US012404101B2

(12) United States Patent
Hellman

(10) Patent No.: US 12,404,101 B2
(45) Date of Patent: Sep. 2, 2025

(54) METHODS, APPARATUSES AND COMPUTER PROGRAM PRODUCTS FOR OPERATING A MODULAR SUPERSTRUCTURE

(71) Applicant: Intelligrated Headquarters, LLC, Mason, OH (US)

(72) Inventor: Kevin Hellman, Katy, TX (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 18/898,569

(22) Filed: Sep. 26, 2024

(65) Prior Publication Data

US 2025/0042657 A1 Feb. 6, 2025

Related U.S. Application Data

(63) Continuation-in-part of application No. 18/796,132, filed on Aug. 6, 2024, which is a continuation of application No. PCT/US2023/012328, filed on Feb. 3, 2023, application No. 18/898,569 is a continuation of application No. PCT/US2023/030875, filed on Aug. 22, 2023.

(Continued)

(51) Int. Cl.

| | |
|---|---|
| ***B65G 1/04*** | (2006.01) |
| ***B65G 1/10*** | (2006.01) |
| ***B65G 1/12*** | (2006.01) |
| ***B65G 1/137*** | (2006.01) |
| ***G06Q 10/04*** | (2023.01) |
| ***G06Q 10/0631*** | (2023.01) |
| ***G06Q 10/0633*** | (2023.01) |

(52) U.S. Cl.
CPC ............ *B65G 1/0478* (2013.01); *B65G 1/10* (2013.01); *B65G 1/12* (2013.01); *B65G 1/1373* (2013.01); *G06Q 10/04* (2013.01); *G06Q 10/06316* (2013.01); *G06Q 10/0633* (2013.01)

(58) Field of Classification Search
CPC ...... B65G 1/0478; B65G 1/1373; B65G 1/10; B65G 1/12; G06Q 10/04; G06Q 10/06316; G06Q 10/0633
See application file for complete search history.

(56) References Cited

U.S. PATENT DOCUMENTS

| | | | |
|---|---|---|---|
| 3,860,130 | A | 1/1975 | Frangos |
| 9,796,527 | B1 | 10/2017 | Kaukl et al. |

(Continued)

FOREIGN PATENT DOCUMENTS

| | | | |
|---|---|---|---|
| CA | 3097226 | A1 | 10/2019 |
| FR | 3097852 | A1 | 1/2021 |

(Continued)

OTHER PUBLICATIONS

IPEA/409—International Preliminary Report on Patentability Mailed on Aug. 22, 2024 for WO Application No. PCT/US23/012328, 14 page(s).

(Continued)

*Primary Examiner* — Jacob S. Scott
*Assistant Examiner* — Erin Morris
(74) *Attorney, Agent, or Firm* — Alston & Bird LLP

(57) ABSTRACT

Methods, apparatuses and computer program products for movement of rectangular prisms in a multi-dimensional space are provided.

20 Claims, 283 Drawing Sheets

Related U.S. Application Data

(60) Provisional application No. 63/499,680, filed on May 2, 2023, provisional application No. 63/484,601, filed on Feb. 13, 2023, provisional application No. 63/373,316, filed on Aug. 23, 2022, provisional application No. 63/267,629, filed on Feb. 7, 2022.

(56) References Cited

U.S. PATENT DOCUMENTS

| | | | |
|---|---|---|---|
| 10,850,959 | B2 | 12/2020 | Goetz |
| 2008/0211358 | A1 | 9/2008 | Borgwarth et al. |
| 2021/0130094 | A1 | 5/2021 | Ingram-Tedd et al. |
| 2022/0242668 | A1 | 8/2022 | Perez et al. |
| 2022/0397404 | A1 | 12/2022 | Franey et al. |
| 2023/0084906 | A1 | 3/2023 | Karri et al. |
| 2023/0264897 | A1 | 8/2023 | Stadie et al. |

FOREIGN PATENT DOCUMENTS

| | | | | | |
|---|---|---|---|---|---|
| FR | 3139809 | A1 | | 3/2024 | |
| KR | 10-2021-0126830 | A | | 10/2021 | |
| MY | 200203 | A | * | 12/2023 | B60L 58/12 |
| WO | 2010/118412 | A1 | | 10/2010 | |
| WO | WO-2015185628 | A2 | * | 12/2015 | B60L 58/12 |
| WO | 2017/186825 | A1 | | 11/2017 | |
| WO | 2019/068775 | A1 | | 4/2019 | |
| WO | 2019/232651 | A1 | | 12/2019 | |
| WO | 2020/011628 | A1 | | 1/2020 | |
| WO | 2020/260639 | A1 | | 12/2020 | |
| WO | 2021/099474 | A1 | | 5/2021 | |
| WO | 2021/197941 | A1 | | 10/2021 | |
| WO | WO-2022013365 | A1 | * | 1/2022 | B65G 1/04 |
| WO | 2022/049101 | A1 | | 3/2022 | |
| WO | 2024/239096 | A1 | | 11/2024 | |

OTHER PUBLICATIONS

Outgoing—ISA/210—International Search Report Mailed on Feb. 27, 2024 for WO Application No. PCT/US23/030875, 24 page(s).
Outgoing—ISA/210—International Search Report Mailed on Jul. 23, 2023 for WO Application No. PCT/US23/012328, 6 page(s).
Outgoing Written Opinion of the ISA Mailed on Feb. 29, 2024 for WO Application No. PCT/US23/030875, 11 page (s).
Outgoing Written Opinion of the ISA Mailed on Jul. 23, 2023 for WO Application No. PCT/US23/012328, 12 page (s).
U.S. Appl. No. 18/796,132, filed Aug. 6, 2024, Pending.
Non-Final Rejection Mailed on Dec 12, 2024 for U.S. Appl. No. 18/898,566, 21 page(s).
Non-Final Rejection Mailed on Nov 14, 2024 for U.S. Appl. No. 18/898,557, 12 page(s).
Non-Final Rejection Mailed on Nov. 19, 2024 for U.S. Appl. No. 18/898,563, 26 page(s).
Non-Final Rejection Mailed on Nov. 26, 2024 for U.S. Appl. No. 18/898,248, 25 page(s).
Non-Final Rejection Mailed on Oct. 23, 2024 for U.S. Appl. No. 18/796,132, 8 page(s).
IPEA/409—International Preliminary Report on Patentability Mailed on Mar. 6, 2025 for WO Application No. PCT/ US23/030875, 13 page(s).
Notice of Allowance and Fees Due (PTOL-85) Mailed on Feb. 12, 2025 for U.S. Appl. No. 18/796,132, 9 page (s).
Non-Final Rejection Mailed on Jan. 22, 2025 for U.S. Appl. No. 18/898,577, 16 page(s).
Examiner Interview Summary Record (PTOL-413) Mailed on Apr. 2, 2025 for U.S. Appl. No. 18/898,248, 1 page(s).
Final Rejection Mailed on Apr. 17, 2025 for U.S. Appl. No. 18/898,566, 19 page(s).
Final Rejection Mailed on Mar. 21, 2025 for U.S. Appl. No. 18/898,557, 15 page(s).
Final Rejection Mailed on Mar. 24, 2025 for U.S. Appl. No. 18/898,563, 19 page(s).
Notice of Allowance and Fees Due (PTOL-85) Mailed on Apr. 2, 2025 for U.S. Appl. No. 18/898,248, 13 page(s).
Notice of Allowance and Fees Due (PTOL-85) Mailed on Apr. 14, 2025 for U.S. Appl. No. 18/796,132, 2 page(s).
Notice of Allowance and Fees Due (PTOL-85) Mailed on Apr. 24, 2025 for U.S. Appl. No. 18/898,248, 2 page(s).
Office Action Appendix Mailed on Apr. 2, 2025 for U.S. Appl. No. 18/898,248, 6 page(s).
Notice of Allowance and Fees Due (PTOL-85) Mailed on May 14, 2025 for U.S. Appl. No. 18/898,248, 6 page (s).
Notice of Allowance and Fees Due (PTOL-85) Mailed on May 20, 2025 for U.S. Appl. No. 18/898,577, 9 page(s).
Notice of Allowance and Fees Due (PTOL-85) Mailed on May 30, 2025 for U.S. Appl. No. 18/898,248, 2 page(s).
Advisory Action (PTOL-303) Mailed on Jul. 21, 2025 for U.S. Appl. No. 18/898,563, 3 page(s).
Notice of Allowance and Fees Due (PTOL-85) Mailed on Jul. 16, 2025 for U.S. Appl. No. 18/898,557, 10 page(s).

* cited by examiner

5402

```
movementVisualationFunction (objectID, xAxisDestination, yAxisDestination, zAxisDestination, timeAtLocaiton, timeToGetToLocation)):vv
        endFrame = timeAtLocation * frameRate

        If (timeAtLocation - timeToGEtToLocation) == previousRenderedTime):
            startFrameForColor = previousRenderedTime * frameRate
        Else:
            startFrameForColor = (endFrame - (frameOffset)) - ((timeToGetToLocation) * frameRate


        startFrameForMotion = (endFrame - (frameOffset) ) - ( (timeToGEtToLocation) * frameRate)
        Destination = (xAxisDestination * scaleFactor + objectOffset,
                (yAxisDestination * scaleFactor + objectOffset,
                (zAxisDestination * scaleFactor + objectOffset)
```

FIG. 54

ALT HYBRID POWER MODEL

21702

$$|\nabla u(x)| = n(x)$$

21704

$$|\nabla u(x)| = \frac{1}{f(x)} \text{ for } x \in \Omega \subset R^n$$

21706

$$u(x) = q(x) \quad \text{for } x \in \partial\Omega$$

21708

$$f\colon \bar{\Omega} \rightarrow (0, +\infty)$$

FIG. 217

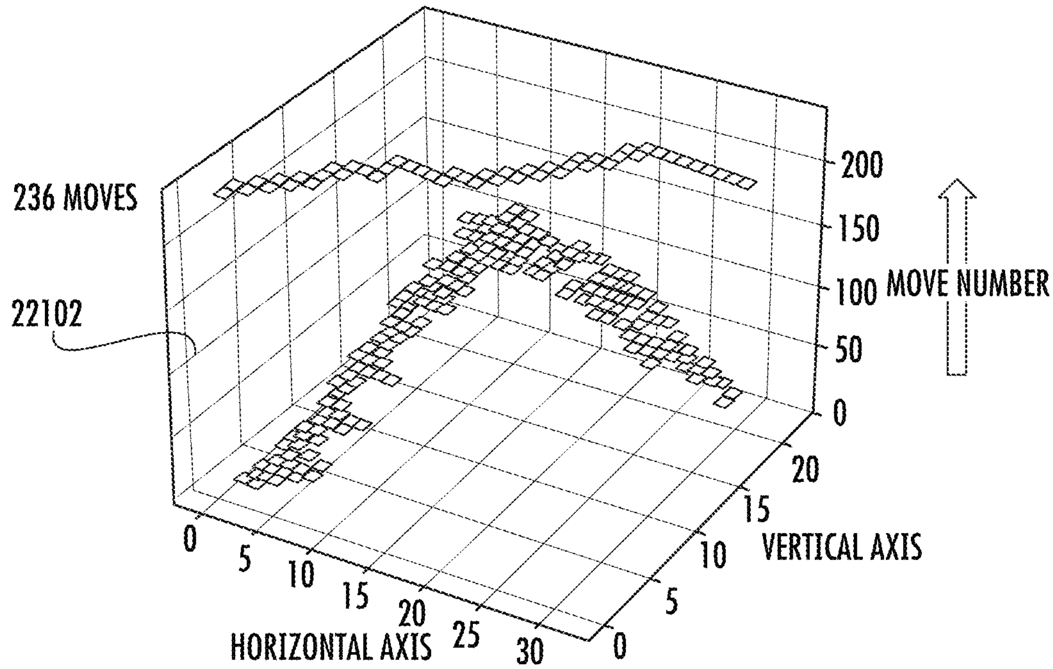
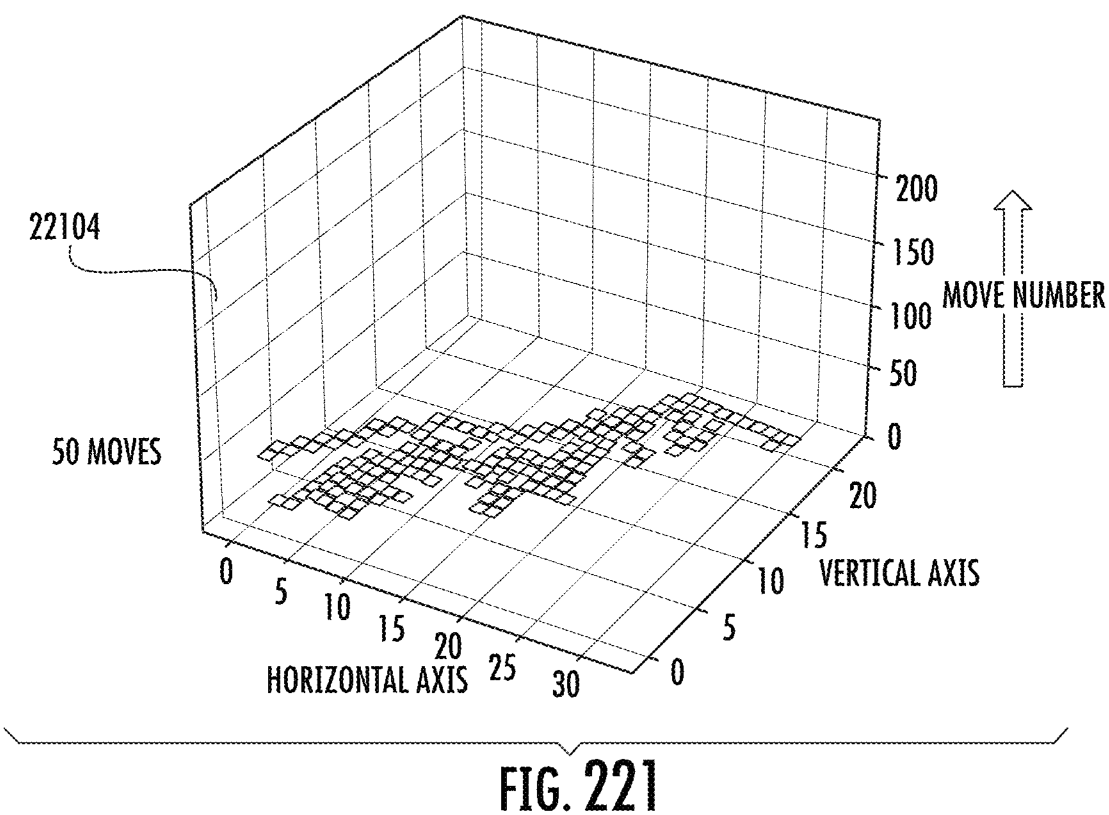
FIG. 221

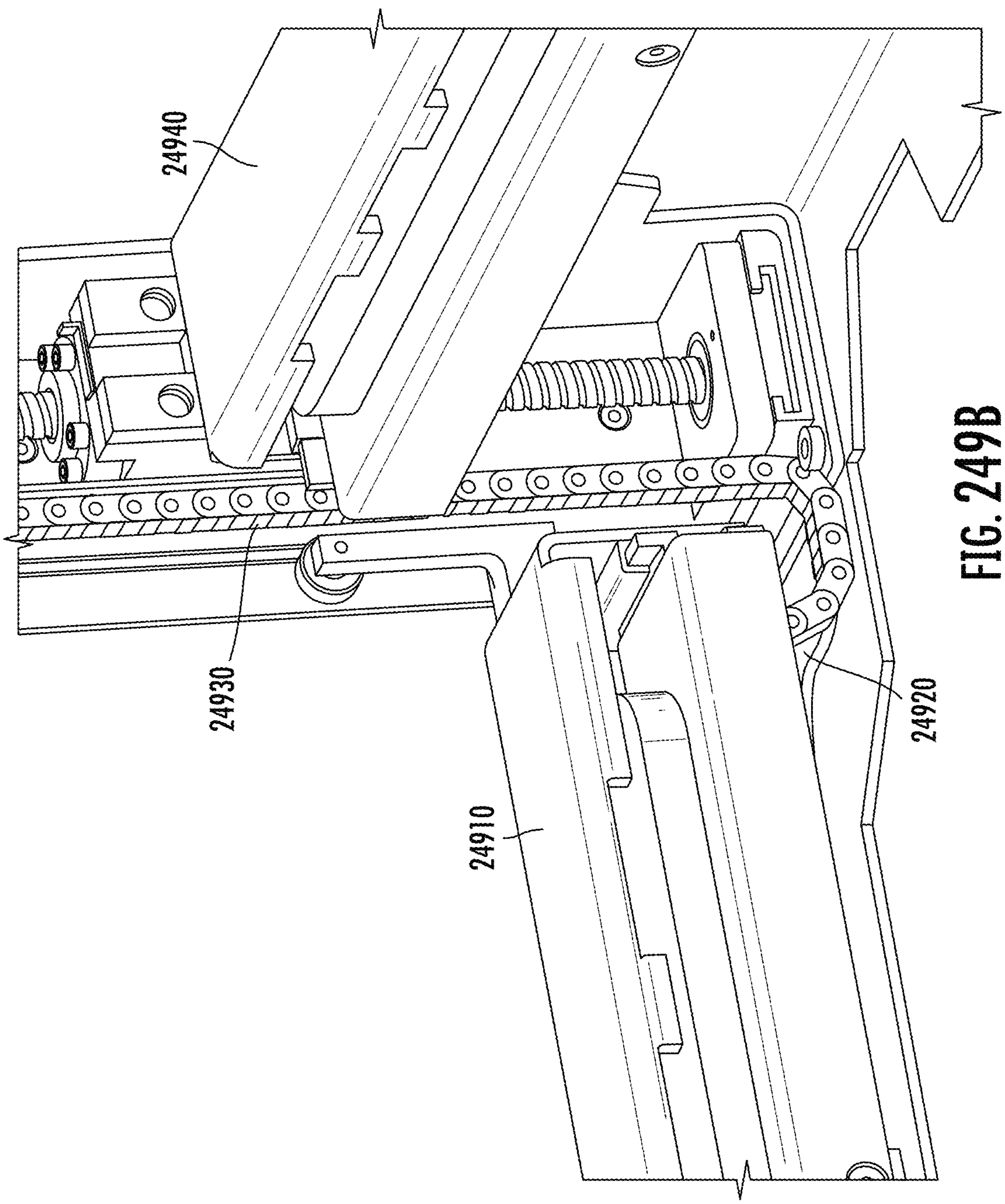
FIG. 2249B

METHODS, APPARATUSES AND COMPUTER PROGRAM PRODUCTS FOR OPERATING A MODULAR SUPERSTRUCTURE

CROSS-REFERENCE TO RELATED APPLICATIONS

The present application is a continuation of PCT Application No. PCT/US2023/030875, filed Aug. 22, 2023, which claims priority to and benefit of U.S. Provisional Patent Application No. 63/373,316 filed Aug. 23, 2022, U.S. Provisional Patent Application No. 63/484,601 filed Feb. 13, 2023, and U.S. Provisional Patent Application No. 63/499,680, filed May 2, 2023, the contents of each of which is incorporated by reference in its entirety.

The present application is a continuation in part of U.S. patent application Ser. No. 18/796,132, filed Aug. 6, 2024, which is a continuation of PCT Application No. PCT/US2023/012328 filed Feb. 3, 2023, which claims priority to and benefit of U.S. Provisional Patent Application No. 63/267,629 filed Feb. 7, 2022, the contents of each of which is incorporated by reference in its entirety.

FIELD OF THE INVENTION

Example embodiments of the present disclosure relate generally to movement of rectangular prisms in a multi-dimensional space and, more particularly, to methods, apparatuses and computer program products for mechanics, communications and control, power, and/or related algorithms for movement of rectangular prisms in a multi-dimensional modular superstructure that is built using a plurality of smart racks.

BACKGROUND

Applicant has identified many technical challenges and difficulties associated with current solutions for storage and retrieval. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and computer program products for the movement of movement of rectangular prisms in a multi-dimensional space.

In accordance with various embodiments of the present disclosure, a smart rack for transporting a rectangular prism is provided. In some embodiments, the smart rack comprises a rack frame comprising a plurality of rack plates, and at least one rack actuator secured to at least an inner surface of at least one of the plurality of rack plates. In some embodiments, the at least one rack actuator comprises: a slider movably disposed on a lead screw; and an arm connected to the slider. In some embodiments, the arm is configured to operate in an engaged mode or a disengaged mode relative to the rectangular prism.

In some embodiments, when the arm operates in the engaged mode, the arm is in contact with an outer surface of the rectangular prism.

In some embodiments, when the arm operates in the disengaged mode, the arm is not in contact with an outer surface of the rectangular prism.

In some embodiments, the smart rack further comprises a swing plate movable between a distal end of a swing bar and a proximal end of the swing bar. In some embodiments, the swing plate is connected to the lead screw. In some embodiments, when the swing plate is at the distal end of the swing bar, the arm is in the disengaged mode. In some embodiments, when the swing plate is at the proximal end of the swing bar, the arm is in the engaged mode.

In some embodiments, the smart rack comprises a linear motor configured to exert a linear motion; and a hinge plate defining a first groove and a second groove. In some embodiments, the linear motor comprises an actuator pin movable along the first groove. In some embodiments, the swing plate is connected to a connector pin movable along the second groove.

In some embodiments, the first groove and the second groove are at a 90-degree angle with one another, such that the hinge plate transfers the linear motion exerted by the linear motor to movements of the swing plate between the distal end and the proximal end.

In some embodiments, the smart rack further comprises a rotary motor. In some embodiments, the rotary motor is configured to cause a rotational motion of the arm relative to the slider.

In accordance with various embodiments of the present disclosure, a method for transmitting a tote plan to a plurality of smart racks in a modular superstructure is provided. In some embodiments, the method comprises receiving, by a processing circuitry of a smart rack, the tote plan from a superstructure controller; determine, by the processing circuitry, whether a smart rack identifier of the tote plan matches a rack coordination set of the smart rack; and in response to determining that the smart rack identifier of the tote plan does not match the rack coordination set of the smart rack, transmitting, by the processing circuitry, the tote plan to at least one peer smart rack of the smart rack.

In some embodiments, the at least one peer smart rack comprises at least one of a top peer smart rack, a bottom peer smart rack, a front peer smart rack, a back peer smart rack, a left peer smart rack, or a right peer smart rack.

In some embodiments, the method further comprises, in response to determining that the smart rack identifier of the tote plan matches the rack coordination set of the smart rack, executing at least one movement instruction of the tote plan.

In some embodiments, executing the at least one movement instruction further comprises: transmitting, by the processing circuitry, a MoveReady message to a right peer smart rack of the smart rack; receiving, by the processing circuitry, a RequestedMoveReady message from the right peer smart rack; and in response to receiving the RequestedMoveReady message, transmitting a MoveRequest message to the right peer smart rack.

In accordance with various embodiments of the present disclosure, a smart rack for selectively conveying power in a modular superstructure is provided. In some embodiments, the smart rack comprises a rack actuator circuit connected to a smart rack power access point of the smart rack; and at least one smart rack switch circuit connected to the smart rack power access point. In some embodiments, the rack actuator circuit is configured to provide power to at least one motor of the smart rack. In some embodiments, each of the at least one smart rack switch circuit is connected to at least one peer smart rack power access point of at least one peer smart rack.

In some embodiments, the smart rack power access point receives power from outside the smart rack.

In some embodiments, the at least one smart rack switch circuit comprises at least one an x dimension smart rack switch circuit, a y dimension smart rack switch circuit, and a z dimension smart rack switch circuit.

In some embodiments, the x dimension smart rack switch circuit is configured to control a flow of electricity from the smart rack to a peer smart rack that is positioned adjacent to the smart rack in an x axis dimension.

In some embodiments, the y dimension smart rack switch circuit is configured to control a flow of electricity from the smart rack to a peer smart rack that is positioned adjacent to the smart rack in a y axis dimension.

In some embodiments, the z dimension smart rack switch circuit is configured to control a flow of electricity from the smart rack to a peer smart rack that is positioned adjacent to the smart rack in a z axis dimension.

In accordance with various embodiments of the present disclosure, a method for generating a tote plan is provided. In some embodiments, the method comprises determining a closest perpendicular peer smart rack to a current smart rack having a target rectangular prism; generating movement instructions related to the current smart rack having a target rectangular prism in the tote plan to cause the target rectangular prism in the current smart rack to be moved to the closest perpendicular peer smart rack in an instance in which the closest perpendicular peer smart rack has state information that is set to open; and generating one or more other movement instructions in the tote plan in an instance in which the closest perpendicular peer smart rack has state information that is set to occupied.

In some embodiments, the method further comprises identifying the target rectangular prism, the current smart rack, and an egress point.

In some embodiments, determining the closest perpendicular peer smart rack comprises determining a perpendicular smart rack that is closest to the egress point.

In some embodiments, the method further comprises determining state information for one or more peer smart racks. In some embodiments, the state information comprises at least one of open or occupied.

In some embodiments, the method further comprises updating the location of the target rectangular prism and setting the closest perpendicular peer smart rack as the current smart rack in an instance in which the current smart rack is moved to the closest perpendicular peer smart rack.

In some embodiments, generating one or more other movement instructions in a tote plan in an instance in which the closest perpendicular peer smart rack has state information that is set to occupied further comprises: determining whether at least one peer smart rack has state information set to open; and causing a rectangular prism in the closest perpendicular peer smart rack to be moved to a peer smart rack of the at least one peer smart rack that has state information set to open.

In some embodiments, generating one or more other movement instructions in a tote plan in an instance in which the closest perpendicular peer smart rack has state information that is set to occupied further comprises: determining whether at least one peer smart rack at a distance n has state information set to open; and determining one or more movements to position at least one peer smart rack at a distance n has state information set to open closer to the current smart rack.

In accordance with various embodiments of the present disclosure, a computer-implemented method is provided. In some embodiments, the computer-implemented method comprises identifying a data graph matrix representation of a modular superstructure comprising a plurality of smart racks, the data graph matrix representation comprising a plurality of nodes representing the plurality of smart racks and a plurality of edges that each connect nodes representing peers of the plurality of smart racks; receiving at least one tote query, the at least one tote query representing a request to relocate at least one tote via the modular superstructure from at least one tote starting position to at least one tote ending position; computing, utilizing a sliding A* algorithm and the data graph matrix, at least one tote movement path to relocate the at least one tote, wherein the at least one tote movement path represents a set of rack operations for relocating the at least one tote in accordance with the at least one tote query; generating a tote plan based at least in part on the at least one tote movement path; and outputting the tote plan.

In some embodiments, the at least one tote comprises a first tote associated with a current position corresponding to a current node of the plurality of nodes and that begins movement from a first tote starting position corresponding to a first node of the plurality of nodes. In some embodiments, computing the at least one tote movement path to relocate the at least one tote comprises: while the current position is determined to not equivalent to any of the at least one tote ending position: executing a first A* pathfinder algorithm to compute a lowest resistance peer node associated with the current node, wherein the lowest resistance peer node comprises a second node of the plurality of nodes that is (1) connected to the current node by at least a first edge of the plurality of edges, and (2) determined to be along a lowest resistance tote movement path from the current position to any of the at least one ending position; determining the lowest resistance peer node is empty; and generating data representing a swap of the first tote to an updated position corresponding to the lowest resistance peer node.

In some embodiments, the at least one tote comprises a first tote associated with a current position corresponding to a current node of the plurality of nodes and that begins movement from a first tote starting position corresponding to a first node of the plurality of nodes. In some embodiments, computing the at least one tote movement path to relocate the at least one tote comprises: while the current position is determined to not equivalent to any of the at least one tote ending position: executing a first A* pathfinder algorithm to compute a lowest resistance peer node associated with the current node, wherein the lowest resistance peer node comprises a second node of the plurality of nodes that is (1) connected to the current node by at least a first edge of the plurality of edges, and (2) determined to be along a lowest resistance tote movement path from the current position to any of the at least one ending position; determining the lowest resistance peer node is filled; executing a second A* pathfinder algorithm to identify a closest empty node connected to the lowest resistance peer node and a second tote movement path that clears the lowest resistance peer node using the second tote movement path; and generating data representing a swap of the first tote to an updated position corresponding to the lowest resistance peer node after clearing the lowest resistance peer node.

In some embodiments, generating the tote plan based at least in part on the at least one tote movement path comprises: configuring the tote plan to serially execute each tote movement plan of the at least one tote movement path.

In some embodiments, the computer-implemented method further comprises initializing the data graph matrix representation of the modular superstructure based at least in part on a matrix manifest that defines a location of each smart rack of the plurality of smart racks, and movement resistance data associated with each smart rack of the plurality of smart racks.

In some embodiments, the computer-implemented method further comprises initializing each particular node of the plurality of nodes by setting, for each particular node, a peer information set comprising peer information associated with each peer node connected to the particular node by at least one edge of the plurality of edges. In some embodiments, the peer information associated with a particular peer node comprises: state data associated with the particular peer node; and/or behavior data associated with the particular peer node.

In some embodiments, identifying the graph matrix representation of the modular superstructure comprises: reading configuration data comprising first configuration data representing a structure of the modular superstructure and second configuration data representing a set of current tote positions for at set of totes stored via the modular superstructure; generating the plurality of nodes and the plurality of edges of the data graph matrix based at least in part on the first data; and configuring at least one data property for at least a portion of the plurality of nodes based at least in part on the second data.

In some embodiments, each node of the plurality of nodes comprises behavior data. In some embodiments, the behavior data for a particular node is used to derive at least one resistance value associated with the particular node.

In some embodiments, the at least one tote query comprises order indication data indicating whether an order of the relocation of the at least one tote via the modular superstructure is defined.

In some embodiments, the at least one tote query comprises a first tote query. In some embodiments, the first tote query comprises: first data indicating a request to relocate a first tote from a first tote starting position to a first tote ending position; second data indicating a request to relocate a first set of totes from a first set of tote starting positions to a first set of tote ending positions; or third data indicating a request to relocate the first tote from the first tote starting position to the first set of tote ending positions.

In some embodiments, at least a first node of the plurality of nodes comprises a time movement value set comprising a time movement value for each direction in which a particular smart rack associated with the first node is capable of moving a particular tote.

In some embodiments, each node of the plurality of nodes comprises current state data. In some embodiments, the current state data for a particular node is configurable between an empty state in a circumstance where a particular smart rack corresponding to the particular node is empty and an occupied state in a circumstance where the particular smart rack is occupied by a particular tote. In some embodiments, the sliding A* algorithm processes at least one data value that is based at least in part on the current state data associated with the particular node.

In some embodiments, each node of the plurality of nodes comprises behavior data that is configurable between at least first behavior, a second behavior, and a second behavior. In some embodiments, the first behavior indicates a particular node is inaccessible. In some embodiments, the second behavior indicates the particular node corresponds to a particular smart rack that operates according to a first set of resistance values. In some embodiments, the third behavior indicates the particular node corresponds to a particular smart rack that operates according to a second set of resistance values. In some embodiments, the second set of resistance values comprises at least a first resistance value associated with a first relocation operation that is preferable to a second resistance value associated with the first relocation operation in the second set of resistance values.

In some embodiments, the data graph matrix represents the modular superstructure and at least one hole associated with the modular superstructure.

In some embodiments, the at least one tote ending position represents an egress position external from the plurality of smart racks.

In accordance with various embodiments of the present disclosure, a method for generating a digital twin of a smart rack superstructure is provided. In some embodiments, the method comprises: accessing a configuration file and a smart rack matrix having peer information; accessing a tote plan having one or more movement instructions for moving rectangular prisms from a start location in a smart rack to an egress point; generating the digital twin based on the configuration file, the smart rack matrix having peer information, and one or more rendering instructions; and causing the tote plan to be executed on the digital twin.

In accordance with some embodiments of the present disclosure, an apparatus is provided. In some embodiments, the apparatus comprises at least one processor and at least one memory comprising computer-coded instructions stored thereon that, in execution with the at least one processor, causes the apparatus: transmit, to a smart rack, a first message in a general messaging data format to cause the smart rack to operate in accordance with the first message; receive, from the smart rack, a second message in the general messaging data format, the second message representing an actual status of the smart rack; and receive, from the smart rack, a third message in a digital rendering data format.

In some embodiments, the apparatus is further caused to: cause rendering of a digital twin based at least in part on the third message.

In some embodiments, the apparatus is further caused to: store log data based at least in part on the second message.

In some embodiments, the apparatus is further caused to: store log data based at least in part on the third message.

In some embodiments, the apparatus is further caused to: generate the first message based at least in part on a tote plan.

In some embodiments, the general messaging format comprises a message type, a message identifier, an origin identifier, a step origin identifier, a step destination identifier, a tote identifier, and a tote SKU.

In some embodiments, the digital rendering data format comprises a message identifier, an object identifier, a rendering view identifier, an X-axis coordinate, a Y-axis coordinate, a Z-axis coordinate, a unit of length, a time at location, a time to get to location, and a unit of time.

In some embodiments, the apparatus receives a plurality of messages in the digital rendering data format, the plurality of messages received from a plurality of smart racks, wherein the apparatus generates a digital twin comprising a plurality of virtual objects each based on one of the plurality of messages.

In some embodiments, the apparatus is further caused to: update at least one virtual object of a digital twin based at least in part on the third message.

In some embodiments, a computer-implemented method comprises transmitting, to a smart rack, a first message in a general messaging data format to cause the smart rack to operate in accordance with the first message; receiving, from the smart rack, a second message in the general messaging data format, the second message representing an actual status of the smart rack; receiving, from the smart rack, a third message in a digital rendering data format.

In some embodiments, the computer-implemented method further comprises: causing rendering of a digital twin based at least in part on the third message.

In some embodiments, the computer-implemented method further comprises: storing log data based at least in part on the second message.

In some embodiments, the computer-implemented method further comprises: storing log data based at least in part on the third message.

In some embodiments, the computer-implemented method further comprises: generating the first message based at least in part on a tote plan.

In some embodiments, the general messaging format comprises a message type, a message identifier, an origin identifier, a step origin identifier, a step destination identifier, a tote identifier, and a tote SKU.

In some embodiments, the digital rendering data format comprises a message identifier, an object identifier, a rendering view identifier, an X-axis coordinate, a Y-axis coordinate, a Z-axis coordinate, a unit of length, a time at location, a time to get to location, and a unit of time.

In some embodiments, the computer-implemented method comprises: receiving a plurality of messages in the digital rendering data format, the plurality of messages received from a plurality of smart racks; and generating a digital twin comprising a plurality of virtual objects each based on one of the plurality of messages.

In some embodiments, the computer-implemented method comprises: updating at least one virtual object of a digital twin based at least in part on the third message.

In some embodiments, a computer program product comprises at least one non-transitory computer-readable storage medium having computer program code stored thereon that, in execution with at least one processor, is configured for: transmitting, to a smart rack, a first message in a general messaging data format to cause the smart rack to operate in accordance with the first message; receiving, from the smart rack, a second message in the general messaging data format, the second message representing an actual status of the smart rack; receiving, from the smart rack, a third message in a digital rendering data format.

In some embodiments, the computer program product is further configured for: causing rendering of a digital twin based at least in part on the third message.

In some embodiments, the computer program product is further configured for: storing log data based at least in part on the second message.

In some embodiments, the computer program product is further configured for: storing log data based at least in part on the third message.

In some embodiments, the computer program product is further configured for: generating the first message based at least in part on a tote plan.

In some embodiments, the general messaging format comprises a message type, a message identifier, an origin identifier, a step origin identifier, a step destination identifier, a tote identifier, and a tote SKU.

In some embodiments, the digital rendering data format comprises a message identifier, an object identifier, a rendering view identifier, an X-axis coordinate, a Y-axis coordinate, a Z-axis coordinate, a unit of length, a time at location, a time to get to location, and a unit of time.

In some embodiments, the computer program product is further configured for: receiving a plurality of messages in the digital rendering data format, the plurality of messages received from a plurality of smart racks; and generating a digital twin comprising a plurality of virtual objects each based on one of the plurality of messages.

In some embodiments, the computer program product is further configured for: updating at least one virtual object of a digital twin based at least in part on the third message.

In some embodiments, an apparatus comprises at least one processor and at least one memory having computer-coded instructions stored thereon that, in execution with the at least one processor, causes the apparatus to: receive, from a smart rack, at least one message in a digital rendering data format; apply data from the at least one message to a movement visualization function, wherein the movement visualization function updates at least one virtual object in a digital twin based at least in part on the at least one message to generate an updated digital twin; and cause rendering of the updated digital twin.

In some embodiments, the apparatus is further caused to: set a rendering property associated with the at least one virtual object based at least in part on the movement visualization function, wherein the rendering property corresponds to visibility through the at least one virtual object.

In some embodiments, the movement visualization function corresponds to a particular rendering view via which the digital twin is rendered.

In some embodiments, at least one message comprises a message identifier, an object identifier, a rendering view identifier, an X-axis coordinate, a Y-axis coordinate, a Z-axis coordinate, a unit of length, a time at location, a time to get to location, and a unit of time.

In some embodiments, the movement visualization function takes as input at least an object identifier, an X-axis destination, a Y-axis destination, a Z-axis destination, a time at location, and a time to get to location.

In some embodiments, the apparatus is further caused to: receive, from the smart rack, at least one other message in a general message data format, wherein the apparatus applies data from the at least one other message to the movement visualization function.

In some embodiments, the apparatus is further caused to: receive a plurality of messages in the digital rendering data format; and apply data from each message of the plurality of messages to the movement visualization function to update a plurality of virtual objects in the digital twin, wherein the updated digital twin comprises an updated version of each of the plurality of virtual objects.

In some embodiments, a computer-implemented method comprises: receiving, from a smart rack, at least one message in a digital rendering data format; applying data from the at least one message to a movement visualization function, wherein the movement visualization function updates at least one virtual object in a digital twin based at least in part on the at least one message to generate an updated digital twin; and causing rendering of the updated digital twin.

In some embodiments, the computer-implemented method further comprises: set a rendering property associated with the at least one virtual object based at least in part on the movement visualization function, wherein the rendering property corresponds to visibility through the at least one virtual object.

In some embodiments, the movement visualization function corresponds to a particular rendering view via which the digital twin is rendered.

In some embodiments, the at least one message comprises a message identifier, an object identifier, a rendering view identifier, an X-axis coordinate, a Y-axis coordinate, a Z-axis coordinate, a unit of length, a time at location, a time to get to location, and a unit of time.

In some embodiments, the movement visualization function takes as input at least an object identifier, an X-axis destination, a Y-axis destination, a Z-axis destination, a time at location, and a time to get to location.

In some embodiments, the computer-implemented method further comprises: receiving, from the smart rack, at least one other message in a general message data format, wherein the computer-implemented method comprises applying data from the at least one other message to the movement visualization function.

In some embodiments, the computer-implemented method further comprises: receiving a plurality of messages in the digital rendering data format; and applying data from each message of the plurality of messages to the movement visualization function to update a plurality of virtual objects in the digital twin, wherein the updated digital twin comprises an updated version of each of the plurality of virtual objects.

In some embodiments, a computer program product comprises at least one non-transitory computer-readable storage medium having computer program code stored thereon that, in execution with at least one processor, is configured for: receiving, from a smart rack, at least one message in a digital rendering data format; applying data from the at least one message to a movement visualization function, wherein the movement visualization function updates at least one virtual object in a digital twin based at least in part on the at least one message to generate an updated digital twin; and causing rendering of the updated digital twin.

In some embodiments, the computer program product is further configured for: setting a rendering property associated with the at least one virtual object based at least in part on the movement visualization function, wherein the rendering property corresponds to visibility through the at least one virtual object.

In some embodiments, the movement visualization function corresponds to a particular rendering view via which the digital twin is rendered.

In some embodiments, the at least one message comprises a message identifier, an object identifier, a rendering view identifier, an X-axis coordinate, a Y-axis coordinate, a Z-axis coordinate, a unit of length, a time at location, a time to get to location, and a unit of time.

In some embodiments, the movement visualization function takes as input at least an object identifier, an X-axis destination, a Y-axis destination, a Z-axis destination, a time at location, and a time to get to location.

In some embodiments, the computer program product is further configured for: receiving, from the smart rack, at least one other message in a general message data format, wherein the computer program product is configured for applying data from the at least one other message to the movement visualization function.

In some embodiments, the computer program product is further configured for: receiving a plurality of messages in the digital rendering data format; and applying data from each message of the plurality of messages to the movement visualization function to update a plurality of virtual objects in the digital twin, wherein the updated digital twin comprises an updated version of each of the plurality of virtual objects.

In accordance with various embodiments of the present disclosure, a smart rack switch circuit for a smart rack is provided. In some embodiments, the smart rack switch circuit comprises a transistor comprising a transistor source pin, a transistor drain pin, and a transistor gate pin, wherein the transistor source pin is electrically coupled to a smart rack power access point associated with the smart rack, wherein the transistor drain pin is electrically coupled to a peer smart rack power access point of a peer smart rack neighboring the smart rack; and a controller comprising an input voltage sensing pin, an output voltage sensing pin, and a gate drive output pin, wherein the input voltage sensing pin is electrically coupled to the transistor source pin of the transistor, wherein the output voltage sensing pin is electronically coupled to the transistor drain pin of the transistor, wherein the gate drive output pin is electronically coupled to the transistor gate pin of the transistor.

In some embodiments, the transistor comprises a field-effect transistor (FET).

In some embodiments, the transistor comprises a metal-oxide-semiconductor FET.

In some embodiments, the controller comprises an ideal diode controller.

In some embodiments, a power control input is transmitted to the controller through a shutdown control pin of the controller.

In some embodiments, in response to the power control input indicating a connection signal, the controller outputs a connection voltage through the gate drive output pin and connects the transistor source pin and the transistor drain pin.

In some embodiments, in response to the power control input indicating a disconnection signal, the controller outputs a disconnection voltage through the gate drive output pin and disconnects the transistor source pin and the transistor drain pin.

In accordance with various embodiments of the present disclosure, a smart rack power circuit for selectively conveying power in a modular superstructure is provided. In some embodiments, the smart rack power circuit comprises a smart rack controller electrically coupled to a rechargeable power source and at least one dimension smart rack switch circuit; and a smart charger electrically coupled to a smart rack power access point and the rechargeable power source.

In some embodiments, the smart rack controller transmits at least one power control input signal to the at least one dimension smart rack switch circuit.

In some embodiments, the at least one dimension smart rack switch circuit is electrically coupled to the smart rack power access point.

In some embodiments, the at least one dimension smart rack switch circuit is configured to control a flow of electricity from the smart rack power access point to a peer smart rack that is positioned adjacent to a smart rack in an axis dimension based on the at least one power control input signal.

In some embodiments, the at least one dimension smart rack switch circuit comprises at least one of an x dimension smart rack switch circuit, a y dimension smart rack switch circuit, and a z dimension smart rack switch circuit.

In some embodiments, the smart rack controller transmits at least one charge control input signal to the smart charger.

In some embodiments, the smart charger is configured to control a flow of electricity from the smart rack power access point to the rechargeable power source based at least in part on the at least one charge control input signal.

In accordance with various embodiments of the present disclosure, a smart rack power circuit for selectively conveying power in a modular superstructure operating system is provided. In some embodiments, the smart rack power circuit comprises an OR gate comprising a first input end electrically coupled to a rechargeable power source, a second input end electrically coupled to a smart rack power access point, and an output end electrically coupled to a smart rack controller; and a smart charger electrically coupled to the rechargeable power source and the smart rack power access point.

In some embodiments, the smart rack controller receives power from at least one of the smart rack power access point or the rechargeable power source.

In some embodiments, the smart rack controller transmits at least one power control input signal to at least one dimension smart rack switch circuit.

In some embodiments, the at least one dimension smart rack switch circuit is electrically coupled to the smart rack power access point.

In some embodiments, the at least one dimension smart rack switch circuit is configured to control a flow of electricity from the smart rack power access point to a peer smart rack that is positioned adjacent to a smart rack in an axis dimension based on the at least one power control input signal.

In some embodiments, the at least one dimension smart rack switch circuit comprises at least one of an x dimension smart rack switch circuit, a y dimension smart rack switch circuit, and a z dimension smart rack switch circuit.

In some embodiments, the smart rack controller transmits at least one charge control input signal to the smart charger.

In some embodiments, the smart charger is configured to control a flow of electricity from the smart rack power access point to the rechargeable power source based at least in part on the at least one charge control input signal.

In accordance with various embodiments of the present disclosure, a smart rack for transporting a rectangular prism is provided. In some embodiments, the smart rack comprises a rack frame, at least one pinion gear, and at least one geared rack. In some embodiments, the rack frame comprises a plurality of lateral rack beams. In some embodiments, the at least one pinion gear is secured to at least one of the plurality of lateral rack beams. In some embodiments, the at least one geared rack engages with the at least one pinion gear.

In some embodiments, at least one pinion gear comprises: a first pinion gear secured to a first lateral rack beam of the plurality of lateral rack beams, and a second pinion gear secured to a second lateral rack beam of the plurality of lateral rack beams. In some embodiments, the first lateral rack beam and the second lateral rack beam are in a diagonal arrangement with one another.

In some embodiments, the at least one geared rack comprises a first geared rack engaging with the first pinion gear, and a second geared rack engaging with the second pinion gear. In some embodiments, each of the first geared rack and the second geared rack is in a parallel arrangement with the plurality of lateral rack beams.

In some embodiments, a length of each of the first geared rack and the second geared rack is less than a length of each of the plurality of lateral rack beams.

In some embodiments, the smart rack further comprises at least one fork connected to at least a bottom end of the at least one geared rack.

In some embodiments, the at least one fork is in a perpendicular arrangement with the at least one geared rack. In some embodiments, the rectangular prism is positioned on the at least one fork.

In some embodiments, the at least one pinion gear and the at least one geared rack are configured to transform between a retracted mode and an engaged mode.

In some embodiments, when the at least one pinion gear and the at least one geared rack are in the retracted mode, the rectangular prism is positioned within the rack frame.

In some embodiments, when the at least one pinion gear and the at least one geared rack are in the engaged mode, the at least a portion of the rectangular prism is positioned outside of the rack frame.

In accordance with various embodiments of the present disclosure, a smart rack for transporting a rectangular prism is provided. In some embodiments, the smart rack comprises a plurality of slide rails and at least one shutter. In some embodiments, the plurality of slide rails are secured to a plurality of bottom rack beams of a rack frame. In some embodiments, at least one shutter is movably attached to the plurality of slide rails.

In some embodiments, the plurality of slide rails are in parallel arrangements with the plurality of bottom rack beams.

In some embodiments, the at least one shutter defines a first leg portion, a second leg portion, and a center portion between the first leg portion and the second leg portion.

In some embodiments, the first leg portion is in a perpendicular arrangement with the second leg portion.

In some embodiments, the center portion of the at least one shutter is secured to a center slider. In some embodiments, a first end of the first leg portion of the at least one shutter is secured to a leg slider.

In some embodiments, the center slider is movable along a first slide rail of the plurality of slide rails. In some embodiments, the leg slider is movable along a second slide rail of the plurality of slide rails.

In some embodiments, the first slide rail and the second slide rail are in a perpendicular arrangement with one another.

In some embodiments, the smart rack further comprises at least one mecanum wheel disposed on a top surface of the at least one shutter.

In accordance with various embodiments of the present disclosure, a smart rack for transporting a rectangular prism is provided. In some embodiments, the smart rack comprises a rack frame and at least one transport roller.

In some embodiments, the rack frame comprises at least one rack beam. In some embodiments, the at least one transport roller is secured on an inner surface of the at least one rack beam.

In some embodiments, each of the at least one rack beam comprises a horizontal rack plate and a vertical rack plate. In some embodiments, the horizontal rack plate is in a perpendicular arrangement with the vertical rack plate.

In some embodiments, the at least one rack beam comprises at least one bottom rack beam. In some embodiments, the at least one transport roller comprises at least one bottom transport roller that is secured to the at least one bottom rack beam.

In some embodiments, a height of the at least one bottom transport roller is less than a height of the vertical rack plate.

In some embodiments, the at least one bottom transport roller is configured to cause a transport of the rectangular prism from the smart rack to a peer smart rack in an X direction or an Y direction.

In some embodiments, the at least one rack beam comprises at least one top rack beam. In some embodiments, the at least one transport roller comprises at least one top transport roller that is secured to the at least one top rack beam.

In some embodiments, a width of the at least one top transport roller is less than a width of the horizontal rack plate.

In some embodiments, the at least one top transport roller is configured to cause a transport of a rectangular prism from the rack frame to a peer rack frame in an Z direction.

In accordance with various embodiments of the present disclosure, a smart rack for transporting a rectangular prism is provided. In some embodiments, the smart rack comprises a rack frame and at least one guidance roller. In some embodiments, the rack frame comprises at least one rack beam. In some embodiments, the at least one guidance roller is secured on an edge of the at least one rack beam.

In some embodiments, each of the at least one rack beam comprises a horizontal rack plate and a vertical rack plate. In some embodiments, the horizontal rack plate is in a perpendicular arrangement with the vertical rack plate.

In some embodiments, the at least one rack beam comprises at least one bottom rack beam. In some embodiments, the at least one guidance roller is secured to a top edge of the vertical rack plate of the at least one bottom rack beam.

In some embodiments, the at least one guidance roller is motorized via at least one roller belt that engages with a motor.

In accordance with various embodiments of the present disclosure, a smart rack for transporting a rectangular prism is provided. In some embodiments, the smart rack comprises a rack frame and at least one roller arm.

In some embodiments, the rack frame comprises at least one rack beam. In some embodiments, the at least one roller arm defines a first end and a second end. In some embodiments, the first end is connected to the at least one rack beam via at least one rotation plate. In some embodiments, a guidance roller is secured to the second end.

In some embodiments, the at least one roller arm is in a perpendicular arrangement with the at least one rack beam.

In accordance with various embodiments of the present disclosure, a smart rack for transporting a rectangular prism is provided. In some embodiments, the smart rack comprises a rack frame and at least one guidance element.

In some embodiments, the rack frame comprises at least one bottom rack beam. In some embodiments, the at least one guidance element is secured on an edge of the at least one bottom rack beam.

In accordance with various embodiments of the present disclosure, a smart rack for transporting a rectangular prism is provided. In some embodiments, the smart rack comprises a rack frame and a gantry.

In some embodiments, the rack frame comprises a plurality of bottom rack beams. In some embodiments, the gantry is secured to the plurality of bottom rack beams.

In some embodiments, the gantry comprises: a first gantry beam and a second gantry beam, wherein each of the first gantry beam and the second gantry beam is secured to one of the plurality of bottom rack beams; and a first motor sliding rail and a second motor sliding rail that are secured between the first gantry beam and the second gantry beam. In some embodiments, the first motor sliding rail and the second motor sliding rail are in parallel arrangements with each other.

In some embodiments, the gantry comprises a carriage.

In some embodiments, the rectangular prism is positioned on a top surface of the carriage.

In some embodiments, the gantry comprises: a first carriage sliding rail and a second carriage sliding rail that are secured between the first motor sliding rail and the second motor sliding rail. In some embodiments, the first carriage sliding rail and the second carriage sliding rail are in parallel arrangements with each other and are in perpendicular arrangements with the first motor sliding rail and the second motor sliding rail.

In some embodiments, the carriage is movable the first carriage sliding rail and the second carriage sliding rail.

In some embodiments, the gantry comprises: a first motor secured to the first gantry beam, and an X direction drive belt engaging with the first motor and secured between the first gantry beam and the second gantry beam, wherein the first drive belt is in a parallel arrangement with the first motor sliding rail and the second motor sliding rail.

In some embodiments, the first carriage sliding rail and the second carriage sliding rail are slidably attached to the X direction drive belt via at least one support plate.

In some embodiments, the gantry comprises: a second motor secured to one of the at least one support plate; and a Y direction drive belt engaging with the second motor.

In some embodiments, the carriage is connected to the Y direction drive belt.

In accordance with various embodiments of the present disclosure, a smart rack for transporting a rectangular prism is provided. In some embodiments, the smart rack comprises a rack frame and a crane and pulley assembly.

In some embodiments, the rack frame comprises a plurality of rack beams. In some embodiments, the crane assembly is secured to the plurality of rack beams.

In some embodiments, the crane assembly comprises a first crane rail and a second crane rail that are in parallel arrangements with each other. In some embodiments, each of the first crane rail and the second crane rail is secured to one of the plurality of rack beams.

In some embodiments, the crane assembly comprises a crane bridge slidably connected to the first crane rail and the second crane rail.

In some embodiments, the crane assembly comprises a hoist slidably secured to the crane bridge.

In some embodiments, the crane assembly further comprises at least one arm. In some embodiments, a first end of the at least one arm is secured to the hoist, wherein a second end of the at least one arm is connected to a claw.

In accordance with various embodiments of the present disclosure, a superstructure for transporting a rectangular prism is provided. In some embodiments, the superstructure comprises a plurality of smart racks forming a horizontal rack neighborhood.

In some embodiments, each of the plurality of smart racks comprises at least one horizontal transport mechanism for transporting the rectangular prism horizontally. In some embodiments, only one of the plurality of smart racks comprises a vertical transport mechanism for transporting the rectangular prism vertically.

In some embodiments, the at least one horizontal transport mechanism comprises at least one roller.

In some embodiments, the at least one horizontal transport mechanism comprises at least one shutter.

In some embodiments, the at least one horizontal transport mechanism comprises at least one gantry assembly.

In some embodiments, the vertical transport mechanism comprises at least one rack and pinion assembly.

In some embodiments, the vertical transport mechanism comprises at least one crane and pulley assembly.

According to some embodiments, there is provided a rectangular prism configured to be transported between a plurality of smart racks. In some embodiments, the rectangular prism includes a plurality of lips disposed along one or more surfaces of the rectangular prism. In some embodiments, the rectangular prism includes a plurality of nubs disposed on one or more surfaces of the rectangular prism. In some embodiments, the plurality of nubs are configured to assist in transporting the rectangular prism between the plurality of smart racks.

In some embodiments, the rectangular prism includes a plurality of rails disposed along one or more surfaces of the rectangular prism.

In some embodiments, the rectangular prism includes a plurality of guide rails disposed on one or more of the surfaces of the rectangular prism.

In some embodiments, the plurality of guide rails are disposed on the bottom surface of the rectangular prism.

In some embodiments, the plurality of guide rails are configured to move along one or more rollers that are disposed on one or more of the plurality of smart racks.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 54 illustrates an example movement visualization function in accordance with at least one example embodiment of the present disclosure.

FIG. 94 shows an angled view of an example repair and inspection robot in accordance with some embodiments of the present disclosure.

FIG. 95 shows an angled view of an example repair and inspection robot having a camera in accordance with some embodiments of the present disclosure.

FIG. 96 illustrates an angled view of an example smart rack including tote alignment sensors in accordance with some embodiments of the present disclosure.

FIG. 97 illustrates an example motor actuation device in accordance with some embodiments of the present disclosure.

FIG. 98 illustrates an example motor actuation device in accordance with some embodiments of the present disclosure.

FIG. 99 illustrates an example slip device in accordance with some embodiments of the present disclosure.

FIG. 100 illustrates an example rectangular prism in accordance with some embodiments of the present disclosure.

FIG. 101A illustrates an example cross-section view of an example modular superstructure in accordance with some embodiments of the present disclosure.

FIG. 101B illustrates example distributions of electrometric coils in accordance with some embodiments of the present disclosure.

FIG. 102 illustrates an example cross-section view of an example modular superstructure in accordance with some embodiments of the present disclosure.

FIG. 103 illustrates an example method of associating a rectangular prism identifier with a user identifier in accordance with some embodiments of the present disclosure.

FIG. 104 illustrates an example method of determining a rectangular prism identifier associated with a user identifier in accordance with some embodiments of the present disclosure.

Figure 105A:
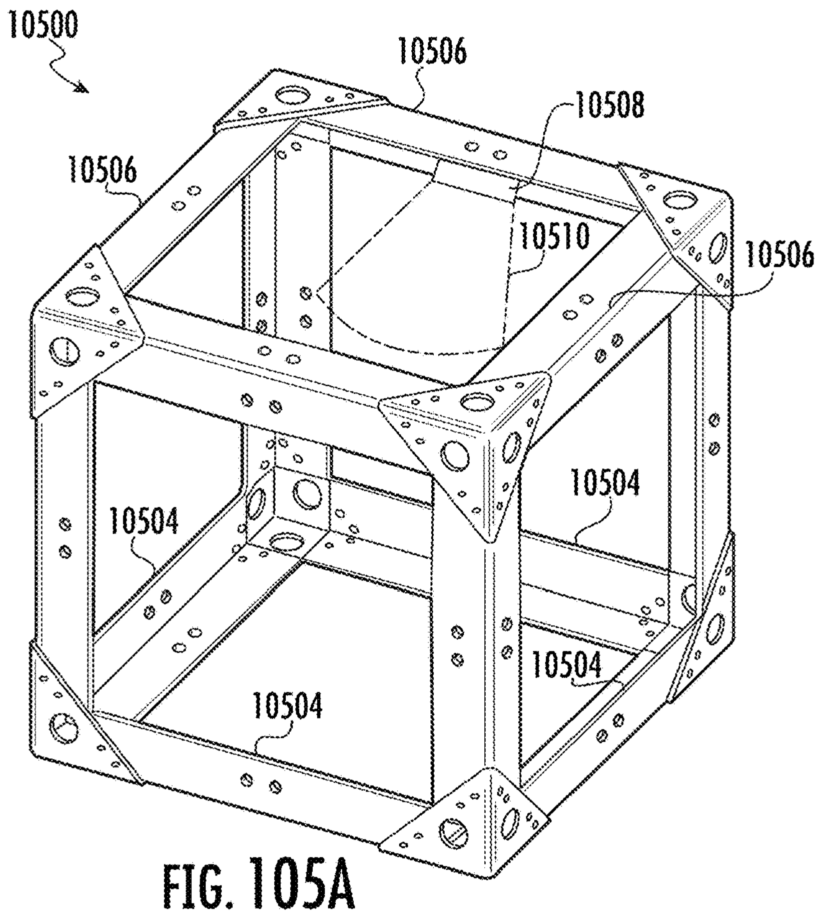
Figure 105B:
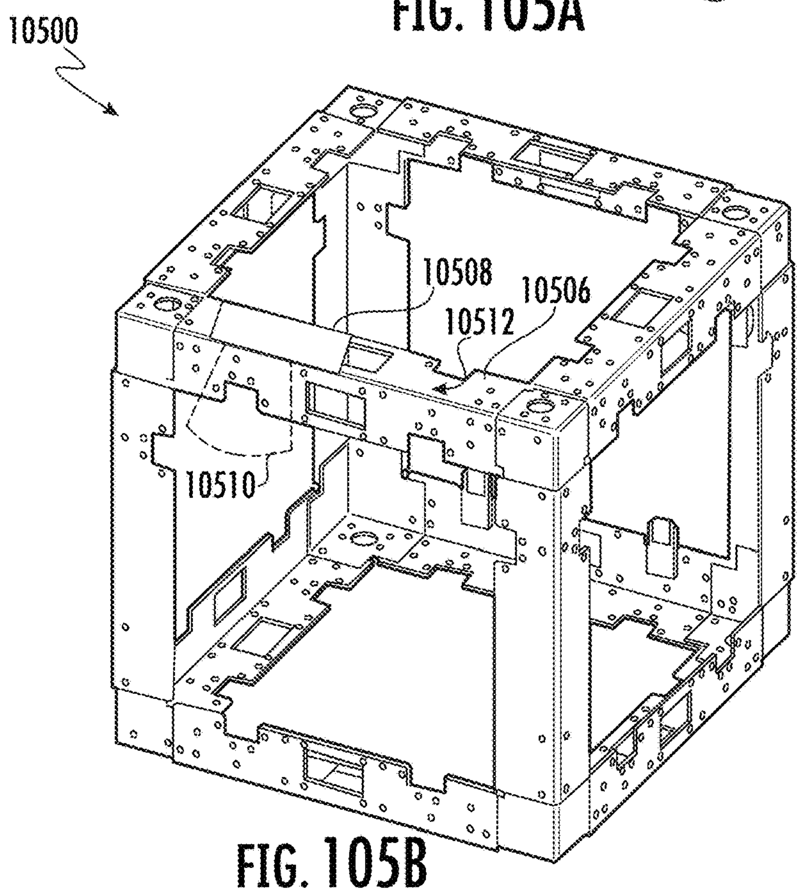

FIG. 105A and FIG. 105B illustrate an example scanning enabled smart rack in accordance with some embodiments of the present disclosure.

Figure 106:
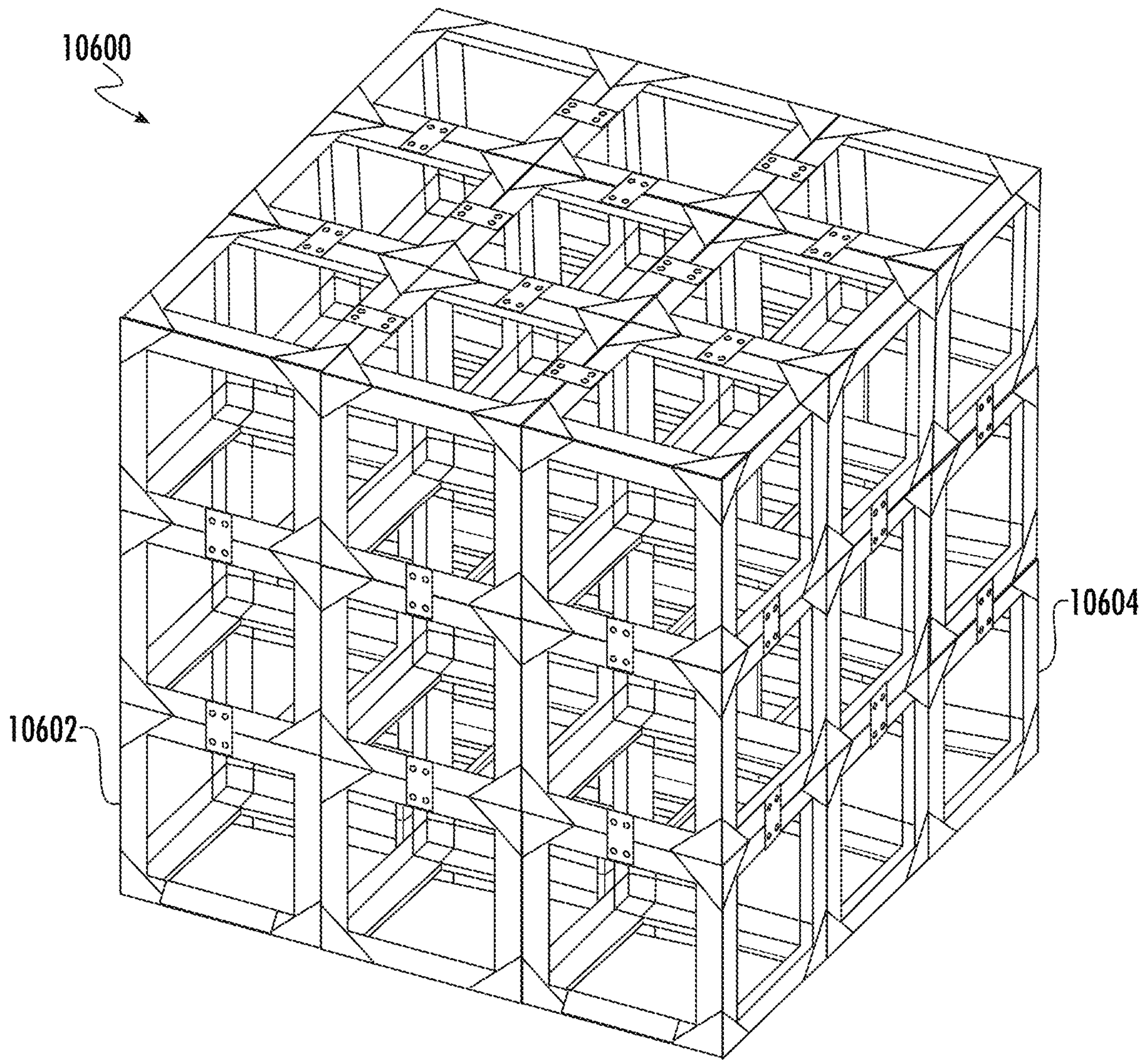

FIG. 106 illustrates an example modular superstructure including one or more scanner enabled smart racks in accordance with some embodiments of the present disclosure.

Figure 107:
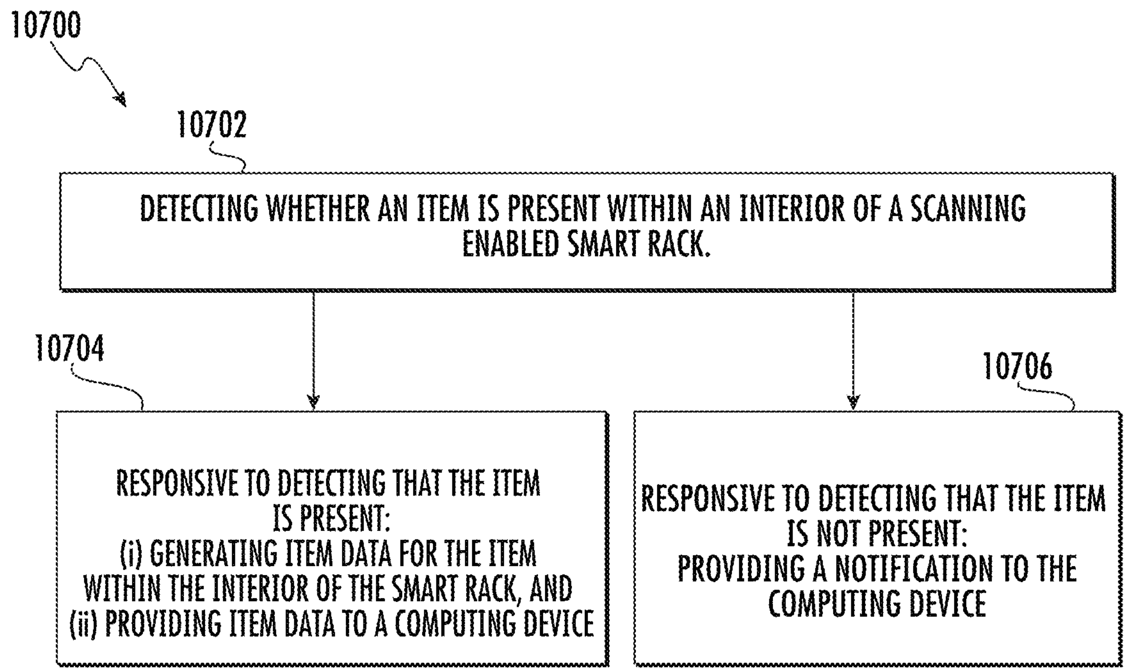

FIG. 107 illustrates a flow chart depicting operations of an example process for prioritized tote retrieval in accordance with some embodiments of the present disclosure.

Figure 108:
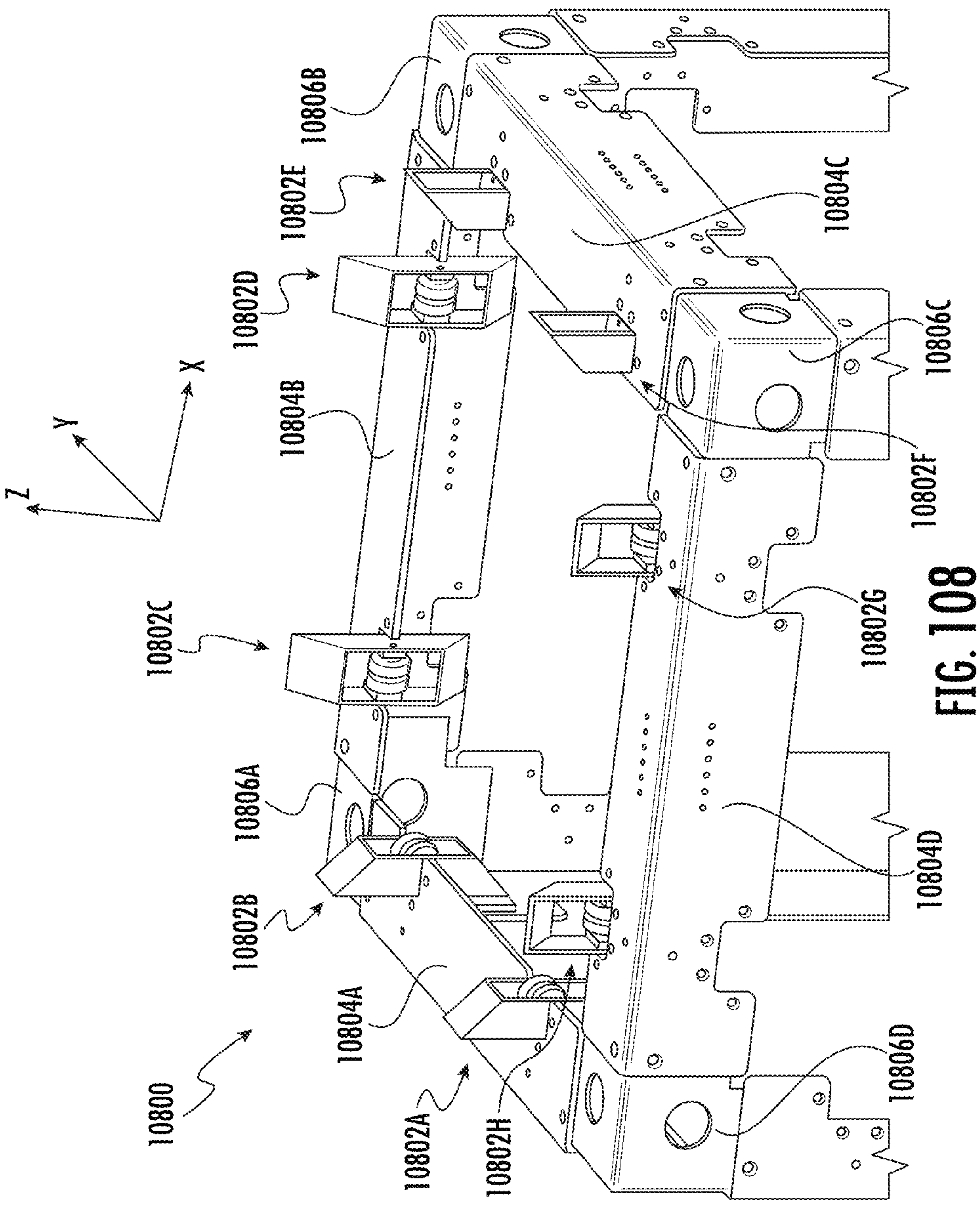

FIG. 108 illustrates an angled view of a top section of a smart rack with example guidance planes in accordance with some embodiments of the present disclosure.

Figure 109:
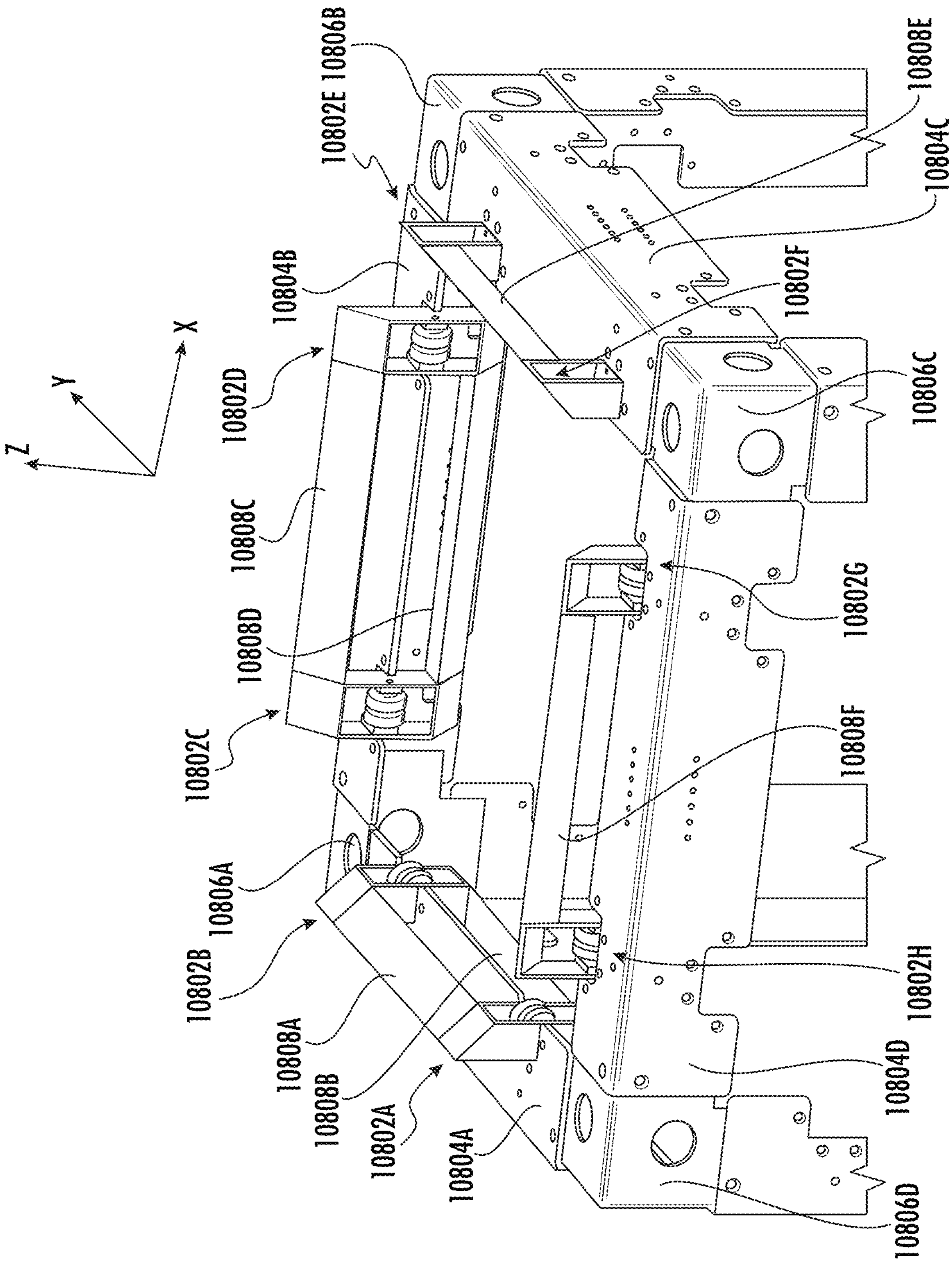

FIG. 109 illustrates an angled view of a top section of a smart rack with example guidance planes in accordance with some embodiments of the present disclosure.

Figure 110:
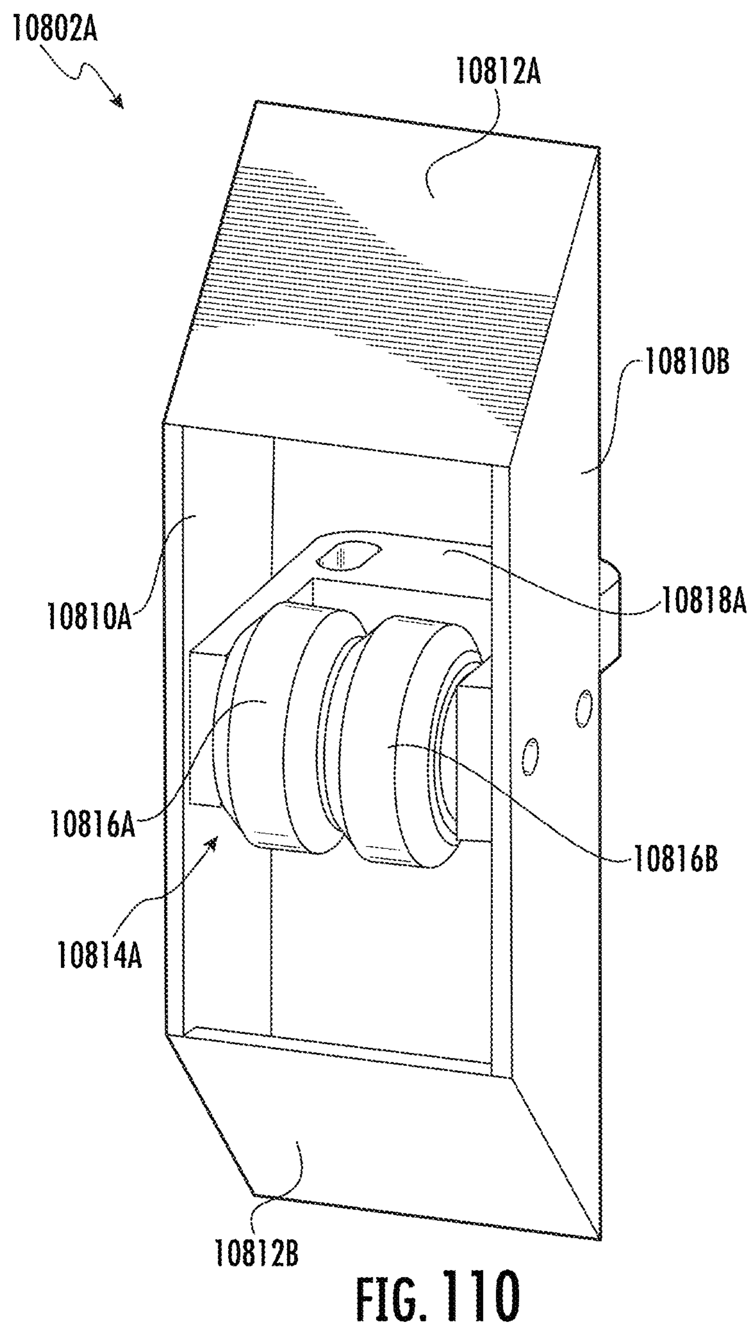

FIG. 110 illustrates an angled view of a guidance subassembly in accordance with some embodiments of the present disclosure.

Figure 111A:
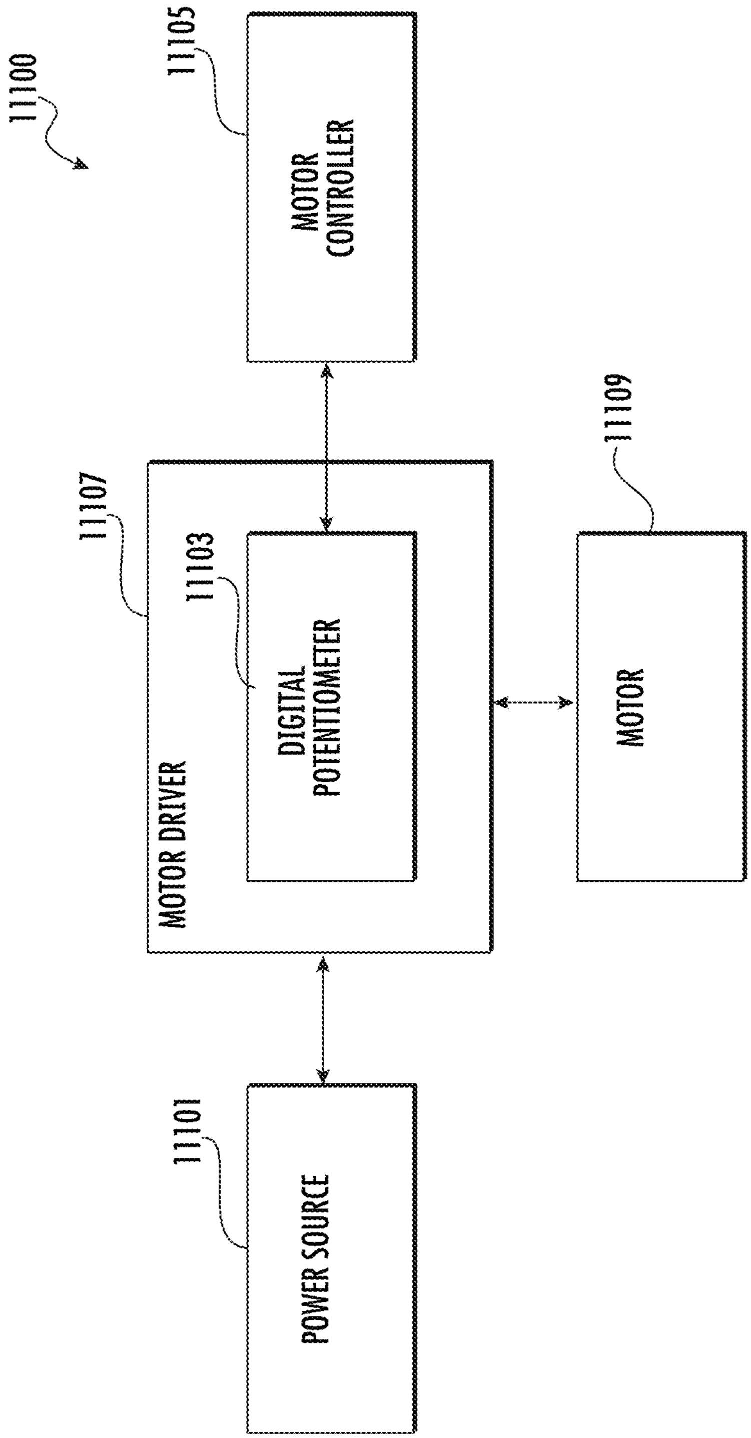

FIG. 111A illustrates an example block diagram of an example arm actuation device in accordance with some embodiments of the present disclosure.

Figure 111B:
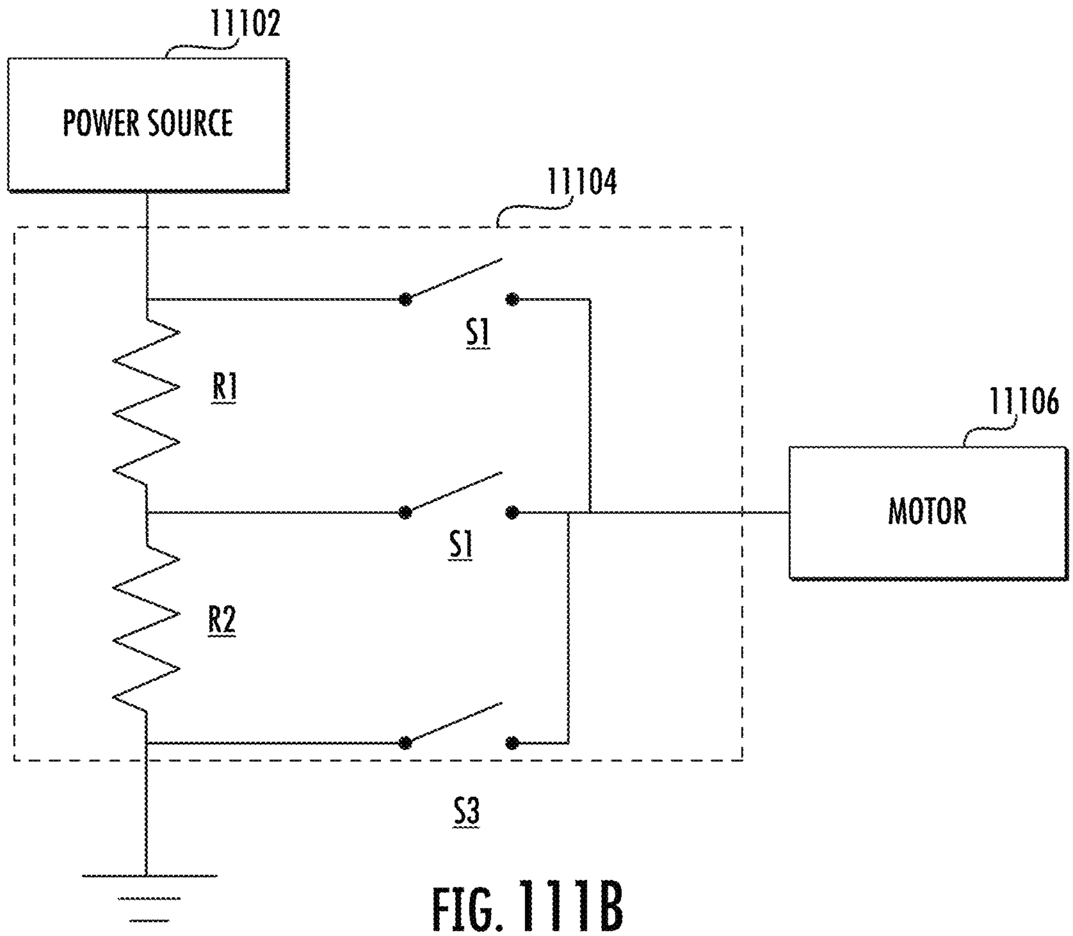

FIG. 111B illustrates an example digital potentiometer in accordance with some embodiments of the present disclosure.

Figure 112:
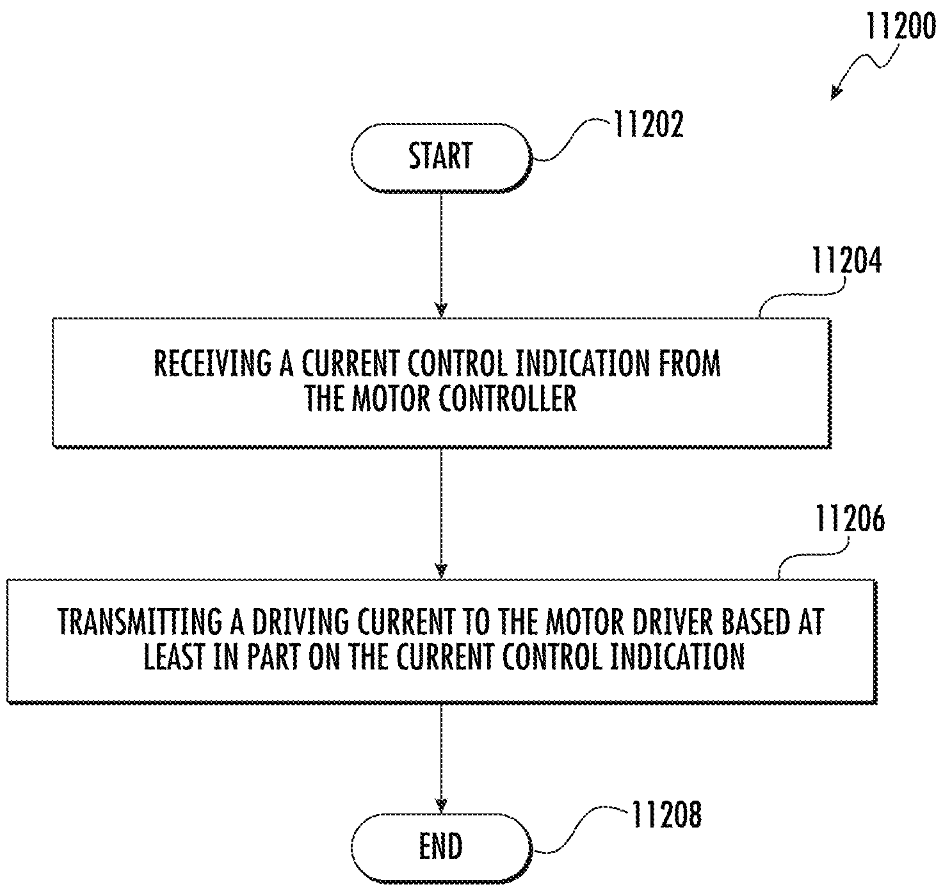

FIG. 112 illustrates an example method of operating the example arm actuation device in accordance with some embodiments of the present disclosure.

Figure 113:
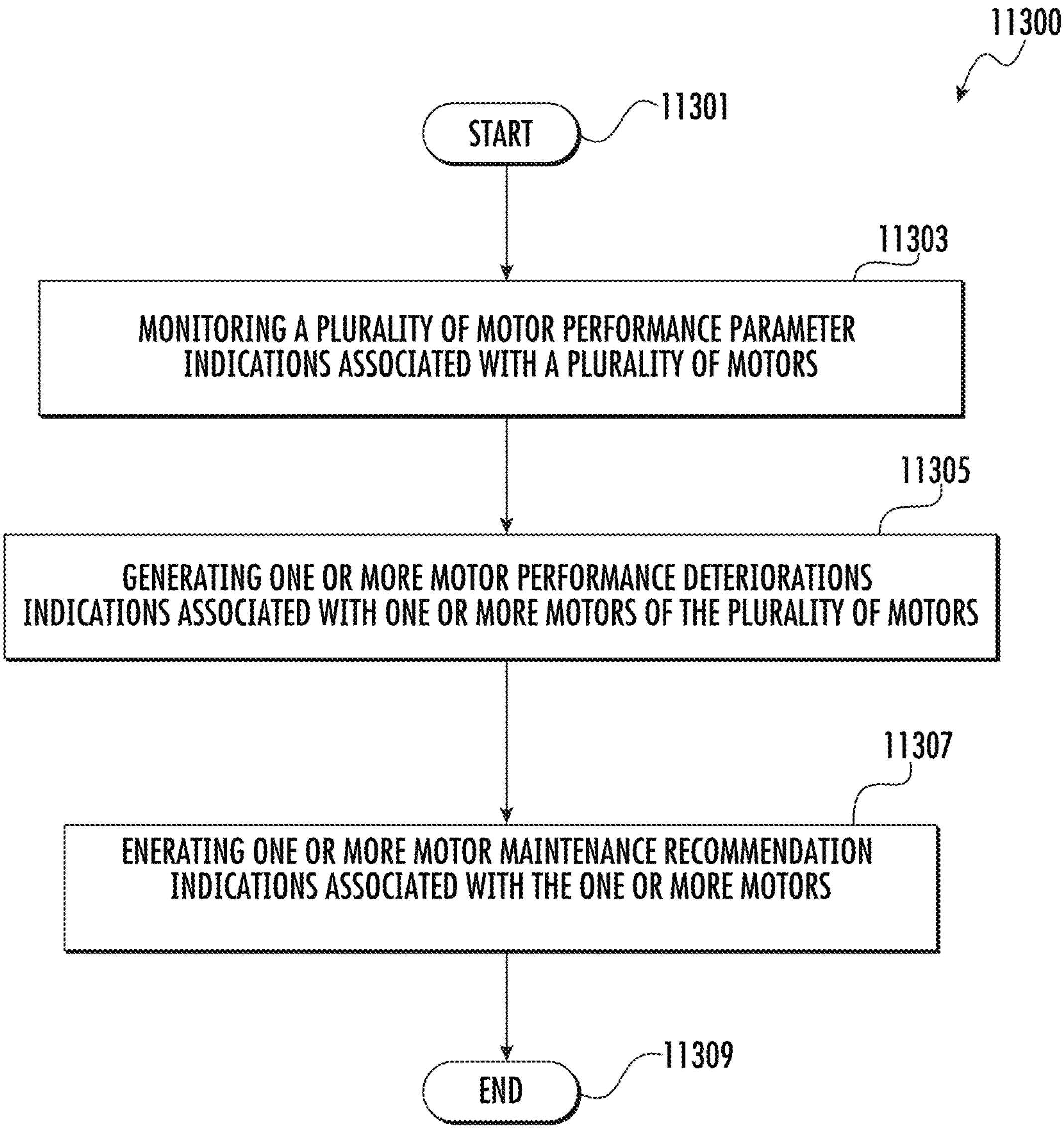

FIG. 113 illustrates an example method of generating motor maintenance recommendation indications in accordance with some embodiments of the present disclosure.

Figure 114:
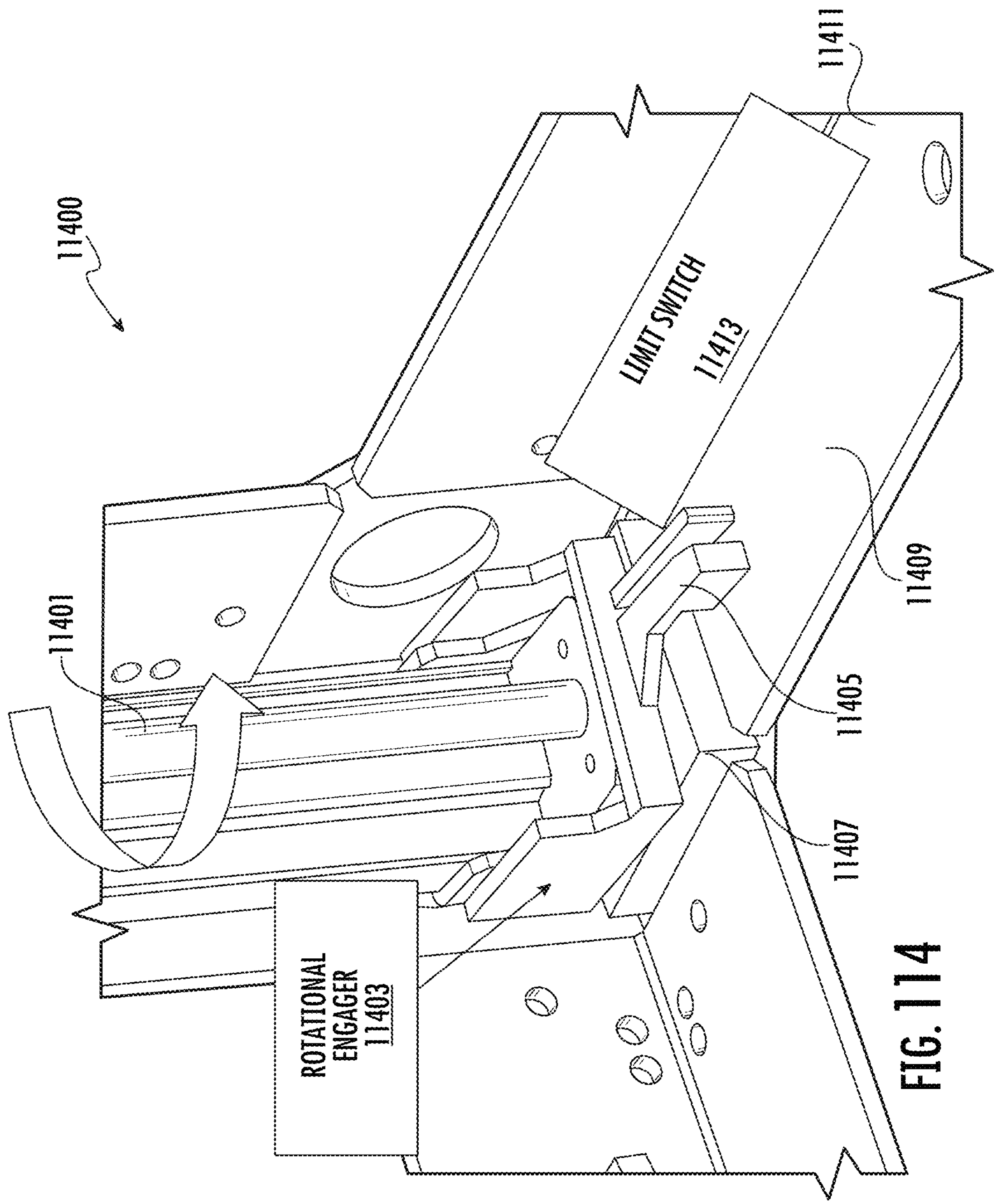

FIG. 114 illustrates an example portion of an example smart rack in accordance with some embodiments of the present disclosure.

Figure 115:
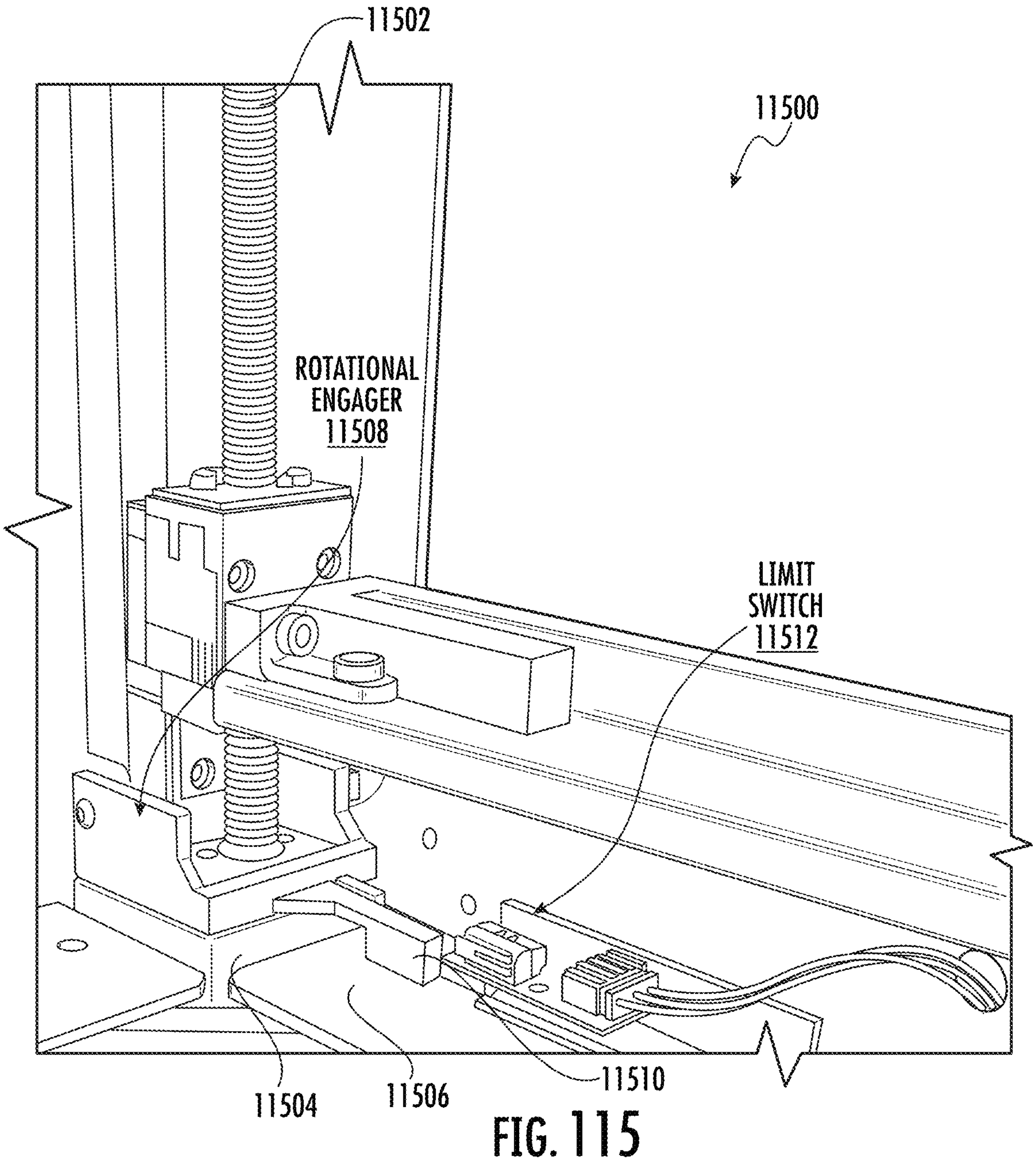

FIG. 115 illustrates an example portion of an example smart rack in accordance with some embodiments of the present disclosure.

Figure 116:
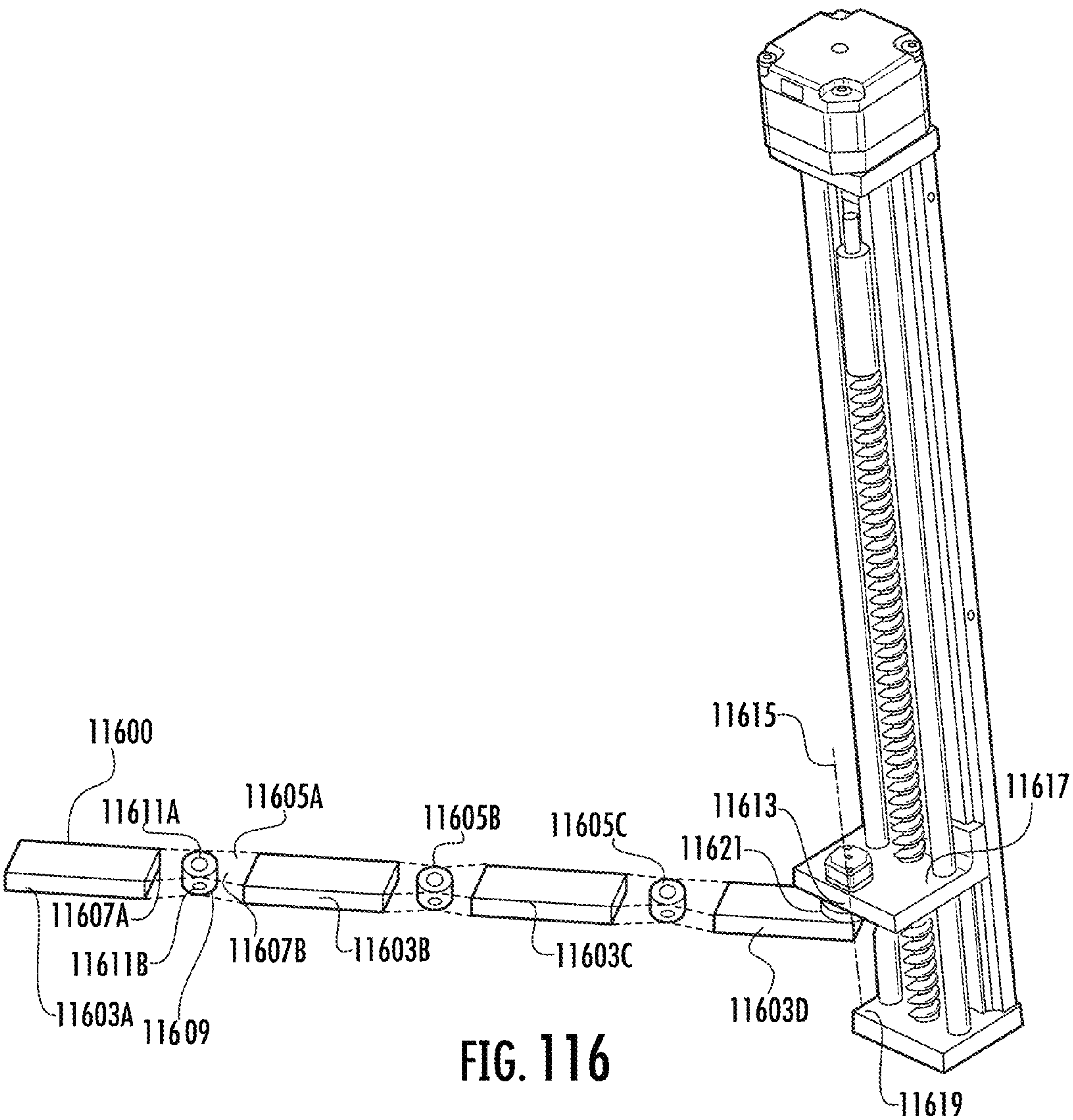

FIG. 116 illustrates an example smart rack arm in accordance with some embodiments of the present disclosure.

Figure 117A:
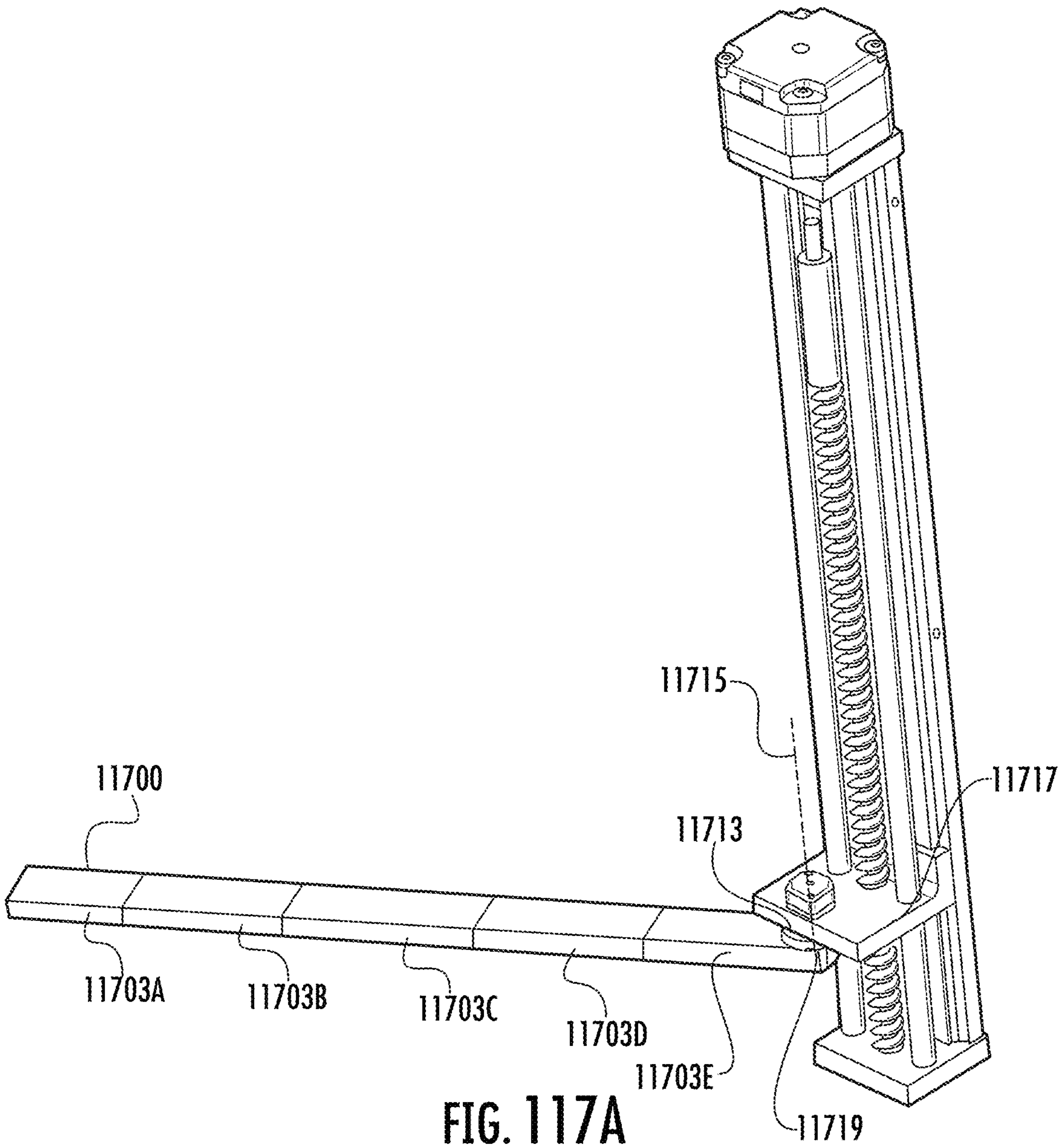

FIG. 117A illustrates an example perspective view of an example smart rack arm in accordance with some embodiments of the present disclosure.

Figure 117B:
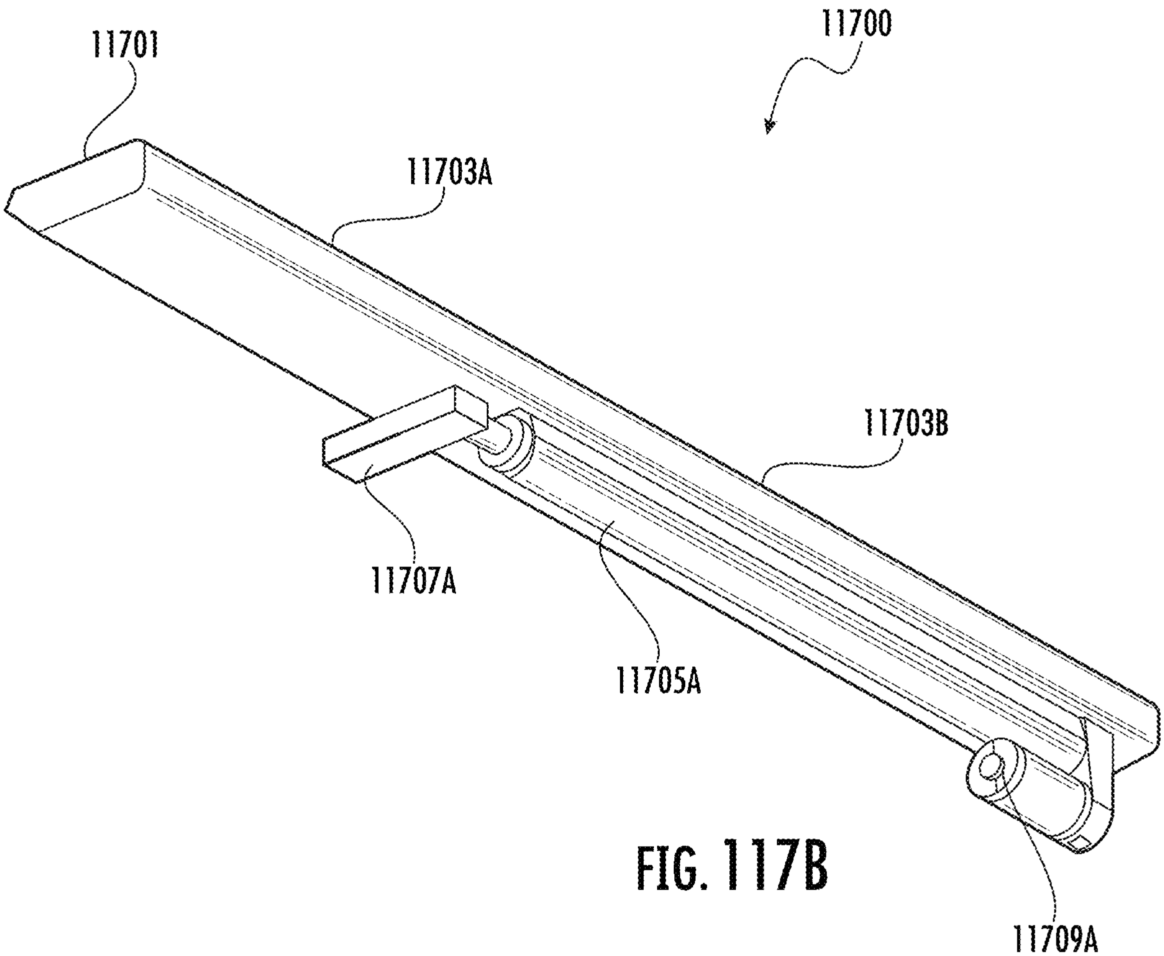

FIG. 117B illustrates an example bottom review of the example smart rack arm in accordance with some embodiments of the present disclosure.

Figure 118:
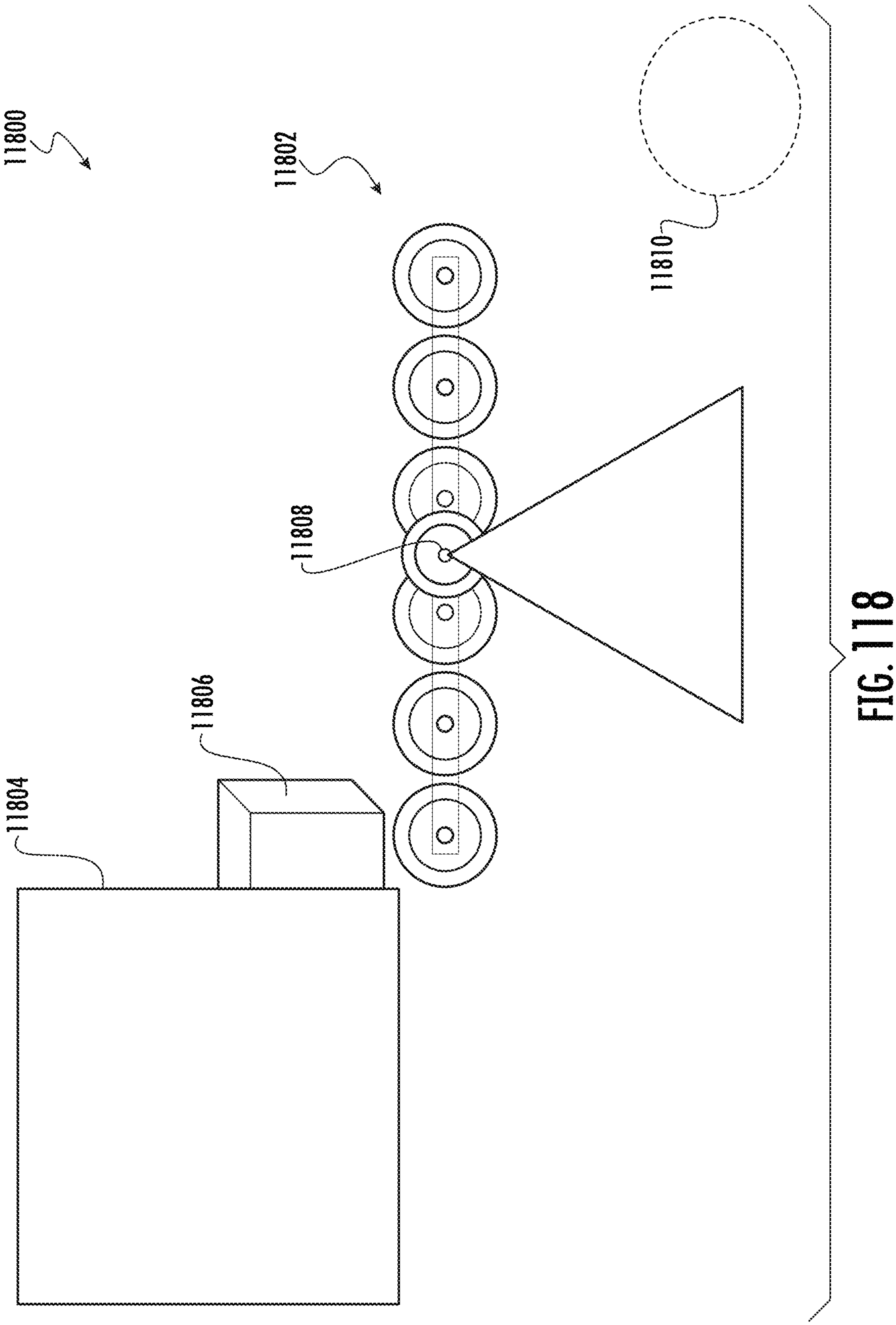

FIG. 118 illustrates an example configuration of a pivot conveyor roller assembly in accordance with some embodiments of the present disclosure.

Figure 119:
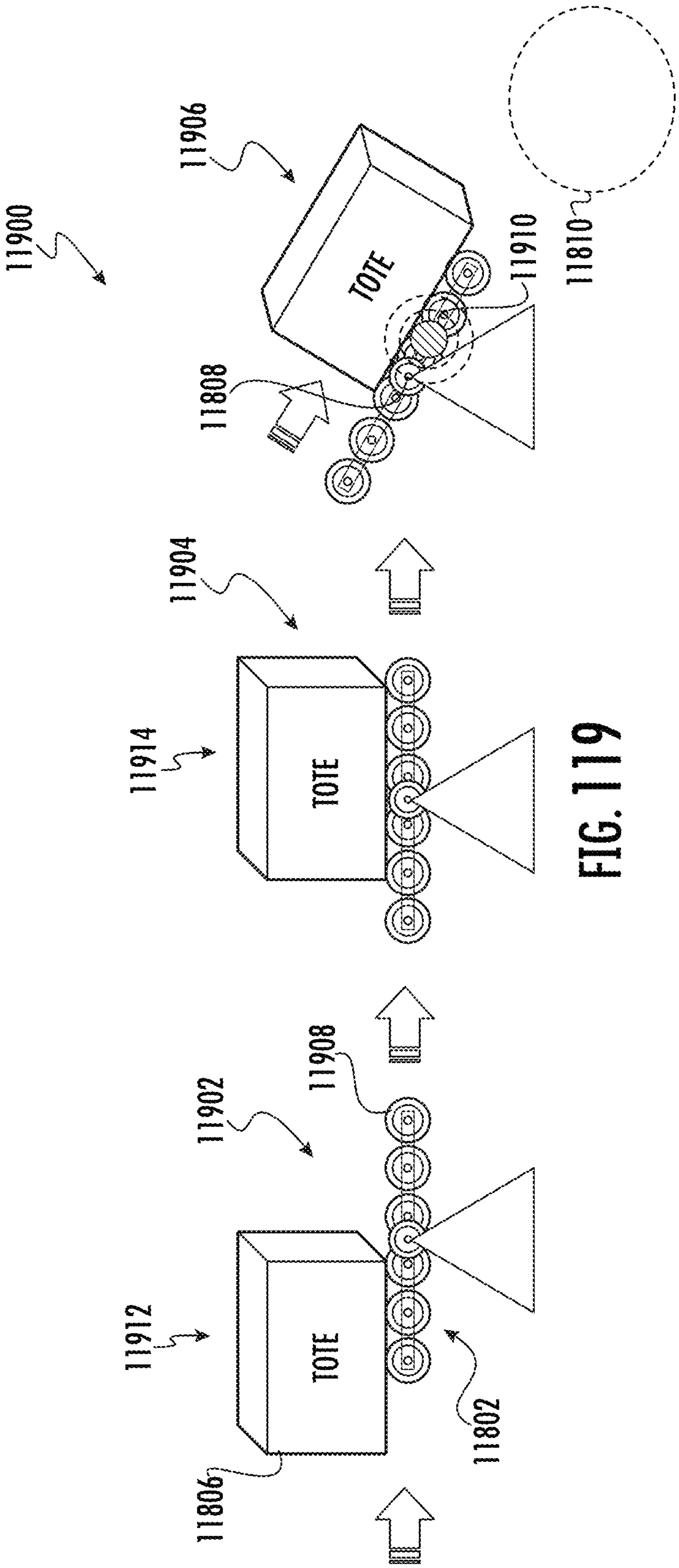

FIG. 119 illustrates example movements of a pivot conveyor roller assembly in accordance with some embodiments of the present disclosure.

Figure 120:
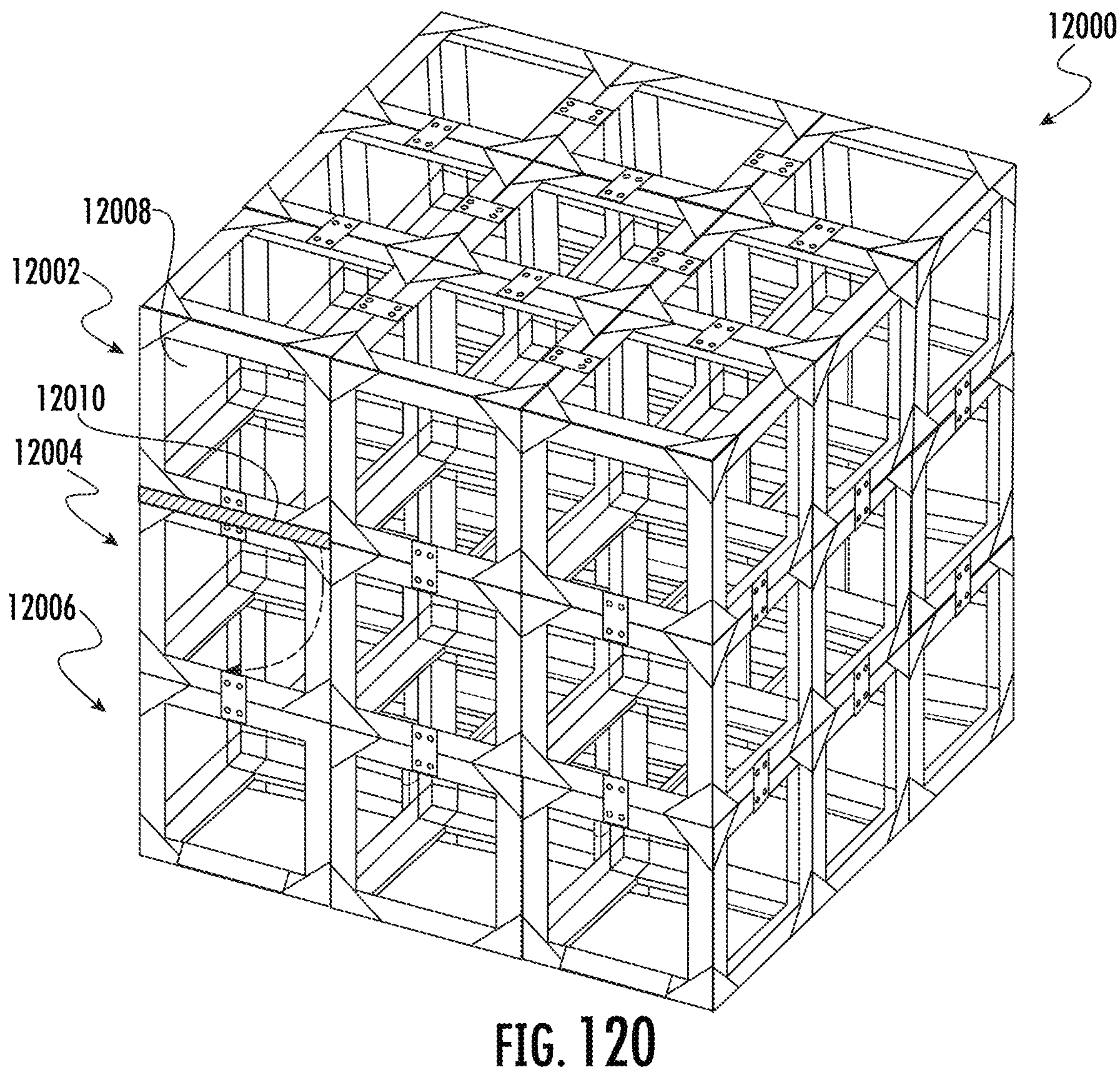

FIG. 120 illustrates a modular superstructure augmented with a pivot conveyor roller assembly in accordance with some embodiments of the present disclosure.

Figure 121:
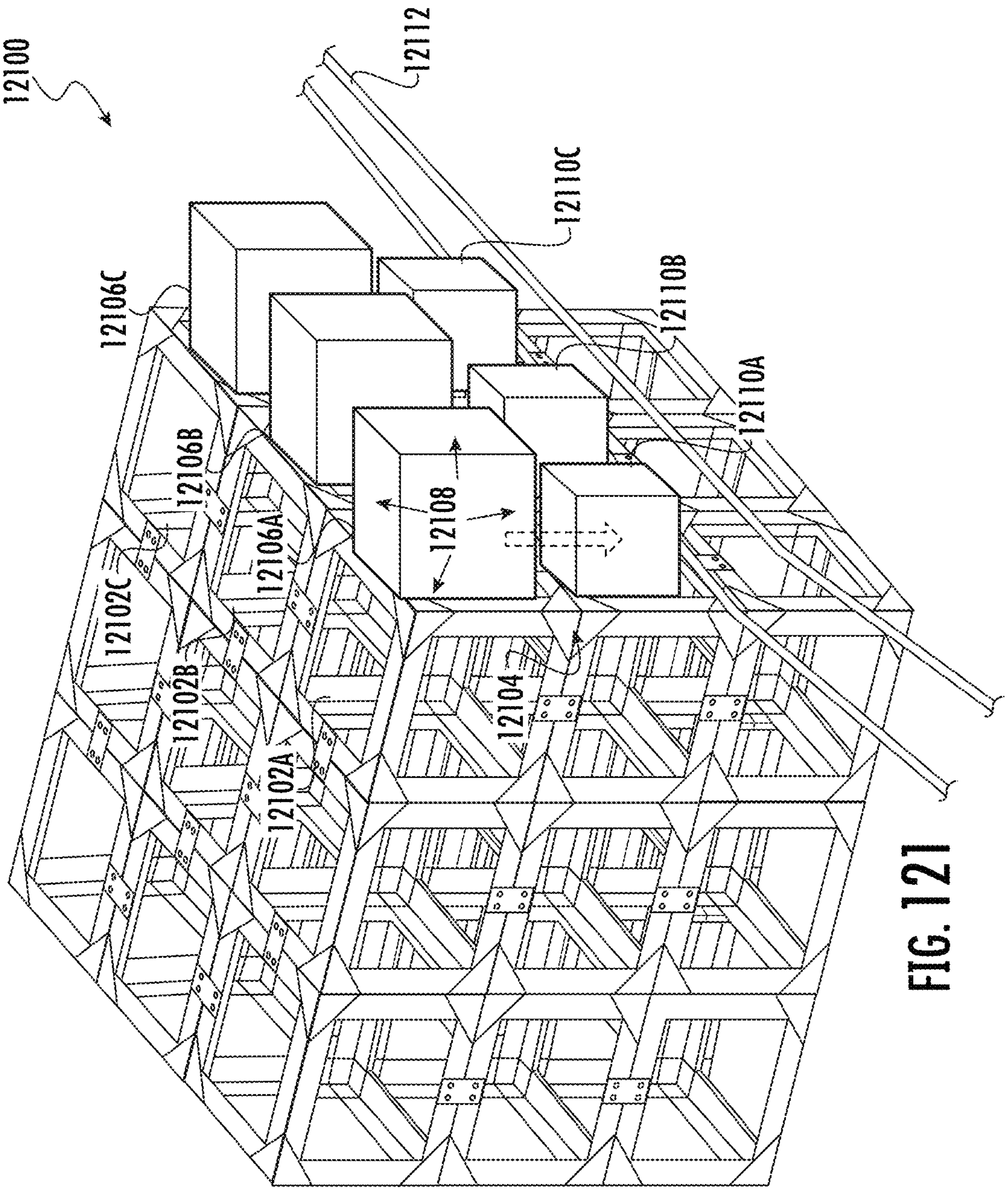

FIG. 121 illustrates an example modular superstructure including a conveyor roller assembly in accordance with some embodiments of the present disclosure.

Figure 122:
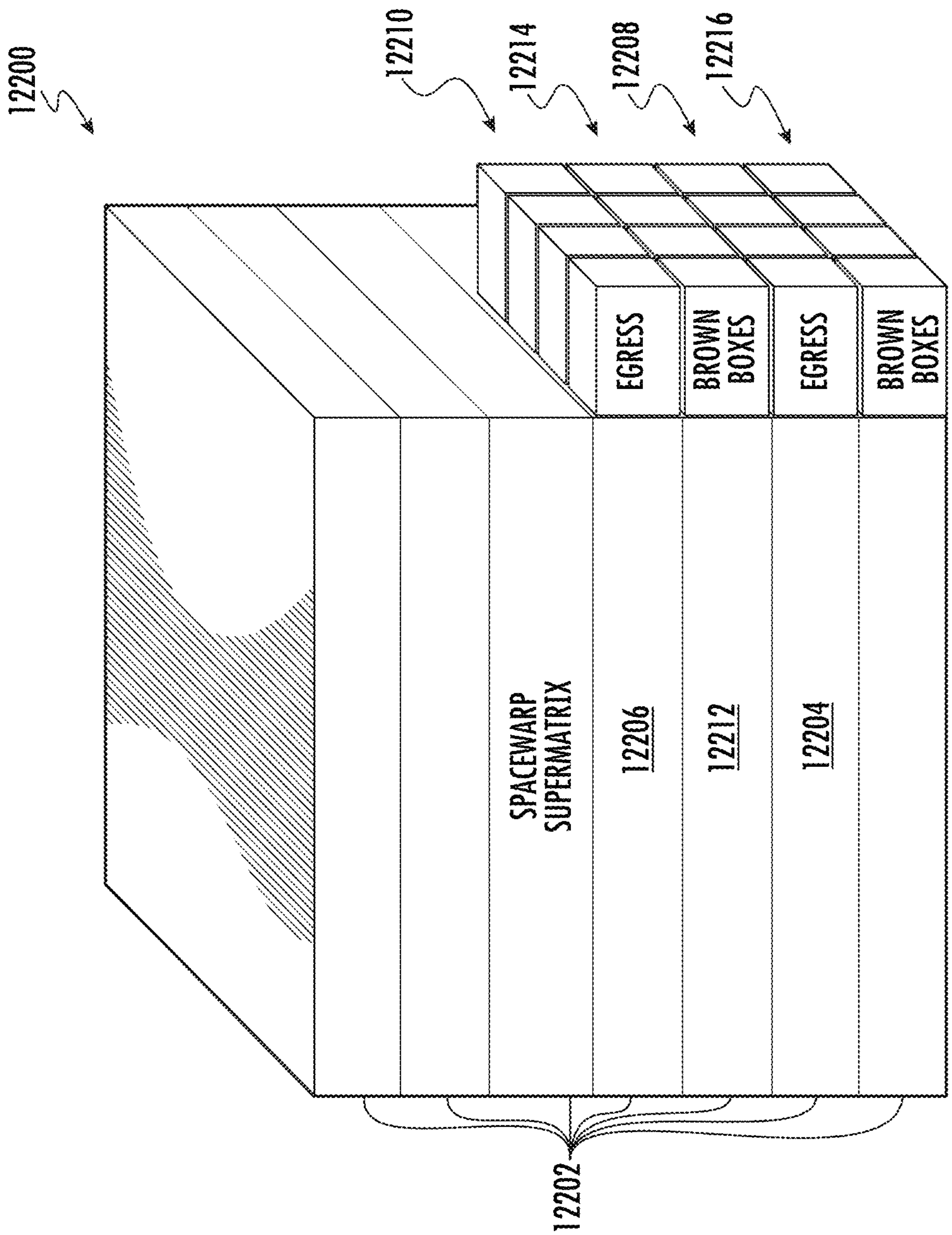

FIG. 122 illustrates an example motor driven roller assembly and smart rack configuration in accordance with some embodiments of the present disclosure.

Figure 123:
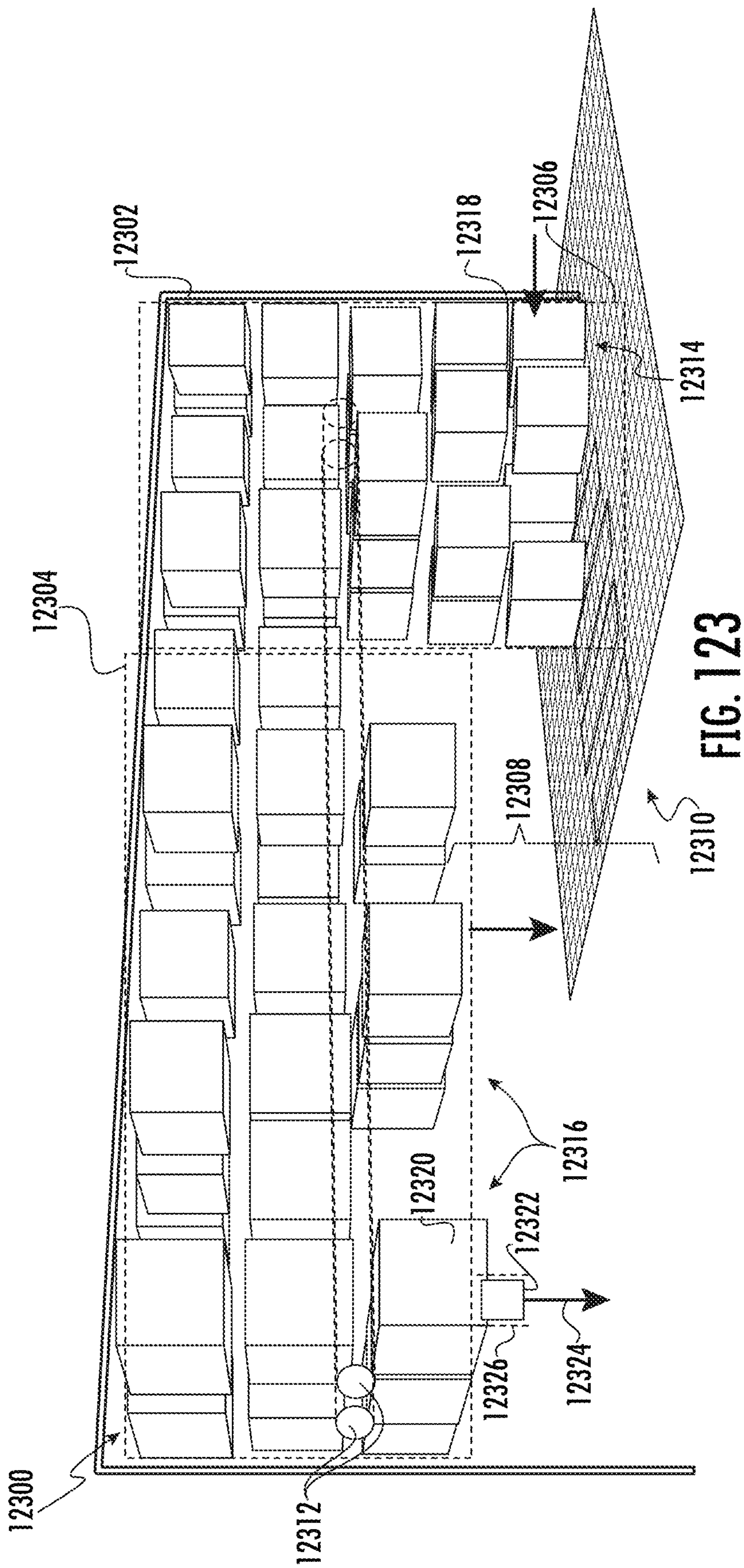
Figure 124:
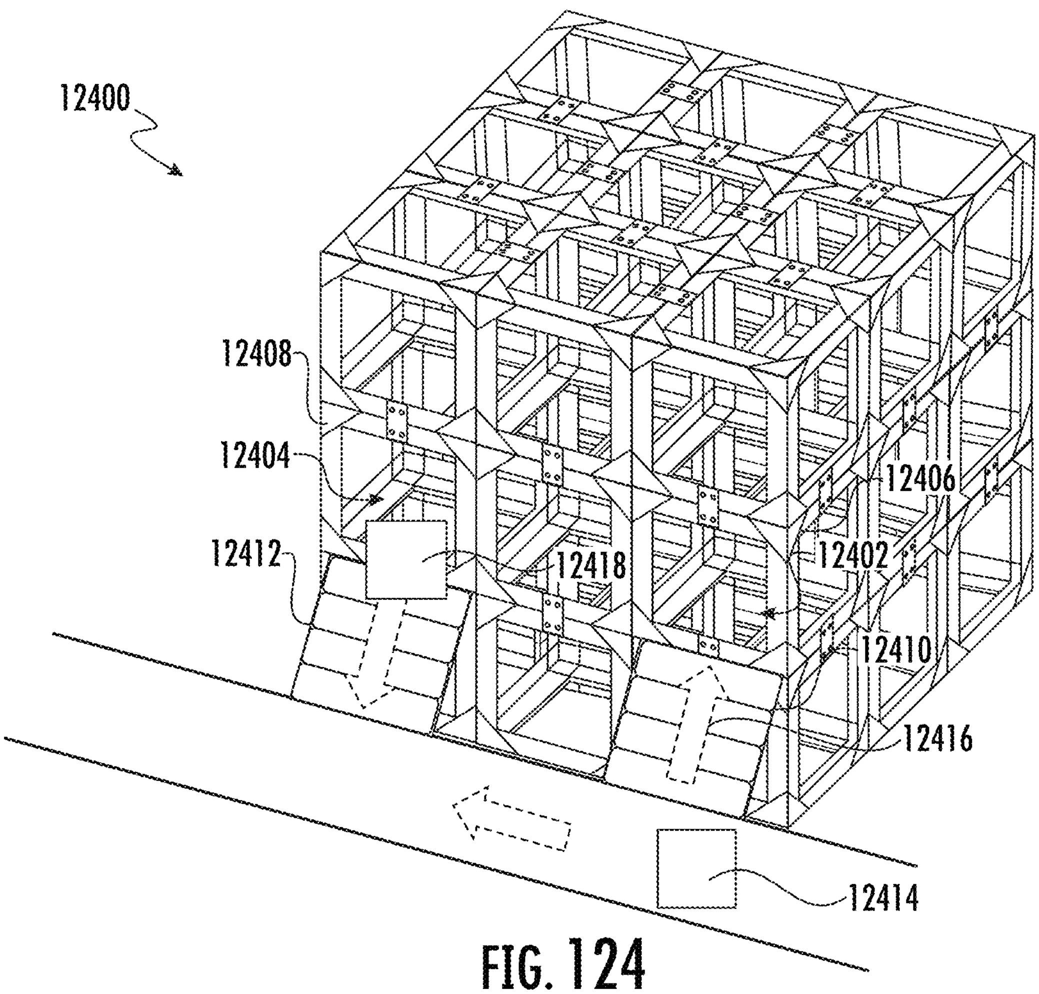

FIG. 123 illustrates an example modular superstructure in accordance with some embodiments of the present disclosure FIG. 124 illustrates an example modular superstructure including a conveyor roller assembly in accordance with some embodiments of the present disclosure.

Figure 125:
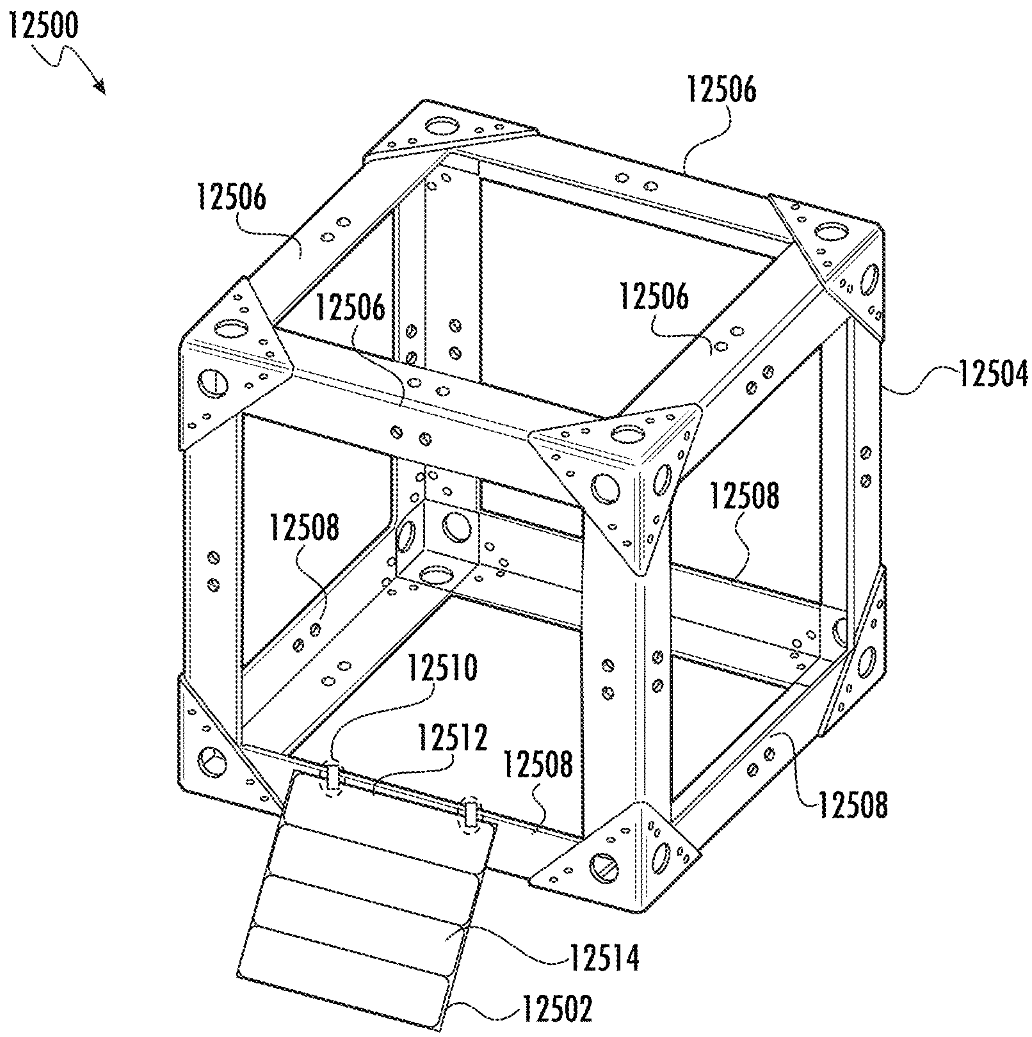

FIG. 125 illustrates an example motor driven roller assembly and smart rack configuration in accordance with some embodiments of the present disclosure.

Figure 126:
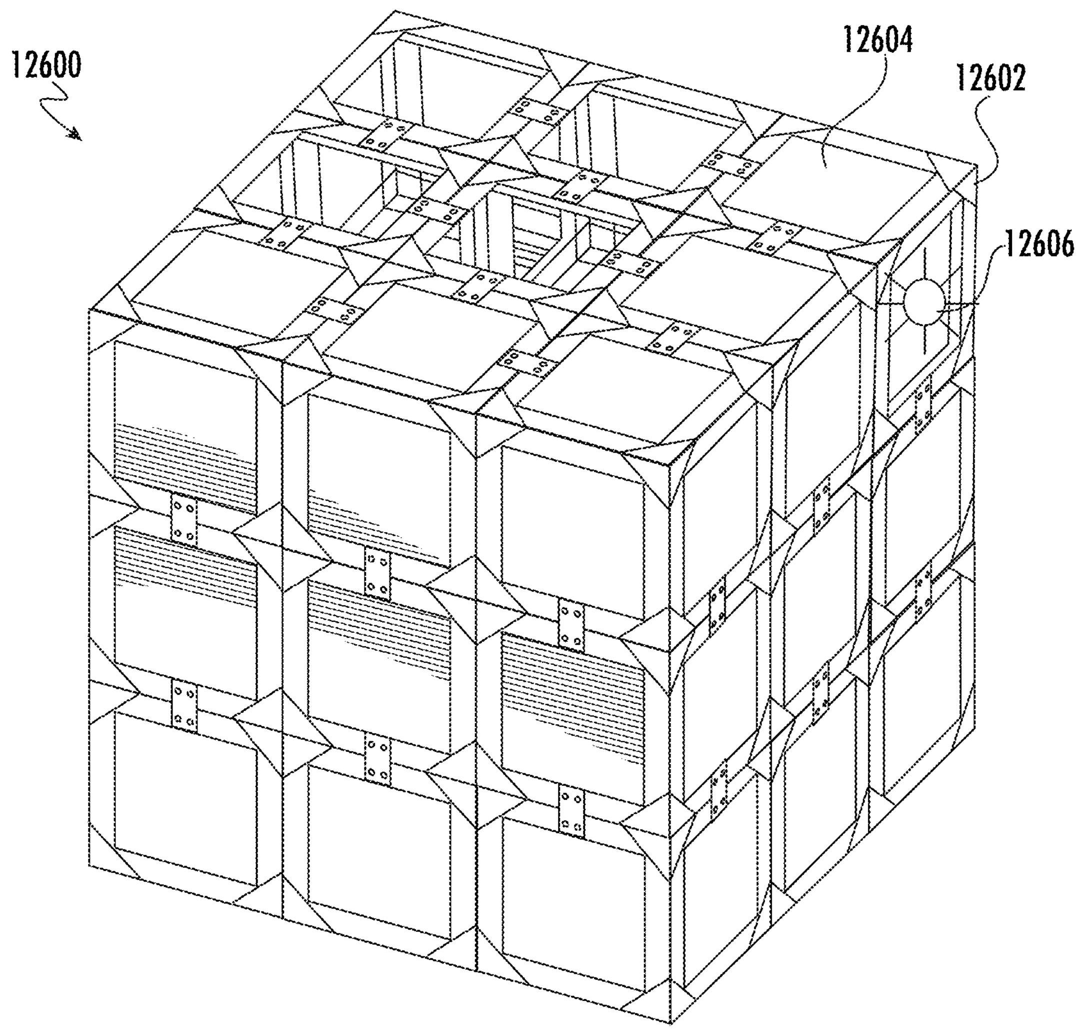

FIG. 126 illustrates a modular superstructure augmented with one or more smart totes in accordance with some embodiments of the present disclosure.

Figure 127:
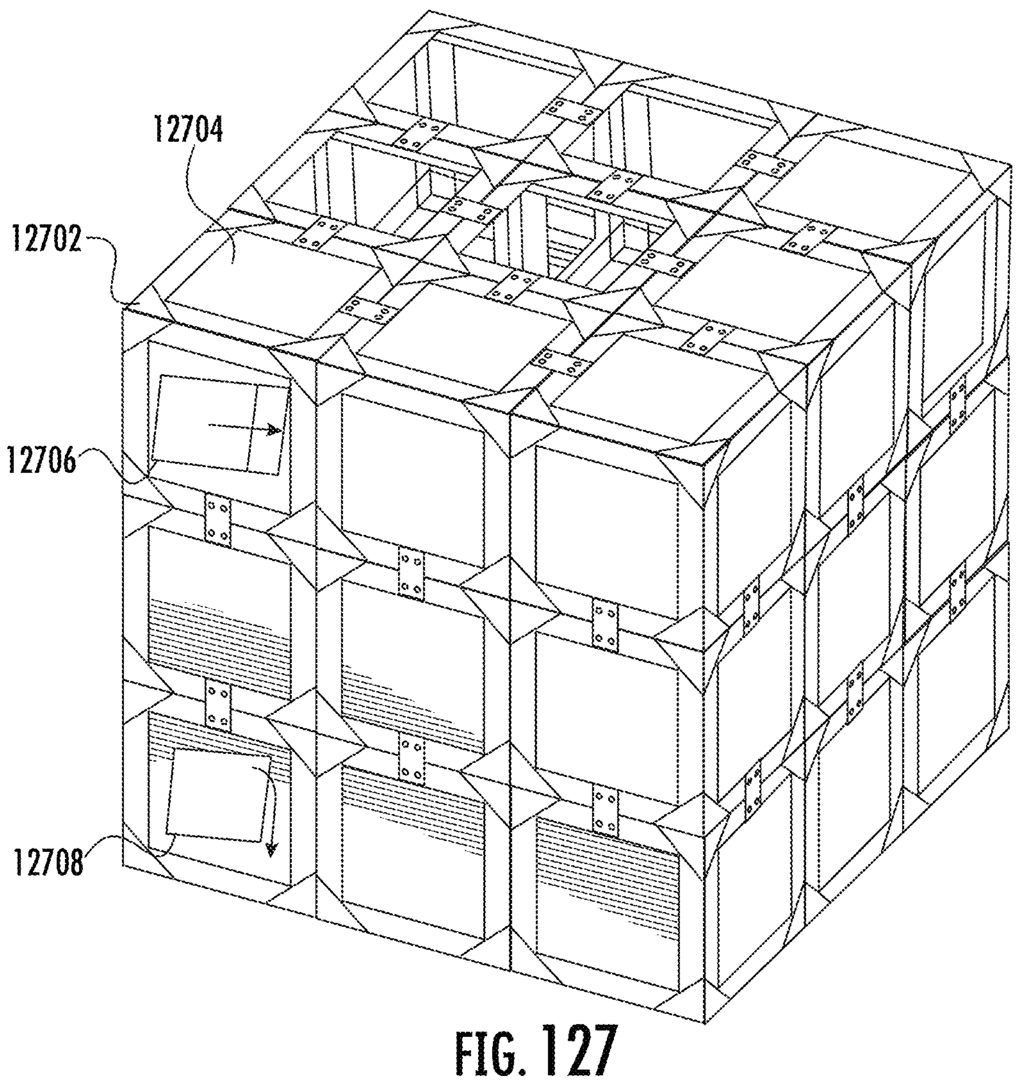

FIG. 127 illustrates a modular superstructure augmented with one or more smart totes in accordance with some embodiments of the present disclosure.

Figure 128:
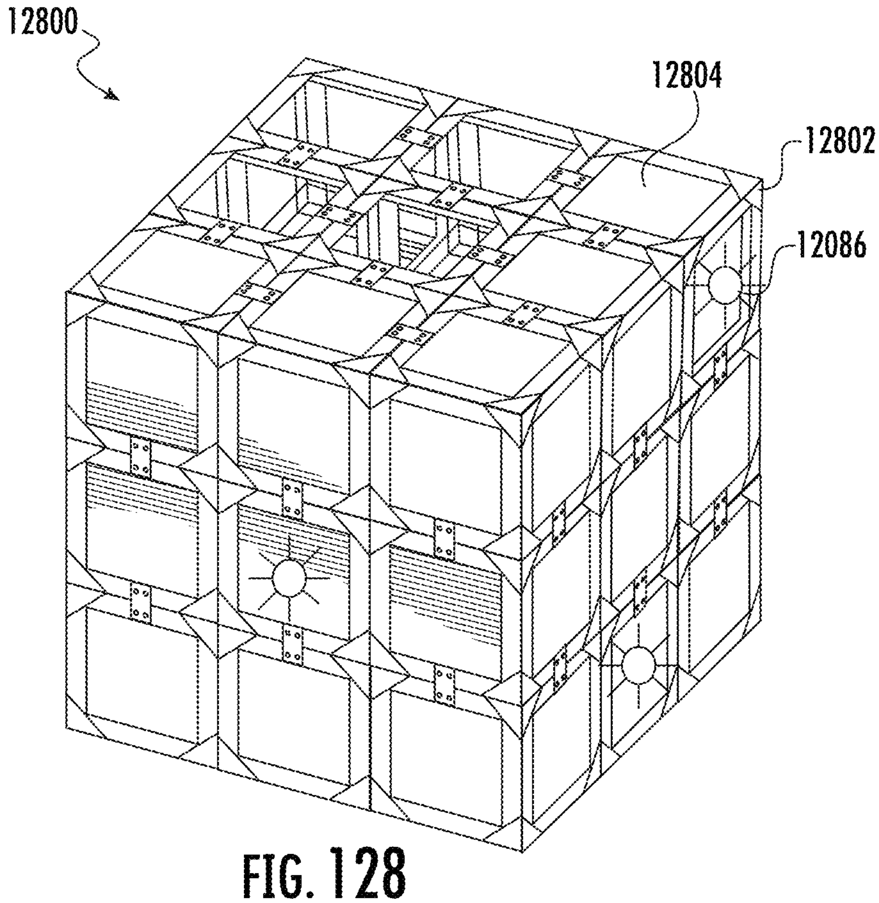

FIG. 128 illustrates a modular superstructure augmented with one or more smart totes in accordance with some embodiments of the present disclosure.

Figure 129:
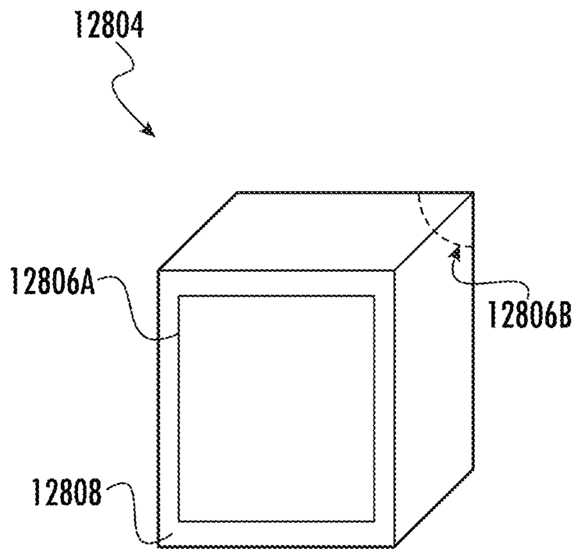

FIG. 129 illustrates an example smart tote in accordance with some embodiments of the present disclosure.

Figure 130:
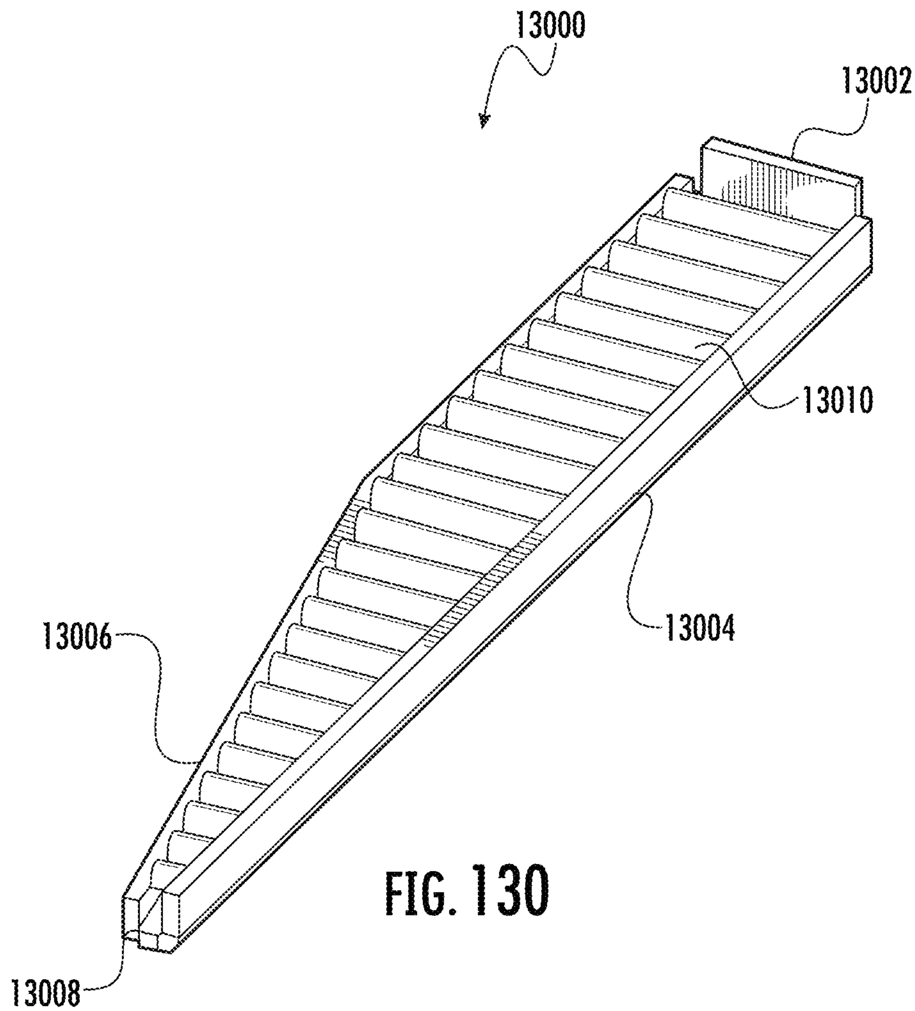

FIG. 130 is an example embodiment of a roller arm apparatus in accordance with some embodiments of the present disclosure.

Figure 131:
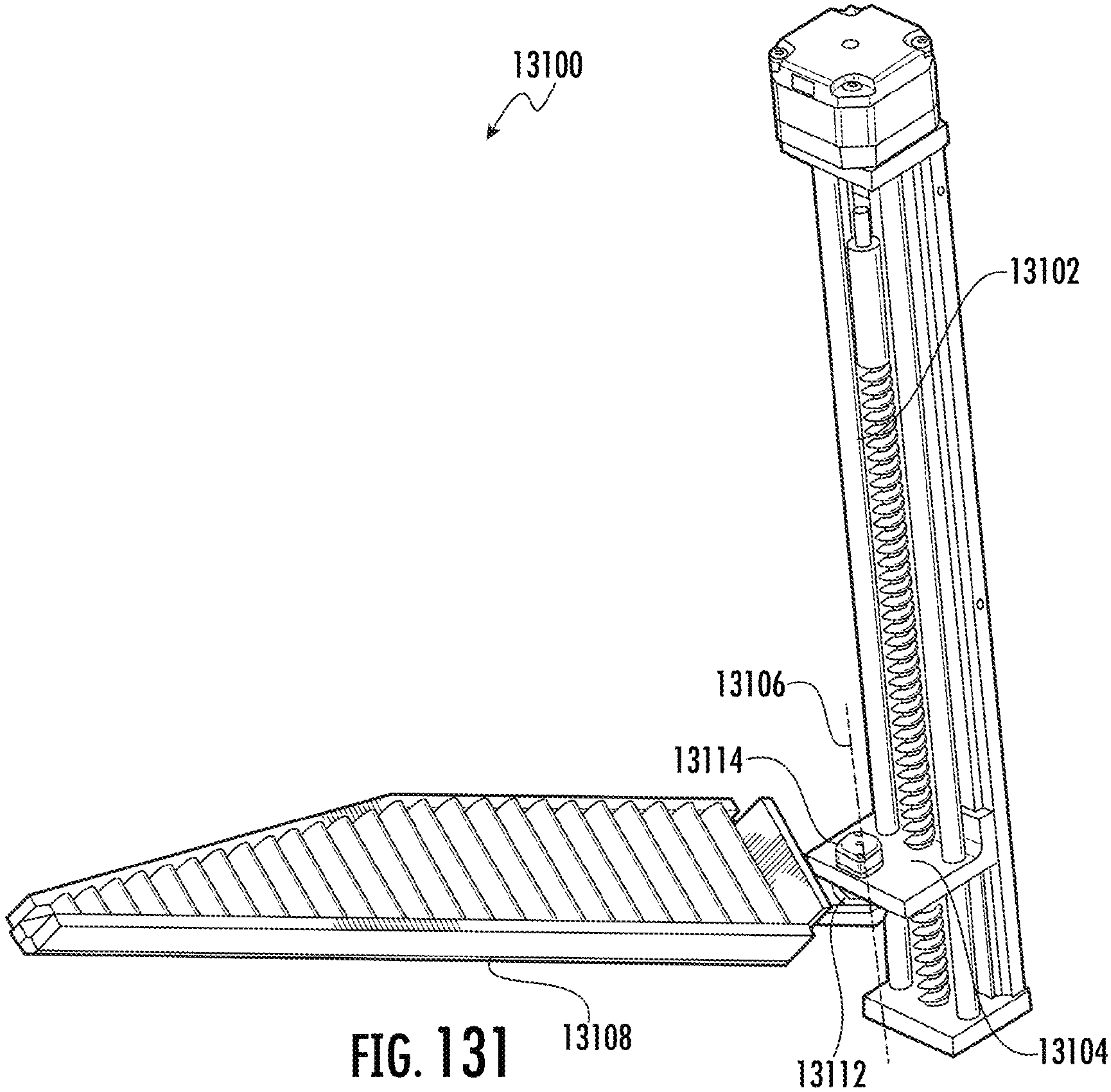

FIG. 131 is an example perspective view of an example rack actuator in accordance with some embodiments of the present disclosure.

Figure 132A:
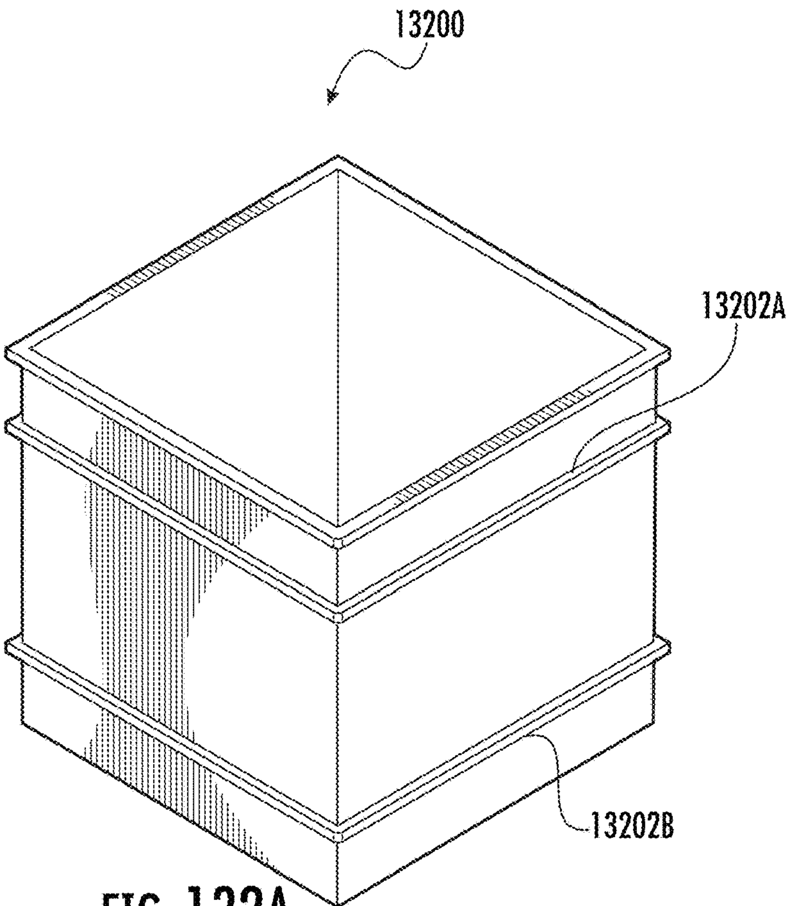

FIG. 132A is an example perspective view of an example rectangular prism in accordance with some embodiments of the present disclosure.

Figure 132B:
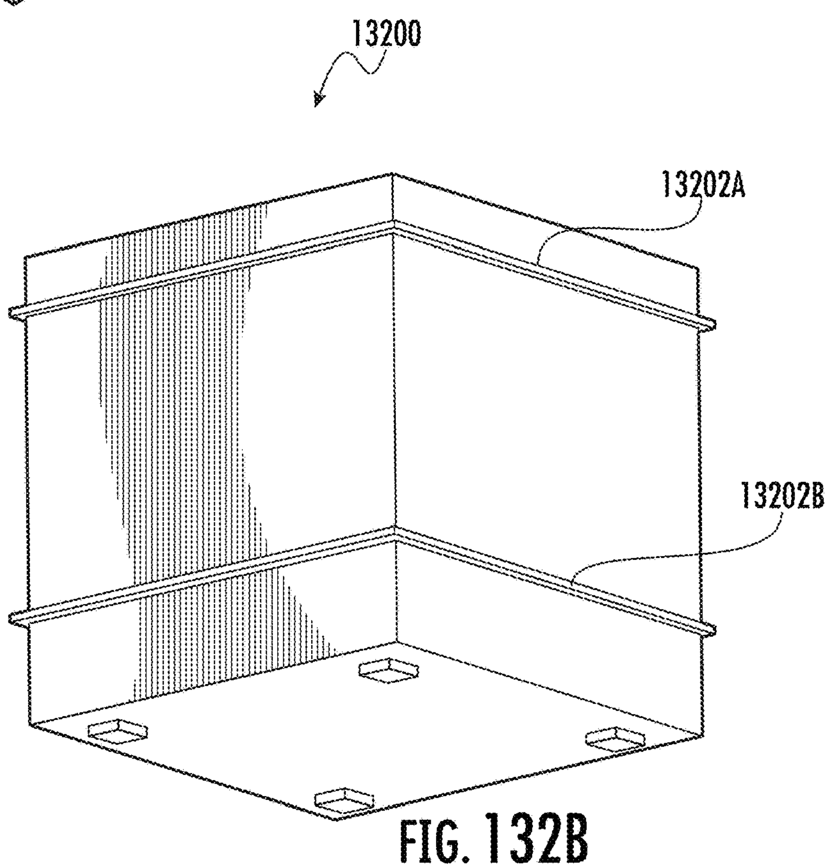

FIG. 132B is another example perspective view of an example rectangular prism in accordance with some embodiments of the present disclosure.

Figure 133:
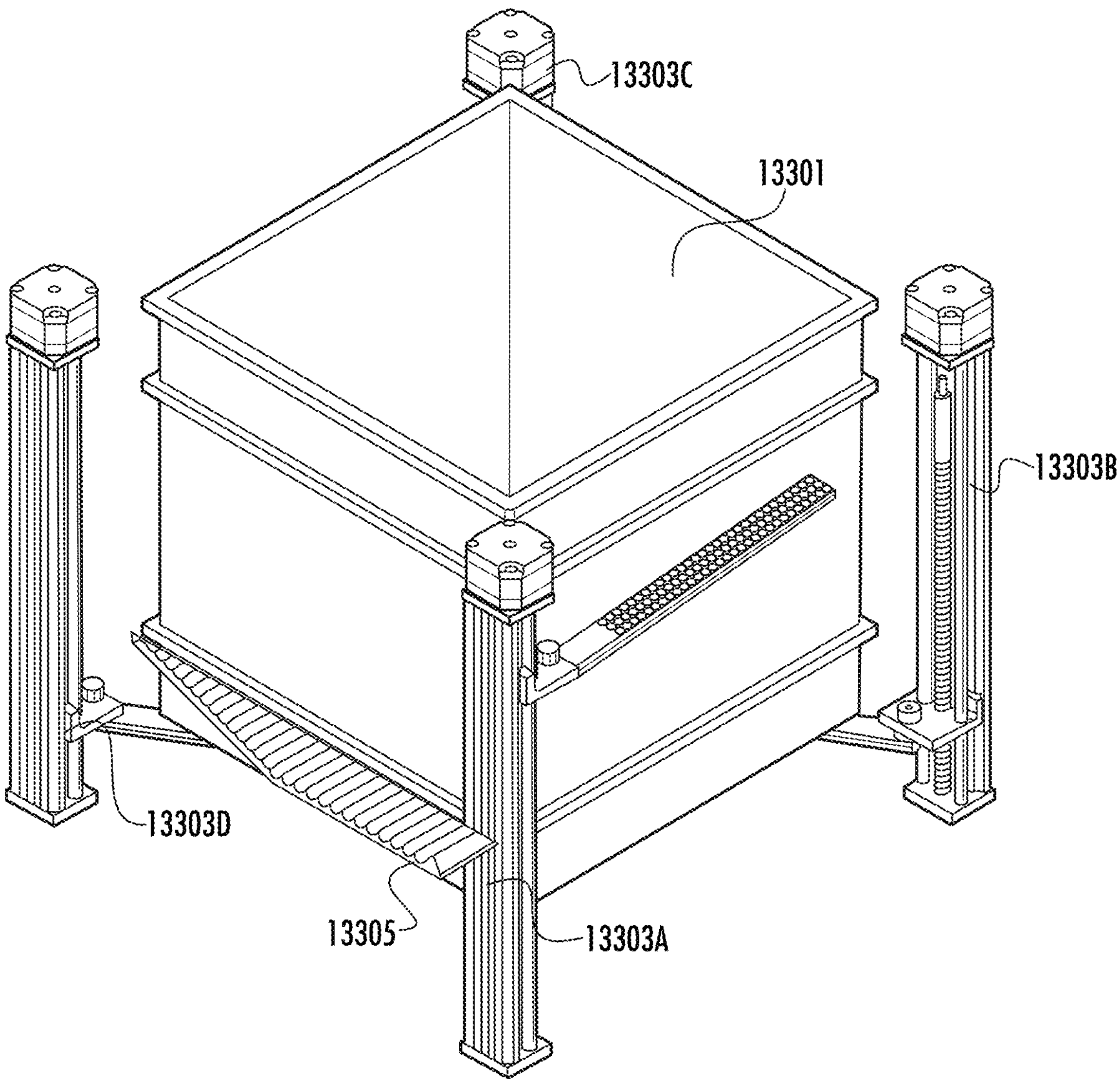

FIG. 133 illustrates example movements of an example rectangular prism in a horizontal direction in accordance with some embodiments of the present disclosure.

Figure 134:
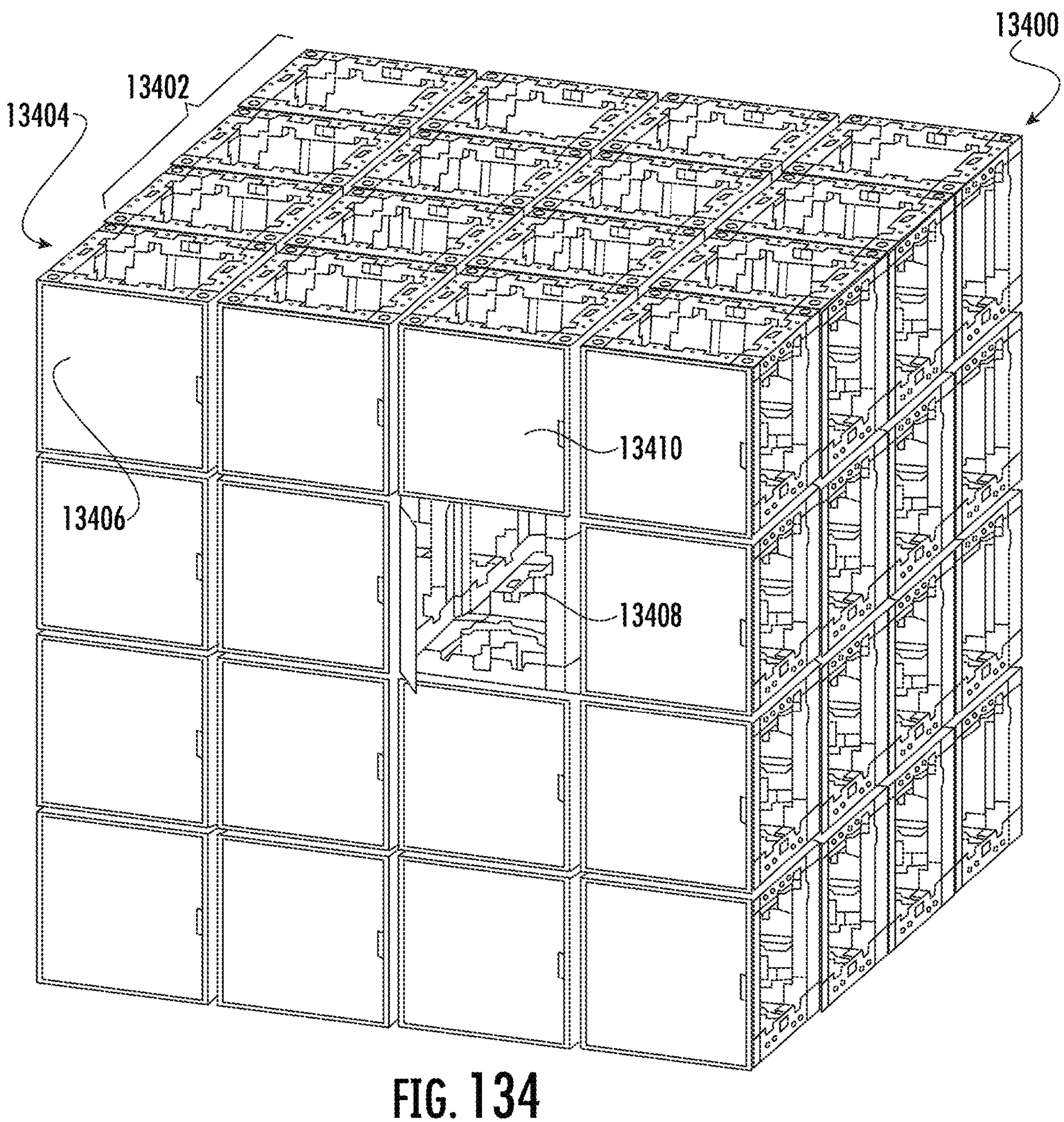

FIG. 134 illustrates a modular superstructure locker in accordance with some embodiments of the present disclosure.

Figure 135:
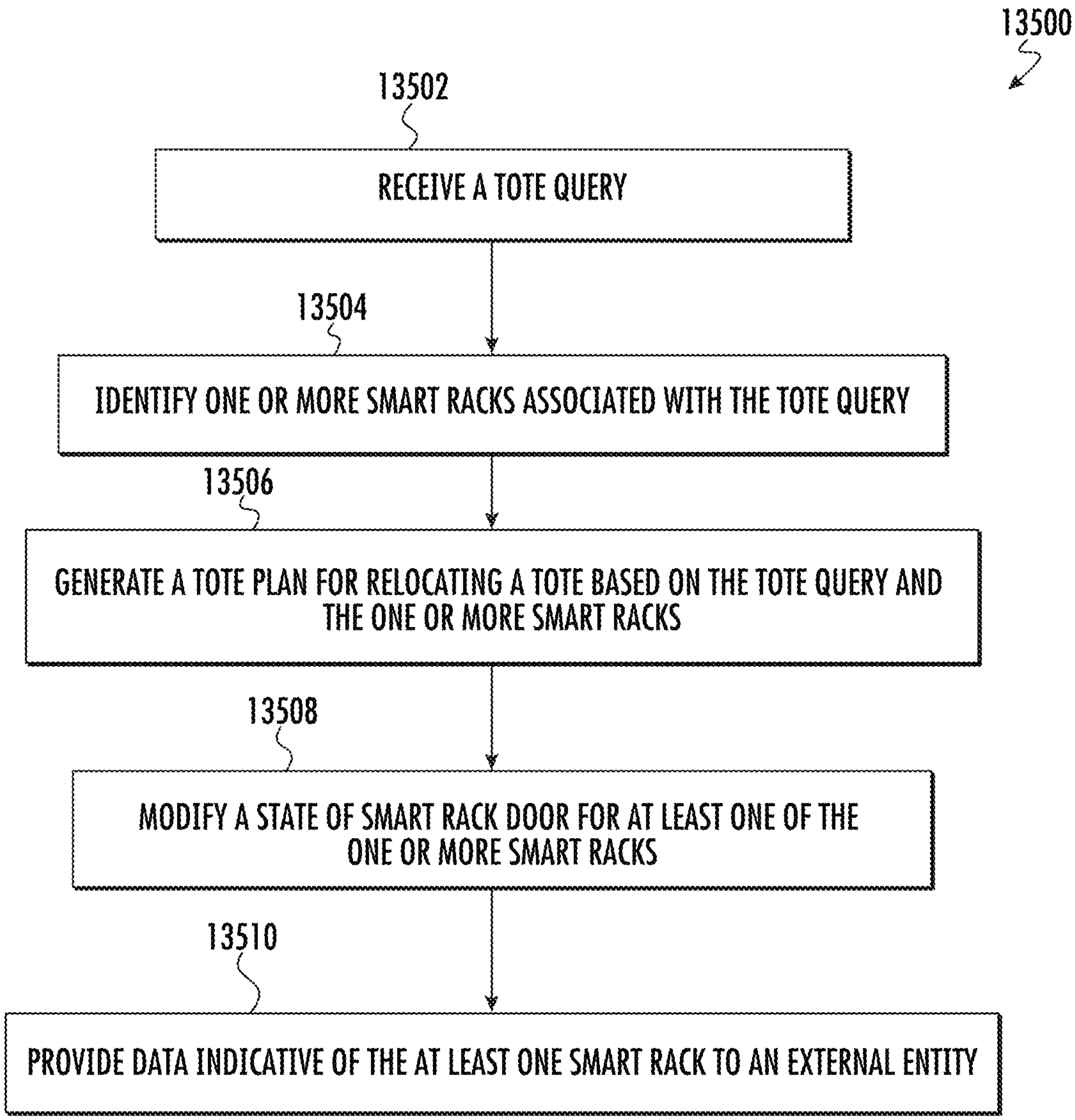

FIG. 135 illustrates a flow chart for relocating a tote within a modular superstructure locker in accordance with some embodiments of the present disclosure.

Figure 136:
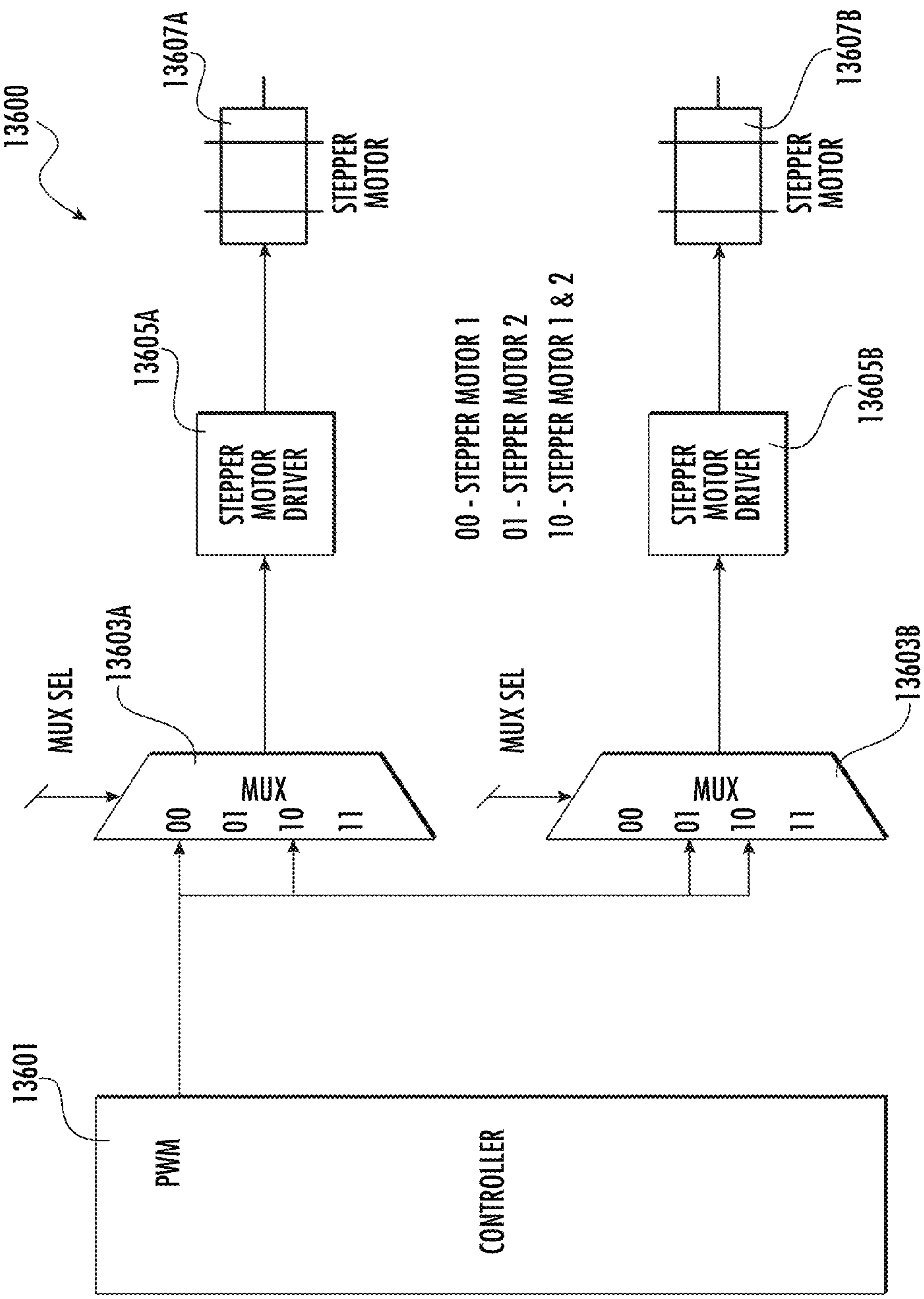

FIG. 136 illustrates an example block diagram of an example portion of an example modular superstructure in accordance with some embodiments of the present disclosure.

Figure 137:
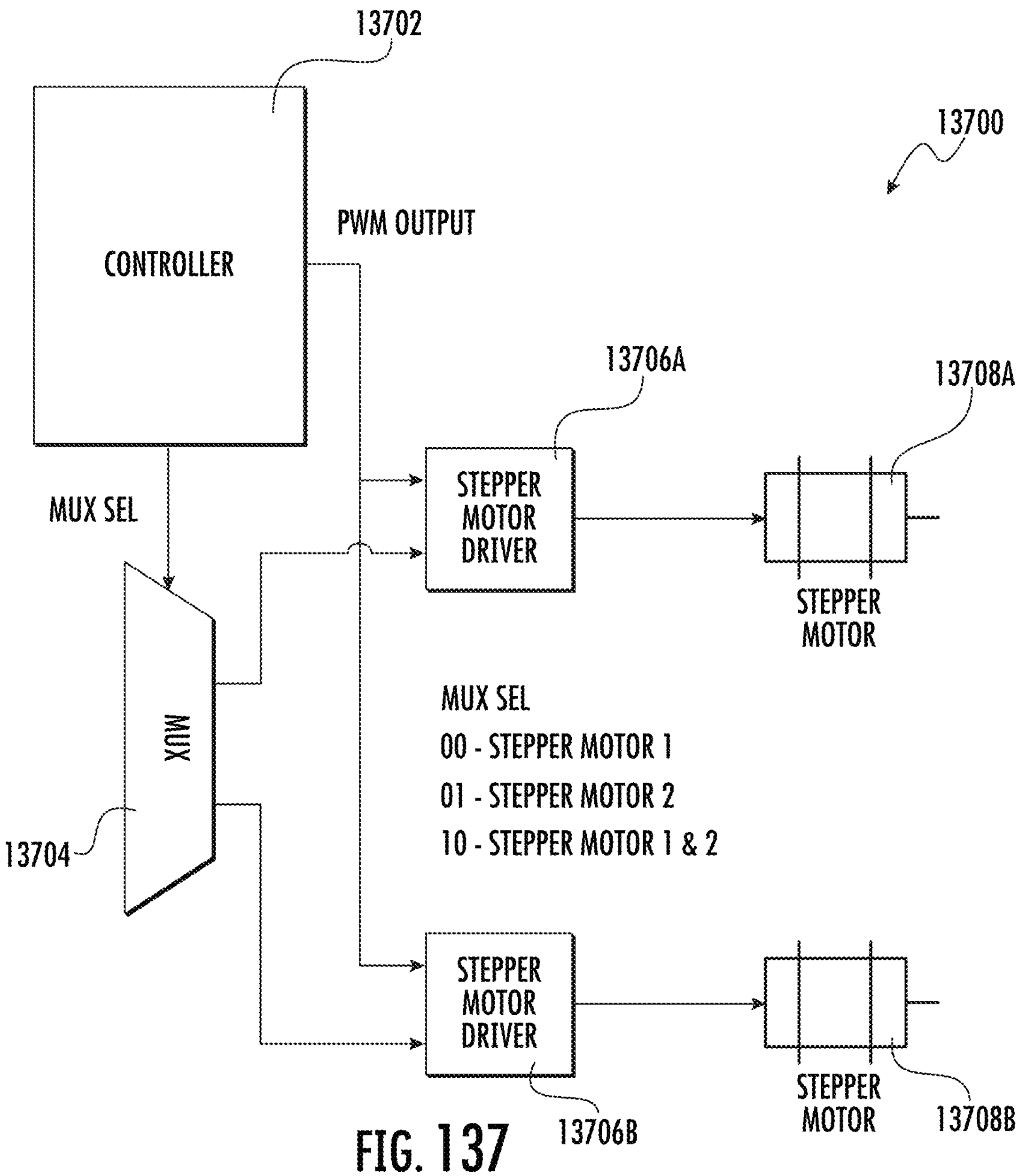

FIG. 137 illustrates an example block diagram of an example portion of an example modular superstructure in accordance with some embodiments of the present disclosure.

Figure 138B:
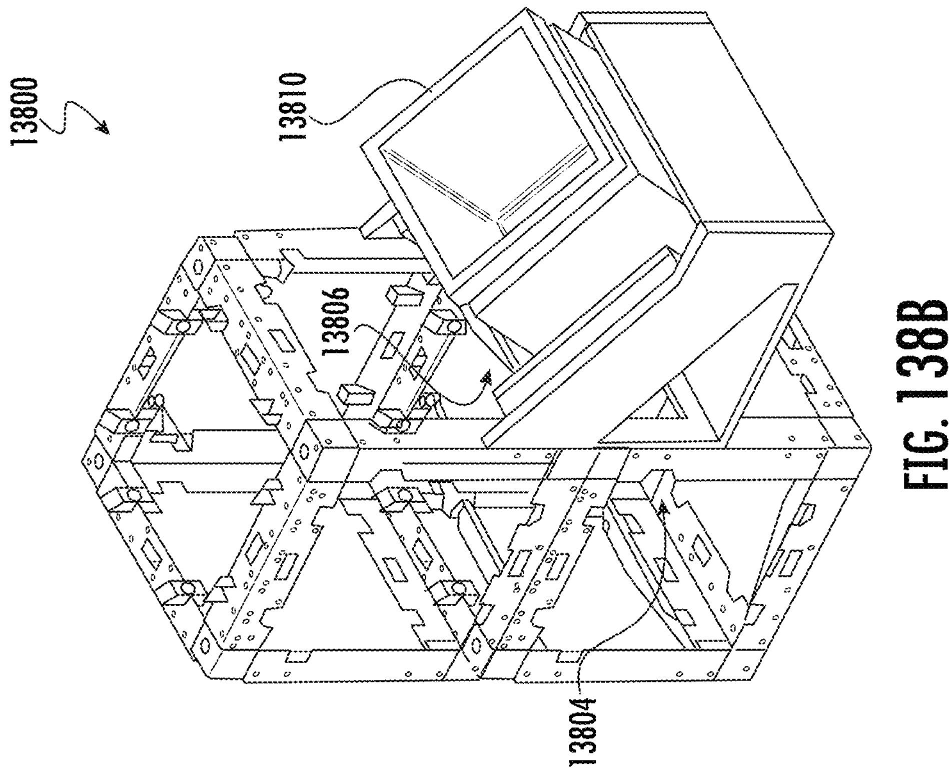
Figure 138A:
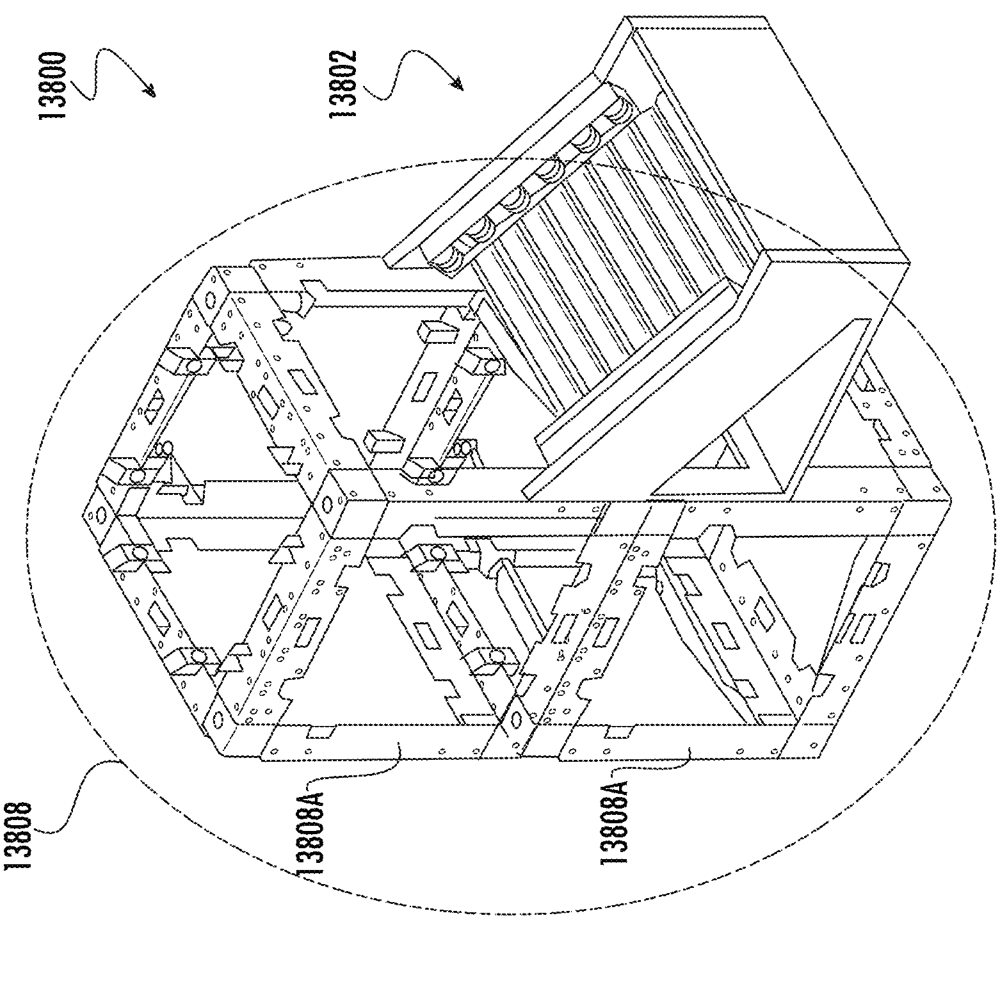

FIG. 138A and FIG. 138B illustrate an example view of a smart rack tote access attachment in accordance with some embodiments of the present disclosure.

Figure 139B:
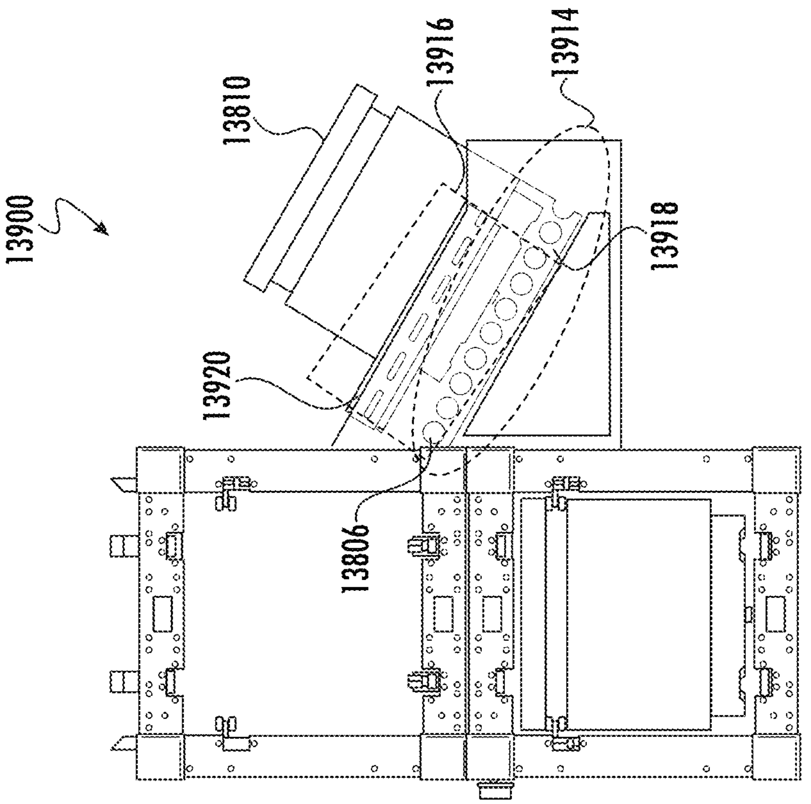
Figure 139A:
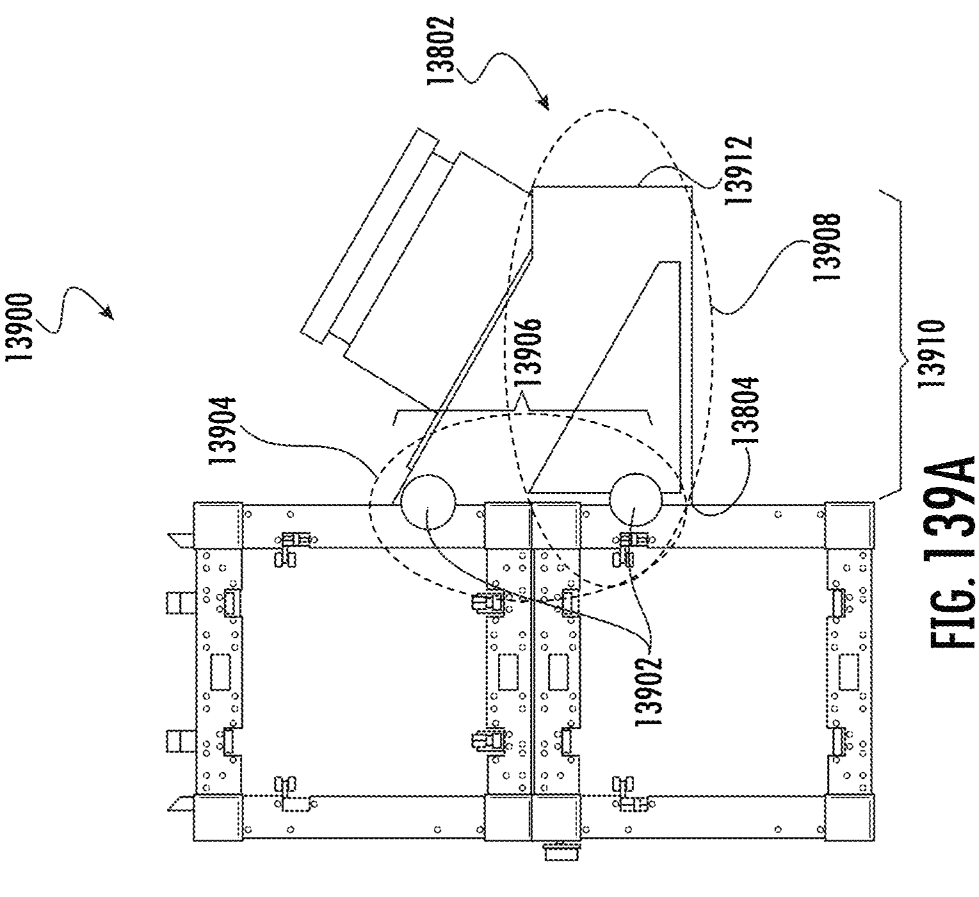

FIG. 139A and FIG. 139B illustrate an example side view of a smart rack tote access attachment in accordance with some embodiments of the present disclosure.

Figure 140:
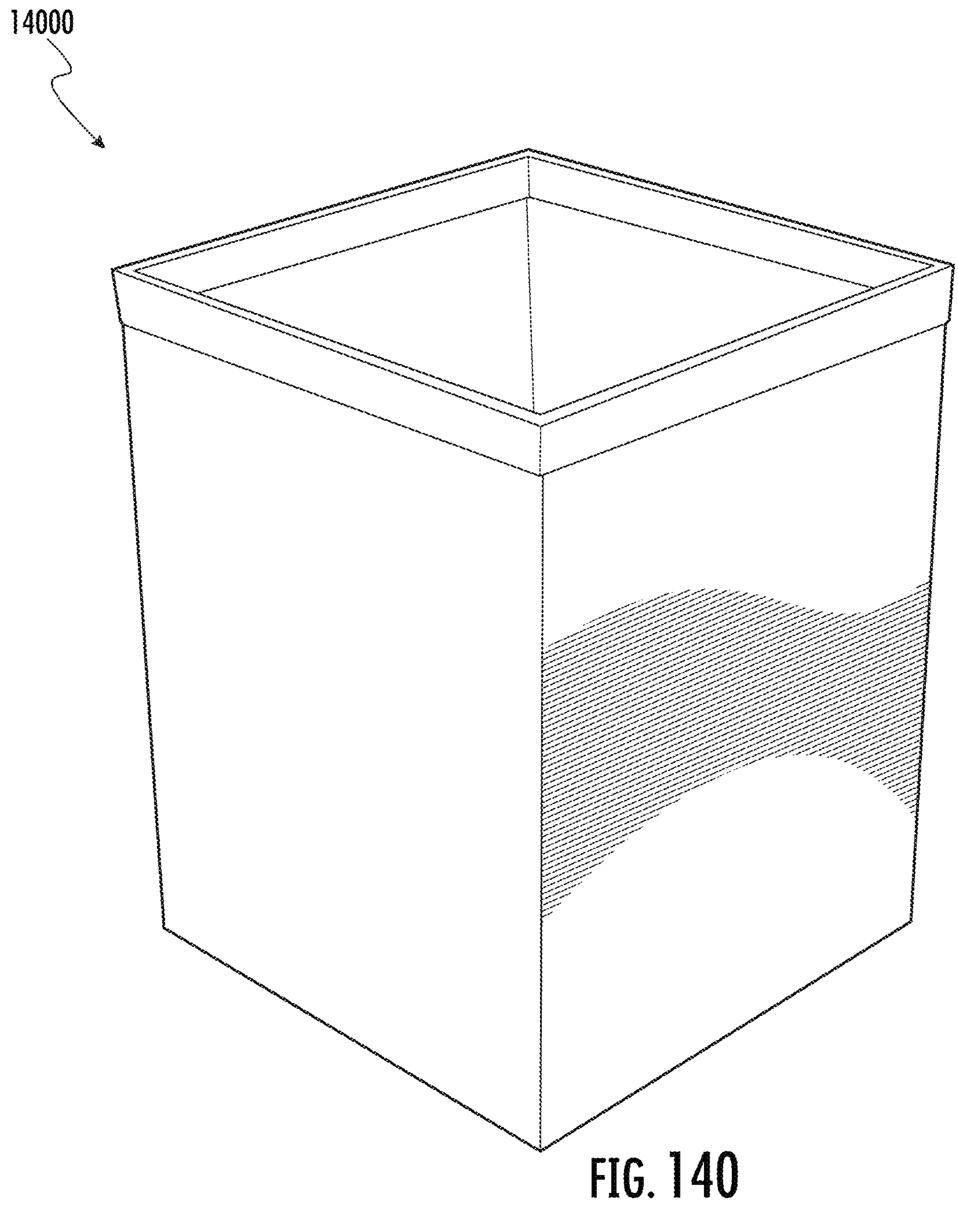

FIG. 140 illustrates an angled view of a transparent tote in accordance with some embodiments of the present disclosure.

Figure 141:
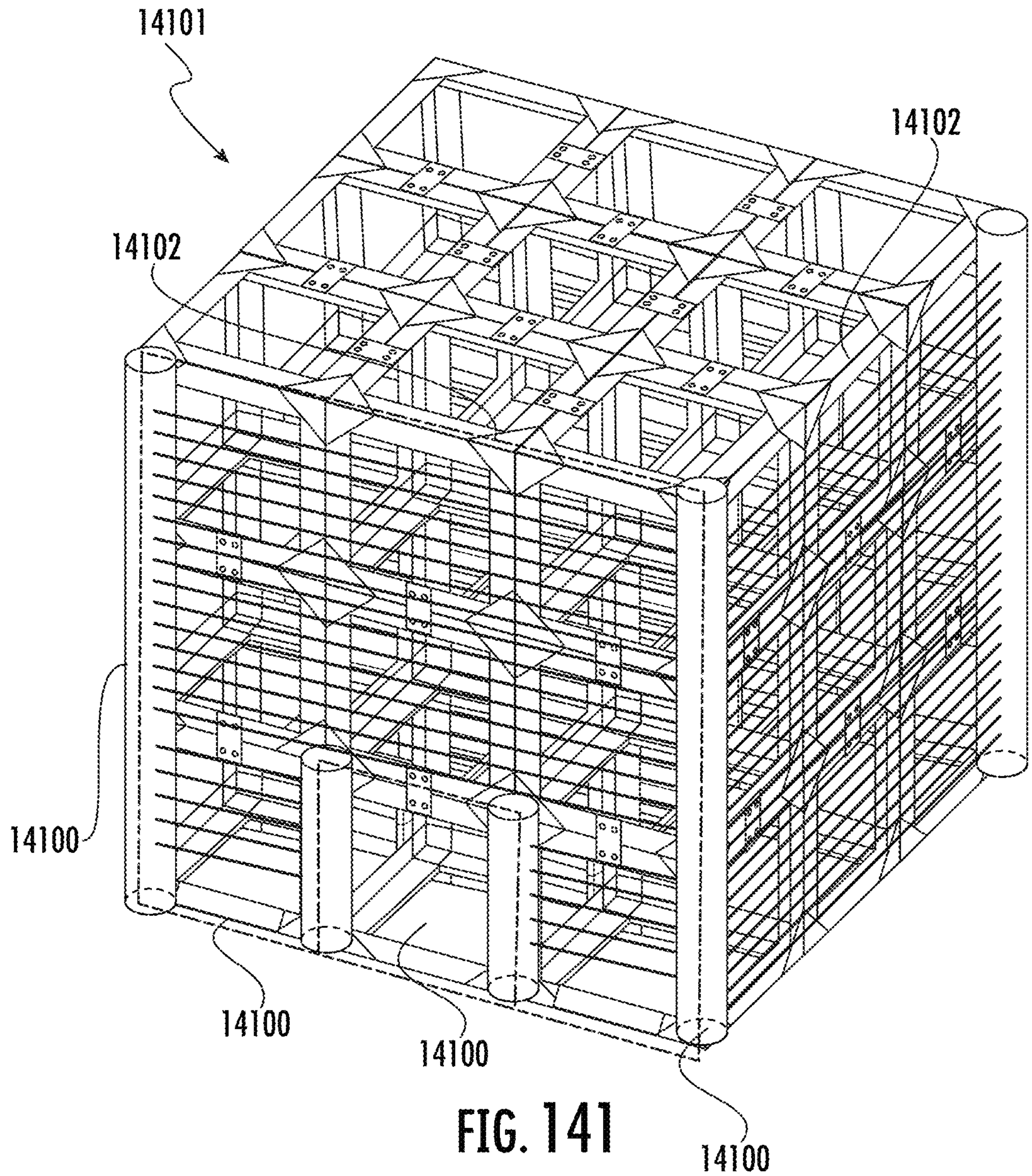

FIG. 141 illustrates a modular superstructure augmented with an exterior boundary sensing device in accordance with some embodiments of the present disclosure.

Figure 142:
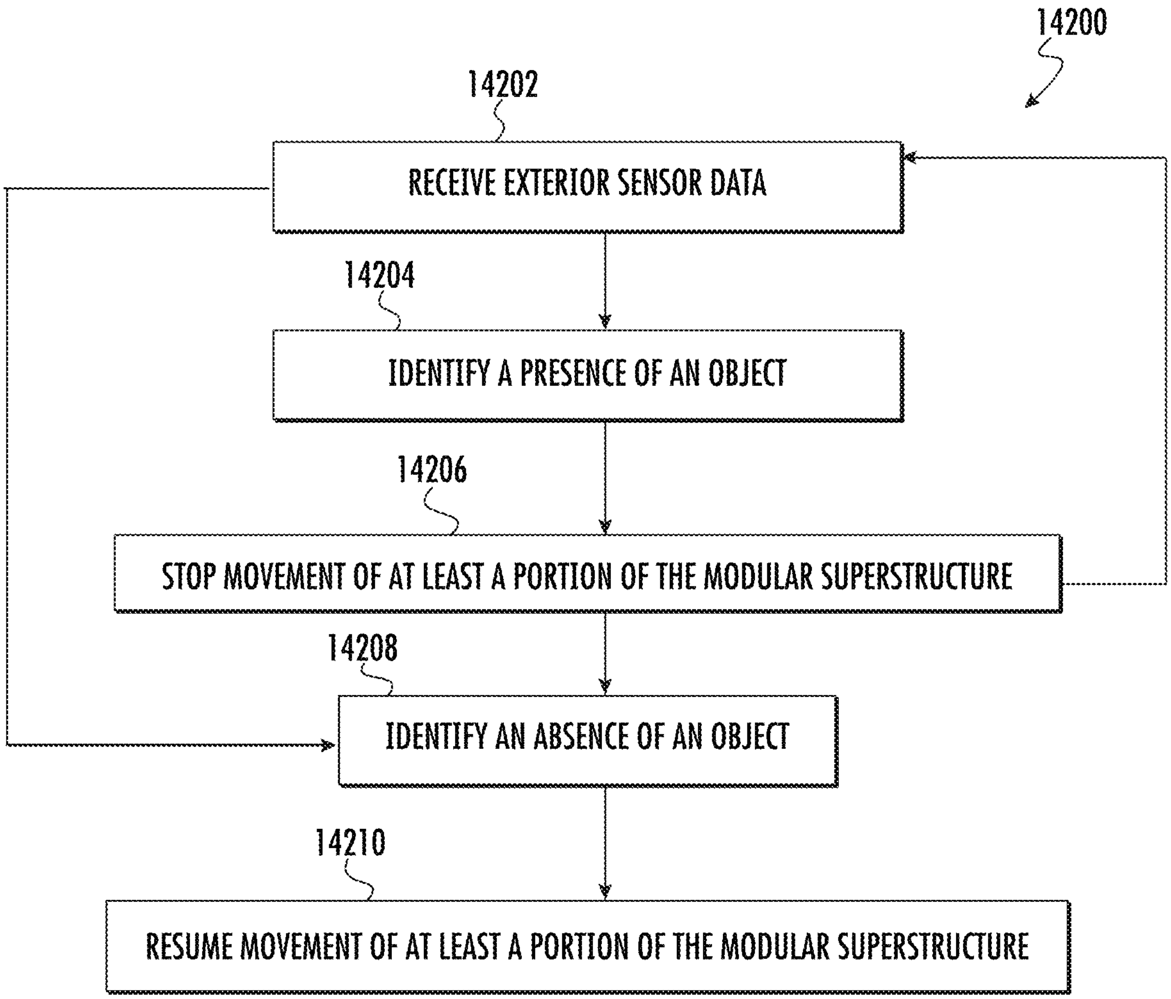

FIG. 142 illustrates a flow chart depicting operations of an example process for automatically controlling a modular superstructure in accordance with some embodiments of the present disclosure.

Figure 143:
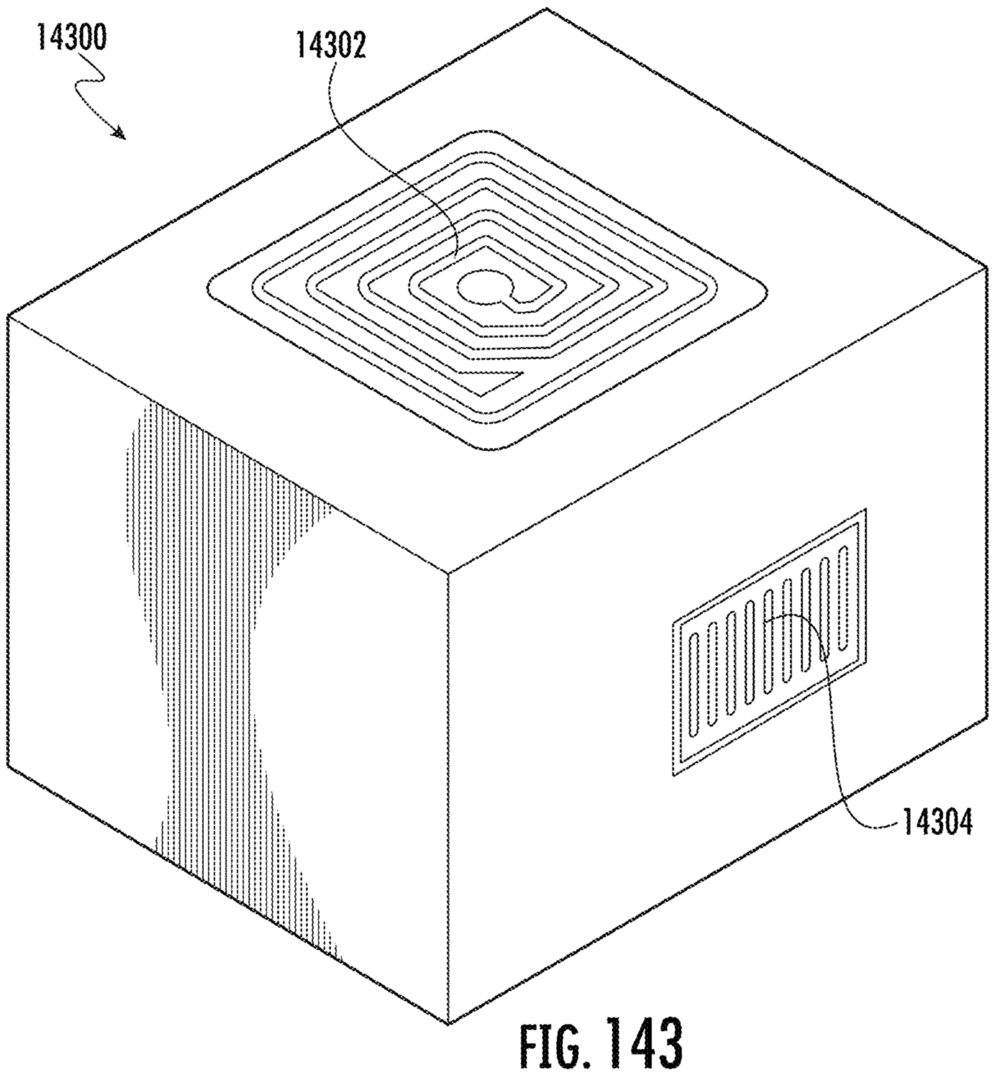

FIG. 143 illustrates an example tagged tote in accordance with some embodiments of the present disclosure.

Figure 144:
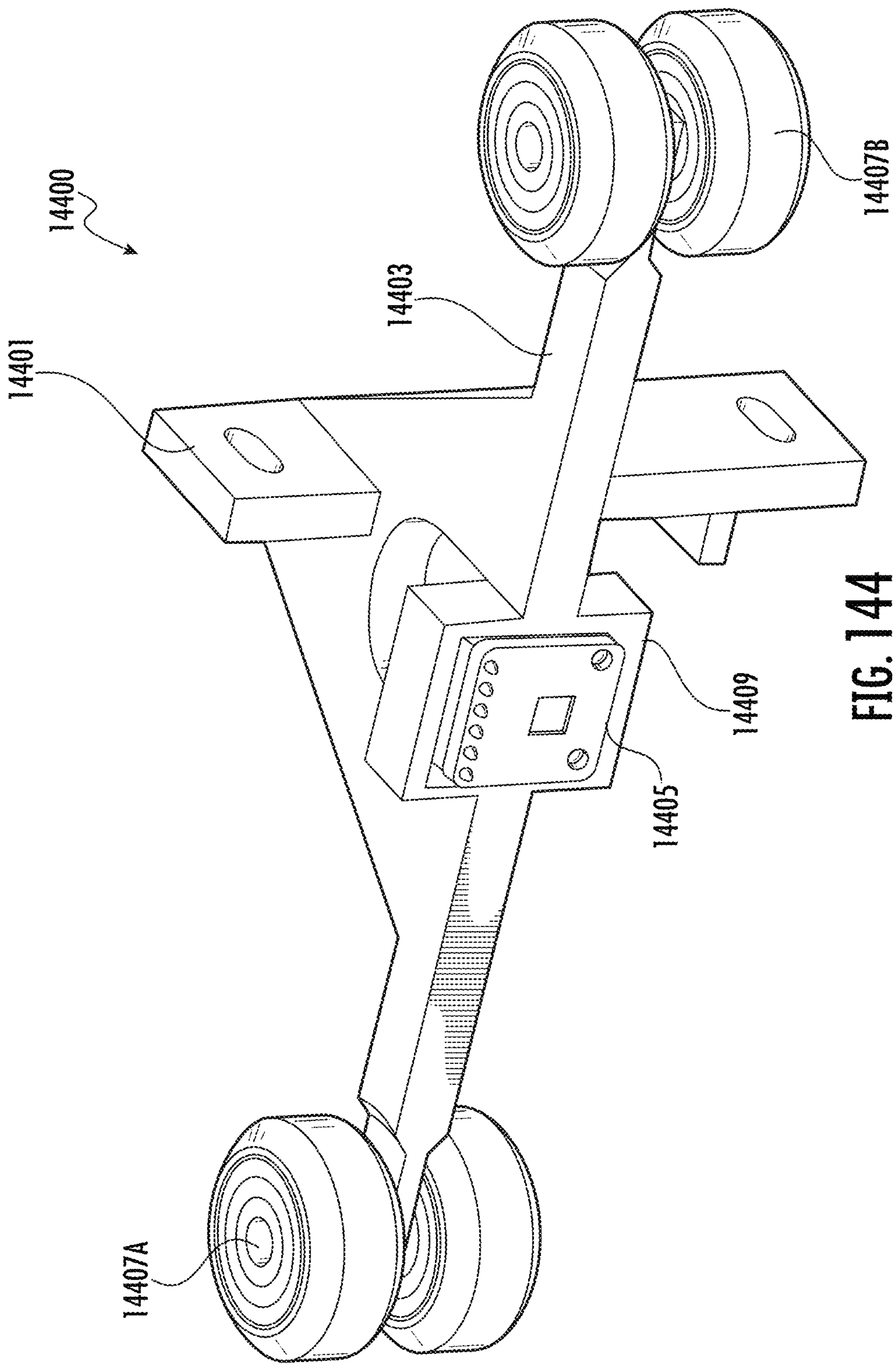

FIG. 144 illustrates an example portion of an example smart rack in accordance with some embodiments of the present disclosure.

Figure 145:
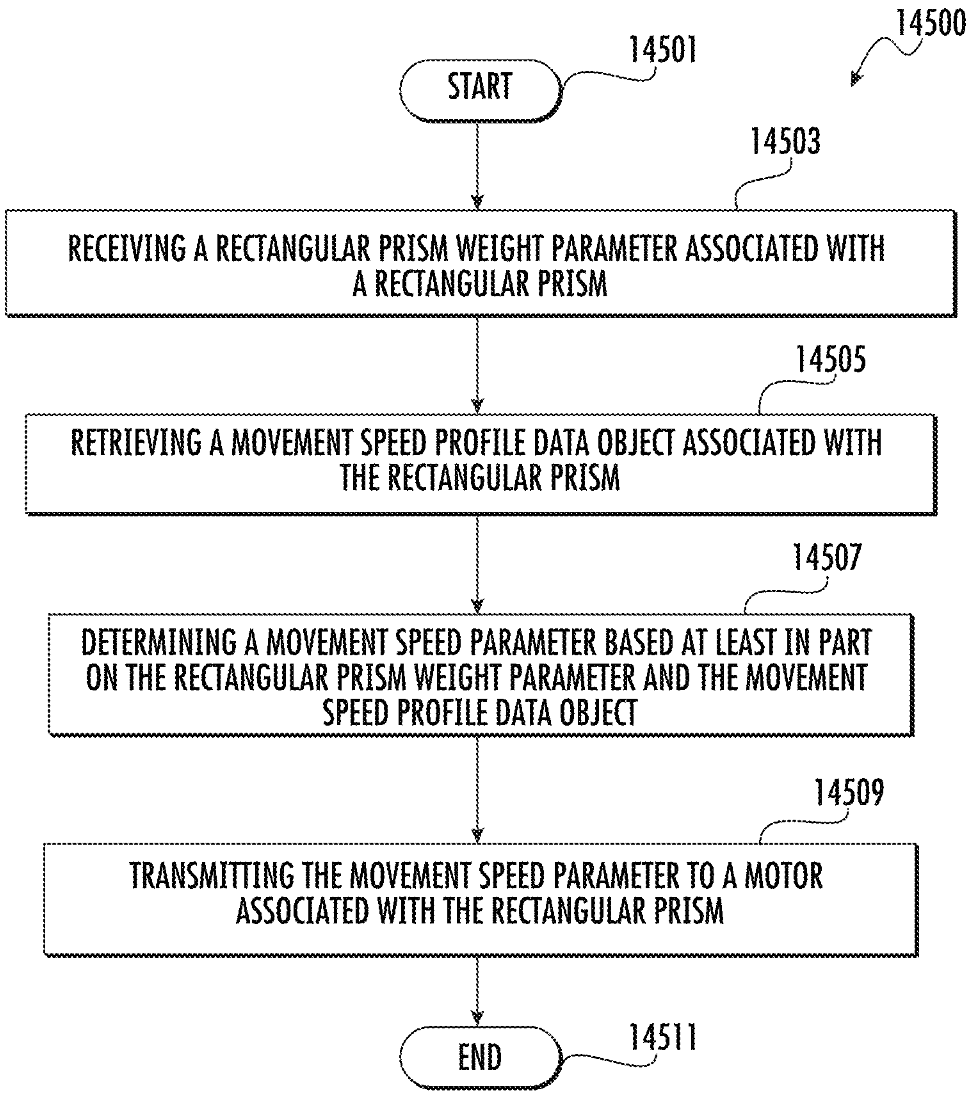

FIG. 145 illustrates an example method of optimizing the movement speed of the rectangular prism in accordance with some embodiments of the present disclosure.

Figure 146:
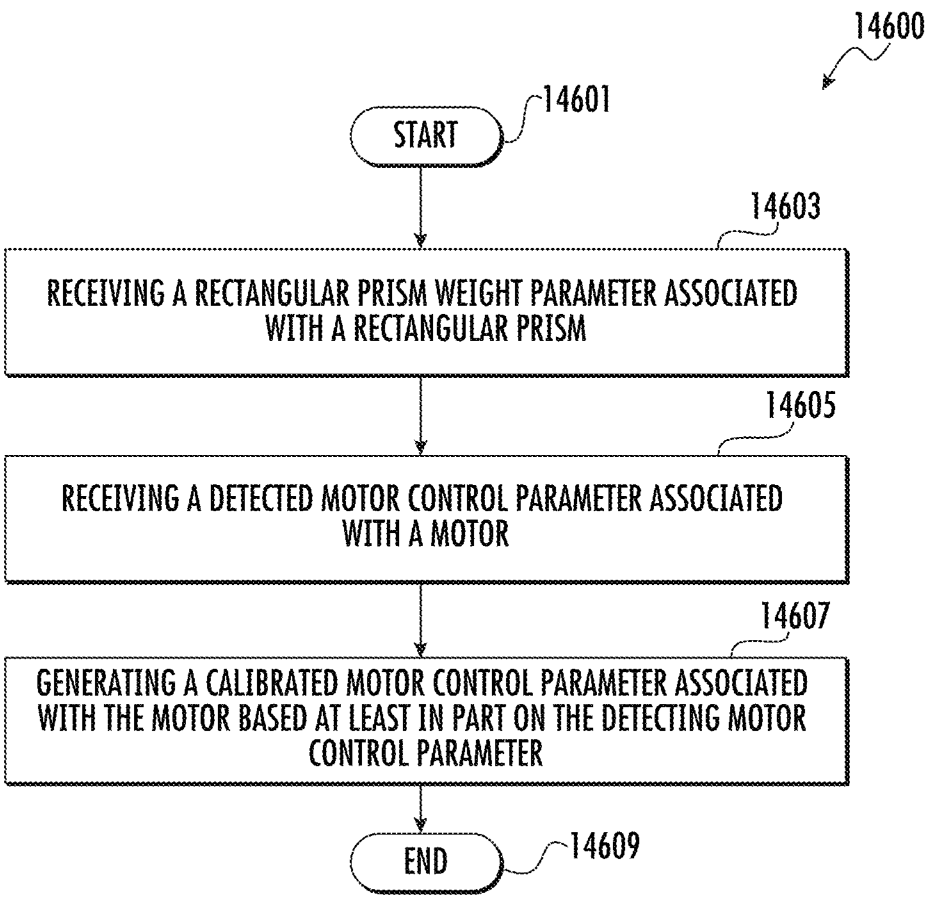

FIG. 146 illustrates an example method of generating a calibrated motor control parameter in accordance with some embodiments of the present disclosure.

Figure 147:
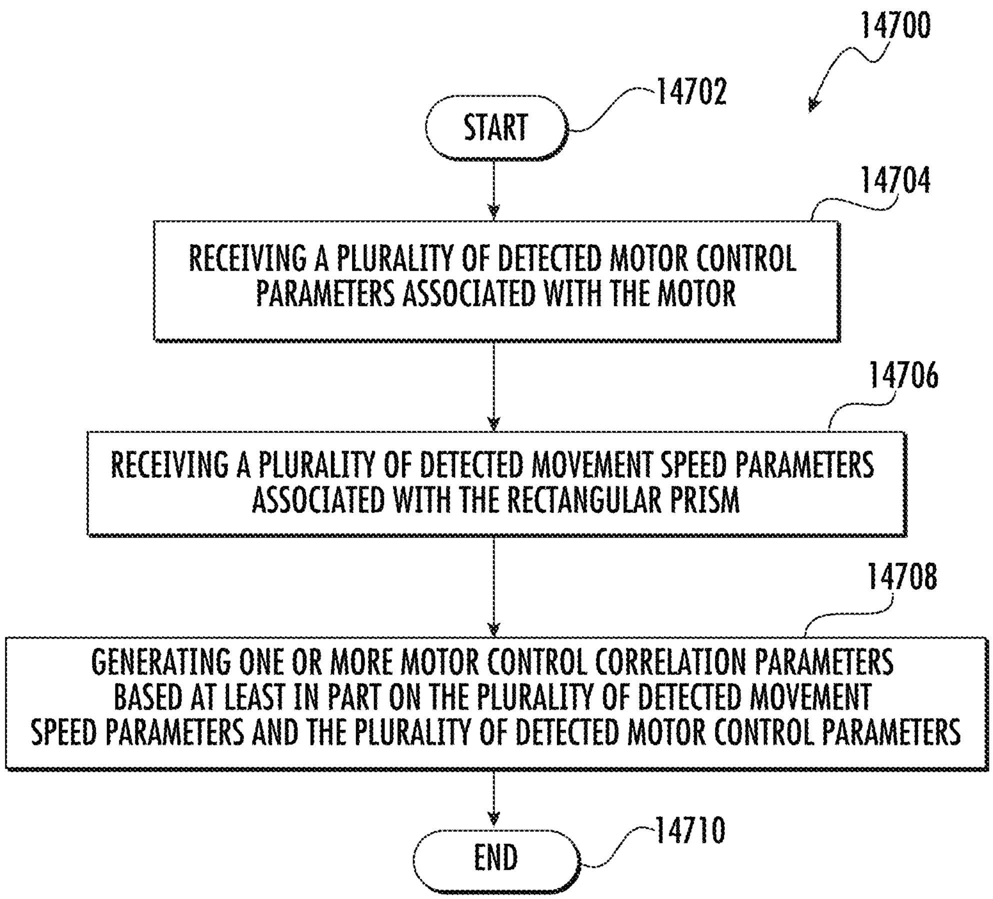

FIG. 147 illustrates an example method of generating one or more motor control correlation parameters in accordance with some embodiments of the present disclosure.

Figure 148:
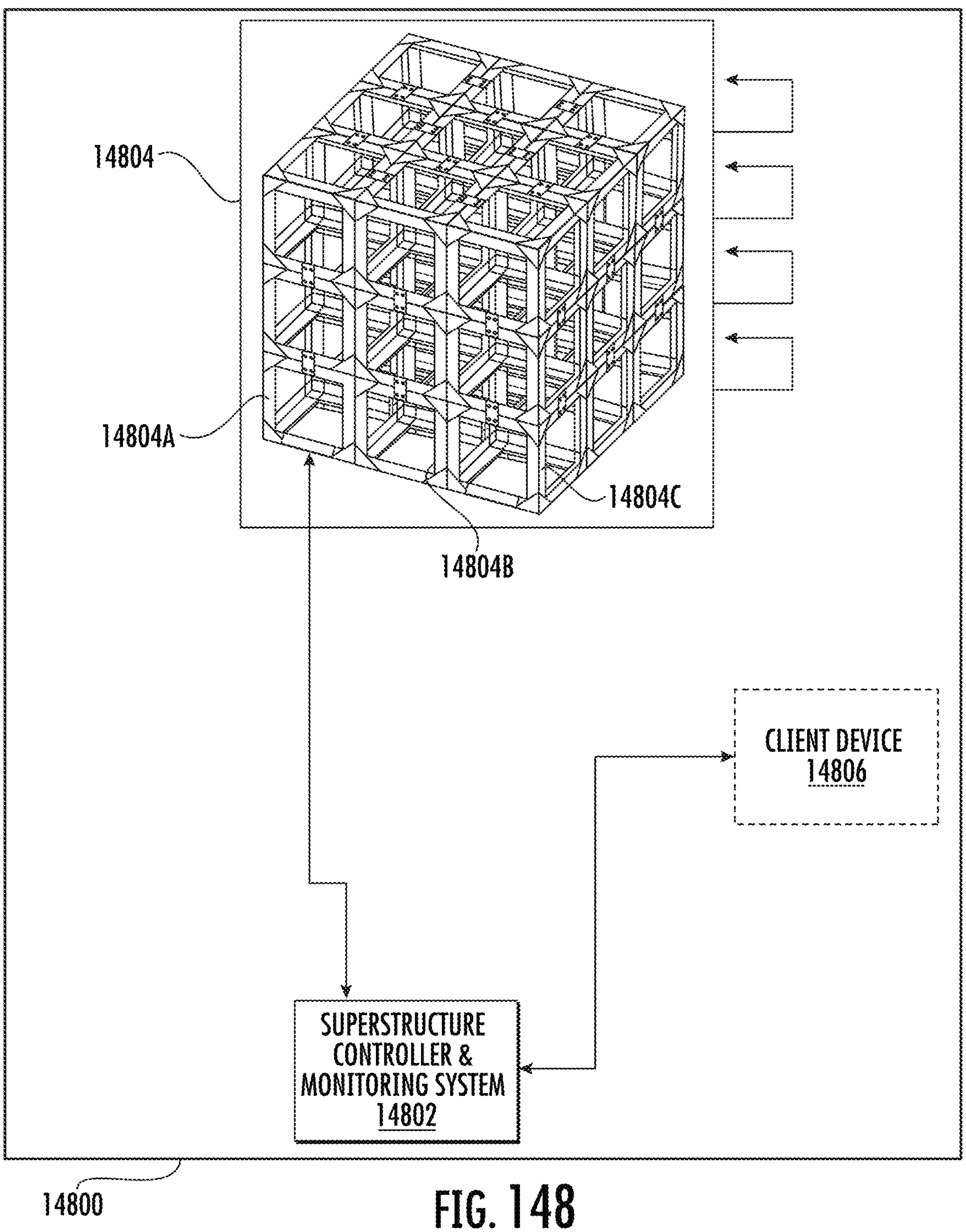

FIG. 148 illustrates a block diagram of a system that may be specially configured within which embodiments of the present disclosure may operate.

Figure 149:
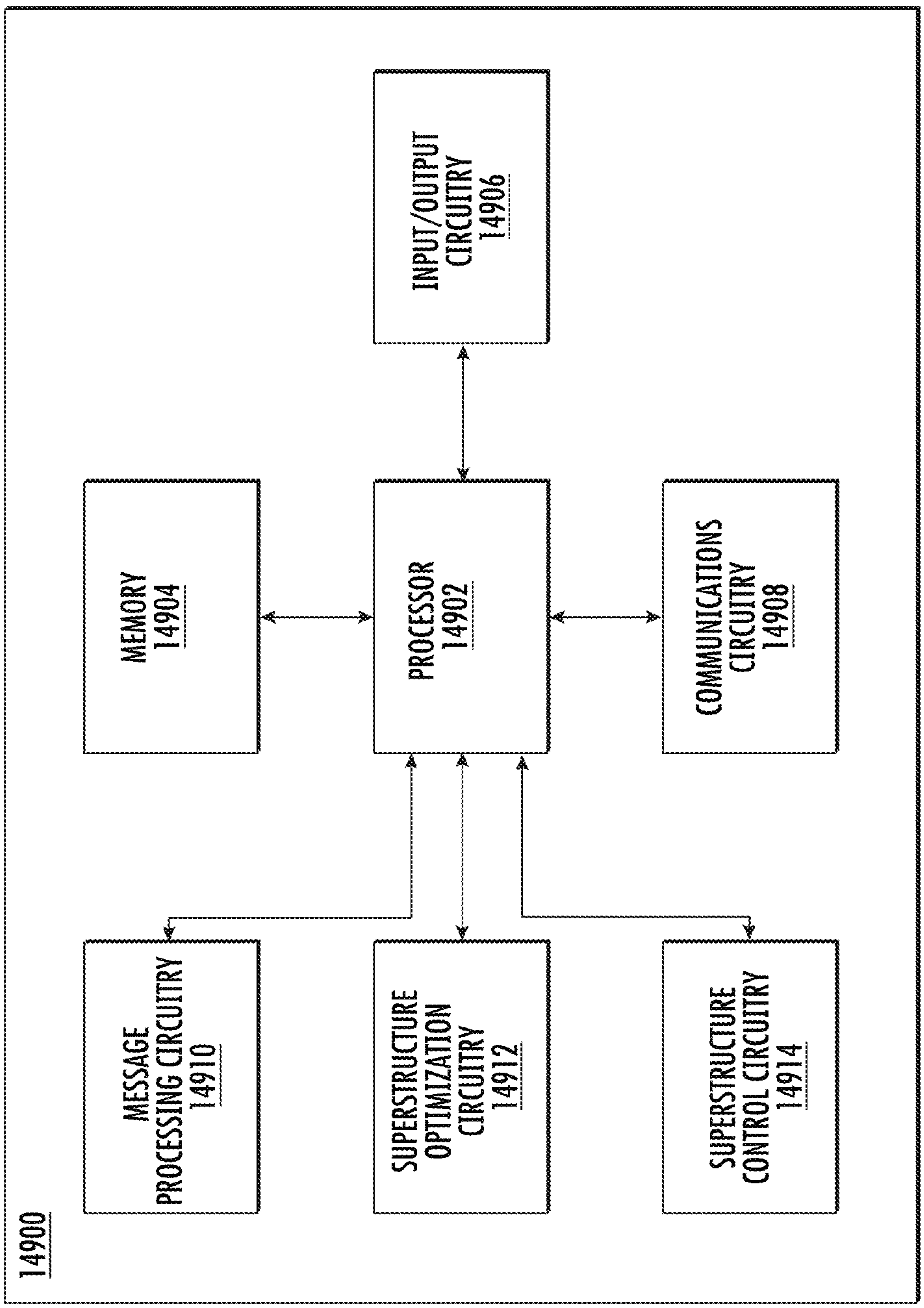

FIG. 149 illustrates a block diagram of an example optimized control apparatus that may be specially configured in accordance with at least an example embodiment of the present disclosure.

Figure 150:
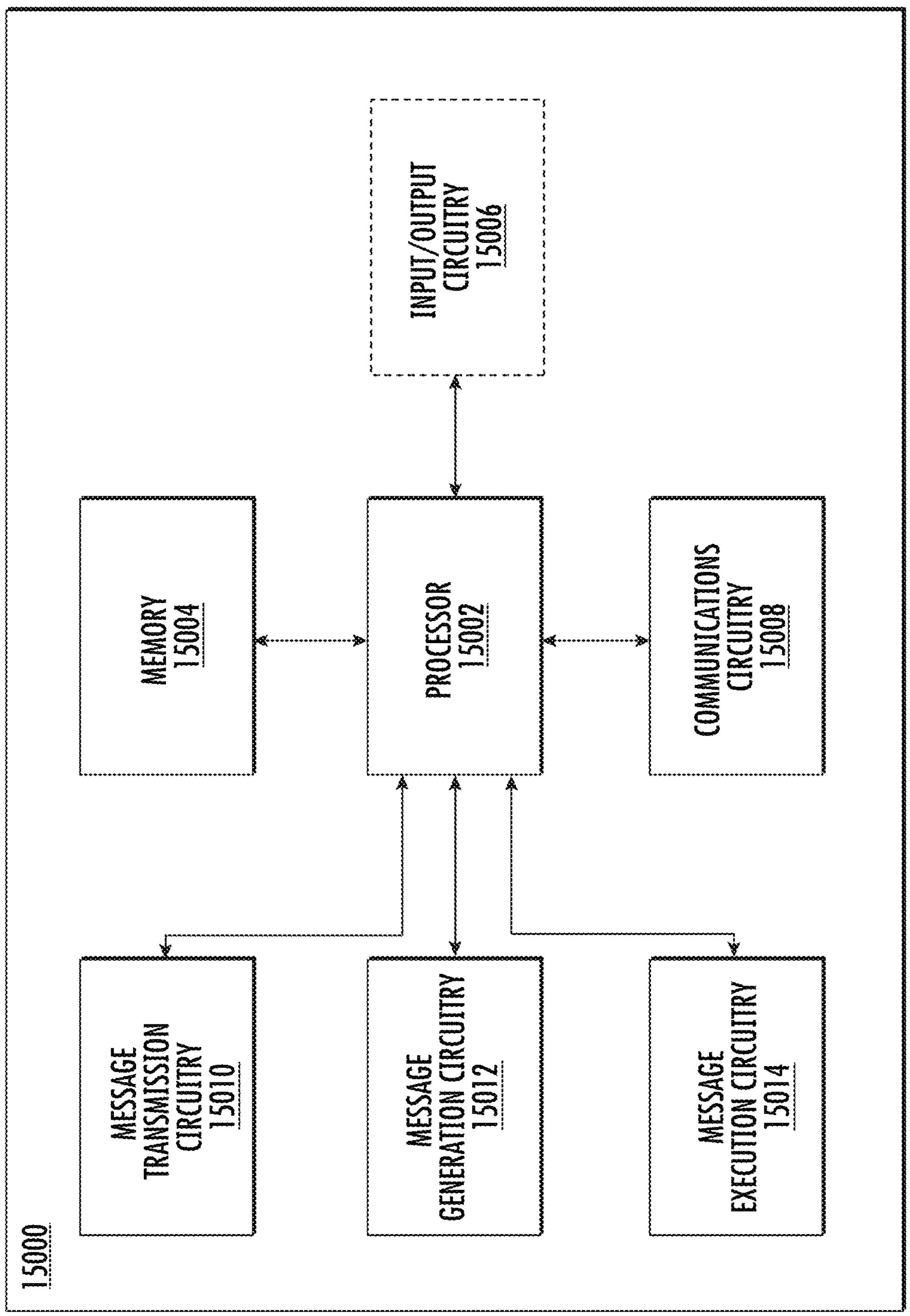

FIG. 150 illustrates a block diagram of an example model apparatus that may be specially configured in accordance with at least an example embodiment of the present disclosure.

Figure 151:
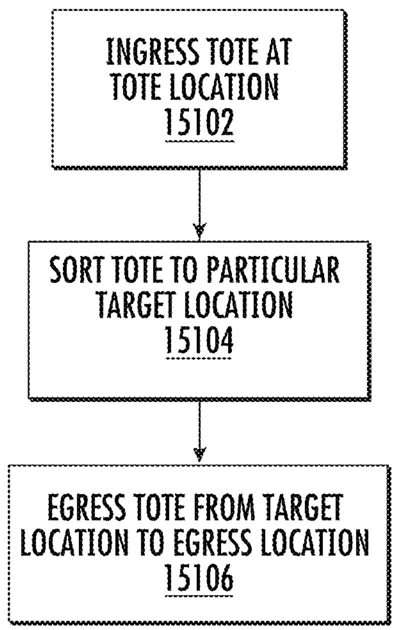

FIG. 151 illustrates a flowchart depicting example operations for manipulating a tote via a modular superstructure in accordance with at least an example embodiment of the present disclosure.

Figure 152:
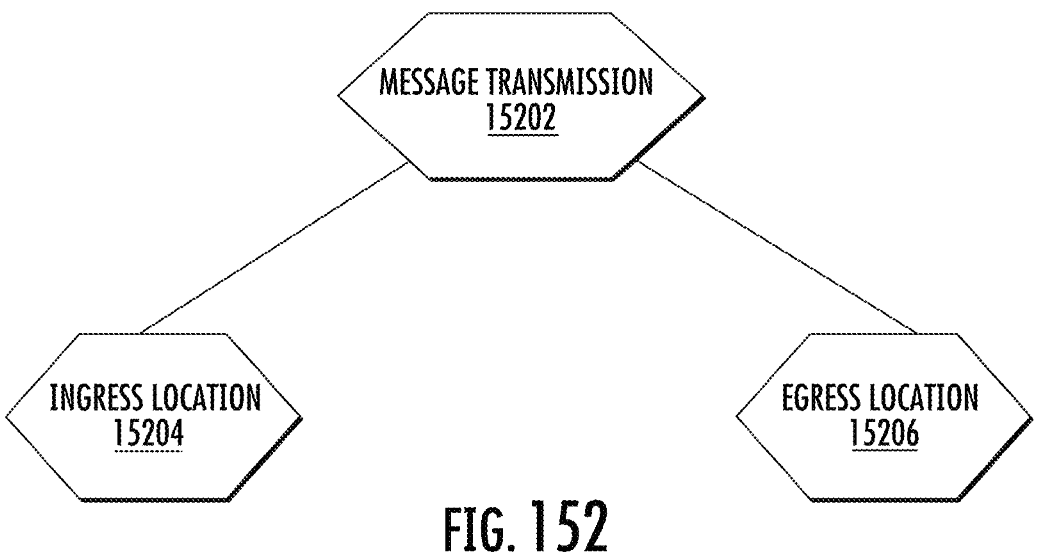

FIG. 152 illustrates example data components of a message transmission in accordance with at least an example embodiment of the present disclosure.

Figure 153:
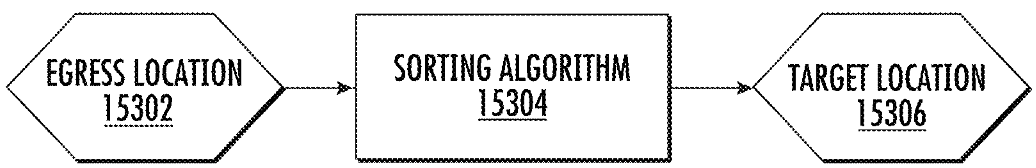

FIG. 153 illustrates example data operations for generation of a target location using at least one sorting algorithm based at least on an egress location in accordance with at least an example embodiment of the present disclosure.

Figure 154:
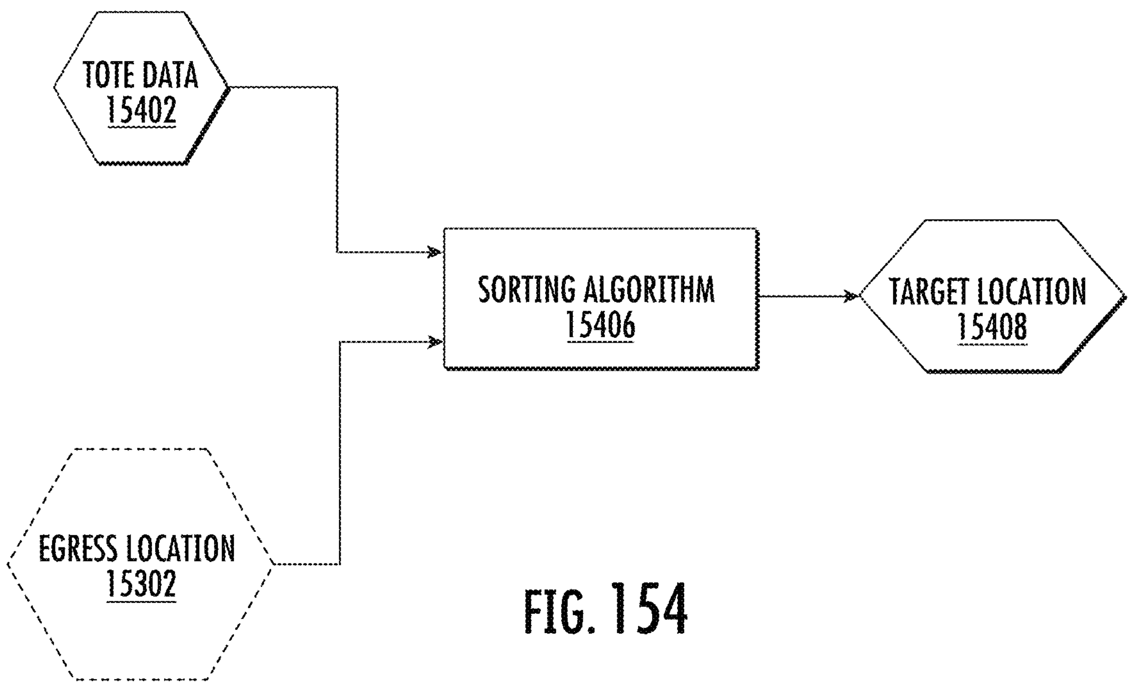

FIG. 154 illustrates example data operations for generation of a target location using at least one sorting algorithm based at least on tote data in accordance with at least an example embodiment of the present disclosure.

Figure 155:
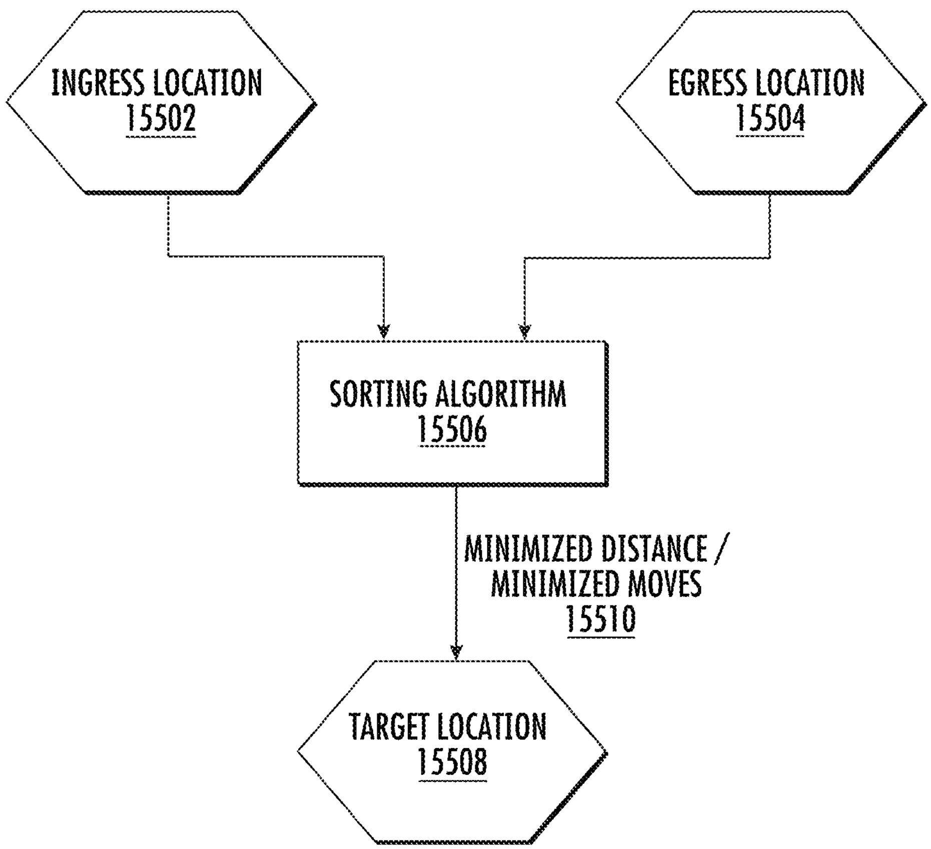

FIG. 155 illustrates example data operations for generation of a target location using at least one sorting algorithm to optimize a target parameter in accordance with at least an example embodiment of the present disclosure.

Figure 156:
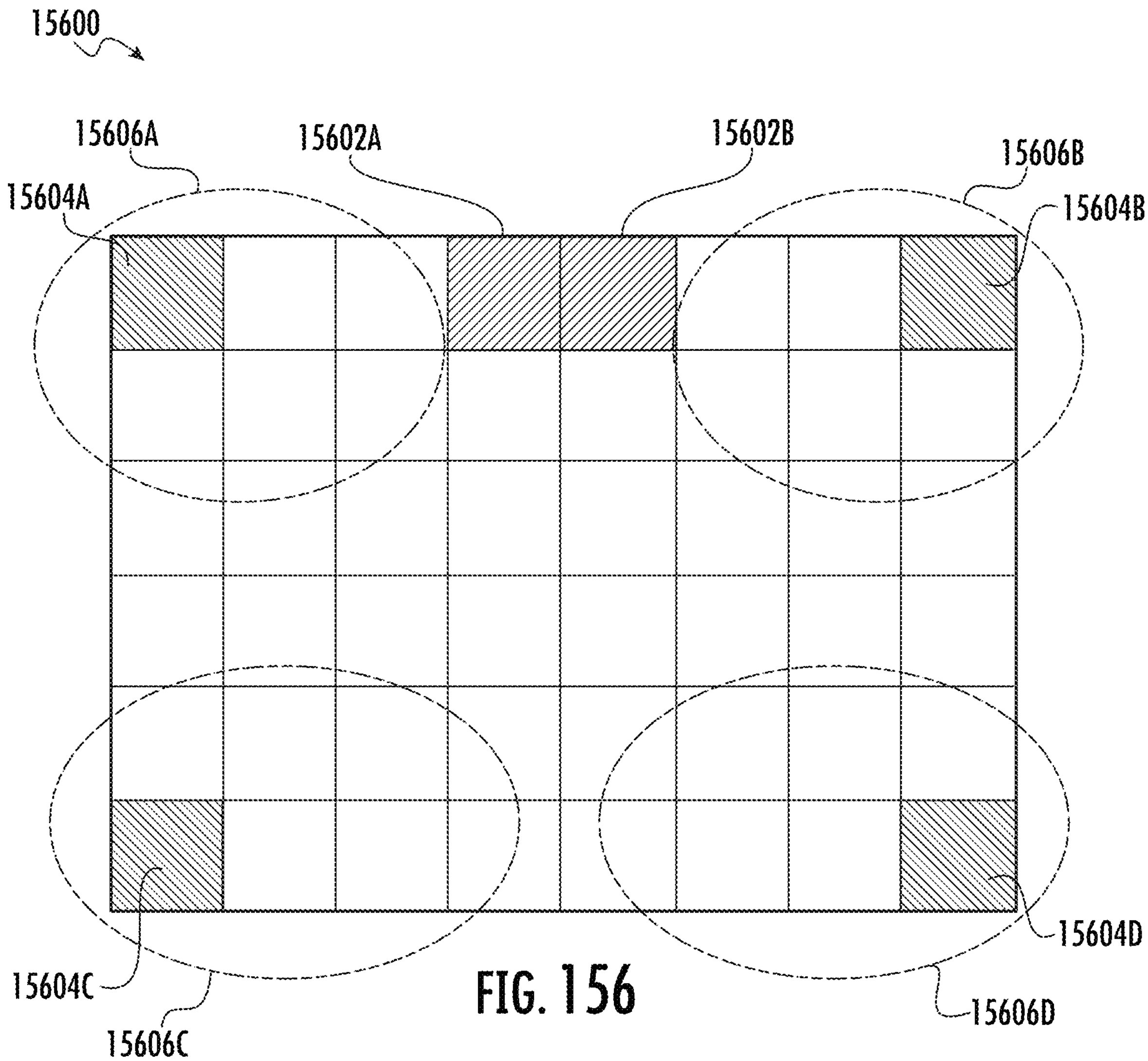

FIG. 156 illustrates a visualization of an example modular superstructure in accordance with at least an example embodiment of the present disclosure.

Figure 157:
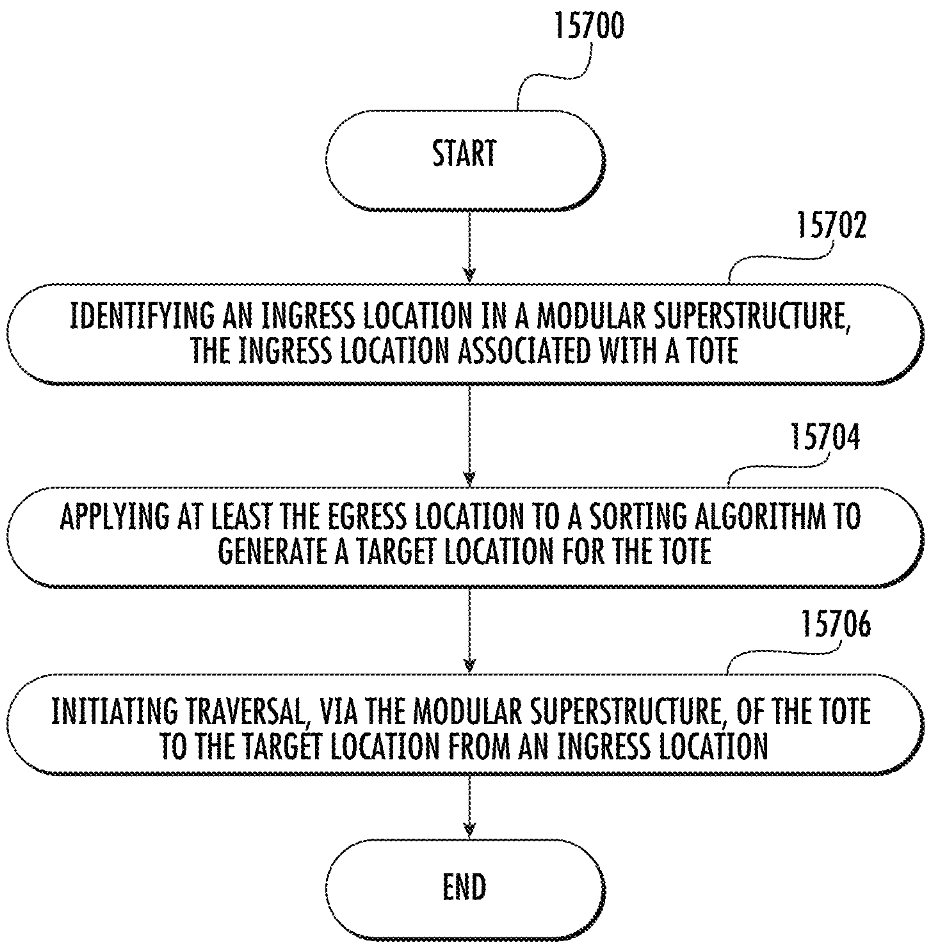

FIG. 157 illustrates a flowchart depicting example operations for determining efficient manipulation of a tote using a modular superstructure in accordance with at least an example embodiment of the present disclosure.

Figure 158:
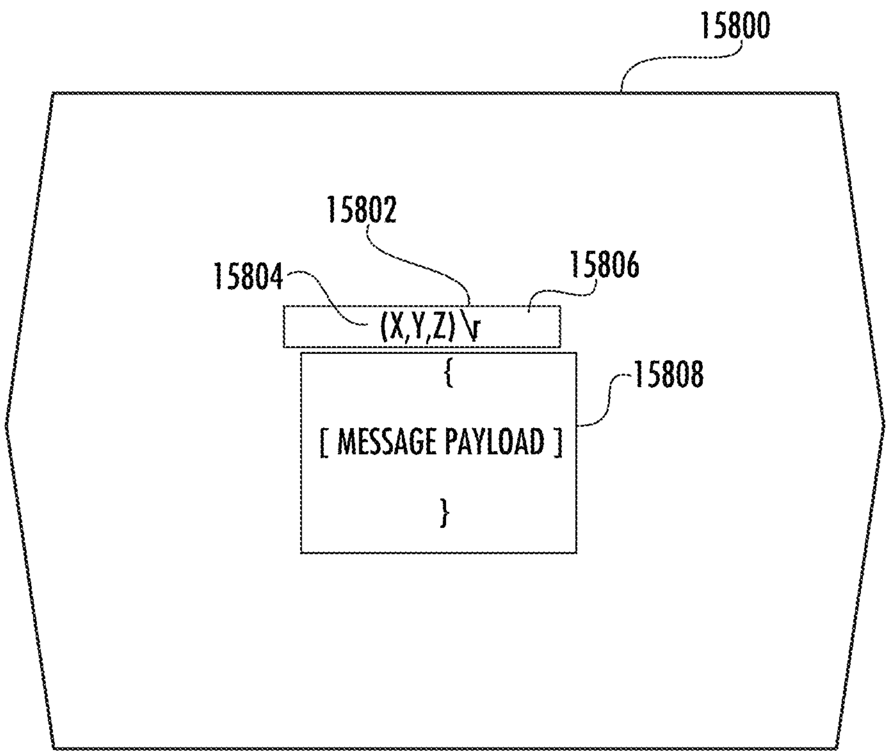

FIG. 158 illustrates an example data architecture of a message transmission in accordance with at least an example embodiment of the present disclosure.

Figure 159:
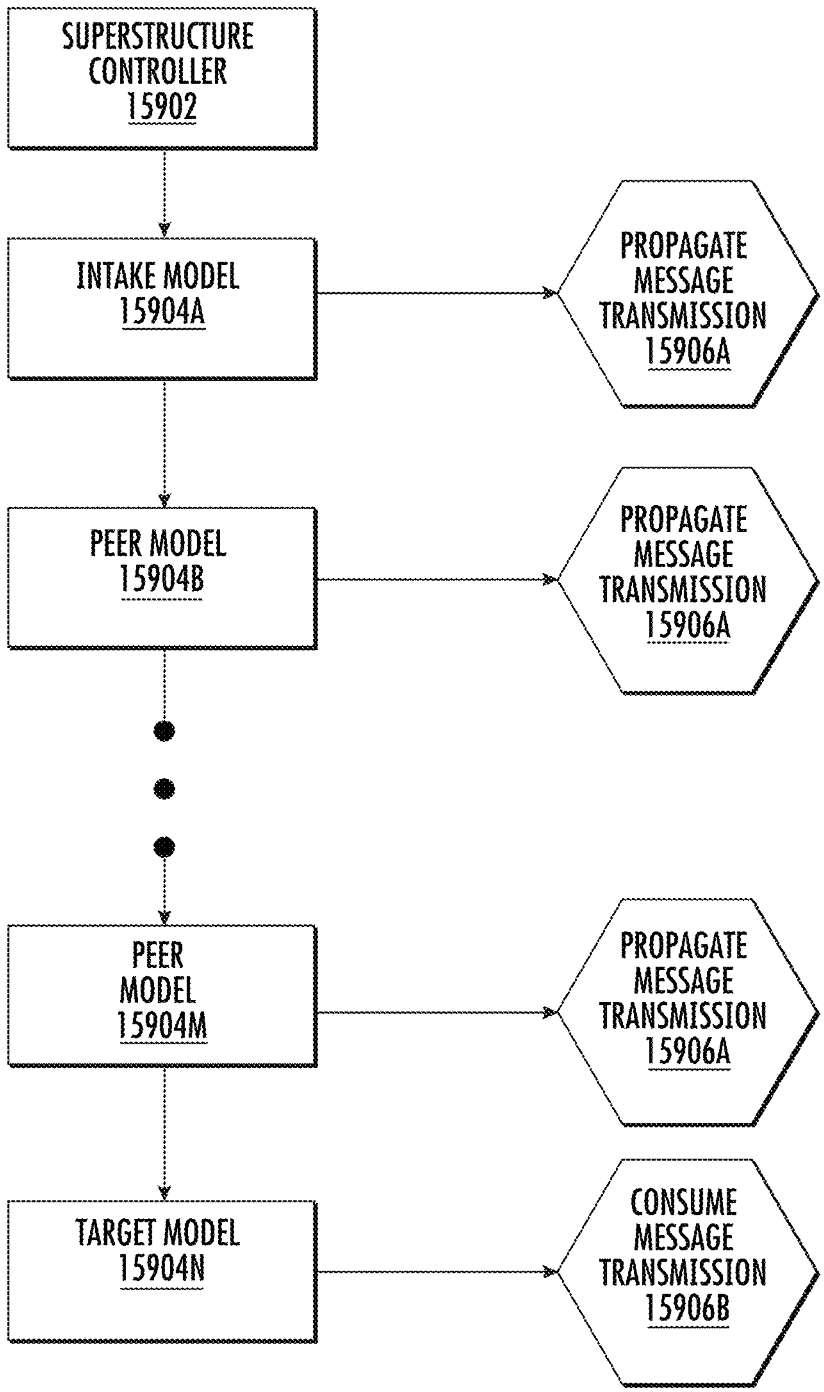

FIG. 159 illustrates example operations performed during message transmission propagation in accordance with at least an example embodiment of the present disclosure.

Figure 160:
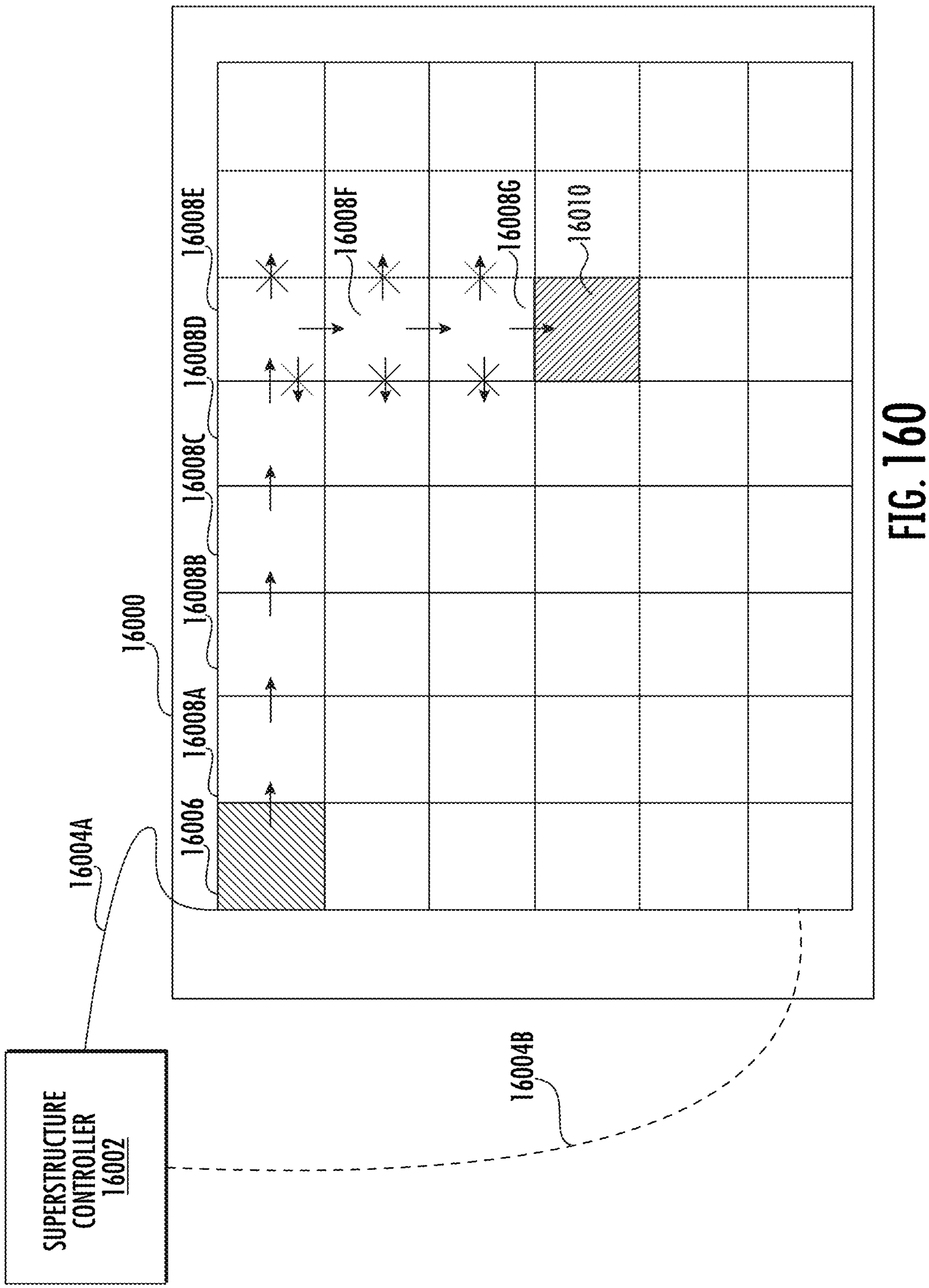

FIG. 160 illustrates an example visualization of routing a message transmission throughout a modular superstructure in accordance with at least an example embodiment of the present disclosure.

Figure 161:
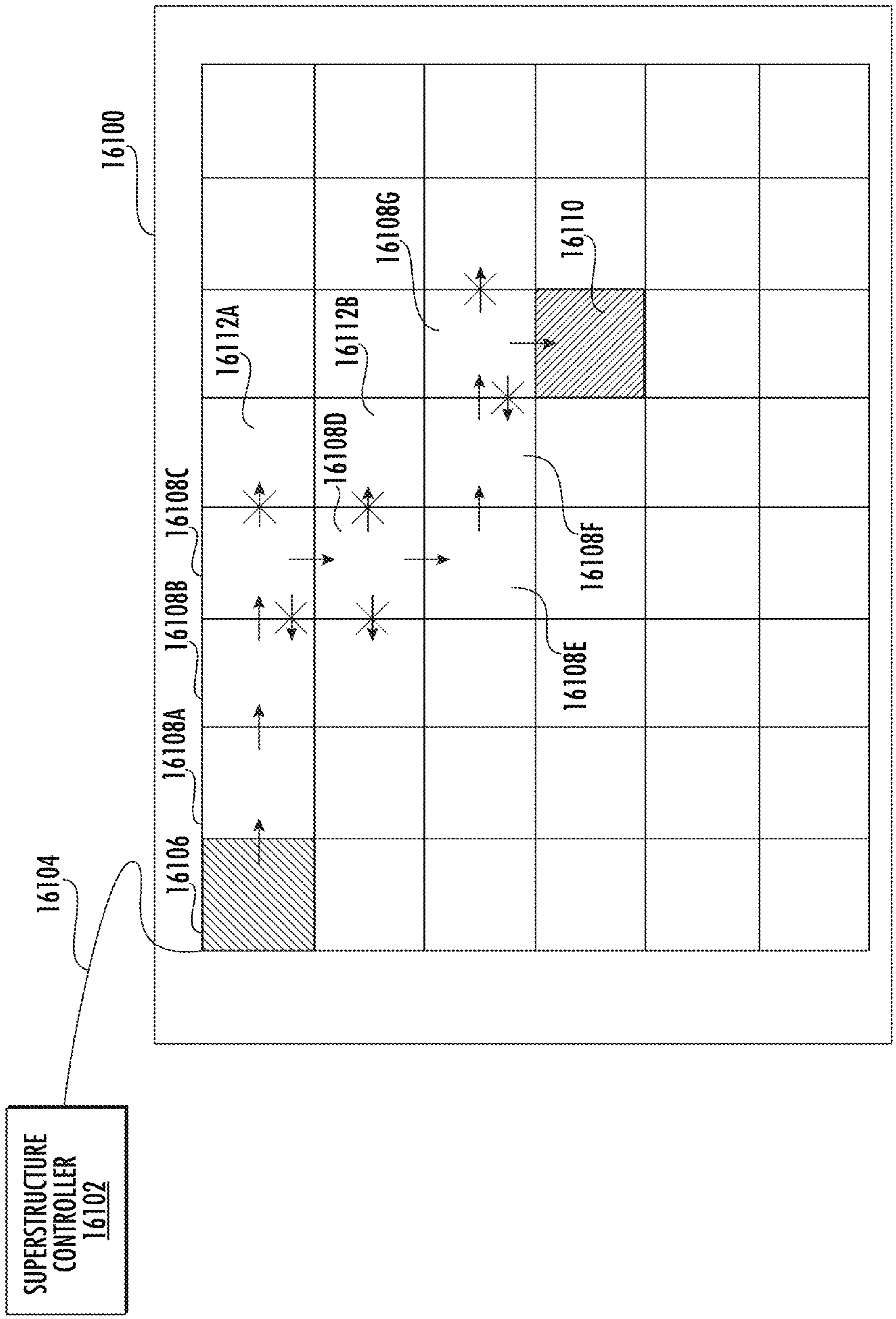

FIG. 161 illustrates another example visualization of routing a message transmission throughout another modular superstructure in accordance with at least an example embodiment of the present disclosure.

Figure 162A:
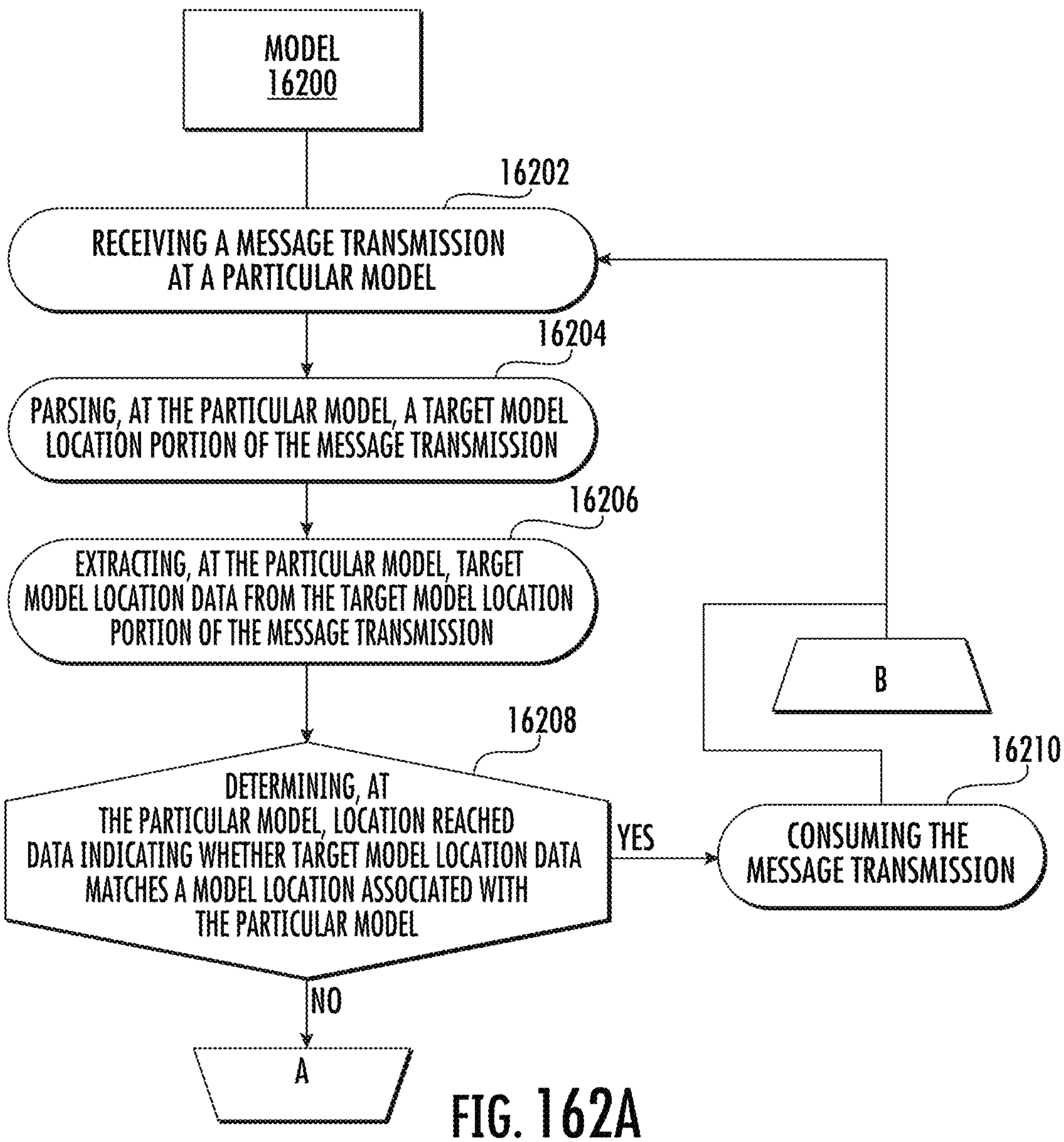
Figure 162B:
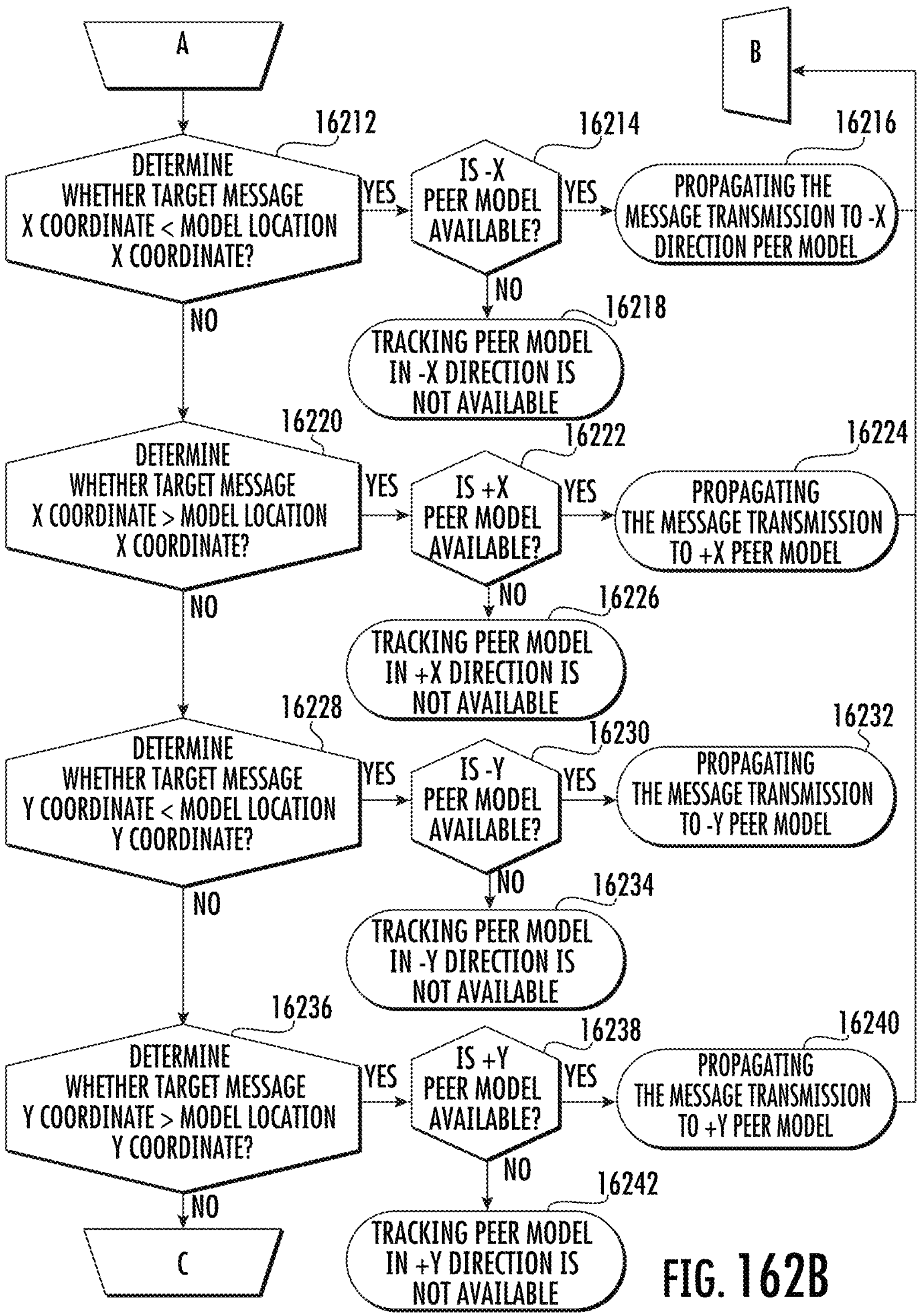
Figure 162C:
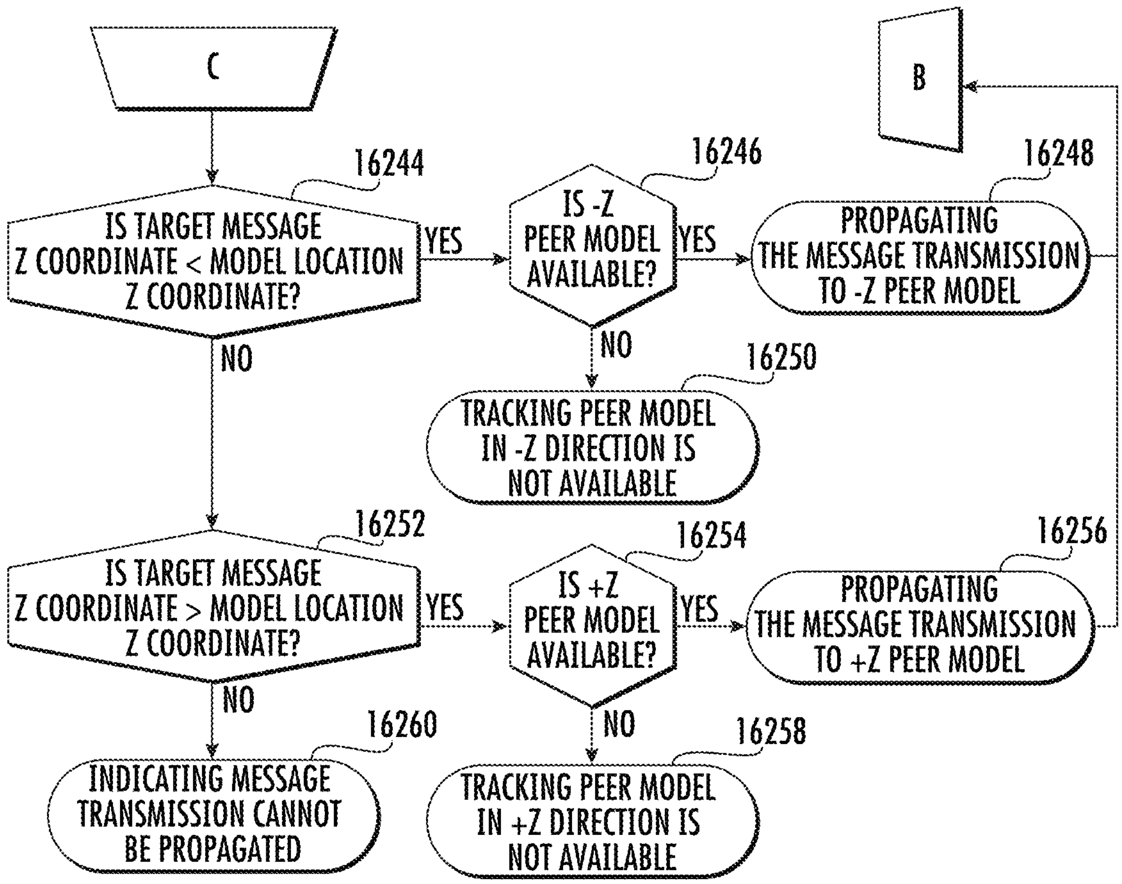

FIG. 162A, FIG. 162B, and FIG. 162C each illustrate a flowchart depicting example operations of an example process for routing a message transmission in accordance with at least an example embodiment of the present disclosure.

Figure 163:
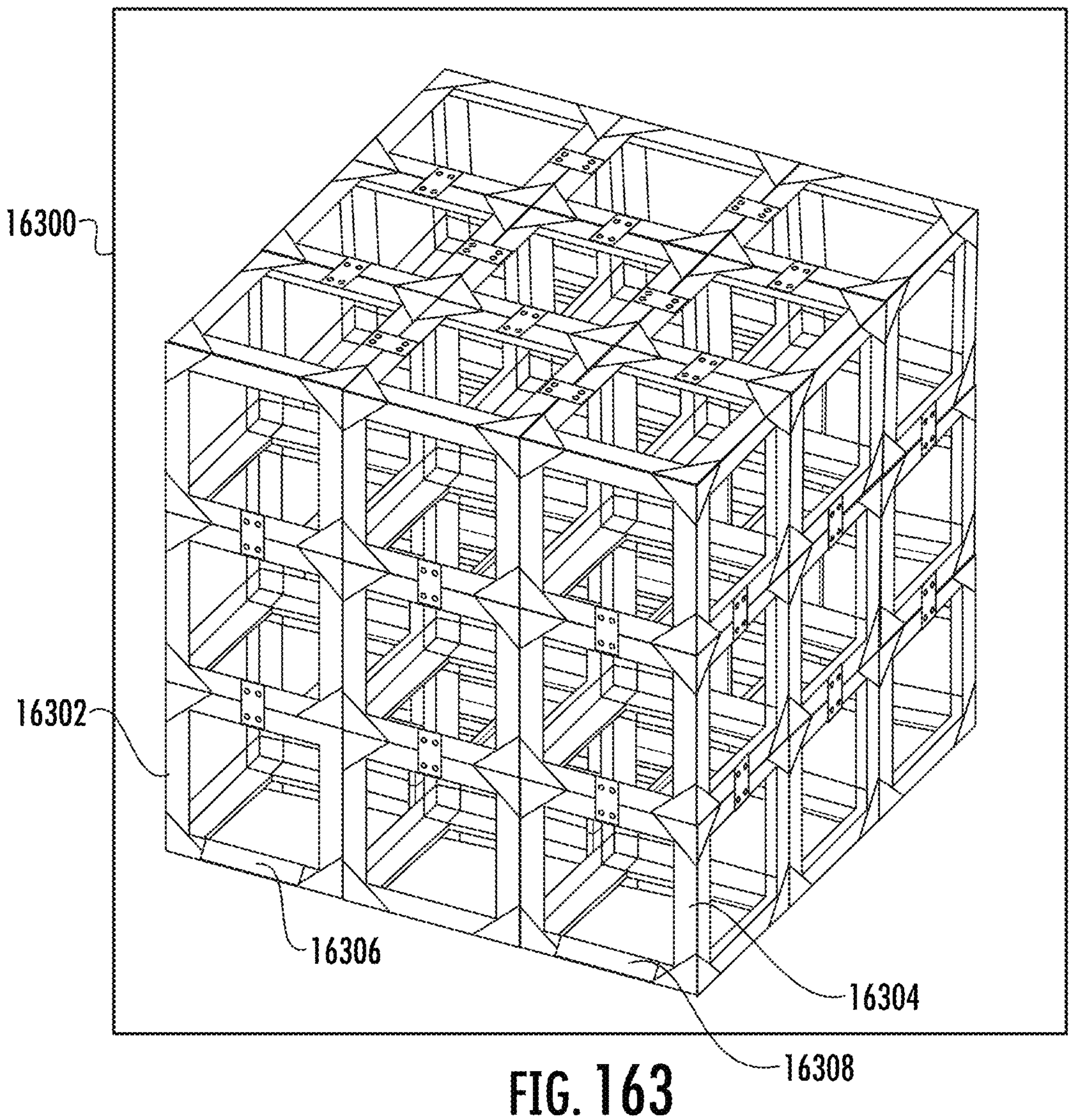

FIG. 163 illustrates a modular superstructure with improved smart racks including at least one display in accordance with at least an example embodiment of the present disclosure.

Figure 164:
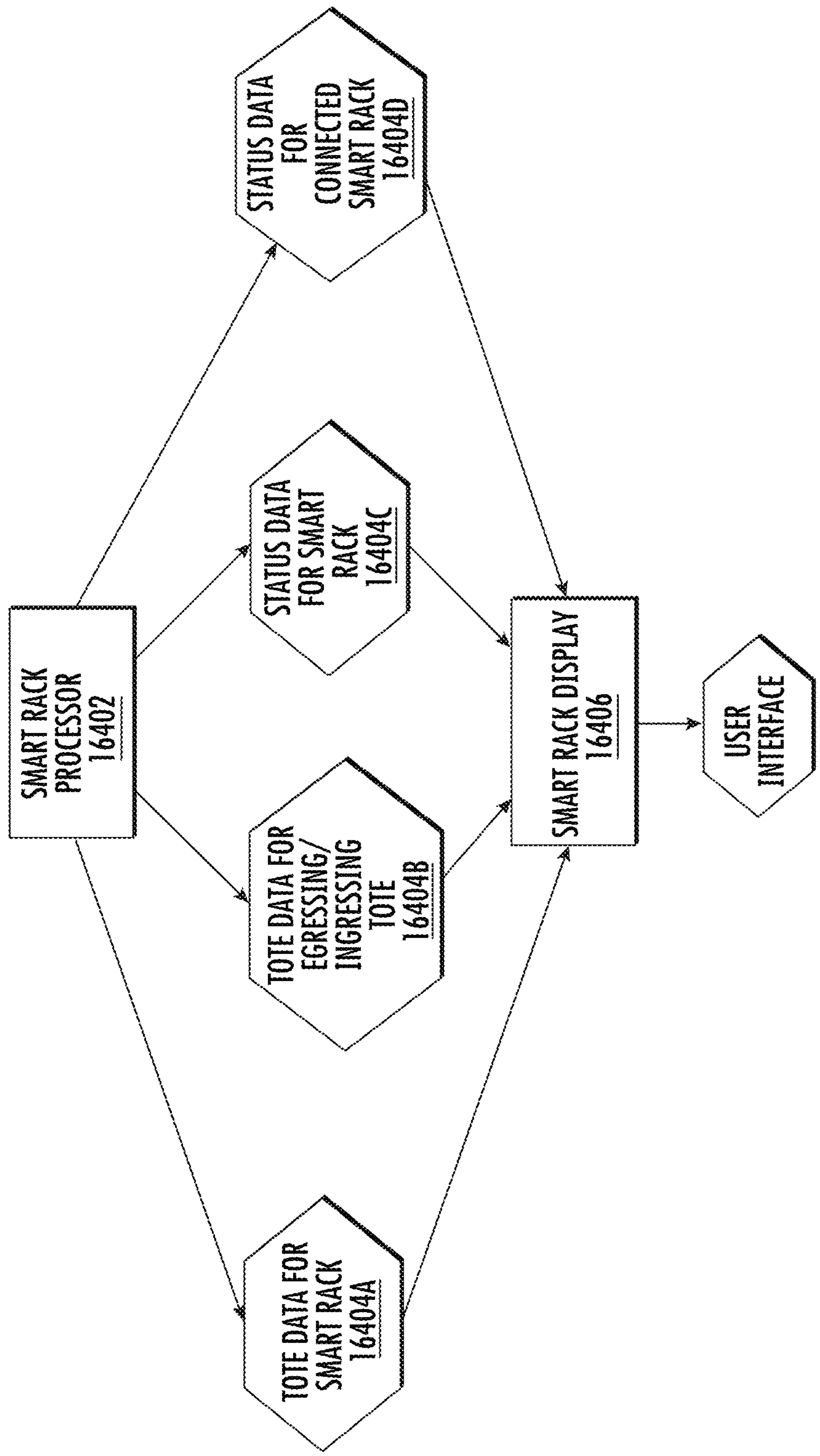

FIG. 164 illustrates example data identification and/or manipulation for causing rendering to a display in accordance with at least an example embodiment of the present disclosure.

Figure 165:
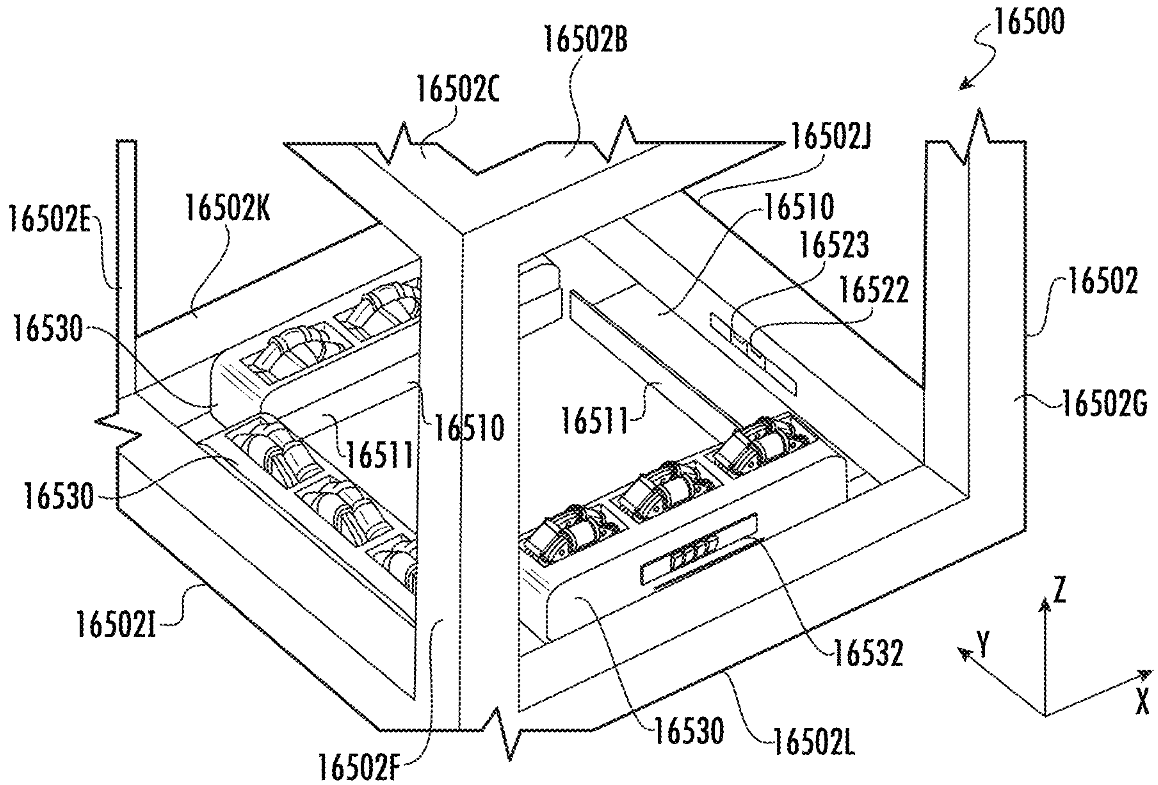

FIG. 165 illustrates a perspective view of a rack frame, in accordance with some embodiments of the present disclosure.

Figure 166:
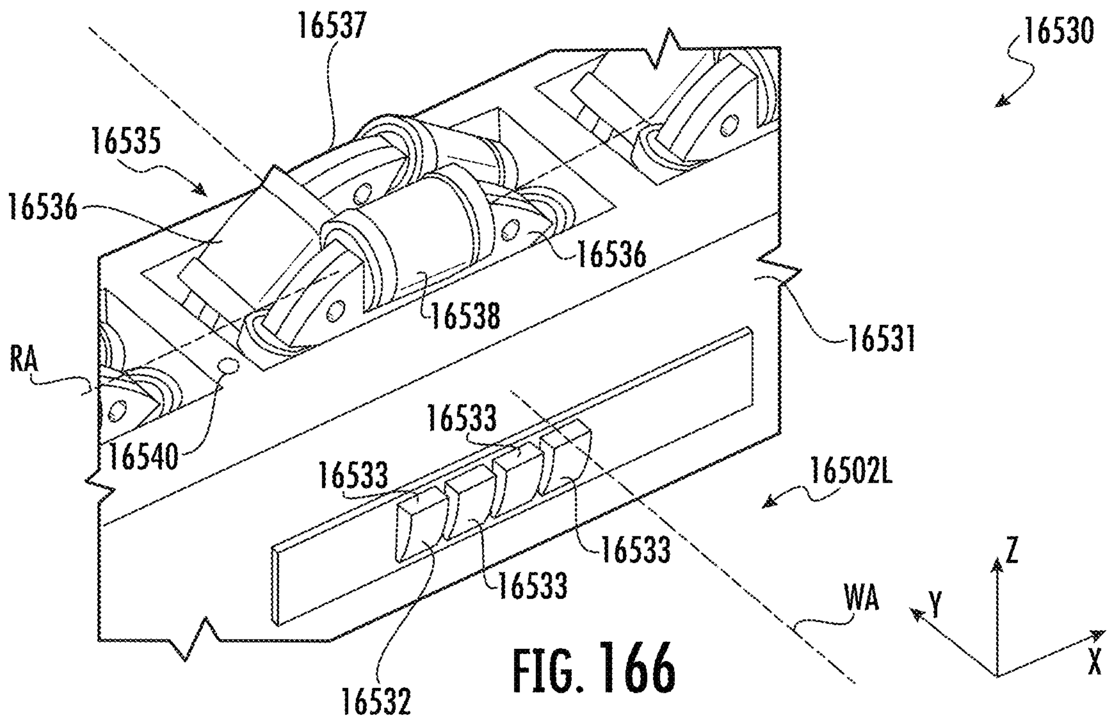

FIG. 166 illustrates a perspective view a portion of a wheel pack, in accordance with some embodiments of the present disclosure.

Figure 167:
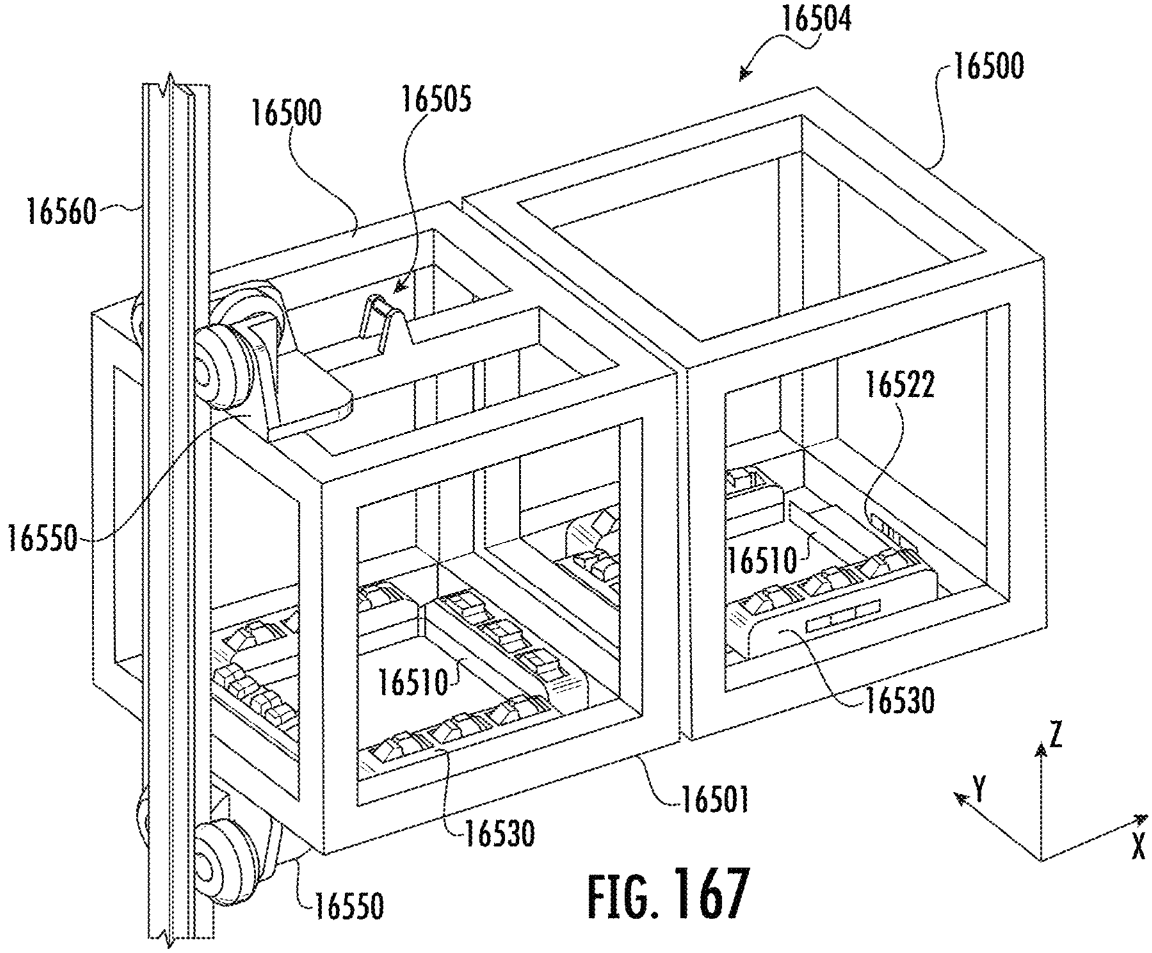

FIG. 167 illustrates a perspective view a portion of a modular superstructure, in accordance with some embodiments of the present disclosure.

Figure 168:
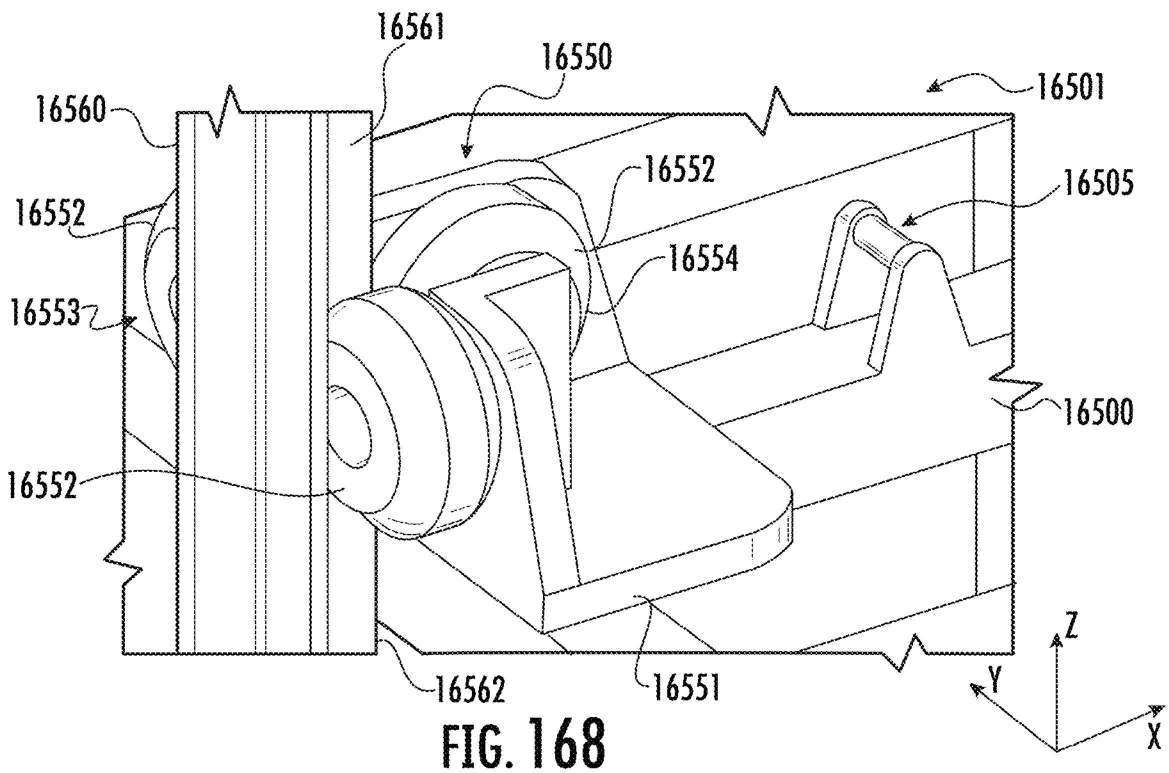

FIG. 168 illustrates a perspective view a portion of an elevator rack frame, in accordance with some embodiments of the present disclosure.

Figure 169:
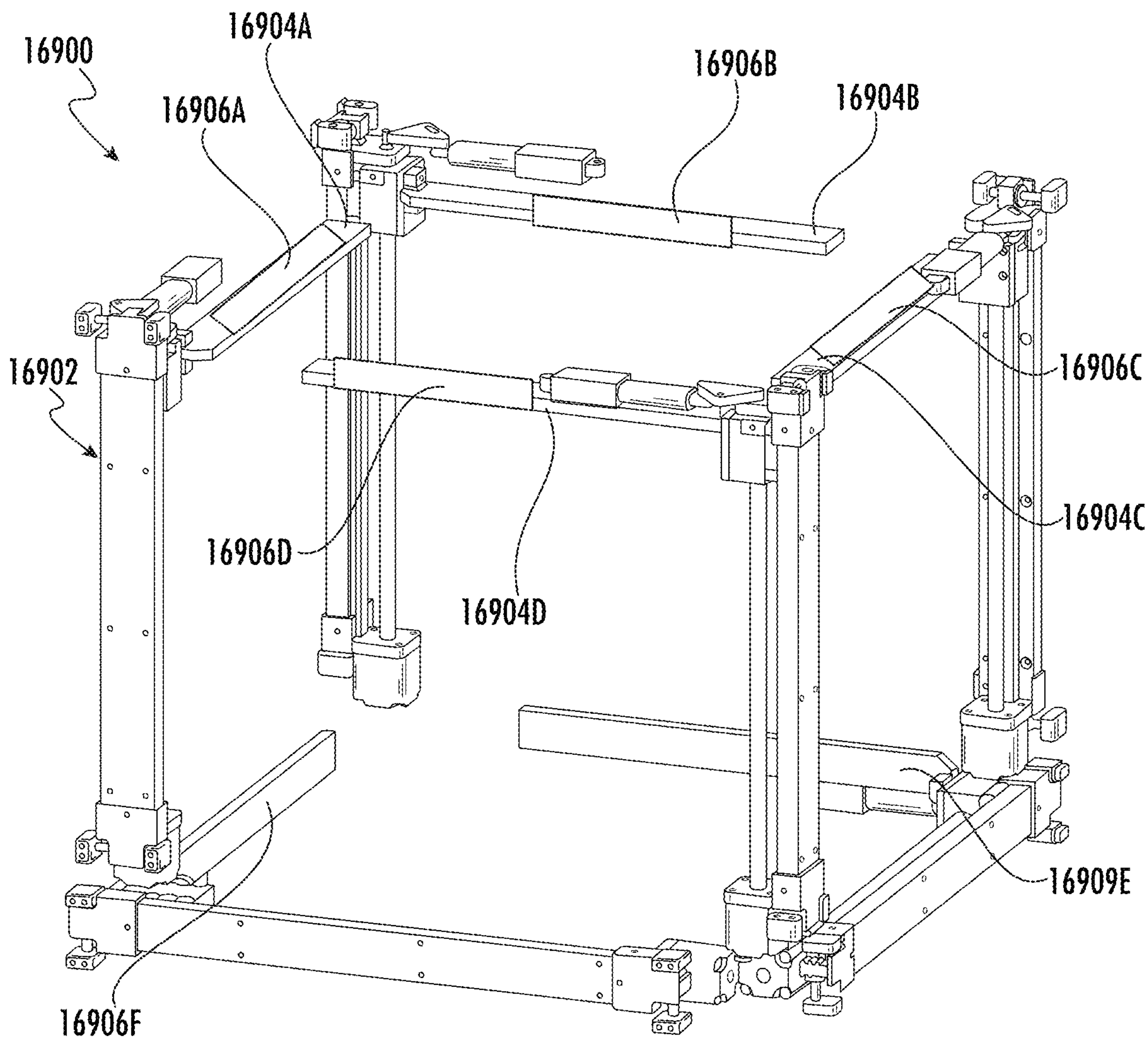

FIG. 169 illustrates an isometric view of an example smart rack with charging devices in accordance with some embodiments of the present disclosure.

Figure 170:
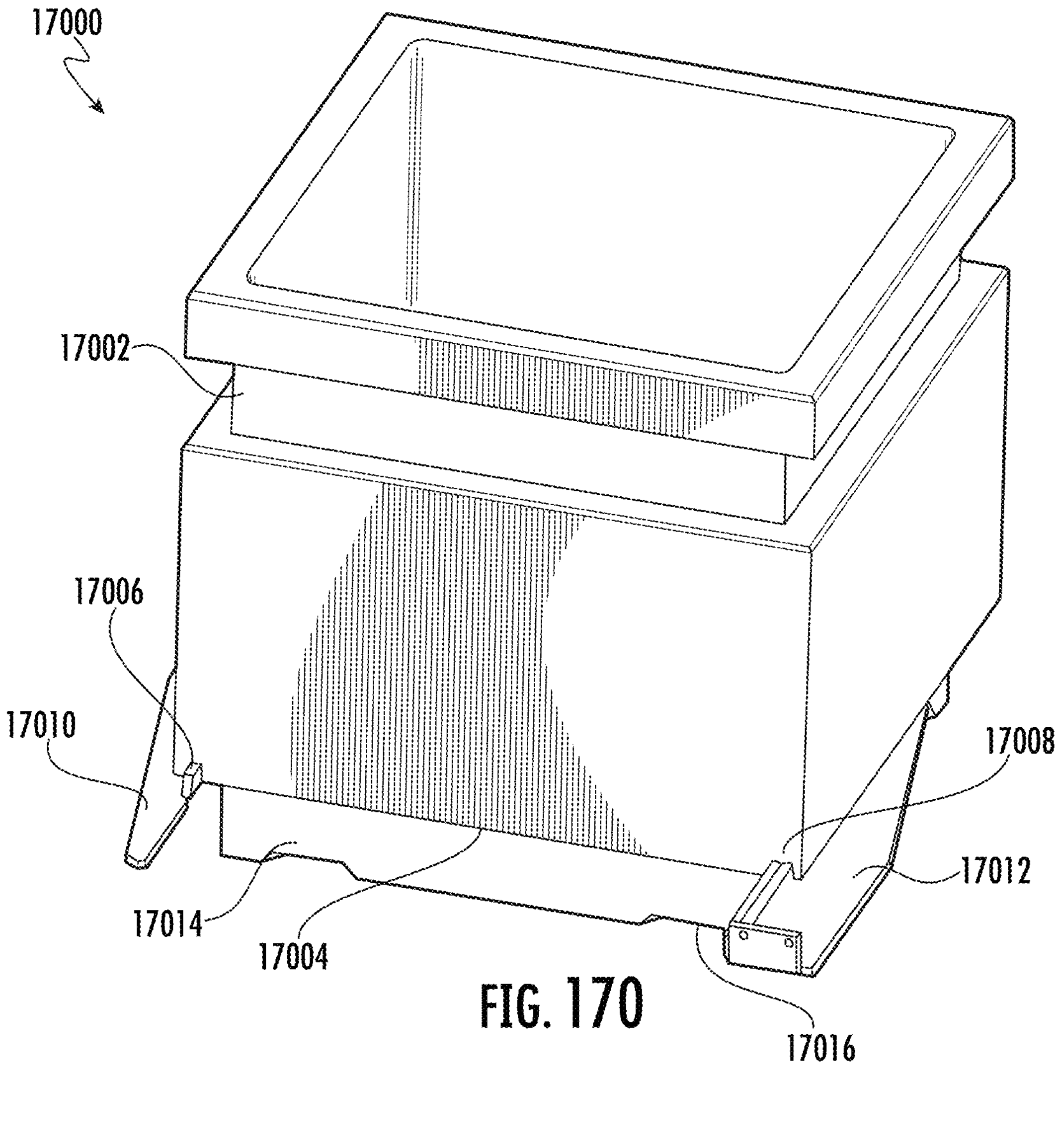

FIG. 170 illustrates a perspective view of an example tote with rails in accordance with some embodiments of the present disclosure.

Figure 171:
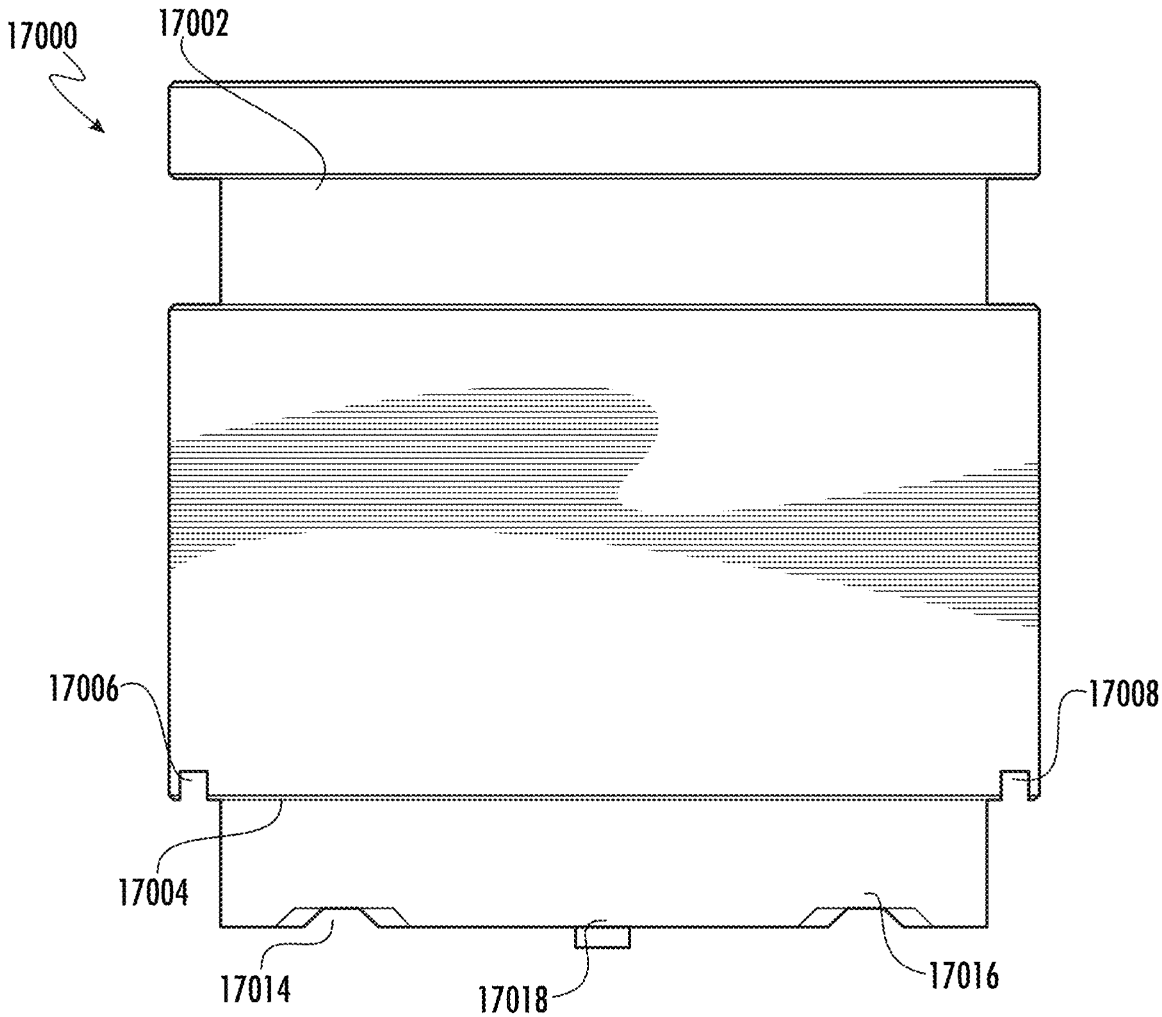

FIG. 171 illustrates an elevation side view of an example tote with rails in accordance with some embodiments of the present disclosure.

Figure 172:
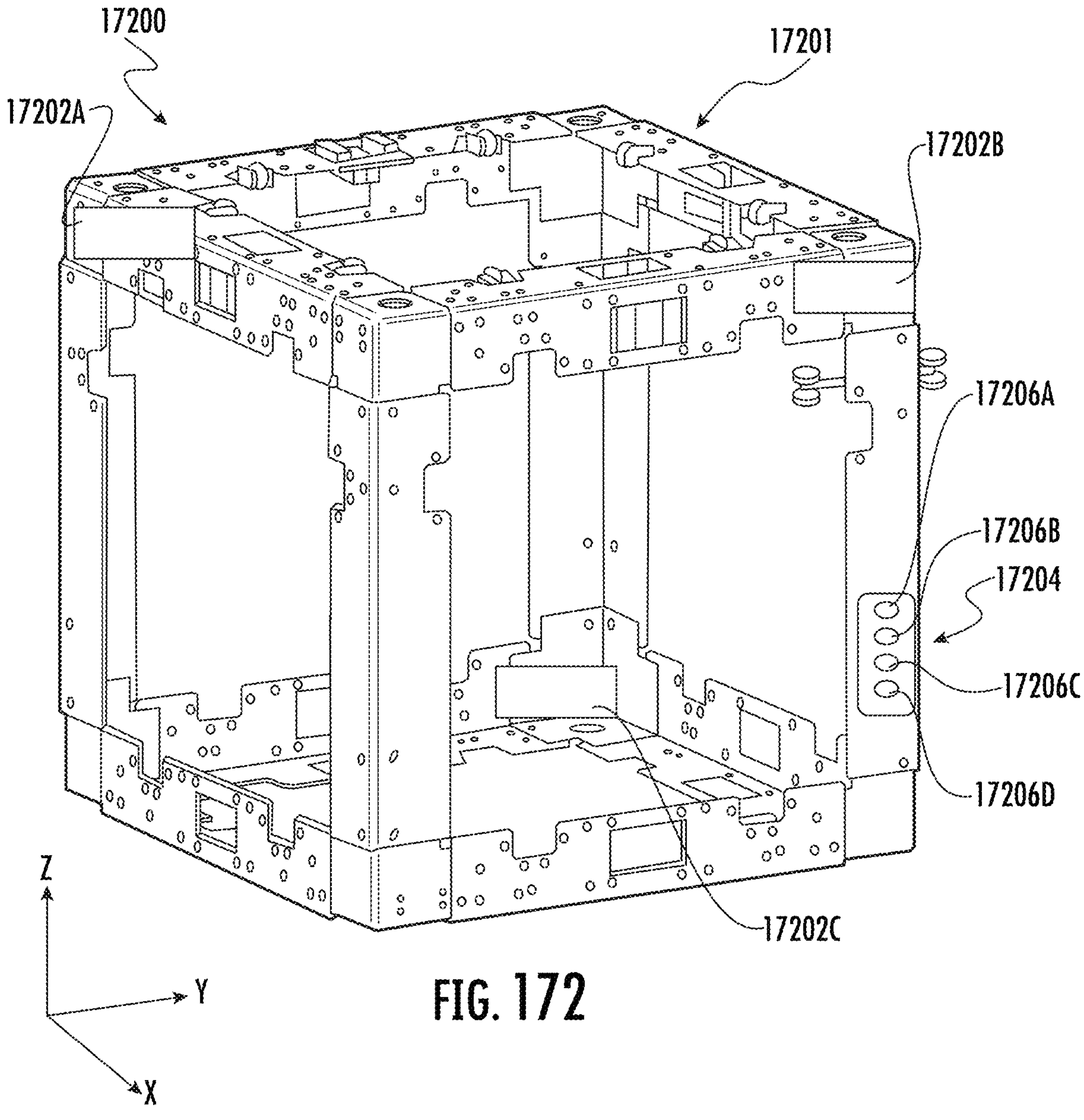

FIG. 172 illustrates a perspective view of an example pneumatic smart rack in accordance with some embodiments of the present disclosure.

Figure 173:
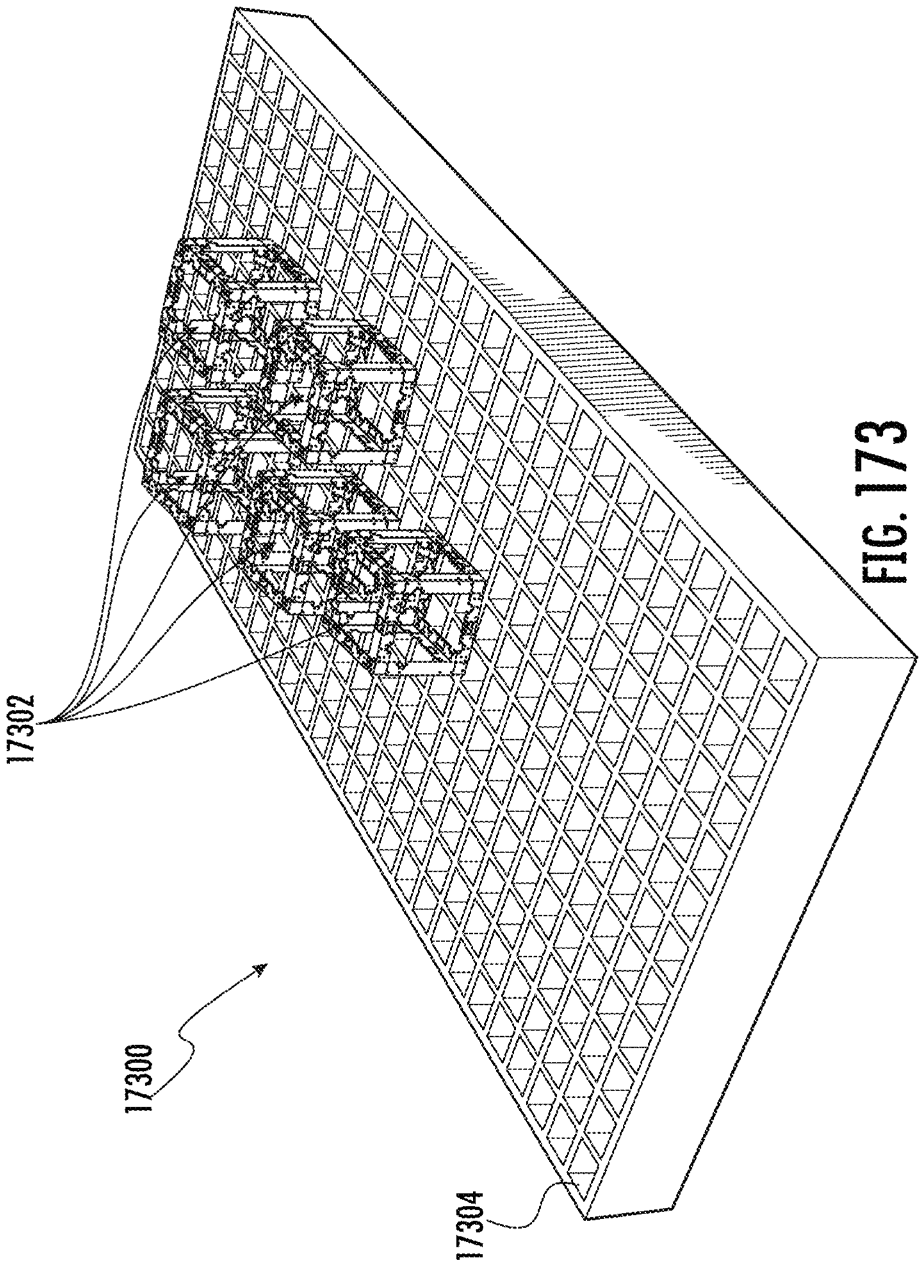

FIG. 173 illustrates a perspective view of an example platform for self-locking smart racks in accordance with some embodiments of the present disclosure.

Figure 174:
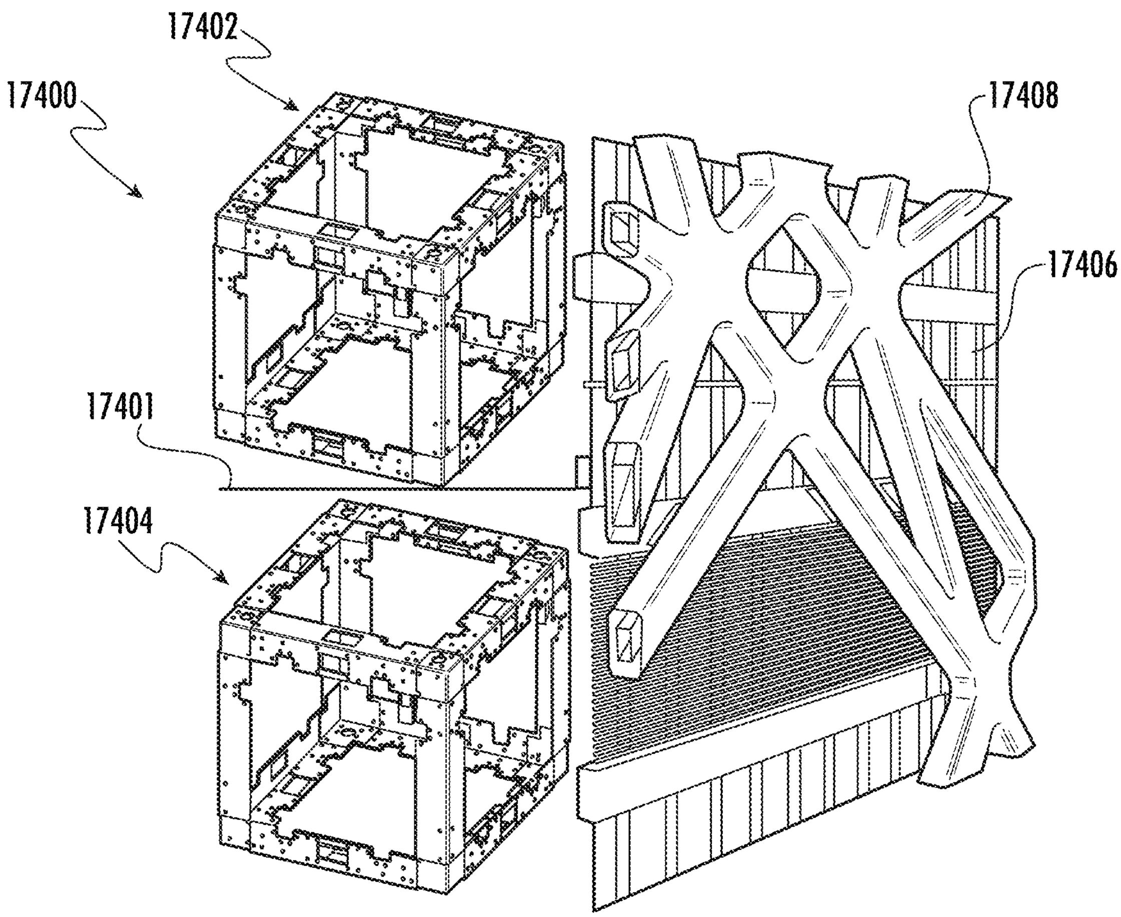

FIG. 174 illustrates a perspective view of an example superstructure with dampeners for self-locking smart racks in accordance with some embodiments of the present disclosure.

Figure 175:
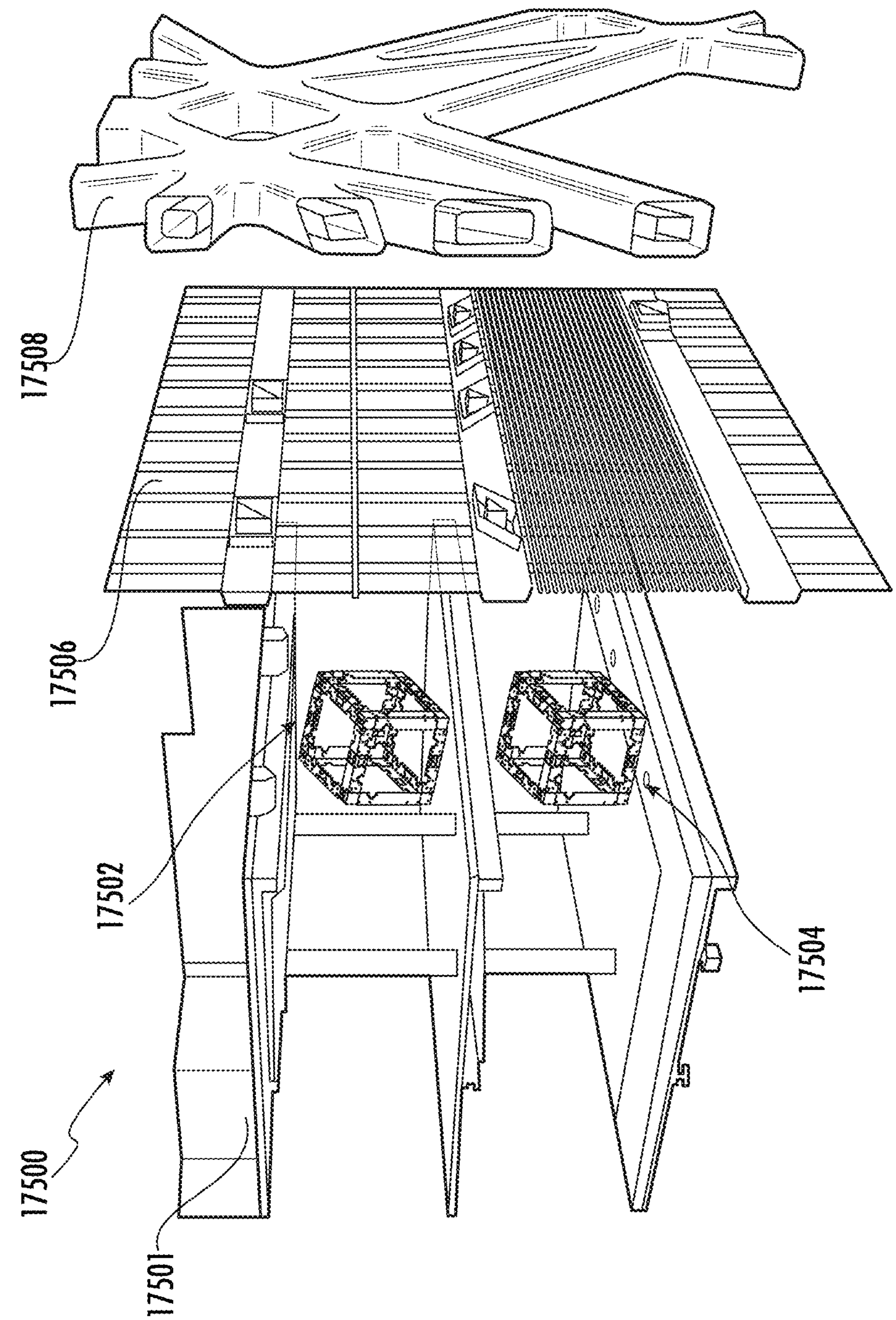

FIG. 175 illustrates an exploded view of an example superstructure with dampeners for self-locking smart racks in accordance with some embodiments of the present disclosure.

Figure 176:
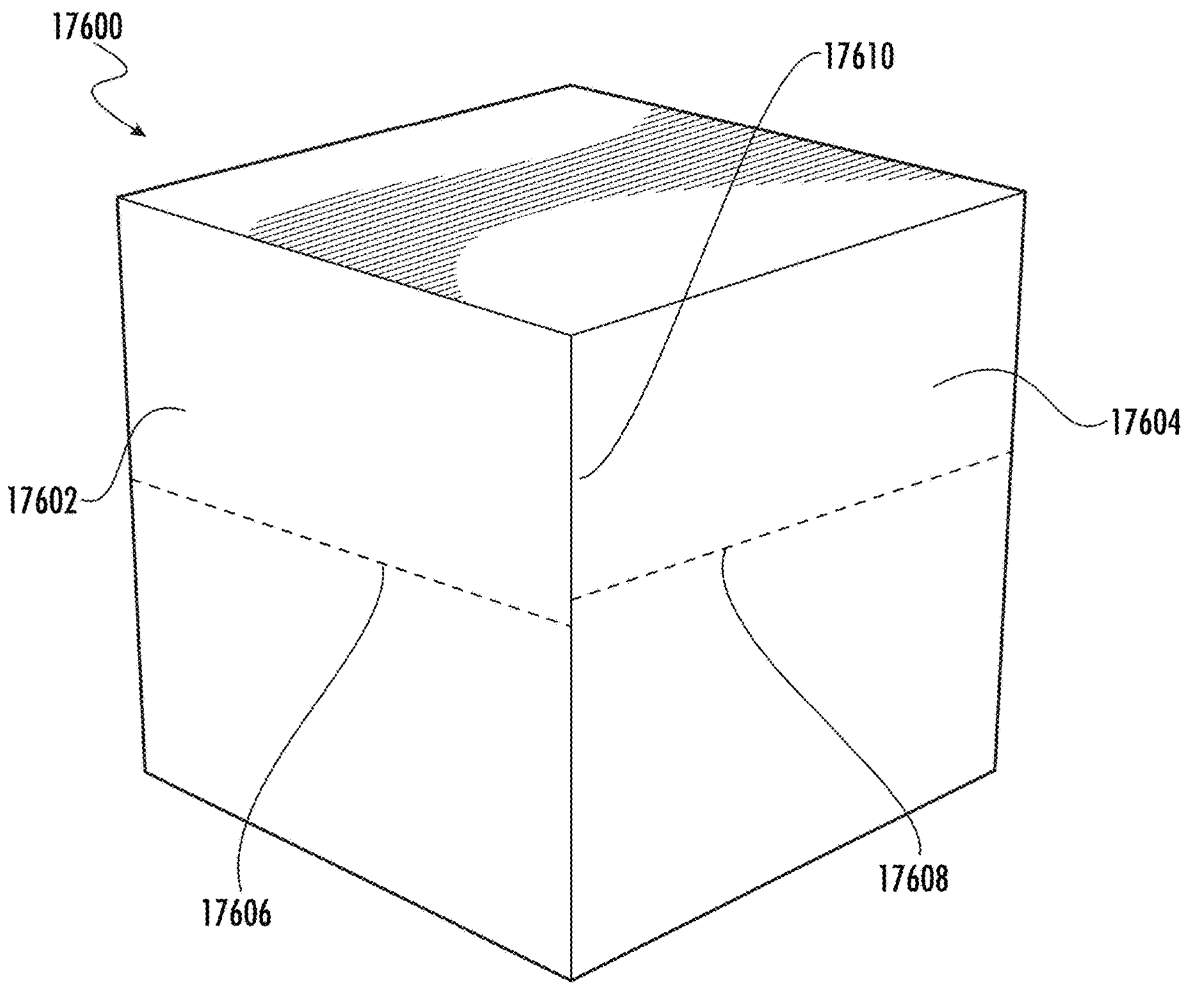

FIG. 176 illustrates a perspective view of an example collapsible tote in accordance with some embodiments of the present disclosure.

Figure 177:
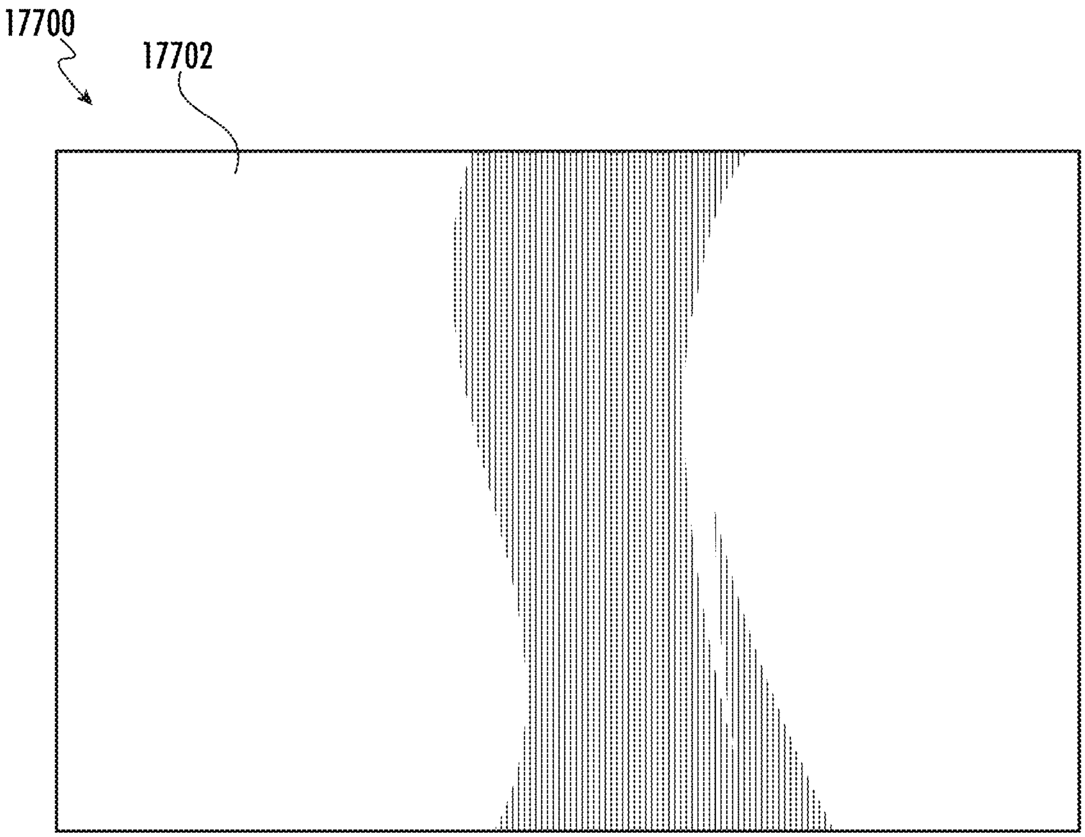

FIG. 177 illustrates a first top plan view of an example tote for self-locking smart racks in accordance with some embodiments of the present disclosure.

Figure 178:
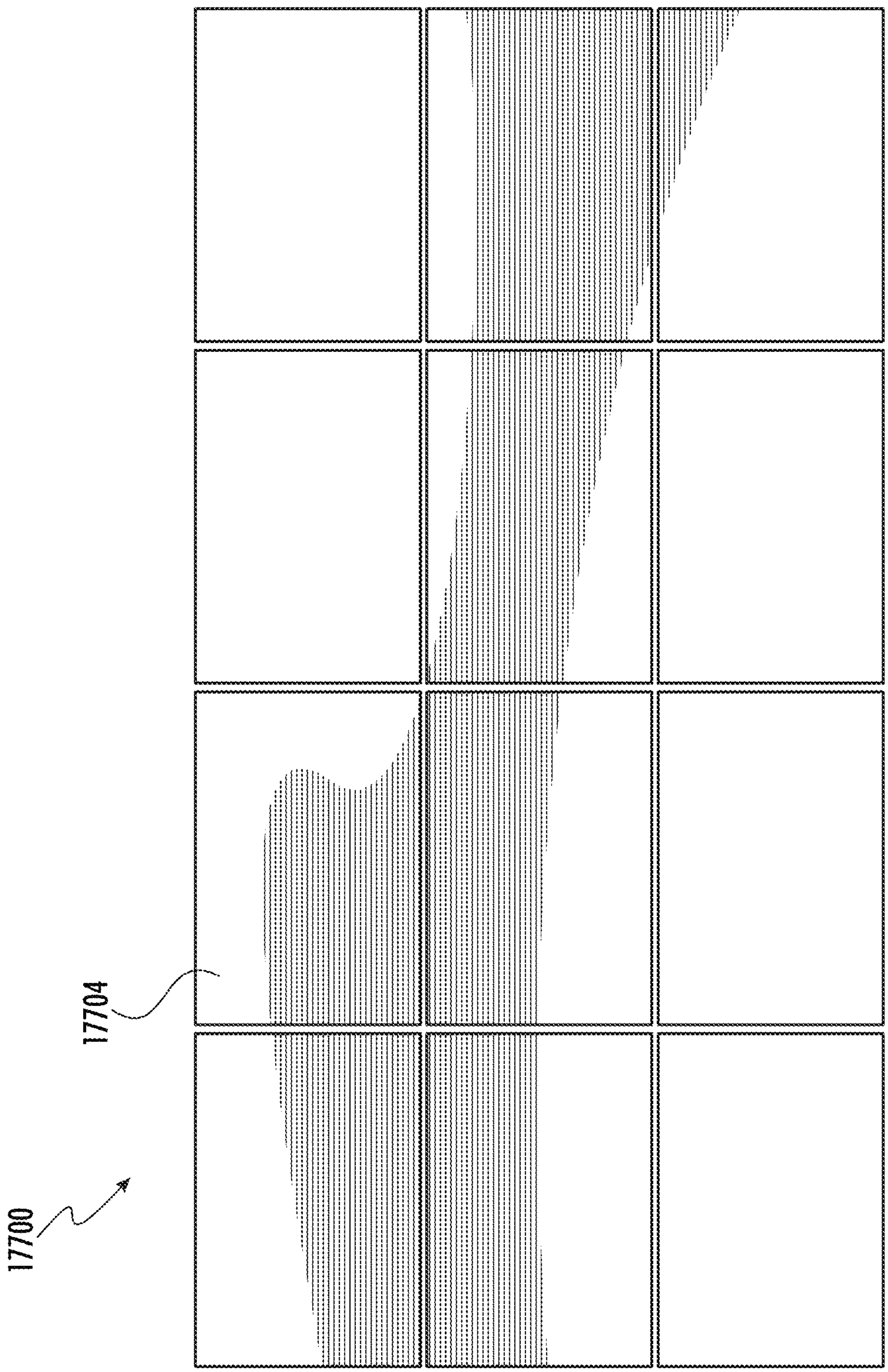

FIG. 178 illustrates a second top plan view of an example tote for self-locking smart racks in accordance with some embodiments of the present disclosure.

Figure 179:
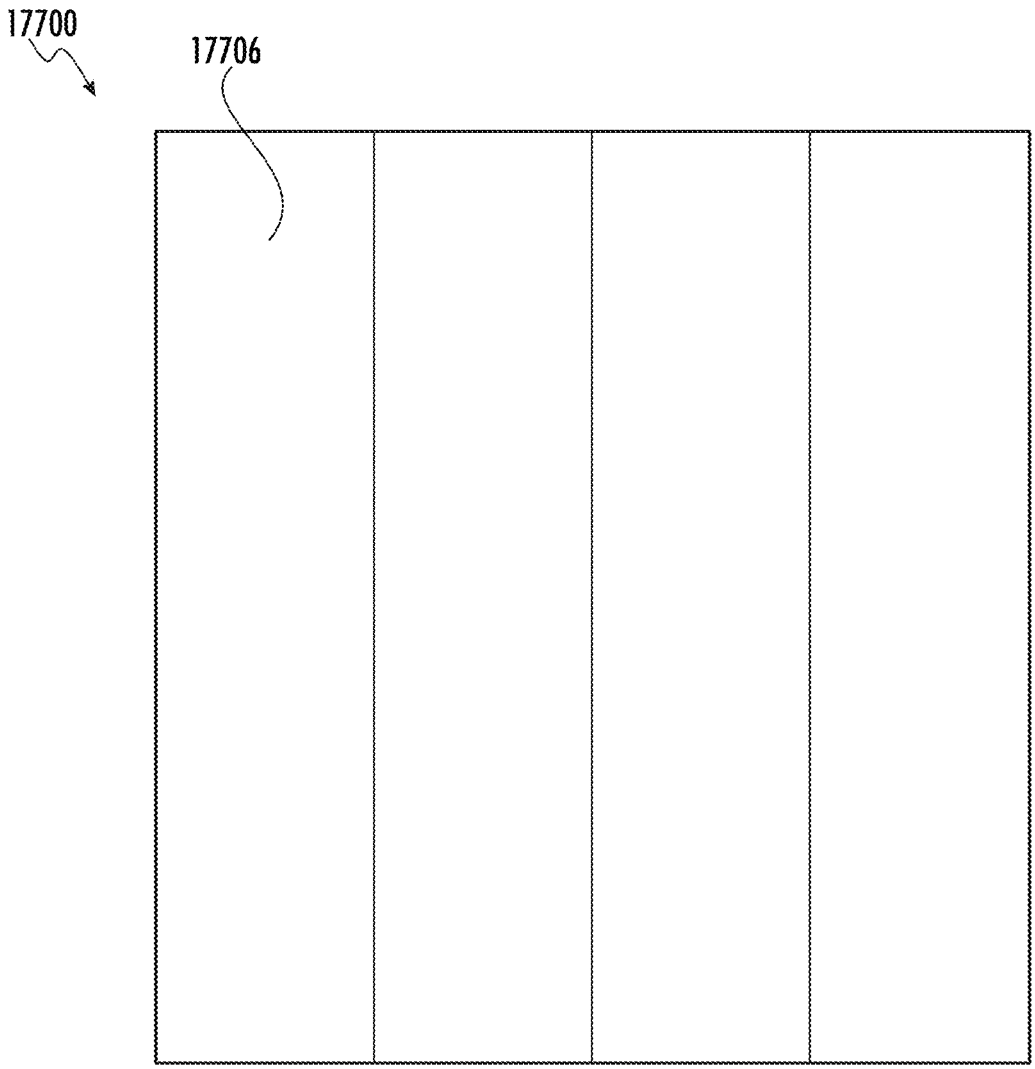

FIG. 179 illustrates a third top plan view of an example tote for self-locking smart racks in accordance with some embodiments of the present disclosure.

Figure 180:
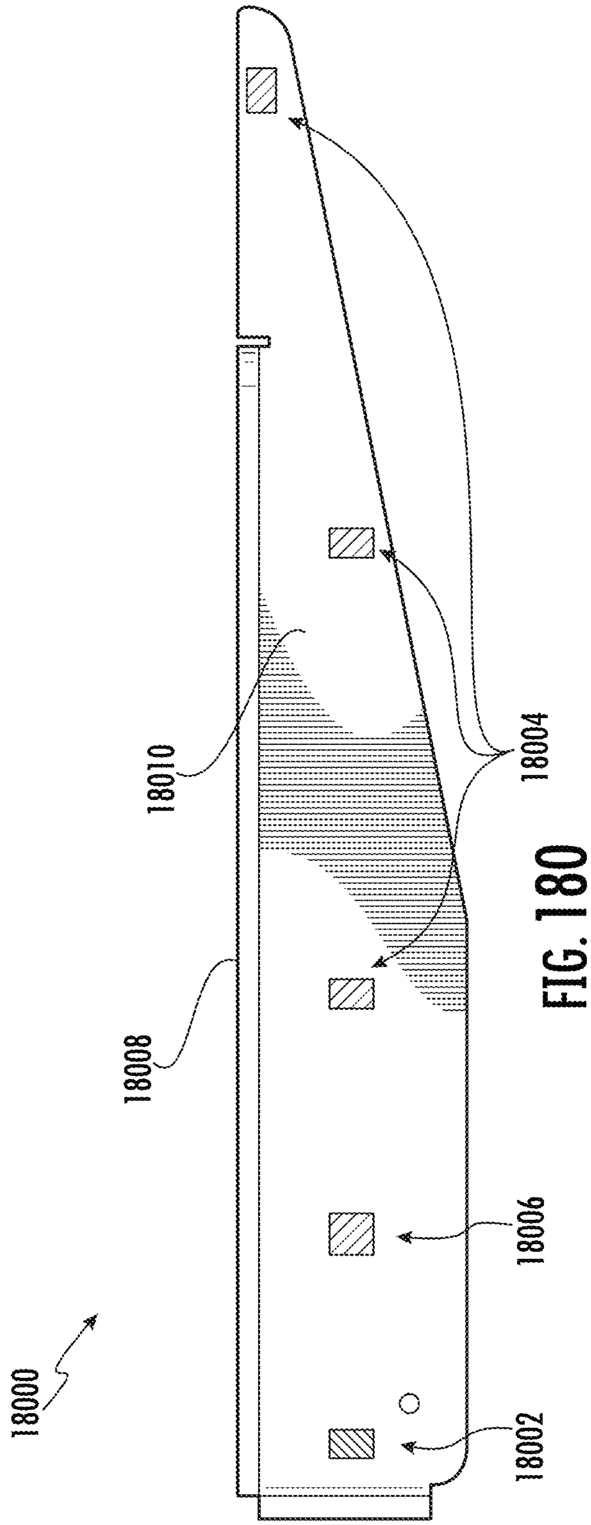

FIG. 180 illustrates a top plan view for a smart arm for self-locking smart racks in accordance with some embodiments of the present disclosure.

Figure 181:
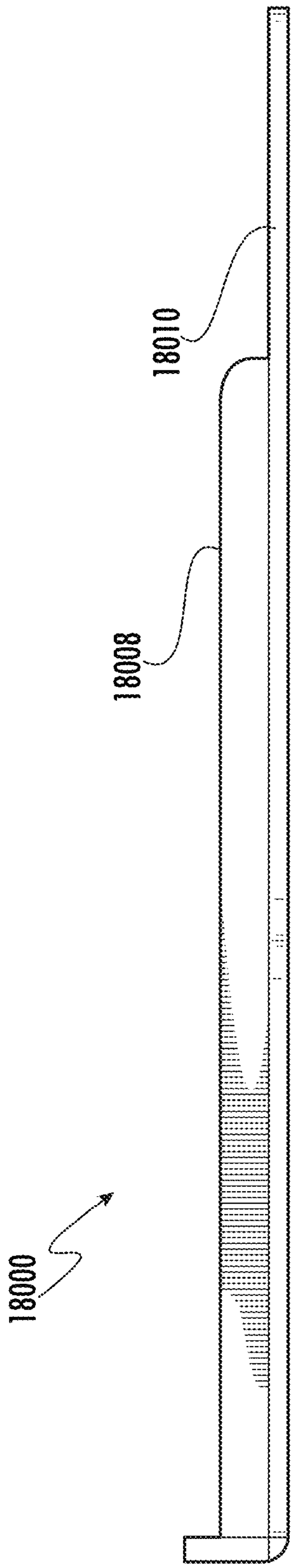

FIG. 181 illustrates an elevation side view for a smart arm for self-locking smart racks in accordance with some embodiments of the present disclosure.

Figure 182:
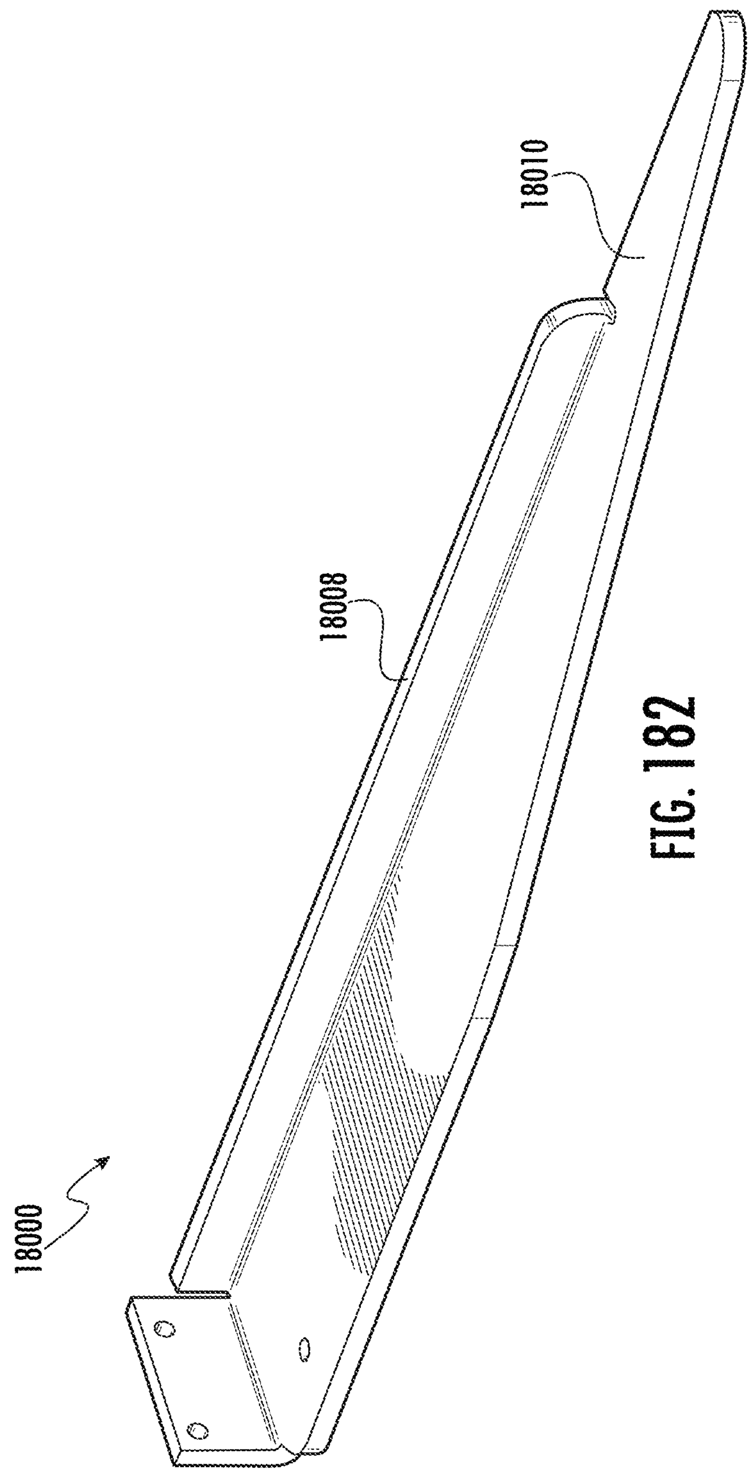

FIG. 182 illustrates a perspective view of an example smart arm for self-locking smart racks in accordance with some embodiments of the present disclosure.

Figure 183:
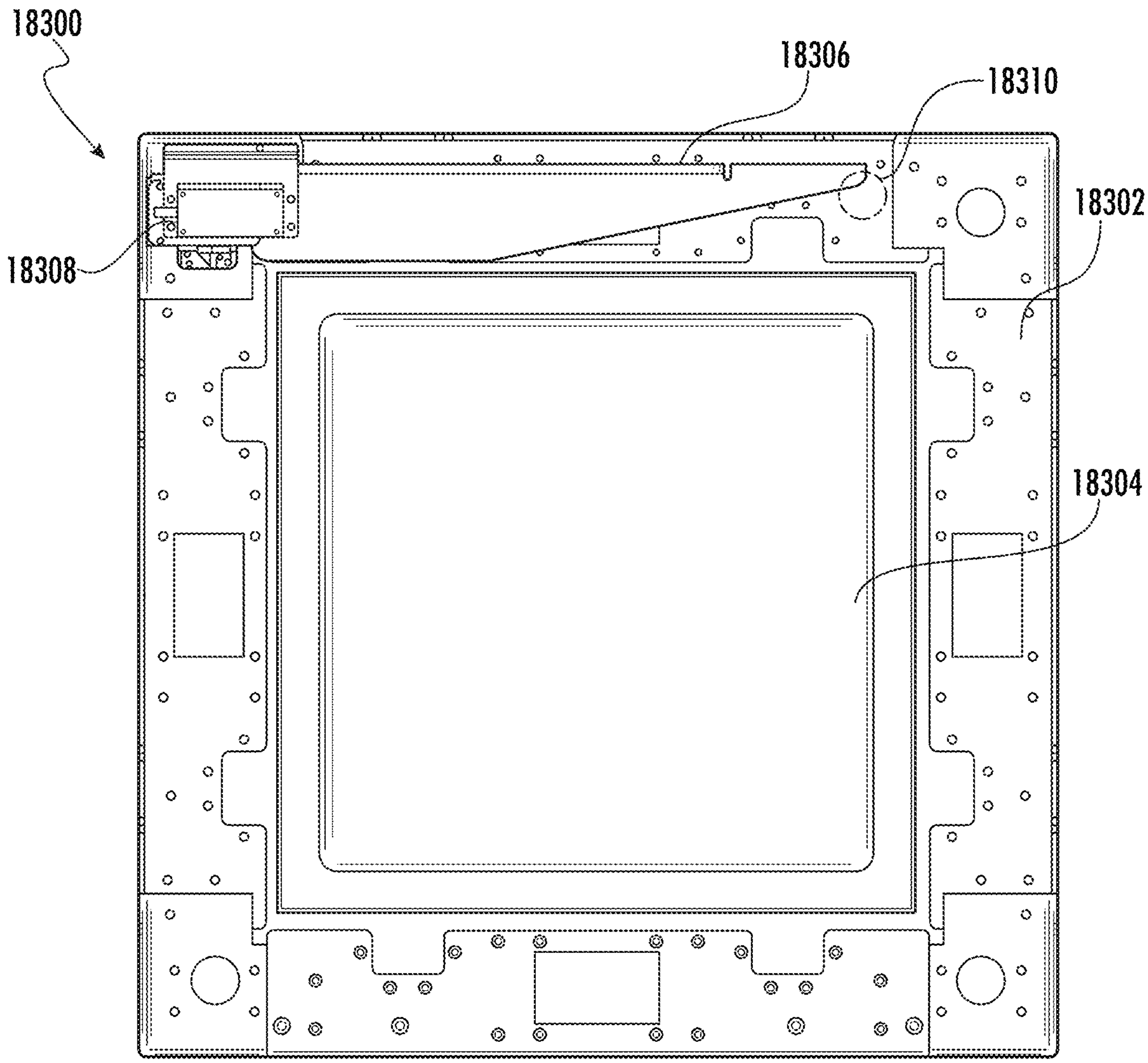

FIG. 183 illustrates a top plan view of an example smart rack with arm lateral roller in accordance with some embodiments of the present disclosure.

Figure 184:
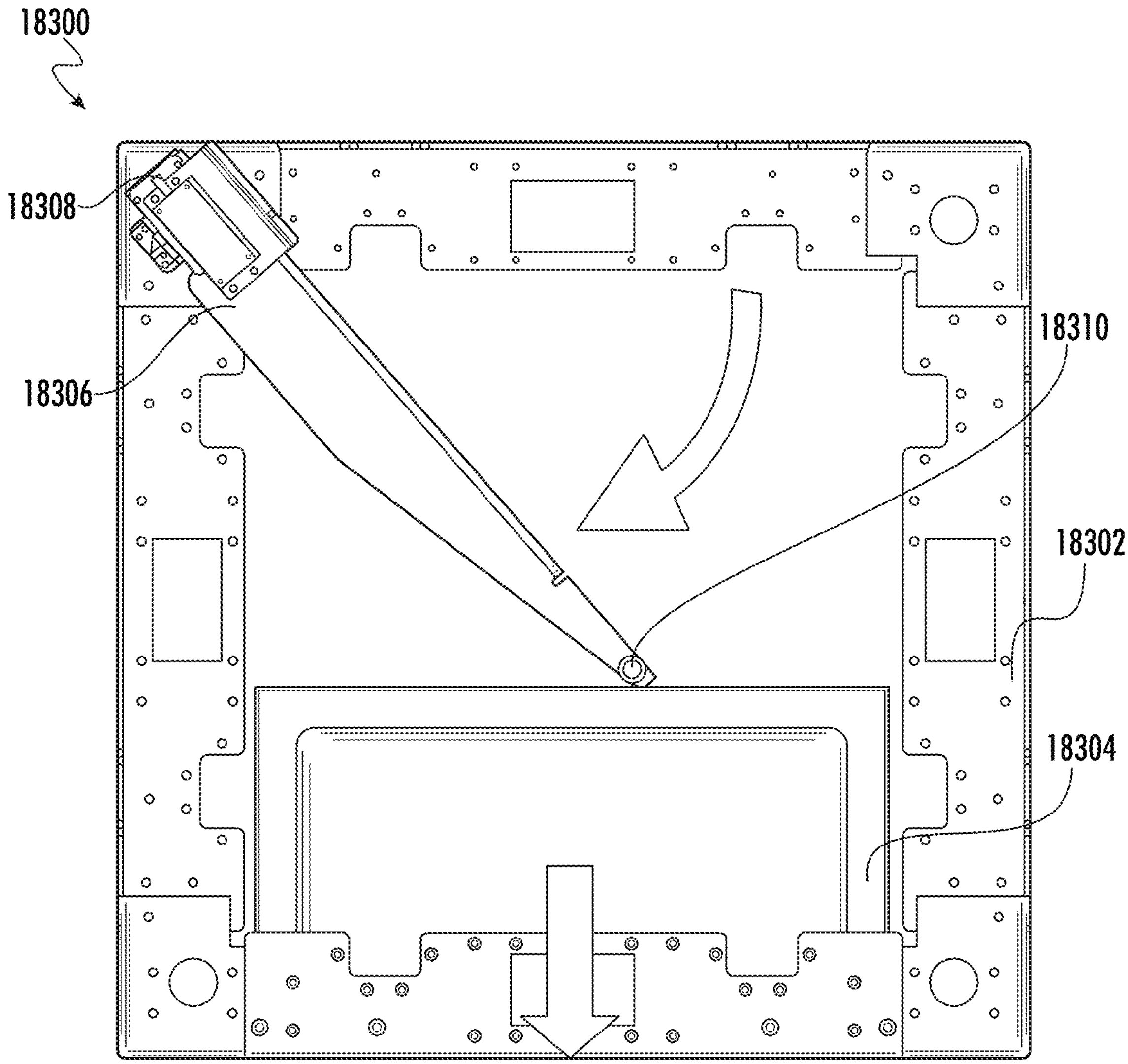

FIG. 184 illustrates a top plan view of an example smart rack with arm lateral roller in accordance with some embodiments of the present disclosure.

Figure 185:
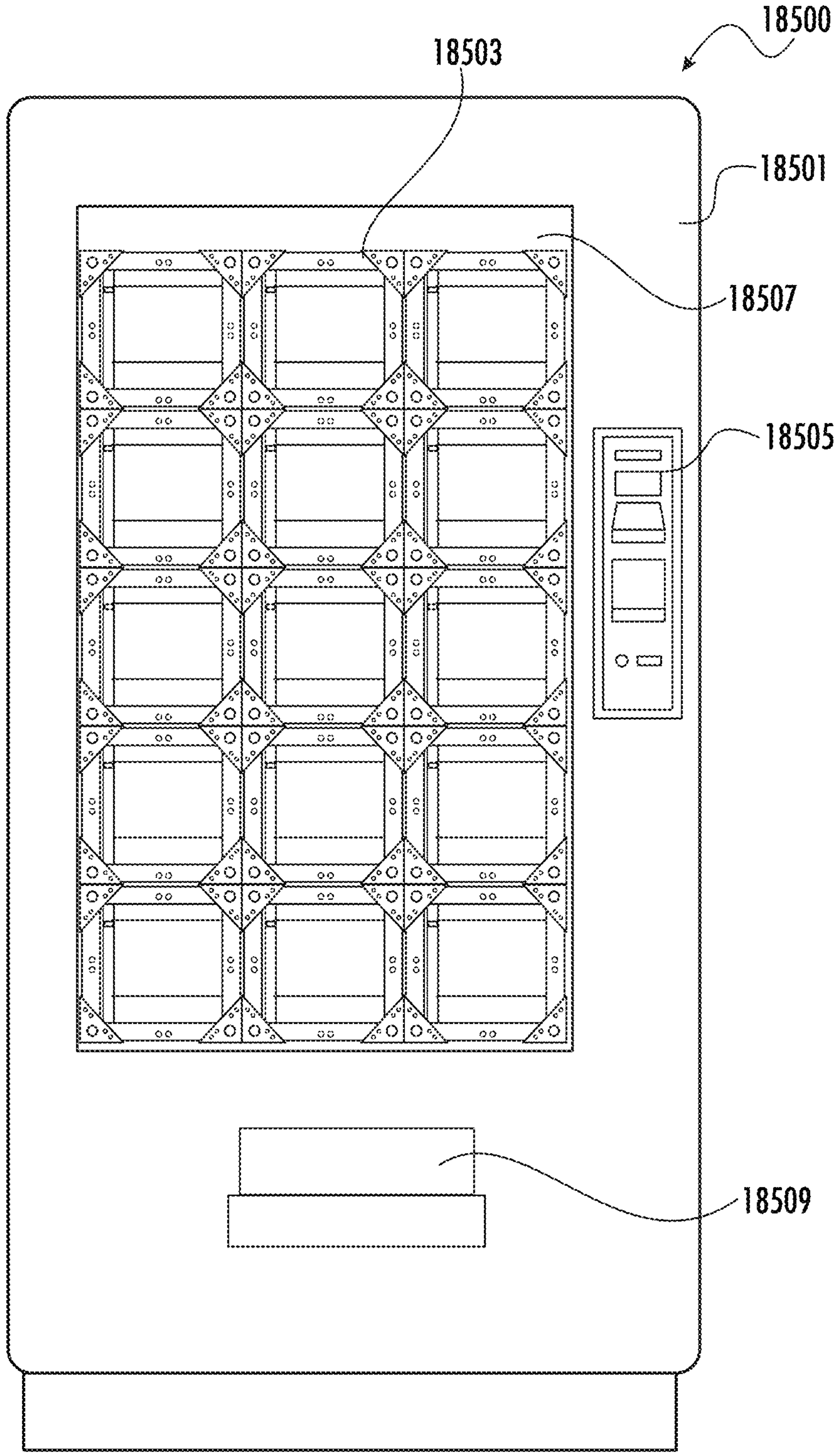

FIG. 185 illustrates an item retrieval apparatus in accordance with some embodiments of the present disclosure.

Figure 186:
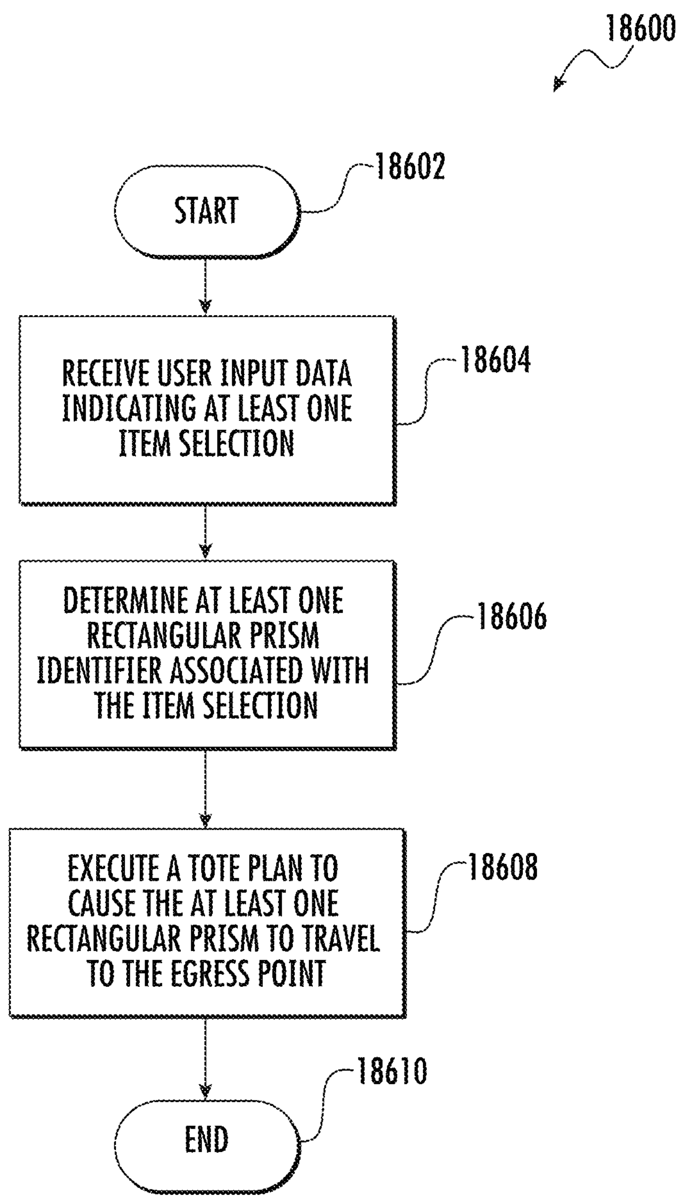

FIG. 186 illustrates an example method that may be executed by an example item retrieval apparatus in accordance with some embodiments of the present disclosure.

Figure 187:
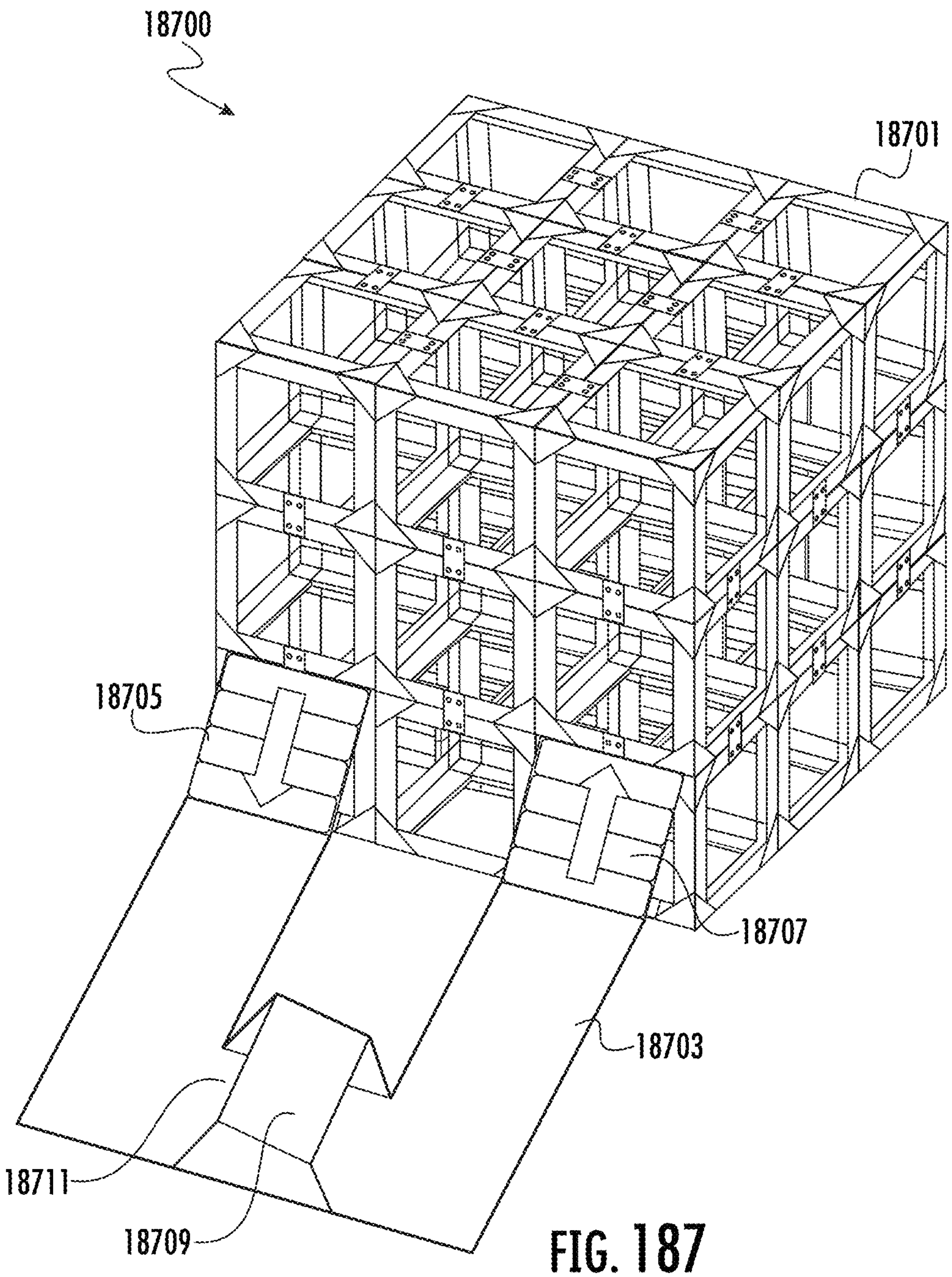

FIG. 187 illustrates an example rectangular prism sanitation system in accordance with some embodiments of the present disclosure.

Figure 188:
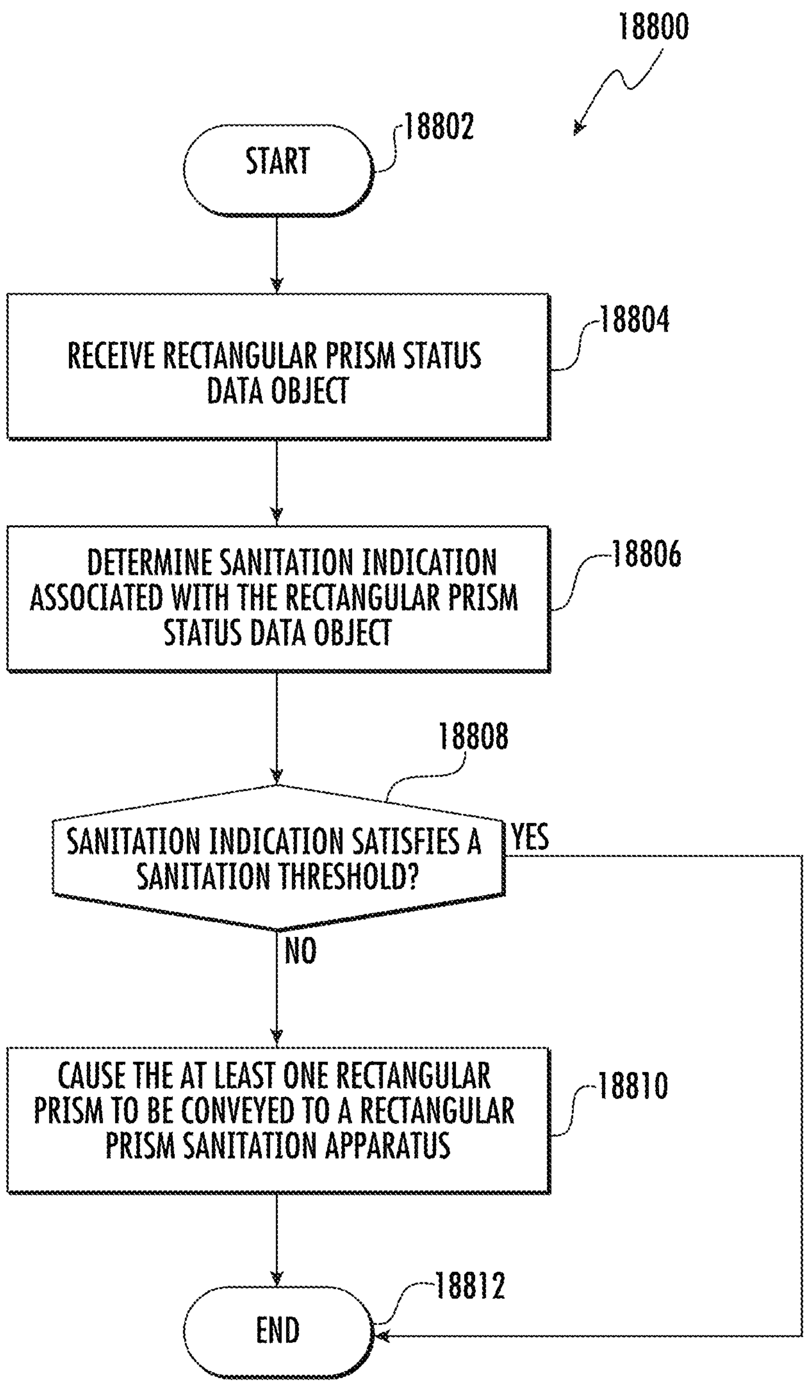

FIG. 188 illustrates an example method that may be executed by a rectangular prism sanitation system in accordance with some embodiments of the present disclosure.

Figure 189:
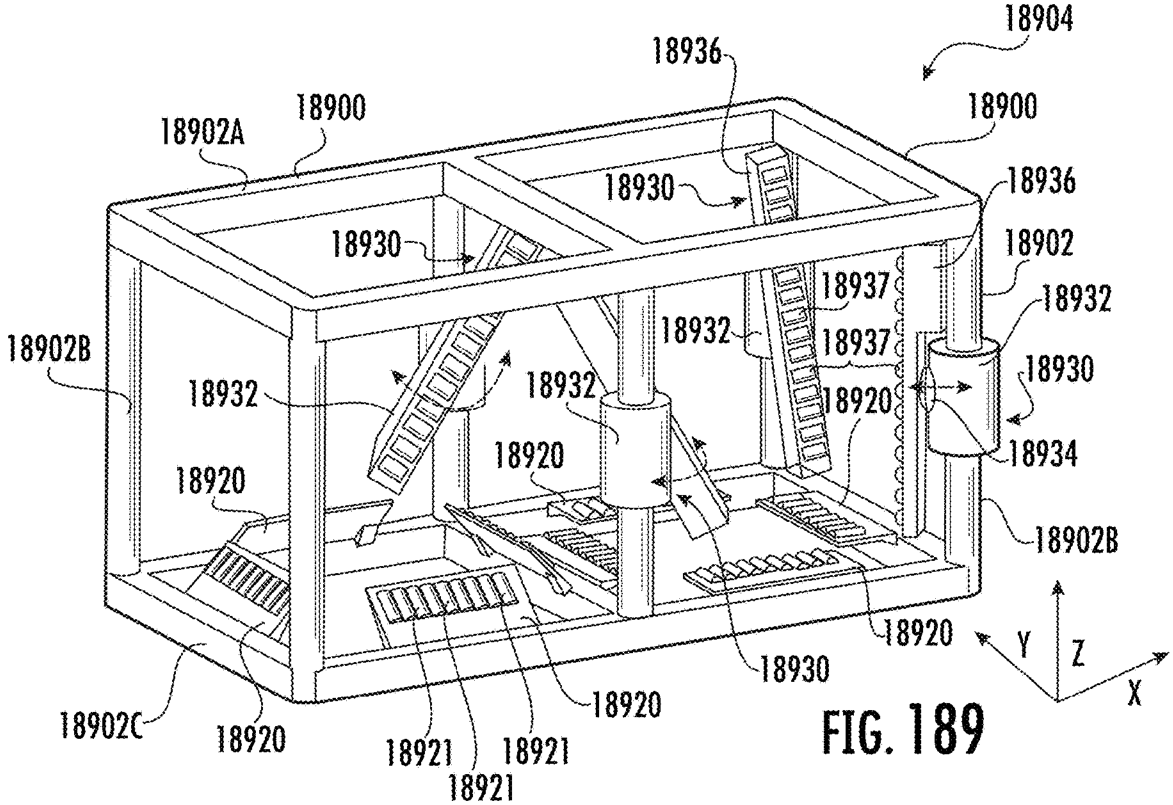

FIG. 189 illustrates a modular superstructure, in accordance with some embodiments of the present disclosure.

Figure 190:
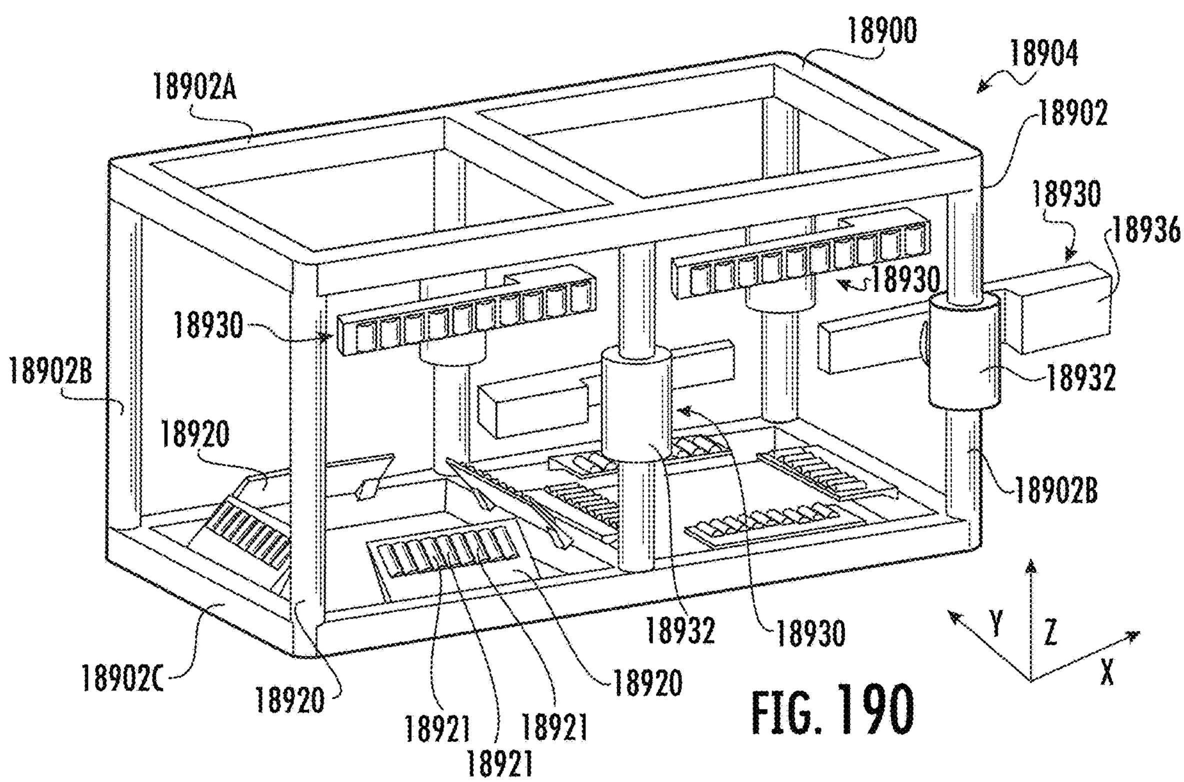

FIG. 190 illustrates the modular superstructure of FIG. 189, in accordance with some embodiments of the present disclosure.

Figure 191:
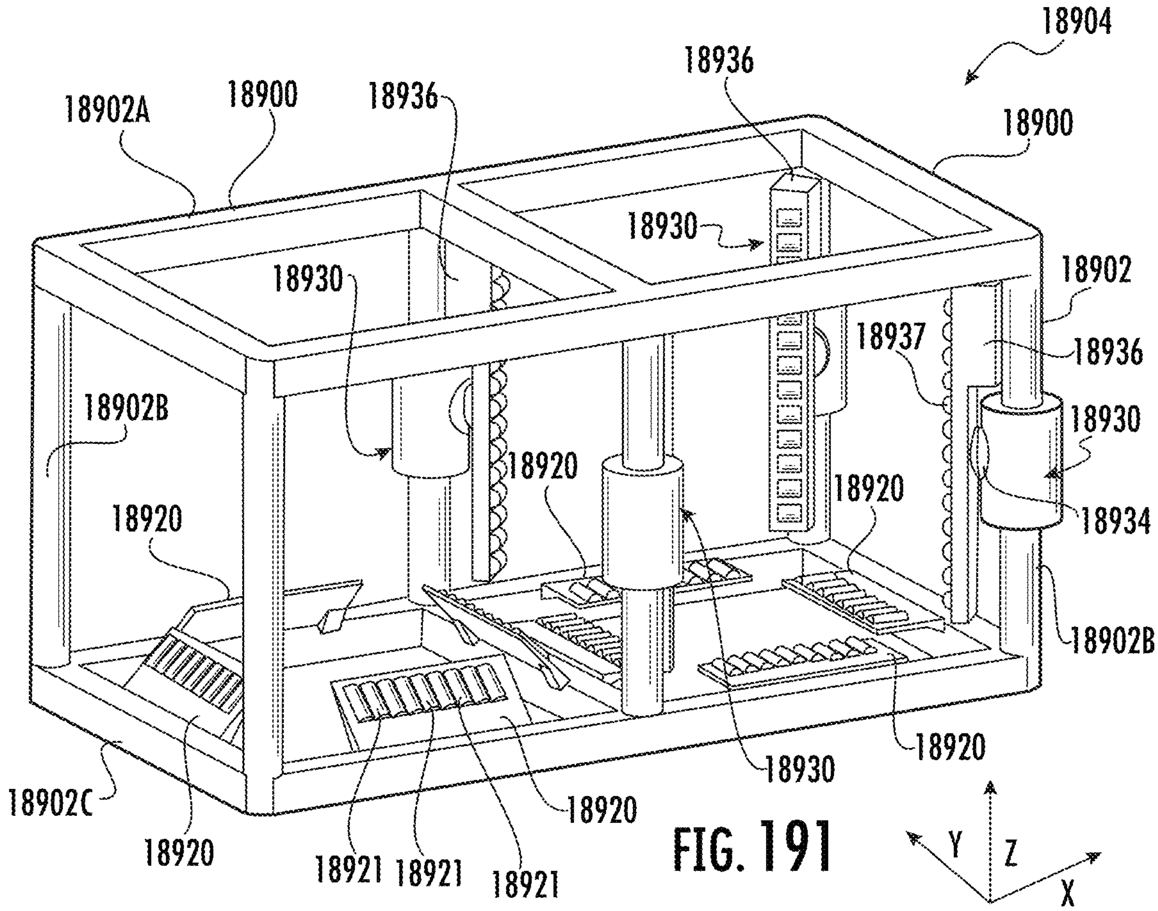

FIG. 191 illustrates the modular superstructure of FIG. 189, in accordance with some embodiments of the present disclosure.

Figure 192:
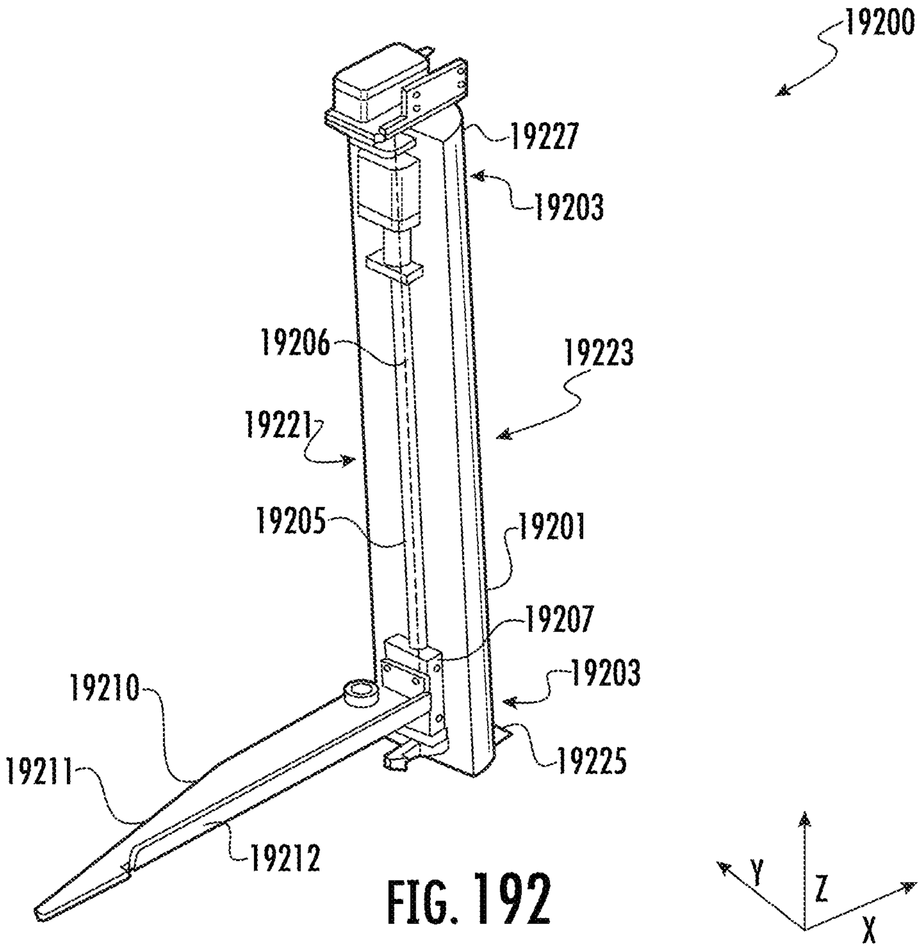

FIG. 192 illustrates a rack actuator, in accordance with some embodiments of the present disclosure.

Figure 193:
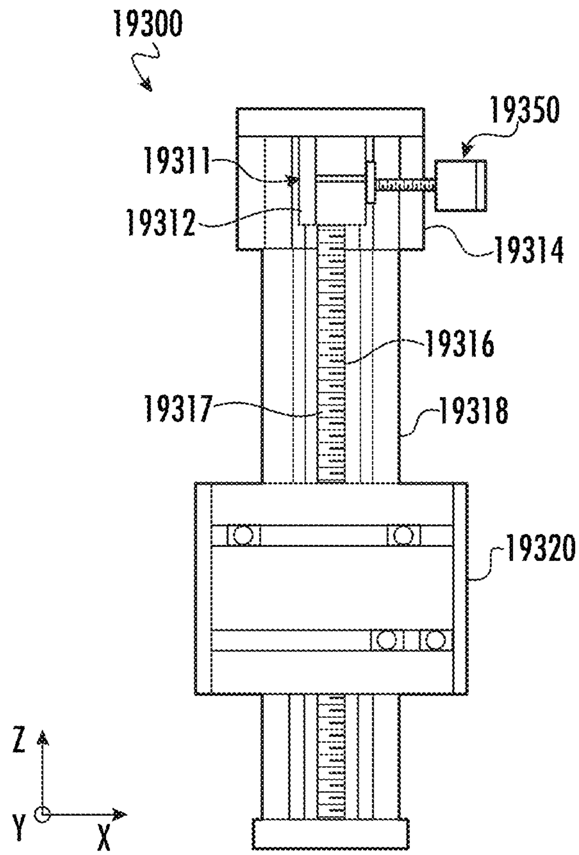

FIG. 193 illustrates a side-view of a linear actuator assembly, in accordance with some embodiments of the present disclosure.

Figure 194:
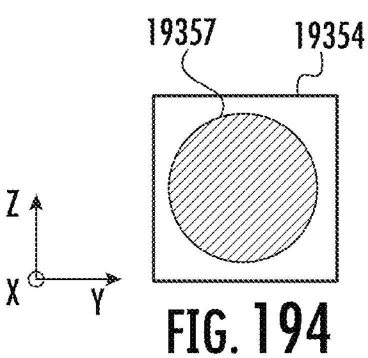

FIG. 194 illustrates a side-view of a motor brake assembly, in accordance with some embodiments of the present disclosure.

Figure 195:
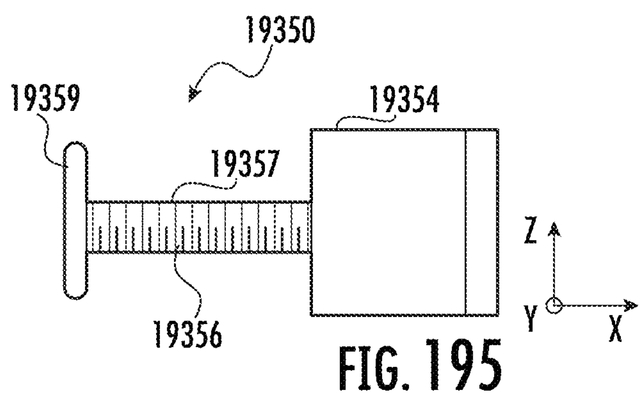

FIG. 195 illustrates a side-view of the motor brake assembly of FIG. 194, in accordance with some embodiments of the present disclosure.

Figure 196:
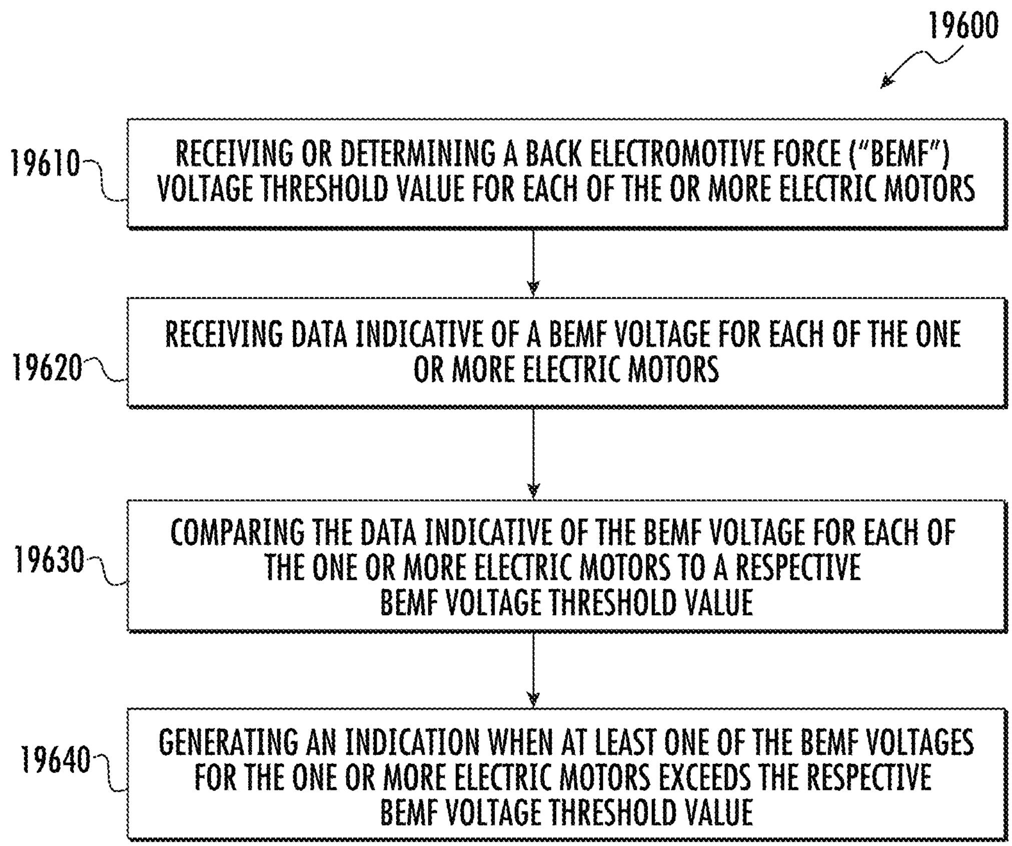

FIG. 196 illustrates a flowchart of a method for monitoring a health of one or more electric motors, in accordance with some embodiments of the present disclosure.

Figure 197:
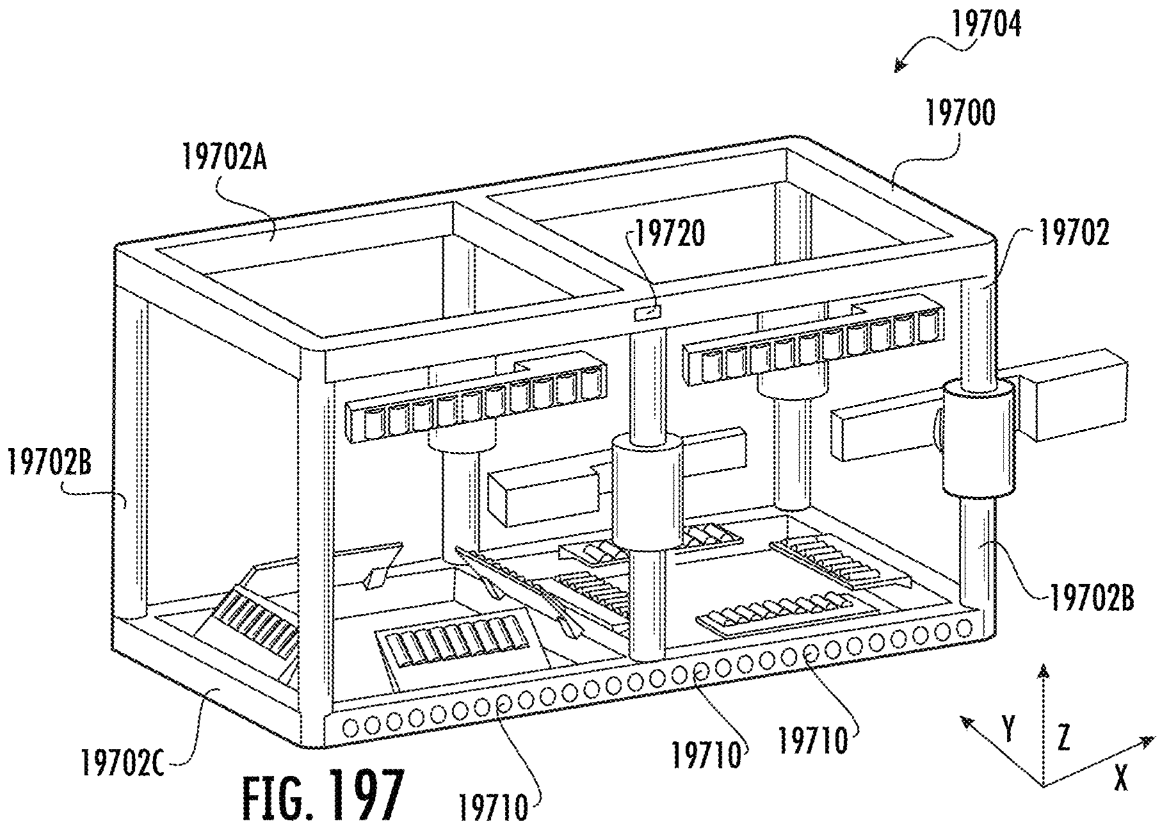

FIG. 197 illustrates a modular superstructure, in accordance with some embodiments of the present disclosure.

Figure 198:
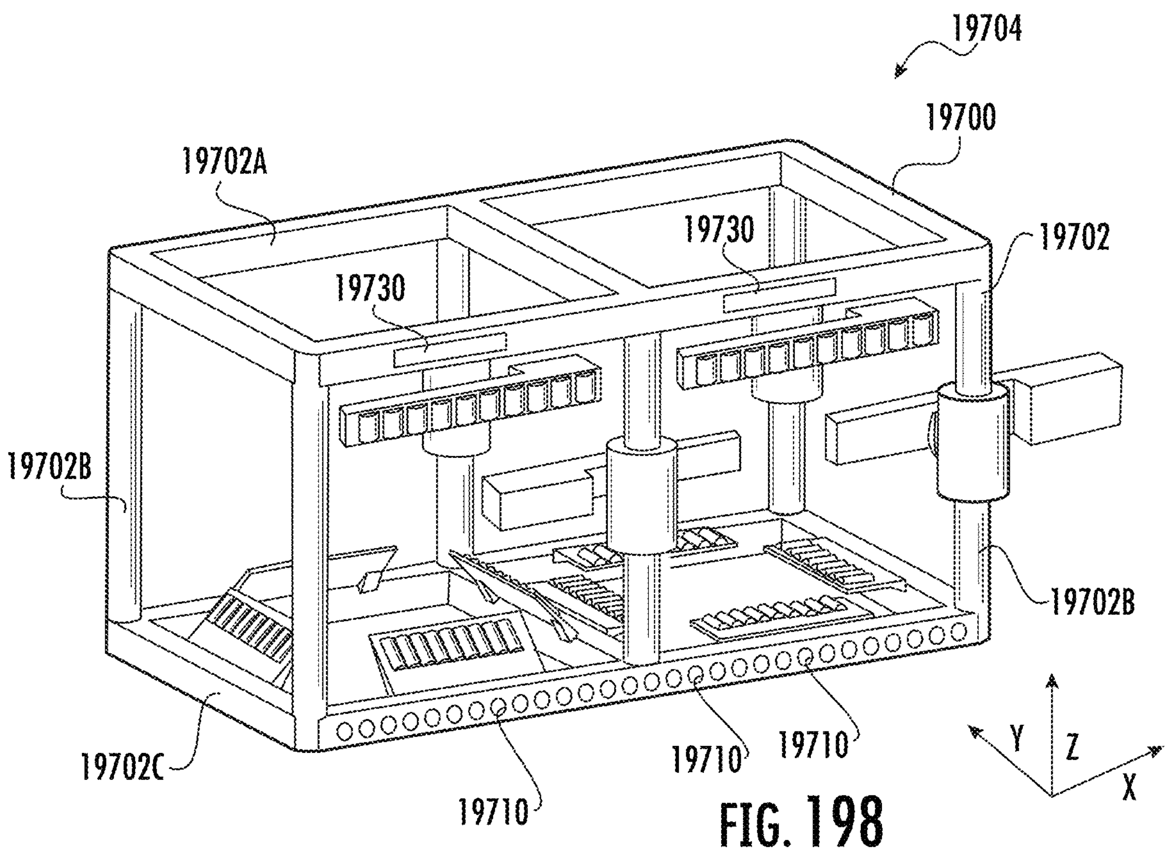

FIG. 198 illustrates a modular superstructure, in accordance with some embodiments of the present disclosure.

Figure 199:
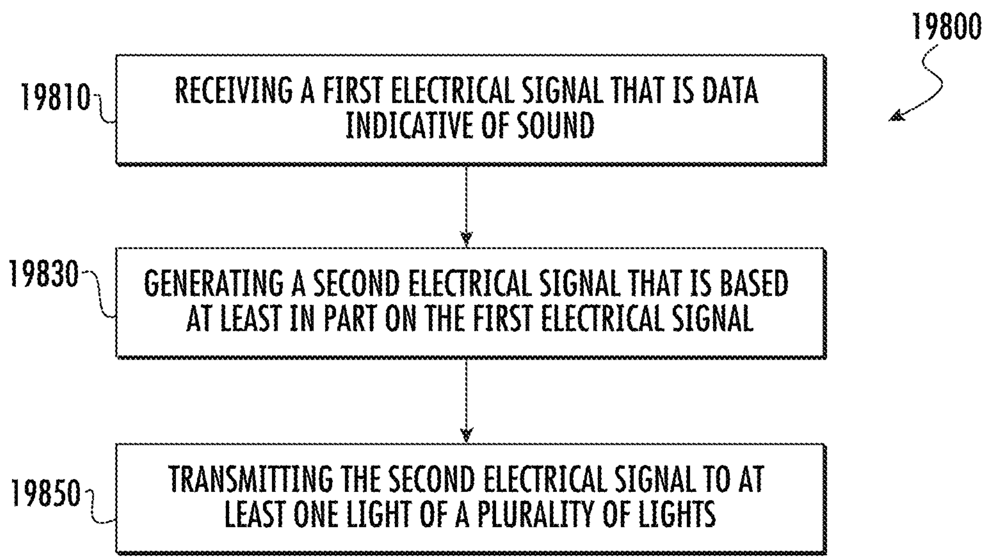

FIG. 199 illustrates a flowchart of a method for controlling one or more lights of modular superstructure of FIG. 197 or FIG. 198, in accordance with some embodiments of the present disclosure.

Figure 200:
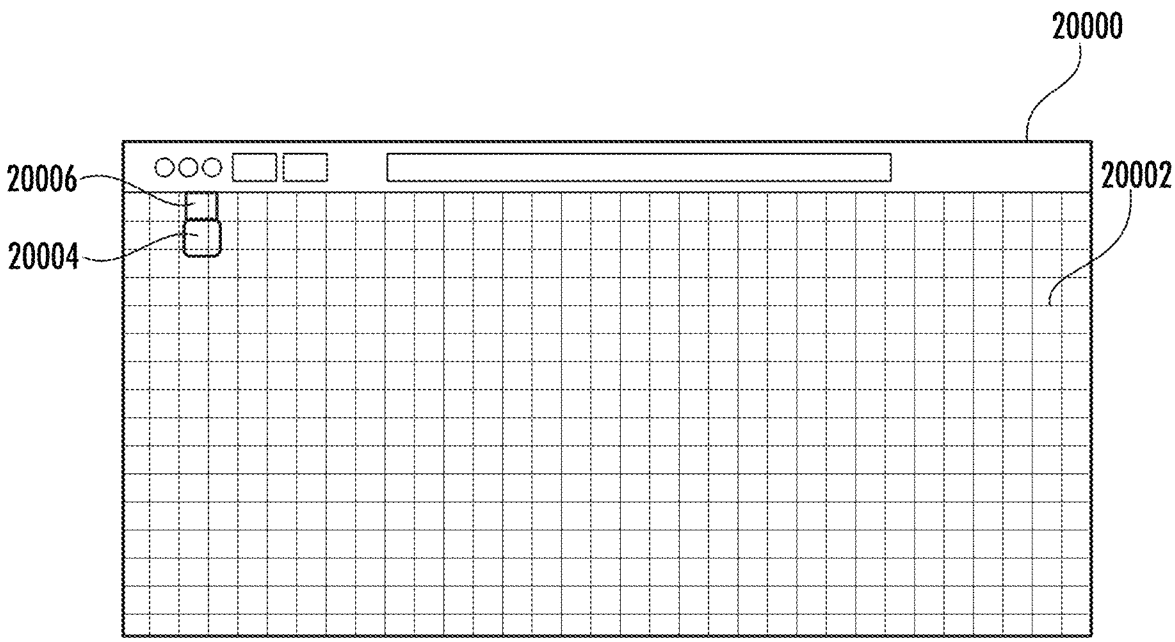

FIG. 200 illustrates a program view of an example 2D environment in accordance with some embodiments of the present disclosure.

Figure 201:
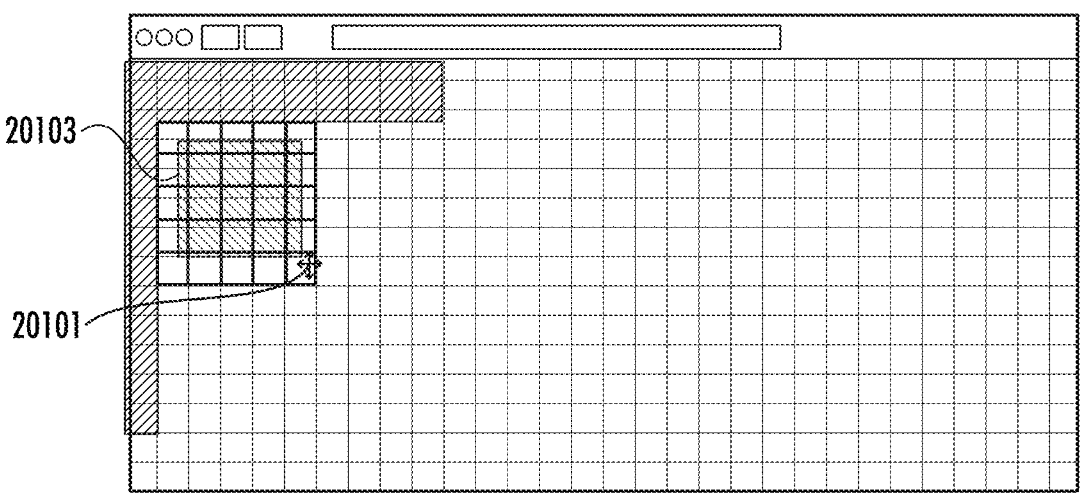

FIG. 201 illustrates a program view of an example 2D environment for building objects in accordance with some embodiments of the present disclosure.

Figure 202:
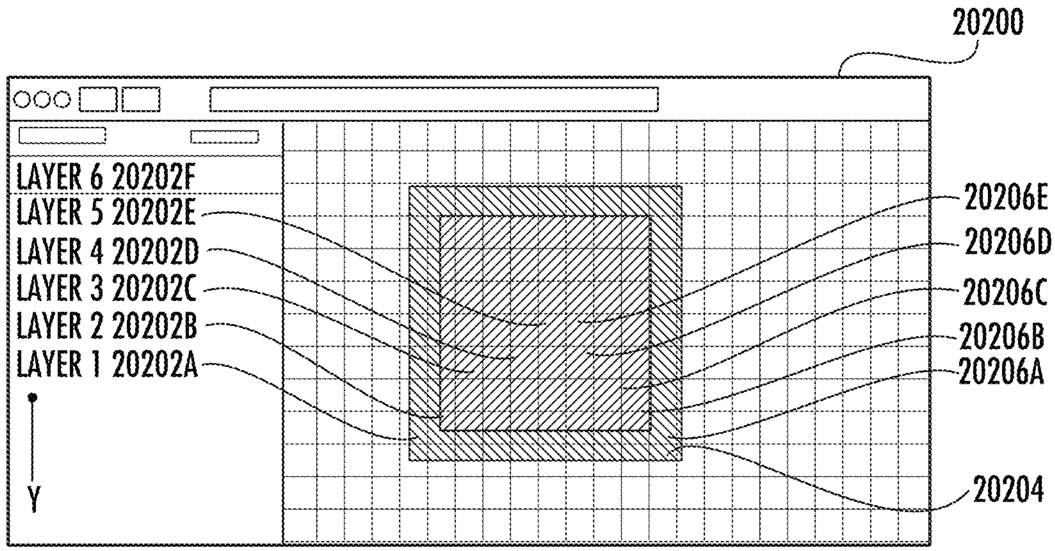

FIG. 202 illustrates a program view of an example 2D environment for managing depth in accordance with some embodiments of the present disclosure.

Figure 203:
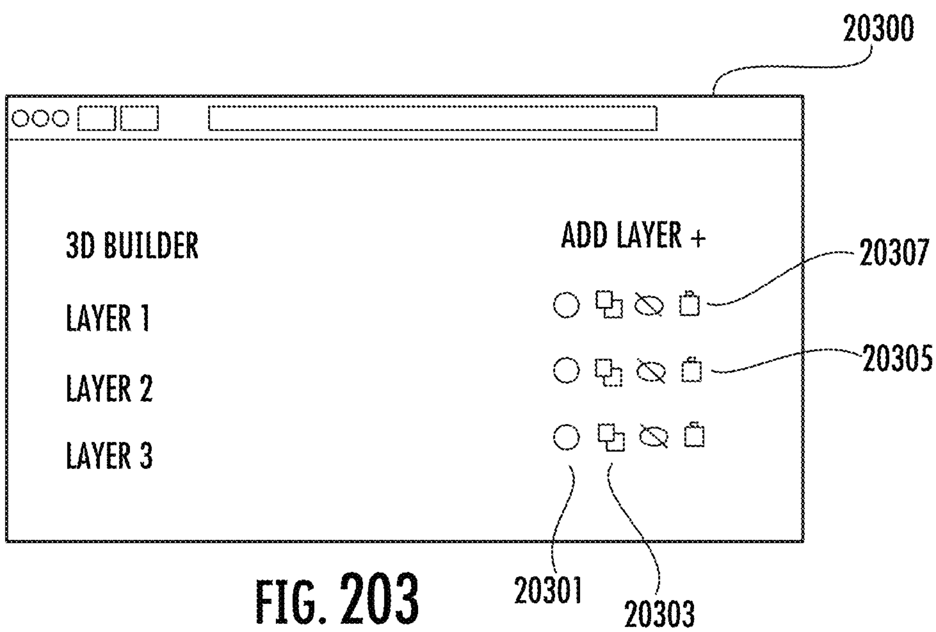

FIG. 203 illustrates a program view of an example 2D environment for layer management in accordance with some embodiments of the present disclosure.

Figure 204:
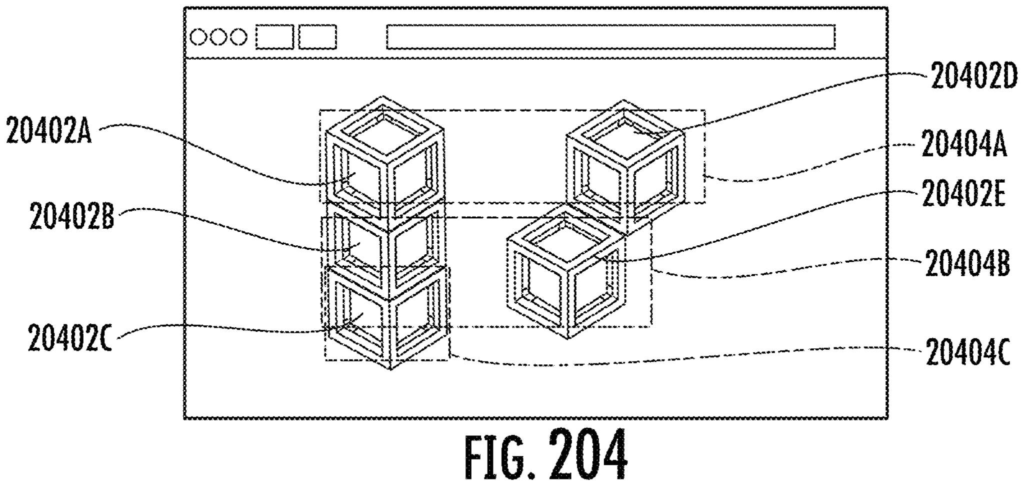

FIG. 204 illustrates a program view of an example 3D visualization in accordance with some embodiments of the present disclosure.

Figure 205:
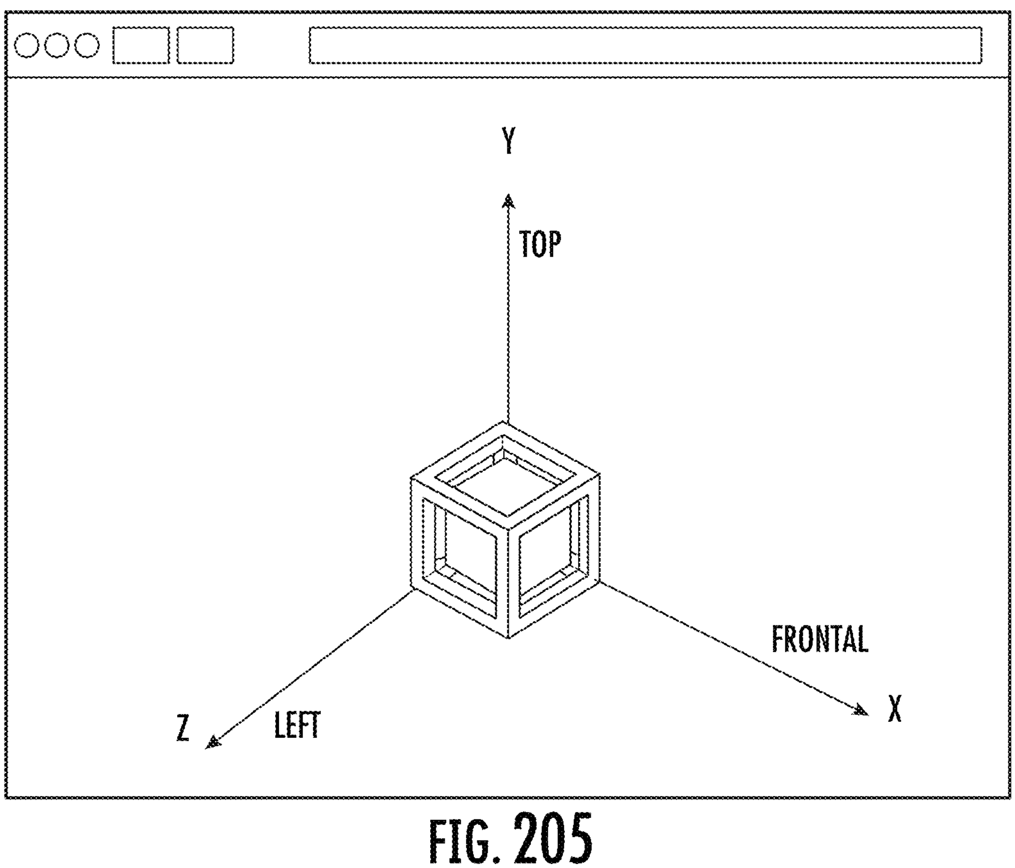

FIG. 205 illustrates an isometric view of an example 3D object in accordance with some embodiments of the present disclosure.

Figure 206:
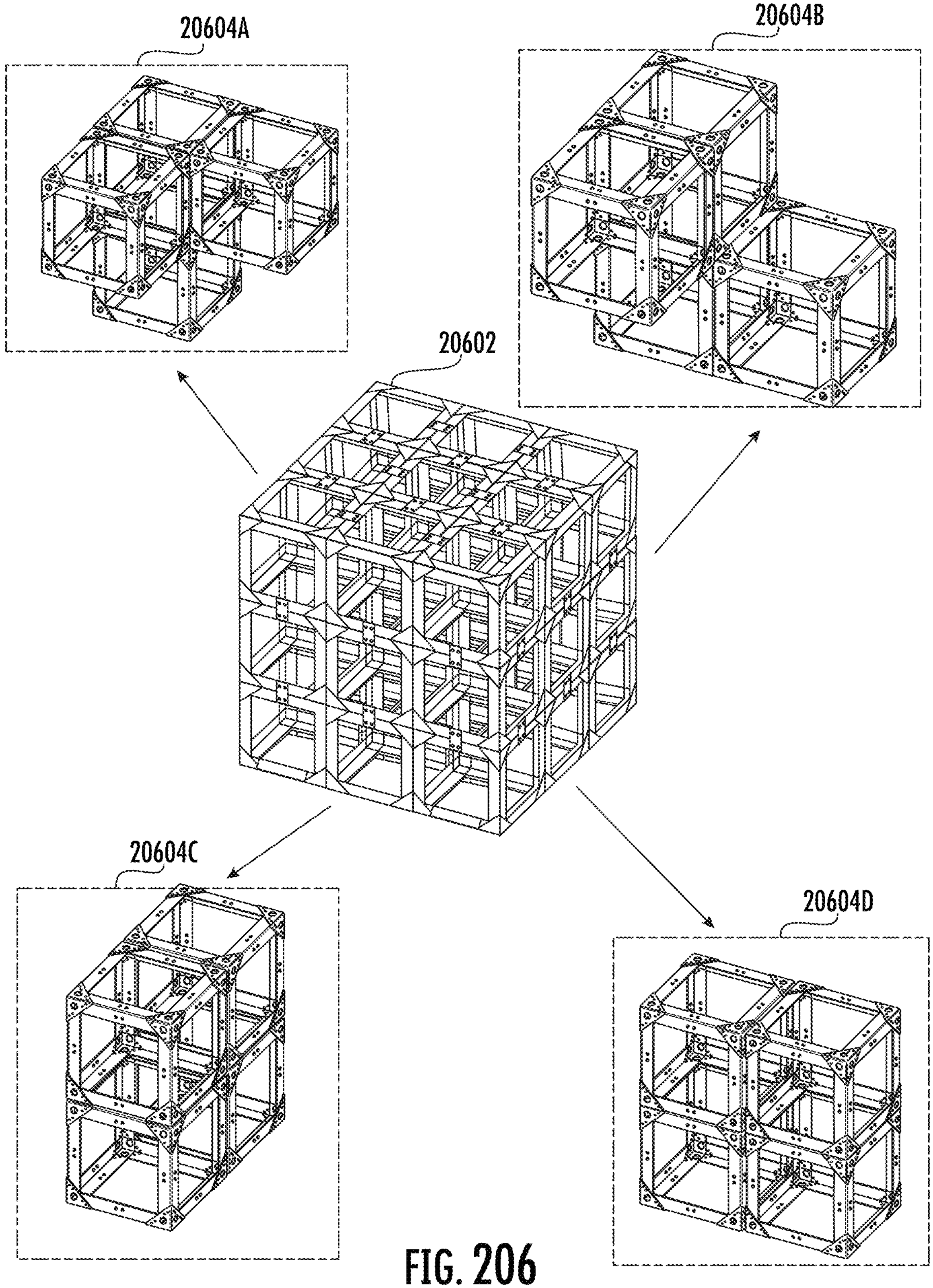

FIG. 206 illustrates example modular clusters associated with an example modular superstructure in accordance with some embodiments of the present disclosure.

Figure 207:
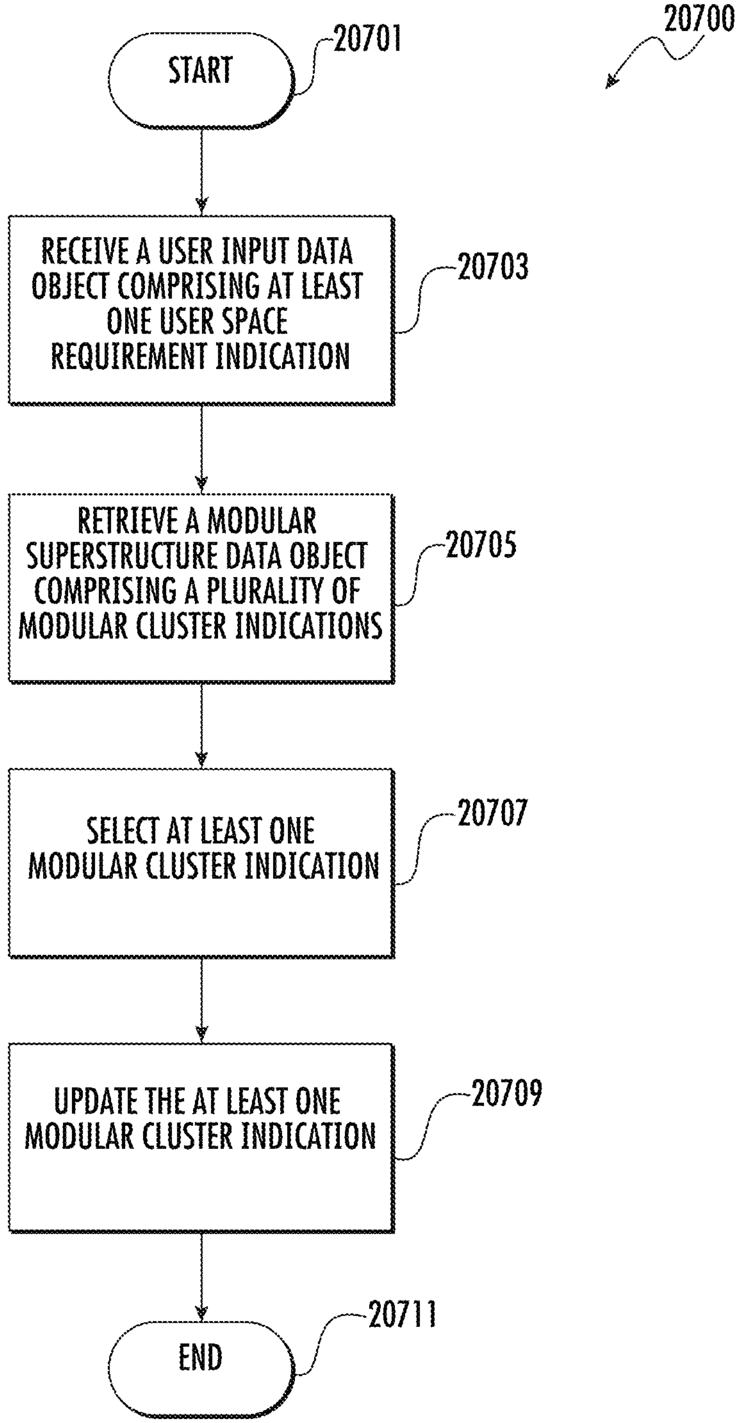

FIG. 207 illustrates an example method associated with an example modular superstructure that comprises modular clusters in accordance with some embodiments of the present disclosure.

Figure 208:
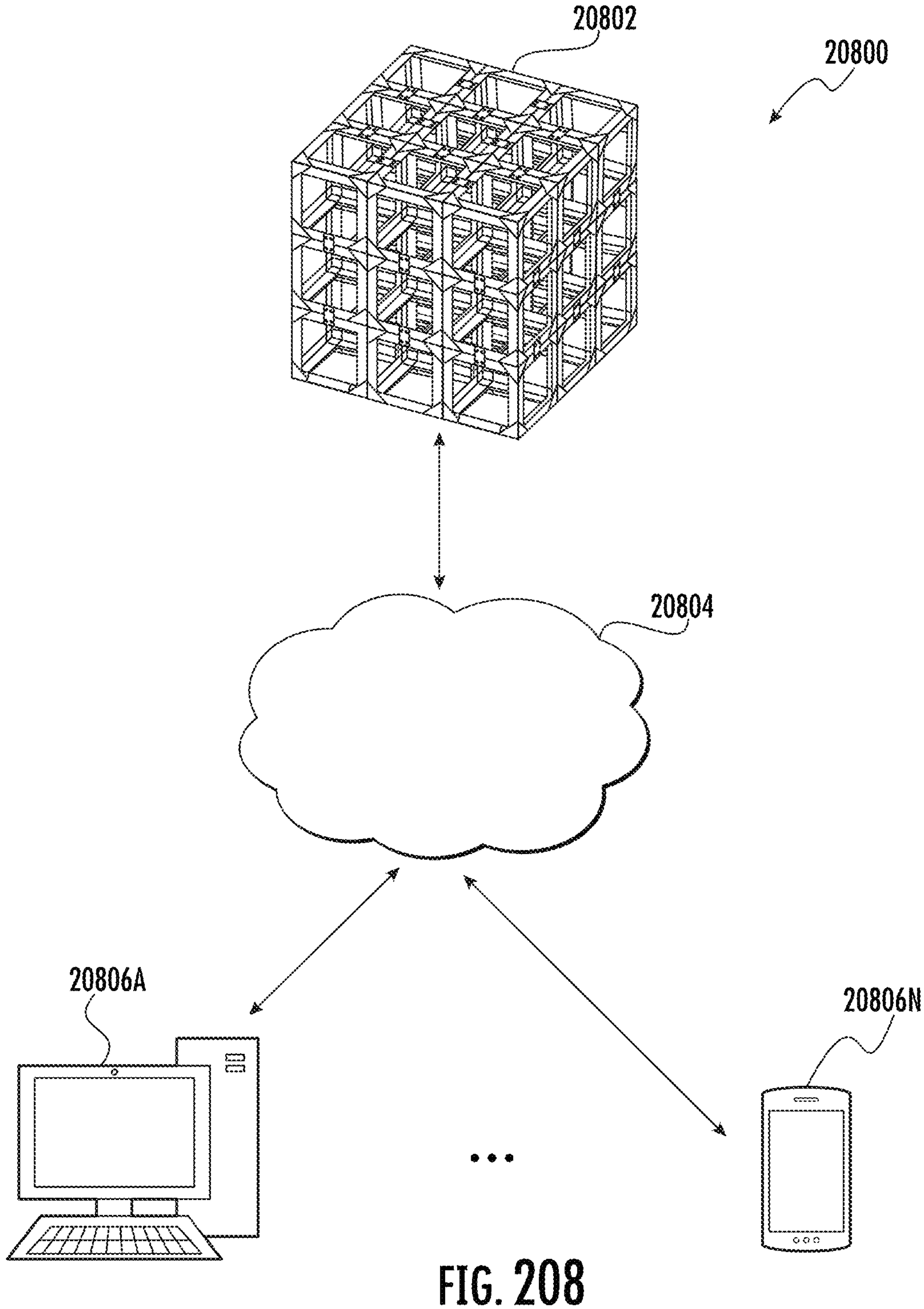

FIG. 208 illustrates an example smart rack configuration report generation system in accordance with some embodiments of the present disclosure.

Figure 209:
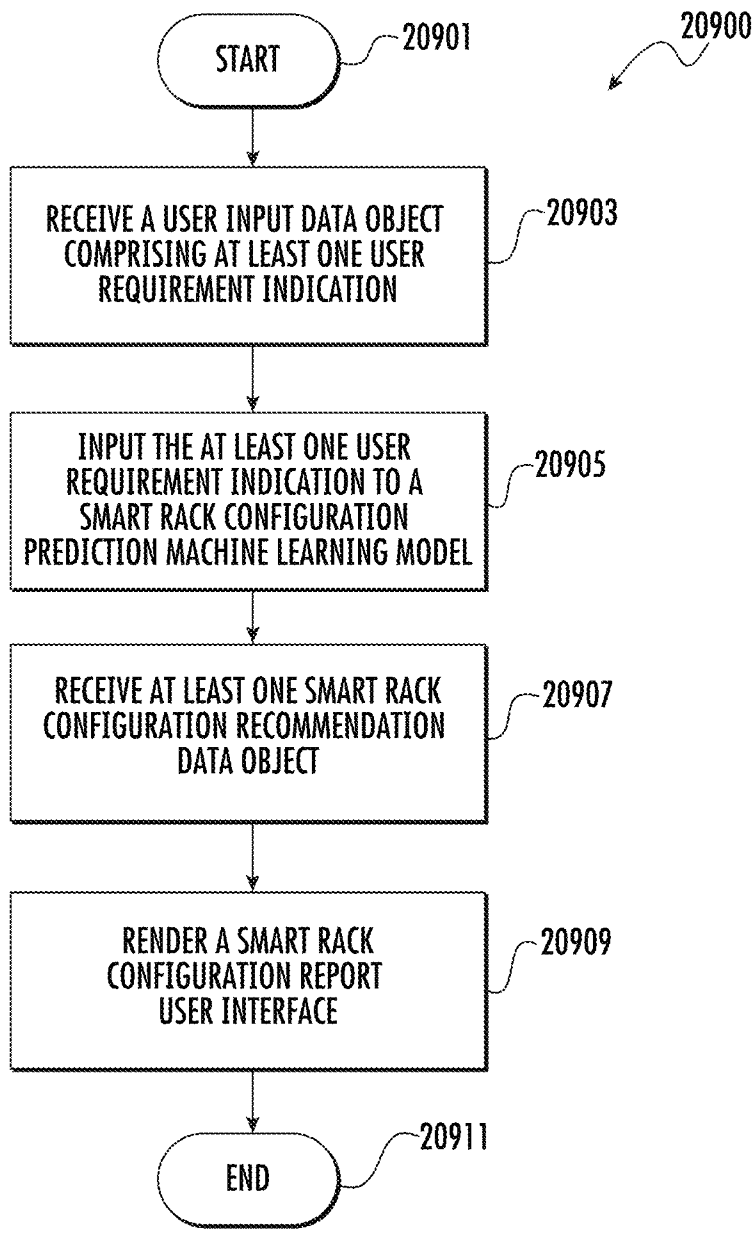

FIG. 209 illustrates an example method associated with generating an example smart rack configuration report user interface in accordance with some embodiments of the present disclosure.

Figure 210:
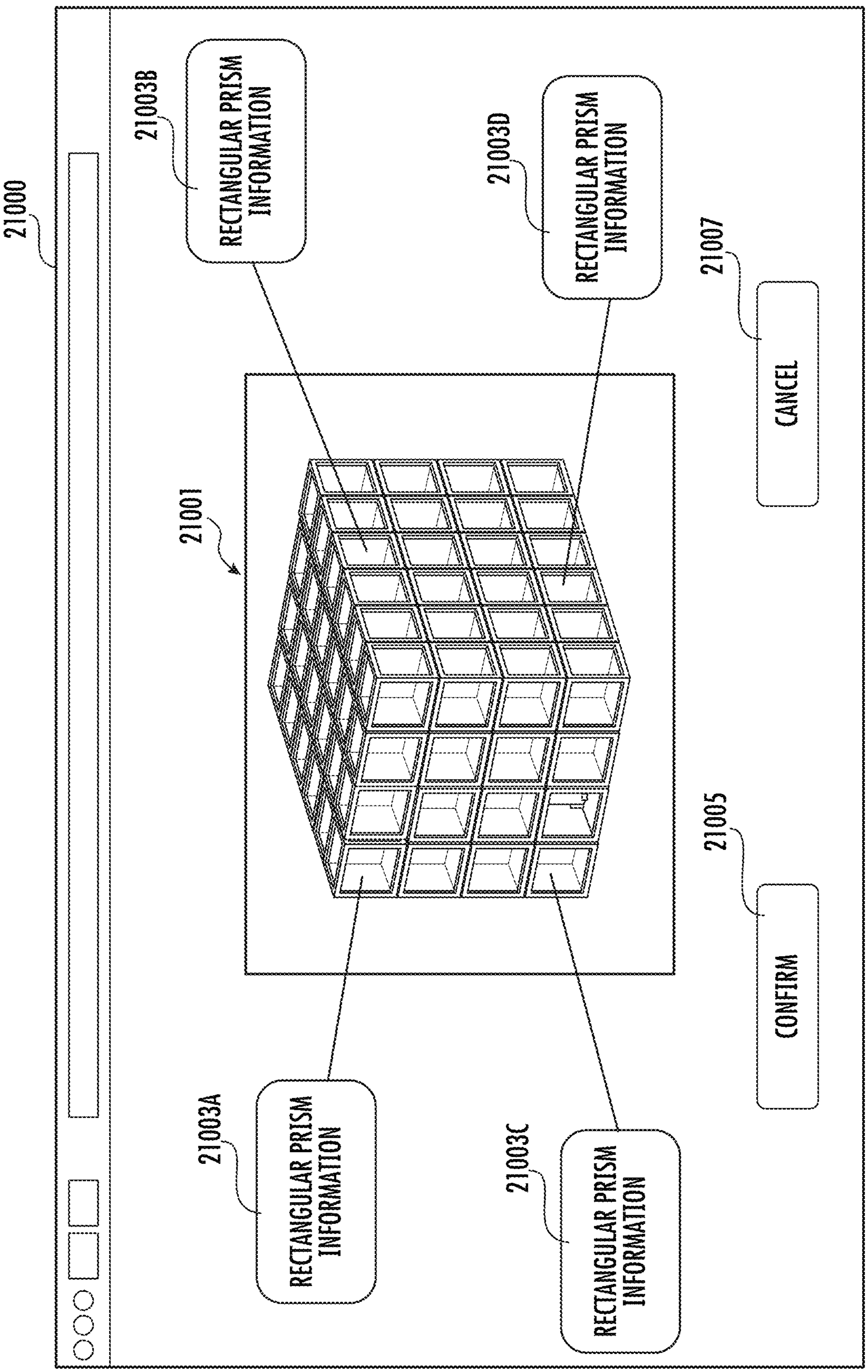

FIG. 210 illustrates an example smart rack configuration report user interface in accordance with some embodiments of the present disclosure.

Figure 211:
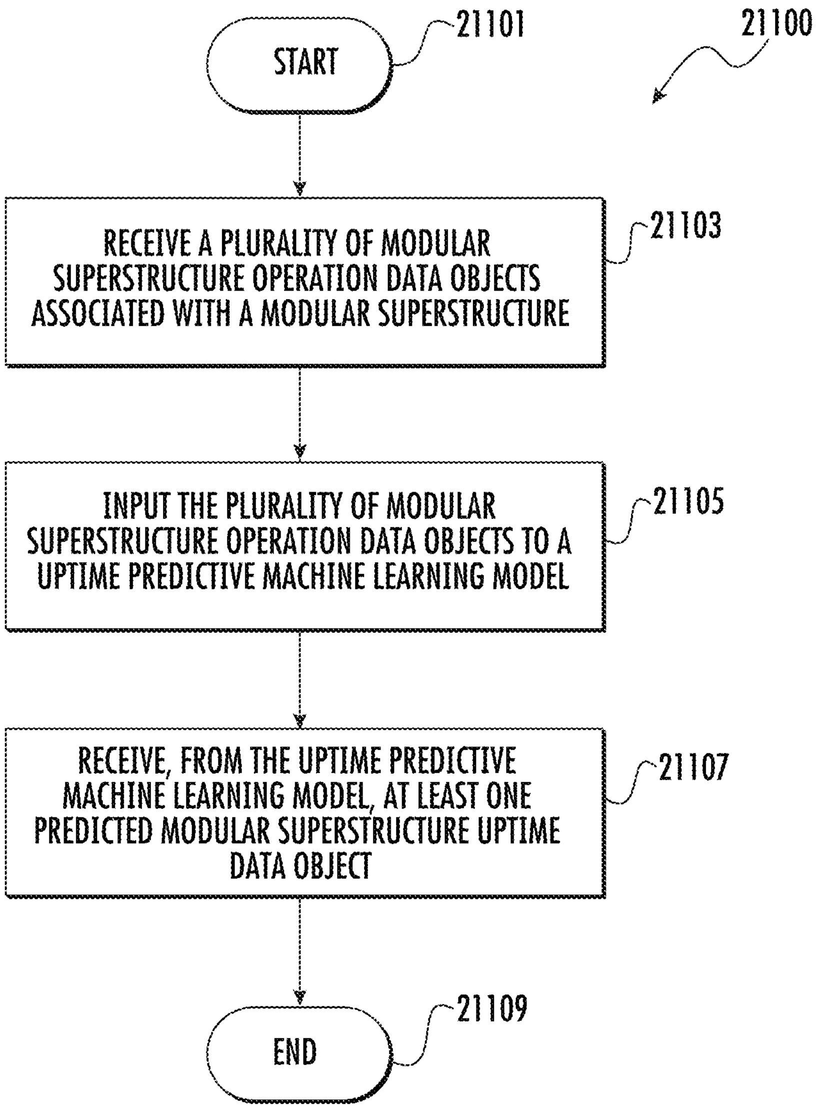

FIG. 211 illustrates an example method in accordance with some embodiments of the present disclosure.

Figure 212:
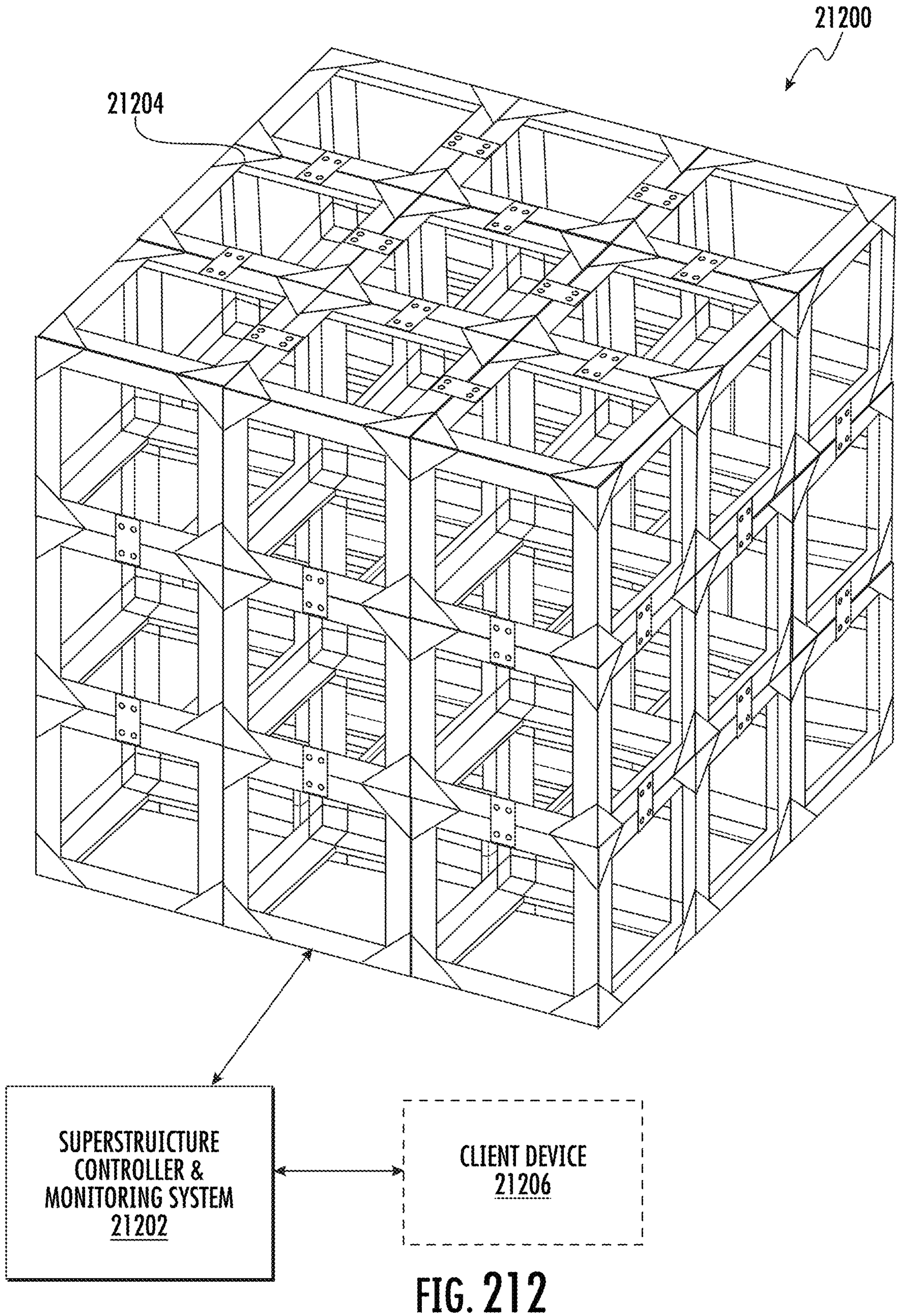

FIG. 212 illustrates an example system in which embodiments of the present disclosure may operate.

Figure 213:
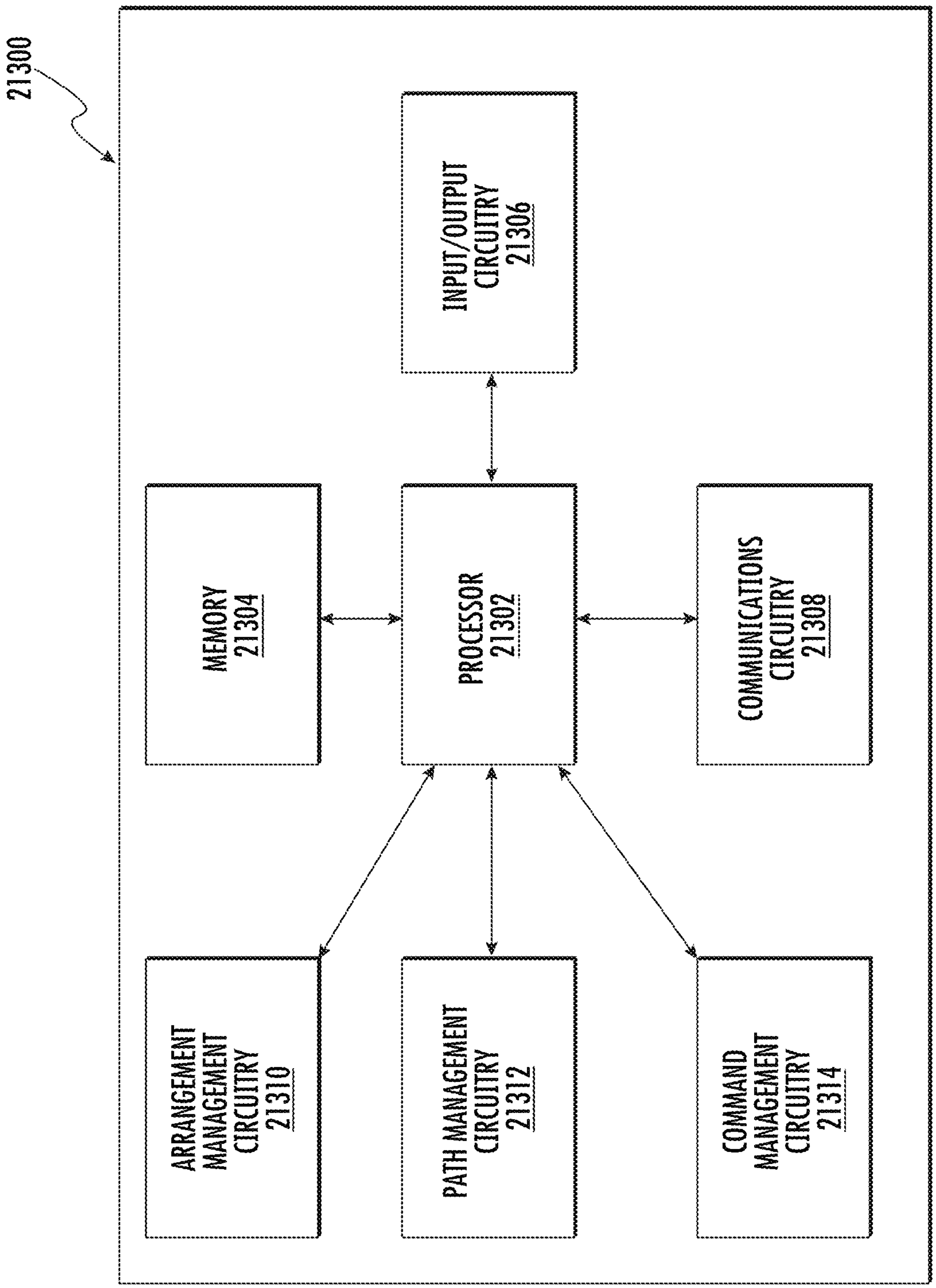

FIG. 213 illustrates a block diagram of an example apparatus in accordance with at least one example embodiment of the present disclosure.

Figure 214:
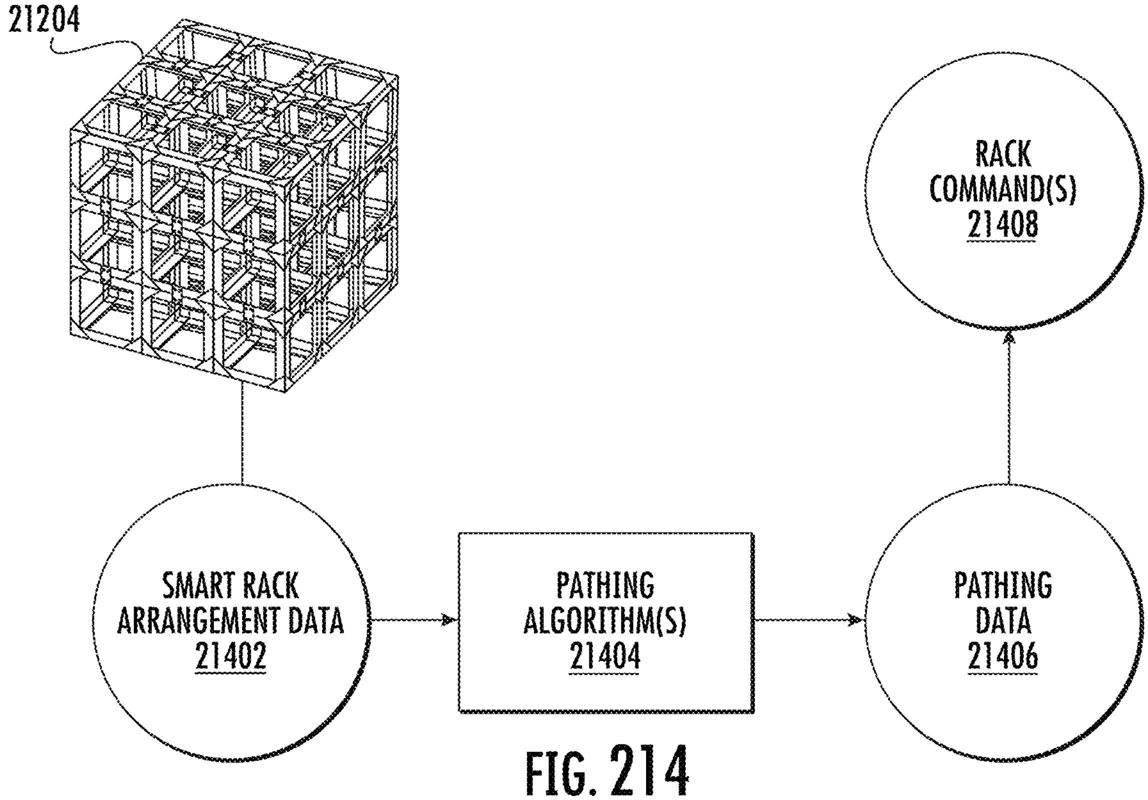

FIG. 214 illustrates an example visualization of data flows for initiating tote traversal via pathing in accordance with at least one example embodiment of the present disclosure.

Figure 215:
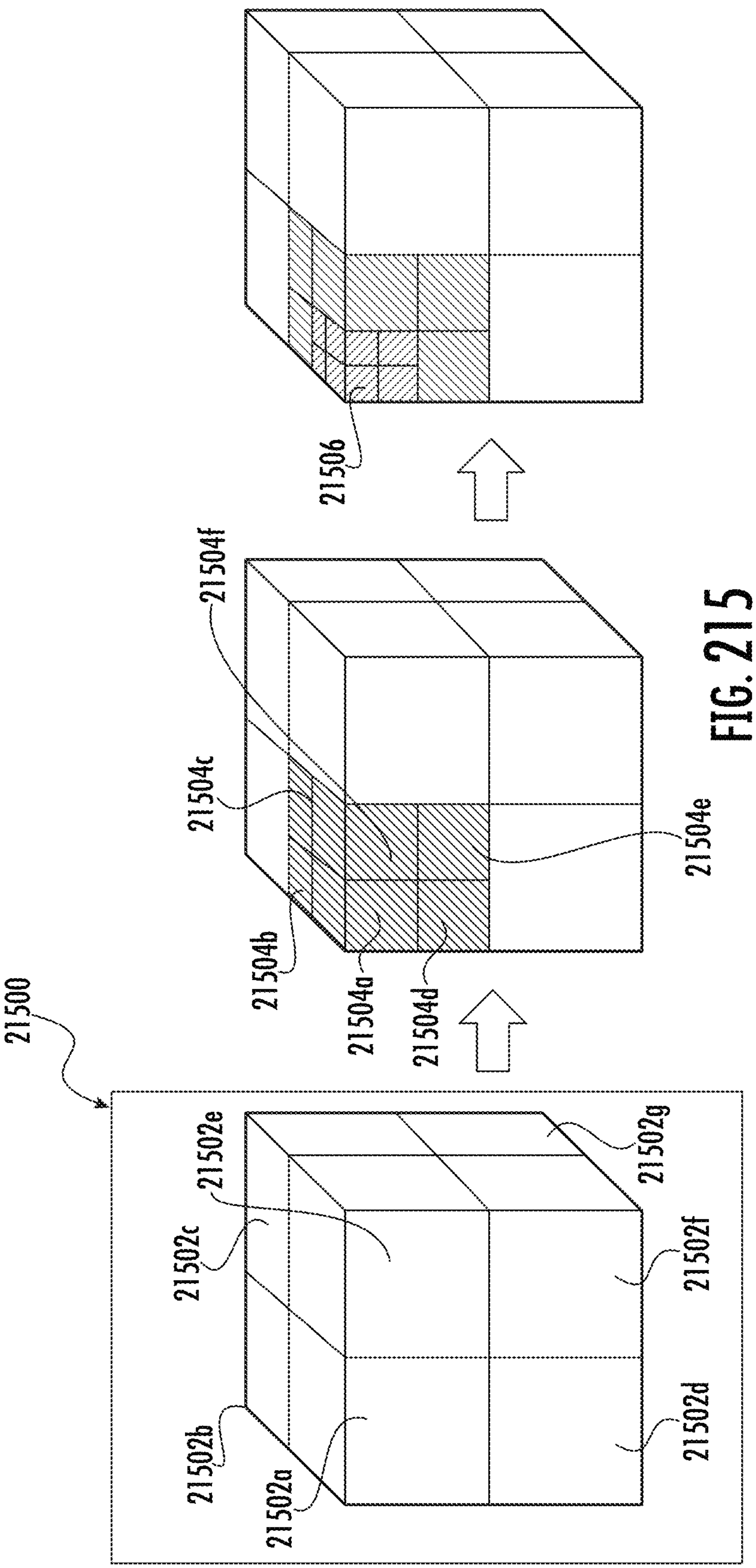

FIG. 215 illustrates an example visualization of segmenting a smart rack arrangement of a modular superstructure in accordance with at least one example embodiment of the present disclosure.

Figure 216:
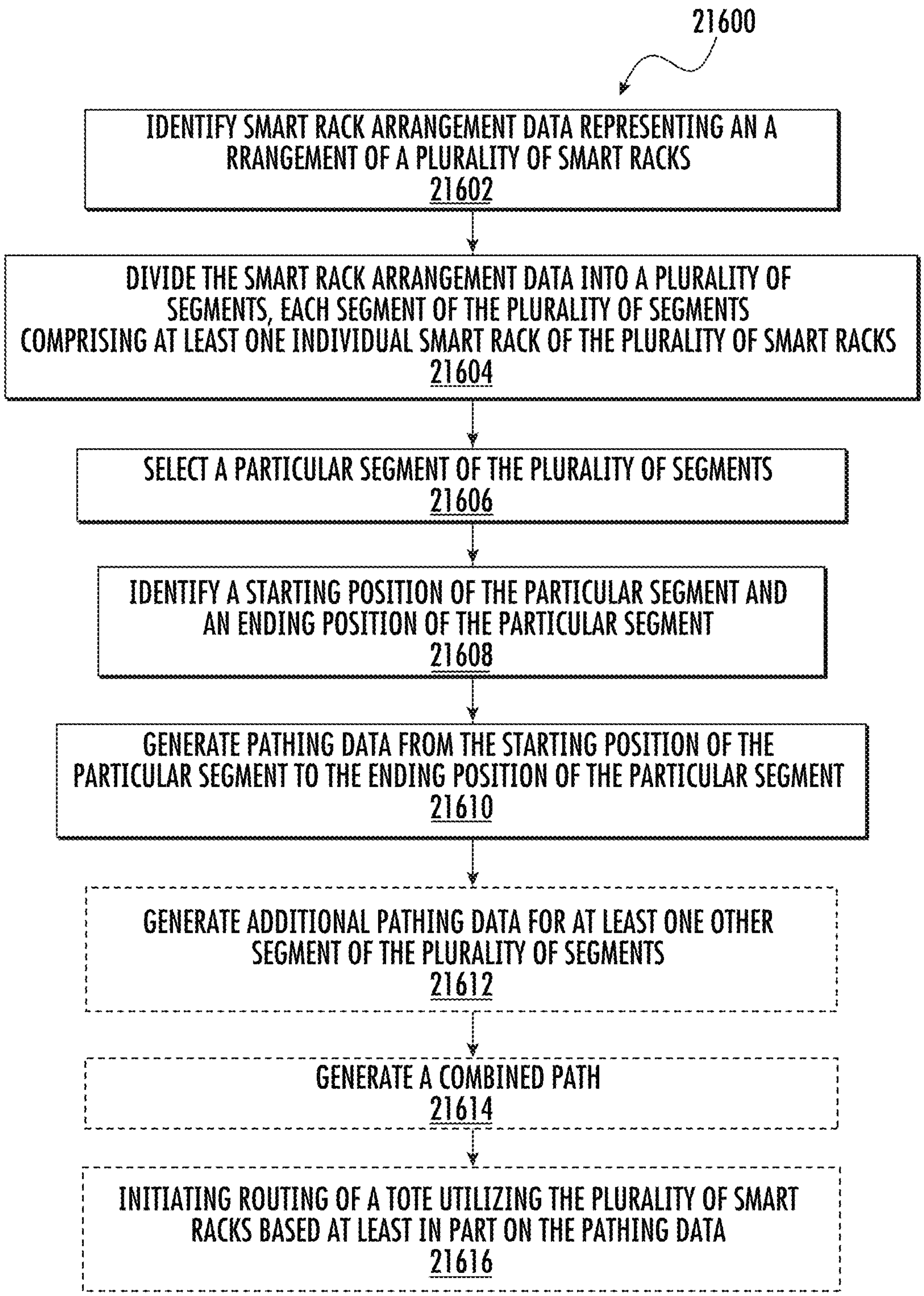

FIG. 216 illustrates a flowchart depicting example operations of a process for generating pathing data utilizing smart rack arrangement segmentation in accordance with at least one example embodiment of the present disclosure.

FIG. 217 illustrates formulas for Eikonal pathing in accordance with at least one example embodiment of the present disclosure.

Figure 218:
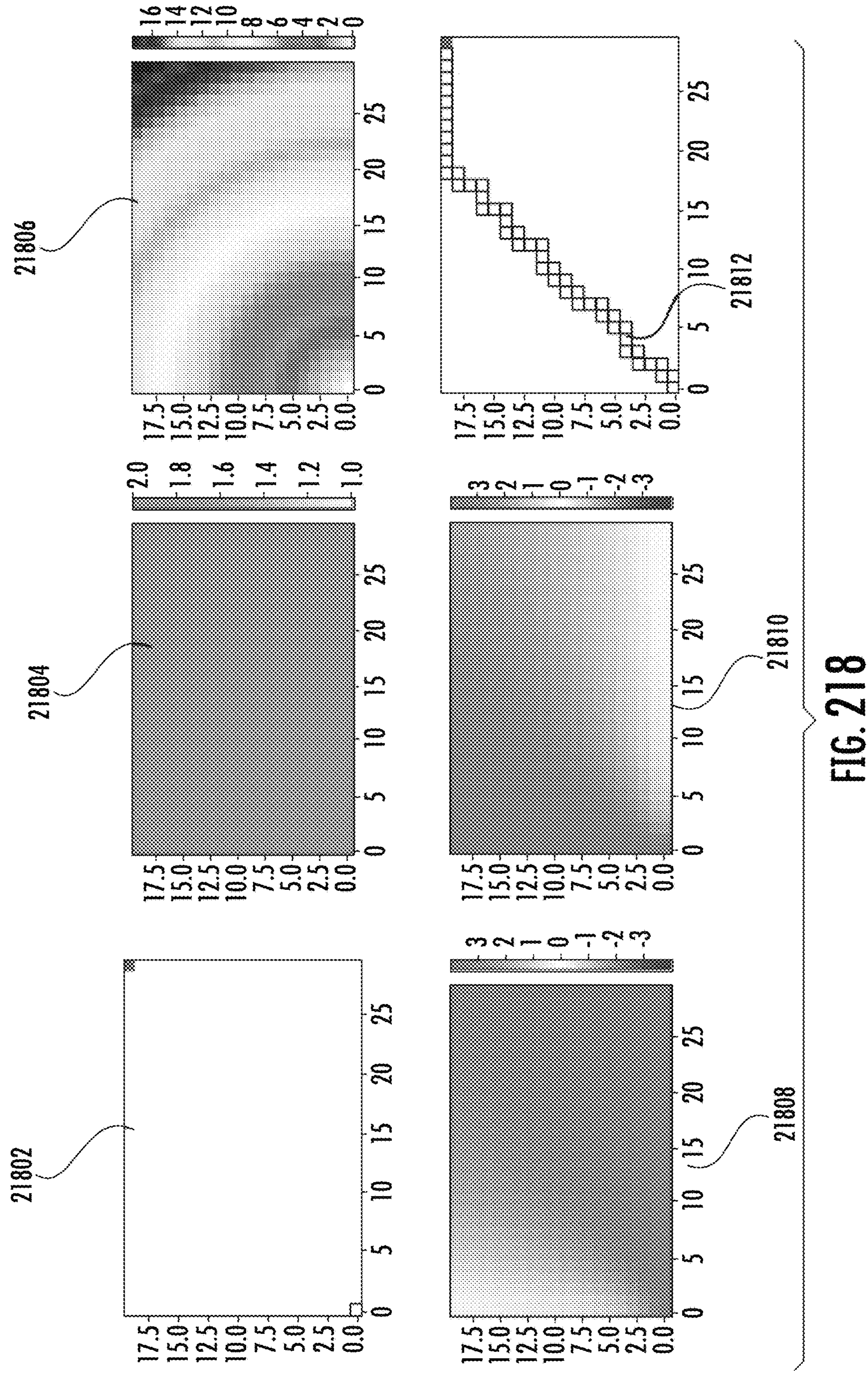

FIG. 218 illustrates visualizations of data derived for Eikonal pathing of an unobstructed arrangement of smart racks in accordance with at least one example embodiment of the present disclosure.

Figure 219:
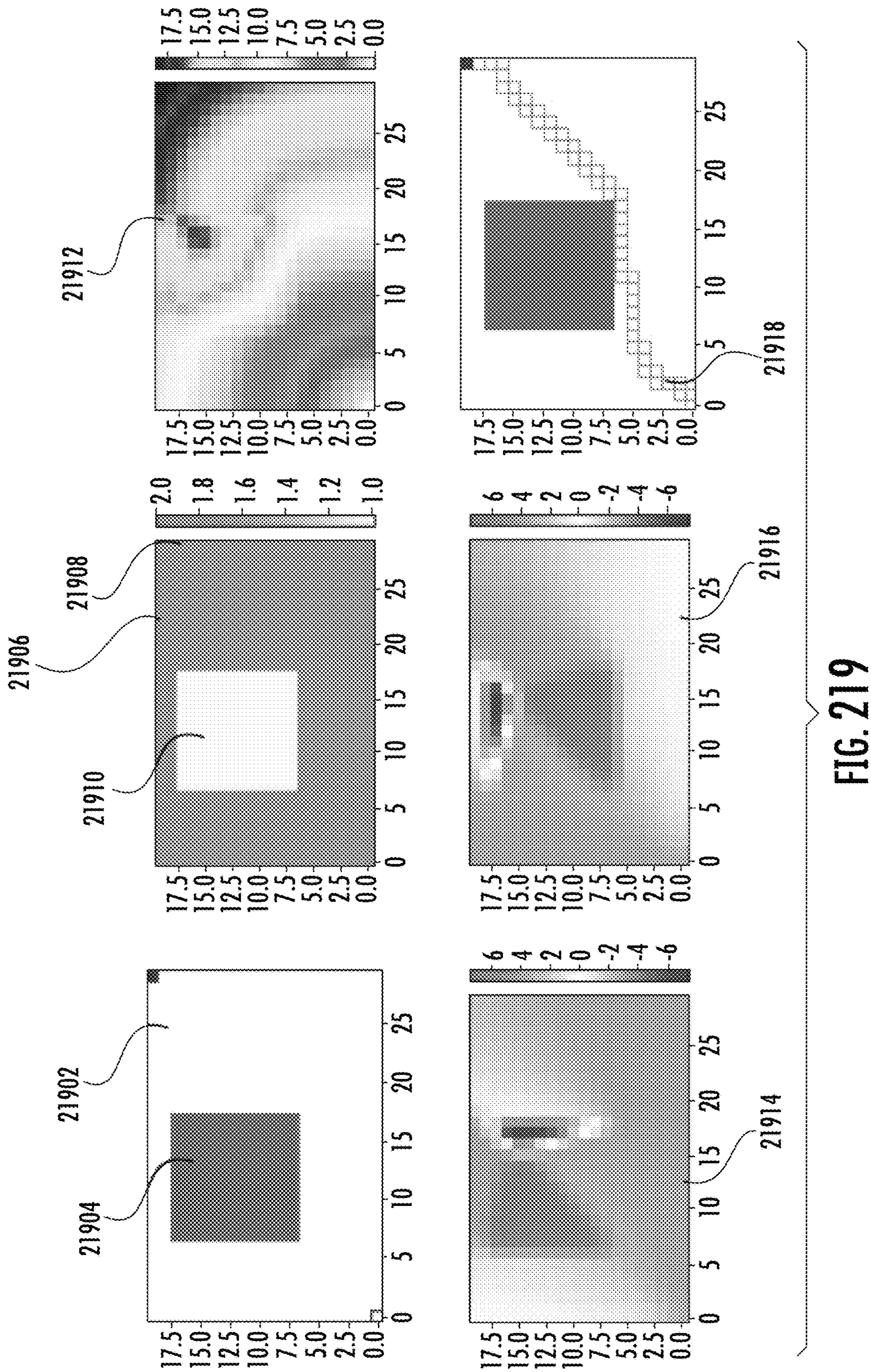

FIG. 219 illustrates visualization of data derived for Eikonal pathing of an obstructed arrangement of smart racks in accordance with at least one example embodiment of the present disclosure.

Figure 220:
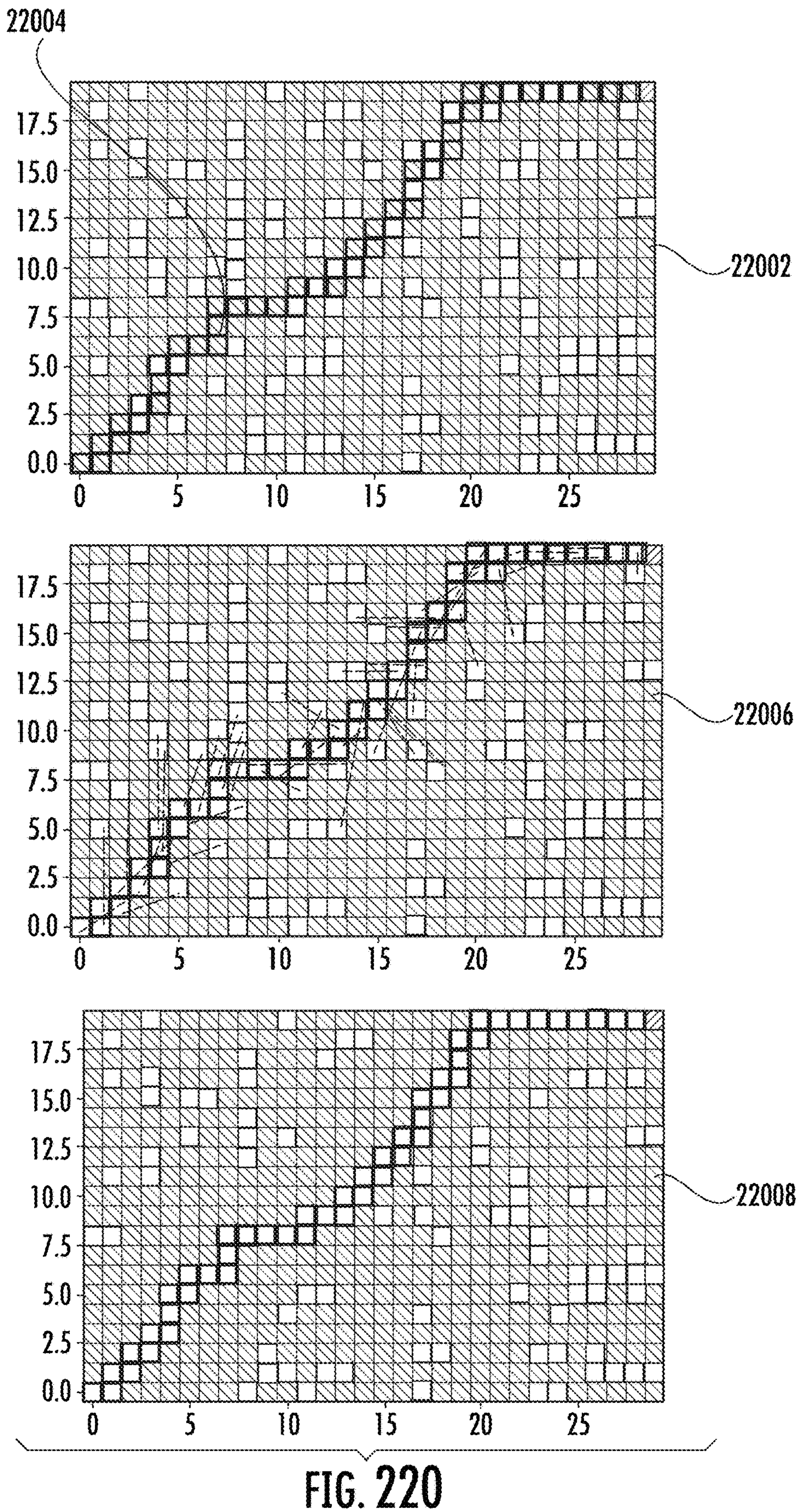

FIG. 220 illustrates visualizations of different stages of Eikonal pathing including clearing moves in accordance with at least one example embodiment of the present disclosure.

FIG. 221 illustrates a visualization of pathing data and corresponding parallelization of pathing data in accordance with at least one example embodiment of the present disclosure.

Figure 222:
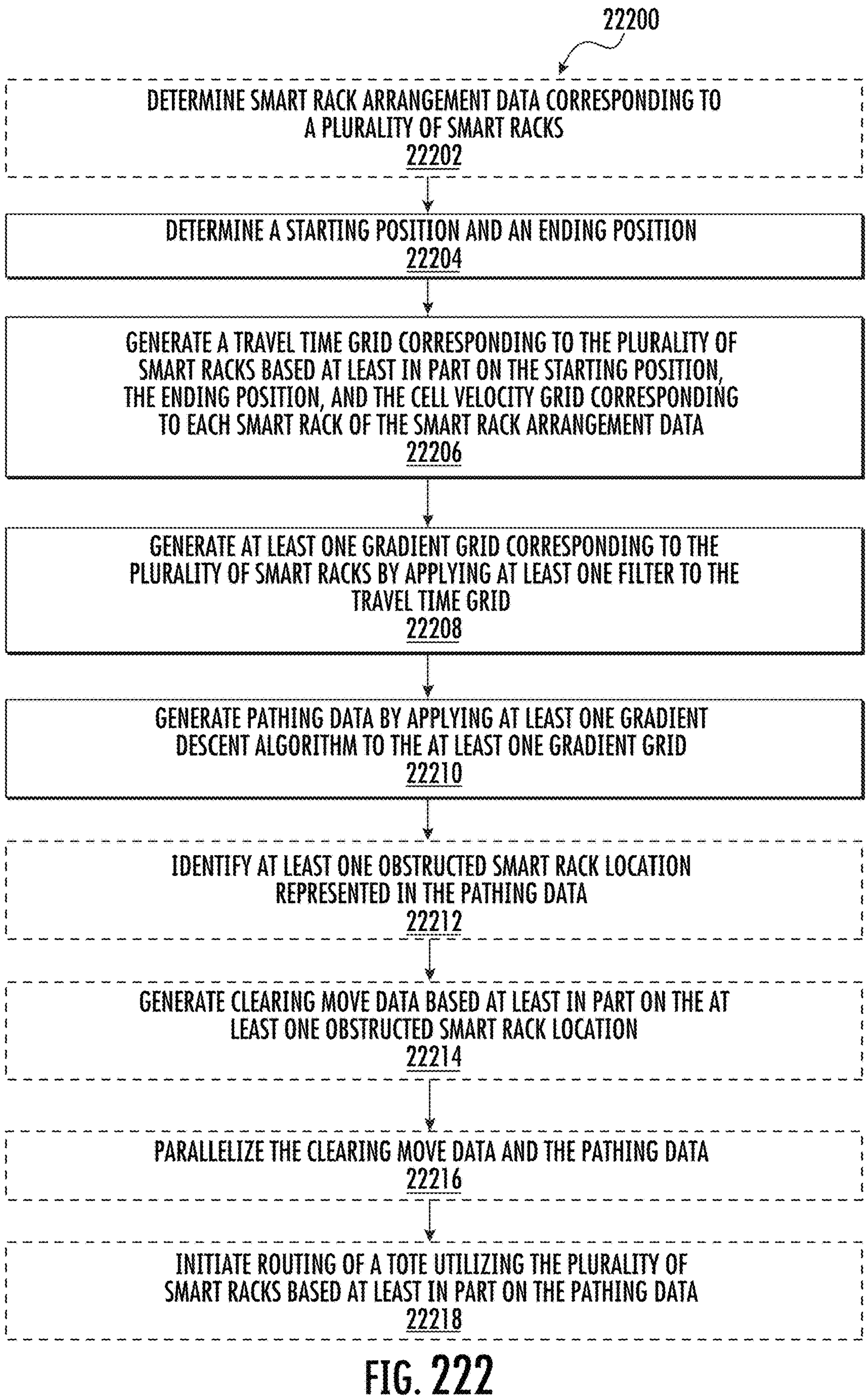

FIG. 222 illustrates a flowchart depicting example operations of a process for generating pathing data utilizing Eikonal pathing in accordance with at least one example embodiment of the present disclosure.

Figure 223:
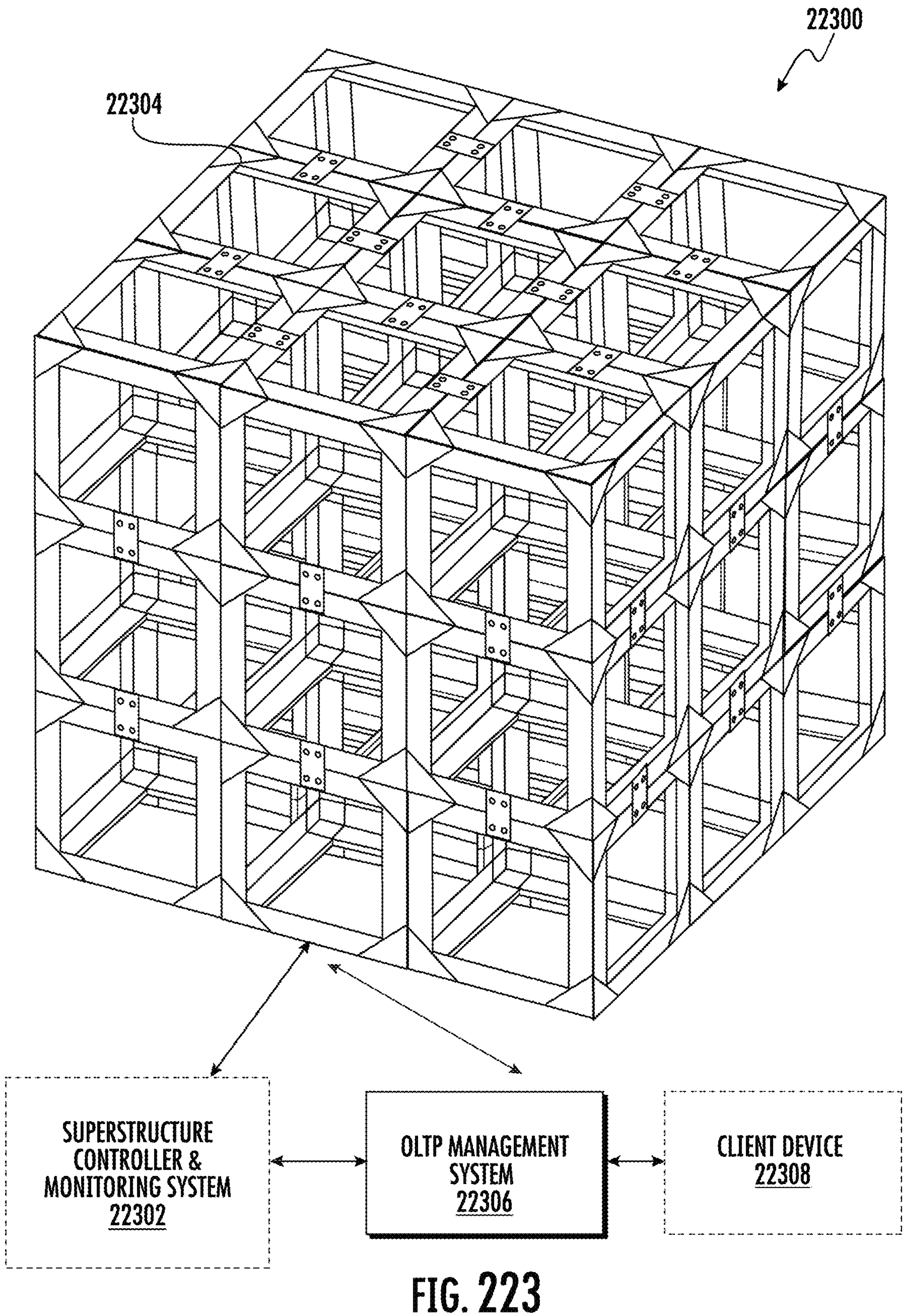

FIG. 223 illustrates an example system in which embodiments of the present disclosure may operate.

Figure 224:
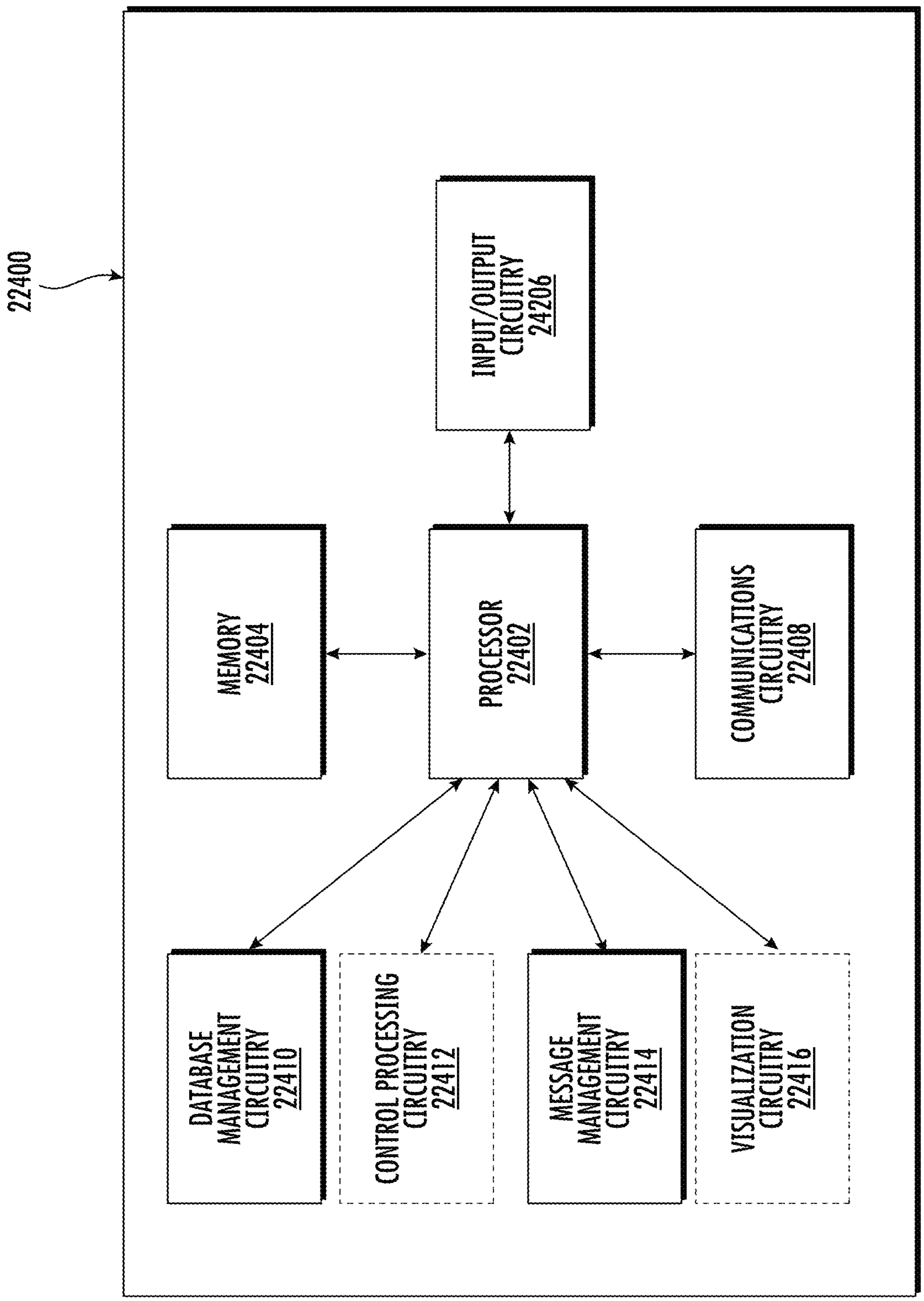

FIG. 224 illustrates a block diagram of an example embodiment in accordance with at least one embodiment of the present disclosure.

Figure 225:
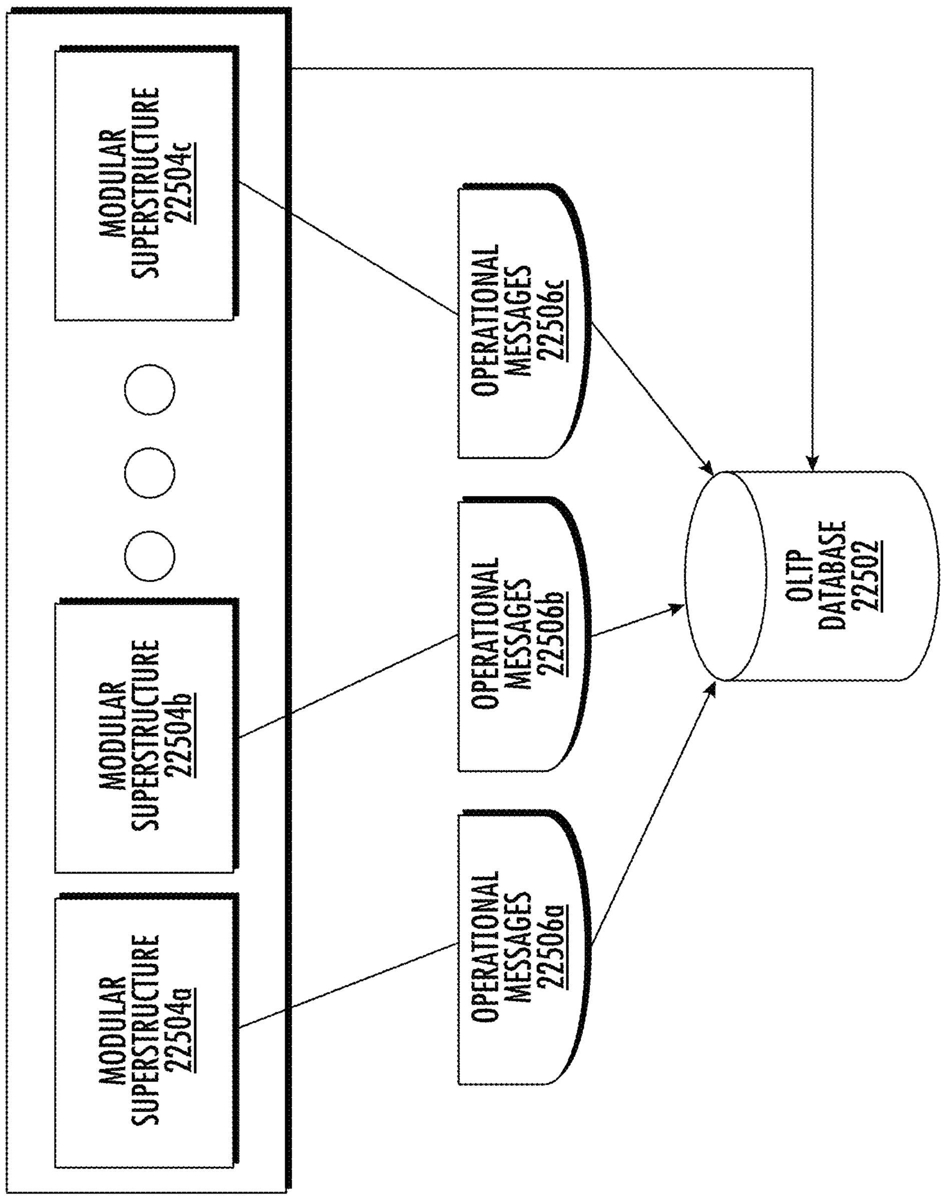

FIG. 225 illustrates a data flow for configuring an online transaction processing database in accordance with at least one embodiment of the present disclosure.

Figure 226A:
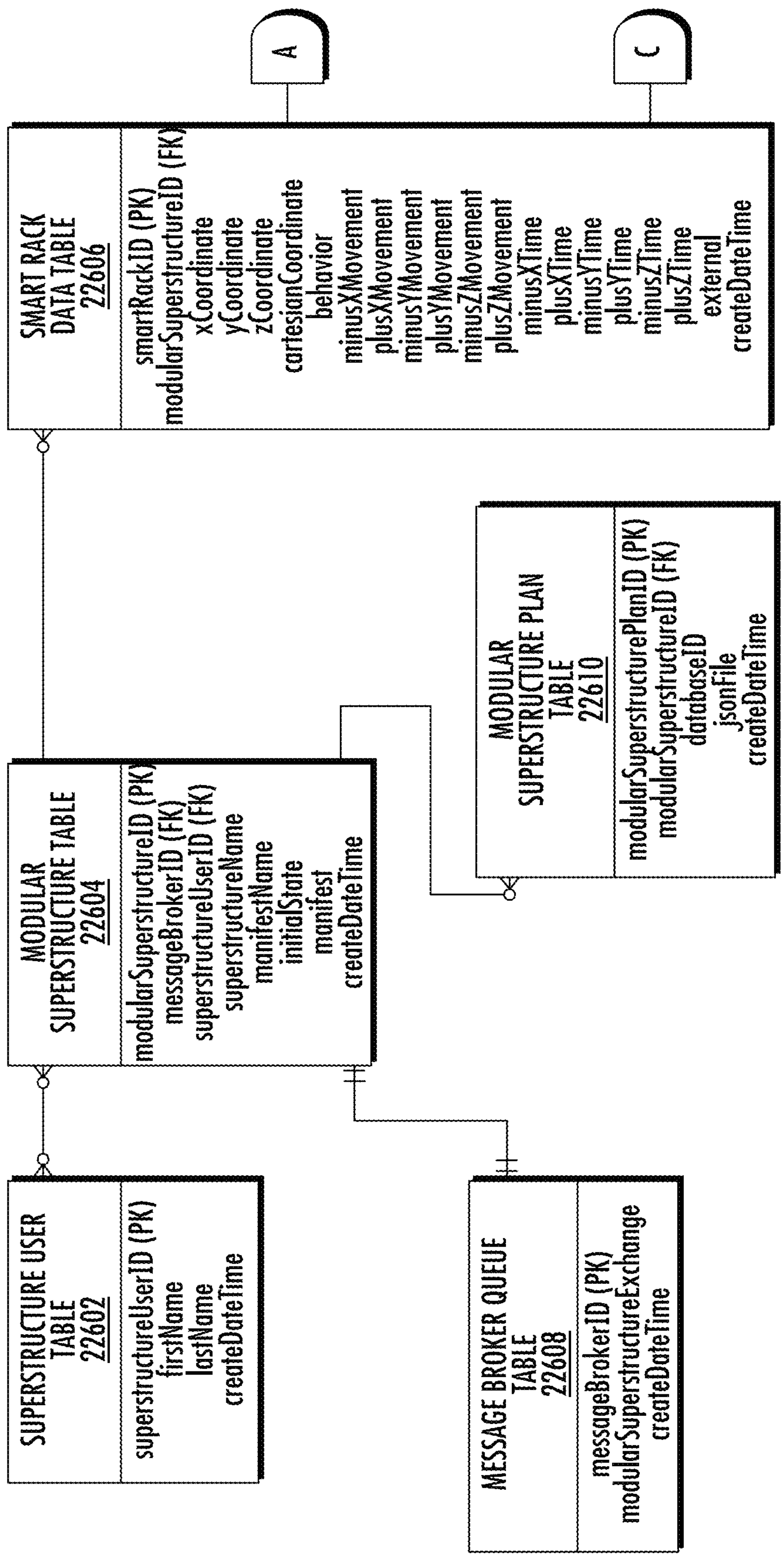

FIG. 226A illustrates a first set of tables of an online transaction processing database in accordance with at least one embodiment of the present disclosure.

Figure 226B:
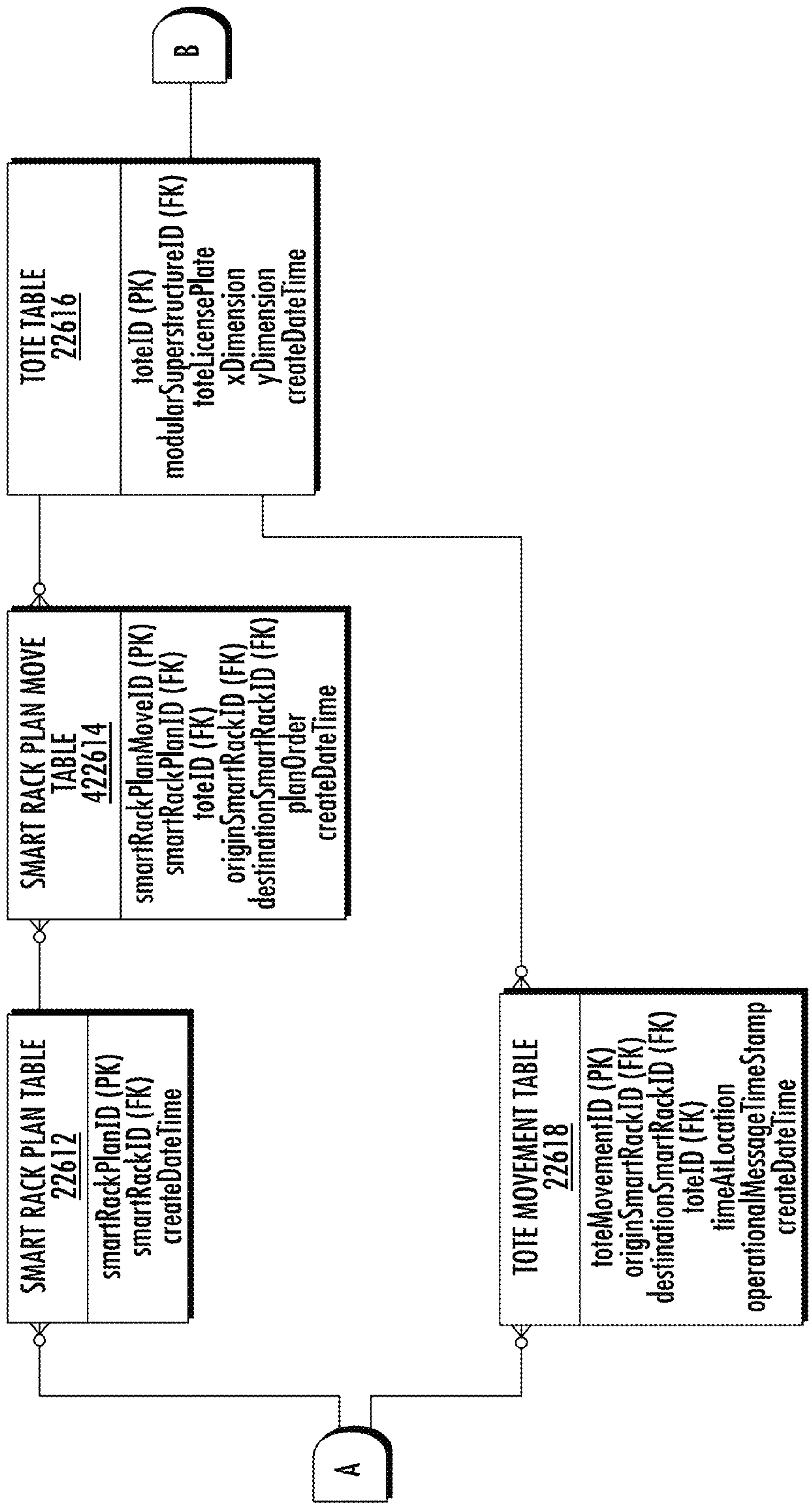

FIG. 226B illustrates a second set of tables of an online transaction processing database in accordance with at least one embodiment of the present disclosure.

Figure 226C:
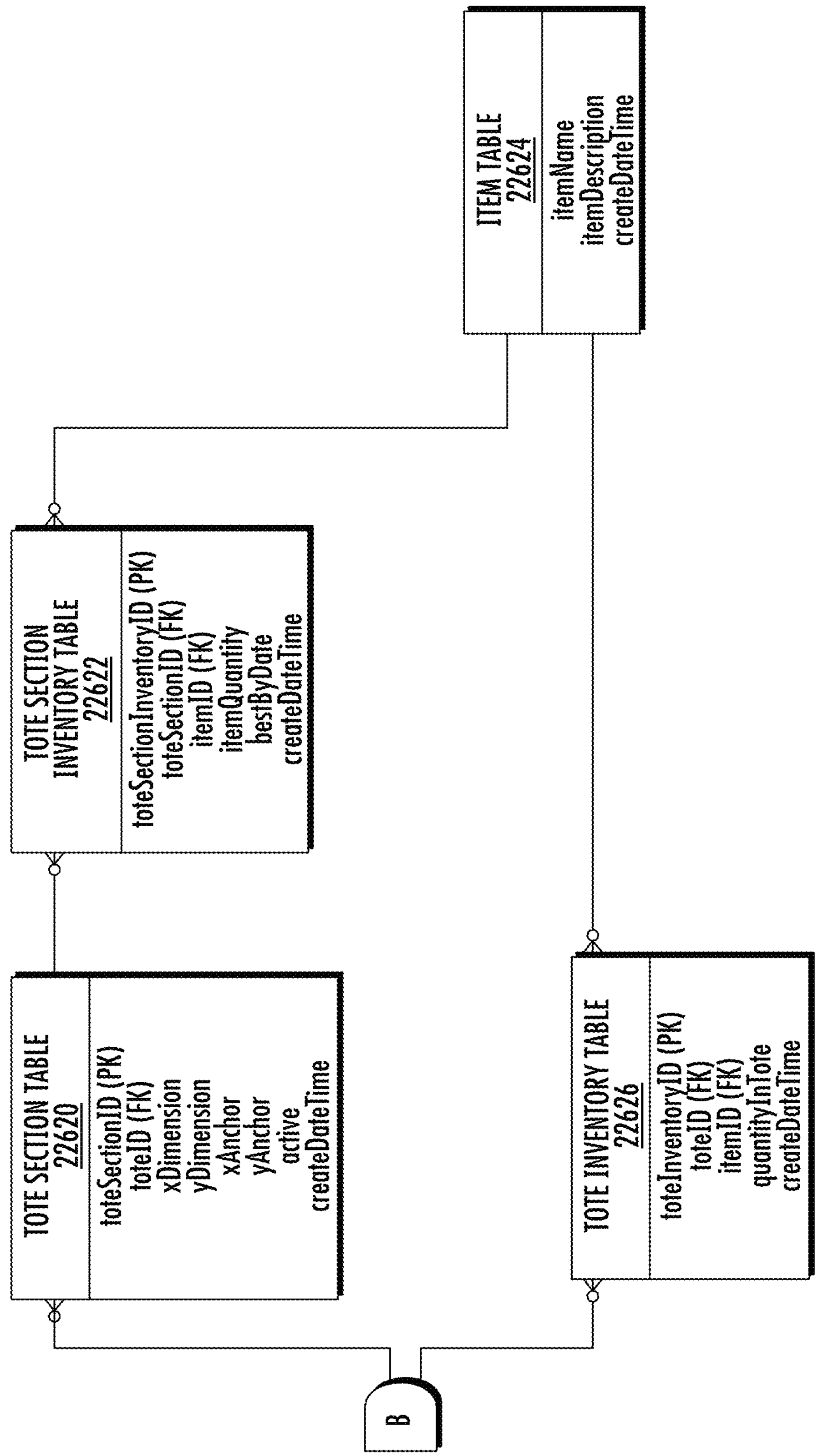

FIG. 226C illustrates a third set of tables of an online transaction processing database in accordance with at least one embodiment of the present disclosure.

Figure 226D:
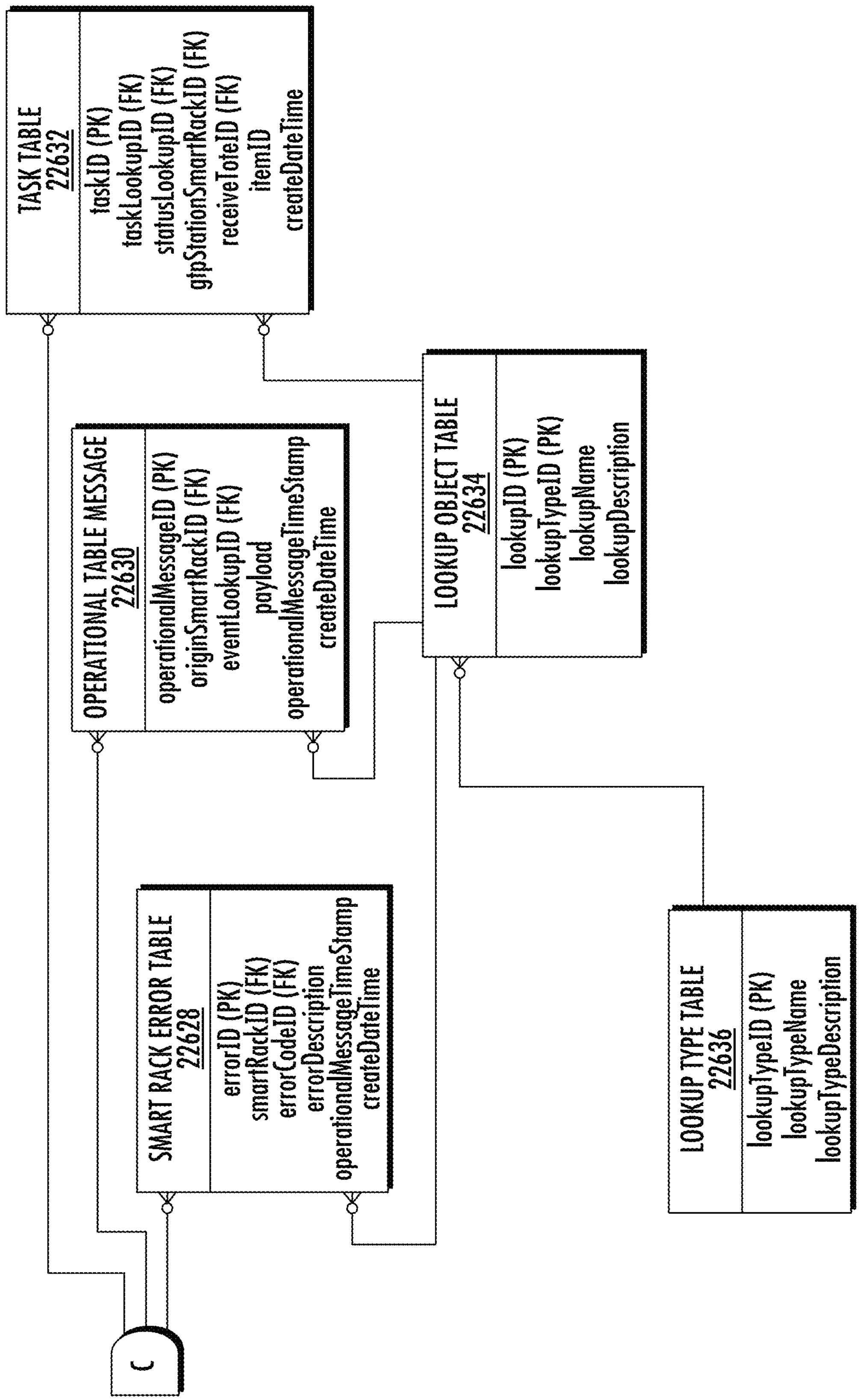

FIG. 226D illustrates a fourth set of tables of an online transaction processing database in accordance with at least one embodiment of the present disclosure.

Figure 227:
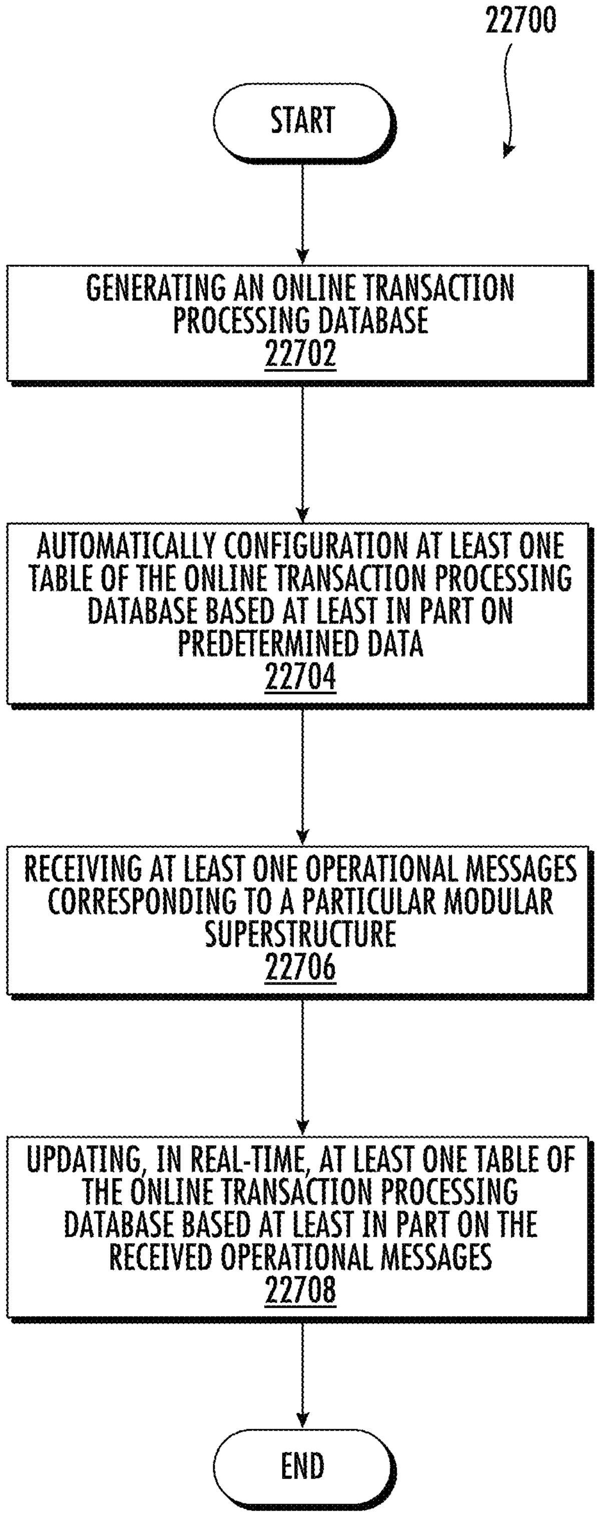

FIG. 227 illustrates operations of an example data flow for configuring and utilizing an online transaction processing database in accordance with at least one embodiment of the present disclosure.

Figure 228:
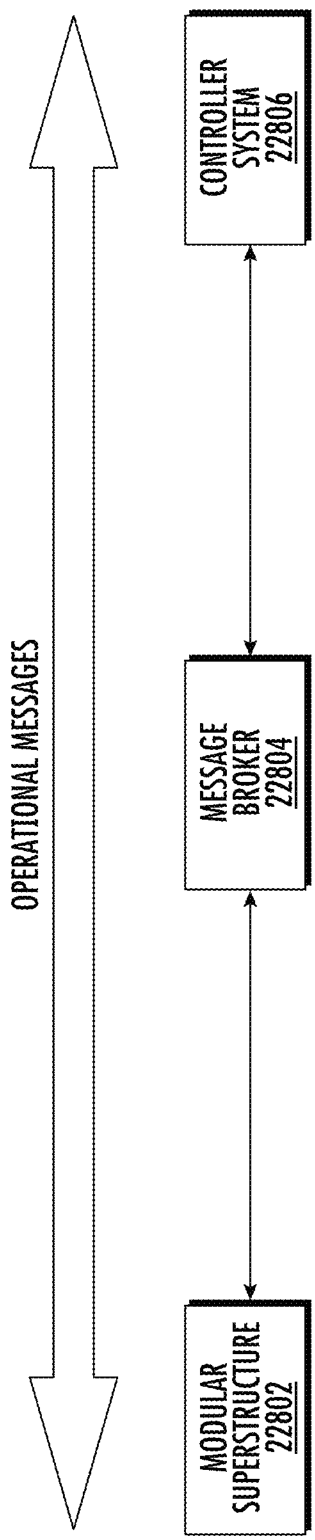

FIG. 228 illustrates an example data flow for communication of operational messages in accordance with at least one embodiment of the present disclosure.

Figure 229:
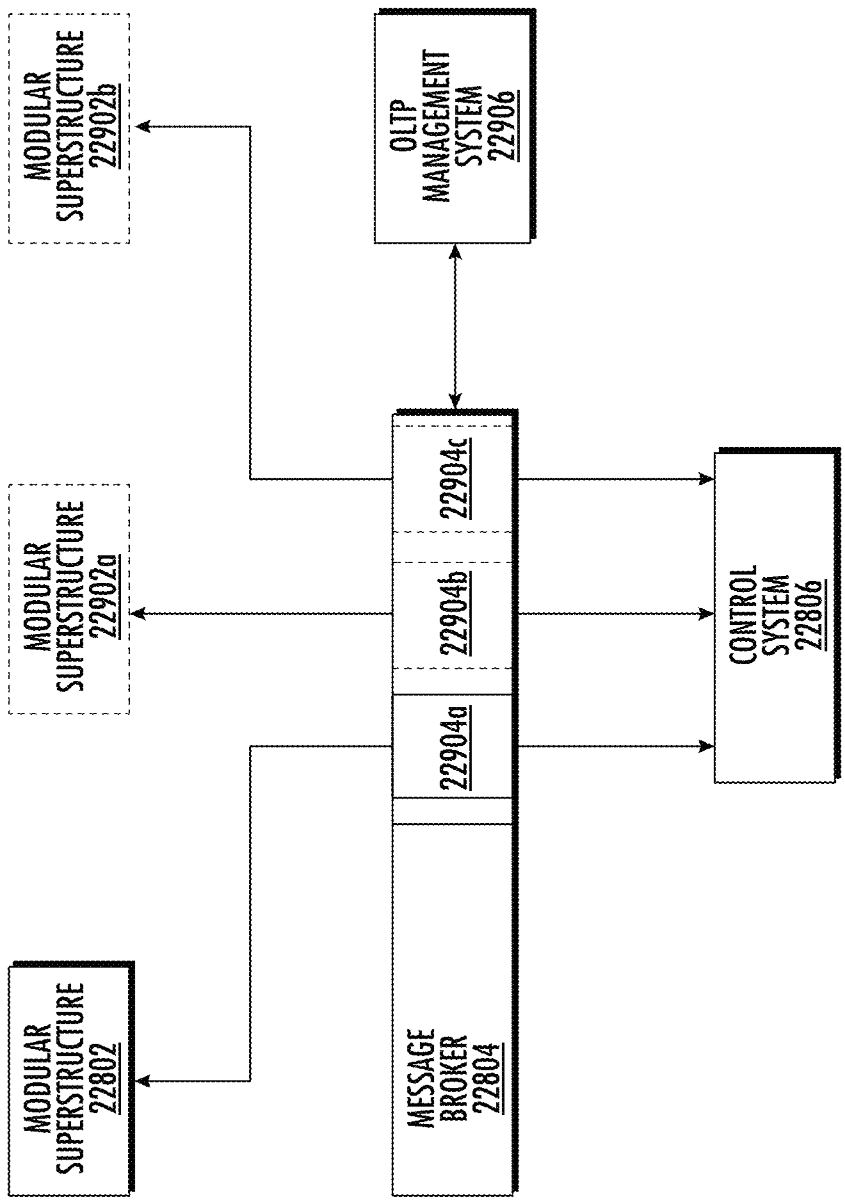

FIG. 229 illustrates an example visualization of at least one message intercept service operating in accordance with at least one embodiment of the present disclosure.

Figure 230:
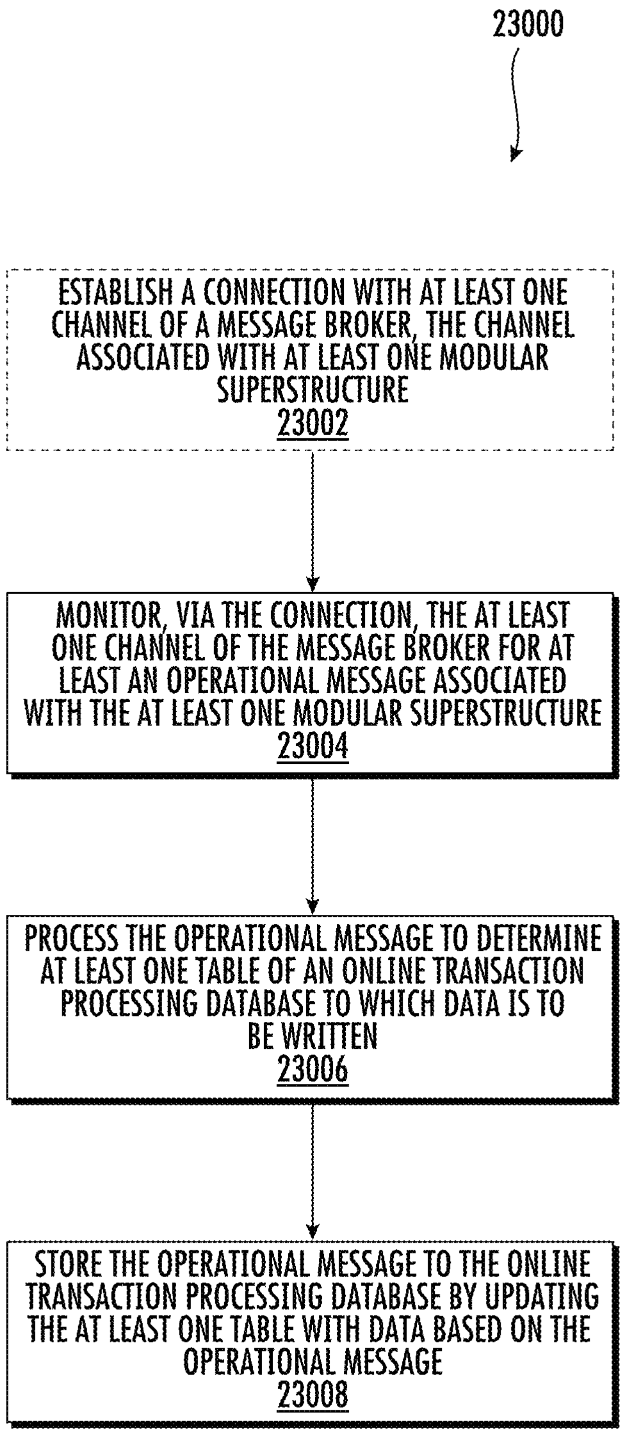

FIG. 230 illustrates a flowchart depicting operations of an example process for storing operational messages by a message intercept service in accordance with at least one embodiment of the present disclosure.

Figure 231:
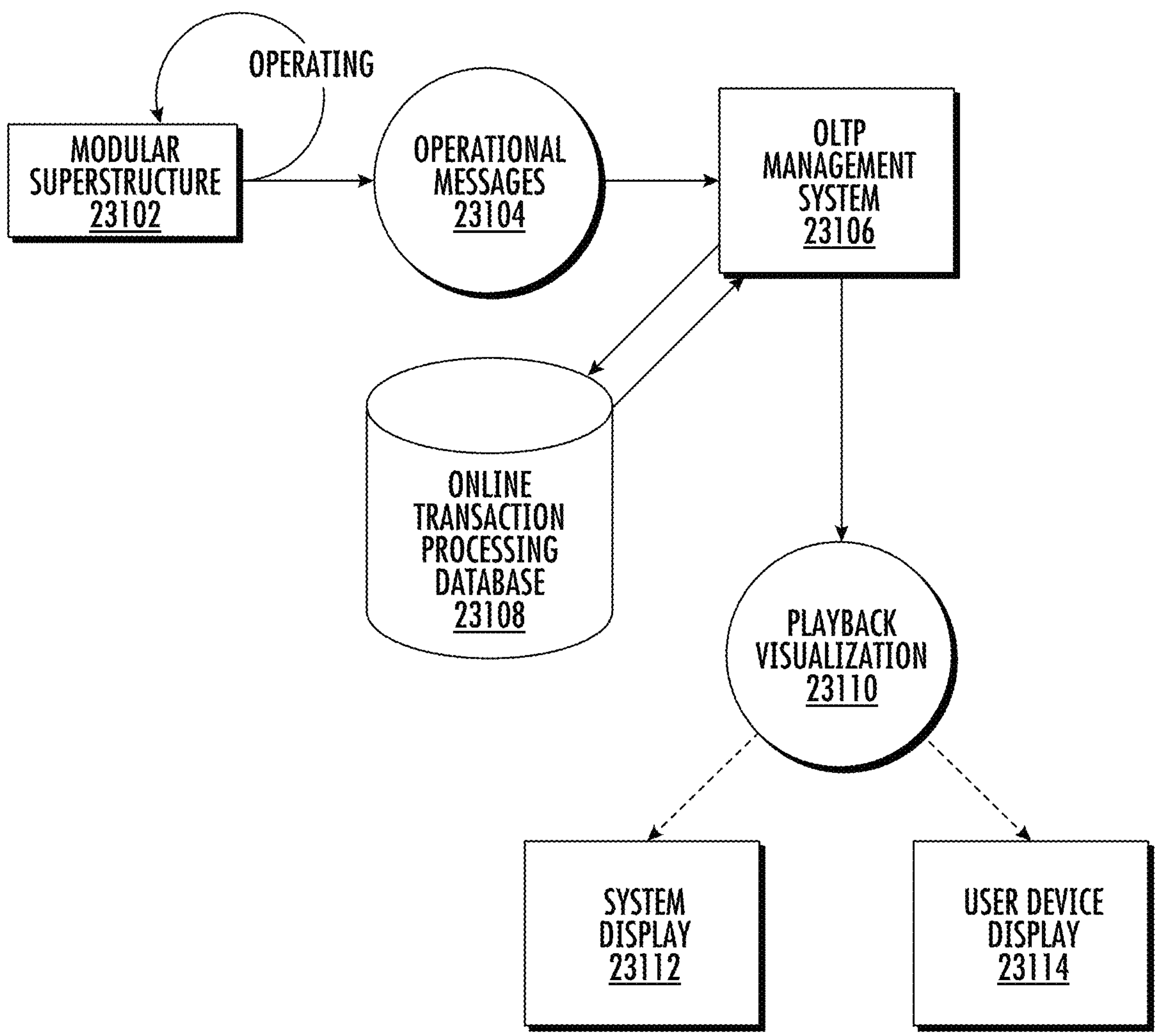

FIG. 231 illustrates an example data flow for outputting a playback visualization in accordance with at least one embodiment of the present disclosure.

Figure 232:
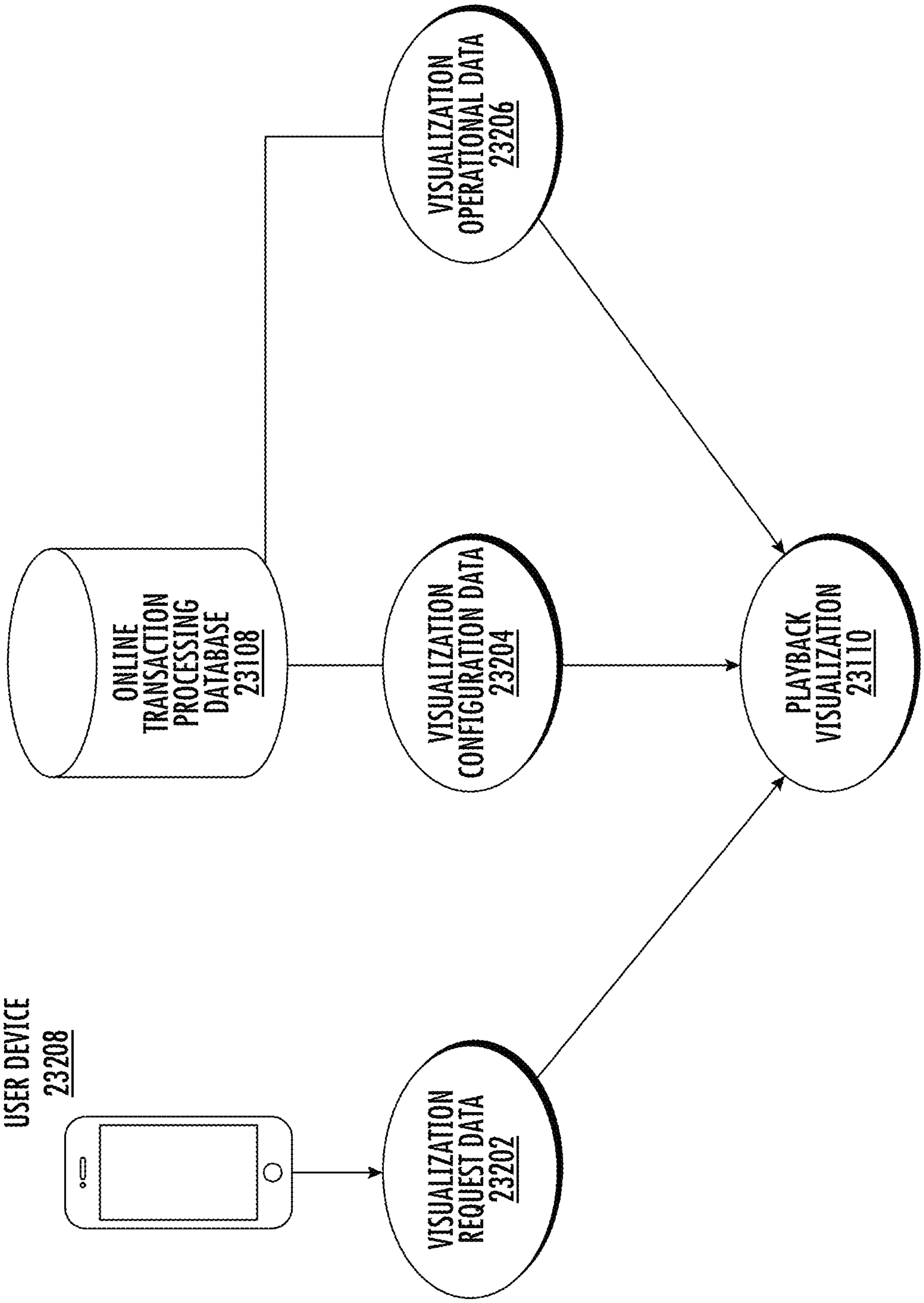

FIG. 232 illustrates an example visualization of data retrieval from an online transaction processing database for outputting a playback visualization in accordance with at least one embodiment of the present disclosure.

Figure 233:
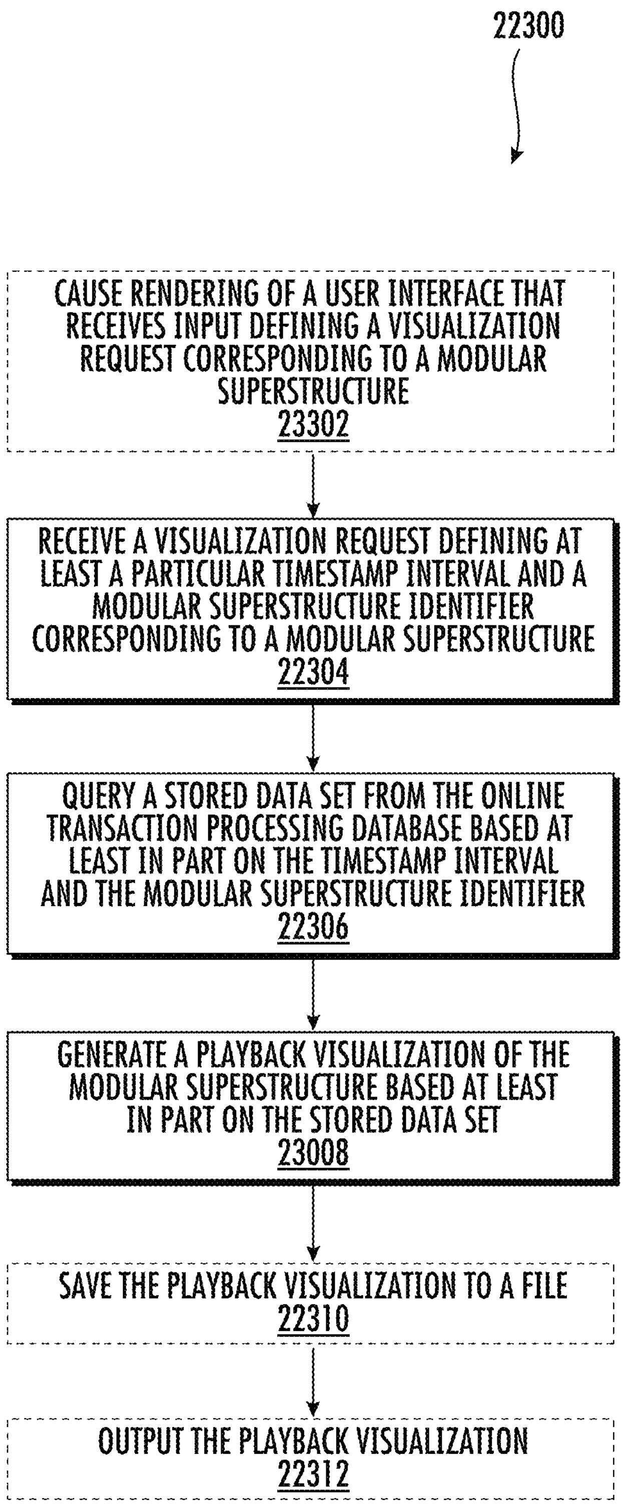
Figure 234A:
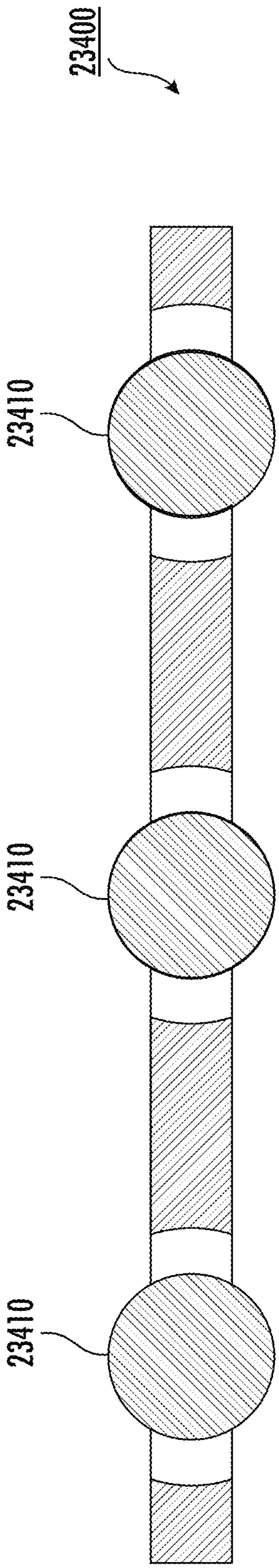
Figure 234B:
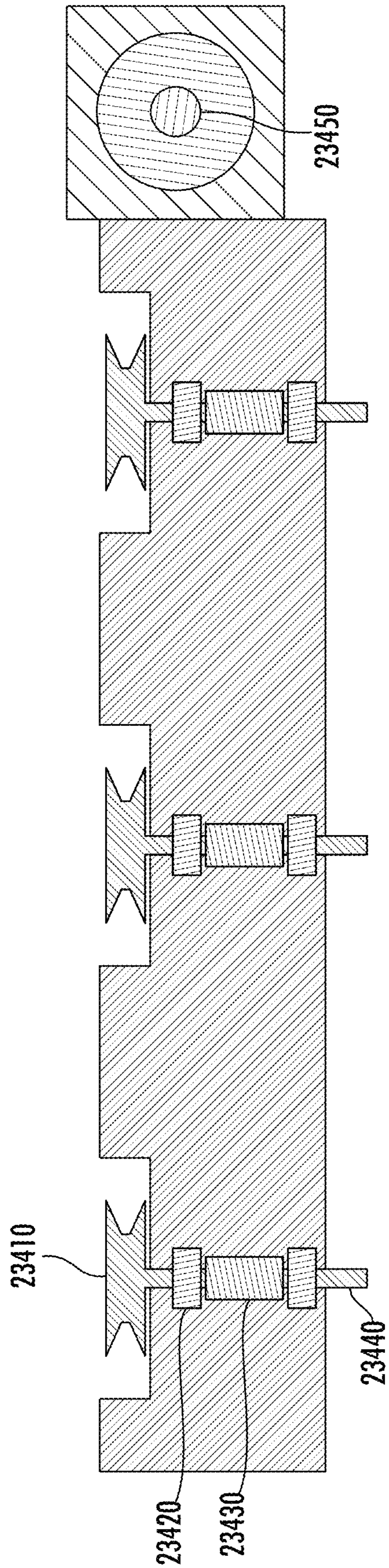
Figure 234C:
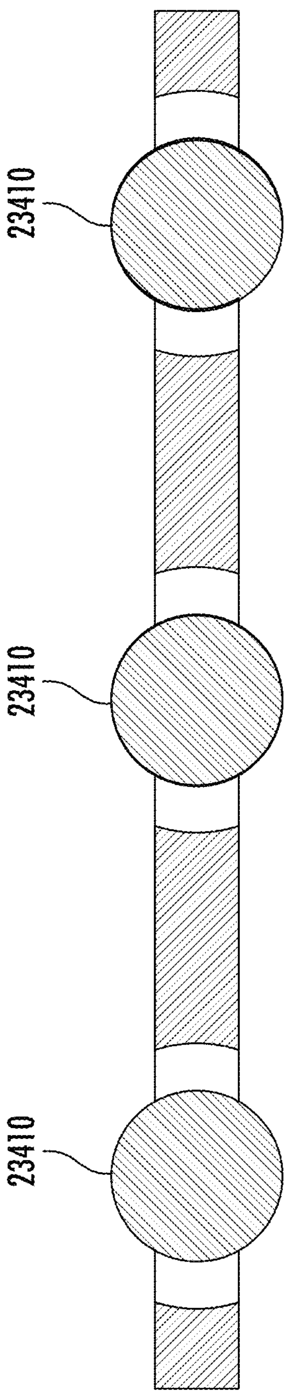
Figure 234D:
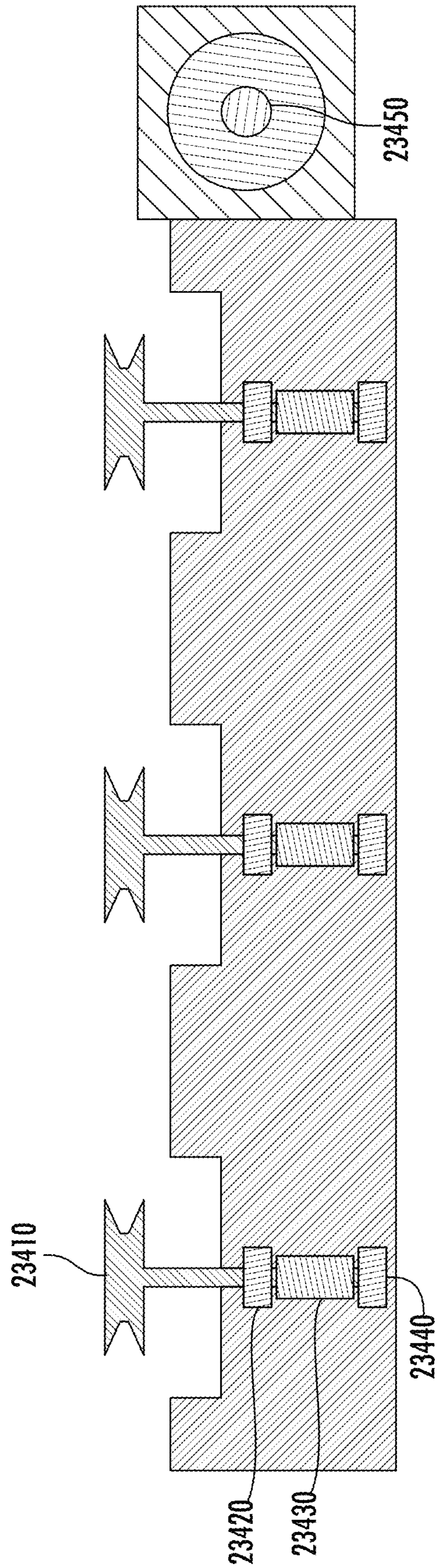

FIG. 233 illustrates a flowchart depicting operations of an example process for outputting a playback visualization in accordance with at least one embodiment of the present disclosure.

FIG. 234A, FIG. 234B, FIG. 234C, and FIG. 234D illustrate example views of example configurations associated with example smart racks in accordance with some embodiments of the present disclosure.

Figure 235A:
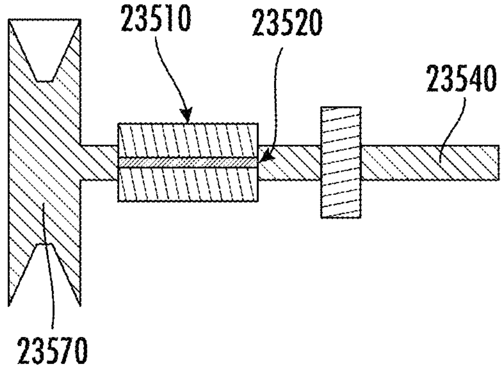
Figure 235B:
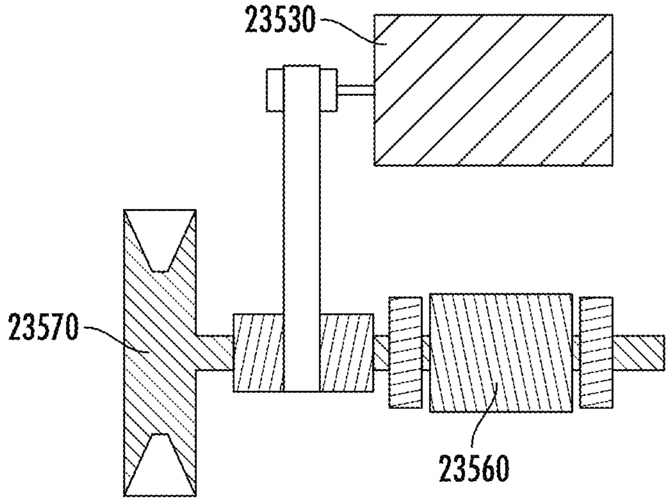

FIG. 235A and FIG. 235B illustrates example views associated with an example solenoid coupled to an example motor sleeve in accordance with some embodiments of the present disclosure.

Figure 236A:
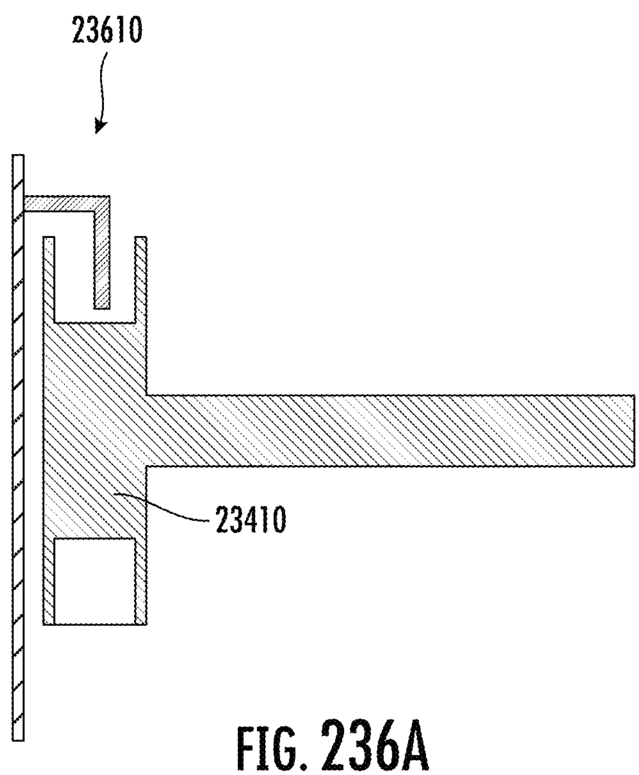
Figure 236B:
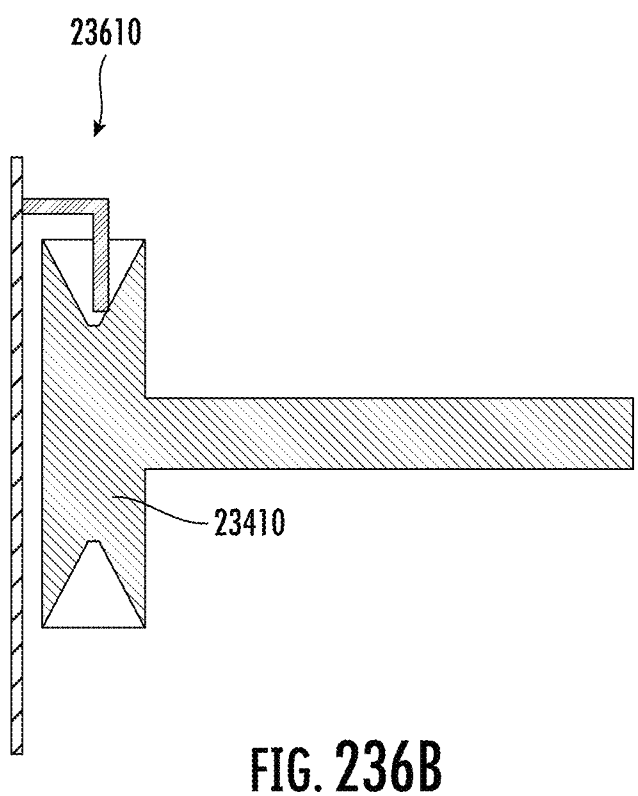

FIG. 236A and FIG. 236B illustrate example engagements between example lips of example rectangular prisms and example rollers of example smart racks in accordance with some embodiments of the present disclosure.

Figure 237A:
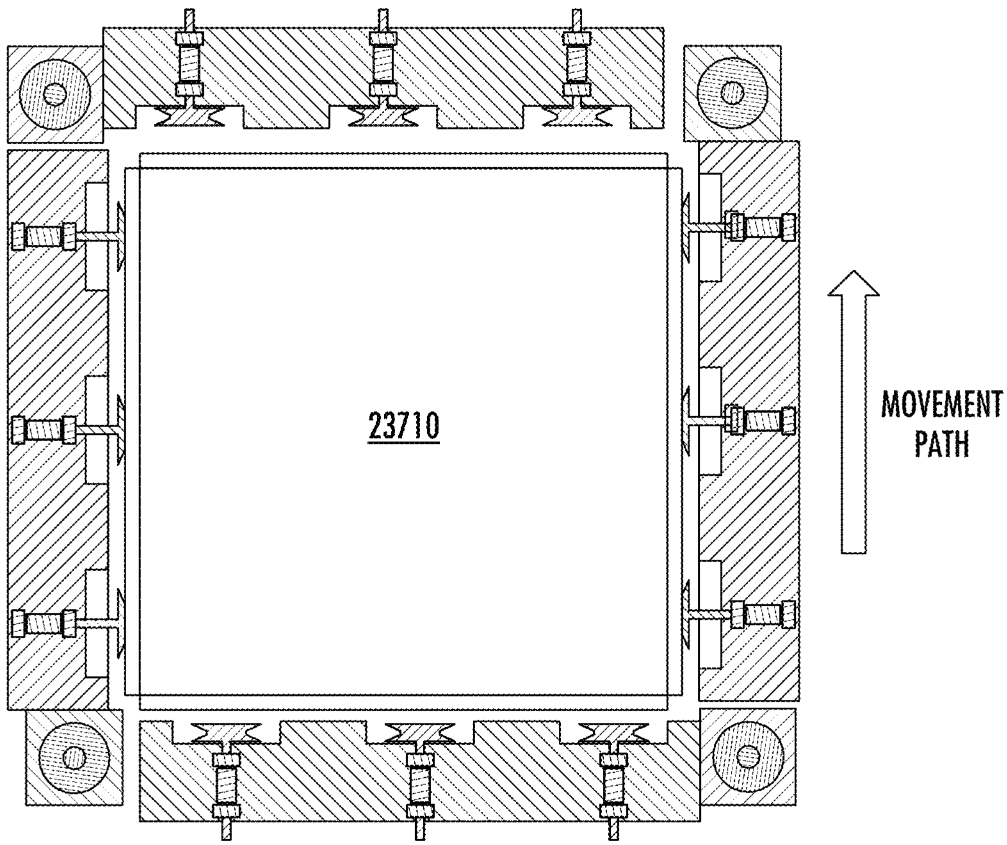
Figure 237B:
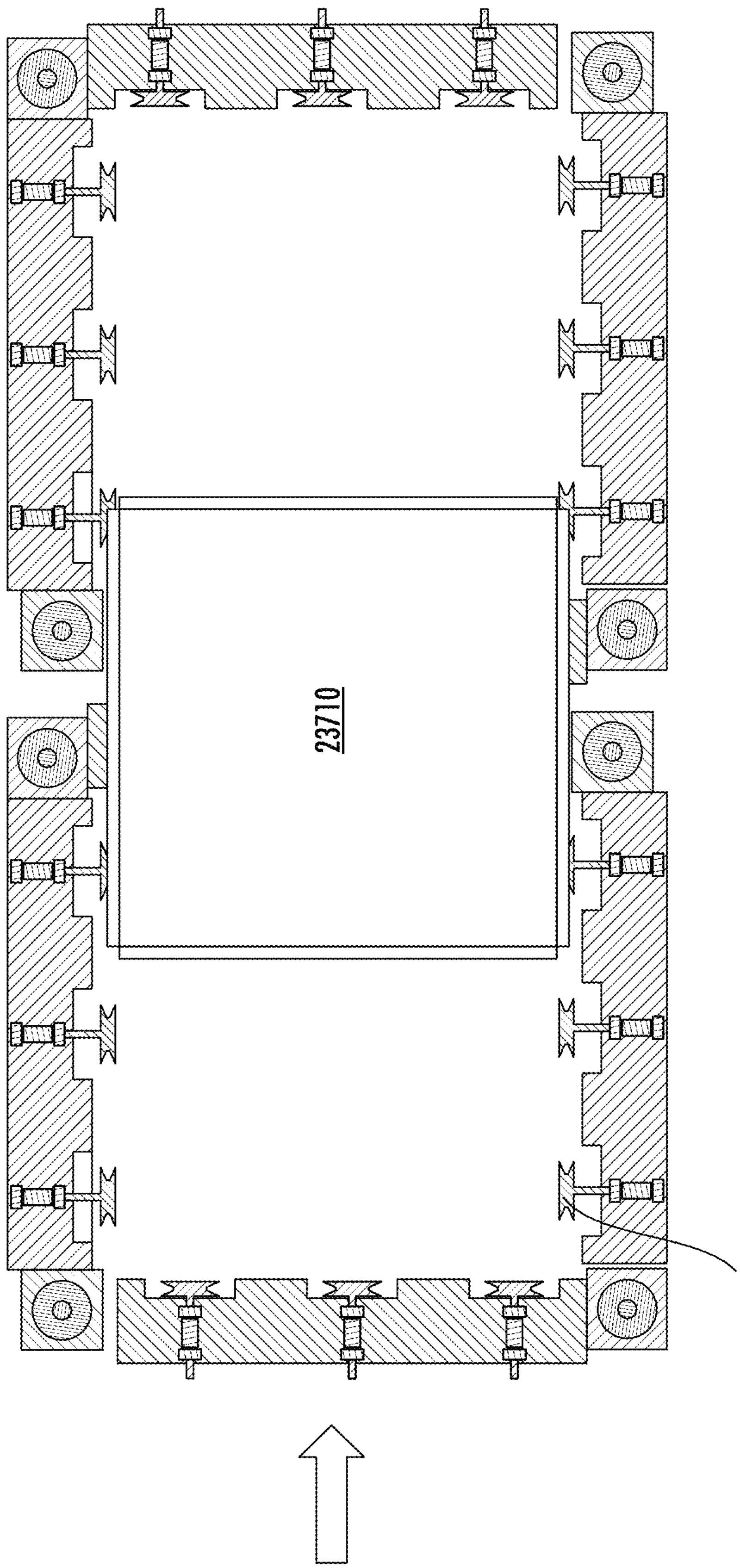

FIG. 237A and FIG. 237B illustrate example movements associated with example rectangular prisms within example smart racks in accordance with some embodiments of the present disclosure.

Figure 238:
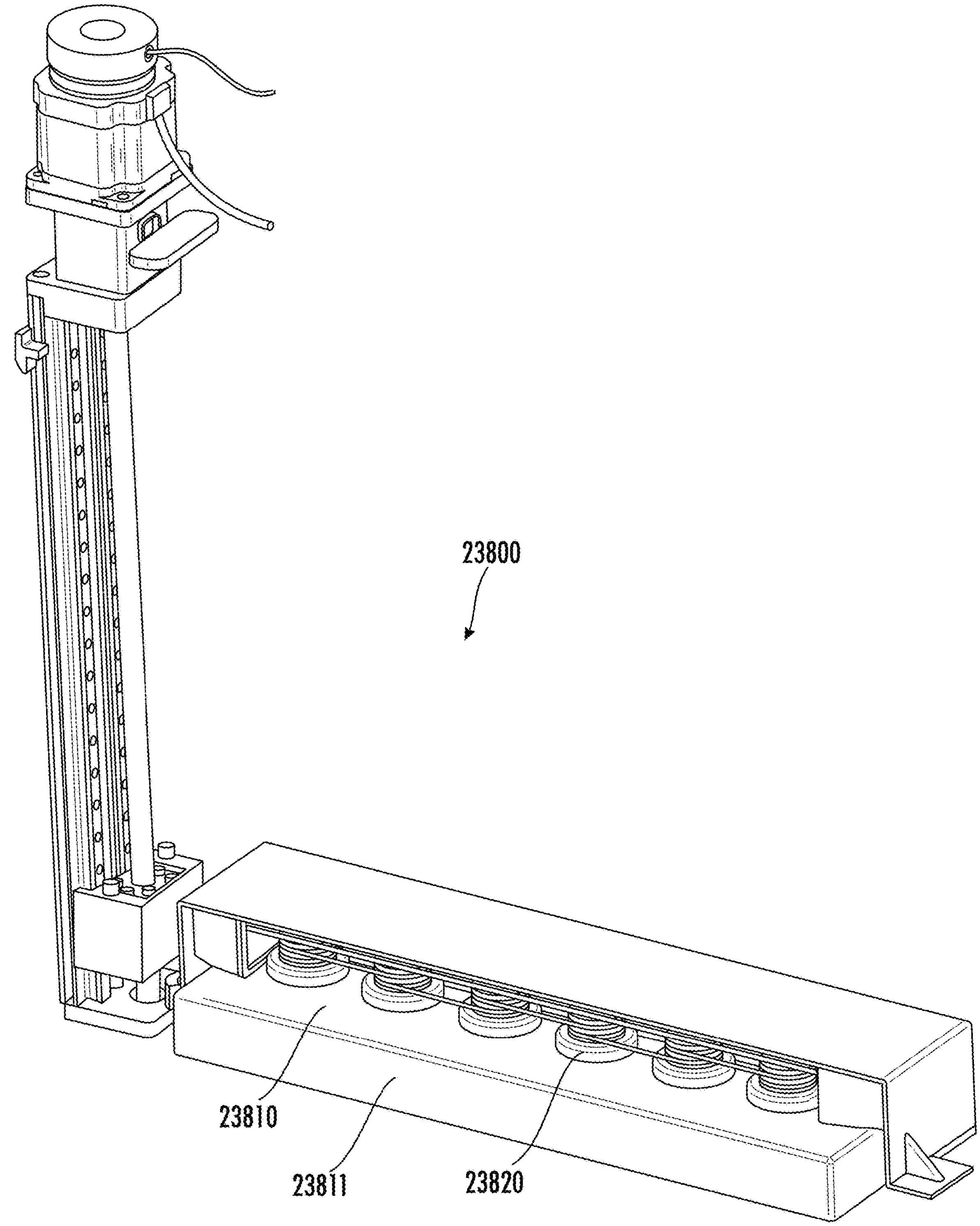

FIG. 238 illustrates example portions associated with an example smart rack in accordance with some embodiments of the present disclosure.

Figure 239A:
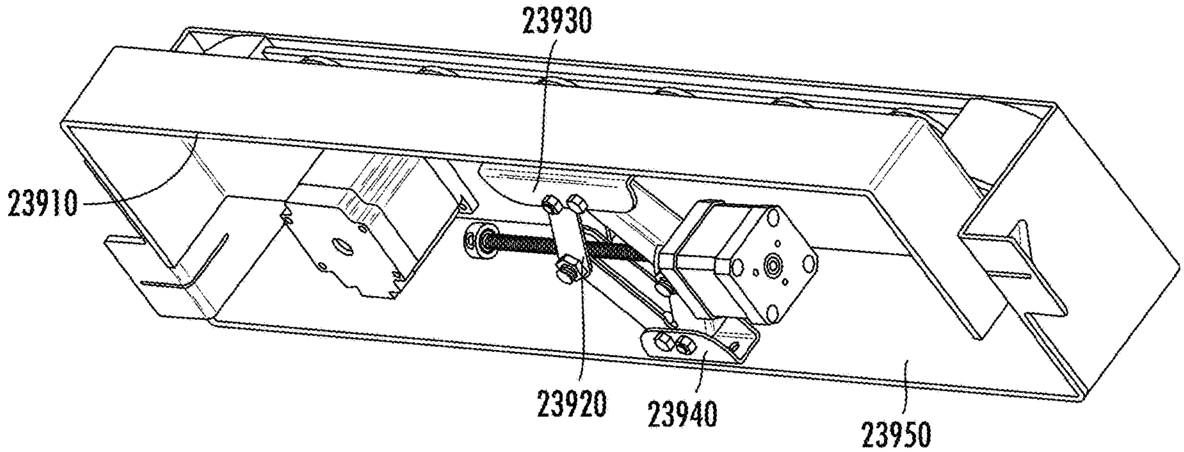
Figure 239B:
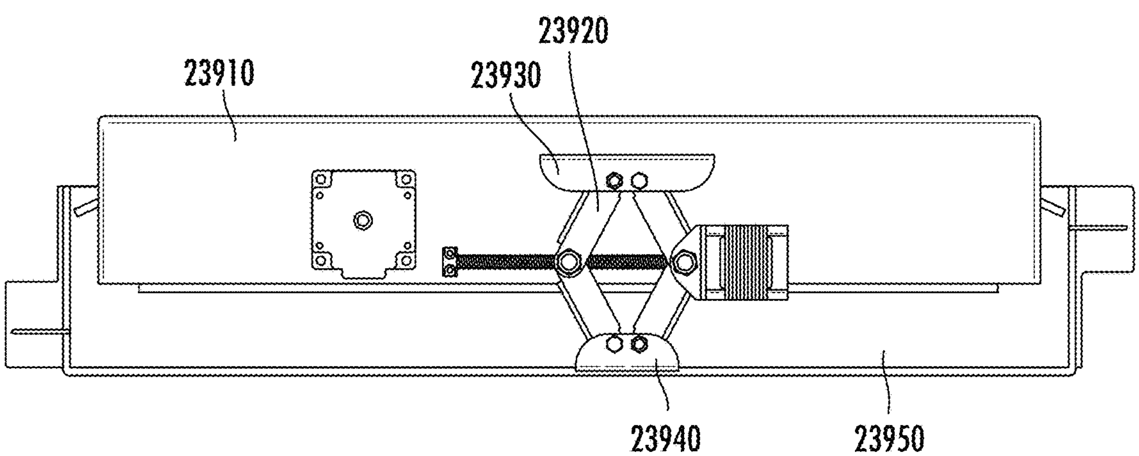

FIG. 239A and FIG. 239B illustrate example views associated with retractable arms in accordance with some embodiments of the present disclosure.

Figure 240:
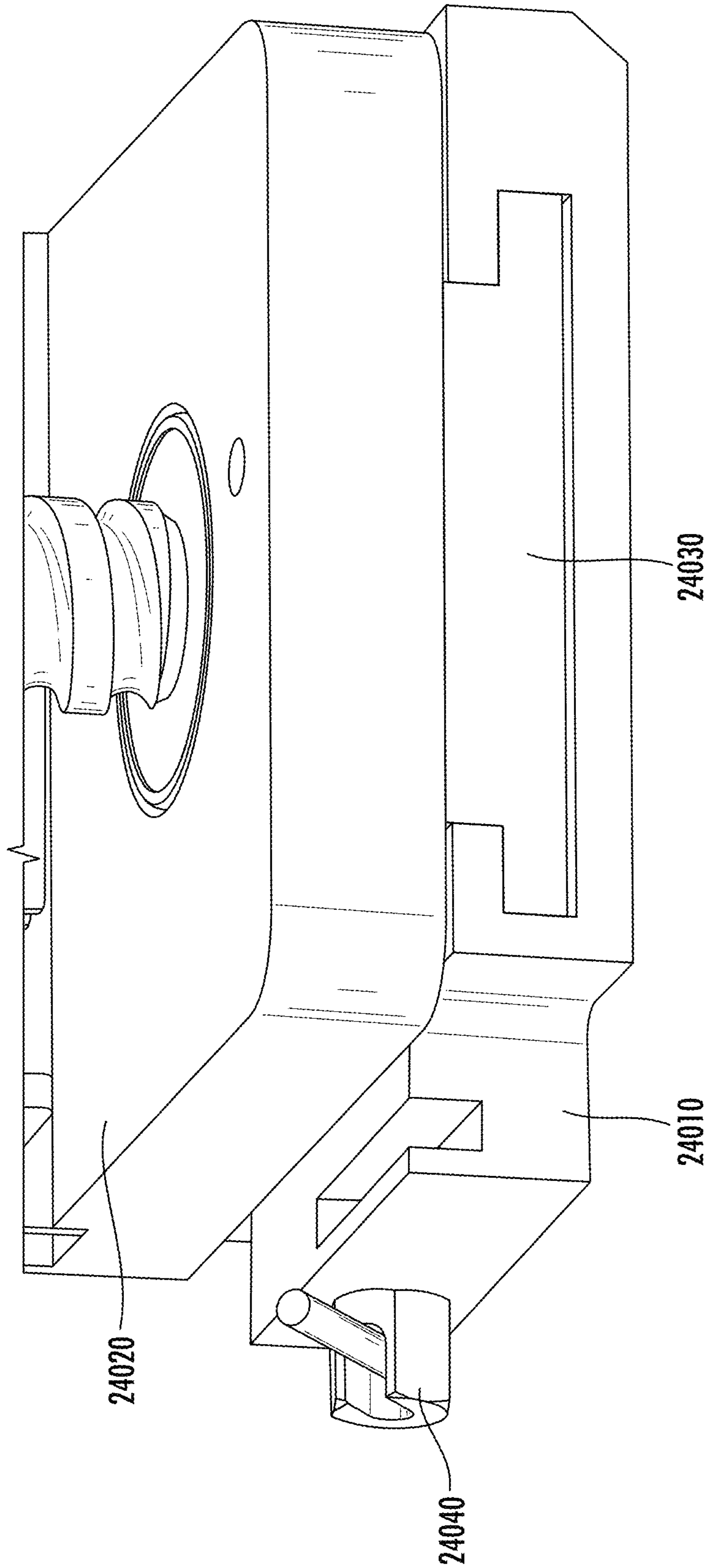

FIG. 240 illustrates an example portion associated with an example lead screw secured to an example smart rack in accordance with some embodiments of the present disclosure.

Figure 241:
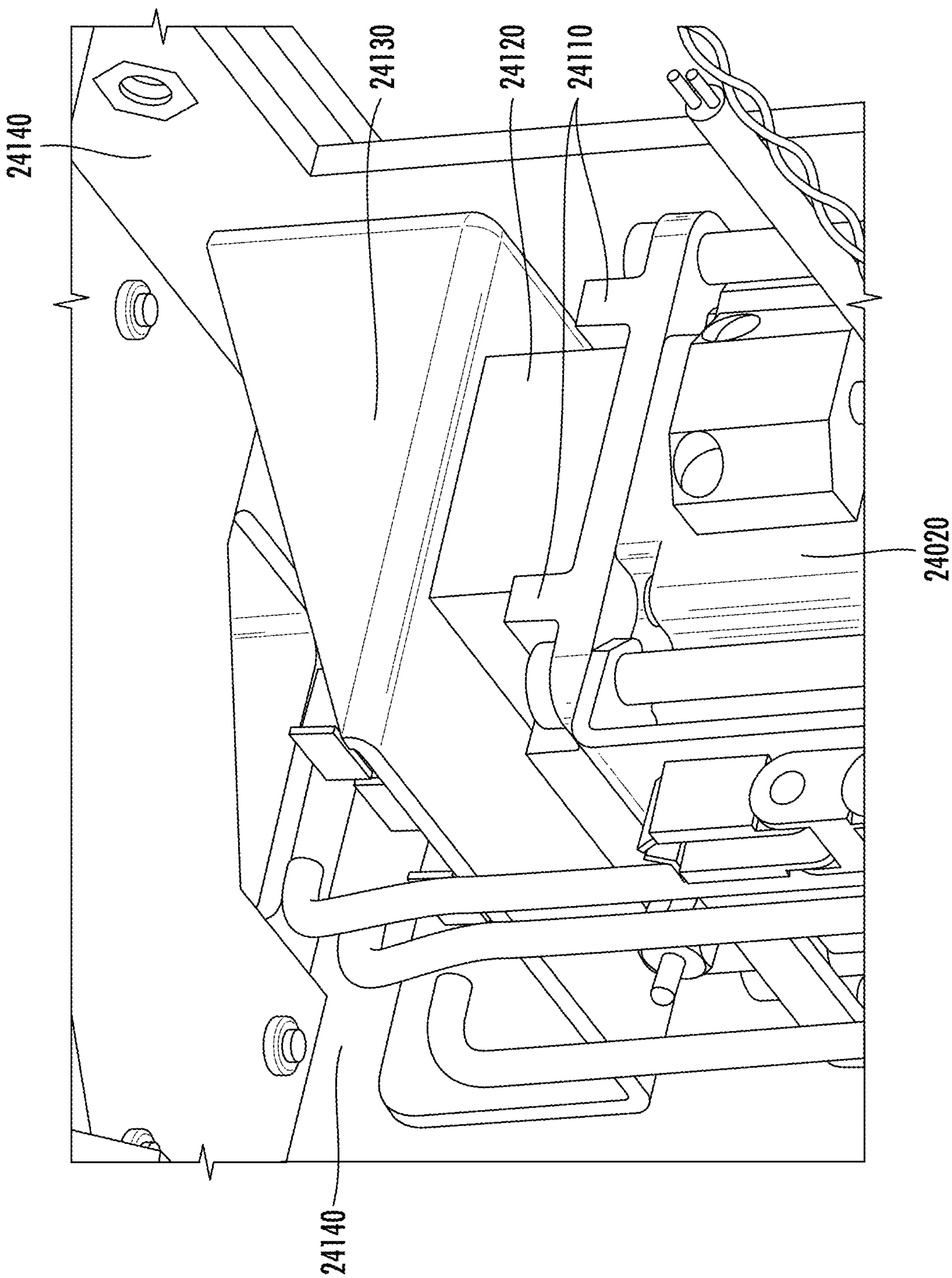

FIG. 241 illustrates an example portion associated with an example lead screw secured to an example smart rack in accordance with some embodiments of the present disclosure.

Figure 242A:
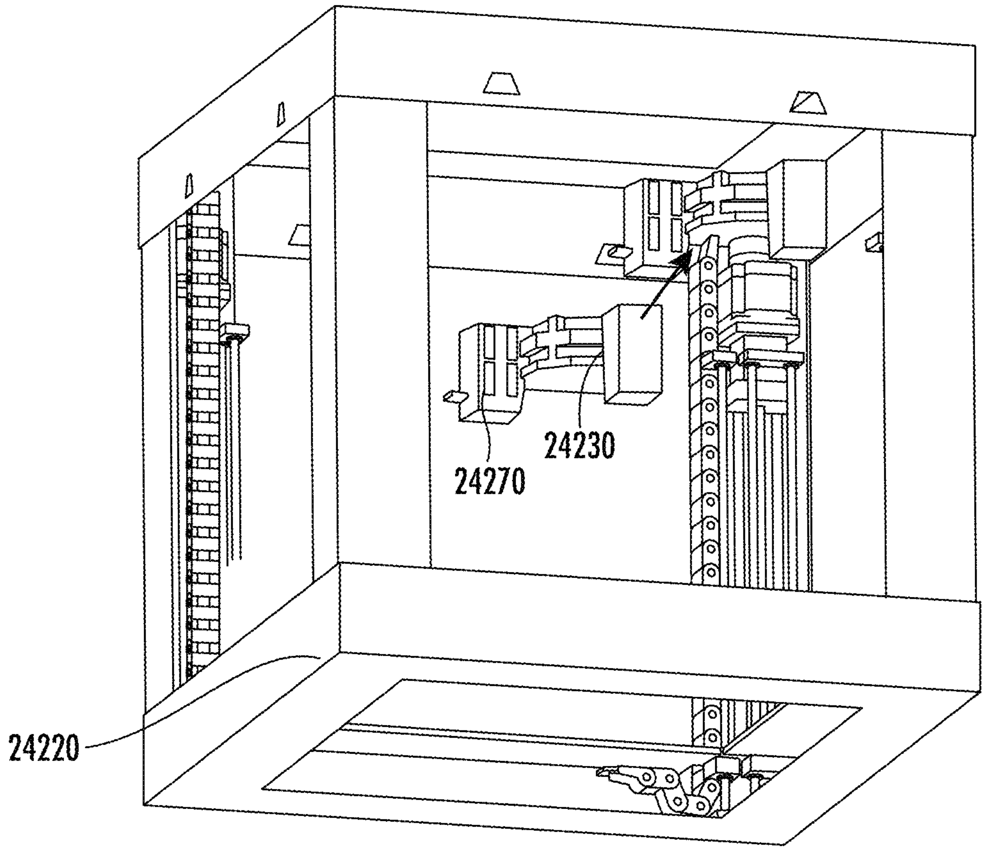
Figure 242B:
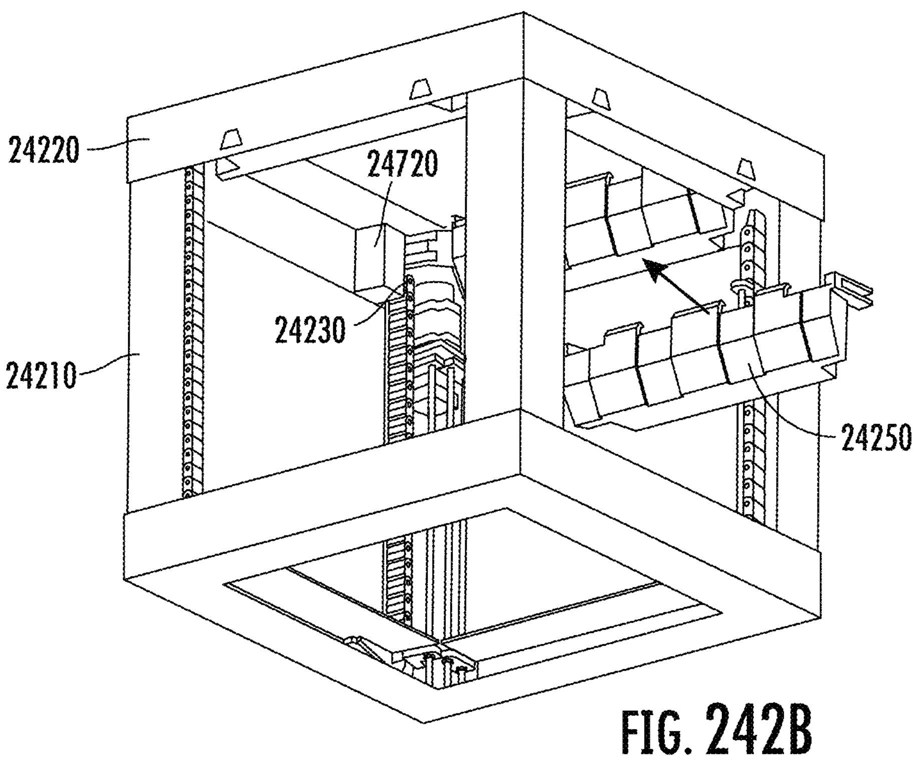
Figure 242C:
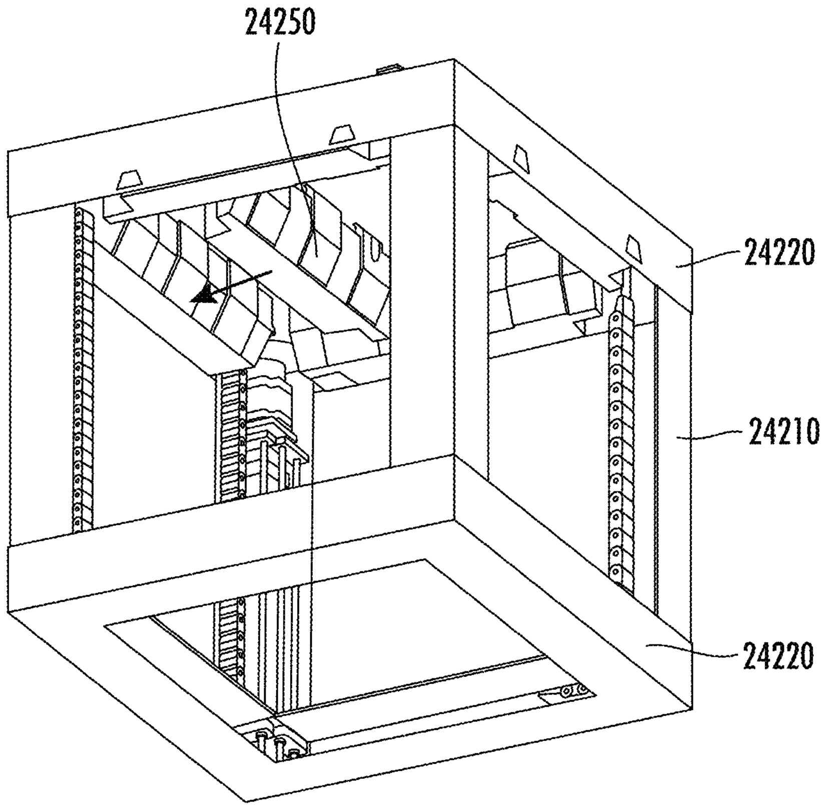

FIG. 242A, FIG. 242B, and FIG. 242C illustrate example methods associated with installing an example conner hub and example brainboxes to an example smart rack in accordance with some embodiments of the present disclosure.

Figure 243:
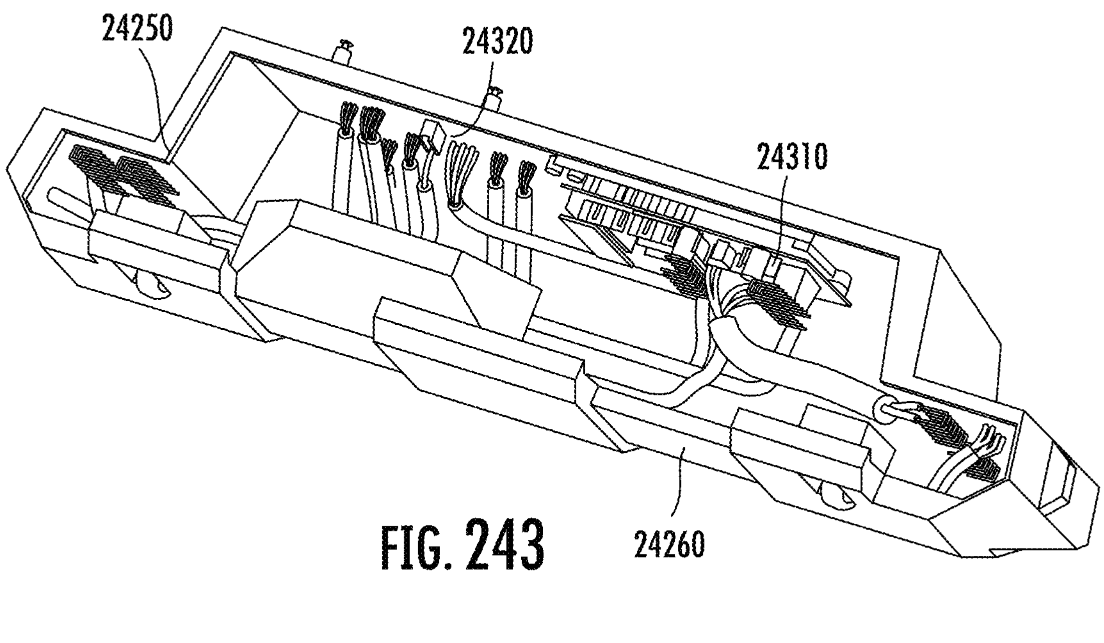

FIG. 243 illustrates an example view associated with an example brainbox in accordance with some embodiments of the present disclosure.

Figure 244A:
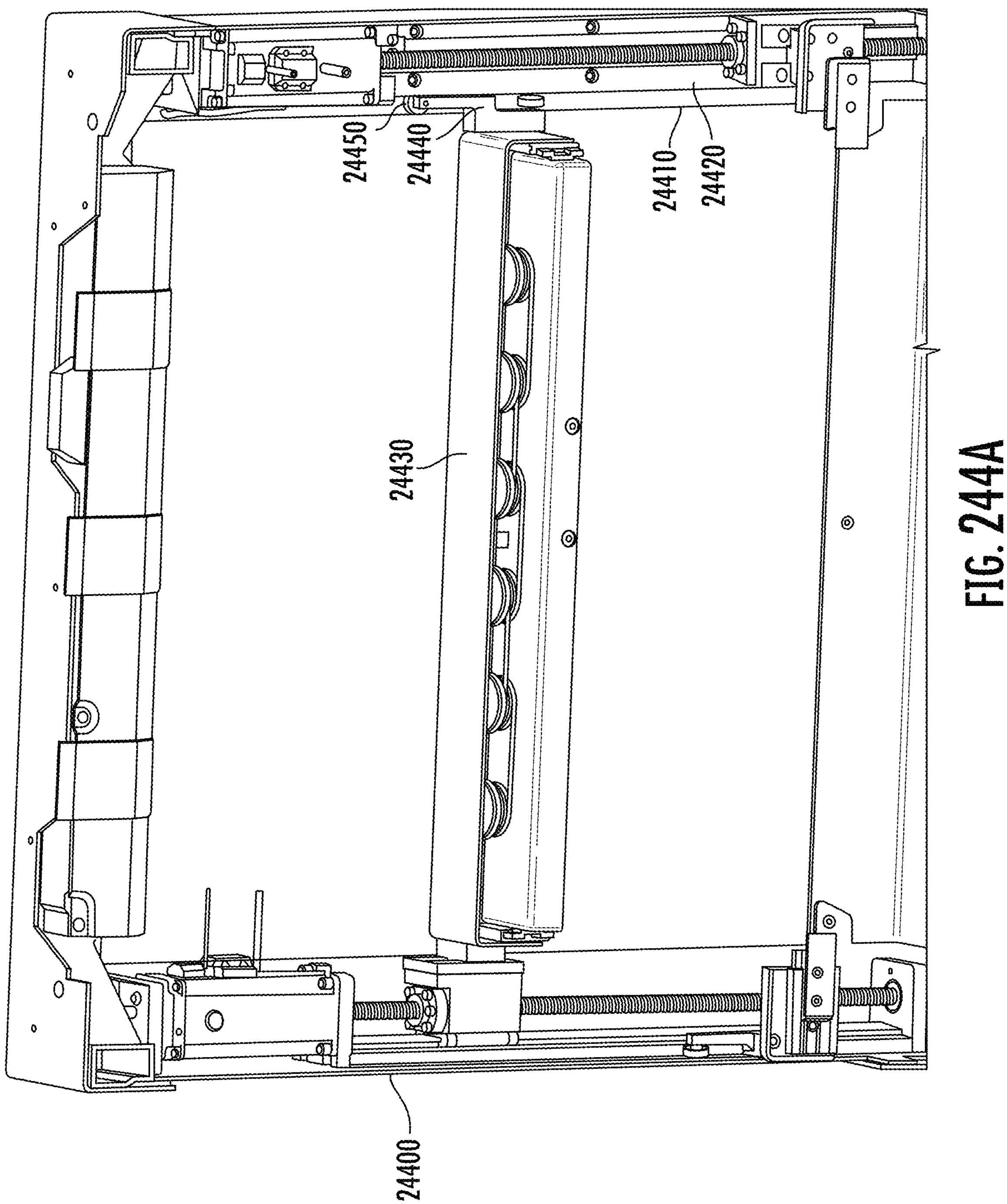

FIG. 244A illustrates an example view associated with an example retractable arm slidably secured to an example smart rack in accordance with some embodiments of the present disclosure.

Figure 244B:
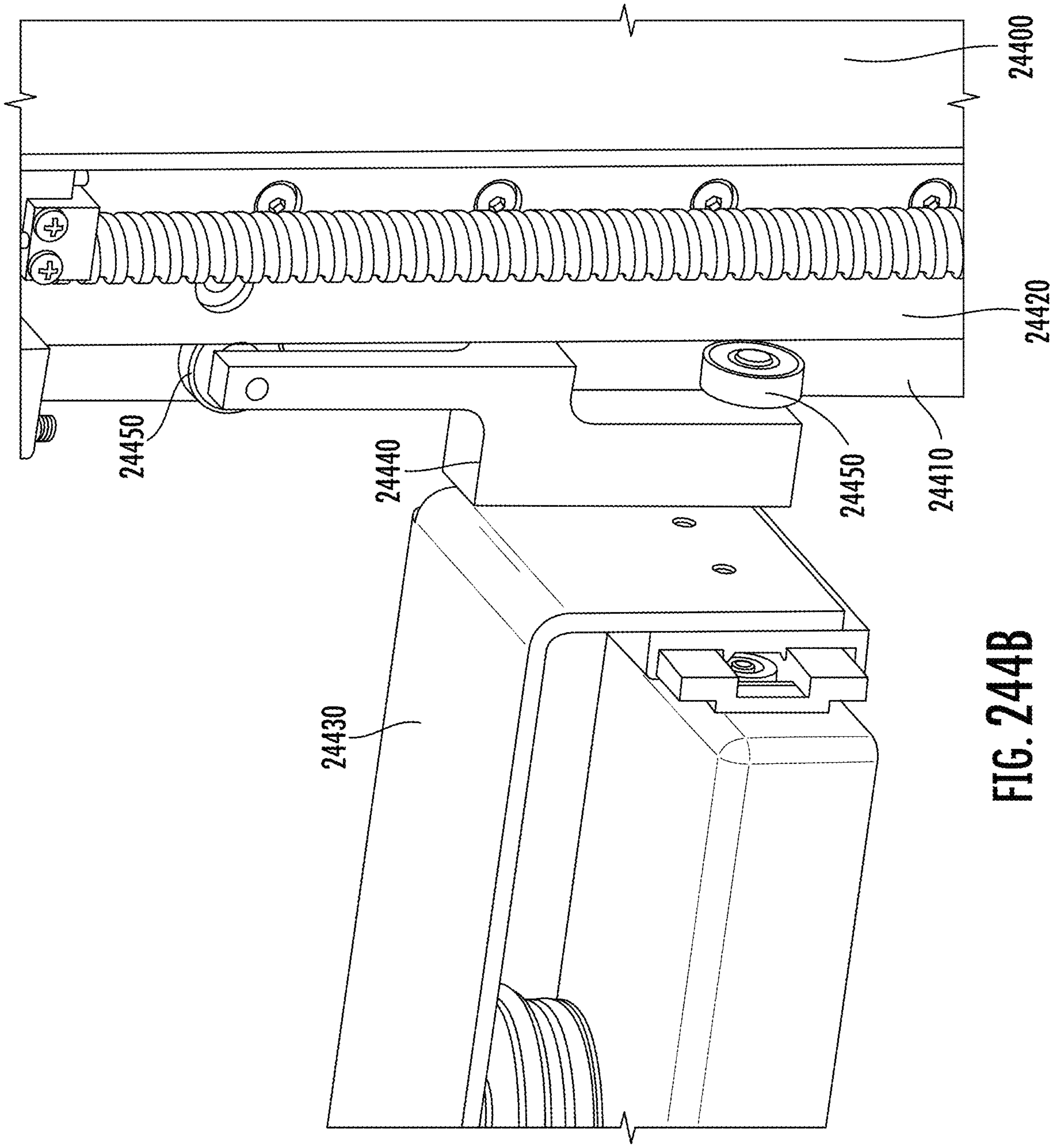

FIG. 244B illustrates an example zoomed view of an example retractable arm slidably secured to an example smart rack in accordance with some embodiments of the present disclosure.

Figure 244C:
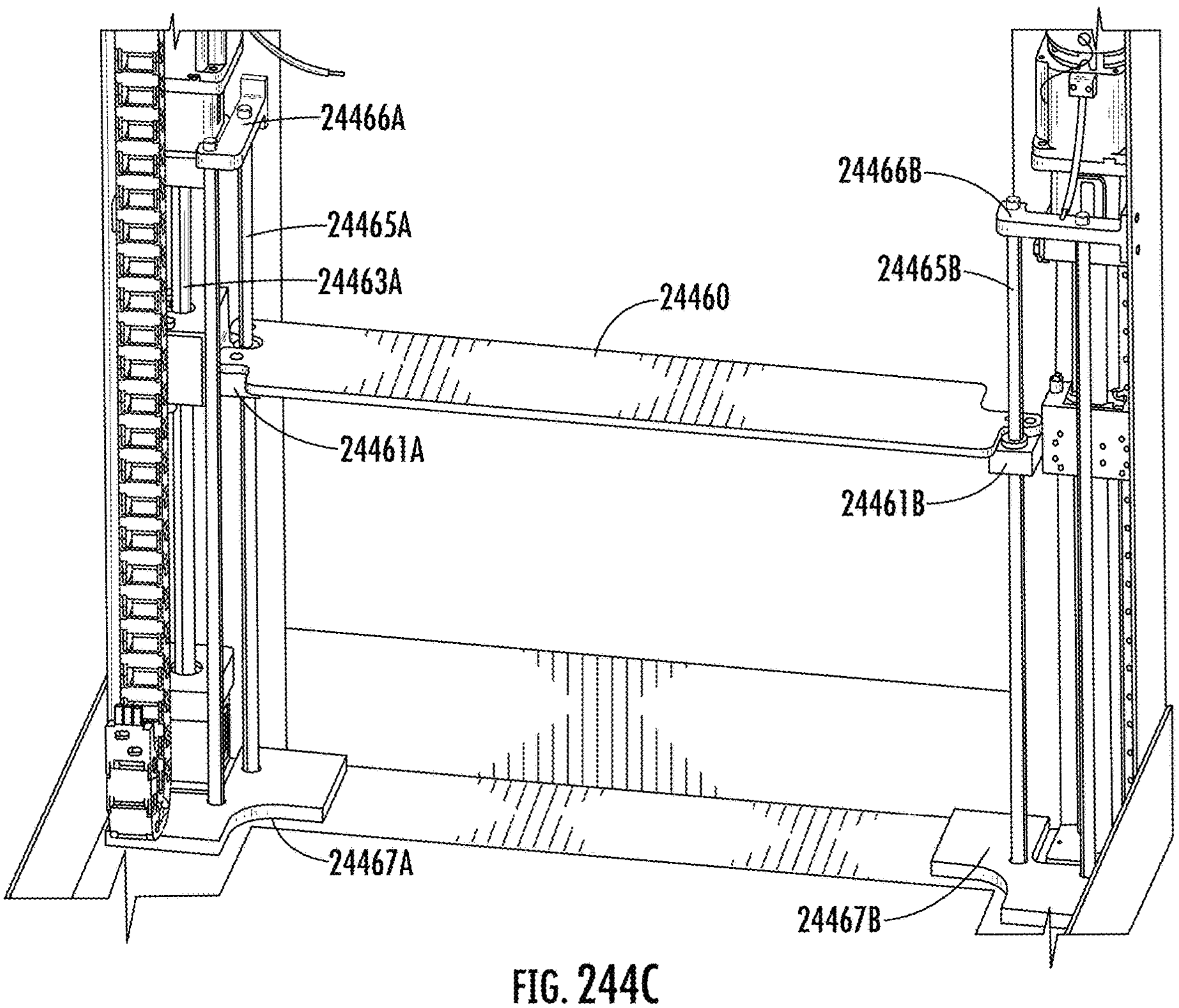

FIG. 244C illustrates an example zoomed view of another example retractable arm slidably secured to an example smart rack in accordance with some embodiments of the present disclosure.

Figure 245:
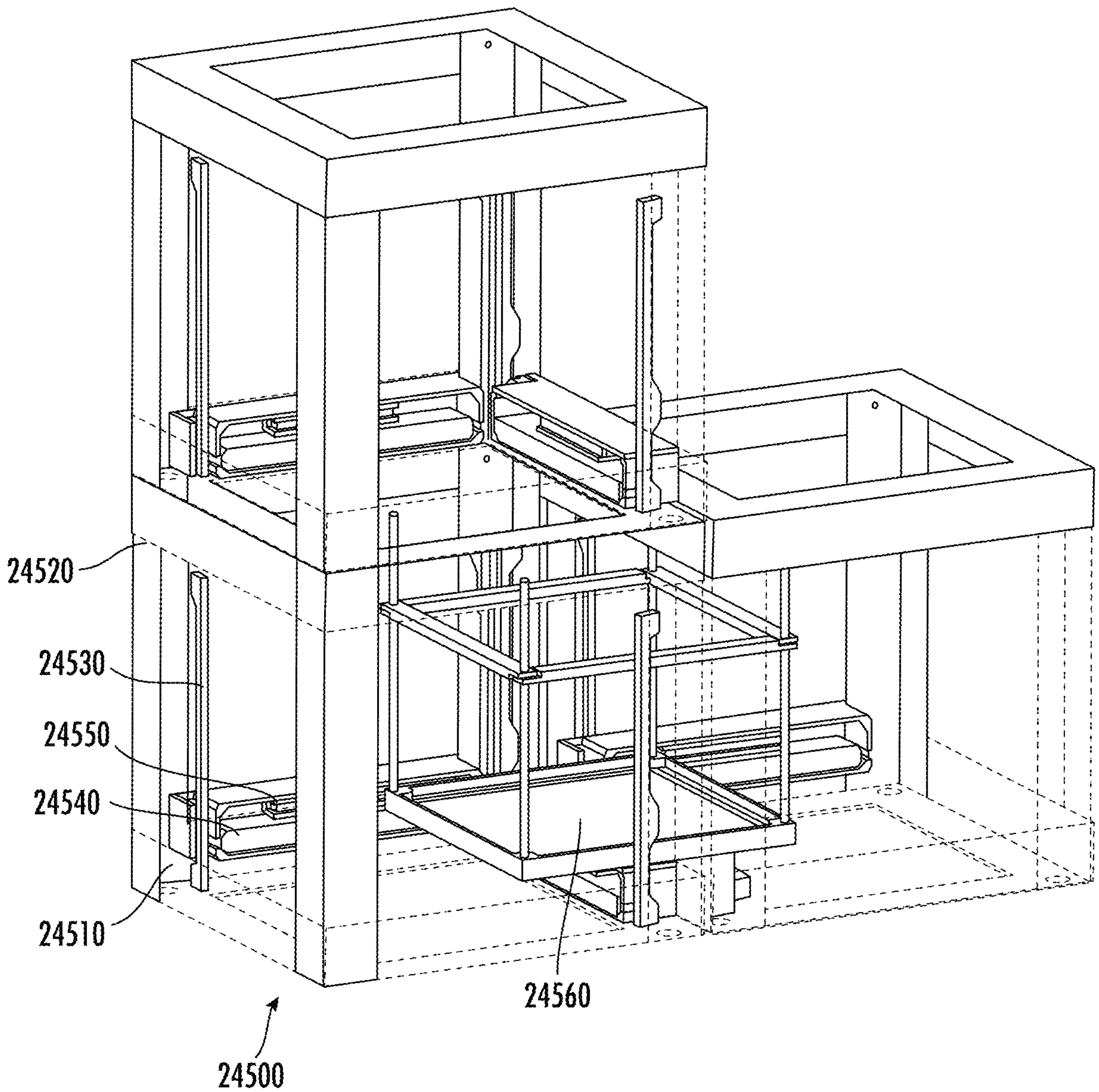

FIG. 245 illustrates an example view associated with an example modular superstructure in accordance with some embodiments of the present disclosure.

Figure 246:
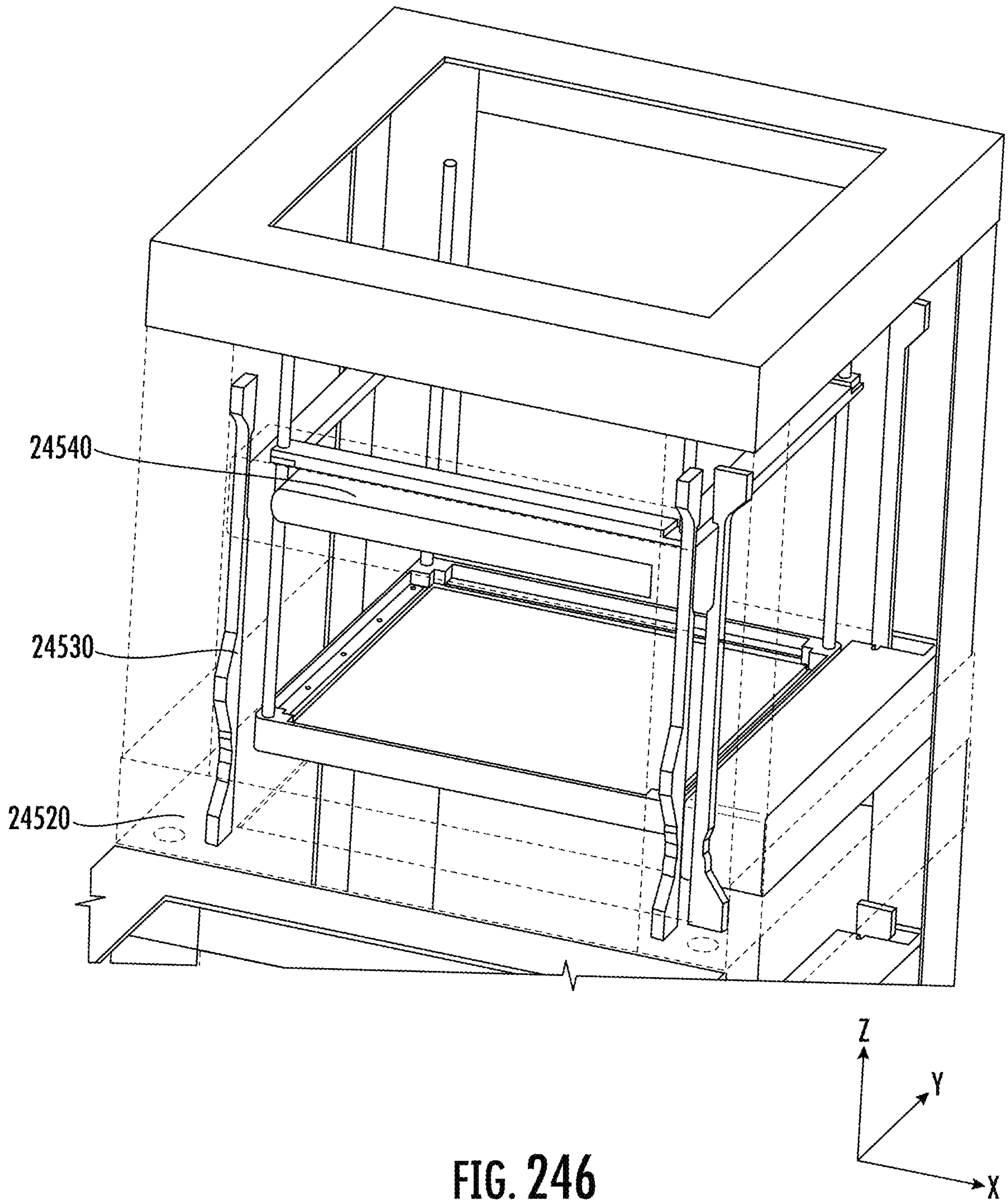

FIG. 246 illustrates an example view associated with an example smart rack in an example modular superstructure in accordance with some embodiments of the present disclosure.

Figure 247:
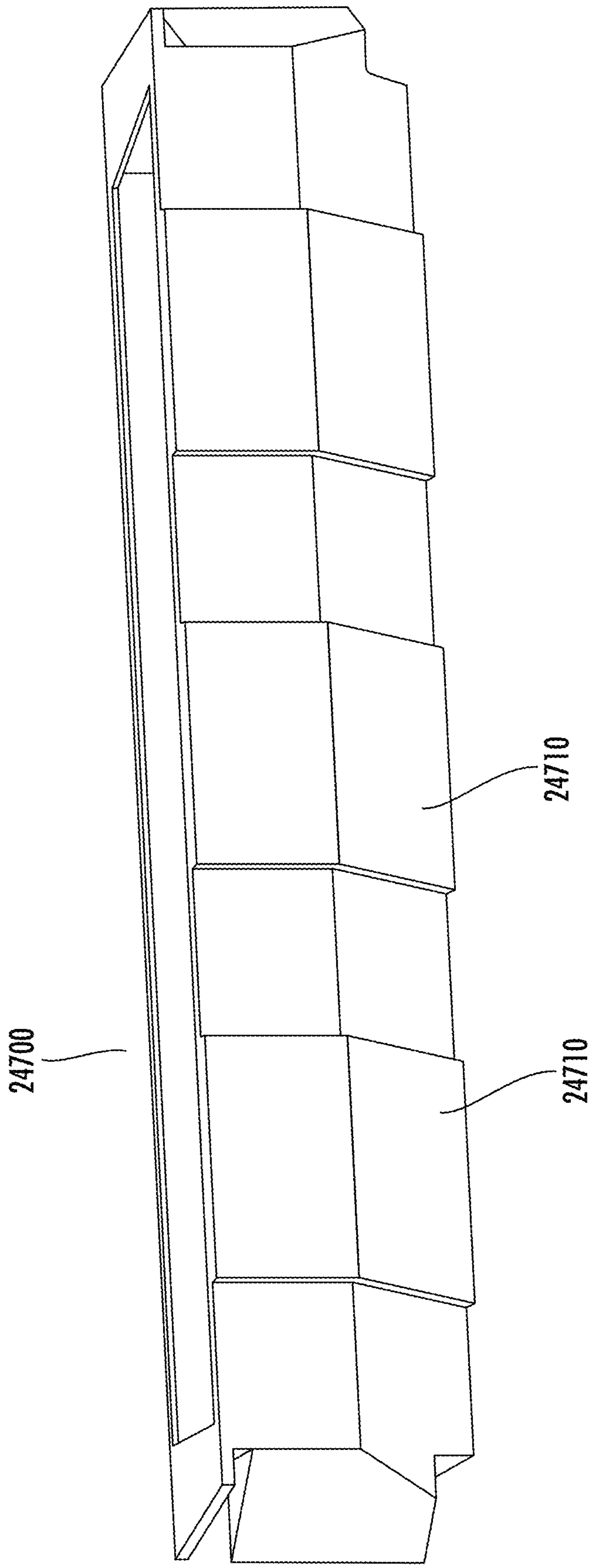

FIG. 247 illustrates an example view associated with an example brainbox in accordance with some embodiments of the present disclosure.

Figure 248:
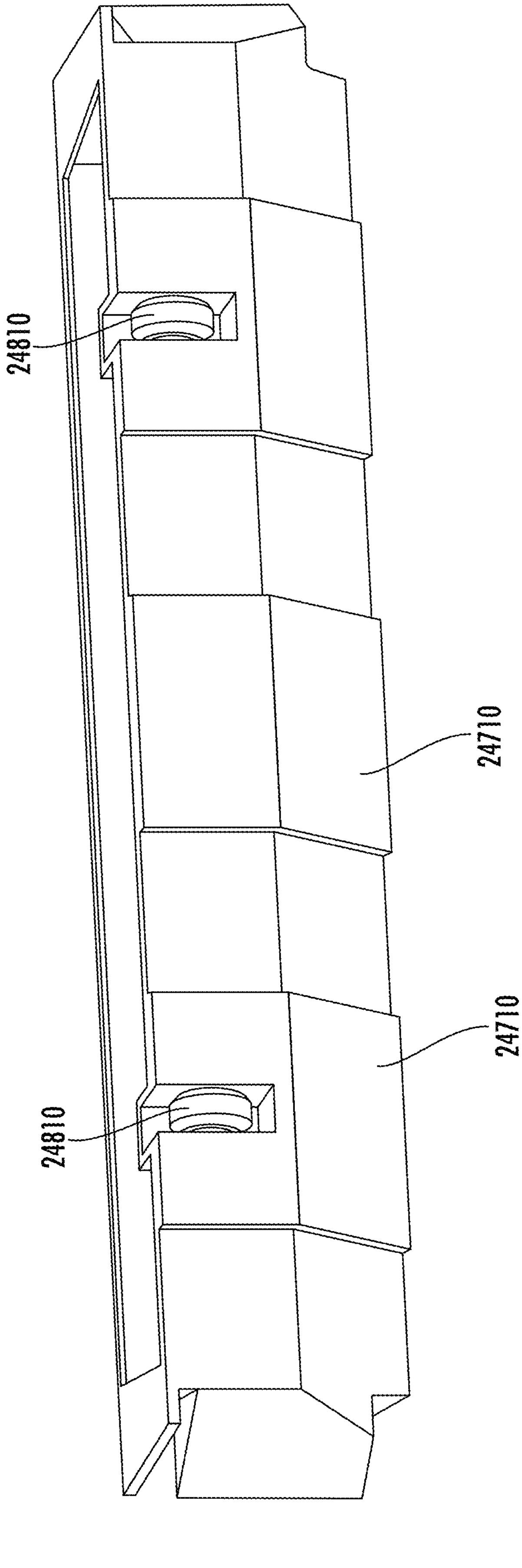

FIG. 248 illustrates an example view associated with an example brainbox in accordance with some embodiments of the present disclosure.

Figure 249A:
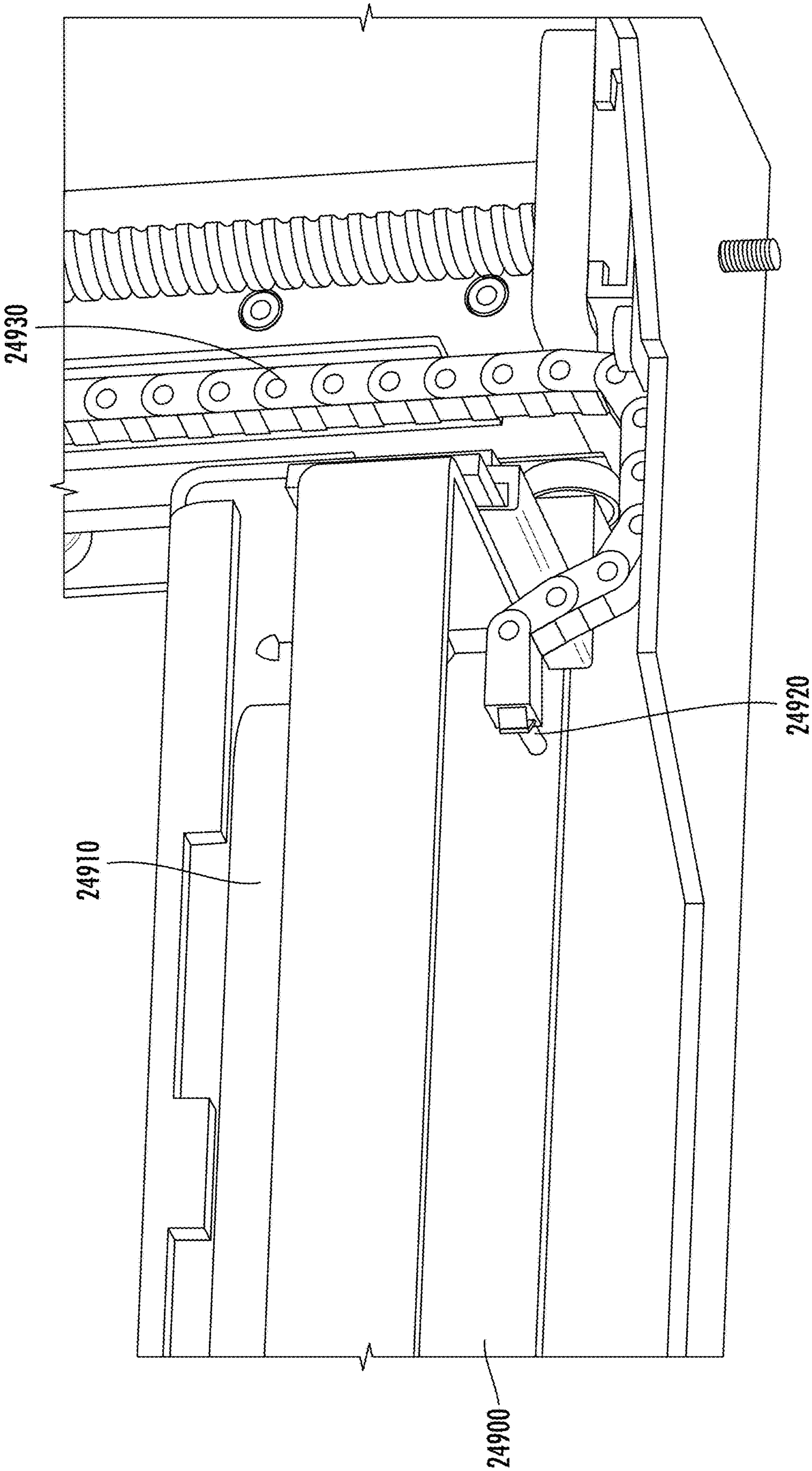

FIG. 249A illustrates an example portion of an example smart rack (including an example retractable arm) in accordance with some embodiments of the present disclosure.

FIG. 249B illustrates an example portion of an example smart rack (including an example retractable arm) in accordance with some embodiments of the present disclosure.

Figure 250A:
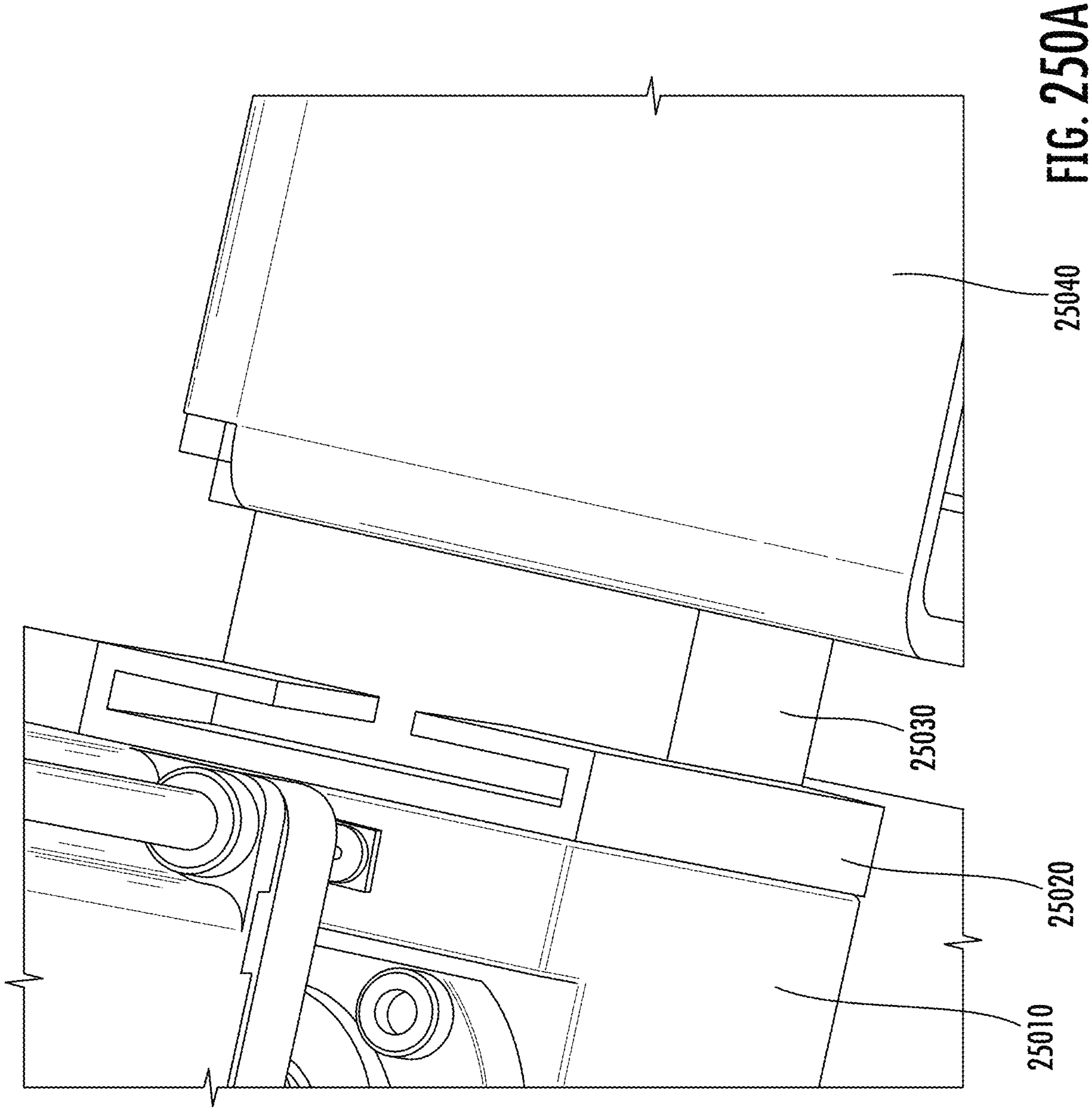

FIG. 250A illustrates an example connection between an example lead screw and an example arm assembly in accordance with some embodiments of the present disclosure.

Figure 250B:
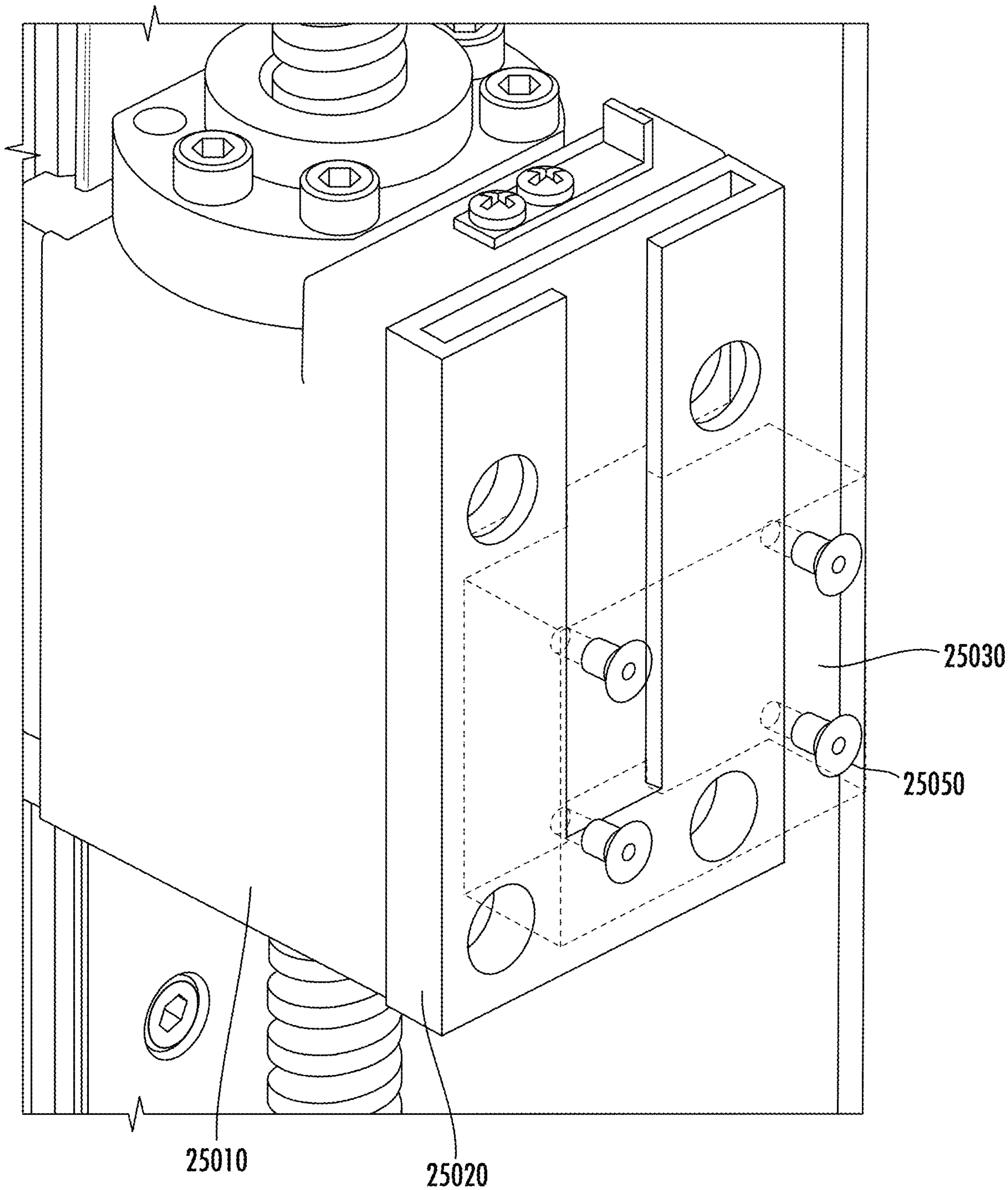

FIG. 250B illustrates an example connection between an example lead screw and an example arm assembly in accordance with some embodiments of the present disclosure.

Figure 251A:
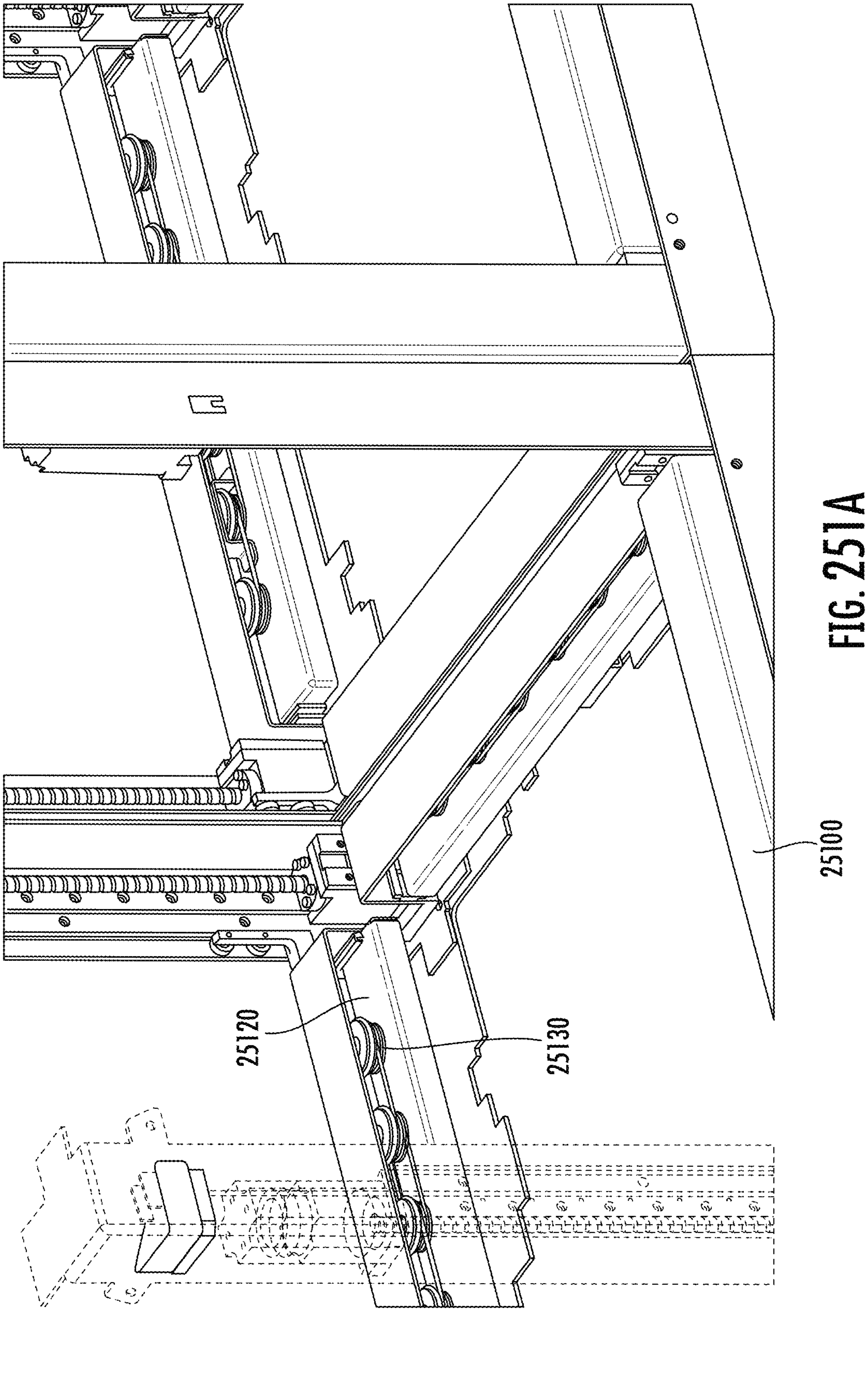

FIG. 251A illustrates example retractable arm assemblies in example smart racks in accordance with some embodiments of the present disclosure.

Figure 251B:
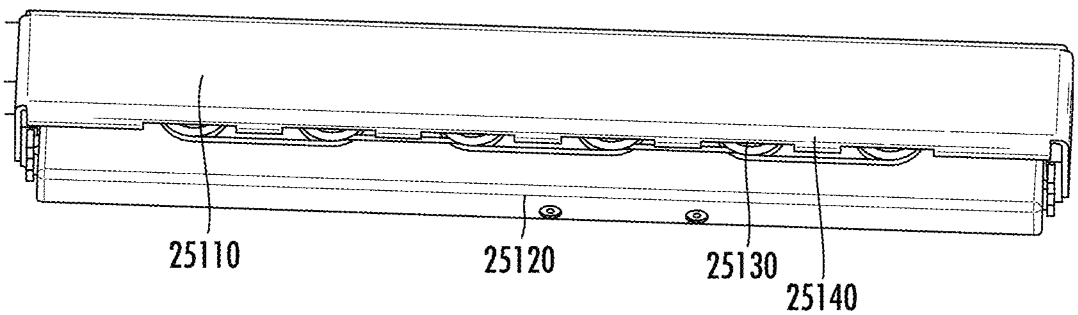
Figure 251C:
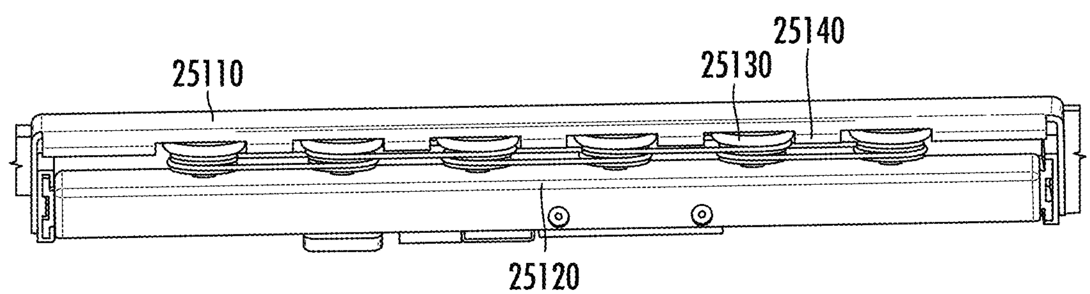
Figure 251D:
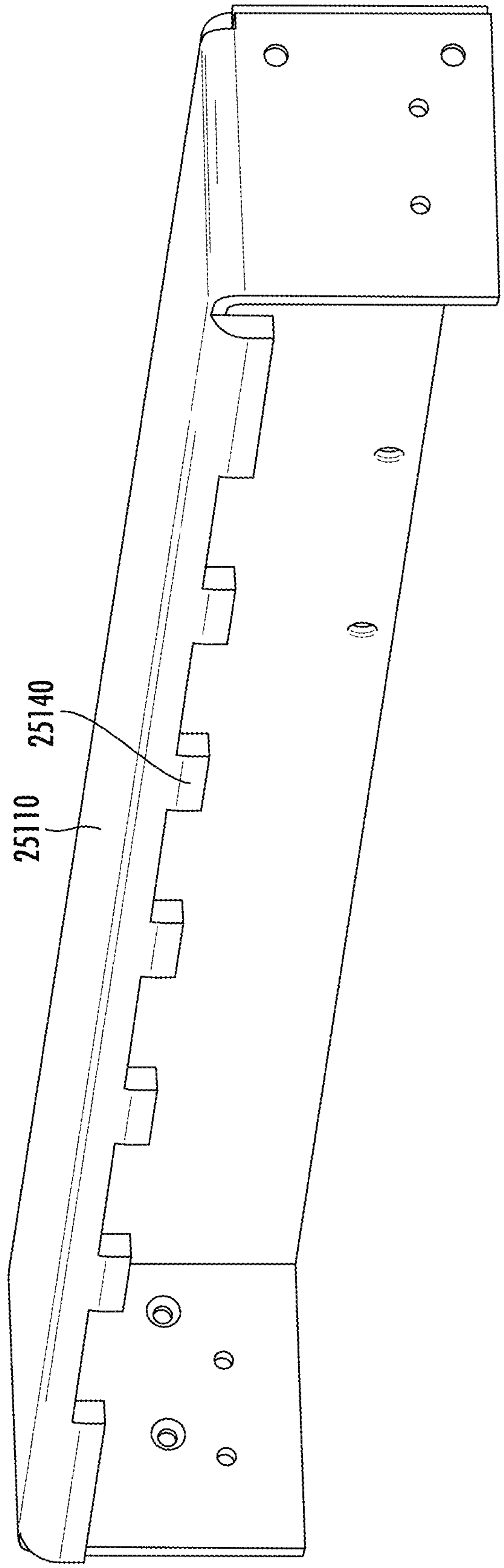

FIG. 251B, FIG. 251C, and FIG. 251D illustrate example views associated with an example retractable arm assembly in accordance with some embodiments of the present disclosure.

Figure 252A:
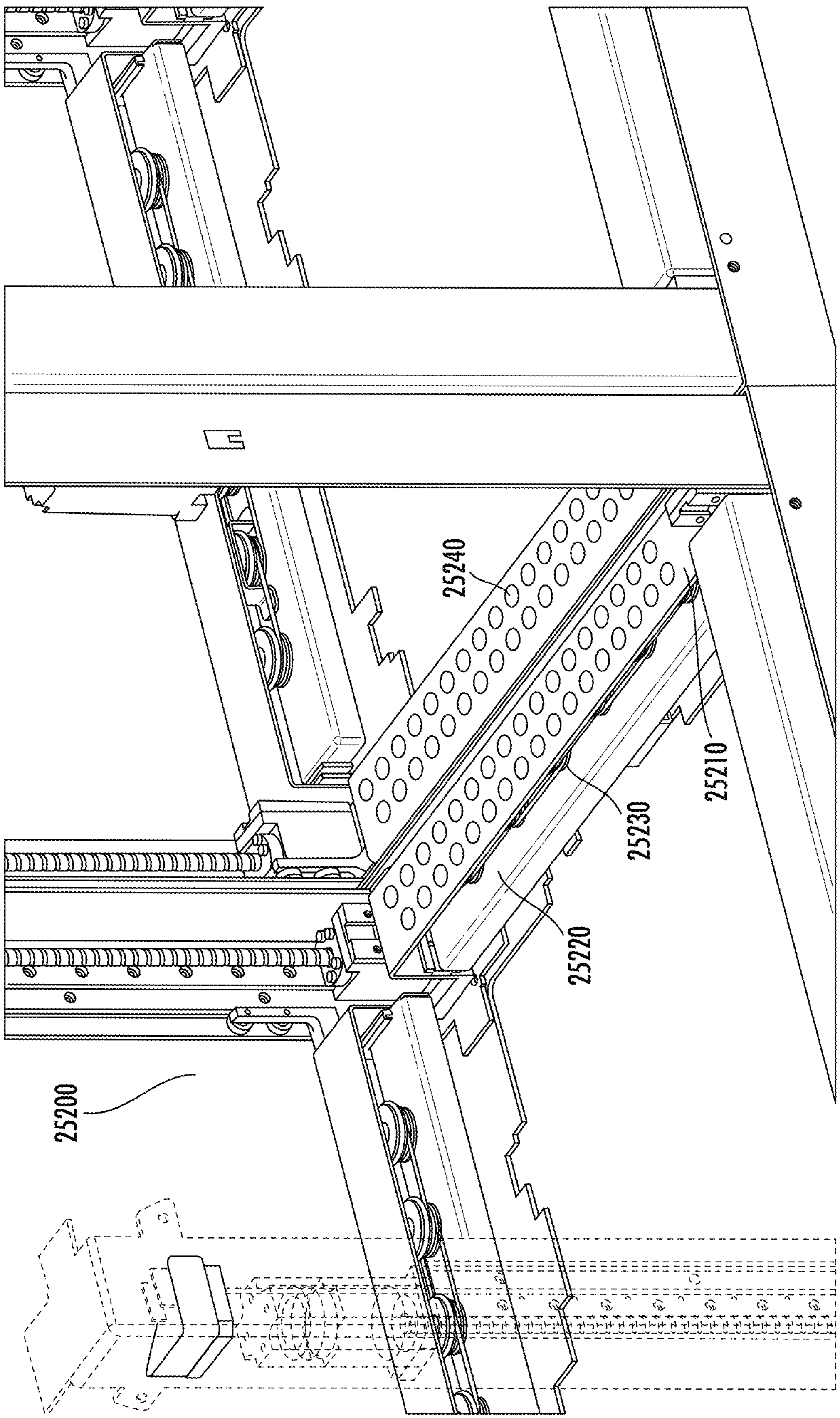

FIG. 252A illustrates example retractable arm assemblies in example smart racks in accordance with some embodiments of the present disclosure.

Figure 252B:
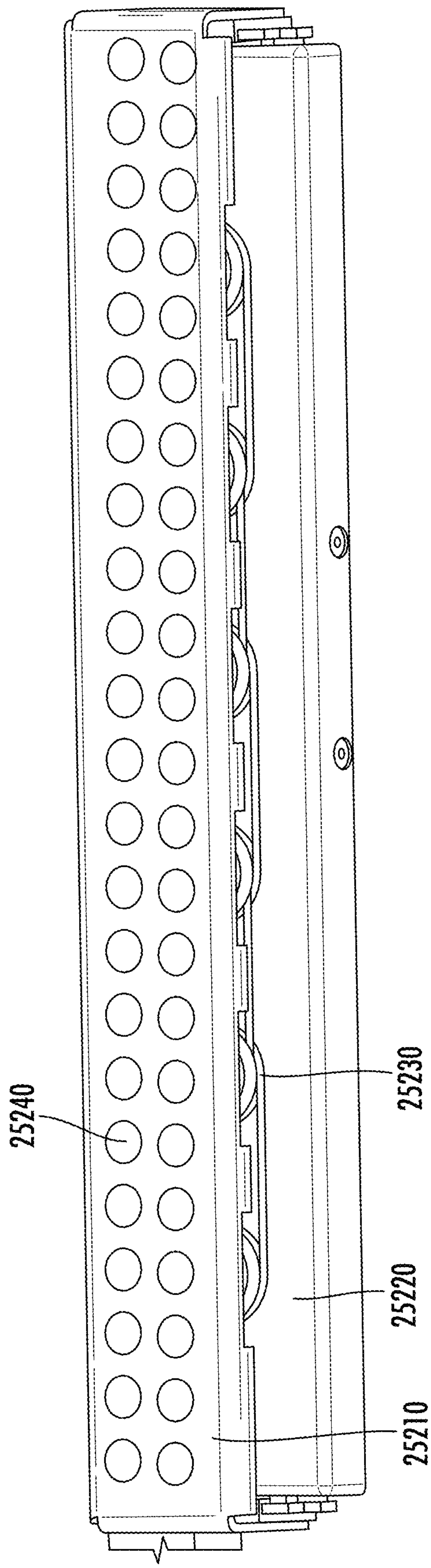

FIG. 252B illustrates an example view associated with an example retractable arm assembly in accordance with some embodiments of the present disclosure.

Figure 253:
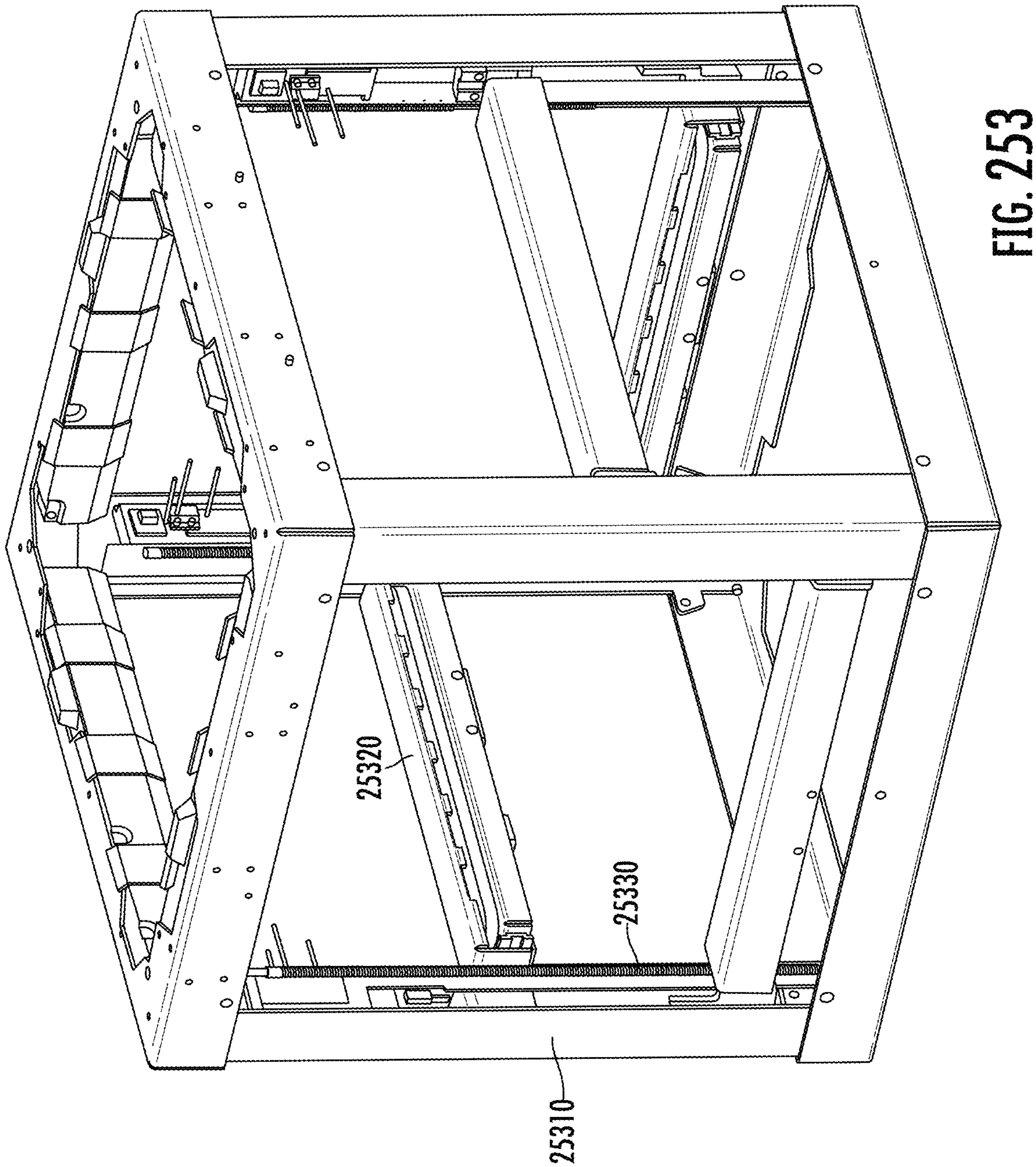

FIG. 253 illustrates an example view associated with an example smart rack in accordance with some embodiments of the present disclosure.

Figure 254:
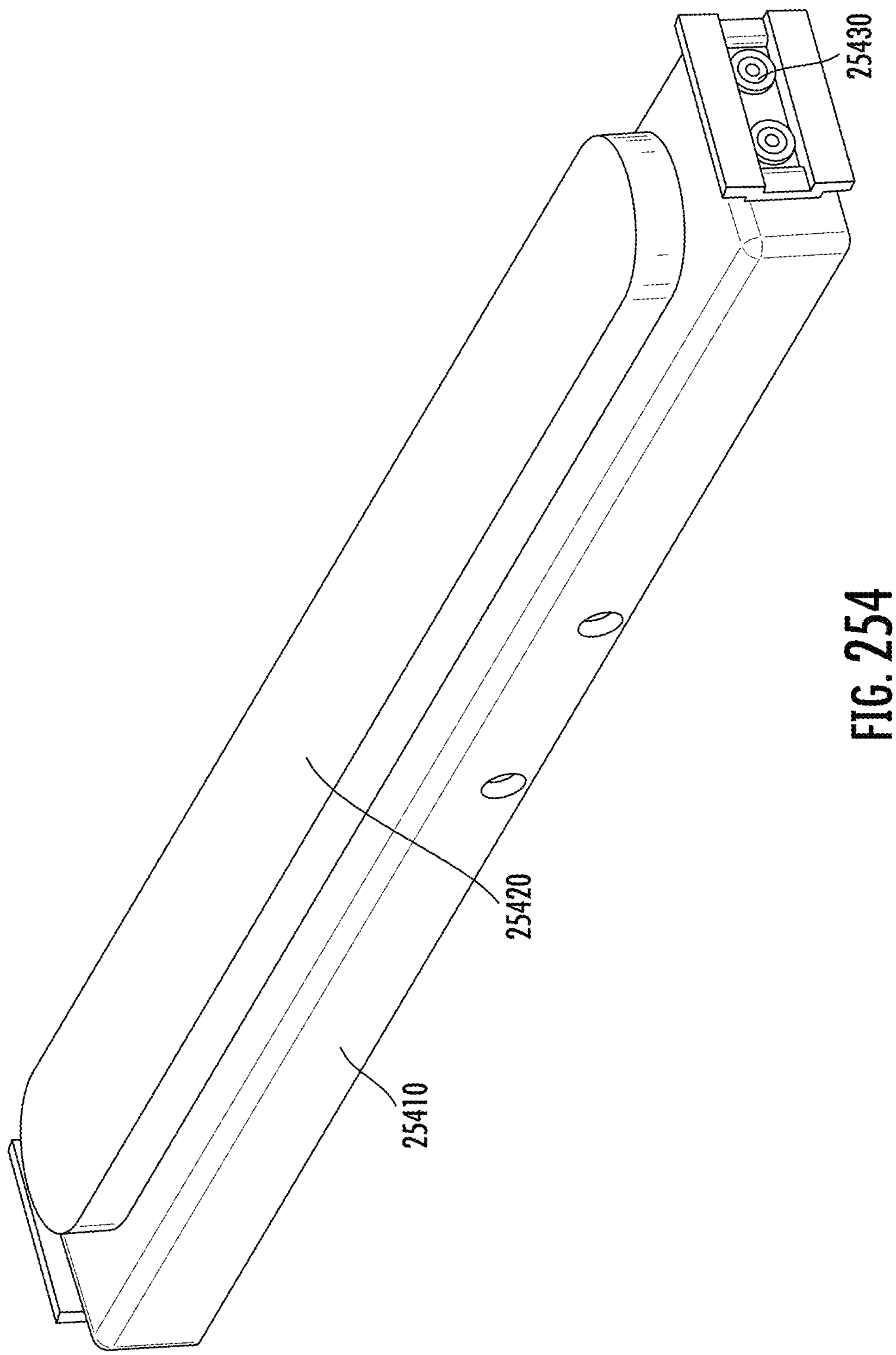

FIG. 254 illustrates an example view associated with an example retractable arm assembly in accordance with some embodiments of the present disclosure.

DETAILED DESCRIPTION OF THE INVENTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "back," "top," "bottom," "left," "right," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

The term "rectangular prism" refers to a container of any geometry, preferably rectangular, that is configured to hold or otherwise retain goods, items, stock keeping units, or the like. In some examples, a rectangular prism may be any type of container used, such as a carton, a case, a tote, a divided tote, a tray, a pallet, or the like. In some embodiments, an example rectangular prism may comprise material such as plastic, silicone, and/or the like.

The term "target rectangular prism" refers to a current, selected, or otherwise identified rectangular prism that is to be moved. For example, a "target rectangular prism" may be identified as the rectangular prism that is to be moved forward, back, left, right, up, or down.

The term "tote plan" refers to one or more instructions that cause the movement of one or more rectangular prisms. In some examples, the tote plan may include a movement instruction to a first smart rack (or its related processing circuitry) to move a rectangular prism to a second smart rack. Alternatively or additionally, the tote plan may provide movement instructions that cause one or more smart racks to move a rectangular prism, such as a target rectangular prism, to an egress point. In some examples, the tote plan may be the result of one or more algorithms discussed herein and may take the form of a text file, a JSON file, or the like.

The term "smart rack" refers to a component of the modular superstructure that is configured to store a rectangular prism and/or to cause the movement of the rectangular prisms within the modular superstructure. In some embodiments, an example smart rack provides a modular square or rectangle rack that provides structure, power, control, and/or mechanical movements of one or more rectangular prisms. For example, an example smart rack comprises an example rack frame and a plurality of rack actuators, details of which are described herein.

The term "peer smart rack" of a smart rack is defined as another smart rack that is secured to, in physical connection with, or is otherwise linked to the smart rack. In some embodiments, a processing circuitry of a smart rack may provide direct data communications with peer processing circuitries of peer smart racks through dedicated communication channels (for example, input/output (I/O) channels), details of which are described herein.

The term "behavior data" refers to electronically managed data that represents a state of functionality and/or performable operations of a particular smart rack of a modular superstructure.

The term "best peer rack" refers to a second smart rack connected to a first smart rack that is along a path determined to be associated with minimal cost based on one or more data value(s) associated with said cost.

The term "configuration data" refers to any data that represents the physical structure of a modular superstructure, data property/properties of one or more smart racks or other subunits of the modular superstructure, and/or state(s) of one or more smart racks or other subunits of the modular superstructure.

The term "current tote positions" refers to electronically managed data representing the current smart rack or location of a particular tote in a modular superstructure.

The term "data graph matrix" refers to a directed or undirected graph representation of smart racks in a modular superstructure. In some embodiments, a data graph matrix includes at least a node for each active smart rack in the modular superstructure, with peer smart racks connected via edges.

The term "lowest resistance peer node" refers to a node connected to a particular node that is along a path determined to be associated with a lowest movement resistance value. A lowest resistance peer node corresponds to a best peer rack.

The term "lowest resistance value path" refers to a path traversing through one or more nodes in a graph that is determined to result in the lowest total movement resistance value to traverse from a first, start node to a second, end node.

The term "movement plan" refers to data representing instructions for moving totes in a modular superstructure. In some embodiments, the movement plan includes or is embodied by a tote plan.

The term "movement resistance value" refers to any determinable data value that represents a cost for moving a tote in a particular direction via a smart rack. In some embodiments, a movement resistance value for a particular movement is dependent on an assisting and/or resisting force associated with such a movement (e.g., gravity decreasing a movement resistance value for a downward motion, and/or increasing a movement resistance value for an upwards motion).

The term "peer information" refers to data representing an indication of a second node or second smart rack connected to a first node and/or first smart rack, and/or a movement resistance value associated with traversing from the first node to the second node and/or moving a tote from the first smart rack to the second smart rack.

The term "peer node" refers to a node connected by an edge to another node in a graph representation. In some embodiments, peer smart racks are represented as peer nodes within a graph representation, for example a data graph matrix representing a modular superstructure. In some embodiments, a first node is associated with a peer node that is associated with an aspect of a modular superstructure other than a smart rack, including and without limitation a node representing a hole, an egress point, and/or other movable area in the configuration of the modular superstructure connected to a particular smart rack corresponding to the first node.

The term "queried tote" refers to a particular tote identifier for which a tote query was received. A queried tote is to be repositioned from its tote starting position to at least one tote ending position.

The term "rack operation" refers to any action, process, or operation that is performable by a smart rack. In some embodiments, a rack operation is performable/can be performed using one or more actuators, plates, or other hardware of the smart rack for engaging and/or otherwise interacting with a tote.

The term "sliding A* algorithm" refers to an algorithm that utilizes one or more executed A* pathfinder algorithms to route totes along a particular path in a modular superstructure and alter locations of totes obstructing one or more smart racks in the particular path.

The term "smart rack manifest" refers to electronically managed data associated with the physical structure of a modular superstructure, configuration of smart racks in the modular superstructure, states, and/or behaviors of smart racks in the modular superstructure.

The term "smart rack matrix" refers to electronically managed data that represents a physical structure of a modular superstructure.

The term "status data" refers to data associated with a particular smart rack that indicates whether the smart rack is occupied/filled or unoccupied/empty.

The term "target end position" refers to a location identifier where a tote is authorized to move. Non-limiting representations of a target end point include, without limitation, an index, a two-dimensional (X,Y) identifier, a column/row identifier, and a three-dimensional (X,Y,Z) identifier.

The term "total movement resistance value" refers to a total cost associated with a particular path between nodes of a graph. In some embodiments, the total movement resistance value is embodied by the aggregation of movement resistance values for each step in the path.

The term "tote ending position" refers to a target end position for repositioning any number of totes.

The term "tote movement path" refers to a path between nodes of a data graph matrix from a tote starting position to a tote ending position. A tote movement path represents how a tote should be repositioned via smart racks corresponding to the nodes in the tote movement path.

The term "tote query" refers to data indicating a request to relocate a tote from a particular smart rack.

The term "tote starting position" refers to a location identifier from which a tote is beginning movement.

The term "tote" refers to any rectangular prism or other physical object that is capable of being manipulated by a smart rack in one or more directions. In some embodiments, the term "tote" and the term "rectangular prism" can be used interchangeably.

The term "actual status" refers to any data that represents an operational aspect of the physical structure of a smart rack, current data property/properties of a smart rack, and/or state(s) of operation of a smart rack.

The term "message" refers to a data transmission between a smart rack and a control system, between smart racks, and/or between any other system(s) of physical objects that are configured in accordance with particular communication protocol(s).

The term "general messaging data format" refers to a communication protocol utilized to configure a message for operating a smart rack and/or monitoring operational aspects of a smart rack.

The term "digital rendering data format" refers to a communication protocol utilized to render a visualization of a representation of actual operation of a physical object in a virtual environment.

The term "message type" refers to electronically managed data that represents a type of a message.

The term "message identifier" refers to electronically managed data that uniquely represents an identifier or other unique indicator of a structure of a message.

The term "origin identifier" refers to electronically managed data representing a smart rack that originated a message.

The term "step origin identifier" refers to electronically managed data representing a smart rack that is performing an operation associated with a message.

The term "step destination identifier" electronically managed data representing a smart rack that is a target of an operation. In some embodiments a step destination identifier uniquely represents a smart rack that is to receive a tote as part of an operation.

The term "tote identifier" refers to electronically managed data that uniquely represents a particular tote.

The term "tote SKU" refers to electronically managed data that represents physical object(s) within a tote.

The term "rendering view" refers to a software application and/or platform that enables generation, maintenance, configuration, and/or rendering of virtual object(s) embodying a digital twin of a corresponding physical environment.

The term "rendering view identifier" refers to electronically managed data that uniquely identifies a rendering view.

The term "X-axis coordinate" refers to electronically managed data that represents a X-position in a three-dimensional environment of a physical object for depicting in a particular rendering view.

The term "Y-axis coordinate" refers to electronically managed data that represents Y-position in a three-dimensional environment of a physical object for depicting in a particular rendering view.

The term "Z-axis coordinate" refers to electronically managed data that represents Z-position in a three-dimensional environment of a physical object for depicting in a particular rendering view.

The term "unit of length" refers to electronically managed data that indicates a unit of measurement utilized for representing a size of a virtual object within a rendering view.

The term "time at location" refers to a timestamp representing a time at which a tote reaches a particular location associated with a particular smart rack of a modular superstructure.

The term "time to get to location" refers to electronically managed data representing a length of time for a length of time that a smart rack has to complete a step for moving a tote to a particular smart rack.

The term "unit of time" refers to electronically managed data that indicates a unit of measurement representing a timestep between frames in a rendering view.

The term "digital twin" refers to electronically managed data representing virtual representation(s) of physical object(s) and/or virtual representation(s) of interactions between the physical object(s). In some embodiments, a digital twin represents the smart rack(s) of a modular superstructure and interactions between the smart rack(s).

The term "virtual object" refers to electronically managed data embodying a virtual representation, within a particular rendering view, of a corresponding physical object. A virtual object is configurable to be positioned at a particular location within a virtual environment, configured for virtual operation, and/or virtually representing any other physical configuration, property, position, or operation of a corresponding physical object.

The term "log data" refers to electronically managed data that represents monitored data associated with status(es) for one or more configuration(s) of a smart rack, operation(s) of a smart rack, and/or other physical aspect(s) of a smart rack.

The term "movement visualization function" refers to one or more algorithm(s) that set at least one rendering property of one or more virtual object(s) to depict, in a particular rendering view, a virtual representation of the virtual object during movement within a digital twin corresponding to movement of a physical object.

The term "rendering property" refers to any configurable data parameter that affects how a virtual object is rendered within a rendering view. Non-limiting examples of a rendering property include a color property, an opacity property, and a visibility flag.

The term "updated" refers to a state of one or more virtual object(s) having data value(s) set based on newly received data received, generated, and/or derived associated with the virtual object(s).

Current storage and retrieval systems rely on complex and individually designed superstructures for storage of one or more rectangular prisms within a factory or a warehouse. In some examples, the construction of the superstructure is time consuming given the design time and construction time. In addition, the superstructure requires significant empty space around it and/or within it for robots, shuttles, elevators, conveyors, and/or the like to be able to operate. For example, in one such system, a multi-dimensional superstructure is designed to house or otherwise store columns of rectangular prisms that are retrieved by robots operating along the top of the superstructure. In operation, each of the robots dig or otherwise retrieve a particular rectangular prism from the structure, transport it to an egress point, such as an elevator, and then discharge it to a conveyor or other transport system for movement to another location, such as a picking station.

Storage and retrieval systems may utilize various material handling products such as various shuttles, carriages, carts, lifts, conveyors, and/or the like to facilitate the transportation of rectangular prisms from a position within the superstructure to an egress point where the rectangular prism is then able to be delivered to a desired delivery location within a factory or a warehouse. For example, automated shuttles may be used to transport rectangular prisms to and/or from various storage locations within the superstructure. To retrieve a stored rectangular prism from a location within a storage and retrieval system, automated shuttles may be transported to the storage location, where automated shuttles are often configured to utilize various electronically-driven components disposed on the shuttle to physically retrieve the stored rectangular prism from within the storage location. For example, to extract an object from a storage location, shuttles in storage and retrieval system may use electronically-driven motors to deploy various electronically-actuated retention elements (e.g., hooks, fingers, and/or the like) connected to an extendable load arm that is extended from the shuttle into the storage location such that the electrical retention elements disposed about a distal end of the load arm may interface the stored rectangular prism. Automated shuttles that operate using such motor-driven control systems or electronic retrieval components exhibit extremely high manufacturing costs and are often plagued by an increased amount of part and/or system failures resulting from the configuration of such electronic and/or motor-driven instruments on inherently dynamic parts of an automated shuttle, such as, for example, along a load arm. Alternatively or additionally, automated shuttles require space in and around a superstructure to be able to move around and accomplish the task of retrieving a rectangular prism.

Various embodiments described herein disclose a smart rack apparatus that is capable of being bolted to, joined with, or otherwise linked to one or more peer smart racks for the purpose of creating a modular superstructure that is configured to allow for the ingress, storage, and/or egress of one or more rectangular prisms. In some examples, smart racks within the modular superstructure are configured to move or otherwise urge rectangular prisms through the modular superstructure without reliance on automated shuttles. Instead, the one or more smart rack disclosed herein may comprise rack actuators that are mechanically actuatable (e.g. motors and arms) and controllable (e.g. such as by a processing circuitry) to move or otherwise urge a rectangular prism to a peer smart rack. As a result, the systems, apparatus, and methods described herein are able to more effectively use space while allowing for increased speed of ingress and egress given the ability of rectangular prisms to traverse the modular superstructure more directly as compared to alternative solutions. Moreover, in some examples, each smart rack is individually powered and controllable so as to allow the smart racks to work together (e.g., like a swarm) to enable the rectangular prisms to traverse the modular superstructure.

In some examples, the smart rack apparatus is configured with one or more arms and one or more motors. In some examples, the one or more motors are configured to actuate the one or more arms to lift, urge, or otherwise direct a rectangular prism up, down, left, right, forward, or back. In some examples, one or more of the arms may move simultaneously. Alternatively or additionally, the one or more arms and the one or more motors may operate to receive a rectangular prism from a peer tote and urge it into a static or resting position within the smart rack.

In some examples, each smart rack within the modular superstructure may be defined by a series of coordinates (also referred to a "rack coordination set") in a defined coordinate system, such as an x, y, z coordinate system. In such examples, a first smart rack may be defined as 0, 0, 0 and each of the one or more additional smart racks may be defined with respect to the 0, 0, 0 smart rack. In such a way, each smart rack has an address for the purposes of control, messaging, power, location, and/or the like. Alternatively, or additionally, the address may be dynamic and, thus, may be changed as the modular superstructure is changed, modified, or the like.

In some examples, each smart rack may house or otherwise be linked to processing circuitry. In some examples, the processing circuitry is configured to process and/or route messages and/or control the one or more arms and/or the one or more motors. In some examples, a smart rack may receive a first message, such as via the processing circuitry. If not directed to the smart rack, based on the x, y, z addressing scheme, the message may be routed to a closest peer. If, instead, the message is indeed directed to the smart rack, the processing circuitry is configured to analyze, store, and/or process the message. In some examples, the message may cause the processing circuitry to activate the one or more motors, which in turn activate the one or more arms, to move a rectangular prism. In some examples, the processing circuitry may communicate with peer smart racks to confirm that a peer smart rack is prepared to receive a rectangular prism. Advantageously, such a communication and control pathway provides a low power, low cost, and/or scalable architecture that allows for communication with each of the smart racks, even a smart rack in the middle of the superstructure.

In some examples, each smart rack may be configured with power, such as with one or more, preferably three or more, smart rack switch circuits. In some examples, each of the smart rack switch circuits are connected to one or more, preferably two or more, peer smart racks. In some examples, the smart rack switch circuits are configured to provide a power path within the modular superstructure. Alternatively, or additionally, the power path may be an on-demand power path that is established during a period when a smart rack is to actuate its motors to move a rectangular prism and is disabled when the move is complete. Advantageously, in some examples, such an on-demand power path may reduce overall power usage and may allow for a larger modular superstructure.

In some examples and in operation, a superstructure controller is configured to manage the movements of the one or more rectangular prisms within the superstructure. In some examples, the superstructure controller is configured to receive or otherwise determine the location of one or more rectangular prisms within a modular infrastructure. In some examples, the superstructure controller may receive, access, or otherwise determine a rectangular prism, such as a target rectangular prism, and an egress point for that rectangular prism. In response, the superstructure controller may determine a tote plan that provides instructions to one or more smart racks to move the rectangular prism in such a way that it traverses the modular superstructure from its current location to its egress point.

In some examples, an emulation or simulation may be created by the superstructure controller based on the tote plan. In such cases, the emulation or simulation may be run in advance of the tote plan being executed in the physical modular infrastructure or it may be run simultaneously with the tote plan being executed in the physical modular infrastructure (e.g., a digital twin). In some examples and when the emulation or simulation is run in advance of the tote plan being executed in the physical modular infrastructure, certain metrics and/or timings may be calculated (e.g., time from current location to egress). In some examples when the emulation or simulation is run simultaneously with the tote plan being executed in the physical modular infrastructure, the emulation or simulation may operate as a digital twin and allow a user to view operations in the emulator or simulator that mimic or otherwise represent operations that are occurring in the physical world. In some examples, the emulation or simulation may include details from the physical world so as to provide a realistic view of the modular superstructure. In some examples, the simulator or emulator may be viewable via the Internet, such as via HTML 5.

As such, various embodiments of the present disclosure may provide technical advantages and improvements such as, but not limited to, reducing the space needed for transporting rectangular prisms to, from, and within the modular superstructure and improving the speed of transporting the rectangular prisms, details of which are described herein.

Figure 1:
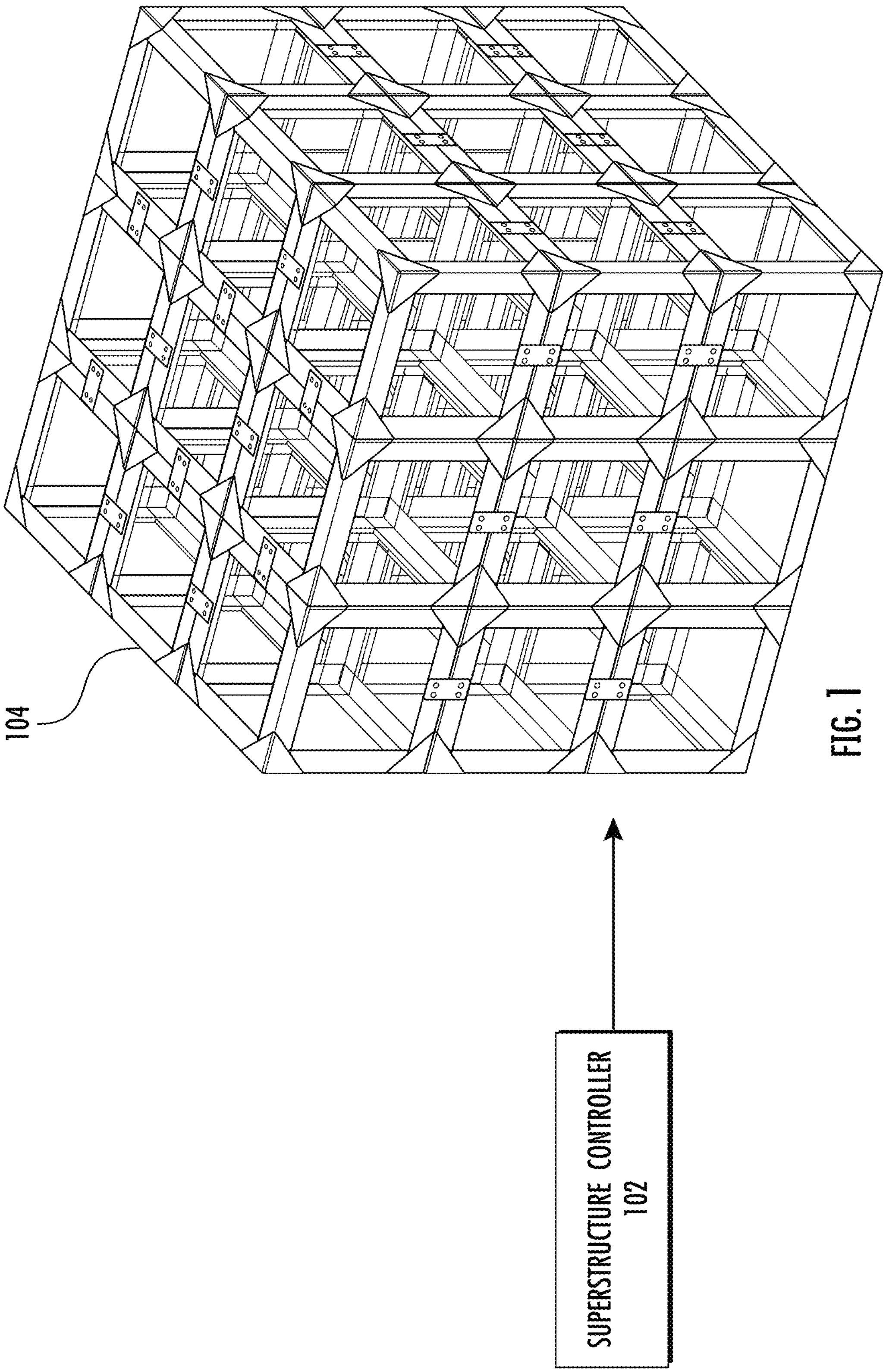
FIG. 1 is an example system architecture diagram illustrating an example environment for movement of rectangular prisms in a modular superstructure in accordance with some embodiments of the present disclosure.

FIG. 1 illustrates at least a portion of an example modular superstructure 104 that is controlled by one or more superstructure controllers 102 in accordance with some example embodiments described herein.

As described above, the modular superstructure 104 is configured to allow for the ingress, store, and egress of one or more rectangular prisms. To achieve such functions, the example modular superstructure 104 comprises a plurality of smart racks that are configured to urge and/or otherwise move rectangular prisms through the modular superstructure 104.

In some examples, the superstructure controller 102 may comprise a controller device (such as, but not limited to, a desktop computer, a laptop computer, and/or the like). In some example embodiments, the superstructure controller may be configured to manage the movements of the one or more rectangular prisms within the superstructure. For example, the superstructure controller 102 is configured to receive or otherwise determine the location of one or more rectangular prisms within a modular infrastructure. In some examples, the superstructure controller 102 may receive, access, or otherwise determine a rectangular prism, such as a target rectangular prism, and an egress point for that rectangular prism. In response, the superstructure controller may determine, input, or otherwise execute a tote plan that provides instructions to one or more smart racks to move the rectangular prism in such a way that it traverses the modular superstructure from its current location to its egress point.

In some examples, the superstructure controller 102 may transmit the tote plan to one or more processing circuitries of the one or more smart racks in the modular superstructure. In some embodiments, the tote plan may comprise one or more movement instructions for one or more smart racks. In some embodiments, each of the one or more movement instructions may indicate a movement of a rectangular prism. In some embodiments, to execute these movement instructions, the one or more smart racks may transmit one or more movement messages to one another, and may cause one or more arms of one or more rack actuators to move the rectangular prism, details of which are described herein.

Some embodiments utilize various particular algorithms to reduce or minimize one or more costs associated with movement of totes via a modular superstructure (e.g., time, power consumption, resources, and/or the like). Some embodiments utilize a sliding A* algorithm that generates a tote movement path corresponding to an efficient set of movements for relocating a particular tote from a particular tote starting position to a particular tote ending position with reduced or minimized total movement resistance value to accomplish said movements. By leveraging various underlying executed A* pathing, the sliding A* algorithm determines an efficient path for relocating a tote for which a tote query was received, as well as determining how to efficiently relocate other totes currently blocking an identified path for the queried tote. In this regard, the sliding A* algorithm advantageously is usable to identify instructions for operating a modular superstructure for efficiently repositioning the totes therein as tote queries are received, and in some embodiments to facilitate such operations via the modular superstructure.

Figure 2A:
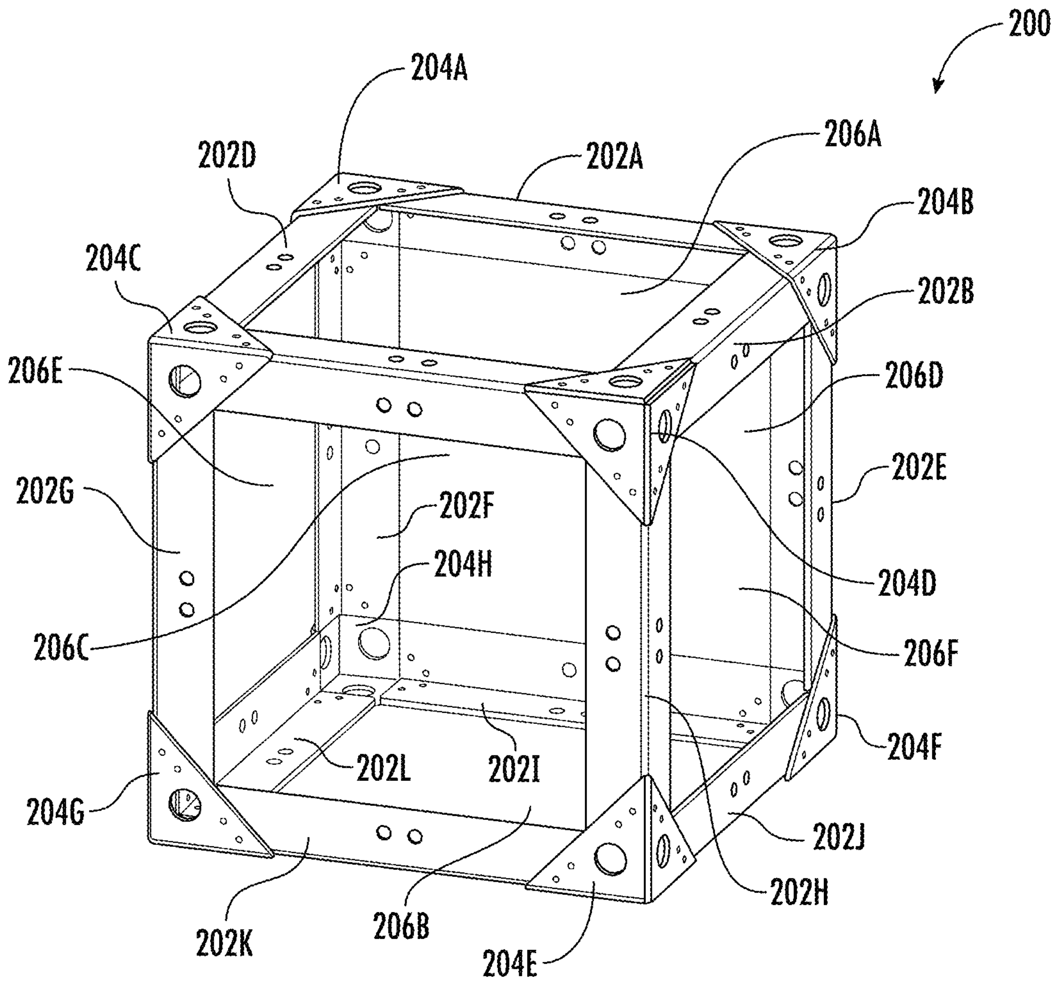
FIG. 2A is an example perspective view of an example rack frame of an example smart rack that is a part of a modular superstructure in accordance with some embodiments of the present disclosure.

Referring now to FIG. 2A, an example rack frame 200 in accordance with some embodiments of the present disclosure is illustrated. In some embodiments, the example rack frame 200 is a part of an example smart rack that can be used in a modular superstructure in accordance with some embodiments of the present disclosure.

In the example shown in FIG. 2A, the example rack frame 200 comprises a plurality of rack beams and a plurality of rack corners. In some embodiments, the plurality of rack beams and the plurality of rack corners of the example rack frame 200 may define a three-dimensional shape that is similar to a cuboid shape or a cube shape.

For example, the example rack frame 200 may comprise a rack beam 202A, a rack beam 202B, a rack beam 202C, a rack beam 202D, a rack beam 202E, a rack beam 202F, a rack beam 202G, a rack beam 202H, a rack beam 202I, a rack beam 202J, a rack beam 202K, and a rack beam 202L. In some embodiments, each rack beam defines an edge of the example rack frame 200, and the plurality of rack beams define a plurality of openings through which one or more rectangular prisms may be transported.

For example, the rack beam 202A and the rack beam 202C are positioned in a parallel arrangement with one another, and the rack beam 202B and the rack beam 202D are positioned in a parallel arrangement with one another. In some embodiments, each of the rack beam 202A and the rack beam 202C are positioned in a perpendicular or an orthogonal arrangement with both the rack beam 202D and the rack beam 202B, such that the rack beam 202A, the rack beam 202B, the rack beam 202C, and the rack beam 202D define a plane and/or a top opening 206A. In some embodiments, the one or more rectangular prisms may be transported from within the rack frame 200 through the top opening 206A (for example, to a top peer smart rack that is secured on top of the rack frame 200) by one or more rack actuators, details of which are described herein.

As another example, the rack beam 202I and the rack beam 202K are positioned in a parallel arrangement with one another, and the rack beam 202L and the rack beam 202J are positioned in a parallel arrangement with one another. In some embodiments, each of the rack beam 202I and the rack beam 202K are positioned in a perpendicular or an orthogonal arrangement with both the rack beam 202J and the rack beam 202L, such that the rack beam 202I, the rack beam 202L, the rack beam 202K, and the rack beam 202J define a plane and/or a bottom opening 206B. In some embodiments, the one or more rectangular prisms may be transported from within the rack frame 200 through the bottom opening 206B (for example, to a bottom peer smart rack that is secured under the rack frame 200) by one or more rack actuators, details of which are described herein.

As another example, the rack beam 202C and the rack beam 202K are positioned in a parallel arrangement with one another, and the rack beam 202G and the rack beam 202H are positioned in a parallel arrangement with one another. In some embodiments, each of the rack beam 202C and the rack beam 202K are positioned in a perpendicular or an orthogonal arrangement with both the rack beam 202G and the rack beam 202H, such that the rack beam 202C, the rack beam 202G, the rack beam 202K, and the rack beam 202H define a plane and/or a front opening 206C. In some embodiments, the one or more rectangular prisms may be transported from within the rack frame 200 through the front opening 206C (for example, to a front peer smart rack that is secured to the front of the rack frame 200) by one or more rack actuators, details of which are described herein.

As another example, the rack beam 202A and the rack beam 202I are positioned in a parallel arrangement with one another, and the rack beam 202E and the rack beam 202F are positioned in a parallel arrangement with one another. In some embodiments, each of the rack beam 202A and the rack beam 202I are positioned in a perpendicular or an orthogonal arrangement with both the rack beam 202E and the rack beam 202F, such that the rack beam 202A, the rack beam 202F, the rack beam 202I, and the rack beam 202E define a plane and/or a back opening 206D. In some embodiments, the one or more rectangular prisms may be transported from within the rack frame 200 through the back opening 206D (for example, to a back peer smart rack that is secured on the back of the rack frame 200) by one or more rack actuators, details of which are described herein.

As another example, the rack beam 202D and the rack beam 202L are positioned in a parallel arrangement with one another, and the rack beam 202F and the rack beam 202G are positioned in a parallel arrangement with one another. In some embodiments, each of the rack beam 202D and the rack beam 202L are positioned in a perpendicular or an orthogonal arrangement with both the rack beam 202F and the rack beam 202G, such that the rack beam 202D, the rack beam 202G, the rack beam 202L, and the rack beam 202F define a plane and/or a left opening 206E. In some embodiments, the one or more rectangular prisms may be transported from within the rack frame 200 through the left opening 206E (for example, to a left peer smart rack that is secured on the left of the rack frame 200) by one or more rack actuators, details of which are described herein.

As another example, the rack beam 202H and the rack beam 202E are positioned in a parallel arrangement with one another, and the rack beam 202B and the rack beam 202J are positioned in a parallel arrangement with one another. In some embodiments, each of the rack beam 202H and the rack beam 202E are positioned in a perpendicular or an orthogonal arrangement with both the rack beam 202B and the rack beam 202J, such that the rack beam 202H, the rack beam 202B, the rack beam 202E, and the rack beam 202J define a plane and/or a right opening 206F. In some embodiments, the one or more rectangular prisms may be transported from within the rack frame 200 through the right opening 206F (for example, to a right peer smart rack that is secured to the right of the rack frame 200) by one or more rack actuators, details of which are described herein.

In the example shown in FIG. 2A, the example rack frame 200 may comprise a rack corner 204A, a rack corner 204B, a rack corner 204C, a rack corner 204D, a rack corner 204E, a rack corner 204F, a rack corner 204G, and a rack corner 204H. In some embodiments, each rack corner securely connects three rack beams that are in perpendicular arrangements with one another in a three-dimensional shape to form a vertex of the example rack frame 200.

For example, the rack corner 204A connects the rack beam 202A, the rack beam 202D, and the rack beam 202F, and secures the positions of the rack beam 202A, the rack beam 202D, and the rack beam 202F relative to one another. In some embodiments, the rack beam 202A, the rack beam 202D, and the rack beam 202F are in perpendicular arrangement with one another in a three dimensional space, such that each of the rack beam 202A, the rack beam 202D, and the rack beam 202F defines an edge of a cuboid shape or a cube shape, and the rack corner 204A defines a left, back, top vertex of the cuboid shape or the cube shape.

As another example, the rack corner 204B connects the rack beam 202A, the rack beam 202B, and the rack beam 202E, and secures the positions of the rack beam 202A, the rack beam 202B, and the rack beam 202E relative to one another. In some embodiments, the rack beam 202A, the rack beam 202B, and the rack beam 202E are in perpendicular arrangement with one another in a three dimensional space, such that the rack beam 202A, the rack beam 202B, and the rack beam 202E define edges of a cuboid shape or a cube shape, and the rack corner 204B defines a right, back, top vertex of the cuboid shape or the cube shape.

As another example, the rack corner 204F connects the rack beam 202I, the rack beam 202J, and the rack beam 202E, and secures the positions of the rack beam 202I, the rack beam 202J, and the rack beam 202E relative to one another. In some embodiments, the rack beam 202I, the rack beam 202J, and the rack beam 202E are in perpendicular arrangement with one another in a three dimensional space, such that each of the rack beam 202I, the rack beam 202J, and the rack beam 202E defines an edge of a cuboid shape or a cube shape, and the rack corner 204F defines a right, back, bottom vertex of the cuboid shape or the cube shape.

As another example, the rack corner 204H connects the rack beam 202I, the rack beam 202L, and the rack beam 202F, and secures the positions of the rack beam 202I, the rack beam 202L, and the rack beam 202F relative to one another. In some embodiments, the rack beam 202I, the rack beam 202L, and the rack beam 202F are in perpendicular arrangement with one another in a three dimensional space, such that each of the rack beam 202I, the rack beam 202L, and the rack beam 202F defines an edge of a cuboid shape or a cube shape, and the rack corner 204H defines a left, back, bottom vertex of the cuboid shape or the cube shape.

As another example, the rack corner 204C connects the rack beam 202D, the rack beam 202G, and the rack beam 202C, and secures the positions of the rack beam 202D, the rack beam 202G, and the rack beam 202C relative to one another. In some embodiments, the rack beam 202D, the rack beam 202G, and the rack beam 202C are in perpendicular arrangement with one another in a three dimensional space, such that each of the rack beam 202D, the rack beam 202G, and the rack beam 202C defines an edge of a cuboid shape or a cube shape, and the rack corner 204C defines a left, front, top vertex of the cuboid shape or the cube shape.

As another example, the rack corner 204D connects the rack beam 202B, the rack beam 202H, and the rack beam 202C, and secures the positions of the rack beam 202B, the rack beam 202H, and the rack beam 202C relative to one another. In some embodiments, the rack beam 202B, the rack beam 202H, and the rack beam 202C are in perpendicular arrangement with one another in a three dimensional space, such that each of the rack beam 202B, the rack beam 202H, and the rack beam 202C defines an edge of a cuboid shape or a cube shape, and the rack corner 204D defines a right, front, top vertex of the cuboid shape or the cube shape.

As another example, the rack corner 204G connects the rack beam 202G, the rack beam 202K, and the rack beam 202L, and secures the positions of the rack beam 202G, the rack beam 202K, and the rack beam 202L relative to one another. In some embodiments, the rack beam 202G, the rack beam 202K, and the rack beam 202L are in perpendicular arrangement with one another in a three dimensional space, such that each of the rack beam 202G, the rack beam 202K, and the rack beam 202L defines an edge of a cuboid shape or a cube shape, and the rack corner 204G defines a left, front, bottom vertex of the cuboid shape or the cube shape.

As another example, the rack corner 204E connects the rack beam 202H, the rack beam 202K, and the rack beam 202J, and secures the positions of the rack beam 202H, the rack beam 202K, and the rack beam 202J relative to one another. In some embodiments, the rack beam 202H, the rack beam 202K, and the rack beam 202J are in perpendicular arrangement with one another in a three dimensional space, such that each of the rack beam 202H, the rack beam 202K, and the rack beam 202J defines an edge of a cuboid shape or a cube shape, and the rack corner 204E defines a right, front, bottom vertex of the cuboid shape or the cube shape.

Figure 2B:
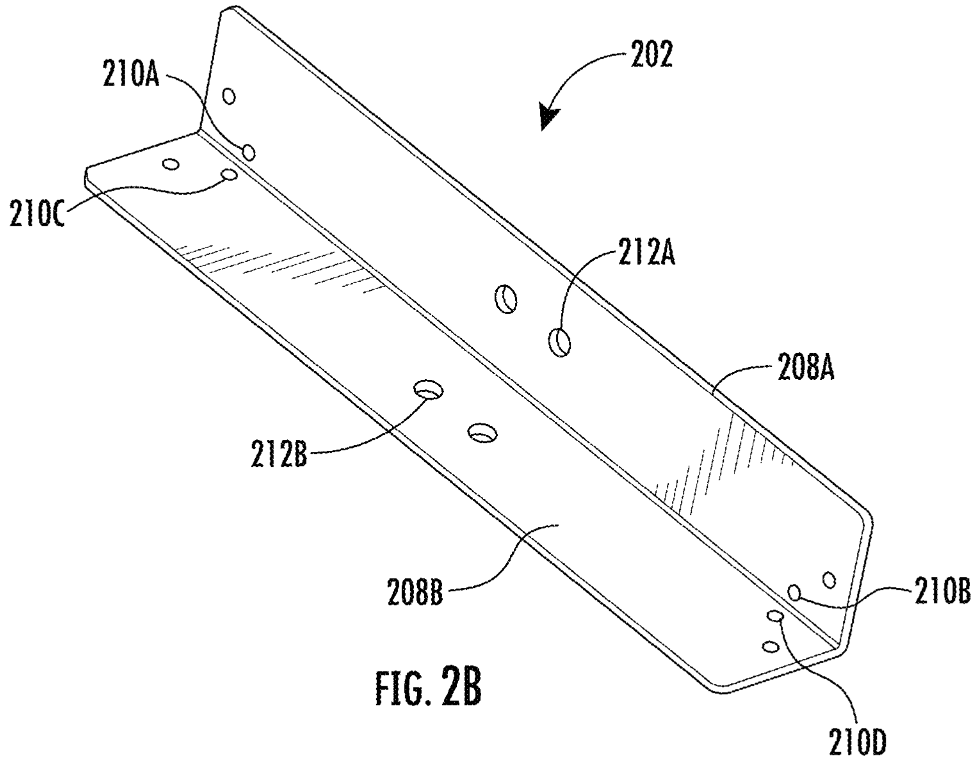
FIG. 2B is an example perspective view of an example rack beam that is a part of an example rack frame in accordance with some embodiments of the present disclosure.

Referring now to FIG. 2B, an example rack beam 202 in accordance with some embodiments of the present disclosure is illustrated.

In the example shown in FIG. 2B, the example rack beam 202 comprises a beam plate 208A and a beam plate 208B. In some embodiments, each of the beam plate 208A and the beam plate 208B may comprise metal material(s) such as, but not limited to, iron, steel, aluminum, and/or the like. In some embodiments, each of the beam plate 208A and the beam plate 208B may have a thickness of ⅛ inches. In some embodiments, one or both of the beam plate 208A and the beam plate 208B may have a thickness that is less than or more than ⅛ inches.

In some embodiments, each of the beam plate 208A and the beam plate 208B is in a shape similar to a rectangular shape. In some embodiments, the beam plate 208A and the beam plate 208B are connected to one another through, for example but not limited to, welding, machine cutouts, and/or the like. For example, an edge of the beam plate 208A may be welded to an edge of the beam plate 208B. Additionally, or alternatively, the beam plate 208A and the beam plate 208B may be cutouts from an edge of a square tubing. Additionally, or alternatively, the beam plate 208A and the beam plate 208B may be connected through other ways.

In some embodiments, the beam plate 208A may be positioned at an angle with respect to the beam plate 208B. For example, a surface of the beam plate 208A may be in a perpendicular arrangement with a surface of the beam plate 208B. Additionally, or alternatively, an angle between the surface of the beam plate 208A and the surface of the beam plate 208B may be less than or more than 90 degrees.

In some embodiments, the example rack beam 202 may be in the form of a ⅛" angle iron. Additionally, or alternatively, the example rack beam 202 may be in other forms.

In the example shown in FIG. 2B, the example rack beam 202 may comprise one or more holes on each of the beam plate 208A and the beam plate 208B, including, but not limited to, one or more middle holes and one or more end holes.

For example, the beam plate 208A may comprise one or more middle holes, including a middle hole 212A that is disposed at or near a middle portion of the beam plate 208A. In some embodiments, a fastener (such as, but not limited to, a screw) may connect the example rack beam 202 to another example rack beam of another rack frame through at least the middle hole 212A, details of which are described herein. Similarly, the beam plate 208B may comprise one or more middle holes, including a middle hole 212B that is disposed at or near a middle portion of the beam plate 208B. In some embodiments, a fastener (such as, but not limited to, a screw) may connect the example rack beam 202 to another example rack beam through the at least the middle hole 212B, details of which are described herein.

As another example, the beam plate 208A may comprise one or more end holes, including a first end hole 210A that is disposed near a first end of the beam plate 208A and a second end hole 210B that is disposed near a second end of the beam plate 208A. In some embodiments, a fastener (such as, but not limited to, a screw) may connect the beam plate 208A to a first rack corner through the at least the first end hole 210A, and may connect the beam plate 208A to a second rack corner through the at least the second end hole 210B, details of which are described herein.

Similarly, the beam plate 208B may comprise one or more end holes, including a first end hole 210C that is disposed near a first end of the beam plate 208B and a second end hole 210D that is disposed near a second end of the beam plate

208B. In some embodiments, a fastener (such as, but not limited to, a screw) may connect the beam plate 208B to the first rack corner through the at least the first end hole 210C, and may connect the beam plate 208B to the second rack corner through the at least the second end hole 210D, details of which are described herein.

Figure 2C:
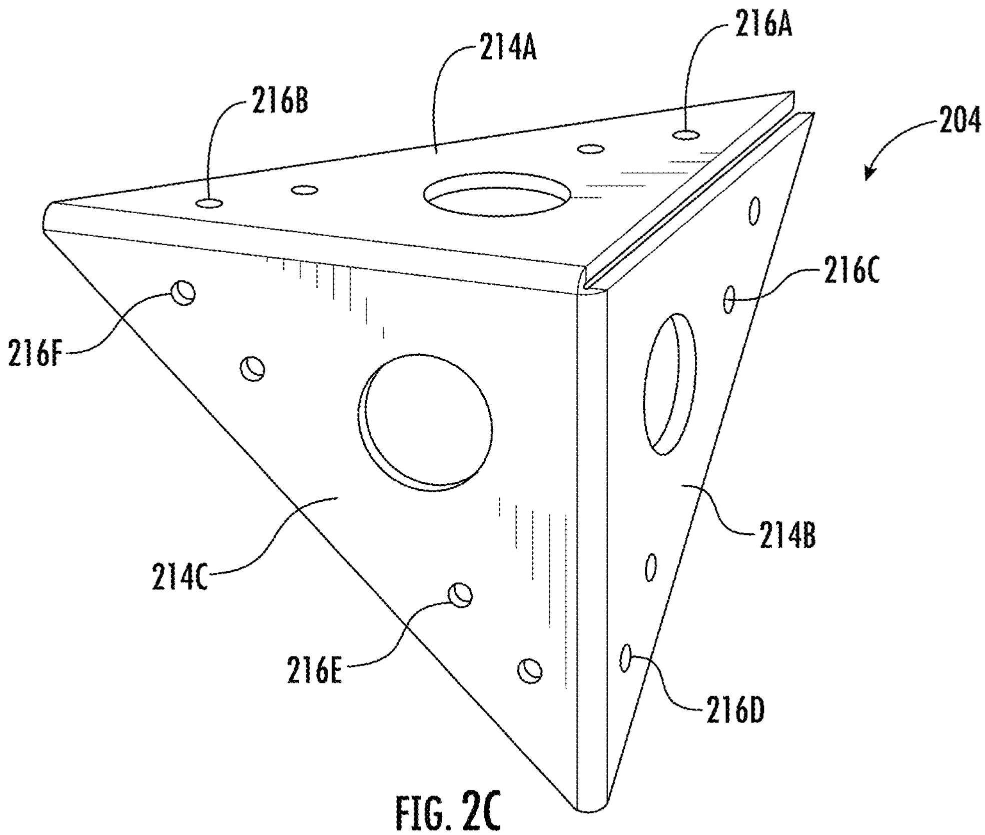
FIG. 2C is an example perspective view of an example rack corner that is a part of an example rack frame in accordance with some embodiments of the present disclosure.

Referring now to FIG. 2C, an example rack corner 204 in accordance with some embodiments of the present disclosure is illustrated.

In the example shown in FIG. 2C, the example rack corner 204 may comprise three corner plates: a corner plate 214A, a corner plate 214B, and a corner plate 214C. In some embodiments, each of the corner plate 214A, the corner plate 214B, and the corner plate 214C may comprise metal material(s) such as, but not limited to, iron, steel, aluminum, and/or the like. In some embodiments, each of the corner plate 214A, the corner plate 214B, and the corner plate 214C may have a thickness of ⅛ inches. In some embodiments, one or more of the corner plate 214A, the corner plate 214B, and the corner plate 214C may have a thickness that is less than or more than ⅛ inches.

In some embodiments, each of the corner plate 214A, the corner plate 214B, and the corner plate 214C may be connected to and positioned at an angle with one another. For example, the corner plate 214A, the corner plate 214B, and the corner plate 214C are connected to one another, for example but not limited to, through welding, from machine cutouts, and/or the like. For example, a first edge of the corner plate 214A may be welded to a first edge of the corner plate 214B, a second edge of the corner plate 214B may be welded to a first edge of the corner plate 214C, and a second edge of the corner plate 214C may be welded to a second edge of the corner plate 214A. Additionally, or alternatively, the corner plate 214A, the corner plate 214B, and the corner plate 214C may be cutouts from a corner of a square tubing. Additionally, or alternatively, the corner plate 214A, the corner plate 214B, and/or the corner plate 214C may be connected through other ways.

In some embodiments, each of the corner plate 214A, the corner plate 214B, and the corner plate 214C is in a shape similar to a triangular shape. For example, each of the corner plate 214A, the corner plate 214B, and the corner plate 214C may be in a shape similar to a right triangle shape (such as, but not limited to, an isosceles right triangle) that comprises a pair of legs at the right angle with one another. Similar to those described above, a first leg of the corner plate 214A is connected to a first leg of the corner plate 214B, a second leg of the corner plate 214B is connected to a first leg of the corner plate 214C, and a second leg of the corner plate 214C is connected to a second leg of the corner plate 214A. In some embodiments, the angle between a surface of the corner plate 214A and a surface of the corner plate 214B, the angle between the surface of the corner plate 214B and a surface of the corner plate 214C, and the angle between the surface of the corner plate 214C and a surface of the corner plate 214A are all 90 degrees. Additionally, or alternatively, the angle between the surface of the corner plate 214A and the surface of the corner plate 214B, the angle between the surface of the corner plate 214B and the surface of the corner plate 214C, and/or the angle between the surface of the corner plate 214C and the surface of the corner plate 214A may be less than or more than 90 degrees.

In the example shown in FIG. 2C, each of the corner plate 214A, the corner plate 214B, and the corner plate 214C may comprise one or more holes for securing the corner plate to one or more rack beams. As described above, each of the corner plate 214A, the corner plate 214B, and the corner plate 214C may be in a shape similar to a right triangle shape (such as, but not limited to, an isosceles right triangle), and the one or more holes may be positioned along a hypotenuse side of the right triangle shape (or the isosceles right triangle shape).

For example, the corner plate 214A may comprise one or more edge holes (such as, but not limited to, the edge hole 216A) that are positioned at one end of the hypotenuse side of the corner plate 214A and one or more edge holes (such as, but not limited to, the edge hole 216B) that are positioned at the other end of the hypotenuse side of the corner plate 214A. Similarly, the corner plate 214B may comprise one or more edge holes (such as, but not limited to, the edge hole 216C) that are positioned at one end of the hypotenuse side of the corner plate 214B and one or more edge holes (such as, but not limited to, the edge hole 216D) that are positioned at the other end of the hypotenuse side of the corner plate 214B. Similarly, the corner plate 214C may comprise one or more edge holes (such as, but not limited to, the edge hole 216F) that are positioned at one end of the hypotenuse side of the corner plate 214C and one or more edge holes (such as, but not limited to, the edge hole 216E) that are positioned at the other end of the hypotenuse side of the corner plate 214C.

In some embodiments, the rack corner 204 is secured to one or more rack beams through fasteners (such as, but not limited to, screws). In such examples, the fasteners connect the edge holes of the rack corner and the end holes of the rack beams to form a rack frame.

For example, as illustrated in FIG. 2C, the edge hole 216B of the corner plate 214A is a mirror image of the edge hole 216F of the corner plate 214C along the edge that connects the corner plate 214A and the corner plate 214C. As illustrated in FIG. 2B, the second end hole 210B of the beam plate 208A is a mirror image of the second end hole 210D of the beam plate 208B along the edge that connects the beam plate 208A and the beam plate 208B. In some embodiments, one or more fasteners may connect the edge hole 216B of the corner plate 214A to the second end hole 210B of the beam plate 208A, so that the beam plate 208A is secured to the corner plate 214A. One or more fasteners may connect the edge hole 216F of the corner plate 214C to the second end hole 210D of the beam plate 208B, so that the beam plate 208B is secured to the corner plate 214C. Because the beam plate 208A is secured to the beam plate 208B, and the corner plate 214C is secured to the corner plate 214A, the rack beam 202 shown in FIG. 2B can be secured to the rack corner 204 shown in FIG. 2C.

As such, a rack beam may be secured to the corner plate 214A and the corner plate 214C. Similarly, a rack beam may be secured to the corner plate 214A and the corner plate 214B, and a rack beam may be secured to the corner plate 214B and the corner plate 214C. Because the corner plate 214A, the corner plate 214B, and the corner plate 214C are in perpendicular arrangements with one another, the three rack beams that are secured to the rack corner 204 are in perpendicular arrangements with one another as well. As such, rack beams may define edges of a cuboid shape or a cube shape, and rack corners may define vertices of the cuboid shape or the cube shape.

Figure 3A:
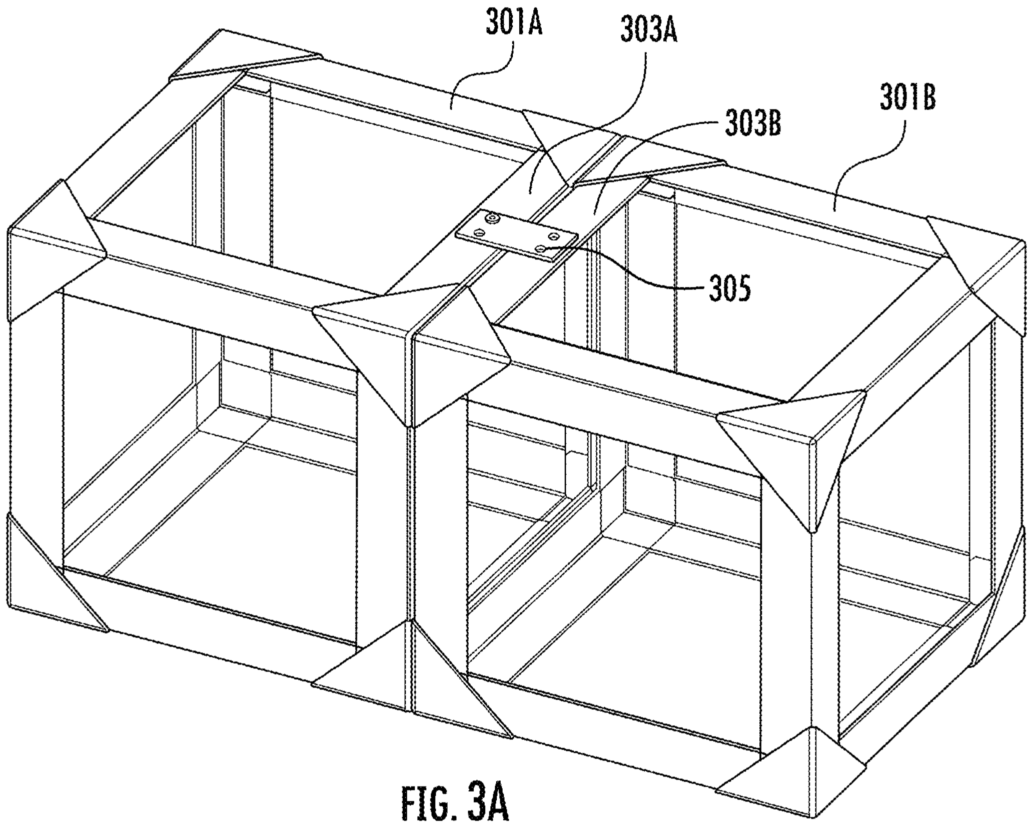
FIG. 3A is an example perspective view of two example rack frames that are connected through an example connector plate in accordance with some embodiments of the present disclosure.
Figure 3B:
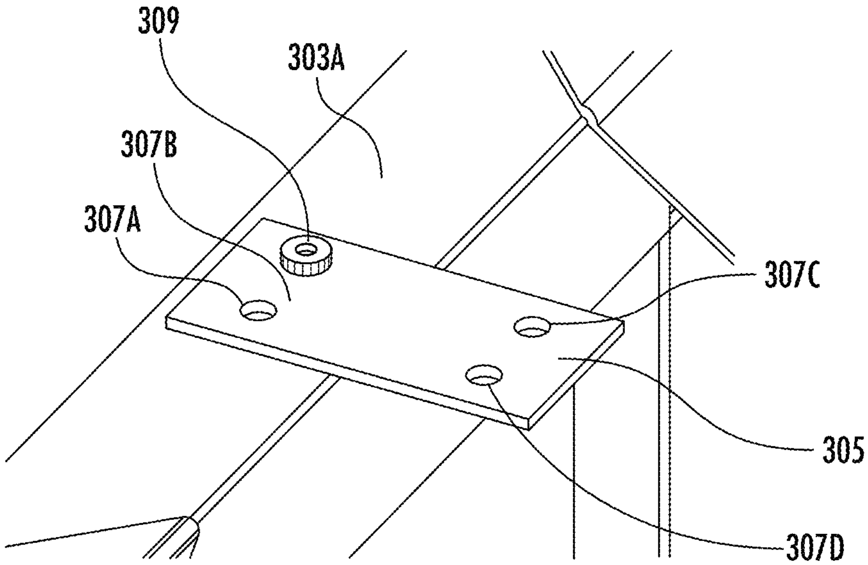
FIG. 3B is an example zoomed view of an example portion of FIG. 3A showing the example connector plate in accordance with some embodiments of the present disclosure.

Referring now to FIG. 3A, an example perspective view of two example rack frames is illustrated. In particular, FIG. 3A illustrates an example of connecting two example rack frames through an example connector plate. FIG. 3B illustrates an example zoomed view of an example portion of the example perspective view shown in FIG. 3A.

In the example shown in FIG. 3A, the rack frame 301A and the rack frame 301B are secured to one another through an example connector plate 305. For example, the rack frame 301A may comprise a rack plate 303A, and the rack frame 301B may comprise a rack plate 303B. In such an example, the rack frame 301A and the rack frame 301B are secured to one another through the example connector plate 305 that is secured to both the rack plate 303A and the rack plate 303B.

In the example shown in FIG. 3B, the connector plate 305 is in a shape similar to a rectangle shape. In some embodiments, the connector plate 305 may comprise metal material(s) such as, but not limited to, iron, steel, aluminum, and/or the like. For example, the connector plate 305 may be in the form of a metal plate.

In some embodiments, a first end of the connector plate 305 may be secured to the rack plate 303A, and a second end of the connector plate 305 may be secured to the rack plate 303B. For example, the example connector plate 305 may comprise one or more connector holes (such as, but not limited to, the connector hole 307A and the connector hole 307B) that are disposed on the first end of the example connector plate 305, and may comprise one or more connector holes (such as, but not limited to, the connector hole 307C and the connector hole 307D) that are disposed on a second end of the example connector plate 305. In some embodiments, each of the connector holes of the connector plate 305 may be positioned to overlap with one of the middle holes of a beam plate of a rack plate, and a fastener (such as, but not limited to, a screw) may be disposed through both the connector hole and the middle hole, so as to secure the connector plate 305 to a rack plate.

For example, the connector hole 307A and the connector hole 307B of the example connector plate 305 are positioned to overlap with the middle holes of the rack plate 303A. A screw 309 may be disposed through both the connector hole 307B and the corresponding middle hole of the rack plate 303A, so as to secure the first end of the connector plate 305 to the rack plate 303A. Similarly, the connector hole 307C and the connector hole 307D of the example connector plate 305 are positioned to overlap with the middle holes of the rack plate 303B. Screws may be disposed through both the connector hole 307C and the corresponding middle hole of the rack plate 303B, so as to secure the second end of the connector plate 305 to the rack plate 303B.

As both the rack plate 303A and the rack plate 303B can be secured to the connector plate 305, the rack frame 301A and the rack frame 301B can be secured relative to one another through the connector plate 305 such that their positions relative to one another do not change.

While the description above provides an example of securing the rack frame 301B to the right of the rack frame 301A (e.g., the rack frame 301B is a right peer smart rack frame of the rack frame 301A), it is noted that the scope of the present disclosure is not limited to the description above. In some examples, another rack frame can be secured to and positioned on the top of the rack frame 301A (e.g., a top peer smart rack frame of the rack frame 301A) through, for example but not limited to, one or more connector plates. Additionally, or alternatively, another rack frame can be secured to and positioned under the rack frame 301A (e.g., a bottom peer smart rack frame of the rack frame 301A) through, for example but not limited to, one or more connector plates. Additionally, or alternatively, another rack frame can be secured to and positioned on the left of the rack frame 301A (e.g., a left peer smart rack frame of the rack frame 301A) through, for example but not limited to, one or more connector plates. Additionally, or alternatively, another rack frame can be secured to and positioned on the front of the rack frame 301A (e.g., a front peer smart rack frame of the rack frame 301A) through, for example but not limited to, one or more connector plates. Additionally, or alternatively, another rack frame can be secured to and positioned on the back of the rack frame 301A (e.g., a back peer smart rack frame of the rack frame 301A) through, for example but not limited to, one or more connector plates.

As described above in connection with at least FIG. 2A, the plurality of rack beams defines a plurality of openings in a three-dimensional space through which one or more rectangular prisms may be transported to and/or from an example rack frame/smart rack. As such, one or more rectangular prisms may be transported from the rack frame 301A to a top peer smart rack frame of the rack frame 301A, and/or transported to the rack frame 301A from the top peer smart rack frame of the rack frame 301A. Additionally, or alternatively, one or more rectangular prisms may be transported from the rack frame 301A to a bottom peer smart rack frame of the rack frame 301A, and/or transported to the rack frame 301A from the bottom peer smart rack frame of the rack frame 301A. Additionally, or alternatively, one or more rectangular prisms may be transported from the rack frame 301A to a left peer smart rack frame of the rack frame 301A, and/or transported to the rack frame 301A from the left peer smart rack frame of the rack frame 301A. Additionally, or alternatively, one or more rectangular prisms may be transported from the rack frame 301A to a right peer smart rack frame of the rack frame 301A, and/or transported to the rack frame 301A from the right peer smart rack frame of the rack frame 301A. Additionally, or alternatively, one or more rectangular prisms may be transported from the rack frame 301A to a front peer smart rack frame of the rack frame 301A, and/or transported to the rack frame 301A from the front peer smart rack frame of the rack frame 301A. Additionally, or alternatively, one or more rectangular prisms may be transported from the rack frame 301A to a back peer smart rack frame of the rack frame 301A, and/or transported to the rack frame 301A from the back peer smart rack frame of the rack frame 301A. Additional details of transporting the one or more rectangular prisms are described herein.

Figure 4A:
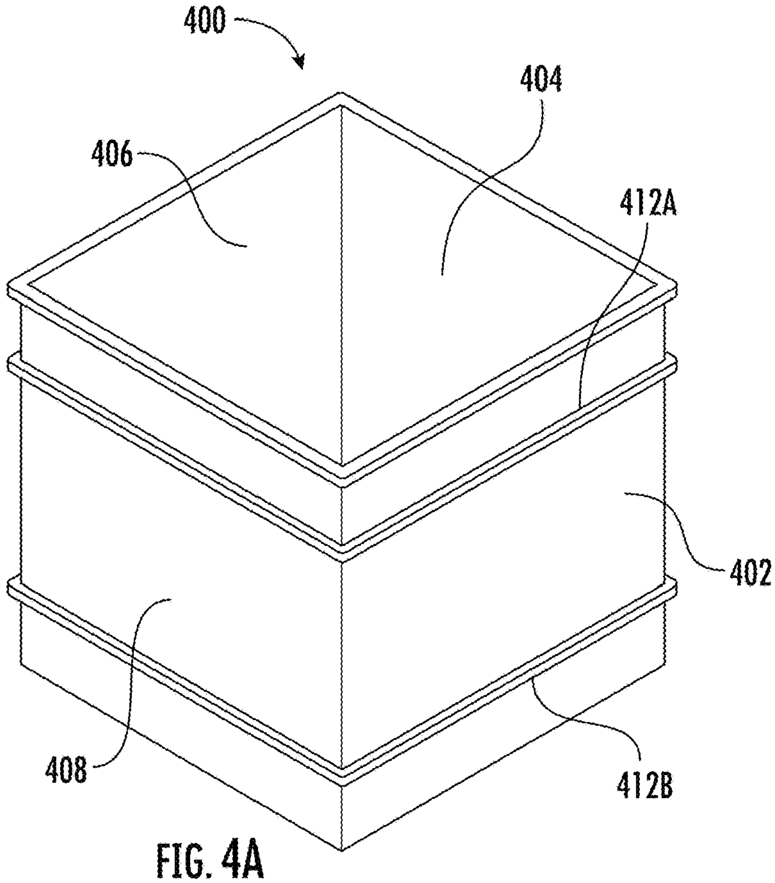
FIG. 4A is an example perspective view of an example rectangular prism in accordance with some embodiments of the present disclosure.
Figure 4B:
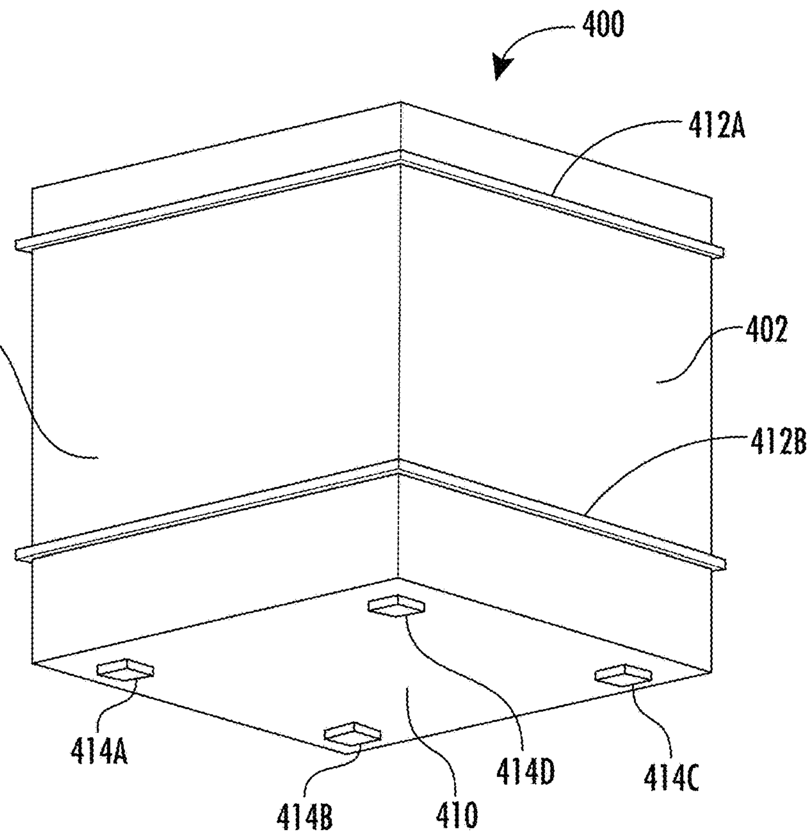
FIG. 4B is another example perspective view of an example rectangular prism in accordance with some embodiments of the present disclosure.

Referring now to FIG. 4A and FIG. 4B, example perspective views of an example rectangular prism 400 in accordance with some embodiments of the present disclosure are illustrated.

In the example shown in FIG. 4A and FIG. 4B, the example rectangular prism 400 may be in the shape that is similar to a hollow rectangular prism shape with the top surface removed. For example, the example rectangular prism 400 may comprise a front lateral wall 408, a back lateral wall 404, a left lateral wall 406, a right lateral wall 402, and a bottom wall 410. In some embodiments, each of the front lateral wall 408, the back lateral wall 404, the left lateral wall 406, the right lateral wall 402, and the bottom wall 410 may be in a shape similar to a thin, flat cuboid shape. In some embodiments, one or more of the front lateral wall 408, the back lateral wall 404, the left lateral wall 406, the right lateral wall 402, and the bottom wall 410 may be in other shape(s).

In some embodiments, the front lateral wall 408 is connected to and in perpendicular arrangements with each of the left lateral wall 406, the right lateral wall 402, and the bottom wall 410. In some embodiments, the right lateral wall 402 is connected to and in perpendicular arrangements with each of the front lateral wall 408, the back lateral wall 404, and the bottom wall 410. In some embodiments, the back lateral wall 404 is connected to and in perpendicular arrangements with each of the left lateral wall 406, the right lateral wall 402, and the bottom wall 410. In some embodiments, the left lateral wall 406 is connected to and in perpendicular arrangements with each of the back lateral wall 404, the front lateral wall 408, and the bottom wall 410.

In some embodiments, the bottom wall 410 is connected to and in a perpendicular arrangement with each of the front lateral wall 408, the back lateral wall 404, the left lateral wall 406, and the right lateral wall 402. For example, the front lateral wall 408 and the back lateral wall 404 may be in a parallel arrangement with one another, and the left lateral wall 406 and the right lateral wall 402 may be in a parallel arrangement with one another, such that the example rectangular prism 400 defines an opening and a space between the front lateral wall 408, the back lateral wall 404, the left lateral wall 406, the right lateral wall 402, and the bottom wall 410. In some embodiments, the opening may be used to receive/retrieve goods, items, stock keeping units, or the like by/from the rectangular prism 400. In some embodiments, the space may be used to store goods, items, stock keeping units, or the like. In some embodiments, the example rectangular prism 400 may be in forms such as, but not limited to, a carton, a case, a tote, a divided tote, a tray, a pallet, or the like.

In some embodiments, the example rectangular prism 400 may comprise one or more ribs and/or protrusions that are disposed on the outer surface of walls of the example rectangular prism 400. In some embodiments, each of the one or more ribs and/or protrusions defines an elevated surface from the outer surface of the walls of the example rectangular prism 400. In some embodiments, the one or more ribs and/or protrusions may allow peer-to-peer engagement and movement of the rectangular prism between the smart racks.

For example, a top rib 412A may be disposed on the outer surface of the front lateral wall 408, the back lateral wall 404, the left lateral wall 406, and the right lateral wall 402. In some embodiments, the top rib 412A may be in a shape that is similar to an elongated cuboid. Additionally, or alternatively, the top rib 412A may be in a shape that is similar to other shape(s). In some embodiments, portions of the top rib 412A that are disposed on the front lateral wall 408, the back lateral wall 404, the left lateral wall 406, and the right lateral wall 402 may be connected to one another. In some embodiments, one or more portions of the top rib 412A that are disposed on the front lateral wall 408, the back lateral wall 404, the left lateral wall 406, and the right lateral wall 402 may not be connected to one another.

As another example, a bottom rib 412B may be disposed on the outer surface of the front lateral wall 408, the back lateral wall 404, the left lateral wall 406, and the right lateral wall 402. In some embodiments, the bottom rib 412B is positioned under the top rib 412A in the vertical direction. Similar to the top rib 412A, the bottom rib 412B may be in a shape that is similar to an elongated cuboid. Additionally, or alternatively, the bottom rib 412B may be in a shape that is similar to other shape(s). In some embodiments, portions of the bottom rib 412B that are disposed on the front lateral wall 408, the back lateral wall 404, the left lateral wall 406, and the right lateral wall 402 may be connected to one another. In some embodiments, one or more portions of the bottom rib 412B that are disposed on the front lateral wall 408, the back lateral wall 404, the left lateral wall 406, and the right lateral wall 402 may not be connected to one another.

In the example shown in FIG. 4B, the outer surface of the bottom wall 410 comprises a plurality of protrusions, such as, but not limited to, a left front bottom protrusion 414A, a left back bottom protrusion 414B, a right back bottom protrusion 414C, and a right front bottom protrusion 414D. In some embodiments, each of the left front bottom protrusion 414A, a left back bottom protrusion 414B, a right back bottom protrusion 414C, and a right front bottom protrusion 414D may be disposed on one of the corners of the outer surface of the bottom wall 410.

For example, the left front bottom protrusion 414A may be disposed on a left front corner of the outer surface of the bottom wall 410 that is connected to the left lateral wall 406 and the front lateral wall 408. As another example, the left back bottom protrusion 414B may be disposed on a left back corner of the outer surface of the bottom wall 410 that is connected to the left lateral wall 406 and the back lateral wall 404. As another example, the right back bottom protrusion 414C may be disposed on a right back corner of the outer surface of the bottom wall 410 that is connected to the right lateral wall 402 and the back lateral wall 404. As another example, the right front bottom protrusion 414D may be disposed on a right front corner of the outer surface of the bottom wall 410 that is connected to the right lateral wall 402 and front lateral wall 408.

While the description above provides an example rectangular prism that comprises a top rib, a bottom rib, and four bottom protrusions, it is noted that the scope of the present disclosure is not limited to the description above.

In some embodiments, the one or more ribs and/or protrusions (including, but not limited to, the top rib 412A, the bottom rib 412B, the left front bottom protrusion 414A, the left back bottom protrusion 414B, the right back bottom protrusion 414C, and/or the right front bottom protrusion 414D) of the rectangular prism 400 may be engaged with the one or more rack actuators of a smart rack. For example, the one or more rack actuators of a smart rack may engage with the one or more ribs and/or protrusions to secure the rectangular prism 400 within the smart rack. Additionally, or alternatively, the one or more rack actuators of the smart rack may engage with the one or more ribs and/or protrusions to cause the rectangular prism 400 to be moved to another smart rack that is adjacent to the smart rack, details of which are described herein.

Figure 5:
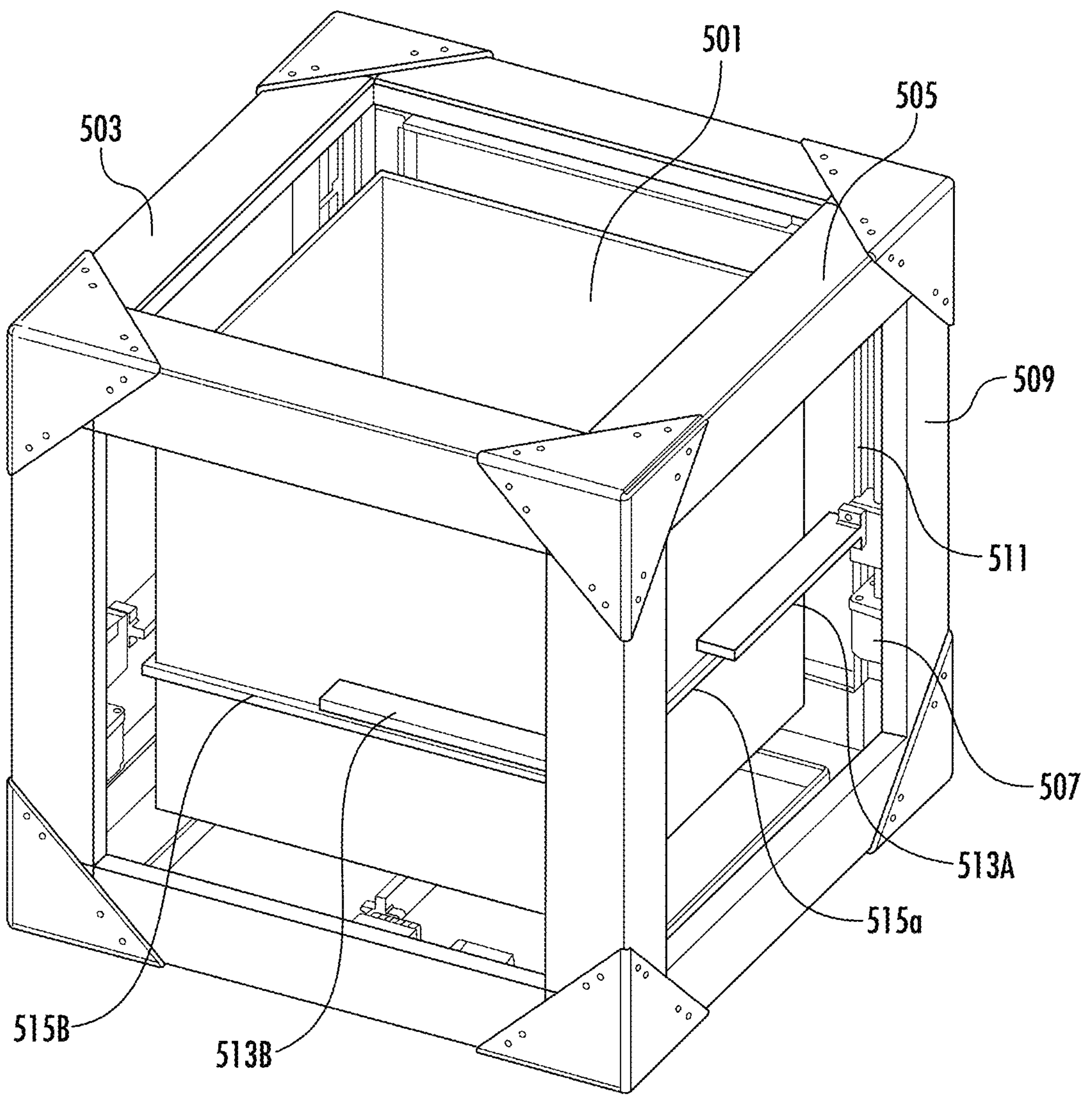
FIG. 5 is an example perspective view of an example rectangular prism positioned within an example smart rack in accordance with some embodiments of the present disclosure.

Referring now to FIG. 5, an example rectangular prism 501 positioned within an example smart rack 503 in accordance with some embodiments of the present disclosure is illustrated.

In particular, the example smart rack 503 may comprise a rack frame 505 that is similar to the example rack frame described above in connection with at least FIG. 2A to FIG. 2C, as well as a plurality of rack actuators that are secured to inner surfaces of the rack frame 505. In some embodiments, the rack frame comprises a plurality of rack plates, and at least one rack actuator is secured to at least an inner surface of at least one of the plurality of rack plates. For example, the example smart rack 503 may comprise a rack actuator 507 that is disposed on an inner surface of the rack beam 509 of the rack frame 505.

In some embodiments, each of the plurality of rack actuators comprises at least an arm that is secured to a slider on a lead screw. For example, each of the plurality of rack actuators may comprise a slider movably disposed on a lead screw, and an arm connected to the slider. In some embodiments, the lead screw may provide outer threads that engage with the inner threads of the slider, such that the slider may move along the lead screw. As the arm is connected to the slider, the arm may move along the lead screw as well.

In some embodiments, the lead screw may be positioned in a parallel arrangement with one of the rack beams. In the example shown in FIG. 5, the lead screw 511 of the rack actuator 507 is positioned in a parallel arrangement with the rack beam 509, and the arm 513A is secured to the slider of the lead screw 511. In some embodiments, the arm 513A is in a perpendicular arrangement with the lead screw 511, such that the arm 513A may extend on a horizontal plane and move in a vertical direction along the lead screw 511.

Similar to those described above in connection with at least FIG. 4A and FIG. 4B, the rectangular prism 501 may comprise one or more ribs on its outer surface, such as, but not limited to, a rib 515A. Similar to those described above in connection with at least FIG. 4A and FIG. 4B, the rib 515A may protrude from an outer surface of the rectangular prism 501. As shown in FIG. 5, the rib 515A may extend on the horizontal plane, and the arm 513A is in a parallel arrangement with the rib 515A.

In various embodiments of the present disclosure, an example arm of an example rack actuator may be in different positions along the lead screw and relative to a rib of the rectangular prism. For example, an example arm/an example rack actuator of an example smart rack may be at a "top position." When the example arm/the example rack actuator is in the top position, the example arm is positioned adjacent to and under the top rib of the rectangular prism. Additionally, or alternatively, an example arm/an example rack actuator of an example smart rack may be at a "bottom position." When the example arm/the example rack actuator is in the bottom position, the example arm is positioned adjacent to and under the bottom rib of the rectangular prism.

In various embodiments of the present disclosure, an example arm/an example rack actuator of an example rack actuator may be configured to operate in different modes relative to a rib of the rectangular prism.

For example, an example arm/an example rack actuator of an example smart rack may be configured to operate in an "engaged mode" relative to the rectangular prism. When the example arm/the example rack actuator is in the engaged mode, the example arm may be positioned to be in contact with the outer surface of the rectangular prism.

Additionally, or alternatively, an example arm/an example rack actuator of an example smart rack may be configured to operate in a "disengaged mode" relative to the rectangular prism. When the example arm/the example rack actuator is in the disengaged mode, the example arm may be positioned not in contact with the outer surface of the rectangular prism.

In the example shown in FIG. 5, the arm 513A is at the bottom position and in an engaged mode. In other words, the arm 513A is positioned adjacent to and under the rib 515A and in contact with the outer surface of the rectangular prism 501. While gravity may pull the rectangular prism 501 in a downwards direction, the arm 513A may provide support to the rectangular prism 501 through engagement with the rib 515A, and may prevent the rectangular prism 501 from falling through the example smart rack 503. Similarly, the arm 513B is at the bottom position and in an engaged mode. In other words, the arm 513B is positioned adjacent to and under the rib 515B and in contact with the outer surface of the rectangular prism 501, so as to provide support to the rectangular prism 501 and prevent the rectangular prism 501 from falling through the example smart rack 503.

As such, various embodiments of the present disclosure may secure one or more rectangular prisms within a smart rack through positioning of arm(s) of rack actuators and engagements between arm(s) of rack actuators and ribs of the one or more rectangular prisms.

Figure 6A:
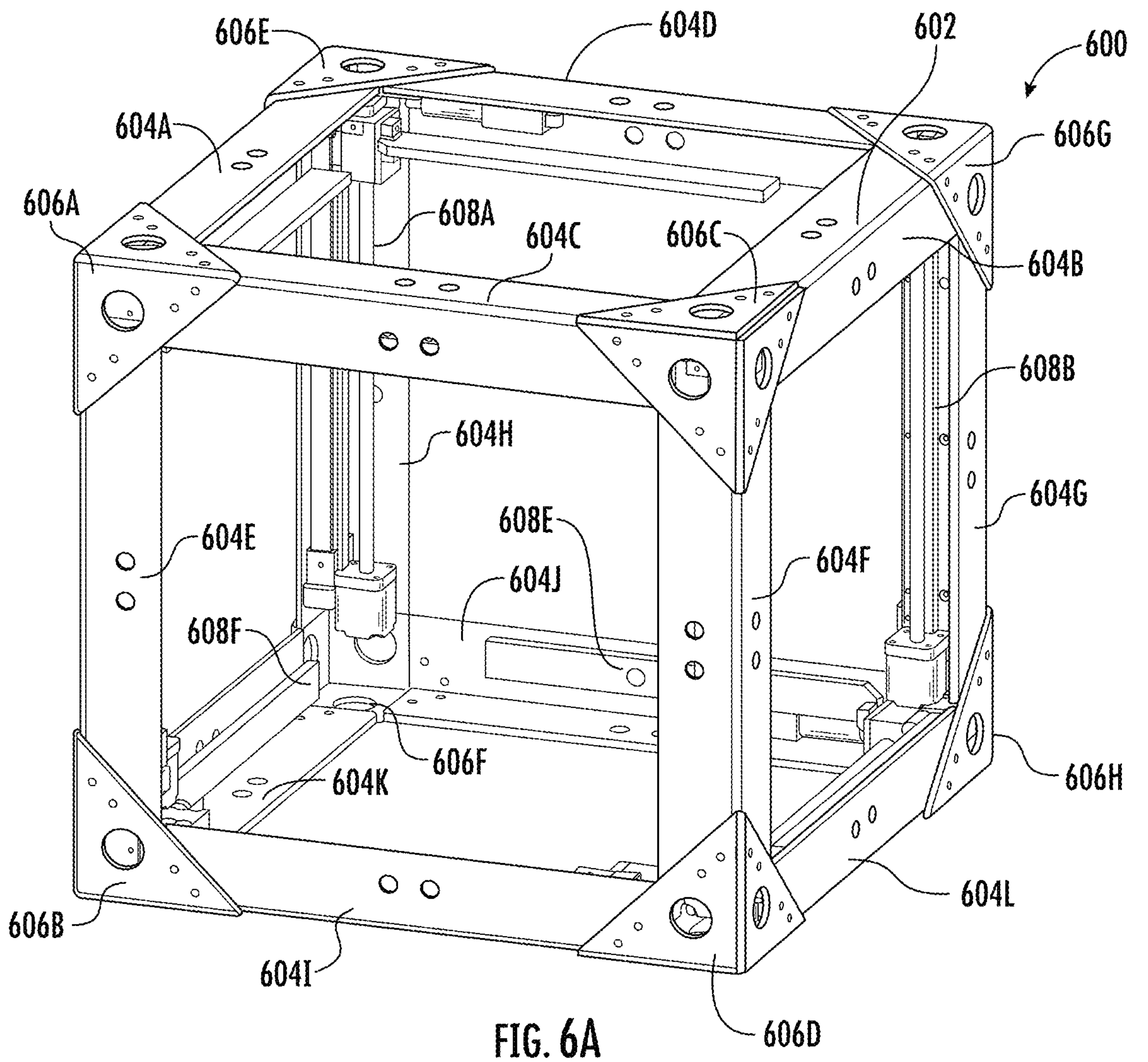
FIG. 6A is an example perspective view of an example smart rack in accordance with some embodiments of the present disclosure.
Figure 6B:
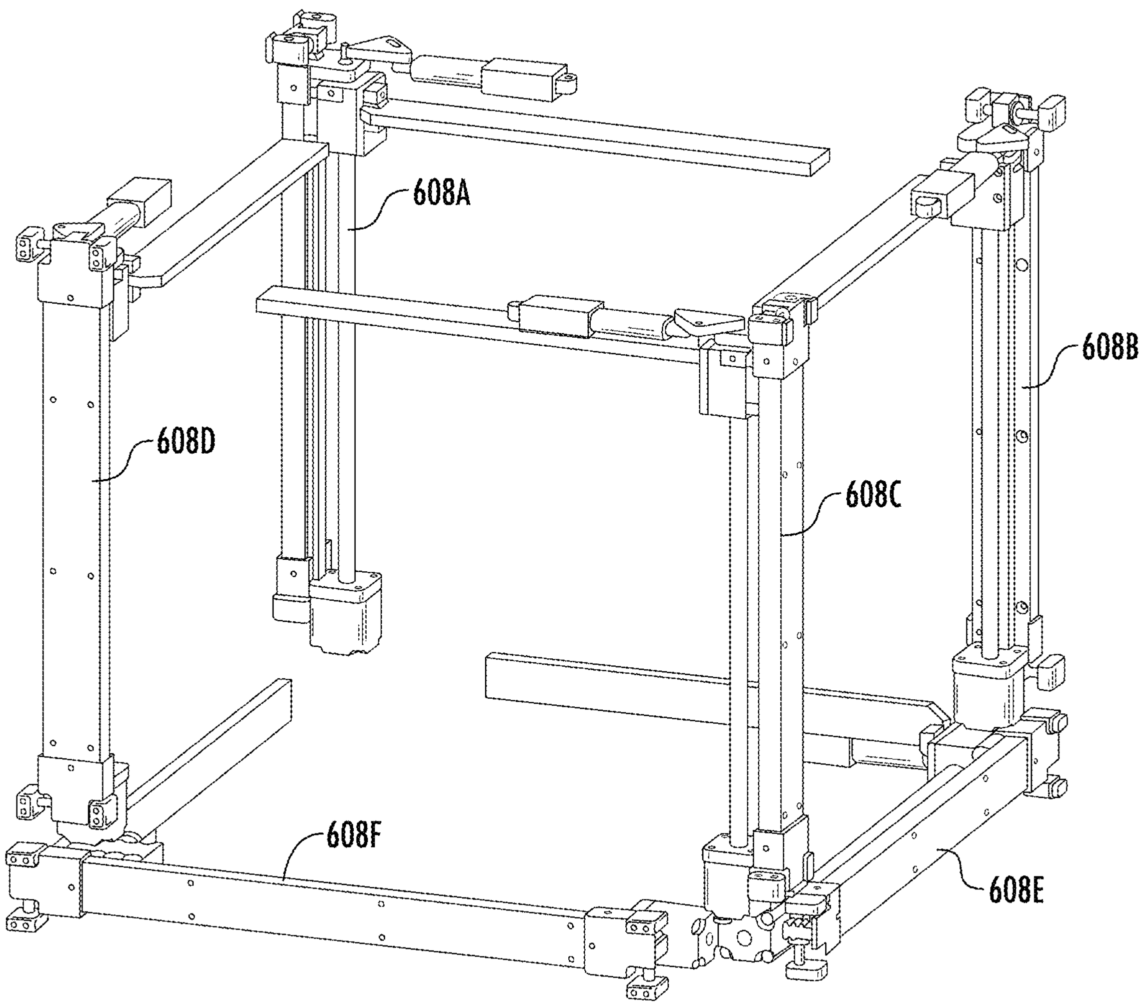
FIG. 6B is an example perspective view of a plurality of rack actuators in an example smart rack in accordance with some embodiments of the present disclosure.

FIG. 6A illustrates an example smart rack 600 in accordance with some embodiments of the present disclosure. FIG. 6B illustrates a plurality of rack actuators of the example smart rack 600 shown in FIG. 6A in accordance with some embodiments of the present disclosure. In particular, FIG. 6B removes the example rack frame 602 from the example smart rack 600 shown in FIG. 6A to illustrate the positions of the plurality of rack actuators of the example smart rack 600.

In the example shown in FIG. 6A and FIG. 6B, the example smart rack 600 comprises a rack frame 602 and a plurality of rack actuators that are secured within the rack frame 602.

Similar to those described above in connection with FIG. 2A, the rack frame 602 may comprise a plurality of rack beams, including, but not limited to, a plurality of top rack beams (such as, but not limited to, a left top rack beam 604A, a right top rack beam 604B, a front top rack beam 604C, and a back top rack beam 604D), a plurality of lateral rack beams (such as, but not limited to, a left front lateral rack beam 604E, a right front lateral rack beam 604F, a left back lateral rack beam 604H, and a right back lateral rack beam 604G), and a plurality of bottom rack beams (such as, but not limited to, a left bottom rack beam 604K, a right bottom rack beam 604L, a front bottom rack beam 604I, and a back bottom rack beam 604J).

For example, the rack frame 602 may comprise a left top rack beam 604A that is positioned at a left top portion of the rack frame 602. The rack frame 602 may comprise a right top rack beam 604B that is positioned at a right top portion of the rack frame 602. In some embodiments, the left top rack beam 604A and the right top rack beam 604B may be in a parallel arrangement with one another, similar to those described above.

In some embodiments, the rack frame 602 may comprise a front top rack beam 604C that is positioned at a front top portion of the rack frame 602, and a back top rack beam 604D that is positioned at a back top position of the rack frame 602. In some embodiments, the front top rack beam 604C and the back top rack beam 604D are in a parallel arrangement with one another, similar to those described above.

In some embodiments, the rack frame 602 may comprise a left bottom rack beam 604K that is positioned at a left bottom portion of the rack frame 602. The rack frame 602 may comprise a right bottom rack beam 604L that is positioned at a right bottom portion of the rack frame 602. In some embodiments, the left bottom rack beam 604K and the right bottom rack beam 604L may be in a parallel arrangement with one another, similar to those described above.

In some embodiments, the rack frame 602 may comprise a front bottom rack beam 604I that is positioned at a front bottom portion of the rack frame 602, and a back bottom rack beam 604J that is positioned at a back bottom position of the rack frame 602. In some embodiments, front bottom rack beam 604I and the back bottom rack beam 604J are in a parallel arrangement with one another, similar to those described above.

In some embodiments, the rack frame 602 may comprise a plurality of lateral rack beams that are secured between top rack beams and bottom rack beams.

For example, the rack frame 602 may comprise a left front lateral rack beam 604E that is positioned at a left front portion of the rack frame 602 and in a parallel arrangement with the lateral side of the rack frame 602. In some embodiments, the left front lateral rack beam 604E is secured to the left top rack beam 604A and the front top rack beam 604C through the left front top rack corner 606A, similar to those described above. In some embodiments, the left front lateral rack beam 604E is secured to the left bottom rack beam 604K and the front bottom rack beam 604I through the left front bottom rack corner 606B, similar to those described above.

In some embodiments, the rack frame 602 may comprise a right front lateral rack beam 604F that is positioned at a right front portion of the rack frame 602 and in a parallel arrangement with the lateral side of the rack frame 602. In some embodiments, the left front lateral rack beam 604E is secured to the right top rack beam 604B and the front top rack beam 604C through the right front top rack corner 606C, similar to those described above. In some embodiments, the right front lateral rack beam 604F is secured to the right bottom rack beam 604L and the front bottom rack beam 604I through the right front bottom rack corner 606D, similar to those described above.

In some embodiments, the rack frame 602 may comprise a left back lateral rack beam 604H that is positioned at a left back portion of the rack frame 602 and in a parallel arrangement with the lateral side of the rack frame 602. In some embodiments, the left back lateral rack beam 604H is secured to the left top rack beam 604A and the back top rack beam 604D through the left back top rack corner 606E, similar to those described above. In some embodiments, the left back lateral rack beam 604H is secured to the left bottom rack beam 604K and the back bottom rack beam 604J through the left back bottom rack corner 606F, similar to those described above.

In some embodiments, the rack frame 602 may comprise a right back lateral rack beam 604G that is positioned at a right back portion of the rack frame 602 and in a parallel arrangement with the lateral side of the rack frame 602. In some embodiments, the right back lateral rack beam 604G is secured to the right top rack beam 604B and the back top rack beam 604D through the right back top rack corner 606G, similar to those described above. In some embodiments, the right back lateral rack beam 604G is secured to the right bottom rack beam 604L and the back bottom rack beam 604J through the right back bottom rack corner 606H, similar to those described above.

In some embodiments, the example smart rack 600 may comprise one or more rack actuators that are secured within the rack frame 602 and between the rack beams of the rack frame 602.

In some embodiments, the one or more rack actuators may function as single axis linear actuators to transfer force/motion perpendicular to the axis of movement inside a smart rack. In some embodiments, the one or more rack actuators are hidden within the smart rack structure (for example, within the rack frame) to allow movement of the rectangular prism within the modular superstructure.

For example, as shown in FIG. 6A and/or FIG. 6B, the example smart rack 600 may comprise a left back lateral rack actuator 608A, a right back lateral rack actuator 608B, a right front lateral rack actuator 608C, a left front lateral rack actuator 608D, a front bottom rack actuator 608F, and a right bottom rack actuator 608E.

In some embodiments, the left back lateral rack actuator 608A may be positioned such that the lead screw of the left back lateral rack actuator 608A is in a parallel arrangement with the left back lateral rack beam 604H, and that the arm of the left back lateral rack actuator 608A extends in a horizontal plane. For example, the left back lateral rack actuator 608A may comprise a linear guide that is secured to the inner surface of the left back lateral rack beam 604H (for example, secured to the left beam plate of the left back lateral rack beam 604H), and the linear guide is in a parallel arrangement with the lead screw of the left back lateral rack actuator 608A. In such an example, the arm of the left back lateral rack actuator 608A may provide a single axis movement along the left back lateral rack beam 604H. For example, the arm of the left back lateral rack actuator 608A may move up and down on the back of the smart rack 600.

In some embodiments, the right back lateral rack actuator 608B may be positioned such that the lead screw of the right back lateral rack actuator 608B is in a parallel arrangement with the right back lateral rack beam 604G, and that the arm of the right back lateral rack actuator 608B extends in a horizontal direction. For example, the right back lateral rack actuator 608B may comprise a linear guide that is secured to the inner surface of the right back lateral rack beam 604G (for example, secured to the back beam plate of the right back lateral rack actuator 608B), and the linear guide is in a parallel arrangement with the lead screw of the right back lateral rack actuator 608B. In such an example, the arm of the right back lateral rack actuator 608B may provide a single axis movement along the right back lateral rack beam 604G. For example, the arm of the right back lateral rack actuator 608B may move up and down on the right of the smart rack 600.

In some embodiments, the right front lateral rack actuator 608C may be positioned such that the lead screw of the right front lateral rack actuator 608C is in a parallel arrangement with the right front lateral rack beam 604F, and that the arm of the right front lateral rack actuator 608C extends in a horizontal direction. For example, the right front lateral rack actuator 608C may comprise a linear guide that is secured to the inner surface of the right front lateral rack beam 604F (for example, secured to the right beam plate of the right front lateral rack beam 604F), and the linear guide is in a parallel arrangement with the lead screw of the right front lateral rack actuator 608C, details of which are described herein. In such an example, the arm of the right front lateral rack actuator 608C may provide a single axis movement along the right front lateral rack beam 604F. For example, the arm of the right front lateral rack actuator 608C may move up and down on the front of the smart rack 600.

In some embodiments, the left front lateral rack actuator 608D may be positioned such that the lead screw of the left front lateral rack actuator 608D is in a parallel arrangement with the left front lateral rack beam 604E, and/or that the arm of the left front lateral rack actuator 608D extends in a horizontal direction. For example, the left front lateral rack actuator 608D may comprise a linear guide that is secured to the inner surface of the left front lateral rack beam 604E (for example, secured to the front beam plate of the left front lateral rack beam 604E), and the linear guide is in a parallel arrangement with the lead screw of the left front lateral rack actuator 608D, details of which are described herein. In such an example, the arm of the left front lateral rack actuator 608D may provide a single axis movement along the left front lateral rack beam 604E. For example, the arm of the left front lateral rack actuator 608D may move up and down on the left of the smart rack 600.

In some embodiments, the front bottom rack actuator 608F may be positioned such that the lead screw of the front bottom rack actuator 608F is in a parallel arrangement with the front bottom rack beam 604I, and/or that the arm of the front bottom rack actuator 608F extends in a horizontal direction. For example, the front bottom rack actuator 608F may comprise a linear guide that is secured to the inner surface of the front bottom rack beam 604I (for example, secured to the front beam plate of the front bottom rack beam 604I), and the linear guide is in a parallel arrangement with the lead screw of the front bottom rack actuator 608F, details of which are described herein. In such an example, the arm of the front bottom rack actuator 608F may provide a single axis movement along the front bottom rack beam 604I. For example, the arm of the front bottom rack actuator 608F may move left and right on the bottom of the smart rack 600.

In some embodiments, the right bottom rack actuator 608E may be positioned such that the lead screw of the right bottom rack actuator 608E is in a parallel arrangement with the right bottom rack beam 604L, and/or that the arm of the right bottom rack actuator 608E extends in a horizontal direction. For example, the right bottom rack actuator 608E may comprise a linear guide that is secured to the inner surface of the right bottom rack beam 604L (for example, secured to the right beam plate of the right bottom rack beam 604L), and the linear guide is in a parallel arrangement with the lead screw of the right bottom rack actuator 608E, details of which are described herein. In such an example, the arm of the right bottom rack actuator 608E may provide a single axis movement along the right bottom rack beam 604L. For example, the arm of the right bottom rack actuator 608E may move front and back on the bottom of the smart rack 600.

As such, the examples shown in FIG. 6A and FIG. 6B illustrate examples of symmetrical/semi-symmetrical designs by mounting rack actuators on all sides of the rack frame.

Figure 7A:
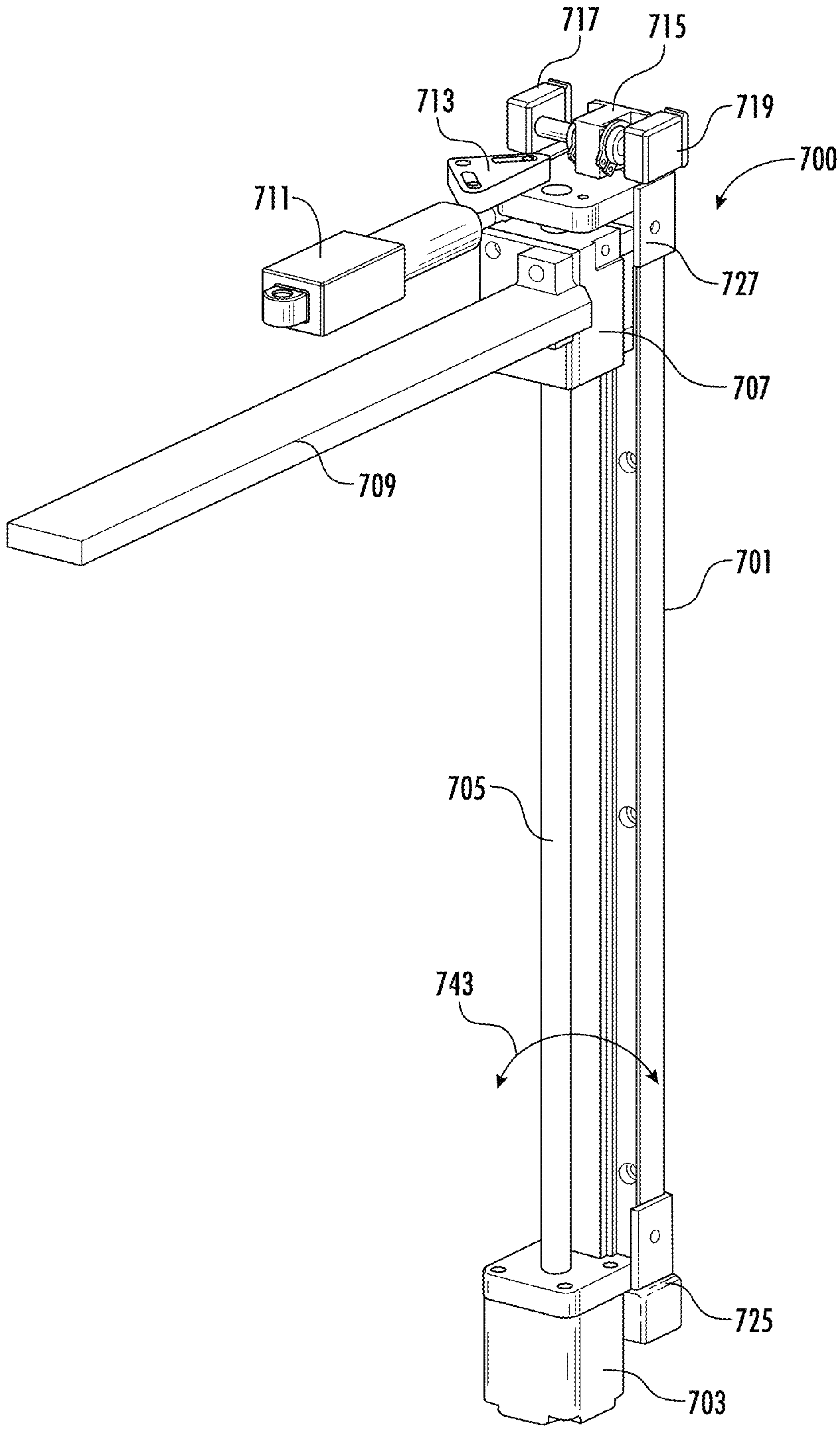
FIG. 7A is an example perspective view of an example rack actuator in accordance with some embodiments of the present disclosure.
Figure 7B:
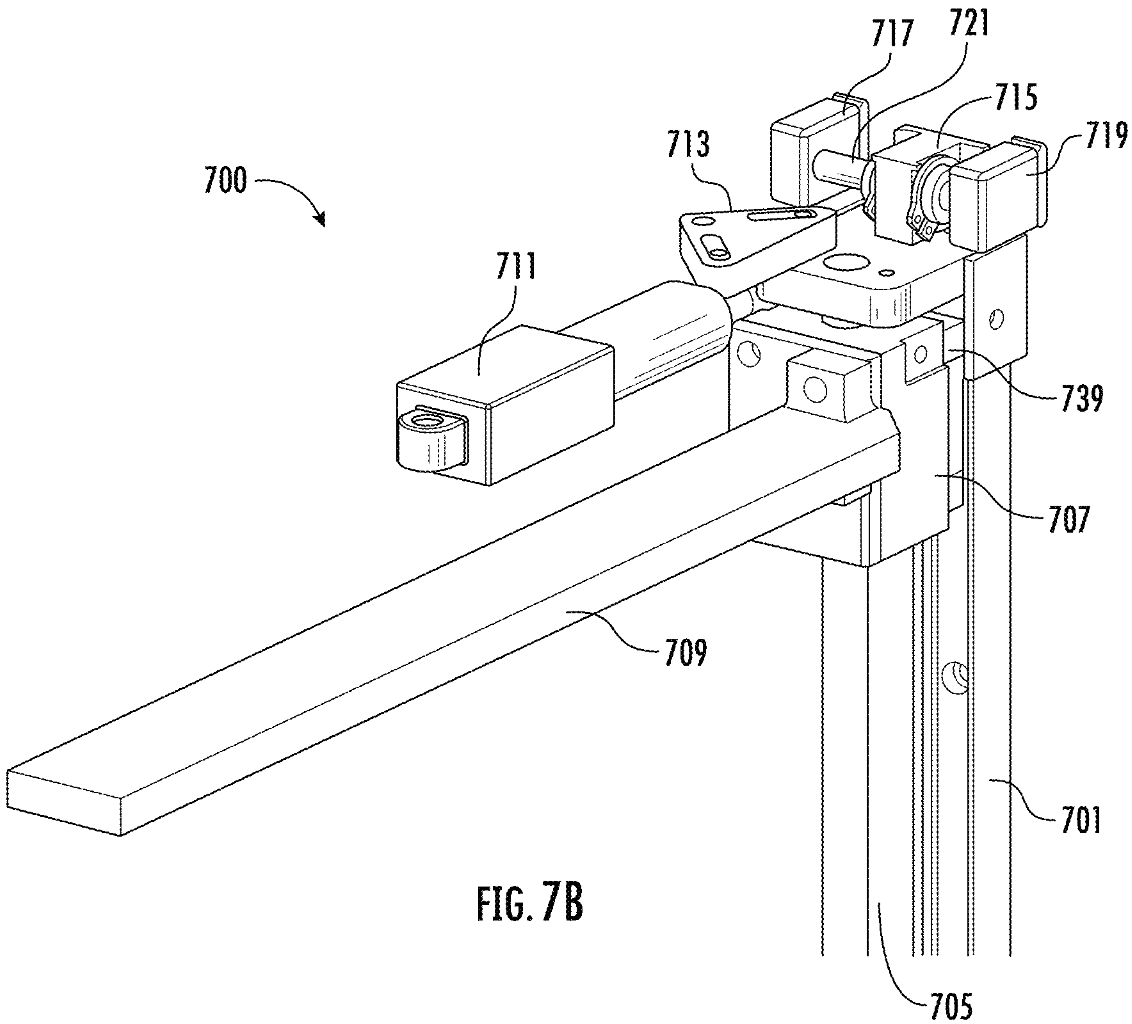
FIG. 7B is an example zoomed view of an example portion of the example rack actuator shown in FIG. 7A in accordance with some embodiments of the present disclosure.
Figure 7C:
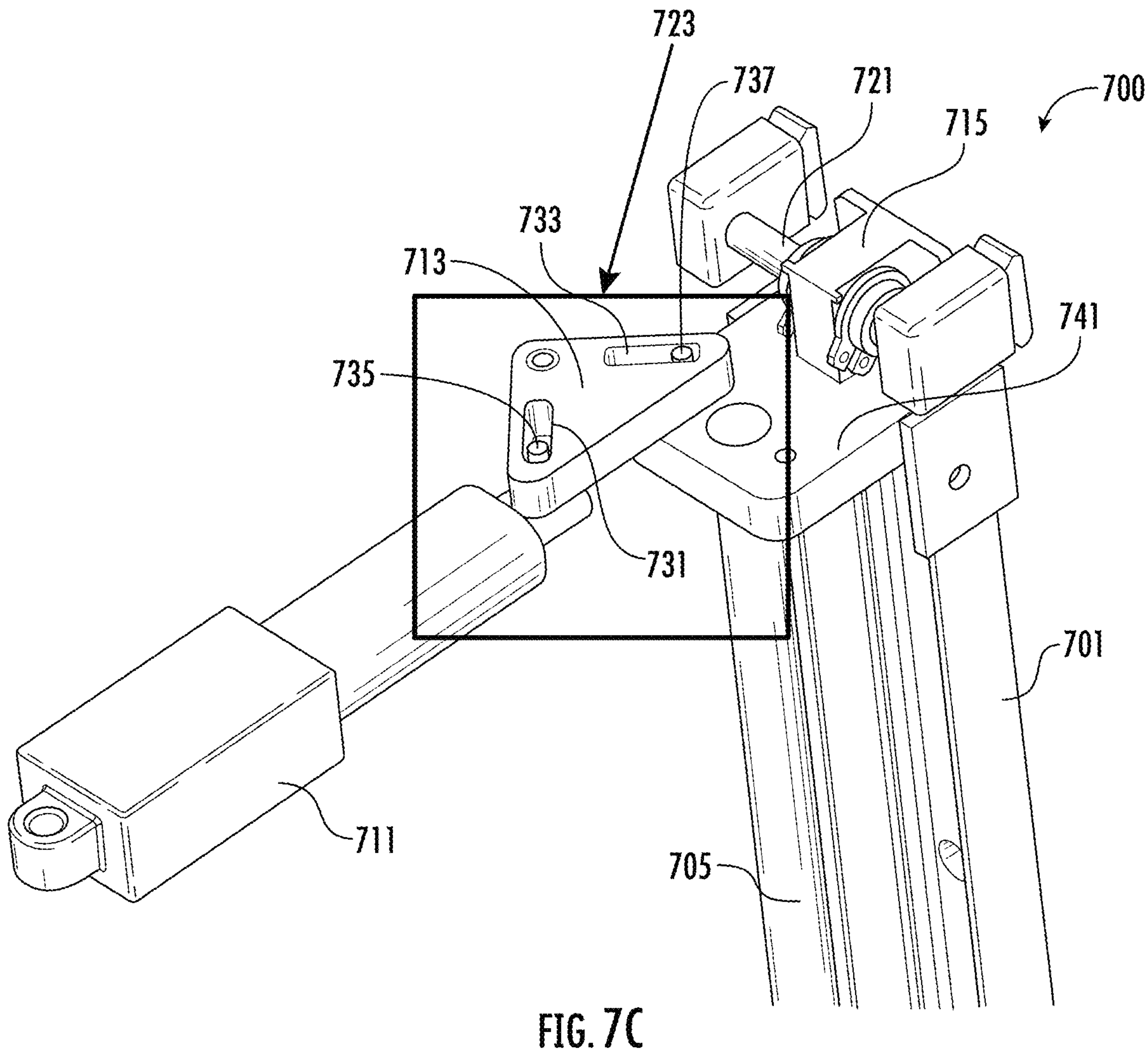
FIG. 7C is another example zoomed view of an example portion of the example rack actuator shown in FIG. 7A in accordance with some embodiments of the present disclosure.

Referring now to FIG. 7A to FIG. 7G, example views of an example rack actuator 700 in accordance with various embodiments of the present disclosure are illustrated. In particular, FIG. 7A illustrates an example perspective view of an example rack actuator 700 in accordance with some embodiments of the present disclosure. FIG. 7B illustrates an example zoomed view of an example portion of the example rack actuator 700 shown in FIG. 7A in accordance with some embodiments of the present disclosure. FIG. 7C illustrates another example zoomed view of an example portion of the example rack actuator 700 shown in FIG. 7A in accordance with some embodiments of the present disclosure.

In the example shown in FIG. 7A, the example rack actuator 700 may comprise a linear guide 701. Similar to those described above, the linear guide 701 may be secured to an inner surface of the rack plate of a rack beam.

In some embodiments, the linear guide 701 may be in the form of a FLS 30 linear guide. In some embodiments, the linear guide 701 may be in the form of other linear guide(s).

In some embodiments, the linear guide 701 may comprise a first end 725 and a second end 727. In some embodiments, an actuator base 703 may be disposed at the first end 725 of the linear guide 701. In some embodiments, the actuator base 703 may provide housing for components that include, but are not limited to, step motors, controllers, and/or the like.

In some embodiments, the step motor within the actuator base 703 may be in the form of a Nema 11 motor. In some embodiments, the step motor may be in other forms.

In the example shown in FIG. 7A, a lead screw 705 extends from the actuator base 703. For example, the lead screw 705 may be connected to the step motor that is housed within the actuator base 703, so that the step motor may exert rotational motion on the lead screw 705. In some embodiments, the connection between the actuator base 703 to the linear guide 701 may not be fixed. For example, the actuator base 703 (along with the lead screw 705) may rotate, as shown by the arrow 743 in FIG. 7A.

In some embodiments, a second end of the lead screw 705 may be secured to a swing plate 715. As shown in FIG. 7B, the swing plate 715 may be positioned on a swing bar 721. For example, the swing plate 715 may comprise an opening in the center, and the swing bar 721 may be positioned through the opening in the center. In some embodiments, one or more bearings may be provided between the opening in the center of the swing plate 715 and the swing bar 721, such that the swing plate 715 may move along the swing bar 721. In some embodiments, one or more snap rings may be positioned on the inner circumference of the bearings contacting the swing bar 721 and/or the outer circumference of the bearings contacting the opening in the center of the swing plate 715, so as to secure the bearings. In some embodiments, the swing plate 715 is movable between a distal end of the swing bar 721 and a proximal end of the swing bar 721, details of which are described herein.

In some embodiments, the swing bar 721 is secured between a first spacer 717 and a second spacer 719. In some embodiments, the first spacer 717 and the second spacer 719 may provide support to secure the rack actuator within the rack frame. For example, support and spacing may be provided for better fitment of the first spacer 717 and the second spacer 719 against the rack plates of the rack frame.

In some embodiments, the example rack actuator 700 further comprises a slider 707 that is positioned on the lead screw 705. In some embodiments, the slider 707 may be movably along the lead screw 705. For example, the lead screw 705 may comprise outer threads that engage with the inner threads of the slider 707. Additionally, the slider 707 may comprise slider legs 739 that can travel along the inner groove of the linear guide 701.

In some embodiments, the step motor stored in the actuator base 703 may cause the lead screw 705 to rotate. As the inner threads of the slider 707 is engaged with the outer threads of the lead screw 705, and that the slider 707 can travel along the inner groove of the linear guide 701, the rotational motion from the lead screw 705 can be translated into a vertical motion of the slider 707. In other words, the step motor stored in the actuator base 703 can cause the slider 707 to travel along the lead screw 705.

In some embodiments, an arm 709 is secured to the slider 707. In some embodiments, the arm 709 may be in a shape similar to a cuboid shape. In some embodiments, the arm 709 may be in a perpendicular arrangement with the lead screw 705. Similar to those described above in connection with at least FIG. 6A and FIG. 6B, the step motor stored in the actuator base 703 may cause the arm 709 to be moved to different positions relative to a rib of a rectangular prism, including a top position and a bottom position.

Further, the arm 709 may operate in an engaged mode or a disengaged mode. As described above, when the arm 709 is in the engaged mode, the arm 709 is in contact with the outer surface of the rectangular prism. When the arm 709 is in the disengaged mode, the arm 709 is not in contact with the outer surface of the rectangular prism. In some embodiments, the linear motor 711 may cause the rack actuator 700 to switch between the engaged mode and the disengaged mode.

Referring now to FIG. 7C, a zoomed view of a portion of the rack actuator 700 is illustrated. In particular, FIG. 7C highlights the connections between the linear motor 711 and the hinge plate 713 shown in area 723.

In the example shown in FIG. 7C, the hinge plate 713 comprises/defines a first groove 731 and a second groove 733. In some embodiments, the first groove 731 and the second groove 733 are at a 90-degree angle with one another. For example, the first groove 731 defines a first longitudinal axis, and the second groove 733 defines a second longitudinal axis. In some embodiments, the first longitudinal axis is at a 90-degree angle with the second longitudinal axis.

In some embodiments, the linear motor 711 may exert a linear motion. In some embodiments, the linear motor 711 may comprise an actuator pin 735 that is disposed in the first groove 731 and movable along the first groove 731. For example, the actuator pin 735 may be movable along the first longitudinal axis of the first groove 731.

In some embodiments, the rack actuator 700 may comprise an intermediate plate 741. As shown in FIG. 7C, the intermediate plate 741 may comprise a connector pin 737 that is disposed in the second groove 733, and is movable along the second longitudinal axis of the second groove 733. In some embodiments, the intermediate plate 741 is secured to the swing plate 715.

As described above, the first longitudinal axis of the first groove 731 and the second longitudinal axis of the second groove 733 may be at a 90-degree angle with one another, such that the hinge plate 713 transfers the linear motion exerted by the linear motor 711 to movements of the swing plate between the distal end and the proximal end across a 90-degree turn. For example, because the actuator pin 735 of the linear motor 711 may travel along the first longitudinal axis of the first groove 731, and the connector pin 737 of the intermediate plate 741 may travel along the second longitudinal axis of the second groove 733, the hinge plate 713 may translate the linear motions from the linear motor 711 in a first direction to motions of the intermediate plate 741 (and the swing plate 715) in a second direction. In some embodiments, the first direction is at a 90-degree angle with the second direction.

As such, the hinge plate 713 may transfer linear motion across a 90-degree angle corner to engage arms onto the outer surface of the rectangular prism, details of which are described in connection with at least FIG. 7D to FIG. 7G.

Figure 7D:
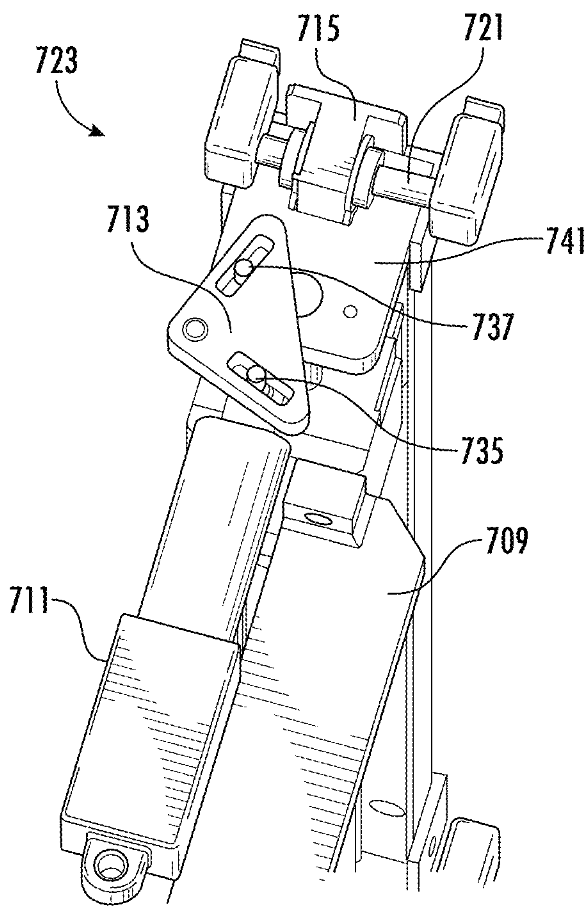
FIG. 7D is an example perspective view of at least a portion of the example rack actuator that is in a disengaged mode in accordance with some embodiments of the present disclosure.
Figure 7E:
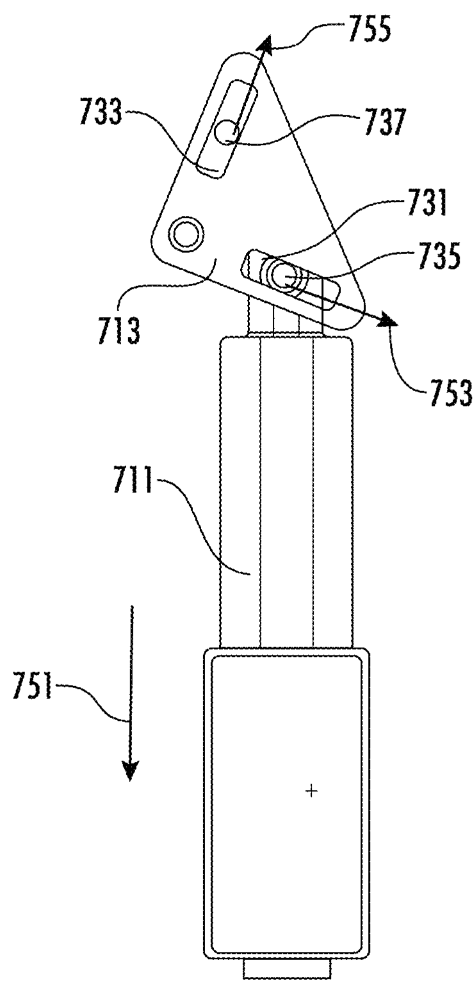
FIG. 7E is an example top view of at least a portion of the example rack actuator that is in a disengaged mode in accordance with some embodiments of the present disclosure.
Figure 7F:
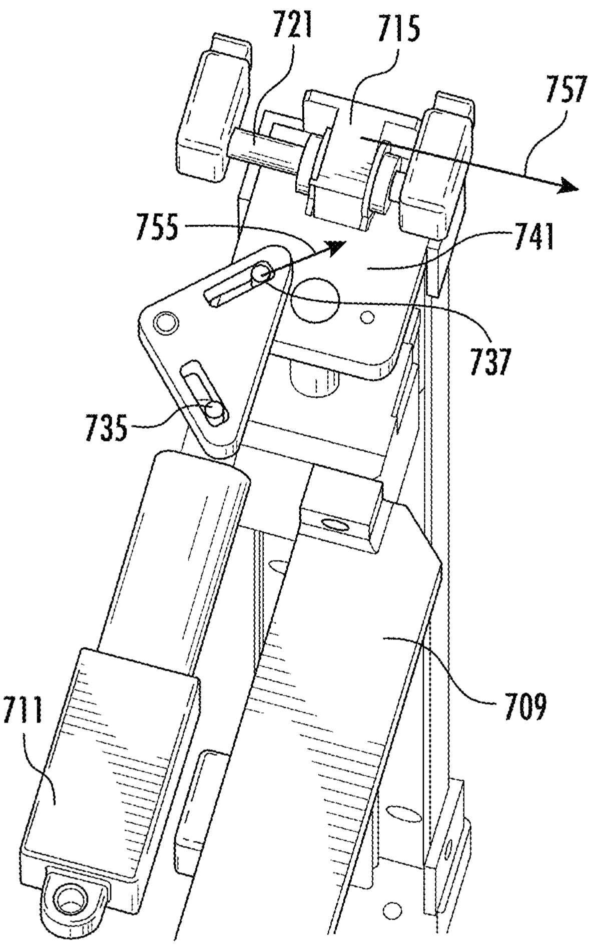
FIG. 7F is an example perspective view of at least a portion of the example rack actuator that is in an engaged mode in accordance with some embodiments of the present disclosure.
Figure 7G:
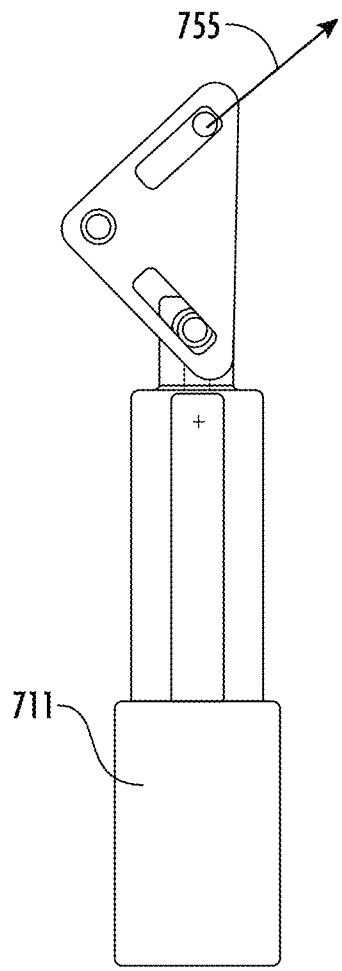
FIG. 7G is an example top view of at least a portion of the example rack actuator that is in an engaged mode in accordance with some embodiments of the present disclosure.

Referring now to FIG. 7D to FIG. 7G, example perspective views and top views of at least a portion of the example rack actuator 700 in accordance with some embodiments of the present disclosure are illustrated. In particular, FIG. 7D and FIG. 7E illustrate example views when the arm 709 is in the disengaged mode. FIG. 7F and FIG. 7G illustrate example views when the arm 709 is in the engaged mode.

In the example shown in FIG. 7D, the swing plate 715 is positioned near a distal end of the swing bar 721. In the present disclosure, the distal end of the swing bar 721 refers to an end of the swing bar 721 that is the furthest from an outer surface of the rectangular prism that is positioned within the smart rack. In some embodiments, when the swing plate 715 is at the distal end of the swing bar, the arm 709 is in the disengaged mode.

As shown in FIG. 7D, the swing plate 715 is connected to the intermediate plate 741, which in turn is connected to the lead screw 705. Because the swing plate 715 is positioned furthest from the outer surface of the rectangular prism, the lead screw 705 is also rotated away from the outer surface of the rectangular prism. Because the arm 709 is secured to a slider 707 that is on the lead screw 705, the arm 709 is rotated further away from the outer surface of the rectangular prism. As such, the arm 709 is as shown in FIG. 7D is in a disengaged mode.

In some embodiments, to cause the arm 709 to switch from the disengaged mode to the engaged mode, the linear motor 711 may exert a linear motion. Referring now to FIG. 7E, an example linear motion 751 of the linear motor 711 is illustrated. In particular, the linear motion 751 exerted by the linear motor 711 is in a direction that is in a parallel arrangement with the outer surface of the rectangular prism, and is away from the lead screw 705. As described above, the linear motor 711 may comprise an actuator pin 735 that travels along the first longitudinal axis of the first groove 731. As such, the linear motion 751 is exerted to the actuator pin 735, and causes the actuator pin 735 to travel along the first groove 731 in the movement direction 753 shown in FIG. 7D.

As described above, the connector pin 737 of the intermediate plate 741 may travel along the second longitudinal axis of the second groove 733 of the hinge plate 713. Because the second longitudinal axis of the second groove 733 is at a 90 degrees angle with the first longitudinal axis of the first groove 731, when the linear motion 751 causes the actuator pin 735 to travel along the first groove 731 in the movement direction 753, the movement direction 755 of the connector pin 737 of the intermediate plate 741 is rotated at 90 degrees from the movement direction 753, as shown in FIG. 7E.

Referring now to FIG. 7F and FIG. 7G, the movement direction 755 of the connector pin 737 of the intermediate plate 741 caused by the linear motion 751 is shown. As described above, the intermediate plate 741 is secured to the swing plate 715. Because the swing plate 715 is positioned on a swing bar 721, the movement direction 755 of the connector pin 737 is transferred to a movement direction 757 of the swing plate 715. As shown in FIG. 7F, the movement direction 757 indicates that the swing plate 715 is moving towards a proximal end of the swing bar 721. In the present disclosure, the proximal end of the swing bar 721 refers to an end of the swing bar 721 that is the closest to an outer surface of the rectangular prism that is positioned within the smart rack.

Because the swing plate 715 is positioned closest to the outer surface of the rectangular prism, the lead screw 705 is also rotated to be close to the outer surface of the rectangular prism. Because the arm 709 is secured to a slider 707 that is on the lead screw 705, the arm 709 is rotated to be closed to the outer surface of the rectangular prism. As such, when the swing plate 715 is at the proximal end of the swing bar, the arm 709 is in the engaged mode as shown in FIG. 7F and FIG. 7G.

As such, FIG. 7D to FIG. 7G illustrate an example of causing the arm 709 to switch from a disengaged mode to an engaged mode. In particular, the linear motor 711 may exert a force in a direction that is in a parallel arrangement with the outer surface of the rectangular prism, and away from the lead screw 705 to cause the arm 709 to switch from a disengaged mode to an engaged mode. Similarly, the linear motor 711 may exert a force in a direction that is in a parallel arrangement with the outer surface of the rectangular prism, and towards the lead screw 705 to cause the arm 709 to switch from an engaged mode to a disengaged mode.

Referring now to FIG. 8A, FIG. 8B, FIG. 8C, and FIG. 8D, example views of an example rectangular prism and two peer example smart racks are provided.

In particular, FIG. 8A, FIG. 8B, FIG. 8C, and FIG. 8D illustrate example movements of an example rectangular prism 804 between the two peer example smart racks: from a smart rack 802A to a smart rack 802B that is secured to the right of the smart rack 802A. FIG. 8A to FIG. 8D illustrate an example of using rack actuators that are mounted symmetrically on all sides of a smart rack to move rectangular prisms in all directions, where each rack actuator provides single axis movements.

Figure 8A:
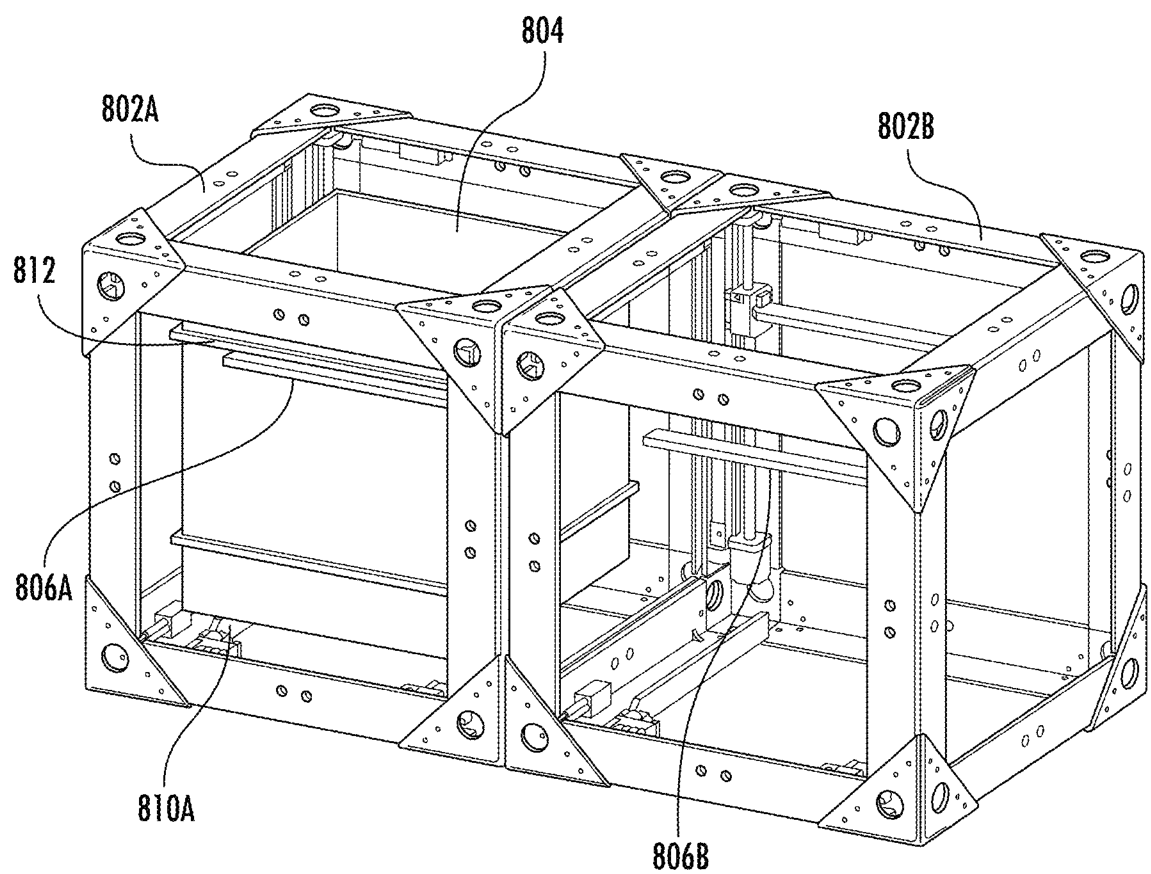
FIG. 8A, FIG. 8B, FIG. 8C, and FIG. 8D illustrate example movements of an example rectangular prism from one example smart rack to another example smart rack in a horizontal direction in accordance with some embodiments of the present disclosure.

In the example shown in FIG. 8A, a rectangular prism 804 may be positioned within the smart rack 802A. Similar to those described above, the rectangular prism 804 may comprise ribs that are disposed on an outer surface of the rectangular prism 804, including, but are not limited to, a top rib 812.

In some embodiments, the smart rack 802A may comprise a plurality of rack actuators. For example, the smart rack 802A may comprise a right front lateral rack actuator 806A. In some embodiments, to secure the rectangular prism 804 within the smart rack 802A, the right front lateral rack actuator 806A may be in the top position for the top rib 812 and in an engaged mode, similar to those described above. Similarly, the smart rack 802A may comprise another rack actuator (e.g. a left back lateral rack actuator) that is positioned opposite to the right front lateral rack actuator 806A, and may be moved to be in top position and in the engaged mode so that it can also support the rectangular prism 804.

Figure 8B:
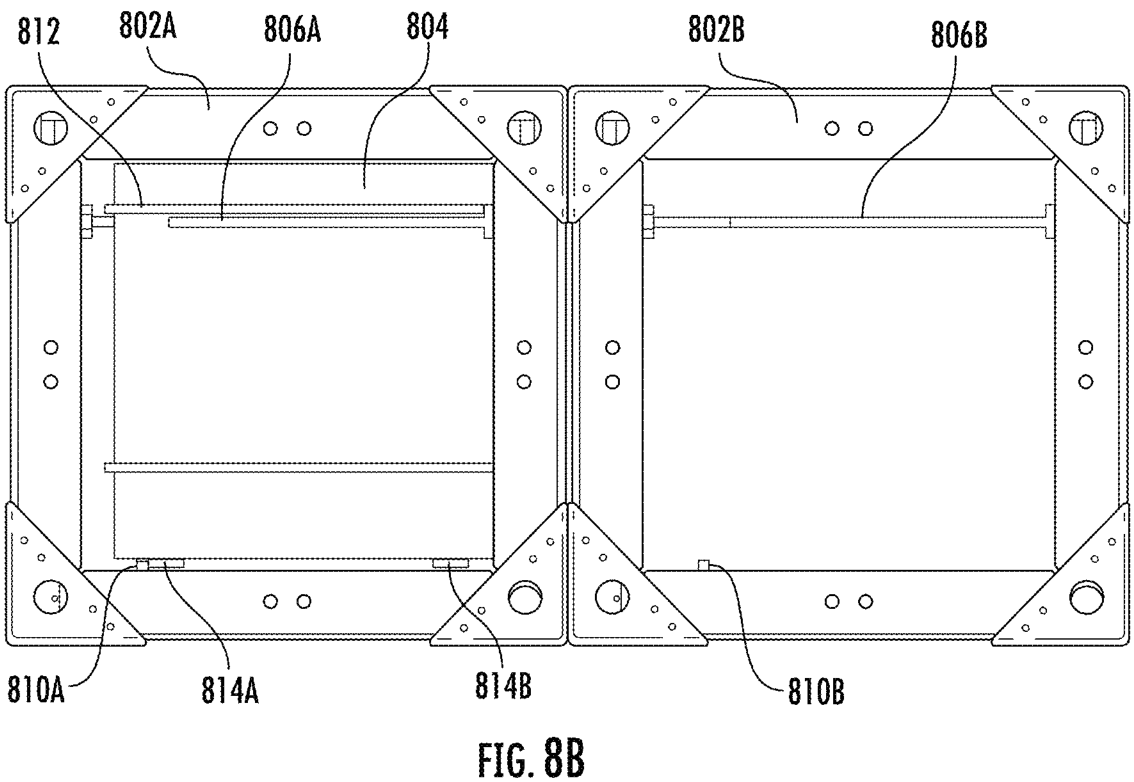

Referring now to FIG. 8B, a side view of the example shown in FIG. 8A is illustrated. In the example shown in FIG. 8B, the smart rack 802A may comprise a front bottom rack actuator 810A. In some embodiments, the front bottom rack actuator 810A may be positioned adjacent to left front bottom protrusion 814A, and may be in the engaged mode. For example, the front bottom rack actuator 810A may contact a left side of the left front bottom protrusion 814A.

In some embodiments, the front bottom rack actuator 810A may cause the smart rack 802B to be pushed to the right. For example, the front bottom rack actuator 810A may activate its step motor, and cause the slider to move towards the right along with the arm. Because the arm of the front bottom rack actuator 810A is in contact with the left front bottom protrusion 814A, the front bottom rack actuator 810A may cause the rectangular prism 804 to be moved to the right.

In some embodiments, the smart rack 802B may comprise one or more rack actuators. For example, the smart rack 802B may comprise a right front lateral rack actuator 806B and a front bottom rack actuator 810B. In some embodiments, the right front lateral rack actuator 806B may be moved to the top position and be in the engaged mode, such that the right front lateral rack actuator 806B may provide support to the rectangular prism 804 once it is moved into the smart rack 802B.

In some embodiments, prior to the top rib 812 is moved to be within the smart rack 802B, the front bottom rack actuator 810B may be in a disengaged mode, such that the right front protrusion 814B of the rectangular prism 804 may travel past the front bottom rack actuator 810B, without being blocked by the front bottom rack actuator 810B.

Figure 8C:
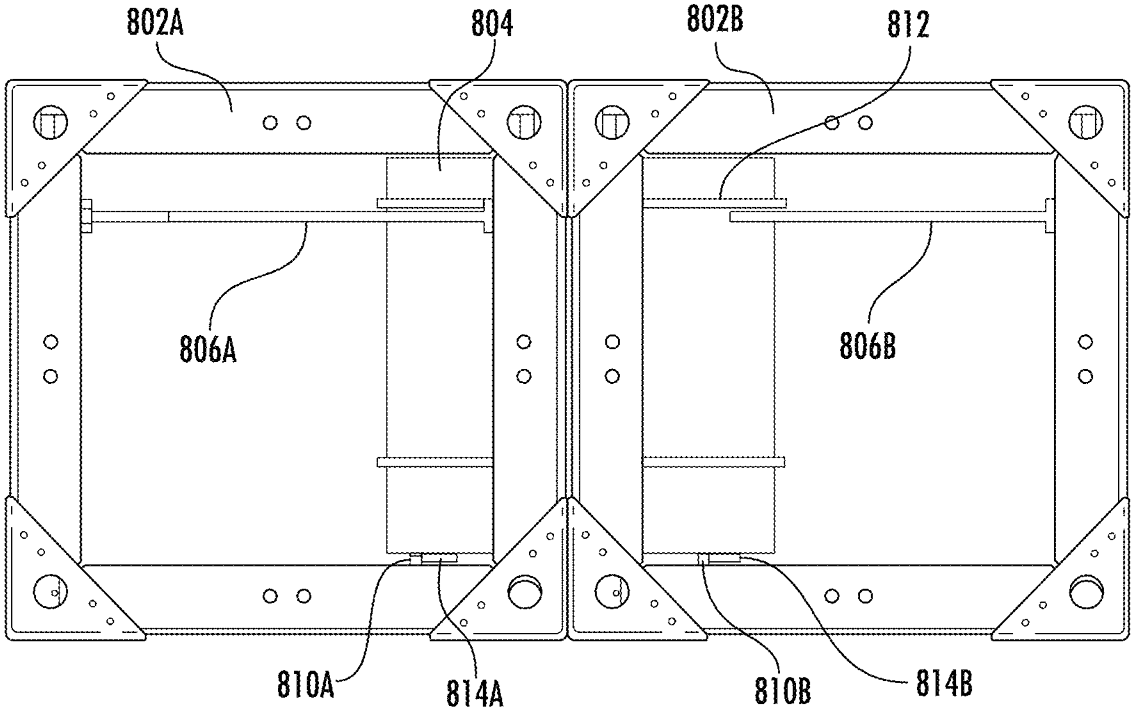

Referring now to FIG. 8C, the rectangular prism 804 is moved from the smart rack 802A to the smart rack 802B. In some embodiments, in response to determining that the right front protrusion 814B is moved past the front bottom rack actuator 810B, the front bottom rack actuator 810B may switch to engaged mode. In some embodiments, after the front bottom rack actuator 810B is in the engaged mode, the front bottom rack actuator 810B may push the rectangular prism 804 to the right, while the right front lateral rack actuator 806B may support the rectangular prism 804 via the top rib 812 throughout the right movement.

Figure 8D:
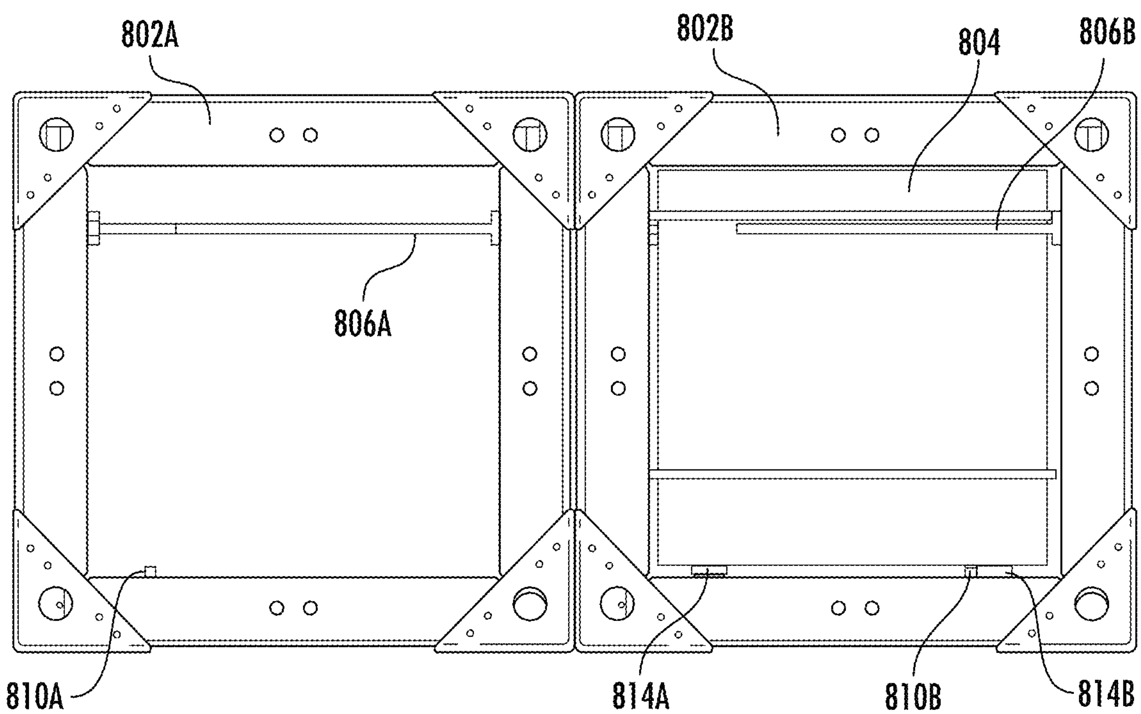

Referring now to FIG. 8D, the front bottom rack actuator 810A may continue pushing the right front protrusion 814B of the rectangular prism 804 towards the right, until the rectangular prism 804 is completely positioned with the smart rack 802B. As such, the rectangular prism 804 may be transported from the smart rack 802A to the smart rack 802B through the rack actuators.

Figure 9A:
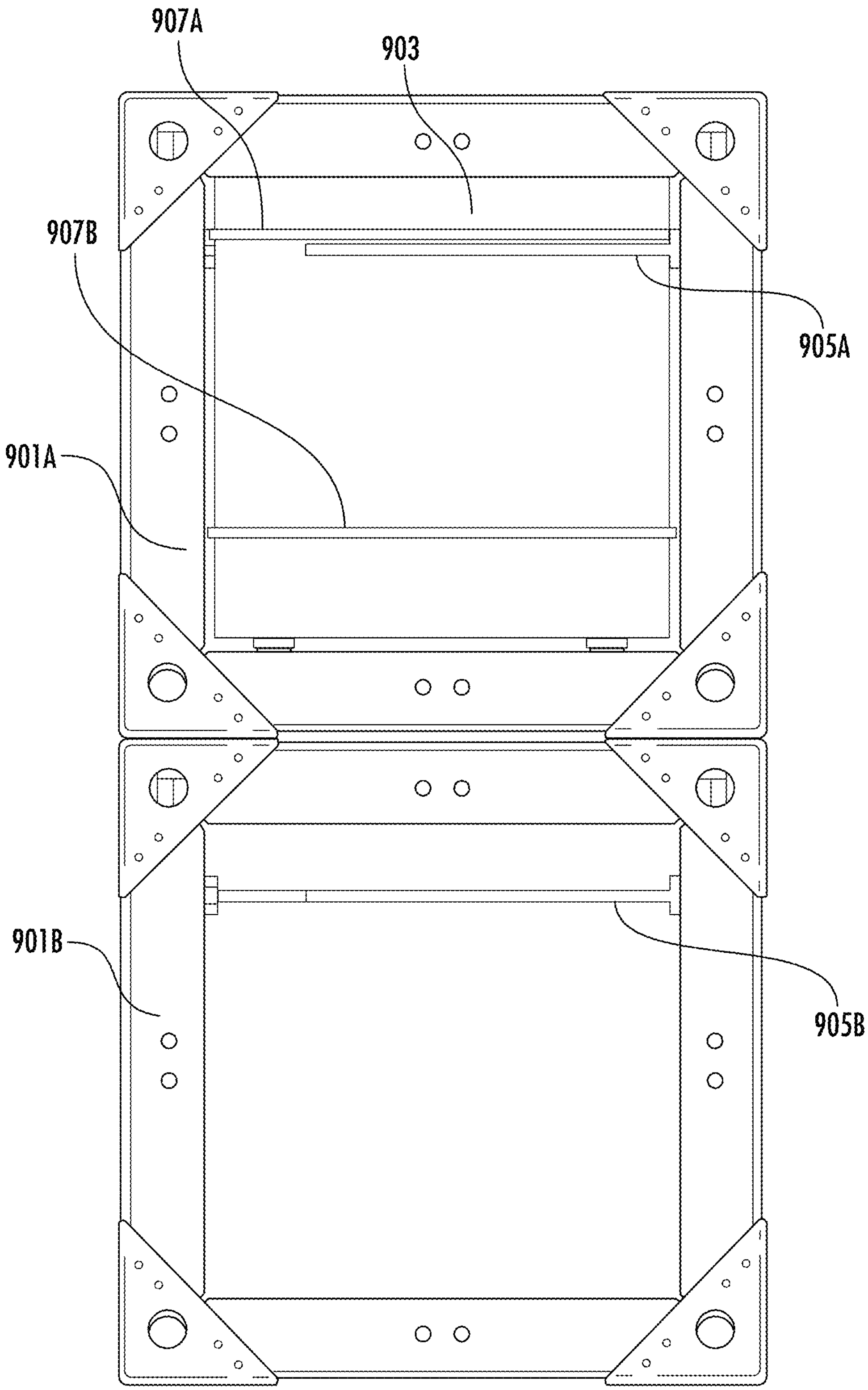
FIG. 9A, FIG. 9B, and FIG. 9C illustrate example movements of an example rectangular prism from one example smart rack to another example smart rack in a vertical direction in accordance with some embodiments of the present disclosure.
Figure 9B:
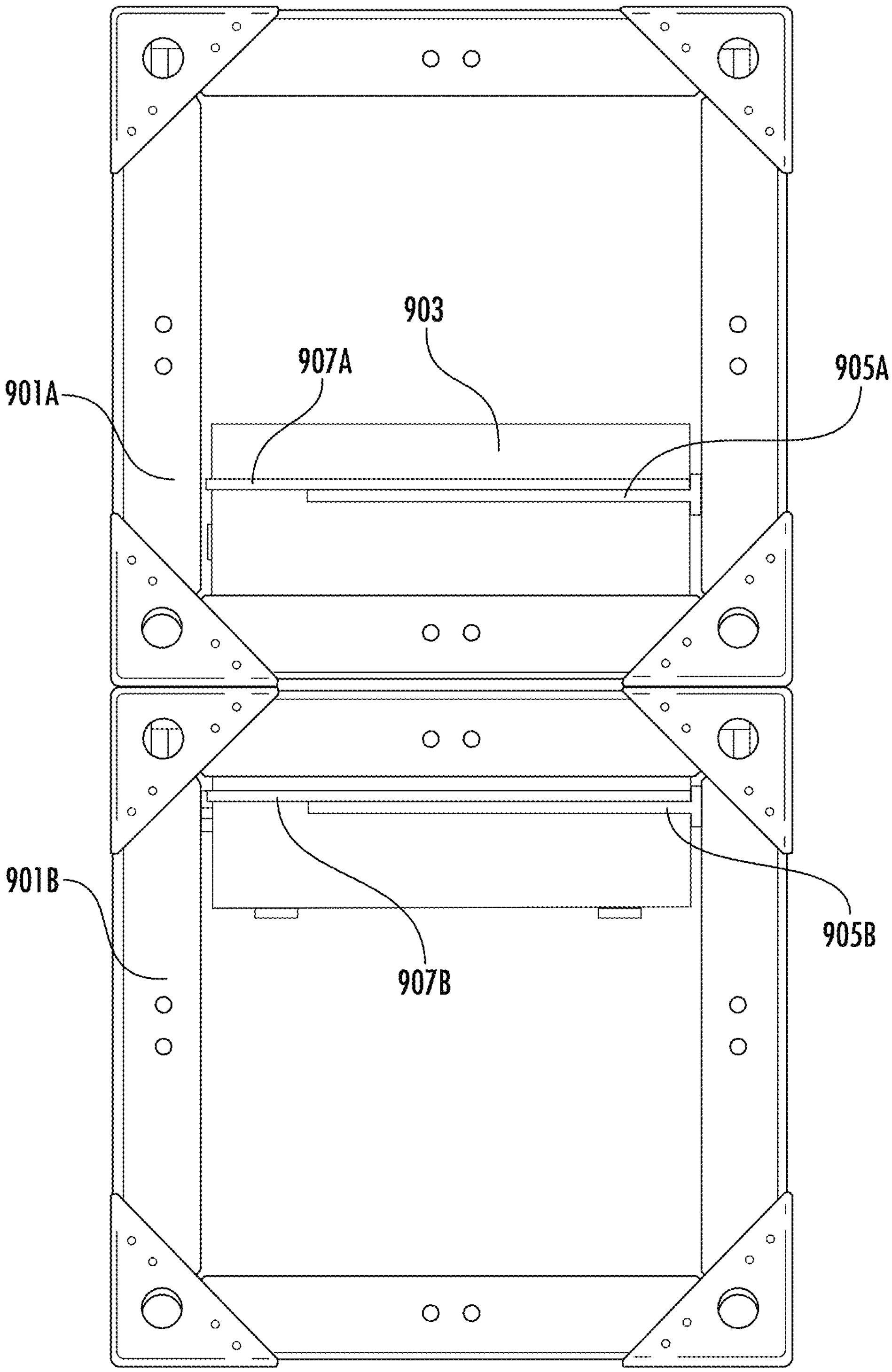
Figure 9C:
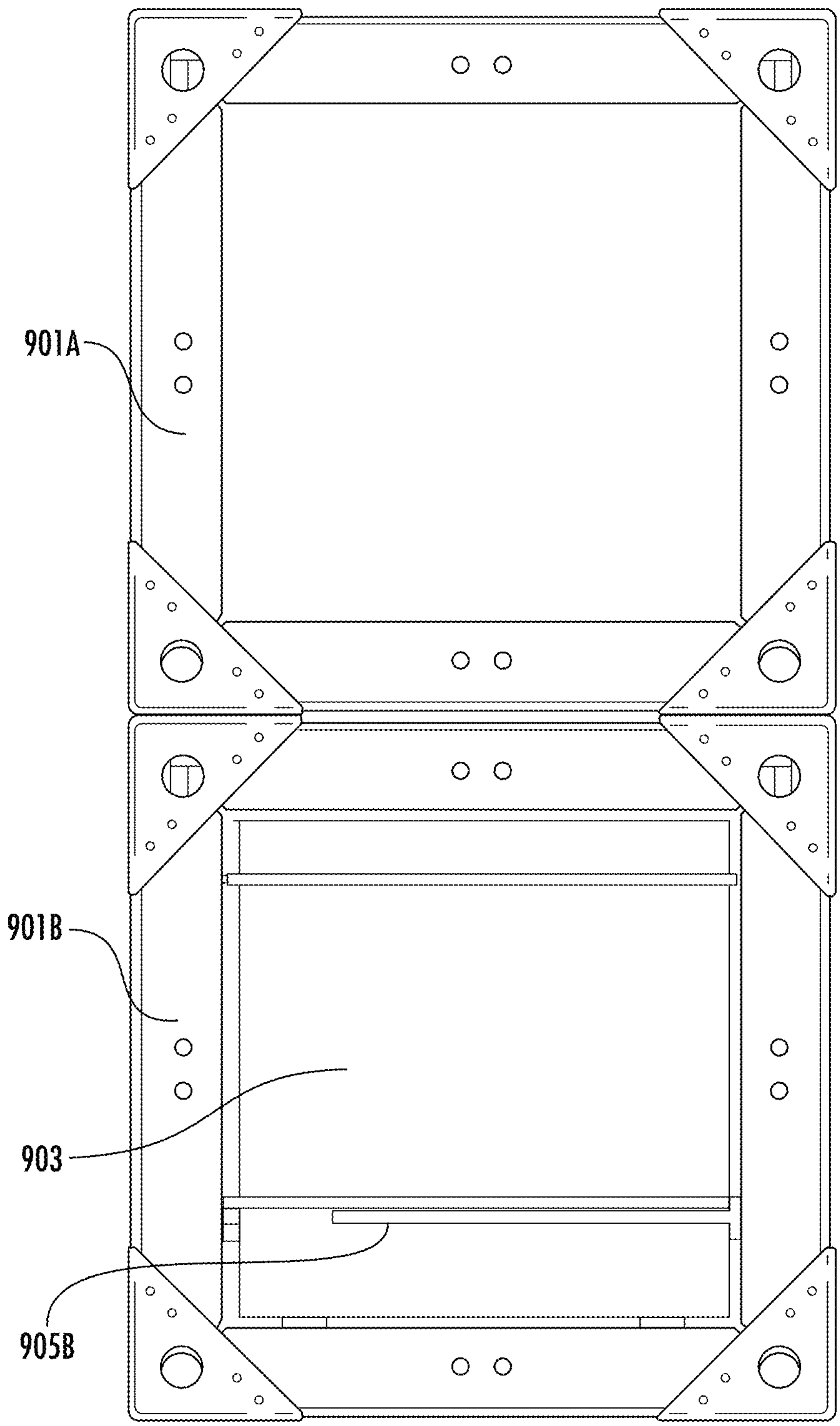

Referring now to FIG. 9A, FIG. 9B, and FIG. 9C, example views of an example rectangular prism and two peer example smart racks are provided.

In particular, FIG. 9A, FIG. 9B, and FIG. 9C illustrate a rectangular prism 903 between the two peer example smart racks: from a smart rack 901A to a smart rack 901B that is secured to the bottom of the smart rack 901A. FIG. 9A to FIG. 9C illustrate an example of using rack actuators that are mounted symmetrically on all sides of a smart rack to move rectangular prisms in all directions, where each rack actuator provides single axis movements.

Referring now to FIG. 9A, the rectangular prism 903 is positioned within the smart rack 901A. For example, the smart rack 901A may comprise one or more rack actuators, such as the right front lateral rack actuator 905A. In some embodiments, the right front lateral rack actuator 905A may be in the engaged mode and in the top position, such that the right front lateral rack actuator 905A may contact the top rib 907A of the rectangular prism 903, and may provide support for the rectangular prism 903. Similarly, the rectangular prism 903 may comprise another rack actuator (for example, a left back lateral rack actuator) that is positioned opposite to the right front lateral rack actuator 905A. In some embodiments, the rack actuator that is positioned opposite to the right front lateral rack actuator 905A may also provide support for the rectangular prism 903. In some embodiments, the rectangular prism 903 may be caused to travel downwards by lowering the arm of the right front lateral rack actuator 905A.

Referring now to FIG. 9B, in some embodiments, prior to or as the rectangular prism 903 travels downwards by lowering the right front lateral rack actuator 905A, the 905B of the 901B may be in an engaged mode. When the rectangular prism 903 travels downwards, the right front lateral rack actuator 905B may be in an engaged mode. As the rectangular prism 903 continues traveling downwards, the arm of the right front lateral rack actuator 905B becomes in contact with the bottom rib 907B of the rectangular prism 903. In some embodiments, after the arm of the right front lateral rack actuator 905B is in contact with the bottom rib 907B of the rectangular prism 903, the right front lateral rack actuator 905A be switched to a disengaged mode to release the top rib 907A.

Referring now to FIG. 9C, in some embodiments, after the right front lateral rack actuator 905A becomes disengaged from the 907A, the right front lateral rack actuator 905B may continue lowering the rectangular prism 903. As such, the rectangular prism 903 may be transported from the smart rack 901A to the smart rack 901B through a down movement.

Figure 10:
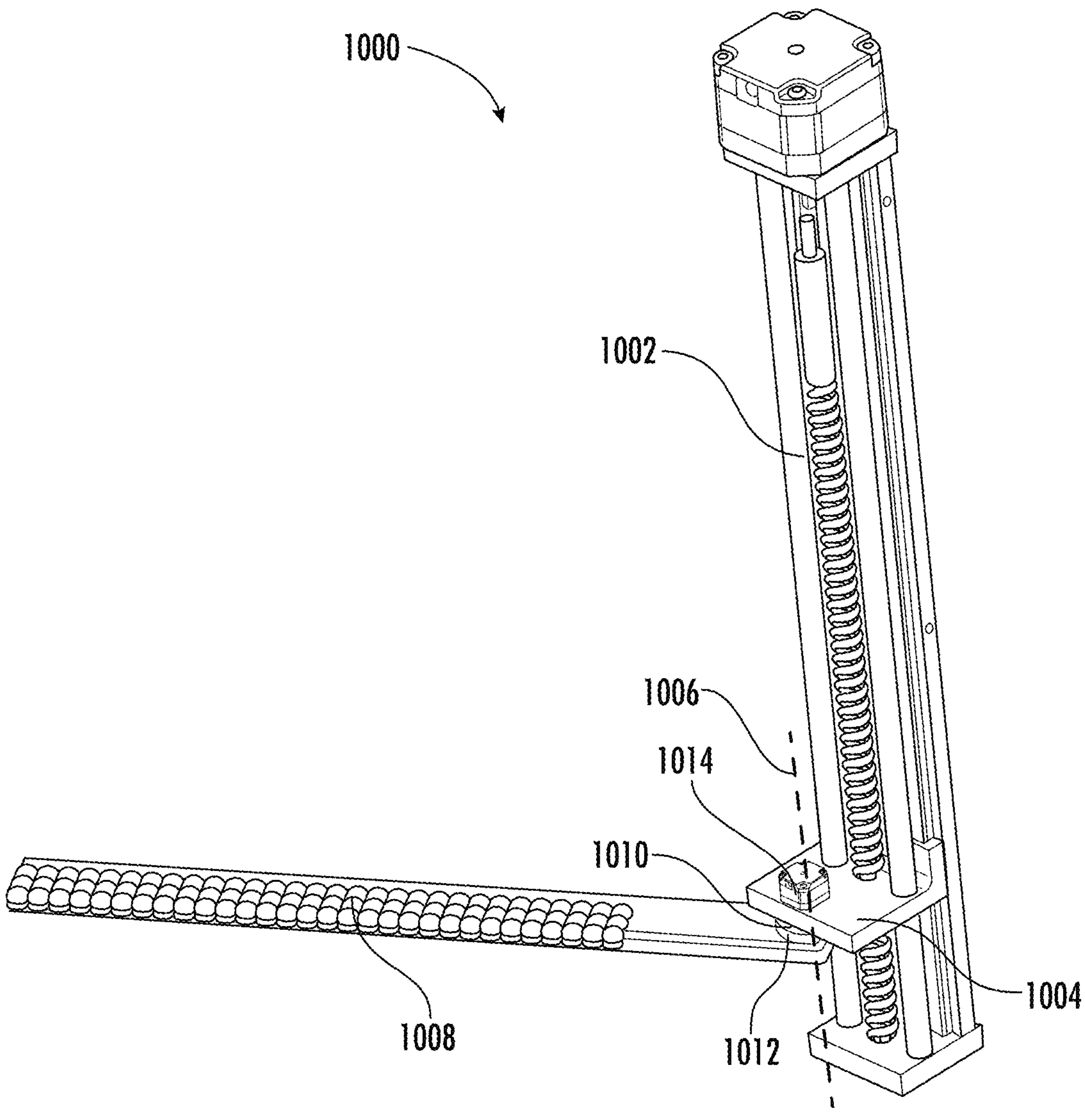
FIG. 10 is an example perspective view of an example rack actuator in accordance with some embodiments of the present disclosure.

Referring now to FIG. 10, an example perspective view of an example rack actuator 1000 in accordance with some embodiments of the present disclosure is illustrated. In particular, the example shown in FIG. 10 illustrates utilizing rack actuators that function as single axis linear actuators and coupled with rotational motion mechanism to engage and move rectangular prisms in a modular superstructure in accordance with various embodiments of the present disclosure.

In some embodiments, the example rack actuator 1000 may comprise a slider 1004 and a lead screw 1002. For example, a stepped motor may cause the lead screw 1002 to rotate, which in turn may cause the slider 1004 to move along the lead screw 1002, similar to those described above.

In some embodiments, an arm 1008 may be rotatably connected to the slider 1004. For example, the example rack actuator 1000 may comprise a rotary motor 1014 that can cause the arm 1008 to rotate/swing along the rotation axis 1006.

For example, the rotary motor 1014 may be secured to the slider 1004 and rotationally connected to an end of the arm 1008 through one or more bearings. In some embodiments, one or more bearings may include, but are not limited to, a thrust bearing 1012 that provides structural support for the arm 1008 to support a rectangular prism, as well as a ball bearing 1010 that allows the arm 1008 to rotate. As such, the example rack actuator 1000 shown in FIG. 10 provides structural support and transfers movement in rotation with use of bearings.

In some embodiments, the rotary motor 1014 is configured to cause a rotational motion of the arm 1008 relative to the slider. In some embodiments, the rotary motor 1014 may cause a maximum of 90-degree rotation of the arm 1008. For example, the rotary motor 1014 may cause the arm 1008 to rotate between the front of a smart rack and the left of the smart rack. As another example, the rotary motor 1014 may cause the arm 1008 to rotate between the front of a smart rack and the right of the smart rack. As another example, the rotary motor 1014 may cause the arm 1008 to rotate between the back of a smart rack and the right of the smart rack. As another example, the rotary motor 1014 may cause the arm 1008 to rotate between the back of a smart rack and the left of the smart rack.

In some embodiments, the rotary motor may cause the arm 1008 to rotate towards the outer surface of the rectangular prism, so as to cause the arm 1008 to be in an engaged mode. Additionally, or alternatively, the rotary motor may cause the arm 1008 to rotate away from the outer surface of the rectangular prism, so as to cause the arm 1008 to be in a disengaged mode.

As such, the example rack actuator 1000 shown in FIG. 10 illustrates examples of causing an arm of the rack actuator to switch between an engaged mode and a disengaged mode by utilizing a rotary motor to cause the arm to rotate towards/away from the outer surface of the rectangular prism. In accordance with various embodiments of the present disclosure, an example smart rack may comprise four rack actuators that are positioned similar to a turntable type design. For example, each of the arms of the rack actuators of the smart rack may be positioned in a perpendicular arrangement with the arms of its peer smart rack actuators, thereby providing force and direction of movement, additional details of which are described herein.

Figure 11A:
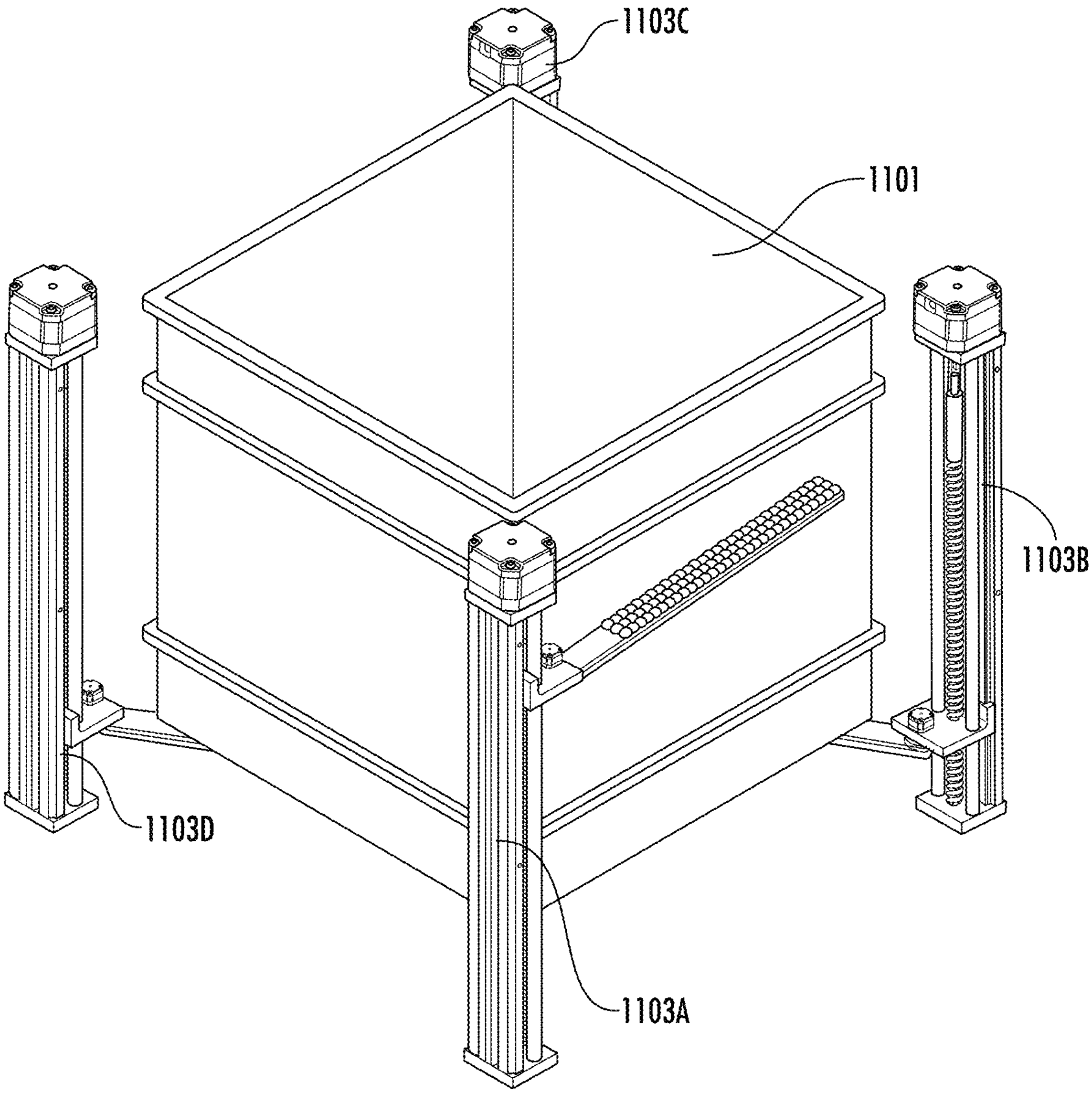
FIG. 11A illustrates example movements of an example rectangular prism in a horizontal direction in accordance with some embodiments of the present disclosure.
Figure 11B:
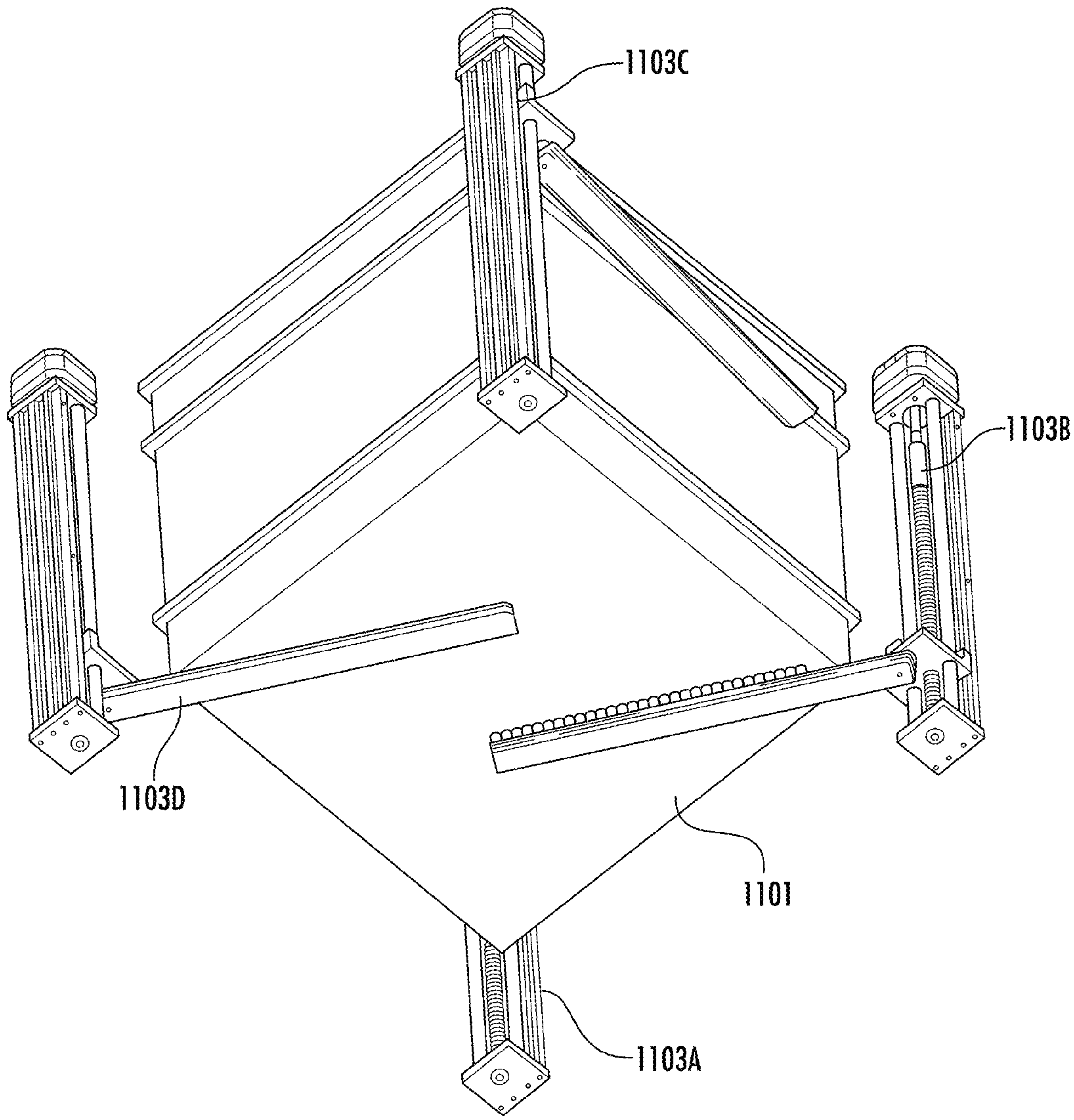
FIG. 11B illustrates example movements of an example rectangular prism in a vertical direction in accordance with some embodiments of the present disclosure.

Referring now to FIG. 11A and FIG. 11B, example movements of an example rectangular prism 1101 caused by example rack actuators shown in FIG. 10 are provided.

In particular, FIG. 11A illustrates example movements of an example rectangular prism 1101 in a horizontal direction. In the example shown in FIG. 11A, the example smart rack comprises a left front lateral rack actuator 1103A, a right front lateral rack actuator 1103B, a left back lateral rack actuator 1103D, and a right back lateral rack actuator 1103C.

In some embodiments, based on the movement instructions, a rack actuator is selected to exert force on the rectangular prism 1101. For example, if the movement instructions indicates a front movement (e.g. the rectangular prism 1101 is to be moved to a front peer smart rack), the left back lateral rack actuator 1103D and/or the right back lateral rack actuator 1103C may be selected to exert force on the rectangular prism 1101. If the movement instructions indicates a back movement (e.g. the rectangular prism 1101 is to be moved to a back peer smart rack), the left front lateral rack actuator 1103A and/or the right front lateral rack actuator 1103B may be selected to exert force on the rectangular prism 1101. If the movement instructions indicates a left movement (e.g. the rectangular prism 1101 is to be moved to a left peer smart rack), the right front lateral rack actuator 1103B and/or the right back lateral rack actuator 1103C may be selected to exert force on the rectangular prism 1101. If the movement instructions indicates a right movement (e.g. the rectangular prism 1101 is to be moved to a right peer smart rack), the left front lateral rack actuator 1103A and the left back lateral rack actuator 1103D may be selected to exert force on the rectangular prism 1101.

In some embodiments, to cause the selected rack actuator to exert force on the rectangular prism 1101, the rotary motor of the selected rack actuator may cause the arm to be rotated towards the outer surface of the rectangular prism 1101. In some embodiments, the rack actuators that are not selected to exert force on the rectangular prism 1101 may provide support for the rectangular prism 1101. For example, arms of the rack actuators that are not selected may be positioned near the bottom of the smart rack and be in contact with the bottom wall of the rectangular prism 1101, so as to prevent the rectangular prism 1101 from falling through.

Referring now to FIG. 11B, example movements of an example rectangular prism 1101 in a vertical direction caused by the rack actuators shown in FIG. 10 are illustrated.

In some embodiments, to cause the example rectangular prism 1101 to move in a vertical direction (e.g. up or down), one or more rack actuators may be moved to be engaged with the bottom wall of the example rectangular prism 1101 or one of the ribs of the example rectangular prism 1101.

For example, as shown in FIG. 11B, the arm of the right front lateral rack actuator 1103B and the arm of the left back lateral rack actuator 1103D may be positioned to be in contact with and support the bottom wall of the rectangular prism 1101. The arm of the left front lateral rack actuator 1103A and the arm of the right back lateral rack actuator 1103C may be positioned to be in contact with a rib of the rectangular prism 1101.

In some embodiments, to cause the example rectangular prism 1101 to transported to a top peer smart rack, the arms of the left front lateral rack actuator 1103A, the right front lateral rack actuator 1103B, the left back lateral rack actuator 1103D, and the right back lateral rack actuator 1103C may travel up along their corresponding lead screws. After the top rib of the example rectangular prism 1101 enters the top peer smart rack, an arm of the rack actuator of the top peer smart rack may become in an engaged mode with the top rib, and may continue lifting the example rectangular prism 1101 up until it is positioned within the top peer smart rack.

In some embodiments, to cause the example rectangular prism 1101 to be transported to a bottom peer smart rack, the arms of the left front lateral rack actuator 1103A, the right front lateral rack actuator 1103B, the left back lateral rack actuator 1103D, and the right back lateral rack actuator 1103C may travel down along their corresponding lead screws. After the bottom rib of the example rectangular prism 1101 enters the bottom peer smart rack, an arm of the rack actuator of the bottom peer smart rack may become in an engaged mode with the bottom rib, and may continue lowering the example rectangular prism 1101 down until it is positioned within the bottom peer smart rack.

Figure 12:
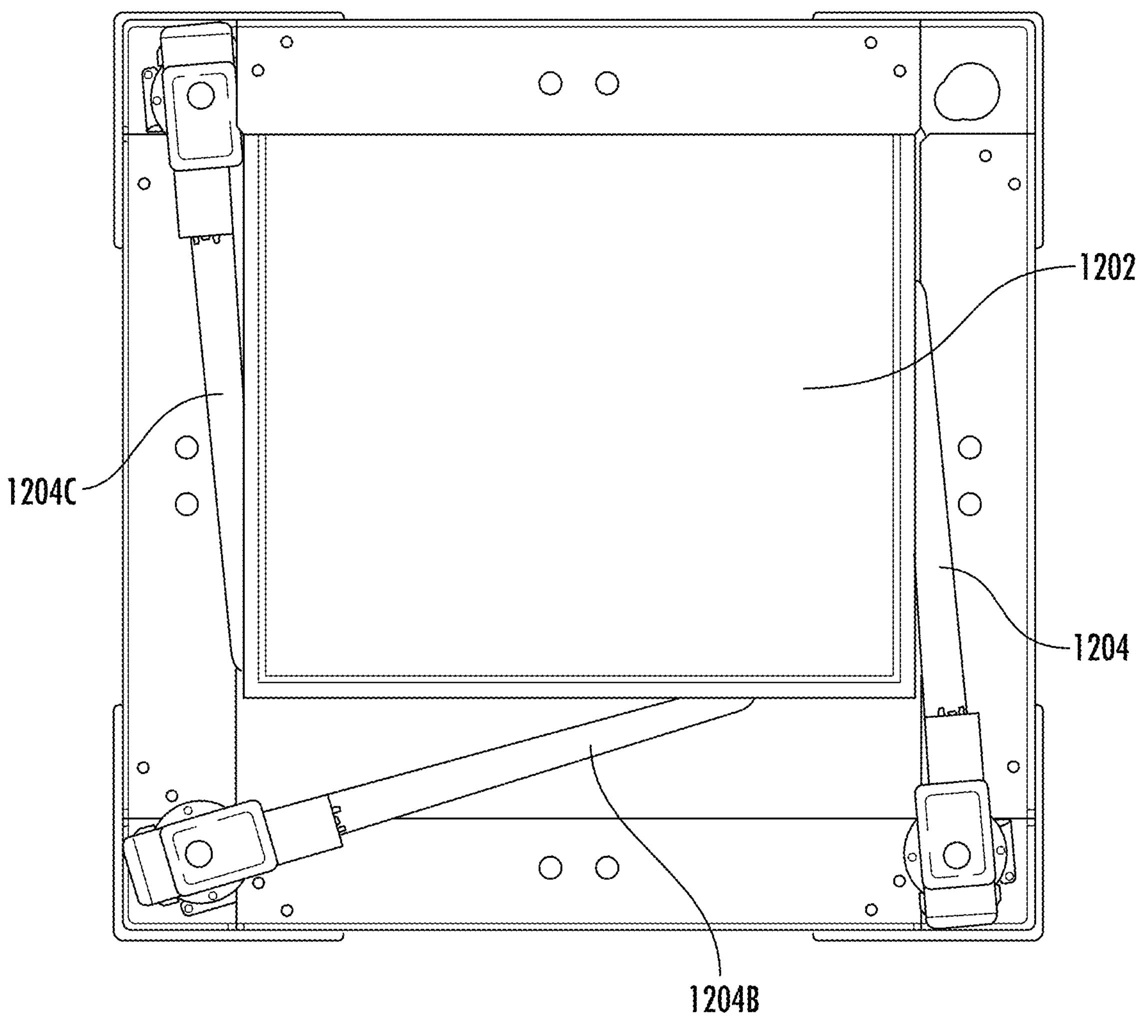
FIG. 12 illustrates example movements of an example rectangular prism in a vertical direction in accordance with some embodiments of the present disclosure.

FIG. 12 illustrates example movements of an example rectangular prism in a vertical direction caused by the example rack actuator shown in FIG. 10 in accordance with some embodiments of the present disclosure.

In the examples shown in FIG. 12, the arm of the example rack actuator 1204A, the arm of the example rack actuator 1204B, and the arm of the example rack actuator 1204C may engaged with a rib of the rectangular prism 1202. Similar to those described above, the arms may cause the rectangular prism 1202 to be lifted up or lowered down.

As described above, an example smart rack in accordance with various embodiments of the present discourse can be connected to up to six peer smart racks: a left peer smart rack, a right peer smart rack, a front peer smart rack, a back peer smart rack, a top peer smart rack, and/or a bottom peer smart rack. In some embodiments, the example smart rack may be configured to cause a rectangular prism within the example smart rack to be transported from one of the six peer smart racks.

In some embodiments, an example smart rack may be a part of a modular superstructure that receives a tote plan from a superstructure controller. For example, the superstructure controller may be configured to generate one or more tote plans, details of which are described herein. In some embodiments, the superstructure controller may transmit a tote plan to one of the smart racks in the modular superstructure at a time interval. In some embodiments, the smart rack that receives the tote plan may comprise dedicated peer-to-peer communication channels with each of its peer smart racks and may transmit the tote plan to each of its peer smart rack, details of which are described herein.

In some embodiments, the tote plan may comprise one or more movement instructions that request a smart rack to move a rectangular prism that is currently stored in the smart rack to one of its peer smart racks. However, the tote plan does not dictate when the smart rack needs to carry out the movement. Instead, the smart rack may utilize the peer-to-peer communication channels to communicate with one or more of its peer smart racks to determine when the carry out the movement of the rectangular prism (for example, based on when the conditions of the one or more of its peer smart racks are suitable to receive the rectangular prism from the smart rack).

As such, while the tote plan may provide “directive” that may, for example, define one or more tote movement paths for a rectangular prism to move through the smart racks of the modular superstructure, the real time “traffic” of the rectangular prism within the modular superstructure can be managed by peer-to-peer communications between the smart racks without interference or input from the superstructure controller. Through peer-to-peer communications between the smart racks and without reliance on the superstructure controller, each smart rack of the modular superstructure maintains its own set of expected instructions (for example, messages) and only communicates with its direct 6 potential peer smart racks to fulfill the requested moves when/if a space is available in a peer smart rack. By allowing each smart rack to determine its own abilities to meet the request from the tote plan during the time interval in between receiving the tote plans, various embodiments of the present disclosure may provide technical benefits such as, but not limited to, reducing the communication bandwidth that is needed between the superstructure controller and the modular superstructure, while improving the accuracies in tracking and monitoring the real-time traffic of the rectangular prism between the smart racks, detail of which are described herein.

Figure 13:
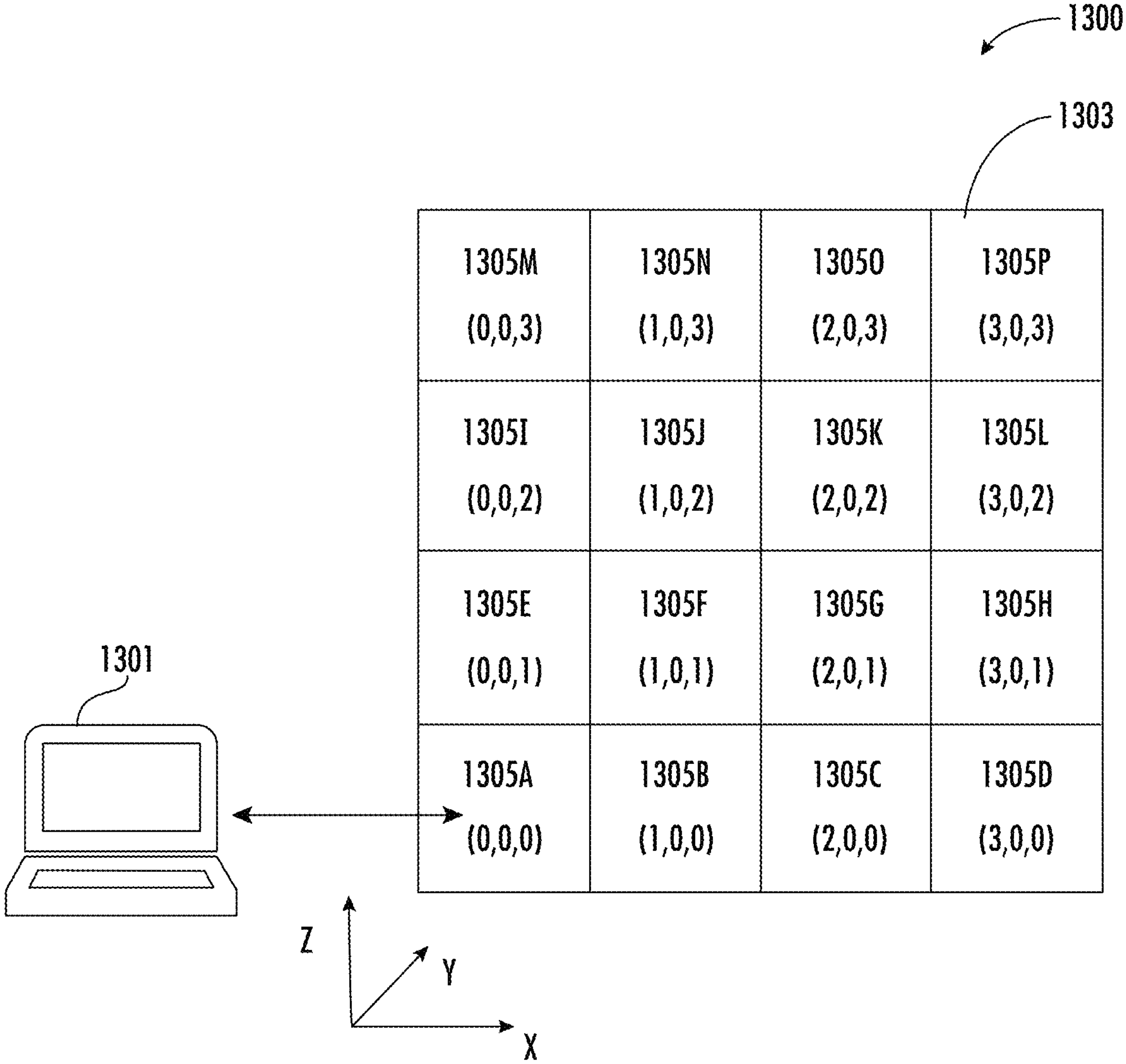
FIG. 13 is an example diagram illustrating example data communications from a superstructure controller to a modular superstructure in accordance with some embodiments of the present disclosure.

Referring now to FIG. 13, an example diagram 1300 is illustrated. In particular, the example diagram 1300 illustrates example data communications between an example superstructure controller 1301 and an example modular superstructure 1303.

In some embodiments, the example modular superstructure 1303 may comprise a plurality of smart racks. In some embodiments, each smart rack is associated with a corresponding rack coordination set that defines a location of the smart rack in a three-dimensional space. For example, the rack coordination set may define a relative position, such as via a set of coordinates in a Cartesian coordinate system, of the smart rack in the modular superstructure 1303.

In some embodiments, each rack coordination set may comprise three coordinates that are defined by their relative positions in the x axis, y axis, and the z axis. In some embodiments, each rack coordination set is in the form of (x, y, z). In some embodiments, the x axis and the y axis are in a perpendicular arrangement with one another and meet at an origin point. The z axis intersects the x axis and the y axis at the origin point, forming right angles with each of the x axis and the y axis. In some embodiments, the origin point may be represented as (0, 0, 0).

In some embodiments, the origin point (0, 0, 0) may be assigned to a smart rack that is positioned at a bottom corner of the example modular superstructure 1303. Additionally, or alternatively, the origin point (0, 0, 0) may be assigned to a smart rack that is positioned at a top corner of the example modular superstructure 1303. Additionally, or alternatively, the origin point (0, 0, 0) may be assigned to a smart rack that is positioned at neither any top corner nor any bottom corner of the example modular superstructure 1303.

In some embodiments, the x axis originates from the origin point and shows locations of smart racks in left and right directions of the modular superstructure 1303 (for example, from the left direction to the right direction of the modular superstructure 1303). For example, a first smart rack associated with the rack coordination set (0, 1, 1) is secured to the left of a second smart rack associated with the rack coordination set (1, 1, 1), as the x coordinate value of the first smart rack decreases by 1 in comparison to the x coordinate value of the second smart rack. As another example, a first smart rack associated with the rack coordination set (2, 1, 1) is secured to the right of a second smart rack associated with the rack coordination set (1, 1, 1), as the x coordinate value of the first smart rack increases by 1 as compared to the x coordinate value of the second smart rack.

In some embodiments, the y axis originates from the origin point and shows locations of smart racks in front and back directions of the modular superstructure 1303 (for example, from the front direction to the back direction of the modular superstructure 1303). For example, a first smart rack associated with the rack coordination set (1, 0, 1) is secured to the front of a second smart rack associated with the rack coordination set (1, 1, 1), as the y coordinate value of the first smart rack decreases by 1 as compared to the y coordinate value of the second smart rack. As another example, a first smart rack associated with the rack coordination set (1, 2, 1) is secured to the back of a second smart rack associated with the rack coordination set (1, 1, 1), as the y coordinate value of the first smart rack increases by 1 as compared to the y coordinate value of the second smart rack.

In some embodiments, the z axis originates from the origin point and shows locations of smart racks in up and down directions of the modular superstructure 1303 (for example, from the bottom direction to the top direction of the modular superstructure 1303). For example, a first smart rack associated with the rack coordination set (1, 1, 0) is secured under a second smart rack associated with the rack coordination set (1, 1, 1), as the z coordinate value of the first smart rack decreases by 1 as compared to the z coordinate value of the second smart rack. As another example, a first smart rack associated with the rack coordination set (1, 1, 2) is secured to the top of a second smart rack associated with the rack coordination set (1, 1, 1), as the z coordinate value of the first smart rack increases by 1 as compared to the z coordinate value of the second smart rack.

In the example shown in FIG. 13, the origin point (0, 0, 0) is assigned to the smart rack 1305A. The smart rack 1305B is secured to the right of the smart rack 1305A, and therefore is assigned the rack coordination set (1, 0, 0). The smart rack 1305C is secured to the right of the smart rack 1305B, and therefore is assigned the rack coordination set (2, 0, 0). The smart rack 1305D is secured to the right of the smart rack 1305C, and therefore is assigned the rack coordination set (3, 0, 0). The smart rack 1305E is secured to the top of the smart rack 1305A, and therefore is assigned the rack coordination set (0, 0, 1). The rack coordination sets of the smart rack 1305F, the smart rack 1305G, the smart rack 1305H, the smart rack 1305I, the smart rack 1305J, the smart rack 1305K, the smart rack 1305L, the smart rack 1305M, the smart rack 1305N, the smart rack 1305O, and the smart rack 1305P may be similarly assigned.

In some embodiments, a superstructure controller 1301 may determine, generate, input, or otherwise execute a tote plan that comprises one or more movement instructions that are to be performed by one or more smart racks simultaneously, near-simultaneously, and/or the like. The one or more movement instructions may define one or more movements of one or more rectangular prisms entering, exiting, and/or being transported within the modular superstructure 1303. In some embodiments, each of the movement instructions may be assigned to one of the smart racks. In some embodiments, each of the smart racks may comprise a processing circuitry that may generate movement messages, and may transmit movement messages to other peer smart rack(s) based on the movement instructions.

However, there are technical challenges associated with transmitting a tote plan to the modular superstructure and executing the tote plan by the smart racks of the modular superstructure. For example, an example modular superstructure may comprise tens, hundreds, or thousands of smart racks. Directly transmitting the tote plan to the processing circuitries of each individual smart rack can consume extensive processing power and communication bandwidth. Moreover, and given the simultaneously, near-simultaneously nature of the required movements, each smart rack advantageously, in some examples, is configured to perform its movements by communicating with its peer smart racks and not, in some examples, with the superstructure controller 1301 (e.g., not a swarm behavior controlled by the superstructure controller 1301).

Various embodiments of the present disclosure overcome the above technical challenges, and provide various technical improvements. For example, various embodiments of the present disclosure may provide a peer-to-peer network between processing circuitries of smart racks to transmit the tote plan. Additionally, each of the processing circuitries of smart racks may individually determine times points as to when to execute the movement instructions within the tote plan that are assigned to the corresponding smart racks, details of which are described herein.

In the example shown in FIG. 13, the superstructure controller 1301 may transmit the tote plan to one of the processing circuitries of the smart racks of the modular superstructure. In some embodiments, the superstructure controller 1301 may transmit the tote plan to only one of the processing circuitries of the smart racks, without transmitting the tote plan to any other processing circuitry of the smart racks. In the example shown in FIG. 13, the superstructure controller 1301 may transmit the tote plan to the processing circuitry of the smart rack that is assigned the origin point (0, 0, 0).

While the description above provides an example of transmitting the tote plan to the smart rack with the rack coordination set (0, 0, 0), it is noted that the scope of the present disclosure is not limited to the description above. In some examples, the superstructure controller 1301 may transmit the tote plan to a different processing circuitry of a different smart rack in the modular superstructure.

As described above, the superstructure controller 1301 may not transmit the tote plan to all of the processing circuitries of all of the smart racks in the modular superstructure. In some embodiments, each processing circuitry may communicate the tote plan to processing circuitries of peer smart racks, details of which are described in connection with at least FIG. 14 and FIG. 15.

As described above, the tote plan may provide movement instructions for one or more of the smart racks. However, the tote plan may not define the time point as to when to execute each individual movement of the tote plan. In some embodiments, each of the processing circuitry of the smart rack may determine when to execute the movement instructions that are assigned to a corresponding smart rack. For example, each of the processing circuitry may transmit one or more movement messages to one or more processing circuitries of one or more peer smart racks. In other words, each smart rack independently works out when to take action without interference by or input from the superstructure controller 1301. As such, example embodiments of the present disclosure allows each smart rack to dynamically execute the tote plan, which may improve the transportation speed and reduce the power consumption as compared to a system that relies on the superstructure controller 1301 to dictate when each smart rack should take action. Example data communications between the processing circuitries of smart racks are described herein, including, but not limited to, those described in connection with at least FIG. 17A to FIG. 18F.

Figure 14:
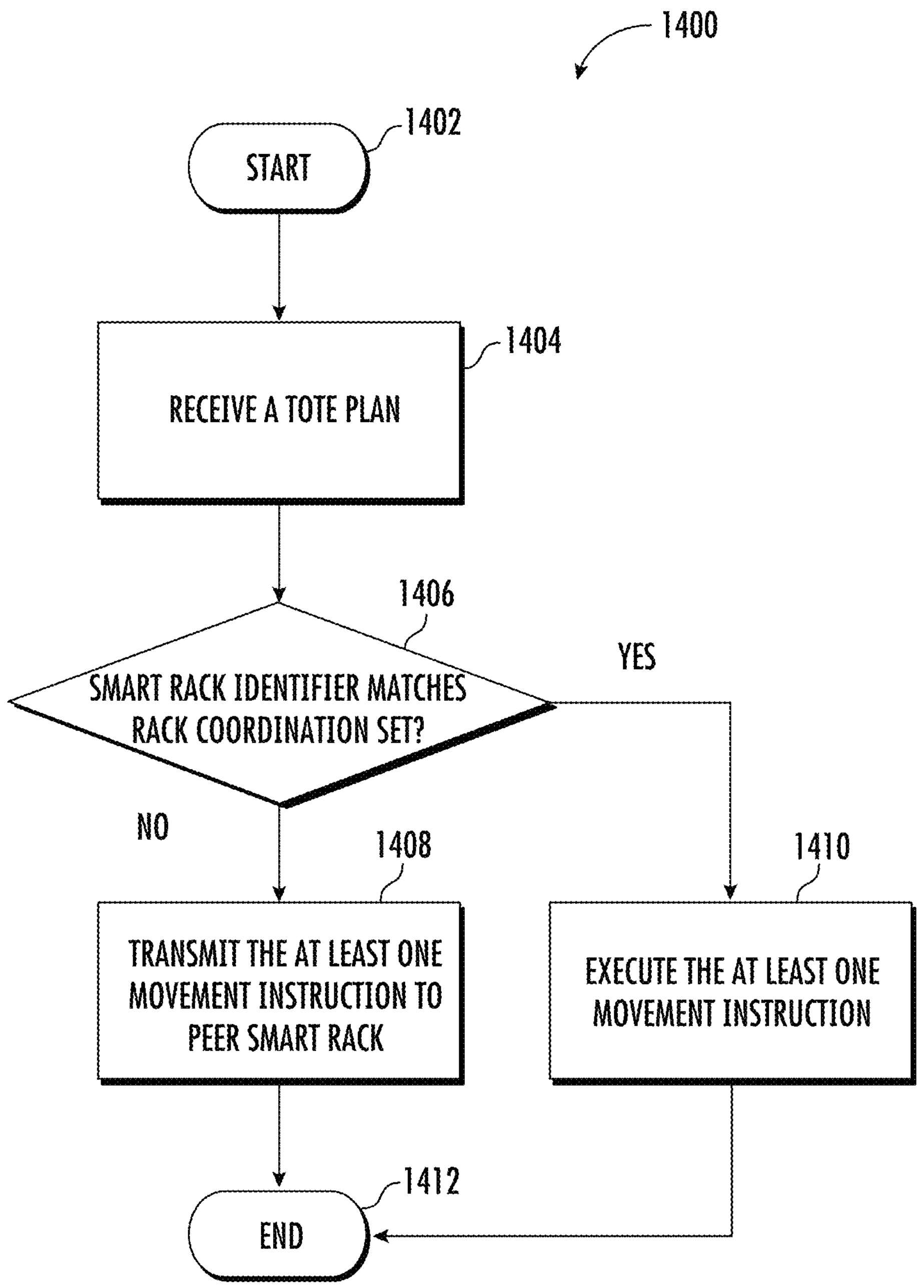
FIG. 14 is an example flow diagram illustrating an example method of transmitting a tote plan to example processing circuitries of smart racks in accordance with some embodiments of the present disclosure.

Referring now to FIG. 14, an example flow diagram illustrating an example method 1400 of transmitting a tote plan to example processing circuitries of smart racks in an example modular superstructure in accordance with some embodiments of the present disclosure is illustrated.

In the example shown in FIG. 14, the example method 1400 starts at step/operation 1402. In some embodiments, subsequent to step/operation 1402, the example method 1400 proceeds to step/operation 1404. At step/operation 1404, a processing circuitry (such as, but not limited to, a processing circuitry of a smart rack in accordance with various embodiments described herein) receives a tote plan from a superstructure controller.

As described above, the tote plan may comprise movement instructions assigned to one or more of the smart racks in the modular superstructure. In some embodiments, each of the movement instructions may comprise a smart rack identifier and a movement indication.

In some embodiments, the smart rack identifier may describe, indicate and/or otherwise identify a particular smart rack from the smart racks in the modular superstructure. In some embodiments, the movement indication may describe, indicate and/or otherwise identify a movement of a rectangular prism to be executed by that particular smart rack.

For example, a movement instruction from the tote plan may comprise a smart rack identifier of (1, 1, 1), which indicates that the movement instruction is for a smart rack in the modular superstructure with the corresponding rack coordination set (1, 1, 1). The movement instruction may comprise a down movement indication, which shows that the movement instruction requests the smart rack with rack coordination set (1, 1, 1) to move a rectangular prism down to the bottom peer smart rack with rack coordination set (1, 1, 0).

As another example, a movement instruction from the tote plan may comprise a smart rack identifier of (1, 1, 1), which indicates that the movement instruction is for a smart rack in the modular superstructure with the corresponding rack coordination set (1, 1, 1). The movement instruction may comprise an up movement indication, which shows that the movement instruction requests the smart rack with rack coordination set (1, 1, 1) to move a rectangular prism up to the top peer smart rack with rack coordination set (1, 1, 2).

As another example, a movement instruction from the tote plan may comprise a smart rack identifier of (1, 1, 1), which indicates that the movement instruction is for a smart rack in the modular superstructure with the corresponding rack coordination set (1, 1, 1). The movement instruction may comprise a front movement indication, which shows that the movement instruction requests the smart rack with rack coordination set (1, 1, 1) to move a rectangular prism to a front peer smart rack with rack coordination set (1, 0, 1).

As another example, movement instruction from the tote plan may comprise a smart rack identifier of (1, 1, 1), which indicates that the movement instruction is for a smart rack in the modular superstructure with the corresponding rack coordination set (1, 1, 1). The movement instruction may comprise a back movement indication, which shows that the movement instruction requests the smart rack with rack coordination set (1, 1, 1) to move a rectangular prism to a back peer smart rack with rack coordination set (1, 2, 1).

As another example, a movement instruction from the tote plan may comprise a smart rack identifier of (1, 1, 1), which indicates that the movement instruction is for a smart rack in the modular superstructure with the corresponding rack coordination set (1, 1, 1). The movement instruction may comprise a left movement indication, which shows that the movement instruction requests the smart rack with rack coordination set (1, 1, 1) to move a rectangular prism to a left peer smart rack with rack coordination set (0, 1, 1).

As another example, a movement instruction from the tote plan may comprise a smart rack identifier of (1, 1, 1), which indicates that the movement instruction is for a smart rack in the modular superstructure with the corresponding rack coordination set (1, 1, 1). The movement instruction may comprise a front movement indication, which shows that the movement instruction requests the smart rack with rack coordination set (1, 1, 1) to move a rectangular prism to a right peer smart rack with rack coordination set (2, 1, 1).

Referring back to FIG. 14, subsequent to step/operation 1404, the example method 1400 proceeds to step/operation 1406. At step/operation 1406, a processing circuitry (such as, but not limited to, a processing circuitry of a smart rack in accordance with various embodiments described herein) determines whether the smart rack identifier from the movement instruction in the tote plan matches the rack coordination set of the smart rack that receive the tote plan at step/operation 1404.

For example, at step/operation 1404, a smart rack associated with the rack coordination set (1, 1, 1) may receive the tote plan. The tote plan may provide a movement instruction with a smart rack identifier of (0, 1, 1). In such an example, the smart rack identifier (0, 1, 1) does not match the rack coordination set (1, 1, 1) of the smart rack, indicating that the movement indication defined by the movement instruction is not for the smart rack that receives the tote plan.

As an example, at step/operation 1404, a smart rack associated with the rack coordination set (1, 1, 1) may receive the tote plan. The tote plan may provide a movement instruction with a smart rack identifier of (1, 1, 1). In such an example, the smart rack identifier (1, 1, 1) matches the rack coordination set (1, 1, 1) of the smart rack, indicating that the movement indication defined by the movement instruction is for the smart rack that receives the tote plan.

Referring back to FIG. 14, if, at step/operation 1406, the processing circuitry determines that the smart rack identifier does not match the rack coordination set, the example method 1400 proceeds to step/operation 1408. At step/operation 1408, a processing circuitry (such as, but not limited to, a processing circuitry of a smart rack in accordance with various embodiments described herein) transmits the tote plan to at least one peer smart rack of the smart rack.

As described above, a peer smart rack of a smart rack is another smart rack that is secured to, in physical connection with, or is otherwise linked to the smart rack. In some embodiments, a processing circuitry of a smart rack may provide direct data communications with processing circuitries of peer smart racks through dedicated communication channels (for example, input/output (I/O) channels), details of which are described herein. In the present disclosure, the processing circuitry of a peer smart rack is also referred to as a peer processing circuitry.

In some embodiments, the at least one peer smart rack comprises at least one of a top peer smart rack, a bottom peer smart rack, a front peer smart rack, a back peer smart rack, a left peer smart rack, and/or a right peer smart rack. For example, a top peer smart rack of a smart rack may be secured above the smart rack through, for example but not limited to, one or more connector plates described above. As another example, a bottom peer smart rack of a smart rack may be secured under the smart rack through, for example but not limited to, one or more connector plates described above. As another example, a left peer smart rack of a smart rack may be secured to the left of the smart rack through, for example but not limited to, one or more connector plates described above. As another example, a right peer smart rack of a smart rack may be secured to the right of the smart rack through, for example but not limited to, one or more connector plates described above. As another example, a front peer smart rack of a smart rack may be secured to the front of the smart rack through, for example but not limited to, one or more connector plates described above. As another example, a back peer smart rack of a smart rack may be secured to the back of the smart rack through, for example but not limited to, one or more connector plates described above.

Figure 15:
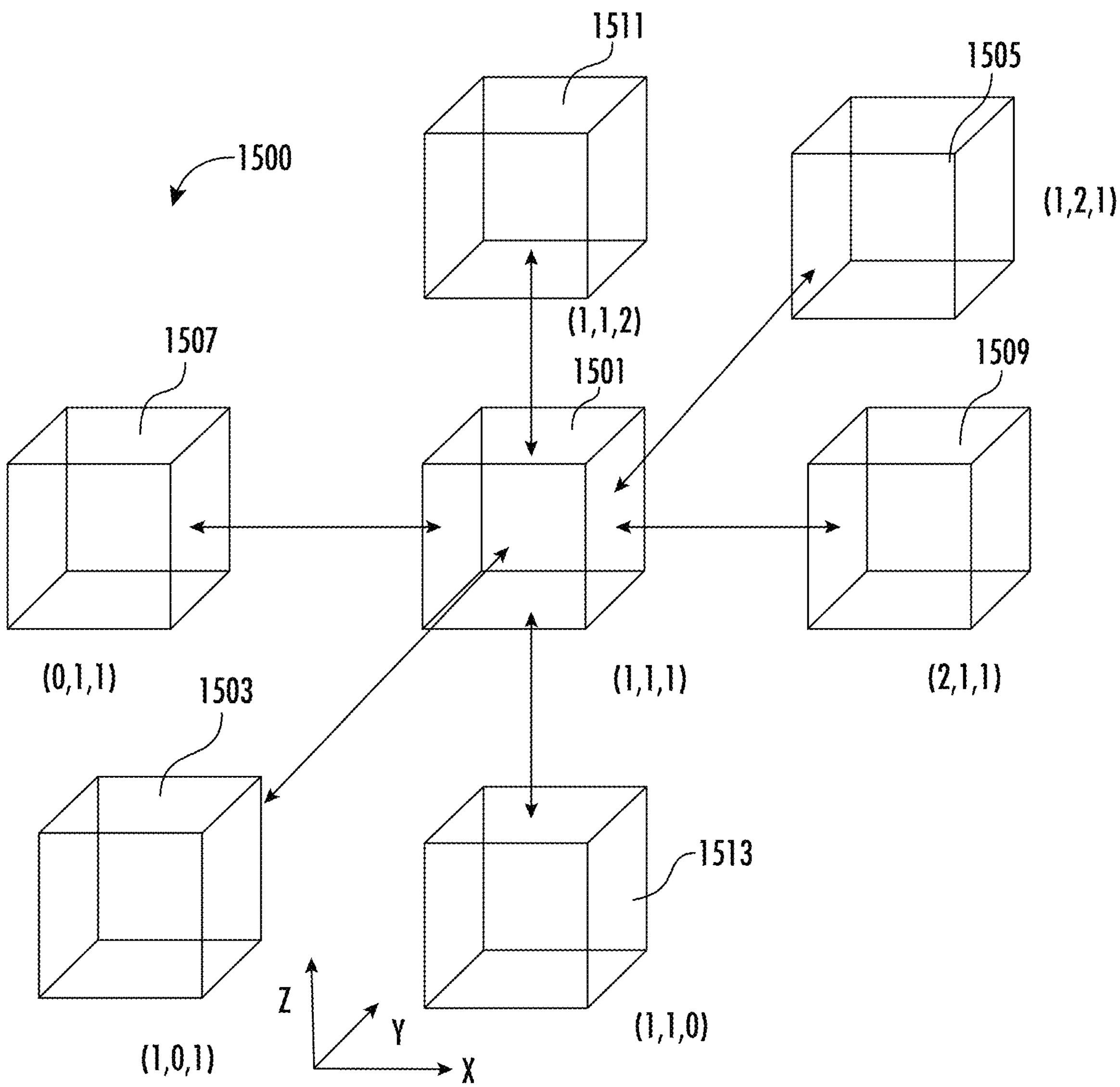
FIG. 15 illustrates example input/out (I/O) data communications between an example processing circuitry of an example smart rack and other example processing circuitry(s) of example peer smart rack(s) in accordance with some embodiments of the present disclosure.

Referring now to FIG. 15, an example diagram 1500 showing a plurality of smart racks in accordance with some embodiments of the present disclosure is provided.

In the example shown in FIG. 15, the processing circuitry of the smart rack 1501 associated with the rack coordination set (1, 1, 1) may receive one or more portions of a tote plan, and may determine whether one or more movement instructions from those one or more portions of the tote plan are associated with smart rack identifier(s) that match the rack coordination set (1, 1, 1) of the smart rack 1501.

In some embodiments, the processing circuitry of the smart rack 1501 may determine that at least one of the one or more movement instructions is associated with the smart rack identifier that matches the rack coordination set (1, 1, 1) of the smart rack 1501. In such an example, the processing circuitry of the smart rack 1501 may store and/or execute at least one of the one or more movement instructions, details of which are described herein.

In some embodiments, the processing circuitry of the smart rack 1501 may determine that at least one of the one or more movement instructions is not associated with the smart rack identifier that matches the rack coordination set (1, 1, 1) of the smart rack 1501. In such an example, the processing circuitry of the smart rack 1501 may transmit the tote plan to some or all of the peer smart racks of the smart rack 1501, including the top peer smart rack (e.g. the smart rack 1511), the bottom peer smart rack (e.g. the smart rack 1513), the front peer smart rack (e.g. the smart rack 1503), the back peer smart rack (e.g. the smart rack 1505), the left peer smart rack (e.g. the smart rack 1507), and the right peer smart rack (e.g. the smart rack 1509).

In some embodiments, the processing circuitry of the smart rack 1501 may provide six input/output (I/O) communication channels, and each of the six data I/O communication channels communicates with one of the six peer smart racks. For example, the processing circuitry of the smart rack 1501 may be in the form of a Raspberry Pi with a dedicated data I/O communication channel or interface for each of the all six sides. (e.g. a front peer smart rack, a back peer smart rack, a top peer smart rack, a bottom peer smart rack, a left peer smart rack, and a right peer smart rack). In some embodiments, the processing circuitry of the smart rack 1501 may provide a communication interface for each of the peer smart racks for peer-to-peer connection. Additionally, or alternatively, the processing circuitry of the smart rack 1501 may be in other forms and/or embedded as other processing circuitries.

As described above, the processing circuitry of the smart rack 1501 may provide a communication interface for each of the peer smart racks for peer-to-peer connection. For example, the processing circuitry of the smart rack 1501 may comprise a data I/O communication channel/interface for a front peer smart rack for providing direct data communications between the smart rack 1501 and the front peer smart rack (e.g. the smart rack 1513). Additionally, or alternatively, the processing circuitry of the smart rack 1501 may comprise a data I/O communication channel/interface for a back peer smart rack for providing direct data communications between the smart rack 1501 and the back peer smart rack (e.g. the smart rack 1505). Additionally, or alternatively, the processing circuitry of the smart rack 1501 may comprise a data I/O communication channel/interface for a left peer smart rack for providing direct data communications between the smart rack 1501 and the left peer smart rack (e.g. the smart rack 1507). Additionally, or alternatively, the processing circuitry of the smart rack 1501 may comprise a data I/O communication channel/interface for a right peer smart rack for providing direct data communications between the smart rack 1501 and the right peer smart rack (e.g. the smart rack 1509). Additionally, or alternatively, the processing circuitry of the smart rack 1501 may comprise a data I/O communication channel/interface for a top peer smart rack for providing direct data communications between the smart rack 1501 and the top peer smart rack (e.g. the smart rack 1511). Additionally, or alternatively, the processing circuitry of the smart rack 1501 may comprise a data I/O communication channel/interface for a bottom peer smart rack for providing direct data communications between the smart rack 1501 and the bottom peer smart rack (e.g. the smart rack 1513).

As an example, the processing circuitry of the smart rack 1501 may include a CAN interface for establishing a communication interface with one or more peer processing circuitries of one or more of the peer smart racks. Additionally, or alternatively, the processing circuitry of the smart rack 1501 may include a RS 485 interface for establishing a communication interface with one or more peer processing circuitries of one or more of the peer smart racks. Additionally, or alternatively, the processing circuitry of the smart rack 1501 may include a UART interface for establishing a communication interface with one or more peer processing circuitries of one or more of the peer smart racks.

For example, the processing circuitry of the smart rack 1501 may be in the form of a Raspberry Pi. In some embodiments, the processing circuitry of the smart rack 1501 may include one or more CAN interfaces for establishing data I/O communication channels/interfaces with one or more peer processing circuitries of one or more of the peer smart racks. For example, the processing circuitry of the smart rack 1501 may comprise one CAN interface for each peer smart rack, where the CAN interface establishes a data I/O communication channel/interface with a CAN interface of a processing circuitry of a peer smart rack. In some embodiments, the one or more CAN interfaces of the smart rack 1501 may be connected in serial.

Additionally, or alternatively, the processing circuitry of the smart rack 1501 may include a RS 485 interface for establishing a data I/O communication channel/interface with one of the peer processing circuitries of one or more of the peer smart racks.

Additionally, or alternatively, the processing circuitry of the smart rack 1501 may include a UART interface for establishing a data I/O communication channel/interface with one of the peer processing circuitries of one or more of the peer smart racks.

The table below illustrates example characteristic of different data I/O communication channels/interfaces:

| | RS485 | CAN | CAN FD | UART |
|---|---|---|---|---|
| Data Rate | 10 Mbps | 1 Mbps | 8 Mbps | 5 Mbps |
| Distance | 1200 m | 250 m | 250 m | 15 m |
| Nodes | 32 | 30 | 30 | 32 |
| Wires | 2 | 2 | 2 | 3 |
| Error Detection | No | Yes | Yes | No |

Referring back to FIG. 15, in some embodiments, in response to determining that at least one of the one or more movement instructions is not associated with the smart rack identifier that matches the rack coordination set (1, 1, 1) of the smart rack 1501, the processing circuitry of the smart rack 1501 may transmit the at least one of the one or more movement instructions that is not associated with the smart rack identifier (1, 1, 1) to the processing circuitry of the smart rack 1503 associated with the rack coordination set (1, 0, 1). For example, the processing circuitry of the smart rack 1501 may transmit the at least one of the one or more movement instructions through a dedicated data I/O communication channel/interface, similar to those described above. In this example, the smart rack 1503 is a front peer smart rack of the smart rack 1501.

Additionally, or alternatively, the processing circuitry of the smart rack 1501 may transmit the at least one of the one or more movement instructions that is not associated with the smart rack identifier (1, 1, 1) to the processing circuitry of the smart rack 1505 associated with the rack coordination set (1, 2, 1). For example, the processing circuitry of the smart rack 1501 may transmit the at least one of the one or more movement instructions through a dedicated data I/O communication channel/interface, similar to those described above. In this example, the smart rack 1505 is a back peer smart rack of the smart rack 1501.

Additionally, or alternatively, the processing circuitry of the smart rack 1501 may transmit the at least one of the one or more movement instructions that is not associated with the smart rack identifier (1, 1, 1) to the processing circuitry of the smart rack 1507 associated with the rack coordination set (0, 1, 1). For example, the processing circuitry of the smart rack 1501 may transmit the at least one of the one or more movement instructions through a dedicated data I/O communication channel/interface, similar to those described above. In this example, the smart rack 1507 is a left peer smart rack of the smart rack 1501.

Additionally, or alternatively, the processing circuitry of the smart rack 1501 may transmit the at least one of the one or more movement instructions that is not associated with the smart rack identifier (1, 1, 1) to the processing circuitry of the smart rack 1509 associated with the rack coordination set (2, 1, 1). For example, the processing circuitry of the smart rack 1501 may transmit the at least one of the one or more movement instructions through a dedicated data I/O communication channel/interface, similar to those described above. In this example, the smart rack 1509 is a right peer smart rack of the smart rack 1501.

Additionally, or alternatively, the processing circuitry of the smart rack 1501 may transmit the at least one of the one or more movement instructions that is not associated with the smart rack identifier (1, 1, 1) to the processing circuitry of the smart rack 1511 associated with the rack coordination set (1, 1, 2). For example, the processing circuitry of the smart rack 1501 may transmit the at least one of the one or more movement instructions through a dedicated data I/O communication channel/interface, similar to those described above. In this example, the smart rack 1511 is a top peer smart rack of the smart rack 1501.

Additionally, or alternatively, the processing circuitry of the smart rack 1501 may transmit the at least one of the one or more movement instructions that is not associated with the smart rack identifier (1, 1, 1) to the processing circuitry of the smart rack 1513 associated with the rack coordination set (1, 1, 0). For example, the processing circuitry of the smart rack 1501 may transmit the at least one of the one or more movement instructions through a dedicated data I/O communication channel/interface, similar to those described above. In this example, the smart rack 1513 is a bottom peer smart rack of the smart rack 1501.

In some embodiments, the processing circuitry of the smart rack 1501 may transmit the at least one of the one or more movement instructions that is not associated with the smart rack identifier that matches the rack coordination set (1, 1, 1) of the smart rack 1501 to all of the peer processing circuitries to all of the peer smart racks, similar to those described above.

In some embodiments, subsequent to the processing circuitry of a peer smart rack receiving the at least one of the one or more movement instructions from the tote plan, the processing circuitry of the peer smart rack may carry out the example method 1400 shown in FIG. 14. For example, the processing circuitry of a peer smart rack may determine whether the at least one of the one or more movement instructions from the tote plan is associated with the smart rack identifier of the peer smart rack. If not, the processing circuitry of the peer smart rack carries out the step/operation 1408 of FIG. 14 described above. If so, the processing circuitry of the peer smart rack carries out the step/operation 1410 of FIG. 14 described herein.

Referring back to FIG. 14, if, at step/operation 1406, the processing circuitry determines that the smart rack identifier matches the rack coordination set, the example method 1400 proceeds to step/operation 1410. At step/operation 1410, a processing circuitry (such as, but not limited to, a processing circuitry of a smart rack in accordance with various embodiments described herein) may execute the movement instruction(s) by generating movement messages and transmitting movement messages to other peer smart racks.

In some embodiments, in response to determining that the smart rack identifier of the tote plan matches the rack coordination set of the smart rack, the controller device executes at least one movement instruction of the tote plan.

As described above, given the simultaneously, near-simultaneously nature of the required movements, each smart rack advantageously, in some examples, is configured to perform its movements by communicating with its peer smart racks and not with the superstructure controller 1301 (e.g., not a swarm behavior defined by the superstructure controller 1301). For example, the movement instructions from the tote plan do not describe or dictate the time as to when to execute each movement instruction. Instead, the processing circuitry of each smart rack may determine whether the conditions of the smart rack (and its peer smart rack) are suitable for carrying out the movement instruction through, for example but not limited to, generating movement messages and transmitting movement messages to the peer processing circuitries of the peer smart racks. Additional details of movement messages are described herein, including, but not limited to, those described in connection with at least FIG. 17A to FIG. 18F.

Referring back to FIG. 14, subsequent to step/operation 1408 and step/operation 1410, the example method 1400 proceeds to step/operation 1412 and ends.

Figure 16:
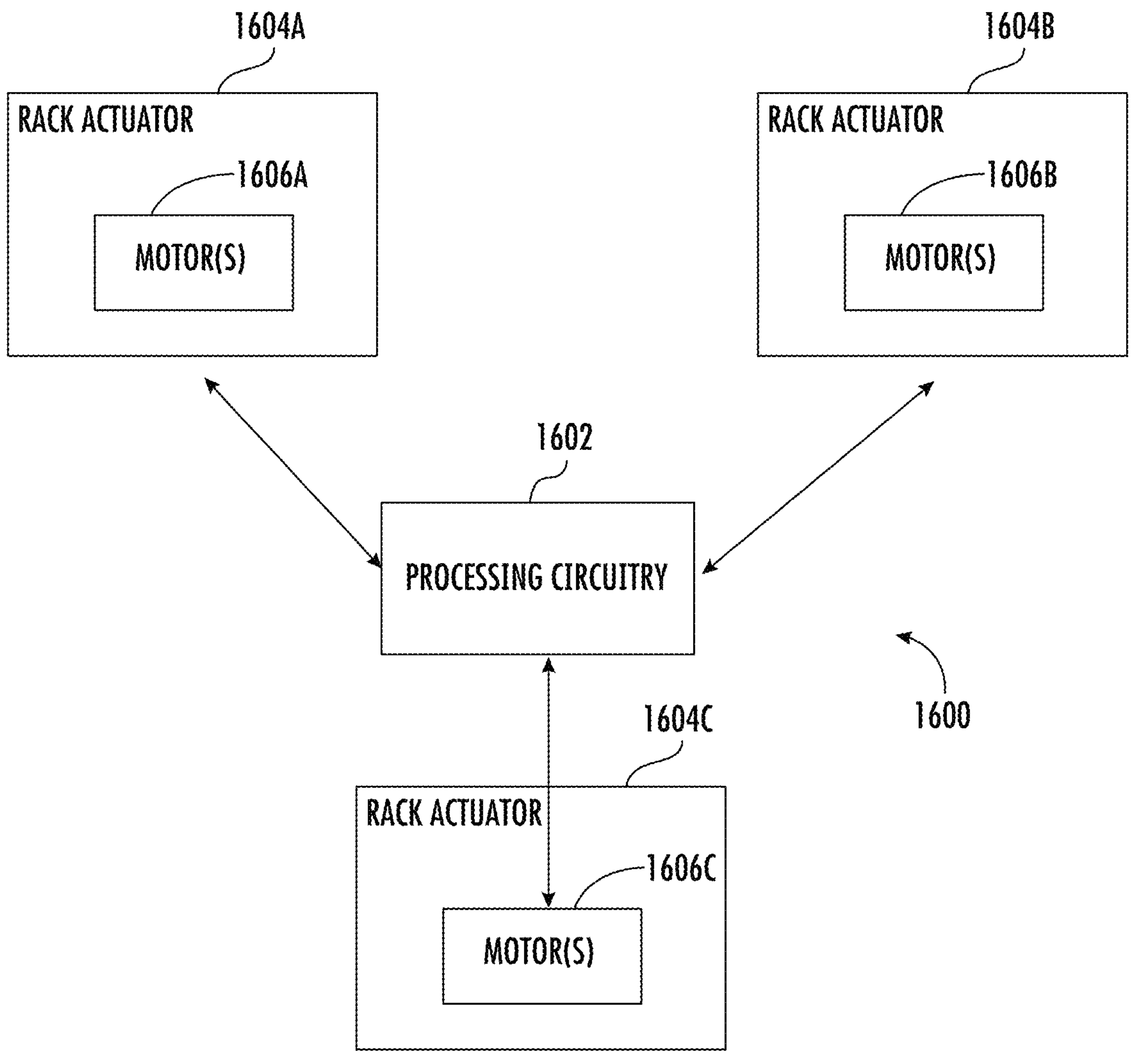
FIG. 16 is an example block diagram of example data communications between an example processing circuitry and example rack actuator(s) of the smart rack in accordance with some embodiments of the present disclosure.

Referring now to FIG. 16, an example block diagram 1600 illustrates example data communications between an example processing circuitry and example rack actuator(s) of the smart rack in accordance with some embodiments of the present disclosure.

In the example shown in FIG. 16, the example smart rack comprises a rack actuator 1604A, a rack actuator 1604B, and a rack actuator 1604C. In some embodiments, each of the rack actuator 1604A, the rack actuator 1604B, and the rack actuator 1604C is similar to the various example rack actuators described herein.

For example, the rack actuator 1604A may comprise one or more motors 1606A. The one or more motors 1606A may include, but not limited to, a linear motor that causes an arm of the rack actuator 1604A to switch between an engaged mode and a disengaged mode, as well as a step motor that causes the arm of the rack actuator 1604A to move to various positions.

Similarly, the rack actuator 1604B may comprise one or more motors 1606B. The one or more motors 1606B may include, but not limited to, a linear motor that causes an arm of the rack actuator 1604B switch between an engaged mode and a disengaged mode, as well as a step motor that causes the arm of the rack actuator 1604B to move to various positions.

Similarly, the rack actuator 1604C may comprise one or more motors 1606C. The one or more motors 1606C may include, but not limited to, a linear motor that causes an arm of the rack actuator 1604C switch between an engaged mode and a disengaged mode, as well as a step motor that causes the arm of the rack actuator 1604C to move to various positions.

In some embodiments, as part of executing the movement instructions and the movement messages, the processing circuitry 1602 may transmit instructions to the one or more motors of the smart racks. In some embodiments, the processing circuitry 1602 may transmit instructions to the motor(s) 1606A of the rack actuator 1604A, the motor(s) 1606B of the rack actuator 1604B, and/or the motor(s) 1606C of the rack actuator 1604C, so as to cause the arm of the rack actuator 1604A, the arm of the rack actuator 1604B, and/or the arm of the rack actuator 1604C to move to various positions and/or to switch between the engaged mode and the disengaged mode.

For example, in response to receiving a movement instruction in the tote plan with the smart rack identifier matching the rack coordination set of the smart rack, the processing circuitry of the smart rack may determine to move a rectangular prism from the smart rack to a peer smart rack, and/or to cause a peer smart rack to move its rectangular prism so that the smart rack can transport the rectangular prism to the peer smart rack. In some embodiments, the processing circuitry of the smart rack generate and transmit a MoveReady message to one of its peer smart racks.

As an example, the processing circuitry 1602 is the processing circuitry of the peer smart rack, and may receive the MoveReady message. In response to receiving the MoveReady message, the processing circuitry may transmit instructions the motor(s) 1606A of the rack actuator 1604A, the motor(s) 1606B of the rack actuator 1604B, and/or the motor(s) 1606C of the rack actuator 1604C, so as to cause the arm of the rack actuator 1604A, the arm of the rack actuator 1604B, and/or the arm of the rack actuator 1604C to be in their corresponding positions/modes and ready to cause movements of a rectangular prism. Additional details associated with the MoveReady messages are described herein.

As another example, the processing circuitry of the smart rack may determine that the peer smart rack is ready to receive a rectangular prism from the smart rack, and/or that the peer smart rack is ready to move its rectangular prism to another smart rack. In some embodiments, the processing circuitry of the smart rack generates and transmits a MoveRequest message to one of its peer smart racks.

As an example, the processing circuitry 1602 is the processing circuitry of the peer smart rack, and may receive the MoveRequest message. In response to receiving the MoveReady message, the processing circuitry may transmit instructions the motor(s) 1606A of the rack actuator 1604A, the motor(s) 1606B of the rack actuator 1604B, and/or the motor(s) 1606C of the rack actuator 1604C, so as to cause the arm of the rack actuator 1604A, the arm of the rack actuator 1604B, and/or the arm of the rack actuator 1604C to cause movements of a rectangular prism. Additional details associated with the MoveRequest messages are described herein.

While the example shown in FIG. 16 provides an example smart rack comprising three rack actuators, it is noted that the scope of the present disclosure is not limited to this example. In some examples, an example smart rack may comprise less than three rack actuators or more than three rack actuators.

Referring now to FIG. 17A, FIG. 17B, FIG. 17C, and FIG. 17D, example data communications between example smart racks for executing an example tote plan in accordance with some embodiments of the present disclosure are illustrated.

Figure 17A:
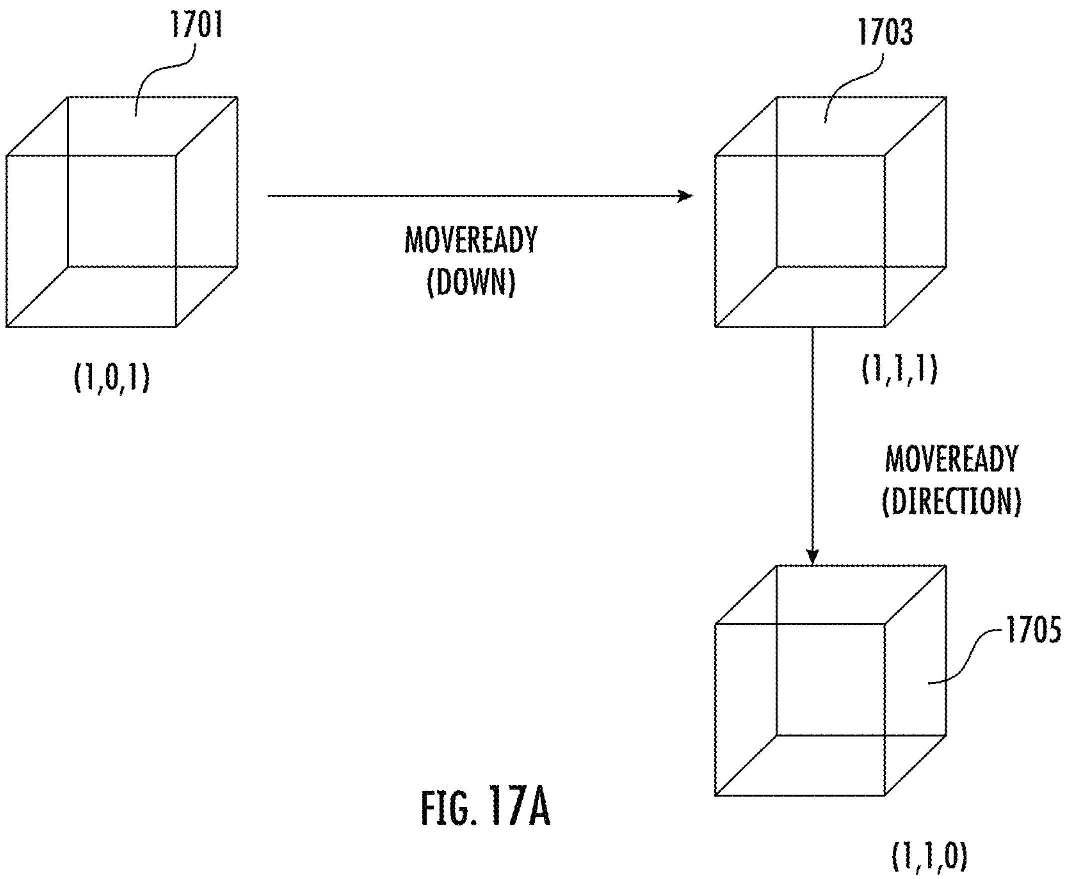
FIG. 17A illustrates example data communications between example smart racks to request one or more smart racks to be ready for transporting a rectangular prism in accordance with some embodiments of the present disclosure.

In the example shown in FIG. 17A, an example smart rack 1701 associated with the rack coordination set (1, 0, 1), an example smart rack 1703 associated with the rack coordination set (1, 1, 1), and an example smart rack 1705 associated with the rack coordination set (1, 1, 0) are illustrated. Based on their corresponding rack coordination sets, the example smart rack 1703 is positioned to the right of the smart rack 1701, and the example smart rack 1705 is positioned under the example smart rack 1703.

In some embodiments, the example smart rack 1701 may receive a movement instruction that is a part of the tote plan. As an example, the tote plan may request the example smart rack 1701 to move a rectangular prism from the example smart rack 1701 to the example smart rack 1703.

However, the example smart rack 1703 may not be in a suitable condition and/or may not be ready to receive the smart rack 1703. For example, the example smart rack 1703 may currently store a rectangular prism and cannot receive the rectangular prism from the example smart rack 1701. In such an example, in order to execute the movement instruction, the example smart rack 1701 may request the example smart rack 1703 to move the rectangular prism that is currently stored in the example smart rack 1703 downwards to the example smart rack 1705.

For example, the example smart rack 1701 may transmit a MoveReady message to the example smart rack 1703. As an example, a processing circuitry of the example smart rack 1701 may transmit the MoveReady message to a processing circuitry of the example smart rack 1703 through the dedicated data I/O communication channel. In some embodiments, the MoveReady message from the example smart rack 1701 indicates a request from the example smart rack 1701 to the example smart rack 1703 to move its rectangular prism downwards to the example smart rack 1705.

In some examples, the communications between the smart racks 1701 and 1703 is an example of smart racks executing movements without the superstructure controller 1301 (e.g., swarm behavior).

For example, while the movement instruction from the tote plan generated by the superstructure controller 1301 and received by the example smart rack 1701 may describe causing the movement of the example rectangular prism from the example smart rack 1701 to the example smart rack 1703, the movement instruction does not specify when to cause such a movement. In some embodiments, the processing circuitry of the example smart rack 1701 (and not the superstructure controller 1301) may determine when to cause such a movement based on determining whether/when the smart rack 1701 is in a suitable condition to cause the rectangular prism to be transported to the smart rack 1703, and whether/when the smart rack 1703 is in a suitable conduction to receive the rectangular prism from the smart rack 1701. If the smart rack 1703 is not in a suitable conduction to receive the rectangular prism from the smart rack 1701 (e.g. if another rectangular prism may currently be stored in the example smart rack 1703), the smart rack 1701 may transmit a MoveReady message to the smart rack 1703 to request the smart rack 1703 to move the rectangular prism that is currently stored in the example smart rack 1703.

In some embodiments, upon receiving the MoveReady message, the processing circuitry of the example smart rack 1703 may cause the motors of the example smart rack 1703 to be in position to cause the rectangular prism to be transported out of the example smart rack 1703. For example, the example smart rack 1703 may be in position to move the rectangular prism from the example smart rack 1703 to the example smart rack 1705.

In some embodiments, the processing circuitry of the example smart rack 1703 (and not the superstructure controller 1301) may determine when to cause such a movement based on determining whether the smart rack 1703 is in a suitable condition to cause the rectangular prism to be transported, and whether the smart rack 1705 is in a suitable conduction to receive the smart rack from the smart rack 1703. For example, the example smart rack 1703 may generate and/or transmit a MoveReady message to the example smart rack 1705. For example, a processing circuitry of the example smart rack 1703 may generate and/or transmit the MoveReady message to a processing circuitry of the example smart rack 1705. In this example, the MoveReady message may describe a request from the example smart rack 1703 to the example smart rack 1705 to confirm that the example smart rack 1705 is ready to receive the rectangular prism from the example smart rack 1703.

While the description above provides an example of the smart rack 1701 transmitting the MoveReady message to the smart rack 1703 to request the smart rack 1703 to move its rectangular prism, it is noted that the scope of the present disclosure is not limited to the description above. In some embodiments, the smart rack 1703 may determine to move the rectangular prism stored in the smart rack 1703 without the MoveReady message from the smart rack 1701. For example, the smart rack 1703 may receive a movement instruction that requests the smart rack 1703 to move the rectangular prism from the smart rack 1703 to the smart rack 1705. Similar to those described above, the processing circuitry of the smart rack 1703 may determine when to move the rectangular prism from the smart rack 1703 to the smart rack 1705 without any input or interference from the superstructure controller 1301. For example, the smart rack 1703 may transmit a MoveReady message to the smart rack 1705, similar to those described above.

Figure 17B:
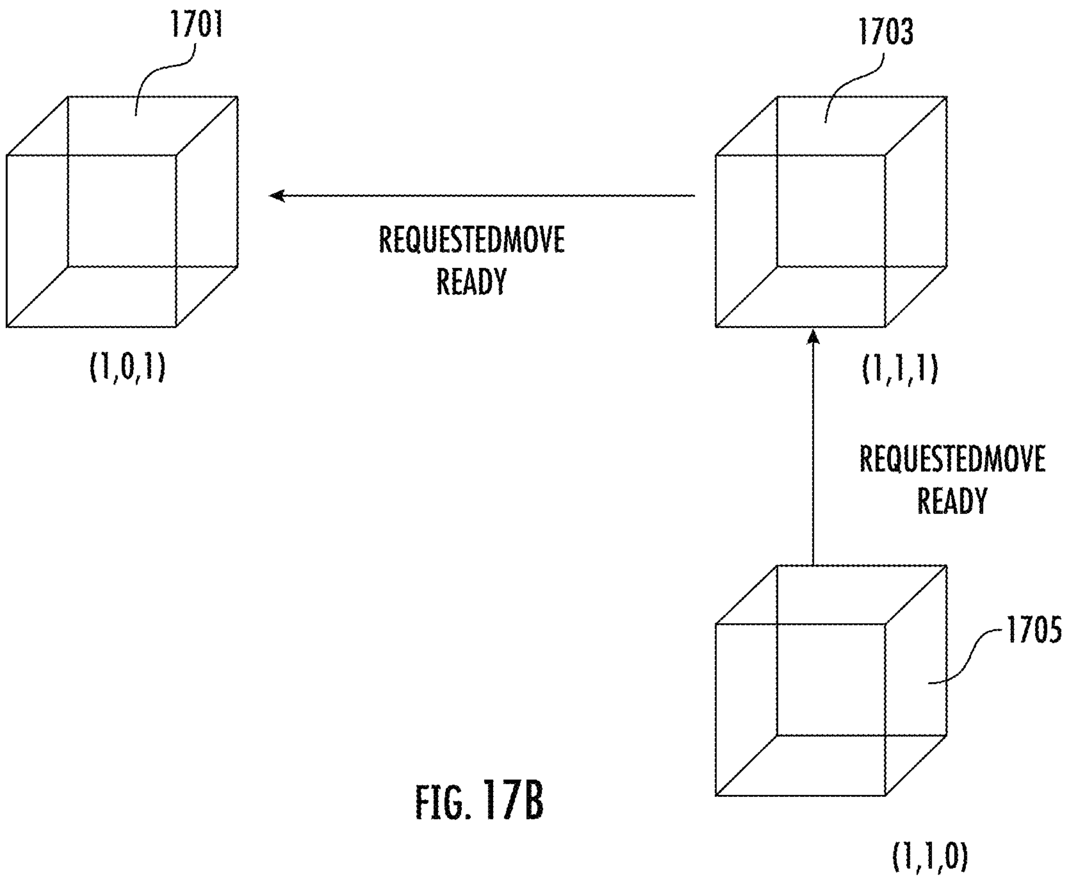
FIG. 17B illustrates example data communications between example smart racks to notify that one or more smart racks are ready for transporting a rectangular prism in accordance with some embodiments of the present disclosure.

In some embodiments, upon receiving the MoveReady message, the processing circuitry of the example smart rack 1705 may cause the motors of the example smart rack 1705 to be in position to receive the rectangular prism from the example smart rack 1703. In some embodiments, subsequent to motors of the example smart rack 1705 being in position, the example smart rack 1705 may transmit a Requested-MoveReady message to the example smart rack 1703 as shown in FIG. 17B. In some embodiments, the Requested-MoveReady message describes that the example smart rack 1705 is ready for the movement described in the MoveReady message. For example, the RequestedMoveReady message may indicate to the example smart rack 1703 that the example smart rack 1705 is ready to receive the rectangular prism from the example smart rack 1703.

Referring now to FIG. 17B, example data communications between the example smart rack 1701, the example smart rack 1703, and the example smart rack 1705 are illustrated. In particular, FIG. 17B illustrates example data communications subsequent to the example data communications shown in FIG. 17A.

As described above, subsequent to receiving the MoveReady message from the example smart rack 1703, the example smart rack 1705 may cause the motors of the example smart rack 1705 to be in position to receive the rectangular prism from the example smart rack 1703. In some embodiments, after the motors of the example smart rack 1705 are in position, the example smart rack 1705 may generate and transmit a RequestedMoveReady message to the example smart rack 1703. For example, a processing circuitry of the example smart rack 1705 may transmit the RequestedMoveReady message to a processing circuitry of the example smart rack 1703. As described above, the RequestedMoveReady message may indicate to the example smart rack 1703 that the example smart rack 1705 is ready to receive the rectangular prism from the example smart rack 1703.

Similarly, subsequent to receiving the MoveReady message from the example smart rack 1701, the example smart rack 1703 may cause the motors of the example smart rack 1703 to be in position to transport the rectangular prism from the example smart rack 1703 to the example smart rack 1705. In some embodiments, upon receiving the RequestedMoveReady message from the example smart rack 1705 and determining that the motors of the example smart rack 1703 are in position, the example smart rack 1703 may generate and transmit a RequestedMoveReady to the example smart rack 1701. For example, a processing circuitry of the example smart rack 1703 may transmit the RequestedMoveReady message to a processing circuitry of the example smart rack 1701. In some embodiments, the RequestedMoveReady message indicates that the example smart rack 1703 is ready to move the rectangular prism from the example smart rack 1703 to the example smart rack 1705.

Figure 17C:
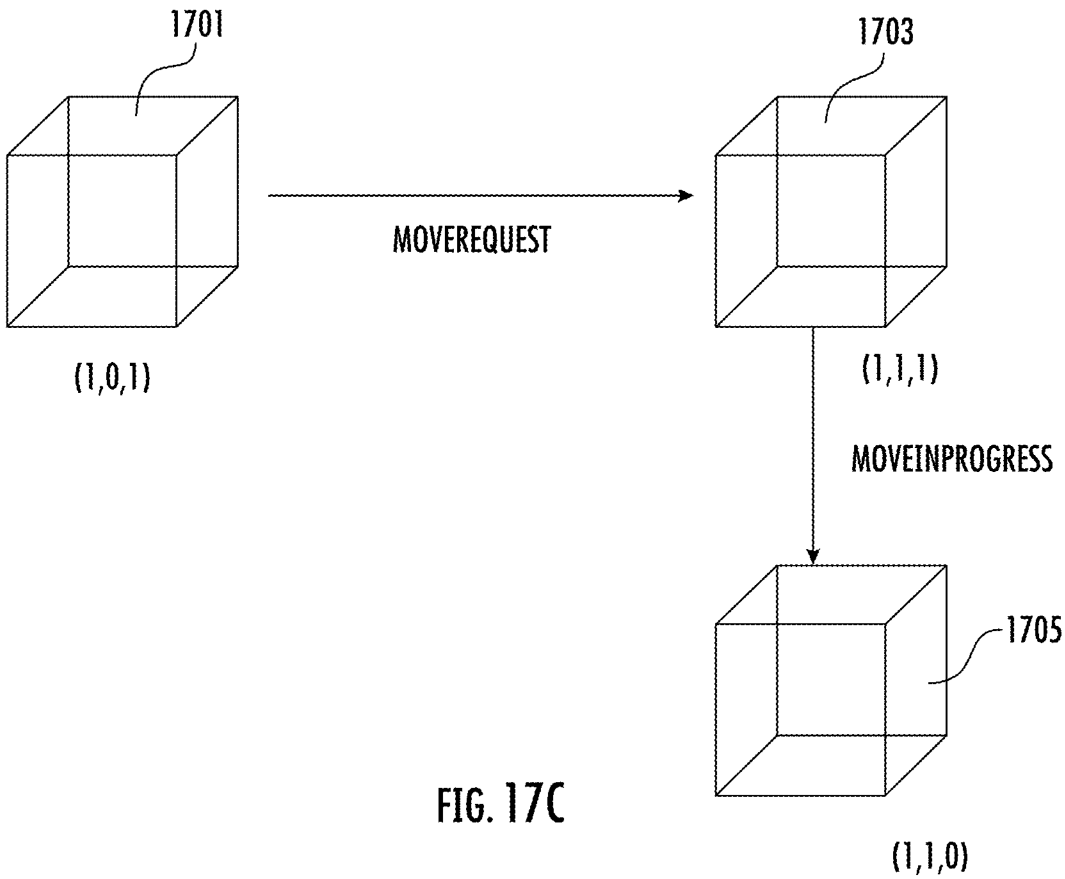
FIG. 17C illustrates example data communications between example smart racks to request transporting a rectangular prism in accordance with some embodiments of the present disclosure.

Referring now to FIG. 17C, example data communications between the example smart rack 1701, the example smart rack 1703, and the example smart rack 1705 are illustrated. In particular, FIG. 17C illustrates example data communications subsequent to the example data communications shown in FIG. 17B.

As described above, the example smart rack 1701 may receive a RequestedMoveReady message from the example smart rack 1703. As described above, the RequestedMoveReady message indicates that the example smart rack 1703 is ready to move the rectangular prism that is currently stored in the example smart rack 1703 to the example smart rack 1705. In some embodiments, upon receiving the RequestedMoveReady message, the example smart rack 1701 may transmit a MoveRequest message to the example smart rack 1703.

In some embodiments, the MoveRequest message may indicate a request from the example smart rack 1701 to the example smart rack 1703 to request that the example smart rack 1703 to move the rectangular prism from the example smart rack 1703 to the example smart rack 1705. In some embodiments, upon receiving the MoveRequest message, a processing circuitry of the example smart rack 1703 may cause the one or more motors to be activated so that an arm of a rack actuator of the example smart rack 1703 causes a down movement of the rectangular prism from the example smart rack 1703 to the example smart rack 1705.

In some embodiments, prior to or while the example smart rack 1703 causing a down movement of the rectangular prism to the example smart rack 1705, the example smart rack 1703 may transmit a MoveInProgress message to the example smart rack 1705. For example, a processing circuitry of the example smart rack 1703 may transmit the MoveInProgress message to a processing circuitry of the example smart rack 1705. In some embodiments, the MoveInProgress message provides a notification to the example smart rack 1705 so that the processing circuitry of the example smart rack 1705 can start activating the one or more motors to receive the rectangular prism from the example smart rack 1703.

Figure 17D:
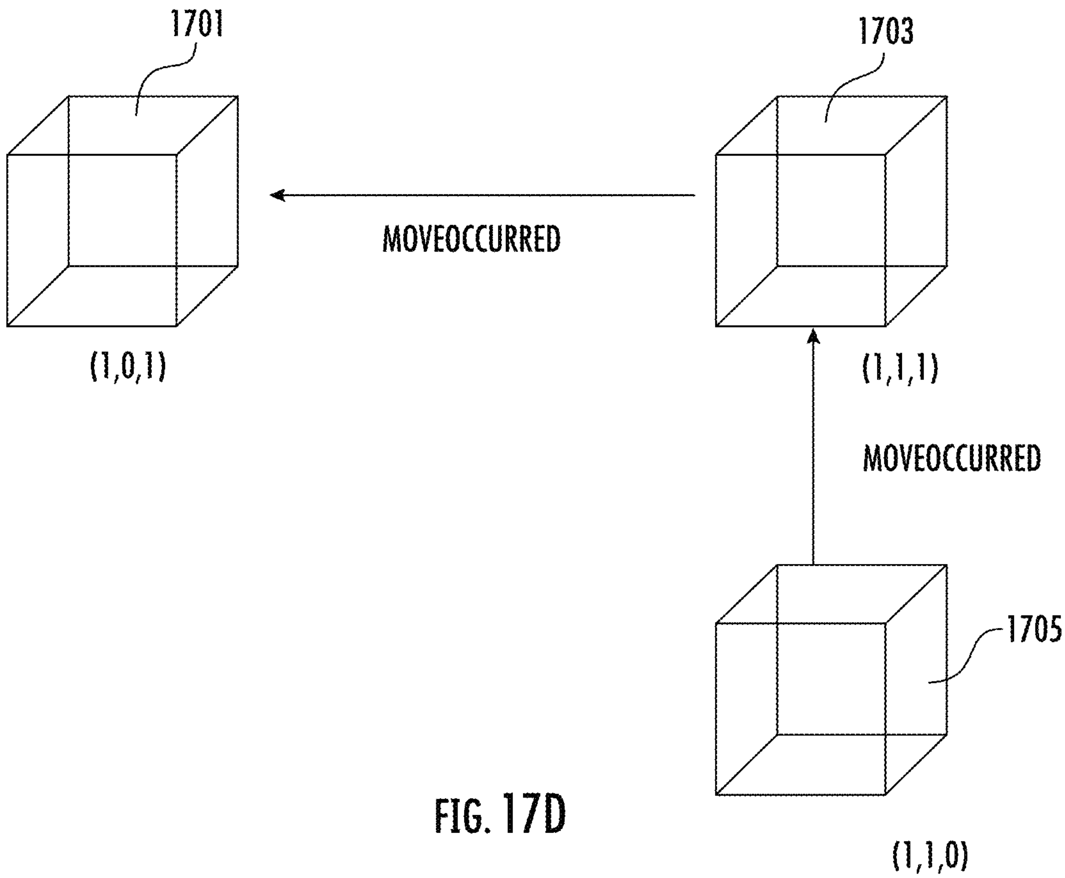
FIG. 17D illustrates example data communications between example smart racks to notify that the transporting of the rectangular prism has been completed in accordance with some embodiments of the present disclosure.

Referring now to FIG. 17D, example data communications between the example smart rack 1701, the example smart rack 1703, and the example smart rack 1705 are illustrated. In particular, FIG. 17D illustrates example data communications subsequent to the example data communications shown in FIG. 17C.

In some embodiments, subsequent to the example rectangular prism being completely moved into the example smart rack 1705, the example smart rack 1705 may transmit a MoveOccured message to the example smart rack 1703. For example, a processing circuitry of the example smart rack 1705 may transmit the MoveOccured message to a processing circuitry of the example smart rack 1703. In some embodiments, the MoveOccured message indicates that the example smart rack 1705 has completed the operations of receiving the rectangular prism from the example smart rack 1703, and/or that the rectangular prism from the example smart rack 1703 has been placed within the example smart rack 1705.

In some embodiments, in response to receiving the MoveOccured message from the example smart rack 1705, the example smart rack 1703 may transmit a MoveOccured message to the example smart rack 1701. For example, a processing circuitry of the example smart rack 1703 may transmit the MoveOccured message to a processing circuitry of the example smart rack 1701. In some embodiments, the MoveOccured message indicates that the example smart rack 1703 has completely moved the rectangular prism away from the example smart rack 1703 to the example smart rack 1705, and/or is ready to receive a rectangular prism from the example smart rack 1701.

In some embodiments, subsequent to receiving the MoveOccured message, the example smart rack 1701 may cause a movement of a rectangular prism from the example smart rack 1701 to the example smart rack 1703.

Referring now to FIG. 18A, FIG. 18B, FIG. 18C, FIG. 18D, FIG. 18E, and FIG. 18F, example movement logics of example rack actuators (such as, but not limited to, the left back lateral rack actuator 1802A, the right front lateral rack actuator 1802B, the front bottom rack actuator 1802C, the right back lateral rack actuator 1802D, the left front lateral rack actuator 1802E, and the left bottom rack actuator 1802F) in accordance with some embodiments of the present disclosure are illustrated. In particular, FIG. 18A, FIG. 18B, FIG. 18C, FIG. 18D, FIG. 18E, and FIG. 18F illustrate example movement logics in response to different movement messages.

Figure 18A:
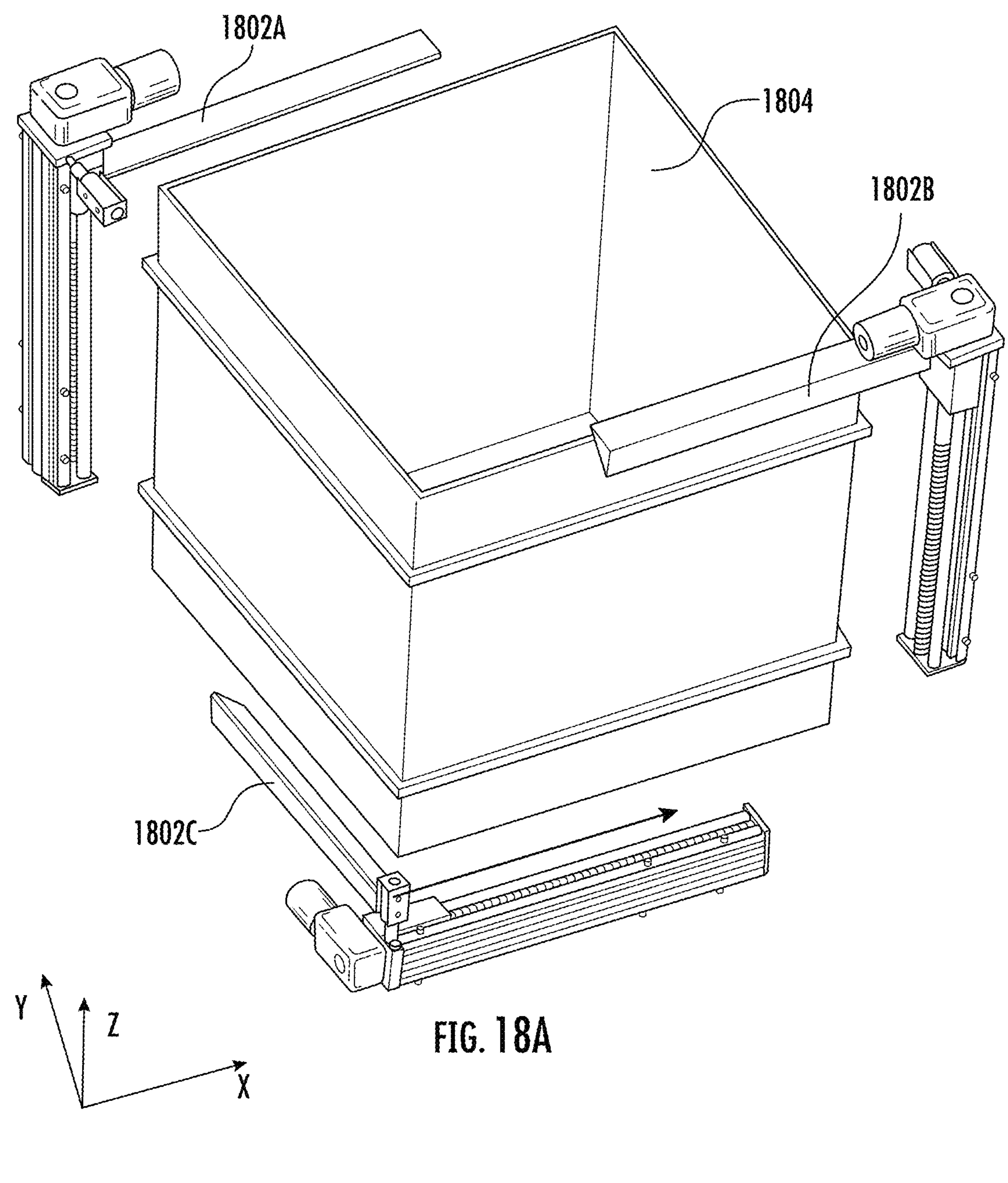
FIG. 18A illustrates example movements of example rack actuators in response to movement messages indicating a right movement in accordance with some embodiments of the present disclosure.

Referring now to FIG. 18A, the example movement logic associated with a right movement of the rectangular prism 1804 in accordance with some embodiments of the present disclosure are illustrated. In particular, FIG. 18A illustrates the example movement logic associated with causing the rectangular prism to be transported to a right peer smart rack.

As described above, a processing circuitry of a smart rack may receive a MoveReady message. In some embodiments, the MoveReady message may describe a request to confirm that the smart rack is ready to move the rectangular prism 1804 to a right peer smart rack.

In some embodiments, subsequent to receiving the MoveReady message, the processing circuitry of the smart rack may cause the arms of the left back lateral rack actuator 1802A and the right front lateral rack actuator 1802B to be moved to the top positions and be in engaged mode. For example, the processing circuitry of the smart rack may transmit instructions to the one or more motor(s), similar to those described and illustrated above in connection with at least FIG. 16. As such, the left back lateral rack actuator 1802A and the right front lateral rack actuator 1802B may be in position to provide support for the rectangular prism 1804.

Additionally, or alternatively, subsequent to receiving the MoveReady message, the processing circuitry of the smart rack may cause front bottom rack actuator 1802C to be moved to a far left position and engaged with a bottom protrusion of the rectangular prism 1804. For example, the processing circuitry of the smart rack may transmit instructions to the one or more motor(s), similar to those described and illustrated above in connection with at least FIG. 16.

In some embodiments, subsequent to the left back lateral rack actuator 1802A, the right front lateral rack actuator 1802B, and front bottom rack actuator 1802C being in position, the processing circuitry may transmit a RequestedMoveReady message indicating that the rectangular prism 1804 is ready to be moved to the right, similar to those described above.

As described above, a processing circuitry of a smart rack may receive a MoveRequest message. In some embodiments, the MoveRequest message may describe a request to move the rectangular prism to a right peer smart rack.

In some embodiments, subsequent to receiving the MoveRequest message, the processing circuitry of the smart rack may cause the arms of front bottom rack actuator 1802C be in engaged mode and exert force towards the right so that the rectangular prism 1804 is pushed to the right. For example, the processing circuitry of the smart rack may transmit instructions to the one or more motor(s), similar to those described and illustrated above in connection with at least FIG. 16.

In some embodiments, after the front bottom rack actuator 1802C exerts force towards the right, the processing circuitry of the smart rack may transmit a MoveInProgress message to the right peer smart rack, notifying the right peer smart rack that the movement to the right is in progress. In some embodiments, after the front bottom rack actuator 1802C completes the right movement of the rectangular prism 1804, the processing circuitry of the smart rack may transmit a MoveOccured message, notifying that the movement has been completed.

Figure 18B:
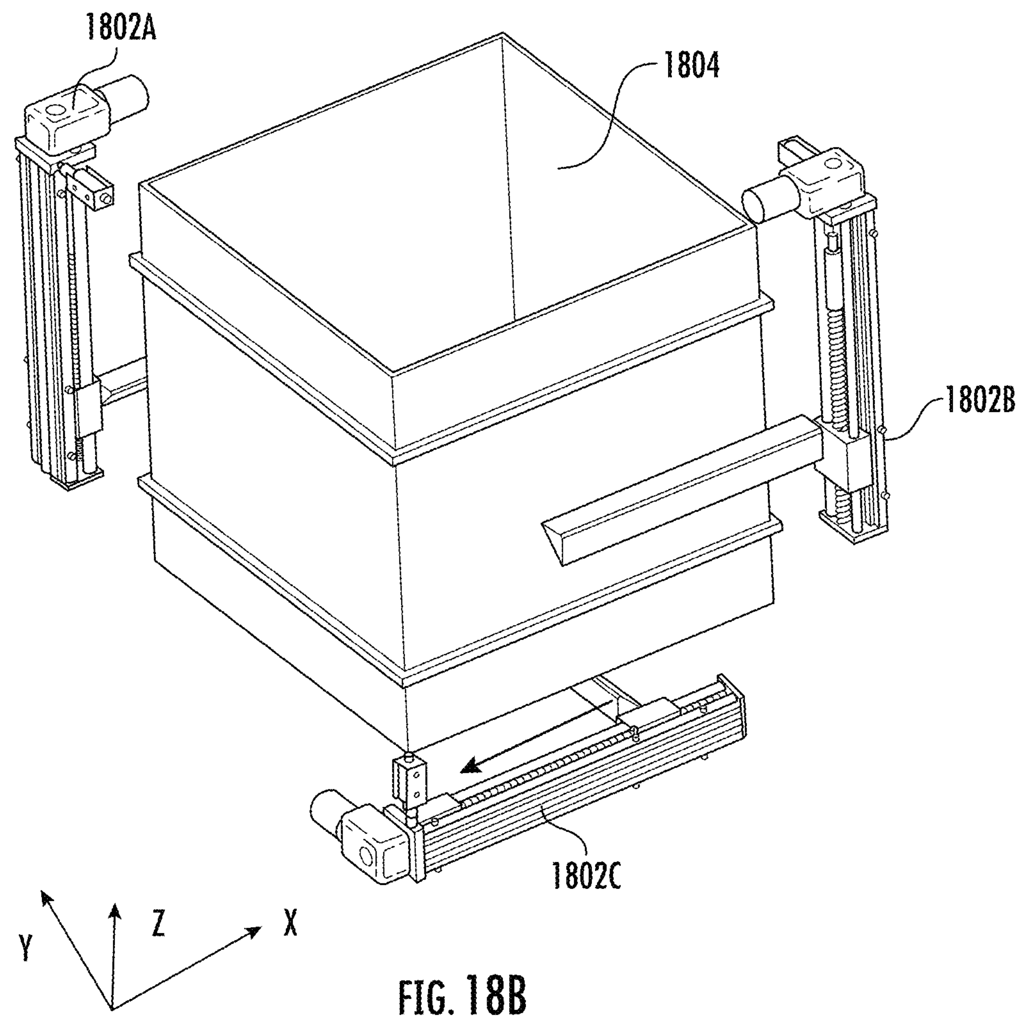
FIG. 18B illustrates example movements of example rack actuators in response to movement messages indicating a left movement in accordance with some embodiments of the present disclosure.

Referring now to FIG. 18B, example movement logic associated with a left movement of the rectangular prism 1804 in accordance with some embodiments of the present disclosure are illustrated. In particular, FIG. 18B illustrates example movement logic associated with causing the rectangular prism 1804 to be transported to a left peer smart rack.

As described above, a processing circuitry of a smart rack may receive a MoveReady message. In some embodiments, the MoveReady message may describe a request to confirm that the smart rack is ready to move the rectangular prism 1804 to a left peer smart rack.

In some embodiments, subsequent to receiving the MoveReady message, the processing circuitry of the smart rack may cause the arms of the left back lateral rack actuator 1802A and the right front lateral rack actuator 1802B to be moved to the top position and be in engaged mode. For example, the processing circuitry of the smart rack may transmit instructions to the one or more motor(s), similar to those described and illustrated above in connection with at least FIG. 16. As such, the left back lateral rack actuator 1802A and the right front lateral rack actuator 1802B may be in position to provide support for the rectangular prism 1804.

Additionally, or alternatively, subsequent to receiving the MoveReady message, the processing circuitry of the smart rack may cause front bottom rack actuator 1802C to be moved to a far right position. For example, the processing circuitry of the smart rack may transmit instructions to the one or more motor(s), similar to those described and illustrated above in connection with at least FIG. 16.

In some embodiments, subsequent to the left back lateral rack actuator 1802A, the right front lateral rack actuator 1802B, and front bottom rack actuator 1802C being in position, the processing circuitry may transmit a RequestedMoveReady message indicating that the rectangular prism 1804 is ready to be moved to the left, similar to those described above.

As described above, a processing circuitry of a smart rack may receive a MoveRequest message. In some embodiments, the MoveRequest message may describe a request to move the rectangular prism to a left peer smart rack.

In some embodiments, subsequent to receiving the MoveRequest message, the processing circuitry of the smart rack may cause the arms of front bottom rack actuator 1802C be in engaged mode and exert force towards the left so that the rectangular prism 1804 is pushed to the left. For example, the processing circuitry of the smart rack may transmit instructions to the one or more motor(s), similar to those described and illustrated above in connection with at least FIG. 16.

In some embodiments, after the front bottom rack actuator 1802C exerts force towards the left, the processing circuitry of the smart rack may transmit a MoveInProgress message to the left peer smart rack, notifying that the movement to the left is in progress. In some embodiments, after the front bottom rack actuator 1802C completes the left movement of the rectangular prism 1804, the processing circuitry of the smart rack may transmit a MoveOccured message, notifying that the movement has been completed.

Figure 18C:
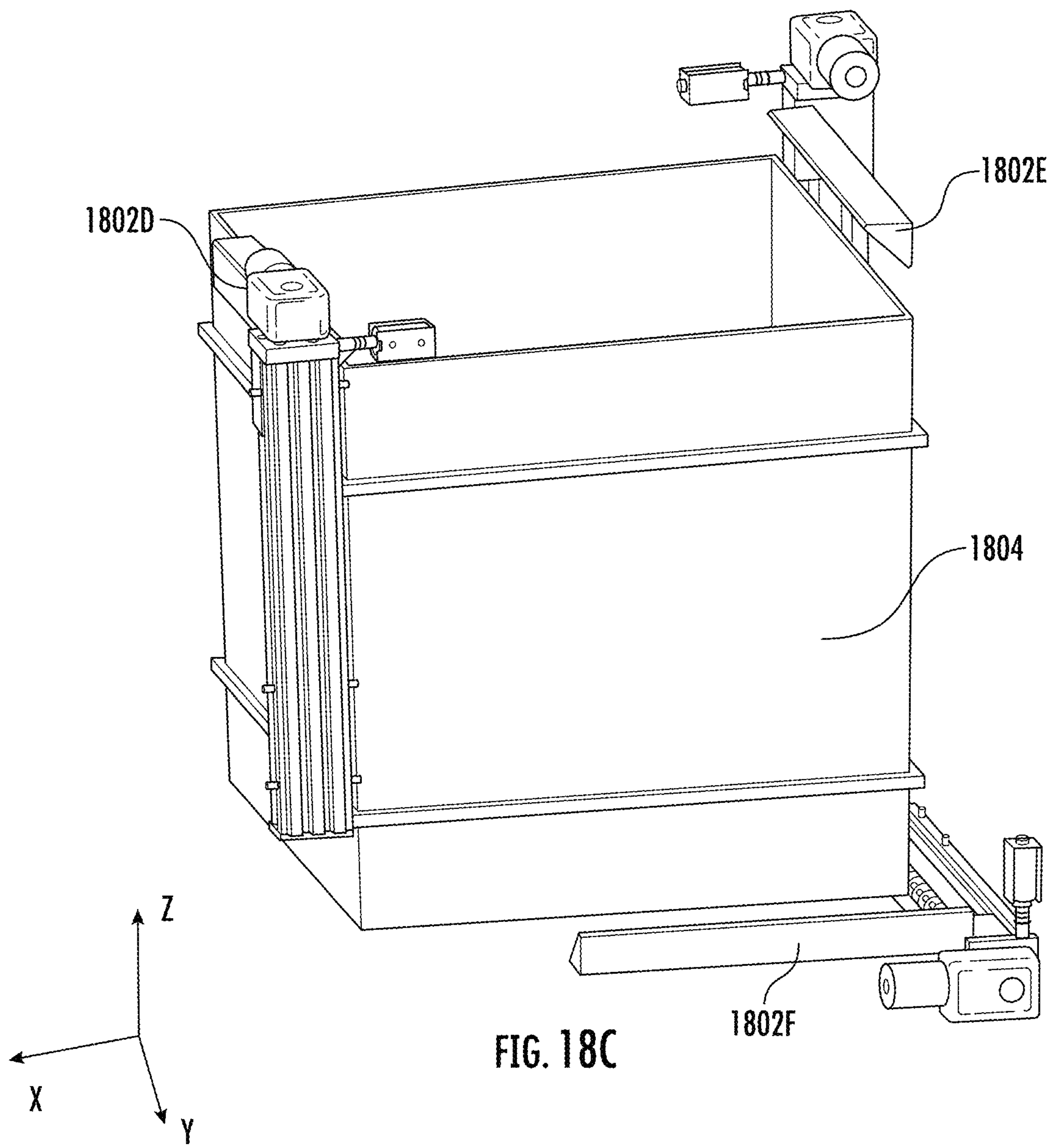
FIG. 18C illustrates example movements of example rack actuators in response to movement messages indicating a front movement in accordance with some embodiments of the present disclosure.

Referring now to FIG. 18C, example movement logic associated with a front movement of the rectangular prism 1804 in accordance with some embodiments of the present disclosure are illustrated. In particular, FIG. 18C illustrates example movement logic associated with causing the rectangular prism 1804 to be transported to a front peer smart rack.

As described above, a processing circuitry of a smart rack may receive a MoveReady message. In some embodiments, the MoveReady message may describe a request to confirm that the smart rack is ready to move the rectangular prism 1804 to a front peer smart rack.

In some embodiments, subsequent to receiving the MoveReady message, the processing circuitry of the smart rack may cause the arms of the right back lateral rack actuator 1802D and the left front lateral rack actuator 1802E to be moved to the top position and be in engaged mode. For example, the processing circuitry of the smart rack may transmit instructions to the one or more motor(s), similar to those described and illustrated above in connection with at least FIG. 16. As such, the right back lateral rack actuator 1802D and the left front lateral rack actuator 1802E may be in position to provide support for the rectangular prism 1804.

Additionally, or alternatively, subsequent to receiving the MoveReady message, the processing circuitry of the smart rack may cause the arms of the left bottom rack actuator 1802F to be moved to a far back position. For example, the processing circuitry of the smart rack may transmit instructions to the one or more motor(s), similar to those described and illustrated above in connection with at least FIG. 16.

In some embodiments, subsequent to right back lateral rack actuator 1802D, the left front lateral rack actuator 1802E, and the left bottom rack actuator 1802F being in position, the processing circuitry may transmit a RequestedMoveReady message indicating that the rectangular prism 1804 is ready to be moved to the front, similar to those described above.

As described above, a processing circuitry of a smart rack may receive a MoveRequest message. In some embodiments, the MoveRequest message may describe a request to move the rectangular prism to a front peer smart rack.

In some embodiments, subsequent to receiving the MoveRequest message, the processing circuitry of the smart rack may cause the arms of the left bottom rack actuator 1802F be in engaged mode and exert force towards the front so that the rectangular prism 1804 is pushed to the front. For example, the processing circuitry of the smart rack may transmit instructions to the one or more motor(s), similar to those described and illustrated above in connection with at least FIG. 16.

In some embodiments, after the left bottom rack actuator 1802F exerts force towards the front, the processing circuitry of the smart rack may transmit a MoveInProgress message to the front peer smart rack, notifying that the movement to the front is in progress. In some embodiments, after the left bottom rack actuator 1802F completes the front movement of the rectangular prism 1804, the processing circuitry of the smart rack may transmit a MoveOccured message, notifying that the movement has been completed.

Figure 18D:
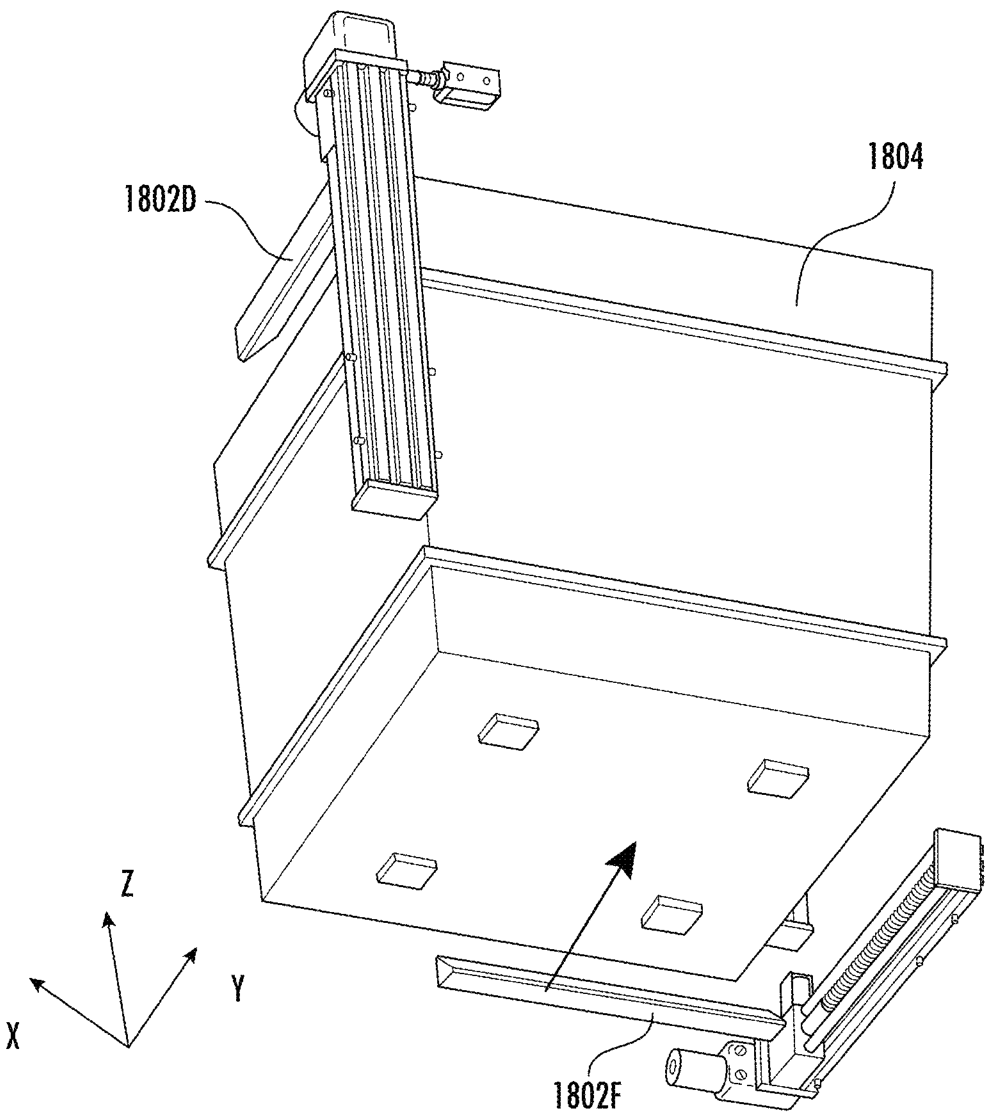
FIG. 18D illustrates example movements of example rack actuators in response to movement messages indicating a back movement in accordance with some embodiments of the present disclosure.

Referring now to FIG. 18D, example movement logic associated with a back movement of the rectangular prism 1804 in accordance with some embodiments of the present disclosure are illustrated. In particular, FIG. 18D illustrates example movement logic associated with causing the rectangular prism 1804 to be transported to a back peer smart rack.

As described above, a processing circuitry of a smart rack may receive a MoveReady message. In some embodiments, the MoveReady message may describe a request to confirm that the smart rack is ready to move the rectangular prism 1804 to a back peer smart rack.

In some embodiments, subsequent to receiving the MoveReady message, the processing circuitry of the smart rack may cause the arms of the right back lateral rack actuator 1802D and the left front lateral rack actuator to be moved to the top position and be in engaged mode. For example, the processing circuitry of the smart rack may transmit instructions to the one or more motor(s), similar to those described and illustrated above in connection with at least FIG. 16. As such, the right back lateral rack actuator 1802D and the left front lateral rack actuator may be in position to provide support for the rectangular prism 1804.

Additionally, or alternatively, subsequent to receiving the MoveReady message, the processing circuitry of the smart rack may cause the arms of the left bottom rack actuator 1802F to be moved to a far front position. For example, the processing circuitry of the smart rack may transmit instructions to the one or more motor(s), similar to those described and illustrated above in connection with at least FIG. 16.

In some embodiments, subsequent to the right back lateral rack actuator 1802D, the left front lateral rack actuator 1802E, and the left bottom rack actuator 1802F being in position, the processing circuitry may transmit a RequestedMoveReady message indicating that the rectangular prism 1804 is ready to be moved to the back, similar to those described above.

As described above, a processing circuitry of a smart rack may receive a MoveRequest message. In some embodiments, the MoveRequest message may describe a request to move the rectangular prism to a back peer smart rack.

In some embodiments, subsequent to receiving the MoveRequest message, the processing circuitry of the smart rack may cause the arms of the left bottom rack actuator 1802F be in engaged mode and exert force towards the back so that the rectangular prism 1804 is pushed to the back. For example, the processing circuitry of the smart rack may transmit instructions to the one or more motor(s), similar to those described and illustrated above in connection with at least FIG. 16.

In some embodiments, after the left bottom rack actuator 1802F exerts force towards the back, the processing circuitry of the smart rack may transmit a MoveInProgress message to the back peer smart rack, notifying that the movement to the back is in progress. In some embodiments, after the left bottom rack actuator 1802F completes the back movement of the rectangular prism 1804, the processing circuitry of the smart rack may transmit a MoveOccured message, notifying that the movement has been completed.

Figure 18E:
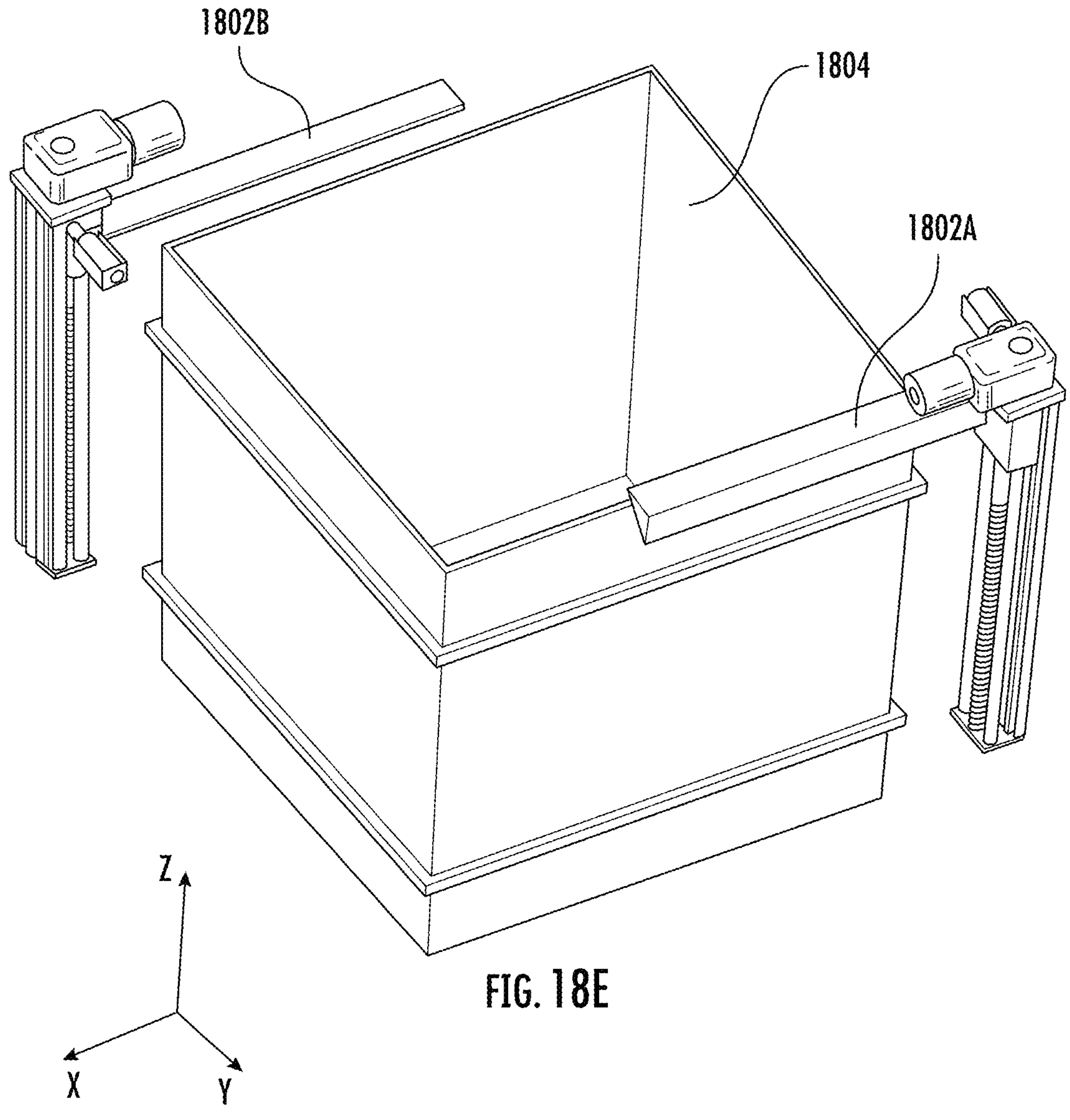
FIG. 18E illustrates example movements of example rack actuators in response to movement messages indicating a down movement in accordance with some embodiments of the present disclosure.

Referring now to FIG. 18E, example movement logic associated with a down movement of the rectangular prism 1804 in accordance with some embodiments of the present disclosure are illustrated. In particular, FIG. 18E illustrates example movement logic associated with causing the rectangular prism 1804 to be pushed to a down peer smart rack.

As described above, a processing circuitry of a smart rack may receive a MoveReady message. In some embodiments, the MoveReady message may describe a request to confirm that the smart rack is ready to move the rectangular prism 1804 to a down peer smart rack.

In some embodiments, subsequent to receiving the MoveReady message, the processing circuitry of the smart rack may cause the arms of the left back lateral rack actuator 1802A and the right front lateral rack actuator 1802B to be moved to their corresponding top positions and be in engaged mode. For example, the processing circuitry of the smart rack may transmit instructions to the one or more motor(s), similar to those described and illustrated above in connection with at least FIG. 16. As such, the left back lateral rack actuator 1802A and the right front lateral rack actuator 1802B may be in position to provide support for the rectangular prism 1804.

Additionally, or alternatively, subsequent to receiving the MoveReady message, the processing circuitry of the smart rack may cause front bottom rack actuator and the left bottom rack actuator to be moved to their end positions so that they do not block the downwards movement of the rectangular prism. For example, the processing circuitry of the smart rack may transmit instructions to the one or more motor(s), similar to those described and illustrated above in connection with at least FIG. 16.

In some embodiments, subsequent to the left back lateral rack actuator 1802A, the right front lateral rack actuator 1802B, front bottom rack actuator and the left bottom rack actuator being in position, the processing circuitry may transmit a RequestedMoveReady message indicating that the rectangular prism 1804 is ready to be moved down, similar to those described above.

As described above, a processing circuitry of a smart rack may receive a MoveRequest message. In some embodiments, the MoveRequest message may describe a request to move the rectangular prism to a down peer smart rack.

In some embodiments, subsequent to receiving the MoveRequest message, the processing circuitry of the smart rack may cause the arms of the left back lateral rack actuator 1802A and the right front lateral rack actuator 1802B to travel downwards so that the rectangular prism 1804 travels downwards. For example, the processing circuitry of the smart rack may transmit instructions to the one or more motor(s), similar to those described and illustrated above in connection with at least FIG. 16.

In some embodiments, after the left back lateral rack actuator 1802A, the right front lateral rack actuator 1802B starts traveling downwards, the processing circuitry of the smart rack may transmit a MoveInProgress message to the bottom peer smart rack, notifying that the movement down is in progress. In some embodiments, after the left back lateral rack actuator 1802A and the right front lateral rack actuator 1802B completing the down movement of the rectangular prism 1804, the processing circuitry of the smart rack may transmit a MoveOccured message, notifying that the movement has been completed.

Figure 18F:
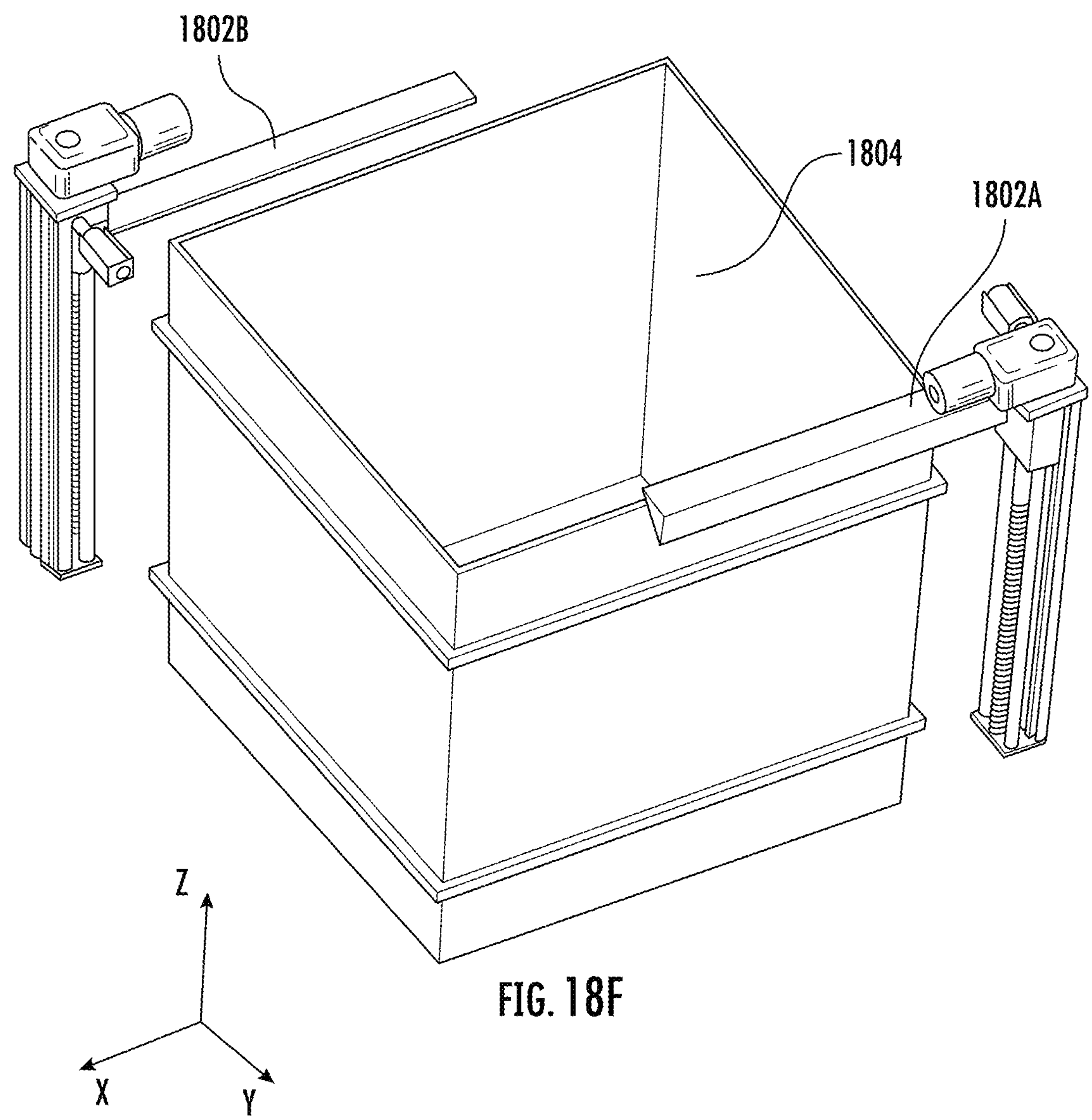
FIG. 18F illustrates example movements of example rack actuators in response to movement messages indicating an up movement in accordance with some embodiments of the present disclosure.

Referring now to FIG. 18F, example movement logic associated with an up movement of the rectangular prism 1804 in accordance with some embodiments of the present disclosure are illustrated. In particular, FIG. 18F illustrates example movement logic associated with causing the rectangular prism 1804 to be lifted to an up peer smart rack.

As described above, a processing circuitry of a smart rack may receive a MoveReady message. In some embodiments, the MoveReady message may describe a request to confirm that the smart rack is ready to move the rectangular prism 1804 to an up peer smart rack.

In some embodiments, subsequent to receiving the MoveReady message, the processing circuitry of the smart rack may cause the arms of the left back lateral rack actuator 1802A and the right front lateral rack actuator 1802B to be moved to their corresponding bottom positions and be in engaged mode. For example, the processing circuitry of the smart rack may transmit instructions to the one or more motor(s), similar to those described and illustrated above in connection with at least FIG. 16. As such, the left back lateral rack actuator 1802A and the right front lateral rack actuator 1802B may be in position to provide support for the rectangular prism 1804.

In some embodiments, subsequent to the left back lateral rack actuator 1802A and the right front lateral rack actuator 1802B being in position, the processing circuitry may transmit a RequestedMoveReady message indicating that the rectangular prism 1804 is ready to be moved up, similar to those described above.

As described above, a processing circuitry of a smart rack may receive a MoveRequest message. In some embodiments, the MoveRequest message may describe a request to move the rectangular prism to an up peer smart rack.

In some embodiments, subsequent to receiving the MoveRequest message, the processing circuitry of the smart rack may cause the arms of the left back lateral rack actuator 1802A and the right front lateral rack actuator 1802B to travel upwards so that the rectangular prism 1804 travels upwards. For example, the processing circuitry of the smart rack may transmit instructions to the one or more motor(s), similar to those described and illustrated above in connection with at least FIG. 16.

In some embodiments, after the left back lateral rack actuator 1802A, the right front lateral rack actuator 1802B starts traveling upwards, the processing circuitry of the smart rack may transmit a MoveInProgress message to the top peer smart rack, notifying that the movement upwards is in progress. In some embodiments, after the left back lateral rack actuator 1802A, the right front lateral rack actuator 1802B completes the up movement of the rectangular prism 1804, the processing circuitry of the smart rack may transmit a MoveOccured message, notifying that the movement has been completed.

As described above, an example smart rack of an example modular superstructure in accordance with some embodiments of the present disclosure may include one or more rack actuators. The rack actuators may support the one or more rectangular prisms to be stored in the example smart rack, and may cause the one or more rectangular prisms to be transported in/out of the example smart rack. In some embodiments, the one or more rack actuators comprise components that require power (e.g. electricity) to be activated or to operate. Such example components may include, but not limited to, motors (including, but not limited to, step motors and linear motors), controllers, and/or the like.

In some embodiments, an example modular superstructure may comprise tens, hundreds or thousands of smart racks. Supplying electricity to all the smart racks at the same time is not only power-consuming, but also unnecessary, as not all the smart racks are activated at the same time. For example, during operation, some smart racks may be activated to transport one or more rectangular prisms from one location to another, while other smart racks may be at an idle state. As such, supplying electricity to all the smart racks can result in a waste of energy.

Various embodiments of the present disclosure overcome the above-referenced difficulties, and provide various technical advancements and improvements. For example, example embodiments of the present disclosure may provide one or more example smart rack switch circuits for each smart rack in the modular superstructure, such that each smart rack may control the flow of electricity in one or more directions/dimensions in the modular superstructure, so as to selectively providing power to only those smart racks that needed to be activated to carry out the movements for the rectangular prisms.

Figure 19:
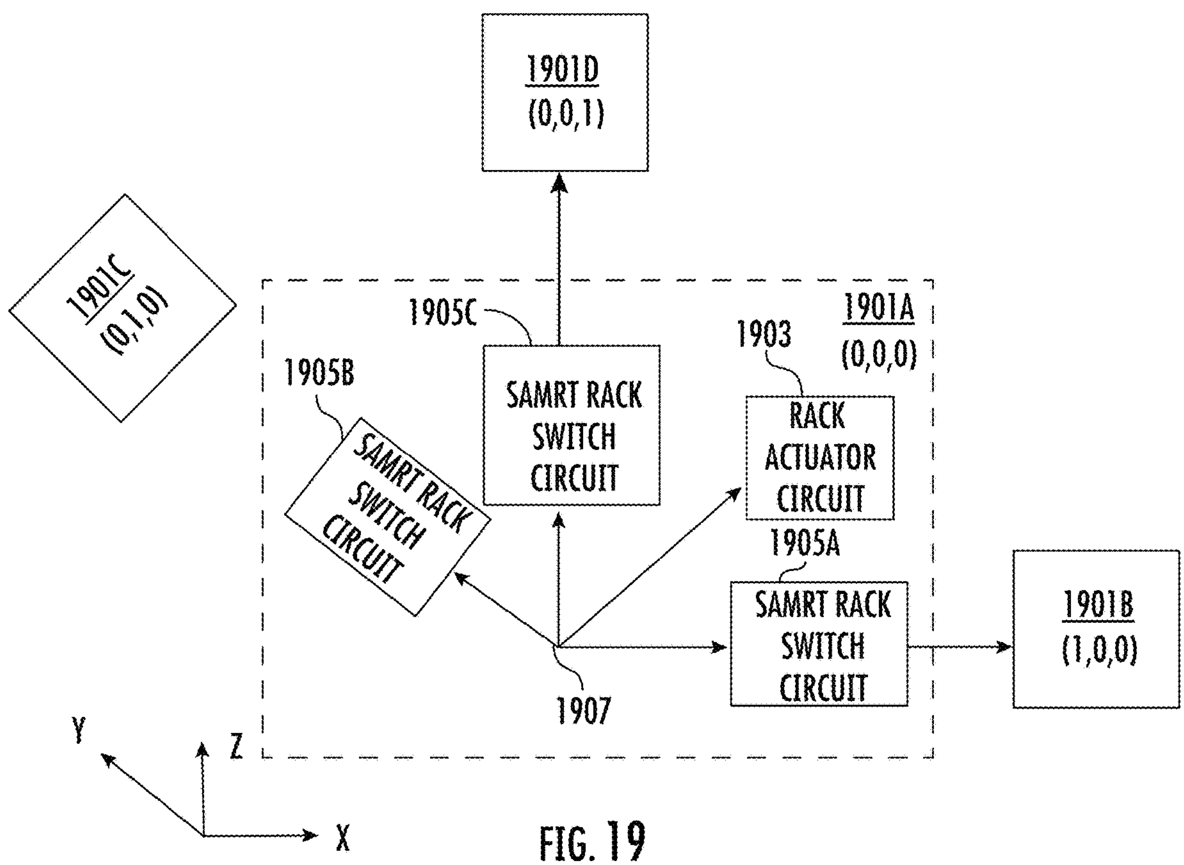
FIG. 19 is an example diagram illustrating example components for providing power within an example smart rack and between the example smart rack and other peer smart racks in accordance with some embodiments of the present disclosure.

Referring now to FIG. 19, an example diagram illustrating an example circuit diagram illustrating example circuits associated with a smart rack 1901A in accordance with some embodiments of the present disclosure is illustrated.

In some embodiments, the example smart rack 1901A may comprise a rack actuator circuit 1903. In some embodiments, a first end of the rack actuator circuit 1903 is connected to smart rack power access point 1907 of the smart rack 1901A. In some embodiments, the smart rack power access point 1907 refers to the point in the circuits associated with a smart rack 1901A that can receive electricity from outside the example smart rack 1901A. In some embodiments, the rack actuator circuit 1903 is configured to provide power to at least one motor of the smart rack 1901A.

For example, when the smart rack power access point 1907 is connected to a power source, and/or when the smart rack power access point 1907 receives electricity from another smart rack, electricity may be supplied to the smart rack power access point 1907. As the rack actuator circuit 1903 is connected to the smart rack power access point 1907, the rack actuator circuit 1903 may provide electricity from the smart rack power access point 1907 to the components of the smart rack that require power (such as, but not limited to, motors, similar to those described above).

In some examples, when the smart rack power access point 1907 is not connected to a power source, and does not receive electricity from another smart rack, there may not be any electricity supplied to the smart rack power access point 1907. In such examples, the rack actuator circuit 1903 may not provide electricity to the components of the smart rack that require electricity (such as, but not limited to, motors, similar to those described above), and these components of the smart rack may not be activated.

In some embodiments, the example smart rack 1901A may comprise one or more smart rack switch circuits. In some embodiments, each of the smart rack switch circuits may control the flow of electricity from the example smart rack 1901A to a peer smart rack. In some embodiments, each of the smart rack switch circuits may control the flow of electricity to a peer smart rack in one dimension. For example, each smart rack switch circuit is connected to the smart rack power access point 1907 of the smart rack 1901A, and each of the at least one smart rack switch circuit is also connected to at least one peer smart rack power access point of at least one peer smart rack (such as, but not limited to, the smart rack 1901B, the smart rack 1901C, and the smart rack 1901D).

For example, if the example smart rack 1901A is a part of a three-dimensional modular superstructure, the example smart rack 1901A may comprise three smart rack switch circuits: an x dimension smart rack switch circuit for controlling the flow of electricity in the x dimension, a y dimension smart rack switch circuit for controlling the flow of electricity in the y dimension, and a z dimension smart rack switch circuit for controlling the flow of electricity in the z dimension.

As another example, if the example smart rack 1901A is a part of a two-dimensional modular superstructure, the example smart rack 1901A may comprise two smart rack switch circuits: an x dimension smart rack switch circuit for controlling the flow of electricity in the x dimension and a y dimension smart rack switch circuit for controlling the flow of electricity in the y dimension.

In the example shown in FIG. 19, the example smart rack 1901A may comprise an x dimension smart rack switch circuit 1905A, a y dimension smart rack switch circuit 1905B, and a z dimension smart rack switch circuit 1905C. In some embodiments, a first end of the x dimension smart rack switch circuit 1905A, a first end of the y dimension smart rack switch circuit 1905B, and a first end of the z dimension smart rack switch circuit 1905C are all connected to the smart rack power access point 1907 of the example smart rack 1901A. In some embodiments, a second end of the x dimension smart rack switch circuit 1905A, a second end of the y dimension smart rack switch circuit 1905B, and a second end of the z dimension smart rack switch circuit 1905C are each connected to a smart rack power access point of a peer smart rack.

In some embodiments, the x dimension smart rack switch circuit 1905A controls the flow of electricity from the smart rack 1901A to another smart rack that is positioned adjacent to the example smart rack 1901A in the x axis dimension. As described above, the x dimension smart rack switch circuit 1905A may comprise a first end that is connected to the smart rack power access point 1907 of the example smart rack 1901A. In some embodiments, a second end of the x dimension smart rack switch circuit 1905A is connected to the smart rack power access point of a peer smart rack in the x dimension.

In the example shown in FIG. 19, the example smart rack 1901A may be associated with the rack coordination set (0, 0, 0), and the example smart rack 1901B may be associated with the rack coordination set (1, 0, 0). In such an example, the example smart rack 1901B is positioned to the right of the example smart rack 1901A, and the second end of the x dimension smart rack switch circuit 1905A is connected to the smart rack power access point of the example smart rack 1901B.

In some embodiments, when the x dimension smart rack switch circuit 1905A is turned on, electric current may flow from the smart rack power access point 1907 of the example smart rack 1901A, through the x dimension smart rack switch circuit 1905A, and to the smart rack power access point of the example smart rack 1901B. As such, example embodiments of the present disclosure may supply power to the example smart rack 1901B through the example smart rack 1901A.

In some embodiments, when the x dimension smart rack switch circuit 1905A is turned off, electric current may not flow from the smart rack power access point 1907 of the example smart rack 1901A to the example smart rack 1901B, thereby disconnecting power from the example smart rack 1901B.

While the description above provides an example of utilizing an x dimension smart rack switch circuit to control the flow of power from the example smart rack 1901A to a right peer smart rack, it is noted that the scope of the present disclosure is not limited to the description above. In some examples, an example x dimension smart rack switch circuit may control the flow of the power from the example smart rack 1901A to a left peer smart rack.

In some embodiments, the y dimension smart rack switch circuit 1905B controls the flow of electricity from the smart rack 1901A to another smart rack that is positioned adjacent to the example smart rack 1901A in the y axis dimension. As described above, the y dimension smart rack switch circuit 1905B may comprise a first end that is connected to the smart rack power access point 1907 of the example smart rack 1901A. In some embodiments, a second end of the y dimension smart rack switch circuit 1905B is connected to the smart rack power access point of a peer smart rack in the y dimension.

In the example shown in FIG. 19, the example smart rack 1901A may be associated with the rack coordination set (0, 0, 0), and the example smart rack 1901C may be associated with the rack coordination set (0, 1, 0). In such an example, the example smart rack 1901C is positioned to the back of the example smart rack 1901A, and the second end of the y dimension smart rack switch circuit 1905B is connected to the smart rack power access point of the example smart rack 1901C.

In some embodiments, when the y dimension smart rack switch circuit 1905B is enabled, electric current may flow from the smart rack power access point 1907 of the example smart rack 1901A, through the y dimension smart rack switch circuit 1905B, and to the smart rack power access point of the example smart rack 1901C. As such, example embodiments of the present disclosure may supply power to the example smart rack 1901C through the example smart rack 1901A.

In some embodiments, when the y dimension smart rack switch circuit 1905B is disabled, electric current may not flow from the smart rack power access point 1907 of the example smart rack 1901A to the example smart rack 1901C, thereby disconnecting power from the example smart rack 1901C.

While the description above provides an example of utilizing a y dimension smart rack switch circuit to control the flow of power from the example smart rack 1901A to a back peer smart rack, it is noted that the scope of the present disclosure is not limited to the description above. In some examples, an example y dimension smart rack switch circuit may control the flow of the power from the example smart rack 1901A to a front peer smart rack.

In some embodiments, the z dimension smart rack switch circuit 1905C controls the flow of electricity from the smart rack 1901A to another smart rack that is positioned adjacent to the example smart rack 1901A in the z axis dimension. As described above, the z dimension smart rack switch circuit 1905C may comprise a first end that is connected to the smart rack power access point 1907 of the example smart rack 1901A. In some embodiments, a second end of the z dimension smart rack switch circuit 1905C is connected to the smart rack power access point of a peer smart rack in the z dimension.

In the example shown in FIG. 19, the example smart rack 1901A may be associated with the rack coordination set (0, 0, 0), and the example smart rack 1901D may be associated with the rack coordination set (0, 0, 1). In such an example, the example smart rack 1901D is positioned to the top of the example smart rack 1901A, and the second end of the z dimension smart rack switch circuit 1905C is connected to the smart rack power access point of the example smart rack 1901D.

In some embodiments, when the z dimension smart rack switch circuit 1905C is enabled, electric current may flow from the smart rack power access point 1907 of the example smart rack 1901A, through the z dimension smart rack switch circuit 1905C, and to the smart rack power access point of the example smart rack 1901D. As such, example embodiments of the present disclosure may supply power to the example smart rack 1901D through the example smart rack 1901A.

In some embodiments, when the z dimension smart rack switch circuit 1905C is disabled, electric current may not flow from the smart rack power access point 1907 of the example smart rack 1901A to the example smart rack 1901D, thereby disconnecting power from the example smart rack 1901D.

While the description above provides an example of utilizing a z dimension smart rack switch circuit to control the flow of power from the example smart rack 1901A to a top peer smart rack, it is noted that the scope of the present disclosure is not limited to the description above. In some examples, an example z dimension smart rack switch circuit may control the flow of the power from the example smart rack 1901A to a bottom peer smart rack.

As such, the example shown in FIG. 19 illustrates examples of circuits associated with a smart rack that include smart rack switch circuits to enable the smart rack to selectively provide power to its peer smart racks. In an example modular superstructure, a plurality of smart racks are secured to one another, and the circuits of the smart racks (including smart rack switch circuits) may form a smart matrix that provides power paths for selectively supplying power to the smart racks.

Figure 20:
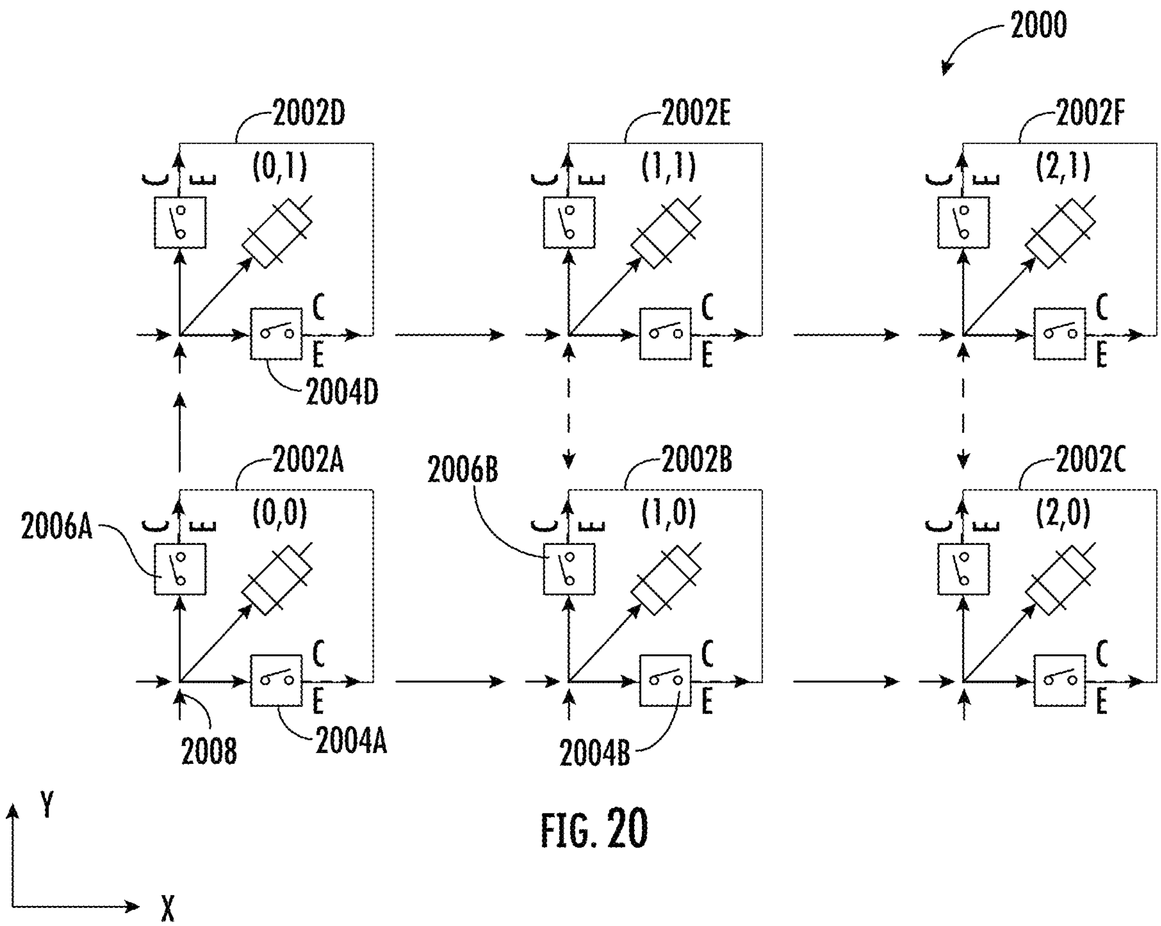
FIG. 20 is an example diagram illustrating an example smart matrix that provides a power path to various smart racks in a modular superstructure in accordance with some embodiments of the present disclosure.

Referring now to FIG. 20, the example diagram illustrates a portion of an example smart matrix 2000 of an example modular superstructure in accordance with some embodiments of the present disclosure.

In the example shown in FIG. 20, the example modular superstructure is a two-dimensional modular superstructure. The example modular superstructure may comprise a plurality of smart racks, including, but not limited to, the smart rack 2002A, the smart rack 2002B, the smart rack 2002C, the smart rack 2002D, the smart rack 2002E, and the smart rack 2002F. In some embodiments, each of smart racks is associated with a rack coordination set that is defined based on their corresponding positions in the x axis and in the y axis. For example, the rack coordination set of each of the smart racks in the example modular superstructure may be in the form of (x, y).

For example, the smart rack 2002A may be associated with a rack coordination set (0, 0), and the smart rack 2002B may be associated with a rack coordination set (1, 0). In such an example, the smart rack 2002B is secured to the right of the smart rack 2002A. The smart rack 2002C may be associated with the rack coordination set (2, 0), which indicates that it is secured to the right of the smart rack 2002B. The smart rack 2002D may be associated with the rack coordination set (0, 1), which indicates that it is secured to the back of the smart rack 2002A. The smart rack 2002E may be associated with the rack coordination set (1, 1), which indicates that it is secured to the right of the smart rack 2002D. The smart rack 2002F may be associated with the rack coordination set (2, 1), which indicates that it is secured to the right of the smart rack 2002E.

Similar to those described above in connection with FIG. 19, each of the smart rack 2002A, the smart rack 2002B, the smart rack 2002C, the smart rack 2002D, the smart rack 2002E, and the smart rack 2002F may comprise one or more smart rack switch circuits that are configured to control the flow of the power to a peer smart rack.

For example, the example smart rack 2002A comprises an x dimension smart rack switch circuit 2004A and a y dimension smart rack switch circuit 2006A, similar to those described above. In some embodiments, a first end of the x dimension smart rack switch circuit 2004A may be connected to the smart rack power access point 2008 of the smart rack 2002A, and a second end of the x dimension smart rack switch circuit 2004A may be connected to the smart rack power access point of the smart rack 2002B. In some embodiments, the smart rack power access point 2008 is connected to a power source (for example, a power outlet). As such, the x dimension smart rack switch circuit 2004A may control the flow of electricity from the smart rack 2002A to the smart rack 2002B. Similarly, in some embodiments, a first end of the y dimension smart rack switch circuit 2006A may be connected to the smart rack power access point of the smart rack 2002A, and a second end of the y dimension smart rack switch circuit 2006A may be connected to the smart rack power access point of the smart rack 2002D. As such, the y dimension smart rack switch circuit 2006A may control the flow of electricity from the smart rack 2002A to the smart rack 2002D.

In some embodiments, the example smart rack 2002B comprises an x dimension smart rack switch circuit 2004B and a y dimension smart rack switch circuit 2006B, similar to those described above. In some embodiments, a first end of the x dimension smart rack switch circuit 2004B may be connected to the smart rack power access point of the smart rack 2002B, and a second end of the x dimension smart rack switch circuit 2004B may be connected to the smart rack power access point of the smart rack 2002C. As such, the x dimension smart rack switch circuit 2004B may control the flow of electricity from the smart rack 2002B to the smart rack 2002C. Similarly, in some embodiments, a first end of the y dimension smart rack switch circuit 2006B may be connected to the smart rack power access point of the smart rack 2002B, and a second end of the y dimension smart rack switch circuit 2006B may be connected to the smart rack power access point of the smart rack 2002E. As such, the y dimension smart rack switch circuit 2006B may control the flow of electricity from the smart rack 2002B to the smart rack 2002D.

In some embodiments, the example smart rack 2002D comprises an x dimension smart rack switch circuit 2004D, similar to those described above. In some embodiments, a first end of the x dimension smart rack switch circuit 2004D may be connected to the smart rack power access point of the smart rack 2002D, and a second end of the x dimension smart rack switch circuit 2004D may be connected to the smart rack power access point of the smart rack 2002E. As such, the x dimension smart rack switch circuit 2004D may control the flow of electricity from the smart rack 2002D to the smart rack 2002E.

In some embodiments, the example smart matrix 2000 may receive, via a processing circuitry, movement instructions that require the smart rack 2002E to be activated. In some embodiments, the example smart matrix 2000 may determine, via a processing circuitry, one or more power paths that allow the power from the power source connected to the smart rack power access point 2008 to be conveyed to the smart rack 2002E. For example, the smart matrix 2000 may selectively enable one or more x dimension smart rack switch circuits and one or more y dimension smart rack switch circuits of the smart racks to enable power supply to the smart rack 2002E.

For example, the example smart matrix 2000 may first determine, via a processing circuitry, the rack coordination set associated with the smart rack that needs power. In the example shown in FIG. 20, the smart rack that needs power is smart rack 2002E, and the rack coordination set associated with the smart rack 2002E is (1, 1).

In some embodiments, the example smart matrix 2000 may transmit, via a processing circuitry, a power management instruction to a smart rack that is connected to the power source, and request that the smart rack enable one of the dimension smart rack switch circuits in one of the dimensions. In some embodiments, the example smart matrix 2000 may transmit the power management instruction to the processing circuitry of the smart rack. For example, the power management instruction may comprise a smart rack identifier that identifies a smart rack of which one or more dimension smart rack switch circuits need to be turned on/off. The power management instruction may further comprise an operation indication that determines whether to turn the corresponding dimension smart rack switch circuit on or off.

In the example shown in FIG. 20, the smart rack that is connected to the power source is smart rack 2002A with rack coordination set (0, 0), and the example smart matrix 2000 may request the smart rack 2002A to enable the x dimension smart rack switch circuit 2004A, allowing power to be provided to the smart rack power access point of the smart rack 2002B with the rack coordination set (1, 0).

In some embodiments, subsequent to enabling a dimension smart rack switch circuit of a smart rack in one dimension and providing power to a peer smart rack in that dimension, the example smart matrix 2000 determine whether the coordinate in that dimension of the peer smart rack is the same as the coordinate in that dimension of the smart rack that requires power.

In some embodiments, subsequent to enabling the x dimension smart rack switch circuit and providing power to a peer smart rack in one dimension (for example, the x dimension), the example smart matrix 2000 may determine whether of the coordinate in x dimension of the powered peer smart rack is the same as the coordinate in x dimension of the smart rack that requires power.

If not, the example smart matrix 2000 may transmit power management instructions to the powered peer smart rack and cause the powered peer smart rack to enable its x dimension smart rack switch circuit to its peer smart rack in the x dimension. This process may be continued until the coordinate in the x dimension of the powered peer smart rack is the same as the coordinate in the x dimension of the smart rack that requires power.

Continuing from the example above, subsequent to powering the smart rack 2002B, the example smart matrix 2000 may determine that the coordinate in the x dimension of the smart rack 2002B is the same as the coordinate in the x dimension of the smart rack that needs power (i.e. the smart rack 2002E).

If the coordinates in the x dimension are the same, the example smart matrix 2000 may determine whether the coordinate in the y dimension of the powered smart rack and the coordinate in the y dimension of the smart rack that needs power are the same. If not, the example smart matrix 2000 may transmit power management instructions to the powered peer smart rack and cause the powered peer smart rack to enable its y dimension smart rack switch circuit to its peer smart rack in the y dimension. This process may be continued until the coordinate in the y dimension of the powered peer smart rack is the same as the coordinate in the y dimension of the smart rack that requires power.

Continuing from the example above, subsequent to powering the smart rack 2002B, the example smart matrix 2000 may determine that the coordinate in the y dimension of the smart rack 2002B is not the same as the coordinate in the y dimension of the smart rack that needs power (i.e. the smart rack 2002E). The example smart matrix 2000 may enable the y dimension smart rack switch circuit of the example smart rack 2002B, and thereby providing power to the smart rack 2002E that needs power.

As such, the example smart matrix 2000 may define an example power path for providing electricity to the smart rack 2002E by: (1) enabling the x dimension smart rack switch circuit 2004A of the smart rack 2002A, which is connected to the smart rack 2002B and allows power to flow from the smart rack 2002A to the smart rack 2002B, and (2) enable the y dimension smart rack switch circuit 2006B of the smart rack 2002B, which is connected to the smart rack 2002E and allows power to flow from the smart rack 2002B. As such, power may flow from the power source that is connected to the smart rack power access point 2008 to the smart rack 2002E through a power path that includes the x dimension smart rack switch circuit 2004A of the smart rack 2002A and the y dimension smart rack switch circuit 2006B of the smart rack 2002B.

While the description above provides an example of a power path, it is noted that the scope of the present disclosure is not limited to the description above. In some examples, an example smart matrix 2000 may define an alternative power path for providing power to the smart rack 2002E. For example, the example smart matrix 2000 may define an example power path for providing electricity to the smart rack 2002E by: (1) enabling the y dimension smart rack switch circuit 2006A of the smart rack 2002A, which is connected to the smart rack 2002D and allows power to flow from the smart rack 2002A to the smart rack 2002D, and (2) enable the x dimension smart rack switch circuit 2004D of the smart rack 2002D, which is connected to the smart rack 2002E and allows power to flow from the smart rack 2002D. As such, power may flow from the power source that is connected to the smart rack power access point 2008 to the smart rack 2002E through a power path that includes the y dimension smart rack switch circuit 2006A of the smart rack 2002A and the x dimension smart rack switch circuit 2004D of the smart rack 2002D.

Figure 21A:
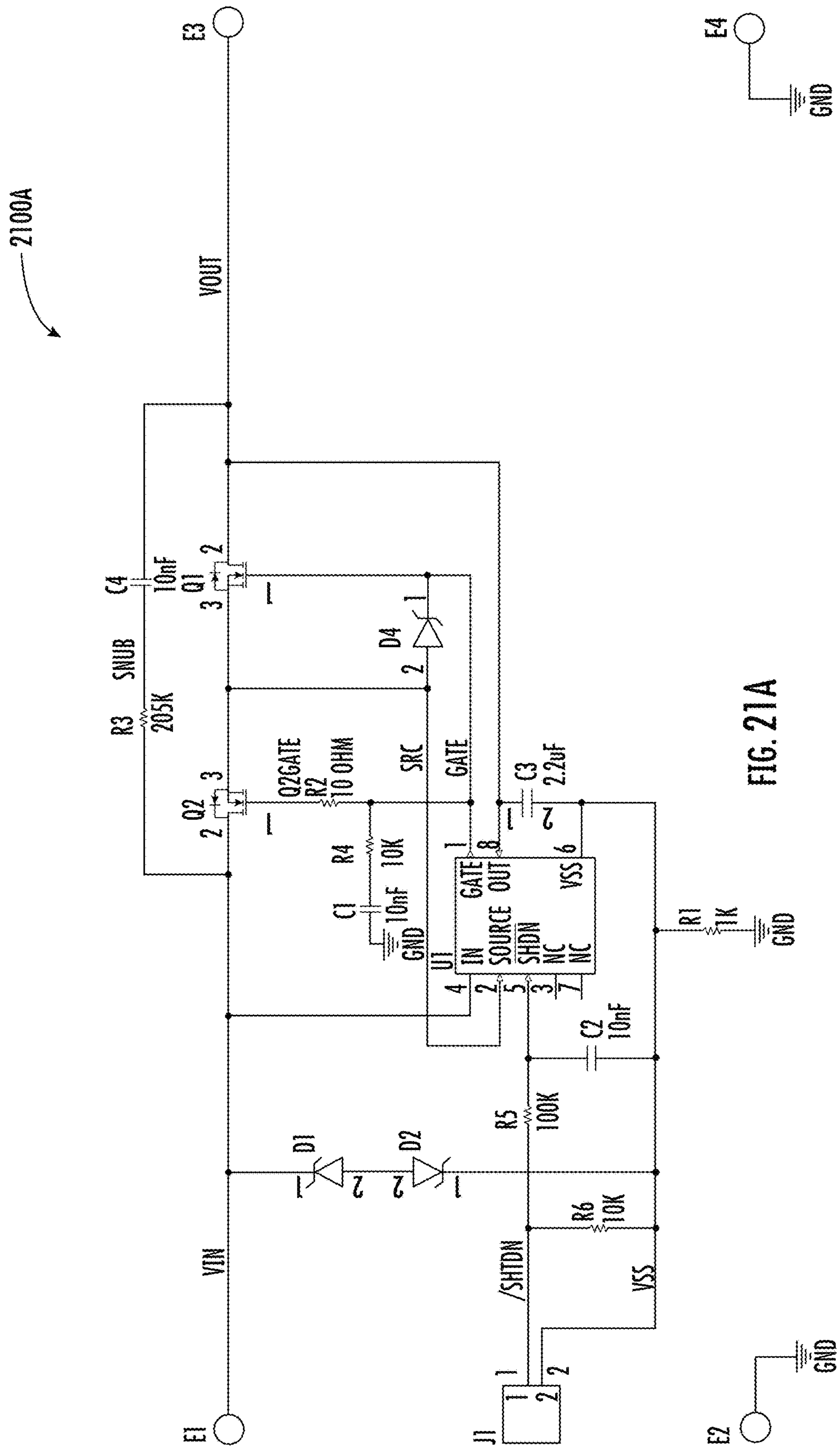
FIG. 21A is an example circuit diagram illustrating an example smart rack switch circuit of an example smart rack in accordance with some embodiments of the present disclosure.

Referring now to FIG. 21A, an example circuit diagram of an example smart rack switch circuit 2100A is illustrated.

In the example shown in FIG. 21A, the example smart rack switch circuit 2100A provides a control switch/relay mechanism that controls the flow of power between the input point E1 and the output point E3.

In some embodiments, the input point E1 may correspond to the first end of the smart rack switch circuit described above. For example, the input point E1 may be a smart rack power access point that is connected to a power source. As another example, the input point E1 may be a smart rack power access point that is connected to another smart rack switch circuit (for example, the input point E1 may be connected to an output point E3' of another smart rack switch circuit).

In some embodiments, the output point E3 may correspond to the second end of the smart rack switch circuit described above. For example, the output point E3 may be connected to a smart rack power access point of another smart rack (for example, the output point E3 may be connected to the input point E1' of another smart rack switch circuit).

In the example shown in FIG. 21A, the example circuit diagram comprises a power management chip U1 (such as, but not limited to, LTC4359). In particular, the power management chip U1 may comprise an input pin U1-4 and an output pin U1-8. In some embodiments, the U1-4 input pin is used to sense the supply power, and the voltage sensed at the output pin U1-8 is used to control the MOSFET gate. In some embodiments, the power-transistor Q2 controls the flow of power between the input point E1 and the output point E3. Power between the input point E1 and the output point E3 does not flow through U1, as the U1 senses the input and output voltages at pins 4 and 8 and controls the power-transistor Q2 to turn it on and/or off. For example, the power management chip U1 may cause the power-transistor Q2 to connect and/or disconnect the power between the input point E1 and the output point E3 based on control inputs received by the power management chip U1.

For example, the control input may be provided through the connector J1. As described above, the smart matrix may transmit the power management instruction to the processing circuitry of the smart rack, and the processing circuitry may transmit switch command through the connector J1 as control input. In the example shown in FIG. 21A, the connector J1 is connected to the shutdown control input pin 5. For example, the connector J1 may receive power management instructions from a processing circuitry. If the power management instruction indicates that the smart rack switch circuit should be turned off, the connector J1 transmits a signal to the power management chip U1, and the power management chip U1 causes the power-transistor Q1 and/or the power-transistor Q2 to disconnect the output point E3 from the input point E1. If the power management instruction indicates that the smart rack switch circuit should be turned on, the connector J1 transmits a signal to the power management chip U1, and the power management chip U1 causes the power-transistor Q1 and/or the power-transistor Q2 to connect the output point E3 to the input point E1.

In other words, the power management chip U1 enables/disables the power-transistor Q1 and/or the power-transistor Q2, which in turn enables/disables the output power at E3. Pins 1 and 8 of the power management chip U1 monitor the input and output voltages. The power-transistor Q1 performs an ideal diode function, while the power-transistor Q2 acts as a switch to control forward power flow.

In some embodiments, the example smart rack switch circuit 2100A shown in FIG. 21A may provide various protection mechanisms. For example, the example smart rack switch circuit 2100A shown in FIG. 21A may allow multiple outputs of supplies to be tied together with selectable feeds, which may resolve the cube interconnect issue, and provide load switching, reverse input protection, and input short circuit protection.

For example, the power management chip U1 may comprise a pin 8 that may receive feedback voltage from the output point E3 to validate that the smart rack switch circuit is operating correctly. The body diodes of the power-transistor Q1 and the power-transistor Q2 prevent any current flow when the MOSFETS are off. The power-transistor Q1 serves as an ideal diode while the power-transistor Q2 acts as a switch to control power flow. The RC circuit that is comprised of C1 and R4 provides inrush control if needed. The transient voltage diodes (otherwise known as "transZorbs or TVS" diodes) D1 and D2 provide protection to the switch controller whenever the input voltage at E1 and E2 are swapped and/or short-circuited. The Zener diode provides a 12 reference voltage. For input voltages 24V and greater, D4 is needed to protect the MOSFET's gate oxide during input short circuit conditions.

Figure 21B:
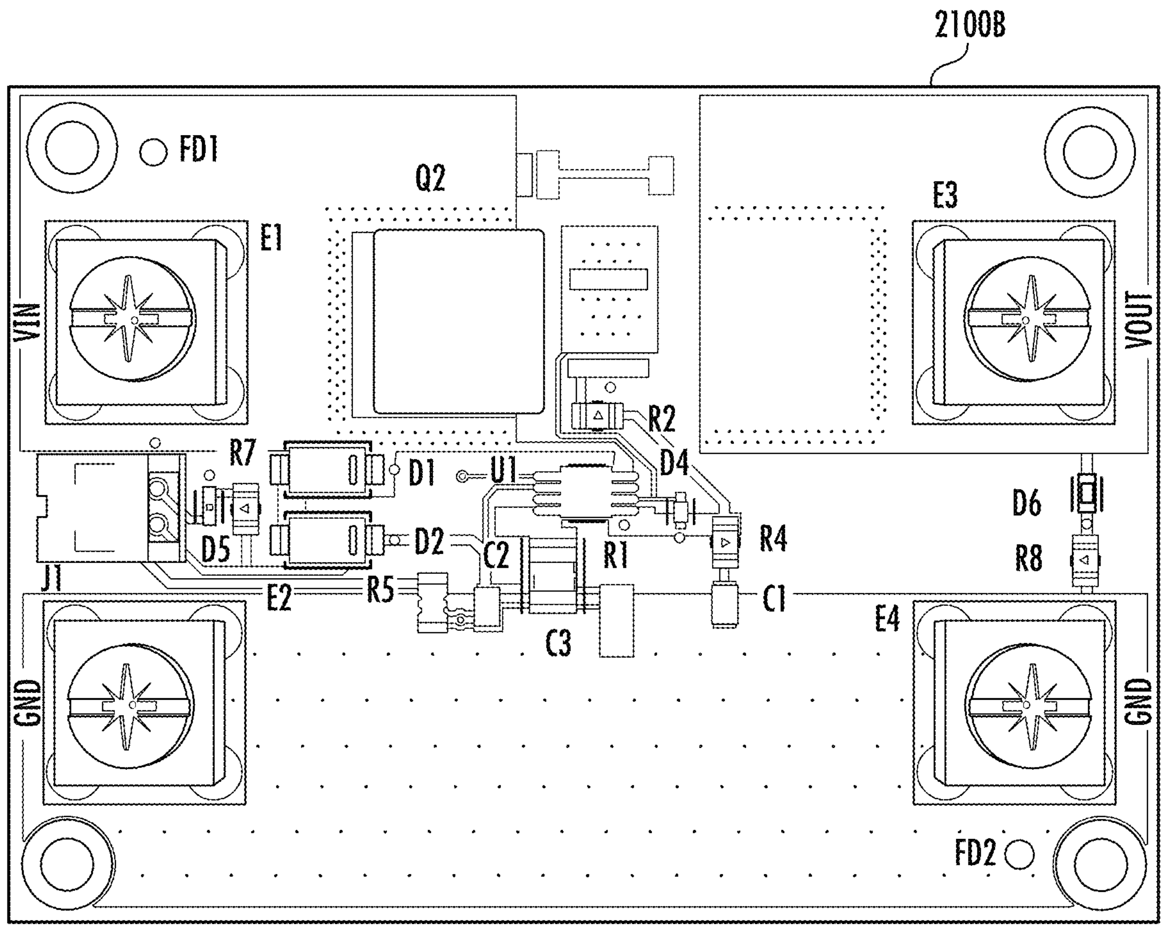
FIG. 21B is an example design diagram illustrating an example power board in accordance with some embodiments of the present disclosure.

FIG. 21B is an example design diagram illustrating an example power board 2100B in accordance with various embodiments of the present disclosure.

In some embodiments, the example power board 2100B illustrates an input point E1 and output point E3, similar to those described above. In some embodiments, the example power board 2100B may comprise a smart rack switch circuit that controls the flow of electricity from the input point E1 to the output point E3. For example, the smart rack switch circuit may include a power management chip U1, similar to those described above. As such, the example shown in FIG. 21B illustrates that there may be one power switch per board.

In some embodiments, the power board 2100B may implement a 2-layer board design that has a 1.6 mm thickness.

Figure 22:
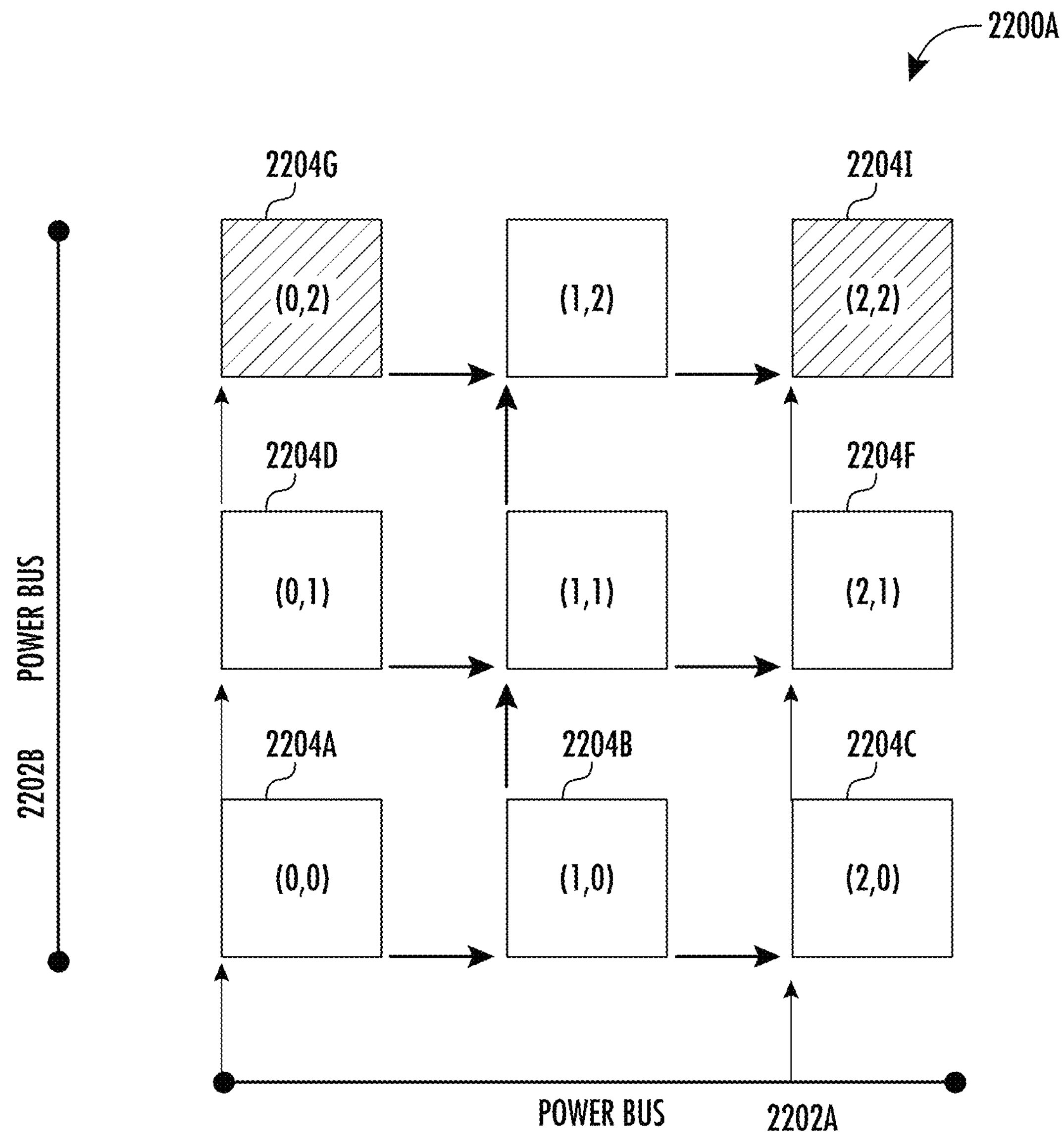
FIG. 22 is an example diagram illustrating an example smart matrix with power buses that provide power paths to various smart racks in a modular superstructure in accordance with some embodiments of the present disclosure.

Referring now to FIG. 22, an example diagram illustrates a portion of an example smart matrix 2200A with power buses in accordance with some embodiments of the present disclosure.

In accordance with various embodiments of the present disclosure, an example smart matrix may utilize one or more power buses to dynamically define one or more power paths and provide power to one or more smart racks in the modular superstructure. For example, the modular superstructure may comprise one power bus for each of the dimensions in the modular superstructure.

For example, if the modular superstructure is a three-dimensional structure, the modular superstructure may comprise an x dimension power bus that is connected to one or more smart racks along the x axis (where each smart rack may have the same coordinates on the y dimension and the z dimension, but different coordinates on the x dimension), a y dimension power bus that is connected to one or more smart racks along the y axis (where each smart rack may have the same coordinates on the x dimension and the z dimension, but different coordinates on the y dimension), and a z dimension power bus that is connected to one or more smart racks along the z axis (where each smart rack may have the same coordinates on the x dimension and the y dimension, but different coordinates on the z dimension).

As another example, if the modular superstructure is a two-dimensional structure, the modular superstructure may comprise an x dimension power bus that is connected to one or more smart racks along the x axis, and a y dimension power bus that is connected to one or more smart racks along the y axis.

The example shown in FIG. 22 illustrates two example power buses, including a power bus 2202A and a power bus 2202B. In some embodiments, the power bus 2202A may be a x dimension power bus, and the power bus 2202B may be a y dimension power bus.

For example, the power bus 2202A may be connected to one or more smart racks that are along the x dimension axis. For example, the one or more smart racks are associated with the same coordinate on the y dimension. In the example shown in FIG. 22, the smart rack 2204A is associated with the rack coordination set (0, 0), the smart rack 2204B is associated with the rack coordination set (1, 0), and the smart rack 2204C is associated with the (2, 0). In this example, the smart rack 2204A, the smart rack 2204B, and the smart rack 2204C are all associated with the same coordinate on the y dimension ("0"), and the power bus 2202A may be connected to each of the smart rack 2204A, the smart rack 2204B, and the smart rack 2204C. For example, the power bus 2202A may be connected to each smart rack power access point of each of the smart rack 2204A, the smart rack 2204B, and the smart rack 2204C. In some embodiments, when the power bus 2202A receives power, each of the smart rack 2204A, the smart rack 2204B, and the smart rack 2204C receives power as well.

Additionally, or alternatively, the power bus 2202B may be connected to one or more smart racks along the y dimension axis. For example, the one or more smart racks are associated with the same coordinate on the x dimension. In the example shown in FIG. 22, the smart rack 2204A is associated with the rack coordination set (0, 0), the smart rack 2204D is associated with the rack coordination set (0, 1), and the smart rack 2204G is associated with the (0, 2). In this example, the smart rack 2204A, the smart rack 2204D, and the smart rack 2204G are all associated with the same coordinate on the x axis, and the power bus 2202B may be connected to each of the smart rack 2204A, the smart rack 2204D, and the smart rack 2204G. For example, the power bus 2202B may be connected to each smart rack power access point of each of the smart rack 2204A, the smart rack 2204D, and the smart rack 2204G. In some embodiments, when the power bus 2202B receives power, each of the smart rack 2204A, the smart rack 2204D, and the smart rack 2204G receives power as well.

In some embodiments, one end of each power bus may be connected to a power bus switch circuit. The power bus switch circuit may be connected directly or indirectly to a power source. As such, the power bus switch circuit may control the flow of power from the power source to the corresponding power bus (and to the one or more smart racks that are connected to the corresponding power bus).

For example, the x dimension power bus switch circuit may be connected between the power source and the x dimension power bus. In such an example, the x dimension power bus switch circuit may control the flow of power from the power source to the x dimension power bus.

As another example, the y dimension power bus switch circuit may be connected between the power source and the y dimension power bus. In such an example, the y dimension power bus switch circuit may control the flow of power from the power source to the y dimension power bus.

As another example, the z dimension power bus switch circuit may be connected between the power source and the z dimension power bus. In such an example, the z dimension power bus switch circuit may control the flow of power from the power source to the z dimension power bus.

In some embodiments, each of the smart racks also comprises one or more smart rack switch circuits. For example, each of the smart racks may comprise an x dimension smart rack switch circuit, a y dimension smart rack switch circuit, and/or a z dimension smart rack switch circuit, similar to those described above.

In some embodiments, the example smart matrix with power buses may receive movement instructions that require one or more smart racks to be powered/to receive electricity, and may dynamically determine one or more power paths for the one or more smart racks. In the example shown in FIG. 22, the example smart matrix 2200A may receive, via a processing circuitry, movement instructions that require the smart rack 2204I to be activated/powered. In some embodiments, the example smart matrix 2200A may determine, via a processing circuitry, one or more power paths that provide power from the power source to the smart rack 2204I. For example, the smart matrix 2200A may selectively turn on one of the power bus switch circuits and one or more smart rack switch circuits.

For example, the example smart matrix 2200A may first determine, via a processing circuitry, the rack coordination set associated with the smart rack that needs power. In the example shown in FIG. 22, the smart rack that needs power is smart rack 2204I, and the rack coordination set associated with the smart rack 2204I is (2, 2).

In some embodiments, the example smart matrix 2200A may transmit, via a processing circuitry, a power management instruction to turn on one of the power bus switch circuits that is connected to one of the power buses along one of the axes/in one of the dimensions. For example, the example smart matrix 2200A may turn on the x dimension power bus switch circuit.

In this example, when the x dimension power bus switch circuit is turned on, power may be provided to the power bus 2202A (e.g. an x dimension power bus). As described above, the power bus 2202A is connected to one or more smart racks along the x axis. As such, power may be provided to the smart rack 2204A, the smart rack 2204B, and the smart rack 2204C.

In some embodiments, subsequent to turning on the power bus switch circuit that is in a particular dimension, the example smart matrix 2200A may select, via a processing circuitry, a smart rack that is connected to the power bus and has the same coordinate in the that particular dimension as that of the smart rack that requires power.

For example, in the example shown in FIG. 22, the example smart matrix 2200A may select, via a processing circuitry, the smart rack 2204C. In this example, the smart rack 2204C is associated with the coordinate “2” in the x dimension, and the smart rack 2204I is associated with the coordinate “2” in the x dimension as well. As such, the smart rack 2204C has the same coordinate in the x dimension as the smart rack 2204I.

In some embodiments, subsequent to selecting the smart rack, the example smart matrix 2200A may determine, via a processing circuitry, whether the selected smart rack has the same coordinate in another dimension as the smart rack that requires power. If not, the example smart matrix 2200A may cause the power smart rack to turn on the smart rack switch circuit in the other dimension.

For example, in the example shown in FIG. 22, the example smart matrix 2200A may determine, via a processing circuitry, whether the smart rack 2204C has the same coordinate in the y dimension as the smart rack 2204I. In this example, the smart rack 2204C is associated with the coordinate “0” in the y dimension, and the smart rack 2204I is associated with the coordinate “2” in the y dimension. As such, the example smart matrix 2200A may determine that the smart rack 2204C is not associated with the same coordinate in the y dimension as that of the smart rack 2204I, and may turn on the y dimension power bus switch circuit of the smart rack 2204I so as to provide power to the smart rack 2204F.

In some embodiments, the above process may be repeated until the coordinate in the y dimension of a powered smart rack is the same as the coordinate in the y dimension of the smart rack that requires power. For example, the processing circuitry may determine that the smart rack 2204F is not associated with the same coordinate in the y dimension as that of the smart rack 2204I, and may turn on the y dimension power bus switch circuit of the smart rack 2204F so as to provide power to the smart rack 2204I.

As such, the description above illustrates an example dynamic power path that provides power to the smart rack 2204I by turning on the x dimension power bus switch circuit and the y dimension smart rack switch circuits of the smart rack 2204C and the smart rack 2204F. In this example, the example smart matrix 2200A may define a power path from the power source, via the power bus 2202A, the smart rack 2204C, the smart rack 2204F, and to the smart rack 2204I.

While the description above provides an example of a power path, it is noted that the scope of the present disclosure is not limited to the description above. In some examples, an example power path may be dynamically determined through other mechanisms.

As such, various embodiments of the present provide mechanisms that can dynamically define an on-demand power path. For example, the on-demand power path may be established during a period when a smart rack is to actuate its motors to move a rectangular prism and is disabled when the move is complete. Advantageously, in some examples, such an on demand power path may reduce overall power usage and may allow for a larger modular superstructure.

Figure 23:
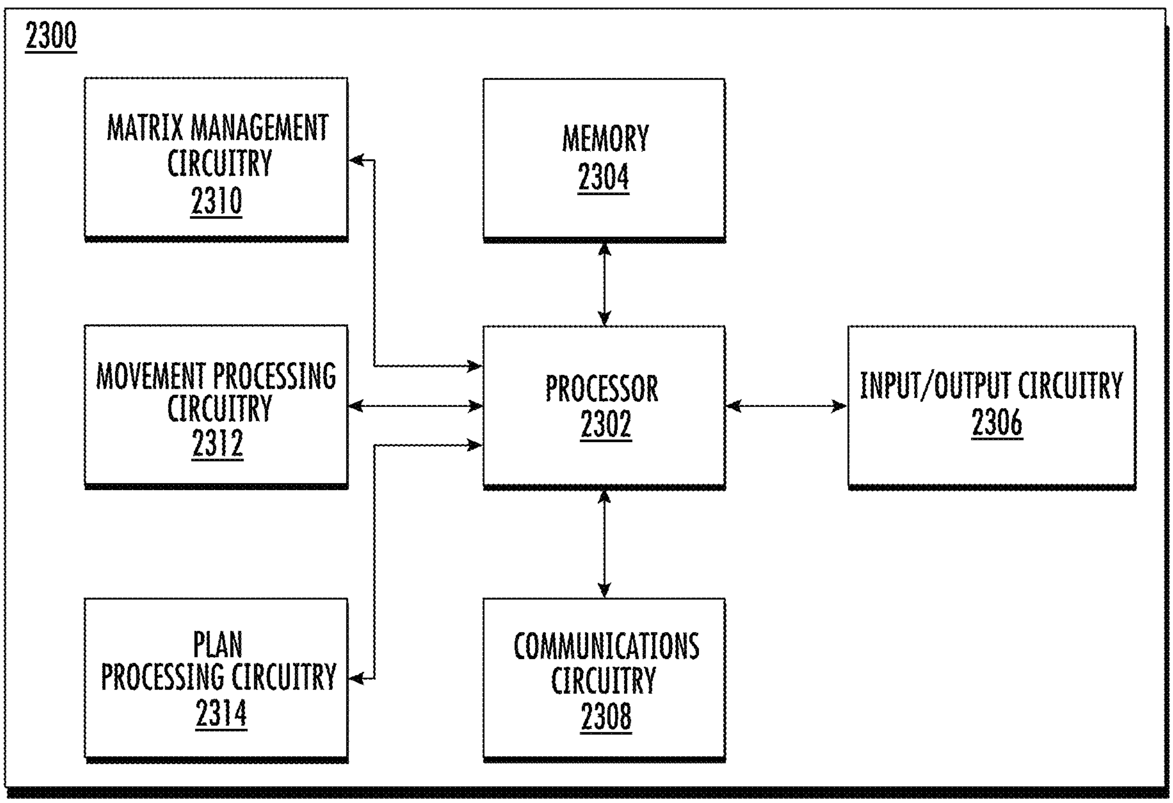
FIG. 23 illustrates a block diagram of an example superstructure control apparatus in accordance with at least some example embodiments of the present disclosure.

FIG. 23 illustrates a block diagram of an example superstructure control apparatus in accordance with at least some example embodiments of the present disclosure. In some embodiments, the superstructure control apparatus embodies one or more computing device(s) and/or system(s) that control operations of a modular superstructure (e.g., embodied in physical smart racks or an emulated modular superstructure). FIG. 23 depicts an example superstructure control apparatus 2300 (also referred to as a “superstructure controller”), as further described herein. The superstructure control apparatus 2300 includes a processor 2302, a memory 2304, input/output circuitry 2306, communications circuitry 2308, matrix management circuitry 2310, movement processing circuitry 2312, and plan processing circuitry 2314. In some embodiments, the superstructure control apparatus 2300 is configured, using one or more of the sets of circuitry 2302, 2304, 2306, 2308, 2310, 2312, and/or 2314, to execute the operations described herein.

Although components are described with respect to functional limitations, it should be understood that the particular implementations necessarily include the user of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some input/output devices, and/or the like. Alternatively or additionally, in some embodiments, other elements of the superstructure control apparatus 2300 provide or supplement the functionality of other particular sets of circuitry. For example, the processor 2302 in some embodiments provides processing functionality to any of the sets of circuitry, the memory 2304 provides storage functionality to any of the sets of circuitry, the communications circuitry 2308 provides network interface functionality to any of the sets of circuitry, and/or the like.

In some embodiments, the processor 2302 (and/or co-processor or any other processing circuitry assisting or otherwise associated with the processor) is/are in communication with the memory 2304 via a bus for passing information among components of the superstructure control apparatus 2300. In some embodiments, for example, the memory 2304 is non-transitory and may include, for example, one or more volatile and/or non-volatile memories. In other words, for example, the memory 2304 in some embodiments includes or embodies an electronic storage device (e.g., a computer readable storage medium). In some embodiments, the memory 2304 is configured to store information, data, content, applications, instructions, or the like, for enabling the superstructure control apparatus 2300 to carry out various functions in accordance with example embodiments of the present disclosure.

The processor 2302 may be embodied in a number of different ways. For example, in some example embodiments, the processor 2302 includes one or more processing devices configured to perform independently. Additionally, or alternatively, in some embodiments, the processor 2302 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the superstructure control apparatus 2300, and/or one or more remote or "cloud" processor(s) external to the superstructure control apparatus 2300.

In an example embodiment, the processor 2302 is configured to execute instructions stored in the memory 2304 or otherwise accessible to the processor. Alternatively or additionally, the processor 2302 in some embodiments is configured to execute hard-coded functionality. As such, whether configured by hardware or software methods, or by a combination thereof, the processor 2302 represents an entity (e.g., physically embodied in circuitry) capable of performing operations according to an embodiment of the present disclosure while configured accordingly. Alternatively or additionally, as another example in some example embodiments, when the processor 2302 is embodied as an executor of software instructions, the instructions specifically configure the processor 2302 to perform the algorithms embodied in the specific operations described herein when such instructions are executed.

As one particular example embodiment, the processor 2302 is configured to perform various operations associated with representing, processing, and/or otherwise controlling a modular superstructure, for example as described herein. In some embodiments, the processor 2302 includes hardware, software, firmware, and/or a combination thereof, that receives configuration data (e.g., in the form of a configuration file or retrieved configuration data) representing a modular superstructure. Additionally, or alternatively, in some embodiments, the processor 2302 includes hardware, software, firmware, and/or a combination thereof, that initializes a smart rack matrix, for example including particular data (e.g., peer information, connections, states, behaviors, and/or the like) from configuration data. Additionally, or alternatively, in some embodiments, the processor 2302 includes hardware, software, firmware, and/or a combination thereof, that executes one or more movement algorithm(s), for example for processing tote queries via the modular superstructure with or without defined constraints. Additionally, or alternatively, in some embodiments, the processor 2302 includes hardware, software, firmware, and/or a combination thereof, that generates a movement plan, for example based on the results of the movement algorithm(s). Additionally, or alternatively, in some embodiments, the processor 2302 includes hardware, software, firmware, and/or a combination thereof, that outputs a movement plan, for example for execution via an emulated modular superstructure and/or an actual, physical modular superstructure in the real world.

In some embodiments, the superstructure control apparatus 2300 includes input/output circuitry 2306 that provides output to the user and, in some embodiments, to receive an indication of a user input. In some embodiments, the input/output circuitry 2306 is in communication with the processor 2302 to provide such functionality. The input/output circuitry 2306 may comprise one or more user interface(s) and in some embodiments includes a display that comprises the interface(s) rendered as a web user interface, an application user interface, a user device, a backend system, or the like. In some embodiments, the input/output circuitry 2306 also includes a keyboard, a mouse, a joystick, a touch screen, touch areas, soft keys a microphone, a speaker, a holographic display, an augmented reality display or system, a virtual reality display or system, at least one projector and/or screen display, or other input/output mechanisms. The processor 2302 and/or input/output circuitry 2306 comprising the processor may be configured to control one or more functions of one or more user interface elements through computer program instructions (e.g., software and/or firmware) stored on a memory accessible to the processor (e.g., memory 2304, and/or the like). In some embodiments, the input/output circuitry 2306 includes or utilizes a user-facing application to provide input/output functionality to a client device and/or other display associated with a user.

The communications circuitry 2308 includes any means such as a device or circuitry embodied in either hardware or a combination of hardware and software that is configured to receive and/or transmit data from/to a network and/or any other device, circuitry, or module in communication with the superstructure control apparatus 2300. In this regard, the communications circuitry 2308 includes, for example in some embodiments, a network interface for enabling communications with a wired or wireless communications network. Additionally, or alternatively in some embodiments, the communications circuitry 2308 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 2308 includes circuitry for interacting with the antenna(s) and/or other hardware or software to cause transmission of signals via the antenna(s) or to handle receipt of signals received via the antenna(s). In some embodiments, the communications circuitry 2308 enables transmission to and/or receipt of data from a client device in communication with the superstructure control apparatus 2300.

The matrix management circuitry 2310 includes hardware, software, firmware, and/or a combination thereof, that supports various functionality associated with smart rack matrix maintenance. For example, in some embodiments, the matrix management circuitry 2310 includes hardware, software, firmware, and/or a combination thereof, that accesses configuration data associated with configuration of a smart data matrix. Additionally, or alternatively, in some embodiments, the matrix management circuitry 2310 includes hardware, software, firmware, and/or a combination thereof, that generates a smart rack matrix embodied by data representing a modular superstructure, for example based on accessed configuration data. Additionally, or alternatively, in some embodiments, the matrix management circuitry 2310 includes hardware, software, firmware, and/or a combination thereof, that initializes one or more data portion(s) of a smart rack matrix (e.g., behaviors, states, allowable moves/actions for repositioning totes, clock management, and/or the like). Additionally, or alternatively, in some embodiments, the matrix management circuitry 2310 includes hardware, software, firmware, and/or a combination thereof, that stores and/or otherwise maintains the smart rack matrix for subsequent use, retrieval, transmission, and/or other processing. In some embodiments, the matrix management circuitry 2310 includes a separate processor, specially configured field programmable gate array (FPGA), or a specially programmed application specific integrated circuit (ASIC).

The movement processing circuitry 2312 includes hardware, software, firmware, and/or a combination thereof, that supports various functionality associated with processing a smart rack matrix to route movement via the corresponding modular superstructure. For example, in some embodiments, the movement processing circuitry 2312 includes hardware, software, firmware, and/or a combination thereof, that initiates one or more movement algorithm(s) that process a smart rack matrix. Additionally, or alternatively, in some embodiments, the movement processing circuitry 2312 includes hardware, software, firmware, and/or a combination thereof, that generates one or more tote movement path(s) by processing the smart rack matrix, for example utilizing one or more movement algorithm(s). Additionally, or alternatively, in some embodiments, the movement processing circuitry 2312 includes hardware, software, firmware, and/or a combination thereof, that minimizes or reduces a particular cost (e.g., a movement resistance value) associated with initiating one or more action(s) via a modular superstructure represented by a smart rack matrix. Additionally, or alternatively, in some embodiments, the movement processing circuitry 2312 includes hardware, software, firmware, and/or a combination thereof, that processes one or more tote query/queries via a smart rack matrix. Additionally, or alternatively, in some embodiments, the movement processing circuitry 2312 includes hardware, software, firmware, and/or a combination thereof, that defines egress and ingress points for any number of queried totes. In some embodiments, the movement processing circuitry 2312 includes a separate processor, specially configured field programmable gate array (FPGA), or a specially programmed application specific integrated circuit (ASIC).

The plan processing circuitry 2314 includes hardware, software, firmware, and/or a combination thereof, that supports various functionality associated with generating and/or outputting instructions associated with operation of a modular superstructure. The plan processing circuitry 2314 includes hardware, software, firmware, and/or a combination thereof, that supports functionality for assigning or otherwise executing operations, steps, and/or tasks to be executed by smart racks of a modular superstructure. For example, in some embodiments, the plan processing circuitry 2314 includes hardware, software, firmware, and/or a combination thereof, that generates a movement plan, for example based on data generated, identified, or otherwise produced via one or more movement algorithm(s). Additionally, or alternatively, in some embodiments, the plan processing circuitry 2314 includes hardware, software, firmware, and/or a combination thereof, that generates one or more data file(s), data command(s), transmission(s), and/or other data embodying instructions for operating one or more portion(s) of a modular superstructure represented by a smart rack matrix. Additionally, or alternatively, in some embodiments, the plan processing circuitry 2314 includes hardware, software, firmware, and/or a combination thereof, that outputs generated data, for example a movement plan, for processing, display, visualization, execution, and/or the like. In some embodiments, the plan processing circuitry 2314 includes a separate processor, specially configured field programmable gate array (FPGA), or a specially programmed application specific integrated circuit (ASIC).

Additionally, or alternatively, in some embodiments, one or more of the sets of circuitry 2302-2314 are combinable. Alternatively or additionally, in some embodiments, one or more of the sets of circuitry perform some or all of the functionality described associated with another component. For example, in some embodiments, one or more sets of circuitry 2302-2314 are combined into a single module embodied in hardware, software, firmware, and/or a combination thereof. Similarly, in some embodiments, one or more of the sets of circuitry, for example matrix management circuitry 2310, movement processing circuitry 2312, and/or plan processing circuitry 2314, is/are combined such that the processor 2302 performs one or more of the operations described above with respect to each of these circuitry individually.

Figure 24:
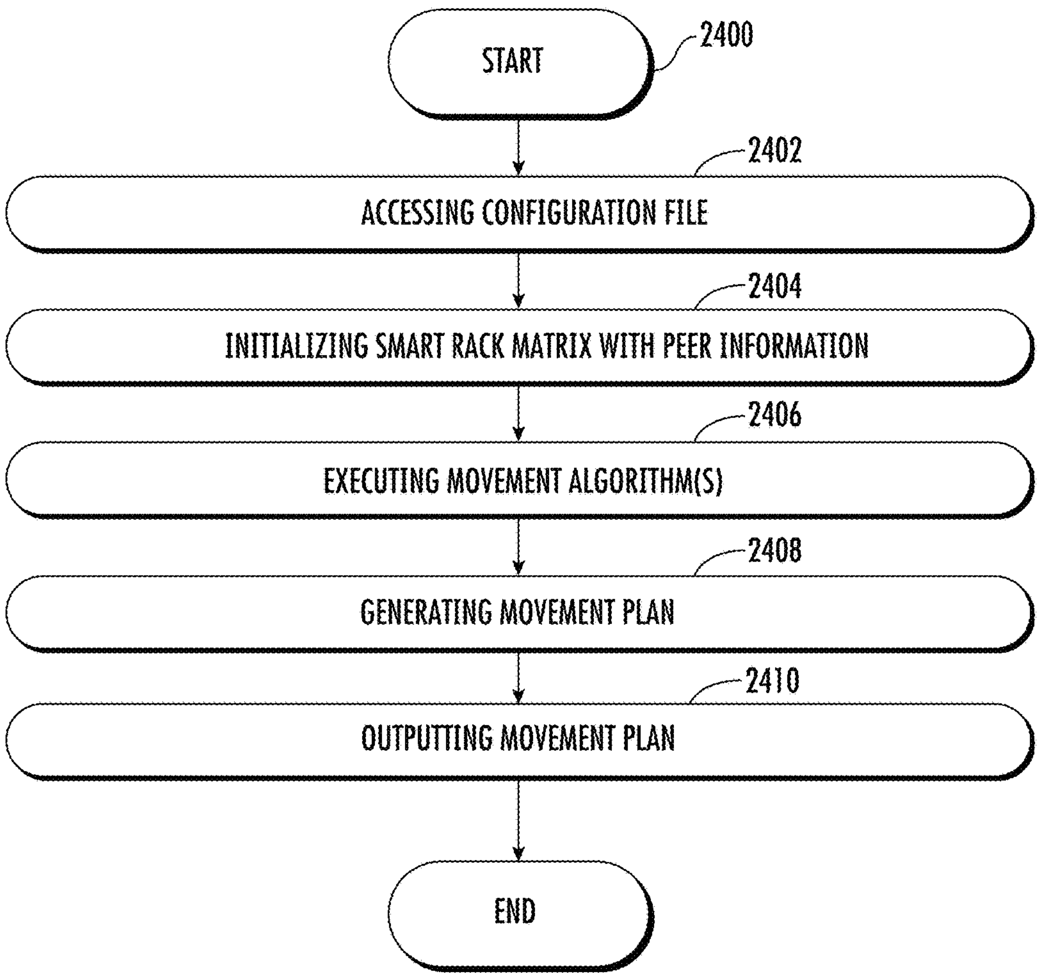
FIG. 24 illustrates a flowchart depicting operations of an example process for outputting a movement plan for a smart rack matrix in accordance with at least some example embodiments of the present disclosure.

FIG. 24 illustrates a flowchart depicting operations of an example process for outputting a movement plan for a smart rack matrix in accordance with at least some example embodiments of the present disclosure. Specifically, FIG. 24 depicts an example process 2400, for example for initializing and processing a smart rack matrix. The process 2400 is performable by any number of computing device(s) as described herein, for example embodiment in hardware, software, firmware, and/or any combination thereof. In some embodiments, the apparatus 2300 includes the various circuitry as means for performing each operation of the process 2400. At operation 2402, the process 2400 includes accessing a configuration file. In some embodiments, the configuration file embodies a smart matrix manifest and/or other file that represents at least the structure (e.g., a physical configuration and/or connections thereof) of smart racks within a modular superstructure. In some embodiments, the configuration file is received from a server, data repository, and/or the like. In some embodiments, the configuration file is stored locally by a particular computing device, system, data repository, and/or the like. It will be appreciated that, in some embodiments, a configuration file comprises or is defined by a plurality of sub-files that each include particular portions of the configuration of a modular superstructure.

At operation 2404, the process 2400 includes initializing a smart rack matrix with peer information. In some embodiments, the smart rack matrix is initialized as data that represents each smart rack in the modular superstructure, a physical design and/or configuration of the modular superstructure, and/or connection(s) between the smart rack(s) in the modular superstructure. For example, in some embodiments, the peer information indicates peer smart rack(s) associated with a particular smart rack (e.g., peer smart rack identifier) that may be subsequently used to quickly identify the data associated with a peer of a particular smart rack. Additionally, or alternatively, in some embodiments, the peer information includes movement resistance value(s) for moving to a particular peer, whether movement towards a particular peer is possible, whether movement from a particular peer is possible, and/or the like. In some embodiments, the smart rack matrix is initialized as a data graph matrix comprising a plurality of nodes and edges, as described herein.

At operation 2406, the process 2400 includes executing one or more movement algorithm(s). In some embodiments, the movement algorithm(s) determine data representing how a particular tote should move from its current position, representing a tote starting position, to a tote ending position. In some embodiments, the movement algorithm(s) generate in rack operation(s) to be performed to relocate one or more tote(s) via a modular superstructure, for example in accordance with one or more tote queries. In some embodiments, the movement algorithm(s) are performed to reduce or minimize a particular movement resistance value associated with moving the tote(s), for example time, power usage, computing resources, and/or the like. In some embodiments, the movement algorithm(s) are performed to satisfy delineated egress and ingress points, for example defined from input tote queries, user inputs, automatic determination(s), and/or the like. In some embodiments, the movement algorithm(s) include one or more brute force algorithm(s) and/or direct algorithm(s) as described herein with respect to FIGS. 25-28. In some embodiments, the movement algorithm(s) include one or more sliding A* algorithm(s) as described herein with respect to FIGS. 29-43.

At operation 2408, the process 2400 includes generating a movement plan. In some embodiments, the movement plan embodies a tote plan for relocating particular totes within the modular superstructure. The movement plan may include data utilized for operating one or more smart rack(s) according to data resulting from the movement algorithm(s) performed at an earlier operation, for example operation 2406. In some embodiments, the movement plan embodies a file, data stream, instruction set, or other structured data representation of the rack operation(s) to be performed. In one example context, the movement plan embodies a JSON file that includes JSON blocks for performing the tote operations embodying or associated with the movement data (e.g., tote movement path(s)) determined via the movement algorithm(s). In other embodiments, the movement plan embodies hardware-specific instructions for controlling one or more smart rack(s) directly. It will be appreciated that the movement plan may be generated in any of a myriad of desired data format(s).

At operation 2410, the process 2400 includes outputting the movement plan. In some embodiments, the movement plan is output for storing in one or more database(s), cache(s), instruction buffer(s), and/or the like for subsequent retrieval. In some embodiments, the movement plan is output as instructions for execution by smart rack(s) of a particular modular superstructure. In some embodiments, the movement plan is output as a file, transmission, or other data to an external system for executing, storing, and/or further processing. In some embodiments, the movement plan is output to a user interface, for example of a client device, a backend server, one or more user device(s), and/or the like. In some embodiments, the movement plan is output as instructions for executing by an emulation system, for example where the emulation system is configured to emulate operation of a particular modular superstructure. In some embodiments, the apparatus 2300 causes the particular smart racks of the modular superstructure to operate according to the movement plan (e.g., an outputted tote plan). Alternatively or additionally, in some embodiments, the apparatus 2300 outputs the movement plan such that the subunits of the modular superstructure (e.g., the individual smart racks) may determine when and/or how to execute the instructions embodied in the movement plan.

Figure 25:
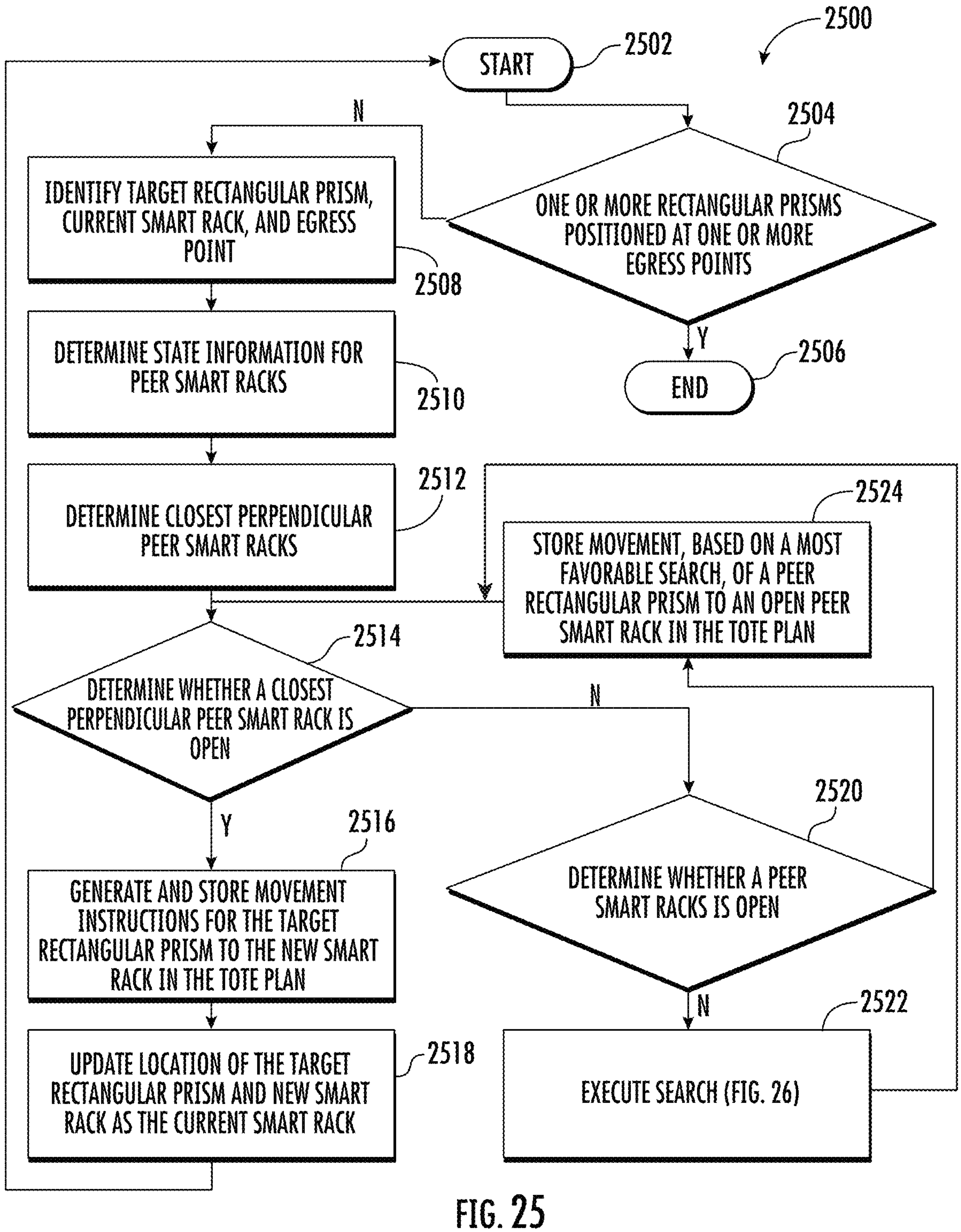
FIG. 25 illustrates a flowchart including operations for generating a tote plan in accordance with at least some example embodiments of the present disclosure.

FIG. 25 illustrates a flowchart including operations for generating a tote plan in accordance with at least some example embodiments of the present disclosure. Specifically, FIG. 25 illustrates operations of an example process 2500. In some embodiments, the example process 2500 is embodied by computer program code stored on a non-transitory computer-readable storage medium of a computer program product configured for execution to perform the process as depicted and described. Alternatively or additionally, in some embodiments, the process 2500 is performed by one or more specially configured computing devices, such as the superstructure controller 2300 alone or in communication with one or more other component(s), device(s), system(s), and/or the like. In this regard, in some such embodiments, the superstructure controller 2300 is specially configured by computer-coded instructions (e.g., computer program instructions) stored thereon, for example in the memory 2304 and/or another component depicted and/or described herein and/or otherwise accessible to the superstructure controller 2300, for performing the operations as depicted and described. In some embodiments, the superstructure controller 2300 is in communication with one or more external apparatus(es), system(s), device(s), and/or the like, to perform one or more of the operations as depicted and described. For example, the superstructure controller 2300 may be in communication with any number of real-time sensor(s), data stores, input/output streams, other computing device(s), and/or the like. For purposes of simplifying the description, the process 2500 is described as performed by and from the perspective of superstructure controller 2300.

The process 2500 begins at operation 2502. At decision block 2504, the superstructure controller 2300 includes means, such as the processor 2302, memory 2304, input/output circuitry 2306, communications circuitry 2308, and/or the like, or a combination thereof, to determine whether one or more target rectangular prisms are positioned at one or more egress points. As was described with respect to FIG. 24, one or more target rectangular prisms are identified along with one or more corresponding egress points. During operation of process 2500, and in other processes outlined herein, superstructure controller 2300 determines one or more movements that are designed to move the one or more target rectangular prisms so that they may reach and/or exit via one or more corresponding egress points. The one or more movements are stored in a tote plan.

If one or more identified movements have not yet moved the one or more target rectangular prisms to the one or more egress points, the process continues at operation 2508. If however, one or more identified movements in the movement plan have moved the one or more target rectangular prisms to the one or more egress points, the process ends at operation 2506 and the movement plan is returned in accordance with the operations outlined in FIG. 24.

At operation 2508, the superstructure controller 2300 includes means, such as the processor 2302, memory 2304, input/output circuitry 2306, communications circuitry 2308, and/or the like, or a combination thereof, to identify a target rectangular prism and a current smart rack. As described above, the superstructure controller 2300 determines, accesses, or otherwise inputs a target rectangular prism. In some examples, the superstructure controller 2300 determines the current smart rack that currently is holding or otherwise retaining the target rectangular prism. In some examples and as described elsewhere herein, the current smart rack may be identified based on a three dimensional coordinate system. In some examples, the superstructure controller 2300 determines, accesses, or otherwise inputs an egress point. As is described herein, the tote plan is configured to provide a series of movements that moves, urges, or otherwise directs the target rectangular prism to the egress point.

At operation 2510, the superstructure controller 2300 includes means, such as the processor 2302, memory 2304, input/output circuitry 2306, communications circuitry 2308, and/or the like, or a combination thereof, to determine state information for peer smart racks. In some examples, state information may include an indication as to whether a smart rack is open, occupied with a rectangular prism, is blocked, or is otherwise unavailable. In some examples, a smart rack may be blocked based on a malfunction. In other examples, a smart rack may be marked as blocked because it is being used or is being otherwise held open based on another operation in the tote plan. Alternatively or additionally, a flag may be set that marks a smart rack as blocked because it is being used by another process.

As is described above, peers are smart racks that are connected to, in communication with, or are otherwise affixed to the current smart rack. In some examples, a peer may be a perpendicular peer if a rectangular prism in the current smart rack can be directly transferred to it (e.g., a smart rack that is to the left, right, front, back, above, or below the current smart rack). That is, upon actuation of the motors and arms on the current smart rack, a rectangular prism can be transferred from the current smart rack to a perpendicular peer smart rack without any other moves in between. In some examples, the peers and the perpendicular peers are identified by three coordinates.

In order to determine state information, the superstructure controller 2300 accesses the smart rack matrix, the current tote plan, and/or the like. For example, the superstructure controller 2300 may access the smart rack matrix and then update it based on the current tote plan to determine whether a smart rack, to include a peer smart rack can be marked as occupied, blocked, or otherwise unavailable.

At operation 2512, the superstructure controller 2300 includes means, such as the processor 2302, memory 2304, input/output circuitry 2306, communications circuitry 2308, and/or the like, or a combination thereof, to determine closest perpendicular peer smart racks. In some examples, and based on the peers, and their respective states, identified at operation 2510, the superstructure controller 2300, including means such as the processor 2302, memory 2304, input/output circuitry 2306, communications circuitry 2308, and/or the like, or a combination thereof is configured to measure, such as by straight line distance, radial distance, number of moves, mathematical operation or the like, the distance from each perpendicular peer smart rack to the egress point. In some examples, the closest perpendicular peer smart racks (e.g., closest with respect to the egress point and/or in the direction of the egress point) are identified. In other examples two, or preferably three, closest perpendicular peer smart racks are identified.

At decision block 2504, the superstructure controller 2300 includes means, such as the processor 2302, memory 2304, input/output circuitry 2306, communications circuitry 2308, and/or the like, or a combination thereof, to determine whether a closest perpendicular peer smart rack is open. In some examples, a smart rack may have a state of open if a rectangular prism can be transferred to it. That is, if the smart rack is able to accept a rectangular prism, it is marked as open.

Figure 27A:
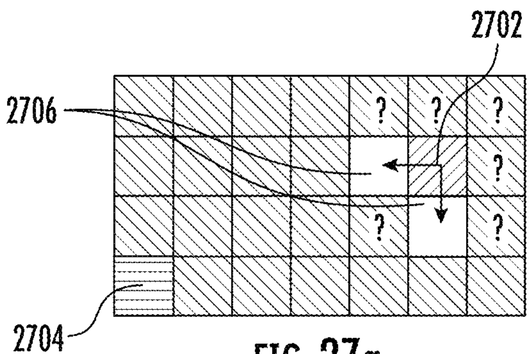
FIG. 27A, FIG. 27B, FIG. 27C, and FIG. 27D illustrate an example smart rack matrix with smart racks labeled according to their state information.

By way of example and as shown in FIG. 27*a*, a target rectangular prism may be positioned in smart rack 2702. Based on the aforementioned steps, the superstructure controller 2300 may have identified that perpendicular peer smart racks 2706 are the closest open smart racks to the egress point 2704. In such a case, and as described below, the target rectangular prism may be moved to one of perpendicular peer smart racks 2706.

Returning to FIG. 25, if the closest perpendicular peer smart rack is open, the target rectangular prism is moved to the open peer and then operations continue at operation 2516. If the closest perpendicular peer smart rack is not marked as open (e.g., it is marked as occupied, blocked or otherwise unavailable), then operations continue at decision block 2520.

At operation 2516, the superstructure controller 2300 includes means, such as the processor 2302, memory 2304, input/output circuitry 2306, communications circuitry 2308, and/or the like, or a combination thereof, to generate movement instructions for the target rectangular prism to the new smart rack and store the movement instructions in the tote plan. In some examples and once a closest perpendicular peer smart rack is determined to be open, the target rectangular prism is moved In some examples, the target rectangular prism is not yet actually moved in the superstructure but is instead moved virtually as a result of a movement being made in the tote plan. That is, the instructed movement is written in the tote plan. As a result, and in some examples, the move of the target rectangular prism to the closest perpendicular peer smart rack is stored in the tote plan.

At operation 2518, the superstructure controller 2300 includes means, such as the processor 2302, memory 2304, input/output circuitry 2306, communications circuitry 2308, and/or the like, or a combination thereof, to update the location of the location of the target rectangular prism and the new smart rack (e.g., the closest peer that just received the target rectangular prism) is set as the current smart rack.

That is, the matrix is updated to include the moves that were made in this iteration. The process then restarts at operation 2502.

Figure 27B:
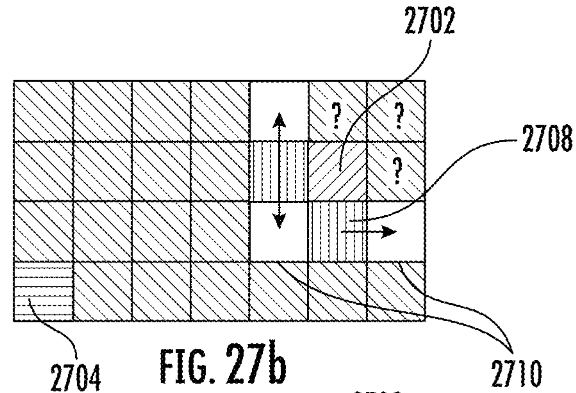

At decision block 2520, the superstructure controller 2300 includes means, such as the processor 2302, memory 2304, input/output circuitry 2306, communications circuitry 2308, and/or the like, or a combination thereof, to determine whether a peer smart rack is open. That is, the superstructure controller 2300, after determining that there is not a closest perpendicular peer smart rack that is open, searches (e.g., radially, concentrically at each distance of n, in a particular direction, such as in the direction of the egress point, or the like), based on the state information for peer smart racks, for an open peer smart rack. In some examples, the superstructure controller 2300 may search peers and/or any smart racks that are within a distance of n=1 from the current smart rack. In some examples, and as shown in FIGS. 27*b*-27*d*, an open peer may be in a diagonal direction (e.g., smart racks 2710, 2716) or in a perpendicular direction (even if not the closest in the perpendicular direction (e.g., smart rack 2712).

If a peer smart rack is determined to be open at decision block 2520, the process continues at operation 2524. If, however, a peer smart rack is determined to not be open at decision block 2520, then a search is executed for an open smart rack. Examples of the search are further described with respect to FIG. 26. After the search is executed and one or more rectangular prisms are moved, the process restarts after operation 2522 at decision block 2514.

At operation 2524 the superstructure controller 2300 includes means, such as the processor 2302, memory 2304, input/output circuitry 2306, communications circuitry 2308, and/or the like, or a combination thereof, to store movement, based on a most favorable search, of a peer rectangular prism to an open peer smart rack in the tote plan. In some examples, the superstructure controller 2300 is configured to cause a closest perpendicular peer smart rack to become open. In some examples, the superstructure controller 2300, and as shown in FIG. 27*b*, a closest peer smart rack (e.g., smart rack 2708) may cause a rectangular prism to move to an open peer (e.g., smart racks 2710) thereby creating an open closest perpendicular peer smart rack. In such an example, after the rectangular prism is moved to an open peer, the movements are stored and the process continues at decision block 2514.

Figure 27C:
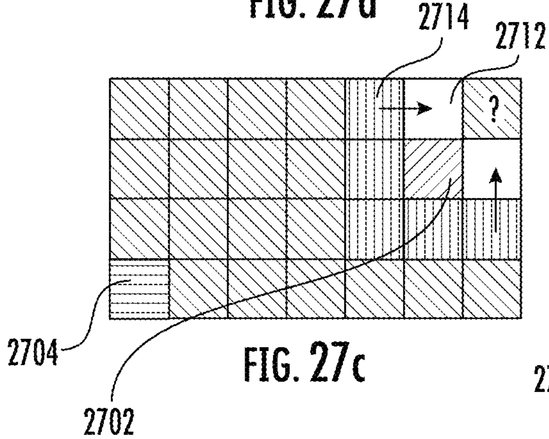
Figure 27D:
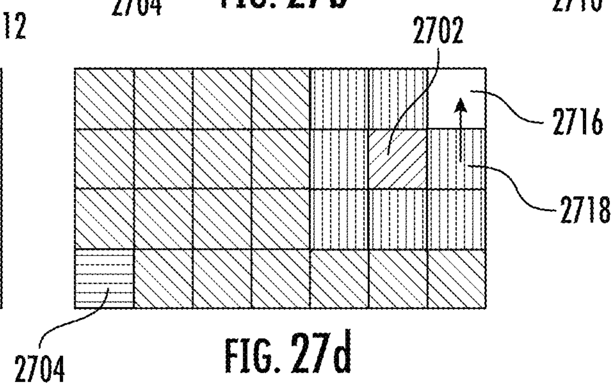

In other examples, such as the examples shown in FIG. 27*c* and FIG. 27*d*, multiple moves may be required to create an open closest perpendicular peer smart rack. In such examples, and at operation 2524, a move is made and the process continues at decision block 2514. For example and with respect to FIG. 27*c*, the superstructure controller 2300 causes a rectangular prism (e.g., rectangular prism 2714) to move to an open smart rack (e.g., smart rack 2712). After the move, a situation similar to FIG. 27*b* is created. As noted above, the process continues at decision block 2514 and iteratively moves rectangular prisms until an open closest perpendicular peer smart rack is obtained or otherwise created.

Similarly and with respect to FIG. 27*d*, at each iteration a rectangular prism (e.g., rectangular prism 2718) is moved to an open smart rack (e.g., smart rack 2716). As noted above, the process continues at decision block 2514 and iteratively moves rectangular prisms until an open closest perpendicular peer smart rack is obtained.

Figure 26:
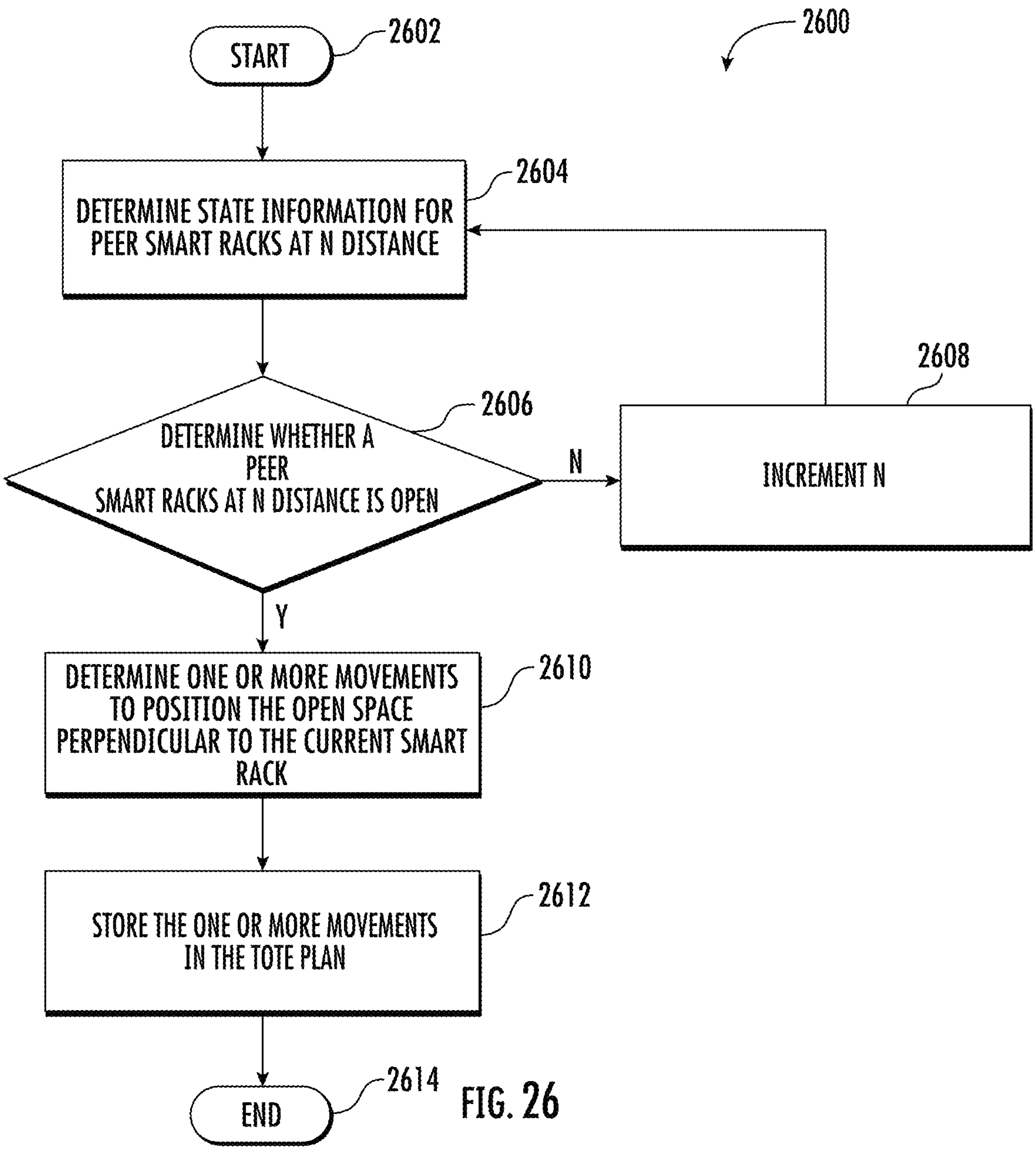
FIG. 26 illustrates a flowchart including operations for searching for an open smart rack within a certain distance of a target rectangular prism with at least some example embodiments of the present disclosure.

FIG. 26 illustrates a flowchart including operations for searching for an open smart rack within a certain distance of a target rectangular prism with at least some example embodiments of the present disclosure. Specifically, FIG. 26 illustrates operations of an example process 2600. In some embodiments, the example process 2600 is embodied by computer program code stored on a non-transitory computer-readable storage medium of a computer program product configured for execution to perform the process as depicted and described. Alternatively or additionally, in some embodiments, the process 2600 is performed by one or more specially configured computing devices, such as the superstructure controller 2300 alone or in communication with one or more other component(s), device(s), system(s), and/or the like. In this regard, in some such embodiments, the superstructure controller 2300 is specially configured by computer-coded instructions (e.g., computer program instructions) stored thereon, for example in the memory 2304 and/or another component depicted and/or described herein and/or otherwise accessible to the superstructure controller 2300, for performing the operations as depicted and described. In some embodiments, the superstructure controller 2300 is in communication with one or more external apparatus(es), system(s), device(s), and/or the like, to perform one or more of the operations as depicted and described. For example, the superstructure controller 2300 may be in communication with any number of real-time sensor(s), data stores, input/output streams, other computing device(s), and/or the like. For purposes of simplifying the description, the process 2600 is described as performed by and from the perspective of superstructure controller 2300.

The process 2500 begins at operation 2502. At operation 2604, the superstructure controller 2300 includes means, such as the processor 2302, memory 2304, input/output circuitry 2306, communications circuitry 2308, and/or the like, or a combination thereof, to determine state information for peer smart racks at n distance. In some examples, n=1 initially and the superstructure controller 2300, may determine state information for all smart racks within a distance of n=1 (e.g., a peer) of the current smart rack that is housing the target rectangular prism.

Figure 28A:
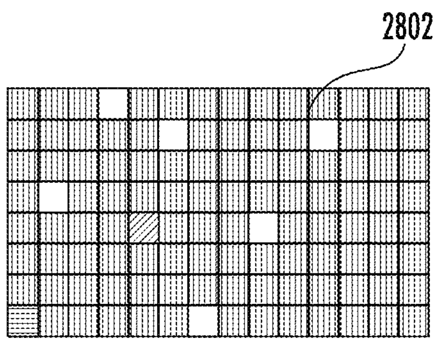
FIG. 28A, FIG. 28B, FIG. 28C, and FIG. 28D illustrate an example smart rack matrix with smart racks labeled according to their state information.
Figure 28B:
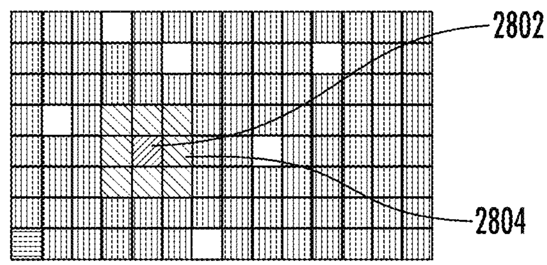

By way of example, if superstructure controller 2300 was analyzing the current smart rack having the target rectangular prism (e.g., current smart rack 2802 in FIG. 28*a*), the smart racks within a distance of n (e.g., FIG. 28*b* illustrating smart racks 2804 at a distance of n=1) would be checked to determine state information.

Figure 28C:
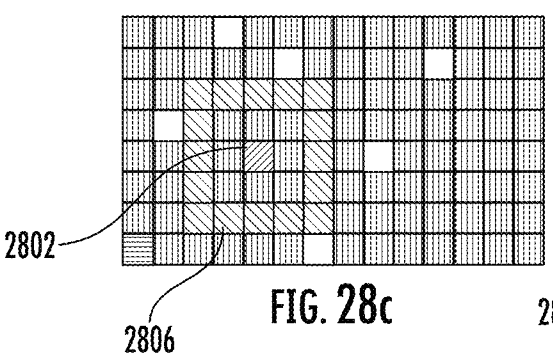
Figure 28D:
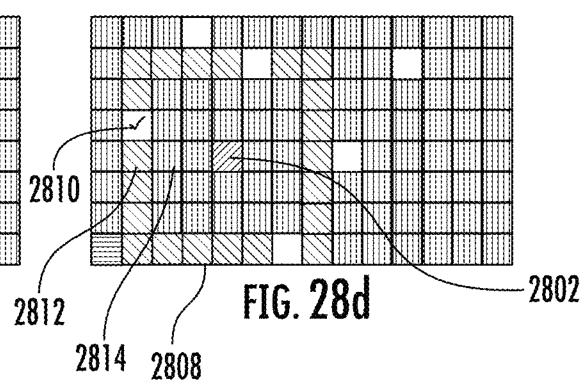

At decision block 2606, the superstructure controller 2300 includes means, such as the processor 2302, memory 2304, input/output circuitry 2306, communications circuitry 2308, and/or the like, or a combination thereof, to determine whether a peer smart rack at n distance is open. If at decision block 2606, it is determined that there is no any peer smart rack at n distance open (e.g., FIG. 28*b* illustrating no open smart racks 2804 at a distance of n=1 and FIG. 28*c* illustrating no open smart racks 2806 at a distance of n=2), then the process continues to operation 2608 where n is incremented before starting again at operation 2604. If at decision block 2606, it is determined that there is a peer smart rack at n distance open (e.g., FIG. 28*d* illustrating open smart rack 2810 at a distance of n=3), then the process continues to operation 2610.

At operation 2610, the superstructure controller 2300 includes means, such as the processor 2302, memory 2304, input/output circuitry 2306, communications circuitry 2308, and/or the like, or a combination thereof, to determine one or more movements to position the open space perpendicular to the current smart rack. In some examples, the superstructure controller 2300 is configured to create an open space at a closest perpendicular peer smart rack. As such, irrespective of the distance n the superstructure controller 2300 is configured to move rectangular prisms so as to create an open space at a closest perpendicular peer smart rack.

In some examples and to move rectangular prisms so as to create an open space at a closest perpendicular peer smart rack, superstructure controller 2300 selects a first direction along the coordinate system. In some examples, the first direction may be the x direction, the y direction, and/or the z direction. In some examples, superstructure controller 2300 may intermix directions, such as the x direction for a predetermined number of moves, the y direction for a predetermined number of moves, and/or the z direction for a predetermined number of moves.

Once a direction is selected (e.g., the y direction), the superstructure controller 2300 is configured to cause the open smart rack at distance n to become perpendicular to the current smart rack. For example, and as shown in FIG. 28*d*, the rectangular prism in a smart rack (e.g., smart rack 2812) may be moved up (e.g., the y direction) to the open smart rack (e.g., smart rack 2810) so as to create an open smart rack perpendicular to the current smart rack. In some examples, the process may continue by causing the rectangular prism in a smart rack (e.g., smart rack 2814) to be moved left (e.g., the x direction) to the now open smart rack (e.g., smart rack 2812) so as to create an open smart rack perpendicular and closer to the current smart rack.

At operation 2612, the superstructure controller 2300 includes means, such as the processor 2302, memory 2304, input/output circuitry 2306, communications circuitry 2308, and/or the like, or a combination thereof, to the one or more movements are stored in the tote plan. The process returns to FIG. 25 at operation 2614.

Figure 29:
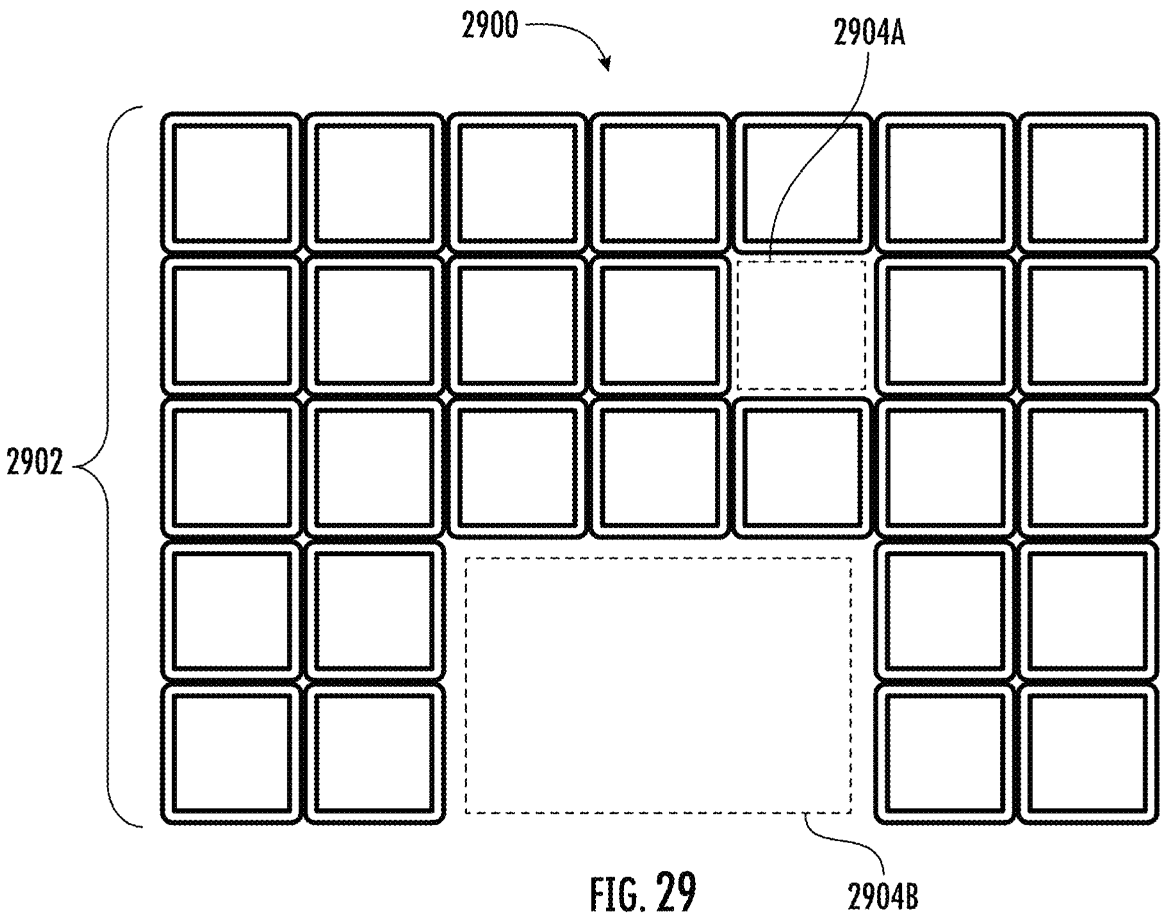
FIG. 29 illustrates an example modular superstructure for storing and moving totes in accordance with at least some example embodiments of the present disclosure.

FIG. 29 illustrates an example modular superstructure for storing and moving totes in accordance with at least some example embodiments of the present disclosure. Specifically, FIG. 29 depicts a modular superstructure 2900. The modular superstructure 2900 includes a plurality of smart racks 2902, wherein the smart racks are structured in a manner such that they are connected to one another. In this regard, each smart rack may pass, swap, slide, or otherwise relocate items (e.g., a tote) in any of a myriad of directions. For example, in some embodiments each smart rack is configured to manipulate an incoming tote from any of a number of cartesian directions (e.g., up, down, left, right, front, back), and to any of a number of cartesian directions. As depicted, each smart rack may be connected to one or more other smart racks on particular sides, such that a given smart rack may only receive a tote from certain directions and send out a tote in a particular direction.

In some embodiments, the modular superstructure is embodied as a perfect grid. For example, the modular superstructure may be embodied by a 5-wide by 5-long by 5-high grid of interconnected smart racks. However, in some embodiments, the modular superstructure includes one or more other elements that add complexity to the connections between the smart racks. For example, as illustrated, the modular superstructure 2900 includes two holes within the structure of the modular superstructure 2900. Such holes are defined by hole 2904A, which defines a hole equivalent to the width and length of one smart rack, and hole 2904B, which defines a hole equivalent to the size of smart racks three long and two wide.

It will be appreciated that the modular superstructure 2900 may be a particular example embodiment configuration of the modular superstructures described throughout. It should be appreciated however that other configurations of modular superstructures may be utilized in other embodiments. Accordingly, FIG. 29 is exemplary and not to limit the scope and spirit of this description.

The particular configuration of the modular superstructure 2900 may be represented in any of a myriad of manners. For example, in some embodiments, the modular superstructure 2900 is represented as a smart rack matrix that defines the smart racks of the modular superstructure and/or other contextual elements associated with the structure of the modular superstructure. In some such embodiments, the smart rack matrix is embodied by a data graph matrix, which represents the configuration of the modular superstructure 2900 as an interconnected set of nodes and edges.

Figure 30:
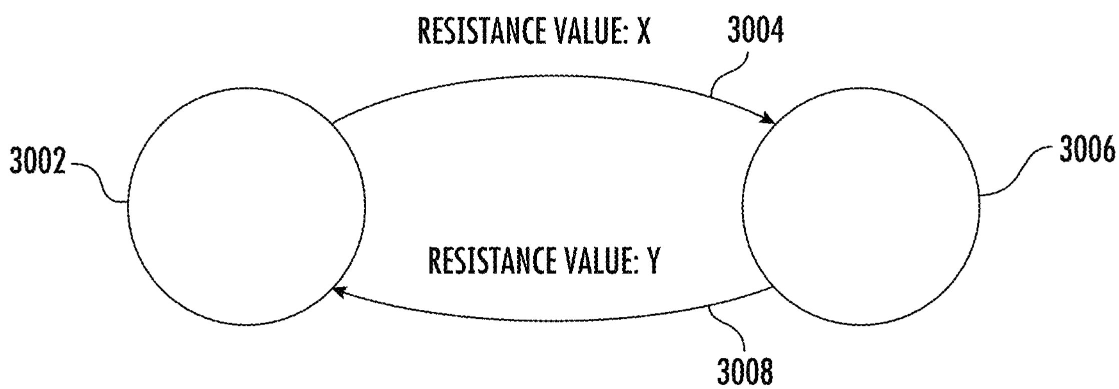
FIG. 30 illustrates an example node representation of connected smart racks in accordance with at least some example embodiments of the present disclosure.

FIG. 30 illustrates an example node representation of connected smart racks in accordance with at least some example embodiments of the present disclosure. Specifically, FIG. 30 depicts a first node 3002 and a second node 3006. In some embodiments, each node represents a smart rack or other element of the configured structure of a modular superstructure, for example the modular superstructure 2900. In some embodiments, a node may represent a smart rack, a hole, another mechanical component or robot, and/or the like, for example. For ease of description, the first node 3002 and second node 3006 are further described as representing smart racks within a modular superstructure, for example the smart racks 2902 of the modular superstructure 2900.

In some embodiments, nodes representing connected smart racks are associated with one or more edges that connect the nodes. For example, as illustrated, the first node 3002 and the second node 3006 are connected by first edge 3004 and second edge 3008. In some embodiments, the first edge 3004 represents a first movement resistance value (X) for repositioning from the first node 3002 to the second node 3006. Similarly, the second edge 3008 represents a second movement resistance value (Y) for repositioning a tote from the second node 3006 to the first node 3002. In this regard, the movement resistance values may each represent a cost or other factor for moving a tote from a smart rack corresponding to the node to another smart rack corresponding to the other node in accordance with the direction of the edge. For example, repositioning a tote from a first smart rack corresponding to the first node 3002 to a second smart rack corresponding to the second node 3006 may incur a movement resistance value of X. In some embodiments, the movement resistance values for moving between two smart racks represented by particular nodes are the same in each direction. In other embodiments, the movement resistance values for moving between two smart racks are different in each direction.

In some embodiments, the nodes may be connected by a single edge. For example, a single edge may indicate bidirectionality of movement (e.g., a tote can be moved in either direction). In this regard, such edges may be assigned a single weight representing a movement resistance value, or two weights associated with movement resistance values in each direction. For brevity and to maintain visibility of the attached figures, single edges are used throughout to indicate bidirectionality with movement resistance values that may be the same or different for the two directions.

Figure 31:
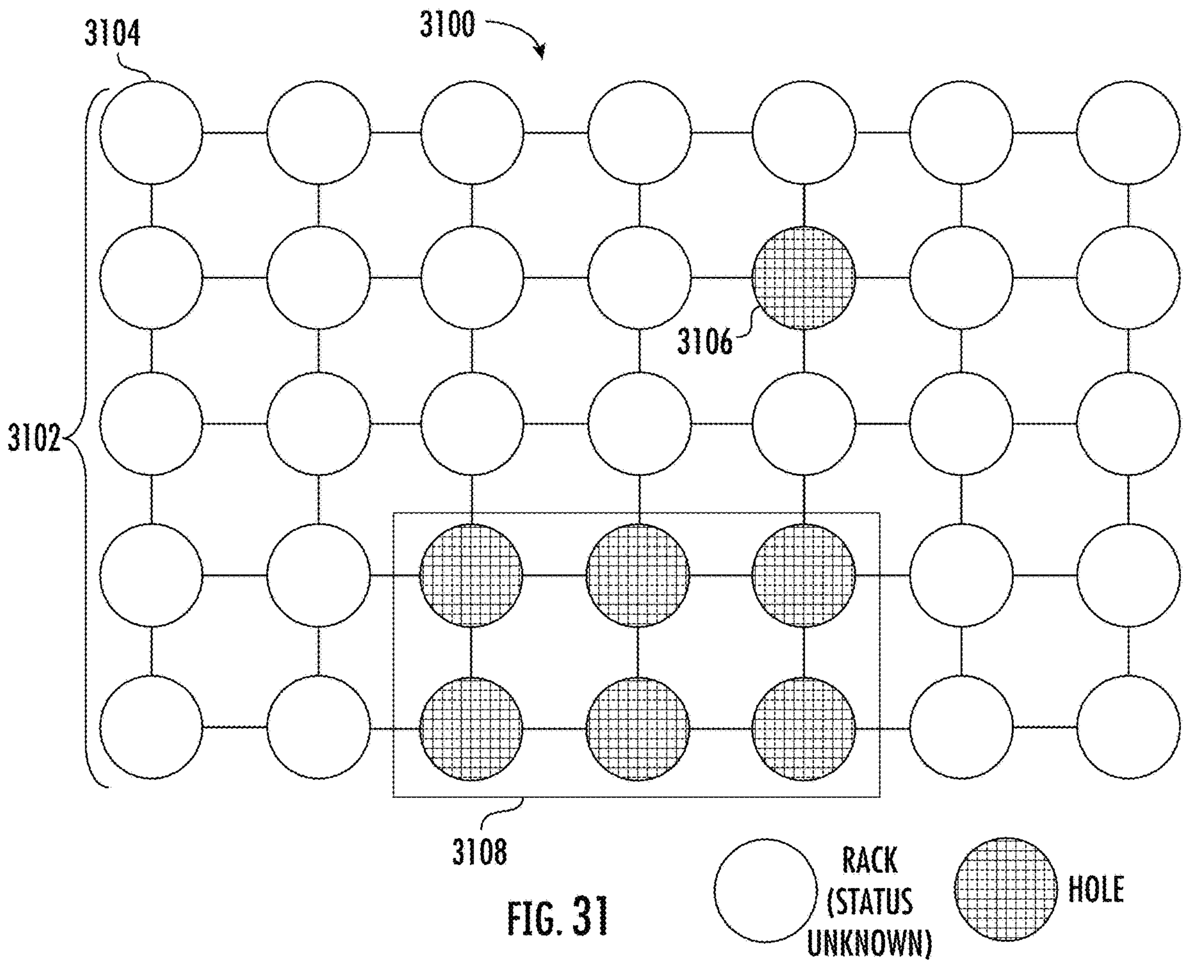
FIG. 31 illustrates a data graph matrix representation of a modular superstructure in accordance with at least some example embodiments of the present disclosure.

FIG. 31 illustrates a data graph matrix representation of a modular superstructure in accordance with at least some example embodiments of the present disclosure. Specifically, FIG. 31 illustrates a data graph matrix 3100 representation of the modular superstructure 2900. As illustrated, the data graph matrix 3100 includes a complete set of nodes 3102 equal to the length and width dimensions of the modular superstructure 2900. In some embodiments, the nodes 3102 are configured to represent the corresponding modular superstructure in accordance with a particular coordinate, grid, or other location identifying methodology. For example, in some embodiments, each node is assigned and identifiable via an assigned position index represented by a 2D or 3D index (e.g., an X-Y or X-Y-Z position). In some embodiments the index begins at an origin point, for example corresponding to the node 3104, and increments at each jump from said origin point. In this regard, the node 3104 may be assigned the position index (0,0) as an (X,Y) tuple, with each increment in row incrementing the X value and each increment in column incrementing the Y value. It will be appreciated that, in this regard, each node may represent a portion of physical space in the modular superstructure 2900 that is equivalent to the length and width of one smart rack.

Each node may be configured by setting one or more data properties that represents the behavior of the corresponding element of the modular superstructure (e.g., whether the node represents a smart rack or a hole in the depicted example). As illustrated, each node that is unshaded represents a smart rack, whereas each node that is shaded with a checkered pattern represents a hole in the structure of the corresponding modular superstructure. In some embodiments, each of the nodes 3102 includes a behavior data property, such that a value for said behavior data may be set that represents the behavior of the corresponding element in the modular superstructure. As illustrated, the nodes corresponding to locations where the modular superstructure 2900 includes a hole are configured with particular behavior data indicating that the node corresponds to a hole. For example, nodes 3108 and node 3106 are each configured to represent a hole. In this regard, the other nodes connected to any of the nodes 3108 and 3106 may determine based on such a behavior setting that movement in the direction of the hole node is not valid.

In some embodiments, for example, each node representing a smart rack may have behavior data set or other state data that is set to a current value that indicates the node represents a rack, and each node representing a hole in the modular superstructure may have behavior data set to a current value of "HOLE." In some embodiments, behaviors may be further broken down within one or more categories. For example, in some embodiments, smart racks may be specially configured to perform different desired behaviors. For example, some smart racks may be assigned a first behavior that prioritizes staying empty (e.g., a "OXYGEN" behavior). Some smart racks may be assigned a second behavior that prioritizes moving totes quickly in a particular direction or particular directions (e.g., a "RAIL" behavior). Other smart racks may be assigned a third behavior that indicates a normally functioning smart rack that has no particular special priority (e.g., a "NORMAL" behavior). In some embodiments, behavior data may similarly be utilized to represent states of operation of one or more smart racks, for example an "OFFLINE" behavior if a smart rack loses connection to a corresponding control system, a "MALFUNCTIONING" behavior if the smart rack is detected to not be functioning properly, and/or the like. In some such embodiments, the value represented in behavior data affects one or more movement resistance values associated with the node corresponding to the particular smart rack. In this regard, it will be appreciated that any desired combination of behaviors may be created and utilized to enable the modular superstructure to function as desired. Additionally, it will be appreciated that the example behaviors depicted and described herein are not meant to limit the scope and spirit of this disclosure.

In some embodiments, a smart rack matrix is determined and/or otherwise initialized via one or more portion(s) of read and/or otherwise received data. In some embodiments, a configuration file embodying a manifest that defines the structure of a modular superstructure is received, retrieved, and/or otherwise identified, and subsequently read to configure a corresponding smart rack matrix accordingly. In the example context of a data graph matrix for example, such configuration data may be read to determine a size of the data graph matrix (e.g., a number of rows and columns of nodes), the configuration of each node (e.g., behavior data for each node), and/or connections between each node. In some embodiments, the configuration file embodies a manifest file comprising JSON data and/or other human-readable configuration data representing the structure of the modular superstructure. In some embodiments, the smart rack matrix for a particular modular superstructure is previously stored and/or initialized, and/or can be retrieved without subsequent initialization.

Once configured, the data graph matrix 3100 is usable for any of a myriad of advantageous processes. In some embodiments, the data graph matrix 3100 is usable to process any of a myriad of tote queries representing requested movement of totes via the corresponding modular superstructure. In this regard, the data graph matrix 3100 may be processed to identify an efficient path for moving one or more tote(s) to one or more target end position(s), and/or to do so with reduced and/or minimizing a particular movement resistance value. Advantageously, the graph-based implementation of the data graph matrix 3100 enables performance of particularly efficient algorithm(s) for facilitating such process(es), for example the sliding A* algorithm implementations as described herein.

Figure 32:
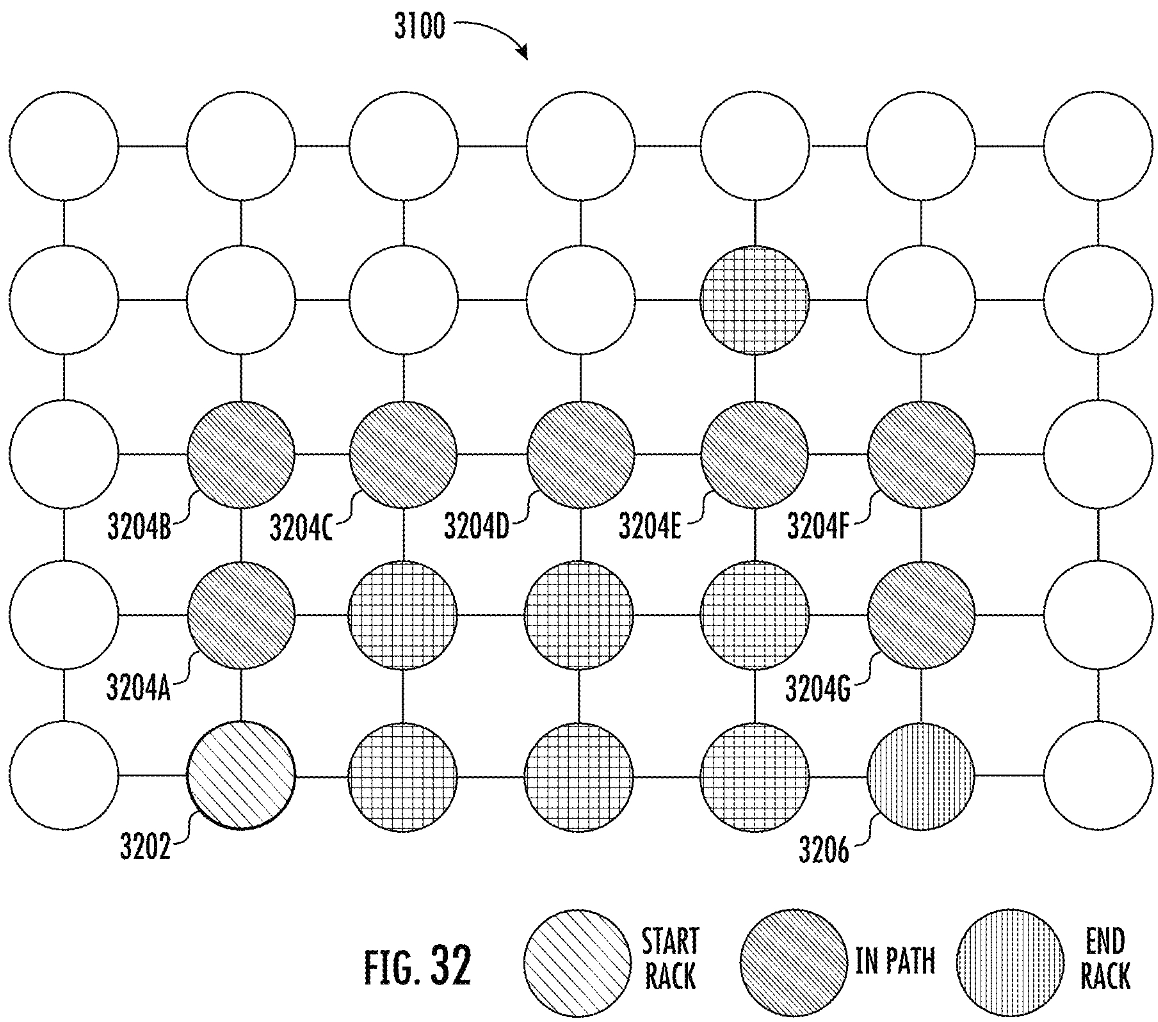
FIG. 32 illustrates a node representation of a tote movement path in a data graph matrix in accordance with at least some example embodiments of the present disclosure.

FIG. 32 illustrates a node representation of a tote movement path in a data graph matrix in accordance with at least some example embodiments of the present disclosure. Specifically, FIG. 32 depicts a tote movement path for repositioning a tote from a smart rack at a first tote starting position associated with the node 3202 to a smart rack at a tote ending position associated with the node 3206. As illustrated, the intermediary portion of the tote movement path is formed via nodes 3204A-3204G, ultimately ending at 3206. In some embodiments, a tote ending position is out of the boundaries defined by the modular superstructure 2900, for example by egressing from the modular superstructure 2900 from a particular egress point. In some such embodiments, the tote ending position may represent an external position where a tote egresses via the node associated with the tote ending position corresponding to the node 3206.

Figure 33:
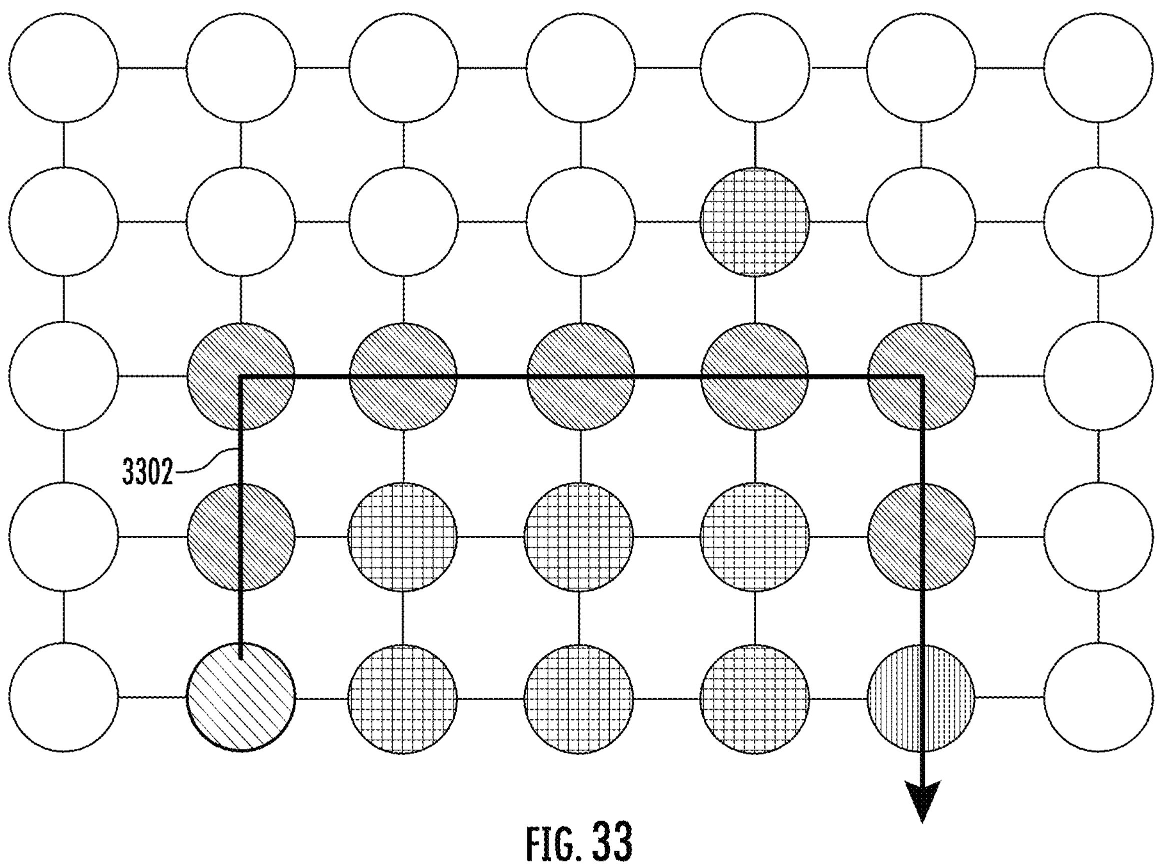
FIG. 33 illustrates a visual representation of the tote movement path in a data graph matrix determinable using an A* algorithm in accordance with at least some example embodiments of the present disclosure.

For example, FIG. 33 illustrates a visual representation of the tote movement path in a data graph matrix determinable using an A* algorithm in accordance with at least some example embodiments of the present disclosure. Specifically, FIG. 33 illustrates a visual representation of the tote movement path determined for repositioning a tote at a first smart rack associated with the node 3202 to a tote ending position representing an egress point via a second smart rack associated with the node 3206. In some embodiments, the tote is manipulated by each smart rack represented by a node in the path to reposition the tote along the path, and ultimately reach the egress point. As illustrated, a tote may move along the tote movement path 3302. In some embodiments, a sliding A* algorithm is executed to determine the tote movement path 3302, for example as described herein with respect to FIG. 32.

In some embodiments, the data graph matrix 3100 is processed utilizing a sliding A* algorithm that identifies the best peer rack to which a tote should be moved to progress the tote from its current position towards a tote ending position (e.g., an egress point) with minimal movement resistance value. In some embodiments, the sliding A* algorithm includes executing an A* pathfinder algorithm from the tote starting position to the tote ending position associated with the egress point, for example from the tote starting position associated with node 3202 to the tote ending position associated with node 3206. The A* pathfinder algorithm generates an F-score associated with each processed node that represents a cost associated with traveling via the processed node. In some embodiments, the A* pathfinder algorithm utilizes the formula F (n)=G (n)+H (n), where F (n) represents the F-score for a particular node n, G (n) represents a current lowest cost (e.g., a shortest distance) via edges from a starting node to the node n, and H (n) represents an estimated cost (e.g., a shortest distance) from node n until the node associated with the tote ending position embodying a target end position. In this regard, in some embodiments the G (n) value for a particular node is built as the path to connected edges are explored between the nodes. The H (n) value is determinable via any of a myriad of heuristics. For example, in some embodiments, a Manhattan distance or Euclidean distance is utilized as a heuristic for determining the H (n) score for a particular node. In some such embodiments, the heuristic represents an expected cost (e.g., an expected movement resistance value) for traversing via the node towards the tote ending position. In this regard, the F-score represented by F (n) for a particular node improves as the nodes are traversed in the correct direction towards the node corresponding to the target end position, where possible.

As illustrated in FIG. 32, the node directly to the right of the starting node 3202 corresponds to a hole in the modular superstructure. Accordingly, the A* pathfinder algorithm may determine that it cannot reposition the tote in that direction. During processing of the remaining peers, the A* pathfinder algorithm determines the F-score for node 3204A is lowest, and therefore this node is identified as corresponding to the best peer rack. Accordingly, this node 3204A is utilized in the tote movement path and the tote may be swapped to that position. The A* pathfinder algorithm continues from node 3204A, determining that the best peer rack is along the path around the hole since the node directly to the right of node 3204A is also a hole. In this regard, the A* pathfinder algorithm continues until each of the nodes 3204A, 3204B, 3204C, 3204D, 3204E, 3204F, 3204G, and finally node 3206 are added to the path. Once the A* pathfinder algorithm reaches node 3206 corresponding to the tote ending position, the algorithm ends the search for new nodes and the tote movement path is determined from looking back to trace the nodes traversed to reach the node 3206. Once determined, the tote movement path represents the movement between nodes for a tote to move from its tote starting position to a target end position with reduced or minimized cost (e.g., a minimized movement resistance value).

Figure 34:
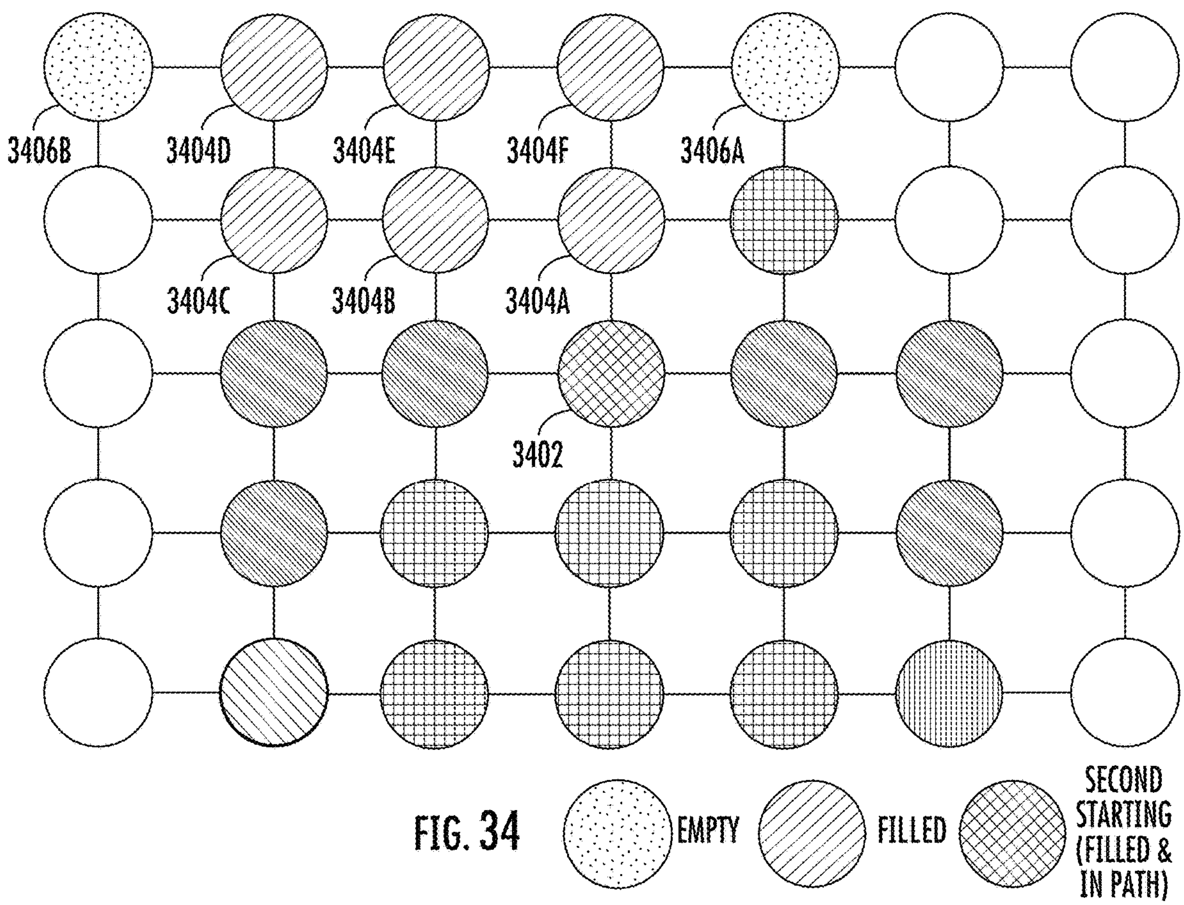
FIG. 34 illustrates a node representation of a secondary tote movement path for repositioning a tote in an identified tote movement path in accordance with at least some example embodiments of the present disclosure.

In some embodiments, the sliding A* algorithm further identifies nodes that are determined as within a tote movement path and also currently occupied, so that such nodes may be further processed. In some such embodiments, the sliding A* algorithm may be configured to efficiently reposition the totes in such occupied nodes within the tote movement path to further reduce the total movement resistance value associated with repositioning a particular tote (e.g., a queried tote to be moved to an egress point). For example, FIG. 34 illustrates a node representation of a secondary tote movement path for repositioning a tote in an identified tote movement path in accordance with at least some example embodiments of the present disclosure.

In some embodiments, the sliding A* algorithm relocates a tote from an occupied smart rack to a closest empty smart rack by determining a closest empty node in a data graph matrix to the node that corresponds to the occupied smart rack. As illustrated in FIG. 34, the node 3402 is within the tote movement path identified from the starting node 3202. In some embodiments, the sliding A* algorithm executes an additional A* pathfinder algorithm to identify a second tote movement path from the occupied node to a closest empty node to said occupied node. The sliding A* algorithm may determine status data (e.g., representing whether the corresponding smart rack is occupied or empty) for any of a myriad of nodes radiating out from the starting node. In some embodiments, the sliding A* algorithm may not consider nodes that are in the first identified tote movement path. In other embodiments, the sliding A* algorithm considers some or all nodes that are in the first identified tote movement path, for example so long as the movements to such nodes do not conflict with the first identified tote movement path.

As illustrated, nodes 3404A-3404F are determined to be occupied. In this regard, in some embodiments, such nodes may be determined as occupied during execution of the second A* pathfinder algorithm, for example by checking the status of each node upon processing it for traversal. Two empty nodes are similarly depicted, specifically nodes 3406A and 3406B. The second A* pathfinder algorithm may continue to process nodes until one of the empty nodes is reached. For example, the second A* pathfinder algorithm may continue to process each node estimated to represent the shortest tote movement path, for example embodying a lowest resistance value path based on the total of movement resistance values for the nodes in the tote movement path. As illustrated, for example, the second A* pathfinder algorithm may continue along a frontier until the algorithm first encounters an empty node, for example the empty node 3406A as illustrated.

Figure 35:
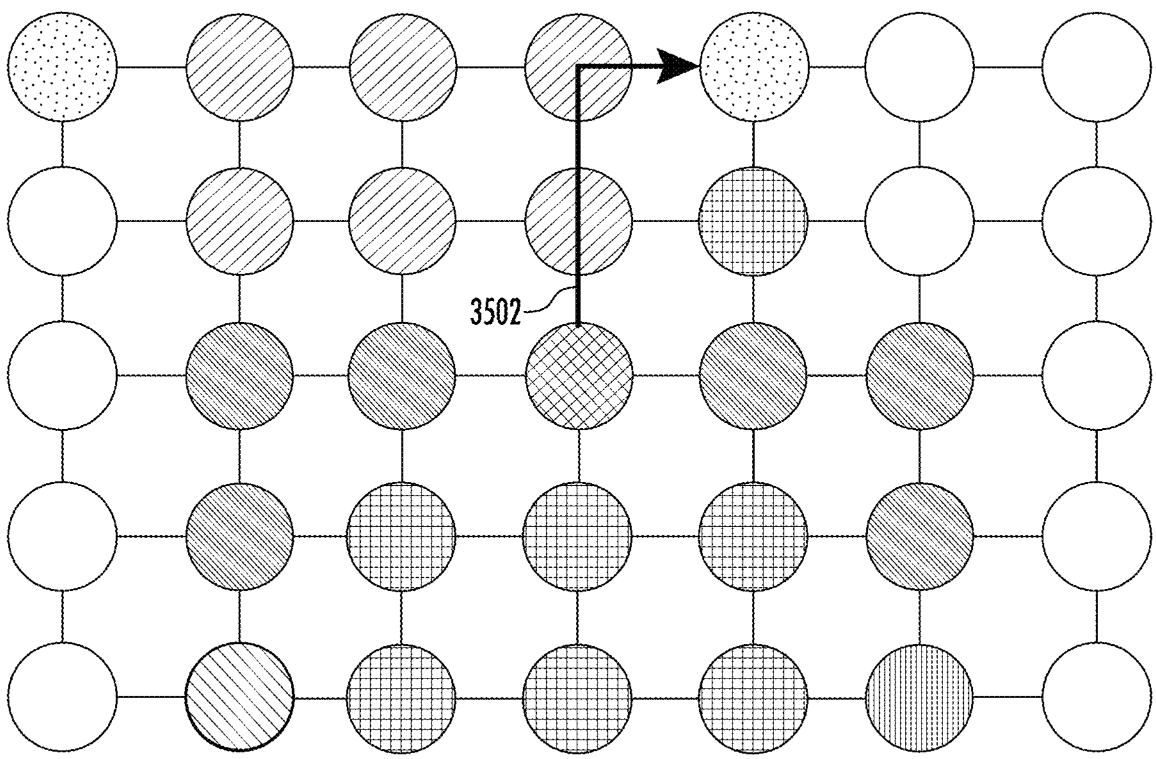
FIG. 35 illustrates a visual representation of the secondary tote movement path to the closest empty node determinable using an A* algorithm in accordance with at least some example embodiments of the present disclosure.

FIG. 35 illustrates a visual representation of the secondary tote movement path to the closest empty node determinable using an A* algorithm in accordance with at least some example embodiments of the present disclosure. Specifically, FIG. 35 illustrates a visual representation of the tote movement path 3502 for repositioning a tote from the smart rack corresponding to the node 3402 (in the first identified tote movement path) to the nearest empty rack. In some embodiments, each smart rack in the second tote movement path 3502 is manipulated to clear the second tote blocking the originally identified, first tote movement path through one or more manipulations with the minimum movement resistance value. Upon determining instructions for clearing the node 3402, further instructions may be generated for continuing the first tote along the originally identified first tote movement path represented as tote movement path 3302.

It should be appreciated that this process for clearing an identified tote movement path utilizing a particular tote movement path representing a reduced, minimized, or lowest resistance value path may be repeated for any number of occupied nodes. For example, in some embodiments, an A* pathfinder algorithm is initiated for each occupied node in a first identified tote movement path (e.g., to get a tote from a tote starting position to a tote ending position for egress). Each implementation of the A* pathfinder algorithm advantageously reduces or minimizes the total cost (represented by a total movement resistance value) of enabling such movements. In this regard, the sliding A* algorithm utilizing such sub-A* pathfinder algorithms produces low cost paths for relocating a tote from a tote starting position to a tote ending position while addressing any intermediary blocking totes in an efficient manner, thus saving various resources and particularly minimizing expenditure resources represented by the movement resistance value (e.g., power consumption, time, other resources, and/or the like).

Figure 36:
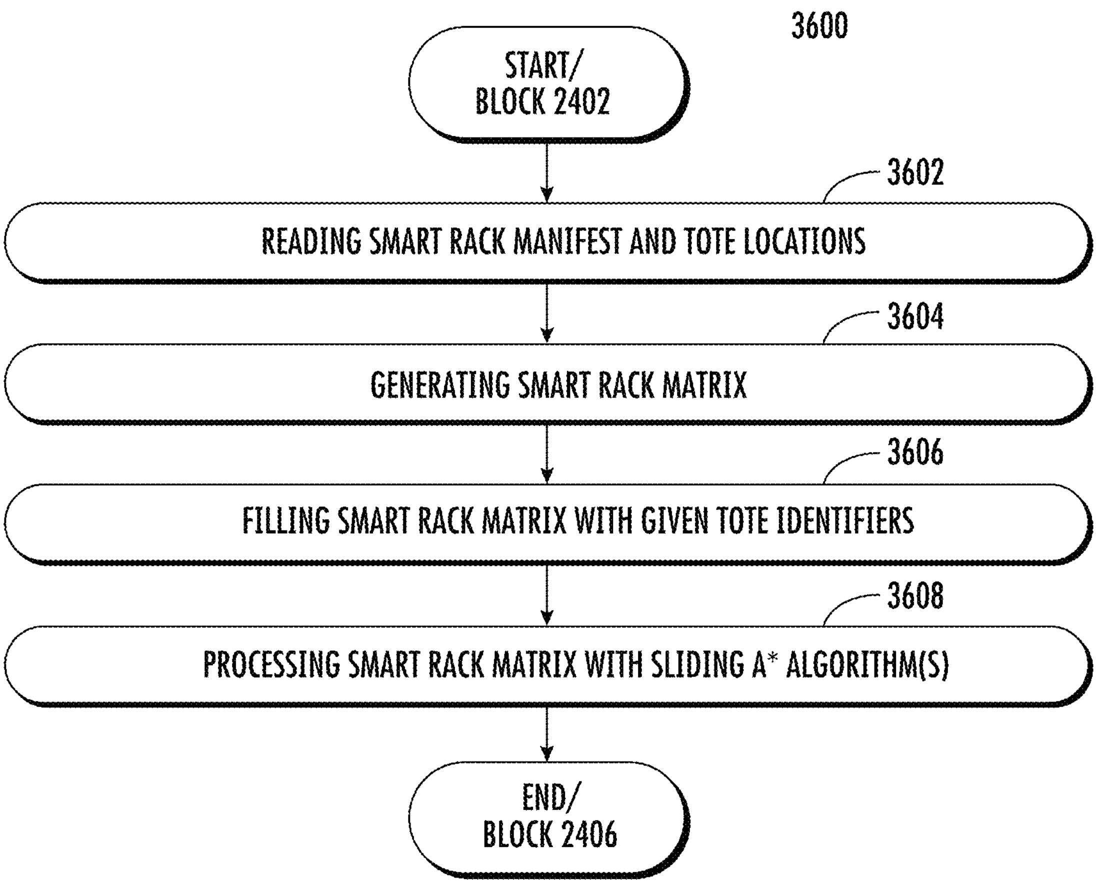
FIG. 36 illustrates a flowchart depicting operations of an example process for creating a smart rack matrix for processing in accordance with at least some example embodiments of the present disclosure.

FIG. 36 illustrates a flowchart depicting operations of an example process for creating a smart rack matrix for processing in accordance with at least some example embodiments of the present disclosure. Specifically, FIG. 36 depicts an example process 3600. The process 3600 is performable by any number of computing device(s) as described herein, for example embodiment in hardware, software, firmware, and/or any combination thereof. In some embodiments, the apparatus 2300 includes the various circuitry as means for performing each operation of the process 3600.

In some embodiments, the process 3600 embodies a sub-process of one or more process(es) depicted and/or described herein. In some embodiments, the process 3600 embodies a sub-process of the process 2400. For example, in some embodiments, the process 3600 embodies a sub-process for initializing a smart rack matrix with peer information. In this regard, it will be appreciated that the process 3600 may replace, and/or supplement, one or more of the operations of such process(es) herein. Additionally, or alternatively, in some embodiments, flow returns to another process upon completion of the operations of process 3600.

At operation 3602, the process 3600 includes reading a smart rack manifest and tote locations. In some embodiments, the smart rack manifest comprises data representing a shape, design, and/or other structure of a modular superstructure. For example, in some embodiments, the smart rack manifest comprises data representing the locations of smart rack(s), hole(s), connection(s) between smart racks, and/or the like. The tote locations in some embodiments comprises data indicating the smart rack(s) that currently are storing and/or otherwise are filled with totes. In some embodiments, the tote locations include data representing a position index, location, or other identifier of smart rack(s) that are currently occupied by a tote.

In some embodiments, the smart rack manifest and tote locations are read from different files, databases, and/or the like. Alternatively or additionally, in some embodiments, at least a portion of the smart rack manifest and tote locations are read from a shared file. For example, in some embodiments, the smart rack manifest and tote locations are read from a single configuration file with such data.

At operation 3604, the process 3600 includes generating a smart rack matrix. In some embodiments, the smart rack matrix is generated as a data graph matrix comprising any number of nodes and edges. For example, in some embodiments, the smart rack matrix is generated comprising a node representing each position in a grid corresponding to a modular superstructure. Such node(s) may each store behavior information indicating whether a node corresponds to a smart rack, a hole, or another element associated with operation of the modular superstructure. In this regard, the smart rack matrix may represent a data-driven representation of the smart racks of a modular superstructure, connections between the smart racks, holes and/or other obstacles that affect maneuvering totes via the modular superstructure, and/or the like. In some embodiments, each node stores behavior data representing the particular behavior of the element corresponding to the node, such that the behavior data may be set appropriately.

At operation 3606, the process 3600 includes filling the smart rack matrix with given tote identifiers. In some embodiments, the tote identifiers are filled based on the tote locations read at an earlier operation, for example operation 3602. In some such embodiments where the smart rack matrix is embodied by a data graph matrix, the nodes of the data graph matrix may be configured to fill the smart rack matrix with the given tote identifiers. In some embodiments, each node representing a smart rack is associated with one or more properties indicating a tote that is stored via the smart rack. In some embodiments, the node includes a data property embodying current status data, which may be set to a filled/occupied status in the circumstance where a tote is currently being held, stored, and/or otherwise manipulated by the smart rack, and empty in the circumstance where a tote is currently not holding, storing, and/or otherwise manipulating any tote. In some embodiments, the status data stores a tote identifier corresponding to the tote that is currently being stored via the smart rack, and/or a default, null, or empty data value in a circumstance where the smart rack is currently empty.

Upon completion of filling the smart rack matrix, the smart rack matrix may be utilized for processing. For example, in some embodiments, the smart rack matrix may be utilized for processing one or more tote queries, as described herein. At optional operation 3608, the process 3600 includes processing the smart rack matrix with sliding A* algorithm(s). In some such embodiments, the sliding A* algorithm(s) enable repositioning of tote(s) via the modular superstructure with a minimized total movement resistance value to perform such repositioning.

Figure 37:
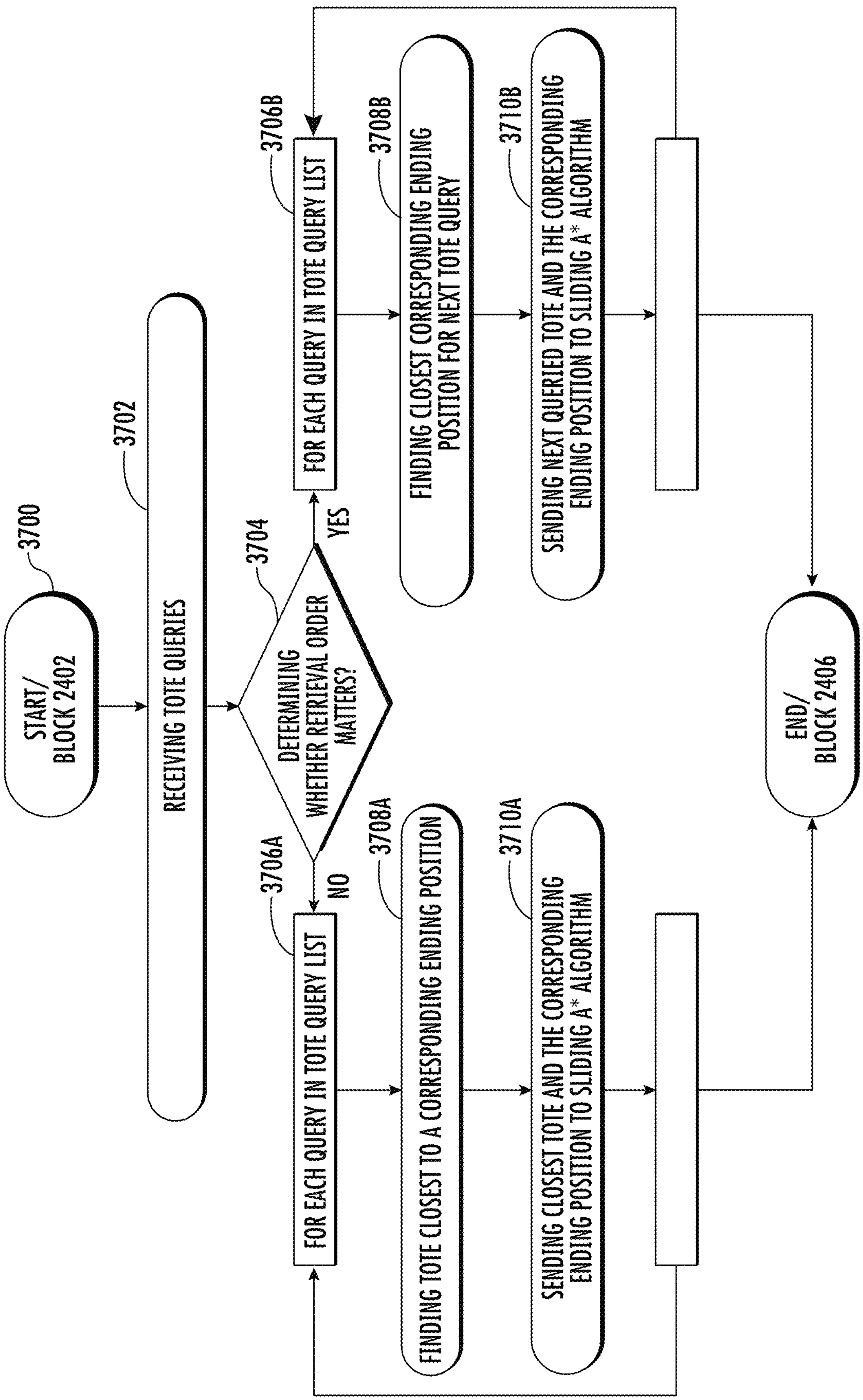
FIG. 37 illustrates a flowchart depicting operations of an example process for processing at least one tote query in accordance with at least some example embodiments of the present disclosure.

FIG. 37 illustrates a flowchart depicting operations of an example process for processing at least one tote query in accordance with at least some example embodiments of the present disclosure. Specifically, FIG. 37 depicts an example process 3700. The process 3700 is performable by any number of computing device(s) as described herein, for example embodiment in hardware, software, firmware, and/or any combination thereof. In some embodiments, the apparatus 2300 includes the various circuitry as means for performing each operation of the process 3700.

In some embodiments, the process 3700 embodies a sub-process of one or more process(es) depicted and/or described herein. In some embodiments, the process 3700 embodies a sub-process of the process 2400. For example, in some embodiments, the process 3700 embodies a sub-process for executing a movement algorithm embodying a sliding A* algorithm. In this regard, it will be appreciated that the process 3700 may replace, and/or supplement, one or more of the operations of such process(es) herein. Additionally, or alternatively, in some embodiments, flow returns to another process upon completion of the operations of process 3700.

At operation 3702, the process 3700 includes receiving tote queries. Each tote query may represent a request to relocate a particular tote from its current position to a target end position, for example from a tote starting position to a tote ending position. Each tote query may represent a request to relocate any number of tote queries, for example including a single tote or plurality of totes to any of plurality of target end positions. In some embodiments, a single tote query is received. In other embodiments, a plurality of tote queries is received. In some embodiments, the tote queries are received via a request, API call, or other incoming transmission. Alternatively or additionally, in some embodiments the tote queries are received in response to user input via a client computing device associated with a modular superstructure. It should be appreciated that in a circumstance where a plurality of tote queries is received, a single transmission, user input, or other data may be received that represents a plurality of tote queries, or a plurality of transmissions, user inputs, and/or other data portions may be received that represent a plurality of tote queries.

At operation 3704, the process 3700 includes determining whether retrieval order matters for a tote query or plurality of tote queries. In some embodiments, each tote query includes data indicating whether retrieval order matters. In this regard, such data may be extracted and/or otherwise parsed from the tote query and compared with a predefined data value (e.g., indicating order does matter or indicating order does not matter) to determine whether the extracted and/or otherwise parsed data matches. In a circumstance where retrieval order is determined to not matter, flow proceeds to operation 3706A. In a circumstance where retrieval order is determined to matter, flow proceeds to operation 3706B.

At operation 3706A, the process 3700 includes processing each query in a tote query list. In some such embodiments, the tote query list may be processed in any order. It will be appreciated that the subsequent operations 3708A and 3710A may be repeated for any number of tote queries.

At operation 3708A, the process 3700 includes finding a tote closest to a corresponding ending position. In some embodiments, one or more algorithm(s), heuristic(s), and/or other methodologies are utilized to determine which tote is closest to a corresponding ending position. For example, in some embodiments, a Euclidian distance is determined between a current position of a tote (e.g., embodying a tote starting position) and a corresponding ending position for said tote (e.g., embodying a tote ending position), such that the closest is determinable from the lowest value Euclidian distance. Alternatively or additionally, in some embodiments, a distance to a corresponding ending position for each tote is determined by executing an implementation of an A* pathfinder algorithm for each tote, such that the determined tote movement path with the minimal movement resistance value is determined to correspond to the tote closest to its corresponding ending position. It will be appreciated that any other algorithm and/or heuristic may be utilized to determine the distance between each tote and a corresponding ending position, and thereby determine a tote closest to its corresponding ending position.

At operation 3710A, the process 3700 includes sending the closest tote and the corresponding ending position to a sliding A* algorithm. In some embodiments, the sliding A* algorithm determines a tote movement path for relocating the tote closest to its corresponding ending position to said corresponding ending position, for example with a minimized movement resistance value. Additionally, or alternatively, in some embodiments, the sliding A* algorithm determines additional (e.g., second) tote movement path(s) for each tote in a smart rack along the first tote movement path for relocating the closest tote. Non-limiting examples of executing a sliding A* algorithm are described herein with respect to FIGS. 38-44.

At operation 3706B, the process 3700 includes processing each query in a tote query list. In some such embodiments, the tote query list may be processed in the order received. It will be appreciated that the subsequent operations 3708B and 3710B may be repeated for any number of tote queries.

At operation 3708B, the process 3700 includes finding the closest corresponding ending position for the next tote query. In this regard, such embodiments may not process totes out of order, and may continue with processing the next queried tote in the tote query list. In some embodiments, one or more algorithm(s), heuristic(s), and/or other methodologies are utilized to determine the distance between the next tote query and accessible ending position(s). For example, in some embodiments, a Euclidian distance is determined between a current position of a tote (e.g., embodying a tote starting position) and available ending position(s) for said tote (e.g., each embodying a tote ending position), such that the closest ending position is determinable from the lowest value Euclidian distance. Alternatively or additionally, in some embodiments, a distance to each corresponding ending position for the next tote query is determined by executing an implementation of an A* pathfinder algorithm for the next tote query, such that the determined tote movement path with the minimal movement resistance value is determined to correspond to the closest corresponding ending position for the next tote query. It will be appreciated that any other algorithm and/or heuristic may be utilized to determine the closest corresponding ending position for the next tote query.

At operation 3710B, the process 3700 includes sending the next queried tote and the corresponding ending position to a sliding A* algorithm. In some embodiments, the sliding A* algorithm determines a tote movement path for relocating the next queried tote to its corresponding ending position=with a minimized movement resistance value. Additionally, or alternatively, in some embodiments, the sliding A* algorithm determines additional (e.g., second) tote movement path(s) for each tote in a smart rack along the first tote movement path for relocating the closest tote. Non-limiting examples of executing a sliding A* algorithm are described herein with respect to FIGS. 38-44.

Figure 38:
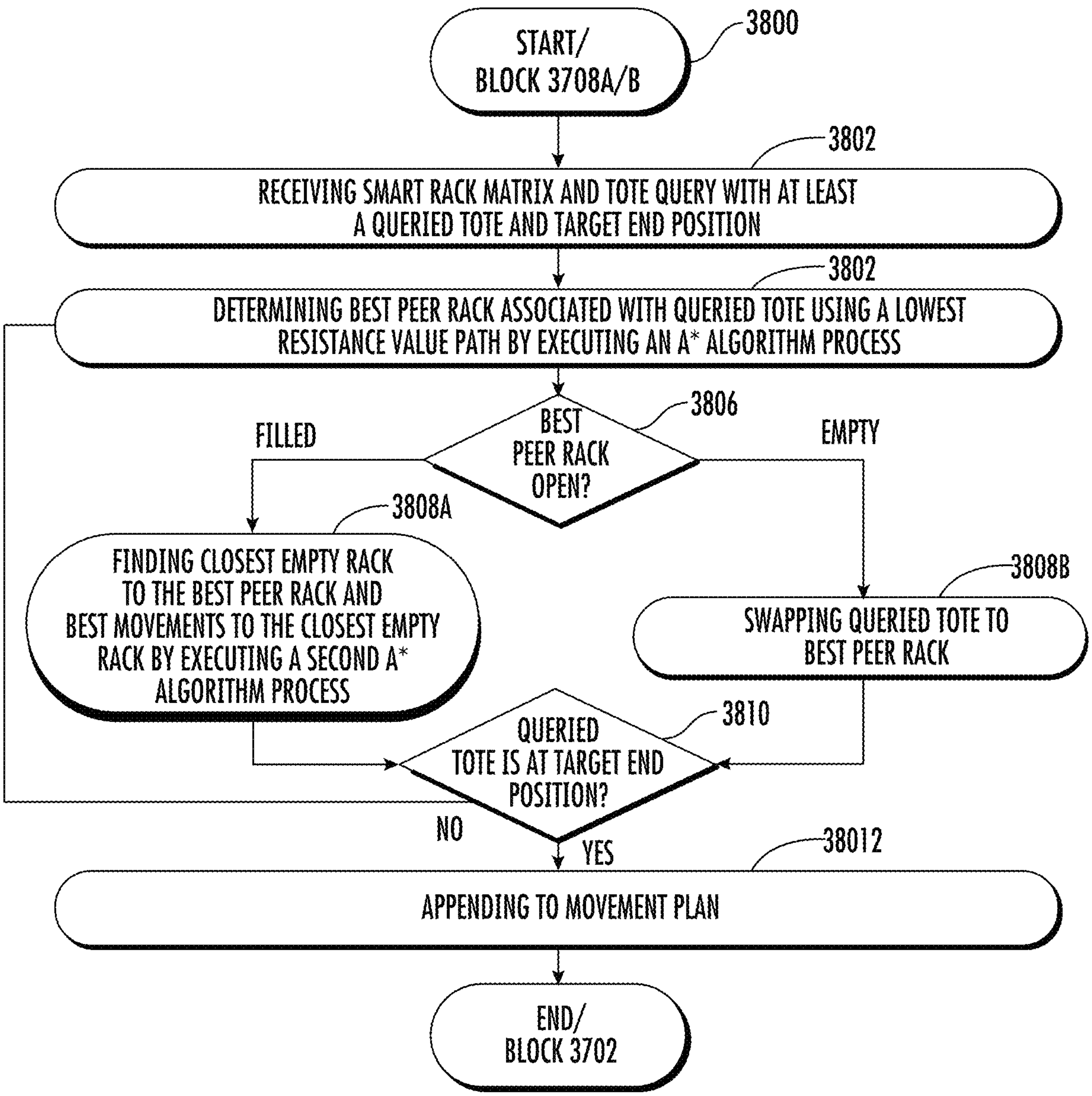
FIG. 38 illustrates a flowchart depicting operations of an example process for performing a sliding A* algorithm in accordance with at least some example embodiments of the present disclosure.

FIG. 38 illustrates a flowchart depicting operations of an example process for performing a sliding A* algorithm in accordance with at least some example embodiments of the present disclosure. Specifically, FIG. 38 depicts an example process 3800. The process 3800 is performable by any number of computing device(s) as described herein, for example embodiment in hardware, software, firmware, and/or any combination thereof. In some embodiments, the apparatus 2300 includes the various circuitry as means for performing each operation of the process 3800.

In some embodiments, the process 3800 embodies a sub-process of one or more process(es) depicted and/or described herein. In some embodiments, the process 3800 embodies a sub-process of the process 2400. For example, in some embodiments, the process 3800 embodies a sub-process for executing a movement algorithm embodying a sliding A* algorithm. In this regard, it will be appreciated that the process 3800 may replace, and/or supplement, one or more of the operations of such process(es) herein. Additionally, or alternatively, in some embodiments, flow returns to another process upon completion of the operations of process 3800.

At operation 3802, the process 3800 includes receiving a smart rack matrix and tote query with at least a queried tote and target end position. In some such embodiments, the smart rack matrix embodies a data graph matrix representing a particular modular superstructure. In some embodiments, the smart rack matrix is retrieved from a data repository. In some embodiments, the smart rack matrix is initialized at an earlier stage, as described herein.

In some embodiments, the tote query defines the queried tote based at least in part on a particular identifier, tote starting position, and/or the like. Accordingly, the queried tote may be determinable as located at a particular current position corresponding to a particular current smart rack. Additionally, or alternatively, in some embodiments the tote query defines the target end position that represents at least one tote ending position where the queried tote may be relocated. It should be appreciated that the tote query may be received on its own, or together with a plurality of tote queries.

At operation 3804, the process 3800 includes determining a best peer rack associated with the queried tote using a lowest resistance value path by executing an A* pathfinder algorithm. In this regard, the best peer rack may represent a peer smart rack connected to the current smart rack where the queried tote is currently located. The best peer rack may be determined as along a particular tote movement path associated with the lowest total movement resistance value (e.g., the lowest resistance value path. In some embodiments, operation 3804 includes executing a particular implementation of an A* pathfinder algorithm to generate, identify, or otherwise determine the lowest resistance value path from the current position associated with the queried tote to the target end position. It will be appreciated that the A* pathfinder algorithm in some embodiments traverses the smart rack matrix embodying the data graph matrix to determine the lowest resistance value path utilizing the resistance values between the nodes in the data graph matrix.

At operation 3806, the process 3800 includes determining whether the best peer rack is currently open. In some embodiments, status data associated with the best peer rack is determined (e.g., from a node corresponding to the best peer rack) and is compared with a predefined data value representing an open rack (e.g., an empty status). In a circumstance where the best peer rack is not determined opened (or in other words, the smart rack is filled where a tote is currently within the smart rack), flow proceeds to operation 3808A. In a circumstance where the best peer rack is determined open (or in other words, empty where no tote is currently within the smart rack), flow proceeds to operation 3808B.

At operation 3808A, the process 3800 includes finding a closest empty rack to the best peer rack and best movements to the closest empty rack by executing a second A* pathfinder algorithm. In some embodiments, the second A* pathfinder algorithm embodies a second implementation of an A* pathfinder algorithm for pathing from a position associated with the best peer rack to the closest empty rack associated with said best peer rack. In this regard, the second A* pathfinder algorithm minimizes the total movement resistance value for nodes embodying the path between the best peer rack and the closest empty rack. In this regard, the second tote filling the best peer rack may be relocated utilizing the second tote movement path between the best peer rack and the closest empty rack as determined via the second A* pathfinder algorithm, thus clearing the best peer rack to an empty state. It will be appreciated that the particular second A* pathfinder algorithm executed may be the same as the first A* pathfinder algorithm executed for the queried tote, but need not necessarily be the same. In some embodiments, upon finding the closest empty rack, data may be generated representing the movements to reposition the totes along the second tote movement path between the best peer rack and the closest empty rack, for example for inclusion in a movement plan.

At operation 3808B, the process 3800 includes swapping the queried tote to the best peer rack. In some embodiments, a tote plan is generated including data representing the swap of the queried tote to the best peer rack (e.g., by sliding, repositioning, or otherwise moving the tote from its current smart rack to the best peer rack). It will be appreciated that, advantageously, some embodiments detect open smart racks to execute subsequent A* pathfinder algorithm(s) only when necessary to improve operation when the path to be traveled by the queried tote is filled at one or more positions.

At operation 3810, the process 3800 includes determining whether the queried tote is at the target end position representing a tote ending position. In a circumstance where the queried tote is not at the target end position, flow returns to operation 3804 to determine a next best peer rack to continue moving the queried tote towards the target end position. In a circumstance where the queried tote is at the target end position, the flow proceeds to operation 3812.

At operation 3812, the process 3800 includes appending to a movement plan. In some embodiments, data is appended to a movement plan embodying a tote plan, where such data represents the rack operation(s) to be performed to relocate the queried tote along the identified first tote movement path, and relocate any tote(s) currently in the first tote movement path (if necessary) to prevent unnecessary collisions and/or delays.

Figure 39:
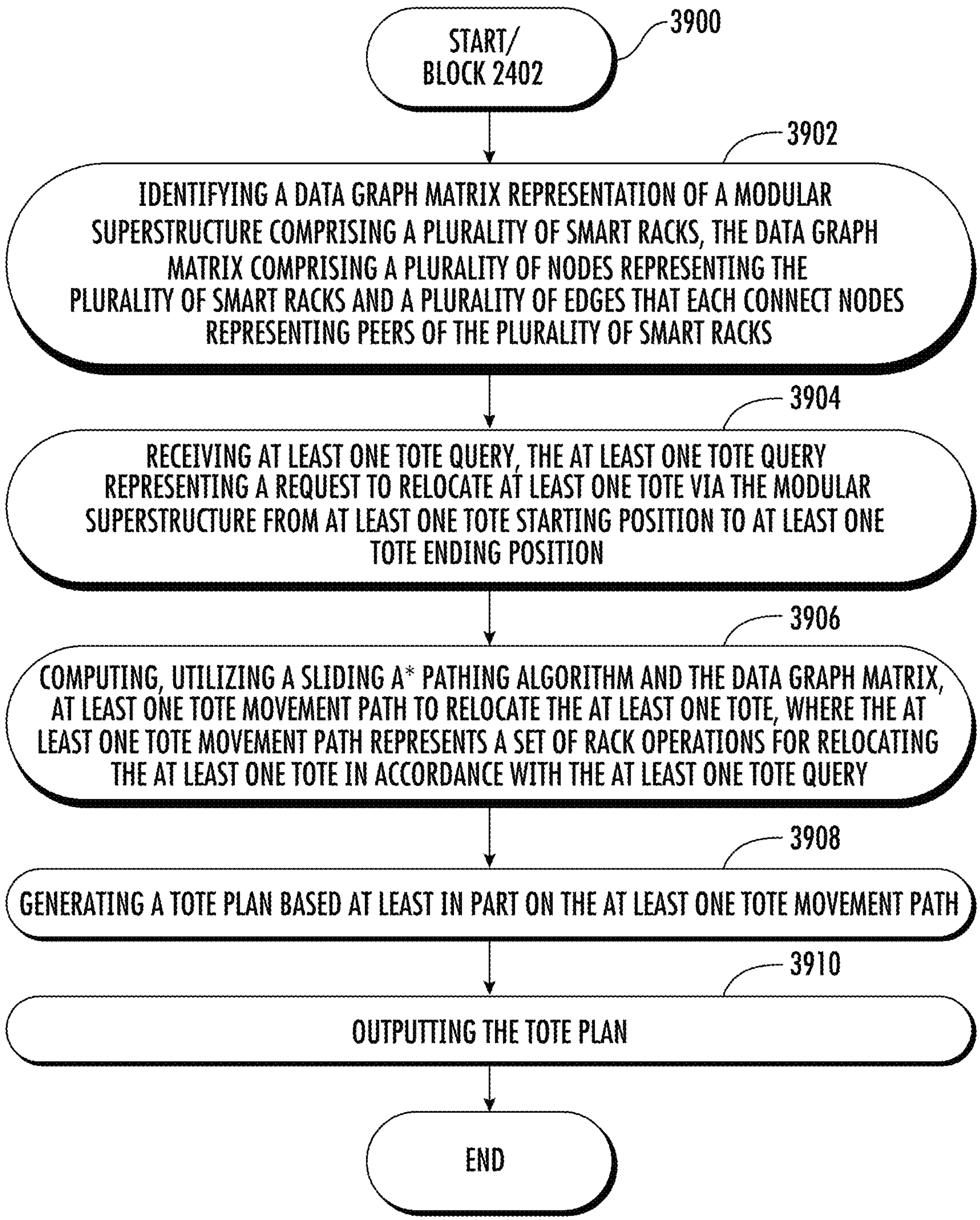
FIG. 39 illustrates a flowchart depicting operations of an example process for generating and outputting a movement plan represented by a tote plan utilizing a sliding A* algorithm in accordance with at least some example embodiments of the present disclosure.

FIG. 39 illustrates a flowchart depicting operations of an example process for generating and outputting a movement plan represented by a tote plan utilizing a sliding A* algorithm in accordance with at least some example embodiments of the present disclosure. Specifically, FIG. 39 depicts an example process 3900. The process 3900 is performable by any number of computing device(s) as described herein, for example embodiment in hardware, software, firmware, and/or any combination thereof. In some embodiments, the apparatus 2300 includes the various circuitry as means for performing each operation of the process 3900.

In some embodiments, the process 3900 embodies a sub-process of one or more process(es) depicted and/or described herein. In some embodiments, the process 3900 embodies a sub-process of the process 2400. For example, in some embodiments, the process 3900 embodies a sub-process for initializing a smart rack matrix with peer information, executing movement algorithm(s), generating a movement plan, and outputting a movement plan. In this regard, it will be appreciated that the process 3900 may replace, and/or supplement, one or more of the operations of such process(es) herein. Additionally, or alternatively, in some embodiments, flow returns to another process upon completion of the operations of process 3900.

At operation 3902, the process 3900 includes identifying a data graph matrix representation of a modular superstructure comprising a plurality of smart racks. In some embodiments, the plurality of smart racks are interconnected with one another, such that each smart rack is capable of repositioning a tote to at least one other smart rack and/or receiving a tote from at least one other smart rack. The data graph matrix may be embodied as a directed graph with a plurality of nodes and edges. In some embodiments, the data graph matrix includes a plurality of nodes representing the plurality of smart racks. Additionally, or alternatively, in some embodiments the data graph matrix includes a plurality of edges that each connect nodes representing peers of the plurality of smart racks. In this regard, in some embodiments an edge connects a node representing a particular smart rack capable of repositioning a tote to a peer smart rack represented by a peer node connected via the edge. In some embodiments, one or more of the edge(s) is directional indicating possible movement of the tote in a particular direction. Alternatively or additionally, in some embodiments one or more of the edge(s) is bi-directional or not directional, indicating possible movement of the tote in both directions represented via the edge (e.g., from the first node to a second node in a first direction, and similarly from the second node to the first node in a second direction). In some embodiments, the edges and/or nodes are associated with movement resistance value(s) associated with movement of a tote in a particular direction via the corresponding smart rack and/or to or from the corresponding smart rack. In other embodiments, each edge and/or node is associated with the same movement resistance value (e.g., in a circumstance where all smart racks are configured the same in each direction of movement).

At operation 3904, the process 3900 includes receiving at least one tote query. In some embodiments, the at least one tote query represents a request to relocate at least one tote via the modular superstructure. Specifically, the tote query may represent a request to relocate at least one tote from at least one tote starting position to at least one tote ending position. In some embodiments, the tote ending position represents one or more egress point(s) associated with the modular superstructure. In other embodiments, the tote ending position may represent any other desired relocation point to which a tote should be moved. The tote starting position(s) and/or tote ending position(s) may be represented in any of a myriad of manners. For example, in some embodiments, a tote starting position and/or tote ending position is represented as an index (e.g., row/column/depth), a location identifier, an absolute or relative location within the modular superstructure, and/or the like.

In some embodiments, a tote query indicates a single tote to be repositioned from a particular, single tote starting position to a particular, single tote ending position. Alternatively or additionally, in some embodiments, a tote query indicates multiple totes to be repositioned from multiple tote starting positions to a particular, single tote ending position. Alternatively or additionally, in some embodiments, a tote query indicates multiple totes to be repositioned from multiple tote starting positions to multiple tote ending positions. Alternatively or additionally, in some embodiments, a tote query indicates a single tote to be repositioned to any of multiple tote ending positions. It will be appreciated that in some embodiments, any tote may be relocated to any identified tote ending position. Alternatively, or additionally, in some embodiments a tote is associated with a particular tote ending position.

At operation 3906, the process 3900 includes computing, utilizing a sliding A* algorithm and the data graph matrix, at least one tote movement path to relocate the at least one tote. In some embodiments, the at least one tote movement path represents a set of rack operations (e.g., movement(s), operation(s), and/or other action(s) to be performed by particular smart rack(s) of the modular superstructure) for relocating the at least one tote in accordance with the at least one tote query. In some embodiments, the sliding A* algorithm includes executing an implementation of the A* pathfinder algorithm to determine a tote movement path that routes each of the at least one tote from its tote starting position to a closest tote ending position. In some embodiments, the closest tote ending position is determined based on movement resistance value(s) between the tote starting position and the tote ending position, for example utilizing the A* pathfinder algorithm. In some embodiments, the closest tote ending position is determined utilizing a heuristic or other algorithm, such that the A* pathfinder algorithm may be executed from the tote starting position to the closest tote ending position.

In some embodiments, the sliding A* algorithm advantageously utilizes one or more subsequent implementations of an A* pathfinder algorithm. For example, in some embodiments, the sliding A* algorithm executes one or more additional A* pathfinder algorithm to reposition totes that fill smart racks within the tote movement path identified as best for the at least one tote queried to be relocated. Advantageously, such embodiments efficiently relocate such totes with minimal resistance.

Non-limiting examples of a sliding A* algorithm are described herein with respect to FIG. 38. Additional and/or alternative details with respect to the sliding A* algorithm are described herein with respect to FIGS. 39-44 herein.

At operation 3908, the process 3900 includes generating a tote plan based at least in part on the at least one tote movement path. In some embodiments the tote plan represents a movement plan of rack operations for relocating the at least one tote in the modular superstructure from tote starting positions embodying the tote(s) current position(s) to the tote ending position(s). In some embodiments, the tote plan embodies a file, data stream, instruction set, or other structured data representation of the rack operation(s) to be performed. In one example context, the tote plan embodies a human-readable configuration file that includes human-readable instructions for performing tote operations embodying or associated with at least one tote movement path, for example a JSON file that includes JSON instructions for performing the tote operations embodying or associated with the at least one tote movement path. In some embodiments, the tote plan embodies machine-readable data embodying or associated with such at least one tote movement path. In other embodiments, the tote plan embodies hardware-specific instructions for controlling one or more smart rack(s) directly. It will be appreciated that the tote plan may be generated in any of a myriad of desired data format(s).

At operation 3910, the process 3900 includes outputting the tote plan. In some embodiments, the tote plan is output as a file and stored to a data repository/plurality of data repositories, transmitted to one or more external system(s), and/or the like. Alternatively or additionally, in some embodiments, the tote plan is output by outputting particular portion(s) of the tote plan to one or more smart rack(s), for example by outputting each portion of the tote plan representing particular rack operation(s) to the particular smart rack to perform said rack operation(s) to cause initiation of the rack operation(s). In some embodiments, the tote plan is performed serially with one or more other tote plan(s), and/or in parallel in some embodiments where operations of distinct tote plans may be performed without impeding one another.

Figure 40:
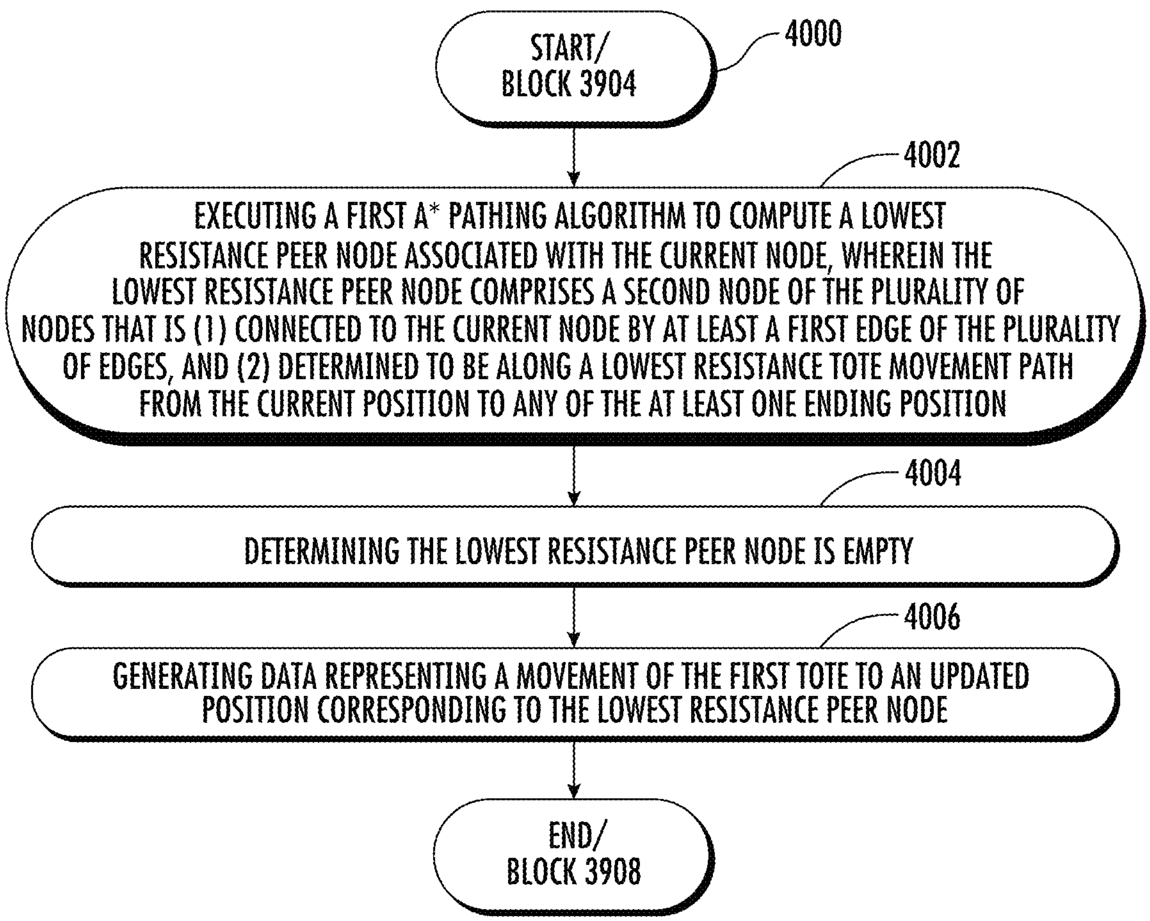
FIG. 40 illustrates a flowchart depicting operations of an example process for generating data movement of a tote to a currently empty in at least some example embodiments of the present disclosure.

FIG. 40 illustrates a flowchart depicting operations of an example process for generating data movement of a tote to a currently empty in at least some example embodiments of the present disclosure. Specifically, FIG. 40 depicts an example process 4000. The process 4000 is performable by any number of computing device(s) as described herein, for example embodiment in hardware, software, firmware, and/or any combination thereof. In some embodiments, the apparatus 2300 includes the various circuitry as means for performing each operation of the process 4000.

In some embodiments, the process 4000 embodies a sub-process of one or more process(es) depicted and/or described herein. In some embodiments, the process 4000 embodies a sub-process of the process 3900. For example, in some embodiments, the process 4000 embodies a sub-process for computing at least one movement path to relocate at least one tote utilizing a sliding A* algorithm and the data graph matrix. In this regard, it will be appreciated that the process 4000 may replace, and/or supplement, one or more of the operations of such process(es) herein. Additionally, or alternatively, in some embodiments, flow returns to another process upon completion of the operations of process 4000.

At operation 4002, the process 4000 includes executing a first A* pathfinder algorithm. The A* pathfinder algorithm is executed to compute a lowest resistance peer node associated with the current node. In some such embodiments, the lowest resistance peer node is a different, unvisited node of the plurality of nodes that is connected to the current node by at least a first edge. Additionally, or alternatively, in some embodiments the lowest resistance peer node is determined to be along a lowest resistance tote movement path from the current position to any of the least one ending position. It will be appreciated that, in some embodiments, the A* pathfinder algorithm is executed based on the edges connecting the various nodes to determine the path from the current position (e.g., corresponding to the current node in the plurality of nodes defining the data graph matrix) to any of the at least one ending position based at least in part on the edges connecting the various node(s). In some embodiments, the first A* pathfinder algorithm is executed utilizing the current position and a particular ending position determined to be closest to the current position based at least in part on one or more algorithm(s), heuristic(s), and/or the like. It will be appreciated that the lowest resistance peer node is determinable based on the first edge connecting the current node to a subsequent node in the lowest resistance tote movement path determined via the first A* pathfinder algorithm.

At operation 4004, the process 4000 includes determining the lowest resistance peer node is empty. In some embodiments, the current node includes peer information utilized to determine status data representing a status of the lowest resistance peer node. In some embodiments, the current status data for the lowest resistance peer node is compared to an empty status, wherein a match indicates that the lowest resistance peer node corresponds to a currently empty smart rack (e.g., currently not storing, holding, and/or otherwise manipulating a tote). In some embodiments, the current node utilizes stored peer information to query for the current status data associated with the lowest resistance peer node.

At operation 4006, the process 4000 includes generating data representing a movement of the first tote to an updated position corresponding to the lowest resistance peer node. In some embodiments, the tote may be swapped, slid, or otherwise relocated to a smart rack corresponding to the corresponding lowest resistance peer node. In this regard, the tote may advantageously be moved without additional relocating of a tote already filling the lowest resistance peer node, advantageously increasing the throughput for movement of the first tote. In some embodiments, in a circumstance where another tote is filling the smart rack corresponding to the lowest resistance peer node, it is advantageous to efficiently move the other tote to a temporary position to enable the first tote to continue along the determined tote movement path. In this regard, one or more of such other tote(s) may be repositioned in accordance with the methodology described with respect to FIG. 41 herein.

Figure 41:
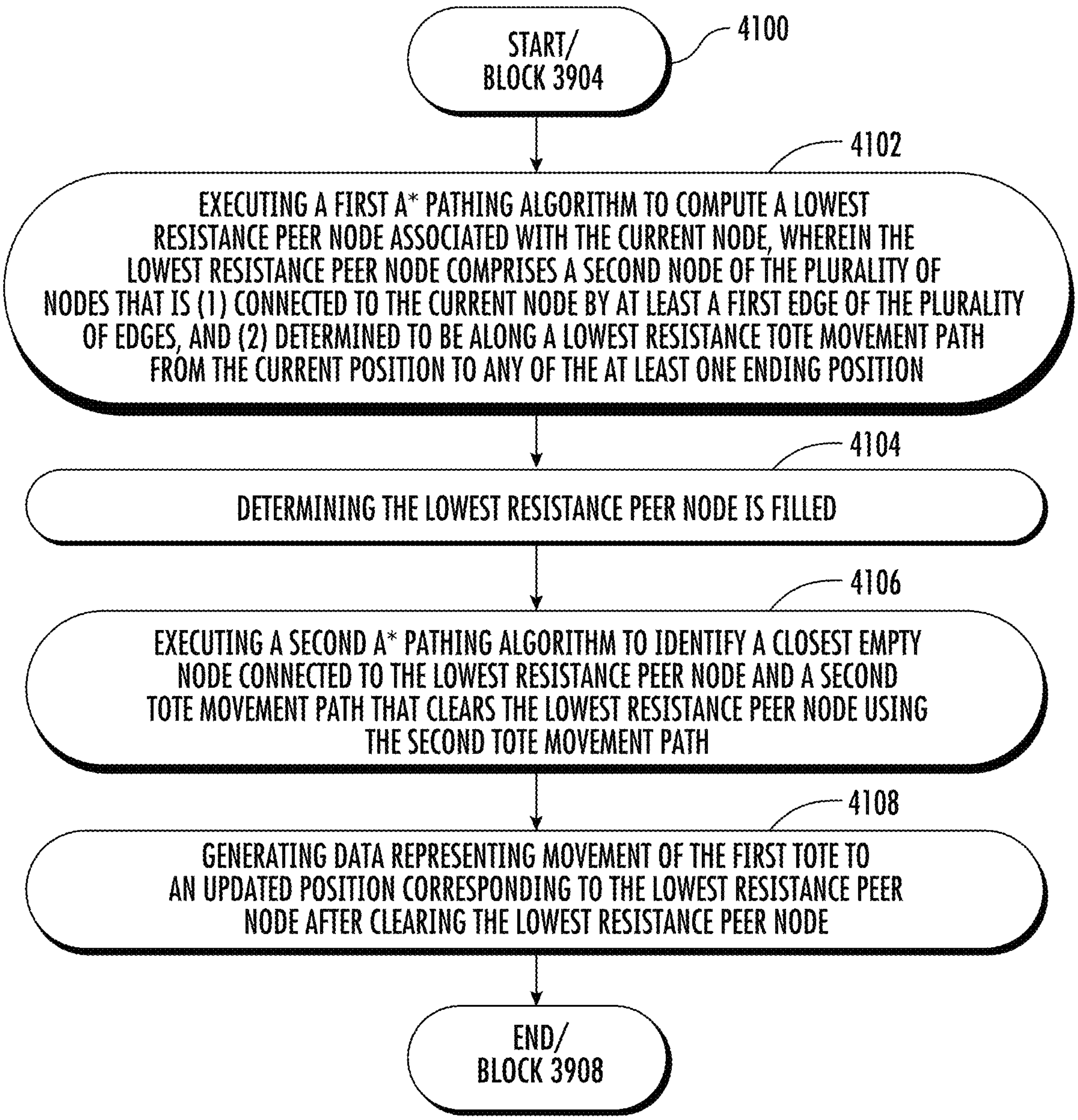
FIG. 41 illustrates a flowchart depicting operations of an example process for movement of a tote to a currently filled position in accordance with at least some example embodiments of the present disclosure.

FIG. 41 illustrates a flowchart depicting operations of an example process for movement of a tote to a currently filled position in accordance with at least some example embodiments of the present disclosure. Specifically, FIG. 41 depicts an example process 4100. The process 4100 is performable by any number of computing device(s) as described herein, for example embodiment in hardware, software, firmware, and/or any combination thereof. In some embodiments, the apparatus 2300 includes the various circuitry as means for performing each operation of the process 4100.

In some embodiments, the process 4100 embodies a sub-process of one or more process(es) depicted and/or described herein. In some embodiments, the process 4100 embodies a sub-process of the process 3900. For example, in some embodiments, the process 4100 embodies a sub-process for computing at least one movement path to relocate at least one tote utilizing a sliding A* algorithm and the data graph matrix. In this regard, it will be appreciated that the process 4100 may replace, and/or supplement, one or more of the operations of such process(es) herein. Additionally, or alternatively, in some embodiments, flow returns to another process upon completion of the operations of process 4100.

At operation 4102, the process 4100 includes executing a first A* pathfinder algorithm. The A* pathfinder algorithm is executed to compute a lowest resistance peer node associated with the current node. In some such embodiments, the lowest resistance peer node is a different, unvisited node of the plurality of nodes that is connected to the current node by at least a first edge. Additionally, or alternatively, in some embodiments the lowest resistance peer node is determined to be along a lowest resistance tote movement path from the current position to any of the least one ending position. It will be appreciated that, in some embodiments, the A* pathfinder algorithm is executed based on the edges connecting the various nodes to determine the path from the current position (e.g., corresponding to the current node in the plurality of nodes defining the data graph matrix) to any of the at least one ending position based at least in part on the edges connecting the various node(s). In some embodiments, the first A* pathfinder algorithm is executed utilizing the current position and a particular ending position determined to be closest to the current position based at least in part on one or more algorithm(s), heuristic(s), and/or the like. It will be appreciated that the lowest resistance peer node is determinable based on the first edge connecting the current node to a subsequent node in the lowest resistance tote movement path determined via the first A* pathfinder algorithm.

At operation 4104, the process 4100 includes determining the lowest resistance peer node is filled. In some embodiments, the current node includes peer information utilized to determine status data representing a status of the lowest resistance peer node. In some embodiments, the current status data for the lowest resistance peer node is compared to an occupied (or filled) status, wherein a match indicates that the lowest resistance peer node corresponds to a currently filled smart rack (e.g., currently storing, holding, or otherwise manipulating a tote). In some embodiments, the current node utilizes stored peer information to query for the current status data associated with the lowest resistance peer node.

At operation 4106, the process 4100 includes executing a second A* pathfinder algorithm to identify a closest empty node connected to the lowest resistance peer node and a second tote movement path. In some embodiments, the second tote movement path embodies a lowest resistance determined for moving a tote from the lowest resistance peer node, which is determined to be filled with a tote) to an empty space. In this regard, the second tote movement path may be used as a path that clears the lowest resistance peer node utilizing low-resistance movements. It will be appreciated that in some embodiments, the closest empty node in some embodiments is determined utilizing the second A* pathfinder algorithm, for example as the second A* pathfinder algorithm proceeds along a frontier to search for empty nodes (e.g., nodes associated with state data representing an empty state). Alternatively, or additionally, in some embodiments, the nearest empty node is determined utilizing known data, another algorithm, a heuristic, and/or the like, such that the second A* pathfinder algorithm may be utilized to generate the lowest resistance movement path to the closest empty node from the lowest resistance peer node.

At operation 4108, the process 4100 includes generating data representing movement of the first tote to an updated position corresponding to the lowest resistance peer node after clearing the lowest resistance peer node. In this regard, the lowest resistance peer node may become empty by relocating the tote in the smart rack associated with the lowest resistance peer node (and/or one or more additional nodes) along the second tote movement path to fill the smart rack associated with the closest empty node. Upon clearing the lowest resistance peer node, the original tote to be moved to the at least one ending position may continue to be relocated without impediment.

Figure 42:
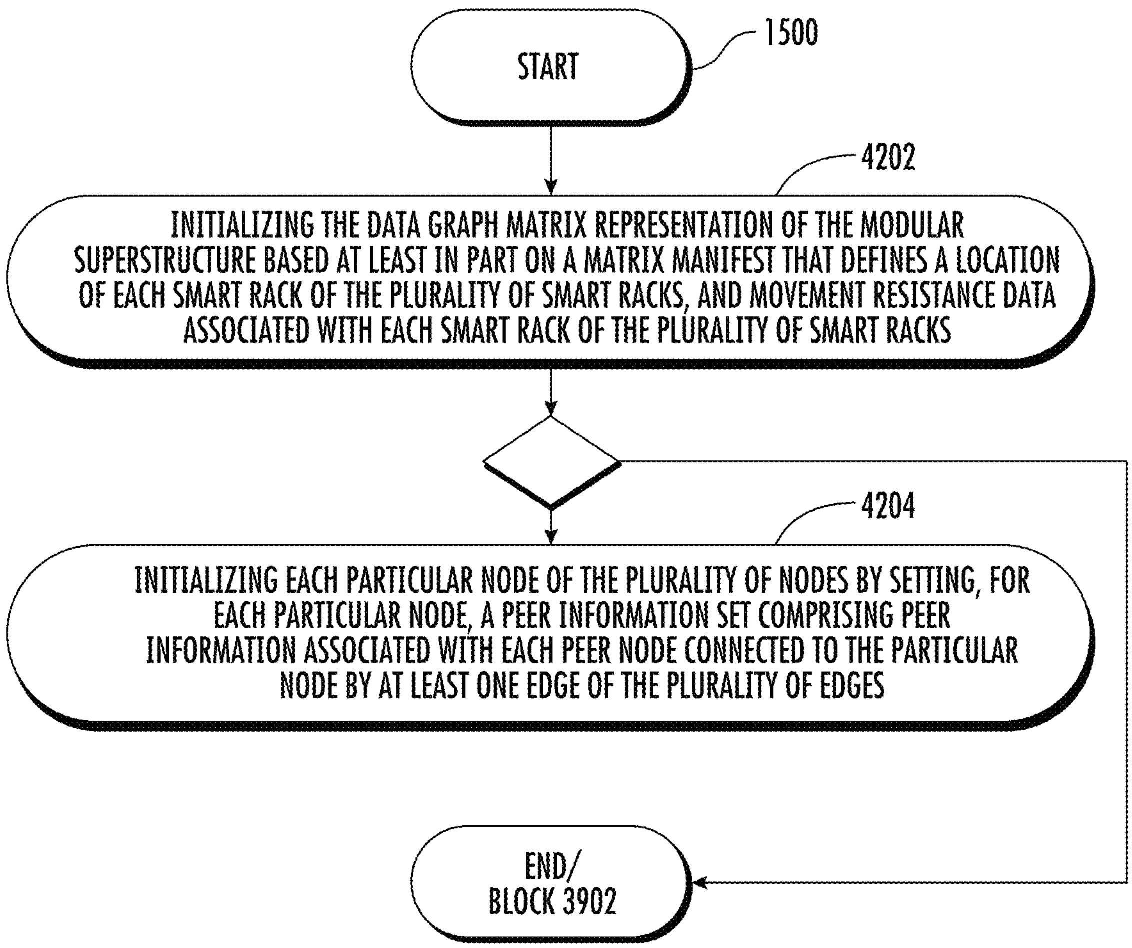
FIG. 42 illustrates a flowchart depicting operations of an example process for initializing a data graph matrix representation of a modular structure in accordance with at least some example embodiments of the present disclosure.

FIG. 42 illustrates a flowchart depicting operations of an example process for initializing a data graph matrix representation of a modular structure in accordance with at least some example embodiments of the present disclosure. Specifically, FIG. 42 depicts an example process 4200. The process 4200 is performable by any number of computing device(s) as described herein, for example embodiment in hardware, software, firmware, and/or any combination thereof. In some embodiments, the apparatus 2300 includes the various circuitry as means for performing each operation of the process 4200.

In some embodiments, the process 4200 embodies a sub-process of one or more process(es) depicted and/or described herein. In some embodiments, the process 4200 embodies a sub-process of the process 3900. For example, in some embodiments, the process 4200 embodies a sub-process for identifying a data graph matrix representation of a modular superstructure. In this regard, it will be appreciated that the process 4200 may replace, and/or supplement, one or more of the operations of such process(es) herein. Additionally, or alternatively, in some embodiments, flow returns to another process upon completion of the operations of process 4200.

At operation 4202, the process 4200 includes initializing a data graph matrix representation of the modular superstructure based at least in part on a matrix manifest. In some embodiments, the matrix manifest comprises one or more data files stored locally, at a remote server, and/or the like. Alternatively or additionally, in some embodiments, the matrix manifest comprises one or more data record(s) stored to a data repository.

The matrix manifest may define a myriad of data properties and/or configuration(s) of the modular superstructure. In some embodiments, the matrix manifest defines a location of each smart rack of the plurality of smart racks. For example, in some embodiments, the matrix manifest defines a physical location, multi-dimensional index (e.g., a 2D index such as row/column or a 3D index such as row/column/depth), and/or other position representing the location of a smart rack within the modular superstructure. It will be appreciated that the matrix manifest in some embodiments includes other contextual data associated with the modular superstructure, for example location(s) of hole(s) in the modular superstructure, position(s) representing egress point(s) from the modular superstructure, and/or the like.

Additionally, or alternatively, in some embodiments, the matrix manifest includes movement resistance data. In some embodiments, the matrix manifest defines movement resistance data associated with each smart rack of the plurality of smart racks within a particular modular superstructure. The movement resistance data in some embodiments represents a resistance value for moving a tote via the smart rack represented by a particular node. In some embodiments, the movement resistance data for a particular smart rack is defined for each direction in which a tote may be moved via the smart rack. For example, in one example context, a smart rack is configured to move a tote potentially in any cartesian direction (e.g., left, right, forward, backwards, up, down), and the movement resistance data represents a movement resistance value for some or all of such directions. In some embodiments, each portion of the movement resistance data includes a clock time for the corresponding smart rack to move the tote in a particular direction (e.g., in seconds, milliseconds, and/or the like), such that a higher clock time represents a higher resistance. In other embodiments, the movement resistance data represents another data property and/or cost associated with the smart rack moving a tote. Non-limiting examples of movement resistance data includes a power consumption, a clock time, a resource cost, and/or the like.

In some embodiments, the process 4200 ends upon completion of operation 4202. In other embodiments, the process continues to operation 4204 upon completion of operation 4202.

At operation 4204, the process 4200 includes initializing each particular node of the plurality of nodes. In some embodiments, each particular node of the plurality of nodes is initialized by setting, for each particular node, a peer information set comprising peer information associated with each peer node connected to the particular node by at least one edge of a plurality of edges. For example, in some embodiments, the peer information indicates a node identifier for a peer node connected to the particular node. Additionally, or alternatively, in some embodiments, the peer information includes a movement resistance value for moving a tote from the particular node towards a particular peer node. Additionally, or alternatively, in some embodiments, the peer information includes behavior data indicating a behavior of the operation of the peer node (e.g., indicating whether the peer node is a smart rack configured to perform in a particular manner, a hole that is not accessible for relocating totes, and/or the like).

Figure 43:
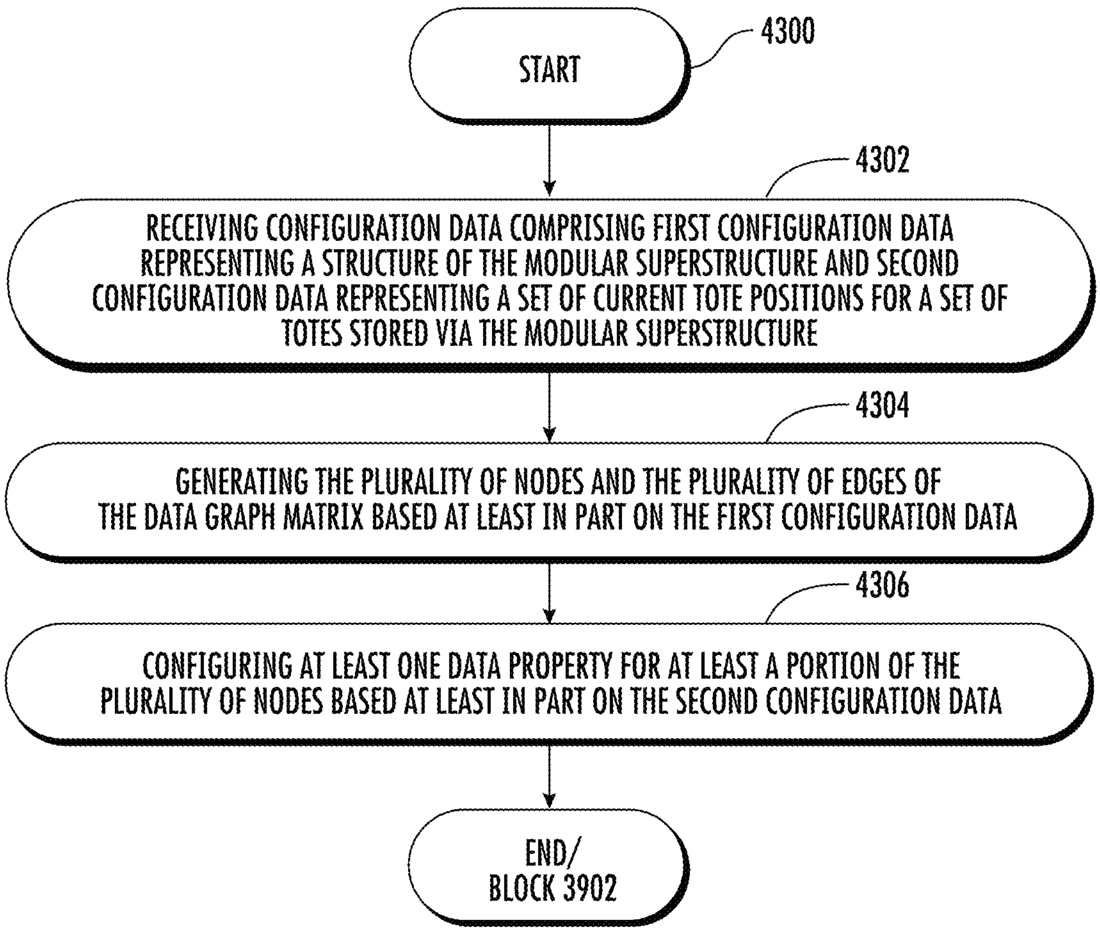
FIG. 43 illustrates a flowchart depicting operations of an example process for configuring a plurality of nodes and edges from configuration data in accordance with at least some example embodiments of the present disclosure.

FIG. 43 illustrates a flowchart depicting operations of an example process for configuring a plurality of nodes and edges from configuration data in accordance with at least some example embodiments of the present disclosure. Specifically, FIG. 43 depicts an example process 4300. The process 4300 is performable by any number of computing device(s) as described herein, for example embodiment in hardware, software, firmware, and/or any combination thereof. In some embodiments, the apparatus 2300 includes the various circuitry as means for performing each operation of the process 4300.

In some embodiments, the process 4300 embodies a sub-process of one or more process(es) depicted and/or described herein. In some embodiments, the process 4300 embodies a sub-process of the process 3900. For example, in some embodiments, the process 4300 embodies a sub-process for identifying a data graph matrix representation of a modular superstructure. In this regard, it will be appreciated that the process 4300 may replace, and/or supplement, one or more of the operations of such process(es) herein. Additionally, or alternatively, in some embodiments, flow returns to another process upon completion of the operations of process 4300.

At operation 4302, the process 4300 includes reading configuration data. In some embodiments, the reading configuration data is read from a manifest file. In some embodiments, the configuration data is retrieved from a datastore for a particular location, identifier, and/or the like.

In some embodiments, the configuration data includes first configuration data representing a structure of a modular superstructure. In some embodiments for example, such data includes a height, width, and/or depth of the modular superstructure. In other embodiments, such data includes locations of smart racks of a modular superstructure, and/or locations of hole(s) and/or other configuration elements of the modular superstructure.

In some embodiments, the configuration data includes second configuration data representing a set of current tote positions for a set of totes stored via the modular superstructure. In some embodiments, the second configuration data includes an index or identifier associated with a smart rack in the modular superstructure, indicating that a particular tote is stored in that smart rack. Alternatively, or additionally, in some embodiments, the second configuration data includes a position (e.g., a row and/or a column) indicating the location of a smart rack where a tote is located. In some embodiments, the second configuration data includes a tote identifier that uniquely represents the particular tote at a particular position in the particular smart rack.

At operation 4304, the process 4300 includes generating the plurality of nodes and the plurality of edges of the data graph matrix based at least in part on the first configuration data. In some embodiments, the plurality of nodes includes a node representing each smart rack in the modular superstructure. Additionally, or alternatively, in some embodiments, the plurality of nodes includes a node for other spaces, holes, and/or other elements associated with the structure of the modular superstructure. For example, in some embodiments, the plurality of nodes is configured to represent a grid of particular dimensions (e.g., a height and width), with each node configured to represent a hole, a smart rack, and/or another element. In this regard, it will be appreciated that one or more node(s) may represent elements that are not physical subcomponents of the modular superstructure, but provide context to the physical structure of the modular superstructure.

At operation 4306 includes configuring at least one data property for at least a portion of the plurality of nodes based at least in part on the second configuration data. In some embodiments, for example, the second configuration data is utilized to set state data representing a current state of each node. In some embodiments, the state data indicates whether a particular node is associated with an empty state (e.g., indicating that the corresponding smart rack is empty) or an occupied state (e.g., indicating that the corresponding smart rack is occupied/filled). In this regard, it will be appreciated that the nodes may be arranged in a particular arrangement and/or assigned particular location identifier(s) or index(s) that enable determination of a state of a particular node based on a portion of the second configuration data associated therewith.

Figure 44:
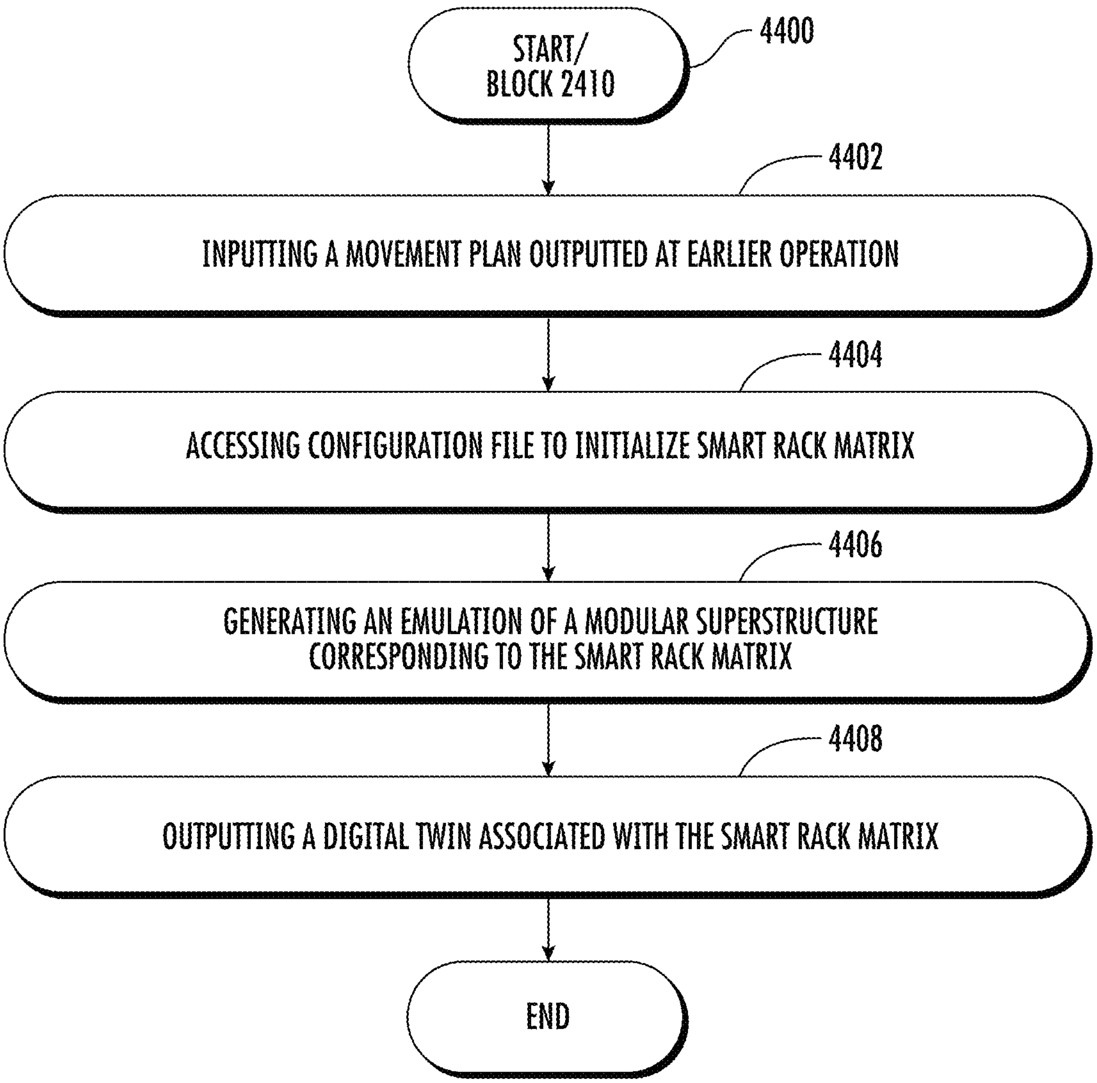
FIG. 44 illustrates a flowchart depicting operations of an example process in accordance with at least some example embodiments of the present disclosure.

FIG. 44 illustrates a flowchart depicting operations of an example process for emulating a modular superstructure in accordance with at least some example embodiments of the present disclosure. Specifically, FIG. 44 depicts an example process 4400. The process 4400 is performable by any number of computing device(s) as described herein, for example embodiment in hardware, software, firmware, and/or any combination thereof. In some embodiments, the apparatus 2300 includes the various circuitry as means for performing each operation of the process 4400.

In some embodiments, the process 4400 embodies a sub-process of one or more process(es) depicted and/or described herein. In some embodiments, the process 4400 embodies a sub-process of the process 2400. For example, in some embodiments, the process 4400 embodies a sub-process for outputting a movement plan (e.g., a tote plan). In this regard, it will be appreciated that the process 4400 may replace, and/or supplement, one or more of the operations of such process(es) herein. Additionally, or alternatively, in some embodiments, flow returns to another process upon completion of the operations of process 4400.

At operation 4402, the process 4400 includes inputting a movement plan outputted at an earlier operation. In some embodiments, the inputted movement plan is received as output at operation 2410. In other embodiments, a movement plan is outputted and stored, such that it is subsequently retrieved and inputted. A movement plan (e.g., a tote plan) may be inputted automatically upon output, in response to user input selecting the movement plan, and/or the like.

At operation 4404, the process 4400 includes accessing configuration file to initialize a smart rack matrix. In some embodiments, the configuration file embodies a smart matrix manifest and/or other file that represents at least the structure (e.g., a physical configuration and/or connections thereof) of smart racks within a modular superstructure. In some embodiments, the configuration file is received from a server, data repository, and/or the like. In some embodiments, the configuration file is stored locally by a particular computing device, system, data repository, and/or the like. It will be appreciated that, in some embodiments, a configuration file comprises or is defined by a plurality of sub-files that each include particular portions of the configuration of a modular superstructure.

In some embodiments, the smart rack matrix is initialized as data that represents each smart rack in the modular superstructure, a physical design and/or configuration of the modular superstructure, and/or connection(s) between the smart rack(s) in the modular superstructure. For example, in some embodiments, the peer information indicates peer smart rack(s) associated with a particular smart rack (e.g., peer smart rack identifier) that may be subsequently used to quickly identify the data associated with a peer of a particular smart rack. Additionally, or alternatively, in some embodiments, the peer information includes movement resistance value(s) for moving to a particular peer, whether movement towards a particular peer is possible, whether movement from a particular peer is possible, and/or the like. In some embodiments, the smart rack matrix is initialized as a data graph matrix comprising a plurality of nodes and edges, as described herein.

At operation 4406, the process 4400 includes generating an emulation of a modular superstructure corresponding to the smart rack matrix. In some embodiments, the emulation of the modular superstructure embodies digital representations of the various components or subunits (e.g., smart racks) of the modular superstructure with simulated operations of such digital representations configured to mimic real-world operations of the modular superstructure. In this regard, it will be appreciated that the emulation may include the same structure of the corresponding real-world modular superstructure based on the initialized smart rack matrix. Additionally, in some embodiments, the apparatus 2300 initiates the emulation to execute the movement plan. In this regard, the emulation may continue to simulate execution of the instructions represented in the movement plan, and generate simulated data based on such digital execution. For example, in some embodiments, the emulation initiates rack operations based on the inputted movement plan, such that the results of such rack operations may be visualized via the emulation. In some embodiments, the system and/or a user adjusts the movement plan based on the data resulting from the emulation, and/or the movement plan may be executed via the corresponding real-world modular superstructure based on the results of the emulation. In some embodiments, the emulation is generated in an emulation environment that similarly emulates one or more physical conditions of the real-world environment associated with the corresponding modular superstructure (e.g., via a physics engine). In one example context, the Blender open source software provided by the Blender Foundation is utilized to generate and/or output the emulation. In another example, Blender is utilized to export 3D objects to HTML.

At optional operation 4408, the process 4400 includes outputting a digital twin associated with the smart rack matrix. The digital twin in some embodiments similarly embodies a digital representation of the real-world modular superstructure represented by the smart rack matrix. In some embodiments, the digital twin is output utilizing only the smart rack matrix to configure the digital twin accordingly. Additionally, or alternatively, in some embodiments, the digital twin is output utilizing the smart rack matrix and data from the emulation. For example, in some embodiments, the digital twin is generated utilizing image data at one or more time slice(s) as generated via the emulation and inputted for use in generating the digital twin. In some embodiments, the digital twin provides an adaptable or generic view of the smart racks of the modular superstructure as they operate in the real world and/or via the emulation. In some embodiments, one or more aspects of the digital twin is/are configurable separate from the emulation and/or the real-world modular superstructure. In some embodiments, the digital twin may be altered to generate an updated smart rack matrix, or other digitally emulated modular superstructure design, for testing as compared to the existing real-world modular superstructure and/or existing emulations. Alternatively or additionally, in some embodiments, the digital twin's clock can be advanced into the future to identify issues, make corrections associated with operation of the modular superstructure, and/or utilize actionable insights derived from data produced by the digital twin or observed by the digital twin, in real-time to adjust and/or improve real-world behavior automatically (e.g., in real-time) or upon determined updates.

In some embodiments, a feedback loop is generated to correct, resolve, or otherwise address malfunctions or otherwise sub-optimal conditions (e.g., in operation of a modular superstructure). Alternatively or additionally, another feedback look may be generated that allows one or more scenario(s) to be run to present KPIs based on varying factors including, but not limited to, fungibility, throughput, and/or power consumption. Such feedback loops may be performed via emulation and/or digital twin. In some embodiments, one or more aspects of the modular superstructure may be updated automatically, or via user interaction, in response to data produced via the feedback loop (e.g., KPIs tested in a first given scenario versus KPIs in a second scenario).

In a circumstance where multiple systems operate in conjunction with one another, the systems must utilize particular data communications to accomplish such operations. By transmitting data communications between one another, such systems are capable of informing one another of ongoing actions, working in conjunction with one another to accomplish an operation, and/or simply to propagate data throughout an overarching system.

A modular superstructure must be able to communicate data transmissions for a myriad of purposes. A control system (a "controller") must be able to initiate message(s) to one or more smart rack(s) to accomplish a particular goal, for example to transport a tote from one location to another using various smart racks of the modular superstructure. Similarly, smart racks may communicate with one another to facilitate a particular operation as part of the particular goal.

At the same time, operation of a modular superstructure—and more particularly the individual smart racks therein—may deviate or differ from expectation for any of a myriad of reasons. It is desirable to monitor the operation of smart racks in a modular superstructure to monitor operation of such smart rack(s), interpret what a physical smart rack is doing, and otherwise track operations of the modular superstructure as a whole so that subsequent determinations, predictions, and/or adjustments to operation, if needed, may be performed.

Particular communication protocols are needed to enable message transmission that facilitates these operations. Specifically, one or more custom communication protocols are required to enable operational messages to be transmitted from a controller and a smart rack and/or between smart racks of a modular superstructure, as well as messages for monitoring operations of the smart racks as they operate. Furthermore, one or more custom communication protocols are required to enable visualization messages to be transmitted that enable rendering of visual effects, metrics monitoring, and/or generation and maintenance of a digital twin for such physical smart racks.

Embodiments of the present disclosure provide for communication protocol(s) that enable transmission of specially configured data transmissions ("messages") that enable coordinated operation between smart racks of a modular superstructure, as well as emulation of a digital representation of the smart racks via a digital twin. Such communication protocol(s) are configured such that these messages include meaningful information utilized for such purposes, such as to provide appropriate insight into the operations of the smart rack(s) for causing a particular action, monitoring the operation of the smart rack(s), and/or visualizing in a digital twin. In this regard, the communication protocol(s) serve as the underlying framework for enabling monitoring and visualization of operations of smart rack(s) for any of a myriad of purposes, including metric logging, operation visualization, and/or simulation modeling.

In some embodiments, a dual-protocol communication framework is utilized. Such a framework includes a general message data format and a digital rendering data format. The general message data format enables messaging to and/or between smart racks for operation and/or monitoring of performed operations in accordance with a particular goal action. The digital rendering data format enables visualization rendering, for example via a digital twin, of physical object(s), movement of physical object(s), and/or the like. Such dual-protocol enables transfer of all information required for monitoring operation, generating, updating, and/or otherwise maintaining a digital twin of a smart rack, modular superstructure of multiple smart racks, and/or the like.

Embodiments of the present disclosure further include particular algorithms, functions, and/or mechanisms for generating, updating, and/or otherwise maintaining a digital twin. Some embodiments utilize particular movement rendering algorithm(s) to depict object motion and/or operation of smart rack(s) in a manner that is interpretable or otherwise meaningful to an end user. For example, some embodiments leverage the communication protocol(s) described herein to generate messages that provide key data points from the physical smart racks for rendering such a movement. These particularly configured data messages of particular data formats may be utilized alone or in combination with configuration data to render objection status and/or motion within the digital twin for a physical smart rack or modular superstructure. In this regard, embodiments of the present disclosure utilize the communication protocol(s) and/or particular algorithm(s) described herein to accurately build and maintain a digital twin embodying a functional, virtual representation of the corresponding physical model(s). Such an accurately-generated digital twin may be utilized for monitoring the physical smart rack(s), metrics reporting, predictive analytics, and/or the like, that can be used to ensure the current operation of the smart rack(s) remains in a working status while predicting future operations and predicting future operational effects and trends without affecting or risking operations of the physical smart rack(s) themselves. Furthermore, as changes to a smart rack and/or modular superstructure of smart racks are contemplated, such changes may be visualized to provide an accurate visualization of how such changes will affect the corresponding physical components without risk to the currently-operating physical implementation of such components.

Figure 45:
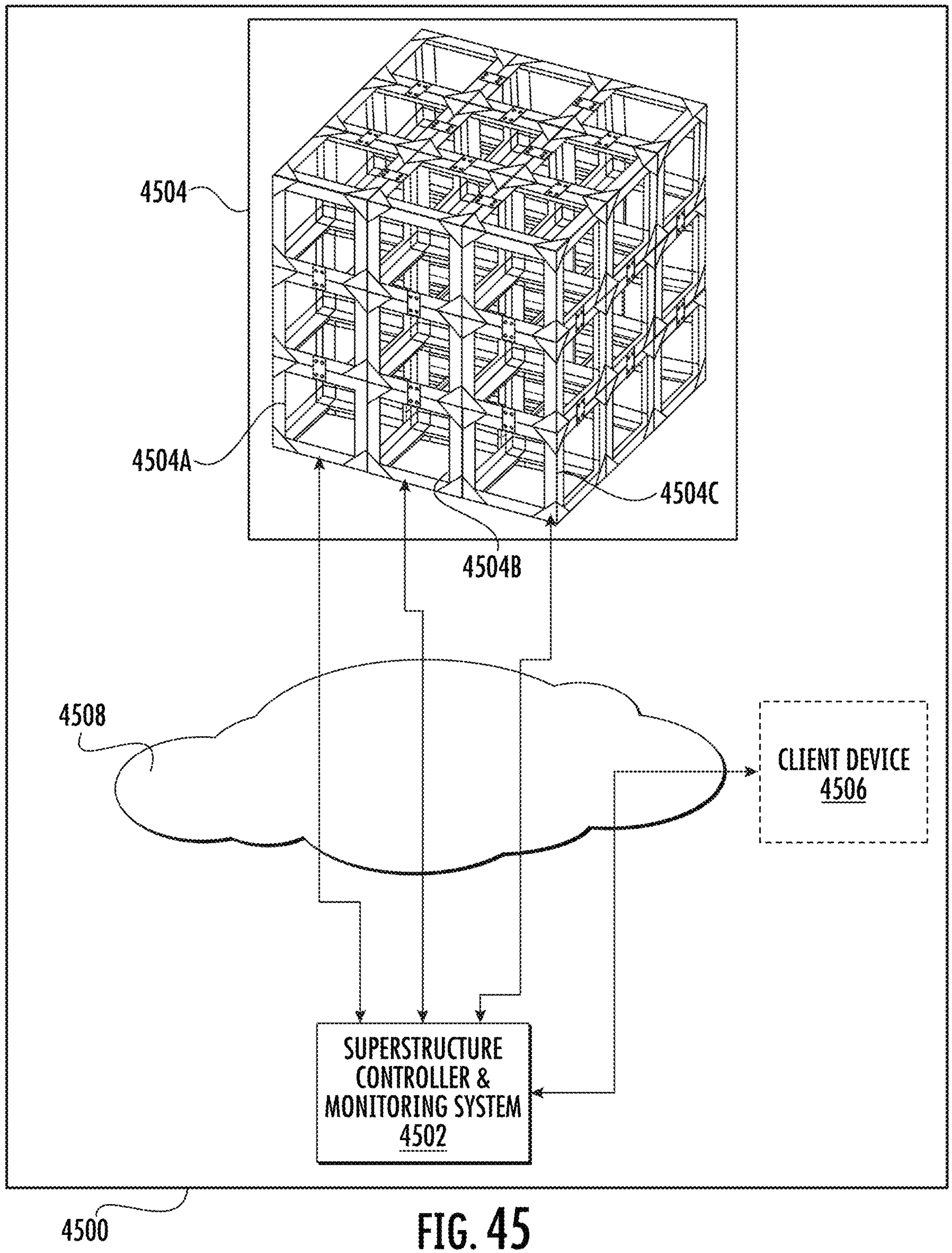
FIG. 45 illustrates a block diagram of a system for modular superstructure monitoring and visualization that may be specially configured within which embodiments of the present disclosure may operate.

FIG. 45 illustrates a block diagram of a system for modular superstructure monitoring and visualization that may be specially configured within which embodiments of the present disclosure may operate. Specifically, FIG. 45 depicts an example system 4500, As illustrated, the system 4500 includes a modular superstructure 4504, a superstructure controller & monitoring system 4502, and an optional client device 4506. In some embodiments, the modular superstructure 4504, the superstructure controller & monitoring system 4502, and/or the client device 4506 are communicable with at least one other computing device of the depicted system 4500 via one or more computing network(s), for example the communications network 4508.

It should be appreciated that the communications network 4508 in some embodiments is embodied in any of a myriad of network configurations. In some embodiments, the communications network 4508 embodies a public network (e.g., the Internet). In some embodiments, the communications network 4508 embodies a private network (e.g., an internal, localized, or closed-off network between particular devices). In some other embodiments, the communications network 4508 embodies a hybrid network (e.g., a network enabling internal communications between particular connected devices and external communications with other devices). The communications network 4508 in some embodiments includes one or more base station(s), relay(s), router(s), switch(es), cell tower(s), communications cable(s) and/or associated routing station(s), and/or the like. In some embodiments, the communications network 4508 includes one or more user controlled computing device(s) (e.g., a user-controlled router and/or modem) and/or one or more external utility devices (e.g., Internet service provider communication tower(s) and/or other device(s)).

Each of the components of the system communicatively coupled to transmit data to and/or receive data from one another over the same or different wireless or wired networks embodying the communications network 4508. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 45 illustrates certain system entities as separate, standalone entities communicating over the communications network 4508, the various embodiments are not limited to this particular architecture. In other embodiments, one or more computing entities share one or more components, hardware, and/or the like, or otherwise are embodied by a single computing device such that connection(s) between the computing entities over the communications network 4508 are altered and/or rendered unnecessary. For example, in some embodiments, a superstructure controller & monitoring system 4502 includes or embodies a client device 4506 utilized to output particular data and/or receive input, such that a separate client device is not required.

In some embodiments, the modular superstructure 4504 embodies a complete structure or a portion of a larger modular superstructure. The modular superstructure 4504 in some embodiments is configured to enable the identification, movement, and/or retrieval of totes positioned within and/or adjacent to the modular superstructure. For example, in some embodiments, the modular superstructure 4504 receives a tote at an ingress point for storage, movement, and/or the like. The modular superstructure 4504 may move the tote to reposition it to a particular location, for example such that it may be stored until needed in a future operation. The modular superstructure 4504 may subsequently reposition the tote for egress from the modular superstructure 4504, for example at a particular egress point. In some embodiments, the modular superstructure 4504 is positioned adjacent to other physical object(s), for example conveyor belt(s), picker robot(s), human operator(s), automated and/or human-controlled forklift(s), and/or the like within the same environment, which place tote(s) for ingress into the modular superstructure 4504 and/or receive tote(s) via egress from the modular superstructure 4504.

As described above, the modular superstructure 104 is configured to allow for the ingress, store, and egress of one or more tote(s), for example where each tote is embodied by a rectangular prism configured to store item(s) within the internal volume of the rectangular prism. To achieve such functions, the example modular superstructure 4504 comprises a plurality of smart racks that are configured to urge and/or otherwise move such tote(s) (e.g., rectangular prism(s)) through the modular superstructure 4504. For example, as illustrated, the modular superstructure 4504 includes a plurality of smart rack(s) including at least smart rack 4504A, smart rack 4504B, and smart rack 4504C. Each of the smart racks 4504A, 4504B, and 4504C may be operated independently. In this regard, the plurality of smart racks may be coordinated or otherwise communicate to operate in conjunction with one another in a manner that accomplishes a particular goal task, for example movement of a tote from a first location of the modular superstructure 4504 to a second location of the modular superstructure 4504.

In some embodiments, the superstructure controller & monitoring system 4502 includes one or more computing device(s) embodied in hardware, software, firmware, and/or a combination thereof. In some embodiments, the superstructure controller & monitoring system 4502 is embodied by a single system. Alternatively or additionally, in some embodiments the superstructure controller & monitoring system 4502 is embodied by a plurality of sub-systems. For example, in some embodiments the superstructure controller & monitoring system 4502 includes a controller system that facilitates control of the modular superstructure 4504, and a separate monitoring system that facilitates monitoring of the modular superstructure 4504 as it operates. The monitoring system may Additionally, or alternatively facilitate visualization based at least in part on the monitored data, for example via a digital twin as described herein, and/or simulation of particular configuration(s) for operation of the modular superstructure 4504 without affecting control of the actual physical smart racks forming the modular superstructure 4504. It should be appreciated that in some embodiments, each of such systems includes further sub-systems that facilitate the different operations, for example a monitoring subsystem that monitors data representing operation of the modular superstructure 4504 and a visualization subsystem that generates, configures, and/or maintains a digital twin associated with the modular superstructure 4504 via a particular rendering view.

In some examples, the superstructure controller & monitoring system 4502 includes or embodies a superstructure controller comprising a controller device (such as, but not limited to, a desktop computer, a laptop computer, and/or the like). In some example embodiments, the superstructure controller may be configured to manage the smart racks of the modular superstructure 4504 to thereby manage movements of the one or more tote(s) (e.g., embodied by rectangular prisms) within the modular superstructure. For example, in some embodiments the superstructure controller is configured to receive or otherwise determine the location of one or more rectangular prisms within a modular infrastructure, for example representing the structure of the modular superstructure 4504. In some examples, the superstructure controller may receive, access, or otherwise determine a tote, such as a target rectangular prism, and an egress point for that tote. In response, the superstructure controller may determine, input, or otherwise execute a tote plan that provides instructions to one or more smart rack(s), such as one or more of the smart racks 4504A, 4504B, and/or 4504C, or the like, to move the rectangular prism embodying the tote in such a way that the rectangular prism traverses the modular superstructure from a current location of the tote to its determined egress point.

In some examples, the superstructure controller may transmit the tote plan to one or more processing circuitries of the one or more smart rack(s) in the modular superstructure 4504. In some embodiments, the tote plan may comprise one or more movement instructions for the one or more smart rack(s). In some embodiments, each of the one or more movement instructions may indicate a movement of a rectangular prism. In some embodiments, to execute these movement instructions, the one or more smart racks may transmit one or more specially configured transmission(s) embodying message(s) to one another, and may cause one or more arms of one or more rack actuator(s) to move the rectangular prism in accordance with the movement instructions. For example, in some embodiments the rectangular prism may be moved by a smart rack in an up, down, left, right, forward, or backward direction in accordance with the tote's intended movement based at least in part on the tote plan.

In some embodiments, the communications between the superstructure controller & monitoring system 4502 and the modular superstructure 4504 are specially configured to enable such systems to effectively communicate with one another. For example, in some embodiments, the superstructure controller & monitoring system 4502 communicates with one or more smart rack(s) of the modular superstructure 4504 using a particular communications protocol. The particular communications protocol, in some embodiments, is embodied by a general message data format that enables transmission of instructions, commands, and/or other data in a particular structure between such system(s). Additionally, or alternatively, in some embodiments the smart racks of the modular superstructure 4504 are configured to generate, transmit, receive, and/or process message(s) of the general message data format to enable inter-communication between the smart racks themselves (e.g., independent from the superstructure controller & monitoring system 4502. In this regard, in some embodiments the general message data format defines a particular common language that is utilized for all systems to communicate particular instructions, commands, and/or data between one another. Additional details regarding example general message data formats are further described herein.

Additionally, or alternatively, in some embodiments, the superstructure controller & monitoring system 4502 and the modular superstructure 4504 communicate via one or more message(s) transmitted in accordance with a second communications protocol. The second communications protocol may enable transmission of specially configured data transmission(s) utilized for visualization via a digital twin, reconfiguration of a digital twin, and/or other monitoring and/or visualization purposes. The particular second communications protocol, in some embodiments, is embodied by a digital rendering data format that enables transmission of data between the smart racks of the modular superstructure 4504 and the superstructure controller & monitoring system 4502, and/or between smart racks of the modular superstructure 4504, such that the data may be utilized for visualization via virtual object(s) and/or monitoring of the modular superstructure 4504. In this regard, in some embodiments the digital rendering data format defines a particular common language that is utilized for all systems to communicate particular data for visualization and/or other monitoring, for example via a rendering view. Additional details regarding example digital rendering data formats are further described herein.

In some embodiments, the superstructure controller & monitoring system 4502 includes one or more display(s) and/or device(s) that facilitate input and/or output to an end user. For example, in some embodiments, the superstructure controller & monitoring system 4502 includes at least one display that depicts a rendering view. In this regard, as the rendering view is updated (e.g., by making updates to a digital twin embodied in and/or depicted via the rendering view) the display may be utilized by the end user to visualize such updates.

Additionally, or alternatively, in some embodiments, the superstructure controller & monitoring system 4502 communicates with the client device 4506 for providing user input and/or output. In some embodiments, the client device 4506 includes one or more computing device(s) accessible to an end user. In some embodiments, the client device 4506 includes or is embodied by a personal computer, laptop, smartphone, tablet, Internet-of-Things enabled device, smart home device, virtual assistant, alarm system, and/or the like. The client device 4506 Additionally, or alternatively in some embodiments includes or is embodied by a display, visual indicator, audio indicator, and/or the like, for outputting information from the superstructure controller & monitoring system 4502 to the user and/or receiving input from the user for transmission to the superstructure controller & monitoring system 4502. In some embodiments, the client device 4506 executes or otherwise includes a browser application, native application, or other means for accessing and/or communicating with the controller & monitoring system 4502.

Figure 46:
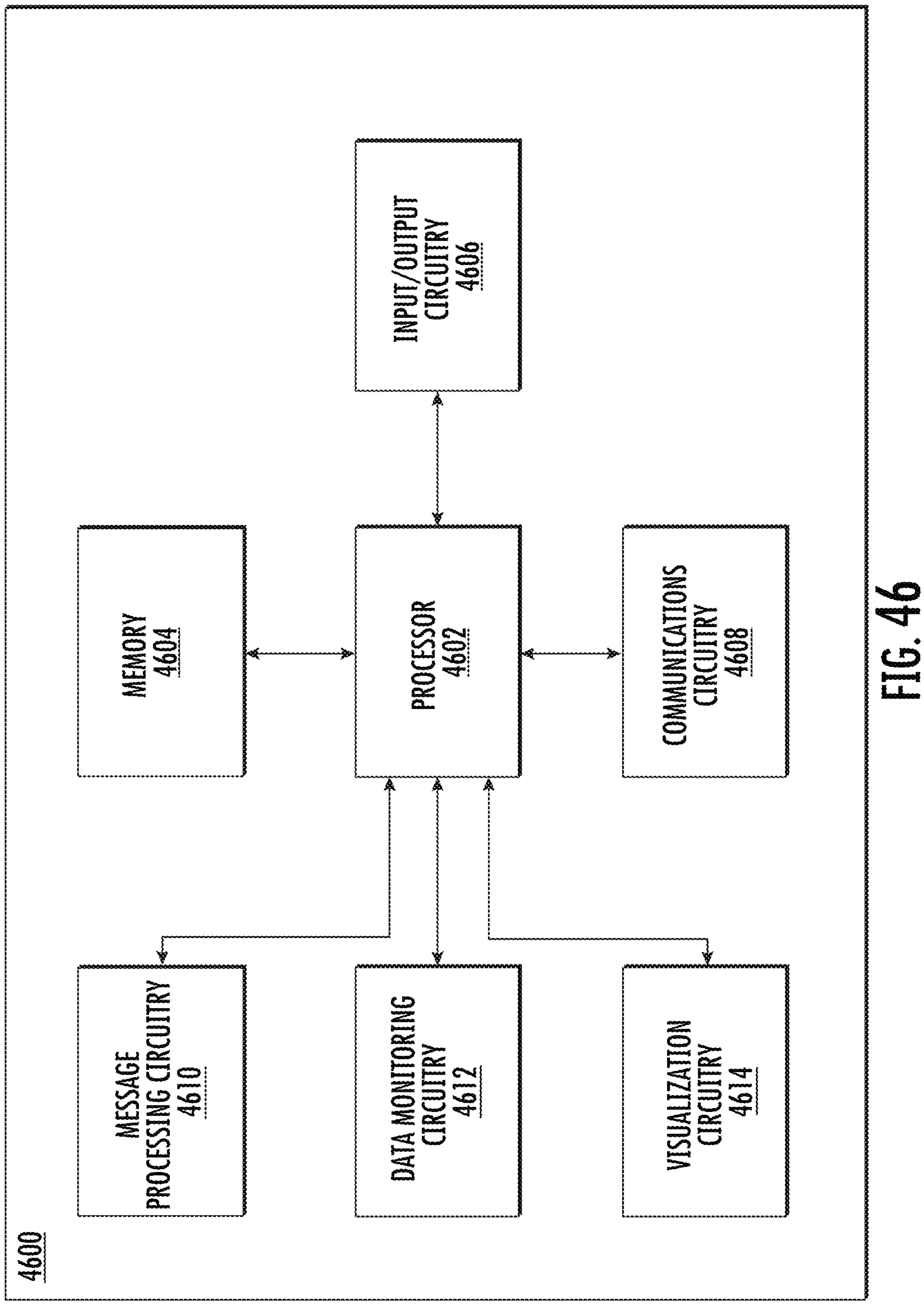
FIG. 46 illustrates a block diagram of an example apparatus for modular superstructure monitoring and visualization that may be specially configured in accordance with at least one example embodiment of the present disclosure.

FIG. 46 illustrates a block diagram of an example apparatus for modular superstructure monitoring and visualization that may be specially configured in accordance with at least one example embodiment of the present disclosure. Specifically, FIG. 46 depicts an example superstructure controller & monitoring apparatus 4600 ("apparatus 4600") specifically configured in accordance with at least some example embodiments of the present disclosure. In some embodiments, the superstructure controller & monitoring system 4502 and/or a subsystem thereof is embodied by one or more system(s), such as the apparatus 4600 as depicted and described in FIG. 46. The apparatus 4600 includes processor 4602, memory 4604, input/output circuitry 4606, communications circuitry 4608, message processing circuitry 4610, data monitoring circuitry 4612, and/or visualization circuitry 4614. In some embodiments, the apparatus 4600 is configured, using one or more of the sets of circuitry 4602, 4604, 4606, 4608, 4610, 4612, and/or 4614, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 4600 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 4600 provide or supplement the functionality of another particular set of circuitry. For example, the processor 4602 in some embodiments provides processing functionality to any of the sets of circuitry, the memory 4604 provides storage functionality to any of the sets of circuitry, the communications circuitry 4608 provides network interface functionality to any of the sets of circuitry, and/or the like.

In some embodiments, the processor 4602 (and/or co-processor or any other processing circuitry assisting or otherwise associated with the processor) is/are in communication with the memory 4604 via a bus for passing information among components of the apparatus 4600. In some embodiments, for example, the memory 4604 is non-transitory and may include, for example, one or more volatile and/or non-volatile memories. In other words, for example, the memory 4604 in some embodiments includes or embodies an electronic storage device (e.g., a computer readable storage medium). In some embodiments, the memory 204 is configured to store information, data, content, applications, instructions, or the like, for enabling the apparatus 4600 to carry out various functions in accordance with example embodiments of the present disclosure.

The processor 4602 may be embodied in a number of different ways. For example, in some example embodiments, the processor 4602 includes one or more processing devices configured to perform independently. Additionally, or alternatively, in some embodiments, the processor 4602 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 4600, and/or one or more remote or "cloud" processor(s) external to the apparatus 4600.

In an example embodiment, the processor 4602 is configured to execute instructions stored in the memory 4604 or otherwise accessible to the processor. Alternatively or additionally, the processor 4602 in some embodiments is configured to execute hard-coded functionality. As such, whether configured by hardware or software methods, or by a combination thereof, the processor 4602 represents an entity (e.g., physically embodied in circuitry) capable of performing operations according to an embodiment of the present disclosure while configured accordingly. Alternatively or additionally, as another example in some example embodiments, when the processor 4602 is embodied as an executor of software instructions, the instructions specifically configure the processor 4602 to perform the algorithms embodied in the specific operations described herein when such instructions are executed.

As one particular example embodiment, the processor 4602 is configured to perform various operations associated with controlling smart racks of a modular superstructure, monitoring operational statuses for smart racks of a modular superstructure, and/or visualizing operational aspects of a modular superstructure. In some embodiments, the processor 4602 includes hardware, software, firmware, and/or a combination thereof, that generates and transmits message(s) in a particular data format to smart rack(s) to initiate action via the smart rack(s). Additionally, or alternatively, in some embodiments, the processor 4602 includes hardware, software, firmware, and/or a combination thereof, that receives message(s) of the same particular data format from smart rack(s) indicating one or more operational status(es) of the smart rack(s) as they function. Such operational status(es) may indicate whether the smart rack is operating normally or undergoing a problem, the health or expected lifetime of one or more component(s) of the smart rack (e.g., a battery life), any detected error(s) in operation of the smart rack, and/or the like. Additionally, or alternatively, in some embodiments, the processor 4602 includes hardware, software, firmware, and/or a combination thereof, that receives message(s) of a different particular data format from smart rack(s) indicating data usable for generating, updating, maintaining, and/or otherwise depicting a digital twin. The digital twin may embody a virtualized version of the physical object(s) embodying and/or that interact with the modular superstructure. Additionally, or alternatively, in some embodiments, the processor 4602 includes hardware, software, firmware, and/or a combination thereof, that configures a rendering view for depiction of a digital twin.

In some embodiments, the apparatus 4600 includes input/output circuitry 4606 that provides output to the user and, in some embodiments, to receive an indication of a user input. In some embodiments, the input/output circuitry 4606 is in communication with the processor 4602 to provide such functionality. The input/output circuitry 4606 may comprise one or more user interface(s) and in some embodiments includes a display that comprises the interface(s) rendered as a web user interface, an application user interface, a user device, a backend system, or the like. In some embodiments, the input/output circuitry 4606 also includes a keyboard, a mouse, a joystick, a touch screen, touch areas, soft keys, a microphone, a speaker, or other input/output mechanisms. The processor 4602 and/or input/output circuitry 4606 comprising the processor may be configured to control one or more functions of one or more user interface elements through computer program instructions (e.g., software and/or firmware) stored on a memory accessible to the processor (e.g., memory 4604, and/or the like). In some embodiments, the input/output circuitry 4606 includes or utilizes a user-facing application to provide input/output functionality to a client device and/or other display associated with a user.

In some embodiments, the apparatus 4600 includes communications circuitry 4608. The communications circuitry 4608 includes any means such as a device or circuitry embodied in either hardware or a combination of hardware and software that is configured to receive and/or transmit data from/to a network and/or any other device, circuitry, or module in communication with the apparatus 4600. In this regard, in some embodiments the communications circuitry 4608 includes, for example, a network interface for enabling communications with a wired or wireless communications network. Additionally, or alternatively in some embodiments, the communications circuitry 4608 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 4608 includes circuitry for interacting with the antenna(s) and/or other hardware or software to cause transmission of signals via the antenna(s) or to handle receipt of signals received via the antenna(s). In some embodiments, the communications circuitry 4608 enables transmission to and/or receipt of data from the user device, one or more asset(s) or accompanying sensor(s), and/or other external computing device in communication with the apparatus 4600.

The message processing circuitry 4610 includes hardware, software, firmware, and/or a combination thereof, that supports generation, transmission, and/or receiving of data message(s) of a particular data format. In some embodiments, the message processing circuitry 4610 includes hardware, software, firmware, and/or a combination thereof, that generates general message(s) in accordance with a general message data format. Additionally, or alternatively, in some embodiments, the message processing circuitry 4610 includes hardware, software, firmware, and/or a combination thereof, that generates a message embodying instructions for executing a tote plan via one or more smart rack(s) of a modular superstructure. Additionally, or alternatively, in some embodiments, the message processing circuitry 4610 includes hardware, software, firmware, and/or a combination thereof, that generates a visualization message in accordance with a digital rendering data format. Additionally, or alternatively, in some embodiments, the message processing circuitry 4610 includes hardware, software, firmware, and/or a combination thereof, that receives and/or extracts data from received message(s) in accordance with a general message data format. Additionally, or alternatively, in some embodiments, the message processing circuitry 4610 includes hardware, software, firmware, and/or a combination thereof, that receives and/or extracts data from received message(s) in accordance with a digital rendering data format. In some embodiments, the message processing circuitry 4610 includes a separate processor, specially configured field programmable gate array (FPGA), or a specially programmed application specific integrated circuit (ASIC).

The data monitoring circuitry 4612 includes hardware, software, firmware, and/or a combination thereof, that supports processing of message(s) for monitoring operation(s) of smart rack(s) of a modular superstructure. For example, in some embodiments, the data monitoring circuitry 4612 includes hardware, software, firmware, and/or a combination thereof, that uses data extracted from received message(s) in a general message data format and/or a digital rendering data format to generate and/or store corresponding log data. Additionally, or alternatively, in some embodiments, the data monitoring circuitry 4612 includes hardware, software, firmware, and/or a combination thereof, that configures one or more virtual object(s) for depicting via a particular rendering view. Additionally, or alternatively, in some embodiments, the data monitoring circuitry 4612 includes hardware, software, firmware, and/or a combination thereof, that derives an error status, monitored status, or other data indicating whether a smart rack is performing normally or as expected based at least in part on received message(s). In some embodiments, the data monitoring circuitry 4612 includes a separate processor, specially configured field programmable gate array (FPGA), or a specially programmed application specific integrated circuit (ASIC).

The visualization circuitry 4614 includes hardware, software, firmware, and/or a combination thereof, that supports various functionality associated with rendering a digital twin via a rendering view. For example, in some embodiments, the visualization circuitry 4614 includes hardware, software, firmware, and/or any combination thereof, that configures a particular rendering view based on static, determinable, and/or received data parameter(s). Additionally, or alternatively, in some embodiments, the visualization circuitry 4614 includes hardware, software, firmware, and/or any combination thereof, that identifies a particular rendering view for use from a plurality of possible rendering views, for example based at least in part on user input, a statically configured data value, a data-driven determination, and/or one or more received message(s). Additionally, or alternatively, in some embodiments, the visualization circuitry 4614 includes hardware, software, firmware, and/or any combination thereof, that generates and/or updates one or more virtual object(s) of a digital twin based at least in part on received message(s), for example message(s) in accordance with a digital rendering data format. Additionally, or alternatively, in some embodiments, the visualization circuitry 4614 includes hardware, software, firmware, and/or any combination thereof, that configures one or more virtual object(s) of a digital twin for rendering via a particular rendering view. Additionally, or alternatively, in some embodiments, the visualization circuitry 4614 includes hardware, software, firmware, and/or any combination thereof, that renders or causes rendering of a digital twin to one or more display(s). In some embodiments, the visualization circuitry 4614 includes a separate processor, specially configured field programmable gate array (FPGA), or a specially programmed application specific integrated circuit (ASIC).

Additionally, or alternatively, in some embodiments, two or more of the sets of circuitries 4602-4614 are combinable. Alternatively or additionally, in some embodiments, one or more of the sets of circuitry perform some or all of the functionality described associated with another component. For example, in some embodiments, two or more of the sets of circuitry 4602-4616 are combined into a single module embodied in hardware, software, firmware, and/or a combination thereof. Similarly, in some embodiments, one or more of the sets of circuitry, for example the message processing circuitry 4610, the data monitoring circuitry 4612, and/or the visualization circuitry 4614, is/are combined with the processor 4602, such that the processor 4602 performs one or more of the operations described above with respect to each of these sets of circuitry 4610-4614.

Having described example systems and apparatuses in accordance with the disclosure, example data flows and data architectures of the disclosure will now be discussed. In some embodiments, each system and/or computing device maintains one or more computing environment(s) that facilitate the storage, processing, and/or transmission of data. In this regard, it will be appreciated that such computing environment(s) may maintain data in a manner that enables processing of such data in accordance with the functionality described herein, and/or to enable transmission of data between systems and/or computing device(s) for use of the data by such system(s) and/or computing devices that receive the transmitted data.

Figure 47:
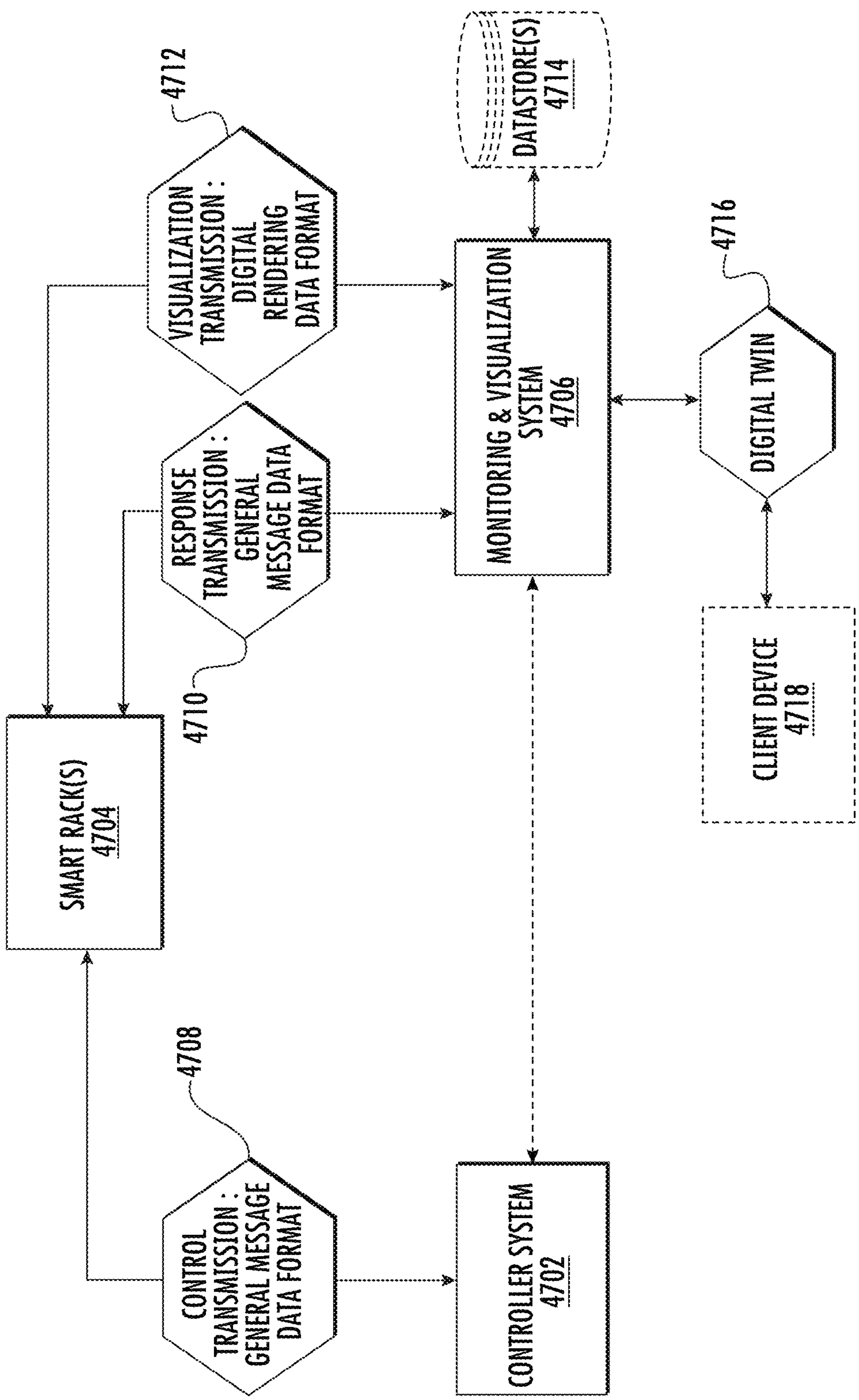
FIG. 47 illustrates a data flow between systems for controlling operation of a smart rack and visualization of the control of the smart rack in accordance with at least one example embodiment of the present disclosure.

FIG. 47 illustrates a data flow between systems for controlling operation of a smart rack and visualization of the control of the smart rack in accordance with at least one example embodiment of the present disclosure. Specifically, FIG. 47 depicts a data flow between a controller system 4702, smart rack(s) 4704, and a monitoring & visualization system 4706, as well as optional client device 4718 and/or datastore(s) 4714. In some embodiments, the monitoring & visualization system 4706, alone or in combination with one or more of the controller system 4702, datastore(s) 4714, and/or client device 4718, is embodied by the apparatus 200 as described herein.

As illustrated, the controller system 4702 is in communication with the smart rack(s) 4704. The controller system 4702 generates and/or transmits data message(s) for controlling one or more of the smart rack(s) 4704, for example for operation in accordance with a tote plan. As illustrated, the controller system 4702 generates and/or transmits a control transmission 4708. The control transmission 4708 includes any number of data messages configured in accordance with a general message data format. In some embodiments, a single message configured in accordance with the general message data format is transmitted to each smart rack that is to be operated in accordance with a particular tote plan. Alternatively, in some embodiments a plurality of messages in accordance with the general message data format is transmitted to a particular smart rack of the smart rack(s) 4704 to execute a particular operation. The tote plan may be generated by the controller system 4702 or by another system that transmits the tote plan to the controller system 4702 for execution. The general message data format in some embodiments represents a particular structure and/or arrangement of data that enables the smart rack(s) 4704 to parse all data from the message(s) necessary to execute a corresponding operation. In some embodiments, once a message is received and processed, the smart rack(s) 4704 may initiate execution of an operation corresponding to the transmitted message, for example by activating one or more actuator(s) of the smart rack to facilitate movement of a tote embodied by a rectangular prism.

In some embodiments, the smart rack(s) 4704 communicate with a monitoring & visualization system 4706 to enable the monitoring & visualization system 4706 to track a status associated with operation(s) of the smart rack(s) 4704 and/or to visualize aspects of the operation of the smart rack(s) 4704. In some embodiments, the smart rack(s) 4704 generate and/or transmit a response transmission 4710. The response transmission 4710 includes any number of data messages configured in accordance with a general message data format. In some embodiments, a single message is configured in accordance with the general message data format from each smart rack of the smart rack(s) 4704 as the smart rack operates. Alternatively, in some embodiments a plurality of messages in accordance with the general message data format is transmitted from a particular smart rack of the smart rack(s) 4704 as the smart rack operates, for example to carry out a tote plan or operation thereof. The general message data format in some embodiments represents a particular structure and/or arrangement of data utilized to generate message(s) indicating the current operational status for one or more aspect(s) of the smart rack as it operates. In this regard, it will be appreciated that such general message(s) in accordance with the general message data format may be utilized to monitor any aspect of the functioning of each smart rack of the smart rack(s) 4704 as it executes a commanded operation.

Additionally, or alternatively, in some embodiments, the smart rack(s) 4704 generate and/or transmit a visualization transmission 4712. The visualization transmission 4712 may be generated and/or transmitted together with and/or separately from the response transmission 4710. The visualization transmission 4712 includes any number of data messages configured in accordance with a digital rendering data format. In some embodiments, a single message is configured in accordance with the digital rendering data format from each smart rack of the smart rack(s) 4704 as the smart rack operates. Alternatively, in some embodiments, a plurality of messages in accordance with the digital rendering data format is transmitted from a particular smart rack of the smart rack(s) 4704 as the smart rack operates, for example to carry out a tote plan or operation thereof. The digital rendering data format in some embodiments represents a particular structure and/or arrangement of data utilized to generate message(s) that enable a virtual object corresponding to a smart rack of the smart rack (s 304 to be generated and/or updated based on the current operational aspect(s) of the smart rack. In this regard, it will be appreciated that such visualization message(s) in accordance with the digital rendering data format may be utilized to generate and/or update a virtual object to accurately reflect the current state of a corresponding physical object in a particular real-world environment, for example a state of operation for one or more of the smart rack(s) 4704, a position and/or state associated with a tote manipulated by the smart rack(s) 4704, and/or the like.

From the smart rack(s) 4704, the monitoring & visualization system 4706 receives the response transmission 4710 comprising the one or more messages configured in accordance with the general message data format, and/or receives the visualization transmission 4712 comprising the one or more messages configured in accordance with the digital rendering data format. Utilizing one or both of the messages of the response transmission 4710 and/or the visualization transmission 4712, in some embodiments the monitoring & visualization system 4706 stores data of such transmission(s) and/or log data derived therefrom to one or more datastore(s) 4714. In some embodiments, the monitoring & visualization system 4706 stores the individual message(s) of the response transmission 4710 and/or the visualization transmission 4712 to the datastore(s) 4714. Alternatively or additionally, in some embodiments, the monitoring & visualization system 4706 extracts particular data from one or more of the messages of the response transmission 4710 and/or the visualization transmission 4712 for storage via the datastore(s) 4714. Additionally, or alternatively still, in some embodiments, the monitoring & visualization system 4706 derives particular data from the data values represented in the message(s) of the response transmission 4710 and/or the visualization transmission 4712. Such derived data may include log data representing data insights into operational aspect(s) of the smart rack(s) 4704 based on the communicated message(s).

The datastore(s) 4714 may be embodied in any of a myriad of manners. In some embodiments, the datastore(s) 4714 include or are embodied by one or more non-transitory memories of the monitoring & visualization system 4706. Alternatively or additionally, in some embodiments, the datastore(s) 4714 include or are embodied by one or more database server(s) in communication with the monitoring & visualization system 4706. In some embodiments, the datastore(s) 4714 include one or more local and/or on-premises database(s) embodied in hardware, software, firmware, and/or a combination thereof. Alternatively or additionally, in some embodiments, the datastore(s) 4714 include one or more cloud database(s) located remotely from the monitoring & visualization system 4706 but communicable over one or more communication network(s).

In some embodiments, the monitoring & visualization system 4706 utilizes the received message(s) to report back to the controller system 4702. For example, such data transmissions may embody a feedback loop that enables the controller system 4702 to update its commands for achieving a particular goal action based at least in part on the messages received from the smart rack(s) 4704 as they operate.

In some embodiments, the monitoring & visualization system 4706 maintains a digital twin 4716. The digital twin 4716 may virtually represent any number of physical objects in a particular environment. For example, in some embodiments, the digital twin 4716 includes virtual object(s) corresponding to each smart rack of a modular superstructure, for example the smart rack(s) 4704. Additionally, or alternatively, in some embodiments, the digital twin 4716 includes virtual object(s) corresponding to any other physical or real-world object that interacts with the smart rack(s) 4704, for example external machinery, warehousing equipment, robot(s), user(s), autonomous and/or semi-autonomous system(s), and/or the like. Such virtual object(s) may be configurable in a manner that represents each virtual object in a particular virtual environment as identically to the corresponding physical object as possible, for example with the same size, location in the environment, configuration(s), performable action(s), and/or the like. Similarly, the digital twin 4716 may be embodied in a manner that enables simulation of real-world effects on the virtual object(s), for example physics effects, lighting effects, sound effects, and/or the like. In this regard, it will be appreciated that the digital twin 4716 may embody a virtualized but realistic representation of a particular real-world environment and the operations occurring therein.

In some embodiments, the monitoring & visualization system 4706 maintains the digital twin via a particular rendering view. The rendering view in some embodiments corresponds to a particular platform that enables generation, maintenance, configuration, and/or depiction of virtual object(s), for example embodying the digital twin 4716. Non-limiting examples of a rendering view include Blender, Unity, Maya, and the like.

As the monitoring & visualization system 4706 receives message(s) from the smart rack(s) 4704, for example, the monitoring & visualization system 4706 may utilize the data of such message(s) to update the digital twin 4716. For example, in some embodiments, the monitoring & visualization system 4706 updates the digital twin 4716 by updating particular virtual object(s) corresponding to one or more of the smart rack(s) 4704. In this regard, the virtual object may be updated such that the configuration, position, size, and/or other aspect of the virtual object is updated to be consistent with the data in the message(s) received via the response transmission 4710 and/or the visualization transmission 4712. For example, in some embodiments, the digital twin 4716 is updated based at least in part on the visualization messages of the visualization transmission 4712 to accurately depicting operating smart rack(s) of the smart rack(s) 4704, locations of tote(s) being moved by the smart rack(s) 4704, and/or the like.

Additionally, in some embodiments the monitoring & visualization system 4706 continuously renders at least a portion of the digital twin 4716. In some embodiments, the monitoring & visualization system 4706 renders a particular view of the digital twin 4716 based at least in part on a virtualized camera positioned within the digital twin 4716. The virtualized camera may be statically positioned, dynamically-driven based at least in part on data-driven determination(s), and/or user controlled. The monitoring & visualization system 4706 may render an interface depicting a state of the digital twin 4716 at a particular timestamp, for example such that the rendering is consistently updated as an animation, video file, and/or the like. In some embodiments, the monitoring & visualization system 4706 utilizes the rendering view to render the digital twin 4716 to a display associated with the monitoring & visualization system 4706.

Alternatively or additionally, in some embodiments, the monitoring & visualization system 4706 utilizes the rendering view to cause rendering of the digital twin 4716 to a client device, such as the client device 4718. The client device 4718 may be specially configured to render an interface representing the digital twin 4716 to a display of the client device 4718 to enable viewing by an end user.

Figure 48:
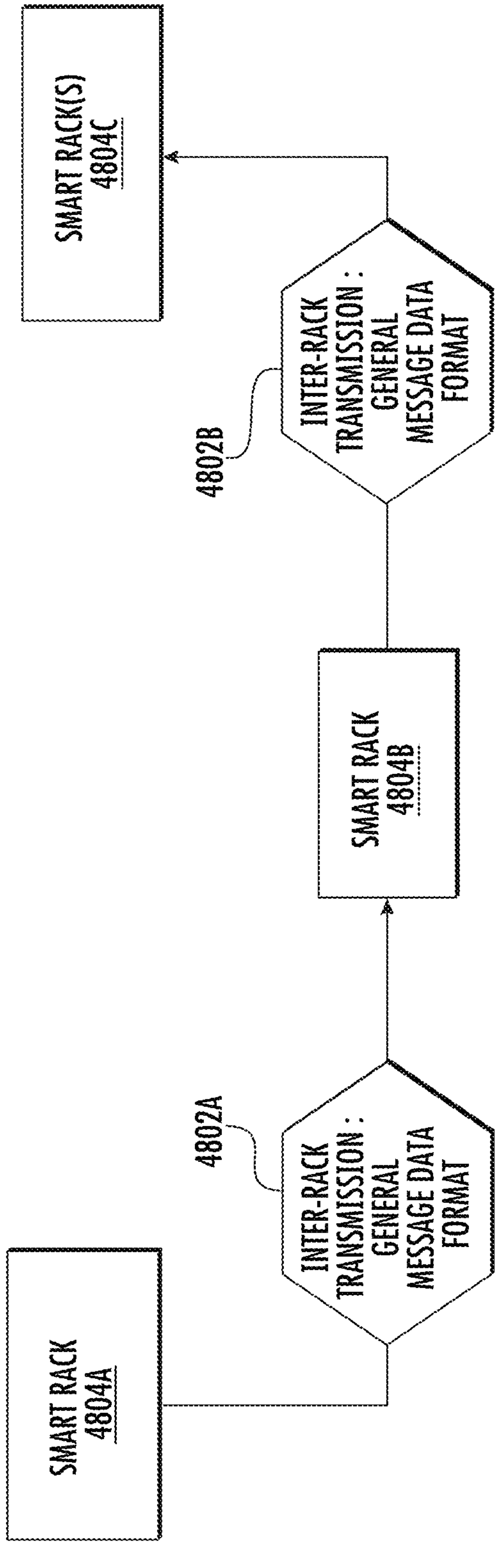
FIG. 48 illustrates a data flow of messages in accordance with a general message data format for inter-smart rack operation in accordance with at least one example embodiment of the present disclosure.

In some embodiments, one or more smart rack(s) communicate with one another directly and/or indirectly, in addition to and/or alternative to communicating with a superstructure controller (e.g., embodied by the controller system 4702). FIG. 48 illustrates a data flow of messages in accordance with a general message data format for inter-smart rack operation in accordance with at least one example embodiment of the present disclosure. Specifically, FIG. 48 illustrates communication between a smart rack 4804A, 4804B, and 4804C.

As illustrated, the smart rack 4804A transmits an inter-rack transmission 4802A configured in accordance with a general message data format to the smart rack 4804B. The inter-rack transmission 4802A includes one or more messages configured in accordance with the general message data format. Such general message(s) of the inter-rack transmission 4802A may be generated and/or forwarded from the smart rack 4804A to the smart rack 4804B to configure the smart rack 4804B for performing a particular operation based at least in part on the message(s). In this regard, the smart rack 4804A may configure the smart rack 4804B without requiring transmission of message(s) from a separate controller system.

Similarly, the smart rack 4804B in some embodiments transmits an inter-rack transmission 402B configured in accordance with a general message data format to the smart rack 4804C. The inter-rack transmission 402B includes one or more messages configured in accordance with the general message data format. Such general message(s) of the inter-rack transmission 4802B may be generated and/or forwarded from the smart rack 4804B to the smart rack 4804C to configure the smart rack 4804C for performing a particular operation based at least in part on the message(s). In this regard, the smart rack 4804B may configure the smart rack 4804C without requiring transmission of message(s) from the separate controller system.

It will be appreciated that any number of smart racks may communicate with one another. For example, general message(s) may be propagated by any number of smart rack(s) to facilitate a particular tote plan. Additionally, or alternatively, in some embodiments, smart racks transmit general messages indicating operational status(es) of particular smart rack(s) corresponding to another particular smart rack, for example peer smart rack(s) connected to or that can move totes to the particular smart rack.

Figure 49:
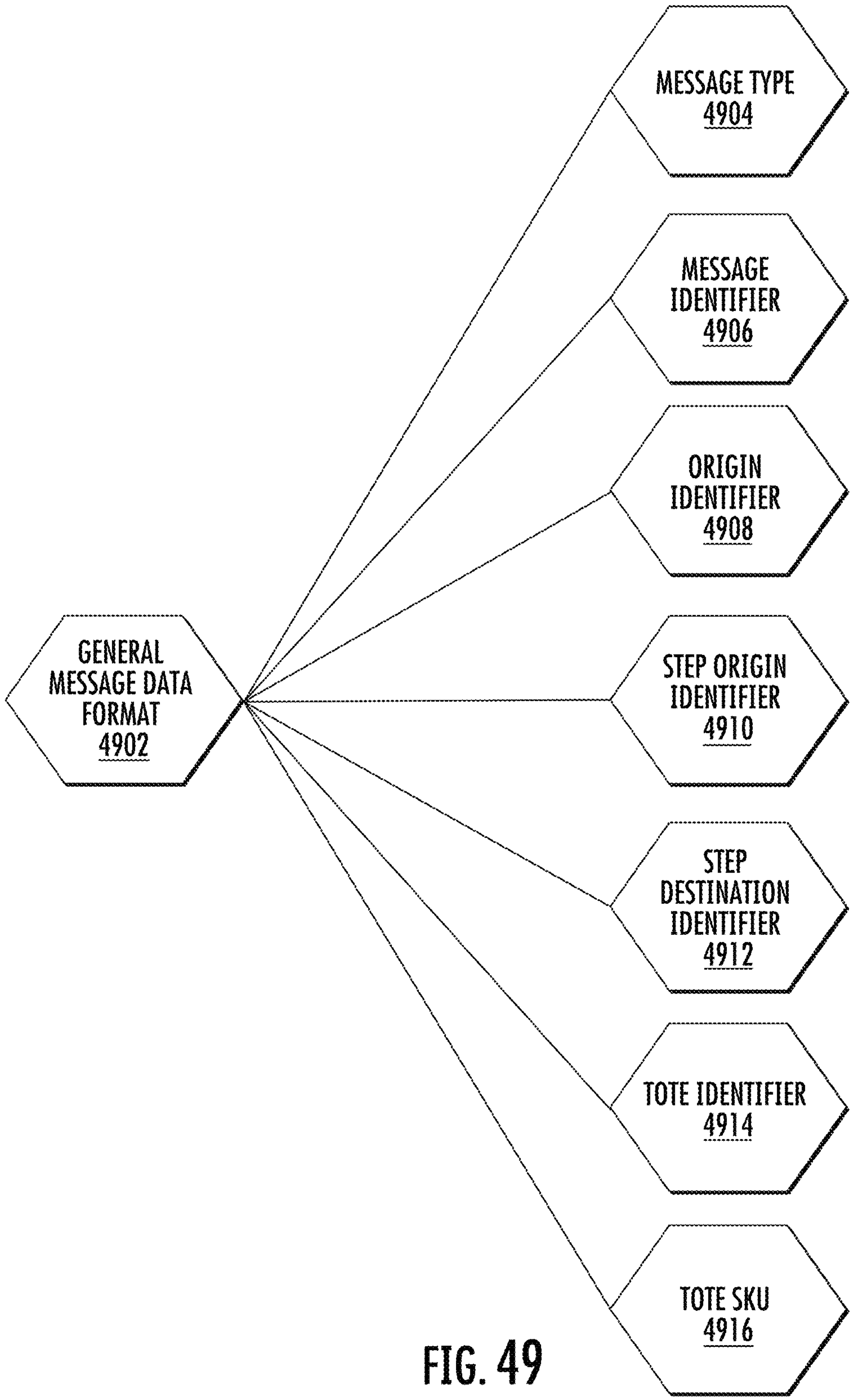
FIG. 49 illustrates an example communication protocol for a general message in accordance with at least one example embodiment of the present disclosure.

FIG. 49 illustrates an example communication protocol for a general message in accordance with at least one example embodiment of the present disclosure. Specifically, FIG. 49 depicts a data architecture of an example communication protocol embodied by a general message data format 4902. The general message data format 4902 may be utilized to configure any number of general message(s), for example transmitted between an apparatus 200 and a smart rack, and/or between smart racks of a modular superstructure.

The general message data format 4902 includes a message type 4904. In some embodiments, the message type 4904 includes data that uniquely identifies a particular type of message from a set of candidate message types. In this regard, the different message types may each be processed differently, and/or utilized for different processing purposes. For example, in some embodiments, the message type includes a data identifier representing a reporting message, an error message, and/or the like.

The general message data format 4902 includes a message identifier 4906 that uniquely identifies a message. In some embodiments, the message identifier 4906 embodies a global unique identifier, universal unique identifier, and/or the like. In some embodiments, the message identifier 4906 is automatically generated by the computing device originating the message. In some embodiments, the message identifier 4906 embodies a string, alphanumeric value, and/or other unique identifier. It will be appreciated that the message identifier 4906 in some embodiments is generated and/or otherwise identified utilizing any of a myriad of known algorithm(s).

The general message data format 4902 includes an origin identifier 4908. The origin identifier 4908 includes a data identifier that uniquely identifies a smart rack that originated or is to receive a message. In some embodiments, the smart rack that originates the message assigns the value of the origin identifier 4908 upon generation of the message, for example by setting the origin identifier 4908 to the identifier for the smart rack. Alternatively or additionally, in some embodiments where a controller system generates the origin identifier 4908 representing the smart rack that is to receive the message.

The general message data format 4902 includes a step origin identifier 4910. The step origin identifier 4910 includes a data identifier that uniquely represents a smart rack intended to perform an operation associated with a message. In some embodiments, the step origin identifier 4910 is determined based at least in part on a tote plan to be performed. For example, the computing device generating the message (e.g., the apparatus 200) may identify a smart rack identifier corresponding to a particular smart rack to perform an operation corresponding to the message.

The general message data format 4902 includes a step destination identifier 4912. The step destination identifier 4912 includes a data identifier that uniquely represents a smart rack intended to receive a tote as part of a particular operation performed as part of a tote plan. In some embodiments, the step destination identifier 4912 is determined based at least in part on a tote plan to be performed. For example, the computing device generating the message (e.g., the apparatus 200) may identify a step destination identifier 4912 corresponding to a particular smart rack that is intended to receive a tote moved based at least in part on the message.

The general message data format 4902 includes a tote identifier 4914. The tote identifier 4914 includes a data identifier that uniquely represents a tote to be moved as part of a particular operation performed as part of a tote plan. In some embodiments, the tote identifier 4914 is determined based at least in part on the tote plan to be performed, such that the tote identifier 4914 uniquely represents the next tote to be moved in accordance with the tote plan. The computing device generating the message (e.g., the apparatus 200) may identify a tote identifier 4914 corresponding to the particular tote identified to be moved via the message.

The general message data format 4902 includes a tote SKU 4916. The tote SKU 4916 includes a data identifier that uniquely represents an item, or classification of item, within a particular tote. Alternatively or additionally, in some embodiments, the tote SKU 4916 uniquely identifies a particular item, or classification of item, to be removed from the tote. In some embodiments, the particular tote within which the item represented by the tote SKU 4916 is retrievable is represented by the corresponding tote identifier 4914.

In some embodiments, the general message data format 4902 includes data value(s) corresponding to any of a number of additional and/or alternative data parameter(s). For example, in some embodiments, the general message data format 4902 include some or more data portion(s) representing error code(s), status(es) of different operational aspects of a smart rack, and/or the like.

Figure 50:
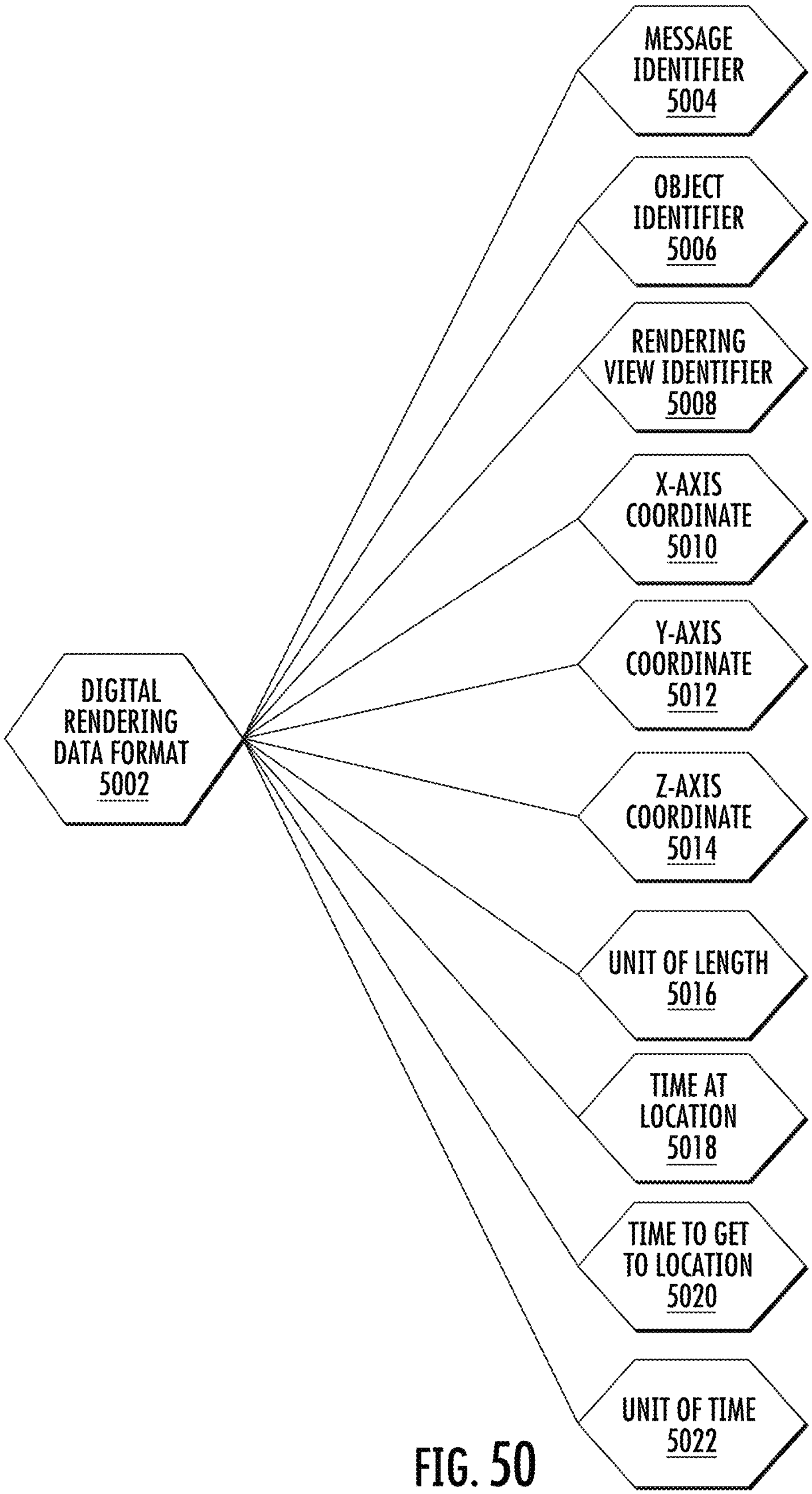
FIG. 50 illustrates an example communication protocol for a visualization message in accordance with at least one example embodiment of the present disclosure.

FIG. 50 illustrates an example communication protocol for a visualization message in accordance with at least one example embodiment of the present disclosure. Specifically, FIG. 50 depicts a data architecture of an example communication protocol embodied by digital rendering data format 5002. The digital rendering data format 5002 may be utilized to configure any number of visualization message(s), for example transmitted between an apparatus 200 and a smart rack, and/or between smart racks of a modular superstructure.

The digital rendering data format 5002 includes a message identifier 5004. In some embodiments, the message identifier 5004 embodies a global unique identifier, universal unique identifier, and/or the like. In some embodiments, the message identifier 5004 is automatically generated by the computing device originating the message. In some embodiments, the message identifier 5004 embodies a string, alphanumeric value, and/or other unique identifier. It will be appreciated that the message identifier 5004 in some embodiments is generated and/or otherwise identified utilizing any of a myriad of known algorithm(s).

The digital rendering data format 5002 further includes an object identifier 5006. The object identifier 5006 includes a data identifier that represents a particular physical object and/or classification of physical object. For example, in some embodiments, the object identifier 5006 represents an identifier from a set of object types corresponding to each type of object within a physical environment. Non-limiting examples of an object identifier 5006 represents a smart rack identifier corresponding to a smart rack in a physical environment, a conveyor identifier corresponding to a conveyor belt in the physical environment, a picker bot identifier corresponding to a picker bot in the physical environment, and/or the like. In this regard, the object identifier 5006 may be utilized to indicate a particular virtual object to be generated corresponding to a particular physical object within the physical environment.

The digital rendering data format 5002 further includes a rendering view identifier 5008. The rendering view identifier 5008 uniquely identifies a rendering view to be utilized for configuring and/or rendering virtual object(s) of a digital twin. In some embodiments, the rendering view identifier 5008 is statically set. Alternatively or additionally, in some embodiments the rendering view identifier 5008 is determined by the apparatus 200.

The digital rendering data format 5002 further includes an X-Axis coordinate 5010, a Y-Axis coordinate 5012, and a Z-Axis coordinate 5014. Such coordinate values may represent a particular location of a virtual object to be rendered within a particular rendering view. One or more rendering view(s) may utilize different coordinate systems to arrange virtual objects for rendering. The X-Axis coordinate 5010 may embody a location along an X-Axis where a virtual object is to be located, the Y-Axis coordinate 5012 may embody a location along a Y-Axis where a virtual object is to be located, and the Z-Axis coordinate 5014 may embody a location along a Z-Axis where a virtual object is to be located when rendered within a corresponding rendering view. The coordinate in some embodiments corresponds to an origin point for the virtual object to be rendered within the rendering view.

The digital rendering data format 5002 further includes a unit of length 5016. The unit of length 5016 represents a particular unit from a set of selectable units. It should be appreciated that different rendering views may be configured to utilize any of a myriad of known units of measurement, and convert data values in accordance with that unit of measurement.

The digital rendering data format 5002 further includes a time at location 5018. In some embodiments, the time at location 5018 indicates a timestamp representing a time at which a tote reaches a particular location, for example a location from which the step corresponding to the message is to continue moving the tote towards a destination location in accordance with a tote plan. In some embodiments, a time at location 5018 is determined as the time at which a particular message is originated, or otherwise is derived based at least in part on a tote plan and/or one or more instructions embodying steps performed to perform the tote plan.

The digital rendering data format 5002 further includes a time to get to location 5020. In some embodiments, the time to get to location 5020 represents a length of time to complete a particular step for moving a tote from a current location to a particular destination location. In some embodiments, the time to get to location 5020 is determined based at least in part on a tote plan. Additionally, or alternatively, in some embodiments the time to get to location 5020 is determined based at least in part on current operations of a particular smart rack or plurality of smart racks.

The digital rendering data format 5002 further includes a unit of time 5022. The unit of time 5022 represents a particular unit from a set of selectable units. It should be appreciated that different rendering views may be configured to utilize any of a myriad of different known units of time, for example to render frame(s) of movement of a tote from a starting or origin location to a destination location via operation of one or more smart rack(s).

In some embodiments, the digital rendering data format 5002 includes data value(s) corresponding to any of a number of additional and/or alternative data parameter(s) utilized for logging and/or visualization, for example via a rendering view. For example, in some embodiments, the digital rendering data format 5002 includes one or more data portion(s) representing different operational aspects of a smart rack, error code(s) associated with operation of a smart rack, and/or the like.

Figure 51:
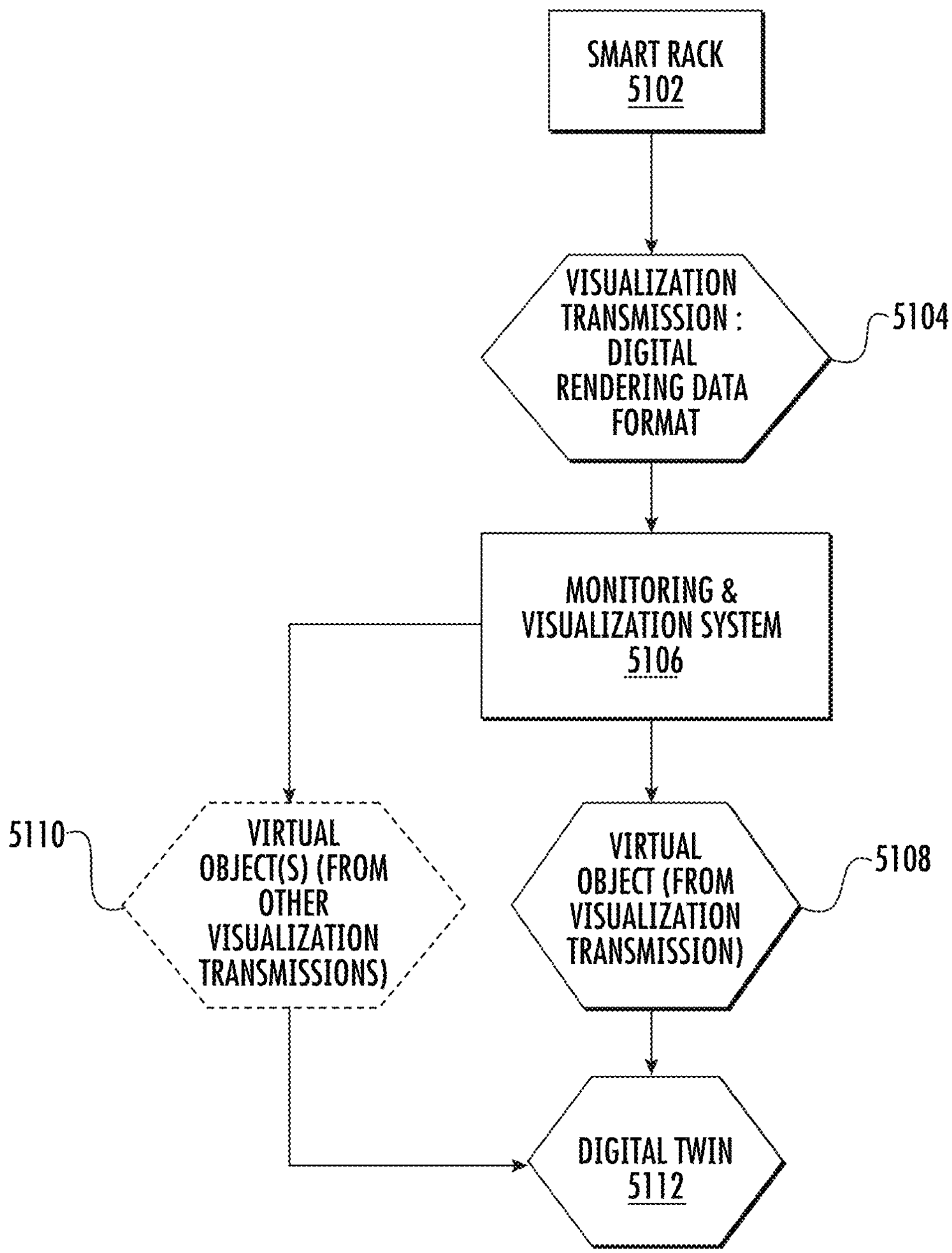
FIG. 51 illustrates a data flow for maintaining a digital twin based on messages of digital rendering data format in accordance with at least one example embodiment of the present disclosure.

FIG. 51 illustrates a data flow for maintaining a digital twin based on messages of digital rendering data format in accordance with at least one example embodiment of the present disclosure. Specifically, FIG. 51 depicts generation and/or maintenance of a digital twin 5112 by a monitoring & visualization system 5106, for example depicted and/or described based at least in part on message(s) received from a smart rack 5102.

As depicted, the smart rack 5102 generates a visualization transmission 5104 configured in accordance with a digital rendering data format. In some embodiments, the visualization transmission 5104 includes one or more visualization message(s) configured in accordance with the digital rendering data format. The visualization message(s) may each include data determined by, generated by, and/or received by the smart rack 5102 for use in generating at least one corresponding virtual object.

In some embodiments, the monitoring & visualization system 5106 (for example embodied by the apparatus 200) receives the visualization transmission 5104. In some embodiments, the monitoring & visualization system 5106 generates and/or updates at least one virtual object based at least in part on the visualization transmission 5104. As depicted, in some embodiments, the monitoring & visualization system 5106 generates and/or updates the virtual object 5108 based at least in part on at least one visualization message received via the visualization transmission 5104. For example, in some embodiments, the visualization message(s) include one or more data value(s) utilized for updating and/or setting particular data properties of the virtual object 5108. Non-limiting examples of such data properties include a type of virtual object to be generated as the virtual object 5108, a virtual object size, a virtual object location in a rendering view, data utilized to render movement of the virtual object 5108, and/or the like.

In some embodiments, the monitoring & visualization system 5106 additionally identifies, retrieves, and/or otherwise maintains one or more other virtual object(s) 5110. The other virtual object(s) 5110 may include one or more virtual object(s) generated and/or configured based at least in part on other visualization transmission(s) received, for example comprising visualization message(s) configured in accordance with the digital rendering data format by other smart racks. In this regard, the virtual object(s) 5110 may be positionable and renderable within the same rendering view as the virtual object 5108.

As illustrated, in some embodiments the monitoring & visualization system 5106 generates and/or updates a digital twin 5112 based at least in part on the virtual object 5108 and/or the other virtual object(s) 5110. For example, in some embodiments, the digital twin 5112 embodies or includes the virtual object 5108 and/or other virtual object(s) 5110 positioned within a particular rendering view. Additionally, or alternatively, in some embodiments, the digital twin 5112 is maintained in a manner that simulates operation(s) of one or more of the virtual objects 5108 and/or the other virtual object(s) 5110. In this regard, the constructed digital twin 5112 may represent an accurate, virtualized version of the corresponding physical environment. Additionally, or alternatively, as subsequent visualization messages configured in accordance with a digital rendering data format are received, for example, one or more of the virtual objects corresponding to such subsequently received visualization messages may be updated within the digital twin.

Figure 52:
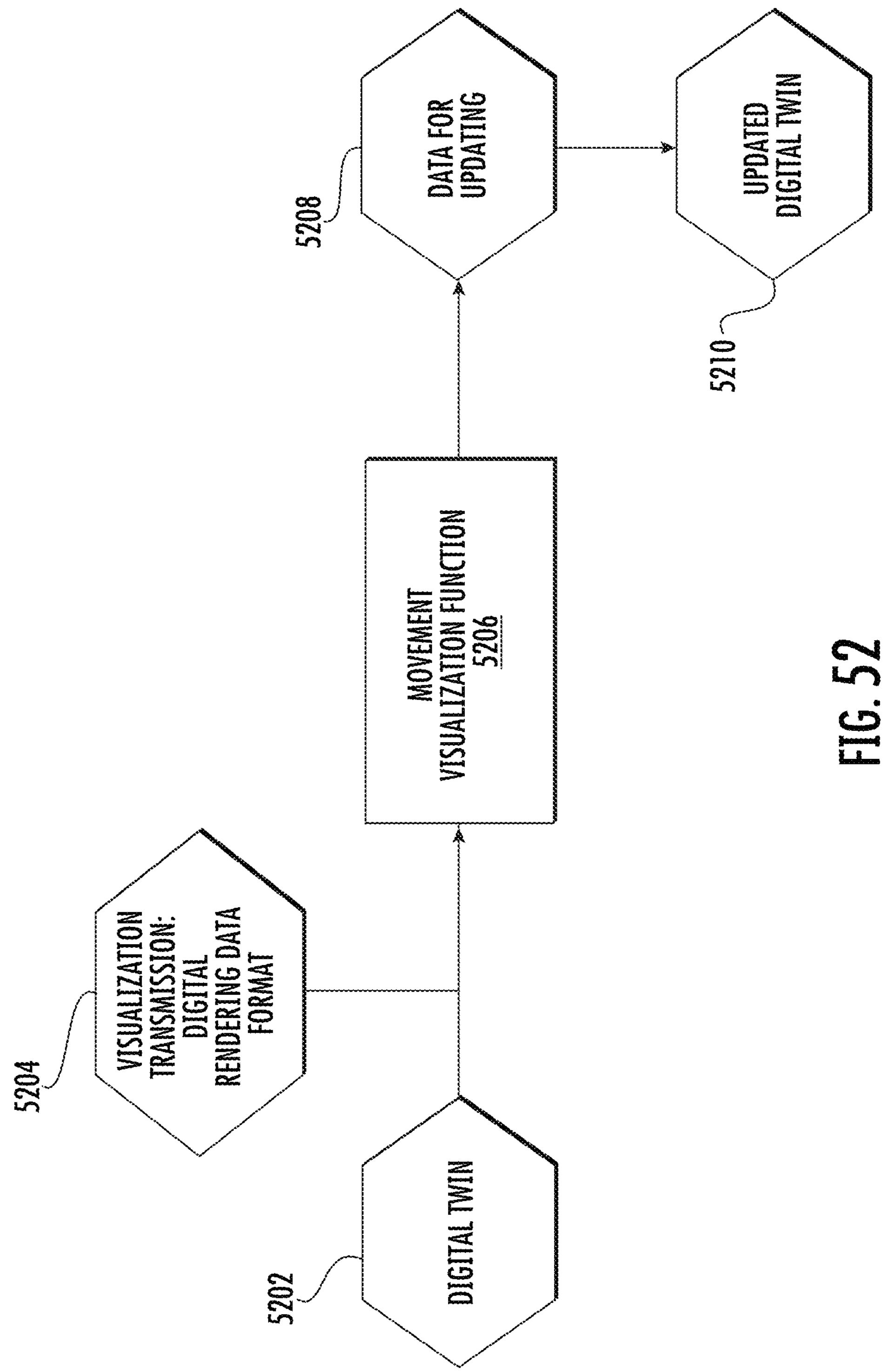
FIG. 52 illustrates a data flow using a movement visualization function for updating a digital twin in accordance with at least one example embodiment of the present disclosure.

FIG. 52 illustrates a data flow using a movement visualization function for updating a digital twin in accordance with at least one example embodiment of the present disclosure. In some embodiments, the apparatus 200 maintains one or more computing environment(s) that enable maintenance of the depicted data and/or processing as depicted and described. In this regard, the data flows as depicted and described in some embodiments are performed entirely by the apparatus 200.

As illustrated, the data flow includes a digital twin 5202. The digital twin 5202 may include any number of virtual objects. Each virtual object may correspond to a particular physical object in a corresponding physical environment. For example, in some embodiments, the digital twin 5202 includes a plurality of virtual smart racks embodying a virtual modular superstructure corresponding to a real-world modular superstructure of the same design, and/or may include virtual object(s) corresponding to any other physical device(s) that interact with or otherwise engage or are associated with the real-world modular superstructure.

The data flow further includes a visualization transmission 5204. As described herein, the visualization transmission 5204 may include any number of visualization message(s) configured in accordance with a digital rendering data format. In this regard, such visualization message(s) may include a myriad of data utilized to generate, update, and/or otherwise depict one or more virtual object(s) within a particular rendering view, for example based on corresponding attribute(s), status(es), and/or operation(s) of physical object(s) corresponding to such virtual object(s).

The digital twin 5202 and visualization messages of the visualization transmission 5204 are inputted into a movement visualization function 5206. In some embodiments, the movement visualization function 5206 generates and/or determines particular data to be updated within the digital twin to accurately depict ongoing operation(s) and/or status(es) of physical object(s). For example, in some embodiments, the movement visualization function 5206 determines particular data for updating 5208 that configures rendering properties for one or more virtual object(s) to enable visual distinguishing of particular virtual object(s) representing tote(s) moving via a corresponding physical modular superstructure, and/or smart rack(s) currently operating to facilitate such movement. In one example context, the movement visualization function 5206 sets data for updating 5208 that indicates particular rendering properties to be set such that virtual objects corresponding to totes currently being moved are rendered with a particular opacity based on their rate of movement and/or progress towards a destination location, whereas totes not currently being moved or that have remained stationary for some period of time are rendered translucently or entirely transparent to enable a user to view smart racks internal to the modular superstructure that would otherwise be blocked by exterior smart racks and/or totes located in said exterior smart racks.

The data for updating 5208 in some embodiments represents one or more value(s) utilized to set particular properties and/or otherwise configure a virtual object. For example, in some embodiments the movement visualization function 5206 configures rendering properties or other characteristics of the virtual object to an updated value determined via the movement visualization function 5206. In some embodiments, the data for updating 5208 corresponds to a rendering property representing a color and/or opacity of a virtual object, for example such that the object may be visually distinguished or made visible in a circumstance where the virtual object is moving, closer to its destination location, operating (e.g., in a circumstance where the virtual object is a smart rack), and/or the like. The data for updating 5208 may embody data values associated with a single virtual object, or alternatively in some embodiments may include data values associated with updating a plurality of virtual objects.

The data for updating 5208 is utilized to generate an updated digital twin 5210. In some embodiments, the apparatus 200, for example, applies the data for updating 5208 to one or more virtual object(s) of the digital twin 5202 to generate the updated digital twin 5210. The digital twin 5202 may be updated by setting new values and/or otherwise reconfiguring one or more aspect(s) of at least one virtual object represented within the digital twin 5202. In this regard, the updated digital twin 5210 represents the virtual objects of the digital twin 5202 updated based on the data for updating 5208. The updated digital twin 5210 in some embodiments visually distinguishes virtual object(s) that are movement and/or facilitating movement of another virtual object (e.g., currently operating smart racks) from nonmoving and/or non-operating virtual objects. The digital twin may be continuously updated as each new visualization message is received, and corresponding data for updating 5208 is generated based at least in part on the visualization message.

In some embodiments, a digital twin is maintained within and/or associated with a particular rendering view. In this regard, in some embodiments, the rendering view is utilized to depict updates to the digital twin as they occur. In some embodiments, the updated digital twin 5210 is rendered via the particular rendering view utilizing frames generated by the rendering view. The rendering view may continuously render frames dynamically, render based on particular key-frames of a processed animation or simulation, render based on a particular tracked time and/or real-time timestamp, and/or the like. In some embodiments, the rendering view interpolates between particular frames at which data for particular virtual object(s) are calculated.

Figure 53:
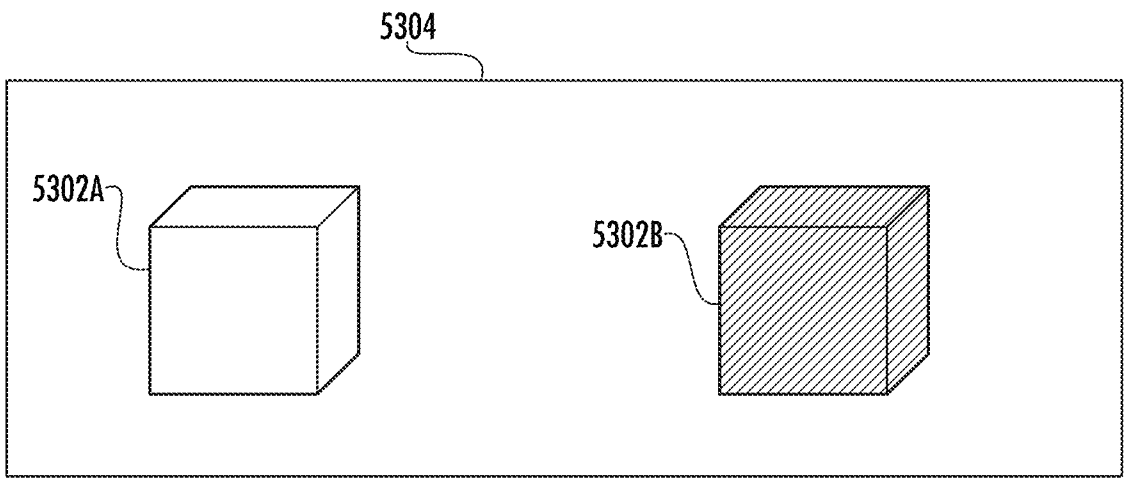
FIG. 53 illustrates a visualization of virtual object rendering based at least in part on a movement visualization function in accordance with at least one example embodiment of the present disclosure.

FIG. 53 illustrates a visualization of virtual object rendering based at least in part on a movement visualization function in accordance with at least one example embodiment of the present disclosure. Specifically, FIG. 53 depicts different rendering properties of a virtual object representing a tote, where such rendering properties are determined based at least in part on a movement visualization function. In this regard, the movement visualization function may configure one or more rendering properties of a virtual object representing a tote such that the tote is visible when it is moving, and less visible (or completely transparent) when it is not moving and/or slowing down to approach a destination location.

As illustrated, FIG. 53 depicts an example virtual object 5304. The virtual object 5304 may be associated with a particular object type that identifies the virtual object as representing a tote, which corresponds to a particular object type identifier for example. In some embodiments, a movement visualization function is utilized to generate and/or set data value(s) for rendering the virtual object with a particular opacity. For example, as depicted the virtual object 5304 may be rendered as fully opaque 5302A in a circumstance where the virtual object 5304 is determined moving. Alternatively, the virtual object 5304 may be rendered with reduced opacity 5302B, such as translucent or fully transparent in a circumstance where the virtual object 5304 is determined not moving. In this regard, when the virtual object 5304 corresponds to a particular tote not being acted upon for movement, the tote may be depicted in a manner that enables a user to see through the virtual object, for example such that moving totes behind such totes may be seen within the virtual representation.

FIG. 54 illustrates an example movement visualization function in accordance with at least one example embodiment of the present disclosure. Specifically, FIG. 54 depicts pseudocode for a movement visualization function 5402 that utilizes data—for example extracted and/or otherwise identified from a message configured in accordance with a digital rendering data format—to update virtual object(s) in accordance with such data. The movement visualization function 5402 in some embodiments is utilized to update data parameters associated with a particular virtual object, for example a virtual object corresponding to a physical object such as a tote being moved by a modular superstructure, where at least one visualization message in the digital rendering data format was/were received associated with such a physical object. In some embodiments, the apparatus 4600 executes the movement visualization function via a software environment maintained via the apparatus 4600. Additionally, or alternatively, in some embodiments, the apparatus 4600 derives and/or otherwise identifies static and/or derived data values utilized in the movement visualization function 5402.

In some embodiments, the apparatus 4600 defines different movement visualization function(s) for different rendering views. For example, the different movement visualization functions may be utilized in some embodiments to set different data parameters utilized by the different rendering views. As illustrated, for example, the movement visualization function 5402 may be utilized for a particular first rendering view, for example the Blender3D environment.

At line 1, the movement visualization function receives one or more input parameters. In some embodiments, the data values corresponding to the input parameters are identified and/or extracted from a received data message in a digital rendering data format. As illustrated, such input parameters include an object identifier, an X-Axis destination location, a Y-axis destination location, a Z-Axis destination location, a time at location data value, and/or a time to get to location data value. In some embodiments, each of such input parameters is identified from a particular message in the digital rendering data format.

At line 2, the movement visualization function includes determining a value of an end frame for rendering. In some embodiments, the end frame is determined from a time at location value and a frame rate or "speed" value. The frame rate may be maintained by the apparatus 4600, embodied as a predetermined value, and/or the like. In other embodiments, the frame rate or speed value is determined from a message received by the apparatus 4600 from at least one smart rack. For example, in some embodiments, the apparatus 4600 maintains a frame rate or speed value for each virtual object corresponding to a physical object, either statically or based at least in part on data from one or more message(s), and retrieves the frame rate or speed value for a particular virtual object for use in the movement visualization function.

In some embodiments, the movement visualization function may include one or more determination(s) that resolve inconsistencies or inaccuracies in the virtualized rendering of moving virtual objects. In one example context, in some embodiments the movement visualization function includes one or more steps that prevent blinking of objects that are rendered as opaque while moving in accordance with a first action, rendered as transparent only for one frame when completing moving of the first action, and then rendered as opaque again when beginning moving for a next action in an immediately subsequent timestamp. Such blinking is not only computationally wasteful, but also visually inaccurate and confusing for depicting the virtual object.

For example, at line 3, the movement visualization function includes determining whether a particular conditional is satisfied. As depicted, the conditional includes a value of a time at location minus a value of a time to get to location compared with a value of a previous rendered time. The conditional may be satisfied when the difference is equivalent to the value of the previous rendered time. In this regard, the previous rendered time may represent an actual timestamp for a previously rendered frame as determined and/or tracked by the apparatus 4600.

In a circumstance where the value of the time at location minus the value of the time to get to location is equivalent to the value of the previous rendered time, the conditional is met and flow proceeds to line 4. At line 4, the movement visualization function sets a value of a start frame for coloring (e.g., a color rendering) equal to a value of the previous time rendered times the value of the frame rate. In this regard, the start frame for color may be set to a value that is opaque, with its opacity defined by the value of the previous time rendered times the value of the frame rate. Such a condition prevents objects becoming transparent for a brief time (e.g., a single timestamp) once a timestamp to reach a destination location is hit.

In a circumstance where the value of the conditional is not met, flow proceeds to the else statement at line 5, and subsequently line 6 is performed. At line 6, the movement visualization function sets a value of a start frame for color equal to a value of the end frame minus a frame offset, less a value of the time to get to the location times a value of the frame rate. In this regard, the start frame for color is set to a value based on this determined difference as the virtual object is moved throughout time. In some embodiments the frame offset represents a particular offset from a current frame, time, frame rate, and/or the like.

Flow continues to line 7. At line 7, a value of a start frame for motion is determined in the movement visualization function. The value of the start frame is set to a value of the end frame minus the frame rate, less a value of the time to get to the location times a value of the frame rate. In this regard, the start frame may correspond to a timestamp where the virtual object begins movement corresponding to a particular action. In some embodiments, the start frame for motion corresponds to a particular frame at which a virtual object begins to move.

At line 8, the movement visualization function determines a value for a destination associated with the virtual object. In some embodiments, the movement visualization function determines the destination based at least in part on the X-Axis destination, Y-Axis destination, and Z-Axis destination values representing a current X, Y, and Z location of the corresponding physical object. In addition to these location values, the apparatus 4600 may determine, based at least in part on a portion of a visualization message (e.g., a unit of length) and/or as a predetermined value, a value of a scale factor that is utilized to scale the virtual object within a particular rendering review, for example such that the virtual object is accurately depicted as the right size at the right location within the virtual environment. Additionally, or alternatively, in some embodiments, the value of the object may correspond to an offset utilized for positioning and/or configuring the virtual object within a particular rendering view. In this regard, the object offset may be utilized to offset the position and size of the particular virtual object in a specific rendering view based on requirements and/or methodologies of how particular shape(s) are processed within the particular rendering view to be utilized. The resulting destination in some embodiments is set to an arranged tuple of values representing an X, Y, and Z location in the virtual environment maintained by the corresponding rendering view to accurately represent the corresponding physical object within the rendering view.

In some embodiments, the data values set and/or identified via the movement visualization function are utilized as preprocessing steps for configuring a virtual object within a particular rendering view. For example, based at least in part on the start frame, end frame, start frame for color, start frame for motion, and/or destination determined via the movement visualization function 5402, the apparatus 4600 may push some or all of such data to the rendering view for depicting. For example, in some embodiments, one or more of the determined data values is/are pushed to the rendering view via one or more API calls to cause the rendering view to depict the virtual object at a particular location and/or particular size at one or more timestamps in accordance with the determined data values. Additionally, or alternatively, in some embodiments the apparatus 4600 utilizes such data value(s) to cause the rendering view to perform interpolation and/or other interim determinations for rendering one or more other frames based at least in part on such data. For example, the apparatus 4600 may initiate an API call to a particular rendering view that causes the rendering view to perform the rendering based at least in part on the determined data value(s) as depicted and described with respect to the movement visualization function 5402.

Having described example systems and apparatuses, data architectures, data flows, and movement visualization functions in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 55:
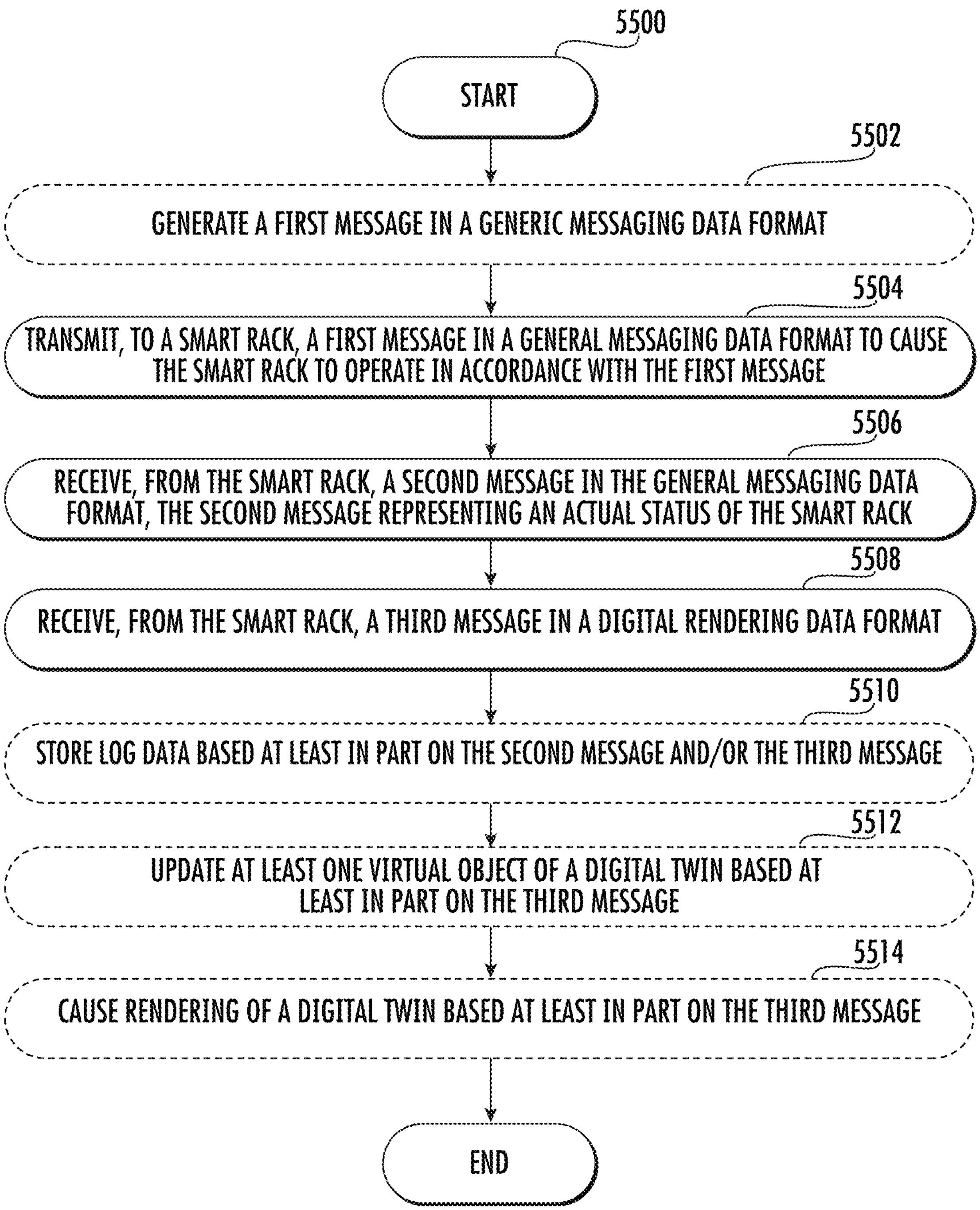
FIG. 55 illustrates a flowchart including example operations for smart rack communication in accordance with particular data communication protocols in accordance with at least one example embodiment of the present disclosure.

FIG. 55 illustrates a flowchart including example operations for smart rack communication in accordance with particular data communication protocols in accordance with at least one example embodiment of the present disclosure. Specifically, FIG. 55 depicts operations of an example process 5500. In some embodiments, the process 5500 is embodied by computer program code stored on a non-transitory computer-readable storage medium of a computer program product configured for execution to perform the process as depicted and described. Alternatively or additionally, in some embodiments, the process 5500 is performed by one or more specially configured computing devices, such as the apparatus 4600 alone or in communication with one or more other component(s), device(s), system(s), and/or the like. In this regard, in some such embodiments, the apparatus 4600 is specially configured by computer-coded instructions (e.g., computer program instructions) stored thereon, for example in the memory 4604 and/or another component depicted and/or described herein and/or otherwise accessible to the apparatus 4600, for performing the operations as depicted and described. In some embodiments, the apparatus 4600 is in communication with one or more external apparatus(es), system(s), device(s), and/or the like, to perform one or more of the operations as depicted and described. For example, the apparatus 4600 in some embodiments is in communication with at least one or more smart rack(s) of a modular superstructure, one or more other physical object(s), an optional external controller system, and/or the like. For purposes of simplifying the description, the process 5500 is described as performed by and from the perspective of the apparatus 4600.

The process 5500 begins at optional operation 5502. At optional operation 5502, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that generates a first message in a general messaging data format. In some embodiments, the first message embodies a control message representing a command to perform a particular action. The apparatus 4600 may configure the first message in accordance with the general messaging data format to enable a smart rack to interpret the message and initiate corresponding instructions.

At operation 5504, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that transmits, to a smart rack, a first message in a general messaging data format. In some embodiments, the apparatus 4600 transmits the first message generated at operation 5502. In some embodiments, the first messages is transmitted to cause the smart rack to operate in accordance with the first message. For example, the transmission of the first message may cause the smart rack to receive the first message and execute instructions based at least in part on the first message. For example, the first message may initiate particular operations via the smart rack to cause the smart rack to receive and/or move a tote.

At operation 5506, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that receives, from the smart rack, a second message in the general messaging data format. In some embodiments, the second message represents an actual status of the smart rack. For example, in some embodiments, the actual status of the smart rack may include data indicating one or more operational status(es) of the smart rack itself, including one or more portions of data indicating whether the smart rack is detecting any error in operation, battery level for the smart rack, and/or the like. Alternatively or additionally, in some embodiments, the actual status of the smart rack includes data representing aspect(s) of a tote currently being handled by the smart rack, expected to be handled by the smart rack, and/or the like. Such aspect(s) of a tote may include whether the tote is received, when the tote was received by the smart rack, how long the tote has been located at the smart rack, measurable characteristics regarding the physical properties of the tote (e.g., tote weight, tote size, and/or the like). In some embodiments, the second message is in the general messaging data format as depicted and described herein with respect to FIG. 49.

At operation 5508, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that receives, from the smart rack, a second message in the general messaging data format. In some embodiments, the third message includes data utilized to depict a virtual object embodying the smart rack itself and/or associated with the smart rack. In some embodiments, for example, the third message includes data utilized to configure and/or update a virtual object representing the smart rack. Additionally, or alternatively, in some embodiments the third message includes data utilized to configure and/or update a virtual object representing a tote handled by the smart rack and/or to be handled by the smart rack. In some embodiments, the third message is in the digital rendering data format as depicted and described herein with respect to FIG. 50.

At optional operation 5510, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that stores log data based at least in part on the second message and/or the third message. The log data may represent one or more portion(s) of data associated with operation of the smart rack and/or associated physical object(s), such as movement of tote(s) via the smart rack and/or one or more other smart rack(s). In some embodiments, the log data is stored corresponding to one or more timestamp(s) associated with such log data, for example one or more timestamps at which the second message and/or third message were received, a timestamp at which such data was detected via a smart rack, and/or the like. The log data may be stored to one or more particular data store(s) of or otherwise accessible to the apparatus 4600.

At optional operation 5512, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that update at least one virtual object of a digital twin. In some embodiments, the apparatus 4600 updates the at least one virtual object based at least in part on the third message. In some embodiments, the apparatus 4600 identifies the at least one virtual object for updating based on data from the third message, for example one or more identifier(s) within the third message that indicate the corresponding physical object(s) with which the third message is associated. In some embodiments, the apparatus 4600 derives particular data for updating utilized to reconfigure the at least one virtual object of the digital twin based at least in part on the specific data values represented in the third message. In some embodiments, the apparatus 4600 updates at least one virtual object utilizing a movement visualization function as described herein, for example to reconfigure rendering properties of the virtual object based at least in part on movement and/or operation of corresponding physical object(s) represented by the at least one virtual object.

At optional operation 5514, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that causes rendering of a digital twin based at least in part on the third message. In some embodiments, the apparatus 4600 generates the digital twin based at least in part on the third message. Alternatively or additionally, in some embodiments the apparatus 4600 renders the digital twin including one or more updated virtual objects based at least in part on the third message, for example as depicted and described with respect to operation 5512.

In some embodiments, the apparatus 4600 utilizes a particular rendering view to render the digital twin. In some embodiments, the rendering view is similarly utilized to configure and/or maintain the digital twin itself, for example by generating and/or configuring virtual object(s) within the rendering view. The rendering view may be utilized to enable rendering based at least in part on particular key-frames defined and/or generated by the apparatus 4600, and/or based on particular timestamps. In some embodiments, the rendering view is displayed on a user interface.

Figure 56:
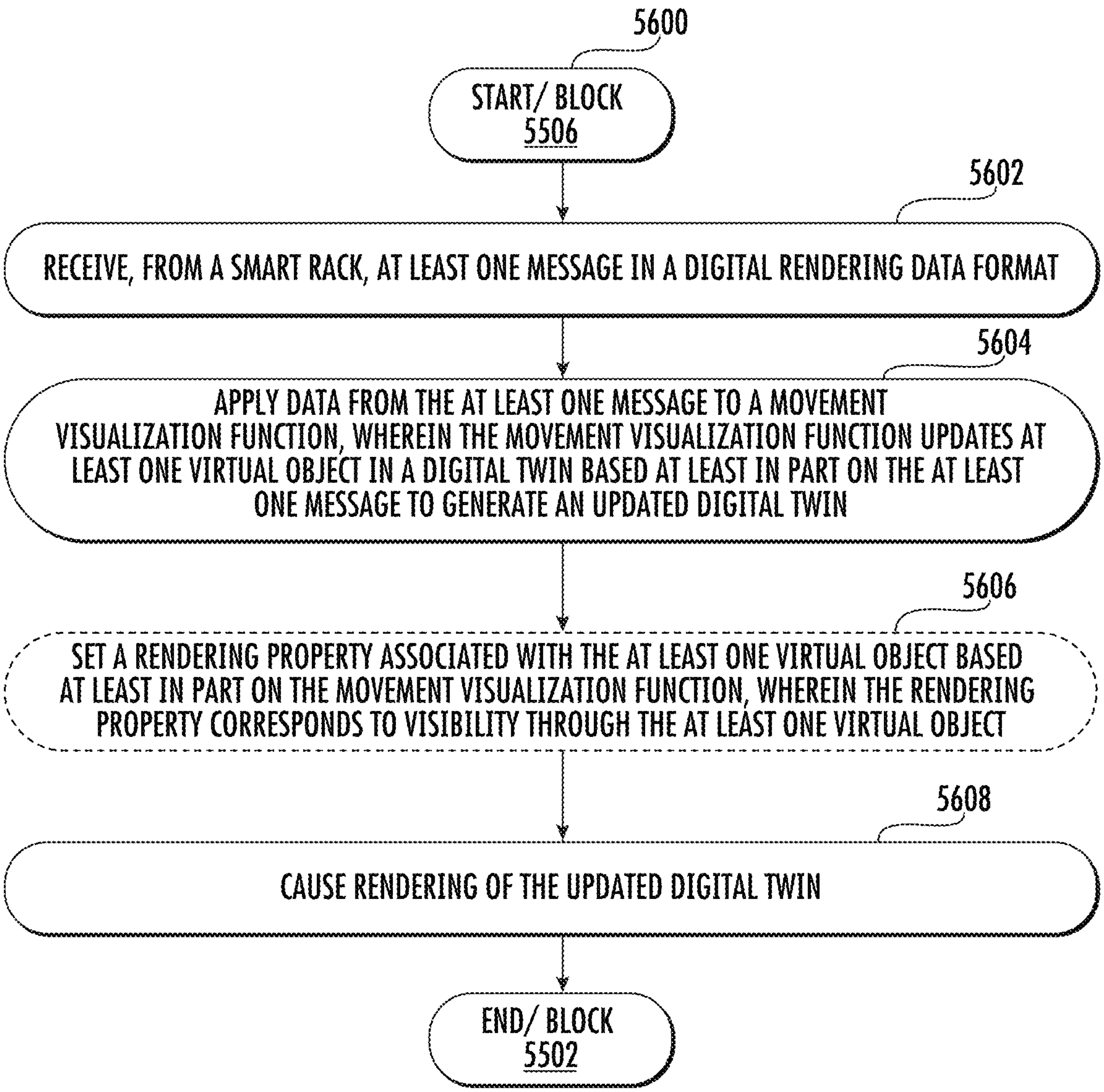
FIG. 56 illustrates a flowchart including example operations for rendering a digital twin using a movement visualization function based at least in part on message(s) in a digital rendering data format in accordance with at least one example embodiment of the present disclosure.

FIG. 56 illustrates a flowchart including example operations for rendering a digital twin using a movement visualization function based at least in part on message(s) in a digital rendering data format in accordance with at least one example embodiment of the present disclosure. Specifically, FIG. 56 depicts operations of an example process 5600. In some embodiments, the process 5600 is embodied by computer program code stored on a non-transitory computer-readable storage medium of a computer program product configured for execution to perform the process as depicted and described. Alternatively or additionally, in some embodiments, the process 5600 is performed by one or more specially configured computing devices, such as the apparatus 4600 alone or in communication with one or more other component(s), device(s), system(s), and/or the like. In this regard, in some such embodiments, the apparatus 4600 is specially configured by computer-coded instructions (e.g., computer program instructions) stored thereon, for example in the memory 4604 and/or another component depicted and/or described herein and/or otherwise accessible to the apparatus 4600, for performing the operations as depicted and described. In some embodiments, the apparatus 4600 is in communication with one or more external apparatus(es), system(s), device(s), and/or the like, to perform one or more of the operations as depicted and described. For example, the apparatus 4600 in some embodiments is in communication with at least one or more smart rack(s) of a modular superstructure, one or more other physical object(s), an optional external controller system, and/or the like. For purposes of simplifying the description, the process 5600 is described as performed by and from the perspective of the apparatus 4600.

The process 5600 begins at operation 5602. In some embodiments, the process 5600 begins after one or more operations depicted and/or described with respect to any one of the other processes described herein. For example, in some embodiments as depicted, the process 5600 begins after execution of operation 5506. In this regard, some or all of the process 5600 may replace or supplement one or more blocks depicted and/or described with respect to any of the processes described herein. Upon completion of the process 5600, the flow of operations may terminate. Additionally, or alternatively, as depicted, upon completion of the process 5600 in some embodiments, flow may return to one or more operation(s) of another process, such as back to the operation 5502. It will be appreciated that, in some embodiments, the process 5600 embodies a sub-process of one or more other process(es) depicted and/or described herein, for example the process 5500.

At operation 5602, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that receives, from a smart rack, at least one message in a digital rendering data format. In some embodiments, the at least one message in the digital rendering data format includes the third data message as depicted and described with respect to operation 5508. Additionally, or alternatively, in some embodiments, each visualization message of the at least one message is configured to include particular data based at least in part on the digital rendering data format for use in configuring virtual object(s) based at least in part on the at least one message.

At operation 5604, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that applies data from the at least one message to a movement visualization function. In some embodiments, the movement visualization function updates at least one virtual object in a digital twin to generate a corresponding updated digital twin. The movement visualization function may update the at least one virtual object based at least in part on the at least one message. In some embodiments, the apparatus 4600 applies data values from the at least one message in the digital rendering data format to the movement visualization function to generate and/or set updated data value(s) for one or more rendering properties of virtual object(s) in the digital twin.

At optional operation 5606, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that sets at least one rendering property associated with the at least one virtual object based at least in part on the movement visualization function. In some embodiments, the apparatus 4600 sets a rendering property corresponding to visibility through the at least one virtual object. For example, in some embodiments the apparatus 4600 utilizes the movement visualization function to set a data value of an opacity property of the at least one virtual object in the digital twin. In this regard, the apparatus 4600 may utilize the movement visualization function to make visible, or more fully visible, virtual object(s) corresponding to totes that are moving via a particular modular superstructure, and/or make invisible, or less visible, virtual object(s) corresponding to totes that are not moving in the modular superstructure. Alternatively or additionally, in some embodiments, the apparatus 4600 makes more visible virtual object(s) corresponding to totes as they begin to move and continue moving, and makes such virtual object(s) less visible as such totes slow moving as they reach a destination location. The apparatus 4600 may utilize one or more movement visualization function(s) to generate the data values for which such rendering properties are set.

At operation 5608, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that causes rendering of the updated digital twin on a user interface. The apparatus 4600 may cause rendering of the updated digital twin in a manner as depicted and described with respect to operation 5514. In some embodiments, the apparatus 4600 causes rendering of the updated digital twin via a particular rendering view. The apparatus 4600 may generate particular keyframes associated with changes in one or more data properties for virtual object(s) of the digital twin, for example updates to rendering properties set based at least in part on movement visualization function(s) as described herein. In this regard, the updated digital twin may be rendered via a particular interface in a manner that enables the updates to the virtual objects therein to be depicted to an end user.

Figure 57:
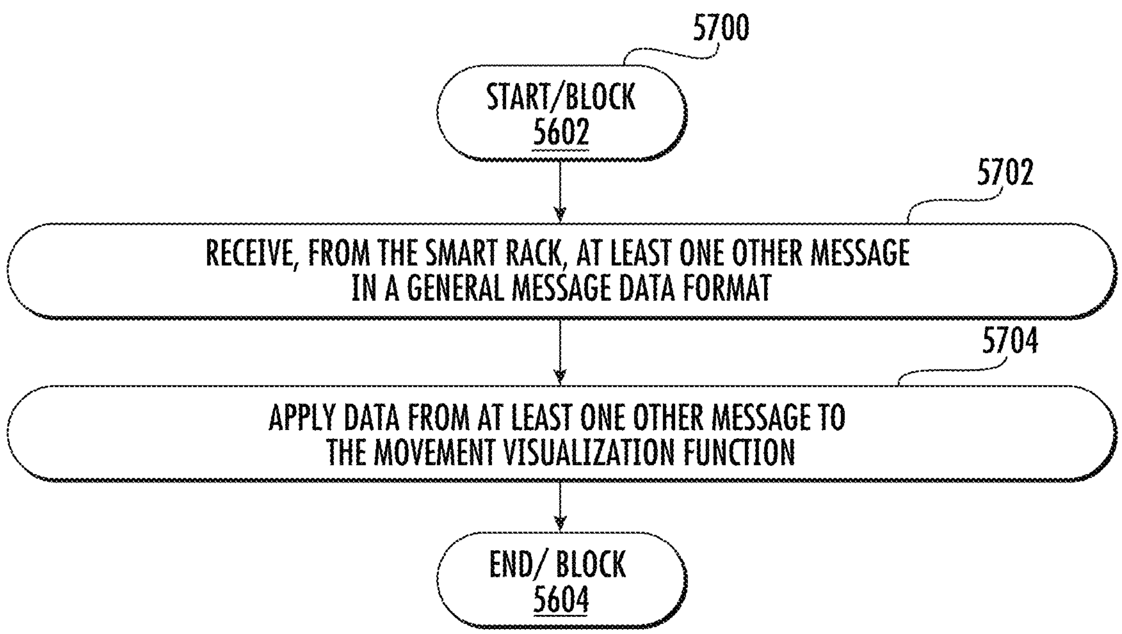
FIG. 57 illustrates a flowchart including example operations for using a movement visualization function based at least in part on messages in a general message data format in accordance with at least one example embodiment of the present disclosure.

FIG. 57 illustrates a flowchart including example operations for using a movement visualization function based at least in part on messages in a general message data format in accordance with at least one example embodiment of the present disclosure. Specifically, FIG. 57 depicts operations of an example process 5700. In some embodiments, the process 5700 is embodied by computer program code stored on a non-transitory computer-readable storage medium of a computer program product configured for execution to perform the process as depicted and described. Alternatively or additionally, in some embodiments, the process 5700 is performed by one or more specially configured computing devices, such as the apparatus 4600 alone or in communication with one or more other component(s), device(s), system(s), and/or the like. In this regard, in some such embodiments, the apparatus 4600 is specially configured by computer-coded instructions (e.g., computer program instructions) stored thereon, for example in the memory 4604 and/or another component depicted and/or described herein and/or otherwise accessible to the apparatus 4600, for performing the operations as depicted and described. In some embodiments, the apparatus 4600 is in communication with one or more external apparatus(es), system(s), device(s), and/or the like, to perform one or more of the operations as depicted and described. For example, the apparatus 4600 in some embodiments is in communication with at least one or more smart rack(s) of a modular superstructure, one or more other physical object(s), an optional external controller system, and/or the like. For purposes of simplifying the description, the process 5700 is described as performed by and from the perspective of the apparatus 4600.

The process 5700 begins at operation 5702. In some embodiments, the process 5700 begins after one or more operations depicted and/or described with respect to any one of the other processes described herein. For example, in some embodiments as depicted, the process 5700 begins after execution of operation 5602. In this regard, some or all of the process 5700 may replace or supplement one or more blocks depicted and/or described with respect to any of the processes described herein. Upon completion of the process 5700, the flow of operations may terminate. Additionally, or alternatively, as depicted, upon completion of the process 5700 in some embodiments, flow may return to one or more operation(s) of another process, such as the operation 5604. It will be appreciated that, in some embodiments, the process 5700 embodies a sub-process of one or more other process(es) depicted and/or described herein, for example the process 5600.

At operation 5702, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that receives, from the smart rack, at least one other message in a general message data format. In some embodiments, the at least one other message includes data value(s) for the data properties defined by the general message data format. The at least one other message may include data representing one or more operational aspect(s) associated with the smart rack and/or associated tote(s). In this regard, the apparatus 4600 may identify particular configuration data utilized to configure a digital twin based at least in part on the at least one other message in the general message data format.

At operation 5704, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that applies data from the at least one other message to the movement visualization function. In some embodiments, the movement visualization function utilizes the data from the at least one other message to set one or more data properties associated with at least one virtual object. It should be appreciated that the apparatus 4600 may utilize the data value for any parameter of the general message data format, for example, in the movement visualization function.

Figure 58:
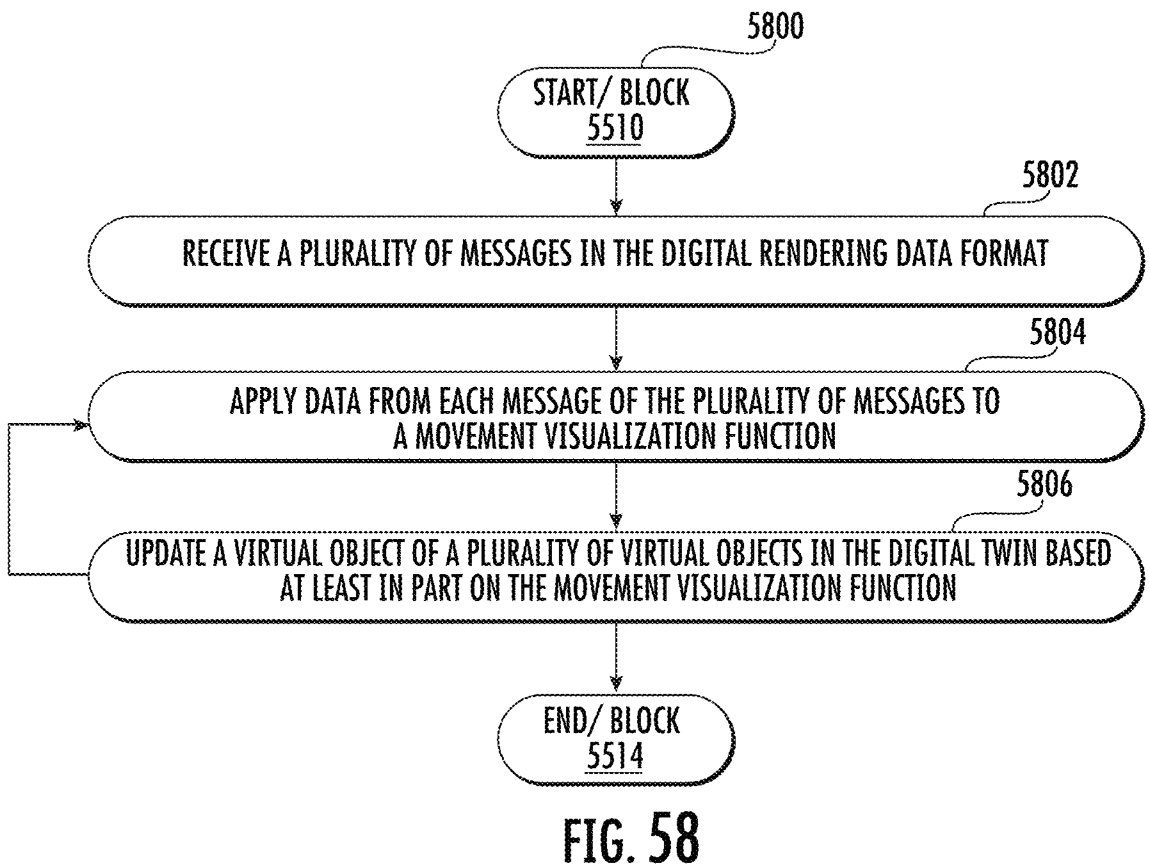
FIG. 58 illustrates a flowchart including example operations for updating a plurality of virtual objects in a digital twin based at least in part on a plurality of messages in a digital rendering data format in accordance with at least one example embodiment of the present disclosure.

FIG. 58 illustrates a flowchart including example operations for updating a plurality of virtual objects in a digital twin based at least in part on a plurality of messages in a digital rendering data format in accordance with at least one example embodiment of the present disclosure. Specifically, FIG. 58 depicts operations of an example process 5800. In some embodiments, the process 5800 is embodied by computer program code stored on a non-transitory computer-readable storage medium of a computer program product configured for execution to perform the process as depicted and described. Alternatively or additionally, in some embodiments, the process 5800 is performed by one or more specially configured computing devices, such as the apparatus 4600 alone or in communication with one or more other component(s), device(s), system(s), and/or the like. In this regard, in some such embodiments, the apparatus 4600 is specially configured by computer-coded instructions (e.g., computer program instructions) stored thereon, for example in the memory 4604 and/or another component depicted and/or described herein and/or otherwise accessible to the apparatus 4600, for performing the operations as depicted and described. In some embodiments, the apparatus 4600 is in communication with one or more external apparatus(es), system(s), device(s), and/or the like, to perform one or more of the operations as depicted and described. For example, the apparatus 4600 in some embodiments is in communication with at least one or more smart rack(s) of a modular superstructure, one or more other physical object(s), an optional external controller system, and/or the like. For purposes of simplifying the description, the process 5800 is described as performed by and from the perspective of the apparatus 4600.

The process 5800 begins at operation 5802. In some embodiments, the process 5800 begins after one or more operations depicted and/or described with respect to any one of the other processes described herein. For example, in some embodiments as depicted, the process 5800 begins after execution of operation 5510. In this regard, some or all of the process 5800 may replace or supplement one or more blocks depicted and/or described with respect to any of the processes described herein. Upon completion of the process 5800, the flow of operations may terminate. Additionally, or alternatively, as depicted, upon completion of the process 5800 in some embodiments, flow may return to one or more operation(s) of another process, such as the operation 5514. It will be appreciated that, in some embodiments, the process 5800 embodies a sub-process of one or more other process(es) depicted and/or described herein, for example the process 5500.

At operation 5802, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that receives a plurality of messages in the digital rendering data format. In some embodiments, the plurality of messages in the digital rendering data format are received via a plurality of smart racks. Additionally, or alternatively, in some embodiments, all of the plurality of messages are received from a particular smart rack. Each of the plurality of messages may be configured as depicted and described with respect to operation 5508 as depicted and described herein.

In some embodiments, the apparatus 300 processes each message of the plurality of messages for use in updating a digital twin. At operation 5804, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that applies data from each message of the plurality of messages to a movement visualization function. In some embodiments, the apparatus 4600 applies the data from each message of the plurality of messages in the digital rendering data format to the movement visualization function as depicted and described with respect to operation 5604. In this regard, the movement visualization function may be utilized to generate particular data based at least in part on the data from each received message. Each message may be associated with a different physical object, for example, and/or utilized to configure a particular virtual object corresponding to that particular physical object.

At operation 5806, the apparatus 4600 includes means such as the message processing circuitry 4610, the data monitoring circuitry 4612, the visualization circuitry 4614, the communications circuitry 4608, the input/output circuitry 4606, the processor 4602, and/or the like, or a combination thereof, that updates a virtual object of a plurality of virtual objects in the digital twin based at least in part on the movement visualization function. The apparatus 4600 in some embodiments updates at least one virtual object based at least in part on data corresponding to the at least one virtual object and that is generated via the movement visualization function. In this regard, the apparatus 4600 may process the plurality of messages to configure each virtual object based at least in part on the visualization message(s) in the digital rendering data format that are associated with particular physical object(s) corresponding to such virtual object(s). It should be appreciated, as described herein, that the physical object(s) and/or corresponding virtual object(s) for updating in some embodiments are identifiable from a particular message of the plurality of messages.

Such message processing may be repeated for any number of messages. For example, in some embodiments, the apparatus 4600 repeats the operations 5804 and 5806 for each message of the plurality of messages received at operation 5802. In this regard, the apparatus 4600 may enable updating of each virtual object associated with one or more received message(s) in the digital rendering data format.

Figure 59:
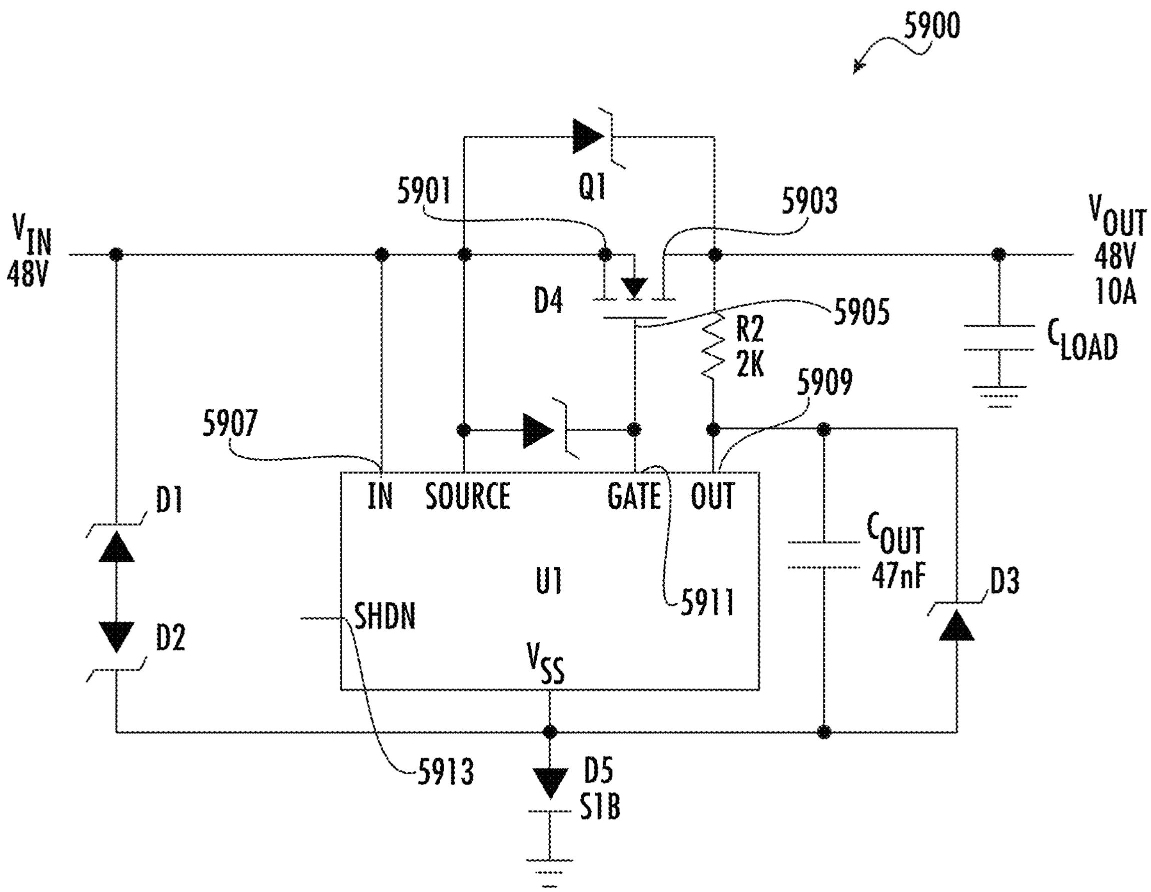
FIG. 59 illustrates an example circuit diagram of an example smart rack switch circuit in accordance with some embodiments of the present disclosure.

Referring now to FIG. 59, an example circuit diagram of an example smart rack switch circuit 5900 in accordance with some embodiments of the present disclosure is illustrated.

In some embodiments, the example smart rack switch circuit 5900 is a part of a smart rack. In particular, the example smart rack switch circuit 5900 provides a control switch/relay mechanism that controls the flow of power from the smart rack to a peer smart rack that is adjacent to the smart rack in one of the dimensions (for example, one of x dimension, y dimension, or z dimension as described above).

In some embodiments, the voltage input point $V_{IN}$ may correspond to the first end of the smart rack switch circuit 5900. For example, the voltage input point $V_{IN}$ may be a smart rack power access point that is connected to a power source. As another example, the voltage input point $V_{IN}$ may be a smart rack power access point that is connected to another smart rack switch circuit. For example, the voltage input point $V_{IN}$ may be connected to an voltage output point $V_{OUT}$ of another smart rack switch circuit from a peer smart rack that is adjacent to the smart rack in the x dimension, the y dimension, or the z dimension.

In some embodiments, the voltage output point $V_{OUT}$ may correspond to the second end of the smart rack switch circuit 5900. For example, the voltage output point $V_{OUT}$ may be connected to a peer smart rack power access point of a peer smart rack neighboring the smart rack. For example, the voltage output point $V_{OUT}$ may be connected to a voltage input point $V_{IN}$ of another smart rack switch circuit from a peer smart rack that is adjacent to the smart rack in the x dimension, the y dimension, or the z dimension.

While FIG. 59 illustrates an example voltage of 48 Volts at the voltage input point $V_{IN}$ and the voltage output point $V_{OUT}$, it is noted that the scope of the present disclosure is not limited to the example shown in FIG. 59. In some examples, an example smart rack switch circuit controls the flow of power that is less than or more than 48 Volts from the voltage input point $V_{IN}$ to the voltage output point $V_{OUT}$.

In the example shown in FIG. 59, the example smart rack switch circuit 5900 comprises a transistor Q1 and a controller U1.

In some embodiments, the transistor Q1 functions as a switch that enables and disables the flow of power from the voltage input point $V_{IN}$ to the voltage output point $V_{OUT}$. In some embodiments, the transistor Q1 comprises a field-effect transistor (FET). For example, the transistor Q1 comprises a transistor source pin 5901, a transistor drain pin 5903, and a transistor gate pin 5905.

In some embodiments, the transistor source pin 5901 is electrically coupled to a smart rack power access point associated with the smart rack. For example, the transistor source pin 5901 of the transistor Q1 is electrically coupled to the voltage input point $V_{IN}$. As described above, the voltage input point $V_{IN}$ is connected to the smart rack power access point associated with the smart rack. In some embodiments, the current enters the transistor Q1 through the transistor source pin 5901.

In some embodiments, the transistor drain pin 5903 is electrically coupled to a peer smart rack power access point of a peer smart rack neighboring the smart rack. For example, the transistor drain pin 5903 of the transistor Q1 is electrically coupled to the voltage output point $V_{OUT}$. As described above, the voltage output point $V_{OUT}$ is connected to a peer smart rack power access point of a peer smart rack neighboring the smart rack (for example, a peer smart rack that is adjacent to the smart rack in the x dimension, the y dimension, or the z dimension). In some embodiments, the current exits the transistor Q1 through the transistor source pin 5901.

In some embodiments, the transistor gate pin 5905 is formed by a diffusion of an N-type semiconductor and a P-type semiconductor. In other words, the transistor gate pin 5905 provides a PN junction region that controls the flow of the current from the transistor source pin 5901 to the transistor drain pin 5903.

In some embodiments, the transistor Q1 comprises a metal-oxide-semiconductor FET (also referred to as a MOSFET). In the example shown in FIG. 59, the transistor Q1 is in the form of a IPB200N25N3-G chip, which is an OptiMOS™3 Power-Transistor manufactured by Infineo®. Additionally, or alternatively, the transistor Q1 may be in other forms and/or comprise transistor(s) that are manufactured by other companies.

In some embodiments, the controller U1 functions as a power management controller that controls the transistor Q1. As described above, the transistor Q1 functions as a switch that turns on or turns off the flow of power from the voltage input point $V_{IN}$ to the voltage output point $V_{OUT}$. In some embodiments, the controller U1 provides a connection voltage to the transistor Q1 that causes the transistor Q1 to be turned on or provides a disconnection voltage to transistor Q1 that causes the transistor Q1 to be turned off.

For example, the controller U1 comprises an ideal diode controller that controls the transistor Q1 to form an ideal diode. In some embodiments, the controller U1 comprises an input voltage sensing pin 5907, an output voltage sensing pin 5909, and a gate drive output pin 5911.

In some embodiments, the input voltage sensing pin 5907 of the controller U1 is the anode of the ideal diode. In some embodiments, the input voltage sensing pin 5907 of the controller U1 is electrically coupled to the transistor source pin 5901 of the transistor Q1. In some embodiments, the voltage sensed at the input voltage sensing pin 5907 (which is the same as the voltage that enters the transistor Q1) is used to control the transistor Q1, details of which are described herein.

In some embodiments, the output voltage sensing pin 5909 of the controller U1 is the cathodal of the ideal diode. In some embodiments, the output voltage sensing pin 5909 of the controller U1 is electronically coupled to the transistor drain pin 5903 of the transistor Q1. In some embodiments, the voltage sensed at the output voltage sensing pin 5909 (which is the same as the voltage that exits the transistor Q1) is used to control the transistor Q1, details of which are described herein.

In some embodiments, the gate drive output pin 5911 of the controller U1 is electronically coupled to the transistor gate pin 5905 of the transistor Q1. In some embodiments, the gate drive output pin 5911 of the controller U1 provides a voltage to the transistor gate pin 5905 of the transistor Q1. In some embodiments, the transistor Q1 enables or disables the flow of power from the input voltage point $V_{IN}$ to the output voltage point $V_{OUT}$ based on the amount of voltage received at the transistor gate pin 5905 of the transistor Q1.

In particular, the controller U1 comprises a shutdown control pin 5913. In some embodiments, a power control input is transmitted to the controller U1 through the shutdown control pin 5913 of the controller U1. In some embodiments, the power control input indicates a signal that triggers the controller U1 to output a voltage to the transistor Q1. In particular, based on the power control input received at the shutdown control pin 5913, the controller U1 transmits a voltage through the gate drive output pin 5911 of the controller U1, which triggers either a connection or a disconnection of the flow of power from the input voltage point $V_{IN}$ to the output voltage point $V_{OUT}$. In some embodiments, the signal indicated by the power control input is in the form of a voltage signal.

In some embodiments, the power control input indicates/comprises a connection signal. In some embodiments, the connection signal is in the form of a voltage that is above a gate threshold voltage of the controller U1 (for example, but not limited to, 2 Volts). As described above, the power control input is provided to the controller U1 through the shutdown control pin 5913. In some embodiments, in response to receiving the power control input that comprises a connection signal, the controller U1 outputs a voltage from the gate drive output pin 5911 of the controller U1 to the transistor gate pin 5905 of the transistor Q1. In some embodiments, the voltage is above a trigger voltage threshold (for example, but not limited to, 10 Volts), which causes the PN junction region at the transistor gate pin 5905 of the transistor Q1 to open the channel between the transistor source pin 5901 and the transistor drain pin 5903 and enable the flow of power from the input voltage point $V_{IN}$ to the output voltage point $V_{OUT}$. As such, in response to the power control input indicates a connection signal, the controller U1 outputs a connection voltage through the gate drive output pin 5911 of the controller U1, which connects the transistor source pin 5901 of the transistor Q1 and the transistor drain pin 5903 of the transistor Q1.

In some embodiments, the power control input indicates/comprises a disconnection signal. In some embodiments, the disconnection signal is in the form of a voltage that is below the gate threshold voltage of the controller U1 (or is in the form of zero voltage). As described above, the power control input is provided to the controller U1 through the shutdown control pin 5913. In some embodiments, in response to receiving the power control input that comprises a disconnection signal, the controller U1 outputs a voltage from the gate drive output pin 5911 of the controller U1 to the transistor gate pin 5905 of the transistor Q1. In some embodiments, the voltage is below a trigger voltage threshold, which causes the PN junction region at the transistor gate pin 5905 of the transistor Q1 to close the channel between the transistor source pin 5901 and the transistor drain pin 5903 and disable the flow of power from the input voltage point $V_{IN}$ to the output voltage point $V_{OUT}$. As such, in response to the power control input indicates a disconnection signal, the controller U1 outputs a disconnection voltage through the gate drive output pin 5911 of the controller U1, which disconnects the transistor source pin 5901 of the transistor Q1 and the transistor drain pin 5903 of the transistor Q1.

Similar to those described above, the example smart rack switch circuit 5900 may be connected to an example smart matrix. In such an example, the example smart matrix may transmit power management instruction to the processing circuitry of the smart rack, and the processing circuitry may transmit power control input to the controller U1 based on the power management instruction. For example, if the power management instruction indicates that the transistor Q1 should be turned off, the processing circuitry provides a power control input that indicates a disconnection signal to the controller U1. If the power management instruction indicates that the transistor Q1 should be turned on, the processing circuitry provides a power control input that indicates a connection signal to the controller U1.

In the example shown in FIG. 59, the controller U1 is in the form of a LTC4359 chip, which is an ideal diode controller with reverse input protection that is manufactured by Analog Devices Inc. Additionally, or alternatively, the controller U1 may be in other forms and/or comprise controller(s) that are manufactured by other companies.

In some embodiments, the controller U1 comprises an ideal diode controller that controls the transistor Q1 to form an ideal diode. In some embodiments, when switching from a connection state to a disconnection state, the ideal diode stores energy that must be discharged through a reverse recovery that can generate a spike in voltage. In the example shown in FIG. 59, the diode D1, diode D2, the resistor R5, and the capacitor $C_{OUT}$ protect the controller U1 from the spike in voltage and absorb the reverse recovery energy.

The example smart rack switch circuit 5900 illustrated in FIG. 59 provides technical improvements and advantages. For example, the example smart rack switch circuit 5900 utilizes the transistor Q1 and the controller U1 to control the flow of power from the voltage input point $V_{IN}$ and the voltage output point $V_{OUT}$. Compared with other power switch circuits, the example smart rack switch circuit 5900 shown in FIG. 59 provides reduced resistance, which improves the power efficiency when controlling the flow of power from the voltage input point $V_{IN}$ and the voltage output point $V_{OUT}$.

Figure 60:
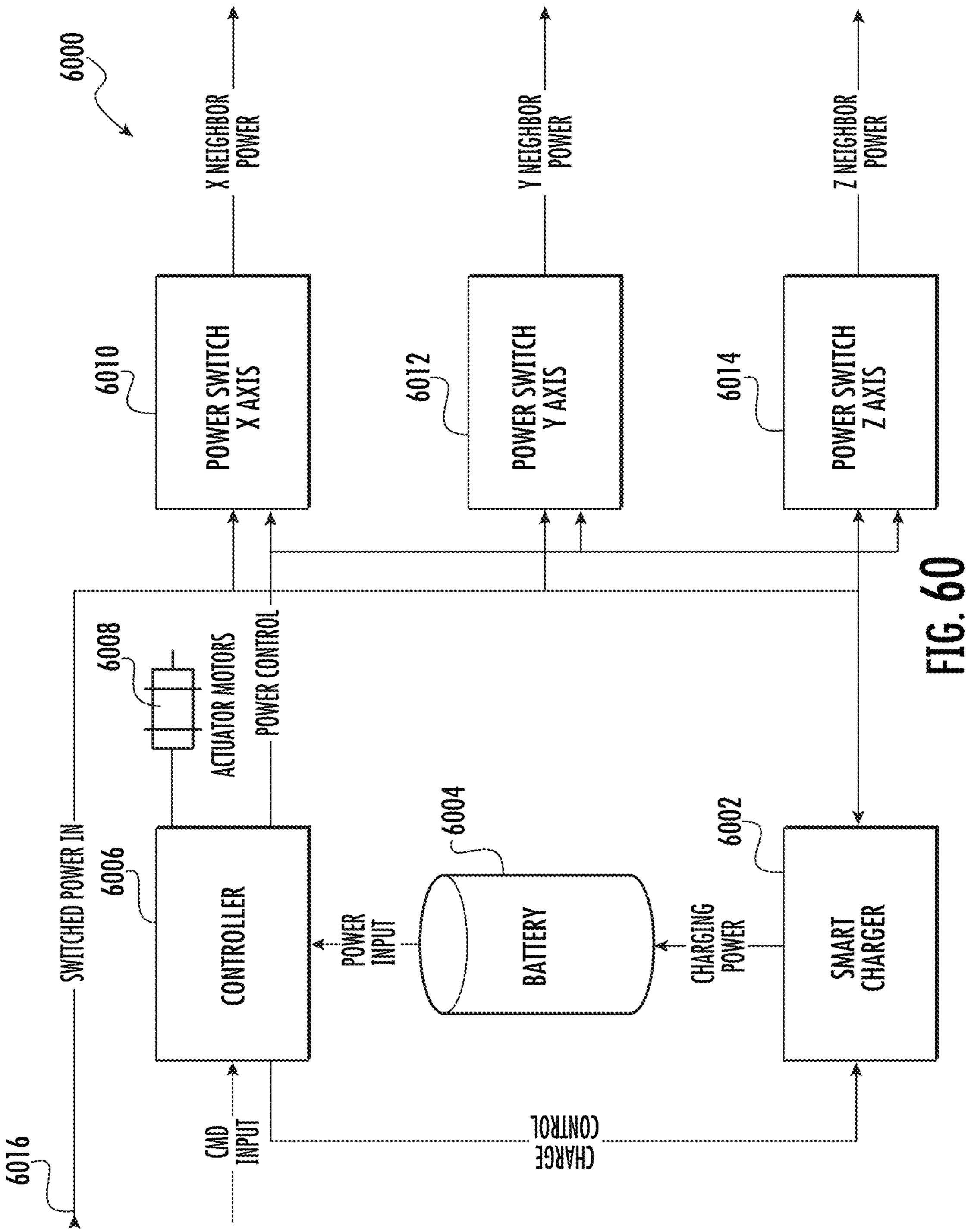
FIG. 60 illustrates an example diagram of an example smart rack power circuit in accordance with some embodiments of the present disclosure.

Referring now to FIG. 60, an example diagram of an example smart rack power circuit 6000 in accordance with some embodiments of the present disclosure is illustrated. In particular, the example smart rack power circuit 6000 selectively conveys power in a modular superstructure.

In the example shown in FIG. 60, the smart rack power circuit 6000 comprises a smart rack controller 6006, a rechargeable power source 6004, and a smart charger 6002.

In some embodiments, the smart rack controller 6006 comprises a processing circuitry, similar to various processing circuitries described above. For example, the smart rack controller 6006 may receive power management instructions and generate power control input signals to one or more dimension smart rack switch circuits. The smart rack controller 6006 may transmit actuator control signals to one or more rack actuator circuits to activate one or more rack actuators so that the rack actuators can engage with the rectangular prism and/or to cause the rectangular prism to move to a peer smart rack.

In particular, the smart rack controller 6006 is electrically coupled to at least one dimension smart rack switch circuit. In some embodiments, the smart rack controller 6006 transmits at least one power control input signal to the at least one dimension smart rack switch circuit based on the power management instructions. In some embodiments, the at least one dimension smart rack switch circuit is electrically coupled to the smart rack power access point 6016, and the at least one power control input signal indicates whether the at least one dimension smart rack switch circuit should connect or disconnect power from the smart rack power access point 6016 to a peer smart rack that is positioned adjacent to the smart rack in an axis dimension. Based on the at least one power control input signal, the dimension smart rack switch circuit is configured to control a flow of electricity from the smart rack power access point 6016 to the peer smart rack that is positioned adjacent to the smart rack in the axis dimension.

For example, if the power control input signal indicates a connection signal, the at least one dimension smart rack switch circuit connects power from the smart rack power access point 6016 to the peer smart rack associated with the at least one dimension smart rack switch circuit. Additionally, or alternatively, if the power control input signal indicates a disconnection signal, the at least one dimension smart rack switch circuit disconnects power from the smart rack power access point 6016 to the peer smart rack associated with the at least one dimension smart rack switch circuit. As such, the smart rack power circuit 6000 can selectively conveys power from the smart rack power access point 6016 to other peer smart racks in a modular superstructure.

In the example shown in FIG. 60, the at least one dimension smart rack switch circuit comprises at least one of an x dimension smart rack switch circuit 6010, a y dimension smart rack switch circuit 6012, and a z dimension smart rack switch circuit 6014. In some embodiments, the smart rack controller 6006 is electrically coupled to the x dimension smart rack switch circuit 6010, the y dimension smart rack switch circuit 6012, and the z dimension smart rack switch circuit 6014.

For example, as shown in FIG. 60, the x dimension smart rack switch circuit 6010 is electronically coupled to the smart rack power access point 6016 of the smart rack and the smart rack controller 6006. As described above, the smart rack controller 6006 transmits power control input signals to the x dimension smart rack switch circuit 6010. If the power control input signal indicates a connection signal, the x dimension smart rack switch circuit 6010 enables a flow of electricity from the smart rack power access point 6016 of the smart rack to a peer smart rack that is positioned adjacent to the smart rack in the x axis dimension. If the power control input signal indicates a disconnection signal, the x dimension smart rack switch circuit 6010 disables a flow of electricity from the smart rack power access point 6016 of the smart rack to a peer smart rack that is positioned adjacent to the smart rack in the x axis dimension.

Additionally, or alternatively, as shown in FIG. 60, the y dimension smart rack switch circuit 6012 is electronically coupled to the smart rack power access point 6016 of the smart rack and the smart rack controller 6006. As described above, the smart rack controller 6006 transmits power control input signals to the y dimension smart rack switch circuit 6012. If the power control input signal indicates a connection signal, the y dimension smart rack switch circuit 6012 enables a flow of electricity from the smart rack power access point 6016 of the smart rack to a peer smart rack that is positioned adjacent to the smart rack in the y axis dimension. If the power control input signal indicates a disconnection signal, the y dimension smart rack switch circuit 6012 disables a flow of electricity from the smart rack power access point 6016 of the smart rack to a peer smart rack that is positioned adjacent to the smart rack in the y axis dimension.

Additionally, or alternatively, as shown in FIG. 60, the z dimension smart rack switch circuit 6014 is electronically coupled to the smart rack power access point 6016 of the smart rack and the smart rack controller 6006. As described above, the smart rack controller 6006 transmits power control input signals to the z dimension smart rack switch circuit 6014. If the power control input signal indicates a connection signal, the z dimension smart rack switch circuit 6014 enables a flow of electricity from the smart rack power access point 6016 of the smart rack to a peer smart rack that is positioned adjacent to the smart rack in the z axis dimension. If the power control input signal indicates a disconnection signal, the z dimension smart rack switch circuit 6014 disables a flow of electricity from the smart rack power access point 6016 of the smart rack to a peer smart rack that is positioned adjacent to the smart rack in the z axis dimension.

In some embodiments, the smart rack controller 6006 is electrically coupled to a rack actuator circuit 6008. In some embodiments, the rack actuator circuit 6008 comprises at least one rack actuator. As described above, the smart rack in accordance with some embodiments of the present disclosure comprise rack actuators that are mechanically actuatable (e.g. motors and arms) and controllable (e.g. such as by the smart rack controller 6006) to move or otherwise urge a rectangular prism to a peer smart rack. For example, the rack actuators may be secured to a rack frame of the smart rack, and may receive actuator control signals from the smart rack controller 6006. In some embodiments, the actuator control signals may indicate whether to activate the rack actuators so that the rack actuators can engage with the rectangular prism and/or to cause the rectangular prism to move to a peer smart rack.

In some embodiments, the smart rack controller 6006 is electrically coupled to the rechargeable power source 6004. In some embodiments, the rechargeable power source 6004 provides power to the smart rack controller 6006 so that the smart rack controller 6006 can transmit the actuator control signals to the rack actuator circuit 6008 and/or transmit the power control input signal to the at least one dimension smart rack switch circuit (including, but not limited to, at least one of an x dimension smart rack switch circuit 6010, a y dimension smart rack switch circuit 6012, and/or a z dimension smart rack switch circuit 6014).

In some embodiments, the rechargeable power source 6004 refers to a source of electric power that can discharge electricity into the smart rack controller 6006 and be recharged with electricity from another power source (such as, but not limited to, the smart rack power access point 6016). In some embodiments, the rechargeable power source 6004 may be in the form of a rechargeable battery (such as, but not limited to, a Nickel-Cadmium rechargeable battery, a Nickel-Metal Hydride rechargeable battery, or a Lithium Ion rechargeable battery). In some embodiments, the rechargeable power source 6004 may be in the form of other rechargeable batteries.

In some embodiments, the smart charger 6002 is electrically coupled to the smart rack power access point 6016 and the rechargeable power source 6004. As described above, the rechargeable power source 6004 can be recharged with electricity from the smart rack power access point 6016. In some embodiments, the smart charger 6002 controls the flow of electricity from the smart rack power access point 6016 to the rechargeable power source 6004 for recharging the rechargeable power source 6004.

In particular, the smart rack controller 6006 transmits at least one charge control input signal to the smart charger 6002, and the smart charger 6002 is configured to control a flow of electricity from the smart rack power access point 6016 to the rechargeable power source 6004 based at least in part on the charge control input signal.

For example, when the rechargeable power source 6004 is low on power, the smart rack controller 6006 may receive a voltage that is not sufficient to activate the smart rack controller 6006. In response to receiving the insufficient voltage, the smart rack controller 6006 may transmit a charge control input signal to the smart charger 6002, indicating a request to the smart charger 6002 to enable the flow of electricity from the smart rack power access point 6016 to the rechargeable power source 6004. In response to receiving the charge control input signal, the smart charger 6002 charges the rechargeable power source 6004. When the rechargeable power source 6004 is charged with sufficient power, the smart rack controller 6006 transmits a charge control input signal to the smart charger 6002, indicating a request to the smart charger 6002 to disable the flow of electricity from the smart rack power access point 6016 to the rechargeable power source 6004. In response to receiving the charge control input signal, the smart charger 6002 stops charging the rechargeable power source 6004.

While the description above provides an example of charging the rechargeable power source 6004 based on charge control input signals that are generated by the smart rack controller 6006, it is noted that the scope of the present disclosure is not limited to the description above. In some examples, the smart rack controller 6006 may generate charge control input signals that indicate whether to charge the rechargeable power source 6004 based on user inputs. For example, a user may provide a user input to the smart rack controller 6006 through one or more input//output circuitries (such as, but not limited to, a keyboard, a mouse, a touch screen, and/or the like). If the user input indicates a request to charge the rechargeable power source 6004, the smart rack controller 6006 may transmit a charge control input signal to the smart charger 6002, and the smart charger 6002 enables the flow of electricity from the smart rack power access point 6016 to the rechargeable power source 6004. If the user input indicates a request to stop charging the rechargeable power source 6004, the smart rack controller 6006 may transmit a charge control input signal to the smart charger 6002, and the smart charger 6002 disables the flow of electricity from the smart rack power access point 6016 to the rechargeable power source 6004.

Figure 61:
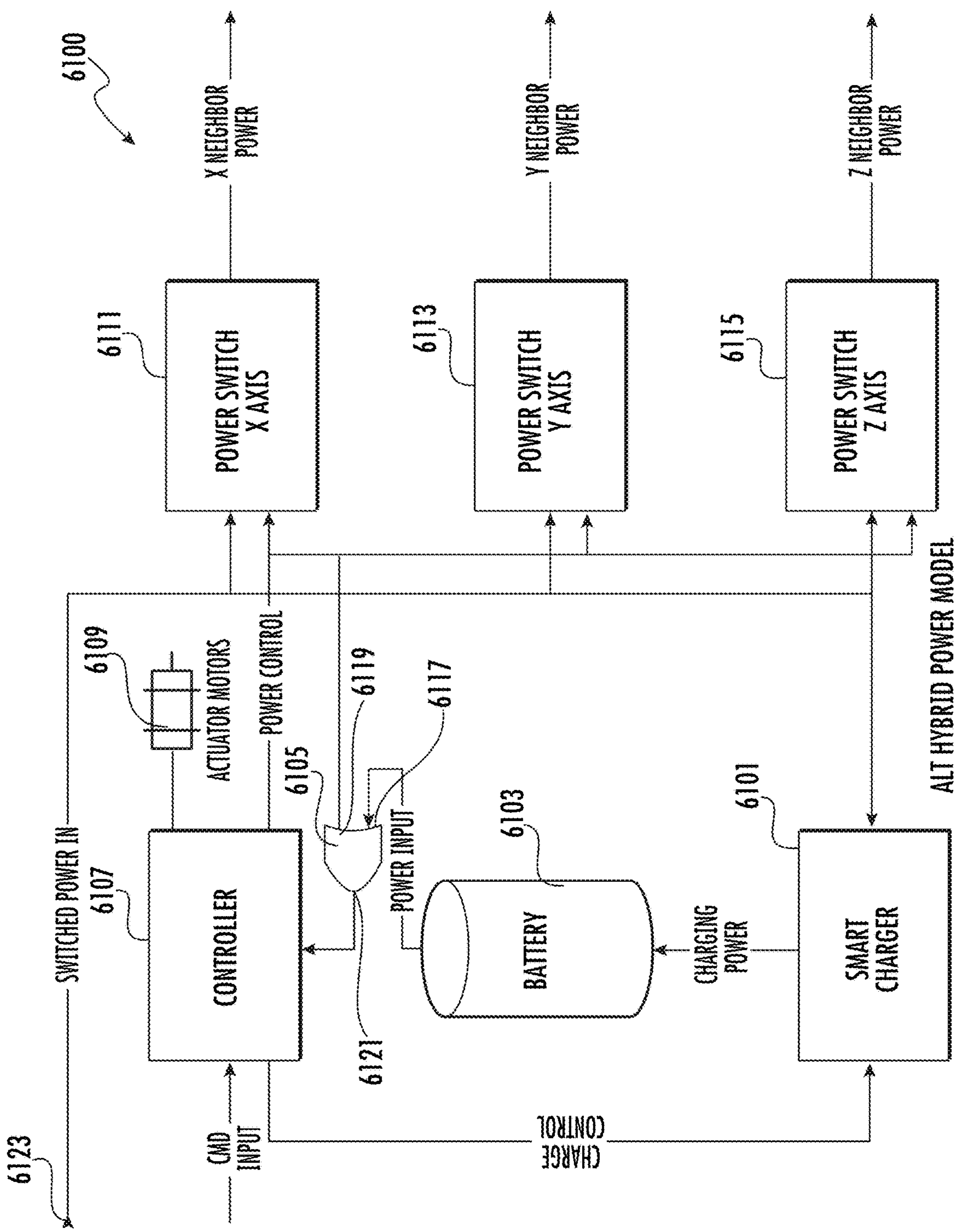
FIG. 61 illustrates an example diagram of an example smart rack switch circuit in accordance with some embodiments of the present disclosure.

Referring now to FIG. 61, an example diagram of an example smart rack power circuit 6100 in accordance with some embodiments of the present disclosure is illustrated. In particular, the example smart rack power circuit 6100 selectively conveys power in a modular superstructure.

In the example shown in FIG. 61, the example smart rack power circuit 6100 comprises an OR gate 6105 and a smart charger 6101.

In some embodiments, the OR gate 6105 is in the form of a digital logic circuit that comprises two input ends and one output end. In the example shown in FIG. 61, the OR gate 6105 comprises a first input end 6117, a second input end 6119, and an output end 6121.

In some embodiments, the output end 6121 of the OR gate 6105 is electrically coupled to a smart rack controller 6107. Similar to the smart rack controller 6006 described above in connection with at least FIG. 60, the smart rack controller 6107 comprises a processing circuitry, similar to various processing circuitries described above. For example, the smart rack controller 6107 may receive power management instructions and generate power control input signals to one or more dimension smart rack switch circuits. The smart rack controller 6107 may transmit actuator control signals to one or more rack actuator circuits to activate one or more rack actuators so that the rack actuators can engage with the rectangular prism and/or to cause the rectangular prism to move to a peer smart rack.

In particular, the smart rack controller 6107 is electrically coupled to at least one dimension smart rack switch circuit. In some embodiments, the smart rack controller 6107 transmits at least one power control input signal to the at least one dimension smart rack switch circuit based on the power management instructions. In some embodiments, the at least one dimension smart rack switch circuit is electrically coupled to the smart rack power access point 6123, and the at least one power control input signal indicates whether the at least one dimension smart rack switch circuit should connect or disconnect power from the smart rack power access point 6123 to a peer smart rack that is positioned adjacent to the smart rack in an axis dimension. Based on the at least one power control input signal, the dimension smart rack switch circuit is configured to control a flow of electricity from the smart rack power access point 6123 to the peer smart rack that is positioned adjacent to the smart rack in the axis dimension.

For example, if the power control input signal indicates a connection signal, the at least one dimension smart rack switch circuit connects power from the smart rack power access point 6123 to the peer smart rack associated with the at least one dimension smart rack switch circuit. Additionally, or alternatively, if the power control input signal indicates a disconnection signal, the at least one dimension smart rack switch circuit disconnects power from the smart rack power access point 6123 to the peer smart rack associated with the at least one dimension smart rack switch circuit. As such, the smart rack power circuit 6100 can selectively conveys power from the smart rack power access point 6123 to other peer smart racks in a modular superstructure.

In the example shown in FIG. 61, the at least one dimension smart rack switch circuit comprises at least one of an x dimension smart rack switch circuit 6111, a y dimension smart rack switch circuit 6113, and a z dimension smart rack switch circuit 6115. In some embodiments, the smart rack controller 6107 is electrically coupled to the x dimension smart rack switch circuit 6111, the y dimension smart rack switch circuit 6113, and the z dimension smart rack switch circuit 6115.

For example, as shown in FIG. 61, the x dimension smart rack switch circuit 6111 is electronically coupled to the smart rack power access point 6123 of the smart rack and the smart rack controller 6107. As described above, the smart rack controller 6107 transmits power control input signals to the x dimension smart rack switch circuit 6111. If the power control input signal indicates a connection signal, the x dimension smart rack switch circuit 6111 enables a flow of electricity from the smart rack power access point 6123 of the smart rack to a peer smart rack that is positioned adjacent to the smart rack in the x axis dimension. If the power control input signal indicates a disconnection signal, the x dimension smart rack switch circuit 6111 disables a flow of electricity from the smart rack power access point 6123 of the smart rack to a peer smart rack that is positioned adjacent to the smart rack in the x axis dimension.

Additionally, or alternatively, as shown in FIG. 61, the y dimension smart rack switch circuit 6113 is electronically coupled to the smart rack power access point 6123 of the smart rack and the smart rack controller 6107. As described above, the smart rack controller 6107 transmits power control input signals to the y dimension smart rack switch circuit 6113. If the power control input signal indicates a connection signal, the y dimension smart rack switch circuit 6113 enables a flow of electricity from the smart rack power access point 6123 of the smart rack to a peer smart rack that is positioned adjacent to the smart rack in the y axis dimension. If the power control input signal indicates a disconnection signal, the y dimension smart rack switch circuit 6113 disables a flow of electricity from the smart rack power access point 6123 of the smart rack to a peer smart rack that is positioned adjacent to the smart rack in the y axis dimension.

Additionally, or alternatively, as shown in FIG. 61, the z dimension smart rack switch circuit 6115 is electronically coupled to the smart rack power access point 6123 of the smart rack and the smart rack controller 6107. As described above, the smart rack controller 6107 transmits power control input signals to the z dimension smart rack switch circuit 6115. If the power control input signal indicates a connection signal, the z dimension smart rack switch circuit 6115 enables a flow of electricity from the smart rack power access point 6123 of the smart rack to a peer smart rack that is positioned adjacent to the smart rack in the z axis dimension. If the power control input signal indicates a disconnection signal, the z dimension smart rack switch circuit 6115 disables a flow of electricity from the smart rack power access point 6123 of the smart rack to a peer smart rack that is positioned adjacent to the smart rack in the z axis dimension.

In some embodiments, the smart rack controller 6107 is electrically coupled to a rack actuator circuit 6109. In some embodiments, the rack actuator circuit 6109 comprises at least one rack actuator. As described above, the smart rack in accordance with some embodiments of the present disclosure comprise rack actuators that are mechanically actuatable (e.g. motors and arms) and controllable (e.g. such as by the smart rack controller 6107) to move or otherwise urge a rectangular prism to a peer smart rack. For example, the rack actuators may be secured to a rack frame of the smart rack, and may receive actuator control signals from the smart rack controller 6107. In some embodiments, the actuator control signals may indicate whether to activate the rack actuators so that the rack actuators can engage with the rectangular prism and/or to cause the rectangular prism to move to a peer smart rack.

As described above, the smart rack controller 6107 is electrically coupled to the output end 6121 of the OR Gate 6105. In some embodiments, the output end 6121 of the OR Gate 6105 provides electrical power to the smart rack controller 6107 if either one or both of the first input end 6117 and the second input end 6119 receive electrical power. In some embodiments, the first input end 6117 of the OR gate 6105 is electrically coupled to a rechargeable power source 6103. In some embodiments, the second input end 6119 of the OR gate 6105 is electrically coupled to a smart rack power access point 6123. As such, the smart rack controller 6107 receives power from at least one of the smart rack power access point 6123 or the rechargeable power source 6103.

In some embodiments, the rechargeable power source 6103 refers to a source of electric power that can discharge electricity into the smart rack controller 6107 and be recharged with electricity from another power source (such as, but not limited to, the smart rack power access point 6123). In some embodiments, the rechargeable power source 6103 may be in the form of a rechargeable battery (such as, but not limited to, a Nickel-Cadmium rechargeable battery, a Nickel-Metal Hydride rechargeable battery, or a Lithium Ion rechargeable battery). In some embodiments, the rechargeable power source 6103 may be in the form of other rechargeable batteries.

In some embodiments, the smart charger 6101 is electrically coupled to the smart rack power access point 6123 and the rechargeable power source 6103. As described above, the rechargeable power source 6103 can be recharged with electricity from the smart rack power access point 6123. In some embodiments, the smart charger 6101 controls the flow of electricity from the smart rack power access point 6123 to the rechargeable power source 6103 for recharging the rechargeable power source 6103.

In particular, the smart rack controller 6107 transmits at least one charge control input signal to the smart charger 6101, and the smart charger 6101 is configured to control a flow of electricity from the smart rack power access point 6123 to the rechargeable power source 6103 based at least in part on the charge control input signal.

For example, when the rechargeable power source 6103 is low on power, the smart rack controller 6107 may receive a voltage that is not sufficient to activate the smart rack controller 6107. In response to receiving the insufficient voltage, the smart rack controller 6107 may transmit a charge control input signal to the smart charger 6101, indicating a request to the smart charger 6101 to enable the flow of electricity from the smart rack power access point 6123 to the rechargeable power source 6103. In response to receiving the charge control input signal, the smart charger 6101 charges the rechargeable power source 6103. When the rechargeable power source 6103 is charged with sufficient power, the smart rack controller 6107 transmits a charge control input signal to the smart charger 6101, indicating a request to the smart charger 6101 to disable the flow of electricity from the smart rack power access point 6123 to the rechargeable power source 6103. In response to receiving the charge control input signal, the smart charger 6101 stops charging the rechargeable power source 6103.

While the description above provides an example of charging the rechargeable power source 6103 based on charge control input signals that are generated by the smart rack controller 6107, it is noted that the scope of the present disclosure is not limited to the description above. In some examples, the smart rack controller 6107 may generate charge control input signals that indicate whether to charge the rechargeable power source 6103 based on user inputs. For example, a user may provide a user input to the smart rack controller 6107 through one or more input//output circuitries (such as, but not limited to, a keyboard, a mouse, a touch screen, and/or the like). If the user input indicates a request to charge the rechargeable power source 6103, the smart rack controller 6107 may transmit a charge control input signal to the smart charger 6101, and the smart charger 6101 enables the flow of electricity from the smart rack power access point 6123 to the rechargeable power source 6103. If the user input indicates a request to stop charging the rechargeable power source 6103, the smart rack controller 6107 may transmit a charge control input signal to the smart charger 6101, and the smart charger 6101 disables the flow of electricity from the smart rack power access point 6123 to the rechargeable power source 6103.

As described above, the smart rack controller 6107 receives power from at least one of the smart rack power access point 6123 or the rechargeable power source 6103. For example, when the smart rack controller 6107 needs power but the rechargeable power source 6103 is low on power, the smart rack controller 6107 can receive power from the smart rack power access point 6123 through the OR gate 6105 and provide a charge control input signal to the smart charger 6101 so that the rechargeable power source 6103 can be recharged. Additionally, or alternatively, when power is available from the smart rack power access point 6123, then the smart rack controller 6107 may choose to switch power from the rechargeable power source 6103 to the smart rack power access point 6123 to so as to receive power from the smart rack power access point 6123 and conserve the rechargeable power source 6103.

As described above, there are many technical challenges and difficulties associated with transporting a rectangular prism in a multi-dimensional modular superstructure that is built using a plurality of smart racks, including, but not limited to, technical challenges and difficulties associated with the mechanical mechanisms for transporting a rectangular prism from a smart rack to a peer smart rack that neighbors the smart rack in the x dimension, the y dimension, and/or the z dimension.

For example, an example rectangular prism may be in the form of, such as but not limited to, a carton, a case, a tote, a divided tote, a tray, a pallet, and/or the like. In some embodiments, the example rectangular prism may store one or more objects, goods, and/or articles, and the total weight of the rectangular prism (including the stored objects, goods, and/or articles) is not negligible. In such embodiments, the mechanical mechanism for transporting the rectangular prism between smart racks should provide sufficient mechanical support for the rectangular prism during transportation.

As another example, a rectangular prism that is positioned in an example smart rack may be transported to any one of the six peer smart racks that neighbor the smart rack. In such an example, the rectangular prism may be transported to a peer smart rack that is in the x dimension (for example, to a left peer smart rack or to a right peer smart rack), may be transported to a peer smart rack that is in the y dimension (for example, to a front peer smart rack or to a back peer smart rack), and may be transported to a peer smart rack that is in the z dimension (for example, to a top peer smart rack or a bottom peer smart rack). In some examples, mechanical mechanisms for transporting the rectangular prism may comprise separated or individual components for transporting the rectangular prism in one or more of the dimensions, and these separated or individual components should not obstruct transporting the rectangular prism in other directions. For example, mechanical mechanisms for transporting the rectangular prism may comprise one or more x dimension transportation components that transport the rectangular prism in the x dimension (for example, transporting the rectangular prism to the left peer smart rack or to the right peer smart rack). Because the rectangular prism may need to be transported to not only peer smart rack in the x dimension, but also peer smart rack in the y dimension and the z dimension, one or more x dimension transportation components should not obstruct transporting the rectangular prism in the y dimension or the z dimension.

Various embodiments of the present disclosure overcome these technical challenges and difficulties, and provide various technical improvements and benefits. In particular, FIG. 62 to FIG. 65 provide example illustrations of example mechanical mechanisms based on a rack and pinion assembly for transporting a rectangular prism from a smart rack to a peer smart rack vertically (in the Z direction) in accordance with various embodiments of the present disclosure. In some embodiments, the rack and pinion assembly not only provides mechanical support for rectangular prisms and enables transporting rectangular prisms, but also is configured to transform between an engaged mode (which transports the rectangular prism) and an retracted mode (which does not transport the rectangular prism and does not obstruct transporting the rectangular prism), details of which are described herein.

Figure 62:
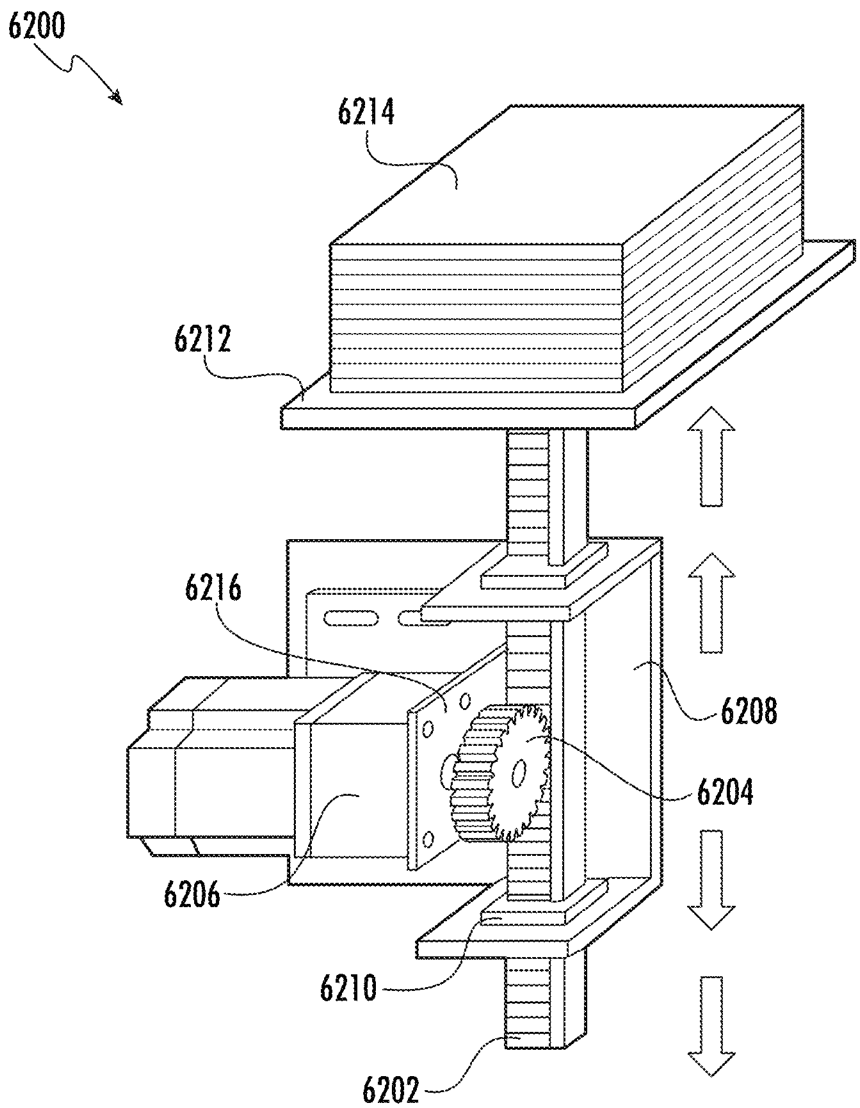
FIG. 62 illustrates an example rack and pinion assembly in accordance with some embodiments of the present disclosure.

Referring now to FIG. 62, an example rack and pinion assembly 6200 is shown.

In some embodiments, the example rack and pinion assembly 6200 comprise a geared rack 6202 (i.e., a linear gear) and a pinion gear 6204 (i.e., a circular gear).

In some embodiments, the pinion gear 6204 may be securely fixed at a location. In the example shown in FIG. 62, the pinion gear 6204 may be attached to a motor installation plate 6216. In some embodiments, the motor installation plate 6216 is secured to a baseboard 6208. In some embodiments, a rack grommet 6210 is also secured to the baseboard 6208. In the example shown in FIG. 62, the geared rack 6202 passes through an opening of the rack grommet 6210. As such, the rack grommet 6210 limits the motion of the pinion gear 6204 to linear motions (e.g. an up motion or a down motion).

In some embodiments, the motor installation plate 6216 and the rack grommet 6210 may be arranged on the baseboard 6208 such that the gears on the geared rack 6202 engage with the gears on the pinion gear 6204. In some embodiments, the rotation of the pinion gear 6204 affects linear motion of the geared rack 6202. In such an example, rotating the pinion gear 6204 causes the geared rack 6202 to move linearly up and down.

In some embodiments, the example rack and pinion assembly 6200 may be powered by one or more geared motors. For example, the pinion gear 6204 may be powered by one or more geared motors in a motor housing 6206. In the example shown in FIG. 62, the motor housing 6206 is secured to the motor installation plate 6216. In some embodiments, a rotation of the motor shaft of the geared motors causes a rotation of the pinion gear 6204, which in turn causes a linear motion of the geared rack 6202, similar to those described above.

In some embodiments, a platform 6212 is secured on top of the geared rack 6202. In some embodiments, the linear motion of the geared rack 6202 may affect motion on the platform 6212, which may be used to move a stack containing a plurality of objects 6214.

Figure 64:
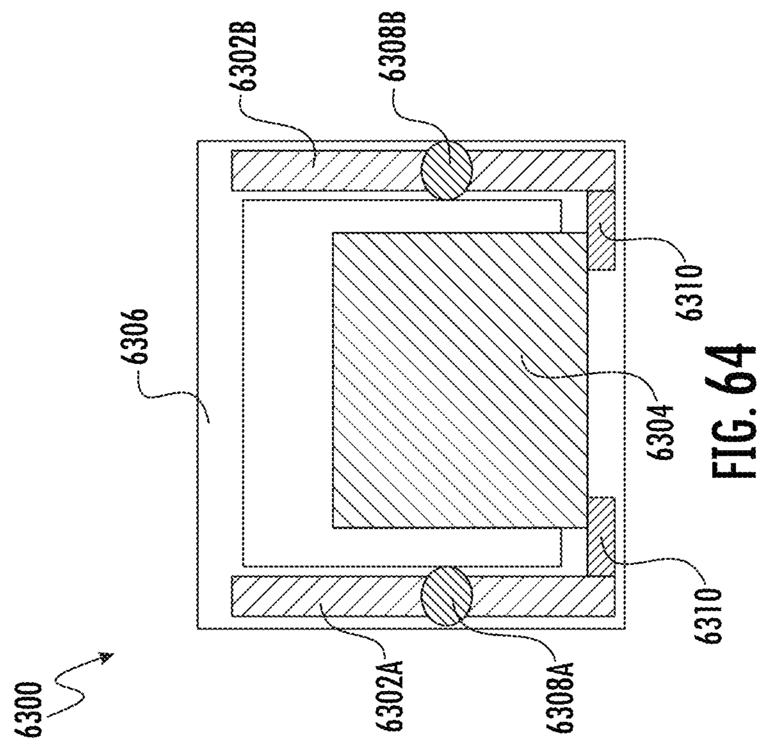
FIG. 64 illustrates an example smart rack with an example rack and pinion assembly in a retracted mode in accordance with some embodiments of the present disclosure.
Figure 63:
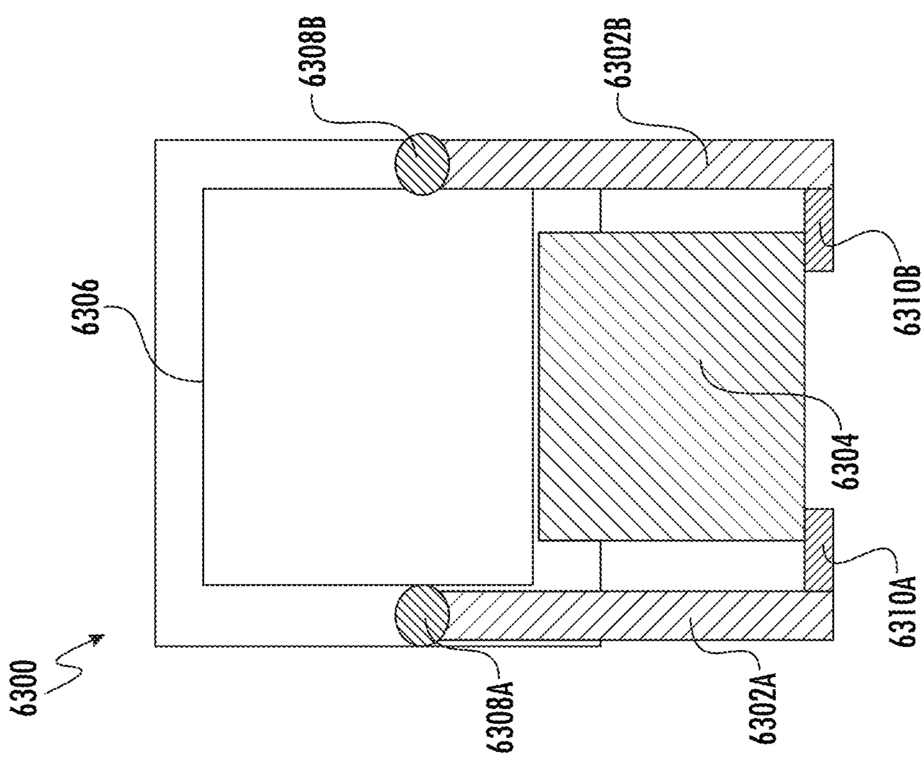
FIG. 63 illustrates an example smart rack with an example rack and pinion assembly in an engaged mode in accordance with some embodiments of the present disclosure.

In accordance with various embodiments of the present disclosure, an example smart rack may implement a rack and pinion assembly similar to the rack and pinion assembly 6200 shown in FIG. 62 to transport a rectangular prism vertically (i.e. in the Z directions). Referring now to FIG. 63 and FIG. 64, an example smart rack 6300 with a rack and pinion assembly is provided. In some embodiments, an example smart rack 6300 with the rack and pinion assembly may also be referred to as a "tree branches" system, as the shapes of the geared racks of the rack and pinion assembly mimic the shapes of tree branches.

In some embodiments, the smart rack 6306 with the rack and pinion assembly may be located within a superstructure (e.g., exemplary modular superstructure 1303). In some embodiments, the example smart rack 6300 with the rack and pinion assembly uses geared racks 6302 (e.g. offset "arms") to cause vertical movements (i.e., Z-axis movement) of a rectangular prism 6304 (such as a tote) from the smart rack 6306 to a peer smart rack, from a peer smart rack to the smart rack 6306, and/or through the smart rack 6306. In particular, FIG. 63 illustrates the rack and pinion assembly in an engaged mode. FIG. 64 illustrates the rack and pinion assembly in a retracted mode.

In the example shown in FIG. 63 and FIG. 64, a plurality of pinion gears are secured on a plurality of lateral rack beams. In some embodiments, the plurality of pinion gears may comprise a first pinion gear 6308A that is secured to a first lateral rack beam and a second pinion gear 6308B that is secured to a second lateral rack beam. In some embodiments, the first lateral rack beam and the second lateral rack beam are in diagonal arrangement with one another (for example, a right front lateral rack beam and a left back lateral rack beam, or a right back lateral rack beam and a left front lateral rack beam).

Similar to the example rack and pinion assembly 6200 illustrated and described above in connection with FIG. 62, the plurality of pinion gears may be used to effect motion on a plurality of geared racks. In the example shown in FIG. 63 and FIG. 64, a first geared rack 6302A engages with the first pinion gear 6308A, and a second geared rack 6302B engages with the second pinion gear 6308B. As described above, the rotation of a pinion gear causes a linear motion of the geared rack that engages with the pinion gear. As such, rotations of the first pinion gear 6308A and the second pinion gear 6308B cause linear motions of the first geared rack 6302A and the second geared rack 6302B, respectively, resulting in transformations of the rack and pinion assembly between an engaged mode and a retracted mode.

As shown in FIG. 63, when the rack and pinion assembly is in an engaged mode, at least a portion of the first geared rack 6302A and/or a portion of the second geared rack 6302B extend outside of the smart rack 6306. As shown in FIG. 64, when the rack and pinion assembly is in a retracted mode, the first geared rack 6302A and the second geared rack 6302B are hidden within the smart rack 6306.

In some embodiments, the geared racks may be connected to one or more respective forks. In some embodiments, the one or more respective forks correspond to and are in perpendicular arrangements with one or more geared racks. For example, the fork 6310A is connected to a bottom end of the geared rack 6302A and is in a perpendicular relationship with the geared rack 6302A. As another example, the fork 6310B is connected to a bottom end of the geared rack 6302B and is in a perpendicular relationship with the geared rack 6302B.

In some embodiments, the one or more respective forks (including, but not limited to, the fork 6310A and the fork 6310B) may hold one or more objects such as, but not limited to, a rectangular prism 6304. As such, the geared racks (including, but not limited to, the geared rack 6302A and the geared rack 6302B), in conjunction with the pinion gears (including, but not limited to, the pinion gear 6308A and the pinion gear 6308B) may be used together to raise and lower one or more objects (such as but not limited to, rectangular prism 6304) in the vertical, Z direction. In at least this way, in some embodiments, the rectangular prism 6304 may be moved between smart racks 6306, which, in some embodiments, may be positioned within a superstructure (e.g., modular superstructure 1303).

As described above, FIG. 63 illustrates the rack and pinion assembly (including the at least one pinion gear and the at least one geared rack) being in an engaged mode, where the at least a portion of the rectangular prism 6304 is positioned outside of the rack frame of the smart rack 6306. FIG. 64 illustrates the rack and pinion assembly (including the at least one pinion gear and the at least one geared rack) being in a retracted mode, where the rectangular prism 6304 is positioned within the rack frame of the smart rack 6306.

Figure 65:
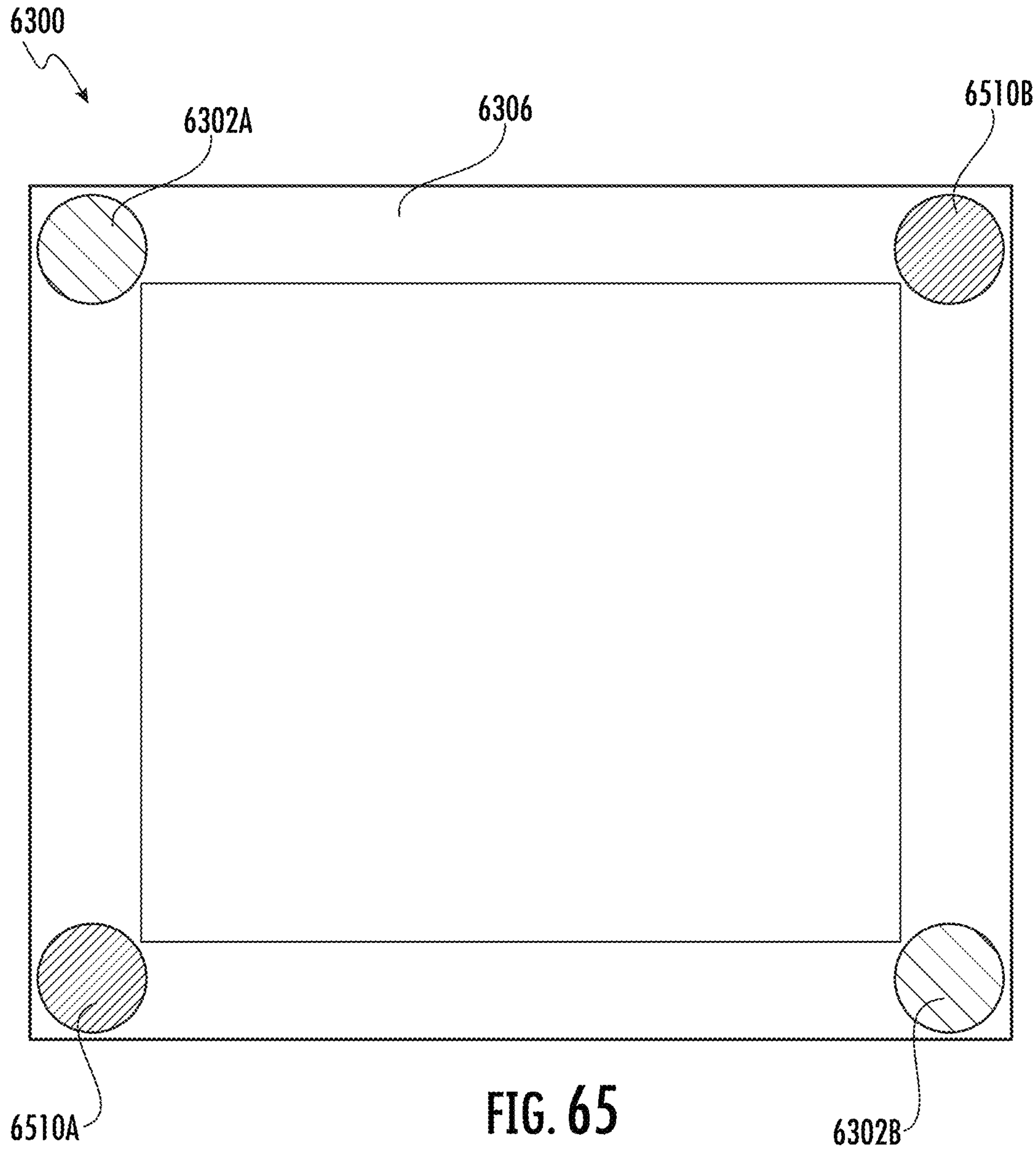
FIG. 65 illustrates an example top view of an example smart rack in accordance with some embodiments of the present disclosure.

As described above, the geared rack 6302A and the geared rack 6302B ("the arms") may be positioned diagonally across the smart rack 6300 to move the rectangular prism 6304. Referring now to FIG. 65, a top down view of the example smart rack 6300 with the rack and pinion assembly is provided. FIG. 65 illustrates how geared racks in one smart rack (e.g. the geared rack 6302A and the geared rack 6302B) are positioned to offset from the geared racks in a peer smart rack that is positioned above or below the smart rack.

As shown in at least FIG. 65, the geared rack 6302A and the geared rack 6302B (i.e. "arms") positioned to offset from two "voids" 6510A and 6510B. For example, the geared rack 6302A and the geared rack 6302B may be secured to the left back rack beam and the right front rack beam, respectively. The voids 6510A and 6510B may be positioned on the right front rack beam and the left back rack beam, respectively. As such, the geared rack 6302A and the geared rack 6302B are positioned diagonally from each other across the smart rack, and the voids 6510A and 6510B are positioned diagonally from each other across the smart rack. There is no overlapping between the geared racks and the voids.

Because smart racks can be stacked on top of each other, geared racks in peer smart racks in the vertical direction should be offset from one another, such that the geared racks in one smart rack do not cause interference to the geared racks in another smart rack. In at least this way, in some embodiments, the "arms" of a higher or lower smart rack 6306 may be configured to "move into" the "voids" 6510 of the smart rack, respectively.

As described above, there are many technical challenges and difficulties associated with transporting a rectangular prism in a multi-dimensional modular superstructure that is built using a plurality of smart racks, including, but not limited to, technical challenges and difficulties associated with the mechanical mechanisms for transporting a rectangular prism from a smart rack to a peer smart rack that neighbors the smart rack in the x dimension, the y dimension, and/or the z dimension.

For example, an example rectangular prism may be in the form of, such as but not limited to, a carton, a case, a tote, a divided tote, a tray, a pallet, and/or the like. In some embodiments, the example rectangular prism may store one or more objects, goods, and/or articles, and the total weight of the rectangular prism (including the stored objects, goods, and/or articles) is not negligible. In such embodiments, the mechanical mechanism for transporting the rectangular prism between smart racks should provide sufficient mechanical support for the rectangular prism during transportation.

As another example, a rectangular prism that is positioned in an example smart rack may be transported to any one of the six peer smart racks that neighbor the smart rack. In such an example, the rectangular prism may be transported to a peer smart rack that is in the x dimension (for example, to a left peer smart rack or to a right peer smart rack), may be transported to a peer smart rack that is in the y dimension (for example, to a front peer smart rack or to a back peer smart rack), and may be transported to a peer smart rack that is in the z dimension (for example, to a top peer smart rack or a bottom peer smart rack). In some examples, mechanical mechanisms for transporting the rectangular prism may comprise separated or individual components for transporting the rectangular prism in one or more of the dimensions, and these separated or individual components should not obstruct transporting the rectangular prism in other directions. For example, mechanical mechanisms for transporting the rectangular prism may comprise one or more x dimension transportation components that transport the rectangular prism in the x dimension (for example, transporting the rectangular prism to the left peer smart rack or to the right peer smart rack). Because the rectangular prism may need to be transported to not only peer smart rack in the x dimension, but also peer smart rack in the y dimension and the z dimension, one or more x dimension transportation components should not obstruct transporting the rectangular prism in the y dimension or the z dimension.

Various embodiments of the present disclosure overcome these technical challenges and difficulties, and provide various technical improvements and benefits. In particular, FIG. 66 to FIG. 68B provide example illustrations of example mechanical mechanisms for transporting a rectangular prism from a smart rack to a peer smart rack horizontally (e.g. in the X direction or in the Y direction) by utilizing a shutter mechanism in accordance with various embodiments of the present disclosure.

Figure 66:
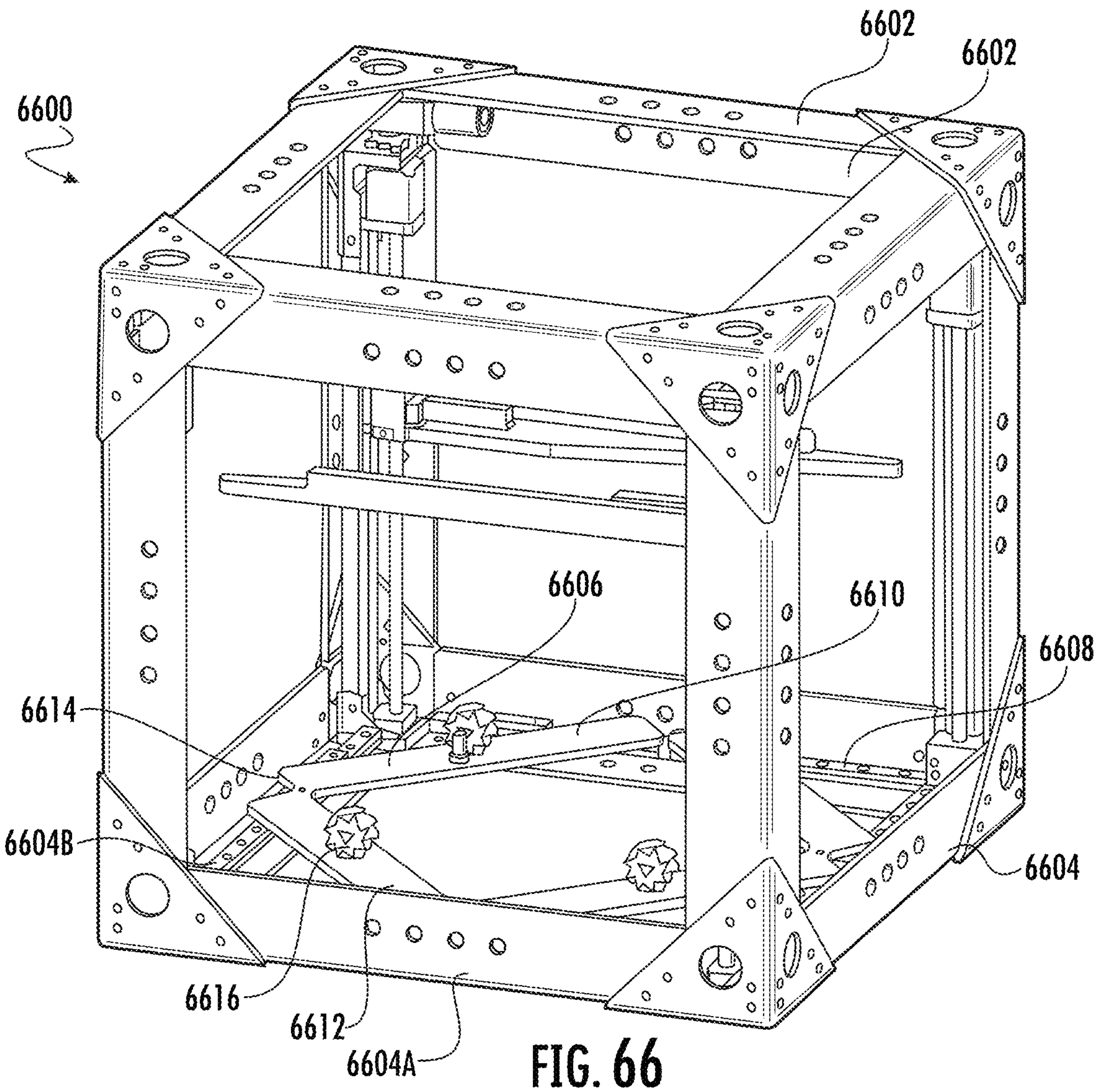
FIG. 66 illustrates an example smart rack with example shutters in accordance with some embodiments of the present disclosure.
Figure 67A:
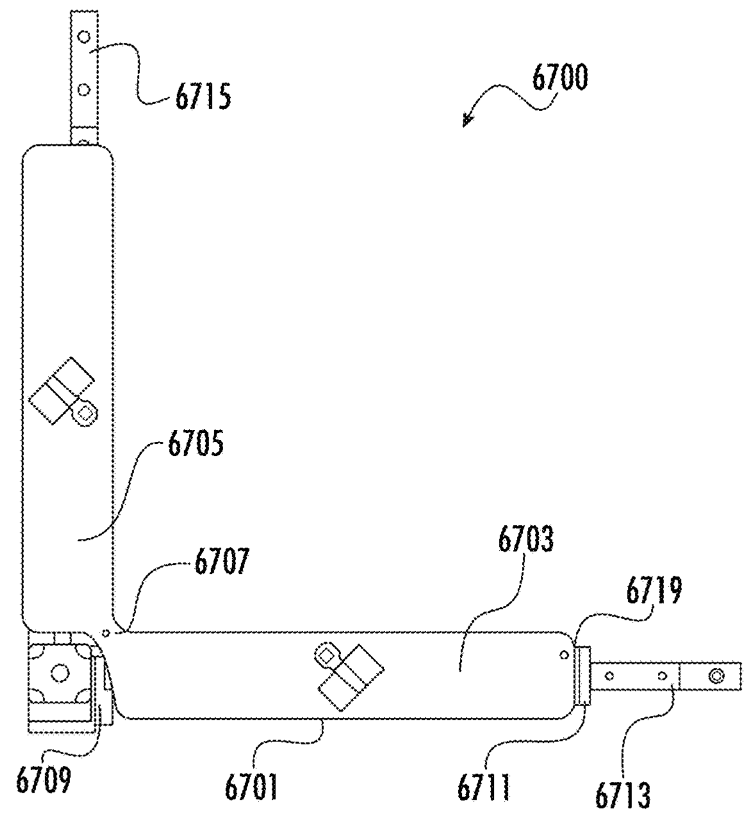
FIG. 67A and FIG. 67B illustrate an example smart rack with example shutters that are in a retraced mode in accordance with some embodiments of the present disclosure.
Figure 67B:
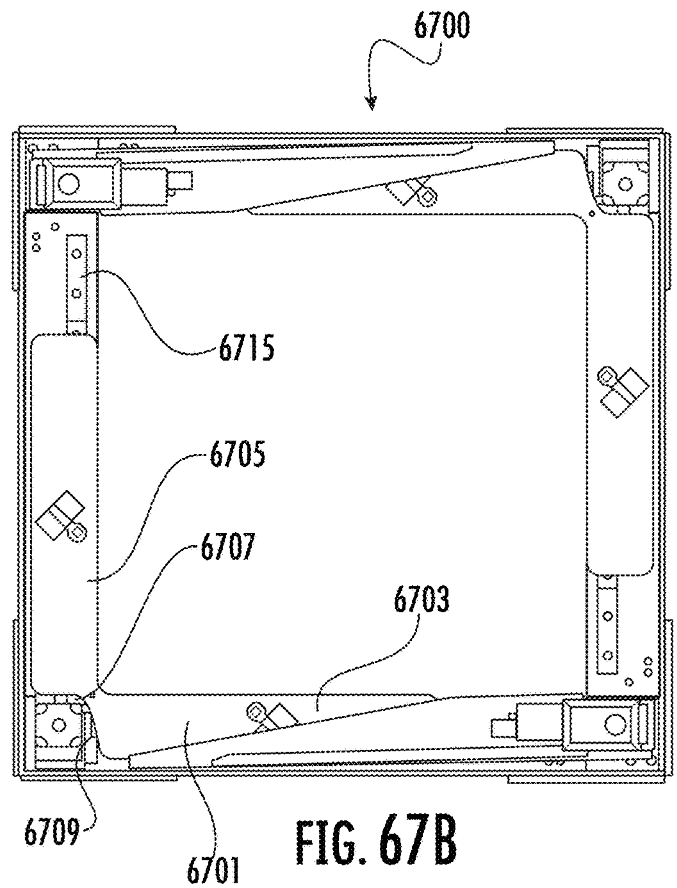
Figure 68A:
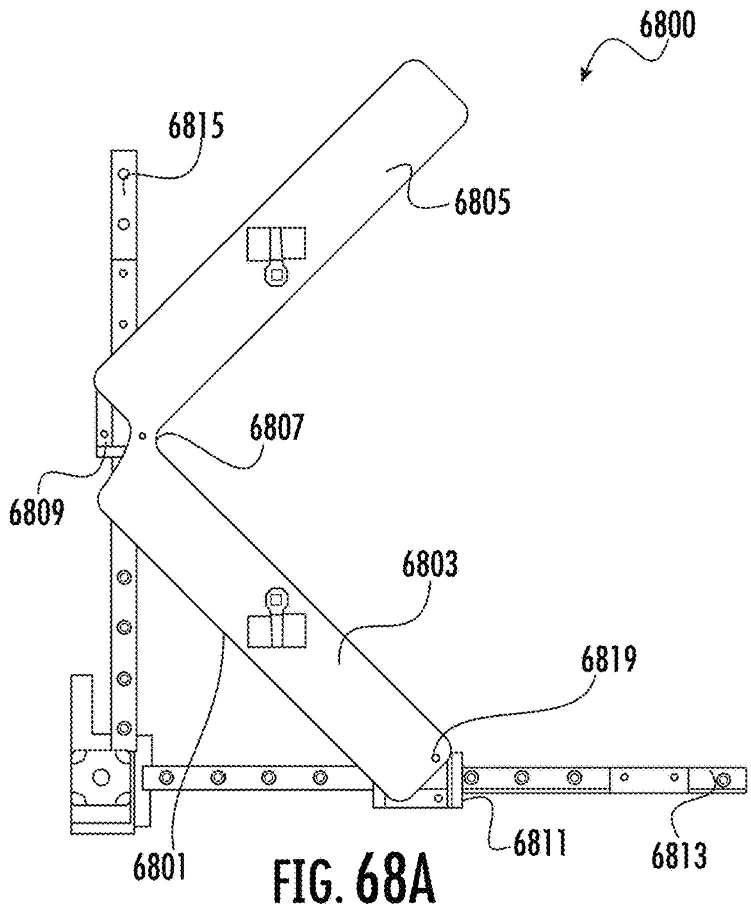
FIG. 68A and FIG. 68B illustrate an example smart rack with example shutters that are in an engaged mode in accordance with some embodiments of the present disclosure.
Figure 68B:
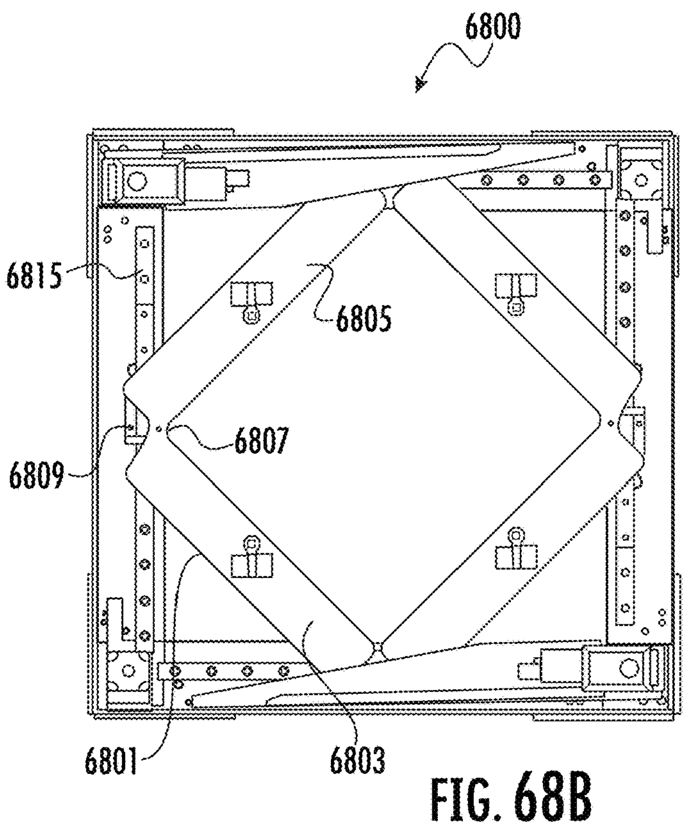

FIG. 66 illustrates an example smart rack 6600 with example shutters in accordance with some embodiments of the present disclosure. FIG. 67A and FIG. 67B illustrate at least a portion of an example smart rack 6700 with example shutters that are in an example retracted mode in accordance with some embodiments of the present disclosure. FIG. 68A and FIG. 68B illustrate an example smart rack 6800 with example shutters that are in an example engaged mode in accordance with some embodiments of the present disclosure.

Referring now to FIG. 66, an example smart rack 6600 is illustrated. In some embodiments, the example smart rack 6600 comprises a rack frame 6602 and at least one shutter (such as, but not limited to, the shutter 6606).

In some embodiments, the rack frame 6602 comprises a plurality of bottom rack beams 6604. Similar to those described above, the plurality of bottom rack beams 6604 are positioned on the bottom portion of the rack frame 6602.

In some embodiments, the shutter 6606 is movably secured to at least two of the plurality of bottom rack beams 6604. In the example shown in FIG. 66, the shutter 6606 is movably secured to the bottom rack beam 6604A and the bottom rack beam 6604B. In some embodiments, the bottom rack beam 6604A and the bottom rack beam 6604B are in perpendicular arrangements with one another.

In some embodiments, to movably secure/attach the shutter 6606 to the bottom rack beam 6604A and the bottom rack beam 6604B, the rack frame 6602 comprises a plurality of slide rails 6608 that are secured to the plurality of bottom rack beams 6604. For example, each of the plurality of bottom rack beams 6604 may comprise a horizontal beam plate and a vertical beam plate, and a slide rail is secured to an inner surface of the horizontal beam plate of each of the plurality of bottom rack beams 6604.

As described in further detail in connection with at least FIG. 67A, FIG. 67B, FIG. 68A, and FIG. 68B, the example smart rack 6600 comprises one or more sliders that are secured to one or more portions of the shutter 6606. In some embodiments, the one or more sliders engage with one or more of the plurality of slide rails 6608, causing transformations of the shutter 6606 between a retracted mode and an engaged mode.

In the example shown in FIG. 66, the example smart rack 6600 comprises two shutters that are slidably secured to the plurality of bottom rack beams. In particular, each of the two shutters are secured to different pairs of bottom rack beams.

It is noted that the scope of the present disclosure is not limited to the example shown in FIG. 66. In some examples, an example smart rack may comprise only one shutter that is slidably secured to the plurality of bottom rack beams. In some examples, an example smart rack may comprise more than two shutters that are slidably secured to the plurality of bottom rack beams.

In some embodiments, the shutter 6606 comprises/defines a plurality of portions. In the example shown in FIG. 66, the shutter 6606 defines a first leg portion 6610, a second leg portion 6612, and a center portion 6614. In some embodiments, the first leg portion 6610 and the second leg portion 6612 are in perpendicular arrangements with each other. In some embodiments, the center portion 6614 is between the first leg portion 6610 and the second leg portion 6612.

In some embodiments, the length of the first leg portion 6610 is the same as the length of the second leg portion 6612. In some embodiments, the length of the first leg portion 6610 and the length of the second leg portion 6612 are smaller than the length of the bottom rack beam of the smart rack 6600. In some embodiments, the length of the first leg portion 6610 and the length of the second leg portion 6612 provide technical advantages such as, but not limited to, allowing the shutter 6606 to transform between a retracted mode and an engaged mode, details of which are illustrated and described in connection with at least FIG. 67A, FIG. 67B, FIG. 68A, and FIG. 68B.

In some embodiments, the smart rack 6600 further comprises at least one mecanum wheel 6616.

In some embodiments, the at least one mecanum wheel 6616 is disposed on a top surface of the at least one shutter 6606. The mecanum wheel 6616 is an omnidirectional wheel that comprises a hub and rollers. In some embodiments, a rectangular prism is positioned on the at least one mecanum wheel 6616. In some embodiments, the at least one mecanum wheel 6616 (and along with the shutter 6606 and/or one or more arms that are rotatably secured to one or more lateral rack beams as shown in FIG. 66) enables the rectangular prism to be transported horizontally (e.g. in the X direction and in the Y direction), additional details of which are described in connection with at least FIG. 67A, FIG. 67B, FIG. 68A and FIG. 68B.

In the example shown in FIG. 66, the example smart rack 6600 comprises two mecanum wheels that are secured to the top surface of each shutter. For example, one of the mecanum wheels is secured on a top surface of the first leg portion 6610 of the shutter 6606, and the other mecanum wheel is secured on a top surface of the second leg portion 6612 of the shutter 6606.

It is noted that the scope of the present disclosure is not limited to the example shown in FIG. 66. In some examples, an example smart rack may comprise only one mecanum wheel that is secured to the top surface of a shutter. In some examples, an example smart rack may comprise more than two mecanum wheels that are secured to the top surface of a shutter.

Referring now to FIG. 67A to FIG. 68B, example modes of example shutters in example smart racks in accordance with some embodiments of the present disclosure are illustrated.

In particular, FIG. 67A and FIG. 67B illustrate an example shutter that is in a retraced mode in the smart rack 6700. FIG. 68A and FIG. 68B illustrate an example shutter that is in an engaged mode in the smart rack 6800.

In the example shown in FIG. 67A and FIG. 67B, the example shutter 6701 comprises a first leg portion 6703, a second leg portion 6705, and a center portion 6707, similar to those described above in connection with at least FIG. 66. In some embodiments, the first leg portion 6703 is in a perpendicular arrangement with the second leg portion 6705. In some embodiments, the center portion 6707 is positioned between the first leg portion 6703 and the second leg portion 6705.

Similar to those described above in connection with at least FIG. 66, the example shutter 6701 is slidably secured to the smart rack 6700. In particular, the smart rack 6700 comprises a plurality of sliding rails that are secured to the plurality of bottom rack beams. In some embodiments, one or more sliders are slidably attached to the plurality of sliding rails and secured to the example shutter 6701. The one or more sliders enable the example shutter 6701 to slide along the sliding rails, causing the example shutter 6701 to transfer between a retracted mode and an engaged mode.

In particular, the smart rack 6700 may comprise a center slider 6709 and a leg slider 6711. In some embodiments, the center slider 6709 is movable along a first slide rail 6713 of the plurality of slide rails, and the leg slider 6711 is movable along a second slide rail 6715 of the plurality of slide rails. In some embodiments, the first slide rail 6713 and the second slide rail 6715 are in perpendicular arrangements with one another.

In some embodiments, the center portion 6707 of the example shutter 6701 is secured to the center slider 6709. Because the center slider 6709 is movable along the first slide rail 6713, the center slider 6709 allows the center portion 6707 of the example shutter 6701 to slide along the first slide rail 6713.

In some embodiments, the first end 6719 of the first leg portion 6703 of the shutter 6701 is secured to a leg slider 6711. Because the leg slider 6711 is movable along the second slide rail 6715, the leg slider 6711 allows the first leg portion 6703 of the shutter 6701 to slide along the second slide rail 6715.

As described above, FIG. 67A and FIG. 67B illustrates the shutter 6701 in a retracted mode. In the retracted mode, the first leg portion 6703 is aligned with the first slide rail 6713 and the second leg portion 6705 is aligned with the second slide rail 6715. Because the first leg portion 6703 is in a perpendicular arrangement with the second leg portion 6705, and the first slide rail 6713 is in a perpendicular arrangement with the second slide rail 6715, the center portion 6707 is aligned with a lateral rack beam. In other words, when the shutter 6606 in the retracted mode, the shutter 6606 is hidden on top of the bottom rack beams and does not obstruct any vertical movement of rectangular prisms to, from, or through the smart rack 6700.

In some embodiments, the shutter 6606 transforms from the retracted mode shown in FIG. 67A and FIG. 67B to the engaged mode shown in FIG. 68A and FIG. 68B. In some embodiments, the transformation may be caused by sliding the center slider 6709 along the first slide rail 6713 and/or sliding the leg slider 6711 along the second slide rail 6715.

In the example shown in FIG. 68A and FIG. 68B, the example shutter 6801 comprises a first leg portion 6803, a second leg portion 6805, and a center portion 6807, similar to those described above in connection with at least FIG. 66, FIG. 67A, and FIG. 67B. In some embodiments, the first leg portion 6803 is in a perpendicular arrangement with the second leg portion 6805. In some embodiments, the center portion 6807 is positioned between the first leg portion 6803 and the second leg portion 6805.

Similar to those described above in connection with at least FIG. 66, FIG. 67A, and FIG. 67B, the example shutter 6801 is slidably secured to the smart rack 6800. In particular, the smart rack 6800 comprises a plurality of sliding rails that are secured to the plurality of bottom rack beams, and one or more sliders that are secured to the example shutter 6801. The one or more sliders enable the example shutter 6801 to slide along the sliding rails and transfer between a retracted mode and an engaged mode.

In particular, the smart rack 6800 may comprise a center slider 6809 and a leg slider 6811. In some embodiments, the center slider 6809 is movable along a first slide rail 6813 of the plurality of slide rails, and the leg slider 6811 is movable along a second slide rail 6815 of the plurality of slide rails. In some embodiments, the first slide rail 6813 and the second slide rail 6815 are in perpendicular arrangements with one another.

In some embodiments, the center portion 6807 of the example shutter 6801 is secured to the center slider 6809. Because the center slider 6809 is movable along the first slide rail 6813, the center slider 6809 allows the center portion 6807 of the example shutter 6801 to slide along the first slide rail 6813.

In some embodiments, the first end 6819 of the first leg portion 6803 of the shutter 6801 is secured to a leg slider 6811. Because the leg slider 6811 is movable along the second slide rail 6815, the leg slider 6811 allows the first leg portion 6803 of the shutter 6801 to slide along the second slide rail 6815.

As described above, FIG. 68A and FIG. 68B illustrates the shutter 6606 in an engaged mode. In the engaged mode, the first end 6819 of the first leg portion 6803 is slid to a middle portion of the first slide rail 6813 and the center portion 6807 is slid to a middle portion of the second slide rail 6815. As such, the shutter 6606 is not aligned with the bottom rack beams of the smart rack, and therefore can provide mechanical support for a rectangular prism.

In the example shown in FIG. 68B, the example smart rack 6800 comprises another shutter that is secured to the plurality of bottom rack beams. Because each shutter comprises a first leg portion and a second leg portions that are in a perpendicular arrangement with one another, when the pair of shutters are in engaged modes, the pair of shutters may form a rectangular shape, providing mechanical support for a rectangular prism that is positioned on top of the pair of shutters.

Similar to those described above, the example smart rack 6800 may comprise at least one arm that is rotationally secured to a lateral rack beam, and at least one mecanum wheel that is disposed on the top surface of the shutter. In some embodiments, when the shutter 6606 in the engaged mode, the shutter 6606 provides mechanical support for the rectangular prism, and the at least one arm may push the rectangular prism to a peer smart rack in a horizontal direction (e.g., in the X direction or in the Y direction), and the at least one mecanum wheel may further facilitate the movement of the rectangular prism.

As described above, there are many technical challenges and difficulties associated with transporting a rectangular prism in a multi-dimensional modular superstructure that is built using a plurality of smart racks, including, but not limited to, technical challenges and difficulties associated with the mechanical mechanisms for transporting a rectangular prism from a smart rack to a peer smart rack that neighbors the smart rack in the x dimension, the y dimension, and/or the z dimension.

For example, an example rectangular prism may be in the form of, such as but not limited to, a carton, a case, a tote, a divided tote, a tray, a pallet, and/or the like. In some embodiments, the example rectangular prism may store one or more objects, goods, and/or articles, and the total weight of the rectangular prism (including the stored objects, goods, and/or articles) is not negligible. In such embodiments, the mechanical mechanism for transporting the rectangular prism between smart racks should provide sufficient mechanical support for the rectangular prism during transportation.

As another example, a rectangular prism that is positioned in an example smart rack may be transported to any one of the six peer smart racks that neighbor the smart rack. In such an example, the rectangular prism may be transported to a peer smart rack that is in the x dimension (for example, to a left peer smart rack or to a right peer smart rack), may be transported to a peer smart rack that is in the y dimension (for example, to a front peer smart rack or to a back peer smart rack), and may be transported to a peer smart rack that is in the z dimension (for example, to a top peer smart rack or a bottom peer smart rack). In some examples, mechanical mechanisms for transporting the rectangular prism may comprise separated or individual components for transporting the rectangular prism in one or more of the dimensions, and these separated or individual components should not obstruct transporting the rectangular prism in other directions. For example, mechanical mechanisms for transporting the rectangular prism may comprise one or more x dimension transportation components that transport the rectangular prism in the x dimension (for example, transporting the rectangular prism to the left peer smart rack or to the right peer smart rack). Because the rectangular prism may need to be transported to not only peer smart rack in the x dimension, but also peer smart rack in the y dimension and the z dimension, one or more x dimension transportation components should not obstruct transporting the rectangular prism in the y dimension or the z dimension.

Various embodiments of the present disclosure overcome these technical challenges and difficulties, and provide various technical improvements and benefits. In particular, FIG. 69 to FIG. 70 provide example illustrations of example mechanical mechanisms for transporting a rectangular prism from a smart rack to a peer smart rack in accordance with various embodiments of the present disclosure by utilizing one or more transport rollers.

Figure 69:
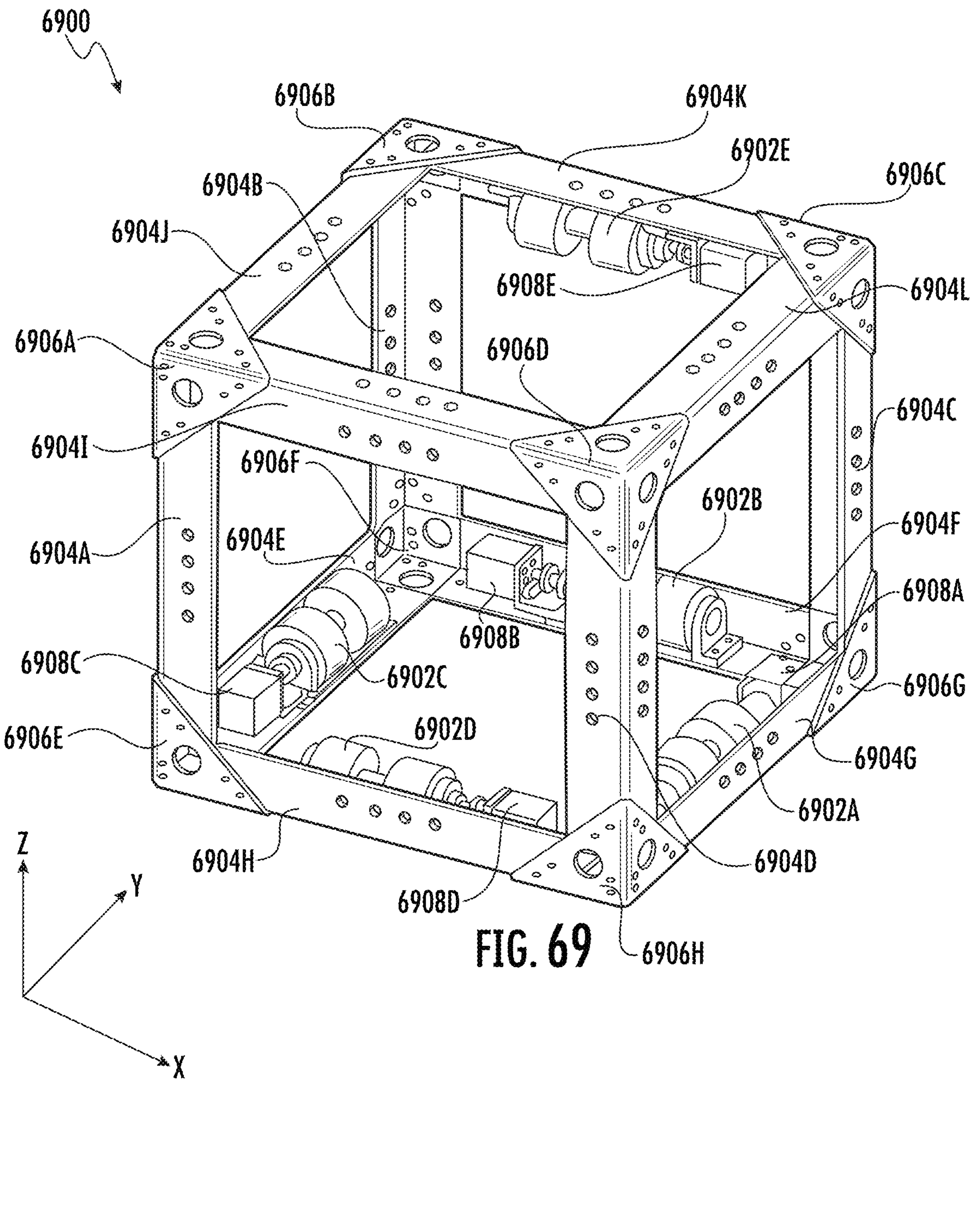
FIG. 69 illustrates an example smart rack with example transport rollers in accordance with some embodiments of the present disclosure.
Figure 70:
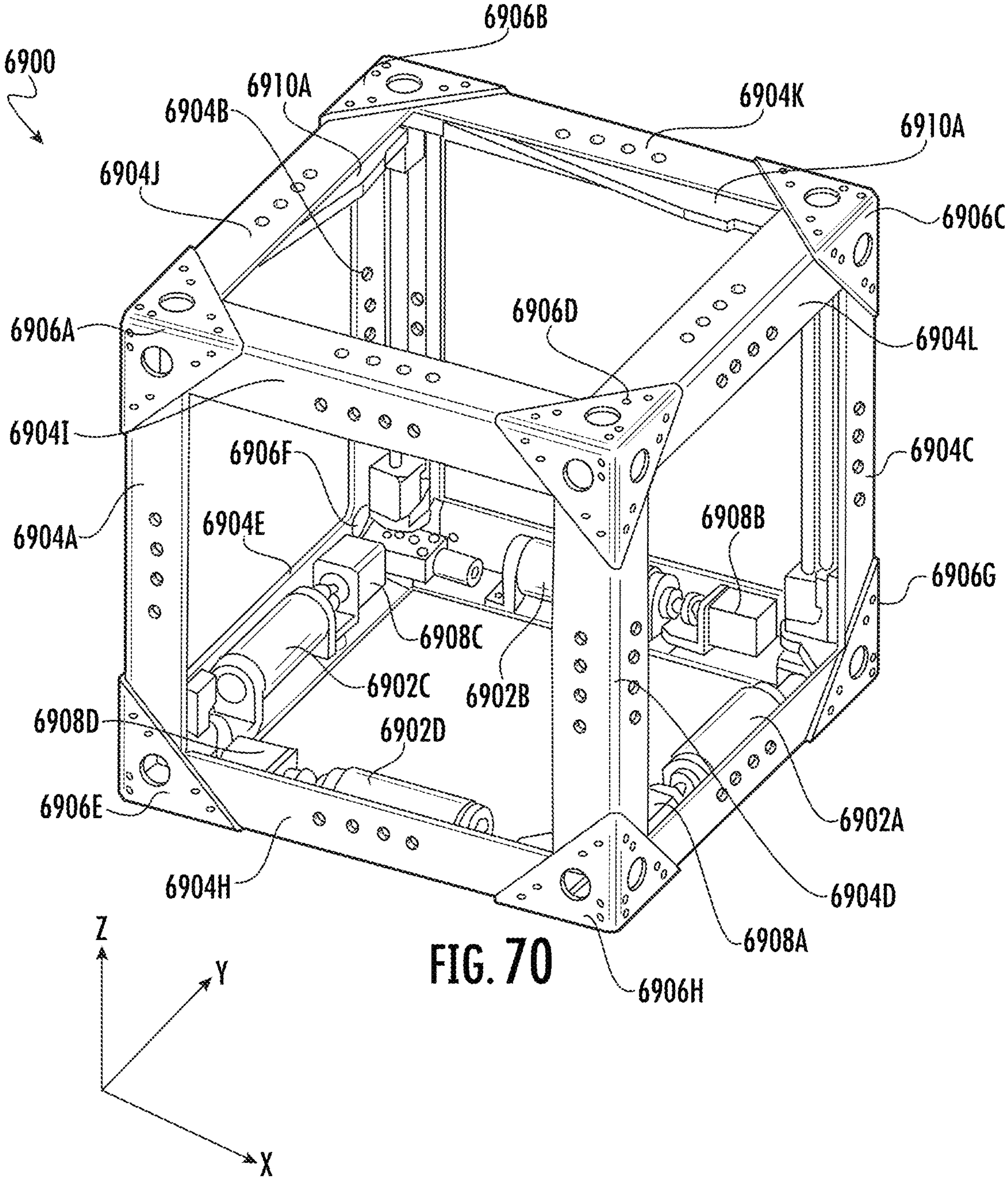
FIG. 70 illustrates an example smart rack with example transport rollers in accordance with some embodiments of the present disclosure.

According to some embodiments, and as shown in at least FIG. 69, a smart rack 6900 in accordance with some embodiments of the present disclosure comprises a rack frame. In some embodiments, the rack frame comprises at least one rack beam (such as, but not limited to, a rack beam 6904A, a rack beam 6904B, a rack beam 6904C, a rack beam 6904D, a rack beam 6904E, a rack beam 6904F, a rack beam 6904G, a rack beam 6904H, a rack beam 6904I, a rack beam 6904J, a rack beam 6904K, and a rack beam 6904L). In some embodiments, the plurality of beams 6904 may be connected by a plurality of corner rackets, such as, but not limited to, at least the corner racket 6906A, the corner racket 6906B, the corner racket 6906C, the corner racket 6906D, the corner racket 6906E, the corner racket 6906F, the corner racket 6906G, and the corner racket 6906H.

In some embodiments, the smart rack 6900 comprises one or more transport rollers (such as, but not limited to, a transport roller 6902A, a transport roller 6902B, a transport roller 6902C, a transport roller 6902D, and a transport roller 6902E). In some embodiments, the one or more transport rollers are disposed adjacent to/secured to the plurality of rack beams.

For example, each of the one or more transport rollers is secured on an inner surface of the at least one rack beam. As described above, each of the at least one rack beam comprises a horizontal rack plate and a vertical rack plate, and the horizontal rack plate is in a perpendicular arrangement with the vertical rack plate. In some embodiments, a transport roller is secured to a surface of the horizontal rack plate. In some embodiments, a transport roller is secured to a surface of the vertical rack plate.

For example, the smart rack 6900 comprises at least one bottom rack beam (such as, but not limited to, a rack beam 6904A, a rack beam 6904B, a rack beam 6904C, a rack beam 6904D). In some embodiments, the at least one transport roller comprises at least one bottom transport roller that is secured to the at least one bottom rack beam. For example, the transport roller 6902A, the transport roller 6902B, the transport roller 6902C, and the transport roller 6902D are bottom transport rollers that are secured to the horizontal rack plate of the rack beam 6904A, the horizontal rack plate of the rack beam 6904B, the horizontal rack plate of the rack beam 6904C, and the horizontal rack plate of the rack beam 6904D, respectfully.

In some embodiments, a height of a bottom transport roller is less than a height of the vertical rack plate associated with the bottom rack beam that the bottom transport roller is secured to, so that the bottom transport roller does not obstruct the movement of the rectangular prism. In some embodiments, the at least one bottom transport roller is configured to cause a transport of the rectangular prism from the smart rack to a peer smart rack in one of the horizontal directions (such as in the X direction or in the Y direction), details of which are described herein.

Additionally, or alternatively, the smart rack 6900 comprises at least one top rack beam (such as, but not limited to, the rack beam 6904K). In some embodiments, the at least one transport roller comprises at least one top transport roller that is secured to the at least one top rack beam. For example, the transport roller 6902E is a top transport roller that is secured to the vertical plate of the rack beam 6904K.

In some embodiments, a width of the at least one top transport roller is less than a width of the horizontal rack plate associated with the top rack beam that the top transport roller is secured to, so that the top transport roller does not obstruct the movement of the rectangular prism. In some embodiments, the at least one top transport roller is configured to cause a transport of the rectangular prism from the smart rack to a peer smart rack in the vertical direction (such as in the Z direction), details of which are described herein.

In some embodiments, each of the one or more transport rollers is motorized by one of a plurality of motors (such as, but not limited to, a motor 3908A, a motor 3908B, a motor 3908C, a motor 3908D, and a motor 3908E). For example, the motor 3908A. In some embodiments, the plurality of motors may affect rotational movement on the plurality of rollers, which may in turn facilitate horizontal movements of a rectangular prism (e.g. in the X direction or in the Y direction) and/or vertical movements of the rectangular prism (e.g. in the Z direction). In some embodiments, the movement of the rollers may be timed to move simultaneously for more effective movement of a rectangular prism (e.g., a tote).

For example, to cause a movement of the rectangular prism in the X direction, the motor 2908A may cause the transport roller 2902A to rotate, and/or the motor 2908C may cause the transport roller 2902C to rotate. Additionally, or alternatively, to cause a movement of the rectangular prism in the Y direction, the motor 2908B may cause the transport roller 2902B to rotate, and/or the motor 2908D may cause the transport roller 2902D to rotate. Additionally, or alternatively, to cause a movement of the rectangular prism in the Z direction, the motor 2908E may cause the transport roller 2902E to rotate.

In the example shown in FIG. 70, the smart rack 6900 may comprise transport rollers (such as, but not limited to, transport roller 6902A, transport roller 6902B, transport roller 6902C, and transport roller 6902D) that are disposed only on the "bottom" level of the smart rack 6900. Instead of having transport roller(s) secured thereon, the top rack beams shown in FIG. 70 (e.g., rack beam 6904J, rack beam 6904K, rack beam 6905L, and rack beam 6904I) may have arms (such as arm 6910A and arm 6010B) or may be unoccupied. As such, the transport rollers shown in FIG. 70 (e.g. transport roller 6902A, transport roller 6902B, transport roller 6902C, and transport roller 6902D) only facilitate movements of the rectangular prism in the X direction and Y direction, and not in the Z direction.

As described above, there are many technical challenges and difficulties associated with transporting a rectangular prism in a multi-dimensional modular superstructure that is built using a plurality of smart racks, including, but not limited to, technical challenges and difficulties associated with the mechanical mechanisms for transporting a rectangular prism from a smart rack to a peer smart rack that neighbors the smart rack in the x dimension, the y dimension, and/or the z dimension.

For example, an example rectangular prism may be in the form of, such as but not limited to, a carton, a case, a tote, a divided tote, a tray, a pallet, and/or the like. In some embodiments, the example rectangular prism may store one or more objects, goods, and/or articles, and the total weight of the rectangular prism (including the stored objects, goods, and/or articles) is not negligible. In such embodiments, the mechanical mechanism for transporting the rectangular prism between smart racks should provide sufficient mechanical support for the rectangular prism during transportation.

As another example, a rectangular prism that is positioned in an example smart rack may be transported to any one of the six peer smart racks that neighbor the smart rack. In such an example, the rectangular prism may be transported to a peer smart rack that is in the x dimension (for example, to a left peer smart rack or to a right peer smart rack), may be transported to a peer smart rack that is in the y dimension (for example, to a front peer smart rack or to a back peer smart rack), and may be transported to a peer smart rack that is in the z dimension (for example, to a top peer smart rack or a bottom peer smart rack). In some examples, mechanical mechanisms for transporting the rectangular prism may comprise separated or individual components for transporting the rectangular prism in one or more of the dimensions, and these separated or individual components should not obstruct transporting the rectangular prism in other directions. For example, mechanical mechanisms for transporting the rectangular prism may comprise one or more x dimension transportation components that transport the rectangular prism in the x dimension (for example, transporting the rectangular prism to the left peer smart rack or to the right peer smart rack). Because the rectangular prism may need to be transported to not only peer smart rack in the x dimension, but also peer smart rack in the y dimension and the z dimension, one or more x dimension transportation components should not obstruct transporting the rectangular prism in the y dimension or the z dimension.

Various embodiments of the present disclosure overcome these technical challenges and difficulties, and provide various technical improvements and benefits. In particular, FIG. 71 to FIG. 74 provide example illustrations of example mechanical mechanisms for supporting/guiding a rectangular prism from a smart rack to a peer smart rack in accordance with various embodiments of the present disclosure by utilizing one or more guidance rollers.

Figure 71:
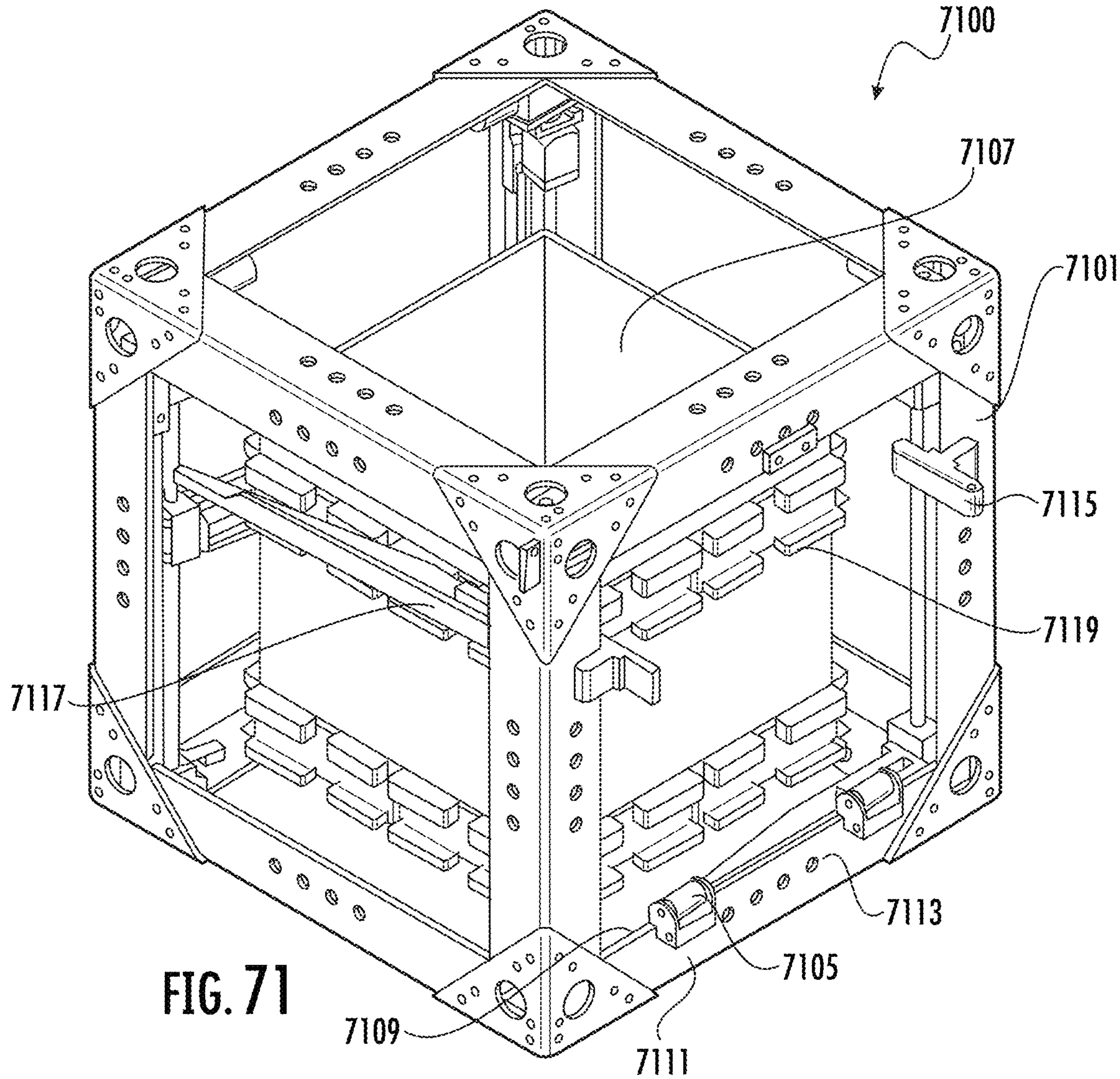
FIG. 71 illustrates an example smart rack with an example guidance roller in accordance with some embodiments of the present disclosure.

Referring now to FIG. 71, an example smart rack 7100 with an example rectangular prism 7107 in accordance with some embodiments of the present disclosure is illustrated. In some embodiments, the smart rack 7100 comprises a rack frame 7101 and at least one guidance roller 7105.

In some embodiments, the rack frame 7101 comprises at least one rack beam. Similar to those described above, the at least one rack beam of the rack frame 7101 may include, but not limited to, the bottom rack beam 7113 that is positioned at the bottom of the rack frame 7101.

In some embodiments, the at least one guidance roller is secured on an edge of the at least one rack beam. In the example shown in FIG. 71, the at least one guidance roller 7105 is secured to the top edge of the bottom rack beam 7113.

In particular, each of the at least one rack beam of the smart rack 7100 comprises a horizontal rack plate and a vertical rack plate, similar to those described above. For example, the bottom rack beam 7113 comprises a horizontal rack plate 7109 and a vertical rack plate 7111, similar to those described above. In some embodiments, the horizontal rack plate is 7109 in a perpendicular arrangement with the vertical rack plate 7111. In the example shown in FIG. 71, the at least one guidance roller 7105 is secured to a top edge of the vertical rack plate 7111 of the at least one bottom rack beam 7113.

In some embodiments, the smart rack 7100 comprises one or more mechanical guidance elements in addition to or in alternative of the guidance rollers 7105. For example, the smart rack 7100 may comprise a lateral guidance bar 7115 that is secured to a lateral rack beam. Additionally, or alternatively, the smart rack 7100 may comprise a lateral guidance arm 7117 that is secured to a lateral rack beam. In some embodiments, the rectangular prism 7107 comprises one or more guidance rails 7119 that are disposed on an outer surface of the rectangular prism 7107. In some embodiments, the one or more guidance rails 7119 correspond to the lateral guidance arm 7117 and/or the lateral guidance bar 7115.

In particular, the height of the lateral guidance arm 7117 and the height of the lateral guidance bar 7115 are the same as the height of the one or more guidance rails 7119. As such, the lateral guidance arm 7117 may cause a movement with the rectangular prism 7107 by engaging with the one or more guidance rails 7119, and the lateral guidance bar 7115 may guide the rectangular prism 7107 to be transported to the corresponding peer rectangular prism.

In some embodiments, the at least one guidance roller 7105 provides the technical benefits and advantages of supporting/guiding the movement of the rectangular prism 7107 from the smart rack 7100 to a peer smart rack, from a peer smart rack to the smart rack 7100, and through the smart rack 7100. As shown in FIG. 71, the at least one guidance roller 7105 can be installed onto the rack beam of the smart rack 7100. Because the smart rack 7100 is secured to a peer smart rack in the superstructure, the at least one guidance roller 7105 is effectively installed between smart racks. When the rectangular prism 7107 moves from one smart rack to a peer smart rack, the at least one guidance roller 7105 can support the rectangular prism 7107 so that the movement direction of the rectangular prism 7107 is aligned with direction towards the peer smart rack.

In some embodiments, the at least one guidance roller 7105 is motorized. In such an example, the at least one guidance roller 7105 can facilitate moving the rectangular prism 7107 from/to a peer smart rack, in addition to supporting/guiding the movement of the rectangular prism 7107.

Figure 72:
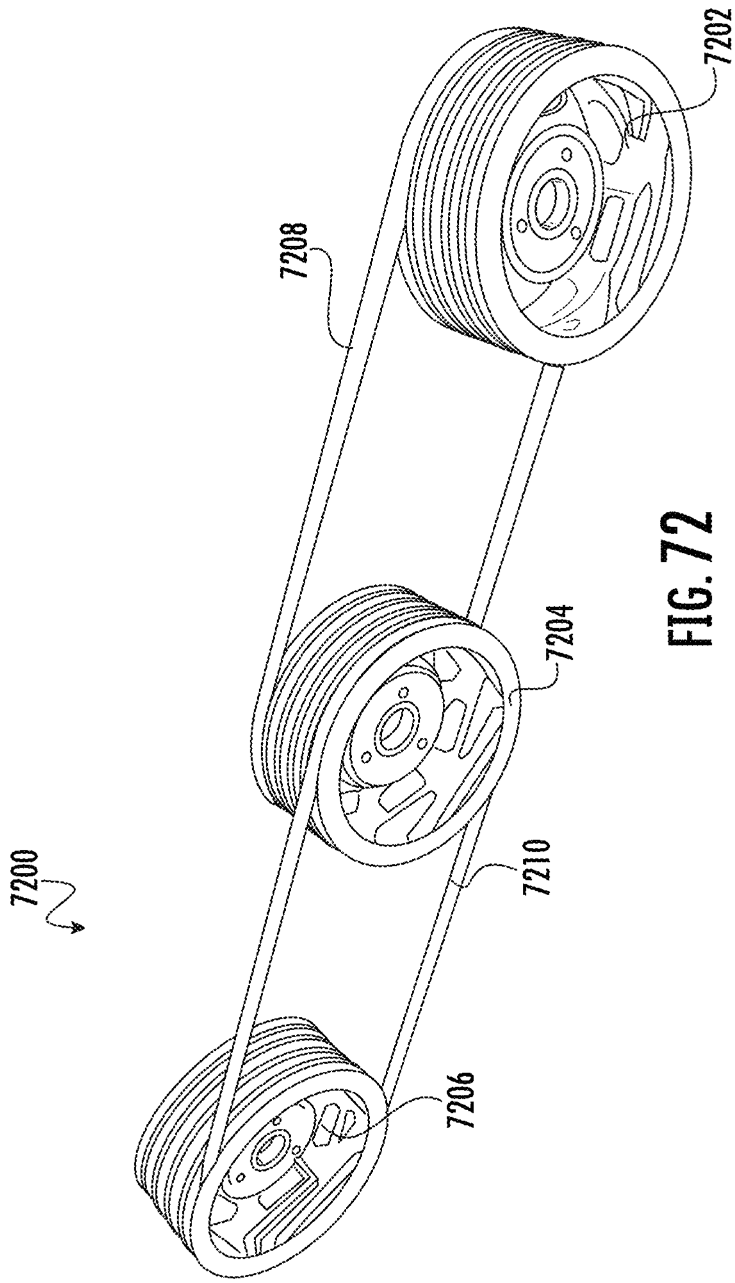
FIG. 72 illustrates an example V-belt configuration in accordance with some embodiments of the present disclosure.

For example, the at least one guidance roller 7105 can be motorized via at least one roller belt that engages with a motor. Referring now to FIG. 72, an example roller belt configuration 7200 in the form of v-belt in accordance with some embodiments of the present disclosure is illustrated. In the example shown in FIG. 72, the example roller belt configuration 7200 may comprise a first guidance roller 7202, a second guidance roller 7204, and a third guidance roller 7206. In some embodiments, the first guidance roller 7202 engages with the second guidance roller 7204 via the first v-belt 7208, and the second guidance roller 7204 engages with the third guidance roller 7206 via the second v-belt 7210.

In some embodiments, the first v-belt 7208 and/or the second v-belt 7210 comprise materials such as, but not limited to, rubbers, polymers, and/or the like.

While the description above provides an example of a v-belt configuration, it is noted that the scope of the present disclosure is not limited to the description above. In some examples, an example guidance roller may be motorized through other configurations.

While the description above provides examples of supporting and guiding the movement of rectangular prisms between smart racks horizontally (e.g. in the x direction or in the y direction), it is noted that the scope of the present disclosure is not limited to the example above. In some embodiments, an example smart rack may comprise one or more guidance elements that support and guide the movement of rectangular prisms between smart racks vertically (e.g. in the z dimension), in addition to or in alternative of supporting and guiding the movement of rectangular prisms between smart racks horizontally (e.g. in the x direction or in the y direction) as described above.

Figure 73A:
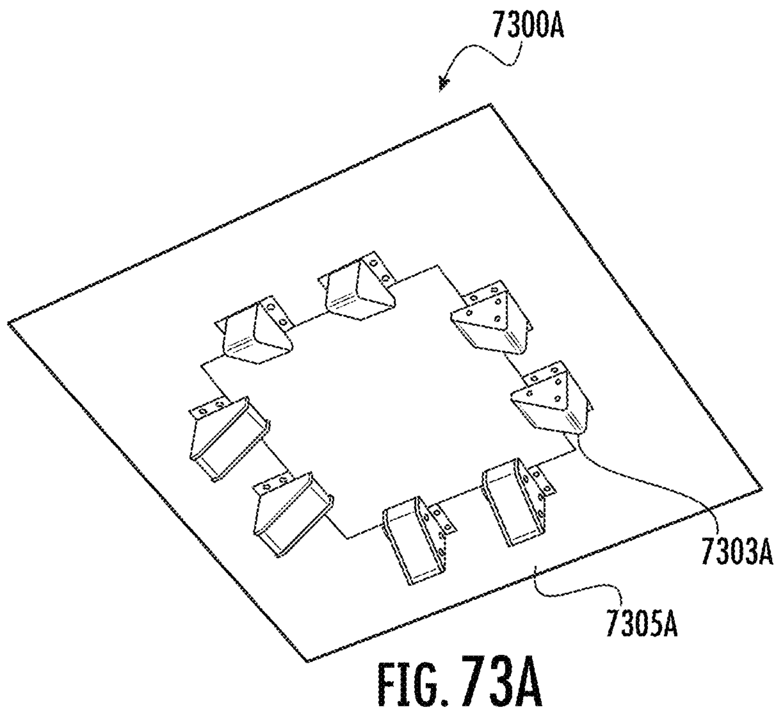
FIG. 73A illustrate an example bottom view of an example smart rack in accordance with some embodiments of the present disclosure.
Figure 73B:
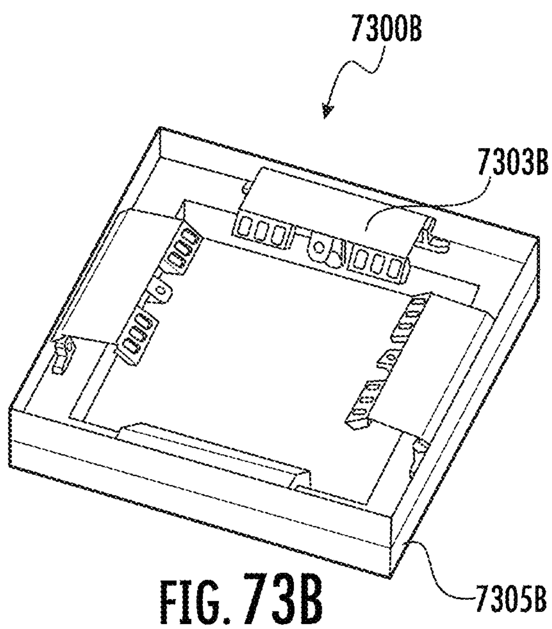
FIG. 73B illustrate an example top view of an example smart rack in accordance with some embodiments of the present disclosure.

In particular, various embodiments of the present disclosure provide example guidance elements that enable mechanical guidance along the Z direction to centralize the rectangular prism as it moves between smart racks. In some embodiments, the example guidance elements may include, but are not limited to, rollers, belts, and/or the like. In some embodiments, the example guidance elements may comprise at least a portion that is positioned at an angle to guide the rectangular prism towards the center of the smart rack during movement. Referring now to FIG. 73A and FIG. 73B, example views associated with example guidance elements in accordance with some embodiments of the present disclosure are illustrated.

FIG. 73A illustrates an example bottom view of an example smart rack 7300A in accordance with some embodiments of the present disclosure. In the example shown in FIG. 73A, the example smart rack 7300A comprises a rack frame and at least one guidance element 7303A. In some embodiments, the rack frame comprises at least one top rack beam 7305A. In some embodiments, the at least one guidance element 7303A is secured to a bottom surface of the at least one top rack beam 7305A.

In particular, the at least one guidance element 7303A is secured on an inner edge of the at least one top rack beam 7305A. As described above, the at least one top rack beam 7305A may at least particularly define a top opening that allows a rectangular prism to be transported from the smart rack 7300A to a peer smart rack that is secured to the top of the smart rack 7300A. As such, the inner edge of the at least one top rack beam 7305A is also an edge of the top opening of the smart rack 7300A.

In some embodiments, the at least one guidance element 7303A comprises an angled surface. In particular, the distance between the angled surface and the at least one top rack beam 7305A decreases as the angled surface gets closer to the inner edge of the at least one top rack beam. When there is a misalignment while the rectangular prism is transported from the smart rack 7300A to a peer smart rack that is secured to the top of the smart rack 7300A, the rectangular prism may become in contact with the angled surface of the at least one guidance element 7303A. In such an example, the angled surface guides the rectangular prism towards the top opening of the smart rack 7300A so that the rectangular prism can pass through.

Referring now to FIG. 73B, an example top view of an example smart rack 7300B in accordance with some embodiments of the present disclosure is illustrated. The example smart rack 7300B comprises a rack frame and at least one guidance element 7303B. In the example shown in FIG. 73B, the rack frame comprises at least one bottom rack beam 7305B. In some embodiments, the at least one guidance element 7303B is secured to a top surface of the at least one bottom rack beam 7305B.

In particular, the at least one guidance element 7303B is secured on an inner edge of the at least one bottom rack beam 7305B. As described above, the at least one bottom rack beam 7305B may at least particularly define a bottom opening that allows a rectangular prism to be transported from the smart rack 7300B to a peer smart rack that is secured to the bottom of the smart rack 7300B. As such, the inner edge of the at least one bottom rack beam 7305B is also the edge of the bottom opening of the smart rack 7300B.

In some embodiments, the at least one guidance element 7303B comprises an angled surface. In particular, the distance between the angled surface and the at least one bottom rack beam 7305B decreases as the angled surface gets closer to the inner edge of the at least one bottom rack beam. When there is a misalignment while the rectangular prism is transported from the smart rack 7300B to a peer smart rack that is secured to the bottom of the smart rack 7300A, the rectangular prism may become in contact with the angled surface of the at least one guidance element 7303B, and the angled surface guides the rectangular prism towards the bottom opening of the smart rack 7300A.

While the description above provides examples of guidance elements that can support/guide movement in the vertical direction (e.g. in the z dimension), it is noted that the scope of the present disclosure is not limited to the description above. For example, in some embodiments, the guidance elements may comprise one or more rollers (including, but not limited to, a motorized roller) to help guiding the movement motion of the rectangular prism along the z direction.

Figure 74:
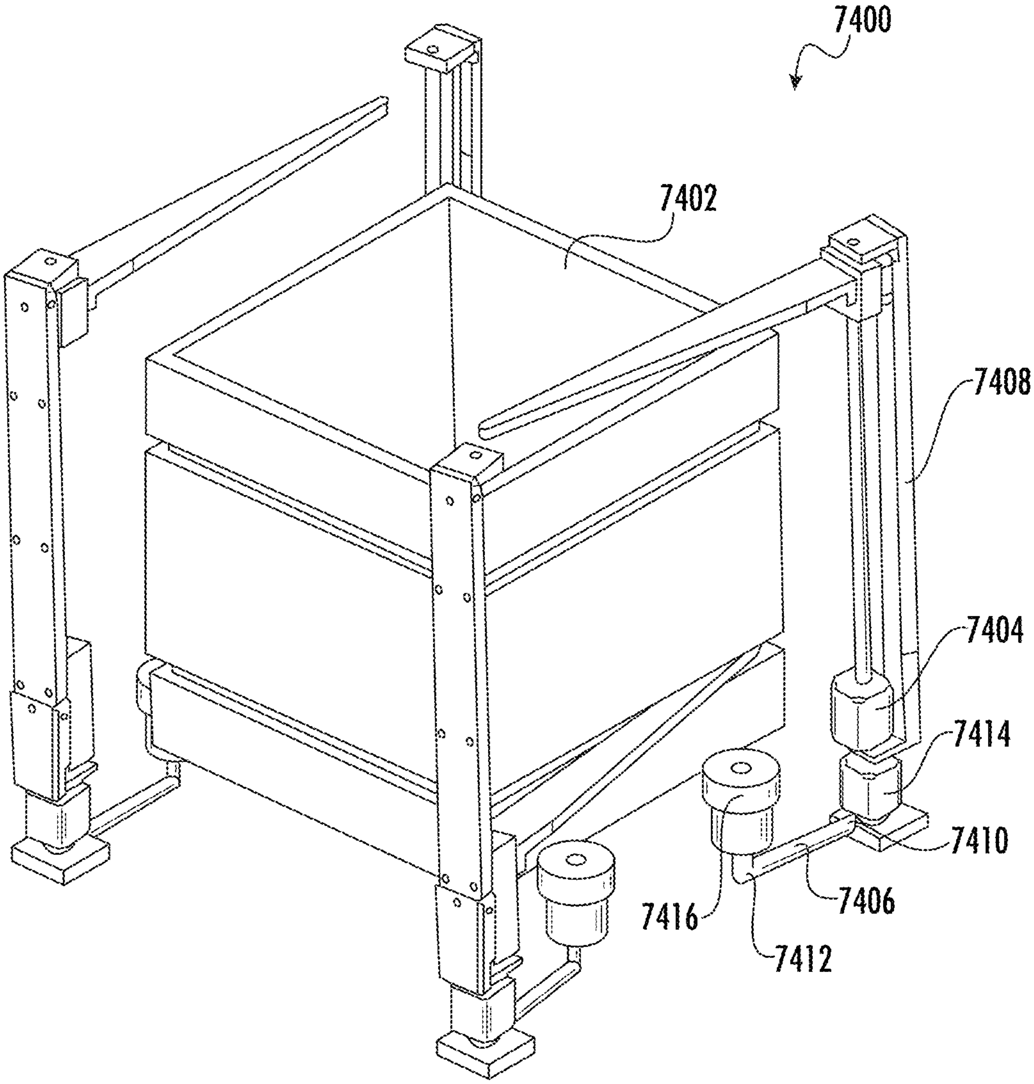
FIG. 74 illustrates an example smart rack with an example roller arm and an example guidance roller in accordance with some embodiments of the present disclosure.

Referring now to FIG. 74, at least a portion of an example smart rack 7400 for transporting an example rectangular prism 7402 in accordance with some embodiments of the present disclosure is illustrated.

In some embodiments, the example smart rack 7400 comprises a rack frame 7404 and at least one roller arm 7406. Similar to those described above, the rack frame 7404 comprises at least one rack beam 7408. In the example shown in FIG. 74, the at least one rack beam 7408 is in the form of a lateral rack beam.

In some embodiments, the at least one roller arm 7406 comprises a first end 7410 and a second end 7412. In some embodiments, the first end 7410 is connected to the at least one rack beam 7408 via at least one rotation plate 7414. In such an example, the at least one rotation plate 7414 enables the at least one roller arm 7406 to rotate around the at least one rack beam 7408. In some embodiments, the at least one roller arm 7406 is in a perpendicular arrangement with the at least one rack beam 7408.

In some embodiments, a guidance roller 7416 is secured to the second end 7412 of the at least one roller arm 7406. In some embodiments, when a rectangular prism 7402 is transported from the smart rack 7400 to a peer smart rack, from a peer smart rack to the smart rack 7400, or through the smart rack 7400, the at least one roller arm 7406 may be rotated so that the guidance roller 7416 contacts the rectangular prism 7402, providing mechanical support and guidance for the movement of the rectangular prism 7402.

In some embodiments, the example smart rack may comprise a plurality of roller arms. In the example shown in FIG. 74, the example smart rack 7400 comprises one roller arm rotatably connected to each lateral rack beam.

It is noted that the scope of the present disclosure is not limited to the example shown in FIG. 74. In some examples, an example smart rack may comprise less than four roller arms. In some embodiments, an example smart rack may comprise more than four roller arms.

As described above, there are many technical challenges and difficulties associated with transporting a rectangular prism in a multi-dimensional modular superstructure that is built using a plurality of smart racks, including, but not limited to, technical challenges and difficulties associated with the mechanical mechanisms for transporting a rectangular prism from a smart rack to a peer smart rack that neighbors the smart rack in the x dimension, the y dimension, and/or the z dimension.

For example, an example rectangular prism may be in the form of, such as but not limited to, a carton, a case, a tote, a divided tote, a tray, a pallet, and/or the like. In some embodiments, the example rectangular prism may store one or more objects, goods, and/or articles, and the total weight of the rectangular prism (including the stored objects, goods, and/or articles) is not negligible. In such embodiments, the mechanical mechanism for transporting the rectangular prism between smart racks should provide sufficient mechanical support for the rectangular prism during transportation.

As another example, a rectangular prism that is positioned in an example smart rack may be transported to any one of the six peer smart racks that neighbor the smart rack. In such an example, the rectangular prism may be transported to a peer smart rack that is in the x dimension (for example, to a left peer smart rack or to a right peer smart rack), may be transported to a peer smart rack that is in the y dimension (for example, to a front peer smart rack or to a back peer smart rack), and may be transported to a peer smart rack that is in the z dimension (for example, to a top peer smart rack or a bottom peer smart rack). In some examples, mechanical mechanisms for transporting the rectangular prism may comprise separated or individual components for transporting the rectangular prism in one or more of the dimensions, and these separated or individual components should not obstruct transporting the rectangular prism in other directions. For example, mechanical mechanisms for transporting the rectangular prism may comprise one or more x dimension transportation components that transport the rectangular prism in the x dimension (for example, transporting the rectangular prism to the left peer smart rack or to the right peer smart rack). Because the rectangular prism may need to be transported to not only peer smart rack in the X direction, but also peer smart rack in the Y direction and the Z direction, one or more horizontal transportation components should not obstruct transporting the rectangular prism in the vertical directions (e.g. the Z direction).

Various embodiments of the present disclosure overcome these technical challenges and difficulties, and provide various technical improvements and benefits. In particular, FIGS. 83, 84, 85, 86A, 86B, 87A, 87B, 87C, and 88 provide example illustrations of example rectangular prisms and example mechanical mechanisms for transporting the example rectangular prism from a smart rack to a peer smart rack by using mechanical guidance in accordance with various embodiments of the present disclosure.

Figure 83:
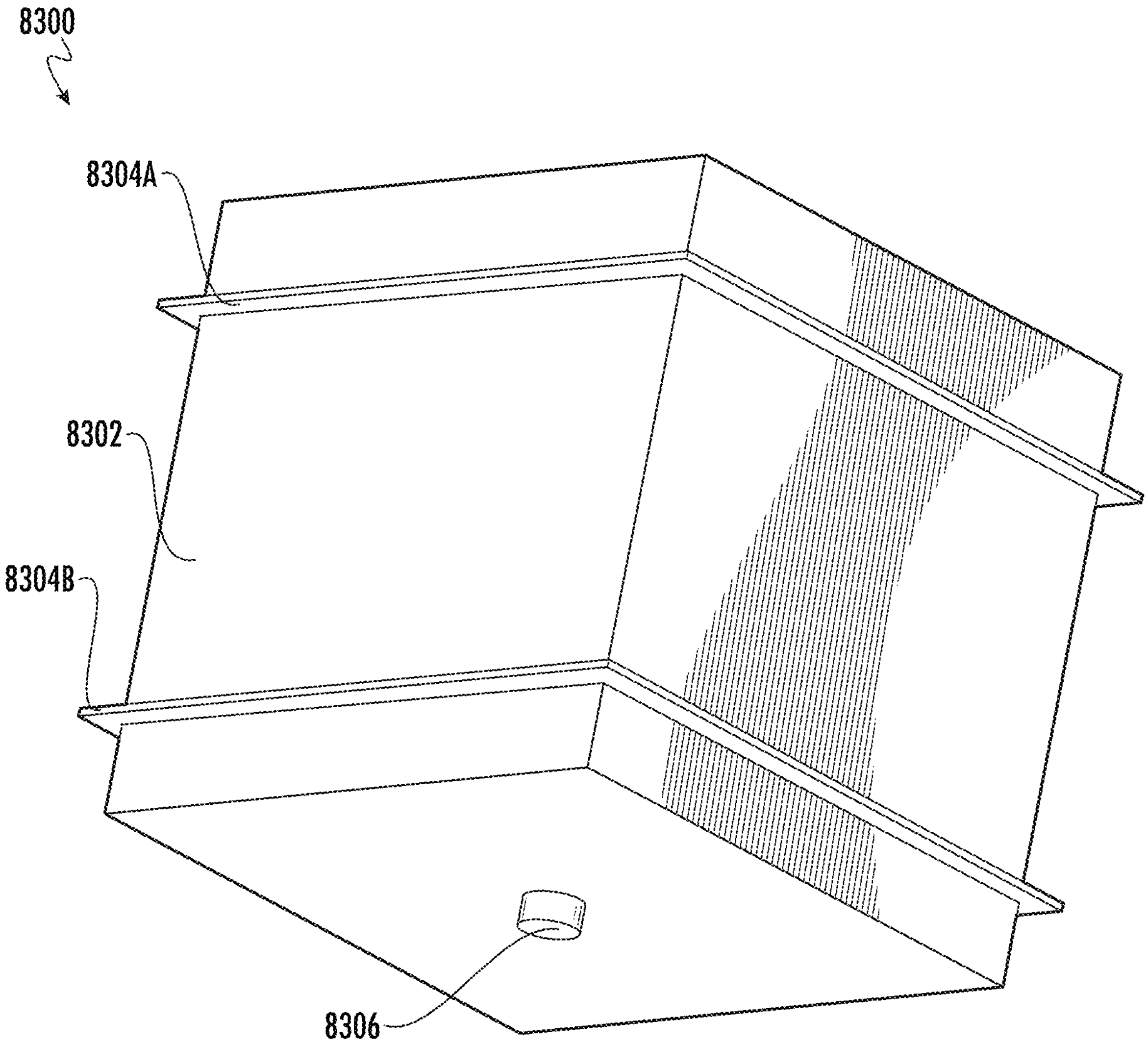
FIG. 83 illustrates a perspective view of an example rectangular prism that includes a bottom nub for use in guiding the rectangular prism between example smart racks in accordance with some embodiments of the present disclosure.

Referring now to FIG. 83, an example assembly 8300 including a rectangular prism 8302 in accordance with some embodiments of the present disclosure is illustrated.

In some embodiments, the rectangular prism 8302 has a plurality of lips 8304A, 8304B that allow for peer to peer transport of the rectangular prism 8302 between smart racks within a superstructure. In the example shown in FIG. 83, the plurality of lips 8304A, 8304B are in the form of protrusions from the surface of the sides of the rectangular prism 8302.

In the example shown in FIG. 83, the lips 8304A, 8304B are disposed along every side of the rectangular prism 8302. However, it will be understood that, in some embodiments, the lips 8304A, 8304B may be disposed along only a certain number of sides of the rectangular prism 8302.

In some embodiments, the two-lip design shown in FIG. 83 can be critical to allow transfer of the rectangular prism 8302 between smart racks. In some embodiments, the bottom section of the rectangular prism 8302 can be considered the first lip (e.g. the lip 8304B), and the top section of the rectangular prism 8302 can be considered the second lip (e.g. the lip 8304A).

For example, as described above in connection with FIG. 71 to FIG. 74 above, one or more arms may engage with the lip 8304A and/or the lip 8304B to cause the rectangular prism 8302 to move between smart racks.

In some embodiments, the rectangular prism 8302 may have a nub 8306 disposed on a surface of the rectangular prism 8302. For example, and as shown in at least FIG. 83, the nub 8306 may be disposed on the bottom surface of the rectangular prism 8302. In some embodiments, the nub 8306 may aid in moving the rectangular prism 8302 between smart racks. For example, one or more arms may push the nub 8306 so as to cause the rectangular prism 8302 to move between smart racks.

It will be understood that, in some embodiments, the nub 8306 may be disposed on a different surface than the bottom surface (e.g., on the top surface). In some embodiments, the bottom section of the rectangular prism 8302 may be considered the first lip.

Figure 84:
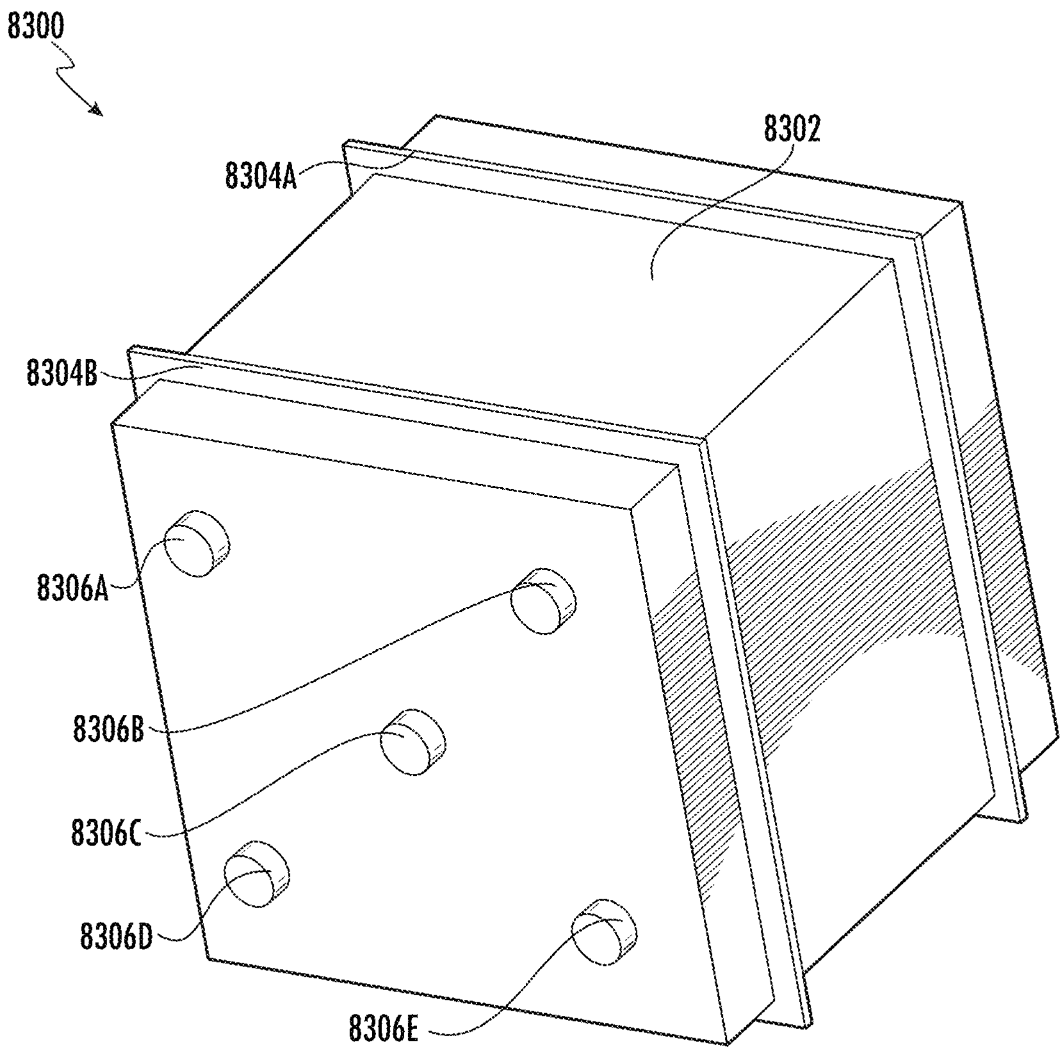
FIG. 84 illustrates a perspective view of an example rectangular prism that includes a plurality of bottom nubs for use in guiding the rectangular prism between example smart racks in accordance with some embodiments of the present disclosure.

As shown in FIG. 84, according to some embodiments, the rectangular prism 8302 of the assembly 8300 may include multiple nubs 8306A, 8306B, 8306C, 8306D, and 8306E. In some embodiments, the nubs 8306A, 8306B, 8306C, 8306D, and 8306E may be disposed on the bottom surface. It will be understood that, in some embodiments, the nubs 8306A, 8306B, 8306C, 8306D, and 8306E may be disposed on multiple surface.

Figure 85:
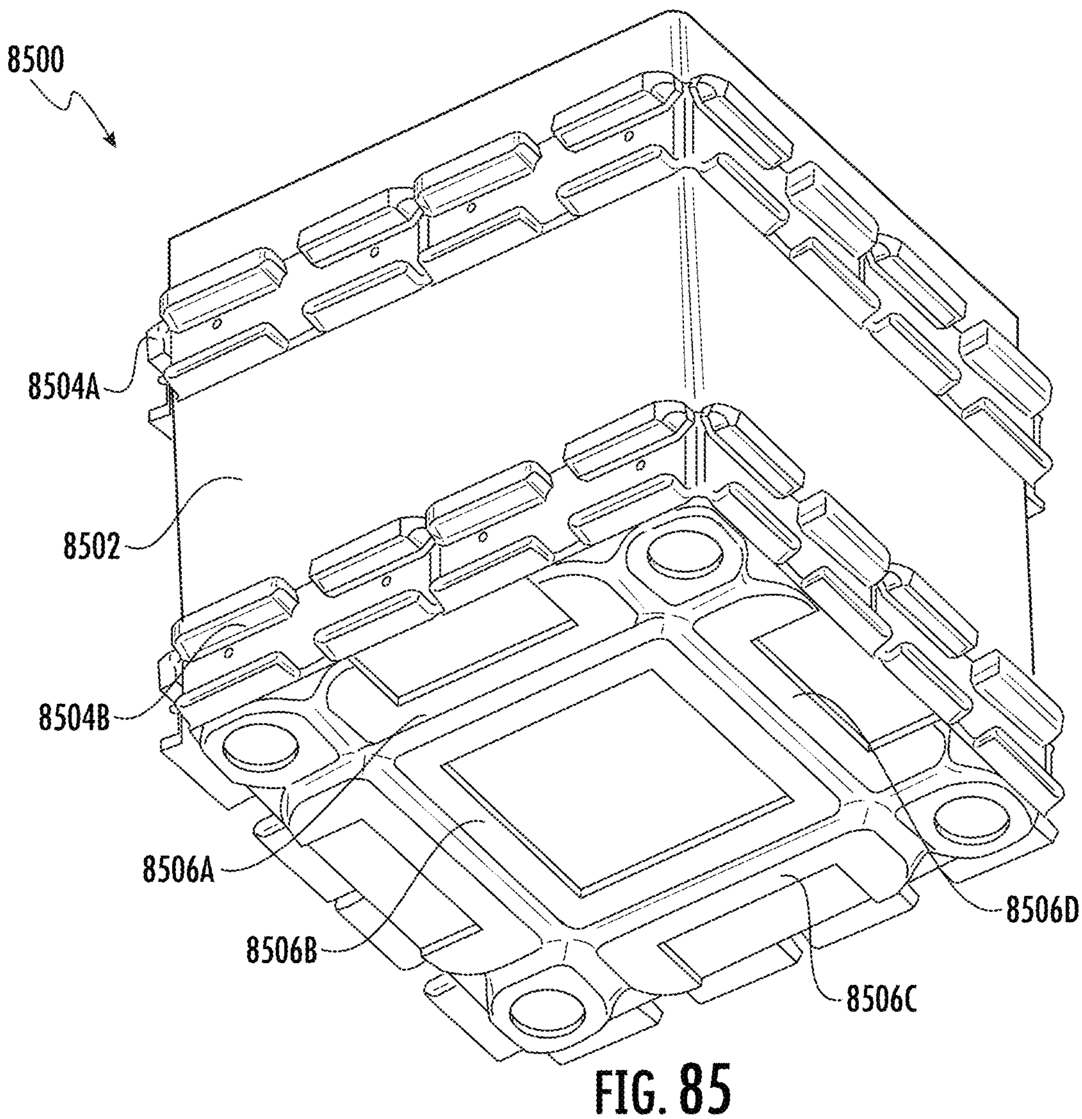
FIG. 85 illustrates a perspective view of an example rectangular prism with bottom and side rails in accordance with some embodiments of the present disclosure.
Figure 86A:
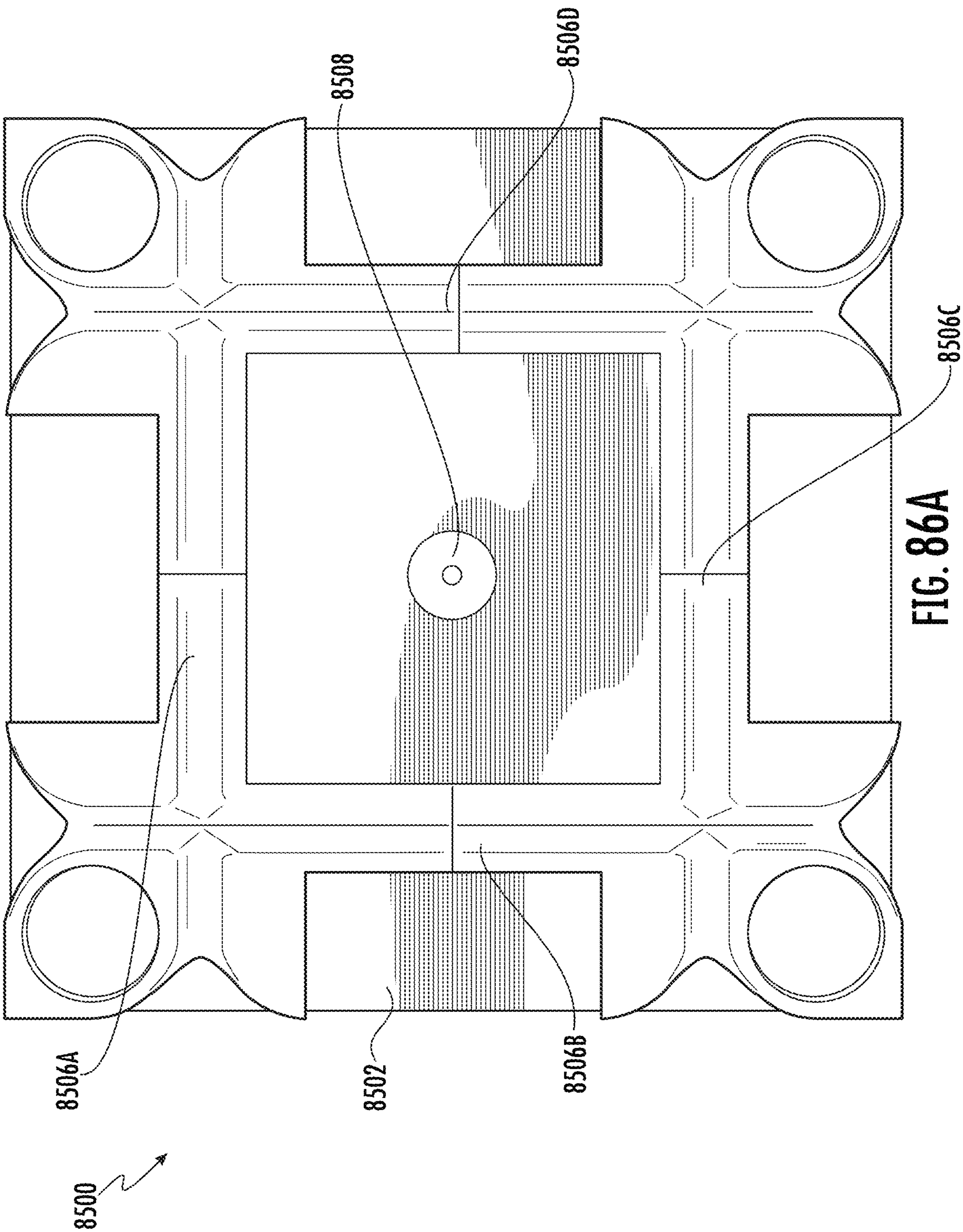
FIG. 86A illustrates a bottom view of an example rectangular prism with a guide rail in accordance with some embodiments of the present disclosure.
Figure 86B:
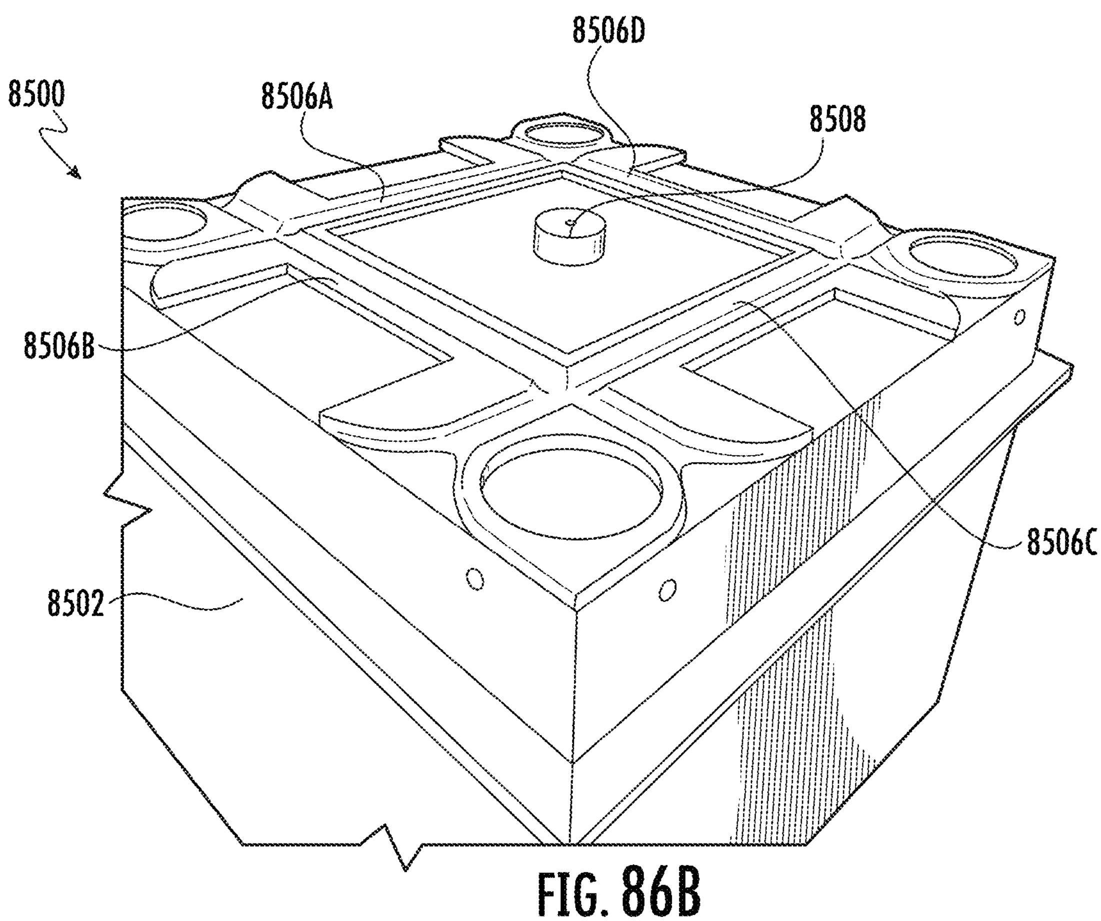
FIG. 86B illustrates a perspective view of an example rectangular prism with a guide rail in accordance with some embodiments of the present disclosure.

Referring now to FIG. 85, FIG. 86A, and FIG. 86B, a system 8500 that includes a rectangular prism 8502 is shown.

In some embodiments, the rectangular prism 8502 may include a rail system with a plurality of rails 8504A, 8504B disposed on the side surfaces of the rectangular prism 8502. In some embodiments, the plurality of rails 8504A, 8504B can facilitate the movement of the rectangular prism 8502, similar to the lips 8304A, 8304B described above in connection with FIG. 83 and FIG. 84. For example, one or more arms or rollers may engage with the plurality of rails 8504A, 8504B to cause the rectangular prism 8302 to move between smart racks, as described above in connection with FIG. 71 to FIG. 74 above. In some embodiments, the plurality of rails 8504A, 8504B can guide the movement of the rectangular prism 8302, such that the rectangular prism 8302 can be aligned to the corresponding peer smart rack when the rectangular prism 8302 is being transported.

In some embodiments, the rectangular prism 8502 may also include a plurality of guide rails 8506A, 8506B, 8506C, and 8506D that may be disposed on the bottom surface of the rectangular prism 8502. In the example shown in FIG. 85, the plurality of guide rails 8506A, 8506B, 8506C, and 8506D are arranged in a rectangular formation, enabling the rectangular prism 8502 to be guided when being transported to peer smart racks.

It will be understood that, in some embodiments, the guide rails 8506A, 8506B, 8506C, and 8506D may be disposed on any side of the rectangular prism 8502 as described in various embodiments. In some embodiments, the guide rails 8506A, 8506B, 8506C, and 8506D are further shown in FIGS. 86A and 86B.

Additionally, in some embodiments, and as shown in FIGS. 86A and 86B, the system 8500 may have one or more nubs (such as the nub 8508) disposed on the same surface as the guide rails 8506A, 8506B, 8506C, and 8506D. In some embodiments, the nub 8508 may function similarly to the nub 8306 described with respect to the assembly 8300 in connection with FIG. 83 to FIG. 84.

Referring now to FIG. 87A, FIG. 87B, FIG. 87C and FIG. 88, a plurality of rollers 8702 and/or a rolling system (including rollers 8802A and 8802B) are shown. In some embodiments, the plurality of rollers 8702 and/or the rolling system (including rollers 8802A and 8802B) can be implemented in conjunction with the rectangular prism described above (such as, but not limited to, the rectangular prism 8302 described above in connection with FIG. 83 and FIG. 84, the rectangular prism 8502 described above in connection with FIG. 85 to FIG. 86B).

Figure 87A:
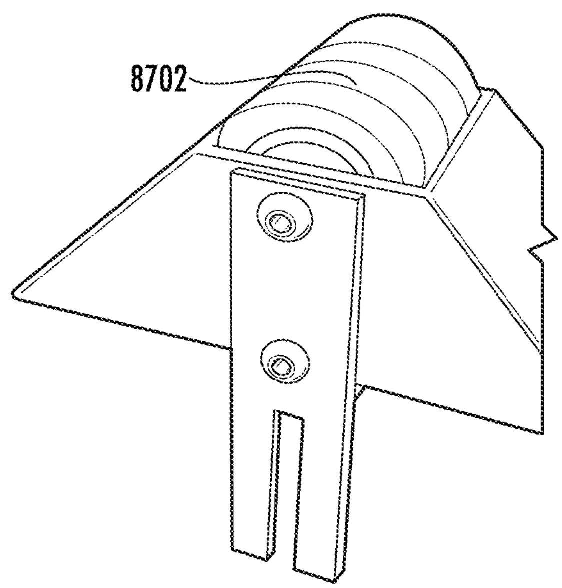
FIG. 87A illustrates a perspective view of an example roller in accordance with some embodiments of the present disclosure.
Figure 87B:
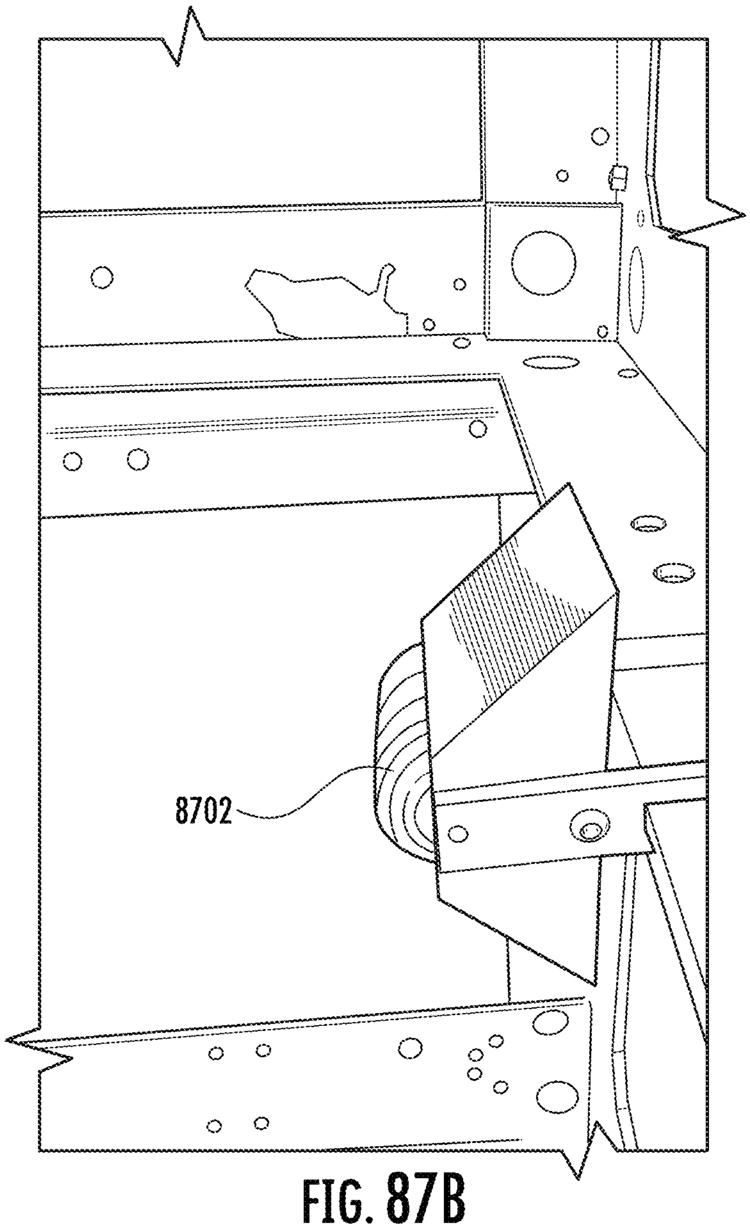
FIG. 87B illustrates a perspective view of an example roller in accordance with some embodiments of the present disclosure.
Figure 87C:
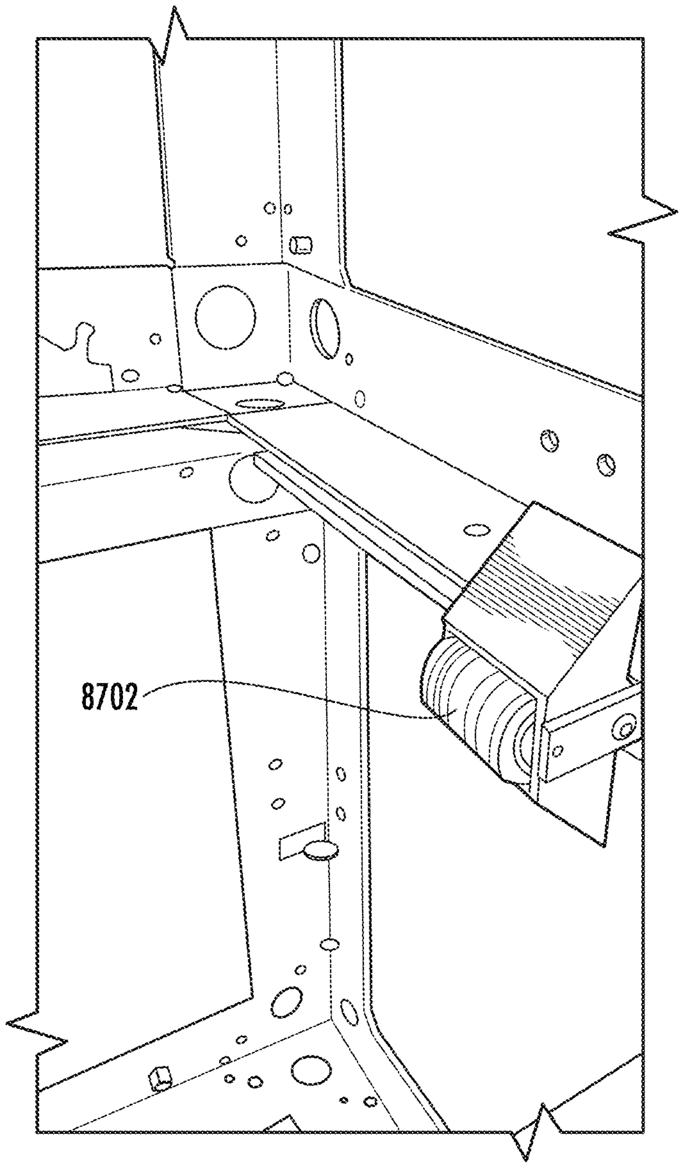
FIG. 87C illustrates a perspective view of an example roller in accordance with some embodiments of the present disclosure.
Figure 88:
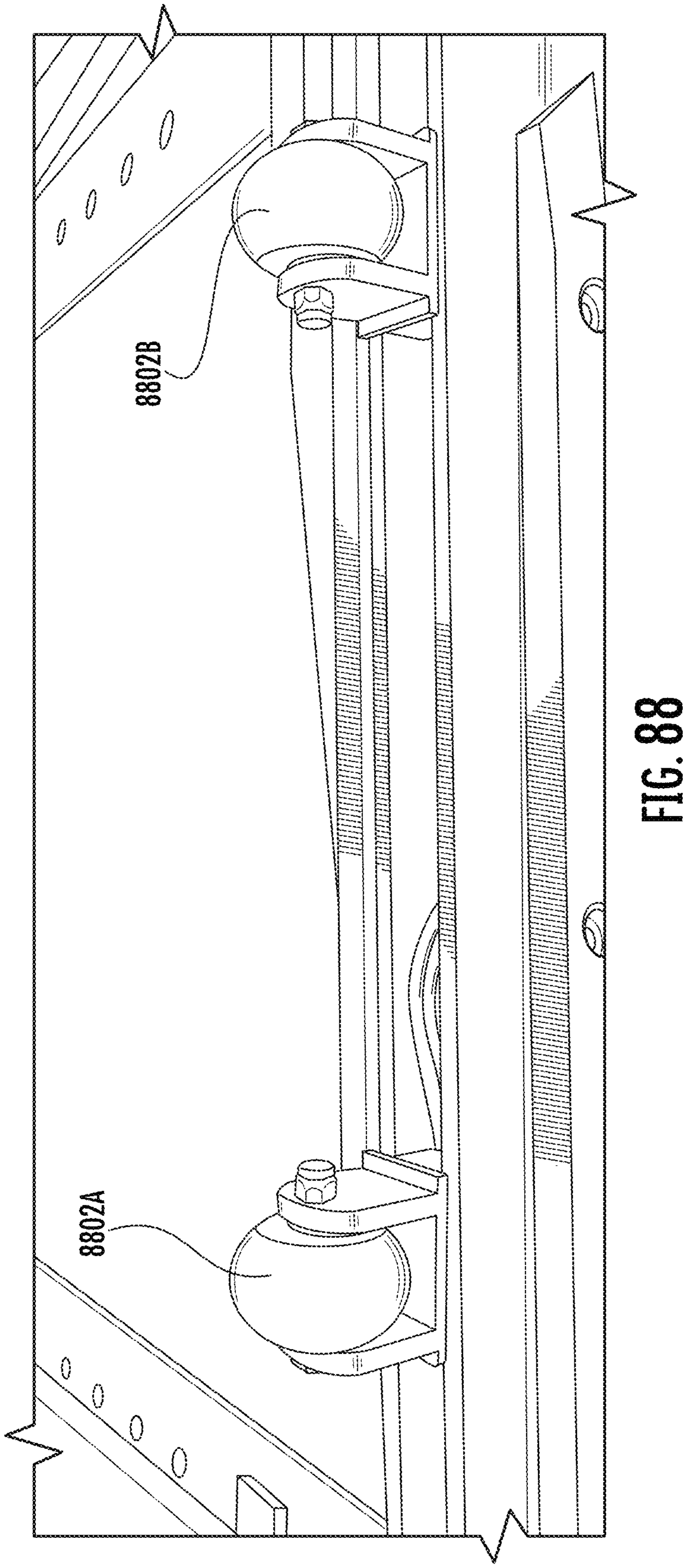
FIG. 88 illustrates a perspective view of example rolling elements in accordance with some embodiments of the present disclosure.

In some embodiments, the rollers 8702 and/or the rolling system (including rollers 8802A and 8802B) may be disposed within a smart rack within a larger superstructure. For example, as shown in FIG. 87A to FIG. 88, the rollers 8702 and/or the rolling system (including rollers 8802A and 8802B) can be secured to the edge of rack frames of smart rack in the superstructure.

In some embodiments, and as shown in FIGS. 87A, 87B, 87C, and 88, a plurality of rollers 8702 and/or a rolling system (including rollers 8802A and 8802B) may be used to move the rectangular prism 8502 of the system 8500 by means of, in some embodiments, the rails rolling on the rollers 8702 and/or the rolling system (including rollers 8802A and 8802B). For example, the rollers 8702 and/or the rolling system (including rollers 8802A and 8802B) may engaged with the guide rails 8506A, 8506B, 8506C, and 8506D of the rectangular prism 8502 described above in connection with FIG. 85 to FIG. 86A.

In some embodiments, the rollers 8702 and/or the rolling system (including rollers 8802A and 8802B) may enable the movement of a rectangular prism 8502 that includes a rail system with a plurality of guide rails 8506A, 8506B, 8506C, and 8508D. In some embodiments, this movement may be in all three directions (i.e., horizontally, vertically, and laterally) within a superstructure and/or between smart racks. For example, the rollers 8702 and/or the rolling system (including rollers 8802A and 8802B) may engage with the guide rails 8506A, 8506B, 8506C, and 8508D of the rectangular prism 8502 described above.

As described above, there are many technical challenges and difficulties associated with transporting a rectangular prism in a multi-dimensional modular superstructure that is built using a plurality of smart racks, including, but not limited to, technical challenges and difficulties associated with the mechanical mechanisms for transporting a rectangular prism from a smart rack to a peer smart rack that neighbors the smart rack in the x dimension, the y dimension, and/or the z dimension.

For example, an example rectangular prism may be in the form of, such as but not limited to, a carton, a case, a tote, a divided tote, a tray, a pallet, and/or the like. In some embodiments, the example rectangular prism may store one or more objects, goods, and/or articles, and the total weight of the rectangular prism (including the stored objects, goods, and/or articles) is not negligible. In such embodiments, the mechanical mechanism for transporting the rectangular prism between smart racks should provide sufficient mechanical support for the rectangular prism during transportation.

As another example, a rectangular prism that is positioned in an example smart rack may be transported to any one of the six peer smart racks that neighbor the smart rack. In such an example, the rectangular prism may be transported to a peer smart rack that is in the x dimension (for example, to a left peer smart rack or to a right peer smart rack), may be transported to a peer smart rack that is in the y dimension (for example, to a front peer smart rack or to a back peer smart rack), and may be transported to a peer smart rack that is in the z dimension (for example, to a top peer smart rack or a bottom peer smart rack). In some examples, mechanical mechanisms for transporting the rectangular prism may comprise separated or individual components for transporting the rectangular prism in one or more of the dimensions, and these separated or individual components should not obstruct transporting the rectangular prism in other directions. For example, mechanical mechanisms for transporting the rectangular prism may comprise one or more x dimension transportation components that transport the rectangular prism in the x dimension (for example, transporting the rectangular prism to the left peer smart rack or to the right peer smart rack). Because the rectangular prism may need to be transported to not only peer smart rack in the X direction, but also peer smart rack in the Y direction and the Z direction, one or more horizontal transportation components should not obstruct transporting the rectangular prism in the vertical directions (e.g. the Z direction).

Various embodiments of the present disclosure overcome these technical challenges and difficulties, and provide various technical improvements and benefits. In particular, FIG. 75 to FIG. 76 provide example illustrations of example mechanical mechanisms for transporting a rectangular prism from a smart rack to a peer smart rack by using a gantry assembly in accordance with various embodiments of the present disclosure.

Figure 75:
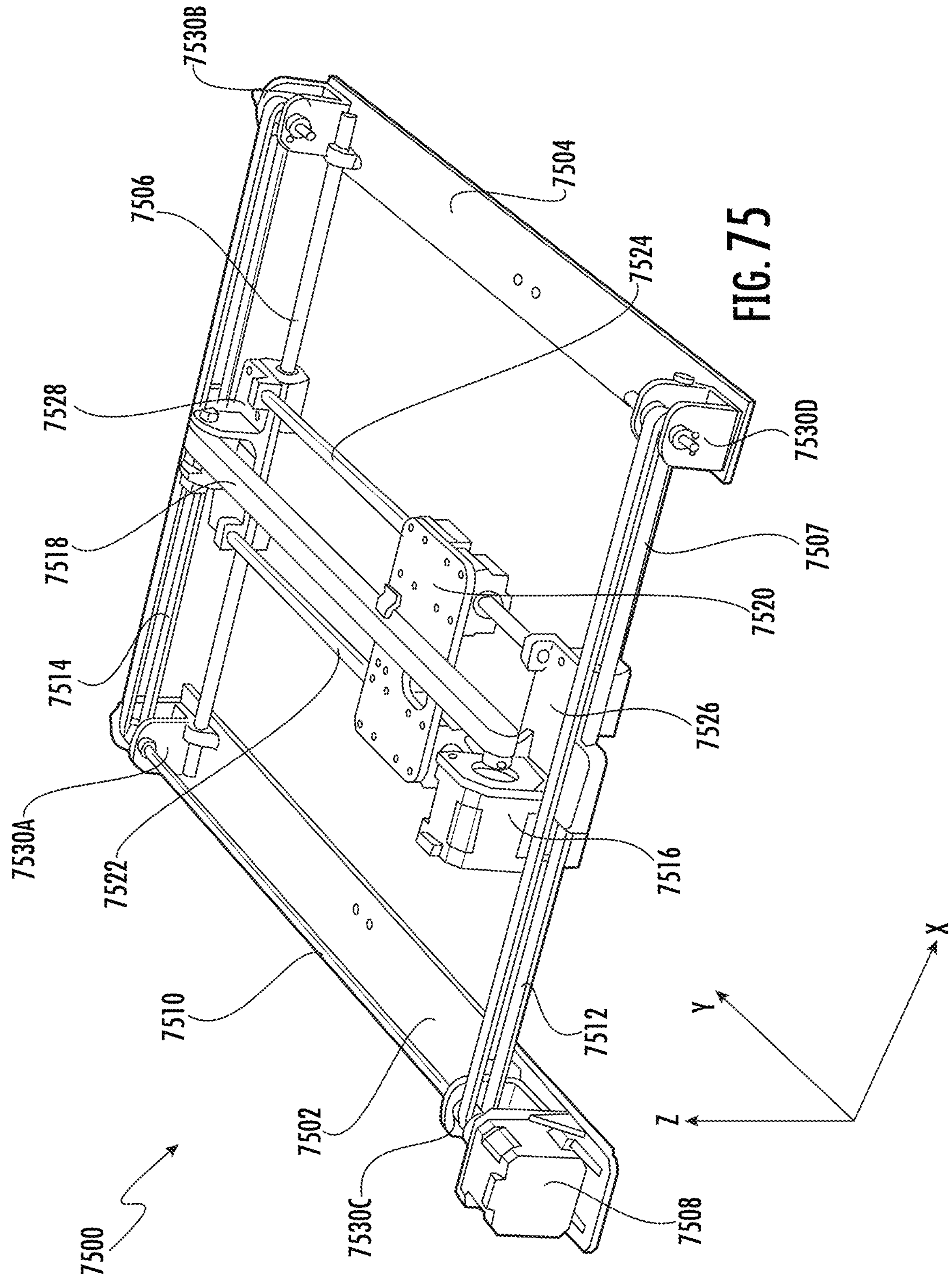
FIG. 75 illustrates an example gantry assembly in accordance with some embodiments of the present disclosure.
Figure 76:
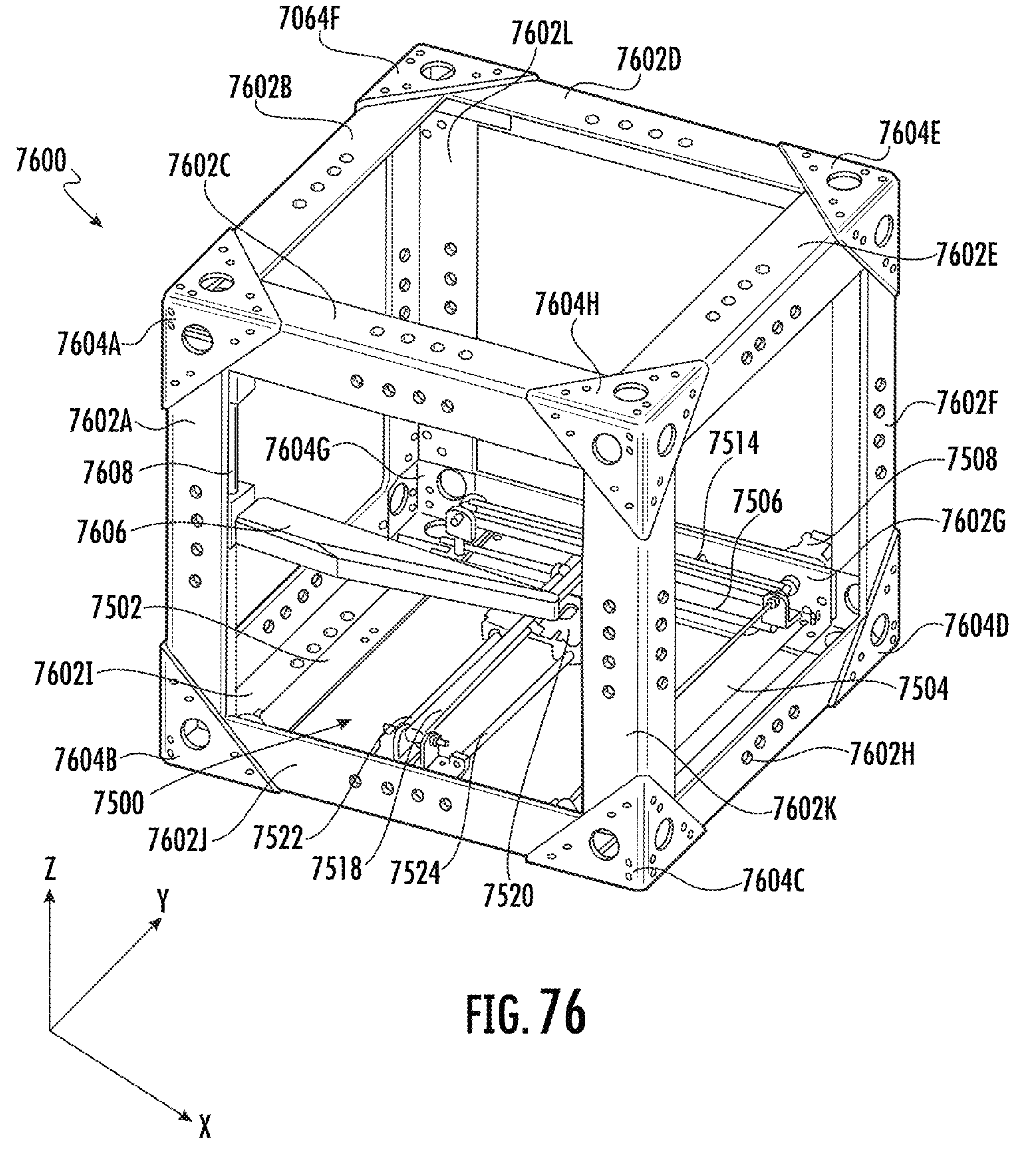
FIG. 76 illustrates an example smart rack with an example gantry assembly in accordance with some embodiments of the present disclosure.

FIG. 75 illustrates a gantry assembly 7500 in accordance with various embodiments of the present disclosure. In some embodiments, the gantry assembly 7500 is configured for facilitating movement of rectangular prisms between smart racks within a superstructure.

In some embodiments, the gantry assembly 7500 comprises a first gantry beam 7502 and a second gantry beam 7504. In some embodiments, the first gantry beam 7502 and the second gantry beam 7504 are in parallel arrangements with one another. In some embodiments, each of the first gantry beam 7502 and the second gantry beam 7504 is secured to one of the plurality of bottom rack beams. For example, the first gantry beam 7502 is secured to a first bottom rack beam, and the second gantry beam 7504 is secured to a second bottom rack beam that is in a parallel arrangement with the first bottom rack beam.

In some embodiments, the gantry assembly 7500 comprises a first motor sliding rail 7506 and a second motor sliding rail 7507. In some embodiments, each of the first motor sliding rail 7506 and the second motor sliding rail 7507 are secured between the first gantry beam 7502 and the second gantry beam 7504. In some embodiments, the first motor sliding rail 7506 and the second motor sliding rail 7507 are in parallel arrangements with one another.

In some embodiments, the gantry assembly 7500 may comprise a first motor 7508. In the example shown in FIG. 75, the first motor 7508 is secured to the first gantry beam 7502.

In some embodiments, the first motor 7508 comprises a first rotational shaft 7510. In some embodiments, the first rotational shaft 7510 of the first motor 7508 engages with at least one X direction drive belt (for example, the X direction drive belt 7512 and the X direction drive belt 7514 as shown in the example illustrated in FIG. 75).

In some embodiments, the X direction drive belt 7512 and the X direction drive belt 7514 are secured between the first gantry beam 7502 and the second gantry beam 7504.

For example, a first bracket 7530A is secured to the first gantry beam 7502, and a second bracket 7530B is secured to the second gantry beam 7504. In some embodiments, the X direction drive belt 7514 is connected between the first bracket 7530A and the second bracket 7530B.

Additionally, or alternatively, a third bracket 7530C is secured to the first gantry beam 7502, and a fourth bracket 7530D is secured to the second gantry beam 7504. In some embodiments, the X direction drive belt 7512 is connected between the third bracket 7530C and the fourth bracket 7530D.

In some embodiments, the X direction drive belt 7512 and the X direction drive belt 7514 are in parallel arrangements with each other. For example, the X direction drive belt 7512 may be secured to a first end of the first gantry beam 7502 and a first end of the second gantry beam 7504, and the X direction drive belt 7512 may be secured to a second end of the first gantry beam 7502 (opposite to the first end of the first gantry beam 7502) and a second end of the second gantry beam 7504 (opposite to the first end of the first gantry beam 7502).

While the description above provides an example gantry assembly that comprises two X direction drive belts, it is noted that the scope of the present disclosure is not limited to the description above. In some embodiments, an example gantry assembly comprises less than or more than two X direction drive belts.

In some embodiments, the gantry assembly 7500 comprises a first carriage sliding rail 7522 and a second carriage sliding rail 7524. In some embodiments, the first carriage sliding rail 7522 and the second carriage sliding rail 7524 are secured between the first motor sliding rail 7506 and the second motor sliding rail 7507.

In some embodiments, the first carriage sliding rail 7522 and the second carriage sliding rail 7524 are in parallel arrangements with each other. In some embodiments, the first carriage sliding rail 7522 is in perpendicular arrangements with the first motor sliding rail 7506 and the second motor sliding rail 7507. In some embodiments, the second carriage sliding rail 7524 is in perpendicular arrangements with the first motor sliding rail 7506 and the second motor sliding rail 7507.

In some embodiments, the first carriage sliding rail 7522 and the second carriage sliding rail 7524 are secured slidably attached to the at least one X direction drive belt via at least one support plate.

For example, a first end of the first carriage sliding rail 7522 and a first end of the second carriage sliding rail 7524 are secured to a support plate 7526. As shown in FIG. 75, the support plate 7526 is connected to the X direction drive belt 7512, and comprises a bottom opening that allows the second motor sliding rail 7507 to pass through. As described above, the first motor 7508 may cause the X direction drive belt 7512 to rotate, which in turn causes the support plate 7526 to slide along the second motor sliding rail 7507 (i.e. in the X direction).

Similarly, a second end of the first carriage sliding rail 7522 and a second end of the second carriage sliding rail 7524 are secured to a support plate 7528. As shown in FIG. 75, the support plate 7528 is connected to the X direction drive belt 7514, and comprises a bottom opening that allows the first motor sliding rail 7506 to pass through. As described above, the first motor 7508 may cause the X direction drive belt 7514 to rotate, which in turn causes the support plate 7528 to slide along the first motor sliding rail 7506 (i.e. in the X direction).

In some embodiments, the gantry assembly 7500 comprises a carriage 7520. In some embodiments, the carriage is movable along the first carriage sliding rail 7522 and the second carriage sliding rail 7524. For example, the carriage 7520 may comprise a first bottom opening and a second bottom opening that allows the first carriage sliding rail 7522 and the second carriage sliding rail 7524, respectively, to pass through.

In some embodiments, the gantry assembly 7500 comprises a second motor 7516. In some embodiments, the second motor 7516 may be positioned on one of the one or more support plates (such as, but not limited to, support plate 7526).

In some embodiments, the second motor 7516 is connected to a second rotational shaft that engages with a Y direction drive belt 7518. In some embodiments, the carriage 7520 is connected to the Y direction drive belt 7518. In some embodiments, the second motor 7516 may cause the Y direction drive belt 7518 to rotate, which in turn causes the carriage 752 to slide along the first carriage sliding rail 7522 and the second carriage sliding rail 7524 (i.e. in the Y direction).

In the example shown in FIG. 75, the Y direction drive belt 7518 is secured between the support plate 7526 and the support plate 7528. As described above, the first motor 7508 may cause the support plate 7528 and/or the support plate 7526 to slide along the first motor sliding rail 7506 and the second motor sliding rail 7507, respectively (i.e. in the X direction). Because the carriage 7520 is connected to the Y direction drive belt 7518, the first motor 7508 can cause the carriage 7520 to move in the X direction.

In some embodiments, the carriage 7520 defines a top surface. In some embodiments, a rectangular prism is positioned on the top surface of the carriage 7520. As described above, the carriage 7520 may be moved by means of the first motor 7508 and the second motor 7516 (and X direction drive belt 7512, X direction drive belt 7514, and Y direction drive belt 7518) in X and Y directions. As such, the carriage 7520 may be used on the gantry assembly 7500 to move an example rectangular prism between smart racks and within a superstructure.

For example, in some embodiments, the gantry assembly 7500 may be positioned on the bottom of one or more smart racks within a superstructure. In some embodiments, the components of the gantry assembly 7500 (including the carriage 7520) may be configured and moved to allow an example rectangular prism to move in the X direction and the Y direction between smart racks within the superstructure.

FIG. 76 shows the gantry assembly 7500 positioned within a smart rack 7600 of a superstructure (e.g., example modular superstructure 1303). The smart rack 7600 may be in the shape of a rectangular box and may be composed of a plurality of rack beams (such as, but not limited to, rack beam 7602A, rack beam 7602B, rack beam 7602C, rack beam 7602D, rack beam 7602E, rack beam 7602F, rack beam 7602G, rack beam 7602H, rack beam 7602I, rack beam 7602J, rack beam 7602K, and rack beam 7602L) and a plurality of brackets (such as, but not limited to, bracket 7604A, bracket 7604B, bracket 7604C, bracket 7604D, bracket 7604E, bracket 7604F, bracket 7604G, and bracket 7604H).

In some embodiments, an arm 7606 may be attached to a column rail 7608 located within the smart rack 7600. In some embodiments, the column rail 7608 may be positioned adjacent to a rack beam 7602A. In some embodiments, the arm 7606 may be used to move rectangular prisms (e.g., prism 500, which may be a tote) between smart racks within the superstructure (e.g., 1303). In some embodiments, and as shown in at least FIG. 76, the first motor 7508 may be positioned outside of the smart rack 7600.

In some embodiments, the gantry assembly 7500 may be positioned on the lower level of the smart rack 7600. In particular, the smart rack 7600 may comprise a plurality of bottom rack beams (such as, but not limited to, rack beam 7602G, rack beam 7602H, rack beam 7602I, and rack beam 7602J). In some embodiments, the gantry assembly 7500 is secured to the plurality of bottom rack beams.

In some embodiments, the gantry assembly 7500 may be used to effect movement horizontally and vertically (e.g., along the indicated X and Y axes) within the superstructure. In some embodiments, the carriage 7520 of the gantry assembly 7500 may be moved to one side of the smart rack 7600 (i.e., "hidden") such that the rectangular prisms may move along the Z axis within the superstructure.

As described above, there are many technical challenges and difficulties associated with transporting a rectangular prism in a multi-dimensional modular superstructure that is built using a plurality of smart racks, including, but not limited to, technical challenges and difficulties associated with the mechanical mechanisms for transporting a rectangular prism from a smart rack to a peer smart rack that neighbors the smart rack in the x dimension, the y dimension, and/or the z dimension.

For example, an example rectangular prism may be in the form of, such as but not limited to, a carton, a case, a tote, a divided tote, a tray, a pallet, and/or the like. In some embodiments, the example rectangular prism may store one or more objects, goods, and/or articles, and the total weight of the rectangular prism (including the stored objects, goods, and/or articles) is not negligible. In such embodiments, the mechanical mechanism for transporting the rectangular prism between smart racks should provide sufficient mechanical support for the rectangular prism during transportation.

As another example, a rectangular prism that is positioned in an example smart rack may be transported to any one of the six peer smart racks that neighbor the smart rack. In such an example, the rectangular prism may be transported to a peer smart rack that is in the x dimension (for example, to a left peer smart rack or to a right peer smart rack), may be transported to a peer smart rack that is in the y dimension (for example, to a front peer smart rack or to a back peer smart rack), and may be transported to a peer smart rack that is in the z dimension (for example, to a top peer smart rack or a bottom peer smart rack). In some examples, mechanical mechanisms for transporting the rectangular prism may comprise separated or individual components for transporting the rectangular prism in one or more of the dimensions, and these separated or individual components should not obstruct transporting the rectangular prism in other directions. For example, mechanical mechanisms for transporting the rectangular prism may comprise one or more x dimension transportation components that transport the rectangular prism in the x dimension (for example, transporting the rectangular prism to the left peer smart rack or to the right peer smart rack). Because the rectangular prism may need to be transported to not only peer smart rack in the x dimension, but also peer smart rack in the y dimension and the z dimension, one or more x dimension transportation components should not obstruct transporting the rectangular prism in the y dimension or the z dimension.

Various embodiments of the present disclosure overcome these technical challenges and difficulties, and provide various technical improvements and benefits. In particular, FIG. 77 to FIG. 81 provide example illustrations of example mechanical mechanisms for transporting a rectangular prism from a smart rack to a peer smart rack by using a crane assembly in accordance with various embodiments of the present disclosure.

Figure 77:
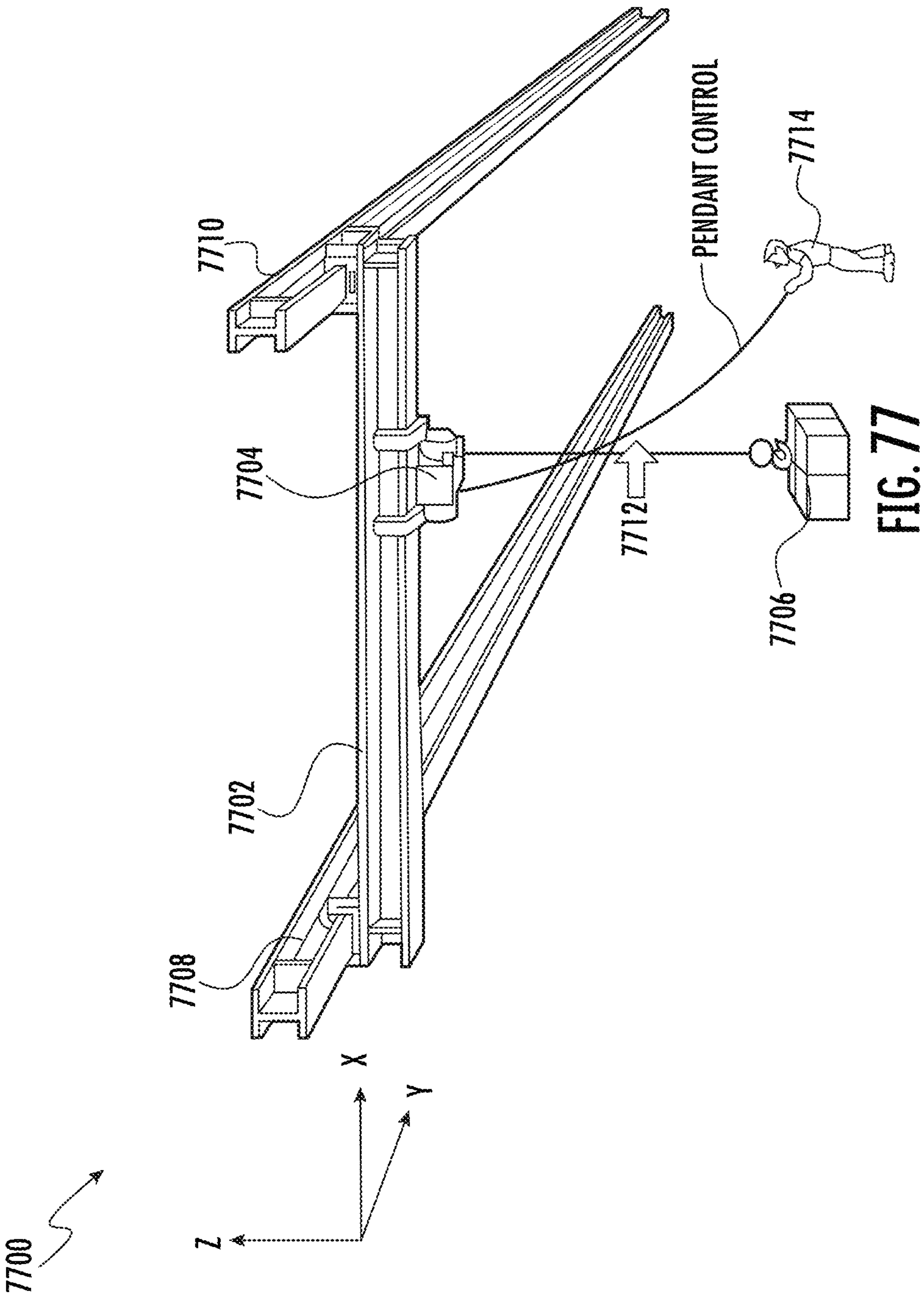
FIG. 77 is an example diagram illustrates an example crane assembly in accordance with some embodiments of the present disclosure.

FIG. 77 shows a crane assembly 7700. According to some embodiments, the crane assembly 7700 comprises a first crane rail 7708 and a second crane rail 7710. In some embodiments, the first crane rail 7708 and the second crane rail 7710 are in parallel arrangements with each other.

In some embodiments, the crane assembly 7700 comprises a crane bridge 7702. In some embodiments, the crane bridge 7702 is slidably connected to the first crane rail 7708 and the second crane rail 7710. In some embodiments, the first crane rail 7708 and the second crane rail 7710 define a runway for the crane bridge 7702 that substantially aligns with the Y axis indicated in FIG. 77. In some embodiments, the crane bridge 7702 is movable along the first crane rail 7708 and the second crane rail 7710 in the direction that aligns with the Y axis.

In some embodiments, the crane assembly 7700 comprises a hoist 7704 that is operably connected to the crane bridge 7702. In some embodiments, the hoist 7704 may be connected to an object 7706 (such as, but not limited to, a rectangular prism), and the hoist 7704 may be configured to raise (i.e., along the Z axis indicated in FIG. 77) or lower (i.e., along the Z axis indicated in FIG. 77) the object 7706.

In some embodiments, the hoist 7704 is slidably secured to the crane bridge 7702. In such examples, the hoist 7704 is movable along the X axis as indicated in FIG. 77. Because the object 7706 is connected to the hoist 7704, the movement of the hoist 7704 also causes a movement of the object 7706. As such, the hoist 7704 may be configured to move the object 7706 (such as, but not limited to, a rectangular prism) laterally along the crane bridge 7702 (i.e., move along the X axis indicated in FIG. 77).

As described above, the hoist 7704 is slidably secured to the crane bridge 7702, and the crane bridge 7702 is movable along the first crane rail 7708 and the second crane rail 7710 in the direction that aligns with the Y axis. As such, the hoist 7704 may be configured to move the object 7706 (such as, but not limited to, a rectangular prism) in the direction that aligns with the Y axis.

In some embodiments, the crane bridge 7702 may be disposed between and connect a first crane rail 7708 and a second crane rail 7710. In some embodiments, the crane assembly 7700 may enable an object 7706 (e.g., a tote) to be moved within a larger superstructure (e.g., example modular superstructure 1303). In some embodiments, the object 7706 may be connected to the hoist 7704 by means of a cable 7712. In some embodiments, the cable 7712 connected to the hoist 7704 may provide a pendant control to a user 7714 to control the object 7706 in relation to the crane bridge 7702 and more generally the crane assembly 770 and the superstructure (e.g., 1303) and one or more racks (e.g., smart rack 7600) within the superstructure.

Figure 78:
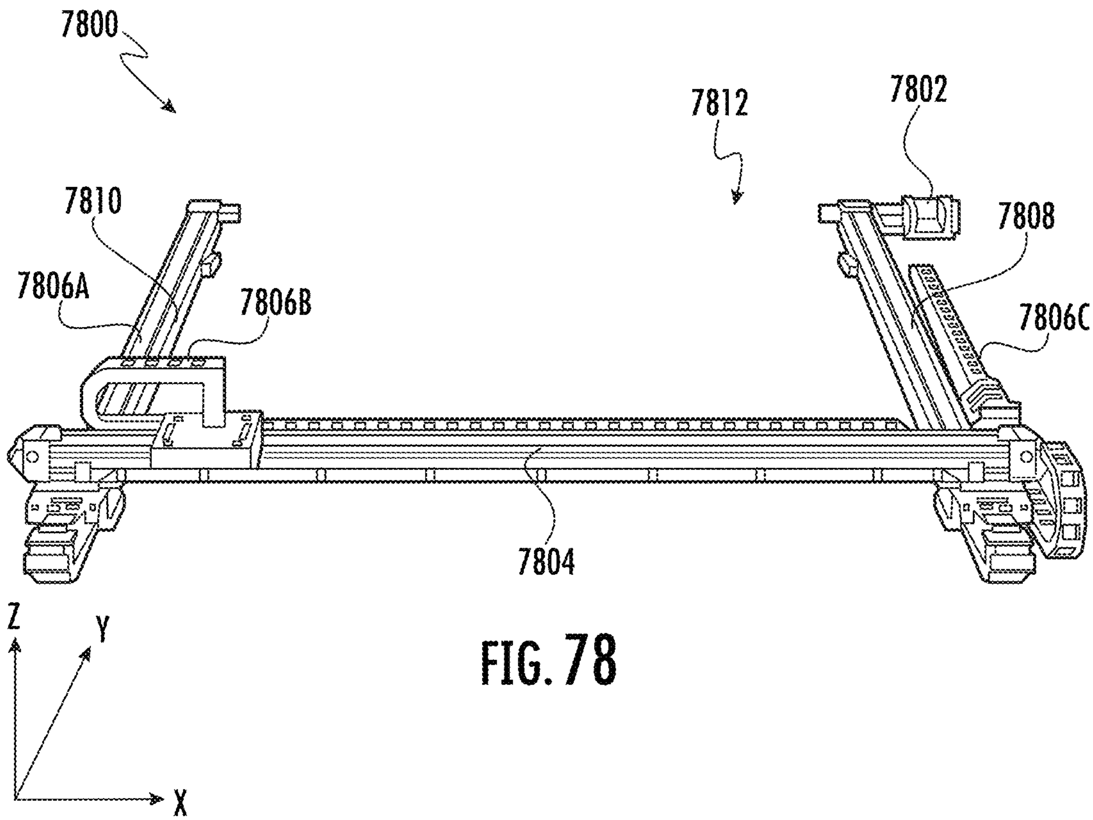
FIG. 78 illustrates an example portion of an example crane assembly in accordance with some embodiments of the present disclosure.

As shown in at least FIG. 78, according to some embodiments, the crane assembly 7800 may include one or more motors 7802 configured to move the crane bridge 7804 along the x, y, and z axes indicated in at least FIG. 78. In some embodiments, the one or more motors (such as, but not limited to, motor 7802) may be configured to operate a plurality of drive rails (such as, but not limited to, drive rail 7806A, drive rail 7806B, and drive rail 7806C. In some embodiments, one or more of the plurality of motors 7802 may be attached to one or more of the crane rails (such as, but not limited to, crane rail 7808 and crane rail 7810).

In some embodiments, one or more of the motors 7802 may be connected to a rotating shaft 7812. In some embodiments, the one or more motors (such as, but not limited to, motor 7802) may be configured to manipulate the crane assembly 7800 to move an object (such as, but not limited to, a rectangular prism) between one or more smart racks within the superstructure. For example, the crane assembly 7800 may be used to lift a rectangular prism out of a smart rack or out of a superstructure entirely. In some embodiments, the crane assembly 7800 may be used in conjunction with the gantry assembly 7500 to manipulate a rectangular prism.

Figure 79:
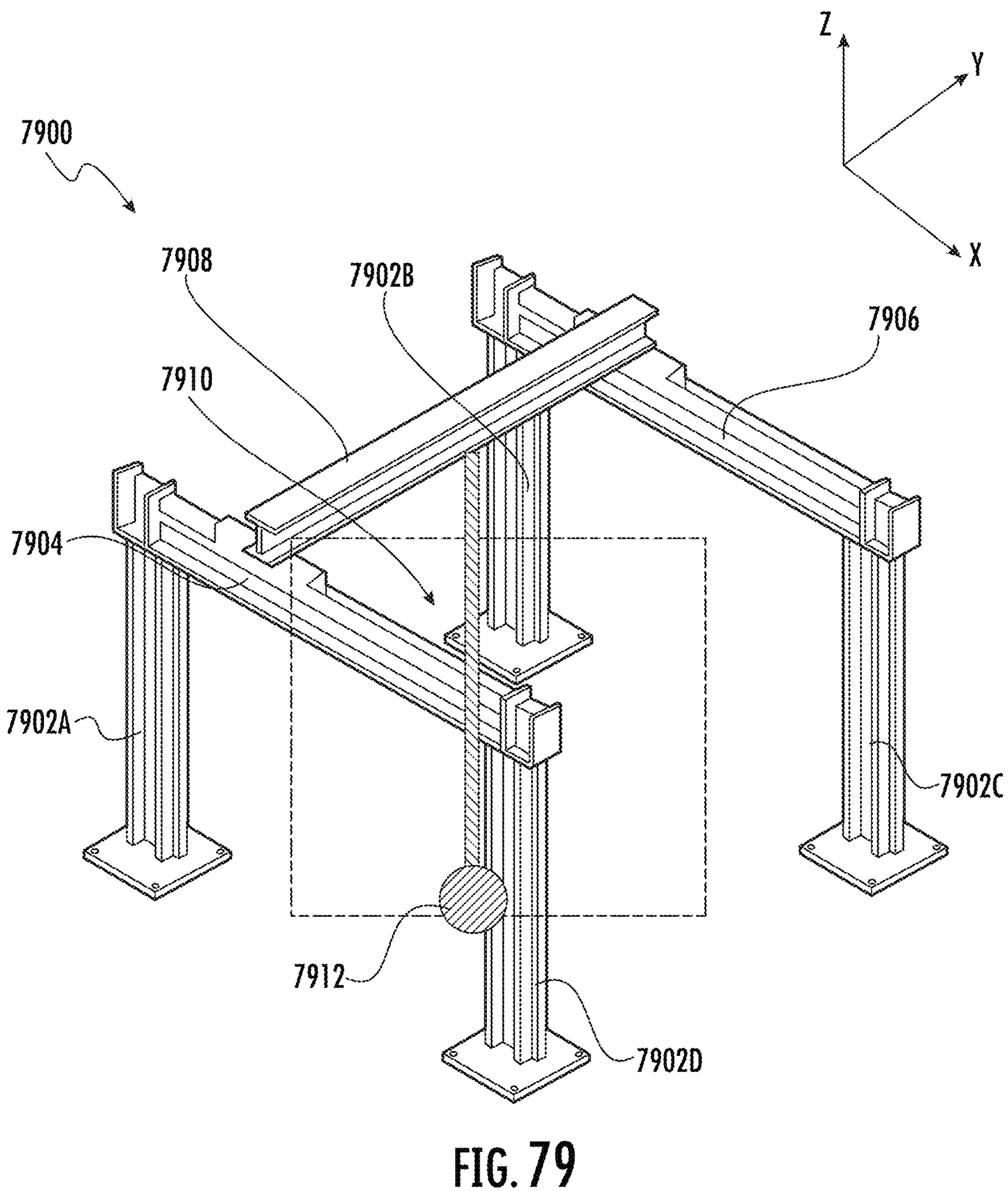
FIG. 79 illustrates an example crane assembly with one example claw assembly in accordance with some embodiments of the present disclosure.
Figure 80:
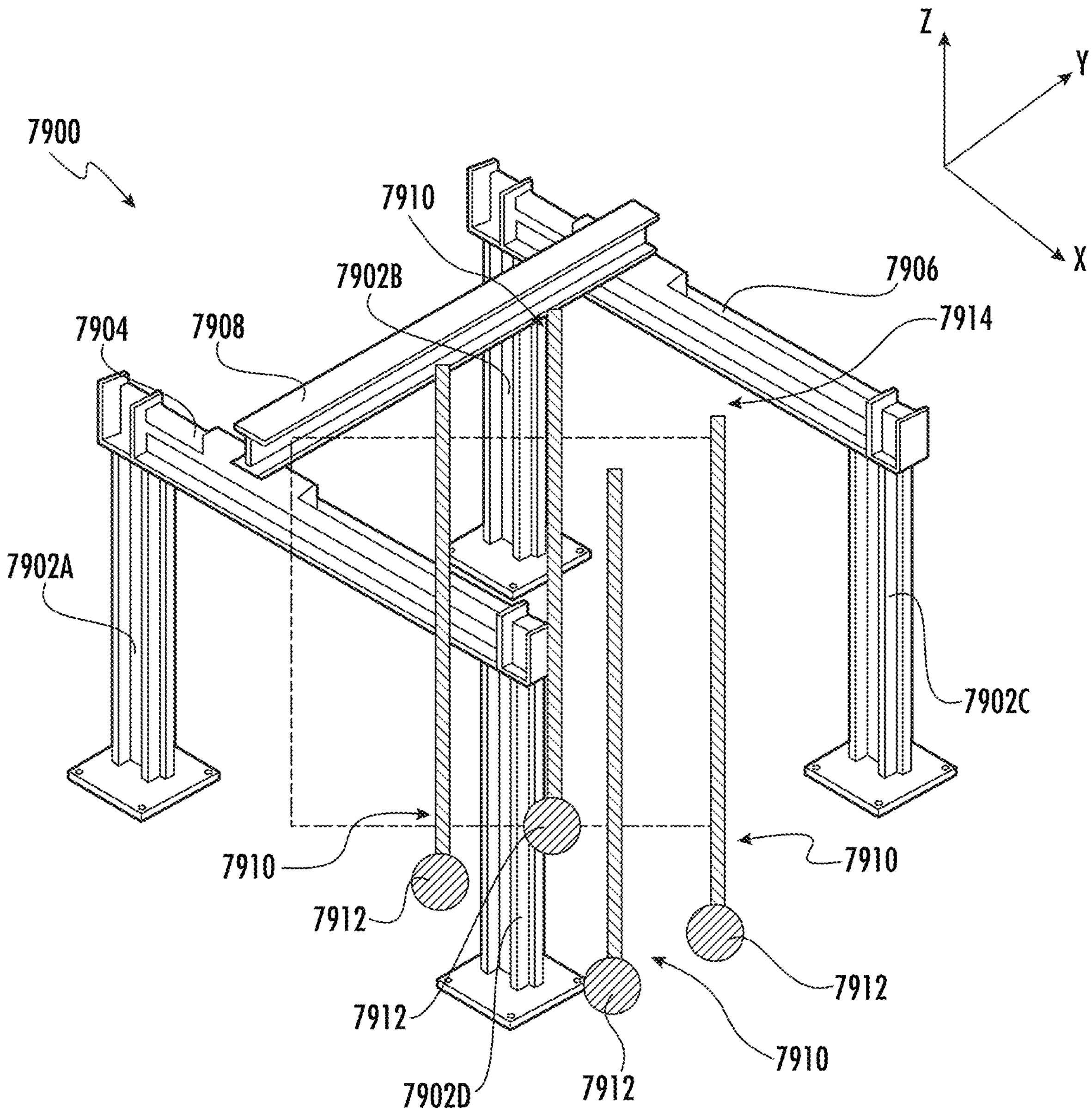
FIG. 80 illustrates an example crane assembly with multiple example claw assemblies in accordance with some embodiments of the present disclosure.

As shown in FIG. 79 and FIG. 80, a crane assembly 7900 may be provided according to various embodiments of the present disclosure.

In some embodiments, the crane assembly 7900 may comprise a plurality of crane support beams, such as, but not limited to, crane support beam 7902A, crane support beam 7902B, crane support beam 7902C, and crane support beam 7902D. In some embodiments, the crane support beam 7902A, the crane support beam 7902B, the crane support beam 7902C, and the crane support beam 7902D are in parallel arrangements with one another.

In some embodiments, the plurality of crane support beams may provide support for one or more crane rails (such as, but not limited to, crane rail 7904 and crane rail 7906), and each of the one or more crane rails may connect two or more of the plurality of crane support beams. For example, the crane support beam 7902A and the crane support beam 7902D support the crane rail 7904. The crane support beam 7902B and the crane support beam 7902C support the crane rail 7906.

In some embodiments, the crane assembly 7900 is implemented in a smart rack. In such an example, the smart rack comprises a rack frame, and the rack frame comprises a plurality of rack beams. In some embodiments, the crane assembly is secured to the plurality of rack beams.

For example, each of the crane rail 7904 and the crane rail 7906 is secured to one of the plurality of rack beams. In some embodiments, each of the crane support beam 7902A, the crane support beam 7902B, the crane support beam 7902C, and the crane support beam 7902D is secured to one of the plurality of rack beams.

In the example shown in FIG. 79, the crane assembly 7900 comprises a crane bridge 7908. In some embodiments, the crane bridge 7908 is slidably attached to the top of the crane rail 7904 and the top of the crane rail 7906.

In some embodiments, the crane bridge 7908 may be configured to slide along the crane rail 7904 and the crane rail 7906, such that the crane bridge 7908 may translate in the X direction (axes indicated in at least FIGS. 79 and 80) along the crane assembly 7900.

In some embodiments, the distance between the crane rail 7904 and the crane rail 7906 may define a span. In some embodiments, the length of the crane rail 7904 and the crane rail 7906 may define a runway length. According to some embodiments, one or more motors (e.g., motors 7802 from FIG. 78) and/or a hoist and cable system (e.g., the hoist 7704 and cable 7712) may be used to translate the crane bridge 7908 within the crane assembly 7900, to effect movement of an object (e.g., a rectangular prism) within a smart rack that may be within a superstructure (e.g., example modular superstructure 1303).

In some embodiments, a claw assembly 7910 comprises at least one arm. In some embodiments, a first end of the at least one arm is secured to the crane bridge 7908 (for example, via a hoist as shown in FIG. 77). In some embodiments, a second end of the at least one arm is connected to a claw 7912. As such, the claw 7912 is attached to the crane bridge 7908.

In some embodiments, the claw assembly 7910 may be configured to move an object (e.g., a rectangular prism) within a smart rack that may be within a superstructure. In some embodiments, the claw 7912 may engage the rectangular prism (e.g. a tote) by engaging the middle of the tote and lifting it in the Z direction. In some embodiments, an actuator may be used to engage the rectangular prism on its top cover to lift it. In some embodiments, the crane assembly 7900 may be used to lift a rectangular prism out of a smart rack or out of a superstructure. In some embodiments, the crane assembly 7900 may be used in conjunction with the gantry assembly 7500.

In some embodiments, as shown in at least FIG. 80, there may be a plurality of claw assemblies 7910 having a plurality of claws 7912. In some embodiments, the plurality of claw assemblies 7910 may be used to manipulate a plurality of rectangular prisms. In some embodiments, the plurality of claw assemblies 7910 may be used to manipulate a single rectangular prism only. As shown in at least FIG. 80, a roller 7914 may be positioned to span the crane rail 7904 and the crane rail 7906. In some embodiments, the roller 7914 may be connected to the one or more claw assemblies 7910. In some embodiments, one or more motors may be included in the crane assembly 7900 on the ends of the roller 7914 to either raise or lower the claw assemblies 7910 as required (for example, depending on the given embodiment, the needs of the user, etc.). In some embodiments, the rollers 7914 may engage the claw assemblies 7910 to engage a rack (e.g., 7600). In some embodiments, the rollers 7914 may engage the claw assemblies 7910 to engage a rectangular prism and pull it into a rack. In some embodiments, the rollers 7914 of the crane assembly 7900 may be positioned to allow movement of a rectangular prism through a rack (i.e., the rollers are "hidden" and moved out of the way to allow movement between racks).

Figure 81:
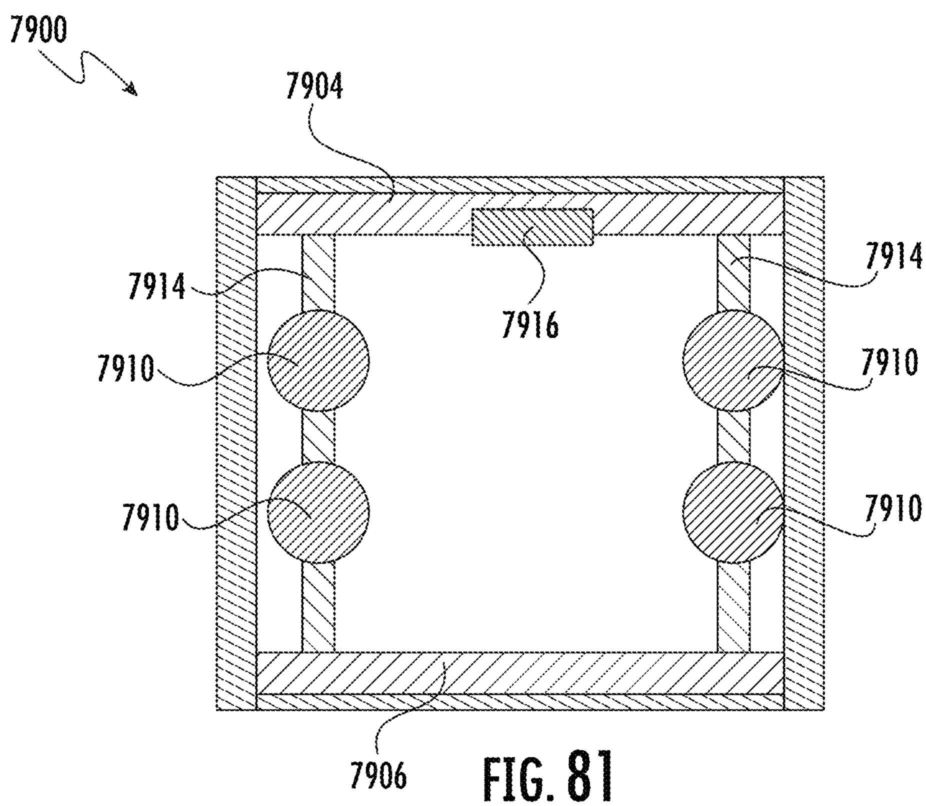
FIG. 81 illustrates an example top-down view of an example smart rack with an example crane assembly in accordance with some embodiments of the present disclosure.

FIG. 81 shows a top-down view of the crane assembly 7900. According to some embodiments, an actuation motor 7916 is provided. In some embodiments, the actuation motor 7916 may be used to control the one or more raising and lowering of the claw assemblies 7910. It will be understood that, in some embodiments, more than one actuation motor 7916 may be included in the crane assembly 7900.

As described above, there are many technical challenges and difficulties associated with transporting a rectangular prism in a multi-dimensional modular superstructure that is built using a plurality of smart racks, including, but not limited to, technical challenges and difficulties associated with the mechanical mechanisms for transporting a rectangular prism from a smart rack to a peer smart rack that neighbors the smart rack in the x dimension, the y dimension, and/or the z dimension.

Various embodiments of the present disclosure overcome these technical challenges and difficulties, and provide various technical improvements and benefits. In particular, FIG. 82 provides example illustrations of example mechanical mechanisms for transporting a rectangular prism from a smart rack to a peer smart rack in accordance with various embodiments of the present disclosure.

Figure 82:
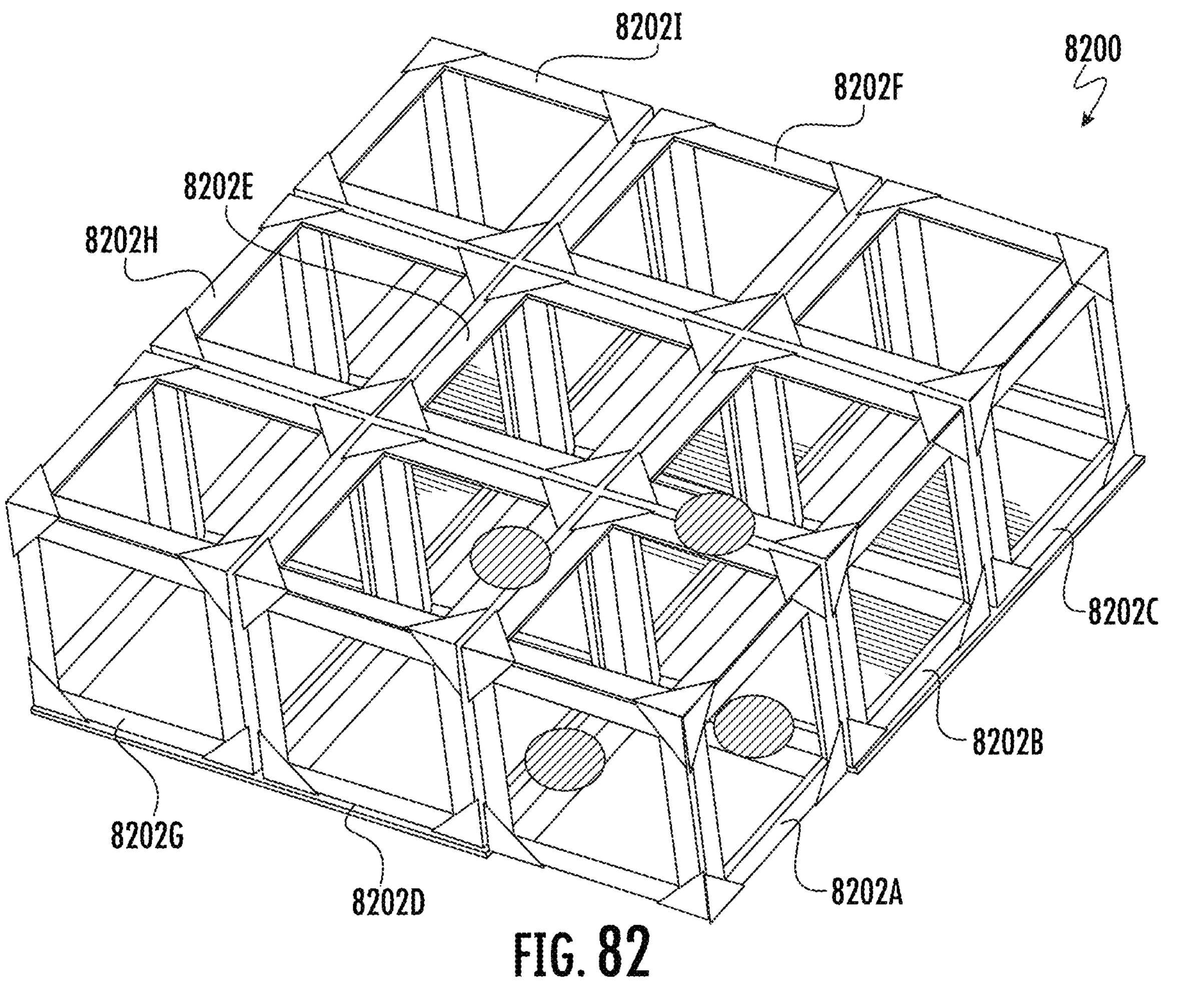
FIG. 82 illustrates an example superstructure that defines an example smart rack neighborhood in accordance with some embodiments of the present disclosure.

In particular, FIG. 82 illustrates an example superstructure 8200 for transporting a rectangular prism. The example superstructure 8200 comprises a plurality of smart racks, such as smart rack 8202A, smart rack 8202B, smart rack 8202C, smart rack 8202D, smart rack 8202E, smart rack 8202F, smart rack 8202G, smart rack 8202H, and smart rack 8202I.

In some embodiments, the plurality of smart racks forming a horizontal rack neighborhood. For example, in the example shown in FIG. 82, the smart rack 8202A, the smart rack 8202B, the smart rack 8202C, the smart rack 8202D, the smart rack 8202E, the smart rack 8202F, the smart rack 8202G, the smart rack 8202H, and the smart rack 8202I form a horizontal rack neighborhood.

In some embodiments, each of the plurality of smart racks comprises at least one horizontal transport mechanism for transporting the rectangular prism horizontally, and only one of the plurality of smart racks comprises a vertical transport mechanism for transporting the rectangular prism vertically.

Continuing from the example shown in FIG. 82, each of the smart rack 8202A, the smart rack 8202B, the smart rack 8202C, the smart rack 8202D, the smart rack 8202E, the smart rack 8202F, the smart rack 8202G, the smart rack 8202H, and the smart rack 8202I may comprise at least one horizontal transport mechanism for transporting the rectangular prism horizontally.

In some embodiments, the at least one horizontal transport mechanism comprises at least one roller (including, but not limited to, the examples illustrated and described above in connection with at least FIG. 69 to FIG. 70). In some embodiments, the at least one horizontal transport mechanism comprises at least one shutter (including, but not limited to, the examples illustrated and described above in connection with at least FIG. 66 to FIG. 68B). In some embodiments, the at least one horizontal transport mechanism comprises at least one gantry (including, but not limited to, the examples illustrated and described above in connection with at least FIG. 75 to FIG. 76).

In some embodiments, only one of the smart rack 8202A, the smart rack 8202B, the smart rack 8202C, the smart rack 8202D, the smart rack 8202E, the smart rack 8202F, the smart rack 8202G, the smart rack 8202H, and the smart rack 8202I may comprise a vertical transport mechanism for transporting the rectangular prism vertically. In some embodiments, the vertical transport mechanism comprises at least one rack and pinion system (including, but not limited to, the examples illustrated and described above in connection with at least FIG. 62 to FIG. 65). In some embodiments, the vertical transport mechanism comprises at least one crane assembly (including, but not limited to, the examples illustrated and described above in connection with at least FIG. 77 to FIG. 81).

As such, the example shown in FIG. 82 provides an example of a superstructure with smart racks, where most of the smart racks provide horizontal transport mechanisms for transporting rectangular prisms horizontally, and only one smart rack provides a vertical transport mechanism for transporting rectangular prisms vertically. For example, eight of nice the smart racks shown in FIG. 82 (e.g. smart rack 8202B, smart rack 8202C, smart rack 8202D, smart rack 8202E, smart rack 8202F, smart rack 8202G, smart rack 8202H, and smart rack 8202I) comprise transport mechanisms only for transporting rectangular prisms horizontally (including, but not limited to, use of rollers/wheels or gantries as described above) that does not transport rectangular prisms vertically. A ninth smart rack (e.g. smart rack 8202A) comprises at least one vertical transport mechanism for transporting rectangular prisms vertically, in addition to at least one horizontal transport mechanism for transporting rectangular prisms horizontally.

As such, the example shown in FIG. 82 provides a simpler design of a superstructure. In particular, the requirements of cost, power, and sensors for those eight smart racks that are provided with only horizontal transport mechanisms would be lower, and allows for a faster, more costly, and more complex transport mechanisms on the ninth smart rack. In such an example, the rectangular prisms would be secured in the smart racks when there is no power.

In some embodiments, the ninth smart rack would be set up to provide vertical movement in the Z direction (similar to an "elevator"), and would meet the same requirements as other smart racks (such as, but not limited to, vibration proofs, platform requirement, etc.).

In some embodiments, components associated with the vertical transport mechanisms may extend beyond the ninth smart rack. For example, the ninth smart rack may utilize available spaces in adjacent smart racks (such as, but not limited to, available space in the smart rack that is secured to the top of the ninth smart rack, and/or available space in the smart rack that is secured to the bottom of the ninth smart rack) to store components that aid in facilitating the movement of the rectangular prism in the vertical direction, as well as to transfer the rectangular prisms into other smart racks.

While the description above provides an example of a superstructure that defines an example smart neighborhood, it is noted that the scope of the present disclosure is not limited to the description above.

For example, an example superstructure may assign every sixth smart rack with a vertical transport mechanism for transporting rectangular prisms vertically. Additionally, or alternatively, the example superstructure may assign one or more smart racks with vertical transport mechanisms for transporting rectangular prisms vertically per the Z dimension level of the smart rack neighborhood.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

Figure 89:
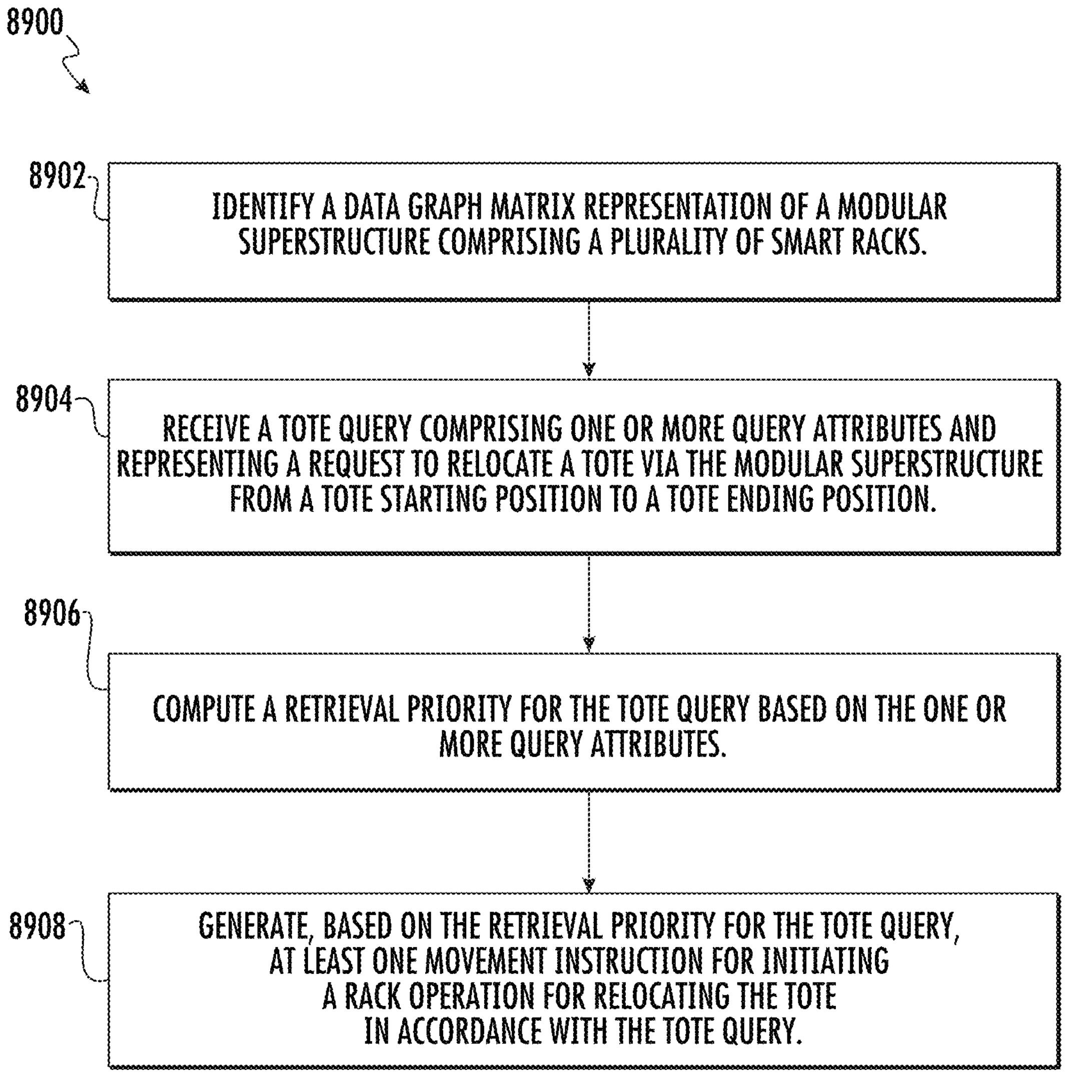
FIG. 89 illustrates a flow chart depicting operations of an example process for prioritized tote retrieval in accordance with some embodiments of the present disclosure.

FIG. 89 illustrates a flowchart depicting operations of an example process for prioritized tote retrieval in accordance with at least some example embodiments of the present disclosure. Specifically, FIG. 89 depicts an example process 8900. The process 8900 is performable by any number of computing device(s) as described herein, for example embodiment in hardware, software, firmware, and/or any combination thereof. In some embodiments, the apparatus 2300 shown in FIG. 23 includes the various circuitry as means for performing each operation of the process 8900.

At operation 8902, the process 8900 includes identifying a data graph matrix representation of a modular superstructure comprising a plurality of smart racks. The plurality of smart racks can physically support a plurality of totes within the modular superstructure. In some embodiments, the plurality of smart racks is interconnected with one another, such that each smart rack is capable of repositioning a tote to at least one other smart rack and/or receiving a tote from at least one other smart rack.

The data graph matrix representation may be embodied as a directed graph with a plurality of nodes and edges. In some embodiments, the data graph matrix representation includes a plurality of nodes representing the plurality of smart racks. Additionally, or alternatively, in some embodiments the data graph matrix representation includes a plurality of edges that each connect nodes representing peers of the plurality of smart racks. In this regard, in some embodiments an edge connects a node representing a particular smart rack capable of repositioning a tote to a peer smart rack represented by a peer node connected via the edge.

At operation 8904, the process 8900 includes receiving a tote query. The tote query may represent a request to relocate a particular tote from its current position to a target end position, for example from a tote starting position to a tote ending position. A tote query may represent a request to relocate any number of tote queries, for example including a single tote or plurality of totes to any of a plurality of target end positions. In some embodiments, a single tote query is received. In other embodiments, a plurality of tote queries is received. In some embodiments, the tote queries are received via a request, API call, or other incoming transmission. Alternatively or additionally, in some embodiments the tote queries are received in response to user input via a client computing device associated with a modular superstructure. It should be appreciated that in a circumstance where a plurality of tote queries is received, a single transmission, user input, or other data may be received that represents a plurality of tote queries, or a plurality of transmissions, user inputs, and/or other data portions may be received that represent a plurality of tote queries.

The tote query can include one or more query attributes. The one or more query attributes can include at least one of (i) a requesting party, (ii) a requested item, (iii) a current node for the tote, or (iv) a requested retrieval time.

The requesting party can be indicative of an originating entity of the tote query. The requesting party can be associated with party data representative of one or more attributes for the requesting party. In some embodiments, the party data can be indicative of a priority tier for the requesting party. For example, the modular superstructure can be associated with a plurality of requesting parties and/or a tiered priority scheme for intelligently handling a plurality of tote queries respectively received from each of the requesting parties. The tiered priority scheme can include a plurality of tiered priority classifications. As one example, the tiered priority classifications can include a first priority classification, a second priority classification, and/or a third priority classification. The first priority classification can have a higher priority than the second and third classifications. The second priority classification can have a higher priority than the third classification and a lower priority than the first classification. The third classification can have a lower priority than the first and second classifications. In some embodiments, each requesting party of the plurality of requesting parties can be associated with a priority classification of the tiered priority scheme.

In some embodiments, one or more attributes can be determined based on the query attributes. By way of example, the requesting party for a tote query can be determined based on the current node of the tote. For example, in some embodiments, the modular superstructure can be associated with a plurality of different sections. Each section can include a subset of the plurality of smart racks that are owned, operated, or otherwise associated with a respective requesting party of the plurality of requesting parties. The requesting party for a respective tote query can be identified in the event that the current position of a particular tote corresponds to a smart rack that is owned, operated, or otherwise associated with a respective requesting party.

The requesting item can be associated with item data. The item data can be representative of one or more attributes for the requested item. For instance, the requested item can be associated with an item type (e.g., perishable item, nonperishable items, etc.) and/or an item age. The item age, for example, can be indicative of a period of time in which a respective item has been stored in the modular superstructure, a period of time after the manufacture, packaging, or selection of the respective item, and/or the like. In some embodiments, the item type can be indicative of a perishable item and the item data can be indicative of a shelf life for the requested item.

The requested retrieval time can be indicative of a requested priority associated with the tote query. For example, a requesting party can indicate a requested retrieval time (and/or time range) for the tote query. In some embodiments, the requested retrieval time can correspond to one or more priority classifications of the tiered priority scheme.

At operation 8906, the process 8900 includes computing a retrieval priority for the tote query based on the one or more query attributes. The retrieval priority identifies a priority of the tote query relative to a plurality of queued tote queries. The retrieval priority can be based on the at least one of (i) a requesting party, (ii) a requested item, (iii) a current node for the tote, or (iv) a requested retrieval time of the tote query.

For example, party data associated with a requesting party of the tote query can be accessed to determine the retrieval priority. The party data, for example, can be indicative of a priority tier for the requesting party. The retrieval priority for tote query can be based on the priority tier for the requesting party. By way of example, the retrieval priority can correspond to a priority classification of the requesting party. In this manner, space of a modular superstructure can be utilized and prioritized for different requesting parties. Several parties can rent, own, or operate a space within the modular superstructure and retrieval of items can be prioritized based on each respective party's position within a tiered priority scheme.

As another example, item data associated with a requested item of the tote query can be accessed to determine the retrieval priority. The item data, for example, can be indicative of an age of the requested item and/or a shelf life for the requested item. The retrieval priority for the tote query can be based on the shelf life for the requested item. In this manner, identical items with older packaging dates and closer to the expiration date can be retrieved before younger items or items with longer shelf lives.

At operation 8908, the process 8900 includes generating, based on the retrieval priority for the tote query, at least one movement instruction for initiating a rack operation for relocating the tote in accordance with the tote query.

In some embodiments, the at least one movement instruction can include a movement priority. The process can include computing, by utilizing the data graph matrix representation, a tote movement path to relocate the tote. The tote movement path can represent a set of rack operations for relocating the tote in accordance with the tote query. The process can include computing the movement priority for the at least one movement instruction based on the retrieval priority for the tote query. The movement priority, for example, can include a priority for a rack operation that corresponds to the retrieval priority. The process can include generating, based on the tote movement path and the movement priority, the at least one movement instruction.

The movement priority for the at least one movement instruction can prioritize the at least one movement instruction over one more other movement instructions for relocating totes corresponding to queued tote queries. In some embodiments, the at least one movement instruction can be indicative of a movement of the tote from a current node to a peer node within the modular superstructure. The execution of the at least one movement instruction can be based on a comparison between (i) the movement priority of the at least one movement instruction and a (ii) another movement priority associated with the peer node. By way of example, the at least one movement instruction can be executed in response to the movement priority outweighing the other movement priority. Alternatively, the at least one movement instruction can be postponed in favor of another instruction in response to the movement priority being outweighed by the other movement priority.

Figure 90:
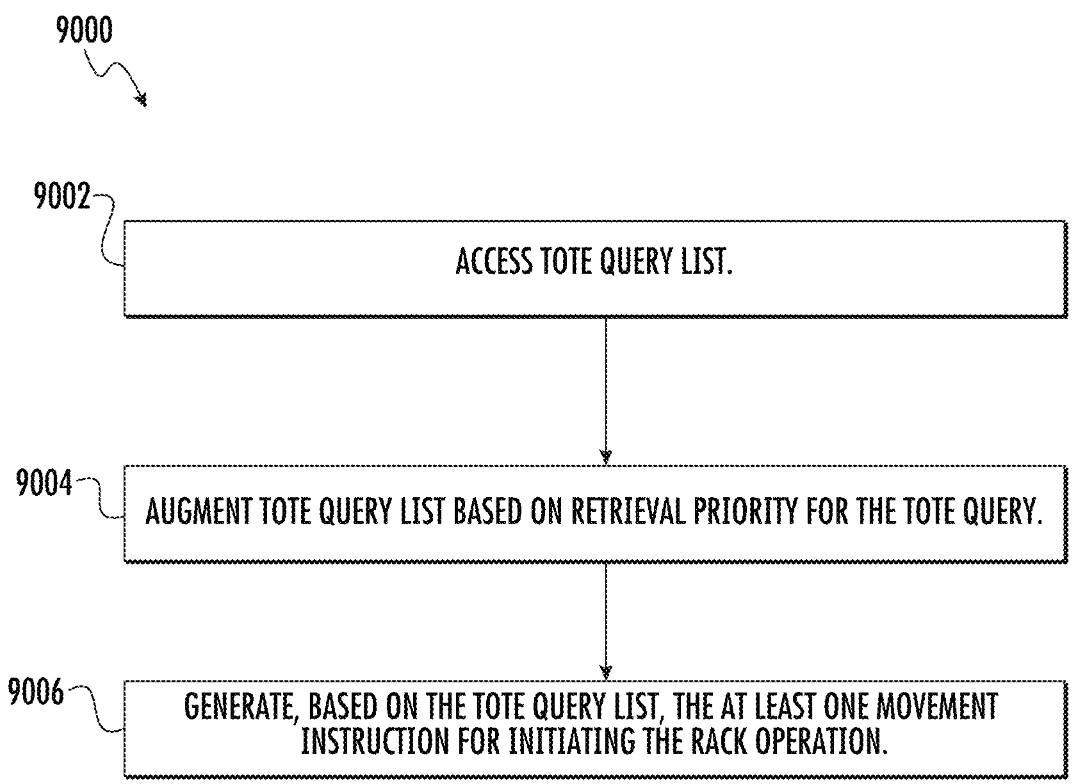
FIG. 90 illustrates a flow chart for generating an at least one movement instruction for a tote query based on a tote query list in accordance with some embodiments of the present disclosure.

In some embodiments, the at least one movement instruction can be based on a tote query list. FIG. 90 illustrates a process 9000 for generating an at least one movement instruction for a tote query based on a tote query list in accordance with some embodiments of the present disclosure. Specifically, FIG. 90 depicts an example process 9000. The process 9000 is performable by any number of computing device(s) as described herein, for example embodiment in hardware, software, firmware, and/or any combination thereof. In some embodiments, the apparatus 2300 shown in FIG. 23 includes the various circuitry as means for performing each operation of the process 9000.

In some embodiments, the process 9000 embodies a sub-process of one or more process(es) depicted and/or described herein. In some embodiments, the process 9000 embodies a sub-process of the process 8900. For example, in some embodiments, the process 9000 embodies a sub-process for generating at least one movement instruction. In this regard, it will be appreciated that the process 9000 may replace, and/or supplement, one or more of the operations of such process(es) herein. Additionally, or alternatively, in some embodiments, flow returns to another process upon completion of the operations of process 9000.

At operation 9002, the process 9000 includes accessing a tote query list including an ordered list of a plurality of queued tote queries. At operation 9004, the process 9000 includes augmenting the tote query list with the tote query based on the retrieval priority for the tote query. At operation 9006, the process 9000 includes generating, based on the tote query list, the at least one movement instruction for initiating the rack operation.

The tote query list, for example, can include a prioritized queue. The tote query list can be augmented based on a comparison between the retrieval priority of the tote query and a respective priority of each of the queued tote queries. In some embodiments, one or more additional factors can be considered. As one example, a length of queued time in which a queued tote query resides in the tote query list can be determined. The length of queued time can be used to allow a lower priority queued tote query to outweigh a higher priority tote query to ensure that lower priority queued tote queries are serviced within at least a threshold time period.

Figure 91:
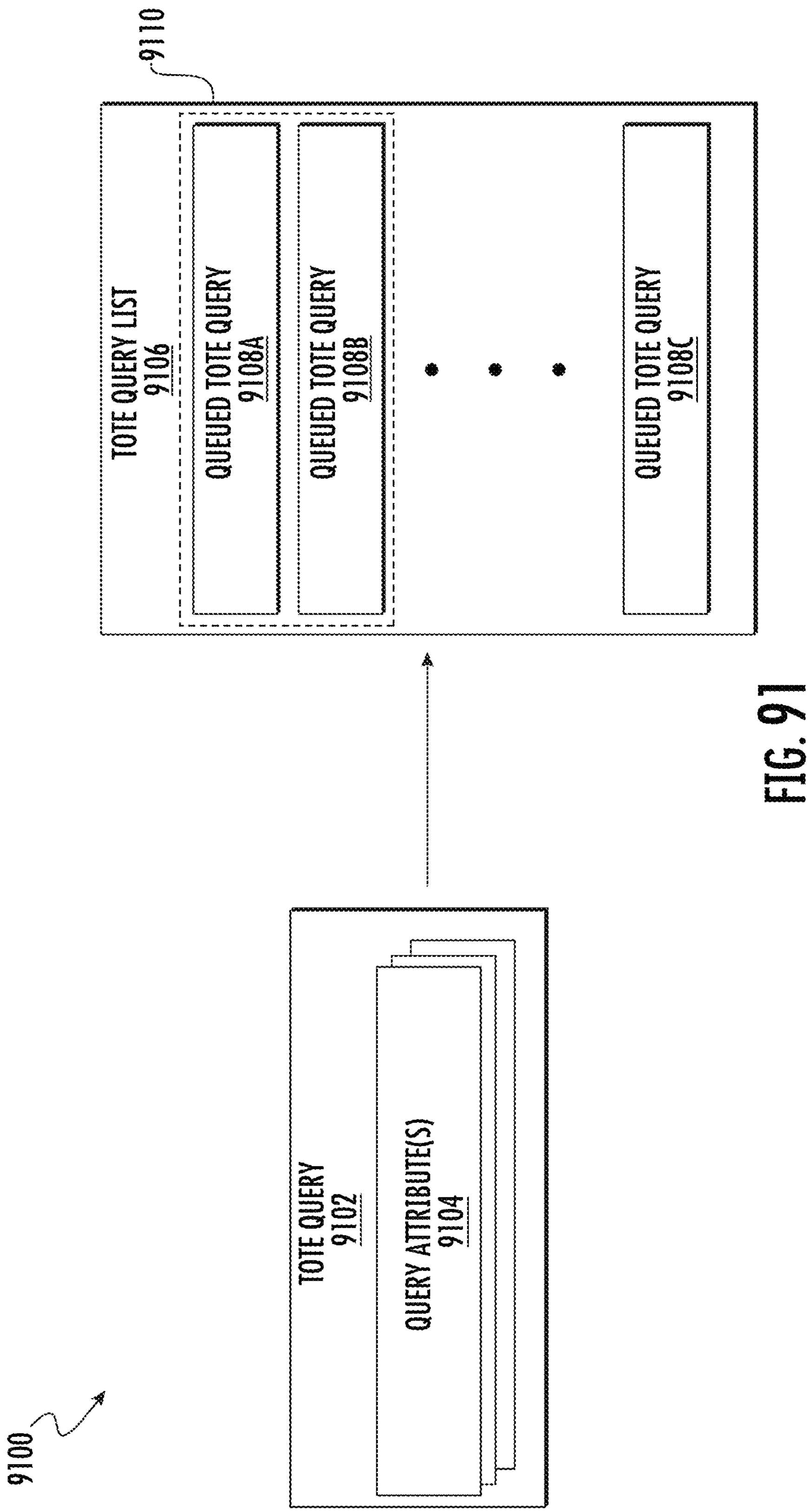
FIG. 91 illustrates a data flow diagram for tote query handling techniques in accordance with some embodiments of the present disclosure.

FIG. 91 illustrates a data diagram 9100 for tote query handling techniques in accordance with some embodiments of the present disclosure. The data diagram 9100 includes a tote query data object 9102. The tote query data object 9102 can include one or more query attribute data object(s) 9104. The query attribute data object(s) 9104, for example, can include and/or be indicative of (i) a requesting party, (ii) a requested item, (iii) a current node for the tote, or (iv) a requested retrieval time.

The data diagram 9100 includes a tote query list 9106 that includes and/or is indicative of a plurality of queued tote queries including a first queued tote query 9108A, a second queued tote query 9108B, and/or a third queued tote query 9108C (collectively-tote queries 9108). The tote query list 9106 is a prioritized queue in which queued tote queries 9108 with a higher priority are pushed to the top of the queue.

In some embodiments, a subset of the queued tote queries can be handled in parallel to retrieve a plurality of totes. The number of queued totes that can be handled in parallel can be based on a retrieval rate 9110 for the modular superstructure. In some embodiments, the tote retrieval rate can be indicative of a portion of the tote query list 9106. The tote retrieval rate can be indicative of a number of totes that can be retrieved within a time period. For example, the retrieval rate 9110 can be indicative of a number of the top queued tote queries that may be serviced in parallel. In some embodiments, the at least one movement instruction for initiating the rack operation can be based on the retrieval rate 9110.

The retrieval rate 9110 can be a static retrieval rate for the modular superstructure. In addition, or alternatively, the retrieval rate 9110 can be dynamically determined based on one or more factors such as an operational capacity associated with the modular superstructure. As one example, the operational data indicative of the operational capacity associated with the modular superstructure can be accessed. The operational capacity can be indicative of a maximum throughput (e.g., a number of totes per minute/hour, etc.) for the modular superstructure based on a workforce availability (e.g., worker utilization levels, a number of workers present in real-time, etc.) and/or a workspace availability (e.g., operable egress points for the modular superstructure).

In this manner, scheduling of tote retrieval from the modular superstructure can be based on worker utilization level, thus preventing under and overutilization of a workforce. A scheduling algorithm can schedule delivery rates of totes to the number of workers present at a specified rate, optimizing workforce participation. Moreover, the scheduling algorithm can predict the amount of work needed for the workday. The scheduling algorithm can optimize schedules in real-time based on worker activity (e.g., lunch or other breaks, etc.), and slow down or speed up a retrieval rate 9110 accordingly.

During operation and use of the example superstructures described throughout this disclosure, it may become necessary to inspect and repair one or more of the example rectangular prisms (also known as totes) disposed within these example superstructures. A robot repair and inspection tote as described in the following portions of the disclosure and as illustrated in the associated figures is at least one way in which example totes may be inspected and repaired within example superstructures.

Figure 92:
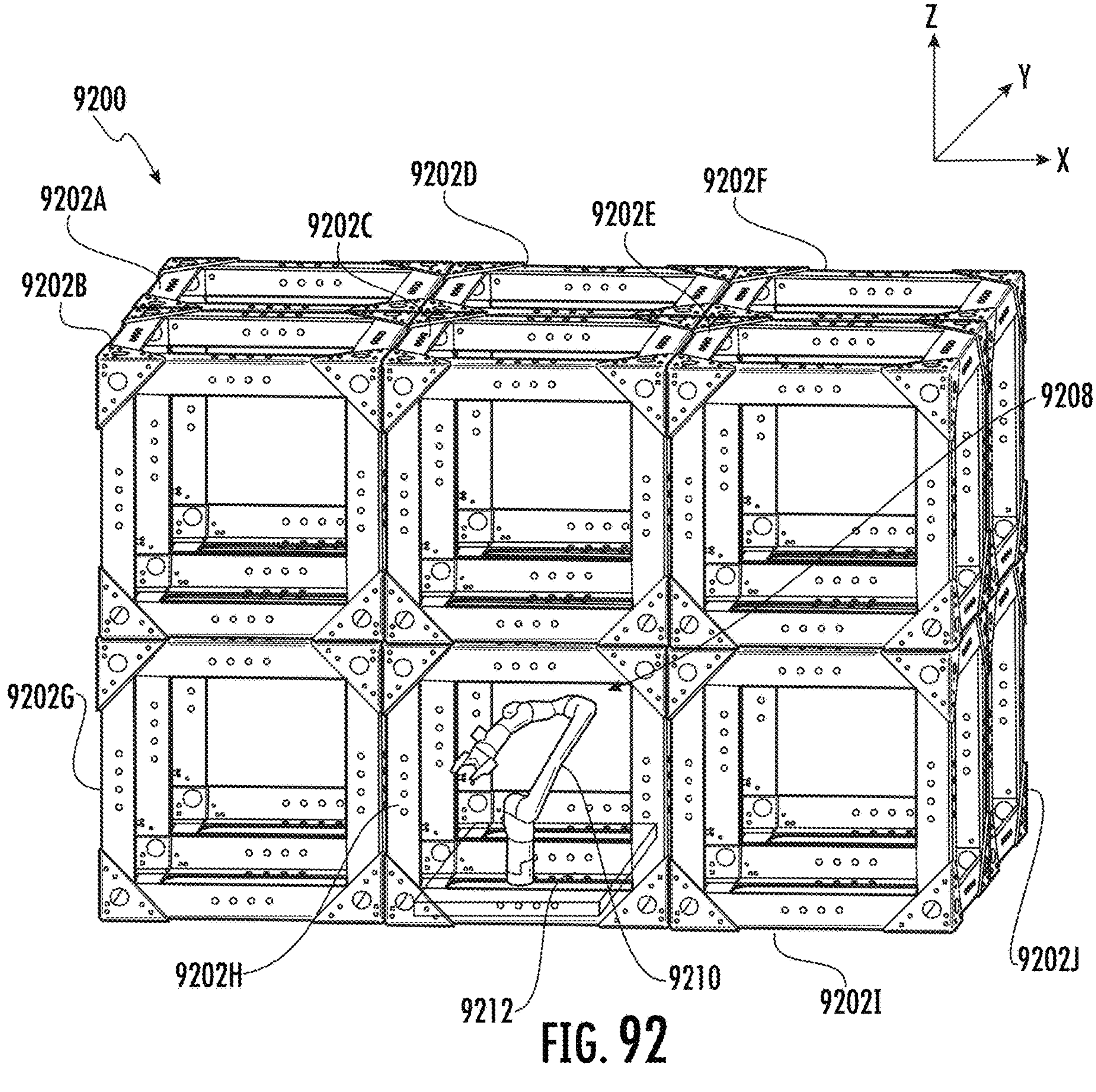
FIG. 92 shows an angled view of an example superstructure for transporting a rectangular prism including a robot repair and inspection tote in accordance with some embodiments of the present disclosure.

Referring now to FIG. 92, an example superstructure 9200 for transporting a rectangular prism in accordance with some embodiments of the present disclosure is illustrated. In some embodiments, the superstructure 9200 includes a plurality of smart racks (including, but not limited to a smart rack 9202A, a smart rack 9202B, a smart rack 9202C, a smart rack 9202D, a smart rack 9202E, a smart rack 9202F, a smart rack 9202G, a smart rack 9202H, a smart rack 9202I, and a smart rack 9202J). In some embodiments, each of the plurality of smart racks 9202A-9202J may be operatively connected to one or more of the other smart racks 9202A-9202J. It will be understood that the example superstructure 9200 may include a variety of components and embodiments as previously described in this disclosure with respect to various other embodiments of example superstructures.

In some embodiments, each of the plurality of smart rack 9202A-J may comprise at least one horizontal transport mechanism for transporting the rectangular prism horizontally, and one of the plurality of smart racks comprises a vertical transport mechanism for transporting the rectangular prism vertically.

Figure 93:
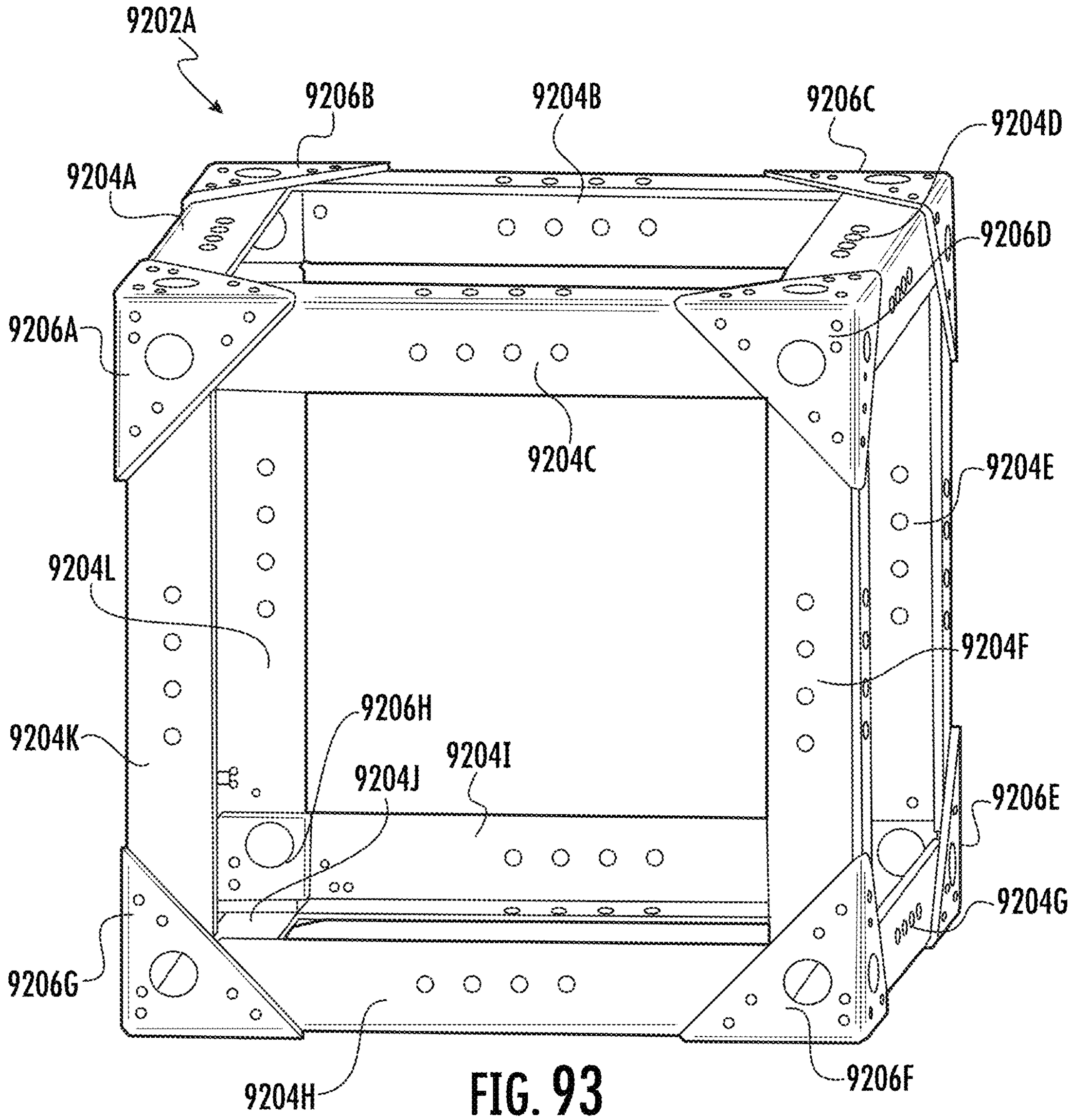
FIG. 93 shows an angled view of an example smart rack in accordance with some embodiments of the present disclosure.

Referring to FIG. 93, in some embodiments, a smart rack 9202A may include a plurality of rails 9204A, 9204B, 9204C, 9204D, 9204E, 9204F, 9204G, 9204H, 9204I, 9204J, 9204K, and 9204L. In some embodiments, the exemplary smart rack 9202A may include a plurality of brackets 9206A, 9206B, 9206C, 9206D, 9206E, 9206F, 9206G, and 9206H. In various embodiments, the plurality of rails

9204A-9204K may be operably connected to the plurality of brackets 9206A-9206H. In some embodiments, the smart racks 9202A-J may be self-contained and replaceable; that is, in some embodiments, one or more smart racks may be removed and/or replaced in the superstructure 9200 without interfering with the other smart racks (i.e., without having to remove and/or replace those smart racks, as well). It will be understood that the example smart racks 9202A may include a variety of components and embodiments as previously described in this disclosure with respect to various other embodiments of example smart racks. For example, as previously described, in some embodiments, the example smart rack 9202A may include at least one rack actuator with a slider and an arm connected to the slider, where the arm is configured to operably engage rectangular prisms within the superstructure 9200. In some embodiments, the rails 9204A-9204L and brackets 9206A-9206H may define a plurality of rack plates.

Returning to FIG. 92, in some embodiments, a robotic repair tote 9208 may be positioned within one of the plurality of smart racks 9202A-9202J. It will be understood that, while the robotic repair tote 9208 is positioned in the smart rack 9202H in at least FIG. 92, the robotic repair tote 9208 may be positioned in any one of the smart racks 9202A-9202J. In some embodiments, the robotic repair tote 9208 may include an exemplary repair and inspection robot 9210. In some embodiments, the robot repair tote 108 may move between the plurality of smart racks 9202A-9202J of the example superstructure 9200. In some embodiments, the robotic repair tote 9208 can be inserted into the example superstructure 9200 using an ingress point and transferred to the faulty rack via a movement plan for inspection and repairs. In some embodiments, the ingress point may be the space formed by one or more of the plurality of rails 9204A-9204L connected to the one or more brackets 9206A-9206H. In some embodiments, the robotic repair tote 9208 may be capable of removing faulty assemblies from a rack and replacing them. In some embodiments, the robotic repair tote 9208 may store the faulty assemblies removed for later retrieval. In some embodiments, the repair and inspection robot 9210 may contain a storage location to store replacement and failed assemblies. In some embodiments, the robotic repair tote 9208 may be self-powered and/or the robot 9210 may be self-powered. In some embodiments, the robotic repair tote 9208 may be configured to securely lock itself into a position before performing a repair or realignment procedure. In some embodiments, the repair and inspection robot 9210 shall not interfere with the operational system.

In some embodiments, the robotic repair tote 9208, upon completion of the inspection and repair, shall exit the superstructure 9200 through an egress point. In some embodiments, the egress point may be the space formed by one or more of the plurality of rails 9204A-9204L connected to the one or more brackets 9206A-9206H. In some embodiments, the robotic repair tote 9208 may include a robot 9210 that may be configured for repair and/or inspection and will further be described in reference to at least FIG. 94 and FIG. 95.

Figure 94:
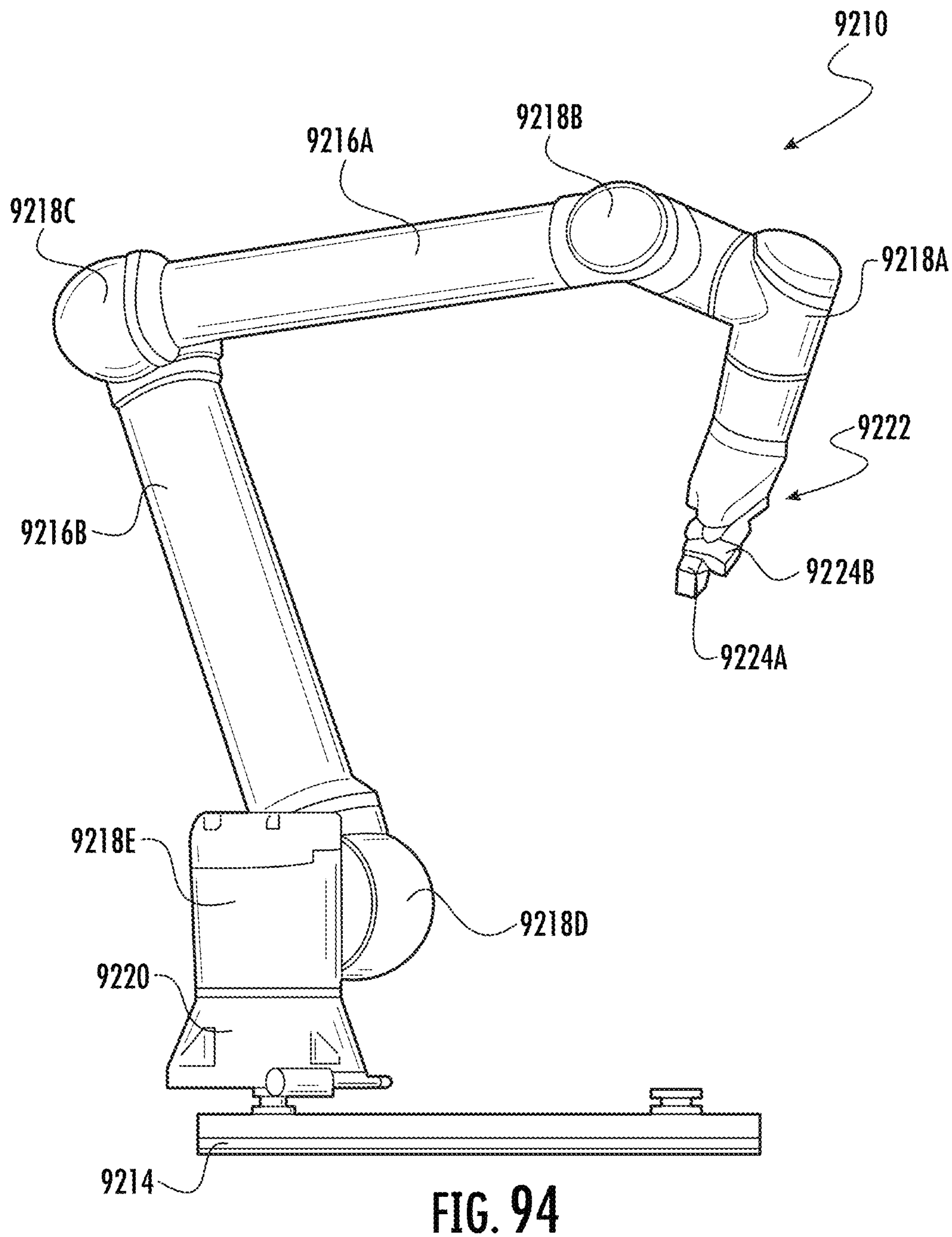

Referring now to FIG. 94, in some embodiments, an exemplary repair and inspection robot 9210 is provided in accordance with some embodiments of the present disclosure. In some embodiments, the repair and inspection robot 9210 may be positioned on a platform 9214. In some embodiments, the repair and inspection robot 9210 may have a plurality of arms 9216A, 9216B. In some embodiments, the repair and inspection robot 9210 may have a plurality of joints 9218A, 9218B, 9218C, 9218D, and 9218E that link the arms 9216A and 9216B. In some embodiments, the joints 9218A, 9218B, 9218C, 9218D, and 9218E may be configured to rotate and/or pivot and thereby move the arms 9216A-9216B of the robot 9210. In some embodiments, the repair and inspection robot 9210 may have a base 9220. In some embodiments, the base 9220 may be fixed to the platform 9214 and may be linked to the arms 9216A-9216B by means of a joint (9218E, at least in FIG. 94).

In some embodiments, the robot 9210 may be a self-powered robot that can inspect and repair damaged smart racks 9202A-9202J. In some embodiments, the robot 9210 may perform these repairs by means of an actuator 9222. In some embodiments, the actuator 9222 may have a plurality of gripping components 9224A, 9224B. In some embodiments, the gripping components 9224A, 9224B may be connected to one of the plurality of joints (9218A in at least FIG. 94). In some embodiments, the actuator 9222 may be configured to attach, remove, and replace faulty assemblies in the plurality of smart racks 9202A-9202J of the superstructure 9200. In some embodiments, faulty assemblies may include, but are not limited to, faulty motor drive ASSYs, faulty controller and/or motor driver PCBs, and faulty power switches PCBs. In some embodiments, the robot 9210 may be configured to realign misaligned totes within the smart racks 9202A-9202J of the superstructure 9200. In some embodiments, the actuator 9222 may be controlled remotely by, for example, a technician. However, it will be understood that, in some embodiments, the robot 9210 may be controlled autonomously. In some embodiments, control may be a mixture of technician control and autonomous control. In some embodiments, the plurality of smart racks 9202A-9202J may include attachment points for the robot arms (e.g., platform 9214). It will be understood that the control system for the aforementioned components may be one of the example control systems and embodiments described throughout this disclosure.

Figure 95:
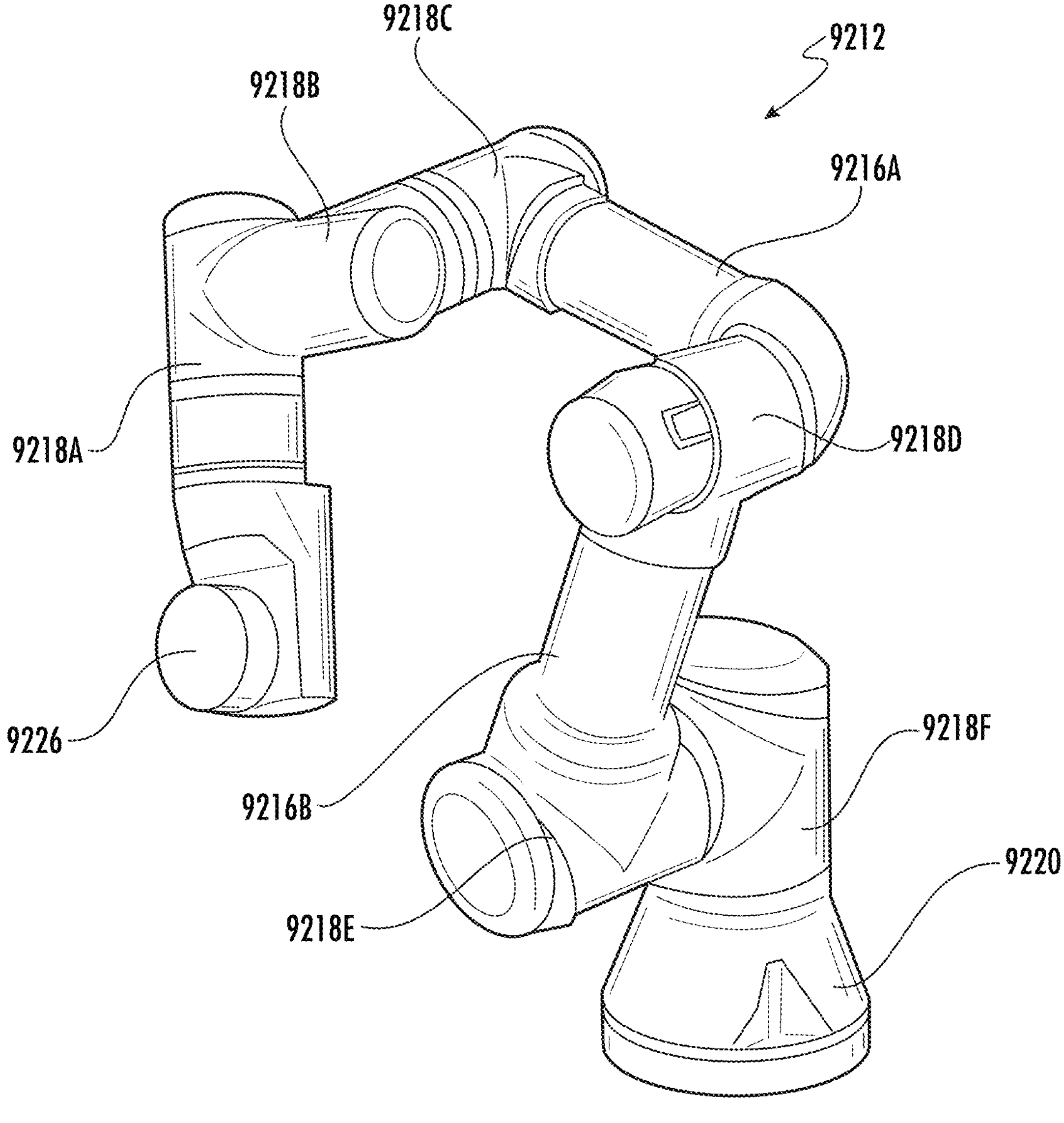

Referring now to FIG. 95, in some embodiments, the robot 9210 may perform inspections of the faulted rack using at least one camera 9226. In some embodiments, the repair and inspection robot 9210 shall contain fixed and movable cameras 9226 for inspections and repairs. In some embodiments, the camera 9226 may enable closer inspection of faulty racks for repair. In some embodiments, the camera 9226 may be remote-controlled. In some embodiments, the camera 9226 may be viewable in real-time (e.g., by a technician operating the robot 9210.

During operation and use of the example superstructures described throughout this disclosure, it may become necessary to maintain alignment of one or more rectangular prisms (also known as totes) within one or more of the smart racks of one or more of the example superstructures described in this disclosure. One or more tote alignment sensors may be disposed on one or more smart racks to detect the alignment of one or more totes. For example, the one or more tote alignment sensors may be programmed to detect one or more parameters and signal when the one or more totes are out of position (e.g., too close to one side of the smart rack). The sensors may be configured to transmit the positioning of the totes to one or more control devices. One or more control devices may then transmit signals to one or more robotic arms that may align or realign the one or more totes within the one or more smart racks. It will be understood that other realignment devices may be used, as described throughout this disclosure, to align or realign the totes within the smart racks.

Figure 96:
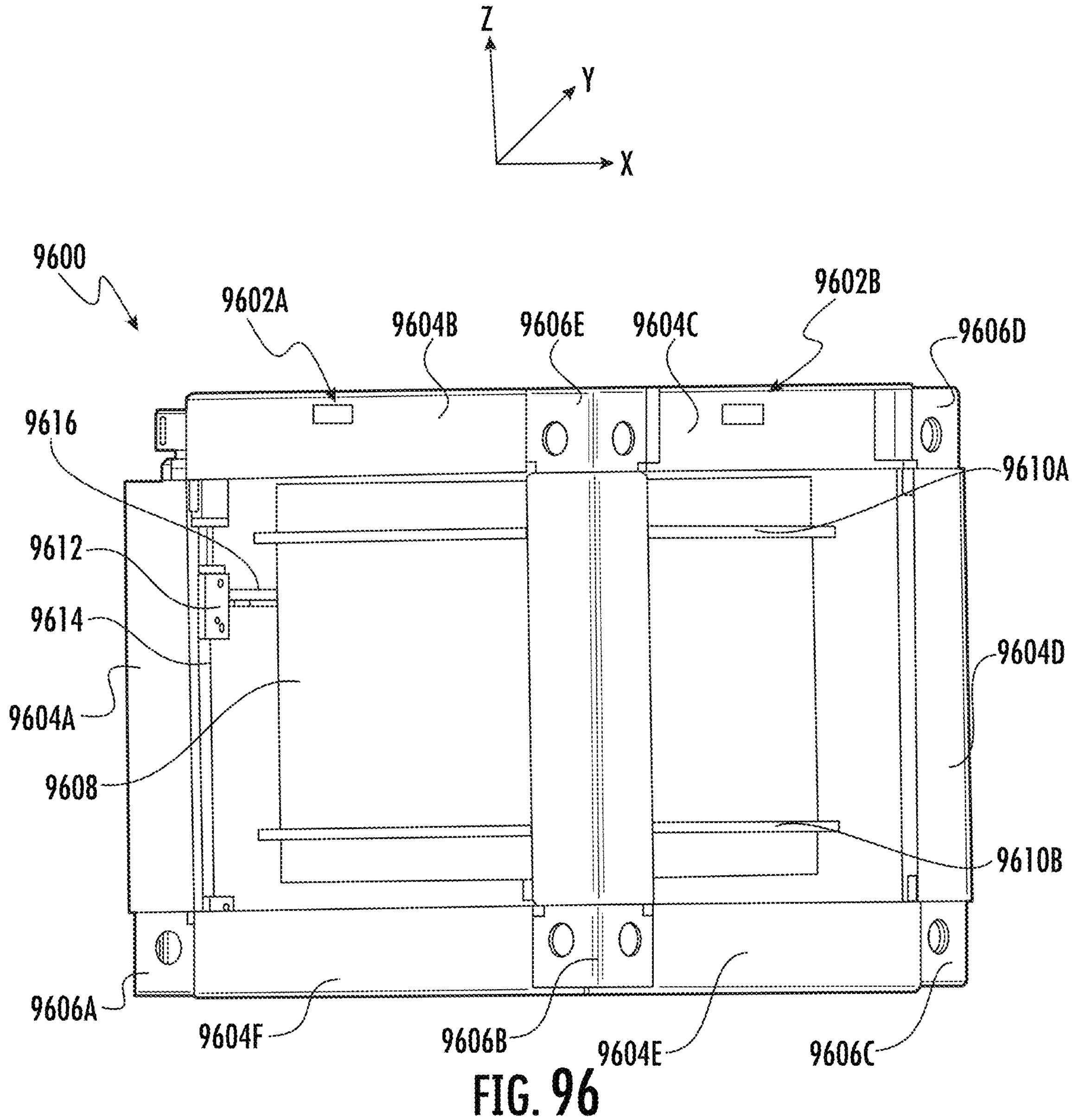

According to some embodiments, and as illustrated in at least FIG. 96, a smart rack 9600 with tote alignment sensors 9602A, 9602B is provided. In some embodiments, the smart rack may have a plurality of beams 9604A, 9604B, 9604C, 9604D, 9604E, 9604F. In some embodiments, the smart rack 9600 may include a plurality of brackets 9606A, 9606B, 9606C, 9606D, 9606E. In some embodiments, the plurality of brackets 9606A-9606E may be linked to the plurality of beams 9604A-9604F and thereby form a plurality of sides for the smart rack 9600. In some embodiments, a tote 9608 may be disposed within the smart rack 9600. In some embodiments, one or more ridges 9610A, 9610B may be disposed on the tote 9608. It will be understood that the smart rack 9600 may include a variety of components and embodiments as previously described in this disclosure with respect to various other embodiments of smart racks.

In some embodiments, the smart rack 9600 may comprise at least one horizontal transport mechanism for transporting the rectangular prism horizontally, and one of the plurality of smart racks comprises a vertical transport mechanism for transporting the rectangular prism vertically.

In some embodiments, the tote alignment sensors 9602A, 9602B may be distance measuring sensors. For example, in some embodiments, the tote alignment sensors 9602A, 9602B may be "time of flight sensors." In some embodiments, the sensors 9602A, 9602B may be ultrasonic sensors. In other embodiments, the sensors 9602A, 9602B may be laser sensors. It will be understood that, in some embodiments, there may be a mixture of sensors (e.g., one sensor 9602A may be an ultrasonic sensor and another sensor 9602B may be a laser sensor). In some embodiments, the sensors 9602A, 9602B may be disposed on all four sides of the smart rack 9600. Although FIG. 96 indicates the sensors as being on the outside of the beams 9604A and 9604B, it will be understood that this is purely illustrative and that, in some embodiments, the sensors 9602A, 9602B may be disposed such that they are facing toward the tote 9608. It will be understood that the example smart rack 9600 may include a variety of components and embodiments as previously described in this disclosure with respect to various other embodiments of example smart racks. For example, as previously described, in some embodiments, the example smart rack 9600 may include at least one rack actuator 9612 with a slider 9614 and an arm 9616 connected to the slider, where the arm is configured to operably engage rectangular prisms within the smart rack 9600. In some embodiments, the beams 9604A-9604L and brackets 9606A-9606H may define a plurality of rack plates.

In some embodiments, the sensors 9602A, 9602B may be configured to measure distance between the sensors 9602A, 9602B and the tote 9608. In some embodiments, the sensors 9602A, 9602B may send the data to a control device, which, in some embodiments, would then analyze the data. In some embodiments, the control device's analysis may be used to determine if the tote 9608 is aligned inside the smart rack 9600. For example, in some embodiments, the tote 9608 may be positioned too closely to one side of the smart rack 9600. In some embodiments, the sensors 9602A, 9602B may detect the positioning of the tote 9608 in three dimensions (i.e., in the x, y, and z directions, as indicated by the axes in FIG. 96). In some embodiments, this may enable a technician to correct the positioning of the tote 9608 within the smart rack 9600. Alternatively, in other embodiments, the positioning may be corrected by an automated system, which, in some embodiments, may also be controlled by the control device. In some embodiments, the arm 9616 may be configured to move the tote 9608. The control device may be one or more of the control devices described elsewhere in this disclosure. It will be understood that the control system for the aforementioned components may be one of the example control systems and embodiments described throughout this disclosure.

There are many technical challenges and difficulties associated with implementing modular superstructures to transport rectangular prisms between smart racks. For example, modular superstructures may utilize smart rack arms to cause movements of the rectangular prisms between smart racks. For example, smart rack arms may be actuated by motors to cause movements of the rectangular prisms between smart racks in the x dimension, in the y dimension, and in the z dimension. As such, some smart racks may require one motor to actuate the smart rack arm in each dimension, increasing the energy consumption of smart racks.

Various embodiments of the present disclosure overcome these technical challenges and difficulties, and provide various technical improvements and advantages. For example, various embodiments of the present disclosure provide example motor actuation devices that may tie one motor to multiple operations of the smart rack arms in multiple dimensions (for example, in the x dimension, in the y dimension, and/or in the z dimension). As such, various embodiments of the present disclosure may reduce cost and reduce motor count as most motors will not be in use for all axes (so opportunity exists to use them in multiple roles). Various embodiments of the present disclosure may improve duty cycle distribution across the motors of smart racks, allowing for more even usage to avoid lifting concerns (with the lighter user motors based on dominant motion for each individual smart rack).

In some embodiments, the motor actuation devices comprise solenoids, which are high reliability devices and can be configured in multiple ways. For example, solenoids may provide a single engagement or disengagement mode for output gearing, and/or provide dual throws to be disengaged when the solenoids receive a null signal and to engage two separated outputs so as to provide extending motion or retracting motion.

In some embodiments, the example motor actuation device comprises a torque limiter or slip device that allows for a common motor output without clutching and can couple motor output operations with varying strokes, operations, and/or directions.

Figure 97:
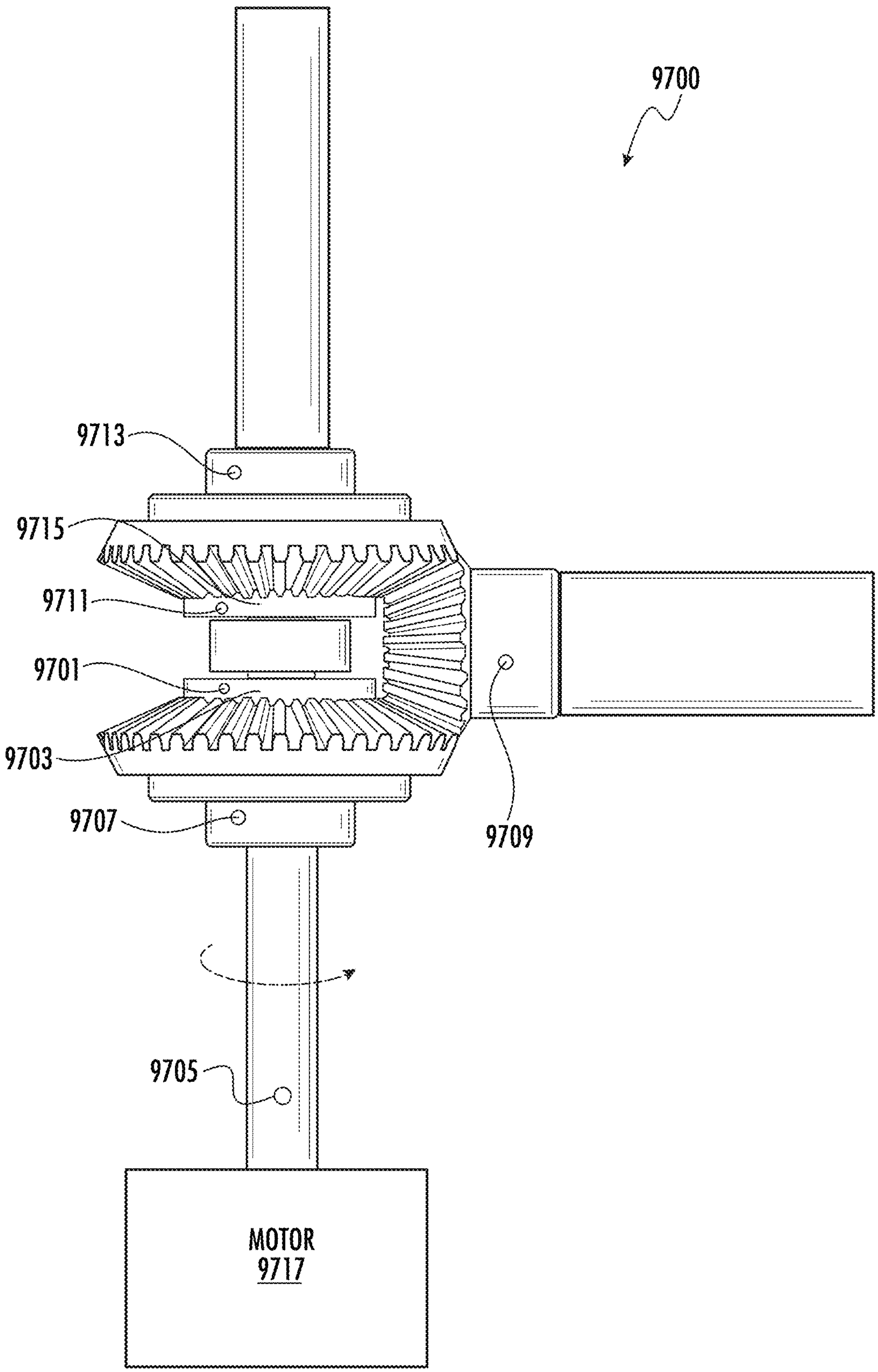

Referring now to FIG. 97, an example motor actuation device 9700 in accordance with some embodiments of the present disclosure is provided. In some embodiments, the motor actuation device 9700 may be implemented in a modular superstructure to reduce the number of motors required to actuate smart rack arms in different dimensions and/or directions.

In the example shown in FIG. 97, the example motor actuation device 9700 comprises a first clutch 9701. In some embodiments, the first clutch 9701 defines a first clutch bore and comprises a first clutch housing 9703.

In some embodiments, the first clutch bore refers to a central opening along the central axis of the first clutch 9701. In some embodiments, a rotating shaft 9705 is secured through the first clutch bore of the first clutch 9701. For example, the rotating shaft 9705 is connected to the output shaft of the motor 9717. In some embodiments, the motor 9717 causes a rotation of the output shaft, which in turn causes a rotation of the rotating shaft 9705. As described above, the first clutch 9701 is secured to the rotating shaft

9705 through the first clutch bore. As such, the first clutch 9701 rotates with the rotating shaft 9705.

In some embodiments, the example motor actuation device 9700 comprises a first bevel gear 9707. In some embodiments, the first bevel gear 9707 defines a first bevel gear bore that is a central opening along the central axis of the first bevel gear 9707. In some embodiments, the first bevel gear 9707 comprises cone shaped gears. For example, the first bevel gear 9707 may comprise teeth that are cut at an angle.

In some embodiments, the first clutch housing 9703 optionally engages with the first bevel gear bore. For example, the first clutch housing 9703 may comprise teeth that are disposed on the outer surface of the first clutch housing 9703. In such an example, the first bevel gear 9707 comprises teeth that are disposed on the inner surface of the first bevel gear bore. As such, when the teeth from the first clutch housing 9703 mesh with the teeth from the first bevel gear 9707, the first clutch housing 9703 engages with the first bevel gear bore of the first bevel gear 9707. When the teeth from the first clutch housing 9703 do not mesh with the teeth from the first bevel gear 9707, the first clutch housing 9703 does not engage with the first bevel gear bore of the first bevel gear 9707.

In some embodiments, the example motor actuation device 9700 comprises a second bevel gear 9709. In some embodiments, the second bevel gear 9709 is in an orthogonal arrangement with the first bevel gear 9707. For example, the first bevel gear 9707 may be positioned along an x axis, and the second bevel gear 9709 may be positioned along the Y axis. In some embodiments, the axes of the first bevel gear 9707 and the second bevel gear 9709 may intersect.

In some embodiments, the second bevel gear 9709 engages with the first bevel gear 9707. Similar to the first bevel gear 9707, the second bevel gear 9709 comprises cone shaped gears in some embodiments. For example, the first bevel gear 9707 may comprise teeth cut in an angle. In some embodiments, the teeth of the first bevel gear 9707 and the teeth of the second bevel gear 9709 mesh with one another.

As described above, the first clutch housing 9703 optionally engages with the first bevel gear bore. As the rotating shaft 9705 is secured through the first clutch bore of the first clutch 9701, when the first clutch housing 9703 engages with the first bevel gear bore, the first clutch 9701 transfers a rotating motion from the rotating shaft 9705 to the first bevel gear 9707. Because the teeth of the first bevel gear 9707 and the teeth of the second bevel gear 9709 mesh with one another, the first bevel gear 9707 causes the second bevel gear 9709 to rotate, when the first clutch housing 9703 engages with the first bevel gear bore. In some embodiments, when the first clutch housing 9703 disengages with the first bevel gear bore, the first clutch 9701 does not transfer a rotating motion from the rotating shaft 9705 to the first bevel gear 9707, and the first bevel gear 9707 does not cause the second bevel gear 9709 to rotate.

As described above, the first bevel gear 9707 may be in an orthogonal arrangement with the second bevel gear 9709. In some embodiments, the second bevel gear 9709 may be connected to a linear actuator that is coupled to a smart rack arm of a smart rack. As such, the example motor actuation device 9700 enables the actuation of a smart rack arm that operates in a different axis than the rotating shaft 9705.

In some embodiments, the example motor actuation device 9700 enables the actuation of multiple smart rack arms that are aligned with different axes. In the example shown in FIG. 97, the motor actuation device 9700 further comprises a second clutch 9711 and a third bevel gear 9713.

In some embodiments, the second clutch 9711 defines a second clutch bore and comprises a second clutch housing 9715.

In some embodiments, the second clutch bore refers to a central opening along its central axis of the second clutch 9711. In some embodiments, the rotating shaft 9705 is secured through the second clutch bore of the second clutch 9711. As described above, the rotating shaft 9705 is connected to the output shaft of the motor 9717. In some embodiments, the second clutch 9711 rotates with the rotating shaft 9705 as the second clutch 9711 is secured to the rotating shaft 9705 through the second clutch bore.

In some embodiments, the third bevel gear 9713 defines a third bevel gear bore that is a central opening along the central axis of the third bevel gear 9713. In some embodiments, the third bevel gear 9713 comprises cone shaped gears. For example, the third bevel gear 9713 may comprise teeth that are cut at an angle.

In some embodiments, the second clutch housing 9715 optionally engages with the third bevel gear bore of the third bevel gear 9713. For example, the second clutch housing 9715 may comprise teeth that are disposed on the outer surface of the second clutch housing 9715. In such an example, the third bevel gear 9713 comprises teeth that are disposed on the inner surface of the third bevel gear bore. As such, when the teeth from the second clutch housing 9715 mesh with the teeth from the third bevel gear 9713, the second clutch housing 9715 engages with the third bevel gear bore of the third bevel gear 9713. When the teeth from the second clutch housing 9715 do not mesh with the teeth from the third bevel gear 9713, the second clutch housing 9715 does not engage with the third bevel gear bore of the third bevel gear 9713.

In some embodiments, the third bevel gear 9713 is in alignment with the first bevel gear 9707. In some embodiments, both the first bevel gear 9707 and the third bevel gear 9713 are positioned along an x axis.

As described above, the second clutch housing 9715 optionally engages with third bevel gear bore. As the rotating shaft 9705 is secured through the second clutch bore of the second clutch 9711, when the second clutch housing 9715 engages with the third bevel gear bore of the third bevel gear 9713, the second clutch 9711 transfers a rotating motion from the rotating shaft 9705 to the third bevel gear 9713. In some embodiments, when the second clutch housing disengages with the third bevel gear bore, the second clutch 9711 does not transfer a rotating motion from the rotating shaft 9705 to the third bevel gear 9713.

In some embodiments, the third bevel gear 9713 may be connected to a linear actuator that is coupled to a smart rack arm of a smart rack. As such, the example motor actuation device 9700 enables the actuation of a smart rack arm that operates in the same axis as the rotating shaft 9705.

As illustrated in the various examples above, the example motor actuation device 9700 illustrated in FIG. 97 may enable the motor 9717 to actuate smart rack arms along different axes. For example, to actuate the smart rack arm that is connected to the second bevel gear 9709 (for example, along the Y axis), the example motor actuation device 9700 causes the first clutch housing to engage with the first bevel gear bore. As another example, to actuate the smart rack arm that is connected to the third bevel gear 9713 (for example, along the X axis), the example motor actuation device 9700 causes the second clutch housing engages with the third bevel gear bore. As another example, to actuate both the smart rack arm that is connected to the third bevel gear 9713 (for example, along the X axis) and the smart rack arm that is connected to the second bevel gear 9709 (for example, along the Y axis), the example motor actuation device 9700 causes the first clutch housing to engage with the first bevel gear bore and the second clutch housing engages with the third bevel gear bore.

Figure 98:
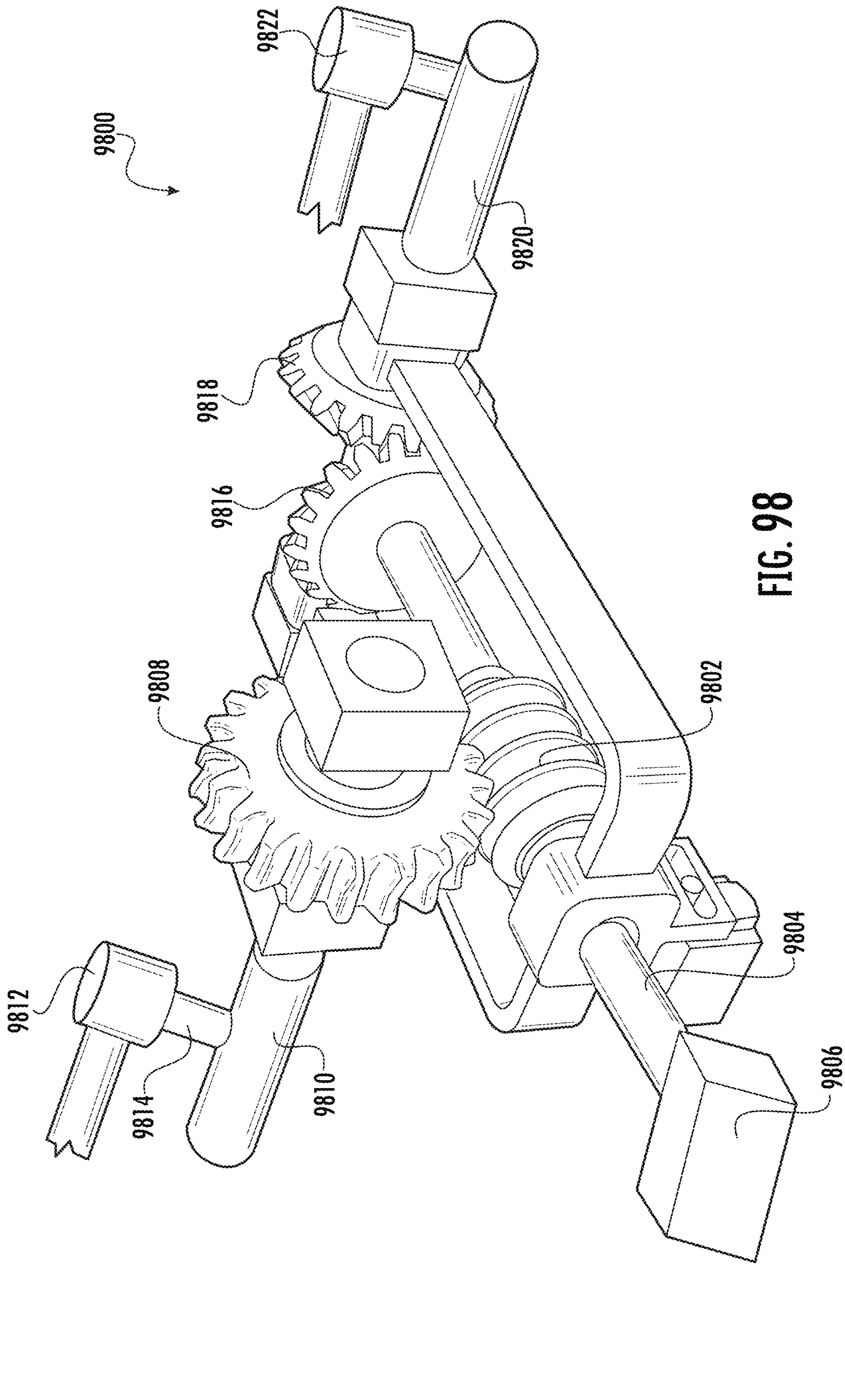

Referring now to FIG. 98, an example motor actuation device 9800 in accordance with some embodiments of the present disclosure is illustrated. In some embodiments, the motor actuation device 9800 may be implemented for a modular superstructure. In some embodiments, the motor actuation device 9800 comprises a first gear 9802, a second gear 9808, and a first solenoid 9812.

In some embodiments, the first gear 9802 is secured to a first gear shaft 9804. For example, the first gear 9802 defines a first gear bore that is a central opening along the central axis of the first gear 9802. In some embodiments, the first gear shaft 9804 is secured through the first gear bore of the first gear 9802.

In some embodiments, the first gear shaft 9804 is connected to a motor 9806. For example, the first gear shaft 9804 is connected to the output shaft of the motor 9806. As the output shaft of the motor 9806 rotates, the first gear shaft 9804 rotates, which in turn causes the first gear 9802 to rotate.

In some embodiments, the second gear 9808 is secured to a second gear shaft 9810. For example, the second gear 9808 defines a second gear bore that is a central opening along the central axis of the second gear 9808. In some embodiments, the second gear shaft 9810 is secured through the second gear bore of the second gear 9808.

In some embodiments, the first gear shaft 9804 is in an orthogonal arrangement with the second gear shaft 9810. For example, the first gear shaft 9804 may be positioned along an X axis, and the second gear shaft 9810 may be positioned along an Y axis.

In some embodiments, the example motor actuation device 9800 comprises a first solenoid 9812. In some embodiments, the first solenoid 9812 comprises a coil of wire, a housing and a first plunger 9814. In some embodiments, the first plunger 9814 is secured to the second gear shaft 9810.

In some embodiments, the first solenoid 9812 causes the second gear 9808 to optionally engage with the first gear 9802. For example, the first solenoid 9812 may cause the second gear 9808 to engage or disengage with the first gear 9802 based on whether a deactivation signal is received. If the deactivation signal is received, the first solenoid 9812 causes the second gear 9808 to disengage with the first gear 9802. If the deactivation signal is not received, the first solenoid 9812 causes the second gear 9808 to engage with the first gear 9802.

In some embodiments, the deactivation signal may be in the form of an electrical current in the coil of wire of the first solenoid 9812. In such an example, when the coil of wire of the first solenoid 9812 receives the electrical current, the coil of wire forms a magnetic field around the coil so that the first plunger 9814 moves up. When the coil of wire of the first solenoid 9812 does not receive the electrical current, gravity pulls the first plunger 9814 down.

In some embodiments, when the first solenoid 9812 receives a deactivation signal, the first plunger 9814 pulls up the second gear 9808, causing the second gear 9808 to disengage with the first gear 9802. In such an example, the first gear 9802 does not transfer a rotating motion from the motor 9806 to the second gear 9808.

In some embodiments, when the first solenoid 9812 does not receive the deactivation signal, the first plunger 9814 drops down, causing the second gear 9808 to engage with the first gear 9802 as the second gear 9808 is positioned above the first gear 9802. In such examples, the first gear 9802 transfers a rotating motion from the motor 9806 to the second gear 9808. As described above, the first gear shaft 9804 is in an orthogonal arrangement with the second gear shaft 9810. As such, the first solenoid 9812 enables the first gear shaft 9804 and the second gear shaft 9810 to transfer a rotation motion from the first axis along the first gear shaft 9804 to a rotation motion from the second axis along the second gear shaft 9810. In some embodiments, the second gear shaft 9810 is connected to a linear actuator that is coupled to a smart rack arm. As such, the first solenoid 9812 enables the motor 9806 to actuate smart rack arms along an axis that is different from the axis of the first gear shaft 9804.

In some embodiments, the example motor actuation device 9800 may enable the motor 9806 to actuate multiple smart rack arms along multiple different axes. For example, the example motor actuation device 9800 comprises a third gear 9816 that is secured to the first gear shaft 9804 in addition to the first gear 9802. In some embodiments, the first gear shaft 9804 causes the third gear 9816 to rotate.

In some embodiments, the example motor actuation device 9800 comprises a fourth gear 9818 that is secured to a fourth gear shaft 9820. In some embodiments, the example motor actuation device 9800 further comprises a second solenoid 9822. In some embodiments, the second solenoid 9822 comprises a second plunger that is secured to the fourth gear shaft 9820. In some embodiments, the second solenoid 9822 causes the fourth gear 9818 to optionally engage with the third gear 9816, similar to those described above in connection with the first solenoid 9812.

In some embodiments, the second gear shaft 9810 may be connected to a linear actuator that is connected to a smart rack arm, and the fourth gear shaft 9820 may be connected to a different linear actuator that is connected to a different smart rack arm. As such, the example motor actuation device 9800 shown in FIG. 98 may enable actuation of different smart rack arms along different axes.

Figure 99:
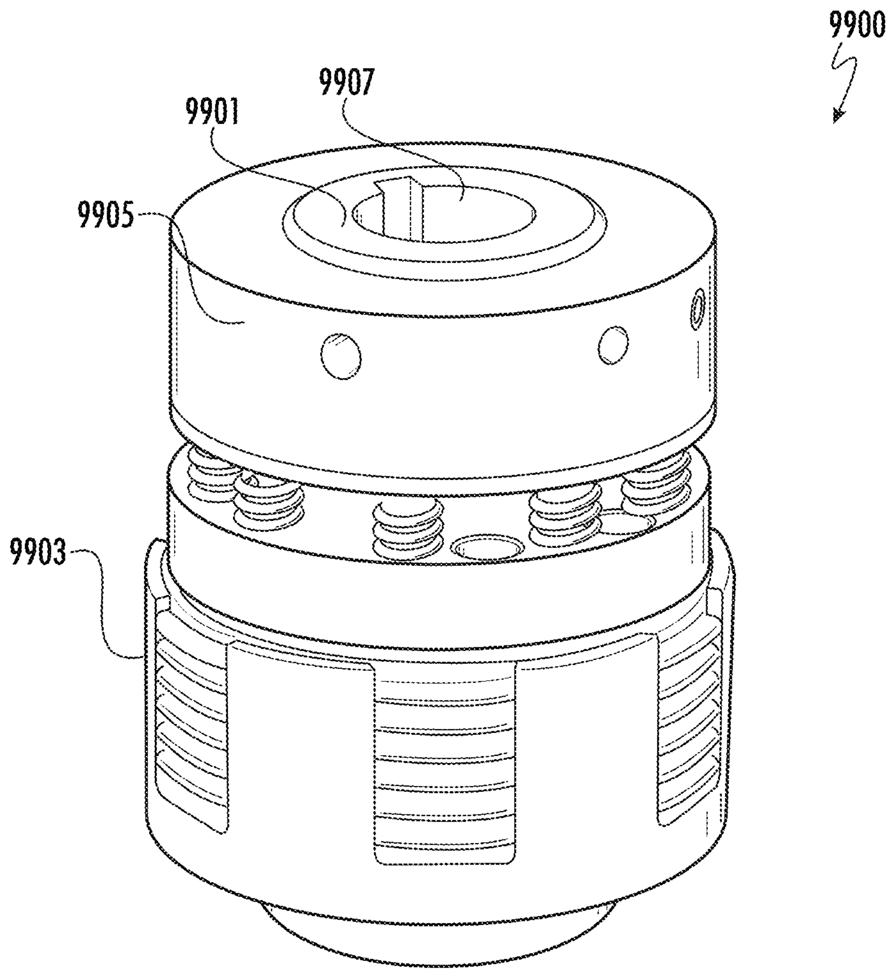

Referring now to FIG. 99, an example slip device 9900 in accordance with some embodiments of the present disclosure is provided.

As illustrated in the examples shown in FIG. 97 and FIG. 98, example motor actuation devices in accordance with some embodiments of the present disclosure comprises one or more clutches that enable one or more gears to optionally engage and disengage with a rotating shaft. In some embodiments, example motor actuation devices in accordance with some embodiments of the present disclosure may utilize one or more slip devices in addition to or in alternative of one or more clutches to enable one or more gears to optionally engage and disengage with a rotating shaft. Referring now to FIG. 99, an example slip device 9900 in accordance with some embodiments of the present disclosure is provided.

In the example shown in FIG. 99, the example slip device 9900 may be in the form of a slip clutch. For example, the example slip device 9900 may comprise a cartridge 9901 and a housing 9903.

In some embodiments, the cartridge 9901 defines a central bore 9907. In some embodiments, a rotating shaft may be secured to the example slip device 9900 through the central bore 9907. In some embodiments, the cartridge 9901 comprises an adjustment nut 9905. In such an example, by rotating the adjustment nut 9905, the housing 9903 may engage or disengage with the cartridge 9901. In some embodiments, the housing 9903 is secured to a central bore of a gear. As such, the example slip device 9900 enables the gear to optionally rotate along with the rotating shaft.

There are many technical challenges and difficulties associated with implementing modular superstructures to transport rectangular prisms between smart racks. For example, many systems rely on mechanical forces to cause movements of rectangular prisms between smart racks, which require motors to be implemented in the smart racks and increase maintenance needs associated with modular superstructures.

Various embodiments of the present disclosure overcome these technical challenges and difficulties, and provide various technical improvements and advantages. For example, various embodiments of the present disclosure provide rectangular prisms that comprise magnetic conductive rails, as well as smart racks that comprise outer frame rails. In some embodiments, the outer frame rails comprise electrometric coils that produce Lorentz forces when the electrometric coils are energized. In some embodiments, the outer frame rails are coupled with the magnetic conductive rails, such that the Lorentz forces propels the rectangular prisms between smart racks. As such, various embodiments of the present disclosure reduce the need for motors, which can lower maintenance needs associated with the modular superstructure.

Figure 100:
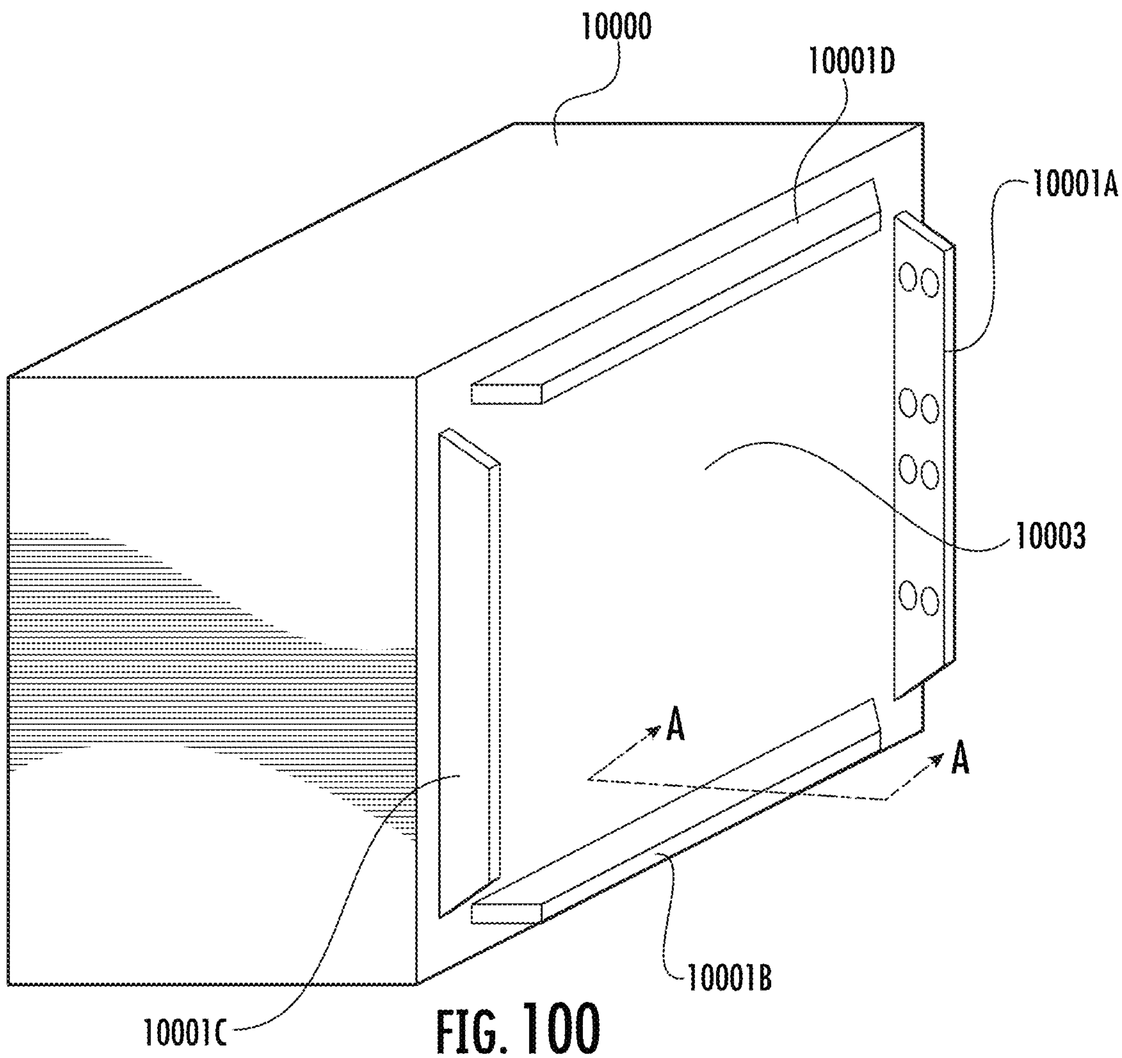

Referring now to FIG. 100, an example rectangular prism 10000 in accordance with some embodiments of the present disclosure is illustrated.

In some embodiments, the rectangular prism 10000 comprises at least one magnetic conductive rail. In some embodiments, each of the at least one magnetic conductive rail protrudes from a surface of the rectangular prism 10000 and is secured near an edge of the rectangular prism 10000.

In the example shown in FIG. 100, the example rectangular prism 10000 comprises a side surface 10003. In some embodiments, the rectangular prism 10000 comprises a right magnetic conductive rail 10001A, a left magnetic conductive rail 10001C, a top magnetic conductive rail 10001D, and a bottom magnetic conductive rail 10001B.

In some embodiments, the right magnetic conductive rail 10001A is secured near the right edge of the side surface 10003. In some embodiments, the left magnetic conductive rail 10001C is secured near the left edge of the side surface 10003. In some embodiments, the top magnetic conductive rail 10001D is secured near the top edge of the side surface 10003. In some embodiments, the bottom magnetic conductive rail 10001B is secured near the bottom edge of the side surface 10003.

While the description above provides an example rectangular prism that comprises four magnetic conductive rails disposed on four edges of a side surface of the example rectangular prism, it is noted that the scope of the present disclosure is not limited to the description above. In some examples, an example rectangular prism may comprise less than four magnetic conductive rails disposed on a surface of the example rectangular prism. For example, the example rectangular prism may not comprise a top magnetic conductive rail.

In some embodiments, each of the magnetic conductive rails comprises magnetically conducting materials. For example, an example magnetic conductive rail in accordance with some embodiments of the present disclosure may comprise materials such as, but not limited to, iron alloy, nickel alloy, and/or the like.

In some embodiments, each of the magnetic conductive rails of the example rectangular prism comprises one or more rectangular prism rollers. For example, the right magnetic conductive rail 10001A comprises rectangular prism rollers. In some embodiments, the rectangular prism rollers engage with the outer frame grooves provided by an outer frame rail secured to the smart rack as shown in, for example but not limited to, at least FIG. 101A and FIG. 101B.

Figure 101A:
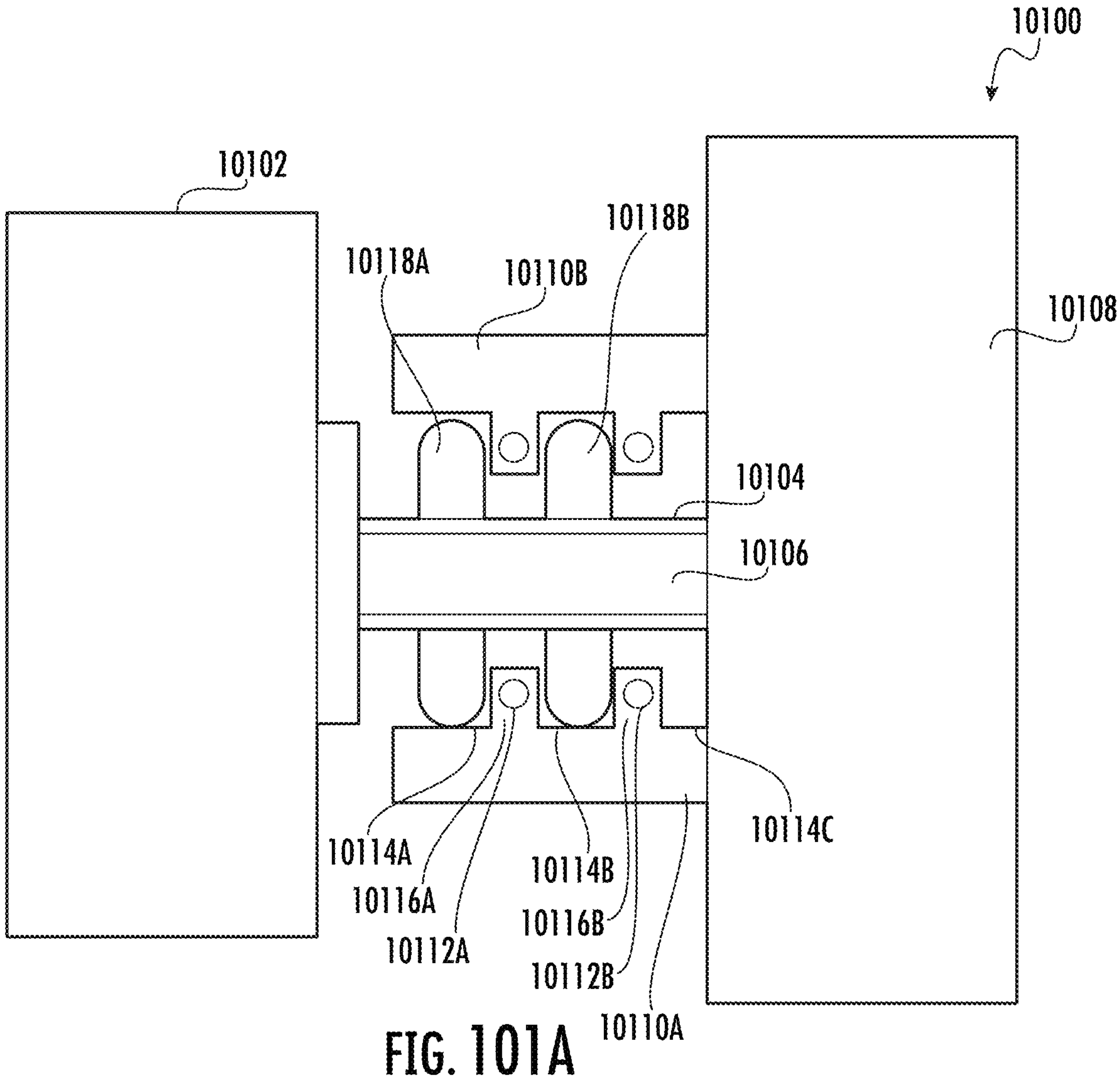

Referring now to FIG. 101A, an example cross-sectional view of an example modular superstructure 10100 in accordance with some embodiments of the present disclosure is illustrated. In particular, the example cross-sectional view illustrates the example rectangular prism 10000 shown in FIG. 100 traveling in an example modular superstructure and viewed from the cutline A-A' as shown in FIG. 100.

In some embodiments, the modular superstructure 10100 comprises a rectangular prism 10102. Similar to the example described above in connection with FIG. 100, the rectangular prism 10102 comprises at least one magnetic conductive rail 10104. In some embodiments, the at least one magnetic conductive rail 10104 is secured to an outer surface of the rectangular prism 10102. For example, the magnetic conductive rail 10104 may protrude from the outer surface of the rectangular prism 10102. In some embodiments, the magnetic conductive rail 10104 may be in a perpendicular arrangement with the outer surface of the rectangular prism 10102.

In some embodiments, the at least one magnetic conductive rail 10104 comprises magnetically conducting materials. For example, an example magnetic conductive rail in accordance with some embodiments of the present disclosure may comprise materials such as, but not limited to, iron alloy, nickel alloy, and/or the like.

In some embodiments, the at least one magnetic core 10106 is housed within the at least one magnetic conductive rail 10104. In some embodiments, the at least one magnetic core 10106 comprises a magnet that produces a magnetic field.

In some embodiments, the rectangular prism 10102 may comprise high impact composite materials (such as, but not limited to, random fiber injection molded materials) which can minimize the disruption with the magnetic circuits (details of which are described herein).

Referring back to FIG. 101A, the modular superstructure 10100 comprises a smart rack 10108. In some embodiments, the smart rack 10108 comprises one or more outer frame rails (such as, but not limited to, the outer frame rail 10110A and the outer frame rail 10110B illustrated in FIG. 101A). In some embodiments, each of the one or more outer frame rails is secured to a smart rack frame of the smart rack 10108 and protrudes from the smart rack frame. For example, each of the one or more outer frame rails is in a perpendicular arrangement with the smart rack frame of the smart rack 10108.

While the description above provides an example smart rack comprising two outer frame rails, it is noted that the scope of the present disclosure is not limited to the description above. In some examples, an example smart rack may comprise only one outer frame rail (for example, only the outer frame rail 10110A that is secured to the bottom of the smart rack 10108).

In some embodiments, each outer frame rail comprises a plurality of electrometric coils. In some embodiments, each electrometric coil comprises materials such as, but not limited to, iron, copper, and/or the like. In some embodiments, the electrometric coils are embedded in the outer frame rail. In the example shown in FIG. 101A, the outer frame rail comprises a plurality of electrometric coils including, but are not limited to, the electrometric coil 10112A and the electrometric coil 10112B. In some embodiments, the one or more outer frame rails (such as, but not limited to, the outer frame rail 10110A and the outer frame rail 10110B illustrated in FIG. 101A) may comprise high impact composite materials (such as, but not limited to, random fiber injection molded materials) which can minimize the disruption with the magnetic circuits (details of which are described herein).

In some embodiments, the outer frame rail 10110 comprises a plurality of outer frame protrusions. In such examples, the outer frame protrusions protrude from an outer surface of the outer frame rail 10110. In the example shown in FIG. 101A, the plurality of outer frame protrusions comprises the outer frame protrusion 10116A and the outer frame protrusion 10116B.

In some embodiments, the plurality of outer frame protrusions defines a plurality of outer frame grooves. In some embodiments, some of the plurality of outer frame grooves are positioned between two of the plurality of outer frame protrusions. In the example shown in FIG. 101A, the plurality of outer frame grooves comprises an outer frame groove 10114A, an outer frame groove 10114B, and an outer frame groove 10114C. For example, the outer frame groove 10114B is positioned between the outer frame protrusion 10116A and the outer frame protrusion 10116B.

In some embodiments, the plurality of electrometric coils of the outer frame rail 10110 is disposed in the plurality of outer frame protrusions. In the example shown in FIG. 101A, the electrometric coil 10112A is disposed in the outer frame protrusion 10116A, and the electrometric coil 10112B is disposed in the outer frame protrusion 10116B.

As described above, the rectangular prism 10102 comprises at least one magnetic conductive rail 10104. In some embodiments, the at least one magnetic conductive rail 10104 comprises a plurality of rectangular prism rollers.

In some embodiments, each of the plurality of rectangular prism rollers is secured to the at least one magnetic conductive rail 10104. For example, the at least one magnetic conductive rail 10104 may be secured to the central openings defined by the central rings of the rectangular prism rollers, such that the rectangular prism rollers may rotate around the at least one magnetic conductive rail 10104. In the example shown in FIG. 101A, the plurality of rectangular prism rollers comprises a rectangular prism roller 10118A and a rectangular prism roller 10118B. In some embodiments, each of the plurality of rectangular prism rollers of the at least one magnetic conductive rail 10104 mates with one of the plurality of outer frame grooves of an outer frame rail (such as, but not limited to, the outer frame rail 10110A and/or the outer frame rail 10110B). In some embodiments, when a rectangular prism roller mates with an outer frame groove, the rectangular prism roller rotates within the outer frame groove. As such, the plurality of rectangular prism rollers in accordance with some embodiments of the present disclosure can support the rectangular prism and allow for easy movement. In some embodiments, the plurality of rectangular prism rollers are spaced apart such that there is no binding during the transition of the rectangular prism from one smart rack to another smart rack.

In the example shown in FIG. 101A, the rectangular prism roller 10118A mates with the outer frame groove 10114A and rotates within the outer frame groove 10114A. The rectangular prism roller 10118B mates with the outer frame groove 10114B and rotates within the outer frame groove 10114B.

In some embodiments, an outer frame rail is positioned above the one or more the rectangular prism rollers, such that air gaps are formed between the one or more the rectangular prism rollers and the outer frame groove of the outer frame rail to reduce friction. In the example shown in FIG. 101A, the outer frame rail 10110B is positioned above the rectangular prism roller 10118A and the rectangular prism roller 10118B, such that air gaps are formed between the outer frame rail 10110B and the rectangular prism roller 10118A/the rectangular prism roller 10118B.

As described above and illustrated in FIG. 101A, the magnetic conductive rail 10104 comprises magnetically conducting materials that cover at least one magnetic core 10106, and the outer frame rail comprises a plurality of embedded electrometric coil. In some embodiments, when the plurality of rectangular prism rollers of the magnetic conductive rail 10104 mates with the plurality of outer frame grooves of the outer frame rail (for example, the outer frame rail 10110A and/or the outer frame rail 10110B), the magnetic conductive rail 10104 is positioned approximate to the plurality of embedded electrometric coils in the outer frame rail. In some embodiments, the plurality of electrometric coils receives one or more activation signals (for example but not limited to, in the form of sinusoidal alternating currents), causing the plurality of embedded electrometric coils function as electromagnets and produce magnetic fields. In some embodiments, the plurality of embedded electrometric coils produces alternating magnetic fields along the longitudinal direction of the outer frame rail. Because the magnetic conductive rail 10104 comprises a magnetic core, the plurality of electrometric coils creates a Lorentz force that causes the magnetic conductive rail 10104 (along with the rectangular prism 10102) to move along the longitudinal direction of the outer frame rail.

Figure 101B:
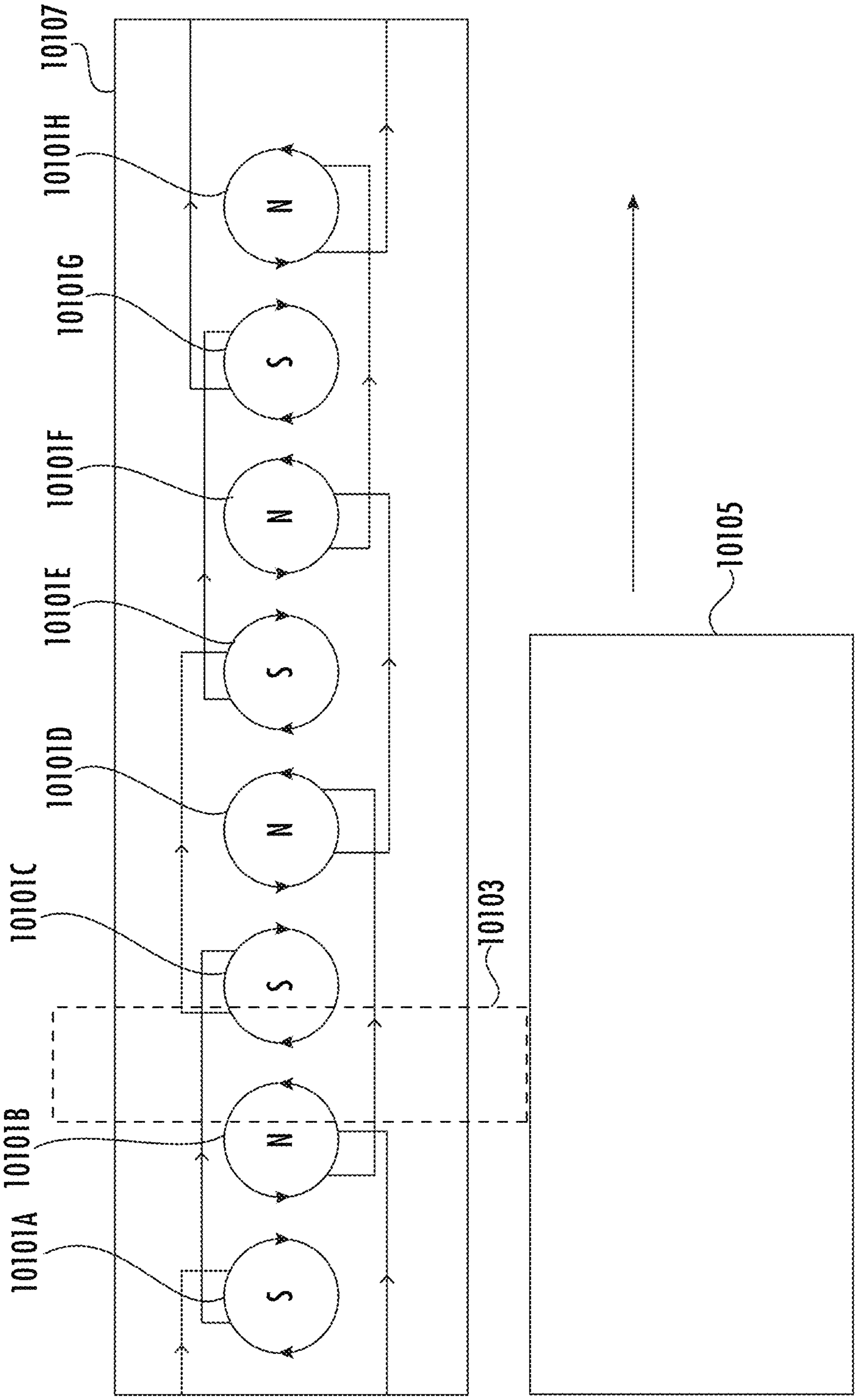

Referring now to FIG. 101B, an example layout of example electrometric coils embedded in an outer frame protrusion 10107 of an example outer frame rail. In particular, FIG. 101B provides an example top view that illustrates an example engagement between an example magnetic conductive rail 10103 (that is coupled to an example rectangular prism) and the outer frame protrusion 10107 of the example outer frame rail along the longitudinal direction of the outer frame rail.

In the example shown in FIG. 101B, the outer frame protrusion 10107 comprise an electrometric coil 10101A, an electrometric coil 10101B, an electrometric coil 10101C, an electrometric coil 10101D, an electrometric coil 10101E, an electrometric coil 10101F, an electrometric coil 10101G and an electrometric coil 10101H. In some embodiments, the electrometric coil 10101A, the electrometric coil 10101B, the electrometric coil 10101C, the electrometric coil 10101D, the electrometric coil 10101E, the electrometric coil 10101F, the electrometric coil 10101G and the electrometric coil 10101H are distributed along the longitudinal direction of the outer frame protrusion 10107.

In some embodiments, the plurality of electrometric coils receives a plurality of activation signals. For example, each of the plurality of electrometric coils may receive one or more sinusoidal current signals. In the example shown in FIG. 101B, the directions of the sinusoidal current signals received by the electrometric coil 10101A, the electrometric coil 10101B, the electrometric coil 10101C, the electrometric coil 10101D, the electrometric coil 10101E, the electrometric coil 10101F, and the electrometric coil 10101G are illustrated.

In some embodiments, the electrometric coil 10101A, the electrometric coil 10101C, the electrometric coil 10101E, and the electrometric coil 10101G are electronically coupled to one another and receive sinusoidal current signals that flow clockwise in each respective electrometric coil when viewed from the top of the outer frame protrusion 10107. In such examples, the electrometric coil 10101A, the electrometric coil 10101C, the electrometric coil 10101E, and the electrometric coil 10101G each creates a magnetic field, where the north pole of the magnetic field points to the example magnetic conductive rail 10103.

In some embodiments, the electrometric coil 10101B, the electrometric coil 10101D, the electrometric coil 10101F, and the electrometric coil 10101H are electronically coupled to one another and receive sinusoidal current signals that flow counterclockwise in each respective electrometric coil when viewed from the top of the outer frame protrusion 10107. In such examples, the electrometric coil 10101B, the electrometric coil 10101D, the electrometric coil 10101F, and the electrometric coil 10101H each creates a magnetic field, where the south pole of the magnetic field points to the example magnetic conductive rail 10103.

In the example shown in FIG. 101B, the electrometric coil 10101B is positioned between the electrometric coil 10101A and the electrometric coil 10101C, the electrometric coil 10101D is positioned between the electrometric coil 10101C and the electrometric coil 10101E, the electrometric coil 10101F is positioned between the electrometric coil 10101E and the electrometric coil 10101G, and the electrometric coil 10101G is positioned between the electrometric coil 10101F and the electrometric coil 10101H. As such, the electrometric coil 10101A, the electrometric coil 10101B, the electrometric coil 10101C, the electrometric coil 10101D, the electrometric coil 10101E, the electrometric coil 10101F, and the electrometric coil 10101G produces alternating magnetic fields along the longitudinal direction of the outer frame protrusion 10107.

Similar to those described above, the example magnetic conductive rail 10103 comprises at least one magnetic core. In some embodiments, the magnetic core produces a magnetic field where the north pole faces the outer frame protrusion 10107. In such an example, the magnetic fields produced by the electrometric coil 10101B, the electrometric coil 10101D, the electrometric coil 10101F, and the electrometric coil 10101H push the example magnetic conductive rail 10103 away, while the electrometric coil 10101A, the electrometric coil 10101C, the electrometric coil 10101E, and the electrometric coil 10101G pulls the example magnetic conductive rail 10103 in. Because the plurality of electrometric coils are distributed in an alternating patterns, the push and pull motions from the plurality of electrometric coils produce a linear motion for the at least one magnetic conductive rail 10103, such that the at least one magnetic conductive rail 10103 travels along the longitudinal direction of the outer frame protrusion 10107. Because the at least one magnetic conductive rail 10103 is secured to the rectangular prism 10105, the rectangular prism 10105 travels with the at least one magnetic conductive rail 10103. As such, the plurality of electrometric coils (including, but not limited to, the electrometric coil 10101A, the electrometric coil 10101B, the electrometric coil 10101C, the electrometric coil 10101D, the electrometric coil 10101E, the electrometric coil 10101F, and the electrometric coil 10101G) and the at least one magnetic conductive rail 10103 cause a propelling motion of the rectangular prism 10105 when the plurality of electrometric coils receives a plurality of activation signals.

While the description above provides an example layout of example electrometric coils, it is noted that the scope of the present disclosure is not limited to the description above. In some examples, an example outer frame rail may comprise one or more additional and/or alternative electrometric coils that are positioned differently than those shown in FIG. 101B.

As such, the examples shown in FIG. 100, FIG. 101A, and FIG. 101B provides an example electromechanical linear actuator propulsion system that enables propulsions of rectangular prisms across smart racks. For example, each smart rack may comprise one or more outer frame rails, and each rectangular prism may comprise one or more magnetic conductive rails. To move a rectangular prism from a first smart rack to a second smart rack, various embodiments of the present disclosure may selectively activate the outer frame rails secured to the first smart rack and to the second smart rack, cause the electrometric coils in the outer frame rails to exert Lorentz forces on the rectangular prism and create propulsions of the rectangular prism. As such, various embodiments of the present disclosure reduce the need for mechanical motors in modular superstructures and the complexity in maintaining the modular superstructure.

Figure 102:
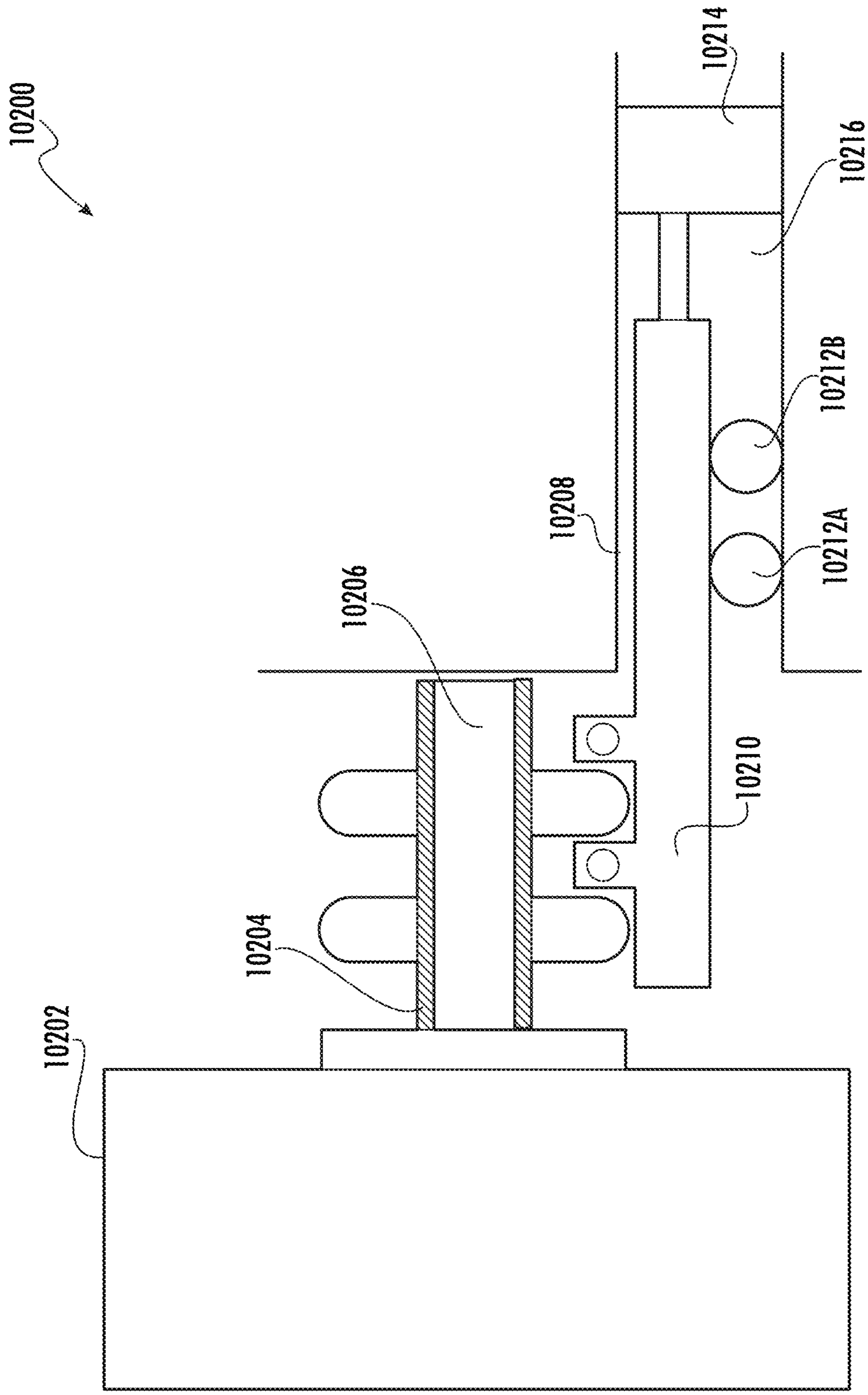

Referring now to FIG. 102, an example cross-sectional view of an example modular superstructure 10200 in accordance with some embodiments of the present disclosure is illustrated.

Similar to the example shown in FIG. 101A, the modular superstructure 10200 comprises a rectangular prism 10202. Similar to the example described above in connection with FIG. 100 and FIG. 101A, the rectangular prism 10202 comprising at least one magnetic conductive rail 10204. In some embodiments, the at least one magnetic conductive rail 10204 is secured to an outer surface of the rectangular prism 10202. For example, the magnetic conductive rail 10204 may protrude from the outer surface of the rectangular prism 10202. In some embodiments, the magnetic conductive rail 10204 may be in a perpendicular arrangement with the outer surface of the rectangular prism 10202.

Similar to the example described above in connection with FIG. 101A, the at least one magnetic conductive rail 10204 comprises magnetically conducting materials. For example, an example magnetic conductive rail in accordance with some embodiments of the present disclosure may comprise materials such as, but not limited to, iron alloy, nickel alloy, and/or the like.

In some embodiments, the at least one magnetic core 10206 is housed within the at least one magnetic conductive rail 10204. In some embodiments, the at least one magnetic core 10206 comprises a magnet that produces a magnetic field.

Referring back to FIG. 102, the modular superstructure 10200 comprises a smart rack 10208. In some embodiments, the smart rack 10208 comprises one or more outer frame rails (such as, but not limited to, the outer frame rail 10210). In some embodiments, each of the one or more outer frame rails is retractable into the smart rack 10208.

For example, as shown in FIG. 102, the outer frame rail 10210 comprises a plurality of outer frame rollers (such as, but not limited to, the outer frame roller 10212A and the outer frame roller 10212B) that are disposed on a bottom surface of the outer frame rail 10210.

In some embodiments, the outer frame rail 10210 is connected to a linear actuator 10214. In some embodiments, the linear actuator 10214 provides push and pull motions on the outer frame rail 10210. For example, the linear actuator 10214 may comprise a solenoid. Additionally, or alternatively, the linear actuator 10214 may comprise one or more additional or alternative components that cause push and pull motions on the outer frame rail 10210.

In some embodiments, the linear actuator 10214 is secured to the smart rack 10208. For example, the smart rack 10208 may define an outer frame rail storage cave 10216 between smart rack plates of the smart rack 10208. In such an example, the linear actuator 10214 is secured in the outer frame rail storage cave 10216. When the linear actuator 10214 exerts a pull motion on the outer frame rail 10210, the outer frame rail 10210 is retracted into the outer frame rail storage cave 10216. In such an example, the outer frame rail 10210 does not block the passageway of the rectangular prism between smart racks. When the linear actuator 10214 exerts a push motion on the outer frame rail 10210, the outer frame rail 10210 extends out of the outer frame rail storage cave 10216. In such an example, the outer frame rail 10210 may engage with the magnetic conductive rail of the rectangular prism, such that the magnetic conductive rail may cause the rectangular prism to travel along a linear motion.

As such, the modular superstructure 10200 shown in FIG. 102 illustrates an example where the outer frame rail 10210 may be extended or retracted as needed, providing flexibility in enabling rectangular prisms to move between smart racks.

There are many technical challenges and difficulties associated with warehouses. For example, many warehouses provide a fixed amount of storage space that cannot be expanded. In such an example, a user (such as, but not limited to, a customer) may have to rent out an entire warehouse with a fixed amount of storage space. If the storage needs of the user changes, such a warehouse may not be able to accommodate the user's storage needs.

Various embodiments of the present disclosure overcome these technical challenges and difficulties, and provide various technical improvements and advantages.

For example, warehouses that implement modular superstructures and/or smart racks in accordance with some embodiments of the present disclosure provide the capability to fractionalize the storage space between multiple users. For example, the space provided by rectangular prisms that are in the superstructures and/or smart racks can be assigned to one or more users as needed (for example, through renting and/or leasing based on the storage space of rectangular prisms). As such, warehouses that implement modular superstructures and/or smart racks allow users (such as customers) to rent space and dynamically increase their footprint as needed. In some embodiments, a user's items can be distributed throughout the modular superstructures and/or smart racks, and be retrieved when needed.

As illustrated in the examples above, such an example storage architecture does not require fixed space per user, and provides few or zero wasted space. In such an example, each user is effectively provided with a "micro-warehouse" that can dynamically grow as needed. As such, an example smart-rack matrix warehouse architecture in accordance with some embodiments of the present disclosure may provide technical benefits and advantages such as, but not limited to, providing uses with dynamic expansion/reduction of their storage footprint, reducing wasted oxygen (and/or wasted/unused storage space), and allowing user inventory to be distributed throughout the modular superstructures and/or smart racks for better space utilization.

Figure 103:
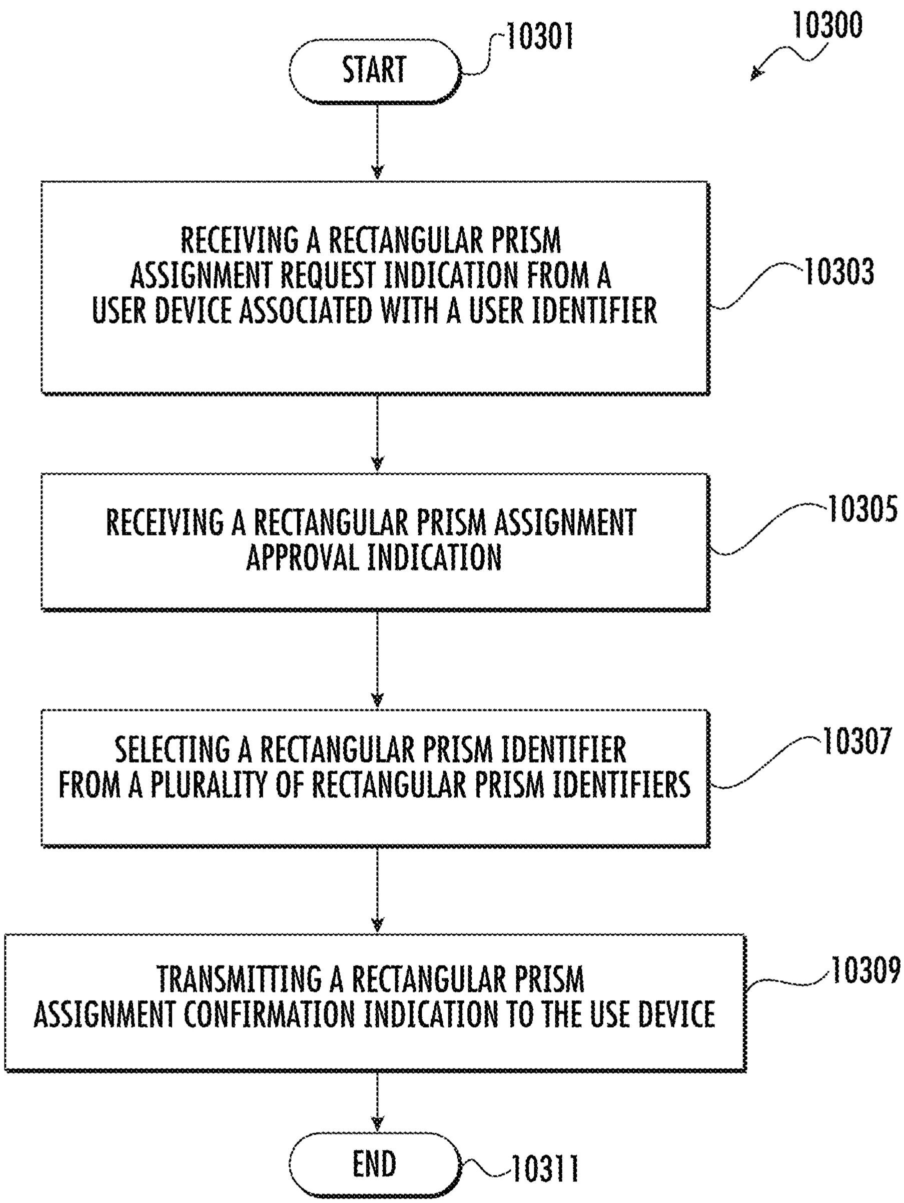

Referring now to FIG. 103, an example method 10300 in accordance with some embodiments of the present disclosure is illustrated. In particular, FIG. 103 illustrates an example method that assigns a rectangular prism with a user identifier in accordance with some embodiments of the present disclosure.

It is noted that each block of the flowchart, and combinations of blocks in the flowchart, may be implemented by various means such as hardware, firmware, circuitry and/or other devices associated with execution of software including one or more computer program instructions. For example, one or more of the procedures may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

In the example shown in FIG. 103, the example method 10300 starts at step/operation 10301. In some embodiments, subsequent to step/operation 10301, the example method 10300 proceeds to step/operation 10303. At step/operation 10303, the example method 10300 comprises receiving a rectangular prism assignment request indication from a user device associated with a user identifier.

For example, a user who needs storage space may transmit a rectangular prism assignment request indication to a modular superstructure server by using a user device. In such an example, the rectangular prism assignment request indication may be in the form of an electronic message indicating a user's request for storage space in the modular superstructure. In some embodiments, the user device is associated with a user identifier corresponding to the user.

In some embodiments, the rectangular prism assignment request indication may comprise requested storage space metadata. In such examples, the requested storage space metadata indicates the amount of storage space that the user needs.

Referring back to FIG. 103, subsequent to step/operation 10303, the example method 10300 proceeds to step/operation 10305. At step/operation 10305, the example method 10300 comprises receiving a rectangular prism assignment approval indication.

In some embodiments, the rectangular prism assignment approval indication may be received from an operator device associated with an operator identifier. In such examples, the operator identifier may identify an operator of the modular superstructure (for example, an employee of the entity that owns the modular superstructure).

In some embodiments, the rectangular prism assignment approval indication may be transmitted from the operator device after the user completes the applicable purchasing or leasing procedures with the operator.

Referring back to FIG. 103, subsequent to step/operation 10305, the example method 10300 proceeds to step/operation 10307. At step/operation 10307, the example method 10300 comprises selecting a rectangular prism identifier from a plurality of rectangular prism identifiers.

In some embodiments, the rectangular prism identifier may be selected by a modular superstructure server. For example, the modular superstructure server may be in data communications with a database that stores modular superstructure fractionalization plan data objects. In such an example, the modular superstructure fractionalization plan data objects indicate rectangular prism identifiers associated with rectangular prisms that can provide available storage space.

In some embodiments, the modular superstructure server selects the rectangular prism identifier based at least in part on the storage space metadata from the rectangular prism assignment request indication. As described above, the storage space metadata indicates the requested storage space that is needed for the user. In some embodiments, the modular superstructure fractionalization plan data objects indicate the amount of storage space of each rectangular prism of each rectangular prism identifier. In such an example, the modular superstructure server selects the rectangular prism identifier that is associated with a rectangular prism having storage space more than the requested storage space in the storage space metadata. As such, various embodiments of the present disclosure may dynamically assign storage space offered by the modular superstructure based on the user needs.

Referring back to FIG. 103, subsequent to step/operation 10307, the example method 10300 proceeds to step/operation 10309. At step/operation 10309, the example method 10300 comprises transmitting a rectangular prism assignment confirmation indication to the use device.

In some embodiments, the rectangular prism assignment confirmation indication indicates to the user that one or more rectangular prisms have been assigned to the user. In some embodiments, the modular superstructure server further associates the one or more rectangular prism identifiers with the user identifier. For example, the modular superstructure server may update the modular superstructure fractionalization plan data objects to indicate one or more associations between the user identifier and the one or more rectangular prism identifiers.

Referring back to FIG. 103, subsequent to step/operation 10309, the example method 10300 proceeds to step/operation 10311 and ends.

Figure 104:
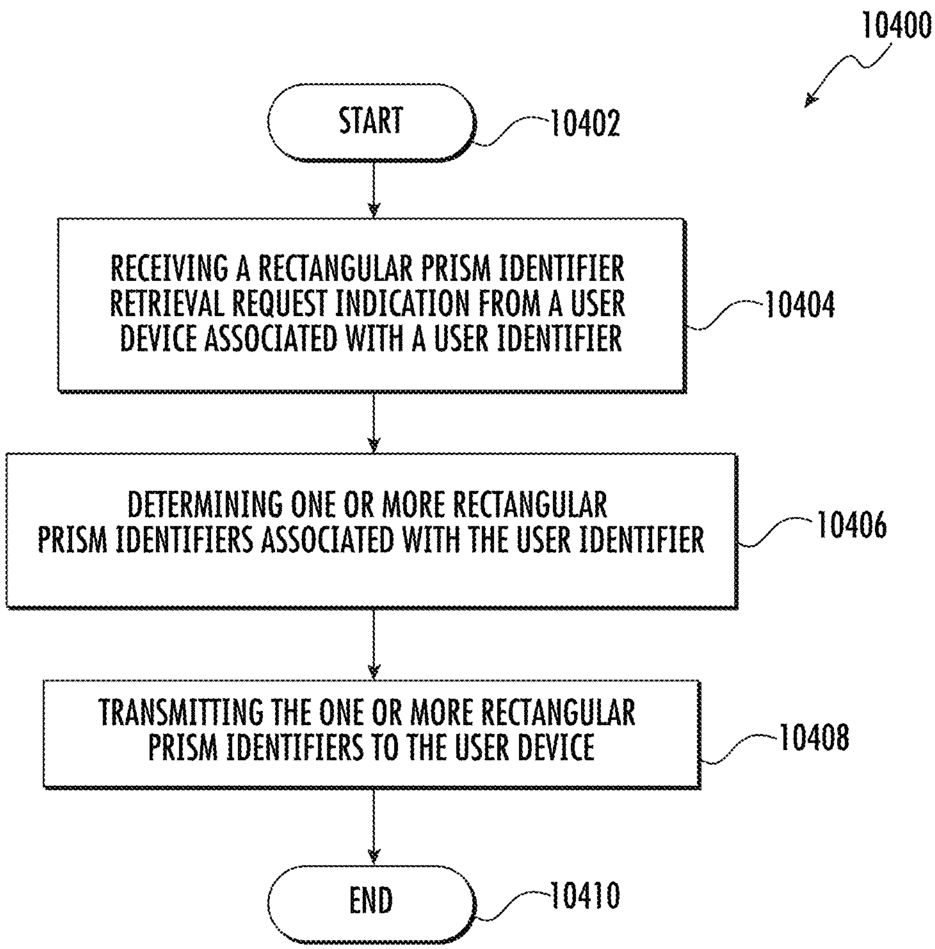

Referring now to FIG. 104, an example method 10400 in accordance with some embodiments of the present disclosure is illustrated. In particular, FIG. 104 illustrates an example method that determines a rectangular prism identifier that is associated with a user identifier in accordance with some embodiments of the present disclosure.

It is noted that each block of the flowchart, and combinations of blocks in the flowchart, may be implemented by various means such as hardware, firmware, circuitry and/or other devices associated with execution of software including one or more computer program instructions. For example, one or more of the procedures may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

In the example shown in FIG. 104, the example method 10400 starts at step/operation 10402. In some embodiments, subsequent to step/operation 10402, the example method 10400 proceeds to step/operation 10404. At step/operation 10404, the example method 10400 comprises receiving a rectangular prism identifier retrieval request indication from a user device associated with a user identifier.

In some embodiments, the rectangular prism retrieval request indicates a request from a user to determine the rectangular prism(s) that have been assigned to the user by the modular superstructure server.

Referring back to FIG. 104, subsequent to step/operation 10404, the example method 10400 proceeds to step/operation 10406. At step/operation 10406, the example method 10400 comprises determining one or more rectangular prism identifiers associated with the user identifier.

In some embodiments, the modular superstructure server determines the one or more rectangular prism identifiers associated with the user identifier based at least in part on modular superstructure fractionalization plan data objects.

For example, the modular superstructure fractionalization plan data objects may indicate associations between different user identifiers and different rectangular prism identifiers. In some embodiments, the modular superstructure server may determine the modular superstructure fractionalization plan data objects that are associated with the user identifier, and may determine one or more rectangular prism identifiers associated with the user identifier based on the modular superstructure fractionalization plan data objects.

Referring back to FIG. 104, subsequent to step/operation 10406, the example method 10400 proceeds to step/operation 10408. At step/operation 10408, the example method 10300 comprises transmitting the one or more rectangular prism identifiers to the user device.

Referring back to FIG. 104, subsequent to step/operation 10408, the example method 10400 proceeds to step/operation 10410 and ends.

FIG. 105A and FIG. 105B illustrate an example scanning enabled smart rack 10500 in accordance with some embodiments of the present disclosure. The scanning enabled smart rack 10500 can include a rack frame with a plurality of rack beams. The plurality of rack beams can include one or more bottom rack beams 10504 and/or one or more top rack beams 10506. In some embodiments, the scanning enabled smart rack 10500 can include at least one scanning sensor 10508. The at least one scanning sensor 10508 can be secured to at least one of the plurality of rack beams. As an example, the at least one scanning sensor 10508 can be secured to at least one of the one or more top rack beams. As shown by FIG. 105B, in some embodiments, the at least one scanning sensor can be secured on an inner edge 10512 of at least one of the plurality of rack beams.

The at least one scanning sensor 10508 can include an optical scanner such as, for example, one or more pen-type readers, laser scanners, charge-coupled devices, camera-based readers, and/or the like. For example, the scanning sensor can include a barcode scanner and/or a stock keeping unit ("SKU") scanner that includes a light source (e.g., infrared, light emitting diode (LED), etc.), a lens, and/or a light sensor configured to convert optical impulses to electrical signals which can be converted into a computer-readable format.

The at least one scanning sensor 10508 can include a field of view 10510 in which the at least one scanning sensor 10508 can identify an item by scanning an identifier (e.g., a barcode, quick response code, etc.) associated with the item. In some embodiments, at least a portion of an interior 10514 of the scanning enabled smart rack 10500 is within the field of view 10510 of the at least one scanning sensor 10508. In this manner, an item within a rectangular prism being transported by the scanning enabled smart rack can be scanned by the at least one scanning sensor 10508. In some embodiments, the at least one scanning sensor 10508 can be configured to automatically scan the interior 10514 of the scanning enabled smart rack 10500 to detect the presence of an item. In this manner, items being transported by the scanning enabled smart rack 10500 can be identified and tracked at one or more locations of a modular superstructure.

FIG. 106 illustrates an example modular superstructure 10600 including one or more scanner enabled smart racks in accordance with some embodiments of the present disclosure. A scanning enabled smart rack can be one of a plurality of smart racks within the modular superstructure 10600 for transporting a rectangular prism. The scanning enabled smart rack can be placed within a proximity to at least one of an ingress point 10602 and/or an egress point 10604 of the modular superstructure 10600. In addition, or alternatively, the modular superstructure 10600 can include a plurality of scanning enabled smart racks placed at one or more locations within the modular superstructure 10600. In some embodiments, each of the plurality of smart racks of the modular superstructure 10600 can include at least one scanner sensor such that an item location can be automatically tracked and verified as it is transported through the modular superstructure 10600.

FIG. 107 illustrates a process 10700 for identifying an item within a scanning enabled tote in accordance with some embodiments of the present disclosure. Specifically, FIG. 107 depicts an example process 10700. The process 10700 is performable by any number of computing device(s) as described herein, for example embodiment in hardware, software, firmware, and/or any combination thereof. In some embodiments, the at least one scanning sensor 10508 includes the various circuitry as means for performing each operation of the process 10700.

At operation 10702, the process 10700 includes detecting whether an item is present within the interior of the smart rack. At operation 10704, the process 10700 includes responsive to detecting that the item is present: (i) generating item data for the item within the interior of the smart rack, and (ii) providing item data to a computing device. At operation 10706, the process 10700 includes responsive to detecting that the item is not present: providing a notification to the computing device. The item, for example, can be within a rectangular prism being transported by the scanning enabled smart rack. The item data can include a unique identifier for the item and/or any other item attribute for the item. The notification can be indicative of at least one of an (i) an empty scanning enabled smart rack, (ii) an incorrect orientation of an item, and/or (iii) one or more corrections to correct an incorrect orientation of an item.

During operation and use of the example superstructures described throughout this disclosure, it may become necessary to move one or more of the example rectangular prisms (also known as totes) disposed within these example superstructures. One method of movement may be one or more inclined planes that can be used to provide mechanical guidance for moving totes between the smart racks of an example superstructure. The inclined planes may have converging angles located at the boundaries of individual smart racks. An example tote may have one or more guidance subassemblies disposed on one or more of the upper rails of the example smart rack. Rollers may be disposed on the one or more guidance subassemblies to aid in moving a tote among the example superstructures.

Referring to FIG. 108, according to some embodiments, a smart rack 10800 with example guidance subassemblies 10802A, 10802B, 10802C, 10802D, 10802E, 10802F, 10802G, 10802H. In some embodiments, the guidance subassemblies 10802A-10802H may be disposed on the upper rails 10804A, 10804B, 10804C, 10804D. In some embodiments, the smart rack 10800 may also include additional rails, not shown in the top view of FIG. 108. In some embodiments, the upper rails 10804A-10804D may be operatively connected to a plurality of brackets 10806A, 10806B, 10806C, and 10806D. In some embodiments, the guidance subassemblies 10802A-10802H may be distributed proportionally on the upper rails. For example, when there are eight subassemblies and four upper rails (as shown in at least FIG. 108), two subassemblies may be disposed for each upper rail. It will be understood that various configurations and distributions of guidance subassemblies may be arranged. It will be understood that, though FIG. 108 shows the guidance subassemblies disposed on the upper rails of the smart rack 10800, in some embodiments the guidance subassemblies may be disposed on other areas of the rack (e.g., on the bottom, on the sides). It will be understood that more or fewer guidance subassemblies may be disposed on the smart rack in more or fewer configurations. It will be understood that the example superstructure may include a variety of components and embodiments as previously described in this disclosure with respect to various other embodiments of example superstructures.

In some embodiments, the smart rack 10800 may comprise at least one horizontal transport mechanism for transporting the rectangular prism horizontally, and one of the plurality of smart racks comprises a vertical transport mechanism for transporting the rectangular prism vertically.

In some embodiments, the smart rack 10800 may be part of a larger superstructure including a plurality of smart racks. In some embodiments, the smart rack 10800 may be configured to move objects or rectangular prisms (such as totes) between the racks within the superstructure. According to some embodiments, the guidance subassemblies may be used for mechanical guidance of a tote as it travels throughout the superstructure. In some embodiments, the guidance subassemblies may further aid in vertical (i.e., z-axis) movement of the tote. For example, in FIG. 108, in some embodiments, Referring to FIG. 109, according to some embodiments, the guidance subassemblies 10802A-10802H may be connected by a respective plurality of inclined planes 10808A and 10808B (connecting guidance subassemblies 10802A and 10802B), 10808C and 10808D (connecting guidance subassemblies 10802C and 10802D), 10808E (connecting guidance subassemblies 10802E and 10802F), and 10808F (connecting guidance subassemblies 10802G and 10802H). It will be understood that second, bottom inclined planes connect guidance subassemblies 10802E, 10802F and 10802G, 10802H, but that these are not shown due to the perspective view of FIG. 109. In some embodiments, these include inclined planes 10808A-10808F may configure two guidance subassemblies (e.g., 10802A, 10802B) into a single guidance subassembly. In some embodiments, the width of the inclined planes 10808A-10808F may be the width of the respective upper rails 10804A-10804D. It will be understood that, in some embodiments, the planes may be less wide than the rails. It will be understood that the example smart rack may include a variety of components and embodiments as previously described in this disclosure with respect to various other embodiments of example smart racks. For example, as previously described, in some embodiments, an example smart rack may include at least one rack actuator with a slider and an arm connected to the slider, where the arm is configured to operably engage rectangular prisms within the superstructure. In some embodiments, the rails and brackets may define a plurality of rack plates.

Referring to FIG. 110, according to some assemblies, an exemplary guidance subassembly 10802A is provided. In some embodiments, the guidance subassembly 10802A may include a pair of frame surfaces 10810A, 10810B that may be connected to a pair of inclined surfaces 10812A, 10812B. In some embodiments, the frame surfaces 10810A, 10810B may be parallel to each other. In other embodiments, the pair of inclined surfaces 10812A, 10812B may be parallel to each other. In some embodiments, the inclined surfaces 10812A, 10812B may be operatively connected to the frame surfaces 10810A, 10810B by means of fasteners. In other embodiments, the inclined surfaces 10812A, 10812B may be welded to the frame surfaces 10810A, 10810B. In some embodiments, the inclined surfaces 10812A, 10812B and frame surfaces 10810A, 10810B may be molded together when the guidance subassemblies 10802A-10802H are formed. In some embodiments, the configuration of the frame surfaces 10810A, 10810B and inclined surfaces 10812A, 10812B may create a void in which a roller device 10814A is disposed. In some embodiments, the roller device 10814A may be operatively connected to the frame surfaces 10810A, 10810B (e.g., by means of fasteners). In some embodiments, the roller device 10814A may include a plurality of rollers 10816A, 10816B that are operatively connected to a holding bracket 10818A.

There are many technical challenges and difficulties associated with implementing modular superstructures to transport rectangular prisms between smart racks. For example, modular superstructures may utilize motors to cause movements of the rectangular prisms between smart racks. Examples of motors include, but are not limited to, stepper motors. For example, a stepper motor may be coupled to an arm of the smart rack, and the arm may hold a rectangular prism.

Many stepper motor drivers for stepper motors have an analog potentiometer that controls the amount of electric current provided to the stepper motor. In such an example, the higher the electric current, the faster the stepper motor, and the more weight that the arm coupled to the stepper motor can hold.

However, many stepper motors are plagued by technical limitations. For example, when the stepper motor is implemented in a modular superstructure (for example, secured to one or more smart racks of the modular superstructure), it is difficult to manually adjust the analog potentiometer to provide varying electric currents to the stepper motor. As a result, the analog potentiometer provides a fixed, constant electric current to the stepper motors through stepper motor drivers in order for the stepper motors to actuate the arms to hold the rectangular prisms. Because the electric current is fixed through the analog potentiometer, the amount of the electric current cannot be adjusted through software. As a result, the stepper motor drivers provide the maximum amount of current to the stepper motor, which is not necessary in many situations (especially when the weight of the rectangular prism is light) and may cause the stepper motor driver to heat up and use an extra amount of power.

Various embodiments of the present disclosure overcome these technical challenges and difficulties, and provide various technical improvements and advantages.

For example, various embodiments of the present disclosure incorporate a digital potentiometer on the motor driver. In such an example, the resistance of the digital potentiometer may be changed through a setting in the firmware, and the change of the resistance of the digital potentiometer results in a change of the electric current provided to the motor driver. As such, by incorporating a digital potentiometer, various embodiments of the present disclosure may dynamically change the amount of electric current provided to the stepper motor. For example, the amount of electric current may be determined based on the weight of the rectangular prism that the arm coupled to the stepper motor carries. In other words, the power consumption level may be adjusted based on the weight of the rectangular prism.

Referring now to FIG. 111A, an example arm actuation device 11100 for a modular superstructure in accordance with some embodiments of the present disclosure is illustrated.

In the example shown in FIG. 111A, the example arm actuation device 11100 comprises a power source 11101, a motor controller 11105, a motor driver 11107, and a motor 11109.

In some embodiments, the motor 11109 is coupled to an arm that is secured to a smart rack of the rectangular prism, similar to various examples described above. For example, the motor 11109 may convert electrical energy into mechanical energy and generate motion for the arm.

In some embodiments, the motor 11109 comprises at least one stepper motor. In such an example, the stepper motor is a type of brushless direct current electric motor that divides a full rotation into a number of equal steps. The higher the current provided to the stepper motor, the faster that the stepper motor rotates, and the more mechanical energy that the stepper motor provides to the arm for holding a rectangular prism.

In some embodiments, the motor driver 11107 is electronically coupled to the motor 11109. In some embodiments, the motor driver 11107 acts as an interface between the motor 11109 and the power source 11101. For example, the motor driver 11107 may receive an input electric current from the power source 11101, and provide an output electric current to the motor 11109.

In some embodiments, the motor driver 11107 comprises a digital potentiometer 11103. In some embodiments, the digital potentiometer 11103 is a variable resistor, where the resistance of the digital potentiometer 11103 is controlled by one or more digital control signals. For example, the digital potentiometer 11103 is electronically coupled to the motor controller 11105, and the motor controller 11105 may provide control indications that causes the digital potentiometer 11103 to change its resistance.

Referring now to FIG. 111B, an example digital potentiometer 11104 in accordance with some embodiments of the present disclosure is illustrated.

In the example shown in FIG. 111B, the example digital potentiometer 11104 comprises a series of resistors (including resistor R1 and resistor R2) that is connected to the power source 11102. The series of resistors are connected in a ladder like structure, where each step of the ladder comprises a switch (including the switch S1, the switch S2, and the switch S3) that is connected to the motor 11106. In some embodiments, the switches (including the switch S1, the switch S2, and the switch S3) are controlled by a digital control signal (such as, but not limited to, a control signal from a motor control). In some embodiments, the resistance of the example digital potentiometer 11104 depends on which switch(es) are turned on or off. Because the electric current provided to the motor 11106 depends on the resistance of the example digital potentiometer 11104, the digital control signals may adjust the electric current provided to the motor 11106.

While the description above provides an example digital potentiometer, it is noted that the scope of the present disclosure is not limited to the description above. In some examples, an example digital potentiometer may comprise one or more additional and/or alternative elements. For example, an example digital potentiometer may be in the form of an integrated circuit (IC) chip.

Referring now to FIG. 112, an example method 11200 in accordance with some embodiments of the present disclosure are illustrated. In particular, the example method 11200 illustrates steps/operations associated with an example digital potentiometer.

Referring now to FIG. 112, the example method 11200 starts at step/operation 11202. In some embodiments, subsequent to step/operation 11202, the example method 11200 proceeds to step/operation 11204. At step/operation 11204, the example method 11200 includes receiving a current control indication from the motor controller.

In some embodiments, the current control indication indicates an amount of electric current to be provided to a motor. In some embodiments, the current control indication is transmitted from the motor controller to the digital potentiometer.

In some embodiments, the current control indication is based on a rectangular prism weight parameter. For example, the rectangular prism weight parameter indicates a weight associated with the rectangular prism that the arm coupled to the arm actuation device is holding. In some embodiments, the higher the rectangular prism weight parameter, the higher the current control indication, such that more electric current is provided to the motor. In some embodiments, the lower the rectangular prism weight parameter, the lower the current control indication, such that less electric current is provided to the motor. As such, various embodiments of the present disclosure may dynamically adjust the power provided to the motor based on the weight associated with the rectangular prism.

Referring back to FIG. 112, subsequent to step/operation 11204, the example method 11200 proceeds to step/operation 11206. At step/operation 11206, the example method 11200 includes transmitting a driving current to the motor driver based at least in part on the driving current indication.

In some embodiments, based on the current control indication, the digital potentiometer adjusts its resistance value so that the driving current corresponding to the current control indication is provided to the motor, similar to those described above in connection with FIG. 111B.

Referring back to FIG. 112, subsequent to step/operation 11206, the example method 11200 proceeds to step/operation 11208 and ends.

There are many technical challenges and difficulties associated with implementing modular superstructures for storing and/or transporting rectangular prisms. As illustrated in the examples above, modular superstructures may utilize motors to move rectangular prisms between smart racks. However, the performance of the motors may deteriorate overtime, which may cause failures in transporting the rectangular prisms.

Various embodiments of the present disclosure overcome these technical challenges and difficulties, and provide various technical improvements and advantages. For example, various embodiments of the present disclosure may implement performance logging and monitoring of particularly selected motor performance parameters (such as, but not limited to, current draw, power consumption, position, and/or the like), such that gradual deterioration of motor(s) can be detected in advance of a significant failure and, ideally, be addressed/corrected with minimal impact to the customer (such as, but not limited to, through preventative maintenance).

Referring now to FIG. 113, an example method 11300 in accordance with some embodiments of the present disclosure is illustrated. In particular, FIG. 113 illustrates an example method that generates motor maintenance recommendation indications in accordance with some embodiments of the present disclosure.

It is noted that each block of the flowchart, and combinations of blocks in the flowchart, may be implemented by various means such as hardware, firmware, circuitry and/or other devices associated with execution of software including one or more computer program instructions. For example, one or more of the procedures may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

In the example shown in FIG. 113, the example method 11300 starts at step/operation 11301. In some embodiments, subsequent to step/operation 11301, the example method 11300 proceeds to step/operation 11303. At step/operation 11303, the example method 11300 comprises monitoring a plurality of motor performance parameter indications associated with a plurality of motors.

Similar to the various examples illustrated above, the plurality of motors is secured to a plurality of smart racks. In some embodiments, the plurality of motors actuates one or more arms that cause movements of rectangular prisms through smart racks.

In some embodiments, the plurality of motors and/or one or more sensors coupled to the plurality of motors may transmit the motor performance parameter indications to a modular superstructure controller. For example, the modular superstructure controller may receive a plurality of motor performance parameter indications associated with the plurality of motors at predetermined time intervals to monitor the plurality of motor performance parameter indications.

In some embodiments, each motor performance parameter indication comprises a motor performance parameter that indicates a performance characteristic associated with one of the plurality of motors. In some embodiments, the plurality of motor performance parameter indications indicates one or more of a current draw parameter, a power consumption parameter, or a position parameter associated with the plurality of motors.

For example, the plurality of motor performance parameter indications indicates a plurality of current draw parameters associated with the plurality of motors. In such an example, a current draw parameter indicates a current draw associated with a motor. In some embodiments, the current draw parameter may be determined by sensors such as, but not limited to, current draw meters that are electronically coupled to the motors.

As another example, the plurality of motor performance parameter indications indicates a plurality of power consumption parameters associated with the plurality of motors. In such an example, a power consumption parameter indicates a power consumption associated with a motor. In some embodiments, the current draw parameter may be determined by sensors such as, but not limited to, power meters that are electronically coupled to the motors.

As another example, the plurality of motor performance parameter indications indicates a plurality of position parameters associated with the plurality of motors. In such an example, a position parameter indicates a position of a motor. In some embodiments, the position parameter may be determined by sensors such as, but not limited to, position sensors that detect the positions of the motors.

While the description above provides examples of motor performance parameter indications, it is noted that the scope of the present disclosure is not limited to the description above. In some examples, an example motor performance parameter indication may indicate one or more additional and/or alternative parameters.

Referring back to FIG. 113, subsequent to step/operation 11303, the example method 11300 proceeds to step/operation 11305. At step/operation 11305, the example method 11300 comprises generating one or more motor performance deterioration indications associated with one or more motors of the plurality of motors.

In some embodiments, the one or more motor performance deterioration indications are generated based on the plurality of motor performance parameter indications monitored at step/operation 11303.

For example, the modular superstructure controller may compare the motor performance parameter indications associated with a motor that are received at different time intervals to determine whether the performance of the motor has deteriorated. In some embodiments, each of the one or more motor performance deterioration indications indicates a deteriorated performance level associated with one of the plurality of motors.

As an example, the modular superstructure controller may compare power consumption parameters associated with a motor at different time intervals. If the modular superstructure controller determines that the power consumption parameters indicate a gradual increase of power consumption associated with the motor, the modular superstructure controller may indicate that the performance of the motor is deteriorating, and that the level of deterioration correlates to the increase of the power consumption level.

While the description above provides an example of determining the deteriorated performance level based on the power consumption parameters associated with the plurality of motors, it is noted that the scope of the present disclosure is not limited to the description above. In some examples, an example modular superstructure controller may determine the deteriorated performance levels based on one or more other parameters.

Referring back to FIG. 113, subsequent to step/operation 11305, the example method 11300 proceeds to step/operation 11307. At step/operation 11307, the example method 11300 comprises generating one or more motor maintenance recommendation indications associated with the one or more motors.

In some embodiments, the one or more motor maintenance recommendation indications are generated based at least in part on the one or more motor performance deterioration indications generated at step/operation 11305. In some embodiments, the one or more motor maintenance recommendation indications comprises one or more of a motor inspection recommendation indication or a motor replacement recommendation indication.

For example, the modular superstructure controller may compare the motor performance deterioration indications with one or more motor maintenance threshold values associated with motor inspection or motor replacement. In such an example, if the motor performance deterioration indication associated with a motor satisfies the motor maintenance threshold value associated with motor inspection, the modular superstructure controller generates a motor inspection recommendation indication, which indicates a recommendation to assign an operator to manually inspect the motor. If the motor performance deterioration indication associated with a motor satisfies the motor replacement threshold value associated with motor replacement, the modular superstructure controller generates a motor replacement recommendation indication, which indicates a recommendation to assign an operator to replace the motor with a new motor.

As such, various embodiments of the present disclosure can detect gradual deterioration of motor(s) in advance of a significant failure and, ideally, be addressed/corrected with minimal impact to the customer (i.e. preventative maintenance).

While the description above provides examples of motor maintenance recommendation indications, it is noted that the scope of the present disclosure is not limited to the description above. In some examples, an example motor maintenance recommendation indication may indicate one or more additional or alternative recommendations.

Referring back to FIG. 113, subsequent to step/operation 11307, the example method 11300 proceeds to step/operation 11309 and ends.

There are many technical challenges and difficulties associated with implementing modular superstructures to transport rectangular prisms between smart racks. For example, modular superstructures may utilize motors to cause movements of rectangular prisms between smart racks. As an example, an example modular superstructure may comprise one or more rotary shafts, and an arm is secured to each of the one or more rotary shafts. In some embodiments, one or more rotary motors actuate the one or more rotary shafts and cause the one or more rotary shafts. Because the arm is secured to each of the one or more rotary shafts, the rotations of the one or more rotary shafts result in the rotations of the arms. In some embodiments, through rotations of the arms, the arms may engage with the rectangular prisms to move the rectangular prisms from one smart rack to another smart rack.

In many examples, the rotary shaft is positioned in a parallel arrangement with a rack beam, and therefore the arm cannot rotate past the rack beam. However, it can be technically challenging to determine when to stop the rotation of the rotary shaft/arm. In some examples, the rotary motor continues rotating the rotary shaft even after the arm has reached the rotation limit (e.g. after the rotation of the arm is blocked by the rack beam), damaging the arm and causing unnecessary power consumption of the motor.

Various embodiments of the present disclosure overcome these technical challenges and difficulties, and provide various technical improvements and benefits.

For example, various embodiments of the present disclosure provide a smart rack that comprises a rotational engager secured to the rotary shaft, in addition to one or more arms secured to the rotary shaft. In some embodiments, the rotary shaft may be in the form of a motor-driven rotating piece, and the rotational engager may be parallel to the one or more arms.

In some embodiments, the rotational engager engages with a limit switch at the end of its travel. For example, the limit switch may turn off the rotary motor that is coupled to the rotary shaft and signals a "zero"/"home" position when the rotational engager engages with the limit switch. As such, by coupling the rotation of the rotational engager with the rotation of the arm, various embodiments of the present disclosure may prevent the arm from extending beyond the smart rack.

Referring now to FIG. 114, an example portion of an example smart rack 11400 in accordance with some embodiments of the present disclosure is illustrated. In the example shown in FIG. 114, the smart rack 11400 comprises a rotary shaft 11401 and a rotational engager 11403.

In some embodiments, the rotary shaft 11401 is secured to the smart rack 11400. For example, an end of the rotary shaft 11401 is secured to a rotary motor 11407, and the rotary motor 11407 is secured on an inner surface 11409 of a rack beam 11411. In such an example, the rotary motor 11407 exerts rotation motions on the rotary shaft 11401.

In some embodiments, an arm is secured to the rotary shaft 11401 and in a perpendicular arrangement with the rotary shaft 11401, similar to the various examples described above.

In some embodiments, the rotational engager 11403 is secured to the rotary shaft 11401. For example, the rotational engager 11403 may be disposed on top of the rotary motor 11407.

In some embodiments, the rotational engager 11403 comprises a rotation indicator 11405. In some embodiments, the rotation indicator 11405 refers to a portion of the rotational engager 11403 that protrudes from the outer surface of the rotational engager 11403 and in a parallel arrangement with the arm that is secured to the rotary shaft 11401. For example, the rotational angle of the arm around the rotary shaft 11401 is the same as the rotational angle of the rotation indicator 11405 around the rotary shaft 11401. In some embodiments, both the arm and the rotation indicator 11405 of the rotational engager 11403 are in perpendicular arrangements with the rotary shaft 11401.

In some embodiments, the rack beam 11411 defines an inner surface 11409. In some embodiments, a limit switch 11413 is disposed on the inner surface 11409 of the rack beam 11411. In the present disclosure, the term "limit switch" refers to a switch that prevents the travel of the rotation indicator 11405 of the rotational engager 11403 past the rack beam 11411. Examples of limit switch may include, but are not limited to, whisker limit switch, roller limit switch, lever limit switch, plunger limit switch, and/or the like.

In some embodiments, when the rotation indicator 11405 of the rotational engager 11403 engages with the limit switch 11413, the limit switch 11413 detects the rotation indicator 11405. In some embodiments, the limit switch 11413 is configured to, in response to detecting the rotation indicator 11405 of the rotational engager 11403, transmit a motor off signal to the rotary motor 11407.

As described above, the rotary motor 11407 is coupled to the rotary shaft 11401 and may cause rotation of the rotary shaft 11401. As described above, the rotation indicator 11405 is in a parallel arrangement with the arm secured to the rotary shaft 11401, such that a rotation angle of the rotation indicator 11405 is the same as the rotation angle of the arm. When the rotation indicator 11405 of the rotational engager 11403 engages with the limit switch 11413, the rotation indicator 11405 has rotated to the rotation threshold (e.g. rotated to the rack beam 11411). In other words, the arm has also rotated to the rotation threshold. As such, the limit switch 11413 transmits a motor off signal to the rotary motor 11407 to turn off the rotary motor 11407, which in turn results in the rotary motor 11407 stopping rotating the rotary shaft 11401 so that the arm does not over rotate.

Referring now to FIG. 115, an example portion of an example smart rack 11500 in accordance with some embodiments of the present disclosure is illustrated.

In some embodiments, the example smart rack 11500 comprises a rotary shaft 11502. In some embodiments, the rotary shaft 11502 is coupled to a rotary motor 11504 that is disposed on an inner surface of the rack beam 11506. In some embodiments, the example smart rack 11500 also comprises a rotational engager 11508 that is secured to the rotary shaft 11502 and disposed on top of the rotary motor 11504.

Similar to the example described above in connection with FIG. 114, an arm is secured to the rotary shaft 11502. In some embodiments, the rotational engager 11508 comprises a rotation indicator 11510 that is in a parallel arrangement with the arm that is secured to the rotary shaft 11502. For example, when the rotary motor 11504 causes the rotary shaft 11502 to rotate, the rotation degree of the arm is the same as the rotation degree of the rotational engager 11508.

In some embodiments, the example smart rack 11500 further comprises a limit switch 11512 that is disposed on the inner surface of the rack beam 11506. In the example shown in FIG. 115, the limit switch 11512 is positioned adjacent to the rotational engager 11508, such that when the rotation indicator 11510 of the rotational engager 11508 rotates to the rotation threshold (e.g. rotated to the rack beam 11506), the rotation indicator 11510 of the rotational engager 11508 engages with the limit switch 11512.

As described above, the rotation angle of the arm is the same as the rotation angle of the rotation indicator 11510 of the rotational engager 11508. As such, when the rotation indicator 11510 of the rotational engager 11508 engages with the limit switch 11512, the arm has rotated to the rotation threshold as well. In some embodiments, the limit switch 11512 transmit a motor off signal to the rotary motor 11504 when the limit switch 11512 detects the rotation indicator 11510 of the rotational engager 11508, so that the rotary motor 11504 may stop the rotation of the rotary shaft 11502, therefore stops the arm from rotating past the rotation threshold.

There are many technical challenges and difficulties associated with implementing modular superstructures to transport rectangular prisms between smart racks. For example, modular superstructures may utilize smart rack arms to cause movements of the rectangular prisms between smart racks. However, when rectangular prisms are transported between smart racks, the smart rack arms may block the passage of the rectangular prisms.

Various embodiments of the present disclosure overcome these technical challenges and difficulties, and provide various technical improvements and advantages. For example, various embodiments of the present disclosure provide smart rack arms that comprises a plurality of arm segments instead of a one-piece smart rack arm, such that the plurality of arm segments may retract and can be folded to prevent blocking the passage of the rectangular prisms.

Referring now to FIG. 116, an example smart rack arm 11600 for a modular superstructure is illustrated.

In some embodiments, the example smart rack arm 11600 comprises a plurality of arm segments. In the example shown in FIG. 116, the example smart rack arm 11600 comprises an arm segment 11603A, an arm segment 11603B, an arm segment 11603C, and an arm segment 11603D.

In some embodiments, each of the plurality of arm segments have the same size. In some embodiments, at least some of the plurality of arm segments may have different sizes.

In some embodiments, the example smart rack arm 11600 comprises a plurality of rotatable segment linkers. In the example shown in FIG. 116, the example smart rack arm 11600 comprises a rotatable segment linker 11605A, a rotatable segment linker 11605B, and a rotatable segment linker 11605C.

In some embodiments, each of the plurality of rotatable segment linkers connects two of the plurality of arm segments. In the example shown in FIG. 116, the rotatable segment linker 11605A connects the arm segment 11603A and the arm segment 11603B, the rotatable segment linker 11605B connects the arm segment 11603B and the arm segment 11603C, and the rotatable segment linker 11605C connects the arm segment 11603C and the arm segment 11603D.

In some embodiments, each of the plurality of rotatable segment linkers comprises a rotatable joint. For example, an example rotatable joint (such as, but not limited to, the rotatable segment linker 11605A, the rotatable segment linker 11605B, and the rotatable segment linker 11605C) may be in the form of an universal joint. In such an example, the example rotatable joint comprises a first yoke and a second yoke that are connected to a central block.

In the example shown in FIG. 116, the rotatable segment linker 11605A comprises a first yoke 11607A, a second yoke 11607B, and a central block 11609.

In some embodiments, the first yoke 11607A is secured to the arm segment 11603A. For example, the first yoke 11607A may comprise a fork portion that extends from the top surface and the bottom surface of the arm segment 11603A. In some embodiments, the fork portion of the first yoke 11607A may be secured to the central block 11609 through the pin 11611A. In such an example, the axis of the pin 11611A is in the longitudinal direction of the central block 11609 (for example, from the top of the central block 11609 to the bottom of the central block 11609).

In some embodiments, the second yoke 11607B is secured to the arm segment 11603B. For example, the second yoke 11607B may comprise a fork portion that extends from the front surface and the back surface of the arm segment 11603B. In some embodiments, the fork portion of the second yoke 11607B may be secured to the central block 11609 through the pin 11611B. In such an example, the axis of the pin 11611B is in the transverse direction of the central block 11609 (for example, from the front of the central block 11609 to the back of the central block 11609).

In some embodiments, the pin 11611A comprises a central aperture that allows the pin 11611B to pass through. As such, the second yoke 11607B may rotate around the pin 11611A relative to the first yoke 11607A. Because the second yoke 11607B is secured to the arm segment 11603B and the first yoke 11607A is secured to the arm segment 11603A, the arm segment 11603B may rotate relative to the arm segment 11603A.

While the description above provides an example rotatable joint in the form of a universal joint, it is noted that the scope of the present disclosure is not limited to the description above. In some examples, an example rotatable joint may comprise one or more additional and/or alternative elements, and/or be in one or more additional and/or alternative forms.

In some embodiments, the plurality of arm segments comprises an initial arm segment that is connected to a rotary motor. In the example shown in FIG. 116, the arm segment 11603D is the initial arm segment that is connected to the rotary motor 11613. In some embodiments, the rotary motor 11613 may cause the arm segment 11603D to rotate/swing along the rotation axis 11615.

For example, the rotary motor 11613 may be secured to a slider 11617 and rotationally connected to an end of the arm segment 11603D through one or more bearings, similar to various examples described above in connection with at least FIG. 1160. In some embodiments, one or more bearings may include, but are not limited to, a thrust bearing 11619 that provides structural support for the arm segment 11603D to support a rectangular prism, as well as a ball bearing 11621 that allows the arm segment 11603D to rotate.

In some embodiments, the rotary motor 11613 is configured to cause a rotational motion of the arm segment 11603D relative to the slider 11617. In some embodiments, the rotary motor 11613 may cause a maximum of 90-degree rotation of the arm segment 11603D.

For example, the rotary motor 11613 may cause the arm segment 11603D to rotate between the front of a smart rack and the left of the smart rack. As another example, the rotary motor 11613 may cause the arm segment 11603D to rotate between the front of a smart rack and the right of the smart rack. As another example, the rotary motor 11613 may cause the arm segment 11603D to rotate between the back of a smart rack and the right of the smart rack. As another example, the rotary motor 11613 may cause the arm segment 11603D to rotate between the back of a smart rack and the left of the smart rack.

In some embodiments, the rotary motor may cause the arm segment 11603D to rotate towards the outer surface of the rectangular prism, so as to cause the arm segment 11603D to be in an engaged mode. Additionally, or alternatively, the rotary motor may cause the arm segment 11603D to rotate away from the outer surface of the rectangular prism, so as to cause the arm segment 11603D to be in a disengaged mode.

In the example shown in FIG. 116, the arm segment 11603D is connected to the arm segment 11603C via the rotatable segment linker 11605C. Similarly, the arm segment 11603C is connected to the arm segment 11603B via the rotatable segment linker 11605B. Similarly, the arm segment 11603B is connected to the arm segment 11603A via the rotatable segment linker 11605A.

There are many technical challenges and difficulties associated with implementing modular superstructures to transport rectangular prisms between smart racks. For example, modular superstructures may utilize smart rack arms to cause movements of the rectangular prisms between smart racks. However, when rectangular prisms are transported between smart racks, the smart rack arms may block the passage of the rectangular prisms.

Various embodiments of the present disclosure overcome these technical challenges and difficulties, and provide various technical improvements and advantages. For example, various embodiments of the present disclosure provide smart rack arms that comprises a plurality of arm segments instead of a one-piece smart rack arm, such that the plurality of arm segments may retract and can be folded to prevent blocking the passage of the rectangular prisms.

Referring now to FIG. 117A and FIG. 117B, example views associated with an example smart rack arm 11700 for a modular superstructure in accordance with some embodiments of the present disclosure are illustrated. In particular, FIG. 117A illustrates an example perspective view of the example smart rack arm 11700, and FIG. 117B illustrates an example bottom view of the example smart rack arm 11700.

In some embodiments, the smart rack arm 11700 comprises a plurality of arm segments. In the example shown in FIG. 117A, the smart rack arm 11700 may include, but not limited to, an arm segment 11703A, an arm segment 11703B, an arm segment 11703C, an arm segment 11703D, an arm segment 11703E.

In some embodiments, each of the plurality of arm segments is positioned adjacent to another of the plurality of arm segments. For example, the arm segment 11703B is positioned between the arm segment 11703A and the arm segment 11703C. Similarly, the arm segment 11703C is positioned between the arm segment 11703B and the arm segment 11703D. Similarly, the arm segment 11703D is positioned between the arm segment 11703C and the arm segment 11703E.

In some embodiments, the plurality of arm segments comprises an initial arm segment that is connected to a rotary motor. In the example shown in FIG. 117A, the arm segment 11703E is the initial arm segment that is connected to the rotary motor 11713. In some embodiments, the rotary motor 11713 may cause the arm segment 11703E to rotate/swing along the rotation axis 1171715.

For example, the rotary motor 11713 may be secured to a slider 11717 and rotationally connected to an end of the arm segment 11703E through one or more bearings, similar to various examples described above. In some embodiments, one or more bearings may include, but are not limited to, a thrust bearing 11719 that provides structural support for the arm segment 11703E to support a rectangular prism, as well as a ball bearing 121 that allows the arm segment 11703E to rotate.

In some embodiments, the rotary motor 11713 is configured to cause a rotational motion of the arm segment 11703E relative to the slider 11717. In some embodiments, the rotary motor 11713 may cause a maximum of 90-degree rotation of the arm segment 11703E.

For example, the rotary motor 11713 may cause the arm segment 11703E to rotate between the front of a smart rack and the left of the smart rack. As another example, the rotary motor 11713 may cause the arm segment 11703E to rotate between the front of a smart rack and the right of the smart rack. As another example, the rotary motor 11713 may cause the arm segment 11703E to rotate between the back of a smart rack and the right of the smart rack. As another example, the rotary motor 11713 may cause the arm segment 11703E to rotate between the back of a smart rack and the left of the smart rack.

In some embodiments, the rotary motor may cause the arm segment 11703E to rotate towards the outer surface of the rectangular prism, so as to cause the arm segment 11703E to be in an engaged mode. Additionally, or alternatively, the rotary motor may cause the arm segment 11703E to rotate away from the outer surface of the rectangular prism, so as to cause the arm segment 11703E to be in a disengaged mode.

In some embodiments, the smart rack arm 11700 comprises a plurality of segment extenders. In some embodiments, each of the plurality of segment extenders connects two of the plurality of arm segments. Referring now to FIG. 117B, an example bottom view associated with an example portion of the smart rack arm 11700 is illustrated. The example portion of the smart rack arm 11700 shown in FIG. 117B comprises the arm segment 11703A and the arm segment 11703B.

In the example shown in FIG. 117B, a segment extender 11705A is secured to the bottom surface of the arm segment 11703A and the bottom surface of the arm segment 11703B.

For example, the segment extender 11705A comprises a front mount 11707A and a back mount 11709A. In such an example, the front mount 11707A of the segment extender 11705A is secured to the bottom surface of the arm segment 11703A, while the back mount 11709A of the segment extender 11705A is secured to the bottom surface of the arm segment 11703B.

In some embodiments, the segment extender 11705A comprises a motor that causes movements of the front mount 11707A relative to the back mount 11709A.

For example, the motor may cause the front mount 11707A to move away from the back mount 11709A. As described above, the front mount 11707A is secured to the arm segment 11703A, and the back mount 11709A is secured to the arm segment 11703B. As such, the segment extender 11705A causes the arm segment 11703A to move away from the arm segment 11703B, extending the smart rack arm 11700.

As another example, the motor may cause the front mount 11707A to move closer to the back mount 11709A. As described above, the front mount 11707A is secured to the arm segment 11703A, and the back mount 11709A is secured to the arm segment 11703B. As such, the segment extender 11705A causes the arm segment 11703A to move closer to the arm segment 11703B, retracting the smart rack arm 11700.

As such, various embodiments of the present disclosure provide a smart rack arm that is dynamically extendable.

While the description above provides an example of segment extender in the form of a linear actuator, it is noted that the scope of the present disclosure is not limited to the description above. In some examples, an example segment extender may comprise one or more additional and/or alternative elements, and/or be in one or more additional or alternative forms. As an example, in addition to the segment extenders, the plurality of arm segments of the smart rack arm comprises one or more rotatable segment linkers. For example, a pair of arm segments may be connected by not only a segment extender, but also a rotatable segment linker, providing more degrees of freedom for the arm segments.

FIG. 118 illustrates an example configuration 11800 of a pivot conveyor roller assembly in accordance with some embodiments of the present disclosure. The configuration 11800 includes a pivot conveyor roller assembly 11802 and a smart rack 11804 of a modular superstructure. The smart rack 11804 can include one of a plurality of smart racks of the modular superstructure that are configured to transport a tote 11806. The pivot conveyor roller assembly 11802 can be place within a threshold distance from the smart rack 11804 such that the tote 11806 can be moved (e.g., pushed, rolled, slid, etc.) from the smart rack 11804 to a surface of the pivot conveyor roller assembly 11802. The pivot conveyor roller assembly 11802 can be configured to tilt about a pivot point 11808 to move the tote 11806 from the smart rack 11804 to a first position 11810 below the smart rack 11804.

FIG. 119 illustrates example movements 11900 of a pivot conveyor roller assembly in accordance with some embodiments of the present disclosure. The example movements 11900 include a first movement 11902, a second movement 11904, and a third movement 11906.

The first movement 11902 can include a first stage in which the tote 11806 is placed on the pivot conveyor roller assembly 11802. For example, the tote 11806 can be moved (e.g., pushed, rolled, slid, etc.) from a smart rack to a surface of the pivot conveyor roller assembly 11802.

The second movement 11904 can include a second stage in which the tote 11806 is moved (e.g., pushed, rolled, slid, etc.) from a first surface position 11912 of the pivot conveyor roller assembly 11802 to a second surface position 11914 of the pivot conveyor roller assembly 11802. For example, the pivot conveyor roller assembly 11802 can include a plurality of motor driven rollers (MDRs) 11908. The MDRs 11908 can include a conveyor roller that uses an electrical motor to drive a motion of the roller. In some embodiments, the MDRs 11908 of the pivot conveyor roller assembly 11802 can be driven to move the tote 11806 from a first surface position 11912 of the pivot conveyor roller assembly 11802 to a second surface position 11914 of the pivot conveyor roller assembly 11802.

The third movement 11906 can include a third stage in which the pivot conveyor roller assembly 11802 tilts about the pivot point 11808 to move the tote 11806 to the first position 11810. In some embodiments, the third movement 11906 can be automatically initiated by the pivot conveyor roller assembly 11802. For example, in some embodiments, the pivot conveyor roller assembly 11802 can include a weight sensor 11910 configured to detect the presence of an object on a surface of the pivot conveyor roller assembly 11802. The pivot conveyor roller assembly 11802 can be configured to detect, using the weight sensor 11910, a presence of the tote 11806, and responsive to detecting the presence of the tote 11806, automatically tilt about the pivot point 11808 based at least in part on the presence of the tote 11806.

In some embodiments, the first position 11810 can include a second pivot conveyor roller assembly configured to tilt about a second pivot point to move the tote 11806 to a second position below the first position 11810. In this manner, a plurality of pivot conveyor roller assemblies can be utilized to incrementally lower the tote 11806 in an environment that is external to a modular superstructure.

FIG. 120 illustrates a modular superstructure 12000 augmented with a pivot conveyor roller assembly in accordance with some embodiments of the present disclosure. The modular superstructure 12000 can include a plurality of smart racks for transporting a tote. The plurality of smart racks can be arranged in a multi-level stacked arrangement. The multi-level stacked arrangement, for example, can include a first level 12002, a second level 12004, a third level 12006, and/or any other additional levels. In some embodiments, for example, the multi-level stacked arrangement can include twenty, thirty, etc. levels. In the example modular superstructure 12000 the first level 12002 can be positioned higher than the second level 12004 and the second level 12004 can be positioned higher than the third level 12006. The respective smart rack 12008 can be located at the first level 12002 of the multi-level stacked arrangement. In some embodiments, a respective pivot conveyor roller assembly 12010 can be placed within a proximity to the respective smart rack 12008. The respective pivot conveyor roller assembly 12010 can tilt about a respective pivot point to move a respective tote from the respective smart rack 12008 to a position below the respective smart rack 12008 that is associated with the second level 12004 of the multi-level stacked arrangement that is below the first level 12002 of the multi-level stacked arrangement.

In some embodiments, the respective smart rack 12008 can be a first egress/ingress point of the modular superstructure 12000. The modular superstructure 12000 can include a second egress/ingress point at the second level 12004 of the multi-level stacked arrangement. The tote can exit the modular superstructure 12000 from the respective smart rack 12008 at the first level 12002 of the multi-level stacked arrangement and enter the modular superstructure 12000 at the second level 12004 of the multi-level stacked arrangement via the second egress/ingress point. In this manner, a tote can be lowered to another level of the modular superstructure 12000 using one or more pivot conveyor roller assemblies. In some embodiments, this can include a secondary mechanism for lowering a tote. By way of example, the one or more pivot conveyor roller assemblies can be utilized alternatively and/or in addition to one or more internal lowering mechanisms of each of the plurality of totes. In some embodiments, the one or more pivot conveyor roller assemblies can be utilized to accelerate the movement of prioritized totes. In addition, or alternatively, the one or more pivot conveyor roller assemblies can be utilized to alleviate backlog and/or gridlock conditions of the modular superstructure 12000.

FIG. 121 illustrates a modular superstructure 12100 augmented with a plurality of egress points in accordance with some embodiments of the present disclosure. The modular superstructure 12100 can include a plurality of smart racks for transporting a tote. The plurality of smart racks can be arranged in a superstructure layout that defines one or more exterior and/or interior regions of the modular superstructure 12100. For example, the plurality of smart racks can include a subset of exterior smart racks (collectively referred to herein as exterior smart racks 12102) that at least partially form one or more exterior sides of the modular superstructure 12100.

The modular superstructure 12100 can include a plurality of egress points (collectively referred to herein as egress points 12106) aligned along at least one exterior side 12104 of the one or more exterior sides. The egress points 12106, for example, can include a respective egress point for one or more of the exterior smart racks 12102. In some embodiments, the egress points 12106 can include a respective egress point for each of the exterior smart racks 12102. By way of example, a first egress point 12106A can be aligned with a first exterior smart rack 12102A, a second egress point 12106B can be aligned with a second exterior smart rack 12102B, and/or a third egress point 12106C can be aligned with a third exterior smart rack 12102C. In some embodiments, the modular superstructure 12100 can include a plurality of egress points 12106 aligned with each exterior side of the one or more exterior sides.

The egress points 12106 can be collectively and/or individually secured to the modular superstructure 12100. For instance, each egress point 12106 can be individually secured to a respective smart rack of the modular superstructure 12100 using one or more attachment mechanisms (e.g., one or more permanent/non-permanent mechanical fasteners such as machine screws, lock nuts, drive rivets, etc.). For example, the first egress point 12106A can be secured to the first exterior smart rack 12102A, the second egress point 12106B can be secured to the second exterior smart rack 12102B, and/or the third egress point 12106C can be secured to the third exterior smart rack 12102C. In addition, or alternatively, the egress points 12106 can be collectively and/or individually secured to a position relative to the modular superstructure 12100 without being secure to the modular superstructure 12100. By way of example, the egress points 12106 can be suspended in an aligned position with respect to the modular superstructure 12100 using one or more beams and/or any other structural component.

Each egress point 12106 can include one or more egress panels 12108 forming an at least partially enclosed area capable of receiving a tote or an item within the tote from a respective smart rack of the modular superstructure 12100. At least one egress panel of the one or more egress panels 12108 can be movable to allow the tote or the item within the tote to exit each egress point 12106, respectively. The movable panel, for example, can be configured to move to create an opening from which the tote or the item within the tote can fit through to exit the egress point. As examples, the movable panel can include one or more panel doors configured to open toward two, opposite sides of the egress point, a rolling panel configured roll to at least one side of the egress point, a folding panel configured to fold to at least one side of the egress point, a retractable panel configured to retract to at least one side of the egress point, etc.

In some embodiments, the movable panel can at least partially form a lower boundary of the at least partially enclosed area. By way of example, the movable panel can include a trap door like configuration located or at least partially forming a floor of the partially enclosed area. The movable panel can be configured to open downwards to allow the tote or the item within the tote to exit the egress point to a position below the egress point.

In some embodiments, a plurality of packaging structures (collectively referred to herein as packaging structures 12110) can be placed at the position below the egress points 12106 such that the tote or the item within the tote can exit the egress points 12106 directly to the packaging structures 12110. By way of example, the plurality of packaging structures 12110 can include a first packaging structure 12110A placed at a position below the first egress point 12106A, a second packaging structure 12110B placed at a position below the second egress point 12106B, and/or a third packaging structure 12110C placed at a position below the third egress point 12106C. A packaging structure can include a box, crate, and/or other container for transporting an item from the modular superstructure 12100. In some embodiments, the packaging structures 12110 can be disposed on a conveyor belt assembly 12112 that is aligned below the exterior smart racks 12102 and along the at least one exterior side 12104 of the modular superstructure 12100.

FIG. 122 illustrates a multi-level modular superstructure 12200 augmented with a plurality of egress points in accordance with some embodiments of the present disclosure. The multi-level modular superstructure 12200 can include a plurality of smart racks arranged in a multi-level stacked arrangement. For example, the plurality of smart racks can be arranged in accordance with a superstructure layout that includes a multi-level stacked arrangement including a plurality of different levels 12202 of smart racks. The plurality of different levels 12202 can include at least a first level 12204 of the multi-level stacked arrangement that is positioned below a second level 12206 of the multilevel stacked arrangement.

The multi-level modular superstructure 12200 can include a plurality of egress points positioned relative to one or more of the different levels 12204 of the multi-level stacked arrangement. For example, the plurality of egress points can include a first level of one or more egress points 12208 aligned along the at least one exterior side of the one or more exterior sides at the first level 12204 of the multi-level stacked arrangement. In addition, or alternatively, the plurality of egress points can include a second level of one or more egress points 12210 aligned along the at least one exterior side of the one or more exterior sides at the second level 12206 of the multi-level stacked arrangement.

A second level egress panel of a second level egress point of the second level of one or more egress points 12210 can be configured to open downwards to allow the tote or the item within the tote to exit the second level egress point 12210 to a mid-level position between the first level 12204 of the multi-level stacked arrangement and the second level 12206 of the multilevel stacked arrangement. The mid-level position, for example, can correspond to a mid-level 12212 of the multilevel stacked arrangement that is between the second level 12206 and the first level 12204. In some embodiments, a plurality of the packaging structures 12214 can be disposed at the mid-level position to receive the tote or the item within the tote from the second level egress points 12210. In addition, or alternatively, a plurality of the packaging structures 12216 can be disposed at a position below the first level egress points 12208 to receive the tote or the item within the tote from the first level egress points 12208.

In some embodiments, the multi-level modular superstructure 12200 can include a plurality of egress points aligned with each level of the multilevel stacked arrangement. In addition, or alternatively, the multi-level modular superstructure 12200 can include a plurality of egress points aligned with alternating levels of the multilevel stacked arrangement.

FIG. 123 illustrates an example modular superstructure 12300 in accordance with some embodiments of the present disclosure. The example modular superstructure 12300 can include a plurality of smart racks for transporting a tote relative to a warehouse 12302. The plurality of the smart racks can be arranged in a superstructure layout. The superstructure layout can be based at least in part on a layout of the warehouse 12302. For example, the superstructure layout can define a shape, size, and/or placement of one or more different portions of the modular superstructure 12300 that are tailored to the layout of the warehouse 12302.

In some embodiments, the superstructure layout can define at least one overhead portion 12304 of the modular superstructure 12300 and/or at least one column portion 12306 of the modular superstructure 12300. The at least one overhead portion 12304 and the at least one column portion 12306 of the modular superstructure 12300 can each include a distinct subset of the plurality of smart racks that are respectively positioned at one or more different areas of the warehouse 12302.

For example, the at least one overhead portion 12304 of the modular superstructure 12300 can include a first subset of the plurality of smart racks that are positioned in an overhead area of the warehouse 12302. The first subset of the plurality of smart racks, for instance, can be suspended a threshold distance 12308 above a floor 12310 of the warehouse 12302 by one or more horizontal beams 12312. The at least one column portion 12306 of the modular superstructure 12300 can include a second subset of the plurality of smart racks that are distinct from the first subset of the plurality of smart racks. The second subset of the plurality of smart racks can form a stacked arrangement of smart racks extending from the floor 12310 of the warehouse 12302 at least the threshold distance 12308 above the floor 12310.

In some embodiments, the superstructure layout can form a plurality of different structural components of the warehouse 12302. By way of example, the at least one overhead portion 12304 of the modular superstructure 12300 can form a roof, a secondary floor, and/or the another at least partially horizontal structure of the warehouse 12302. The at least one column portion 12306 can form one or more side walls, aisles, and/or another at least partially vertical structure of the warehouse 12302. In some embodiments, the superstructure layout can include a combination of the at least one overhead portion 12304 and/or the at least one column portion 12306 that form one or more different zones for the warehouse 12302, such as, for example, one or more loading zones, storage zones, ingress/egress zones, etc.

In this manner, different portions of the modular superstructure 12300 can be arranged to effectively utilize the space of the warehouse 12302. For example, the at least one overhead portion 12304 of the modular superstructure 12300 can fill an otherwise dead overhead space in the warehouse 12302 while keeping non-dead spaces such as the floor 12310 free of obstacles. In this way, the at least one overhead portion 12304 of the modular superstructure 12300 can enable multiple levels of accessible storage that can be the width of the entirety of the warehouse 12302, but elevated to enable the use of the floor 12310 of the warehouse 12302. In some embodiments, the first subset of the plurality of smart racks, for example, can form a secondary floor above the floor 12310 that is supported by the horizontal beams 12312. In this manner, the at least one overhead portion 12304 of the modular superstructure 12300 can utilize a space above the floor 12310 as an additional floor for storage.

The modular superstructure 12300 can include one or more ingress points 12314 for facilitating the ingress of an item to the modular superstructure 12300 and/or one or more egress points 12316 for facilitating the egress of the item from the modular superstructure 12300. At the one or more ingress points 12314, an item can be loaded into a tote for transportation by the modular superstructure 12300. At the one or more egress points 12316, the item can be unloaded from the tote and/or exit the modular superstructure 12300. The one or more ingress points 12314 and the one or more egress points 12316 can include the same location such that the item enters and exits the modular superstructure 12300 at the same location. In addition, or alternatively, the one or more ingress points 12314 and the one or more egress points 12316 can include different locations such that the item enters the modular superstructure 12300 at a first location and is transported to a second location before exiting the modular superstructure 12300 at the second location.

By way of example, an ingress point of the one or more ingress points 12314 can be positioned within a proximity to the at least one column portion 12306 of the modular superstructure 12300 and an egress point of the one or more egress points 12316 can be positioned within a proximity to the at least one overhead portion 12304 of the modular superstructure 12300. For instance, the second subset of the plurality of smart racks can include one or more ingress smart racks 12318 that at least partially form an ingress point of the one or more ingress points 12314. In addition, or alternatively, the first subset of the plurality of smart racks can include one or more egress smart racks 12320 that at least partially form an egress point of the one or more egress points 12316. The modular superstructure 12300 can be configured to transport an item from an ingress smart rack 12318 positioned at a base of the at least one column portion 12306 of the modular superstructure 12300 to an egress smart rack 12320 positioned directly above a loading zone of the warehouse 12302. For example, the at least one overhead portion 12304 of the modular superstructure 12300 can form an elevated bridge over the floor 12310 of the warehouse 12302 to bridge the gap between the loading zone of the warehouse 12302 and the ingress point of the modular superstructure 12300.

In some embodiments, an item can be vertically unloaded from the modular superstructure 12300 to the floor 12310 of the warehouse 12302 and/or a transportation entity below the at least one overhead portion 12304 of the modular superstructure 12300. For example, the first subset of the plurality of smart racks can include the one or more egress smart racks 12320 and one or more adjacent, non-ingress/egress smart racks. In some embodiments, the one or more adjacent smart racks can be directly supported by the one or more horizontal beams 12312 and the one or more egress smart racks 12320 can be indirectly supported by the one or more horizontal beams 12312. This can enable the one or more egress smart racks 12320 to open at least one side (e.g., a bottom side) of the smart rack to allow an item 12322 (and/or tote) to vertically exit the modular superstructure 12300. The item 12322, and/or a tote transporting the item 12322, can exit the modular superstructure 12300 in a first direction 12324 from the modular superstructure 12300. In some embodiments, the one or more egress smart racks 12320 can be dynamically determined to transport the item 12322 to one or more different loading areas of the warehouse 12302.

By way of example, the warehouse 12302 can include a loading zone and the one or more egress smart racks 12320 can be positioned directly above the loading zone. In some embodiments, the one or more egress smart racks 12320 can form multiple egress points at one or more different loading zones and/or locations within the one or more different loading zones. A loading zone can include an unloading platform and/or a transportation entity. The transportation entity can include a mobile truck, a shopping cart, a golf cart, a trailer, a tow truck, a forklift, and/or the like. In some embodiments, the one or more egress smart racks 12320 can include a smart rack group with one or more smart racks grouped together relative to an egress point. The item 12322 can be unloaded from any of the one or more smart racks in the smart rack group to a transportation entity below.

In some embodiments, an egress smart rack of the one or more egress smart racks 12320 can include one or more egress mechanisms 12326 for lowering the item 12322 at least a portion of the threshold distance 1108 to the floor 12310 (and/or a transportation entity) of the warehouse 12302. The one or more egress mechanisms 12326, for example, can include at least one of: (i) an item elevator mechanism, and/or (ii) a loading interface for coupling to a loading mechanism of a transportation entity within the loading zone of the warehouse 12302. The loading interface, for example, can be compatible with an extension fixed to a transportation entity. The loading interface can be configured to attach to the loading extension and provide the item for loading to the transportation entity.

FIG. 124 illustrates an example modular superstructure 12400 including a conveyor roller assembly in accordance with some embodiments of the present disclosure. As described herein, the example modular superstructure 12400 can include a plurality of smart racks for transporting a rectangular prism. Each smart rack of the modular superstructure 12400 can include a rack frame with a plurality of rack beams. The plurality of rack beams can include one or more bottom rack beams and/or one or more top rack beams. The example modular superstructure 12400 can include one or more ingress points 12402 and/or one or more egress points 12404 at which an item can enter and/or exit the modular superstructure 12400, respectively.

The plurality of smart racks can include at least one ingress smart rack 12406 positioned within a proximity to an ingress point 12402 of the modular superstructure 12400 and/or at least one egress smart rack 12408 positioned within a proximity to an egress point 12404 of the modular superstructure 12400. In some embodiments, the at least one ingress smart rack 12406 and the at least one egress smart rack 12408 can include one or more distinct smart racks in the modular superstructure 12400. In some embodiments, the at least one ingress smart rack 12406 and the at least one egress smart rack 12408 can include at least one bi-directional smart rack that can be configured as either the at least one ingress smart rack 12406 or the at least one egress smart rack 12408 based at least in part on an operational configuration.

To facilitate the ingress and/or egress of one or more items to/from the modular superstructure 12400, the modular superstructure 12400 can include one or more smart racks with at least one motor driven roller ("MDR") assembly secured on at least one rack beam of a respective rack frame. The at least one MDR assembly, for example, can include at least one ingress MDR assembly 12410 that can be secured on at least one ingress smart rack 12406 and/or at least one egress MDR assembly 12412 that can be secured on at least one egress smart rack 12408. The at least one ingress MDR assembly 12410 can be configured to transport a first respective item 12414 in a first direction at least partially toward the at least one ingress smart rack 12406. The at least one egress MDR assembly 12412 can be configured to transport a second respective item 12418 in a second direction at least partially from the at least one egress smart rack 12408. In this manner, one or multiple MDR assemblies can be incorporated to the modular superstructure 12400 to automatically transport items to/from the modular superstructure 12400.

In some embodiments, the at least one (ingress/egress) MDR assembly can movable between one or more smart racks of the modular superstructure 12400. For example, a respective MDR assembly can be removably secured to a respective smart rack at one or more different locations of the modular superstructure 12400. In some embodiments, for example, each smart rack of the modular superstructure 12400 can include an attachment mechanism compatible with an attachment mechanism of the respective MDR assembly. In some embodiments, the at least one ingress point 12402 and/or the at least one egress point 12404 can be defined by a placement of the at least one MDR assembly. By way of example, the at least one ingress point 12402 of the modular superstructure 12400 can be defined by the placement of the at least one ingress MDR assembly 12410. In addition, or alternatively, the at least one egress point 12404 of the modular superstructure 12400 can be defined by the placement of the at least one egress MDR assembly 12412.

In some embodiments, the at least one ingress MDR assembly 12410 and/or the at least one egress MDR assembly 12412 can include a bi-directional MDR assembly that can be configured as either the at least one ingress smart rack 12406 or the at least one egress smart rack 12408. In a first operational mode, for example, the at least one bi-directional smart rack can operate as an at least one ingress MDR assembly 12410. In a second operational model the at least one bi-directional smart rack can operate as an at least one egress MDR assembly 12412. In the event that a respective MDR assembly is bidirectional, the at least one ingress point 12402 and/or the at least one egress point 12404 of the modular superstructure 12400 can be defined by a placement of the respective MDR assembly and an operational mode of the MDR assembly.

FIG. 125 illustrates an example motor driven roller assembly and smart rack configuration 12500 in accordance with some embodiments of the present disclosure. The motor driven roller assembly and smart rack configuration 12500 can include an MDR assembly 12502 and a MDR enabled smart rack 12504. The MDR enabled smart rack 12504 can include a plurality of rack beams. The plurality of rack beams can include one or more bottom rack beams 12508 and/or one or more top rack beams 12506. The MDR assembly 12502 can be secured to a bottom rack beam 12508. The bottom rack beam 12508, for example, can include a rack attachment mechanism 12510 that can interface with a conveyor attachment mechanism 12512 of the MDR assembly 12502. In some embodiments, the at least one MDR assembly 12502 can include a first rail and/or a second rail. The at least one of the first rail and/or the second rail can include a respective conveyor attachment mechanism that is compatible with the at least one rack attachment mechanism.

The rack attachment mechanism 12510 can include any mechanical, magnetic, and/or electrical coupling mechanism. As some examples, the rack attachment mechanism 12510, for example, can include an opening (e.g., a ridged/threaded aperture, etc.), a receiving latch, a polarized magnetic material, etc. The conveyor attachment mechanism 12512 can include any mechanical, magnetic, and/or electrical coupling mechanism that is compatible with the rack attachment mechanism 12510. By way of example, the conveyor attachment mechanism 12512 can include a compatible insert (e.g., a ridged/threaded screw, plug, etc.), a latch insert, another polarized magnetic material, etc. The attachment mechanisms can include any of the mechanical mechanisms described herein with reference to other components of the modular superstructure of the present disclosure.

The at least one MDR assembly 12502 can include one or more MDRs 12514. The MDR 12514 can include a conveyor roller that uses an electrical motor to drive a motion of the roller. In bi-directional MDR's the motion can be reconfigurable based at least in part on one or more operational modes for the MDR. The MDR 12514 can include one or more operational controls such as, for example, one or more buttons, etc. that may be interfaced with to operate the MDR 12514. In addition, or alternatively, the MDR can include one or more sensors and/or computer-readable memory to automatically operate the MDR 12514. By way of example, in some embodiments, the MDR 12514 can include a weight sensor configured to detect the presence of an item. In such a case, the MDR 12514 can detect, using the weight sensor, a presence of an item, and responsive to detecting the presence of the item, the MDR 12514 can automatically initiate one or more movement instructions based at least in part on the presence of the item. The movement instructions, for example, can initiate a movement of the MDR 12514 to facilitate the ingress and/or egress of one or more items to/from the modular superstructure 12400 based at least in part on the relative location of the MDR 12514 within the modular superstructure and/or an operational mode of the MDR 12514.

The at least one MDR assembly 12502 can include any number of MDRs 12514. In some embodiments, for example, the at least one MDR assembly 12502 can include a plurality of MDRs (e.g., two, three, four, etc.). In some embodiments, the at least one MDR assembly 12502 can include one or more MDRs 12514 and/or one or more non-motorized conveyor rollers. For example, the non-motorized conveyor rollers can be or include idler rollers or driven rollers and the MDRs 12514 can include drive rollers. In some embodiments, the MDRs 12514 can be configured to drive the non-motorized conveyor rollers/idler rollers. For example, the MDRs 12514 can include drive bands (e.g., drive bands that are connected to and configured to operate each of the non-motorized conveyor rollers/idler rollers).

FIG. 126 illustrates a modular superstructure 12600 augmented with one or more smart totes in accordance with some embodiments of the present disclosure. The modular superstructure 12600 can include a plurality of smart racks 12602 for transporting a plurality of smart totes 12604. The plurality of smart racks 12602 can be arranged in a superstructure layout. The superstructure layout can include one or more interior smart racks and one or more exterior smart racks. The one or more exterior smart racks can be positioned between the one or more interior smart racks and an outside environment such that the one or more interior smart racks are not accessible from the outside environment. The one or more exterior smart racks can form one or more exterior sides of the modular superstructure 12600 that are accessible to the outside environment.

The modular superstructure 12600 can include a plurality of smart totes 12604 arranged at one or more tote locations within the superstructure layout. Each of the smart totes 12604 can be supported at a respective tote location within the superstructure layout by a respective smart rack 12602. The respective smart rack, for example, can include a plurality of rack beams that define an (at least partially) open rectangular frame. Each smart tote 12604 can be placed flush with the plurality of rack beams and can be accessible through the at least partially open rectangular frame. In this way, at least one exterior face of one or more smart totes that are placed within one or more exterior smart racks can be accessible to the outside environment through the at least partially open rectangular frame of each respective exterior smart rack.

Each smart tote 12604 can include one or more interactive selection devices 12606. The interactive selection devices 12606 can be configured to emit a selection signal to identify the particular tote for an operational activity. The interactive selection devices 12606 can be affixed to and/or integrated with a respective smart tote 12604. For example, the one or more interactive selection devices 12606 can be affixed to the at least one exterior face of a respective smart tote 12604. In addition, or alternatively, the one or more interactive selection devices 12606 can form at least a portion of the at least one exterior face of the respective smart tote 12604.

The interactive selection devices 12606 can include any type of signaling device such as, for example, one or more lighting devices, audio devices, user interfaces, etc. The selection signal can depend on the interactive selection devices 12606 and, in some examples, can include one or more lighting signals, audio signal, and/or signals provided for display via a user interface. As one particular example, the one or more interactive selection devices can include at least one lighting device and the selection signal can include a light signal. The one or more interactive selection devices 12606, for example, can be configured to illuminate a respective smart tote 12604 to identify the tote for the operational activity.

The operational activity can include an item retrieval activity. In some embodiments, the selection signal can be indicative of one or more attributes for the operational activity. The attributes, for example, can be indicative of at least one of: (i) an order to retrieve a plurality of items from the plurality of smart totes, and/or (ii) a number of items to retrieve from one or more of the smart totes. For example, the light device can illuminate a number and/or an audio device can announce a number that is indicative of (i) an order to retrieve a plurality of items from the plurality of smart totes, and/or (ii) a number of items to retrieve from one or more of the smart totes. For example, a quantity of the items to be retrieved can be displayed on by the one or more interactive selection devices 12606 in bold numbering on the face of the smart tote 12604.

In some embodiments, the one or more interactive selection devices 12606 can include an interactive user interface configured to identify a particular tote and/or the one or more attributes for the operational activity.

In some embodiments, the modular superstructure 12600 can include a superstructure controller communicatively connected to the one or more interactive selection devices 12606. The superstructure controller can be configured to initiate the selection signal. In some embodiments, the one or more interactive selection devices 12606 can be configured to receive user input and/or provide data indicative of a completed operational activity to the superstructure controller.

FIG. 127 illustrates a modular superstructure 12700 augmented with one or more smart totes in accordance with some embodiments of the present disclosure. The modular superstructure 12700 can include a plurality of smart racks 12702 for transporting a plurality of smart totes 12704. The plurality of smart racks 12702 can be arranged in a superstructure layout. The superstructure layout can include one or more interior smart racks and one or more exterior smart racks. The one or more exterior smart racks can be positioned between the one or more interior smart racks and an outside environment such that the one or more interior smart racks are not accessible from the outside environment. The one or more exterior smart racks can form one or more exterior sides of the modular superstructure 12700 that are accessible to the outside environment.

The modular superstructure 12700 can include a plurality of smart totes 12704 arranged at one or more tote locations within the superstructure layout. Each of the smart totes 12704 can be supported at a respective tote location within the superstructure layout by a respective smart rack 12702. The respective smart rack, for example, can include a plurality of rack beams that define an (at least partially) open rectangular frame. Each smart tote 12704 can be placed flush with the plurality of rack beams and can be accessible through the at least partially open rectangular frame. In this way, at least one exterior face of one or more smart totes that are placed within one or more exterior smart racks can be accessible to the outside environment through the at least partially open rectangular frame of each respective exterior smart rack.

Each smart tote 12704 can include a mechanical means for accessing an interior storage compartment of a respective smart tote 12704. The mechanical means, for example, can include a tote infiltrating mechanism for accessing the interior storage compartment of the respective smart tote 12704. The tote infiltrating mechanism can be reconfigurable between an unlocked state and a locked state. In the locked state, the tote infiltrating mechanism can separate the interior storage compartment from the outside environment. In the unlocked state, the tote infiltrating mechanism can open the interior storage compartment to the outside environment. The tote infiltrating mechanism can be reconfigured while the respective smart tote 12704 remains within the modular superstructure 12700. In this way, each smart tote 12704 can include a means for accessing items with the smart totes 12704 without removing the smart totes 12704 from the modular superstructure 12700.

The tote infiltrating mechanism can include any type of reconfigurable entry point to a respective smart tote 12704. In some embodiments, the tote infiltrating mechanism can include a movable front panel 12708. The movable front panel 12708 can be affixed to a respective smart tote by one or more hinges or other mechanical means. The movable front panel 12708 can be operable to open (e.g., by releasing downward, upward, and/or to one or more sides) to allow access to the interior compartment of a respective smart tote. As another example, in some embodiments, the tote infiltrating mechanism can include a sliding front panel 12706. The sliding front panel 12706 can be affixed to a respective smart tote by one or more sliding mechanisms (e.g., interfacing grooves and ledges, etc.). The sliding front panel 12706 can be operable to open (e.g., by sliding downward, upward, and/or to one or more sides) to allow access to the interior compartment of a respective smart tote.

In some embodiments, the modular superstructure 12700 can include a superstructure controller communicatively connected to the tote infiltrating mechanisms. The superstructure controller can be configured to initiate the state signal to the tote infiltrating mechanisms to modify a state of the tote infiltrating mechanism. In some embodiments, the tote infiltrating mechanisms can be automatically locked and/or unlocked based at least in part on one or more selection criteria.

FIG. 128 illustrates a modular superstructure 12800 augmented with one or more smart totes in accordance with some embodiments of the present disclosure. The modular superstructure 12800 can include a plurality of smart racks 12802 for transporting a plurality of smart totes 12804. The plurality of smart racks 12802 can be arranged in a superstructure layout. The superstructure layout can include one or more interior smart racks and one or more exterior smart racks. The one or more exterior smart racks can be positioned between the one or more interior smart racks and an outside environment such that the one or more interior smart racks are not accessible from the outside environment. The one or more exterior smart racks can form one or more exterior sides of the modular superstructure 12800 that are accessible to the outside environment.

The modular superstructure 12800 can include a plurality of smart totes 12804 arranged at one or more tote locations within the superstructure layout. Each of the smart totes 12804 can be supported at a respective tote location within the superstructure layout by a respective smart rack 12802. The respective smart rack, for example, can include a plurality of rack beams that define an at least partially open rectangular frame. Each smart tote 12804 can be placed flush with the plurality of rack beams and can be accessible through the at least partially open rectangular frame. In this way, at least one exterior face of one or more smart totes that are placed within one or more exterior smart racks can be accessible to the outside environment through the at least partially open rectangular frame of each respective exterior smart rack.

Each smart tote 12804 can include one or more interactive activity devices 12806. The one or more interactive activity devices 12806 can be configured to interact with an external entity during an operational activity. The external entity, for example, can include a user that is assigned to interact with the smart tote 12804 to perform the operational activity. By way of example, the operational activity can include a retrieval and/or loading activity in which a user is assigned (i) to retrieve a particular number/type of items from the smart tote 12804 and/or (ii) load the smart tote 12804 with a particular number/type of items.

FIG. 129 illustrates an example smart tote 12804 in accordance with some embodiments of the present disclosure. The interactive activity devices 12806 can be affixed to and/or integrated with a respective smart tote 12804. For example, the one or more interactive selection devices 12806A can be affixed to and/or form at least a portion of the at least one exterior face 12808 of the smart tote 12804. In addition, or alternatively, the one or more interactive activity devices 12806B can be affixed to an interior surface of the respective smart tote 12804.

The interactive activity devices 12806 can include one or more different interfaces for interacting with an external entity.

In some embodiments, the one or more interactive activity devices 12806 can include one or more user interfaces configured to receive user input from the external entity. The one or more user interfaces can include one or more audio input devices such as one or more microphones, etc., one or more tactile input devices such as one or more touch screens, buttons, etc., and/or the like. For example, the user input can include at least one of: (i) an audio input indicative of a voice command and/or or (ii) a tactile input indicative of a manual command from the external entity.

In addition, or alternatively, the one or more interactive activity devices 12806 can include one or more output interfaces configured to provide an activity signal to the external entity. The one or more output interfaces, for example, can include one or more audio output devices such as one or more speakers, etc., one or more lighting output devices such as one or more lighting device, etc., one or more display devices such as one or more touchscreens, etc. and/or the like. For example, the activity signal can include at least one of: (i) an audio signal and/or (ii) a lighting signal for the operational activity.

The activity signal can be based at least in part on one or more operational activity parameters such as, for example, the user input, a progress of the operation activity, a profile of the external entity, and/or any other attribute involved with the operational activity.

As one example, the activity signal can be based at least in part on a progress of the operational activity. For instance, the activity signal can include an audio and/or lighting signal to direct the external entity to the smart tote 12804 and to retrieve a certain number/type of items from the smart tote 12804. The one or more interactive activity devices 12806 can be configured to monitor the progress of the operational activity while the external entity is retrieving the certain number/type of items from the smart tote 12804. In some embodiments, the activity signal can be indicative of the progress of the operational activity. For instance, the activity signal can include an audio and/or visual notification of a number and/or type of items retrieved and/or to be retrieved, a rate of retrieval, a time period associated with the retrieval, etc.

The one or more interactive activity devices 12806 can include one or more monitoring sensors such as, for example, one or more imaging sensors (e.g., cameras, etc.), weight sensors (e.g., floor scales, etc.), motion sensors (e.g., infrared transmitters, etc.) and/or the like for monitoring a number and/or type of items within an interior compartment of the smart tote 12804 to determine the progress of the operational activity.

As another example, the activity signal can be based at least in part on the user input. The user input, for example, can be indicative of a signal preference (e.g., whether a lighting signal or audio signal is preferred). In addition, or alternately, the user input can include an informational request associated with the operation activity. For example, the user input can include commands such as to repeat an activity signal, skip an operational activity, verify the performance and/or progress of the operational activity, etc.

As yet another example, the activity signal can be based at least in part on a profile of the external entity. For example, the one or more interactive activity devices 12806 can gamify the operational activity by creating an engaging working environment. The activity signal can include a lighting and/or audio notification indicating a new accomplishment for the external entity. The new accomplishment, for example, can include surpassing a retrieval rate, etc. In response to identifying a new accomplishment, the one or more interactive activity devices 12806 can illuminate, play music, etc.

In some embodiments, the modular superstructure 12800 can include a superstructure controller communicatively connected to the one or more interactive activity devices 12806. The superstructure controller can include a central controller configured to initiate one or more of the actions discussed herein with respect to the interactive activity devices 12806.

Referring now to FIG. 130, the example roller arm 13000 in accordance with some embodiments of the present disclosure is illustrated. In some embodiments, the example roller arm 13000 is a part of a smart rack.

In some embodiments, the example roller arm 13000 comprises of a plurality of rollers 13010 that may be configured to engage with one or more lips (e.g., 13202A and 13202B with reference to FIG. 132A and FIG. 132B) to assist with the movement of one or more rectangular prisms 13200. In various embodiments, the example roller arm 13000 may be configured to reduce the amount of friction between one or more rectangular prisms 13200 and the roller arm 13000 itself. In one or more embodiments, a plurality of rollers 13010 are disposed equally with the plurality of uppermost edges on the same height. In one or more embodiments, the plurality of rollers 13010 are configured wherein the axes of rotation are parallel to each other.

In various embodiments, the example roller arm may be configured in a trapezoidal shape. In one or more embodiments, one or more roller arms 13000 may comprise an end point 13008, a linear side plate 13004, a linear side plate 13006 with a convex portion, and an end plate 13002. In one or more or more embodiments, an end plate may be configured to be disposed at a height above the upper most edge of one or more roller 13010 and/or the two linear side plates 13004 and 13006 may be disposed equal with the uppermost edge of one or more roller 13010. In one or more embodiments, the end plate 13002 may be disposed equally with the upper most edge of one or more roller 13010.

In one or more embodiments, the roller arm may comprise a connection point. For example, the end plate 13002 illustrated in connection with FIG. 130 may function as a connection point In some embodiments, the connection point may be configured to engage with a plurality of threaded fasteners. In various embodiments, the connection point may be configured to engage with a thrust bearing 13112 in order to engage with a slider 13104, as depicted in FIG. 131. In one or more embodiments, the rack actuator 13100 may cause the roller arm to be configured in the engage position, where the plurality of rollers 13010 may engage with a lip 13202A and/or 13202B of a rectangular prism 13200 in order to assist with the movement of said rectangular prism. In one or more embodiments, the plurality of rollers 13010 of the roller arm may be configured to reduce the amount of friction a lip 13202A may endure when being transmitted from one smart rack to the next. In various embodiments, the rack actuator 13100 may cause the roller arm 13000 to rotate as depicted in FIG. 131 in order to assist the movement of one or more rectangular prisms 13200.

In one or more embodiments, the linear side plate 13004, the linear side plate 13006 with a convex portion, and the end plate 13002 may be reinforced in order to support the weight of a rectangular prism 13200. In various embodiments, the side plates (e.g., 13002, 13004, and 13006) may be made of a lightweight steel in order to support the prisms. In another example embodiment, the side plates (e.g., 13002, 13004, and 13006) may be made of aluminum and/or aluminum alloy in order to reduce the weight while still having enough strength to support one or more rectangular prisms.

While the description above provides example embodiments of a roller arm that comprises a plurality of rollers, a linear side plate, an end plate, a side linear side plate with a convex section, and a connection point, it is noted that the scope of the present disclosure is not limited to the description of above.

Referring now to FIG. 132A and FIG. 132B, example perspective views of an example rectangular prism 13200 in accordance with some embodiments of the present disclosure are illustrated.

In the example shown in FIG. 132A and FIG. 132B, the example rectangular prism 13200 may be in the shape that is similar to a hollow rectangular prism shape with the top surface removed. For example, the example rectangular prism 13200 may comprise a front lateral wall, a back lateral wall, a left lateral wall, a right lateral wall, and a bottom wall. In some embodiments, each of the front lateral wall, the back lateral wall, the left lateral wall, the right lateral wall, and the bottom wall may be in a shape similar to a thin, flat cuboid shape. In some embodiments, one or more of the front lateral wall, the back lateral wall, the left lateral wall, the right lateral wall, and the bottom wall may be in other shape(s).

In some embodiments, the bottom wall is connected to and in a perpendicular arrangement with each of the front lateral wall, the back lateral wall, the left lateral wall, and the right lateral wall. For example, the front lateral wall and the back lateral wall may be in a parallel arrangement with one another, and the left lateral wall and the right lateral wall may be in a parallel arrangement with one another, such that the example rectangular prism 13200 defines an opening and a space between the front lateral wall 408, the back lateral wall, the left lateral wall, the right lateral wall, and the bottom wall. In some embodiments, the opening may be used to receive/retrieve goods, items, stock keeping units, or the like by/from the rectangular prism 13200. In some embodiments, the space may be used to store goods, items, stock keeping units, or the like. In some embodiments, the example rectangular prism 13200 may be in forms such as, but not limited to, a carton, a case, a tote, a divided tote, a tray, a pallet, or the like.

In some embodiments, the example rectangular prism 13200 may comprise one or more ribs and/or protrusions that are disposed on the outer surface of walls of the example rectangular prism 13200. In some embodiments, each of the one or more ribs and/or protrusions defines an elevated surface from the outer surface of the walls of the example rectangular prism 13200. In some embodiments, the one or more ribs and/or protrusions may allow peer-to-peer engagement and movement of the rectangular prism between the smart racks.

For example, a top rib 13202A may be disposed on the outer surface of the front lateral wall, the back lateral wall, the left lateral wall, and the right lateral wall. In some embodiments, the top rib 13202A may be in a shape that is similar to an elongated cuboid. Additionally, or alternatively, the top rib 13202A may be in a shape that is similar to other shape(s). In some embodiments, portions of the top rib 13202A that are disposed on the front lateral wall 408, the back lateral wall, the left lateral wall, and the right lateral wall may be connected to one another. In some embodiments, one or more portions of the top rib 13202A that are disposed on the front lateral wall, the back lateral wall, the left lateral wall, and the right lateral wall may not be connected to one another.

As another example, a bottom rib 13202B may be disposed on the outer surface of the front lateral wall, the back lateral wall, the left lateral wall, and the right lateral wall. In some embodiments, the bottom rib 13202B is positioned under the top rib 13202A in the vertical direction. Similar to the top rib 13202A, the bottom rib 13202B may be in a shape that is similar to an elongated cuboid. Additionally, or alternatively, the bottom rib 13202B may be in a shape that is similar to other shape(s). In some embodiments, portions of the bottom rib 13202B that are disposed on the front lateral wall, the back lateral wall, the left lateral wall, and the right lateral wall may be connected to one another. In some embodiments, one or more portions of the bottom rib 13202B that are disposed on the front lateral wall, the back lateral wall, the left lateral wall, and the right lateral wall may not be connected to one another.

While the description above provides an example rectangular prism that comprises a top rib, a bottom rib, and four bottom protrusions, it is noted that the scope of the present disclosure is not limited to the description above.

In some embodiments, the one or more ribs and/or protrusions (including, but not limited to, the top rib 13202A and/or the bottom rib 13202B of the rectangular prism 13200 may be engaged with the one or more rack actuators of a smart rack. For example, the one or more rack actuators of a smart rack may engage with the one or more ribs and/or protrusions to secure the rectangular prism 13200 within the smart rack. Additionally, or alternatively, the one or more rack actuators of the smart rack may engage with the one or more ribs and/or protrusions to cause the rectangular prism 13200 to be moved to another smart rack that is adjacent to the smart rack, details of which are described herein.

In various embodiments of the present disclosure, an example roller arm of an example rack actuator may be in different positions along the lead screw and relative to a rib of the rectangular prism. For example, an example roller arm/an example rack actuator of an example smart rack may be at a "top position." When the example roller arm/the example rack actuator is in the top position, the example roller arm is positioned adjacent to and under the top rib of the rectangular prism. Additionally, or alternatively, an example roller arm/an example rack actuator of an example smart rack may be at a "bottom position." When the example roller arm/the example rack actuator is in the bottom position, the example roller arm is positioned adjacent to and under the bottom rib of the rectangular prism.

In various embodiments of the present disclosure, an example roller arm/an example rack actuator of an example rack actuator may be configured to operate in different modes relative to a rib of the rectangular prism.

For example, an example roller arm/an example rack actuator of an example smart rack may be configured to operate in an "engaged mode" relative to the rectangular prism. When the example roller arm/the example rack actuator is in the engaged mode, the example arm may be positioned to be in contact with the outer surface of the rectangular prism.

Additionally, or alternatively, an example roller arm/an example rack actuator of an example smart rack may be configured to operate in a "disengaged mode" relative to the rectangular prism. When the example roller arm/the example rack actuator is in the disengaged mode, the example roller arm may be positioned not in contact with the outer surface of the rectangular prism.

Referring back to FIG. 131, an example perspective view of an example rack actuator 13100 in accordance with some embodiments of the present disclosure is illustrated. In particular, the example shown in FIG. 131 illustrates utilizing rack actuators with roller arms that function as single axis linear actuators and coupled with rotational motion mechanism to engage and move rectangular prisms in a modular superstructure in accordance with various embodiments of the present disclosure.

In some embodiments, the example rack actuator 13100 may comprise a slider 13104 and a lead screw 13102. For example, a stepped motor may cause the lead screw 13102 to rotate, which in turn may cause the slider 13104 to move along the lead screw 13102.

In some embodiments, a roller arm 13108 may be rotatably connected to the slider 13104. For example, the example rack actuator 13100 may comprise a rotary motor 13114 that can cause the roller arm 13108 to rotate/swing along the rotation axis 13106.

For example, the rotary motor 13114 may be secured to the slider 13104 and rotationally connected to an end of the roller arm 13108 through one or more bearings. In some embodiments, one or more bearings may include, but are not limited to, a thrust bearing 13112 that provides structural support for the roller arm 13108 to support a rectangular prism, as well as a ball bearing that allows the roller arm 13108 to rotate. As such, the example rack actuator 13100 shown in FIG. 131 provides structural support and transfers movement in rotation with use of bearings.

In some embodiments, the rotary motor 13114 is configured to cause a rotational motion of the roller arm 13108 relative to the slider. In some embodiments, the rotary motor 13114 may cause a maximum of 90-degree rotation of the roller arm 13108. For example, the rotary motor 13114 may cause the roller arm 13108 to rotate between the front of a smart rack and the left of the smart rack. As another example, the rotary motor 13114 may cause the roller arm 13108 to rotate between the front of a smart rack and the right of the smart rack. As another example, the rotary motor 13114 may cause the roller arm 13108 to rotate between the back of a smart rack and the right of the smart rack. As another example, the rotary motor 13114 may cause the roller arm 13108 to rotate between the back of a smart rack and the left of the smart rack.

In some embodiments, the rotary motor may cause the roller arm 13108 to rotate towards the outer surface of the rectangular prism, so as to cause the roller arm 13108 to be in an engaged mode. Additionally, or alternatively, the rotary motor may cause the roller arm 13108 to rotate away from the outer surface of the rectangular prism, so as to cause the roller arm 13108 to be in a disengaged mode.

As such, the example rack actuator with roller arm 13108 shown in FIG. 131 illustrates examples of causing a roller arm of the rack actuator to switch between an engaged mode and a disengaged mode by utilizing a rotary motor to cause the arm to rotate towards/away from the outer surface of the rectangular prism. In accordance with various embodiments of the present disclosure, an example smart rack may comprise four rack actuators that are positioned similar to a turntable type design. For example, each of the roller arms of the rack actuators of the smart rack may be positioned in a perpendicular arrangement with the arms of its peer smart rack actuators, thereby providing force and direction of movement, additional details of which are described herein.

Referring now to FIG. 133, example movements of an example rectangular prism 13301 is illustrated. In the example shown in FIG. 133, the example smart rack comprises a left front lateral rack actuator 13303A, a right front lateral rack actuator 13303B, a left back lateral rack actuator 13303D, and a right back lateral rack actuator 13303C. FIG. 133 further illustrates a roller arm 13305.

In some embodiments, based on the movement instructions, a rack actuator is selected to exert force on the rectangular prism 13301. For example, if the movement instructions indicate a right movement (e.g., the rectangular prism 13301 is to be moved to a right peer smart rack), the left front lateral rack actuator 13303A and the associated roller arm 13305 may be selected to exert force on the rectangular prism 13301.

In some embodiments, to cause the selected rack actuator with a roller arm to exert force on the rectangular prism 13301, the rotary motor of the selected rack actuator with roller arm may cause the roller arm (e.g., roller arm 13305) to be rotated towards the outer surface of the rectangular prism 13301. In some embodiments, the rack actuators with roller arms that are not selected to exert force on the rectangular prism 13301 may provide support for the rectangular prism 13301. For example, roller arms (e.g., roller arm 13000, as depicted in FIG. 130) of the rack actuators that are not selected may be positioned near the bottom of the smart rack and be in contact with the bottom wall of the rectangular prism 13301, so as to prevent the rectangular prism 13301 from falling through.

FIG. 134 illustrates a modular superstructure locker 13400 in accordance with some embodiments of the present disclosure. The modular superstructure locker 13400 can include a plurality of smart racks for transporting a tote. The plurality of smart racks can be arranged in a three-dimensional superstructure layout. The three-dimensional superstructure layout can include one or more interior smart racks 13402 and one or more exterior smart racks 13404. The one or more exterior smart racks 13404 are positioned between the one or more interior smart racks 13402 and an outside environment such that the one or more interior smart racks 13402 are not accessible from the outside environment.

Each of the plurality of smart racks can include a rack frame. Each rack frame can include a plurality of rack beams that define one or more sides of a respective smart rack and form an at least partially enclosed interior area of the smart rack. Each of the exterior smart racks 13404 can include a smart rack door 13406. The smart rack door 13406 for a respective exterior smart rack can be secured to at least one rack beam of a plurality of rack beams of the respective exterior smart rack. The smart rack door 13406 can form a front facing side of the exterior smart rack that separates the at least partially enclosed interior area of the respective exterior smart rack from the outside environment. The smart rack door 13406, for example, can be reconfigurable between an unlocked state 13408 and a locked state 13410. In the locked state 13410, the smart rack door 13406 can separate the at least partially enclosed interior area of the respective exterior smart rack from the outside environment. In the unlocked state 13408, the smart rack door 13406 can open the at least partially enclosed interior area of the respective exterior smart rack to the outside environment.

In some embodiments, the modular superstructure locker 13400 can include a superstructure controller configured to manage (i) the movement of a tote between one or more of the plurality of smart racks, and/or (ii) a state of a respective smart rack door. In some examples and in operation, the superstructure controller can be configured to manage the movements of the one or more totes within the modular superstructure. In some examples, the superstructure controller can be configured to receive or otherwise determine the location of one or more totes within a modular superstructure. In some examples, the superstructure controller may receive, access, or otherwise determine a tote, such as a target tote, and an egress point for that tote. In response, the superstructure controller can determine a tote plan that provides instructions to one or more smart racks to move the tote in such a way that it traverses the modular superstructure locker 13400 from its current location to its egress point. An egress point, for example, can include an exterior smart rack.

FIG. 135 illustrates a flow chart depicting operations of an example process for automatically relocating a tote within a modular superstructure locker in accordance with some embodiments of the present disclosure. Specifically, FIG. 135 depicts an example process 13500. The process 13500 is performable by any number of computing device(s) as described herein, for example embodiment in hardware, software, firmware, and/or any combination thereof. In some embodiments, the modular superstructure locker can include a superstructure controller that includes the various circuitry as means for performing each operation of the process 13500. The superstructure controller, for example, can be configured to manage (i) the movement of the tote between one or more of a plurality of smart racks of the modular superstructure, and/or (ii) a state of the smart rack door of an exterior smart rack of the modular superstructure.

At operation 13502, the process 13500 includes receiving a tote query. For example, the superstructure controller can receive the tote query. The tote query can be indicative of a request to relocate a tote to a target smart rack of the modular superstructure. By way of example, the plurality of smart racks of the modular superstructure can include a plurality of totes respectively located within the at least partially enclosed interior area of one or more of the plurality of smart racks. One or more of the plurality of totes can include an item respectively stored therein. The tote query can be indicative of (i) a particular tote within the modular superstructure, (ii) an item stored within a particular tote within the modular superstructure, and/or (iii) an availability of a particular smart rack within the modular superstructure.

By way of example, the tote query can be associated with a particular tote within the modular superstructure and/or an item stored within a particular tote within the modular superstructure. The particular tote and/or item can include a requested tote/item that is requested for retrieval. For example, the tote query can be associated with user input indicative of the particular tote and/or an item within the tote. For instance, the user input can identify a location (e.g., coordinates, a smart rack identifier, etc.) within the modular superstructure that corresponds to the particular tote. As another example, the user input can include an item identifier (e.g., a unique item code, etc.) that corresponds to the particular item.

In some embodiments, the superstructure controller can include and/or be associated with one or more user interfaces for receiving the tote query. The user interfaces can include one or more external user interfaces such as, for example, one or more buttons, keypads, touchscreens, scanners (e.g., barcode/QR code scanners, etc.), and/or the like. In addition, or alternatively, the user interfaces can include one or more network interfaces such as, for example, one or more wired/wireless network interfaces, and/or the like.

In addition, or alternatively, the tote query can be indicative of an availability of a particular smart rack within the modular superstructure. The availability of the particular smart rack can be based at least in part on the presence of a tote within the at least partially enclosed interior area of the particular smart rack. The particular smart rack can be available in the event that a tote is not present within the at least partially enclosed interior area of the particular smart rack. The particular smart rack can be unavailable in the event that a tote is present within the at least partially enclosed interior area of the particular smart rack. In some embodiments, the tote query can be indicative of an available exterior smart rack. As described herein, the superstructure controller can be configured to automatically monitor each of a plurality of exterior smart rack to ensure that each exterior smart rack is unavailable by continuously moving totes to available exterior smart racks.

At operation 13504, the process 13500 includes identifying one or more smart racks of the modular superstructure that are associated with the tote query. For example, the superstructure controller can identify one or more smart racks of the modular superstructure that are associated with the tote query. The one or more smart racks can include an interior smart rack in which a tote is currently located and a target smart rack for the tote.

As one example, the tote query can be associated with user input indicative of an item within a tote. The superstructure controller can identify a current smart rack of the modular superstructure in which the tote is currently located. The current smart rack can include an interior smart rack of the modular superstructure. In addition, or alternatively, the superstructure controller can identify a target smart rack of the modular superstructure. The target smart rack can include an available exterior smart rack to which the tote can be moved.

As another example, the tote query can be indicative of an available exterior smart rack. In such a case, the superstructure controller can identify an interior smart rack that includes a tote to automatically transfer the tote to the available exterior smart rack. In some embodiments, the interior smart rack can be identified based at least in part on a tote and/or item priority associated with the tote. In addition, or alternatively, the interior smart rack can be identified based at least in part on one or more timing constraints associated with the plurality of totes and/or items within the modular superstructure. For example, the plurality of smart racks can include a plurality of items respectively located within one or more of the plurality of totes. In some embodiments, one or more of the plurality of items can be associated with one or more time periods. The one or more time periods, for example, can be indicative of an expected delivery and/or pick-up time for each of the one or more items. The interior smart rack of the modular superstructure can be identified based at least in part on the one or more time periods to, for example, ensure that an item is relocating to an exterior smart rack prior to an expected delivery and/or pick-up time for the respective item.

At operation 13506, the process 13500 includes generating a tote plan for relocating a tote based on the tote query and the one or more smart racks. For example, the superstructure controller can generate the tote plan for relocating the tote based on the tote query and the one or more smart racks. The superstructure controller can generate the tote plan to relocate the tote from a current smart rack to a target smart rack of the modular superstructure. The superstructure controller can generate the tote plan based at least in part on the current smart rack and the target smart rack. The tote plan can include one or more movement instructions for relocating the tote from the current smart rack to the target smart rack of the modular superstructure.

In some embodiments, the tote plan can be automatically generated to continuously move totes to available exterior smart racks. For example, responsive to identifying an interior smart rack of the modular superstructure that includes a tote with an item, the superstructure controller can generate the tote plan based at least in part on the interior smart rack and an available exterior smart rack. The tote plan can include one or more movement instructions for relocating the tote from the interior smart rack to the available exterior smart rack.

The tote plan can be generated using a data graph matrix representation of the modular superstructure. The data graph matrix representation can be embodied as a directed graph with a plurality of nodes representing the plurality of smart racks and a plurality of edges that each connect nodes representing peers of the plurality of smart racks. An edge connecting two nodes, for example, can represent a particular smart rack capable of repositioning a tote to another peer smart rack. In response to a tote query, the tote plan can be computed by traversing the data graph matrix representation. The tote plan can represent a set of rack operations for relocating the tote in accordance with the tote query.

At operation 13508, the process 13500 includes modifying a state of a smart rack door for at least one of the one or more smart racks. For example, the superstructure controller can modify the state of the smart rack door for the at least one smart rack. By way of example, in response to a tote query identifying a particular item for pick-up, the superstructure controller can: (i) relocate the item to a target smart rack, and (ii) modify a state of a target smart rack door of the target smart rack to an unlocked state. In this manner, an item can be retrieved in real-time from a three-dimensional superstructure in which only a portion of the superstructure is accessible from an outside environment.

At operation 13510, the process 13500 includes providing data indicative of the at least one smart rack to an external entity. For example, the superstructure controller can provide the data indicative of the at least one smart rack to the external entity. The data, for example, can be indicative of a location and/or an identifier of the exterior smart rack. In some embodiments, the data can be indicative of a security feature (e.g., a code, radio frequency tag, etc.) for unlocking the target smart rack door of the target smart rack.

There are many technical challenges and difficulties associated with implementing modular superstructures to transport rectangular prisms between smart racks. For example, modular superstructures may utilize motors to cause movements of the rectangular prisms between smart racks. For example, each smart rack may comprise one or more arms that are actuated by motors. Many smart racks require multiple arms to be actuated by motors when performing operations on the rectangular prisms (for example, an upward movement, a downward movement, a forward movement, a backward movement, a left movement, or a right movement).

In many examples, the movements of the rectangular prisms (e.g. the actuations of the motors) must be synchronized. For example, when performing a lifting movement operation on a rectangular prism to cause the rectangular prism to move from a bottom smart rack to a top smart rack, the motor of the bottom smart rack and/or the motor of the top smart rack may need to be actuated to cause movements of an arm of the bottom smart rack and/or an arm of the top smart rack, respectively. Similarly, when performing a lowering movement operation on a rectangular prism to cause the rectangular prism to move from a top smart rack to a bottom smart rack, the motor of the bottom smart rack and/or the motor of the top smart rack may need to be actuated to cause movements of an arm of the bottom smart rack and/or an arm of the top smart rack, respectively. In some examples, at least one motor operation is required to move the rectangular prism horizontally. However, it is technically challenging and difficult to synchronize multiple motors to actuate multiple arms.

Various examples of the present disclosure overcome these technical challenges and difficulties, and provide various technical improvements and advantages. For example, various example embodiments utilize pulse width modulation (PWM) to control the operations of the motor (such as, but not limited to, a stepper motor) by reducing the average power to the motor. In some embodiments, a single PWM control signal is provided to multiple stepper motors, which can synchronize the movement when two or more motors are enabled. In some embodiments, selectively controlling the motors can be achieved with a multiplexer, providing more dynamic control of the motor actuations.

Referring now to FIG. 136, an example block diagram of an example portion of an example modular superstructure 13600 in accordance with some embodiments of the present disclosure is illustrated.

In some embodiments, the modular superstructure 13600 comprises a motor controller 13601 and a first multiplexer 13603A.

In the present disclosure, the term "multiplexer" (also referred to as a data selector) refers to a device that selects between different input signals received from different data input ports and forwards a selected input signal to a data output port. In some embodiments, the multiplexer may be in the form of a 4-to-1 channel multiplexer. In such examples, the multiplexer comprises four different data input ports that receive input signals, and provide a selected input signal to a data output port.

In some embodiments, the multiplexer selects the input signal based at least in part on two or more selection signals received from two or more channel selection ports. In some embodiments, the number of channel selection ports may be determined based at least in part on the number of the data input ports. For example, if an example multiplexer has a total number of $2^n$ data input ports, the example multiplexer has a total number of n channel selection ports. Continuing from the 4-to-1 channel multiplexer example above, because the 4-to-1 channel multiplexer has a total of 4 data input ports, the 4-to-1 channel multiplexer has a total of 2 channel selection ports.

As an example, the 4-to-1 channel multiplexer may select which input signal to forward through the data output port based on following table:

| Signal received at the first channel selection port | Signal received at the second channel selection port | Signal from the data output port |
|---|---|---|
| 0 | 0 | First data input port |
| 0 | 1 | Second data input port |
| 1 | 0 | Third data input port |
| 1 | 1 | Fourth data input port |

As shown in the example above, if both the first channel selection port and the second channel section port receive low signals, the data output port forwards the signal from the first data input port through the data output port. If the first channel selection port receives a low signal and the second channel section port receives a high signal, the data output port forwards the signal from the second data input port through the data output port. If the first channel selection port receives a high signal and the second channel section port receives a low signal, the data output port forwards the signal from the third data input port through the data output port. If the first channel selection port receives a high signal and the second channel section port receives a high signal, the data output port forwards the signal from the fourth data input port through the data output port.

Referring back to FIG. 136, the first multiplexer 13603A may be in the form of a 4-to-1 channel multiplexer described above. In some embodiments, the first multiplexer 13603A is electronically coupled to the motor controller 13601 and a first motor driver 13605A. In some embodiments, the motor controller 13601 transmits a plurality of pulse width modulation (PWM) signals to one or more data input ports of the first multiplexer 13603A.

For example, the motor controller 13601 may be electronically coupled to the first data input port and the third data input port of the first multiplexer 13603A and provide the PWM signals to the first data input port and the third data input port of the first multiplexer 13603A. In such an example, when the first multiplexer 13603A receives a low signals on both its first channel selection port and second channel selection port, or when the first multiplexer 13603A receives a high signal on its first channel selection port and a low signal on its second channel selection port, the first multiplexer 13603A provides the PWM signals as output through the data output port. In some embodiments, the first motor driver 13605A is electronically coupled to the data output port of the first multiplexer 13603A. Upon receiving the PWM signals, the first motor driver 13605A actuated the first motor 13607A. When the first multiplexer 13603A receives a high signals on both its first channel selection port and second channel selection port, or when the first multiplexer 13603A receives a low signal on its first channel selection port and a high signal on its second channel selection port, the first multiplexer 13603A does not provides the PWM signals as output through the data output port, and the first motor 13607A is not actuated.

In some embodiments, the modular superstructure 13600 further comprises a second multiplexer 13603B. In some embodiments, the second multiplexer 13603B may be in the form of a 4-to-1 channel multiplexer described above. In some embodiments, the second multiplexer 13603B is electronically coupled to the motor controller 13601 and a second motor driver 13605B. In some embodiments, the motor controller 13601 transmits a plurality of pulse width modulation (PWM) signals to one or more data input ports of the second multiplexer 13603B.

For example, the motor controller 13601 may be electronically coupled to the second data input port and the third data input port of the second multiplexer 13603B and provide the PWM signals to the second data input port and the third data input port of the second multiplexer 13603B. In such an example, when the second multiplexer 13603B receives a low signal on its first channel selection port and a high signal on its second channel selection port, or when the second multiplexer 13603B receives a high signal on its first channel selection port and a low signal on its second channel selection port, the second multiplexer 13603B provides the PWM signals as output through the data output port. In some embodiments, the second motor driver 13605B is electronically coupled to the data output port of the second multiplexer 13603B. Upon receiving the PWM signals, the second motor driver 13605B actuated the second motor 13607B. When the second multiplexer 13603B receives a high signals on both its first channel selection port and second channel selection port, or when the second multiplexer 13603B receives low signals on both its first channel selection port and second channel selection port, the second multiplexer 13603B does not provides the PWM signals as output through the data output port, and the second motor 13607B is not actuated.

The example shown in FIG. 136 illustrates an example of dynamic control of the motor actuations. For example, to actuate the first motor 13607A but not the second motor 13607B, low signals are provided to the first channel selection port and second channel selection port of each of the first multiplexer 13603A and the second multiplexer 13603B. As another example, to actuate the second motor 13607B but not the first motor 13607A, a low signal is provided to the first channel selection port of each of the first multiplexer 13603A and the second multiplexer 13603B and a high signal is provided to the second channel selection port of each of the first multiplexer 13603A and the second multiplexer 13603B. As another example, to actuate both the second motor 13607B and the first motor 13607A, a high signal is provided to the first channel selection port of each of the first multiplexer 13603A and the second multiplexer 13603B and a low signal is provided to the second channel selection port of each of the first multiplexer 13603A and the second multiplexer 13603B.

Referring now to FIG. 137, an example block diagram of an example portion of an example modular superstructure 13700 in accordance with some embodiments of the present disclosure is illustrated. In some embodiments, the modular superstructure 13700 comprising a motor controller 13702 and a first multiplexer 13704.

In some embodiments, the first multiplexer 13704 is electronically coupled to the motor controller 13702 and a first motor driver 13706. In some embodiments, the first multiplexer 13704 is also electronically coupled to a second motor driver 13706B. For example, both the first motor driver 13706 and the second motor driver 13706B are electronically coupled to the data output port of the first multiplexer 13704.

In some embodiments, the motor controller 13702 transmits a plurality of pulse width modulation (PWM) signals to the first motor driver 13706A. In some embodiments, the motor controller 13702 also transmits a plurality of PWM signals to a second motor driver 13706B.

In some embodiments, each of the first motor driver 13706A and the second motor driver 13706B only provides the PWM signals to the first motor 13708A and the second motor 13708B, respectively, when it receives a motor selection signal from the data output port of the first multiplexer 13704. For example, when the data output port of the first multiplexer 13704 provides a motor selection signal that selects the first motor 13708A and not the second motor 13708B, the first motor 13708A is actuated, but the second motor 13708B is not actuated. As another example, when the data output port of the first multiplexer 13704 provides a motor selection signal that selects the second motor 13708B and not the first motor 13708A, the second motor 13708B is actuated, but the first motor 13708A is not actuated. As another example, when the data output port of the first multiplexer 13704 provides a motor selection signal that selects both the first motor 13708A and the second motor 13708B, both the first motor 13708A and the second motor 13708B are actuated.

In some embodiments, the motor controller 13702 transmits a plurality of channel selection signals to the first multiplexer 13704. In such examples, the channel selection signal received by the first multiplexer 13704 may determine the motor selection signal from the data output port.

For example, the first data input port of the first multiplexer 13704 may receive a motor selection signal that selects the first motor 13708A and not the second motor 13708B, the second data input port of the first multiplexer 13704 may receive a motor selection signal that selects the second motor 13708B and not the first motor 13708A, and the fourth data input port of the first multiplexer 13704 may receive a motor selection signal that selects both the first motor 13708A and the second motor 13708B. In such an example, to actuate the first motor 13708A but not the second motor 13708B, the motor controller 13702 provides low signals to the first channel selection port and second channel selection port of the first multiplexer 13704. As another example, to actuate the second motor 13708B but not the first motor 13708A, a low signal is provided to the first channel selection port of the first multiplexer 13704 and a high signal is provided to the second channel selection port of the first multiplexer 13704. As another example, to actuate both the second motor 13708B and the first motor 13708A, a high signal is provided to both the first channel selection port and the second channel selection port of the first multiplexer. As such, various embodiments of the present disclosure provide dynamic synchronization of motor actuations.

FIG. 138A and FIG. 138B illustrate an example view 13800 of a smart rack tote access attachment in accordance with some embodiments of the present disclosure. The smart rack tote access attachment 13802 can include an attachment base 13804 and an angled tote viewing platform 13806. The attachment base 13804 can secure the smart rack tote access attachment 13802 to at least one portion of a modular superstructure 13808. The at least one portion of the modular superstructure 13808, for example, can include a first smart rack 13808A and a second smart rack 13808B. The first smart rack 13808A can be an ingress/egress point of the modular superstructure. The attachment base 13804 can support an angled tote viewing platform 13806 from which a tote 13810 can be accessed.

FIG. 139A and FIG. 139B illustrate an example side view 13900 of a smart rack tote access attachment in accordance with some embodiments of the present disclosure. The attachment base 13804 can include one or more attachment mechanisms 13902 for securing the smart rack tote access attachment 13802 to at least a portion of the modular superstructure. The attachment base 13804 can include at least two base structures. A first base structure 13904 can extend at least a height 13906 of the angled tote viewing platform 13806 and the second base structure 13908 extends at least a length 13910 of the angled tote viewing platform 13806.

The first base structure 13904 can include one or more attachment mechanisms 13902 for securing the smart rack tote access attachment 13802 to at least a portion of the modular superstructure. The one or more attachment mechanisms 13902 can include any mechanical, magnetic, and/or electrical coupling mechanism for securing the first base structure 13904 to at least one portion of the modular superstructure 13808. For instance, the at least one portion of the modular superstructure 13808 can include an opening (e.g., a ridged/threaded aperture, etc.), a receiving latch, a polarized magnetic material, etc. that can be compatible with the one or more attachment mechanisms 13902. By way of example, the attachment mechanisms 13902 can include a compatible insert (e.g., a ridged/threaded screw, plug, etc.), a latch insert, another polarized magnetic material, etc. The attachment mechanisms 13902 can include any of the mechanical, magnetic, and/or electrical mechanisms described herein with reference to other components of the modular superstructure of the present disclosure.

The second base structure 13908 can include a ridge 13912 extending at least a portion of the height 13906 of the angled tote viewing platform 13806. The ridge 13912, for example, can extend at an angle upward such that the tote 13810 can sit flush with the ridge when in a viewing position.

The angled tote viewing platform 13806 can include an angled platform base 13914 and at least one angled side rail 13916. The angled platform base 13914 can include at least one base conveyor roller 13918. In addition, or alternatively, the at least one angled side rail 13916 can include at least one side conveyor roller 13920. The at least one base conveyor roller 13918 and/or the at least one side conveyor roller 13920 can include one or more motor driven rollers (MDRs).

By way of example, to facilitate the ingress and/or egress of the tote 13810, each of the at least one base conveyor roller 13918 and/or the at least one side conveyor roller 13920 can include motor driven roller ("MDR") assemblies configured to automatically move the tote 13810 to/from the at least one portion of the modular superstructure 13808. In this way, the smart rack tote access attachment 13802 can be secured onto the modular superstructure 13808 and utilized to selectively view the interior of a tote.

In some embodiments, the smart rack tote access attachment 13802 can be communicatively connected to a superstructure controller the can be configured to selectively initiate the motion of the at least one base conveyor rollers 13918 and/or the at least one side conveyor rollers 13920. In addition, or alternatively, the at least one base conveyor roller 13918 and/or the at least one side conveyor roller 13920 can be operatively coupled to an input mechanism and can be configured to selectively operate responsive to input to the input mechanism. The input mechanism, for example, can include a tactile button, a microphone, touch screen, etc.

During operation and use of the example superstructures described throughout this disclosure, it may become necessary to use a rectangular prism (also referred to as a tote) with one or more transparent sides. A tote with one or more transparent sides may be used to allow visual inspection of a tote's contents without the need to open the tote. One or more transparent sides may also allow for visual inspection of an interior of a tote, allowing an operator, for example, to detect whether the tote is damaged.

Referring now to FIG. 140, an example transparent tote 14000 is provided. In various embodiments, the transparent tote 14000 may be a rectangular prism of a variety of dimensions. Though the tote shown in FIG. 140 is transparent on all sides, it will be understood that, in some embodiments, one or more sides may be opaque. In some embodiments, the transparent material out of which the transparent tote 14000 is made may be made of a variety of materials, including plastic.

In some embodiments, the transparent tote may be disposed within one or more example smart racks, as described throughout the disclosure, which may be disposed within an example superstructure, as described throughout the disclosure. It will be understood that the example superstructure may include a variety of components and embodiments as previously described in this disclosure with respect to various other embodiments of example superstructures. It will be understood that the example smart racks may include a variety of components and embodiments as previously described in this disclosure with respect to various other embodiments of example smart racks. For example, as previously described, in some embodiments, the example smart rack may include at least one rack actuator with a slider and an arm connected to the slider, where the arm is configured to operably engage rectangular prisms within the superstructure. In some embodiments, the rails and brackets may define a plurality of rack plates. In some embodiments, the smart racks within the example superstructure may have totes that are all transparent, but in other embodiments not all of the totes may be transparent. It will be understood that the control system for the aforementioned components may be one of the example control systems and embodiments described throughout this disclosure.

FIG. 141 illustrates a modular superstructure 14100 augmented with an exterior boundary sensing device in accordance with some embodiments of the present disclosure. The modular superstructure 14100 can include a plurality of smart racks for transporting a tote. The plurality of smart racks can be arranged in a superstructure layout. The superstructure layout can include one or more interior smart racks and one or more exterior smart racks. The one or more exterior smart racks can be positioned between the one or more interior smart racks and an outside environment such that the one or more interior smart racks are not accessible from the outside environment. The one or more exterior smart racks can form one or more exterior sides 14102 of the modular superstructure 14100 that are accessible to the outside environment.

Each of the plurality of smart racks can include a rack frame. Each exterior smart rack can include a plurality of rack beams that define an at least partially open rectangular frame through which a tote can move. The one or more exterior sides 14102 can be formed by a plurality of open rectangular frames of the one or more exterior smart racks. The plurality of open rectangular frames can beneficially allow inspection of the modular superstructure 14100, but can also allow for the unintentional access of objects to the interior of the modular superstructure 14100. To detect the presence of such objects, the modular superstructure 14100 can include one or more exterior boundary sensing devices.

For example, the modular superstructure 14100 can include an exterior boundary sensing device at least partially surrounding the modular superstructure 14100. The exterior boundary sensing device can be configured to detect a presence of an object within a threshold distance of the one or more exterior sides 14102 of the modular superstructure 14100. As one example, the exterior boundary sensing device can include one or more light curtains aligned with the one or more exterior sides 14102 of the modular superstructure 14100. A respective light curtain can include at least one transmitter 14104 aligned with a first edge of an exterior side of the modular superstructure 14100 and/or an at least one receiver 14106 aligned with a second edge of the exterior side of the modular superstructure 14100 that is opposite to the first edge of the exterior side. The at least one transmitter 14104 can continuously emit a plurality of infrared light pulses to the at least one receiver 14106 and measure exterior sensor data indicative of a presence of an object within a threshold distance of a respective exterior side of the modular superstructure 14100 based on a reception and/or disruption of at least one of the plurality of infrared light pulses. By way of example, a disruption of at least one infrared light pulse can be indicative of the presence of an object, whereas the reception of an at least one infrared light pulse can be indicative of an absence of an object. In some embodiments, one or more infrared light pulses can be emitted at one or more different frequencies and the exterior sensor data indicative of a portion of the modular superstructure 14100 that is associated with the presence and/or absence of an object.

The one or more exterior sides 14102 of the modular superstructure 14100 can include one or more ingress/egress points 14108 of the modular superstructure 14100 configured for receiving or providing one or more objects to/from the modular superstructure 14100. In addition, or alternatively, the one or more exterior sides 14102 of the modular superstructure 14100 can include one or more non-ingress/egress boundaries 14110 for the modular superstructure 14100. In some embodiments, the exterior sensing device can be configured to detect the presence of an object within the threshold distance of the one or more non-ingress/egress boundaries 14110 and not detect the presence of an object within the threshold distance of the one or more ingress/egress points 14108. In this manner, the objects can be reliably detected at locations of the modular superstructure 14100 that are not configured to receive/provide the objects.

In some embodiments, the modular superstructure 14100 can include a superstructure controller configured to receive, via the exterior boundary sensing device(s), exterior sensor data indicative of the presence of the object within the threshold distance of the one or more exterior sides 14102 of the modular superstructure 14100; and manage a movement of the tote between one or more of the plurality of smart racks based at least in part on the exterior sensor data. In some examples and in operation, the superstructure controller can be configured to manage the movements of the one or more totes within the modular superstructure 14100 by preventing and/or allowing movements of the one or more totes between one or more portions of the modular superstructure 14100 based at least in part on the exterior sensor data.

FIG. 142 illustrates a flow chart depicting operations of an example process for automatically controlling a modular superstructure in accordance with some embodiments of the present disclosure. Specifically, FIG. 142 depicts an example process 14200. The process 14200 is performable by any number of computing device(s) as described herein, for example embodiment in hardware, software, firmware, and/or any combination thereof. In some embodiments, the modular superstructure can include a superstructure controller that includes various circuitry as means for performing each operation of the process 14200. The superstructure controller, for example, can be configured to configured to receive, via an exterior boundary sensing device, exterior sensor data indicative of a presence of an object within a threshold distance of one or more exterior sides of the modular superstructure; and manage a movement of a tote between one or more of a plurality of smart racks based at least in part on the exterior sensor data.

At operation 14202, the process 14200 includes receiving exterior sensor data. For example, the superstructure controller can receive, via the exterior boundary sensing device, exterior sensor data indicative of the presence of the object within the threshold distance of the one or more exterior sides of the modular superstructure. The exterior sensor data can be indicative a presence and/or absence of an object at one or more portions of the modular superstructure. In some embodiments, the exterior sensor data can be continuously received for the modular superstructure.

At operation 14204, the process 14200 includes identifying the presence of an object. For example, the superstructure controller can identify the presence of an object based at least in part on the exterior sensor data. The presence of the object, for example, can be based at least in part, on a disruption of one or more infrared signals at a receiver of the exterior boundary sensing device. In some embodiments, the exterior sensor data can be indicative of one or more smart racks of the plurality of smart racks. For example, the exterior sensor data can indicate a subset of the smart racks within a proximity to a location where the presence of the object is identified.

At operation 14206, the process 14200 includes stopping a movement of at least a portion of the modular superstructure. For example, the superstructure controller can automatically stop the movement of a tote between one or more of the plurality of smart racks in response to the presence of the object within the threshold distance of the one or more exterior sides of the modular superstructure. In some embodiments, the superstructure controller can be configured to automatically stop the movement of the tote between the subset of the smart racks within a proximity to a location where the presence of the object is identified. In some embodiments, the superstructure controller can provide an indication (e.g., a notification, light, etc.) of the presence of the object within the threshold distance of the one or more exterior sides of the modular superstructure to an external entity.

At operation 14208, the process 14200 includes identifying an absence of an object. For example, the superstructure controller can detect, based on the exterior sensor data, the absence of the object. The absence of the object, for example, can be based at least in part, on a reception of one or more infrared signals at a receiver of the exterior boundary sensing device.

At operation 14210, the process 14200 includes resuming a movement of at least the portion of the modular superstructure. For example, the superstructure controller can automatically resume the movement of the tote between the one or more of the plurality of smart racks in response to the absence of the object. In addition, or alternatively, the superstructure controller can provide an indication (e.g., a notification, light, etc.) of the absence of the object to an external entity. The indication of the absence of the object can include an option to resume the movement of the tote between the one or more of the plurality of smart racks.

During operation and use of the example superstructures described throughout this disclosure, it may become necessary to inspect one or more of the example rectangular prisms (also known as totes) disposed within these example superstructures. One method of inspection may be done by means of scannable tags placed on the exterior of the tote. For example, a radio-frequency identification (RFID) tag or a quick response (QR) code may be disposed on one or more sides of the tote. One or more scanners may be placed on the example superstructure at ingress or egress points to scan the tote as it enters or exits a smart rack of the superstructure. The RFID tags or QR codes may be tagged or coded to specific totes, enabling quick identification to determine the type of tote and the material contained within the tote. A control device may receive the scanned code or tag and send a signal to the user identifying the tote or the contents of the tote.

Referring to FIG. 143, there is provided an example tote 14300 with a tag disposed on it. While two tags are shown in the tote 14300, it will be understood that this is for illustration purposes and an example tote 14300 may have only a single tag 14304 or code 14302 disposed on its surface. In some embodiments, the code or tag may be disposed on one or more of the surfaces of the tote 14300.

It will be understood that the example superstructure may include a variety of components and embodiments as previously described in this disclosure with respect to various other embodiments of example superstructures. It will be understood that the example smart racks may include a variety of components and embodiments as previously described in this disclosure with respect to various other embodiments of example smart racks. For example, as previously described, in some embodiments, the example smart rack may include at least one rack actuator with a slider and an arm connected to the slider, where the arm is configured to operably engage rectangular prisms within the superstructure. In some embodiments, the rails and brackets may define a plurality of rack plates. In some embodiments, each of the plurality of smart racks may comprise at least one horizontal transport mechanism for transporting the rectangular prism horizontally, and one of the plurality of smart racks comprises a vertical transport mechanism for transporting the rectangular prism vertically. It will be understood that the control system for the aforementioned components may be one of the example control systems and embodiments described throughout this disclosure.

There are many technical challenges and difficulties associated with implementing modular superstructures to transport rectangular prisms between smart racks. For example, modular superstructures may synchronize motors to cause movements of the rectangular prisms between smart racks. For example, modular superstructures may utilize motors in a left smart rack and motors in a right smart rack to cause a movement of the rectangular prism from the left smart rack to the right smart rack. When the motor in the left smart rack causes the rectangular prism to be pushed out of the left smart rack, the motor in the right smart rack needs to be actuated so that the rectangular prism can be received by the right smart rack.

However, it is technically challenging and difficult to synchronize the motors among smart racks. Continuing from the above example, the rectangular prism may be moved between the left smart rack and the right smart rack, but motors in the right modular superstructure may not be actuated because the controller for the motors cannot determine the position of the rectangular prism.

Various embodiments of the present disclosure overcome the above referenced technical challenges and difficulties, and provide various technical improvements and advantages. For example, various embodiments of the present disclosure provide one or more feedback sensors that are secured to the lateral guidance bars.

As described above in connection with at least FIG. 75, an example smart rack in accordance with some embodiments of the present disclosure comprises one or more mechanical guidance elements. For example, an example smart rack may comprise a lateral guidance bar that is secured to a lateral rack beam (for example, the lateral guidance bar 7115 shown in FIG. 75). In such an example, the lateral guidance bar extends through two peer smart racks to facilitate movements of rectangular prisms between two peer smart racks. For example, an example rectangular prism may comprise one or more guidance rails that are disposed on an outer surface of the rectangular prism, such that the one or more guidance rails correspond to the lateral guidance bar that is secured to the rack frame.

Referring now to FIG. 144, an example portion of an example smart rack 14400 in accordance with some embodiments of the present disclosure is illustrated. In the example shown in FIG. 144, the example smart rack 14400 comprises a rack beam 14401 and a lateral guidance bar 14403.

In some embodiments, the smart rack 14400 comprises a rack beam 14401 and a lateral guidance bar 14403.

In some embodiments, the rack beam 14401 is connected to the example smart rack 14400 with a peer smart rack. For example, the rack beam 14401 may be a lateral rack beam that connects the example smart rack 14400 to a peer smart rack in the lateral direction (for example, a left peer smart rack, a right peer smart rack, a front peer smart rack, and a back peer smart rack). As another example, the rack beam 14401 may be a top rack beam that connects the smart rack 14400 with a top peer smart rack. As another example, the rack beam 14401 may be a bottom rack beam that connects the smart rack 14400 with a bottom peer smart rack.

In some embodiments, the lateral guidance bar 14403 is secured to the rack beam 14401. For example, the lateral guidance bar 14403 may be secured to a middle portion of the rack beam 14401. In some embodiments, the lateral guidance bar 14403 may be secured to other portions of the rack beam 14401.

In some embodiments, the lateral guidance bar 14403 is in a perpendicular arrangement with the rack beam 14401. As such, the lateral guidance bar 14403 comprises an inner surface 14409 that faces rectangular prisms as the rectangular prisms move in and out of the smart rack 14400.

In some embodiments, the lateral guidance bar 14403 further comprises one or more movement guidance elements that facilitate the movement of the rectangular prisms between smart racks. For example, the lateral guidance bar 14403 may comprise at least one roller element disposed on the inner surface 14409 of the lateral guidance bar 14403. Additionally, or alternatively, the lateral guidance bar 14403 may comprise a first roller element 14407A disposed at a first end of the lateral guidance bar 14403 and a second roller element 14407B disposed at a second end of the lateral guidance bar 14403.

In some embodiments, the lateral guidance bar 14403 comprises a feedback sensor 14405 disposed on the inner surface 14409 of the lateral guidance bar 14403. In some embodiments, the feedback sensor 14405 is disposed in the middle of the inner surface 14409 of the lateral guidance bar 14403. In some embodiments, the feedback sensor 14405 is disposed on another portion of the inner surface 14409 of the lateral guidance bar 14403.

As described above, the inner surface 14409 of the lateral guidance bar 14403 faces rectangular prisms as they move in and out of the smart rack 14400. As described above, the rack beam 14401 secured the smart rack 14400 to a peer smart rack, and the lateral guidance bar 14403 is in a perpendicular arrangement with the rack beam 14401. As such, in some embodiments, the feedback sensor 14405 is positioned between the smart rack 14400 and a neighboring peer smart rack (for example, a top peer smart rack that is secured to the top of the smart rack 14400, a bottom peer smart rack that is secured to the bottom of the smart rack 14400, a left peer smart rack that is secured to the left of the smart rack 14400, a right peer smart rack that is secured to the right of the smart rack 14400, a front peer smart rack that is secured to the front of the smart rack 14400, and/or a back peer smart rack that is secured to the back of the smart rack 14400).

In some embodiments, the feedback sensor 14405 is configured to generate one or more rectangular prism detection signals. For example, the feedback sensor 14405 may comprise one or more object detection sensors. Examples of object detection sensors include, but are not limited to, proximity sensors, infrared sensors, ultrasonic sensors, photoelectric sensors, and/or the like. In some embodiments, the rectangular prism detection signals generated by the feedback sensor 14405 may comprise one or more of the object detection sensors described above that detect whether there is a rectangular prism between the smart rack 14400 and a neighboring peer smart rack (for example, a top peer smart rack that is secured to the top of the smart rack 14400, a bottom peer smart rack that is secured to the bottom of the smart rack 14400, a left peer smart rack that is secured to the left of the smart rack 14400, a right peer smart rack that is secured to the right of the smart rack 14400, a front peer smart rack that is secured to the front of the smart rack 14400, and/or a back peer smart rack that is secured to the back of the smart rack 14400).

In some embodiments, the feedback sensor 14405 transmits the rectangular prism detection signal to a controller (for example, a modular superstructure controller, a motor controller, and/or the like). In some embodiments, based on the rectangular prism detection signal, the controller (for example, a modular superstructure controller, a motor controller, and/or the like) may determine whether to actuate one or more motors in the neighboring peer smart rack. For example, if the rectangular prism detection signal indicates that there is a rectangular prism between the smart rack and a neighboring peer smart rack, the controller (for example, a modular superstructure controller, a motor controller, and/or the like) may transmit a control signal to actuate the one or more motors in the neighboring peer smart rack. If the rectangular prism detection signal indicates that there is no rectangular prism between the smart rack and a neighboring peer smart rack, the controller (for example, a modular superstructure controller, a motor controller, and/or the like) may transmit a control signal to stop the one or more motors in the neighboring peer smart rack.

There are many technical challenges and difficulties associated with implementing modular superstructures to transport rectangular prisms between smart racks. For example, modular superstructures may utilize motors to cause movements of the rectangular prisms between smart racks. However, many methods set the same speed for moving different rectangular prisms with different weights, which may cause unnecessary power consumption (for example, moving a heavy rectangular prism at a speed that results in excessive power consumption).

Various embodiments of the present disclosure overcome these technical challenges and difficulties, and provide various technical improvements and advantages. For example, various embodiments of the present disclosure optimize the movement speed of the rectangular prism based on the weight associated with the rectangular prism.

Referring now to FIG. 145, an example method 14500 in accordance with some embodiments of the present disclosure is illustrated. In particular, FIG. 145 illustrates an example method that generates motor maintenance recommendation indications in accordance with some embodiments of the present disclosure.

It is noted that each block of the flowchart, and combinations of blocks in the flowchart, may be implemented by various means such as hardware, firmware, circuitry and/or other devices associated with execution of software including one or more computer program instructions. For example, one or more of the procedures may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

In the example shown in FIG. 145, the example method 14500 starts at step/operation 14501. In some embodiments, subsequent to step/operation 14501, the example method 14500 proceeds to step/operation 14503. At step/operation 14503, the example method 14500 comprises receiving a rectangular prism weight parameter associated with a rectangular prism.

In some embodiments, the rectangular prism weight parameter indicates a weight value associated with the rectangular prism. In some embodiments, the rectangular prism weight parameter may be generated by a weight sensor (for example, a weight sensor positioned at the ingress point of the modular superstructure) and received by a modular superstructure controller. In such an example, an operator may place the rectangular prism on the weight sensor for the weight sensor to generate the rectangular prism weight parameter.

While the description above provides an example of generating the rectangular prism weight parameter, it is noted that the scope of the present disclosure is not limited to the description above. In some examples, an example method may generate a rectangular prism weight parameter with one or more additional and/or alternative steps/operations.

For example, each rectangular prism is associated with a rectangular prism identifier. In some embodiments, based on the rectangular prism identifier, the modular superstructure controller may retrieve the rectangular prism weight parameter from a database. As an example, a barcode may be affixed on the rectangular prism. In such an example, an operator may scan the barcode using a barcode scanner, and the barcode scanner may decode the barcode to determine the rectangular prism identifier associated with the rectangular prism. Subsequently, the barcode scanner transmits the rectangular prism identifier to the modular superstructure controller, and the modular superstructure controller determines the rectangular prism weight parameter based on the rectangular prism identifier.

Referring back to FIG. 145, subsequent to step/operation 14503, the example method 14500 proceeds to step/operation 14505. At step/operation 14505, the example method 14500 comprises retrieving a movement speed profile data object associated with the rectangular prism.

In some embodiments, a modular superstructure controller may be in data communications with a data storage device that stores a plurality of movement speed profile data objects. In some embodiments, each of the plurality of movement speed profile data objects is associated with a rectangular prism identifier. In some embodiments, the modular superstructure controller retrieves the movement speed profile data object based on the rectangular prism identifier associated with the rectangular prism.

In some embodiments, the movement speed profile data object comprises a plurality of assigned movement speed parameters correlating to a plurality of assigned rectangular prism weight parameters. In some embodiments, each assigned rectangular prism weight parameter indicates a weight associated with the rectangular prism. In some embodiments, each assigned movement speed parameter indicates a movement speed associated with the rectangular prism. In some embodiments, each assigned rectangular prism weight parameter is associated with an assigned movement speed parameter.

In some embodiments, the movement speed profile data object comprises a plurality of assigned movement speed parameter ranges correlating to a plurality of assigned rectangular prism weight parameter ranges. In some embodiments, each assigned rectangular prism weight parameter range indicates a range of rectangular prism weight parameters associated with the rectangular prism. In some embodiments, each assigned movement speed parameter range indicates a range of movement speed associated with the rectangular prism. In some embodiments, each assigned rectangular prism weight parameter range is associated with an assigned movement speed parameter range.

As an example, an example movement speed profile data object may comprise a first assigned rectangular prism weight parameter range of 10 to 15 pounds, and a second assigned rectangular prism weight parameter range of 15 to 25 pounds. In such an example, the first assigned rectangular prism weight parameter range is smaller than the second assigned rectangular prism weight parameter range. As such, the assigned movement speed parameter range associated with the first assigned rectangular prism weight parameter range is higher than the assigned movement speed parameter range associated with the second assigned rectangular prism weight parameter range. In other words, when the rectangular prism is lighter, the movement speed of the rectangular prism is faster.

Referring back to FIG. 145, subsequent to step/operation 14505, the example method 14500 proceeds to step/operation 14507. At step/operation 14507, the example method 14500 comprises determining a movement speed parameter based at least in part on the rectangular prism weight parameter and the movement speed profile data object.

For example, the modular superstructure controller may select the movement speed parameter based on the assigned movement speed parameter from the movement speed profile data object that corresponds to the rectangular prism weight parameter.

Additionally, or alternatively, the modular superstructure controller may select a movement speed parameter from an assigned movement speed parameter range from the movement speed profile data object that corresponds to the assigned the rectangular prism weight parameter range (within which the rectangular prism weight parameter received at step/operation 14503 falls).

Referring back to FIG. 145, subsequent to step/operation 14507, the example method 14500 proceeds to step/operation 14509. At step/operation 14509, the example method 14500 comprises transmitting the movement speed parameter to a motor associated with the rectangular prism.

In some embodiments, the motor causes a movement of the rectangular prism according to the movement speed parameter determined at step/operation 14507.

As such, various embodiments of the present disclosure may optimize the movement speed of the rectangular prism based on the weight of the rectangular prism. For example, if the rectangular prism is lighter, the movement speed of the rectangular prism is faster. If the rectangular prism is heavier, the movement speed of the rectangular prism is slower.

Referring back to FIG. 145, subsequent to step/operation 14509, the example method 14500 proceeds to step/operation 14511 and ends.

There are many technical challenges and difficulties associated with implementing modular superstructures to transport rectangular prisms between smart racks. For example, modular superstructures may utilize motors to cause movements of the rectangular prisms. In such an example, the motors may be actuated based on control parameters. However, many control parameters for the motors are not optimized to cause movements of particular rectangular prisms.

Various embodiments of the present disclosure overcome these technical challenges and difficulties, and provide various technical improvements and advantages. For example, regarding the motors involved with directly transporting the rectangular prisms, various embodiments of the present disclosure provide the ability to calibrate motor control as a function of detected weight/load of the rectangular prism. As such, various embodiments of the present disclosure allow for optimization of motor control parameters (such as, but not limited to, motor speed/torque) per each tote's movement, therefore providing optimization of tote travel speed between smart racks of the modular superstructure. Various embodiments of the present disclosure may apply calibrated motor control values to software simulations to refine algorithms with more precise speed estimates, details of which are described herein.

Referring now to FIG. 146, an example method 14600 in accordance with some embodiments of the present disclosure is illustrated. In particular, FIG. 146 illustrates an example method that generates motor maintenance recommendation indications in accordance with some embodiments of the present disclosure.

It is noted that each block of the flowchart, and combinations of blocks in the flowchart, may be implemented by various means such as hardware, firmware, circuitry and/or other devices associated with execution of software including one or more computer program instructions. For example, one or more of the procedures may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

In the example shown in FIG. 146, the example method 14600 starts at step/operation 14601. In some embodiments, subsequent to step/operation 14601, the example method 14600 proceeds to step/operation 14603. At step/operation 14603, the example method 14600 comprises receiving a rectangular prism weight parameter associated with a rectangular prism.

In some embodiments, the rectangular prism weight parameter indicates a weight value or a load value associated with the rectangular prism.

In some embodiments, the rectangular prism weight parameter may be received by a modular superstructure controller. Additionally, or alternatively, the rectangular prism weight parameter may be received by a motor controller.

Referring back to FIG. 146, subsequent to step/operation 14603, the example method 14600 proceeds to step/operation 14605. At step/operation 14605, the example method 14600 comprises receiving a detected motor control parameter associated with a motor.

In some embodiments, the motor causes a movement of the rectangular prism. For example, the motor may actuate an arm secured to a smart rack. In such an example, the arm may engage with the rectangular prism to cause the movement of the rectangular prism, similar to those described above.

In some embodiments, the detected motor control parameter indicates one or more of a detected motor speed or a detected motor torque of the motor.

For example, the detected motor speed indicates a magnitude of the rotational velocity of the motor shaft. The higher the motor speed, the higher the output power of the motor, and the more force exerted to the rectangular prism by the arm.

Additionally, or alternatively, the detected motor torque indicates an amount of rotational force that the motor develops. The higher the motor torque, the higher the output power of the motor, and the more force exerted to the rectangular prism by the arm In some embodiments, the detected motor control parameter associated with the motor may be generated by a speed detector or a torque detector. In such an example, the speed detector or the torque detector transmits the detected motor control parameter to the modular superstructure controller or the motor controller.

Referring back to FIG. 146, subsequent to step/operation 14605, the example method 14600 proceeds to step/operation 14607. At step/operation 14607, the example method 14600 comprises generating a calibrated motor control parameter associated with the motor based at least in part on the detected motor control parameter.

In some embodiments, the calibrated motor control parameter equals the detected motor control parameter, and is associated with the rectangular prism weight parameter received at step/operation 14603. In such an example, the modular superstructure controller (or the motor controller) associate the weight of the rectangular prism with the control parameter of the motor, therefore dynamically calibrating the control of the motor based on the weight of the rectangular prism.

In some embodiments, the calibrated motor control parameters may be stored in a data storage device that is accessible by the modular superstructure controller (or the motor controller). In some embodiments, when the motor is activated to cause a movement of another rectangular prism, the modular superstructure controller (or the motor controller) may determine a rectangular prism weight parameter associated the rectangular prism, and determine the calibrated motor control parameter that corresponds to the rectangular prism weight parameter. In some embodiments, the modular superstructure controller (or the motor controller) activates the motor based on the calibrated motor control parameter, such that the motor can provide sufficient force to cause an movement of the rectangular prism.

Referring back to FIG. 146, subsequent to step/operation 14607, the example method 14600 proceeds to step/operation 14609 and ends.

In some embodiments, the modular superstructure controller (or the motor controller) may generate a minimum motor control parameter associated with each rectangular prism weight parameter. For example, subsequent to receiving the rectangular prism weight parameter associated with the rectangular prism, the modular superstructure controller (or the motor controller) may cause gradual increase of the motor control parameters (for example, gradually increasing the motor speed or the motor torque) until the motor causes the arm to move the tote. In such an example, the modular superstructure controller (or the motor controller) may assign the motor control parameter that triggered the movement of the rectangular prism as the calibrated motor control parameter, providing optimized motor speed/torque per each rectangular prism's movement.

Referring now to FIG. 147, an example method 14700 in accordance with some embodiments of the present disclosure is illustrated. In particular, FIG. 147 illustrates an example method that generates motor maintenance recommendation indications in accordance with some embodiments of the present disclosure.

It is noted that each block of the flowchart, and combinations of blocks in the flowchart, may be implemented by various means such as hardware, firmware, circuitry and/or other devices associated with execution of software including one or more computer program instructions. For example, one or more of the procedures may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

In the example shown in FIG. 147, the example method 14700 starts at step/operation 14702. In some embodiments, subsequent to step/operation 14702, the example method 14700 proceeds to step/operation 14704. At step/operation 14704, the example method 14700 comprises receiving a plurality of detected motor control parameters associated with the motor.

In some embodiments, the plurality of detected motor control parameters associated with the motor is received at a plurality of detection time points. For example, the plurality of detected motor control parameters may be detected between sample time intervals. In some embodiments, the detected motor control parameters are generated similar to those described above in connection with at least step/operation 14605 of FIG. 146.

Referring back to FIG. 147, subsequent to step/operation 14704, the example method 14700 proceeds to step/operation 14706. At step/operation 14706, the example method 14700 comprises receiving a plurality of detected movement speed parameters associated with the rectangular prism.

In some embodiments, the modular superstructure may comprise one or more speed sensors that generate detected speed indications associated with the rectangular prism.

In some embodiments, the plurality of detected movement speed parameters are associated with the plurality of detection time points described above. For example, each detection time point of the plurality of detection time points is associated with a detected movement speed of the rectangular prism and a detect motor control parameter of the motor.

Referring back to FIG. 147, subsequent to step/operation 14706, the example method 14700 proceeds to step/operation 14708. At step/operation 14708, the method 14700 comprises generating one or more motor control correlation parameters based at least in part on the plurality of detected movement speed parameters and the plurality of detected motor control parameters.

In some embodiments, each of the one or more motor control correlation parameters indicate an estimated correlation between one of the detected motor control parameters and one of the plurality of movement speed parameters. In some embodiments, the motor control correlation parameters are further associated with the rectangular prism weight parameter associated with rectangular prism.

As such, various embodiments of the present disclosure may dynamically calibrate the control of the motor to optimize the travel speed. For example, when the motor is activated to cause movement of the rectangular prism, the modular superstructure controller (or the motor controller) may assign a movement speed for the rectangular prism, and determine the motor control parameter corresponding to the movement speed to optimize the travel of the rectangular prism between smart racks.

While the description above provides an example of generating one or more motor control correlation parameters, it is noted that the scope of the present disclosure is not limited to the description above. For example, in some embodiments, the detected motor control parameters and the detected movement speed parameters are provided to a simulation software.

Referring back to FIG. 147, subsequent to step/operation 14708, the example method 14700 proceeds to step/operation 14710 and ends.

Various embodiments of the present disclosure provide improved smart rack(s) having a display, improved optimized storing of totes in a modular superstructure, and improved propagation of message transmissions between smart racks of a modular superstructure.

Embodiments of the present disclosure provide for various advantageous models in a modular superstructure and technical advantages in manipulating one or more totes, specifically utilizing the modular superstructure. Specifically, embodiments of the present disclosure provide for effective and efficient propagation of message transmissions between smart racks of a modular superstructure. In various contexts, smart racks of and/or associated with traversal of totes via a modular superstructure may be disposed significantly in proximity to one another, for example next to one another, such that traversal is performed by manipulating a tote to pass the tote from one model (e.g., a smart rack) to the next. Attempting wireless communication via the plurality of models forming a modular superstructure may be impossible or impractical, for example where such wireless communication causes significant electronic interference that makes wireless transmission impossible to achieve reliably. Wired connections may thereby be utilized, however particular arbitrary wired transmission methodologies may be inefficient, and direct communication with each model of the modular superstructure may be impractical or impossible due to limitations on connectivity, cost, and the like. Embodiments of the present disclosure utilize particular message transmission propagation methodologies to enable transmission between models in a manner that efficiently routes such message transmissions even when utilizing wired connections between models of a modular superstructure.

Some embodiments of the present disclosure further provide for efficient manipulation and storage of totes via a modular superstructure including models embodying at least a plurality of smart racks. In such a modular superstructure, totes maintained in an arbitrary or random manner may lead to inefficiencies and/or problems, such as substantial blockages, in manipulating totes during subsequent actions (e.g., egress of a particular tote). Embodiments of the present disclosure utilize one or more particular sorting algorithm(s) to arrange and/or otherwise organize totes within a modular superstructure. In some embodiments, the sorting algorithm(s) are utilized to identify a particular location (e.g., corresponding to a particular smart rack) at which a tote is to be traversed for storage and/or subsequent manipulation. In some embodiments, the sorting algorithm(s) optimize for one or more target parameter(s), for example based at least in part on egress location of the tote to minimize distance to the egress location. In this regard, such embodiments improve the efficiency at which totes may be positioned within a modular superstructure for storage and/or from a particular location within the modular superstructure.

Some embodiments of the present disclosure further provide for improved models for use in, of, or otherwise associated with a modular superstructure. In some contexts, operations of a modular superstructure may be monitored from a particular external system, for example a control system, to enable visualization of operation of the modular superstructure, monitoring for error(s), and/or the like. In some contexts, however, it may be desirable to view one or more portion(s) of data when engaging directly with a modular superstructure, for example where the external system utilized for monitoring cannot be accessed from nearby the modular superstructure. Some embodiments utilize one or more displays disposed on or associated with one or more model(s) of the modular superstructure to enable rendering of information to the displays, such that this information may be viewed by a user currently located at or within proximity of the modular superstructure. In some such embodiments, particular data may be rendered to the display, for example that is particularly of importance to the user that has visibility of the display. Such data may include status data associated with one or more model(s) of the modular superstructure, data associated with tote(s) currently being manipulated by the modular superstructure, data associated with tote(s) being ingressed or egressed at a particular location, and/or the like.

The term "routing" refers to an algorithmic and/or computer-implemented process for transmitting data between device(s), system(s), model(s), and/or other computer(s).

The term "model" refers to one or more computing device(s) embodied in hardware, software, firmware, and/or a combination thereof, that facilitates traversal of a tote to, or within, a modular superstructure. Non-limiting examples of a model include a smart rack of a modular superstructure, a smart conveyor that routes to the modular superstructure, and/or a picker external from the modular superstructure.

The term "model location" refers to electronically managed data that identifies a location of a model or other identifier of another location of a model in a modular superstructure or with respect to a modular superstructure.

The term "modular superstructure" refers to a plurality of smart racks arranged for traversing of a tote in one or more direction(s). In some embodiments, a modular superstructure includes a plurality of smart racks that cooperate for traversing of one or more tote(s) in any cardinal direction.

The term "message transmission" refers to electronically managed data for processing by a particular model that facilitates operation of the model, reports operation of another model, and/or facilitates visualization of operation of a particular model.

The term "payload" with respect to a message transmission refers to a content portion of the message transmission for execution, storing, and/or otherwise processing by a target model associated with the message transmission.

The term "target model" refers to a particular model corresponding to receiving a particular message transmission.

The term "target model location data" refers to electronically managed data within a message transmission that indicates a location or other identifier of a model intended to process a message transmission.

The terms "target model coordinate" or "target message coordinate" refer to a data value of a target model location data that represents a quantifiable location of the target model in a particular dimension. Non-limiting examples of a target model coordinate include an X coordinate value, a Y coordinate value, and a Z coordinate value.

The term "target model location portion" with respect to a message transmission refers to an identifiable portion of a message transmission that includes at least target model location data for that message transmission.

The term "location reached data" refers to electronically managed data that indicates whether a model location associated with a model matches target model location data for a particular message transmission.

The term "direction" with respect to a modular superstructure refers to a real-world dimension in which a tote may be traversed via a model of or associated with the modular superstructure. The term "positive direction" represents a first direction of the dimension, and the term "negative direction" represents a second direction that is opposite along the dimension.

The term "peer model" with respect to a first model refers to a second model to which the first model is capable of traversing a tote. In some embodiments, a first model is capable of being coupled with a peer model in a first positive direction, and a second negative direction, for each direction in which the model can traverse a tote.

The term "availability" with respect to a particular peer model refers to electronically managed data that indicates whether the peer model exists and/or is currently operational to receive and/or traverse a tote.

The term "track" with respect to a peer model refers to maintaining electronically managed data that indicates whether the peer model in a particular direction exists and/or is currently available.

The term "propagation" refers to transmission of a message transmission from a first model to another model of or associated with a modular superstructure, where the first model is not an intended target model for consuming the message transmission.

The term "external" with respect to a modular superstructure refers to at least one device embodied in hardware, software, firmware, and/or a combination thereof, that is separate from the models embodying the modular superstructure where the at least one device is communicable with at least one model of the modular superstructure.

The term "control system" refers to hardware, software, firmware, and/or any combination thereof, that communicates with one or more model(s) of a modular superstructure to control operation of one or more model(s) of the modular superstructure, receive data reporting operation of one or more model(s) of a modular superstructure, and/or visualize simulated operation of one or more model(s) of a modular superstructure.

The term "action" with respect to a model refers to a particular computer-implemented process executable by the model to cause operation of the model in a particular manner.

The term "ingress location" refers to electronically managed data associated with a location of a particular model of a modular superstructure, where the model is configured to ingress a tote into the modular superstructure.

The term "egress location" refers to electronically managed data associated with a location of a particular model of a modular superstructure, where the model is configured to egress a tote out of the modular superstructure.

The term "shared egress location" refers to electronically managed data representing a particular egress location determined from one or more message transmission(s) to be utilized to egress a plurality of separate totes.

The term "sorting algorithm" refers to at least one algorithm that arranges one or more tote(s) within a modular superstructure based at least in part on data-driven determination(s) and/or optimization of one or more target metric(s).

The term "traverse" with respect to a tote refers to an action performed via one or more model(s) that physically moves a tote in the real-world from a starting position to an ending position. In some embodiments, traversal of a tote includes movement of the tote via multiple smart rack(s) of the modular superstructure.

The term "distance" with respect to a plurality of locations refers to electronically managed data representing a number of units. number of models, number of steps to be performed, or other quantitative measure representing a length or time required to move a tote from the first location to the second location.

The term "grouped" with respect to a plurality of totes refers to a linking of data uniquely identifying totes based at least in part on one or more shared characteristic(s) and/or other determination(s) associated with each of the plurality of totes.

The term "customer identifier" with respect to a particular tote refers to electronically managed data that uniquely identifies a particular entity to receive the particular tote or particular item(s) within the particular tote.

The term "product category" with respect to a particular tote refers to electronically managed data that represents a classification of items within the particular tote.

The term "expiration date" with respect to a particular tote refers to electronically managed data that represents a date where one or more item(s) within the particular tote are unusable.

The term "order" with respect to a plurality of totes refers to a quantitative arrangement of each tote in the plurality of totes based at least in part on comparison or arrangement a timestamp or other data value identified or derived from at least one message transmission associated with the tote. In some embodiments, an order with respect to a plurality of totes is defined from earliest received tote message associated with a tote to latest received tote message associated with a tote, such that tote messages are processed in the order in which they are received.

The term "display" refers to any visual output that enables the depiction of, visual rendering of, or other representation of particular data. Non-limiting examples of a display include a monitor, a television, an integrated touch-adaptive display, a digital screen, and an electronic paper.

The term "tote data" with respect to a particular tote refers to electronically managed data associated with a message transmission corresponding to the particular tote, electronically managed data associated with traversal or other manipulation of the particular tote via a modular superstructure, and/or electronically managed data associated with items within the particular tote.

The term "status data" refers to electronically managed data representing an operational status of functionality of a particular model of or associated with a modular superstructure, and/or a current action being performed by one or more models of or associated with a modular superstructure. In some embodiments, status data represents a high-level summary of an operational status (e.g., "normal" versus "error" states of operation), and is associated with "detail data" that refers to electronically managed data representing a specific cause or other data-driven determination associated with current status data.

FIG. 148 illustrates a block diagram 14800 of a system that may be specially configured within which embodiments of the present disclosure may operate. Specifically, FIG. 148 illustrates a superstructure controller & monitoring system 14802 in communication with an example modular superstructure 14804. Optionally, in some embodiments the superstructure controller & monitoring system 14802 communicates with a client device 14806.

In some embodiments, the modular superstructure 14804 includes one or more model(s) that manipulate, ingress, store, and/or egress one or more totes. In some embodiments, each tote embodies a rectangular prism. To achieve such functionality, the example modular superstructure 14804 includes at least a plurality of smart racks, such as at least the smart rack 14804A, smart rack 14804B, and smart rack 14804C, that are configured to manipulate and/or otherwise move rectangular prisms throughout the modular superstructure 14804. In some embodiments, the models of the modular superstructure 14804, for example at least the plurality of smart racks 14804A, 14804B, and 14804C, communicate between one another to enable propagation of a message transmission, or plurality of message transmissions, to a target model for consuming each message transmission.

In some embodiments, the superstructure controller & monitoring system 14802 comprises one or more computer(s), server(s), controller(s), and/or other device(s). The superstructure controller & monitoring system 14802 in some embodiments is configured for controlling the models of the modular superstructure 14804 and/or monitoring of the statuses of the models of the modular superstructure 14804. For example, in some embodiments, the superstructure controller & monitoring system 14802 may receive, access, or otherwise determine a rectangular prism, such as a target rectangular prism, and an egress point for that rectangular prism. In response, the superstructure controller & monitoring system 14802 may determine, input, and/or otherwise generate and/or transmit message transmission(s)

that provide instructions to one or more smart rack(s) or other model(s) of the modular superstructure 14804 in such a way to cause traversal of a tote throughout the modular superstructure. For example, a tote may be manipulated via the smart racks throughout the modular superstructure 14804 from an ingress location to a particular target location for storage, and/or from a particular storage location or ingress location to a particular egress location. In some embodiments, the superstructure controller & monitoring system 14802 transmit message transmission(s) to one or more processing circuitries of the one or more smart rack(s) in the modular superstructure 14804 to facilitate movement instructions for such smart rack(s). For example, in some embodiments the superstructure controller & monitoring system 14802 generates and transmits a tote plan embodying one or more message transmission(s) that indicate instructions for moving a tote throughout the modular superstructure 14804. The smart racks of the modular superstructure 14804 may propagate the messages to one another via transmission, where one or more smart rack(s) consume a message transmission to cause one or more arms of the smart rack actuators to move the rectangular prism in a particular manner.

In some embodiments, the superstructure controller & monitoring system 14802 generates message transmission(s) for positioning tote(s) in the modular superstructure 14804. In some embodiments, the superstructure controller & monitoring system 14802 performs one or more sorting algorithm(s) that generate target location(s) for one or more tote(s). Additionally, or alternatively, in some embodiments, the superstructure controller & monitoring system 14802 generates message transmission(s) based at least in part on generated target location(s) and/or the like. The superstructure controller & monitoring system 14802 may generate a tote plan including one or more of such message transmission(s) that is transmitted to the modular superstructure 14804 via one or more model(s) thereof.

In some embodiments, the superstructure controller & monitoring system 14802 may transmit message transmission(s) to the modular superstructure 14804 for consumption by one or more smart rack(s) thereof. For example, in some embodiments, the superstructure controller & monitoring system 14802 is directly communicable over one or more communications networks. The superstructure controller & monitoring system 14802 may transmit message transmission(s) to a particular model of the modular superstructure 14804, for example a particular smart rack that is connected via a wired connection with the superstructure controller & monitoring system 14802, such as the smart rack 14804A. In this regard, the particular smart rack 14804A may propagate such message transmission(s) to other smart rack(s) connected with the smart rack 14804A, for example towards a target location corresponding to a model for consuming the message transmission.

In some embodiments, the plurality of models in the modular superstructure 14804 generate a significant amount of electrical noise. Such electrical noise in some embodiments somewhat or significantly diminishes capabilities for transmission to and/or from the modular superstructure 14804 via wireless communications. Additionally, or alternatively, in some embodiments, the electrical noise generated by the modular superstructure 14804 creates a faraday cage effect that significantly limits the effectiveness of wireless communications to and/or from models of the modular superstructure 14804. In this regard, effective wired communications are established to one or more smart rack(s) of the modular superstructure 14804 at particular location(s), and wired communications enable propagation between models of the modular superstructure 14804. In some embodiments, the models of the modular superstructure 14804 utilize one or more specially configured algorithm(s) to effectively and/or efficiently propagate such message transmission(s) as described herein.

In some embodiments, the superstructure controller & monitoring system 14802 includes one or more display(s), peripheral(s), input/output interface(s), and/or the like, that enables initiation of functionality of the superstructure controller & monitoring system 14802 and/or displaying of information maintained, generated, and/or otherwise outputted by the superstructure controller & monitoring system 14802. The optional client device 14806 includes hardware, software, firmware, and/or a combination thereof, that enables access to functionality of the superstructure controller & monitoring system 14802. In some embodiments, the client device 14806 embodies, for example and without limitation, an end user device, for example a smartphone, a tablet, a personal computer, a laptop, and/or the like. The client device 14806 may access one or more user-facing application(s), including a native application and/or a browser application accessing a particular web address, to communicate with the superstructure controller & monitoring system 14802 for providing such functionality. In some embodiments, the superstructure controller & monitoring system 14802 may communicate with the client device 14806 over a wired communications network, or in other embodiments the superstructure controller & monitoring system 14802 communicates with the client device 14806 over a wireless communications network, for example where the superstructure controller & monitoring system 14802 is located sufficiently distant from the modular superstructure 14804 to avoid any or significant interference from the modular superstructure 14804.

FIG. 149 illustrates a block diagram of an example optimized control apparatus that may be specially configured in accordance with at least an example embodiment of the present disclosure. Specifically, FIG. 149 depicts an example superstructure controller & monitoring apparatus 14900 ("apparatus 14900" specifically configured in accordance with at least some example embodiments of the present disclosure. In some embodiments, the superstructure controller & monitoring system 14802 and/or a subsystem thereof is embodied by one or more system(s), such as the apparatus 14900 as depicted and described in FIG. 149. The apparatus 14900 includes processor 14901, memory 14903, input/output circuitry 14906, communications circuitry 14908, message processing circuitry 14910, superstructure optimization circuitry 14912, and/or superstructure control circuitry 14914. In some embodiments, the apparatus 14900 is configured, using one or more of the sets of circuitries 14901, 14903, 14906, 14908, 14910, 14912, and/or 14914 to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 14900 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitries both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 14900 provide or supplement the functionality of another particular set of circuitry. For example, the processor 14901 in some embodiments provides processing functionality to any of the sets of circuitries, the memory 14903 provides storage functionality to any of the sets of circuitries, the communications circuitry 14908 provides network interface functionality to any of the sets of circuitries, and/or the like.

In some embodiments, the processor 14901 (and/or coprocessor or any other processing circuitry assisting or otherwise associated with the processor) is/are in communication with the memory 14903 via a bus for passing information among components of the apparatus 14900. In some embodiments, for example, the memory 14903 is non-transitory and may include, for example, one or more volatile and/or non-volatile memories. In other words, for example, the memory 14903 in some embodiments includes or embodies an electronic storage device (e.g., a computer readable storage medium). In some embodiments, the memory 14903 is configured to store information, data, content, applications, instructions, or the like, for enabling the apparatus 14900 to carry out various functions in accordance with example embodiments of the present disclosure.

The processor 14901 may be embodied in a number of different ways. For example, in some example embodiments, the processor 14901 includes one or more processing devices configured to perform independently. Additionally, or alternatively, in some embodiments, the processor 14901 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 14900, and/or one or more remote or "cloud" processor(s) external to the apparatus 14900.

In an example embodiment, the processor 14901 is configured to execute instructions stored in the memory 14903 or otherwise accessible to the processor. Alternatively, or additionally, the processor 14901 in some embodiments is configured to execute hard-coded functionality. As such, whether configured by hardware or software methods, or by a combination thereof, the processor 14901 represents an entity (e.g., physically embodied in circuitry) capable of performing operations according to an embodiment of the present disclosure while configured accordingly. Alternatively or additionally, as another example in some example embodiments, when the processor 14901 is embodied as an executor of software instructions, the instructions specifically configure the processor 14901 to perform the algorithms embodied in the specific operations described herein when such instructions are executed.

As one particular example embodiment, the processor 14901 is configured to perform various operations associated with generating optimized message transmission(s) and transmitting message transmission(s) to model(s) of a modular superstructure for execution. In some embodiments, the processor 14901 includes hardware, software, firmware, and/or a combination thereof, that performs one or more optimization processes that generate data, for example target location(s) and/or payload(s), for message transmission(s) to be transmitted to a modular superstructure. Additionally, or alternatively, in some embodiments, the processor 14901 includes hardware, software, firmware, and/or a combination thereof, that generate sorting algorithm(s) associated with at least one tote to generate a target location for each tote. Additionally, or alternatively, in some embodiments, the processor 14901 includes hardware, software, firmware, and/or a combination thereof, that generates optimized data values, such as the target location(s), for any of a myriad of message transmission(s).

In some embodiments, the apparatus 14900 includes input/output circuitry 14906 that provides output to the user and, in some embodiments, to receive an indication of a user input. In some embodiments, the input/output circuitry 14906 is in communication with the processor 14901 to provide such functionality. The input/output circuitry 14906 may comprise one or more user interface(s) and in some embodiments includes a display that comprises the interface(s) rendered as a web user interface, an application user interface, a user device, a backend system, or the like. In some embodiments, the input/output circuitry 14906 also includes a keyboard, a mouse, a joystick, a touch screen, touch areas, soft keys, a microphone, a speaker, or other input/output mechanisms. The processor 14901 and/or input/output circuitry 14906 comprising the processor may be configured to control one or more functions of one or more user interface elements through computer program instructions (e.g., software and/or firmware) stored on a memory accessible to the processor (e.g., memory 14903, and/or the like). In some embodiments, the input/output circuitry 14906 includes or utilizes a user-facing application to provide input/output functionality to a client device and/or other display associated with a user.

In some embodiments, the apparatus 14900 includes communications circuitry 14908. The communications circuitry 14908 includes any means such as a device or circuitry embodied in either hardware or a combination of hardware and software that is configured to receive and/or transmit data from/to a network and/or any other device, circuitry, or module in communication with the apparatus 14900. In this regard, in some embodiments the communications circuitry 14908 includes, for example, a network interface for enabling communications with a wired or wireless communications network. Additionally, or alternatively in some embodiments, the communications circuitry 14908 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 14908 includes circuitry for interacting with the antenna(s) and/or other hardware or software to cause transmission of signals via the antenna(s) or to handle receipt of signals received via the antenna(s). In some embodiments, the communications circuitry 14908 enables transmission to and/or receipt of data from the user device, one or more asset(s) or accompanying sensor(s), and/or other external computing device in communication with the apparatus 14900.

The message processing circuitry 14910 includes hardware, software, firmware, and/or a combination thereof, that supports receiving and processing of message transmission(s) associated with a particular modular superstructure. In some embodiments, the message processing circuitry 14910 includes hardware, software, firmware, and/or a combination thereof, that communicates with at least one model of a modular superstructure to receive message transmission(s) associated with the modular superstructure. In some embodiments, the message transmission(s) embody message(s) in a particular general message data format or a digital rendering data format, where the message transmission(s) indicate status(es) of model(s) in or associated with the modular superstructure and/or facilitate rendering of a digital twin of model(s) of the modular superstructure. Additionally, or alternatively, in some embodiments, the processor 14901 includes hardware, software, firmware, and/or a combination thereof, that extracts data from the received message(s) for storing and/or processing. Additionally, or alternatively, in some embodiments, the processor 14901 includes hardware, software, firmware, and/or a combination thereof, that generates message transmission(s). For example, in some embodiments the message transmission is generated based at least in part on data generated from one or more optimization process(es). In some embodiments, the message processing circuitry 14910 includes a separate processor, specially configured field programmable gate array (FPGA), or a specially programmed application specific integrated circuit (ASIC).

The superstructure optimization circuitry 14912 includes hardware, software, firmware, and/or a combination thereof, that supports optimization process(es) utilized in generating message transmission(s) for execution by a modular superstructure. In some embodiments, the superstructure optimization circuitry 14912 includes hardware, software, firmware, and/or any combination thereof, that generates optimized data for use in at least one particular message transmission. Additionally, or alternatively, in some embodiments, the superstructure optimization circuitry 14912 includes hardware, software, firmware, and/or any combination thereof, that applies a sorting algorithm associated with at least one tote to generate a target location for the tote. Additionally, or alternatively, in some embodiments, the superstructure optimization circuitry 14912 includes hardware, software, firmware, and/or any combination thereof, that generates a message transmission based at least in part on generated optimized data. Additionally, or alternatively, in some embodiments, the superstructure optimization circuitry 14912 includes hardware, software, firmware, and/or any combination thereof, that generates optimized data associated with a plurality of totes, where each portion of the optimized data associated with each tote is utilized in generating a message transmission associated with the particular message tote. In some embodiments, the superstructure optimization circuitry 14912 includes a separate processor, specially configured field programmable gate array (FPGA), or a specially programmed application specific integrated circuit (ASIC).

The superstructure control circuitry 14914 includes hardware, software, firmware, and/or a combination thereof, that supports optimization process(es) utilized in generating message transmission(s) for execution by a modular superstructure. In some embodiments, the superstructure control circuitry 14914 includes hardware, software, firmware, and/or any combination thereof, that generates a specially configured message transmission for consumption via a model of a modular superstructure. Additionally, or alternatively, the superstructure control circuitry 14914 includes hardware, software, firmware, and/or any combination thereof, that generates a message transmission including particular target model location data representing a generated target location for a particular tote. Additionally, or alternatively, the superstructure control circuitry 14914 includes hardware, software, firmware, and/or any combination thereof, that generates a message transmission including a particular payload associated with a particular tote. Additionally, or alternatively, the superstructure control circuitry 14914 includes hardware, software, firmware, and/or any combination thereof, that generates a tote plan including a plurality of messages optimized for positioning a plurality of totes within a modular superstructure. In some embodiments, the superstructure control circuitry 14914 includes a separate processor, specially configured field programmable gate array (FPGA), or a specially programmed application specific integrated circuit (ASIC).

Additionally, or alternatively, in some embodiments, two or more of the sets of circuitries 14901-14914 are combinable. Alternatively or additionally, in some embodiments, one or more of the sets of circuitries perform some or all of the functionality described associated with another component. For example, in some embodiments, two or more of the sets of circuitries 14901-14914 are combined into a single module embodied in hardware, software, firmware, and/or a combination thereof. Similarly, in some embodiments, one or more of the sets of circuitries, for example the message processing circuitry 14910, the superstructure optimization circuitry 14912, and/or the superstructure control circuitry 14914, is/are combined with the processor 14901, such that the processor 14901 performs one or more of the operations described above with respect to each of these sets of circuitries 14910-14914.

FIG. 150 illustrates a block diagram of an example model apparatus that may be specially configured in accordance with at least an example embodiment of the present disclosure. Specifically, FIG. 150 illustrates an example model apparatus 15000 ("apparatus 15000") specially configured in accordance with at least one example embodiment of the present disclosure. In some embodiments, a smart rack of a modular superstructure is embodied at least in part by one or more system(s), device(s), and/or the like, such as the apparatus 15000 as depicted and described in FIG. 150. The apparatus 15000 includes processor 15002, memory 15004, input/output circuitry 15006, communications circuitry 15008, message transmission circuitry 15010, message generation circuitry 15012, and message execution circuitry 15014. In some embodiments, the apparatus 15000 is configured, using one or more of the sets of circuitries 15002, 15004, 15006, 15008, 15010, 15012, and/or 15014, to execute and perform one or more of the operations described herein.

In some embodiments, the circuitry 15002-15008 functions similarly or identically to the similarly named sets of circuitries 14901-14914 as depicted and described with respect to the apparatus 14900 in FIG. 149. Additionally, or alternatively, in some embodiments, the processor 15002 includes hardware, software, firmware, and/or a combination thereof, that supports functionality performed by a smart rack for manipulating a tote, tracking a status of the tote and/or one or more related tote(s), and/or transmitting message(s) associated with the operation of the smart rack and/or associated smart rack(s). For purposes of brevity, repeated disclosure with respect to the functionality of such similarly-named sets of circuitries is omitted herewith.

In some embodiments, the apparatus 15000 includes message transmission circuitry 15010. The message transmission circuitry 15010 includes hardware, software, firmware, and/or a combination thereof, that supports various functionality associated with transmitting message transmission(s) between models of a modular superstructure and/or superstructure controller & monitoring system 14802. For example, in some embodiments, the message transmission circuitry 15010 includes hardware, software, firmware, and/or a combination thereof, that transmits at least one data transmission to any peer model of the apparatus 15000. Additionally, or alternatively, in some embodiments, the message transmission circuitry 15010 includes wired connection(s) to each peer model of the apparatus 15000. In some embodiments, the message transmission circuitry 15010 includes wired connection(s) to a superstructure controller & monitoring system 14802. Additionally, or alternatively, in some embodiments, the message transmission circuitry 15010 includes hardware, software, firmware, and/or a combination thereof, that performs a particular messaging protocol that identifies a particular peer model to which to propagate a message transmission. In some embodiments, the message transmission circuitry 15010 includes a separate processor, specially configured field programmable gate array (FPGA), or a specially programmed application specific integrated circuit (ASIC).

In some embodiments, the apparatus 15000 includes message generation circuitry 15012. The message generation circuitry 15012 includes hardware, software, firmware, and/or a combination thereof, that supports various functionality associated with generating a message transmission for transmitting. For example, in some embodiments, the message generation circuitry 15012 includes hardware, software, firmware, and/or a combination thereof, that generates a message transmission representing a current status of the apparatus 15000. Additionally, or alternatively, in some embodiments, the message generation circuitry 15012 includes hardware, software, firmware, and/or a combination thereof, that identifies particular target location(s) for a message transmission being generated by the apparatus 15000. In some embodiments, the message generation circuitry 15012 includes a separate processor, specially configured field programmable gate array (FPGA), or a specially programmed application specific integrated circuit (ASIC).

In some embodiments, the apparatus 15000 includes message execution circuitry 15014. The message execution circuitry 15014 includes hardware, software, firmware, and/or a combination thereof, that supports various functionality associated with executing a message transmission received by the apparatus 15000. For example, in some embodiments, the message execution circuitry 15014 includes hardware, software, firmware, and/or a combination thereof, that identifies a message payload from a message transmission received at the apparatus 15000. Additionally, or alternatively, in some embodiments, the message execution circuitry 15014 includes hardware, software, firmware, and/or a combination thereof, that extracts a message payload from a message transmission. Additionally, or alternatively, in some embodiments, the message execution circuitry 15014 includes hardware, software, firmware, and/or a combination thereof, that executes a computer-implemented process defined in the message payload. Additionally, or alternatively, in some embodiments, the message execution circuitry 15014 includes hardware, software, firmware, and/or a combination thereof, that initiates at least one computer-implemented process based at least in part on a message payload. In some embodiments, the message execution circuitry 15014 includes a separate processor, specially configured field programmable gate array (FPGA), or a specially programmed application specific integrated circuit (ASIC).

Additionally, or alternatively, in some embodiments, two or more of the sets of circuitries 15002-15014 are combinable. Alternatively or additionally, in some embodiments, one or more of the sets of circuitries perform some or all of the functionality described associated with another component. For example, in some embodiments, two or more of the sets of circuitries 15002-15014 are combined into a single module embodied in hardware, software, firmware, and/or a combination thereof. Similarly, in some embodiments, one or more of the sets of circuitries, for example the message transmission circuitry 15010, message generation circuitry 15012, and/or message execution circuitry 15014, is/are combined with the processor 15002, such that the processor 15002 performs one or more of the operations described above with respect to each of these sets of circuitries 15010-15014.

Having described example systems and apparatuses in accordance with the present disclosure, example data architectures, data environments, and data manipulations in accordance with the present disclosure will now be discussed. In some embodiments, the data environments, architectures, and manipulations are performed via one or more particular system(s) and/or device(s). For example, in some embodiments, the data environments, architectures, and manipulations are performed by the apparatus 14900.

FIG. 151 illustrates a flowchart depicting example operations for manipulating a tote via a modular superstructure in accordance with at least an example embodiment of the present disclosure. In some embodiments, the example operations are performed via a modular superstructure. For example, in some embodiments, various models of the modular superstructure cooperate to facilitate execution of the example operations as depicted and described. In some such embodiments, for example, the modular superstructure includes a plurality of models each embodying a smart rack, where each smart rack is embodied by an individual instance of the apparatus 15000.

At operation 15102, the flow includes ingressing a tote at a tote location. In some embodiments, the ingressing of a tote includes manipulation of a tote by a user, external model, and/or the like, in a manner that allows a particular tote to receive and/or begin manipulating the tote. In some embodiments, one or more particular smart rack(s) of the modular superstructure are designated for ingressing into the modular superstructure. In this regard, the tote location may correspond to location data identifying a particular model, such as a smart rack, that is configured for and/or designated for ingressing into the modular superstructure for subsequent manipulation.

At operation 15104, the flow includes sorting a tote to a particular target location. In some embodiments, the target location is determined via one or more sorting algorithm(s) that generate the target location for the tote. Upon determination of the target location, in some embodiments one or more message transmission(s) is/are generated that facilitate the manipulation of the tote from the ingress location to the target location. For example, in some embodiments, the tote is manipulated via one or more smart racks in accordance with particular generated message transmission(s) by consuming such message transmission(s) at one or more model(s). In some embodiments, the tote is sorted to a particular target location determined utilizing one or more sorting algorithm(s) as described herein.

At operation 15106, the flow includes egressing a tote from the target location to an egress location. In some embodiments, the egress location is defined in one or more message transmission(s) generated by a controller and/or the like for transmission to and execution by one or more model(s) of a modular superstructure. In some embodiments, the modular superstructure utilizes particular model(s) (e.g., smart racks) to manipulate the tote from its current location to the egress location. The tote may be egressed at a time subsequent to sorting and/or storage of the tote to the target location.

FIG. 152 illustrates example data components of a message transmission in accordance with at least an example embodiment of the present disclosure. Specifically, FIG. 152 depicts an example data architecture of an example message transmission, for example message transmission 15202. In some embodiments, the message transmission 15202 is generated by a controller, for example embodied by the apparatus 14900, for transmission to and/or consumption by one or more model(s) of a corresponding modular superstructure. For example, in some embodiments, the message transmission 15202 is transmitted from a controller, for example embodied by the apparatus 14900, to smart rack(s) of a modular superstructure for use in manipulating one or more totes via the smart racks of the modular superstructure.

The message transmission 15202 may include a plurality of data portions. In some embodiments, the message transmission 15202 includes at least an ingress location 15204 and an egress location 15206. In some embodiments, the ingress location 15204 represents a particular location of a model within a modular superstructure at which at least one tote is to be ingressed. In some embodiments, the ingress location 15204 is determined by a controller associated with a modular superstructure, for example embodied by the apparatus 14900. Additionally, or alternatively, in some embodiments, a user or other process is utilized to determine ingress location 15204 for the message transmission 15202 indicating where a tote is ingressed to a modular superstructure. Alternatively or additionally, in some embodiments, the message transmission 15202 is generated with a predetermined ingress location 15204.

In some embodiments, the egress location 15206 represents a particular location of a model within a modular superstructure at which at least one tote is to be egressed. In some embodiments, the egress location 15206 is determined by a controller associated with a modular superstructure, for example embodied by the apparatus 14900. For example, in some embodiments, the controller embodied by the apparatus 14900 determines the egress location based at least in part on one or more task(s) performed by the apparatus 14900. Additionally, or alternatively, in some embodiments, the message transmission 15202 is generated with a predetermined egress location 15206.

In some embodiments, the apparatus 14900 generates other data for the message transmission 15202 utilizing one or more previously determined data portions, for example the ingress location 15204 and/or egress location 15206. For example, in some embodiments the apparatus 14900 identifies and/or determines at least the ingress location 15204 and the egress location 15206 for use in generating at least a target location for a tote associated with the message transmission 15202. In some embodiments, the apparatus 14900 processes the ingress location 15204 and/or the egress location 15206 to generate a target location for at least one tote, and includes the target location in the message transmission 15202. Non-limiting examples of processes for generating a target location are described further herein.

FIG. 153 illustrates example data operations for generation of a target location using at least one sorting algorithm based at least on an egress location in accordance with at least an example embodiment of the present disclosure. In some embodiments, the apparatus 14900 performs the data operations as described. For example, in some embodiments the apparatus 14900 executes one or more software-driven and/or other computer-implemented process(es) to perform the data operations as described.

In some embodiments, the egress location 15302 is inputted into a sorting algorithm 15304. In some embodiments, the egress location 15302 is associated with at least one message transmission, for example as described with respect to message transmission 15202. The egress location 15302 may be predetermined or otherwise previously determined by the apparatus 14900, for example as part of a different computer-implemented process, retrieved from a database, inputted via a user associated with the apparatus 14900, and/or otherwise determined associated with a particular tote or plurality of totes.

In some embodiments, the egress location 15302 is inputted into a sorting algorithm 15304 to generate a target location 15306. In some embodiments, the target location 15306 embodies a location of a model in a modular superstructure where a particular tote is to be stored. For example, in some embodiments, the sorting algorithm 15304 is configured to minimize the distance between the target location 15306 and the egress location 15302. The distance may be minimized based at least in part on minimizing a number of steps to be performed by model(s) of the modular superstructure to achieve egress of a tote from the target location 15306 via the egress location 15302. Additionally, or alternatively, in some embodiments, the distance may be minimized based at least in part on a minimized number of time to perform steps by the model(s) of the modular superstructure to achieve egress of a tote from the target location 15306 via the egress location 15302. The sorting algorithm 15304 may be performed by any of a myriad of computer-implemented function(s), machine learning model(s), artificial intelligence model(s), algorithmic model(s), and/or the like.

FIG. 154 illustrates example data operations for generation of a target location using at least one sorting algorithm based at least on tote data in accordance with at least an example embodiment of the present disclosure. In some embodiments, the apparatus 14900 similarly and/or alternatively performs the data operations as described. For example, in some embodiments the apparatus 14900 executes one or more software-driven and/or other computer-implemented process(es) to perform the data operations as described.

In some embodiments, at least tote data 15402 is applied to the sorting algorithm 15406. In some such embodiments, the tote data 15402 includes characteristic(s) associated with a tote, item(s) in the tote, and/or the like. For example, in some embodiments, the tote data 15402 includes data representing SKU(s) of an item or items in a tote, an expiration date of item(s) in the tote, an expected shipping date or egress date for the tote, and/or the like. The tote data 15402 in some embodiments includes any data associated with item(s) within a corresponding tote. Additionally, or alternatively, in some embodiments, the tote data 15402 includes a particular tote identifier associated with the tote. Additionally, or alternatively still, in some embodiments, the tote data 15402 includes particular data associated with traversal and/or other manipulation of the tote via a modular superstructure, for example an ingress location at which the tote is to be ingressed to the modular superstructure.

In some embodiments, the tote data 15402 and optionally the egress location 15302 is inputted into a sorting algorithm 15406 to generate a target location 15408. In some embodiments, the optional egress location 15302 is associated with at least one message transmission, for example as described with respect to message transmission 15202. The egress location 15302 may be predetermined or otherwise previously determined by the apparatus 14900, for example as part of a different computer-implemented process, retrieved from a database, inputted via a user associated with the apparatus 14900, and/or otherwise determined associated with a particular tote or plurality of totes. In some embodiments, the egress location 15302 is utilized to minimize a distance from a target location to an egress location, for example as described with respect to FIG. 153.

In some embodiments, the target location 15408 embodies a location of a model in a modular superstructure where a particular tote is to be stored. For example, in some embodiments, the sorting algorithm 15406 is configured to position totes sharing one or more characteristics in a manner that groups such totes in a particular geofenced area of a modular superstructure. In some such embodiments, the sorting algorithm 15406 generates a target location 15408 representing a model location for a particular model to receive the tote corresponding to the tote data 15402, for example based at least in part on positioning of totes having particular characteristics represented in the tote data 15402 in particular geofenced areas of the modular superstructure. Additionally, or alternatively, the sorting algorithm 15406 may generate the target location 15408 such that totes are grouped while subsequently attempting to minimize distance to an egress location associated with the tote, for example represented by the egress location 15302. In some embodiments, the sorting algorithm 15406 includes or is embodied by any of a myriad of computer-implemented function(s), machine learning model(s), artificial intelligence model(s), algorithmic model(s), and/or the like.

FIG. 155 illustrates example data operations for generation of a target location using at least one sorting algorithm to optimize a target parameter in accordance with at least an example embodiment of the present disclosure. In some embodiments, the apparatus 14900 similarly and/or alternatively performs the data operations as described. For example, in some embodiments the apparatus 14900 executes one or more software-driven and/or other computer-implemented process(es) to perform the data operations as described.

In some embodiments, at least egress location 15504 is inputted into a sorting algorithm 15506. In some embodiments, the egress location 15504 is associated with at least one message transmission, for example as described with respect to message transmission 15202. The egress location 15504 may be predetermined or otherwise previously determined by the apparatus 14900, for example as part of a different computer-implemented process, retrieved from a database, inputted via a user associated with the apparatus 14900, and/or otherwise determined associated with a particular tote or plurality of totes.

In some embodiments, at least ingress location 15502 is inputted into the sorting algorithm 15506. The ingress location 15502 represents a particular location within a modular superstructure within which at least one tote is to be manipulated. In some embodiments, the ingress location 15502 is determined from tote data associated with a particular tote. Alternatively or additionally, in some embodiments, the ingress location 15502 may be predetermined or otherwise previously determined by the apparatus 14900, for example as part of a different computer-implemented process, retrieved from a database, inputted via a user associated with the apparatus, and/or otherwise determined associated with a particular tote or plurality totes.

In some embodiments, the ingress location 15502 and the egress location 15504 are applied to the sorting algorithm 15506. In some such embodiments, the ingress location 15502 and the egress location 15504 are applied to the sorting algorithm 15506 to generate a target location 15508. In some embodiments, the target location 15508 embodies a model location corresponding to a model of a modular superstructure at which a tote is to be positioned and/or stored. For example, in some embodiments, the sorting algorithm 15506 is configured to position totes based at least in part on optimization of one or more parameter(s). For example, in some embodiments, the apparatus 14900 utilizes the sorting algorithm 15506 to minimize a particular parameter 15510 distance traveled and/or minimize a number of moves performed for a particular tote during manipulation by a modular superstructure. In some such embodiments, the minimized parameter 15510 represents a minimized distance or total moves for traversing the tote from an ingress location 15502 to the target location 15508, and subsequently from the target location 15508 to the egress location 15504. In some embodiments, the sorting algorithm 15506 includes or is embodied by any of a myriad of computer-implemented function(s), machine learning model(s), artificial intelligence model(s), algorithmic model(s), and/or the like.

Having described example systems, apparatuses, data architectures, data environments, and data manipulations in accordance with the present disclosure, example visualization of tote sorting via a modular superstructure will now be discussed. In some embodiments, the example modular superstructure depicted is specially configured via one or more message transmission(s) to traverse one or more tote(s) based at least in part on the characteristics and/or configurations of the modular superstructure as depicted. For example, in some embodiments, the apparatus 14900 initiates and/or otherwise configures one or more aspect(s) of the modular superstructure and/or performance thereof.

FIG. 156 illustrates a visualization of an example modular superstructure in accordance with at least an example embodiment of the present disclosure. Specifically, FIG. 156 illustrates an example modular superstructure 15600. In some embodiments, the modular superstructure 15600 includes a plurality of models each embodying a smart rack. For example, in some such embodiments, the modular superstructure 15600 includes a plurality of smart racks arranged in a modular manner to define particular dimension in each dimension, forming a modular superstructure of a particular height, width, and length (e.g., in number of models defined in each dimension). In this regard, the modular superstructure 15600 may perform particular operations for manipulating tote(s) for traversal throughout and/or storage via the modular superstructure 15600.

In some embodiments, a modular superstructure includes one or more ingress location(s) at which a tote may be taken into the modular superstructure for subsequent manipulation. In some embodiments, an ingress location corresponds to a particular model of the modular superstructure at that particular location, for example a particular smart rack having at least one side facing externally to the modular superstructure for receiving tote(s). The modular superstructure 15600 includes a plurality of ingress locations, specifically the ingress locations 15602A and 15602B corresponding to particular smart racks at such locations. In some embodiments, the smart racks at ingress locations 15602A and/or 15602B are specially configured for ingress. Alternatively or additionally, in some embodiments, a controller, for example embodied by the apparatus 14900, maintains data indicating the coordinates of each of the ingress locations 15602A and 15602B.

In some embodiments, a modular superstructure includes one or more egress location(s) at which a tote may be removed from the modular superstructure. In some embodiments, an egress location corresponds to a particular model of the modular superstructure at that particular location, for example a particular smart rack having at least one side facing externally from the modular superstructure for egressing tote(s). The modular superstructure 15600 includes a plurality of egress locations 15604A, 15604B, 15604C, and 15604D corresponding to particular smart racks at such locations. In some embodiments, the smart racks at egress locations 15604A-15604D are specially configured for egress. Alternatively or additionally, in some embodiments, a controller, for example embodied by the apparatus 14900, maintains data indicating the coordinates of each of the egress locations 15604A-15604D. As illustrated, the egress locations are each located in the corner column of the modular superstructure 15600.

In some embodiments, a controller embodied by the apparatus 14900 generates and/or initiates performance of one or more message transmission(s) for manipulating a tote throughout the modular superstructure 15600. For example, the apparatus 14900 may generate message transmission(s) utilized in traversing tote(s) from an ingress location to an egress location. Additionally, or alternatively, in some embodiments, at least one message transmission is generated for use in storing a tote for any length of time at a particular target location in the modular superstructure 15600. In this regard, the message transmission(s) may be transmitted to and/or propagated between the models of the modular superstructure 14900 to enable consumption of the message transmission(s) for traversing one or more tote(s) via the modular superstructure.

In some embodiments, the controller embodied by the apparatus 14900 maintains one or more geofences for storing totes at particular locations within the geofence. For example, in some embodiments, a geofence includes or is defined by a set or range of model locations proximate to a particular egress location. As illustrated, the modular superstructure 15600 is associated with a first geofenced area 15606A corresponding to the egress location 15604A, a second geofenced area 15606B corresponding to the egress location 15604B, a third geofenced area 15606C corresponding to the egress location 15604C, and a fourth geofenced area 15606D corresponding to the egress location 15604D. In this regard, a tote may be positioned to a target location proximate to a particular egress location.

In some embodiments, a controller embodied by the apparatus 14900 generates target locations for storing one or more tote(s) based at least in part on an egress location. For example, in some embodiments, the apparatus 14900 generates target locations for one or more tote(s) in a manner that sorts the tote(s) in proximity to its corresponding egress location. Additionally, or alternatively, in some embodiments, the apparatus 14900 generates target locations that group particular totes having the same and/or similar characteristics. In some embodiments, totes are positioned in the modular superstructure 15600 to distribute different totes in a manner proximate to their relevant egress location(s), for example within the corresponding various geofenced areas 15606A-15606D. In this regard, upon determination of a target location for storing a particular tote (e.g., based at least in part on an egress location for the tote), the models of the modular superstructure may receive and consume message transmissions from the apparatus 14900 that facilitates traversal of the tote from a corresponding ingress location of ingress location 15602A or 15602B to the corresponding egress location of the egress locations 15604A-15604D.

Having described example systems, apparatuses, data architectures, data environments, data manipulations, and visualization of tote sorting via a modular superstructure in accordance with the present disclosure, example processes for tote sorting will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 157 illustrates a flowchart depicting example operations for determining efficient manipulation of a tote using a modular superstructure in accordance with at least an example embodiment of the present disclosure. In some embodiments, the process 15700 is embodied by computer program code stored on a non-transitory computer-readable storage medium of a computer program product configured for execution to perform the process as depicted and described. Alternatively or additionally, in some embodiments, the process 15700 is performed by one or more specially configured computing devices, such as the apparatus 14900 alone or in communication with one or more other component(s), device(s), system(s), and/or the like. In this regard, in some such embodiments, the apparatus 14900 is specially configured by computer-coded instructions (e.g., computer program instructions) stored thereon, for example in the memory 14903 and/or another component depicted and/or described herein and/or otherwise accessible to the apparatus 14900, for performing the operations as depicted and described. In some embodiments, the apparatus 14900 is in communication with one or more external apparatus(es), system(s), device(s), and/or the like, to perform one or more of the operations as depicted and described. For example, the apparatus 14900 in some embodiments is in communication with a separate modular superstructure, at least one model thereof, and/or the like. For purposes of simplifying the description, the process 15700 is described as performed by and from the perspective of the apparatus 14900.

The process 15700 begins at operation 15702. At operation 15702, the apparatus 14900 includes message processing circuitry 14910, superstructure optimization circuitry 14912, superstructure control circuitry 14914, communications circuitry 14908, input/output circuitry 14906, processor 14901, and/or the like, or a combination thereof, that identifies an ingress location in a modular superstructure. In some embodiments, the ingress location is associated with a particular tote. For example, in some embodiments, the tote is identified by a particular tote identifier. In some embodiments, the egress location is associated with a particular tote In some embodiments, the apparatus 14900 identifies a requested tote. For example, the requested tote may be received in response to an automatically performed process, determination, and/or the like, or in response to a user input. For example, in some embodiments, the apparatus 14900 identifies an ingress location associated with a tote based at least in part on a plan or other scheduled set of automatic and/or user-performed action(s). Additionally, or alternatively, in some embodiments, the apparatus 14900 identifies an ingress location based at least in part on a received message transmission from one or more model(s).

At operation 15704, the apparatus 14900 includes message processing circuitry 14910, superstructure optimization circuitry 14912, superstructure control circuitry 14914, communications circuitry 14908, input/output circuitry 14906, processor 14901, and/or the like, or a combination thereof, that applies at least the egress location to a sorting algorithm. In some embodiments, the apparatus 14900 applies the egress location to the sorting algorithm to generate a target location for the tote. In some embodiments, the sorting algorithm optimizes one or more parameter(s). For example, in some embodiments, the sorting algorithm minimizes a distance between the target location and the egress location associated with the tote. Additionally, or alternatively, in some embodiments, the apparatus 14900 applies one or more additional and/or alternative input(s) to the sorting algorithm, for example utilized to optimize one or more parameter(s) based on such input(s). In some embodiments, for example, the apparatus 14900 applies an ingress location to the sorting algorithm. The ingress location may be utilized to minimize the total distance and/or number of action(s) (e.g., moves) required to traverse the tote from the ingress location to the target location and/or the tote from the target location to the egress location. Alternatively or additionally, in some embodiments, the apparatus 14900 applies tote data to the sorting algorithm. The tote data may be utilized to ensure that totes associated with a shared characteristic are grouped.

At operation 15706, the apparatus 14900 includes message processing circuitry 14910, superstructure optimization circuitry 14912, superstructure control circuitry 14914, communications circuitry 14908, input/output circuitry 14906, processor 14901, and/or the like, or a combination thereof, that initiates traversal, via the modular superstructure, of the tote. The modular superstructure is utilized to initiate traversal of the tote to the target location from an ingress location. For example, in some embodiments, the apparatus 14900 generate(s) at least one message transmission. The at least one message transmission may be generated including at least data representing the ingress location and data representing the target location to which the tote is to be traversed. Additionally, or alternatively, in some embodiments, the at least one message transmission may be generated including data representing the egress location from which the tote is to be egressed. In some embodiments, the message transmission(s) include payload data utilized for execution by the models to traverse the tote throughout the modular superstructure. In some embodiments, the apparatus 14900 transmits the at least one message transmission to at least one model of the modular superstructure, for example at least one smart rack communicable with the apparatus 14900 over a wired connection, for execution, propagation, and/or other execution by the models of the modular superstructure.

In some embodiments, message transmissions are performed to and/or throughout a modular superstructure via wired connections. For example, in some embodiments the models of a modular superstructure generate electronic noise that prevents effective wireless transmission, and indeed requires wired communication between such model(s) and/or a corresponding controller. In some embodiments, each model routes message transmission(s) between one another to enable the efficient propagation of message transmission(s) between such models for consumption by a particular target model. In some such embodiments, each model of the modular superstructure includes a smart rack embodied by the apparatus 15000 as depicted and described herein.

FIG. 158 illustrates an example data architecture of a message transmission in accordance with at least an example embodiment of the present disclosure. Specifically, FIG. 158 illustrates an example specific implementation of data portions of an example message transmission 15800. It will be appreciated that in other embodiments, a message transmission may include other organization(s) and/or implementations of such data architecture of the data portions as depicted and described without changing the desired function(s) of such data portions.

The message transmission 15800 includes a target model location portion 15802. In some embodiments, the target model location portion 15802 includes target model location data and at least one data value, character, and/or portion usable to parse the target model location portion 15802. For example, as illustrated, the target model location portion 15802 includes at least the target model location data 15804 and a delimiter value 15806.

As illustrated, the delimiter value 15806 comprises a carriage return character. Additionally, or alternatively, the delimiter value 15806 comprises a line break character that separates the target model location portion 15802. In this regard, in some such embodiments, a device, apparatus, model, and/or the like, for example embodied by the apparatus 15000, may parse the target model location portion 15802 from the message transmission 15800 by parsing a first line of the content of message transmission 15800. In other embodiments, the delimiter value 15806 includes one or more other reserved character, term, phrase, or other data portion usable to parse data before a portion of data before and/or between delimiter values, where such data embodies the target model location data 15804.

In some embodiments, the target model location data 15804 represents a location corresponding to a particular model designated for consumption of the message transmission 15800. In some embodiments, the target model location data 15804 includes a coordinate in each dimension of a coordinate system in which a model of a modular superstructure is positioned. For example, as illustrated, the target model location data 15804 includes an (X, Y, Z) coordinate tuple, where the X coordinate represents a position of the target model along an x-dimension, where the Y coordinate represents a position of the target model along an y-dimension, and where the Z coordinate represents a position of the target model along a z-dimension in the coordinate system utilized to orient the model(s) of the modular superstructure. It will be appreciated that the tuple may be organized in accordance with a predetermined manner or order, and/or the target model location data may be embodied in another manner interpretable by the apparatus 15000.

As illustrated, the message transmission 15800 includes a message payload 15808. In some embodiments, the message payload 15808 includes one or more executable code portion(s) and/or computer-implementable process(es) that may be consumed by a model. For example, in some embodiments, the message payload 15808 is consumable by a particular smart rack embodied by the apparatus 15000. The apparatus 15000 embodying a smart rack may consume the message payload 15808 by executing a computer-implemented process embodied by or associated with the content of the message payload 15808. For example, in some embodiments, the message payload 15808 includes or embodies Javascript code or other code portion interpretable and/or executable by one or more model(s) embodied by the apparatus 15000. The apparatus 15000 in some embodiments executes computer-implemented processes represented by the message payload 15808 to manipulate a tote via the apparatus 15000 to traverse the tote in a particular manner, for example towards a target location.

FIG. 159 illustrates example operations performed during message transmission propagation in accordance with at least an example embodiment of the present disclosure. Specifically, FIG. 159 illustrates example operations for propagation of a message transmission between a plurality of models of a modular superstructure. In this regard, the same message transmission may be propagated across wired connections across the multiple models until consumed by a particular model embodying a target model associated with the message transmission.

In some embodiments, the superstructure controller 15902 generates one or more message transmissions. For example, in some embodiments, the superstructure controller 15902 is embodied by the apparatus 14900. The superstructure controller 15902 may generate one or more message transmission(s) that cause traversal of one or more tote(s) via model(s) of a modular superstructure, for example including at least a plurality of models 15904A-15904N. In some embodiments, each model of the plurality of models 15904A-15904N include and/or are embodied by a smart rack. The smart racks may be arranged next to, on top of, below, or otherwise adjacent to one another to form a modular superstructure of any desired definition. Such models may be communicatively coupled, via at least one wired connection, with each adjacent model representing a peer model. In this regard, a particular model may communicate message transmission(s) to and/or traverse tote(s) to each peer model associated with the particular model.

In some embodiments, the superstructure controller 15902 is communicable with a particular model, for example to the intake model 15904A. In some embodiments, the intake model 15904A is a particular model communicatively coupled with the superstructure controller 15902 via a wired connection. In this regard, the superstructure controller 15902 generates and/or transmits message transmission(s) to the intake model 15904A for execution by one or more model(s) of the modular superstructure. In some embodiments, the intake model 15904A embodies a smart rack of the modular superstructure that is communicable via a wired connection with the superstructure controller 15902.

In some embodiments, each model of the modular superstructure is configured for propagation of the message transmission in a particular manner. For example, in some embodiments, each model is embodied by the apparatus 15000 configured for propagation of a message transmission in accordance with the processes as depicted and described herein with respect to FIG. 160, FIG. 161, FIG. 162A, FIG. 162B, and/or FIG. 162C. For example, the models may propagate a message transmission through peer models until a target model indicated in the message transmission is reached at the target model for consumption.

Upon receiving the message transmission, the intake model 15904A processes the message transmission to propagate the message transmission 15906A. For example, in some embodiments, the intake model 15904A propagates the message transmission 15906A by identifying a peer model in a particular direction to which to transmit the received message transmission. In some embodiments, the intake model 15904A performs the computer-implemented process described with respect to FIG. 162A, FIG. 162B, and FIG. 162C to propagate the message transmission 15906A.

As illustrated, the intake model 15904A to a peer model 15904B. In some such embodiments, the models each process the message transmission in the same manner, and/or a similar manner. For example, in some embodiments, the peer model 15904B processes the message transmission utilizing the computer-implemented process described with respect to FIG. 162A, FIG. 162B, and FIG. 162C to propagate the message transmission 15906A. In this regard, the peer model 15904B may continue to propagate the message transmission to another peer model of the 15904B. Such propagation may continue for any number of peer models, for example by way of the peer model 15904M. Each peer model may continue to propagate the message transmission 15906A in particular direction(s) towards a target model location, such that the final peer model 15904M ultimately propagates the message transmission 15906A to the target model 15904N via a wired connection across each model of the modular superstructure. It will be appreciated that the message transmission may be received and/or propagated via any number of intermediary peer models before reaching a target model corresponding to the message transmission.

The target model 15904N similarly receives the message transmission from a peer model and processes the message transmission once received. In some such embodiments, the target model 15904N consumes the message transmission 15906B. For example, the target model 15904N may process the message transmission and determine that the target model location data in the message transmission matches the model location corresponding to the target model 15904N, and thus trigger consumption of the message rather than propagation of the message. In some embodiments, the target model 15904N initiates a particular action based at least in part on consumption of the message. For example, in some embodiments, the target model 15904N consumes the message transmission 15906B to execute a particular code portion represented in the message transmission, for example to cause activation of one or more component(s) of the target model 15904N to traverse a tote in a particular direction and/or otherwise perform in accordance with the propagated message transmission.

FIG. 160 illustrates an example visualization of routing a message transmission throughout a modular superstructure in accordance with at least an example embodiment of the present disclosure. Specifically, FIG. 160 illustrates propagation of at least one message transmission via a modular superstructure 1300. As illustrated, the superstructure controller 16002 generates a message transmission and transmits the message transmission to the modular superstructure 1300 via one or more models thereof. For example, as illustrated, the superstructure controller 16002 transmits the message transmission via the wired connection 16004A to the intake model 16006. In some embodiments, the intake model 16006 represents a particular model that receives the message transmission from the superstructure controller 16002. As illustrated, each model of the modular superstructure 1300 may be embodied by a smart rack connected to and/or communicatively coupled with one another for transmission of message(s) and/or traversal of tote(s) via the smart racks.

Additionally, or alternatively, in some embodiments, the superstructure controller 16002 includes one or more additional and/or alternative wired connection(s) to other intake model(s) of the modular superstructure 1300. For example, as illustrated, the superstructure controller 16002 may optionally be communicatively coupled via a second wired connection to a second intake model. In this regard, the superstructure controller 16002 may be transmitted to either of the intake models for further propagation throughout the modular superstructure 1300. In some embodiments, the superstructure controller 16002 determines which wired connection to utilize based at least in part on a target location associated with the message transmission for processing.

Each of the model(s) in the modular superstructure 1300 may process the message transmission upon receipt. In some embodiments, each model performs a particular algorithm for routing the message via propagation through one or more peer model(s) of the modular superstructure 1300. For example, in some embodiments, each model is embodied by the apparatus 15000 that performs the computer-implemented process described with respect to FIG. 162A, FIG. 162B, and FIG. 162C. It will be appreciated that a model may utilize any desired routing algorithm for propagating the message transmission to a target location via any number of intermediary models.

In some embodiments, each model utilizes a routing algorithm that attempts to propagate the message transmission along a particular first dimension towards a target location. The model may attempt propagation along an X-dimension. In a circumstance where the model does not propagate the message transmission, the model may attempt propagation along a particular second dimension towards a target location. The model may attempt propagation along a Y-dimension. In a circumstance where the model does not propagate the message transmission, the model may again attempt propagation along a particular third dimension towards a target location. The model may attempt propagation along a Z-dimension. In a circumstance where no peer model is identified and the message transmission is not propagated, the model may subsequently raise an error indicating that the message transmission cannot be propagated.

As illustrated, a message transmission in some embodiments is generated and/or transmitted having a target location associated with target model 16010. In embodiments where the modular superstructure 1300 is represented as a zero-bounded matrix beginning from an origin point corresponding to intake model 16006, the target location corresponding to the target model 16010 may correspond to a three-dimensional (X, Y, Z) tuple having values of (5, 3, 0), where each value indicates existence of a smart rack along the corresponding dimension. For purposes of illustration and ease of understanding, the modular superstructure 1300 is depicted having a height of 1 in the Z-dimension. It should be appreciated that, in other embodiments, the modular superstructure 1300 may include any number of models defining a particular height.

The intake model 16006 may process the message transmission to determine whether the intake model 16006 is associated with a model location that matches the target location associated with the message transmission. The intake model 16006 may compare model location data with target model location data from the message transmission to determine that the intake model 16006 is not the target model corresponding to the target model location. In this regard, the message transmission may be propagated beginning from an intake model that receives the message transmission from the superstructure controller 16002. In some embodiments, the intake model 16006 attempts propagation in a positive X-direction, which is towards the target model location. The intake model 16006 subsequently attempts to identify a peer model in the positive X-direction and identifies the intermediary peer model 16008A. Upon successfully identifying the intermediary peer model 16008A, the intake model 16006 propagates the message transmission to the intermediary peer model 16008A via a wired connection between the intake model 16006 and the intermediary peer model 16008A.

Each subsequent model may similarly perform processing of the message transmission for propagation. For example, the intermediary peer model 16008A may process the message transmission to determine that the intermediary peer model 16008A is similarly not the target model. The intermediary peer model 16008A subsequently attempts to identify a peer model in the positive X-direction, and successfully identifies the intermediary peer model 16008B. The intermediary peer model 16008A subsequently propagates the message transmission to the intermediary peer model 16008B identified in the positive X-direction.

The message transmission propagation continues in this manner until in alignment with the target location. For example, as illustrated, the intermediary peer model 16008B propagates the message transmission to intermediary peer model 16008C, the intermediary peer model 16008C propagates the message transmission to intermediary peer model 16008D, and the intermediary peer model 16008D propagates the message transmission to the intermediary peer model 16008E.

Upon reaching the intermediary peer model 16008E, the intermediary peer model 16008E performs the same process for routing the message transmission. For example, the intermediary peer model 16008E determines that the target location is not in a positive X-direction from a model location associated with the intermediary peer model 16008E, and similarly that the target location is not in a negative X-direction from the model location associated with the intermediary peer model 16008E. In this regard, the intermediary peer model 16008E may attempt propagation along another dimension, for example along a Y-dimension. The intermediary peer model 16008E in some embodiments attempts propagation in a positive Y-direction (e.g., downward as depicted), which is towards the target model location. The intermediary peer model 16008E identifies the intermediary peer model 16008F in the positive Y-direction. Upon successfully identifying the intermediary peer model 16008F, the intermediary peer model 16006E propagates the message transmission to the intermediary peer model 16008F via a wired connection between the intermediary peer model 16008E and the intermediary peer model 16008F.

The intermediary peer model 16008F again attempts the same process for routing the message transmission. For example, the intermediary peer model 16008F determines that the target location is not in a positive X-direction or a negative X-direction. The intermediary peer model 16008F utilizes the same determination of a Y-direction peer as described with respect to intermediary peer model 16008E. The intermediary peer model 16008F subsequently propagates the message transmission to the intermediary peer model 16008G. It will be appreciated that, in this regard, the message transmission is continued to be propagated in the positive Y-direction from the intermediary peer model 16008G to the target model 16010.

Upon receiving the message transmission, the target model 16010 processes the message transmission to determine that the target model location data associated with the message transmission matches model location data associated with the target model 16010. Upon determination by the target model 16010 that the target model location data matches the model location data associated with target model 16010, the target model 16010 proceeds to consume the message. In this regard, the target model 16010 may execute one or more operation(s) based at least in part on a message payload and/or other data of the message transmission. In this regard, it will be appreciated that the target model 16010 does not further propagate the message transmission, and instead processes the message transmission to initiate and/or otherwise perform such computer-implemented process(es) during consumption of the message transmission.

FIG. 161 illustrates another example visualization of routing a message transmission throughout another modular superstructure in accordance with at least an example embodiment of the present disclosure. Specifically, FIG. 161 illustrates propagation of at least one message transmission via another modular superstructure 16100. FIG. 161 includes the superstructure controller 16102 and a modular superstructure 16100, where the superstructure controller 16102 and the modular superstructure 16100 are communicatively coupled via a wired connection 16104. It will be appreciated that in some embodiments, the superstructure controller 16102 and the wired connection 16104 may be similarly configured as the similarly-named components of the superstructure controller 16002 and wired connection 16004A. For brevity and ease of understanding of the disclosure, repeated description with respect to these components is omitted.

The modular superstructure 16100 similarly includes an intake model 16106 that receives the message transmission from the superstructure controller 16102. The intake model 16106 similarly processes the message transmission together with the intermediary peer models 16108A, 16108B, and 16108C as depicted and described with respect to FIG. 160. As illustrated, the modular superstructure 16100 includes one or more inaccessible locations 16112A and 16112B. In some embodiments, the inaccessible locations 16112A and/or 16112B each correspond to a hole in the modular superstructure 16100, for example where no model of the modular superstructure 16100 is located. In this regard, the hole may represent a location in a particular direction of a particular smart rack where no other smart rack for receiving a tote is located. Additionally, or alternatively, in some embodiments, the inaccessible locations 16112A and/or 16112B corresponds to an inaccessible model in the modular superstructure 16100, for example that is located in the modular superstructure 16100 but experiencing an error, powered down, and/or otherwise not currently available.

The accessibility of a peer model in a particular direction is utilized to determine whether a peer model in a particular direction is accessible. As illustrated, for example, a message transmission may be propagated from the intake model 16106 to the intermediary peer model 16108A, from the intermediary peer model 16108A to the intermediary peer model 16108B, and from the intermediary peer model 16108B to the intermediary peer model 16108C as described with respect to FIG. 160. In some embodiments, the intermediary peer model 16108C subsequently attempts to identify a peer model in the positive X-direction. In some embodiments, the intermediary peer model 16108C maintains data representing the accessibility of a model in each direction, and/or attempts communication in one or more direction(s) to determine whether a peer is accessible in such direction(s). Upon determination by the intermediary peer model 16108C that the inaccessible location 16112A is in the positive X-direction, the intermediary peer model 16108C may track that the positive X-direction is inaccessible. Upon such determination, the intermediary peer model 16108C may proceed with attempting propagation of the message transmission in another direction, for example a positive Y-direction as described.

It will be appreciated that the intermediary peer model 16108D may similarly attempt propagation of the message transmission utilizing the same algorithm. For example, the intermediary peer model 16108D may first attempt propagation of the message transmission in a positive X-direction. The intermediary peer model 16108D similarly may determine that no peer is accessible in the positive X-direction, and in response track data indicating that the positive X-direction peer is inaccessible. Further, in some embodiments, the intermediary peer model 16108D may proceed with attempting propagation of the message transmission in another direction, for example a positive Y-direction as described. In this regard, the intermediary peer model 16108D propagates the message transmission to the intermediary peer model 16108E.

It should be appreciated that the message transmission is propagated in a similar manner as described with respect to FIG. 160. For example, each of the intermediary peer models 16108E and 16108F identify a corresponding peer model in the positive X-direction. The intermediary peer model 16108G attempts the same process for routing the message transmission, and determines that the target location is not in a positive X-direction or a negative X-direction. Accordingly, the intermediary peer model 16108G subsequently utilizes the same determination to identify a Y-direction peer in the positive Y-direction, specifically the target model 16110.

Upon receiving the message transmission, the target model 16110 processes the message transmission to determine that the target model location data associated with the message transmission matches model location data associated with the target model 16110. Upon determination by the target model 16110 that the target model location data matches the model location data associated with target model 16110, the target model 16110 proceeds to consume the message. In this regard, the target model 16110 may execute one or more operation(s) based at least in part on a message payload and/or other data of the message transmission. In this regard, it will be appreciated that the target model 16110 does not further propagate the message transmission, and instead processes the message transmission to initiate and/or otherwise perform such computer-implemented process(es) during consumption of the message transmission.

In some embodiments, a model embodied by the apparatus 15000 performs a particular computer-implemented process for routing message transmission(s) in a modular superstructure. For example, in some embodiments, the apparatus 15000 embodies a smart rack including specially configured processing circuitry for executing a computer-implemented process for routing the message transmission via models of a modular superstructure. FIG. 162A, FIG. 162B, and FIG. 162C each illustrate a flowchart depicting example operations of an example process for routing a message transmission in accordance with at least an example embodiment of the present disclosure. It should be appreciated that the combination of the flowcharts in FIG. 162A, FIG. 162B, and FIG. 162C forms a single computer-implemented process executed by a particular model 16200. In some such embodiments, the model 16200 is embodied by the apparatus 15000, for example embodying each smart rack of a modular superstructure. In this regard, the process as depicted may be repeated for each model of the modular superstructure to which a message transmission is propagated, for example where each model embodies a smart rack receiving a message transmission from another smart rack or a superstructure controller. For brevity, a single iteration of the process depicted and described will be described with respect to the model 16200.

As illustrated, at operation 16202, a message transmission is received at a particular model, for example the model 16200. In some embodiments, the model 16200 receives the message transmission over a wired connection. For example, the model 16200 in some embodiments receives the message transmission directly from a superstructure controller, such as in a circumstance where the model 16200 embodies an intake model to the modular superstructure. Additionally, or alternatively, in some embodiments, the model 16200 receives the message transmission over a wired connection from another model of or associated with the modular superstructure.

At operation 16204, the particular model that receives the message transmission proceeds with parsing a target model location portion of the message transmission. In some embodiments, the model parses the target model location portion utilizing text processing. For example, in some embodiments, the model 16200 parses the target model location portion based at least in part on identification of a particular delimiter value. In one example context, the model 16200 processes the message transmission to extract a first line of the message transmission. In some such embodiments, the model 16200 parses the target model location portion by identifying a line break character and/or carriage return character, and parses the data before such identified character(s).

At operation 16206, the particular model 16200 extracts target model location data from the target model location portion of the message transmission. In some embodiments, the model 16200 extracts a particular data coordinate, series of data values, and/or particular data portion that represents at least an X, Y, and Z coordinate of a target model location. In some embodiments, the target model location data is extracted based at least in part on one or more other delimiter character(s), and/or as the remaining data values in the target model location portion parsed from the message transmission.

At operation 16208, the particular model 16200 determines whether location reached data corresponding to the model 16200 indicates whether the target model location data matches a model location associated with the particular model 16200. In some such embodiments, the model 16200 determines model location data representing the model location for the model 16200, for example where the model location data is earlier-assigned and/or determined by the model 16200. In some embodiments, the model location data is statically maintained by the model 16200 to represent the model location specific to the model 16200.

In a circumstance where the model 16200 at operation 16208 determines that the location reached data indicates that the target model location data matches a model location associated with the particular model 16200, flow proceeds to operation 16210. At operation 16210, the particular model 16200 consumes the message transmission. In some embodiments, to consume the message transmission, the model 16200 processes a payload of the message transmission (such as, but not limited to, parsing and/or extracting a message payload from the message transmission). For example, in some such embodiments, the model 16200 identifies a message payload utilizing a particular key-pair, such as based at least in part on a static key value corresponding to a message payload. Alternatively or additionally, in some embodiments, the model 16200 identifies a message payload utilizing a particular delimiter character. In some embodiments, the model 16200 extracts the remaining data portion of the message transmission after a particular delimiter character utilized to parse the target model location portion from the remainder of the message transmission. Upon consuming the message transmission, the model 16200 may end processing of the particular message transmission and await reception of a subsequent message transmission.

In a circumstance where the model 16200 at operation 16208 determines that the location reached data indicates that the target model location data matches a model location associated with the particular model 16200, flow proceeds to the operations defined by subroutine A as depicted in the flowchart in FIG. 162B. In some embodiments, the subroutine A includes processing of one or more data portion(s) from the target model location data and/or model location data corresponding to the model 16200. For example, in some embodiments, the subroutine A processes X coordinate, Y coordinate, and/or Z coordinate data from each of target model location data from the message transmission, and X coordinate, Y coordinate, and/or Z coordinate data from the model location data associated with the model 16200, as described further herein.

At operation 16212, the model 16200 determines whether a target message X coordinate is less than a model location X coordinate. In some embodiments, the model 16200 extracts the target message X coordinate from the target model location data, and extracts the model location X coordinate from the model location data maintained by the model 16200. In some embodiments, the model 16200 compares the target message X coordinate and the model location X coordinate to determine whether the target message X coordinate is less than the model location X coordinate.

In a circumstance where the model 16200 at operation 16212 determines that the target message X coordinate is less than the model location X coordinate, flow proceeds to operation 16214. At operation 16214, the model 16200 determines whether a −X direction peer model is available from the model 16200. In some embodiments, the model 16200 maintains data indicating statuses of peer models in each direction from the model 16200. Alternatively or additionally, in some embodiments, the model 16200 attempts communication in at least the −X direction to determine whether a reply from a −X peer model is received indicating that the −X peer model is available. In the present disclosure, the X direction is also referred to as the "negative first direction."

In a circumstance where the model 16200 at operation 16214 determines that the −X direction peer model is not available, the flow proceeds to operation 16218. At operation 16218, the model 16200 tracks that the peer model in −X direction is not available. For example, in some embodiments, the model 16200 may maintain data indicating a status of the −X direction peer model, and set the status to a particular data value indicating that the −X direction peer model is not available.

In a circumstance where the model 16200 at operation 16214 determines that the −X direction peer model is available, the flow proceeds to operation 16216. At operation 16216, the model 16200 propagates the message transmission to the −X direction peer model. In some embodiments, the model 16200 transmits the message transmission to the −X direction peer model via a wired connection with the −X direction peer model to propagate the message. Upon receiving the message transmission, the flow may return to the beginning, with the −X direction peer model subsequently processing the message transmission utilizing the operations as described in FIG. 162A, FIG. 162B, and FIG. 162C.

Returning to operation 16212, in a circumstance where the model 16200 at operation 16212 determines that the target message X coordinate is not less than the model location X coordinate, flow proceeds to operation 16220. At operation 16220, the model 16200 determines whether the target message X coordinate is greater than the model location X coordinate. In some embodiments, the model 16200 extracts the target message X coordinate from the target model location data, and extracts the model location X coordinate from the model location data maintained by the model 16200. In some embodiments, the model 16200 compares the target message X coordinate and the model location X coordinate to determine whether the target message X coordinate is greater than the model location X coordinate.

In a circumstance where the model 16200 at operation 16220 determines that the target message X coordinate is greater than the model location X coordinate, flow proceeds to operation 16222. At operation 16222, the model 16200 determines whether a +X direction peer model is available from the model 16200. In some embodiments, the model 16200 maintains data indicating statuses of peer models in each direction from the model 16200. Alternatively or additionally, in some embodiments, the model 16200 attempts communication in at least the +X direction to determine whether a reply from a +X peer model is received indicating that the +X peer model is available.

In a circumstance where the model 16200 at operation 16222 determines that the +X direction peer model is not available, the flow proceeds to operation 16226. At operation 16226, the model 16200 tracks that the peer model in +X direction is not available. For example, in some embodiments, the model 16200 may maintain data indicating a status of the +X direction peer model, and set the status to a particular data value indicating that the +X direction peer model is not available.

In a circumstance where the model 16200 at operation 16222 determines that the +X direction peer model is available, the flow proceeds to operation 16224. At operation 16224, the model 16200 propagates the message transmission to the +X direction peer model. In some embodiments, the model 16200 transmits the message transmission to the +X direction peer model via a wired connection with the +X direction peer model to propagate the message. Upon receiving the message transmission, the flow may return to the beginning, with the +X direction peer model subsequently processing the message transmission utilizing the operations as described in FIG. 162A, FIG. 162B, and FIG. 162C.

Returning to operation 16220, in a circumstance where the model 16200 at operation 16220 determines that the target message X coordinate is not greater than the model location X coordinate (e.g., the target model X coordinate and the model location X coordinate are the same value), flow proceeds to operation 16228. At operation 16228, the model 16200 determines whether a target message Y coordinate is less than a model location Y coordinate. In some embodiments, the model 16200 extracts the target message Y coordinate from the target model location data, and extracts the model location Y coordinate from the model location data maintained by the model 16200. In some embodiments, the model 16200 compares the target message Y coordinate and the model location Y coordinate to determine whether the target message Y coordinate is less than the model location Y coordinate.

In a circumstance where the model 16200 at operation 16228 determines that the target message Y coordinate is less than the model location Y coordinate, flow proceeds to operation 16230. At operation 16230, the model 16200 determines whether a −Y direction peer model is available from the model 16200. In some embodiments, the model 16200 maintains data indicating statuses of peer models in each direction from the model 16200. Alternatively or additionally, in some embodiments, the model 16200 attempts communication in at least the −Y direction to determine whether a reply from a −Y peer model is received indicating that the −Y peer model is available.

In a circumstance where the model 16200 at operation 16230 determines that the −Y direction peer model is not available, the flow proceeds to operation 16234. At operation 16234, the model 16200 tracks that the peer model in −Y direction is not available. For example, in some embodiments, the model 16200 may maintain data indicating a status of the −Y direction peer model, and set the status to a particular data value indicating that the −Y direction peer model is not available.

In a circumstance where the model 16200 at operation 16230 determines that the −Y direction peer model is available, the flow proceeds to operation 16232. At operation 16232, the model 16200 propagates the message transmission to the −Y direction peer model. In some embodiments, the model 16200 transmits the message transmission to the −Y direction peer model via a wired connection with the −Y direction peer model to propagate the message. Upon receiving the message transmission, the flow may return to the beginning, with the −Y direction peer model subsequently processing the message transmission utilizing the operations as described in FIG. 162A, FIG. 162B, and FIG. 162C.

Returning to operation 16228, in a circumstance where the model 16200 at operation 16236 determines that the target message Y coordinate is not less than the model location Y coordinate, flow proceeds to operation 16236. At operation 16236, the model 16200 determines whether a target message Y coordinate is greater than a model location Y coordinate. In some embodiments, the model 16200 extracts the target message Y coordinate from the target model location data, and extracts the model location Y coordinate from the model location data maintained by the model 16200. In some embodiments, the model 16200 compares the target message Y coordinate and the model location Y coordinate to determine whether the target message Y coordinate is greater than the model location Y coordinate.

In a circumstance where the model 16200 at operation 16236 determines that the target message Y coordinate is greater than the model location Y coordinate, flow proceeds to operation 16238. At operation 16238, the model 16200 determines whether a +Y direction peer model is available from the model 16200. In some embodiments, the model 16200 maintains data indicating statuses of peer models in each direction from the model 16200. Alternatively or additionally, in some embodiments, the model 16200 attempts communication in at least the +Y direction to determine whether a reply from a +Y peer model is received indicating that the +Y peer model is available.

In a circumstance where the model 16200 at operation 16238 determines that the +Y direction peer model is not available, the flow proceeds to operation 16242. At operation 16242, the model 16200 tracks that the peer model in +Y direction is not available. For example, in some embodiments, the model 16200 may maintain data indicating a status of the +Y direction peer model, and set the status to a particular data value indicating that the +Y direction peer model is not available.

In a circumstance where the model 16200 at operation 16238 determines that the +Y direction peer model is available, the flow proceeds to operation 16240. At operation 16240, the model 16200 propagates the message transmission to the +Y direction peer model. In some embodiments, the model 16200 transmits the message transmission to the +Y direction peer model via a wired connection with the +Y direction peer model to propagate the message. Upon receiving the message transmission, the flow may return to the beginning, with the +Y direction peer model subsequently processing the message transmission utilizing the operations as described in FIG. 162A, FIG. 162B, and FIG. 162C.

Returning to operation 16236, in a circumstance where the model 16200 at operation 16236 determines that the target message Y coordinate is not greater than the model location Y coordinate (e.g., the target model Y coordinate and the model location Y coordinate are the same value), flow proceeds to operation 16244. At operation 16244, the model 16200 determines whether a target message Z coordinate is less than a model location Z coordinate. In some embodiments, the model 16200 extracts the target message Z coordinate from the target model location data, and extracts the model location Z coordinate from the model location data maintained by the model 16200. In some embodiments, the model 16200 compares the target message Z coordinate and the model location Z coordinate to determine whether the target message Z coordinate is less than the model location Z coordinate.

In a circumstance where the model 16200 at operation 16244 determines that the target message Z coordinate is less than the model location Z coordinate, flow proceeds to operation 16246. At operation 16246, the model 16200 determines whether a −Z direction peer model is available from the model 16200. In some embodiments, the model 16200 maintains data indicating statuses of peer models in each direction from the model 16200. Alternatively or additionally, in some embodiments, the model 16200 attempts communication in at least the −Z direction to determine whether a reply from a −Z peer model is received indicating that the −Z peer model is available.

In a circumstance where the model 16200 at operation 16246 determines that the −Z direction peer model is not available, the flow proceeds to operation 16250. At operation 16250, the model 16200 tracks that the peer model in −Z direction is not available. For example, in some embodiments, the model 16200 may maintain data indicating a status of the −Z direction peer model, and set the status to a particular data value indicating that the −Z direction peer model is not available.

In a circumstance where the model 16200 at operation 16246 determines that the −Z direction peer model is available, the flow proceeds to operation 16248. At operation 16248, the model 16200 propagates the message transmission to the −Z direction peer model. In some embodiments, the model 16200 transmits the message transmission to the −Z direction peer model via a wired connection with the −Z direction peer model to propagate the message. Upon receiving the message transmission, the flow may return to the beginning, with the −Z direction peer model subsequently processing the message transmission utilizing the operations as described in FIG. 162A, FIG. 162B, and FIG. 162C.

Returning to operation 16244, in a circumstance where the model 16200 at operation 16244 determines that the target message Z coordinate is not less than the model location Z coordinate, flow proceeds to operation 16252. At operation 16252, the model 16200 determines whether a target message Z coordinate is greater than a model location Z coordinate. In some embodiments, the model 16200 extracts the target message Z coordinate from the target model location data, and extracts the model location Z coordinate from the model location data maintained by the model 16200. In some embodiments, the model 16200 compares the target message Z coordinate and the model location Z coordinate to determine whether the target message Z coordinate is greater than the model location Z coordinate.

In a circumstance where the model 16200 at operation 16252 determines that the target message Z coordinate is greater than the model location Z coordinate, flow proceeds to operation 16254. At operation 16254, the model 16200 determines whether a +Z direction peer model is available from the model 16200. In some embodiments, the model 16200 maintains data indicating statuses of peer models in each direction from the model 16200. Alternatively or additionally, in some embodiments, the model 16200 attempts communication in at least the +Z direction to determine whether a reply from a +Z peer model is received indicating that the +Z peer model is available.

In a circumstance where the model 16200 at operation 16254 determines that the +Y direction peer model is not available, the flow proceeds to operation 16258. At operation 16258, the model 16200 tracks that the peer model in +Z direction is not available. For example, in some embodiments, the model 16200 may maintain data indicating a status of the +Z direction peer model, and set the status to a particular data value indicating that the +Z direction peer model is not available.

In a circumstance where the model 16200 at operation 16254 determines that the +Z direction peer model is available, the flow proceeds to operation 16256. At operation 16256, the model 16200 propagates the message transmission to the +Z direction peer model. In some embodiments, the model 16200 transmits the message transmission to the +Z direction peer model via a wired connection with the +Z direction peer model to propagate the message. Upon receiving the message transmission, the flow may return to the beginning, with the +Z direction peer model subsequently processing the message transmission utilizing the operations as described in FIG. 162A, FIG. 162B, and FIG. 162C.

Returning to operation 16252, in a circumstance where the model 16200 at operation 16252 determines that the target message Z coordinate is not greater than the model location Z coordinate (e.g., the target model Z coordinate and the model location Z coordinate are the same value), flow proceeds to operation 16260. At operation 16260, the model 16200 indicates the message transmission cannot be propagated. In some embodiments, the model 16200 throws an error message, for example embodied by a message transmission for propagation and/or other transmission to a superstructure controller indicating that the message transmission cannot be propagated, and/or to other model(s) of the modular superstructure to indicate that the message transmission cannot be propagated. Alternatively or additionally, in some embodiments, the model 16200 model 16200 stores data indicating that the message transmission cannot be propagated, and terminates attempting to propagate the message transmission further.

In some embodiments, one or more model(s) is/are improved for output and/or interaction with a user interacting with a modular superstructure. For example, in some embodiments, a model includes one or more additional component(s) that enhances functionality associated with interacting with the model, such as a smart rack. FIG. 163 illustrates a modular superstructure 16300 with one or more improved smart racks including at least one display in accordance with at least an example embodiment of the present disclosure.

In some embodiments, the modular superstructure 16300 includes an improved smart rack including at least one display on an exterior surface of a rack frame of the smart rack. In some embodiments, the display is electronically coupled to the rack frame, such that the display is mounted to the rack frame and enables communication of data between the display and/or processing circuitry of a particular smart rack. As illustrated, the modular superstructure 16300 includes a plurality of improved smart racks embodying improved models of the modular superstructure. For example, the modular superstructure includes a first improved smart rack 16302 and a second improved smart rack 16304, which are located at corner locations in the modular superstructure 16300.

Each of the first improved smart rack 16302 and second improved smart rack 16304 is electronically coupled with a display on an exterior surface of the frame of the corresponding smart rack. Specifically, for example, the first improved smart rack 16302 includes a display 16306 that is electronically coupled to a first direction of the first improved smart rack 16302, specifically facing outwards from the modular superstructure 16300. In some embodiments, the "electronically coupling" of the display to the smart rack includes mounting or other securing of the display to a frame of the smart rack, and/or wired connection between the processing circuitry associated with the smart rack and the display, such that the processing circuitry may cause rendering to the display and/or transmission of data from the display to the processing circuitry. For example, as illustrated, the first improved smart rack 16302 is electronically coupled with the display 16306 to enable the processing circuitry of the first improved smart rack 16302 to render data and/or user interface(s) to the display 16306, and the second improved smart rack 16304 is electronically coupled with the display 16308 to enable the processing circuitry of the second improved smart rack 16304 to render data and/or user interface(s) to the display 16308. It should be appreciated that the display may be located at any position along an external surface of the corresponding smart rack frame, for example along an upper portion of the frame, a lower portion of a frame, a side portion of the frame, and/or the like.

In some embodiments, a display—for example the display 16306 and/or 16308—includes or is embodied by hardware, software, firmware, and/or the like that enables visual depiction of data. Non-limiting examples of a display include a monitor, a television, a digital screen, a touch adaptive interactive display, and the like. A display may be of any shape and/or size, and need not fit within the bounds of a single smart rack or other model. A display may be fixedly secured to the smart rack in any of a myriad of manners and/or utilizing any of a myriad of mechanisms. In some embodiments, the display is physically secured to the smart rack. In some such embodiments, the display is secured via one or more rivet(s), screw(s), nail(s), pin(s), locking mechanism(s), snap fit(s) into a defined and/or recessed position of the smart rack, and/or the like. Alternatively or additionally, in some embodiments, the display is fixedly secured to a movable arm or other component that enables the display to be at least slightly repositioned away from the frame of the smart rack (e.g., by the distance of the arm). In other embodiments, the display is chemically secured to the smart rack, for example utilizing an adhesive, chemical process, and/or the like.

In some embodiments, a display is electronically coupled with improved smart racks within the modular superstructure 16300. In some embodiments, an improved smart rack embodies an intake model of the modular superstructure 16300, for example that is communicatively coupled with a superstructure controller via a wired connection. In some embodiments, an improved smart rack including a display embodies an ingress location within the modular superstructure. Additionally, or alternatively, in some embodiments, an improved smart rack including a display embodies an egress location within the modular superstructure. In yet some other embodiments, any smart rack may embody an improved smart rack with a display. It should be appreciated that in some embodiments, not all ingress locations and/or egress locations correspond to an improved smart rack with a display, but some of such ingress and/or egress locations may correspond to an improved smart rack. In some embodiments, a modular superstructure 16300 includes only a single improved smart rack with a display.

An improved smart rack may utilize a display to output any of a myriad of different types of data and/or user interface(s) for any of a myriad of purposes. In a non-limiting example, FIG. 164 illustrates example data identification and/or manipulation for use in causing rendering to a display in accordance with at least an example embodiment of the present disclosure. It will be appreciated that a particular display of an improved smart rack may be utilized to enable outputting of any desired information for viewing by a user via the display, for example based at least in part on data associated with the improved smart rack, data associated with other smart racks of the modular superstructure, message transmission(s) propagated throughout the modular superstructure 16300, data associated with an associated superstructure controller, and/or message transmission(s) transmitted from the superstructure controller, for example.

FIG. 164 depicts various examples of data identified for rendering via a smart rack processor 16402. In some embodiments, the smart rack processor 16402 embodies processing circuitry of a particular smart rack. In some embodiments, the smart rack processor 16402 embodies a processor of the apparatus 15000, for example that embodies the first improved smart rack 16302. The smart rack processor 16402 in some embodiments executes particular functionality via a specially configured microcontroller, CPU, ASIC, FPGA, and/or the like.

In some embodiments, the smart rack processor 16402 identifies tote data for a smart rack 16404A. For example, in some embodiments the tote data includes data associated with a tote currently in the smart rack corresponding to the smart rack processor 16402. Alternatively or additionally, in some embodiments, the tote data includes historical data associated with tote(s) manipulated by the smart rack corresponding to the smart rack processor 16402. The tote data may include a tote identifier, information associated with item(s) in the tote, at least one item SKU, and/or the like. In some embodiments, the tote data includes a message payload of a message consumed by the smart rack corresponding to the smart rack processor 16402.

Additionally, or alternatively, in some embodiments, the smart rack processor 16402 identifies tote data for egressing and/or ingressing tote 16404B. In some embodiments, the tote data for egressing and/or ingressing tote 16404B includes data associated with at least one tote currently being ingressed and/or egressed via the modular superstructure within which the smart rack corresponding to the smart rack processor 16402 is located. In some embodiments, the tote data for egressing and/or ingressing tote 16404B includes a tote identifier associated with an ingressing and/or egressing tote, an ingress location and/or egress location associated with the tote, a timestamp for expected completion of egress and/or ingress of the tote(s), and/or the like.

Additionally, or alternatively, in some embodiments, the smart rack processor 16402 identifies status data for a smart rack 16404C. In some embodiments, the status data for a smart rack 16404C indicates a current operational status of the smart rack corresponding to the smart rack processor 16402. In some embodiments, the status data indicates whether the smart rack corresponding to the smart rack processor 16402 is available or not available. Alternatively or additionally, in some embodiments, the status data Additionally, or alternatively includes whether the smart rack is currently manipulating a tote or not manipulating a tote. Additionally, or alternatively, in some embodiments, the status data indicates whether the smart rack is communicable with one or more other model(s), for example other smart rack(s) of the modular superstructure. In some embodiments, the status data represents or otherwise embodies an error experienced by the smart rack.

Additionally, or alternatively, in some embodiments, the smart rack processor 16402 identifies status data for a connected smart rack 16404D. In some embodiments, the status data for a connected smart rack 16404D includes status data associated with a smart rack connected to the smart rack corresponding to the smart rack processor 16402. For example, the status data for a connected smart rack 16404D may include status data associated with a peer smart rack, a subsequent upstream and/or downstream smart rack associated with tote ingress and/or egress, and/or the like. In some embodiments, the status data for a connected smart rack 16404D includes status data associated with a smart rack identified via user input, for example to the smart rack processor 16402. In some embodiments, the status data represents or otherwise embodies an error experienced by a peer or other connected smart rack associated with the smart rack corresponding to the smart rack processor 16402.

In some embodiments, the smart rack processor 16402 causes rendering to a smart rack display 16406. In some such embodiments, the smart rack display 16406 embodies a display electronically coupled to an external surface of the smart rack, for example fixedly attached to the rack frame of the smart rack corresponding to the smart rack processor 16402. In some embodiments, the smart rack processor 16402 transmits particular data to the smart rack display 16406 to cause rendering of the data and/or a user interface associated therewith. For example, in some embodiments, the smart rack processor 16402 transmits one or more of the data (e.g. tote data for a smart rack 16404A, tote data for egressing and/or ingressing tote 16404B, status data for a smart rack 16404C, and/or status data for a connected smart rack 16404D) to the smart rack display 16406 to cause rendering of such transmitted data, and/or a user interface associated therewith. For example, in some embodiments the smart rack display 16406 renders a user interface depicting a representation of the data transmitted via the smart rack processor 16402, and/or supporting label(s), control(s), and/or the like associated therewith.

FIG. 165 illustrates a rack frame 16500, in accordance with some embodiments of the present disclosure. Similar to those described above in connection with FIG. 2A, the rack frame 16500 can include a plurality of rack beams 16502, including, but not limited to, a plurality of top rack beams 16502 (such as, but not limited to, a left top rack beam 16502A (FIG. 167), a right top rack beam 16502B, a front top rack beam 16502C, and a back top rack beam 16502D (FIG. 167), a plurality of lateral rack beams 16502 (such as, but not limited to, a left front lateral rack beam 16502E, a right front lateral rack beam 16502F, a left back lateral rack beam 16502H (FIG. 167), and a right back lateral rack beam 16502G), and a plurality of bottom rack beams 16502 (such as, but not limited to, a left bottom rack beam 16502K, a right bottom rack beam 16502L, a front bottom rack beam 16502I, and a back bottom rack beam 16502J). The rack frame 16500 can define an X-direction, a Y-direction that is orthogonal to the X-direction, and a Z-direction that is orthogonal to the X-direction and the Y-direction.

In various examples, the rack frame 16500 includes at least one support 16510. For example, the rack frame 16500 can include a plurality of supports 16510, such as two, three, four, five or more supports. Each support 16510 can be coupled, either directly or indirectly, to a corresponding rack beam 16502 of the rack frame 16500. For example, and as depicted in FIG. 165, the rack frame 16500 can include four supports 16510 that are each coupled, either directly or indirectly, to a corresponding bottom rack beam 16502 (e.g., the left bottom rack beam 16502K, the right bottom rack beam 16502L, the front bottom rack beam 16502I, and the back bottom rack beam 16502J). However, in various other examples, the rack frame 16500 may include less, or more, than four supports 16510. For example, the rack frame 16500 may include two supports 16510 that are coupled to two opposite rack beams 16502 (e.g., rack beam 16502K and 16502L or rack beam 16502J and 16502I). In yet another example, the rack frame 16500 may include three supports 16510 that are coupled to three of the four bottom rack beams 16502.

As will be discussed further, the rack frame 16500 can include at least one wheel pack 16530 that can be positioned adjacent to a rack beam 16502. Each of the at least one support 16510 can be configured to hold a corresponding wheel pack 16530. For example, each support 16510 can extend horizontally and inward from a corresponding rack beam 16502 of the rack frame 16500. The support 16510 can include a flange 16511 that can prevent a horizontal movement of the corresponding wheel pack 16530. The flange 16511 can extend upward in the Z-direction.

In various examples, the at least one support 16510 is pivotably coupled to the corresponding rack beam 16502. As such, the at least one support 16510 and/or the corresponding wheel pack 16530 can pivot in relation to the rack beam 16502L to a position that allows an object, such as a rectangular prism, to move into or through the rack frame 16500 in the Z-direction.

As will also be discussed further, the rack frame 16500 can include an electrical connection 16522 and the wheel pack 16530 can include an electrical connection 16532. The support 16510 can be configured to press the electrical connection 16532 of the wheel pack 16530 on the electrical connection 16522 of the rack frame 16500. Pressing the electrical connection 16532 of the wheel pack 16530 on the electrical connection 16522 of the rack frame 16500 may allow electrical communication between the electrical connections 16522, 16532. As used herein, the term "electrical communication" means that an electric current and/or an electric signal are capable of making the connection between the areas specified.

FIG. 166 illustrates a portion of a wheel pack 16530, in accordance with some embodiments of the present disclosure. In various examples, each wheel pack 16530 can include a wheel pack frame 16531 and at least one set of wheels 16535. For example, and as depicted in FIGS. 165 and 166, each wheel pack 16530 can include three sets of wheels 16535. However, each wheel pack 16530 can include any number of sets of wheels 16535. For example, the wheel pack 16530 can include one, two, four, five, six or more sets of wheels 16535.

Each set of wheels 16535 of each wheel pack 16530 can be configured as an omni-wheel. For example, each set of wheels 16535 of each wheel pack 16530 can be configured to rotate on a wheel axis WA. In various examples, at least some of the sets of wheels 16535 of each wheel pack 16530 can be configured to rotate on a different wheel axis WA, each wheel axis WA being substantially parallel (e.g., within two degrees, such as within one degree) to the other wheel axis WA of the wheel pack 16530. In various examples, at least some of the sets of wheels 16535 of each wheel pack 16530 can be configured to rotate on the same wheel axis WA.

Each set of wheels 16535 can include a plurality of wheels 16536. For example, and as depicted in FIG. 166, each set of wheels 16535 can include two wheels 16536. However, each set of wheels 16535 can include more than two wheels 16536, such as three, four, five, six or more wheels 16536. Each of the wheels 16536 within a set of wheels 16535 can be coupled together, either directly or indirectly, such that they are configured to rotate together, in unison, on the corresponding wheel axis WA.

Each wheel 16536 of a set of wheels 16535 can include a hub 16537 and a plurality of rollers 16538 that are each rotatably coupled to the hub 16537. The hub 16537 of each wheel 16536 can be configured to rotate on the corresponding wheel axis WA. Also, each roller 16538, because it is coupled to a corresponding hub 16537, can rotate circumferentially around the corresponding wheel axis WA. Additionally, each roller 16538 is configured to rotate on a roller axis RA. For example, each roller 16538 is configured to rotate on a different roller axis RA, each roller axis RA extending substantially orthogonal (e.g., within two degrees, such as within one degree) to the corresponding wheel axis WA.

In various examples, and as depicted in FIG. 166, the rollers 16538 of at least one of the wheels 16536 can have a staggered configuration in relation to the rollers 16538 of an adjacent wheel 16536. Because the wheels 16536 of the set of wheels 16535 can be configured to rotate together, in unison, on a corresponding wheel axis WA, positioning the rollers 16538 of at least one of the wheels 16536 such that they are staggered in relation to the rollers 16538 of an adjacent wheel 16536 may ensure contact by at least one roller 16538 with an object, such as a rectangular prism, that is passing over the set of wheels 16535.

Each wheel pack 16530 can include at least one electric motor (not depicted). For example, each of the at least one electric motor can be housed within a wheel pack frame 16531 of a corresponding wheel pack 16530. Each electric motor can be mechanically coupled, directly or indirectly, to at least one set of wheels 16535 and configured to rotate the at least one set of wheels 16535 on the wheel axis WA. Each electric motor can be in electrical communication with the electrical connection 16532 of the corresponding wheel pack 16530. As discussed, the electrical connection 16532 of each wheel pack 16530 can also be in electrical communication with a corresponding electrical connection 16522 of the rack frame 16500, when the wheel pack 16530 is installed within the rack frame 16500 (e.g., positioned on a support 16510 of the rack frame 16500). Therefore, electric current and/or electric signals can be transferred from at least one electrical connection 16522 of the rack frame 16500 to at least one corresponding electric motor when the wheel pack 16530 is installed within the rack frame 16500.

In various examples, and as depicted in FIG. 166, each electrical connection 16532 can include one or more electrical pins 16533. The electrical pins 16533 can be spring-loaded electrical pins. The electrical pins 16533 can each be configured to make contact with a corresponding electrical contact 16523 (FIG. 165) of the electrical connection 16522 of the rack frame 16500.

In various examples, and as depicted in FIG. 166, each wheel pack 16530 can include one or more sensors 16540. For example, each of the one or more sensors 16540 can be positioned on a top surface of the corresponding wheel pack 16530. Each of the one or more sensors 16540 can be configured to sense a positioning of an object, such as a rectangular prism, that is within or near the rack frame 16500 and/or near the corresponding rack beam 16502. Each of the one or more sensors 16540 can be in electrical communication with one or more electric motor and/or one or more electrical connection 16532 of the corresponding wheel pack 16530.

In various examples, each wheel pack 16530 includes a radio-frequency identification (RFID) system. Each RFID system can include a radio transponder, a radio receiver, and/or a radio transmitter. The RFID system of each wheel pack 16530 can be configured to allow the identification or tracking of the corresponding wheel pack 16530.

In various examples, each wheel pack 16530 includes one or more control boards (not depicted). Each control board can include one or more circuit boards that can include electronic components, such as diodes, resistors, transistors, capacitors, etc. Each control board can be configured to be in electrical communication with the various electric components of the corresponding wheel pack 16530 and/or the corresponding rack frame 16500. For example, the one or more control board can be in electrical communication with the one or more sensor 16540 to, for example, receive data indicative of a position of an object, such as a rectangular prism, that is within or near the rack frame 16500 and/or the corresponding rack beam 16502. The one or more control board can be in electrical communication with at least one of the electric motors of the corresponding wheel pack 16530 to, for example, control the speed of rotation of the corresponding set of wheels 16535 based, at least in-part, on the received data that is indicative of the position of the object, such as the rectangular prism, that is within or near the rack frame 16500. The control board can be configured to be in electrical communication with the RFID system of the wheel pack 16530 to, for example, receive data indicative of a position of the wheel pack 16530. The control board can be configured to be in electrical communication with the electrical connection 16522 of the rack frame 16500 to, for example receive electric power or electric signals, such as instructions for controlling the one or more motors of the wheel pack 16530.

The one or more wheel packs 16530 of the rack frame 16500 can apply a force to an object, such as a rectangular prism, to move the object in the X-direction and/or the Y-direction. For example, the set of wheels 16535 of the wheel packs 16530 that are associated with rack beam 16502L and rack beam 16502K can be rotated (e.g., rotated with an electric motor) to move the object in the X-direction while the rollers 16538 of the wheel pack 16530 that are associated with rack beam 16502I and rack beam 16502J are free to rotate, which allow the object to glide over the rollers 16538 in the X-direction. Similarly, the set of wheels 16535 of the wheel packs 16530 that are associated with rack beam 16502I and rack beam 16502J can be rotated (e.g., rotated with an electric motor) to move the object in the Y-direction while the rollers 16538 of the wheel pack 16530 that are associated with rack beam 16502K and rack beam 16502L are free to rotate, which allow the object to glide over the rollers 16538 in the Y-direction.

As will be appreciated, the wheel pack 16530, according to the various examples, has various benefits. For example, the wheel pack 16530 may be relatively easy to install, repair, replace, and/or service. Referring back to FIG. 165, each wheel pack 16530 can be installed within the rack frame 16500 by placing the wheel pack 16530 on a corresponding support 16510. In lieu of fasteners, such as bolts or screws, the flange 16511 of the corresponding support 16510 can maintain positioning of the wheel pack 16530. Additionally, the flange 16511 of the corresponding support 16510 can push the wheel pack 16530 towards the one or more electrical connection 16522, which allows the various electric components (e.g., electric motor(s), sensor(s) 140, and/or control board(s)) of the wheel pack 16530 to be in electrical communication with the electrical connection 16522 of the rack frame 16500 via the electrical connection 16532 of the wheel pack 16530. The support 16510 may include a biasing member (not depicted), such as a spring, to increase the pushing force of the wheel pack 16530 on the one or more electrical connection 16522. The biasing member can be coupled to the flange 16511 of the support 16510. Notably, when the electrical connection 16532 of the wheel pack 16530 and/or the electrical connection 16522 of the rack frame 16500 include electric pins 16533, such as spring-loaded pins, it may be unnecessary to provide electric ports and/or sockets for the transfer of electric power or signals to and from the wheel pack 16530.

FIG. 167 illustrates a portion of a modular superstructure 104, in accordance with some embodiments of the present disclosure. As discussed, the modular superstructure 104 can include a plurality of rack frames 16500 and can be configured to allow for the ingress, store, and egress of one or more objects, such as one or more rectangular prisms. In various examples, and as depicted in FIG. 167, at least one of the plurality of rack frames 16500 can be configured as an elevator rack frame 16501. As discussed, the plurality of wheel packs 16530 can allow for or cause the movement of the one or more objects in the X-direction and in the Y-direction. The elevator rack frame 16501 can additionally allow for the movement of the one or more objects in the Z-direction. More specifically, the elevator rack frame 16501 can be configured to move vertically, up and down, in the Z-direction.

In various example, and as depicted in FIG. 167, the elevator rack frame 16501 can include, or can be coupled to, one or more harness assemblies 16550. In various examples, and as depicted in FIG. 167, the elevator rack frame 16501 includes two harness assemblies 16550. However, the elevator rack frame 16501 can include any number of harness assemblies 16550, such as one, three, four or more harness assemblies 16550. The modular superstructure 16504 can include one or more tracks 16560 that extend vertically in the Z-direction. As will be discussed further, the harness assembly 16550 can be configured to move along a track 16560 of the modular superstructure 16504 in the Z-direction.

The elevator rack frame 16501 can include an attachment point 16505 for coupling a biasing system (not depicted). The biasing system can be configured to move the elevator rack frame 16501 upward and downward in the Z-direction. For example, the biasing system can be a pulley system and a cable (not depicted) of the pulley system can be coupled to the attachment point 16505.

FIG. 168 illustrates a portion of an elevator rack frame 16501, in accordance with some embodiments of the present disclosure. In various examples, and as depicted in FIG. 168, the harness assembly 16550 includes a plurality of wheels 16552. In the example of FIG. 168, the harness assembly 16550 includes three wheels 16552. However, the harness assembly 16550 can include two, four, five or more wheels 16552. In various examples, and as depicted in FIG. 168, each wheel 16552 has a relatively smooth outer surface. However, in other examples, the wheel 16552 may include a plurality of teeth that are configured to mesh with corresponding features of the track 16560.

In various examples, and as depicted in FIG. 168, the harness assembly 16550 includes a pair of wheels 16553 that are positioned on opposite sides of a flange 16561 that extends from the track 16560 in the X-direction and a third wheel 16554 that is positioned on an extremity 16562 of the flange 16561. The extremity 16562 of the flange 16561 can extend in the Y-directions to maintain a position of the pair of wheels 16553 in the X-direction.

As will be appreciated, the elevator rack frame 16501 can transport an object, such as a rectangular prism, in the X, Y, and Z directions. For example, the one or more wheel packs 16530 can move the object in the X and the Y directions to an adjacent rack frame 16500, for example. The object within the elevator rack frame 16501 can also move in the Z direction when the elevator rack frame 16501 is moved in the Z direction by the biasing system.

Referring to FIG. 169, a perspective view of an example smart rack 16900 is shown, according to various embodiments. Similar to various examples described above, the example smart rack 16900 may be configured to support and/or transport a rectangular prism with a hollow interior configured for storing one or more objects. In some embodiments, the example smart rack 16900 may have a similar structure, features, and elements to the totes previously described in this disclosure. In some embodiments, the example smart rack 16900 may be implemented similarly in an example superstructure as previously described in this disclosure.

Similar to various examples described above, the example smart rack 16900 may include a rack frame 16902. In some embodiments, the rack frame 16902 may be configured similarly to previously described rack frames. In some embodiments, the example smart rack 16900 may include one or more transport arms 16904A, 16904B, 16904C, 16904D, 16904E, and 16904F, which may be attached to the rack frame 16902, as previously described in this disclosure.

In some embodiments, the example smart rack 16900 may include one or more charging devices 16906A, 16906B, 16906C, and 16906D. In some embodiments, the one or more charging devices 16906A, 16906B, 16906C, and 16906D may comprise one or more charging pads that may be attached to the one or more transport arms 16904A, 16904B, 16904C, 16904D, 16904E, and 16904F. For example, the one or more charging devices 16906A, 16906B, 16906C, and 16906D may be attached to the upper surfaces of the one or more transport arms 16904A, 16904B, 16904C, 16904D, 16904E, and 16904F.

In some embodiments, the one or more charging pads may be attached to the one or more transport arms 16904A, 16904B, 16904C, 16904D, 16904E, and 16904F using one or more chemical adhesives. In some embodiments, the one or more charging pads may be attached to the one or more transport arms 16904A, 16904B, 16904C, 16904D, 16904E, and 16904F through other mechanisms.

Although only four charging devices 16906A, 16906B, 16906C, and 16906D are shown in FIG. 169, in some embodiments the example smart rack 16900 may include more or fewer than four charging devices 16906A, 16906B, 16906C, and 16906D. In some embodiments, one charging device 16906A, 16906B, 16906C, and 16906D may be disposed on a respective transport arm 16904A-F. Various configurations of charging devices 16906A, 16906B, 16906C, and 16906D may be arranged on the rack frame 16902 and the one or more transport arms 16904A, 16904B, 16904C, 16904D, 16904E, and 16904F.

In some embodiments, the rectangular prism may have one or more batteries installed in or on it. For example, the one or more batteries may be disposed on an housing defined by the rectangular prism. In some embodiments, the one or more batteries may be internal batteries. In some embodiments, the one or more charging devices 16906A, 16906B, 16906C, and 16906D may be configured to charge the one or more internal batteries disposed in the rectangular prism when the rectangular prism is in contact with the example smart rack 16900. For example, the one or more charging devices 16906A, 16906B, 16906C, and 16906D may comprise one or more wireless charging pads. In such an example, the one or more charging devices 16906A, 16906B, 16906C, and 16906D may comprise one or more transmitter coils that are connected to a power source, and the batteries in the rectangular prisms are connected to receiver coils that are disposed on the bottom portions of the rectangular prisms. When the rectangular prisms are placed on the one or more charging devices 16906A, 16906B, 16906C, and 16906D (for example, when the rectangular prisms are placed on the one or more transport arms 16904A, 16904B, 16904C, 16904D during transport), the receiver coils from the rectangular prisms receive electromagnetic field generated by transmitter coils of the one or more charging devices 16906A, 16906B, 16906C, and 16906D, and convert the electromagnetic energy into electrical energy for charging the batteries of the rectangular prisms.

In some embodiments, the one or more charging devices 16906A, 16906B, 16906C, and 16906D may be configured to toggle between a charging state (i.e., charging the internal batteries in the rectangular prism) and a non-charging state (i.e., not charging the internal batteries in the rectangular prism). For example, the one or more charging devices 16906A, 16906B, 16906C, and 16906D may comprise one or more switches that may connect the transmitter coils to the power source or disconnect the transmitter coils from the power source. While the description above provides an example wireless charging mechanism, it is noted that the scope of the present disclosure is not limited to the description above.

Referring to FIG. 170, a perspective view of an example tote 17000 is shown, according to various embodiments. According to various embodiments, the example tote 17000 may be a rectangular prism with a hollow interior configured for storing one or more objects. In some embodiments, the example tote 17000 may have a similar structure, features, and elements to the totes previously described in this disclosure. In some embodiments, the example tote 17000 may be implemented similarly in an example smart rack as previously described in this disclosure.

Still referring to FIG. 170 but also referring to FIG. 171, which shows an elevation side view of an example tote 17000, the tote 17000 may have varying geometry, such as one or more lips 17002, 17004, according to various embodiments. Though two lips are shown in FIG. 170 for an example tote 17000, the example tote 17000 may include more than two lips or fewer than two lips, as desired. Further, in some embodiments, the lips 17002, 17004 may be defined at different locations on the tote 17000 than as shown in FIGS. 170 and 171.

In some embodiments, an example tote 17000 may include one or more rails 17006, 17008. In some embodiments, the one or more rails 17006, 17008 may provide support and may run along the lips 17002, 17004 of the tote 17000. For example, the one or more rails 17006, 17008 may provide recessed portions on the tote 17000 where protrusions from the one or more arms 17010, 17012 may engage with the one or more rails 17006, 17008. As such, the one or more rails 17006, 17008 may hold the example tote 17000 in place when no power is applied to the smart rack. In some embodiments, the one or more rails 17006, 17008 may include one or more of rollers, bearings, or smooth surfaces to mitigate the effects of friction and to help support radial and axial forces.

As described above and shown in at least FIG. 170, the example tote 17000 may engaged with one or more arms 17010, 17012. In some embodiments, the one or more arms 17010, 17012 may be operably engaged with the one or more rails 17006, 17008. In some embodiments, the one or more arms 17010, 17012, when engaged with the one or more rails 17006, 17008, may hold the example tote 17000 in place within the smart rack when the smart rack is unpowered. In some embodiments, the one or more arms 17010, 17012 may be substantially planar, substantially rectangular in some portions and substantially triangular in other portions. In some embodiments, the one or more arms 17010, 17012 may be substantially parallel to each other. In some embodiments, the one or more arms 17010, 17012 may include one or more notch portions that operably engage the one or more rails 17006, 17008 and one or more flange portions that flare out from the one or more rails 17006, 17008 and may hold the example tote 17000 within the smart rack. In some embodiments, the one or more arms 17010, 17012 may be metallic, while in other embodiments, the one or more arms 17010, 17012 may be plastic or composite material.

In some embodiments, the example tote 17000 may include one or more channels 17014, 17016. As shown in at least FIGS. 170 and 171, the one or more channels 17014 and 17016 are disposed on the bottom of the example tote 17000. In some embodiments, and as shown in at least FIG. 171, an example peg 17018 may also be disposed on the bottom of the example tote 17000, disposed between the one or more channels 17014, 17016. In some embodiments, the one or more channels 17014, 17016 engage with the one or more arms 17010, 17012 and/or the one or more rails 17006, 17008 when the example tote 17000 is transported between smart racks, as described above.

Referring to FIG. 172, a perspective view of a pneumatic smart rack 17200 is shown, according to various embodiments. In some embodiments, the example smart rack 17200 may be configured to support and/or transport a rectangular prism with a hollow interior configured for storing one or more objects. In some embodiments, the rectangular prism may be a tote. In some embodiments, the pneumatic smart rack 17200 may have a similar structure, features, and elements to the smart racks previously described in this disclosure. In some embodiments, the pneumatic smart rack 17200 may be implemented similarly in an example superstructure as previously described in this disclosure. In some embodiments, the pneumatic smart rack 17200 may include a rack frame 17201, which may be a rack frame as previously described for example smart racks in this disclosure.

In some embodiments, the pneumatic smart rack 17200 may include one or more actuator mechanisms 17202A-C configured to secure or attach the pneumatic smart rack 17200 to one or more other smart racks within the superstructure. In some embodiments, the one or more actuator mechanisms 17202A-C may be further configured to move the pneumatic rack 17200 to within the superstructure. In some embodiments, the one or more actuator mechanisms 17202A-C may enable speedier and more efficient installation of the pneumatic smart rack 17200 in a superstructure. In the present disclosure, pneumatic actuator mechanisms refers to mechanisms that use compressed air to create motion or force (for example, to secure a smart rack to a neighboring smart rack, the move the smart rack, etc.). In some embodiments, one or more of the actuator mechanisms 17202A-C may be a plunger, a valve, or similar pneumatic actuator mechanism. In other embodiments, the one or more actuator mechanisms 17202A-C may be non-pneumatic actuators. In some embodiments, each actuator mechanism of the one or more actuator mechanisms 17202A-C may be configured to secure the pneumatic smart rack 17200 to a neighboring smart rack in a respective direction. For example, one actuator mechanism 17202A may be configured to secure the pneumatic smart rack 17200 to a neighboring smart rack in the "X" direction (as indicated by the coordinates system in at least FIG. 172); another actuator mechanism 17202B may be configured to secure the pneumatic smart rack 17200 to a neighboring smart rack in the "Y" direction; and still another actuator mechanism 17202C may be configured to secure the pneumatic smart rack 17200 to a neighboring smart rack in the "Z" direction. Although in at least FIG. 172 the actuator mechanisms 17202A-C are depicted as external to the rack frame 17201, in some embodiments, the actuator mechanisms 17202A-C may be disposed within the rack frame 17201 of the pneumatic smart rack 17200 such that the actuator mechanisms 17202A-C do not protrude from the rack frame 17201. For example, the actuator mechanisms 17202A-C may be disposed within a housing that is hidden within the pneumatic smart rack 17200, and may be extended to outside of the pneumatic smart rack 17200 when it is activated.

In some embodiments, the pneumatic smart rack 17200 may include a control valve 17204. In some embodiments, the control valve 17204 may be configured to selectively activate one or more of the one or more actuator mechanisms 17202A-C. In some embodiments, the control valve 17204 may be configured to selectively activate only a single actuator mechanism 17202A-C at a time (e.g., only 17202A may be activated to move the pneumatic smart rack 17200 along the "X" axis, while 17202B and C may not be activated simultaneously). In other embodiments, multiple actuator mechanisms 17202A-C may be simultaneously activated by the control valve 17204. In some embodiments, the control valve 17204 may include one or more ports 17206A-D. In some embodiments, each port of the one or more ports 17206A-D may be configured to activate a respective actuator mechanism 17202A-C. In some embodiments, the one or more ports 17206A-D may be wirelessly connected to the actuator mechanisms 17202A-C, while in other embodiments the one or more ports 17206A-D may be connected to the actuator mechanisms 17202A-C via wires running within or along the rack frame 17201. In some embodiments, there may be more ports 17206A-D than there are actuator mechanisms 17202A-C. In some embodiments, more than one port of the one or more ports 17206A-D may control one of the actuator mechanisms 17202A-C (e.g., ports 17206C and D may each control actuator mechanism 17202C).

Referring to FIG. 173, a perspective view of an example platform 17300 is shown, according to various embodiments. According to various embodiments, the example platform 17300 may be configured to hold and secure one more example smart racks 17302. In some embodiments, the example smart racks 17302 may have a similar structure, features, and elements to the smart racks previously described in this disclosure. In some embodiments, the example smart racks 17302 may include one or more totes as previously described in this disclosure, and may also be implemented into a superstructure, again as described previously in this disclosure.

In some embodiments, the platform 17300 may be a substantially rectangular shape and may have a plurality of notches 17304 into which one or more example smart racks 17302 may be secured. In some embodiments, the plurality of notches 17304 may be substantially square or rectangular or whatever shape is necessary to hold and secure the one or more smart racks 17302. In some embodiments, the platform 17300 may be assembled by fitting together one or more smaller platforms. In at least this way, the platform 17300 may be modular, with smaller portions fitting together (e.g., by snap-fits). In some embodiments, the platform 17300 may be composed of metal or concrete and configured to be secured to a surface, such as a floor. In some embodiments, the platform 17300 may be secured to the surface (e.g., a factory floor) using one or more fasteners, such as nuts and bolts.

In some embodiments, the platform 17300 may be secured in a location (e.g., a warehouse, factory floor, or other work site), and then one or more example smart racks 17302 may be installed into the platform 17300. In some embodiments, the smart racks 17302 may be secured to the platform 17300 by one or more fasteners, such as clips or bolts. In other embodiments, the one or more smart racks 17302 may be snap-fit installed into the platform 17300. For example, the one or more notches 17304 may be configured such that the smart racks 17302 may be snugly fit into the one or more notches 17304. In some embodiments, the one or more smart racks 17302 may be installed prior to installing the platform 17300, but in other embodiments the smart racks 17302 may be installed in the platform 17300 and then the platform 17300 may be installed at the work site. As illustrated in FIG. 173, the platform 17300 provides various technical benefits and advantages such as, but not limited to, allowing the modular superstructure to be assembled quickly and easily.

Referring to FIG. 174, a perspective view of an example superstructure 17400 is shown, according to various embodiments. According to various embodiments, and as previously described in this disclosure, the example superstructure 17400 may include a frame 17401 configured to hold one or more example smart racks 17402, 17404, which may be configured to hold and secure one more example totes. In some embodiments, the example smart racks 17402, 17404 may have similar structures, features, and elements to the smart racks previously described in this disclosure.

Still referring to FIG. 174, but also referring to FIG. 175, which shows an exploded view of the example superstructure 17400, the example superstructure 17400 may include an exoskeleton 17406 and one or more dampeners 17408. In some embodiments, the smart racks 17402, 17404 may be secured to the frame 17401 of the superstructure 17400 after the superstructure is installed at a designated location (e.g., a work site or a distribution center). In some embodiments, the frame 17401 may include one or more levels for supporting one or more of the smart racks 17402, 17404.

In the present disclosure, the exoskeleton 17406 is a load-bearing structure that is located on the exterior of the example smart racks 17402, 17404 that provides support and stability to the example smart racks 17402, 17404. In some embodiments, the exoskeleton 17406 may be attached to the frame 17401 of the superstructure 17400 to provide support for the superstructure 17400. In some embodiments, the exoskeleton 17406 may secure the smart racks 17402, 17404 within the superstructure 17400. In some embodiments, the exoskeleton 17406 may similarly secure one or more totes within the smart racks 17402, 17404. In some embodiments, the exoskeleton 17406 may be a metallic material configured to be wrapped around and/or contain all of the superstructure 17400 or merely a portion of the superstructure 17400. As illustrated in these examples, the exoskeleton 17406 free up space within the modular superstructure as there is no need for interior support, providing greater design flexibility.

In the present disclosure, the one or more dampeners 17408 refers to devices that absorb or dissipate energy and reduce the amplitude of structural vibrations. In some embodiments, the one or more dampeners 17408 may be fixedly attached to the exoskeleton 17406. In some embodiments, the dampeners 17408 may be attached to the superstructure 17400 directly. In some embodiments, the dampeners 17408 may be configured to reduce vibration of the exoskeleton 17406 and/or the superstructure 17400. In some embodiments, the dampeners 17408 may be composed of rubber and/or synthetic material. As illustrated in these examples, the dampeners 17408 provide technical benefits and advantages such as, but not limited to, reducing oscillations and improving structural stability of the modular superstructure.

Referring to FIG. 176, a perspective view of a rectangular prism 17600 is shown, according to various embodiments. In some embodiments, the rectangular prism 17600 may be a rectangular prism as previously described in this disclosure with a hollow interior configured for storing one or more objects. In some embodiments, the rectangular prism 17600 may have a similar structure, features, and elements to the totes previously described in this disclosure. In some embodiments, the rectangular prism 17600 may be implemented similarly in an example smart rack as previously described in this disclosure. In some embodiments, this example smart rack may be integrated into a larger superstructure, also as previously described in this disclosure.

In some embodiments, the rectangular prism 17600 may be configured to fold in on itself such that the rectangular prism 17600 collapses to reduce space and to ease shipment and storage. In some embodiments, the rectangular prism 17600 may have foldable sides, such as a cardboard box. As an example, the rectangular prism 17600 may comprise a foldable side 17602 and a foldable side 17604. In such an example, the foldable side 17602 defines a folding line 17606 and the foldable side 17604 defines a folding line 17608. To fold the rectangular prism 17600, the edge 17610 between the foldable side 17602 and the foldable side 17604 may be disjoined (for example, the edge 17610 may comprise detachable fasteners such as, but not limited to, a zipper). After the edge 17610 is disjoined, the foldable side 17602 may be folded along the folding line 17606 and the foldable side 17604 may be folded along the folding line 17608. In some embodiments, collapsible tote 17600 may fold by other means.

Various examples of the present disclosure provide technical benefits and advantages such as, but not limited to, providing various configurations of rectangular prisms to accommodate for different use needs. Referring to FIGS. 177, 178, and 179, three top plan views of an example tote 17700 is shown, according to various embodiments. According to various embodiments, and as previously described in this disclosure, the example tote 17700 may be a rectangular prism secured within a smart rack as previously described in this disclosure. In some embodiments, the example tote 17700 may have similar structures, features, and elements to the totes previously described in this disclosure. As shown in the various figures, the example tote 17700 may include a variety of compartments 17702.

For example, in FIG. 177, the example tote 17700 includes a single compartment 17702 for storing one or more objects (for example, objects that are not fragile such as, but not limited to, apples).

In FIG. 178, in some embodiments, the example tote 17700 may include 12 compartments 17704. In some embodiments, these compartments may be created by dividing the tote 17700 using dividers, such as plastic dividers snugly fit into the tote 17700. The dividers may be made of other material besides plastic (e.g., paper, cardboard), according to various embodiments. In other embodiments, the tote 17700 may be manufactured with compartments 17704 already created; that is, the tote 17700 may be molded to include compartments 17704. In some embodiments, these multiple compartments 17704 may be configured to support fragile products (e.g., wine bottles) that cannot be stacked inside a single compartment of a tote 17700 (e.g., as in FIG. 177).

In FIG. 179, in some embodiments, the example tote 17700 may include 4 compartments 17706. In some embodiments, the number of compartments 17706 of FIG. 179 may be a middle ground between the number of compartments in FIGS. 177 and 178. In some embodiments, the one or more objects stored in the compartments 17706 may be a collections of the related fragile items (such as, not limited to, dinnerware sets). However, it will be understood that a variety of objects may be supported within the compartments 17706.

Referring to FIG. 180 a top plan view of an example smart arm 18000 is shown, according to various embodiments. According to various embodiments, and as previously described in this disclosure, the example smart arm 18000 may be attached to an example smart rack, which may be a part of a larger superstructure and configured to hold one or more totes containing one or more objects. In some embodiments, the example superstructure, smart rack, and tote may have similar structures, features, and elements to the superstructure, smart rack, and totes previously described in this disclosure.

Referring now to FIG. 180, but also to FIGS. 181 and 182, which show, respectively, an elevation side view and a perspective view of the example smart arm 18000, the smart arm 18000 may include a sensor 18002. In some embodiments, this sensor 18002 may be a 3D magnetic sensor configured for one or more of tote alignment and tote location detection. In some embodiments, the sensor 18002 may be an optical sensor. In further embodiments, the sensor 18002 may comprise multiple sensors, which may comprise a mixture of magnetic sensors and optical sensors to allow various measurements such as tote position, alignment, and movement. In some embodiments, the sensor 18002 may have a corresponding sensor on one or more totes within the smart rack of larger superstructure. For example, one or more magnets may be embedded into the molding of the tote, and these one or more magnets may be detectable by the sensor 18002.

In some embodiments, the smart arm 18000 may include one or more switches 18004, which may be used for moving one or more totes within the smart rack or within the superstructure and/or for detecting the position of one or more totes within the smart rack and/or superstructure. In some embodiments, and as shown in FIG. 180, the switches 18004 may be one or more magnetic switches. In some embodiments, the switches 18004 may be disposed at various locations on the arm 18000. While the switches 18004 are shown disposed on a single, shared side in at least FIG. 180, in other embodiments the switches 18004 may be disposed on opposite or multiple sides of the arm 18000.

In some embodiments, the smart arm 18000 may include a controller 18006, which may be a microcontroller configured for sensor processing. In some embodiments, the controller 18006 may be controlled remotely by an operator, while in other embodiments the controller 18006 may function independently of an operator. In some embodiments, the controller 18006 may include one or more of a central processing unit (CPU) and a memory unit for storing short and/or long-term data. In some embodiments, the controller 18006 may include one or more transceiver units for communicating with one or more of the sensor 18002 and/or the switches 18004. In some embodiments, the controller 18006 may calculate (e.g., via the processor) data from the sensor 18002 and/or the switches 18004 and calculate statistics, such as movement, location, and speed. These statistics may be sent (e.g., by the transceiver) to a controller for one or more of the smart racks or the superstructure, which may use these statistics to detect failures, anomalies, reliability issues, and other performance information.

As shown in the various figures, but particularly in FIGS. 181 and 182, the arm 18000 may define one or more raised, rail portions 18008 and a substantially planar portion 18010. In some embodiments, the rail portions 18008 may fit into one or more rails in a smart rack and be configured to secure the arm 18000 to the smart rack. In other embodiments, the planar portion 18010 may be configured to flare out from the smart rack or into the smart rack and may be further configured to support one or more totes within the smart rack or the larger superstructure.

Referring to FIG. 183, a perspective view of an example smart rack 18300 is shown, according to various embodiments. According to various embodiments, the example smart rack 18300 may be a smart rack configured to hold one or more totes and contained within a larger superstructure, as previously described in this disclosure. In some embodiments, the example tote and the superstructure may have a similar structure, features, and elements to the totes and superstructure previously described in this disclosure.

In some embodiments, the example smart rack 18300 may include a rack frame 18302 that may be configured to hold one or more totes 18304. In some embodiments, the totes 18304 may be a rectangular prism, as previously described.

In some embodiments, the smart rack 18300 may include an arm 18306. In some embodiments, the arm 18306 may be an elongated, substantially planar bar with a rectangular portion and a right triangular portion. In some embodiments, the arm 18306 may define a flat portion aligned with the rack frame 18302 and a raised portion. In some embodiments, the arm 18306 may be operably connected to one or more actuators 18308. In some embodiments, the arm 18306 may be operably connected to the actuators 18308 at a fixed, pivot point, about which the actuators 18308 may cause the arm 18306 to pivot.

In some embodiments, the arm 18306 may include one or more rollers 18310. In some embodiments, the rollers 18310 may be disposed on a tip of the arm 18306 (e.g., on the top point of the right triangular portion of the arm 18306). In some embodiments, the rollers 18310 may be fixedly or operably connected to the arm 18306 and attached by one or more fasteners. In other embodiments, the rollers 18310 may be integrated into the arm 18306 (e.g., molded into the arm 18306 when the arm 18306 is manufactured). In some embodiments, the one or more rollers 18310 may assist in lateral contact between the arm 18306 and the tote 18304. In some embodiments, the one or more rollers 18310 may have a vertical axis of rotation. In some embodiments, the one or more rollers 18310 may reduce friction between the arm 18306 and the tote 18304.

As shown in FIG. 184, the arm 18306 may pivot about the fixed point where it is operably engaged with the actuators 18308 and thereby move the tote 18304 from one smart rack (e.g., 18300) to another smart rack within the superstructure. This motion is depicted by the arrows. As shown in FIG. 184, when the arm 18306 engages with the rectangular prism 18304 to move the rectangular prism 18304, the rollers 18310 is contact with the rectangular prism 18304 and may facilitate the movement of the rectangular prism 18304. In some embodiments, the arm 18306 may pivot about a different point or in a different direction indicated by the arrows, as desired. Though only a single arm 18306 is shown in the figures, an example smart rack 18300 may include multiple arms disposed at multiple locations on the rack frame 18302.

Various embodiments of the present disclosure may be implemented to overcome various technical challenges and difficulties. For example, various embodiments of the present disclosure may be implemented in connection with item retrieval apparatus.

In the present disclosure, item retrieval apparatus refers to an apparatus that comprises one or more components for storing items and at least one user interface component that receives user inputs for retrieving the items. For example, an example item retrieval apparatus may be in the form of a vending machine. In such an example, vending machines need to be filled up every day, which can be a very time consuming process. In particular, the limited space within the vending machines limit the number of items that can be stored within the vending machines.

Various embodiments of the present disclosure overcome these technical challenges and difficulties, and provide various technical improvements and advantages. For example, by implementing a modular superstructure within a vending machine, various embodiments of the present disclosure can significantly increase the number of items that can be stored within the vending machine. In some embodiments, the vending machine may utilize rectangular prisms that are transparent (for example, comprising glass materials) within the modular superstructure, allowing users to see what products are stored within the rectangular prisms.

Referring now to FIG. 185, an item retrieval apparatus 18500 in accordance with some embodiments of the present disclosure is illustrated. In the example shown in FIG. 185, the example item retrieval apparatus 18500 comprises a housing 18501 and a modular superstructure 18503.

In some embodiments, the housing 18501 comprises a user interface component 18505. In some embodiments, the user interface component 18505 provides one or more user interface elements that allows a user to provide user input indicating one or more item selections to the item retrieval apparatus 18500. In some embodiments, the user interface component 18505 comprises at least one display. In some embodiments, the user interface component 18505 comprises at least one button (for example, the user interface component 18505 may comprise one or more keyboards and one or more keypads).

In some embodiments, the modular superstructure 18503 is disposed within the housing 18501. In some embodiments, the modular superstructure 18503 may be secured to the inner bottom portion of the housing 18501. In some embodiments, the modular superstructure 18503 may be secured to the inner back portion of the housing 18501.

In some embodiments, the housing 18501 comprises at least one transparent wall 18507. For example, the at least one transparent wall 18507 may define at least a part of the housing 18501 of the modular superstructure 18503. In some embodiments, the modular superstructure 18503 is visible through the at least one transparent wall 18507.

In some embodiments, the housing 18501 further defines at least one egress point 18509. For example, the at least one egress point 18509. For example, the at least one egress point 18509 may be an opening on the housing 18501, through which a user may obtain items from the modular superstructure 18503. Various examples of the present disclosure may provide various example methods for causing the example item retrieval apparatus 18500 to convey a selected item to the at least one egress point 18509.

Referring now to FIG. 186, an example method 18600 that may be executed by an example item retrieval apparatus in accordance with some embodiments of the present disclosure.

In some embodiments, the example method 1860 may be executed by an example processor or a computing apparatus associated with the modular superstructure (for example, the modular superstructure 18503), similar to various example processors and computing apparatuses described herein.

In the example shown in FIG. 186, the example method 18600 starts at step/operation 18602. In some embodiments, subsequent to and/or in response to step/operation 18602, the example method 18600 proceeds to step/operation 18604. At step/operation 18604, the example method 18600 may include receiving user input data indicating at least one item selection in some embodiments.

For example, the user input data may be received through the user interface component of the example item retrieval apparatus (for example, the user interface component 18505 described above in connection with FIG. 185). As an example, a user may use a display (such as, but not limited to, a touch screen) of the user interface component and/or one or more keyboards or keypads to indicate one or more item selections of items that the user would like to retrieve from the example item retrieval apparatus.

Referring back to FIG. 186, subsequent to and/or in response to step/operation 18604, the example method 18600 proceeds to step/operation 18606. At step/operation 18606, the example method 18600 may include determining at least one rectangular prism identifier associated with the item selection in some embodiments.

For example, a data storage device (such as, but not limited to, a computer database, a computer memory, and/or the like) may store data that indicates associations between rectangular prism identifiers associated with rectangular prisms in the modular superstructure with items identifiers. For example, the data storage device may indicate that an item identifier (for example, a product SKU) is associated with a rectangular prism identifier (for example, a tote identifier number). In such an example, the tote associated with the tote identifier number stores the item that is associated with the product SKU.

In some embodiments, to determine the at least one rectangular prism identifier associated with the item selection, the processor or computing apparatus may retrieve such data from the data storage device, and determine at least one tote identifier number that is associated with the item election received at step/operation 18604.

Referring back to FIG. 186, subsequent to and/or in response to step/operation 18606, the example method 18600 proceeds to step/operation 18608. At step/operation 18608, the example method 18600 may include executing a tote plan to cause the at least one rectangular prism to travel to the egress point in some embodiments.

In some embodiments, the processor and/or the computing apparatus may generate the tote plan based on various example methods described herein. For example, the processor and/or the computing apparatus may determine a location of the rectangular prism associated with the rectangular prism identifier as the source location and the egress location of the item retrieval apparatus as the egress location. In such examples, by executing the tote plan, the rectangular prism that stores the item selected by the user may be conveyed to the egress point of the item retrieval apparatus so that it may be retrieved by a user.

Referring back to FIG. 186, subsequent to and/or in response to step/operation 18608, the example method 18600 proceeds to step/operation 18610 and ends.

Various embodiments of the present disclosure overcome various technical challenges and difficulties associated with item conveyance. For example, various embodiments of the present disclosure provide capabilities and methodologies of cleaning and sanitating rectangular prisms (such as, but not limited to, totes) so they can be reused. Additionally, or alternatively, various embodiments of the present disclosure may provide capabilities and methodologies for implementing a maintenance or cleaning schedule for rectangular prisms (such as, but not limited to, totes) depending on their sanitation levels and exposure to content.

Referring now FIG. 187, an example rectangular prism sanitation system 18700 in accordance with some embodiments of the present disclosure is illustrated.

In the example shown in FIG. 187, the example rectangular prism sanitation system 18700 comprises a modular superstructure 18701, at least one rectangular prism transport assembly 18703, and at least one rectangular prism sanitation apparatus 18709.

In some embodiments, the modular superstructure 18701 is similar to the various modular superstructure 18701 described herein. For example, the modular superstructure 18701 comprises a plurality of smart racks, similar to the various examples described herein.

In some embodiments, the at least one rectangular prism transport assembly 18703 is external to and separable from the modular superstructure 18701. For example, the at least one rectangular prism transport assembly 18703 may be secured to at least one of the plurality of smart racks of the modular superstructure 18701.

For example, the at least one rectangular prism transport assembly 18703 may comprise at least one rectangular prism egress roller assembly 18705 and at least one rectangular prism ingress roller assembly 18707. In such an example, the at least one rectangular prism transport assembly 18703 may comprise at least one conveyor belt that connects the at least one rectangular prism egress roller assembly 18705 and the at least one rectangular prism ingress roller assembly 18707. Similar to the various examples described above, a plurality of rectangular prisms is positioned in the plurality of smart racks. In some embodiments, a rectangular prism may be transported out of the modular superstructure 18701 by the at least one rectangular prism egress roller assembly 18705. In some embodiments, a rectangular prism may be transported into the modular superstructure 18701 by the at least one rectangular prism ingress roller assembly 18707.

In some embodiments, at least one rectangular prism sanitation apparatus 18709 is secured to the at least one rectangular prism transport assembly 18703. For example, the at least one rectangular prism sanitation apparatus 18709 may be in the form of an overhead structure that defines a tunnel 18711 where one or more rectangular prisms may pass through. For example, the at least one rectangular prism sanitation apparatus 18709 may comprise one or more brushes, cloth strips, form pads, and/or the like that may sanitize the rectangular prisms as they pass through the tunnel 18711.

For example, the at least one rectangular prism transport assembly 18703 may convey at least one rectangular prism of the plurality of rectangular prisms in the modular superstructure 18701 to cause the at least one rectangular prism to exit the modular superstructure 18701 through the at least one rectangular prism egress roller assembly 18705, and to the at least one rectangular prism sanitation apparatus 18709. The at least one rectangular prism transport assembly 18703 may further cause the at least one rectangular prism to pass through the tunnel 18711 of the at least one rectangular prism sanitation apparatus 18709. As the at least one rectangular prism passes through the tunnel 18711, the one or more brushes, cloth strips, form pads, and/or the like may sanitize or clean the at least one rectangular prism. After the at least one rectangular prism is cleaned or sanitized, the at least one rectangular prism transport assembly 18703 coveys the at least one rectangular prism back into the modular superstructure 18701 through the at least one rectangular prism ingress roller assembly 18707.

Referring now to FIG. 188, an example method 180000 that may be executed by a rectangular prism sanitation system in accordance with some embodiments of the present disclosure is illustrated.

In some embodiments, the example method 18800 may be executed by an example processor or a computing apparatus associated with the modular superstructure, similar to various example processors and computing apparatuses described herein.

In the example shown in FIG. 188, the example method 18800 starts at step/operation 18802. In some embodiments, subsequent to and/or in response to step/operation 18802, the example method 18800 proceeds to step/operation 18804. At step/operation 18804, the example method 18600 may include receiving a rectangular prism status data object in some embodiments.

In some embodiments, the rectangular prism status data object may comprise data and/or information associated with a rectangular prism in a modular superstructure. For example, the rectangular prism status data object may comprise data and/or information such as, but not limited to, sanitation indication associated with the rectangular prism (e.g. how clean is the rectangular prism), storage indication associated with the rectangular prism (e.g. what items are stored in the rectangular prism), and/or the like).

Referring back to FIG. 188, subsequent to and/or in response to step/operation 18804, the example method 18800 proceeds to step/operation 18806. At step/operation 18806, the example method 18800 may include determining a sanitation indication associated with the rectangular prism status data object in some embodiments.

As described above, the rectangular prism status data object may comprise the sanitation indication. In such examples, the sanitation indication indicates a level of cleanliness associated with the rectangular prism.

In some embodiments, the sanitation indication associated with the rectangular prism status data object may be generated based at least in part on other data and/or information associated with the rectangular prism status data object. For example, the sanitation indication may be generated based on the storage indication associated with the rectangular prism. For example, if the storage indication indicates that the rectangular prism has stored items that may contaminate the rectangular prism, a processor or a computing apparatus may generate a sanitation indication indicating that the rectangular prism has a low sanitation level.

While the description above provides an example step/operation of determining the sanitation indication, it is noted that the scope of the present disclosure is not limited to the description above.

Referring back to FIG. 188, subsequent to and/or in response to step/operation 18806, the example method 18800 proceeds to step/operation 18808. At step/operation 18808, the example method 18800 determine whether the sanitation indication satisfies a sanitation threshold.

In some embodiments, the sanitation threshold indicates a threshold level of cleanliness associated with the rectangular prism. If the sanitation level is below the sanitation threshold, the rectangular prism needs to be cleaned. If the sanitation level is above the sanitation threshold, the rectangular prism does not need to be cleaned.

If, at step/operation 18808, the sanitation indication satisfies the sanitation threshold, the example method 18800 proceeds to step/operation 18812 and ends.

If, at step/operation 18808, the sanitation indication does not satisfy the sanitation threshold, the example method 18800 proceeds to step/operation 18810. At step/operation 18806, the example method 18800 may include causing the at least one rectangular prism to be conveyed to a rectangular prism sanitation apparatus.

For example, at least one rectangular prism transport assembly may convey the at least one rectangular prism from the rectangular prism to a rectangular prism sanitation apparatus, the rectangular prism sanitation apparatus may clean the rectangular prism, and the at least one rectangular prism transport assembly may convey the at least one rectangular prism back to the modular superstructure, similar to those described above in connection with at least FIG. 187.

While the description above provides an example step/operation of determining whether a rectangular prism needs to be cleaned, it is noted that the scope of the present disclosure is not limited to the description above. In some examples, an example method may determine whether one or more rectangular prisms need to be cleaned through other methods.

For example, an example method may include retrieving cleaning or maintenance schedule data associated with the rectangular prism and determining whether the cleaning or maintenance schedule data indicates that the rectangular prism needs to be cleaned.

Referring back to FIG. 188, subsequent to and/or in response to step/operation 18810, the example method 18800 proceeds to step/operation 18812 and ends.

FIG. 189 illustrates a modular superstructure 18904, in accordance with some embodiments of the present disclosure. The modular superstructure 18904 can include a plurality of rack frames 18900. Each rack frame 18900 can include a plurality of rack beams 18902, including, but not limited to, a plurality of top rack beams 18902A, a plurality of lateral rack beams 18902B, and a plurality of bottom rack beams 18902C. The modular superstructure 18904 can define an X-direction, a Y-direction that is orthogonal to the X-direction, and a Z-direction that is orthogonal to the X-direction and the Y-direction. The Z-direction can be a vertical direction.

In various examples, at least one of the rack frames 18900 includes a plurality of flap assemblies 18920. For example, at least one of the plurality of bottom rack beams 18902C can include a plurality of flap assemblies 18920. Each flap assembly 18920 can include a plurality of wheels 18921. Each of the plurality of wheels 18921 can be configured as an omni-wheel. For example, each wheel 18921 can be configured to rotate on a wheel axis and each wheel 18921 can include a plurality of rollers that are each configured to rotate on its own roller axis that is orthogonal to the wheel axis. In various examples, the plurality of wheels 18921 are configured the same as, or similar to various example wheels described above, such as, but not limited to, those described in connection with at least FIG. 165 to FIG. 168. In various examples, the plurality of wheels 18921 provide mechanical guidance for moving the rectangular prisms between rack frames.

In some embodiments, each wheel 18921 can include one or more electric motors (not depicted) that are configured to rotate at least one of the wheels 18921. In various examples, one motor is provided to rotate two or more wheels 18921 and gears are provided to transfer torque from the electric motor to the two or more wheels 18921. However, in various other examples, each wheel 18921 does not include an electric motor. Instead, each wheel 18921 is free to rotate on its axis.

In various examples, the flap assembly 18920 can be pivotably coupled, directly or indirectly, to a bottom rack beam 18902C of a rack frame 18900. For example, a hinge can be provided between the flap assembly 18920 and the corresponding rack beam 18902 to allow the flap assembly 18920 to pivot in relation to the corresponding rack beam 18902.

As depicted in the left-most rack frame 18900 of FIG. 189, each flap assembly 18920 can be configured to pivot upward to allow an object, such as a rectangular prism, to move upward into the corresponding rack frame 18900. As depicted in the right-most rack frame 18900 of FIG. 189, the flap assembly 18920 can be configured to move downward once the object has moved past the flap assembly 18920. In the downward position, the flap assembly 18920 can extend substantially horizontally (e.g., within 2 degrees, such as within 1 degree) along the X-direction and the Y-direction. In various examples, one or more electric motors can be provided to pivot the flap assemblies. However, in various other examples, the pivot assemblies pivot upward from a force exerted by the object and pivot downward from a gravitational force.

In various examples, and as depicted in FIG. 189, at least one of the rack frames 18900 of the modular superstructure 18904 can include at least one arm assembly 18930. For example, at least one of the rack frames 18900 can include a plurality of arm assemblies 18930, such as two, three, four or more arm assemblies 18930. Each arm assembly 18930 can be configured to pivot on an axis that is defined by the Z-direction. For example, each arm assembly 18930 can be configured to pivot on an axis defined by the corresponding rack beam 18902.

In various examples, each arm assembly 18930 includes a base 18932. The base 18932 can be configured to rotate on the axis that is defined by the Z-direction. For example, the base 18932 can be configured to rotate around, at least partially, the corresponding rack beam 18902. For example, the base 18932 can be rotatably coupled, directly or indirectly, to the corresponding rack beam 18902. As depicted in FIG. 189, the base 18932 can be cylindrical and can extend circumferentially around the rack beam 18902. Various mechanical devices, such as one or more gears, bearings, and/or electric motors can be provided to rotate the base 18932 relative to the corresponding rack beam 18902.

In various examples, each arm assembly 18930 includes a shaft 18934. The shaft 18934 can be configured to move linearly towards and away from the corresponding rack beam 18902 and/or the base 18932. For example, the shaft 18934 can be coupled, directly or indirectly, to the base 18932 and the arm assembly 18930 can include various mechanical devices, such as actuators to move the shaft 18934 linearly in relation to the base 18932.

In various examples, each arm assembly 18930 includes one or more arms 18936. Each of the one or more arms 18936 can be coupled, directly or indirectly, to the shaft 18934. Each arm 18936 can be configured to rotate on a plurality of axis that extend radially from an axis that is defined by the Z-direction. For example, each arm 18936 can be configured to rotate on axis that extends orthogonally from the corresponding rack beam 18902. In such an example, the arm 18936 may be connected to the base 18932 through one or more rotating mechanism such as, but not limited to, one or more gears, bearings, flywheels and/or the like. In various examples, each arm 18936 can be configured to rotate relative to the corresponding shaft 18934. However, in various other examples, each arm 18936 and the corresponding shaft 18934 are coupled together and the arm 18936 and the shaft 18934 are configured to rotate in unison relative to the base 18932. Various mechanical devices, such as one or more gears, bearings, and/or electric motors can be provided to rotate the arm 18936 and/or the shaft 18934.

In various examples, each arm 18936 can include a plurality of wheels 18937. Each of the plurality of wheels 18937 can be configured to rotate on its own wheel axis. Each of the wheel axis of the plurality of wheels 18937 can be substantially parallel (e.g., within two degrees, such as within one degree) to each other. Each of the plurality of wheels 18937 can include, or be manufactured from, a grippy material, such as a rubber. Various mechanical devices, such as gears, bearings, and/or electric motors can be provided to rotate each of the plurality of wheels 18937.

FIG. 190 illustrates the modular superstructure 18904 of FIG. 189, in accordance with some embodiments of the present disclosure. More specifically, FIG. 190 illustrates each arm assembly 18930 in a first position. When an arm assembly 18930 is in the first position, the arm assembly 18930 is configured to move an object, such as a rectangular prism, in the X-direction. For example, the arm 18936 and the base 18932 of the arm assembly 18930 can be rotated until the arm 18936 is positioned such that a length of the arm 18936 extends substantially (e.g., within two degrees, such as within one degree) in the X-direction. Also, the arm 18936 of the arm assembly 18930 can be extended toward the object, via the shaft 18934, until the arm 18936 makes contact with the object. The wheels 18937 of the arm 18936 can then be rotated to move the object in the X-direction.

Each arm assembly 18930 can be positioned to a second position (not depicted). When an arm assembly 18930 is in the second position, the arm assembly 18930 is configured to move an object, such as a rectangular prism, in the Y-direction. The second position is similar to the first position, but the base 18932 of the arm assembly 18930 is rotated until the arm 18936 is positioned such that a length of the arm 18936 extends substantially (e.g., within two degrees, such as within one degree) in the Y-direction.

FIG. 191 illustrates the modular superstructure 18904 of FIG. 189, in accordance with some embodiments of the present disclosure. More specifically, FIG. 191 illustrates each arm assembly 18930 in a third position. When an arm assembly 18930 is in the third position, the arm assembly 18930 is configured to move an object, such as a rectangular prism, in the Z-direction. For example, the arm 18936 and the base 18932 of the arm assembly 18930 can be rotated until the arm 18936 is positioned such that a length of the arm 18936 extends substantially (e.g., within two degrees, such as within one degree) in the Z-direction. Also, the arm 18936 of the arm assembly 18930 can be extended toward the object, via the shaft 18934 until the arm 18936 makes contact with the object. The wheels 18937 of the arm 18936 can then be rotated to move the object in the Z-direction.

As will be appreciated, the configuration of the one or more rack frames 18900 of the modular superstructure 18904 of FIG. 189 has various benefits. For example, the modular superstructure 18904 that includes the arm assembly 18930 may move an object, such as a rectangular prism in six directions (e.g., opposite directions along each of the X-direction, the Y-direction, and the Z-direction). Also, the modular superstructure 18904 that includes the flap assemblies 18920 can provide a surface for the object to move along the X-direction and the Y-direction, while also allowing the object to move upward and downward in the Z-direction.

FIG. 192 illustrates a rack actuator 19200, in accordance with some embodiments of the present disclosure. The rack actuator 19200 can be coupled, directly or indirectly, to a lateral rack beam of a rack frame. For example, the rack actuator 19200 can be removably coupled to the lateral rack beam of the rack frame. The rack actuator 19200 can define an X-direction, a Y-direction that is orthogonal to the X-direction, and a Z-direction that is orthogonal to the X-direction and the Y-direction.

The rack actuator 19200 can include a linear guide 19201. The linear guide 19201 can define a front portion 19221 that is configured to face away from the corresponding lateral rack beam and a back portion 19223 that is configured to face towards the corresponding lateral rack beam. The linear guide 19202 can define a first end 19225 and a second end 19227 that are opposite to each other along the Z-direction.

The back portion 19223 of the linear guide 19201 of the rack actuator 19200 can include one or more attachment points 19203. For example, and as depicted in FIG. 192, the back portion 19223 can include two attachment points 1920. A first attachment point 19203 can be positioned proximate to the first end 19225 and a second attachment point 19203 can be positioned proximate to the second end 19227. In other examples, the back portion 19223 includes more than two attachment points 19203 such as three, four, five or more attachment points 19203, and each can be positioned anywhere along the back portion 19223 of the linear guide 19201.

Each attachment point 19203 can be associated with a fastener (not depicted) that is coupled to the back portion 19223 of the linear guide 19201 and/or to the corresponding lateral rack beam. For example, each attachment point 19203 can be associated with a quick-release fastener. Example types of quick-release fasteners may include, but not limited to, camlock fittings, ball lock pins, quarter-turn fasteners, side-release buckles, hook and loop fasteners, toggle latches, and snap fasteners.

In some embodiments, the fastener can be configured to removably couple the rack actuator 19200 with the corresponding rack beam. For example, when the attachment point 19203 is associated with a quick-release fastener, the quick-release fastener can be configured to removably couple, relatively quickly, the rack actuator 19200 with the corresponding rack beam.

The rack actuator 19200 can include at least one shaft 19205 that defines a shaft axis 19206 and an arm 19210 that is coupled, directly or indirectly, to the shaft 19205. The arm 19210 can be configured to move up and down along the shaft axis 19206. For example, the arm 19210 can be slidingly coupled to the shaft 19205 and can be configured to move up and down along the shaft 19205. Various mechanical devices, such as actuators, can be provided to move the arm 19220 along the shaft axis 19206.

The arm 19210 can be configured to rotate on the shaft axis 19206. For example, the arm 19210 can be rotatably coupled to the shaft 19205 to rotate on the shaft axis 19206. Various mechanical devices, such as motors, bearings, and/ or gears, can be provided to rotate the arm 19210 on the shaft axis 19206. The arm 19210 can include a body 19211 that extends generally along a plane defined by the X-direction and the Y-direction. The arm 19210 can include a flange 19212 that extend from the body 19211 upward in the Z-direction.

In operation, the arm 19210 of the rack actuator 19200 may be moved to be positioned under an object, such as a rectangular prism, to move the object. The arm 19210, once positioned under the object, can be rotated to move the object in the X-direction and/or the Y-direction and can be actuated to move the object in the Z-direction.

As will be appreciated, the rack actuator 19200 has various benefits. For example, the rack actuator 19200 can be quickly attached to and/or detached from a corresponding rack beam with the quick-release fastener that can be associated with the one or more attachment points 19203 of the rack actuator 19200. Therefore, the rack actuator 19200 can be relatively quickly installed and/or replaced. For example, if the rack actuator 19200 is broken or damaged, it is relatively easy to replace, or remove and repair, the rack actuator 19200. Notably, because the rack actuator 19200 can be quickly attached to and/or detached from the corresponding rack beam with the quick-release fastener, it may be unnecessary to modify or disassemble the corresponding rack beam or rack frame to remove the rack actuator 19200.

FIG. 193 illustrates a linear actuator assembly 19300, in accordance with some embodiments of the present disclosure. The linear actuator assembly 19300 can define an X-direction, a Y-direction that is orthogonal to the X-direction, and a Z-direction that is orthogonal to the X-direction and the Y-direction. The linear actuator assembly 19300 can include an electric motor 19311, a linear guide 19318, a shaft 19316, and a gantry 19320. In various examples, and as depicted in FIG. 193, the linear actuator assembly 19300 is configured as a ball screw that can translate rotational motion to linear motion. For example, the electric motor 19311 can provide rotational motion and rotate the shaft 19316. The shaft 19316 can extend in the Z-direction and can include one or more threads 19317. The gantry 19320 can include a plurality of balls (not depicted) that are configured to move between the one or more threads 19317 of the shaft 19316 as the shaft 19316 rotates. The linear guide 19318 can be configured to prevent rotation of the gantry 19320, but allow the gantry 19320 to move linearly, generally along the Z-direction. Because the gantry 19320 is prevented from rotating by the linear guide 19318, the rotation of the shaft 19316 causes linear movement of the gantry 19320 along the shaft 19316, generally along the Z-direction.

Various components can be coupled, directly or indirectly, to the gantry 19320 of the linear actuator assembly 19300 to move the components linearly with the linear actuator assembly 19300. The components coupled to the gantry 19320 may place the gantry 19320 under load. As will be appreciated, the pitch angle of the one or more threads 19317 of the shaft 19316 can provide the rate of rotational movement transfer to the linear movement of the gantry 19320. When lifting loads, such as lifting the various components coupled to the gantry 19320, the lead angle of the one or more threads 19317 is directly related to the static friction of this movement transfer. In various examples, where the static friction is too low and the electric motor 19311 does not have power, the linear actuator assembly 19300 may not be able to maintain the position of the gantry 19320 when the gantry 19320 is coupled to the various components. As such, when various components are coupled to the gantry 19320, the gantry 19320 and the components coupled to it may fall downward, generally in the Z-direction. However, in various examples, and as depicted in FIG. 193, a motor brake assembly 19350 can be provided that maintains the position of the gantry 19320 and prevents the gantry 19320 and the components coupled to it from falling downward.

FIG. 194 and FIG. 195 illustrate side views of a motor brake assembly 19350, in accordance with some embodiments of the present disclosure. The motor brake assembly 19350 can include a motor (not depicted) that is positioned within a motor brake housing 19354. The motor brake assembly 19350 can include a shaft 19356 and a brake pad 19359 that is coupled to an extremity of the shaft 19356. The brake pad 19359 can be manufactured from a material with a relatively high coefficient of friction, such as, but not limited to, rubber, polyurethane, and/or the like.

In some embodiments, the motor brake assembly 19350 can be configured such that the motor provides a translational force to the shaft 19356. For example, and as depicted in FIG. 195, the motor brake assembly 19350 can be configured as a non-captive electric motor linear actuator. However, in other examples, the motor brake assembly 19350 can be configured as a captive electric motor linear actuator.

In various examples, and as depicted in FIG. 193 to FIG. 195, the shaft 19356 of the motor brake assembly 19350 can include one or more threads 19357. The motor that is positioned within the motor brake housing 19354 can include a ball or lead screw nut (not depicted). When the rotor of the motor turns, it also turns the ball or lead screw nut, which translates the shaft 19356.

Referring back to FIG. 193, the motor brake assembly 19350 can be positioned such that the brake pad 19359 is positioned adjacent to a rotor 19312 of the electric motor 19311 of the linear actuator assembly 19300. For example, the brake pad 19359 of the motor brake assembly 19350 can be positioned within the housing 19314 of the linear actuator assembly 19300. The shaft 19356 and/or the motor brake housing 19354 of the motor brake assembly 19350 can also be positioned within the housing 19314 of the motor brake assembly 19350. However, in various examples, and as depicted in FIG. 193, the shaft 19356 is positioned partially within the housing 19314 and the motor brake housing 19354 and motor of the motor brake assembly 19350 are positioned exterior to the housing 19314 of the linear actuator assembly 19300.

In operation, the linear actuator assembly 19300 can move the gantry 19320 linearly, along the Z-direction. To prevent undesired movement of the gantry 19320, the brake pad 19359 of the motor brake assembly 19350 can be actuated from a first position away from a rotor 19312 of the electric motor 19311 to a second position that is toward the rotor 19312 of the electric motor 19311 of the linear actuator assembly 19300.

In some embodiments, the brake pad 19359 may be pushed against the rotor 19312 of the electric motor 19311 of the linear actuator, which increases a friction between the rotor 19312 and the brake pad 19359. The friction may prevent a rotation of the rotor 19312 of the electric motor 19311, which prevents a rotation of the shaft 19316. Preventing a rotation of the shaft 19316 may prevent a linear movement of the gantry 19320.

As will be appreciated, incorporating a motor brake assembly 19350 within a linear actuator assembly 19300 has various benefits. For example, the motor brake assembly 19350 may prevent the undesired movement of the gantry 19320 of the linear actuator assembly 19300 and/or components attached to the gantry 19320. For example, the linear actuator assembly 19300 can be coupled directly or indirectly to a lateral rack beam of a rack frame of a modular superstructure for transporting an object, such as a rectangular prism. Various components of the modular superstructure, such as an arm for lifting the object, can be coupled to the gantry 19320 of the linear actuator assembly 19300. However, due to the weight of the object, the arm and the gantry 19320 may experience a downward force. Incorporating the motor brake assembly 19350 may prevent the downward force from causing an undesired downward movement of the gantry 19320 and/or the component that is coupled to the gantry 19320.

FIG. 196 illustrates a flowchart of a method for monitoring a health of one or more electric motors, in accordance with some embodiments of the present disclosure. More specifically, FIG. 196 illustrates a computer-implemented method for monitoring a health of one or more electric motors of the modular superstructure, in accordance with some embodiments of the present disclosure. As discussed, the modular superstructure can include one or more electric motors to move (e.g., translate and/or rotate) various components of the modular superstructure. As will be appreciated, electric motors have a limited lifespan. As such, a method for monitoring a health of one or more electric motors of the modular superstructure (e.g., all of the electric motors of the modular superstructure or a portion of all of the electric motors of the modular superstructure) would be beneficial. For example, if a future failure of the one or more electric motors could be predicted, the one or more electric motors could be replaced prior to the failure of the one or more electric motors. Replacing the one or more electric motors prior to failure may be beneficial because it may decrease down-time of the modular superstructure.

Electric motors, when operating, generate a back electromotive force ("BEMF") voltage that is caused by the electric motor's coils rotating inside a magnetic field. The inventors of the present disclosure have discovered that the BEMF voltage of an electric motor can be monitored over time to determine a degradation of the electric motor and/or predict a failure of the electric motor.

In various examples, a baseline BEMF voltage can be determined for each electric motor. For example, when an electric motor is initially installed within the modular superstructure, a baseline BEMF voltage can be determined by measuring the BEMF voltage of the electric motor with a sensor. In various examples, the baseline BEMF voltage is determined prior to an operational use of the respective electric motor or shortly thereafter (e.g., within 72 hours of use of the electric motor).

In some embodiments, a BEMF voltage threshold value can be determined from the baseline BEMF voltage. For example, an offset BEMF voltage value can be added to the baseline BEMF voltage to determine the BEMF voltage threshold value. In some embodiments, the amount of the offset BEMF voltage value may be based on factors such as, but not limited to, the type or the model of the electric motor.

In some embodiments, when the electric motor is operating, the BEMF voltage of the electric motor can be compared to the BEMF voltage threshold value to determine whether the BEMF voltage exceeds the BEMF voltage threshold value. If the BEMF voltage exceeds the BEMF voltage threshold value a certain number of times (e.g., one time, two times, three times, etc.), it may indicate that the health of the electric motor has degraded to a point where it may fail soon and, as such, it may be beneficial to replace the electric motor.

In various examples, when it is determined that an electric motor may be failing, a programming of the modular superstructure may be modified. For example, the path that an object, such as a rectangular prism, takes within the modular superstructure may be modified to avoid the use of the electric motor that may be failing. In various examples, the programming of the modular superstructure may be modified such that the object traverses through rack frames that are adjacent to the rack frame that includes the electric motor that may be failing.

Referring to FIG. 196, the method 19600 for monitoring a health of one or more electric motors includes a step 19610 of receiving or determining a BEMF voltage threshold value for each of the or more electric motors. As discussed, the BEMF voltage threshold value may be determined based at least in part on the baseline BEMF voltage sensed from a sensor and/or the offset BEMF voltage value.

The method 19600 for monitoring the health of the one or more electric motors can include a step 19620 of receiving data indicative of a BEMF voltage for each of the one or more electric motors. For example, the BEMF voltage for each of the one or more electric motors can be measured with one or more sensors. In various examples, the BEMF voltage for each of the one or more electric motors is monitored with the one or more sensors over time. For example, the BEMF voltage can be measured by the sensors periodically while the respective electric motor is operating or constantly while the respective electric motor is operating.

The method 19600 for monitoring the health of the one or more electric motors can include a step 19630 of comparing the data indicative of the BEMF voltage for each of the one or more electric motors to a respective BEMF voltage threshold value. As discussed, when the measured BEMF voltage for an electric motor exceeds the BEMF voltage threshold value for that electric motor, it may be an indication that the health of the electric motor has degraded to a point where the electric motor may fail soon. In various examples, the number of times the measured BEMF voltage exceeds the BEMF voltage threshold value can be tracked. Also, the number of times the measured BEMF voltage exceeds the BEMF voltage threshold value within a certain timeframe (e.g., within 24 hours of use of the electric motor) can be tracked.

The method 19600 for monitoring the health of the one or more electric motors can include a step 19640 of generating an indication when at least one of the BEMF voltages for the one or more electric motors exceeds the respective BEMF voltage threshold value. In various examples, the indication is an alert that generates a notification that the respective one or more electric motors may need to be replaced. In various examples, generating the indication includes generating a work order to replace the respective one or more electric motors. The generation of the work order can be done automatically or after prompting to a user to generate the work order.

The indication can include data indicative of a location of the one or more electric motor that may need to be replaced. For example, the indication may include data indicative of a location of the rack frame and/or rack beam that is associated with the one or more electric motor that may need to be replaced. In various examples, generating the indication can include illuminating a light on or proximate to the one or more electric motor that needs to be replaced. For example, a light can flash red that is on or proximate to the one or more electric motor that needs to be replaced.

The indication can include data indicative of identification of the one or more electric motor that may need to be replaced, such as a serial number or part number of the one or more electric motor. The indication can include data indicative of identification of an upper assembly of the one or more electric motor that needs to be replaced. For example, the indication can specify that the one or more electric motor that needs to be replaced is an electric motor for a wheel assembly or an arm assembly.

FIG. 197 illustrates a modular superstructure 19704, in accordance with some embodiments of the present disclosure. The modular superstructure 19704 can include a plurality of rack frames 19700. Each rack frame 19700 can include a plurality of rack beams 19702, including, but not limited to, a plurality of top rack beams 19702A, a plurality of lateral rack beams 19702B, and a plurality of bottom rack beams 19702C. The modular superstructure 19704 can define an X-direction, a Y-direction that is orthogonal to the X-direction, and a Z-direction that is orthogonal to the X-direction and the Y-direction. The Z-direction can be a vertical direction.

In various examples, at least one of the rack frames 19700 includes, or is coupled to, a plurality of lights 19710. For example, and as depicted in FIG. 197, at least one of the bottom rack beams 19702C of the at least one of the rack frames 19700 includes the plurality of lights 19710. However, alternatively or in addition to, at least one of the top rack beams 19702A and/or the lateral rack beams 19702B can include a plurality of lights 19710. Each of the lights 19710 can be any device that is configured to produce electromagnetic radiation that can be perceived by a human eye. Stated differently, each of the lights 19710 can be any device that is configured to produce light on the visible spectrum. For example, and as depicted in FIG. 197, the plurality of lights 19710 can be one or more strings of light emitting diode (LED) lights.

Each of the plurality of lights 19710 can be a color-changing LED light. For example, each light 19710 can include three separate diodes, each diode configured to emit a different color. In various examples, each light 19710 can include a red diode, a green diode, and a blue diode. As will be appreciated, each of the diodes can be provided with electric current and/or electric signal and the electric current and/or electric signal provided to each of the diodes can be adjusted to cause the light 19710 to emit a desired light color, when the light 19710 is configured as a color-changing LED.

In various examples, and as depicted in FIG. 197, at least one of the rack frames 19700 can include one or more microphones 19720. Each microphone 19720 can be configured to convert air pressure variations of a soundwave (e.g., a soundwave generated from sound, such as music, playing from a speaker) to an electrical signal. For example, the microphone 19720 can be a dynamic microphone that uses a coil of wire suspended in a magnetic field, a condenser microphone that uses a vibrating diaphragm as a capacitor plate, a contact microphone that uses a crystal of piezoelectric material, etc.

The electrical signal that is generated by the microphone 19720 can be transmitted, via electrical wires or wirelessly, to one or more light controllers (not depicted). Each light controller can be located within the rack frame 19700 and/or within the modular superstructure 19704. In various examples, the controller can be located externally to the rack frame 19700. The light controller can be configured to control the plurality of lights 19710. For example, the light controller can control whether each light 19710 of the plurality of lights 19710 is on or off. In various examples, the light controller can control and/or adjust the brightness level of each of the lights 19710 and/or the color of each of the lights 19710 of the plurality of lights 19710.

In various examples, the light controller can control each of the lights 19710 of the plurality of lights 19710 based at least in part on the electrical signal that is generated by the microphone 19720 from the air pressure variations of soundwaves. For example, the microphone 19720 can receive soundwaves that are transmitted from a speaker that is playing sound, such as music. The microphone 19720 can convert the soundwaves into an electrical signal that can be transmitted to the one or more light controllers. The light controllers can control each of the plurality of lights 19710, individually or in unison, based at least in part on the electrical signal from the microphone 19720.

In various examples, the light controller controls each of the plurality of lights 19710, individually or in unison, based on at least one property of sound, such as music. For example, the at least one property of sound can be at least one of the beat, the tune, the amplitude, the pitch, the overtones, the partials, the harmonics, the bandwidths, etc. of the sound. The sound can be generated by one or more speaker that is poisoned in a location such that the soundwaves emitted from the one or more speakers can be received by the microphone 19720. For example, the speaker can be positioned within the same room as the modular superstructure 19704 and/or the rack frame 19700.

FIG. 198 illustrates a modular superstructure 19704, in accordance with some embodiments of the present disclosure. In various examples, the modular superstructure 19704 includes at least one speaker 19730 that is positioned on, or proximate to, a rack beam of the rack frame 19700 of the modular superstructure 19704. In various examples, the modular superstructure 19704 does not include a microphone 19720. Instead, electrical signals that are indicative of sound (e.g., an audio codec) are transmitted to the light controller for controlling each of the plurality of lights 19710 and the speaker 19730 from a sound source. The sound source can be any device that is capable of transmitting data indicative of sound. For example, the sound source can be any device that is capable of transmitting an audio codec such as MP3, AAC, OGG, VORBIS, and/or OPUS. In various examples, the device is a mobile device that has wireless communications, such as BLUETOOTH.

As will be appreciated, configuring the light controller to control each of the plurality of lights 19710, individually or in unison, within a modular superstructure 19704 based on at least one property of sound has various benefits. For example, the emotional well-being of individuals that are near the modular superstructure 19704 may be improved. Improving the emotional well-being of individuals, such as individuals working nearby the modular superstructure 19704, may increase the productivity of those individuals. Also, the perception of quality of the modular superstructure 19704 may be improved.

FIG. 199 illustrates a flowchart of a method 19800 for controlling one or more lights 19710 of a plurality of lights 19710, in accordance with some embodiments of the present disclosure. The method 19800 can include a step 19810 of receiving a first electrical signal that is data indicative of sound. For example, a light controller can receive a first electrical signal from a microphone 19720 or a sound source In various examples, the sound source is a device that is configured to transmit data that is indicative of the sound.

The method 19800 can include a step 19830 of generating a second electrical signal that is based at least in part on the first electrical signal. For example, the first electrical signal can be data indicative of sound, such as music, that is received from the microphone 19720 or the sound source. The data that is indicative of sound can be used to determine the second electrical signal. For example, a property of the sound, such as music, can be at least one of the beat, the tune, the amplitude, the pitch, the overtones, the partials, the harmonics, the bandwidths, etc. of the sound can be used to determine the second electrical signal. Based on the property of the sound, the second electrical signal can be generated. The second electrical signal can be data indicative of a property of at least one light 19710 of the plurality of lights 19710. For example, the data indicative of a property of the at least one light 19710 of the plurality of lights 19710 can include data indicative of a brightness and/or a color of the at least one light 19710.

The method 19800 can include a step 19850 of transmitting the second electrical signal to at least one light 19710 of the plurality of lights 19710 to control the at least one light 19710. For example, the second electrical signal, which can be an electrical current, can be used to control or adjust a brightness and/or the color of the at least one light 19710.

There are many technical challenges and difficulties associated with rending objects on user interfaces. For example, during operations of a modular superstructure, it may be necessary to render three dimensional objects such as, but not limited to, rectangular prisms, smart racks, and/or the like on a two dimensional user interface. However, it is technically challenging and difficult to depict the three dimensional objects, as well as their positional relationship in the three dimensional environment (for example, layers and positions of the smart racks in a modular superstructure), when using a two dimensional user interface. Various embodiments of the present disclosure overcome these technical challenges. For example, various embodiments of the present disclosure utilizes layer and depth management user interfaces that allow users to easily generate, edit, and/or manipulate three dimensional objects through a two dimensional user interface face. Referring to FIG. 200, a program view of an example 2D environment 20000 is shown, according to various embodiments. In some embodiments, the 2D environment 20000 may be an editor user interface for generating rendering of 3D objects. In some embodiments, the example 2D environment 20000 may utilize native HyperText Markup Language (HTML) behavior and controls. In some embodiments, the example 2D environment 20000 may be configured for use by keyboard users as well as users with low vision.

In some embodiments, the 2D environment 20000 may be configured to allow building complex renderings that comprise 3D voxel models. In the present disclosure, the term "voxel model" refers to a volume element in the three dimensional environment. In some examples, a voxel model may be a basic unit of the rendering. For example, an example voxel model may be a smart rack, a rectangular prism, and/or the like. In some embodiments, by creating and/or manipulating 3D voxel models, the 2D environment 20000 allows a user to generate renderings depicting modular superstructures.

In some embodiments, the 2D environment 20000 may include a plurality of cells 20002. In some embodiments, the plurality of cells 20002 represents a plurality of spaces along a layer in the three dimensional environment (for example, a layer of smart racks). In some embodiments, the example 2D environment 20000 may include a selected cell 20004 and a focused cell 20006. In some embodiments, the term "selected cell" refers to a cell on the example 2D environment that is selected (for example, based on one or more user inputs). In some embodiments, the term "focused cell" refers to a cell on the example 2D environment that is highlighted or emphasized (for example, based on one or more user inputs). In some embodiments, when a user selects a cell, the 2D environment 20000 generates a 3D voxel model at the location of the selected cell.

In some embodiments, the example 2D environment 20000 may be used to create complex structures that comprise 3D objects. In some embodiments, these 3D objects may provide visual representations of smart racks or superstructures of smart racks as described in various examples of the present disclosure.

Referring to FIG. 201, in another program of the example 2D environment 20000, a user may build complex structures that comprise 3D objects within the 2D environment 20000 using mouse or keyboard, according to various embodiments. As shown in FIG. 201, mouse selection may be performed by a cursor 20101. In some embodiments, selection by the cursor will create a selection area 20103 in the 2D environment 20000. In some embodiments, arrow keys on a keyboard or similar input device may be used to change the selection area 20103. In some embodiments, arrow keys may be used to navigate around the 2D environment 20000. In some embodiments, once the selection area 20103 is created, the example 2D environment 20000 may generate a 3D voxel model (such as, but not limited to, a rectangular prism, a smart rack, or a rectangular prism positioned within the smart rack) in each cell of the selection area 20103.

Referring to FIG. 202, in another program view of the example 2D environment 20200, a user may create or manage depth for 3D objects may using one or more layers 20202A, 20202B, 20202C, 20202D, 20202E, and 20202F in a 3D builder 2020. In some embodiments, each layer 20202A, 20202B, 20202C, 20202D, 20202E, and 20202F may represent part(s) of object or objects in the 3D environment along one of the dimensions. For example, each of the layers 20202A, 20202B, 20202C, 20202D, 20202E, and 20202F may represent a part of the modular superstructure in the 3D environment. As an example, the layer 20202A may represent smart racks in the modular superstructure that is positioned to the front of the smart racks depicted in the layer 20202B. The layer 20202B may represent smart racks in the modular superstructure that is positioned to the front of smart racks depicted in the layer 20202C. The layer 20202C may represent smart racks in the modular superstructure that is positioned to the front of smart racks depicted in the layer 20202D. The layer 20202D may represent smart racks in the modular superstructure that is positioned to the front of smart racks depicted in the layer the layer 20202E. The layer 20202E may represent smart racks in the modular superstructure that is positioned to the front of smart racks depicted in the layer the layer 20202F.

In some embodiments, each layer of the layer 20202A, the layer 20202B, the layer 20202C, the layer 20202D, the layer 20202E, and the layer 20202F may correspond to a heat map 20204. In the present disclosure, the term "heat map" refers to a user interface element that provides a graphical representation of data density (for example, how much smart racks is associated with each layer). In some embodiments, each layer 20202A, 20202B, 20202C, 20202D, 20202E, and 20202F may correspond to one of the levels that include the level 20206A, the level 20206B, the level 20206C, the level 20206D, the level 20206E in the heat map 120514. In the example shown in FIG. 202, the sixth layer 20202F is not shown with a corresponding level in FIG. 202 but may include one in other embodiments. As such, the example 2D environment 20200 provides a heat-map view that illustrates how the volume of smart racks changes in the modular superstructure along one dimension. Though six layers are shown in FIG. 202, in some embodiments there may be more or fewer than six layers. In some embodiments, each layer 20202A, 20202B, 20202C, 20202D, 20202E, and 20202F may be shown at half opacity to allow viewing "hotter" levels of the layer 20202A, the layer 20202B, the layer 20202C, the layer 20202D, the layer 20202E, and the layer 20202F on the heat map 20204.

Referring to FIG. 203, in some embodiments, the 3D builder 20300 may have toggles for customizing various layers of the layer 20202A, the layer 20202B, the layer 20202C, the layer 20202D, the layer 20202E, and the layer 20202F. In some embodiments, this may include a toggle for layer color 20301, a toggle for copying a layer 20303, a toggle for changing visibility of a layer 20305, and a toggle for removing a layer 20307. Additional toggles may be included in other embodiments of the 3D builder 20300.

Referring to FIGS. 204 and 205, in some embodiments, example 3D built objects 20402A, 20402B, 20402C, 20402D, and 20402E are shown. In particular, FIG. 204 and FIG. 205 provide various visualizations and renderings of 3D objects in a 2D user interface environment.

In some embodiments, the 3D built objects 20402A, 20402B, 20402C, 20402D, and 20402E may be composed of voxels (for example, each selected cell in the 2D environment may represent a voxel of the 3D built object). In some embodiments, each 3D object 20402A, 20402B, 20402C, 20402D, and 20402E may be constructed from the cells 20002 of the 2D environment described above.

In the example shown in FIG. 204, example layers include the layer 20404A, the layer 20404B, and the layer 20404C. In some examples, each of the layer 20404A, the layer 20404B, and the layer 20404C may represent moving "up" one level through the y-axis from the next layer. For example, FIG. 204 illustrates that the layer 20404A (which includes the 3D built objects 20402A, 20402D) is above the layer 20404B (which includes the 3D built objects 20402B, 20402E), which in turn is above the layer 20404C (which includes the 3D built objects 20402C).

FIG. 205 further illustrates the x-axis, the y-axis, and the z-axis of an 3D object.

There are many technical challenges and difficulties associated with storing and conveying large objects. For example, it may be difficult to determine where to store one or more objects in a large storage structure to maximize the utilization of the storage structure. As an example, when one or more components of a large storage structure fails, it is technically difficult to replace the entire storage structure.

Various embodiments of the present disclosure overcome these technical challenges and difficulties, and provide various technical improvements and advantages. For example, various embodiments of the present disclosure provide example modular superstructures that may be broken down into modular clusters that may be easily detached and replaced in case of any failure. In some embodiments, the failed modular cluster may be easily replaced with a function-ready spare modular cluster (for example, the function-ready space modular cluster may be snapped onto the modular superstructure to replace the failed modular cluster).

In some embodiments, one or more modular clusters may be assigned to store items associated with different users based on user demands. For example, a user may need more storage during the peak festive seasons due to an influx of shopping. In such an example, additional modular clusters may be assigned to store items associated with the user. In some embodiments, modular clusters may be easily attachable and may be rented out on monthly, quarterly, or yearly basis.

Referring now to FIG. 206, example modular clusters associated with an example modular superstructure 260002 in accordance with some embodiments of the present disclosure.

In the example shown in FIG. 206, the example modular superstructure 260002 may comprise one or more modular clusters that include, but are not limited to, a modular cluster 20604A, a modular cluster 20604B, a modular cluster 20604C, and a modular cluster 20604D.

In some embodiments, each of the modular cluster 20604A, the modular cluster 20604B, the modular cluster 20604C, and the modular cluster 20604D comprises a plurality of smart racks secured to one another. For example, the plurality of smart racks may comprise a plurality of rack frames that may be connected through one or more screw connectors, similar to the various examples described above.

In some embodiments, two or more modular clusters (such as, but not limited to, the modular cluster 20604A, the modular cluster 20604B, the modular cluster 20604C, the modular cluster 20604D) may be snapped to one another to form a modular superstructure. As described above, each of the two or more modular clusters may comprise a plurality of rack frames. In such an example, the plurality of modular clusters may be connected to one another through connecting the rack frames.

Referring now to FIG. 207, an example method 20700 associated with an example modular superstructure that comprises modular clusters in accordance with some embodiments of the present disclosure is illustrated.

In some embodiments, the example method 20700 may be executed by an example processor or a computing apparatus associated with the modular superstructure, similar to various example processors and computing apparatuses described herein.

In the example shown in FIG. 207, the example method 20700 starts at step/operation 20701. In some embodiments, subsequent to and/or in response to step/operation 20701, the example method 20700 proceeds to step/operation 20703. At step/operation 20703, the example method 20700 may include a user input data object comprising at least one user space requirement indication.

For example, a processor or a computer apparatus may receive the user input data object from a user device associated with a user identifier.

In some embodiments, the at least one user space requirement indication comprises data that indicates an amount of storage space required or requested by the user. For example, the user space requirement may indicate that the user requests four rectangular prisms for storing items.

Referring back to FIG. 207, subsequent to and/or in response to step/operation 20703, the example method 20700 proceeds to step/operation 20705. At step/operation 20705, the example method 20700 may include retrieving a modular superstructure data object comprising a plurality of modular cluster indications.

In some embodiments, the modular superstructure data object is associated with a modular superstructure. For example, the modular superstructure data object may comprise data and/or information associated with the modular superstructure that may include, but is not limited to, a plurality of modular clusters of the modular superstructure.

Continuing from the example above, each of the plurality of modular clusters is associated with one of the plurality of modular cluster indications. In some embodiments, a modular cluster indication comprise data and/or information associated with the modular cluster such as, but not limited to, the storage space provided by the modular cluster. As an example in connection with FIG. 206, the modular cluster indication associated with the modular cluster 20604A may indicate that the modular cluster 20604A provide storage space for a maximum of four rectangular prisms.

Referring back to FIG. 207, subsequent to and/or in response to step/operation 20705, the example method 20700 proceeds to step/operation 20707. At step/operation 20707, the example method 20700 may include selecting at least one modular cluster indication from the plurality of modular cluster indications based on the at least one user space requirement indication.

For example, the processor or the computing apparatus may select a modular cluster that provides enough space for storing items associated with the user according to the at least one user space requirement indication. Continuing from the example above, the processor or the computing apparatus may select the modular cluster 20604A as it provides storage space for four rectangular prisms.

Referring back to FIG. 207, subsequent to and/or in response to step/operation 20707, the example method 20700 proceeds to step/operation 20709. At step/operation 20709, the example method 20700 may include updating the at least one modular cluster indication to indicate a data association between the at least one modular cluster indication and the user identifier.

In some embodiments, the processor or the computing apparatus may update the modular cluster indication to indicate that the corresponding modular cluster has been assigned to store items associated with the user from whom the user input data object is received at step/operation 20703. Continuing from the example above, the processor or the computing apparatus may update the at least one modular cluster indication of the modular cluster 20604A to indicate a data association between the at least one modular cluster indication and the user identifier.

Referring back to FIG. 207, subsequent to and/or in response to step/operation 20709, the example method 20700 proceeds to step/operation 20711 and ends.

There are many technical challenges and difficulties associated with item storage systems. For example, different users of item storage systems may have different needs or requirements for item storage systems (such as, but not limited to, the locations in the item storage systems for storing items, the condition of the item storage systems for storing items, and/or the like). However, many item storage systems fail to accommodate for these different needs associated with the users.

Various embodiments of the present disclosure overcome the above technical challenges and difficulties, and provide various technical advantages and benefits. For example, various embodiments of the present disclosure implemented generates a smart rack configuration report user interface that provide recommendations on smart rack configuration based on, for example but not limited to, requests or requirements from the users (such as, but not limited to, based on the business types associated with the users).

Referring now to FIG. 208, an example smart rack configuration report generation system 20800 in accordance with some embodiments of the present disclosure is illustrated.

In the example shown in FIG. 208, the example smart rack configuration report generation system 20800 comprises a modular superstructure 20802, a communication network 20804, and one or more user devices (such as, but not limited to, the user device 20806A, . . . the user device 20806N).

In some embodiments, the modular superstructure 20802 is similar to various examples described above. For example, the modular superstructure 20802 may comprise one or more controllers (such as, but not limited to, one or more superstructure controllers) that control various operations associated with the modular superstructure 20802 (such as, but not limited to, the movement of one or more rectangular prisms across one or more smart racks of the modular superstructure 20802).

In some embodiments, the one or more controllers of the modular superstructure 20802 may exchange data and/or information with one or more user devices (such as, but not limited to, the user device 20806A, . . . the user device 20806N) through the communication network 20804. In some embodiments, the communication network 20804 may include, but not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks.

In some embodiments, the communication network 20804 may have any suitable communication range associated therewith and may include, for example, global networks (e.g., the Internet), MANs, WANs, LANs, or PANs. In some embodiments, the communication network 20804 may include medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms/systems provided by network providers or other entities. In some embodiments, the communication network 20804 may utilize a variety of networking protocols including, but not limited to, TCP/IP based networking protocols. In some embodiments, the protocol may be a custom protocol of JavaScript Object Notation (JSON) objects sent via a WebSocket channel. In some embodiments, the protocol is JSON over RPC, JSON over REST/HTTP, and/or the like.

In some embodiments, the one or more user devices (such as, but not limited to, the user device 20806A, . . . the user device 20806N) comprise one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

Referring now to FIG. 209, an example method 20900 associated with generating an example smart rack configuration report user interface in accordance with some embodiments of the present disclosure is illustrated.

In some embodiments, the example method 20900 may be executed by an example processor or a computing apparatus associated with the modular superstructure, similar to various example processors and computing apparatuses described herein.

In the example shown in FIG. 209, the example method 20900 starts at step/operation 20901. In some embodiments, subsequent to and/or in response to step/operation 20901, the example method 20900 proceeds to step/operation 20903. At step/operation 20903, the example method 20900 may include receiving a user input data object comprising at least one user requirement indication.

In some embodiments, the user input data object is received from a user device associated with a user identifier (such as, but not limited to, the user device 20806A, . . . the user device 20806N described above in connection with FIG. 208). In some embodiments, the user input data object comprise data and/or information associated with at least one user request for storage space in a modular superstructure (such as, but not limited to, the modular superstructure 20802 described above in connection with FIG. 208).

For example, the user input data object may comprise at least one user requirement indication that indicates one or more requests or demand associated with the user. As an example, the at least one user requirement indication may indicate the amount of storage space requested by the user (for example, the amount of rectangular prisms that is needed by the user). As another example, the at least one user requirement indication may indicate the condition of the storage space as requested by the user (for example, vibration level, temperature, and/or the like that is associated with the storage space).

Referring back to FIG. 209, subsequent to and/or in response to step/operation 20903, the example method 20900 proceeds to step/operation 20905. At step/operation 20905, the example method 20900 may include inputting the at least one user requirement indication to a smart rack configuration prediction machine learning model.

In the present disclosure, the term "smart rack configuration prediction machine learning model" refers to a type of machine learning model that is trained to generate one or more smart rack configuration recommendation data objects based on receiving one or more user requirement indications.

Examples of smart rack configuration prediction machine learning models may include, but are not limited to, Naive Bayes classifiers, Support Vector Machines (SVMs), decision trees, random forest, Convolutional Neural Networks (CNNs), Recurrent Neural Networks (RNNs), and/or the like.

Referring back to FIG. 209, subsequent to and/or in response to step/operation 20905, the example method 20900 proceeds to step/operation 20907. At step/operation 20907, the example method 20900 may include receiving at least one smart rack configuration recommendation data object.

In some embodiments, the at least one smart rack configuration recommendation data object is received as at least one output from an example smart rack configuration prediction machine learning model described above.

In some embodiments, the at least one smart rack configuration recommendation data object indicates at least one smart rack identifier associated with a smart rack. For example, the at least one smart rack configuration recommendation data object indicates one or more smart rack identifiers associated with one or more rectangular prisms for storing the one or more items associated with the user. In some embodiments, the example smart rack configuration prediction machine learning model may generate the at least one smart rack configuration recommendation data object may generate the at least one smart rack configuration recommendation data object based on data and/or information such as, but not limited to, power consumption, cost, speed and efficiency, and/or the like.

Referring back to FIG. 209, subsequent to and/or in response to step/operation 20907, the example method 20900 proceeds to step/operation 20909. At step/operation 20909, the example method 20900 may include rendering a smart rack configuration report user interface.

In some embodiments, a processor or a computing apparatus may render the smart rack configuration report user interface on a display of the user device (such as, but not limited to, the user device 20806A, . . . the user device 20806N described above in connection with at least FIG. 208) based at least in part on the at least one smart rack configuration recommendation data object.

Referring now to FIG. 210, an example smart rack configuration report user interface 21000 in accordance with some embodiments of the present disclosure is illustrated.

In the example shown in FIG. 210, the example smart rack configuration report user interface 21000 comprises a modular superstructure user interface element 21001 and a plurality of rectangular prism user interface elements that include, but not limited to, the rectangular prism user interface element 21003A, the rectangular prism user interface element 21003B, the rectangular prism user interface element 21003C, and the rectangular prism user interface element 21003D.

In some embodiments, the modular superstructure user interface element 21001 illustrates a rendering of the modular superstructure. In some embodiments, the rectangular prism user interface elements (such as, but not limited to, the rectangular prism user interface element 21003A, the rectangular prism user interface element 21003B, the rectangular prism user interface element 21003C, and the rectangular prism user interface element 21003D) illustrates data and/or information associated with rectangular prisms that are suitable for storing items associated with the users based on the at least one smart rack configuration recommendation data object and/or as predicted by the smart rack configuration prediction machine learning model.

Referring back to FIG. 209, subsequent to and/or in response to step/operation 20909, the example method 20900 proceeds to step/operation 20911 and ends.

There are many technical challenges and difficulties associated with item storage devices and systems. For example, many item storage devices and systems cannot predict the health level or operational uptime associated with the item storage devices. As such, many item storage devices and systems may fail at times that would cause significant issues with end users.

Various embodiments of the present disclosure overcome the above technical challenges and difficulties, and provide various technical advantages and benefits. For example, various embodiments of the present disclosure may collect data and/or information associated with the modular superstructure that includes, but not limited to, the maximum working cycles of motors in the modular superstructure before the motors fail, the maximum acceptable vibration level associated with the modular superstructure, the temperature thresholds of control boards associated with the modular superstructure, life cycle of rectangular prisms in the modular superstructure, and/or the like.

In some embodiments, one or more predictive machine learning models are implemented to predict the health level and/or the operational uptime associated with the modular superstructure. In some embodiments, based on the predictions from the predictive machine learning models, appropriate actions may be taken to prevent system downtime or reduce the amount of system downtime.

Referring now to FIG. 211, an example method 21100 in accordance with some embodiments of the present disclosure is illustrated.

In some embodiments, the example method 21100 may be executed by an example processor or a computing apparatus associated with the modular superstructure, similar to various example processors and computing apparatuses described herein.

In the example shown in FIG. 211, the example method 21100 starts at step/operation 21101. In some embodiments, subsequent to and/or in response to step/operation 21101, the example method 21100 proceeds to step/operation 21103. At step/operation 21103, the example method 21100 may include receiving a plurality of modular superstructure operation data objects associated with a modular superstructure.

In some embodiments, the plurality of modular superstructure operation data objects comprises one or more motor operation data objects, vibration level data objects, or controller temperature data objects.

As described above, an example modular superstructure may implement one or more motors to cause movements of one or more rectangular prisms across smart racks of the example modular superstructure. In some embodiments, the motor operation data objects may record data and/or information associated with the one or more motors such as, but not limited to, the number of working cycles associated with the one or more motors, the voltage information associated with the one or more motors, the current information associated with the one or more motors, and/or the like.

In some embodiments, the conveyance of one or more rectangular prisms across one or more smart racks in the modular superstructure may cause vibrations associated with the modular superstructure. In some embodiments, one or more vibration sensors may be implemented in the modular superstructure to detect the vibration levels associated with the modular superstructure. In some embodiments, the vibration level data objects are generated by the one or more vibration sensors.

As described above, one or more controllers may be implemented to control the operations of the modular superstructure. In some embodiments, one or more temperature sensors are implemented to detect the temperatures associated with the one or more controllers and generate controller temperature data objects.

While the description above provides example types of modular superstructure operation data objects, it is noted that the scope of the present disclosure is not limited to the description above. In some examples, an example method may utilize one or more additional and/or alternative types of modular superstructure operation data objects.

Referring back to FIG. 211, subsequent to and/or in response to step/operation 21103, the example method 21100 proceeds to step/operation 21105. At step/operation 21105, the example method 21100 may include inputting the plurality of modular superstructure operation data objects to an uptime predictive machine learning model.

In some embodiments, the term "uptime predictive machine learning model" refers to a type of machine learning model that is trained to generate one or more predicted modular superstructure uptime data objects based on receiving one or more modular superstructure operation data objects.

Examples of uptime predictive machine learning models may include, but are not limited to, Naive Bayes classifiers, Support Vector Machines (SVMs), decision trees, random forest, Convolutional Neural Networks (CNNs), Recurrent Neural Networks (RNNs), and/or the like.

Referring back to FIG. 211, subsequent to and/or in response to step/operation 21105, the example method 21100 proceeds to step/operation 21107. At step/operation 21107, the example method 21100 may include receiving at least one predicted modular superstructure uptime data object from the predictive machine learning model.

In some embodiments, the at least one predicted modular superstructure uptime data object may indicate predicted uptime associated with the modular superstructure. As described above, the precited uptime may be generated based at least in part on the modular superstructure operation data objects.

In some embodiments, one or more preventive actions may be taken based on the at least one predicted modular superstructure uptime data object. For example, one or more maintenance or repair schedules may be generated or updated based on the at least one predicted modular superstructure uptime data object.

Referring back to FIG. 211, subsequent to step/operation 21107, the example method 21100 proceeds to step/operation 21109 and ends.

In some contexts, a modular superstructure functions to provide storage and/or traversal of any number of totes. A modular superstructure includes any number of smart racks, each operating to facilitate traversal of a tote in any desired cartesian direction (e.g., positive x direction, negative x direction, positive y direction, negative y direction, positive z direction, negative z direction). In this regard, one or more totes may be manipulated via the smart racks to store totes in particular smart racks for subsequent retrieval, traverse a tote (or multiple totes) for egress from the modular superstructure, and/or the like.

Manipulation of totes via the smart racks may take significant time in comparison to generation of instructions for controlling the smart racks. In this regard, it is desirable to enable traversal of totes via the smart racks in a manner that enables completion of the traversal in a time-efficient manner. Often, however, such traversal may not be performed arbitrarily, for example due to potential obstructions in the modular superstructure (e.g., occupied and/or inactive smart racks) that are in the direct path of a tote to be traversed from a starting position to an ending position. Additionally, it is desirable to complete pathing in an efficient manner to reduce time to completion of the pathing and/or reduce the time computing resources are allocated to such pathing. Such efficiency in completing the pathing operations becomes increasingly beneficial as the number of smart racks in the modular superstructure increases, for example where the number of smart racks may grow to an amount where naïve pathing is not completed before an updated state for pathing may result.

Embodiments of the present disclosure provide for a myriad of improved pathing mechanisms. Each of the improved pathing mechanisms advantageously are performable in a manner that is efficiently completable by a system that controls operation of the smart racks of the modular superstructure. In this regard, the pathing mechanisms are completable in a sufficient time span to ensure that pathing data may be updated with sufficient consistency to ensure that the pathing data may be updated as updated information associated with the smart racks are received.

Some embodiments provide pathing mechanisms that utilize segmentation-based pathing. Such embodiments divide an arrangement of smart racks into a plurality of segments, where each segment includes a subset of the plurality of smart racks. Such segments may be further divided any number of times to produce a segment that includes a particular desired number of smart racks, or includes a reduced number of smart racks below a particular threshold for pathing. In this regard, by reducing the number of smart racks that must be considered for pathing by considering a segment at a time, pathing may be performed with a lesser time-to-completion. Additionally, pathing may be resolved efficiently and that results in an efficient path by resolving multiple paths from multiple segments to form a final, combined path. Additionally, or alternatively, parallel processing may be leveraged to provide further advantages with respect to computing execution.

Some embodiments provide pathing mechanisms that utilize Eikonal pathing. Such embodiments utilize Eikonal pathing mechanisms that are based on cell velocities assigned for a particular arrangement of smart racks. In this regard, such pathing algorithms may be completed in an efficient manner to simultaneously yield a path that enables efficient traversal of a particular tote via the smart racks of a modular superstructure. Additionally, some embodiments leverage parallelism between particular steps determined for performance for pathing the tote from a starting position to an ending position to further improve the efficiency at which the tote may be traversed. Some embodiments identify a cell velocity grid for an arrangement of smart racks, generates a travel time grid based on the cell velocity grid, generate at least one gradient grid based at least in part on the travel time grid, and generate pathing data from a starting position to an ending position based on the gradient grid. The pathing data represents a path for efficiently traversing the tote from the starting position to the ending position.

“Arrangement” with respect to any number of smart racks refers to an organization of the smart racks and connections therebetween that enables traversal of a tote between two or more of the smart racks.

“Cell velocity” refers to electronically managed data assigned to a particular smart rack location in an arrangement of smart racks, where the data value represents a resistance of traversing a tote via the smart rack at the smart rack location.

“Cell velocity grid” refers to electronically managed data representing any number of cell velocities assigned to smart rack locations in an arrangement of smart racks.

“Clearing move data” refers to electronically managed data representing a traversal of a tote required unblock an obstructed location in a path represented by particular pathing data.

“Combined path” refers to electronically managed data representing a path formed from two sub-paths, each sub-path embodied by an individual portion of pathing data.

“Ending position” refers to a particular coordinate, location, or other identifier of a smart rack in an arrangement of a plurality of smart racks at which a particular path represented by particular pathing data terminates. In some contexts, a “final ending position” refers to a particular ending position from which traversal of a tote is determined to terminate for final storage or egress of the tote.

“Gradient grid” refers to electronically managed data representing any number of gradient values of a differentiable function associated with each smart rack location in an arrangement of smart racks. A gradient grid in some embodiments embodies a differentiable function that is processable via a gradient descent algorithm.

“Modular superstructure” refers to a plurality of smart racks arranged for traversing of a tote in one or more direction(s). In some embodiments, a modular superstructure includes a plurality of smart racks that cooperate for traversing of one or more tote(s) in any cardinal direction.

“Obstructed smart rack location” refers to a smart rack at a particular location in an arrangement of smart racks.

“Obstructed status” refers to a rack status indicating that a particular smart rack associated with the rack status is currently or permanently obstructed.

“Obstruction” refers to a location in an arrangement of smart racks that is blocked or otherwise currently unable to receive a tote. In some embodiments, an obstruction includes a smart rack that currently is storing a tote, and thus cannot receive another tote. In some embodiments, an obstruction includes a smart rack that is malfunctioning or otherwise unusable. In some embodiments, an obstruction includes a hole in a grid arrangement of smart racks, where no smart rack is present at the hole.

“Open status” refers to a rack status indicating that a particular smart rack associated with the rack status is currently unobstructed.

“Pathing data” refers to electronically managed data representing an ordered number of steps between smart racks to traverse through the smart racks.

“Rack command” refers to electronically managed data transmissible to a particular smart rack, directly or indirectly via another smart rack, which is configured to, upon receipt by the smart rack, cause the smart rack to initiate a particular action. Non-limiting examples of a rack command include data message(s) that indicate a particular movement to initiate via the smart rack to cause traversal of a tote in a particular distance in a positive x, positive y, positive z, negative x, negative y, and/or negative z direction.

“Rack status” refers to electronically managed data representing a state of whether a particular smart rack at a particular smart rack location is currently accessible for traversal of a tote.

“Segment” refers to a continuous section of a plurality of smart racks.

“Smart rack” refers to a component of the modular superstructure that is configured to store a rectangular prism and/or to cause the movement of the rectangular prisms within the modular superstructure. In some embodiments, an example smart rack provides a modular square or rectangle rack that provides structure, power, control, and/or mechanical movements of one or more rectangular prisms. For example, an example smart rack comprises an example rack frame and a plurality of rack actuators, details of which are described herein.

“Smart rack arrangement data” refers to electronically managed data representing an arrangements of smart racks. In some embodiments smart rack arrangement data represents existence of smart racks and any connections between such smart racks.

“Smart rack location” refers to electronically managed data that uniquely represents a position in an arrangement of smart racks. Non-limiting examples of a smart rack location represents a coordinate in a grid system, an index value, or another data value specific to a position in a defined order of smart racks.

“Starting position” refers to a particular coordinate, location, or other identifier of a smart rack in an arrangement of a plurality of smart racks at which a particular path represented by particular pathing data begins. In some contexts, an "initial starting position" refers to a particular starting position from which traversal of a tote is determined to begin.

"Tote" refers to any rectangular prism or other physical object that is capable of being manipulated by a smart rack in one or more directions. In some embodiments, the term "tote" and the term "rectangular prism" can be used interchangeably.

"Travel time" refers to electronically managed data representing a determined projection of resistance to traverse from a particular starting position to another smart rack location in an arrangement of smart racks based on a cell velocity grid corresponding to the arrangement of smart racks.

"Travel time grid" refers to electronically managed data representing a travel time associated with any number of smart rack locations in an arrangement of smart racks.

FIG. 212 illustrates an example system in which embodiments of the present disclosure may operate. Specifically, FIG. 212 depicts an example system 21200. Specifically, FIG. 212 illustrates a superstructure controller & monitoring system 21202 in communication with an example modular superstructure 21204. Optionally, in some embodiments the superstructure controller & monitoring system 21202 communicates with a client device 21206.

In some embodiments, the modular superstructure 21204 includes one or more smart rack(s) that manipulate, ingress, store, and/or egress one or more totes. In some embodiments, each tote embodies a rectangular prism. To achieve such functionality, the example modular superstructure 21204 includes at least a plurality of smart racks, such as those connected in a particular arrangement of smart racks in particular rows and columns, which are configured to manipulate and/or otherwise move rectangular prisms throughout the modular superstructure 21204. In some embodiments, the smart racks of the modular superstructure 21204 communicate between one another to enable propagation of a message transmission, or plurality of message transmissions, to a target model for consuming a particular message transmission.

In some embodiments, the superstructure controller & monitoring system 21202 comprises one or more computer(s), server(s), controller(s), and/or other device(s). The superstructure controller & monitoring system 21202 in some embodiments is configured for controlling the smart racks of the modular superstructure 21204 and/or monitoring of the statuses of the models of the modular superstructure 21204. For example, in some embodiments, the superstructure controller & monitoring system 21202 may receive, access, or otherwise determine a rectangular prism, such as a target rectangular prism, and an egress point for that rectangular prism. In response, the superstructure controller & monitoring system 21202 may determine, input, and/or otherwise generate and/or transmit message transmission(s) that provide instructions to one or more smart rack(s) or other model(s) of the modular superstructure 21204 in such a way to cause traversal of a tote throughout the modular superstructure. For example, a tote may be manipulated via the smart racks throughout the modular superstructure 21204 from an ingress location to a particular target location for storage, and/or from a particular storage location or ingress location to a particular egress location. In some embodiments, the superstructure controller & monitoring system 21202 transmit message transmission(s) to one or more processing circuitries of the one or more smart rack(s) in the modular superstructure 21204 to facilitate rack commands embodying movement instructions for such smart rack(s). For example, in some embodiments the superstructure controller & monitoring system 21202 generates and transmits a rack commands embodying a tote plan that represents instructions for moving a tote throughout the modular superstructure 21204, and/or clearing the path through which the tote is to be traversed. The smart racks of the modular superstructure 21204 may propagate the messages embodying rack commands to one another via transmission, where one or more smart rack(s) consume a message transmission to cause one or more arms of the smart rack actuators to move the tote (e.g., a rectangular prism) in a particular manner based on the rack command represented in the message. Additionally, or alternatively, in some embodiments, the superstructure controller & monitoring system 21202 generates rack command(s) for positioning tote(s) in the modular superstructure 21204 to store the tote in the modular superstructure for subsequent retrieval.

In some embodiments, the plurality of smart racks in the modular superstructure 21204 generate a significant amount of electrical noise. Such electrical noise in some embodiments somewhat or significantly diminishes capabilities for transmission to and/or from smart racks of the modular superstructure 21204 via wireless communications. Additionally, or alternatively, in some embodiments, the electrical noise generated by the modular superstructure 21204 creates a faraday cage effect that significantly limits the effectiveness of wireless communications to and/or from models of the modular superstructure 21204. In this regard, effective wired communications are established to one or more smart rack(s) of the modular superstructure 21204 at particular location(s), and wired communications enable propagation between models of the modular superstructure 21204. In some embodiments, the models of the modular superstructure 21204 utilize one or more specially configured algorithm(s) to effectively and/or efficiently propagate such message transmission(s) embodying one or more rack command(s).

FIG. 213 illustrates a block diagram of an example apparatus in accordance with at least one example embodiment of the present disclosure. Specifically, FIG. 213 depicts an example superstructure controller & monitoring apparatus 21300 ("apparatus 21300") specifically configured in accordance with at least some example embodiments of the present disclosure. In some embodiments, the superstructure controller & monitoring system 21202 and/or a subsystem thereof is embodied by one or more system(s), such as the apparatus 21300 as depicted and described in FIG. 213. The apparatus 21300 includes processor 21302, memory 21304, input/output circuitry 21306, communications circuitry 21308, arrangement management circuitry 21310, path management circuitry 21312, and/or command management circuitry 21314. In some embodiments, the apparatus 21300 is configured, using one or more of the processor 21302, memory 21304, input/output circuitry 21306, communications circuitry 21308, arrangement management circuitry 21310, path management circuitry 21312, and/or command management circuitry 21314, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 21300 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 21300 provide or supplement the functionality of another particular set of circuitry. For example, the processor 21302 in some embodiments provides processing functionality to any of the sets of circuitry, the memory 21304 provides storage functionality to any of the sets of circuitry, the communications circuitry 21308 provides network interface functionality to any of the sets of circuitry, and/or the like.

In some embodiments, the processor 21302 (and/or co-processor or any other processing circuitry assisting or otherwise associated with the processor) is/are in communication with the memory 21304 via a bus for passing information among components of the apparatus 21300. In some embodiments, for example, the memory 21304 is non-transitory and may include, for example, one or more volatile and/or non-volatile memories. In other words, for example, the memory 21304 in some embodiments includes or embodies an electronic storage device (e.g., a computer readable storage medium). In some embodiments, the memory 21304 is configured to store information, data, content, applications, instructions, or the like, for enabling the apparatus 21300 to carry out various functions in accordance with example embodiments of the present disclosure.

The processor 21302 may be embodied in a number of different ways. For example, in some example embodiments, the processor 21302 includes one or more processing devices configured to perform independently. Additionally, or alternatively, in some embodiments, the processor 21302 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 21300, and/or one or more remote or "cloud" processor(s) external to the apparatus 21300.

In an example embodiment, the processor 21302 is configured to execute instructions stored in the memory 21304 or otherwise accessible to the processor. Alternatively or additionally, the processor 21302 in some embodiments is configured to execute hard-coded functionality. As such, whether configured by hardware or software methods, or by a combination thereof, the processor 21302 represents an entity (e.g., physically embodied in circuitry) capable of performing operations according to an embodiment of the present disclosure while configured accordingly. Alternatively or additionally, as another example in some example embodiments, when the processor 21302 is embodied as an executor of software instructions, the instructions specifically configure the processor 21302 to perform the algorithms embodied in the specific operations described herein when such instructions are executed.

As one particular example embodiment, the processor 21302 is configured to perform various operations associated with performing efficient pathing of a modular superstructure for execution. In some embodiments, the processor 21302 includes hardware, software, firmware, and/or a combination thereof, that generates pathing data from a starting position to an ending position. In some such embodiments, the processor 21302 includes hardware, software, firmware, and/or a combination thereof, that performs segmentation-based pathing for a modular superstructure. In some such embodiments, the processor 21302 includes hardware, software, firmware, and/or a combination thereof, that performs Eikonal pathing for a modular superstructure. Additionally, or alternatively, in some embodiments, the processor 21302 includes hardware, software, firmware, and/or a combination thereof, that facilitates transmission of electronic data message(s) embodying rack command(s) for execution by a particular smart rack.

In some embodiments, the apparatus 21300 includes input/output circuitry 21306 that provides output to the user and, in some embodiments, to receive an indication of a user input. In some embodiments, the input/output circuitry 21306 is in communication with the processor 21302 to provide such functionality. The input/output circuitry 21306 may comprise one or more user interface(s) and in some embodiments includes a display that comprises the interface(s) rendered as a web user interface, an application user interface, a user device, a backend system, or the like. In some embodiments, the input/output circuitry 21306 also includes a keyboard, a mouse, a joystick, a touch screen, touch areas, soft keys, a microphone, a speaker, or other input/output mechanisms. The processor 21302 and/or input/output circuitry 21306 comprising the processor may be configured to control one or more functions of one or more user interface elements through computer program instructions (e.g., software and/or firmware) stored on a memory accessible to the processor (e.g., memory 21304, and/or the like). In some embodiments, the input/output circuitry 21306 includes or utilizes a user-facing application to provide input/output functionality to a client device and/or other display associated with a user.

In some embodiments, the apparatus 21300 includes communications circuitry 21308. The communications circuitry 21308 includes any means such as a device or circuitry embodied in either hardware or a combination of hardware and software that is configured to receive and/or transmit data from/to a network and/or any other device, circuitry, or module in communication with the apparatus 21300. In this regard, in some embodiments the communications circuitry 21308 includes, for example, a network interface for enabling communications with a wired or wireless communications network. Additionally, or alternatively in some embodiments, the communications circuitry 21308 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 21308 includes circuitry for interacting with the antenna(s) and/or other hardware or software to cause transmission of signals via the antenna(s) or to handle receipt of signals received via the antenna(s). In some embodiments, the communications circuitry 21308 enables transmission to and/or receipt of data from user device, one or more asset(s) or accompanying sensor(s), and/or other external computing device in communication with the apparatus 21300.

In some embodiments, the apparatus 21300 includes arrangement management circuitry 21310. The arrangement management circuitry 21310 includes hardware, software, firmware, and/or a combination thereof, that supports maintenance of data representing an arrangement of smart racks embodying a modular superstructure and/or rack statuses thereof. In some embodiments, the arrangement management circuitry 21310 includes hardware, software, firmware, and/or a combination thereof, that determines, retrieves, and/or receives smart rack arrangement data corresponding to a modular superstructure. In some such embodiments, the smart rack arrangement data represents the arrangement of smart racks of the modular superstructure. Additionally, or alternatively, in some embodiments, the arrangement management circuitry 21310 includes hardware, software, firmware, and/or a combination thereof, that determines, retrieves, and/or receives rack status(es) for one or more smart rack(s) of a modular superstructure. Additionally, or alternatively, in some embodiments, the arrangement management circuitry 21310 includes hardware, software, firmware, and/or a combination thereof, that stores such data for subsequent processing, for example during performance of one or more pathing algorithm(s). In some embodiments, the arrangement management circuitry 21310 includes a separate processor, specially configured field programmable gate array (FPGA), or a specially programmed application specific integrated circuit (ASIC).

In some embodiments, the apparatus 21300 includes path management circuitry 21312. The path management circuitry 21312 includes hardware, software, firmware, and/or a combination thereof, that supports performance of one or more process(es) for pathing a tote in a modular superstructure. In some embodiments, the path management circuitry 21312 includes hardware, software, firmware, and/or a combination thereof, that receives a request or detects a trigger for initiating pathing of at least one tote. Additionally, or alternatively, in some embodiments, the path management circuitry 21312 includes hardware, software, firmware, and/or a combination thereof, that performs segmentation-based pathing for a modular superstructure by dividing the smart racks of the modular superstructure into a plurality of segments, and/or further dividing a segment into a plurality of segments. Additionally, or alternatively, in some embodiments, the path management circuitry 21312 includes hardware, software, firmware, and/or a combination thereof, that performs a pathing algorithm for at least one segment of the plurality of segments. Additionally, or alternatively, in some embodiments, the path management circuitry 21312 includes hardware, software, firmware, and/or a combination thereof, that selects a selected segment of a modular superstructure for which to perform Additionally, or alternatively, in some embodiments, the path management circuitry 21312 includes hardware, software, firmware, and/or a combination thereof, that performs a Eikonal pathing algorithm for smart racks of a modular superstructure. Additionally, or alternatively, in some embodiments, the path management circuitry 21312 includes hardware, software, firmware, and/or a combination thereof, that generates pathing data representing a path from a starting position to an ending position using the one or more pathing algorithm(s). Additionally, or alternatively, in some embodiments, the path management circuitry 21312 includes hardware, software, firmware, and/or a combination thereof, that generates clearing move data associated with a particular path for traversing smart racks of a modular superstructure. In some embodiments, the path management circuitry 21312 includes a separate processor, specially configured field programmable gate array (FPGA), or a specially programmed application specific integrated circuit (ASIC).

In some embodiments, the apparatus 21300 includes command management circuitry 21314. The command management circuitry 21314 includes hardware, software, firmware, and/or a combination thereof, that supports rack command generation and/or transmission. In some embodiments, the command management circuitry 21314 includes hardware, software, firmware, and/or a combination thereof, that generates a rack command embodying a step performed by a smart rack for performing a path represented by generated pathing data. Additionally, or alternatively, in some embodiments, the command management circuitry 21314 includes hardware, software, firmware, and/or a combination thereof, that generates a rack command embodying a step performed by a smart rack for performing steps that clears one or more smart rack locations of a path represented by pathing data, where the steps to clear the path are represented by clearing move data associated with the path. Additionally, or alternatively, in some embodiments, the command management circuitry 21314 includes hardware, software, firmware, and/or a combination thereof, that generates at least one electronic message comprising one or more rack command(s). Additionally, or alternatively, in some embodiments, the command management circuitry 21314 includes hardware, software, firmware, and/or a combination thereof, that transmits the at least one electronic message to one or more smart rack(s) of a modular superstructure for processing. In some embodiments, the command management circuitry 21314 includes a separate processor, specially configured field programmable gate array (FPGA), or a specially programmed application specific integrated circuit (ASIC).

Additionally, or alternatively, in some embodiments, two or more of the processor 21302, memory 21304, input/output circuitry 21306, communications circuitry 21308, arrangement management circuitry 21310, path management circuitry 21312, and/or command management circuitry 21314 are combinable. Alternatively or additionally, in some embodiments, one or more of the sets of circuitry perform some or all of the functionality described associated with another component. For example, in some embodiments, two or more of the processor 21302, memory 21304, input/output circuitry 21306, communications circuitry 21308, arrangement management circuitry 21310, path management circuitry 21312, and/or command management circuitry 21314 are combined into a single module embodied in hardware, software, firmware, and/or a combination thereof. Similarly, in some embodiments, one or more of the sets of circuitry, for example the arrangement management circuitry 21310, path management circuitry 21312, and/or command management circuitry 21314, is/are combined with the processor 21302, such that the processor 21302 performs one or more of the operations described above with respect to each of the arrangement management circuitry 21310, path management circuitry 21312, and/or command management circuitry 21314.

FIG. 214 illustrates an example visualization of data flows for initiating tote traversal via pathing in accordance with at least one example embodiment of the present disclosure. Specifically, in some embodiments the data flow is performed via a system that controls and/or otherwise generates data utilized to operate a modular superstructure. For example, in some embodiments the data flows are performed via a data environment maintained via hardware, software, firmware, and/or a combination thereof, of the superstructure controller & monitoring system 21202, for example embodied by the apparatus 21300 as depicted and described herein. In some such embodiments, the apparatus 21300, for example, maintains a software environment within which the data of the data flow depicted with respect to FIG. 214 is maintained and performed. For brevity and clarity, FIG. 214 will be described from the perspective of the apparatus 21300.

As illustrated, the apparatus 21300 may generate, maintain, and/or receive smart rack arrangement data 21402. The smart rack arrangement data 21402 includes data representing the existence of smart rack(s) of the superstructure controller & monitoring system 21202. Additionally, or alternatively, in some embodiments, the smart rack arrangement data 21402 include data defining an arrangement of the smart racks in the superstructure controller & monitoring system 21202. Additionally, or alternatively still, in some embodiments the smart rack arrangement data 21402 includes data representing a rack status for each of one or more smart racks of the superstructure controller & monitoring system 21202.

In some embodiments, some or all of the smart rack arrangement data 21402 is maintained by the apparatus 21300. For example, the apparatus 21300 may, in a database or other repository, maintain data of the smart rack arrangement data 21402 that represents the arrangement of smart racks of the superstructure controller & monitoring system 21202. In some embodiments, the apparatus 21300 maintains such data as static data, for example in a circumstance where the arrangement of the modular superstructure is unlikely to change. Additionally, or alternatively, in some embodiments, the apparatus 21300 receives some or all of the smart rack arrangement data 21402. For example, in some embodiments the apparatus 21300 receives data message(s) from at least one smart rack of the superstructure controller & monitoring system 21202 that represents a current rack status for one or more smart rack(s) of the superstructure controller & monitoring system 21202. Additionally, or alternatively, in some embodiments, the apparatus 21300 generates or derives at least a portion of the smart rack arrangement data 21402 from other data available to the apparatus 21300.

In some embodiments, the apparatus 21300 processes the smart rack arrangement data 21402 to initiate traversal of one or more totes via the superstructure controller & monitoring system 21202. In some embodiments, the apparatus 21300 receives, for example via user input or an external system, one or more message(s) and/or request(s) that identify particular tote(s) to be ingressed and stored to the superstructure controller & monitoring system 21202, egressed from the superstructure controller & monitoring system 21202, repositioned in the superstructure controller & monitoring system 21202, and/or the like. It will be appreciated that apparatus 21300 may receive, generate, and/or otherwise identify particular starting position(s) and/or ending position(s) for traversal of tote(s) from any data available to the apparatus 21300. For example, in some embodiments, the apparatus 21300 determines a starting position and/or ending position for a tote for traversing throughout the superstructure controller & monitoring system 21202 from one or more request(s), command(s), and/or other input received by, retrieved by, or otherwise available to the apparatus 21300. In some embodiments, the apparatus 21300 includes or communicates with an inventory processing system or other external system that identifies totes for retrieval and/or storage via traversal throughout the superstructure controller & monitoring system 21202.

The apparatus 21300 processes the smart rack arrangement data 21402 utilizing pathing algorithm(s) 21404. In some embodiments, the pathing algorithm(s) 21404 includes a pathing algorithm that divides the smart racks of the modular superstructure 21204 into a plurality of segments. For example, in some embodiments the apparatus 21300 processes the smart rack arrangement data 21402 to divide the arrangement of smart racks embodying the modular superstructure 21204 into a plurality of segments. Additionally, or alternatively, in some embodiments the apparatus 21300 performs a pathing algorithm that processes one or more of such segments to further divide a particular segment into any number of sub-segments, and/or further divide any such sub-segment recursively. A particular selected segment may be processed to perform pathing through a particular segment of the modular superstructure 21204, for example from a starting position in the selected segment to an ending position in the selected segment. Pathing data for multiple segments may then be combined to resolve a combined path that represents a path through multiple segments. Additionally, or alternatively, in some embodiments, the pathing algorithm(s) 21404 includes a pathing algorithm that generates pathing data from a starting position representing a first smart rack location of the modular superstructure 21204 to an ending position representing a second smart rack location of the modular superstructure 21204. In some embodiments, the pathing algorithm(s) 21404 includes an Eikonal pathing algorithm as described herein. Additionally, or alternatively, in some embodiments the pathing algorithm(s) 21404 includes another pathing algorithm determined to efficiently route transversal of a tote throughout the smart racks of the modular superstructure 21204. In some embodiments, the segmentation of the modular superstructure 21204 is combined with one or more other pathing algorithm(s), for example such that a particular pathing algorithm (e.g., an Eikonal pathing algorithm or otherwise) is applied to generate pathing data for one or more particular segment(s) after segmentation of the smart rack(s) embodying the modular superstructure 21204.

As illustrated, the apparatus 21300 utilizes the pathing algorithm(s) 21404 to generate pathing data 21406. In some embodiments, the pathing data 21406 represents a path throughout at least a portion of the smart rack(s) embodying the modular superstructure 21204. For example, in some embodiments, the pathing data 21406 represents a path from a starting position to an ending position in the smart racks represented by smart rack arrangement data 21402. In some embodiments, the pathing data 21406 is determined based at least in part on a tote request, message, or other data indicating an action to be performed by the modular superstructure 21204, for example egressing a particular tote. In some embodiments, the pathing data 21406 represents a combined path, for example generated from a combination of pathing data for a plurality of segments associated with the smart racks represented by the smart rack arrangement data 21402.

In some embodiments, the apparatus 21300 generates rack command(s) 21408 from the pathing data 21406. In some embodiments, the rack command(s) 21408 represents at least one rack command that enables traversal of a tote along the path represented by the pathing data 21406. In some embodiments, the apparatus 21300 generates a rack command for each step in the traversal of a tote along the path represented by the pathing data 21406. In this regard, a rack command may be generated for each smart rack at a smart rack location in the path represented by the pathing data 21406, where the rack command is configured to cause the smart rack to perform action(s) that enables the smart rack to traverse a tote along the path represented by the pathing data 21406. In this regard, the rack command(s) 21408 may be transmitted via one or more message(s) to one or more of the smart racks of the modular superstructure 21204 for routing and/or execution. The message transmission(s) may be consumed by a particular smart rack indicated to execute a particular rack command of the rack command(s) 21408.

Having described example systems and apparatuses in accordance with the disclosure, example implementations for segmentation-based pathing will now be discussed. FIG. 215 illustrates an example visualization of segmenting a smart rack arrangement of a modular superstructure in accordance with at least one example embodiment of the present disclosure. Specifically, FIG. 215 illustrates an example smart rack arrangement data representation 21500. The smart rack arrangement data representation 21500 depicts particular smart rack arrangement data that represents an arrangement of smart racks of a modular superstructure divided into a plurality of segments. In some embodiments, the apparatus 21300, for example, divides the smart rack arrangement data corresponding to the smart rack arrangement data representation 21500 utilizing a segmentation-based pathing algorithm. For example, in some embodiments the apparatus 21300 utilizes a segmentation-based pathing algorithm that divides a particular set of smart racks of a modular superstructure into a particular number of segment(s) such that each include the same number of smart racks. In some embodiments, for example, the apparatus 21300 begins by dividing smart rack arrangement data representing all smart racks of a particular modular superstructure into a plurality of segments. As illustrated, the smart rack arrangement data representation 21500 is divided into eight segments of equal size, specifically segment 21502*a*, segment 21502*b*, segment 21502*c*, segment 21502*d*, segment 21502*f*, segment 21502*g*, and an additional segment not visible from the perspective of the figure.

In some embodiments, the apparatus 21300 divides the smart rack arrangement data a plurality of times. For example, in some embodiments, the apparatus 21300 divides the smart rack arrangement data recursively into segments until particular segments satisfy particular desired criteria, for example where a segment is less than a threshold size (e.g., the number of smart racks in a segment falls below the threshold size). In this regard, the smart rack arrangement data may be divided into various segments, and a particular selected segment may be further divided into segments including a lesser number of smart racks (e.g., where each selected segment includes a greater number of smart racks than the sub-segments created via division of that segment).

As illustrated, for example, the segment 21502*a* may be selected for further segmentation. The segment 21502*a* is divided into a plurality of sub-segments. Specifically, the segment 21502*a* is divided into sub-segment 21504*a*, sub-segment 21504*b*, sub-segment 21504*c*, sub-segment 21504*d*, sub-segment 21504*e*, sub-segment 21504*f*, and two sub-segments not visible in the figure (collectively "segments 21504"). In some embodiments, the segment 21502*a* is divided such that each of the sub-segments is of equal size. For example, the segment 21502*a* may be divided into equally sized octants. Further as illustrated, one or more of the segments 21504 may be further divided. For example, as illustrated, the sub-segment 21504*a* may similarly be further divided into a plurality of sub-segments. In some embodiments, the apparatus 21300 divides segment(s) represented in smart rack arrangement data until the particular segments satisfy one or more threshold criteria, for example a size threshold representing a number of smart racks that may remain within a segment for pathing to be performed.

In some embodiments, once division into segments is completed, the apparatus 21300 selects a particular segment for pathing. As illustrated, in some embodiments the apparatus 21300 selects a particular segment 21506. In some such embodiments, the apparatus 21300 selects a segment that includes a particular smart rack location. For example, in some embodiments the apparatus 21300 selects a particular segment that includes a starting position from which a tote is to be traversed, and/or an ending position to which a tote is to be traversed. Additionally, or alternatively, in some embodiments the apparatus 21300 selects other segments that connect to other selected segments or previously processed segments, or otherwise complete pathing from a starting position to an ending position.

In some embodiments, each particular segment is processed to generate pathing data from a starting position within that segment to an ending position within that segment. In some embodiments, the apparatus 21300 performs a pathing algorithm from a starting position to an ending position utilizing one or more sub-paths that each embody a path from a sub-starting position to a sub-ending position for a particular segment. Each sub-path may be resolved with one or more other sub-paths to generate a final path from an initial starting position to a final ending position. In this regard, in some embodiments, a combined path representing a path from an initial starting position to a final ending position is generated from the combination of sub-paths for each segment that progresses towards the final ending position from the initial starting position. It should be appreciated that in some embodiments, a given particular segment such as the particular segment 21506 may be processed utilizing any of a myriad of pathing algorithm(s) to generate pathing data for that particular segment. In some embodiments, the pathing algorithm includes an Eikonal pathing algorithm as depicted and described herein.

Example processes for segmentation-based pathing will now be discussed. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depict a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 216 illustrates a flowchart depicting example operations of a process for generating pathing data utilizing smart rack arrangement segmentation in accordance with at least one example embodiment of the present disclosure. Specifically, FIG. 216 depicts an example process 21600. The process 21600 embodies an example computer-implemented method. In some embodiments, the process 21600 is embodied by computer program code stored on a non-transitory computer-readable storage medium of a computer program product configured for execution to perform the process as depicted and described. Alternatively or additionally, in some embodiments, the process 21600 is performed by one or more specially configured computing devices, such as the apparatus 21300 alone or in communication with one or more other component(s), device(s), system(s), and/or the like. In this regard, in some such embodiments, the apparatus 21300 is specially configured by computer-coded instructions (e.g., computer program instructions) stored thereon, for example in the memory 21304 and/or another component depicted and/or described herein and/or otherwise accessible to the apparatus 21300, for performing the operations as depicted and described. In some embodiments, the apparatus 21300 is in communication with one or more external apparatus(es), system(s), device(s), and/or the like, to perform one or more of the operations as depicted and described. In some embodiments, the apparatus 21300 is in communication with separate component(s) of a network, external network(s), and/or the like, to perform one or more of the operation(s) as depicted and described. For purposes of simplifying the description, the process 21600 is described as performed by and from the perspective of the apparatus 21300.

Although the example process 21600 depicts a particular sequence of operations, the sequence may be altered without departing from the scope of the present disclosure. For example, some of the operations depicted may be performed in parallel or in a different sequence that does not materially affect the function of the process 21600. In other examples, different components of an example device or system that implements the process 21600 may perform functions at substantially the same time or in a specific sequence.

According to some examples, the method includes identifying smart rack arrangement data representing an arrangement of a plurality of smart racks at operation 21602. In some embodiments, the smart rack arrangement data is received by the apparatus 21300, for example from one or more smart rack(s) of a modular superstructure. Additionally, or alternatively, in some embodiments, the apparatus 21300 statically maintains or otherwise stores data embodying the smart rack arrangement data. In some such embodiments, the apparatus 21300 retrieves the smart rack arrangement data from a data repository maintained by or otherwise accessible to the apparatus 21300. In some embodiments, the smart rack arrangement data includes data defining a smart rack location of one or more smart racks in a grid arrangement. For example, in some embodiments the smart rack arrangement data defines a particular coordinate grid, where each coordinate in the grid represents a different possible smart rack. In some embodiments, the smart rack arrangement data includes data embodying a rack status or other data corresponding to one or more coordinates, where the rack status and/or other data is received from or associated with the smart rack at the smart rack location corresponding to the coordinate. Additionally, or alternatively, one or more portions of the smart rack arrangement data may be generated or otherwise determined by the apparatus 21300, for example representing an obstructed status at one or more smart rack locations in the arrangement in a circumstance where no smart rack is present at the smart rack location, where no message transmission from the smart rack is received (e.g., the smart rack is offline or otherwise malfunctioning), where the smart rack is experiencing an error, and/or the like.

According to some examples, the method includes dividing the smart rack arrangement data into a plurality of segments, each segment of the plurality of segments comprising at least one individual smart rack of the plurality of smart racks at operation 21604. In some embodiments, the apparatus 21300 divides the smart rack arrangement data such that a plurality of equal-sized segments of the smart rack arrangement data are formed. Additionally, or alternatively, in some embodiments, the apparatus 21300 divides the smart rack arrangement data into a plurality of octants, for example embodying eight segments representing each segment defined by each axis of a three-dimensional space. In other embodiments, the apparatus 21300 divides smart racks represented in the smart rack arrangement data into any other number of other defined segments.

In some embodiments, the apparatus 21300 recursively divides at least one segment. For example, in some embodiments, the apparatus 21300 continues to divide one or more segments into smaller segments that include data representing a smaller number of smart racks. In some such embodiments, the apparatus 21300 divides particular segments until a segment is generated that represents a number of smart racks under a threshold representing a maximum number of smart racks.

According to some examples, the method includes selecting a particular segment of the plurality of segments at operation 21606. For example, in some embodiments, the apparatus 21300 selects a particular segment that includes a starting position for pathing. Additionally, or alternatively still, in some embodiments, the apparatus 21300 selects a particular segment that includes an ending position for pathing. Additionally, or alternatively, in some embodiments the apparatus 21300 selects the particular segment that connects to one or more other segment(s) selected by the apparatus 21300 for processing. For example, the apparatus 21300 may select a plurality of segments that connect to enable a continuous path from an initial starting position to a final ending position for pathing.

According to some examples, the method includes identifying a starting position of the particular segment and an ending position of the particular segment at operation 21608. In some embodiments, the starting position represents an initial starting position for traversing a tote via smart racks represented in the smart rack arrangement data. Additionally, or alternatively, in some embodiments, the ending position represents a final ending position for traversing a tote via smart racks represented in the smart rack arrangement data. In some embodiments, the apparatus 21300 determines a starting position and/or ending position within the particular segment such that the starting position and/or ending position are closest to the initial starting position and/or final ending position to which pathing is to be performed. For example, in the example context where a smart rack arrangement data represents smart racks for a 10 by 10 by 10 modular superstructure, a message transmission may indicate traversal of a tote from a starting position corresponding to smart rack location embodied by coordinate (0, 0, 0) to an ending position corresponding to smart rack location embodied by coordinate (10, 10, 10). Upon dividing the smart rack arrangement data into octants, a first particular segment may span from (0, 0, 0) to (4, 4, 4). The first particular segment may be selected for pathing, and a new starting position and a new ending position may be determined based on the smart rack locations closest to the initial starting position of (0, 0, 0) and the final ending position of (10, 10, 10). Since (0, 0, 0) is within the selected segment, the apparatus 21300 may determine the starting position for the segment to be (0, 0, 0). The smart rack location (4, 4, 4) is determined as the closest smart rack location to the final ending position of (10, 10, 10), and therefore is selected as the ending location for the particular segment.

According to some examples, the method includes generating pathing data from the starting position of the particular segment to the ending position of the particular segment at operation 21610. In some embodiments, the apparatus 21300 applies the starting position and the ending position to at least one pathing algorithm. The at least one pathing algorithm determines the pathing data to represent an efficient path for traversing from the starting position to the ending position. In some embodiments, the pathing algorithm comprises an Eikonal pathing algorithm as depicted and described herein. In other embodiments, the apparatus 21300 applies the starting position and ending position to any other pathing algorithm.

According to some examples, the method includes generating additional pathing data for at least one other segment of the plurality of segments at operation 21612. For example, in some embodiments, the apparatus 21300 generates additional pathing data for each segment generated by the apparatus 21300. Alternatively or additionally, in some embodiments the apparatus 21300 identifies a particular set of segments that connects an initial starting position to a final ending position, and generates pathing data for each of the segments in the particular set of segments connecting the initial starting position and the final ending position.

According to some examples, the method includes generating a combined path at operation 21614. In some embodiments, the combined path represents an aggregation of each generated pathing data. For example, in some embodiments, the combined path connects starting positions and ending positions of the pathing data and each additional pathing data in order from the initial starting position to the final ending position.

According to some examples, the method includes initiating routing of a tote utilizing the plurality of smart racks based at least in part on the pathing data at operation 21616. The pathing data may include pathing data for a particular segment, or pathing data embodying a combined path for a plurality of segments. In some embodiments, the apparatus 21300 generates one or more rack commands that each are configured to trigger a movement of at least one smart rack in accordance with the pathing data. For example, the apparatus 21300 may generate a rack command for each individual action to be completed to traverse a tote along the path represented by the pathing data. Additionally, or alternatively, in some embodiments, the apparatus 21300 generates one or more message transmission(s) communicable to the smart rack(s) of the modular superstructure, where the message transmission(s) include or otherwise embody the rack command(s) to be performed. Additionally, or alternatively, in some embodiments, the apparatus 21300 transmits the one or more message transmission(s) to the modular superstructure for processing, for example by transmitting the message transmission(s) embodying the rack command(s) to one or more particular smart rack(s) of the modular superstructure for propagation to the smart rack intended to perform the action represented by a particular rack command represented in the message transmission. In this regard, the apparatus 21300 may cause the smart racks of the modular superstructure to perform traversal actions in accordance with the generated pathing data.

Embodiments for Eikonal pathing will now be discussed. It will be appreciated that, in some embodiments, Eikonal pathing is utilized to perform pathing from an initial starting position to a final ending position associated with traversal of a tote. Additionally, or alternatively, in some embodiments, Eikonal pathing is utilized as a pathing algorithm for one or more segments of a modular superstructure. For example, some embodiments perform Eikonal pathing to generate pathing data for each segment of a plurality of segments, where a combined path representing a path from an initial starting position to a final ending position is generated from the combination of the pathing data for each segment. In this regard, in some embodiments the pathing algorithms embodying Eikonal pathing as depicted and described herein are performed on their own, and in some embodiments the pathing algorithms are combined with the segmentation-based pathing as depicted and described herein.

FIG. 217 illustrates formulas for Eikonal pathing in accordance with at least one example embodiment of the present disclosure. Specifically, FIG. 217 depicts formula 21702. The formula 21702 represents an Eikonal equation that represents a high frequency approximation of a wave propagation equation that serves as a basis for determining a travel time from a particular position. In this regard, the formula 21702 may be utilized to derive a solution to the Eikonal equation. The solution may be represented by formula 21704, where Ω represents an open set with a suitably smooth boundary 82, and formula 21706. In this regard, the minimal travel time from x to 802 may be determined via such equations, where 1/f(x) represents a particular resistance or velocity assigned to a particular position, for example corresponding to a cell velocity assigned to a particular smart rack location. In some embodiments, the cell velocity for a particular location is provided by the formula 21708, as depicted and described herein.

It will be appreciated that, in some embodiments, the formulas are usable to derive a particular formula embodying an algorithm for determining a travel time between positions based at least in part on assigned velocities (or similarly, resistance) values. For example, in some embodiments, the formulas are usable to derive a fast-marching algorithm that determines a travel time between a first position and a second position based at least in part on such velocities assigned to the positions. In some embodiments, the positions embody different smart rack locations represented in smart rack arrangement data, based at least in part on the cell velocity assigned to each smart rack location. It should be appreciated that in other embodiments, another algorithm that similarly represents travel time derived from the smart rack arrangement data, and/or cell velocities associated therewith and/or embodied therein. In this regard, the fast-marching algorithm and/or other derived algorithm may be utilized to generate a travel time grid that represents a travel time from a particular smart rack location embodying a position in an arrangement of smart racks to each other smart rack location embodying another position in the arrangement of smart racks.

FIG. 218 illustrates visualizations of data derived for Eikonal pathing of an unobstructed arrangement of smart racks in accordance with at least one example embodiment of the present disclosure. Specifically, FIG. 218 depicts a visualization of each step in an example Eikonal pathing algorithm. In some embodiments, the Eikonal pathing algorithm is performed by the apparatus 21300, for example for controlling a particular corresponding modular superstructure including any number of smart racks.

FIG. 218 includes a smart rack arrangement data visualization 21802. The smart rack arrangement data visualization 21802 represents particular smart rack arrangement data corresponding to a particular arrangement of smart racks. In some embodiments, the arrangement of smart racks embodies a particular modular superstructure throughout which totes may be traversed. In some embodiments, the smart rack arrangement data corresponding to the smart rack arrangement data visualization 21802 includes or is associated with a particular indication of a starting position from which traversal is to begin in the arrangement of smart racks. As illustrated, the starting position corresponds to a smart rack location in the bottom left of the arrangement of smart racks represented by the smart rack arrangement data visualization 21802. Additionally, or alternatively, in some embodiments, the smart rack arrangement data corresponding to the smart rack arrangement data visualization 21802 includes or is associated with a particular indication of an ending position at which traversal is to terminate in the arrangement of smart racks. As illustrated, the ending position corresponds to a smart rack location in the top right of the arrangement of smart racks represented by the smart rack arrangement data visualization 21802. The smart rack arrangement data corresponding to the smart rack arrangement data visualization 21802 in some embodiments is determined based at least in part on rack status data or other information received from smart racks of the modular superstructure to be represented by the smart rack arrangement data. In other embodiments, the apparatus 21300 statically maintains and/or retrieves the smart rack arrangement data visualization 21802.

FIG. 218 further depicts cell velocity grid visualization 21804. The cell velocity grid visualization 21804 represents values of a particular cell velocity grid. In some embodiments, the smart rack arrangement data includes or otherwise is associated with a cell velocity grid corresponding to the arrangement of smart racks. The cell velocity grid represents a particular cell velocity assigned to each smart rack location in the arrangement of smart racks corresponding to the smart rack arrangement data. In some embodiments, the apparatus 21300 determines and/or assigns a cell velocity to a particular smart rack location based at least in part on the rack status associated with the smart rack corresponding to the particular smart rack location. In some embodiments, the apparatus 21300 predetermines a cell velocity corresponding to a particular smart rack location or a plurality of cell velocities corresponding to a plurality of smart rack locations.

FIG. 218 further depicts travel time grid visualization 21806. The travel time grid visualization 21806 represents values of a travel time grid. In some embodiments, the smart rack arrangement data includes or otherwise is associated with a travel time grid corresponding to the arrangement of smart racks. In this regard, the travel time grid in some embodiments includes data embodying a travel time from a particular smart rack location, for example a starting position, to each other smart rack location in the arrangement of smart racks. In some embodiments, the apparatus 21300 derives some or all of the travel times embodying a travel time grid for a particular arrangement of smart racks based at least in part on corresponding smart rack arrangement data and/or cell velocity grid. For example, in some embodiments, the apparatus 21300 applies a fast-marching algorithm to derive the travel times represented in the travel time grid visualization 21806 for each smart rack location represented in the smart rack arrangement data. The apparatus 21300 may construct the travel time grid based at least in part on the travel time derived by the apparatus 21300 for each smart rack location in the arrangement of smart racks.

FIG. 218 further depicts gradient grid visualization 21808 and gradient grid visualization 21810. In some embodiments, the apparatus 21300 generates a gradient grid for each dimension represented in smart rack arrangement data. For example, as illustrated, smart rack arrangement data visualization 21802 represents a two-dimensional arrangement of smart racks, and apparatus 21300 generates a gradient grid for each of the two dimensions (e.g., an x-dimension and a y-dimension). In embodiments where smart rack arrangement data represents an arrangement of smart racks embodying a three-dimensional arrangement, the apparatus 21300 may generate three gradient grids (e.g., an x-dimension, a y-dimension, and a z-dimension). The gradient grid visualization 21808 represents a gradient grid embodying a first derivation of the travel time grid visualization 21806 along the first dimension, and the gradient grid visualization 21810 represents a gradient grid embodying a second derivation of the travel time grid visualization 21806 along the second dimension. In some embodiments, each of the gradient grids corresponding to gradient grid visualization 21808 and gradient grid visualization 21810 is generated utilizing at least one filter. For example, in some embodiments, the apparatus 21300 applies at least one Sobel filter to the travel time grid corresponding to the travel time grid visualization 21806, such as a first Sobel filter corresponding to the x-direction and a second Sobel filter corresponding to the y-direction.

In some embodiments, the apparatus 21300 processes the one or more gradient grids to determine pathing data representing a path determined for efficiently traversing from a starting position to an ending position. For example, in some embodiments, the apparatus 21300 generates pathing data by applying at least one gradient descent algorithm to the at least one gradient grid. As illustrated, the pathing data corresponding to the pathing data visualization 21812 is generated by applying a gradient descent algorithm to each of the gradient grids corresponding to the gradient grid visualization 21808 and gradient grid visualization 21810. In this regard, the gradient descent algorithm may generate the pathing data representing the path in the pathing data visualization 21812 determined to best traverse along the gradient depicted in each of the gradient grid visualizations 21808 and 21810. In some such embodiments, the pathing data is generated from the starting position to the ending position indicated or otherwise associated with the smart rack arrangement data represented in the smart rack arrangement data visualization 21802. Based on the smart rack arrangement data indicating that the various smart rack locations of the arrangements of smart racks are currently empty (e.g., associated with an open status), the pathing data embodies a direct path moving diagonally via Manhattan-direction traversals towards the ending position until the row of the ending position, at which point the direct path includes horizontal traversals towards the ending position.

FIG. 219 illustrates visualization of data derived for Eikonal pathing of an obstructed arrangement of smart racks in accordance with at least one example embodiment of the present disclosure. Specifically, FIG. 219 depicts another visualization of each step in another example Eikonal pathing algorithm. In some embodiments, the Eikonal pathing algorithm is performed by the apparatus 21300, for example for controlling a particular corresponding modular superstructure including any number of smart racks.

FIG. 219 depicts an example Eikonal pathing algorithm for an arrangement of smart racks including one or more obstructed smart racks. For example, in some embodiments, the apparatus 21300 processes smart rack arrangement data including one or more smart racks associated with an obstructed status. As illustrated, FIG. 219 includes a smart rack arrangement data visualization 21902. The smart rack arrangement data visualization 21902 includes visualization of the one or more smart racks in the smart rack arrangement that are obstructed, for example depicted by obstructed rack representations 21904 as a differently shaded from the remainder of the smart rack arrangement data visualization 21902. In this regard, each smart rack corresponding to a smart rack location of the obstructed rack representations 21904 is associated with an obstructed status, and each smart rack corresponding to a smart rack location of the smart rack arrangement data visualization 21902 is associated with an open status. Additionally, or alternatively, in some embodiments, the smart rack arrangement data corresponding to the smart rack arrangement data visualization 21902 includes or is associated with a particular indication of a starting position at which traversal is to begin, and/or an indication of an ending position at which traversal is to terminate, within the arrangement of smart racks.

In some embodiments, the smart rack arrangement data includes or is associated with a cell velocity grid. The cell velocity grid is represented by cell velocity grid visualization 21906. In this regard, each smart rack location represented in the cell velocity grid visualization 21906 is associated with a particular cell velocity associated with the smart rack at the smart rack location based at least in part on the rack status of that smart rack. As illustrated, the cell velocity grid visualization 21906 includes first cell velocity racks 21908 corresponding to the unobstructed smart racks of the smart rack arrangement data represented by smart rack arrangement data visualization 21902, and second cell velocity racks 21910 corresponding to the obstructed rack representations 21904. In some embodiments, for example, the first cell velocity racks 21908 are assigned a higher cell velocity (e.g., 2.0) than the second cell velocity racks 21910, which are associated with a lower cell velocity (e.g., 1.0).

The cell velocity grid visualization 21906 is processed in the same manner as the cell velocity grid visualization 21804 as depicted and described with respect to FIG. 218. In this regard, FIG. 219 depicts a travel time grid visualization 21912. The travel time grid visualization 21912 represents values of a travel time grid. In some embodiments, the smart rack arrangement data includes or otherwise is associated with a travel time grid corresponding to the arrangement of smart racks, where such data is derived in whole or in part based at least in part on the cell velocity grid corresponding to cell velocity grid visualization 21906. For example, in some embodiments, the apparatus 21300 applies a fast-marching algorithm to the cell velocity grid corresponding to the cell velocity grid visualization 21906 to generate the travel time grid represented by the travel time grid visualization 21912.

FIG. 219 further depicts gradient grid visualization 21914 and gradient grid visualization 21916. In some embodiments, the apparatus 21300 generates a gradient grid for each dimension represented in the smart rack arrangement data, for example corresponding to the smart rack arrangement data visualization 21902. In this regard, in some embodiments, the apparatus 21300 applies at least one Sobel filter to the travel time grid corresponding to the gradient grid visualization 21914, such as a first Sobel filter corresponding to the x-direction and a second Sobel filter corresponding to the y-direction.

In some embodiments, the apparatus 21300 subsequently processes the one or more gradient grids to determine pathing data representing a path determined for efficiently traversing from a starting position to an ending position in the smart rack arrangement data represented by the smart rack arrangement data visualization 21902. For example, in some embodiments, the apparatus 21300 generates pathing data by applying at least one gradient descent algorithm to the at least one gradient grid. As illustrated, the pathing data corresponding to the pathing data visualization 21918 by applying a gradient descent algorithm to each of the gradient grids corresponding to the gradient grid visualization 21914 and gradient grid visualization 21916. In this regard, the gradient descent algorithm may generate the pathing data representing the path determined to best traverse along the gradient depicted in each of the gradient grid visualizations 21914 and 21916. As depicted, the pathing data generated paths efficiently around the obstruction corresponding to the obstructed rack representations 21904 represented in the smart rack arrangement. It will be appreciated that, in other embodiments for example, the apparatus 21300 may utilize such methodologies to generate pathing data that traverses from a starting position to an ending position to account for any number of obstructions in the arrangement of smart racks.

In some embodiments, pathing data as generated via the Eikonal pathing algorithm as described with respect to FIG. 218 and/or FIG. 219, for example, is outputted for further processing. For example, in some embodiments, the pathing data generated is outputted and/or utilized to initiate commands in a circumstance where the apparatus 21300 determines that the path represented by the generated pathing data includes smart rack locations that are unobstructed, where each smart rack associated with a smart rack location in the pathing data is associated with an open status.

Additionally, or alternatively, in some embodiments, Eikonal pathing via the Eikonal pathing algorithm generates clearing move data that represents one or more additional traversals utilized to traverse along the path represented by the generated pathing data. FIG. 220 illustrates visualizations of different stages of Eikonal pathing including clearing moves in accordance with at least one example embodiment of the present disclosure. In this regard, the clearing move data may represent traversals to be initiated by smart racks of the arrangement of smart racks that remove totes from such smart racks in the path represented by the generated pathing data.

As illustrated, FIG. 220 includes smart rack arrangement representation 22002. As depicted, the smart rack arrangement representation 22002 includes pathing data 22004. The pathing data in some embodiments represents the smart rack locations of an arrangement of smart racks that are determined to be utilized to efficiently traverse a tote from a starting position to an ending position. In some embodiments, the pathing data corresponding to smart rack arrangement representation 22002 is generated utilizing the Eikonal pathing algorithm described with respect to FIG. 218 and/or FIG. 219. In this regard, the pathing data 22004 corresponds to an initial state of the smart rack arrangement data at the time that such pathing is to be initiated and before performance of any clearing moves corresponding to particular clearing move data.

FIG. 220 further depicts an assigned unobstructed path representation 22006. The assigned unobstructed path representation 22006 represents the arrangement of the smart racks of a modular superstructure and associated clearing move assigned to each obstructed smart rack based on corresponding generated clearing move data. In some embodiments, the clearing move data is generated utilizing the same pathing algorithm(s) and/or other pathing algorithm(s) from a smart rack location corresponding to a smart rack associated with an obstructed status and that is within the path represented by generated pathing data to a smart rack associated with an open status. In this regard, the assigned unobstructed path representation 22006 represents assignments for traversal of totes from starting positions embodying smart rack locations in the path to unobstructed smart rack locations elsewhere in the modular superstructure.

FIG. 220 further depicts final unobstructed smart rack arrangement representation 22008. The final unobstructed smart rack arrangement representation 22008 depicts the arrangement of smart racks after performance of all clearing moves associated with the generated pathing data. In this regard, the final unobstructed smart rack arrangement representation 22008 depicts all totes in the smart rack arrangement being positioned from smart rack locations located in the path represented by the pathing data to a smart rack corresponding to an open status via performance of an assigned clearing move represented in the clearing move data. As illustrated, the resulting positioning of totes in the arrangement of smart racks enables traversal of a tote from a starting position to an ending position along the path represented by the pathing data without concern for obstructed smart racks in such a path.

It will be appreciated that, at a given point in time, different smart racks may be associated with one of various different possible rack statuses. For example, at a given timestamp, certain smart racks may be storing a tote, whereas other smart racks in the arrangement of smart racks may not be storing any tote. In this regard, at any given timestamp, any number of move may be performed simultaneously in parallel. For example, in some embodiments, one or more moves to traverse from a first smart rack to a second smart rack may be initiated in parallel in a circumstance where the second smart rack is associated with an open status.

FIG. 221 illustrates a visualization of pathing data and corresponding parallelization of pathing data in accordance with at least one example embodiment of the present disclosure. Specifically, FIG. 221 depicts a visualization of parallelization of each move to traverse a tote in accordance with generated pathing data. Such pathing data may include moves to traverse a tote along a particular path, and/or one or more clearing moves represented by clearing move data associated with such a generated path.

FIG. 221 includes a first pathing data representation 22102. The first pathing data representation 22102 depicts each move to be performed associated with particular pathing data. In this regard, the pathing data representation 22102 includes moves associated with traversal of a particular tote from a starting position to an ending position. Additionally, the pathing data representation 22102 includes clearing moves represented in clearing move data, where the clearing moves open all smart rack locations included in a generated path from the starting position to the ending position.

The moves depicted in first pathing data representation 22102 are depicted in an unparallelized manner. For example, the pathing data representation 22102 may represent operation of embodiments where only one move is performable at a particular time step. The pathing data representation 22102 depicts the particular moves associated with pathing data as depicted and discussed with respect to FIG. 220. In this regard, as depicted the pathing data including associated clearing move data includes 236 traversal moves to complete the traversal of a tote from the starting position to the ending position.

FIG. 221 further includes parallelized pathing data representation 22104. The parallelized pathing data representation 22104 depicts each move to be performed associated with the particular pathing data for traversal of a tote from a starting position to an ending position. The moves depicted in the parallelized pathing data representation 22104 represent parallelization of the moves depicted with respect to pathing data representation 22102. In this regard, at a given time step, multiple moves may be performed in a circumstance where each step of the multiple steps is performable (e.g., a traversal to a smart rack that is currently unobstructed, for example currently associated with open status). Accordingly, at each time step (e.g., represented by a "move number" along the vertical axis), a subset of all moves for particular pathing data, including associated clearing move data, may be performed in parallel to reduce the overall execution time for facilitating a tote traversal from starting position to ending position. As illustrated for example, the parallelized pathing data representation 22104 is performable in 50 moves, such that traversal is accomplished in reduced real-world time. Such parallelization advantageously further enables completion of more traversals in a reduced period of time.

Example processes for Eikonal pathing will now be discussed. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depict a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 222 illustrates a flowchart depicting example operations of a process for generating pathing data utilizing Eikonal pathing in accordance with at least one example embodiment of the present disclosure. Specifically, FIG. 222 depicts an example process 22200. The process 22200 embodies an example computer-implemented method. In some embodiments, the process 22200 is embodied by computer program code stored on a non-transitory computer-readable storage medium of a computer program product configured for execution to perform the process as depicted and described. Alternatively or additionally, in some embodiments, the process 22200 is performed by one or more specially configured computing devices, such as the apparatus 21300 alone or in communication with one or more other component(s), device(s), system(s), and/or the like. In this regard, in some such embodiments, the apparatus 21300 is specially configured by computer-coded instructions (e.g., computer program instructions) stored thereon, for example in the memory 21304 and/or another component depicted and/or described herein and/or otherwise accessible to the apparatus 21300, for performing the operations as depicted and described. In some embodiments, the apparatus 21300 is in communication with one or more external apparatus(es), system(s), device(s), and/or the like, to perform one or more of the operations as depicted and described. In some embodiments, the apparatus 21300 is in communication with separate component(s) of a network, external network(s), and/or the like, to perform one or more of the operation(s) as depicted and described. For purposes of simplifying the description, the process 22200 is described as performed by and from the perspective of the apparatus 21300.

Although the example process 22200 depicts a particular sequence of operations, the sequence may be altered without departing from the scope of the present disclosure. For example, some of the operations depicted may be performed in parallel or in a different sequence that does not materially affect the function of the process 22200. In other examples, different components of an example device or system that implements the process 22200 may perform functions at substantially the same time or in a specific sequence.

According to some examples, the method includes determining smart rack arrangement data corresponding to a plurality of smart racks at operation 22202. In some embodiments, the smart rack arrangement data corresponds to a cell velocity grid associated with the plurality of smart racks. Additionally, or alternatively, in some embodiments, the cell velocity grid comprises a cell velocity assigned to each smart rack location in the smart rack arrangement data based at least in part on a rack status associated with a particular smart rack corresponding to the smart rack location.

In some embodiments, the smart rack arrangement data represents an arrangement of the plurality of smart racks. In some embodiments, the smart rack arrangement data is received by the apparatus 21300, for example from one or more smart rack(s) of a modular superstructure. Additionally, or alternatively, in some embodiments, the apparatus 21300 statically maintains or otherwise stores data embodying the smart rack arrangement data. In some such embodiments, the apparatus 21300 retrieves the smart rack arrangement data from a data repository maintained by or otherwise accessible to the apparatus 21300. In some embodiments, the smart rack arrangement data includes data defining a smart rack location of one or more smart racks in a grid arrangement. For example, in some embodiments the smart rack arrangement data defines a particular coordinate grid, where each coordinate in the grid represents a different possible smart rack. In some embodiments, the smart rack arrangement data includes data embodying a rack status or other data corresponding to one or more coordinates, where the rack status and/or other data is received from or associated with the smart rack at the smart rack location corresponding to the coordinate. Additionally, or alternatively, one or more portions of the smart rack arrangement data may be generated or otherwise determined by the apparatus 21300, for example representing an obstructed status at one or more smart rack locations in the arrangement in a circumstance where no smart rack is present at the smart rack location, where no message transmission from the smart rack is received (e.g., the smart rack is offline or otherwise malfunctioning), where the smart rack is experiencing an error, and/or the like.

According to some examples, the method includes determining a starting position and an ending position at operation 22204. In some embodiments, the starting position represents an initial starting position for traversing a tote via smart racks represented in the smart rack arrangement data. Additionally, or alternatively, in some embodiments, the ending position represents a final ending position for traversing a tote via smart racks represented in the smart rack arrangement data. In some embodiments, the starting position represents a smart rack location at which a tote is currently located, and the ending position represents a smart rack location at which the tote is to be egressed. Alternatively, in some embodiments, the starting position represents a smart rack location at which a tote is to be ingressed to the modular superstructure, and the ending position represents a smart rack location at which the tote is to be stored within the modular superstructure. For example, in the example context where a smart rack arrangement data represents smart racks for a 10 by 10 by 10 modular superstructure, a message transmission may indicate traversal of a tote from a starting position corresponding to smart rack location embodied by coordinate (0, 0, 0) to an ending position corresponding to smart rack location embodied by coordinate (10, 10, 10). In some embodiments, the starting position and/or ending position are associated with a particular segment of the smart rack arrangement data, for example segments determined utilizing segmentation-based pathing as described herein with respect to FIG. 214 to FIG. 217.

According to some examples, the method includes generating a travel time grid corresponding to the plurality of smart racks based at least in part on the starting position, the ending position, and the cell velocity grid corresponding to each smart rack of the smart rack arrangement data at operation 22206. For example, in some embodiments, the travel time grid represents a travel time to each smart rack location in the smart rack arrangement data from the starting position. The travel time at a particular smart rack location may be determinable based at least in part on the cell velocity assigned to the smart rack location and/or cell velocities assigned to other smart rack locations leading to the particular smart rack location. In some embodiments, the travel time to a particular smart rack location is determinable utilizing a fast-marching algorithm or other algorithmic solution to an Eikonal equation as disclosed herein, for example as depicted and described with respect to FIG. 218. In this regard, in some embodiments the travel time for each smart rack location represents a wave propagation from the starting position to each smart rack location until the ending position is reached.

According to some examples, the method includes generating at least one gradient grid corresponding to the plurality of smart racks at operation 22208. In some embodiments, the at least one gradient grid is generated by applying at least one filter to the travel time grid. For example, in some embodiments, a filter is applied for each dimension of traversal that is possible between the plurality of smart racks of the modular superstructure. In a context where each smart rack can move in each axis of a three-dimensional Cartesian plane, for example, a first filter may be applied to the travel time grid for an x-direction, a second filter may be applied to the travel time grid for a y-direction, and a third filter may be applied to the travel time grid for a z-direction. In some embodiments, the at least one filter includes at least one Sobel filter. For example, in some embodiments, the at least one filter includes a Sobel filter applied for each direction in which traversal of a tote may be performed.

According to some examples, the method includes generating pathing data at operation 22210. In some embodiments, the pathing data represents a path from the starting position to the ending position. The pathing data may represent any number of traversals to be performed that efficiently moves a tote from the starting position from the ending position. In some embodiments, the pathing data is generated at least in part utilizing a regression or other processing algorithm, such as a gradient descent algorithm. In some embodiments, the processing algorithm is applied to the at least one gradient grid, for example generated at operation 22208. In some embodiments, the gradient descent algorithm (or other processing algorithm) is applied in consideration of all gradient grids simultaneously to account for movement in each possible direction throughout the modular superstructure.

According to some examples, the method includes identifying at least one obstructed smart rack location represented in the pathing data at optional operation 22212. In some embodiments, the pathing data represents a particular determined path from the starting position to the ending position, the path including any number of smart rack locations through which a tote will traverse to reach the ending position from the starting position. In some embodiments, the apparatus 21300 identifies the at least one obstructed smart rack location by querying for the rack status of each smart rack at a smart rack location represented in the path. The apparatus 21300 may identify a particular obstructed smart rack location in a circumstance where the rack status of the rack at the particular smart rack location in the path embodies an obstructed status. In some embodiments each obstructed smart rack location is identified based on current or real-time messages indicating the rack status of each smart rack at the smart rack locations in the path as depicted and described herein.

According to some examples, the method includes generating clearing move data based at least in part on the at least one obstructed smart rack location at optional operation 22214. Additionally, or alternatively, in some embodiments, the pathing data includes clearing move data associated with the path from the starting position to the ending position. In some embodiments, the clearing move data represents one or more clearing moves to be performed, where each clearing move represent a traversal of a tote from an obstructed smart rack location in the path determined from the starting position to the ending position to another, open smart rack location (e.g., a smart rack location corresponding to a smart rack associated with an open status). In this regarding, the clearing move data represents one or more traversals that move totes in the path from the starting position to the ending position to other open smart racks hat are not in the path from the starting position to the ending position. In some embodiments, each clearing move in the clearing move data is determinable for a particular smart rack location associated with an obstructed status utilizing the same algorithms for determining the path from the starting position to ending position. For example, in some embodiments a gradient descent algorithm is applied utilizing the smart rack location that includes the tote in the path as the starting position, and determining a nearest second smart rack location that is associated with an open status as the ending position for a particular clearing move. In other embodiments, another pathing algorithm is utilized to determine a clearing move to clear a tote from a smart rack location in the determined path from the starting position to the ending position represented via the pathing data.

According to some examples, the method includes parallelizing the clearing move data and the pathing data at optional operation 22216. In some embodiments, for example, the parallelization of the clearing move data and the pathing data includes determining which traversals represented in the clearing move data and the pathing data represent, for a particular time step, traversal of a tote from a smart rack storing the tote from a particular first smart rack location to a second, open smart rack location (e.g., a smart rack location corresponding to a smart rack associated with an open status). Such parallelization may be performed for each time step at which traversals may be performed until the tote from the starting position reaches the ending position. In this regard, any number of traversals associated with performing one or more clearing moves represented in the clearing move data may be parallelized for performance with one or more other clearing moves at a particular time step, and/or with performing one or more traversals associated with movement of a tote along the path from the starting position to the ending position represented in the pathing data.

According to some examples, the method includes initiating routing of a tote utilizing the plurality of smart racks based at least in part on the pathing data at optional operation 22218. In some embodiments, the apparatus 21300 generates one or more rack commands. In some such embodiments, each rack command is consumable by at least one particular smart rack to cause the smart rack to perform at least one action that traverses a tote from the smart rack, or at least one action that traverses a tote received by the smart rack. In some embodiments, one or more of the rack commands are transmitted as part of one or more message transmissions from the apparatus 21300 to the modular superstructure, and/or specifically one or more smart racks thereof, for propagation to a target smart rack for consumption. In some embodiments, the message transmissions and/or smart racks include data indicating a time stamp or move number at which the smart rack command is to be executed or otherwise consumed by the particular smart rack. In this regard, the apparatus 21300 may cause the smart racks of the modular superstructure to facilitate the traversals represented by the pathing data (e.g., including the traversal of a target tote along the determined path and/or associated clearing move data for clearing any number of obstructions in the path).

Existing warehousing solutions and methodologies are supported by various conventional database technologies and implementations. Such implementations are sufficient in semi-autonomous implementations and/or other implementations that generally require at least one low-throughput step (e.g., picking performed by a user, and/or the like). At scale, such implementations are often not intended for use in circumstances where consistent, high-throughput data processing is required, for example to track a myriad of automated steps performed by one or more interacting robotic devices.

Applicant has discovered problems and/or inefficiencies with current implementations for maintaining data facilitating tote storage in one or more interacting robot devices, specifically in implementations of storage and/or manipulation via one or more modular superstructures. Through applied effort, ingenuity, and innovation, Applicant has solved many of these identified problems by developing solutions embodied in the present disclosure, which are described in detail below.

In one aspect, a data storage platform for smart matrix data management, the data storage platform embodied via at least an online transaction processing database includes a smart rack data table configured to store data records indicative of at least one smart rack. The data storage platform further includes a tote table configured to store data records indicative of at least one tote associated with manipulation via the at least one smart rack. The data storage platform further includes a smart rack plan table configured to store data records that are each linked to at least one data record of the smart rack data table. The data storage platform further includes a smart rack plan move table configured to store data records that are each linked to (i) at least one data record of the smart rack plan table and (ii) at least one data record of the tote table. The data storage platform further includes a tote movement table configured to store data records that are each linked to (i) at least one data record of the smart rack data table, and (ii) at least one data record of the tote table. The data storage platform further includes a smart rack error table configured to store data records indicative of at least one smart rack error, where the data records of the smart rack error table are each linked to at least one data record of the smart rack data table. The data storage platform further includes an operational message table indicative of at least one operational message received associated with operation of the at least one smart rack.

The data storage platform may also further include an item table configured to store data records indicative of at least one item manipulated via the at least one at least one tote, and a tote inventory table configured to store data records that are each linked to at least one data record of the tote table.

The data storage platform may also further include an item table configured to store data records indicative of at least one item manipulated via the at least one at least one tote, a tote section table configured to store data records indicative of at least one tote section of a tote, each data record of the tote section table linked to at least one data record of the tote table, where each data record of the item table is linked to at least one data record of the tote section table, and a tote section inventory table configured to store data records indicative of at least one tote section inventory data object, each data record of the tote section inventory table linked to at least one data record of the tote section table.

The data storage platform may also further include a lookup type table configured to store data records indicative of a lookup type, and a lookup object table configured to store data records that are each linked to at least one data record of the lookup type table.

The data storage platform may also include where each data record of the smart rack error table is linked to at least one data record of the lookup object table.

The data storage platform may also include where each data record of the operational message table is linked to at least one data record of the lookup object table.

The data storage platform may also further include a modular superstructure table configured to store data records indicative of at least one modular superstructure, the at least one modular superstructure includes the at least one smart rack, where the smart rack data table is linked to the at least one data record of the modular superstructure table.

The data storage platform may also include where the at least one data record of the smart rack data table each defines a smart rack identifier for a smart rack, a modular superstructure identifier corresponding to the smart rack, coordinate data associated with the smart rack, behavior data associated with the smart rack, movement flag data associated with the smart rack, and movement time data associated with the smart rack.

The data storage platform may also further include a modular superstructure plan table configured to store data records indicative of any number of smart rack plan moves associated with a particular modular superstructure of the at least one modular superstructure, where each data record of the modular superstructure plan table is linked to at least one data record of the modular superstructure table.

The data storage platform may also further include a superstructure user table configured to store data records indicative of at least one entity controlling at least a particular modular superstructure of the least one modular superstructure, where each data record of the modular superstructure table is linked to at least one data record of the superstructure user table.

The data storage platform may also further include a message broker queue table configured to store data records indicative of a message broker associated with each modular superstructure of the at least one modular superstructure.

The data storage platform may also include where the at least one data record of the smart rack plan table each defines a smart rack plan identifier for a smart rack plan, a corresponding smart rack identifier.

The data storage platform may also include where the at least one data record of the smart rack data table further defines an external flag.

In one aspect, a computer-implemented method includes generating an online transaction processing database includes a smart rack data table configured to store data records indicative of at least one smart rack, a tote table configured to store data records indicative of at least one tote associated with manipulation via the at least one smart rack, a smart rack plan table configured to store data records that are each linked to at least one data record of the smart rack data table, a smart rack plan move table configured to store data records that are each linked to (i) at least one data record of the smart rack plan table and (ii) at least one data record of the tote table, a tote movement table configured to store data records that are each linked to (i) at least one data record of the smart rack data table, and (ii) at least one data record of the tote table, a smart rack error table configured to store data records indicative of at least one smart rack error, where the data records of the smart rack error table are each linked to at least one data record of the smart rack data table, an operational message table indicative of at least one operational message received associated with operation of the at least one smart rack, and providing access to the online transaction processing database, where the online transaction processing database is updated based at least in part on at least one new operational message received in response to operation of a particular modular superstructure.

In one aspect, a computer-implemented method includes receiving a visualization request defining a particular timestamp interval and a modular superstructure identifier corresponding to a modular superstructure. The computer-implemented method further includes querying a stored data set from the online transaction processing database based at least in part on the timestamp interval and the modular superstructure identifier. The computer-implemented method further includes generating a playback visualization of the modular superstructure based at least in part on the stored data set. The computer-implemented method further includes outputting the playback visualization.

The computer-implemented method may also include where outputting the playback visualization includes rendering the playback visualization to a display.

The computer-implemented method may also further includes causing rendering of a user interface that receives input defining the timestamp interval and a modular superstructure identifier corresponding to the modular superstructure, where the visualization request is received in response to user engagement with a particular interface element of the user interface.

The computer-implemented method may also include where the visualization request further includes superstructure range data defining at least a segment of the modular superstructure to be visualized, and where the playback visualization of the modular superstructure depicts the segment of the modular superstructure defined by the superstructure range data.

The computer-implemented method may also further includes saving the playback visualization to a file.

The computer-implemented method may also include where outputting the playback visualization includes transmitting the file to another computing device, where the transmission of the file causes the other computing device to render the playback visualization.

In one aspect, a computer-implemented method includes establishing a connection with at least one channel of a message broker, the channel associated with at least one modular superstructure. The computer-implemented method further includes monitoring, via the connection, the at least one channel of the message broker for at least an operational message associated with the at least one modular superstructure. The computer-implemented method further includes processing the operational message to determine at least one table of an online transaction processing database to which data is to be written. The computer-implemented method further includes storing the operational message to the online transaction processing database by updating the at least one table with data based on the operational message.

The computer-implemented method may also include where processing the operational message includes determining a message type of the operational message, and determining the at least one table based at least in part on the message type.

The computer-implemented method may also further includes establishing at least one additional connection with at least one other channel of the message broker, each additional connection associated with a distinct modular superstructure, monitoring, via the additional connection, the at least one other channel of the message broker for at least one other operational message associated with the distinct modular superstructure, processing the other operational message to determine a second at least one table of the online transaction processing database to which data is to be written, and storing the at least one other operational message to the online transaction processing database by updating the second at least one table with data based on the other operational message.

The computer-implemented method may also include where the operational message includes a first operational message of a plurality of operational messages received via the connection.

The computer-implemented method may also include where the operational message is transmitted to the message broker from a controller system.

The computer-implemented method may also include where the operational message is transmitted to the message broker from at least one smart rack of the modular superstructure.

The computer-implemented method may also include where the superstructure range data includes a smart rack location that defines the segment as a single smart rack corresponding to the smart rack location.

The computer-implemented method may also include where the superstructure range data includes a range of smart rack locations that defines the segment as a plurality of smart racks corresponding to the range of smart rack locations.

Other technical features may be readily apparent to one skilled in the art from the following figures, descriptions, and claims.

A modular superstructure provides a unique, novel, and inventive methodology for storing and/or manipulating one or more totes. For example, in some contexts a modular superstructure is formed from a myriad of smart racks, each smart rack connected to at least one other smart rack in a particular Cartesian direction. In this regard, a smart rack may initiate one or more actions that traverses an object, such as a tote, positioned within the smart rack. Each smart rack is configured to operate independently, such that at any given time each may smart rack may be executing a particular process that is part of a greater-formed plan to manipulate particular totes in the modular superstructure.

Any of a myriad of data may be generated, processed, and/or otherwise utilized as part of performing functionality via at least one modular superstructure. For example, systems interacting with the smart racks of the modular superstructure and/or the smart racks themselves may generate any of a myriad of data that is utilized to initiate particular actions to be performed by certain smart racks, report a status of operations of one or more particular smart racks, monitor operations of the modular superstructure, and/or otherwise operate the modular superstructure. In this regard, each data portion relevant to the operation of a modular superstructure is to be stored in at least one database that enables subsequent retrieval and processing of such data for any of such purposes, simulation and/or visualization of operation of one or more modular superstructure, alert reporting, and/or the like.

At any given time, each modular superstructure may be associated with any number of data portions to be stored and/or retrieved from the database. For example, a given modular superstructure's data may be stored transactionally as such data is generated by individual smart racks of a particular modular superstructure. In this regard, efficient configuration of a database is desirable to ensure that such data portions may be stored to the database efficiently and/or retrieved from the database efficiently. Further, at any given time it is desirable to configure the database in a manner that ensures data accuracy and mitigates likelihood of data loss regardless of the influx of data to be handled by the database. Conventional database implementations and architectures that provide off-the-shelf functionality as such would fail to sufficiently provide the desired level of data efficiency and accuracy.

Embodiments of the present disclosure provide for a specially configured online transaction processing database for use with any number of modular superstructures. The online transaction processing database is specially configured with particular tables and/or data connections between such tables (e.g., relationships) that enable high throughput and efficiency with respect to data storage and/or retrieval. In this regard, such embodiments of the present disclosure are usable in real-time systems, such as data storage platforms that facilitate operation and/or monitoring of any number of associated modular superstructures. Additionally, the online transaction processing database may be coupled with one or more message brokers that enable such data storage and/or retrieval to be performed efficiently (e.g., in real-time or near-real-time) while additionally preserving data accuracy and preventing data loss during such high-throughput operations in a real-time system. Thus, embodiments of the present disclosure utilize a particular configuration to provide technical improvements in the technical field of data processing and storage, particularly in the context of processing data for operation and/or monitoring of one or more modular superstructures as such modular superstructures perform any number of operations in real-time.

In various contexts, a system specially configured in accordance with embodiments of the present disclosure communicates operational messages via a message broker. A message broker may be specially configured to enable efficient, accurate, and/or safe (e.g., with minimized likelihood of data loss) transmission of such operational messages from a controller system to one or more smart racks of a modular superstructure, and/or from the one or more smart racks of a modular superstructure to the controller system. By default, the operational messages that flow through a message broker may not be efficiently stored or otherwise processed for subsequent data retrieval at a future time. For example, operational messages transmitted via the message broker may require particular processing for proper efficient and accurate storage via an online transaction processing database of an OLTP management system.

Additionally, or alternatively, some embodiments of the present disclosure provide specially configured mechanisms that process operational messages for storing. For example, some embodiments implement at least one message intercept service that processes operational messages for storage. Some embodiments initiate and/or maintain a message intercept service that monitors at least one particular channel of at least one message broker. The message intercept service may detect operational messages transmitted through the channel during such monitoring. Upon detecting an operational message, the message intercept service may process a detected operational message to determine particular data from the operational message to write to particular tables of an online transaction processing database. The particular tables may similarly be determined by the message intercept service. Upon determining such data and tables, the message intercept service may store the operational message to the online transaction processing database by writing particular data determined from the operational message to the corresponding tables determined by the message intercept service. Such embodiments provide technical solutions to conventional message storing techniques that remain inefficient and/or ineffective for use with operational messages associated with modular superstructures.

Additionally, or alternatively still, some embodiments of the present disclosure provide for modular superstructure visualization via outputting of a playback visualization. Specifically, some embodiments generate a playback visualization based at least in part on electronically managed data previously stored to, and retrieved from, an online transaction processing database. In this regard, such embodiments may generate playback visualizations that depict virtualized representations of actions performed by at least one modular superstructure. The playback visualization may be generated from data stored based on received and processed operational messages, as described herein, for example by reconstructing a performed action in a virtualized visualization based on data retrieved from an online transaction processing database. Embodiments may output the playback visualization for analysis by a user, and/or interaction with by the user. In this regard, such embodiments provide functionality for retroactive and/or remote visualization of reconstructed actions of one or more actions performed by at least one modular superstructure, or particular smart racks thereof.

"Channel" with respect to a message broker refers to a defined manner through which operational messages are transmitted to and/or from a particular modular superstructure.

"Connection" refers to one or more software applications that, alone or in combination with associated networking hardware, monitor a channel of a message broker.

"Controller system" refers to at least one system embodied in hardware, software, firmware, and/or a combination thereof, that controls operation of and/or monitors operation of at least one modular superstructure.

"Data storage platform" refers to at least one system embodied by one or more computing device embodied in hardware, software, firmware, and/or any combination thereof that is configured to store data utilized to operate one or more modular superstructures, or that represents operations performed by one or more modular superstructures.

"Item" refers to any object, stock keeping unit, and/or unit that is placed within a tote for manipulation by at least one modular superstructure.

"Item table" refers to a particular table configured to store data properties of at least one item manipulated via a modular superstructure. In some embodiments, each data record or row in an item table represents data properties of a distinct item.

"Lookup object" refers to electronically managed data representing links between one or more data portions and another data portion. In some embodiments, a lookup object represents a database object or table that defines a manner in which two or more other tables are to be integrated, and/or a manner in which at least one table is to be integrated with at least one other portion of data.

"Lookup object table" refers to a particular table configured to store data properties of at least one lookup object. In some embodiments, each data record or row in a lookup object table represents data properties of a distinct lookup object.

"Lookup type" refers to electronically managed data that describes a purpose, classification, or other definition of a lookup object.

"Lookup type table" refers to a particular table configured to store data properties of at least one lookup type. In some embodiments, each data record or row in a lookup type table represents data properties of a distinct lookup type.

"Message broker" refers to one or more executed programs embodied in software, hardware, firmware, and/or any combination thereof, that processes messages transmitted to and/or from one or more systems. In some contexts a message broker is configured to provide message queuing functionality and message data loss prevention functionality. Non-limiting examples of a message broker include RabbitMQ™ processing operational messages transmitted to a modular superstructure and/or from a modular superstructure.

"Message broker queue table" refers to a particular table configured to store data properties of at least one message broker. In some embodiments, each data record or row in a message broker queue table represents data properties of a distinct message broker implementation for processing one or more messages associated with operation of a particular modular superstructure.

"Message intercept service" refers to any application embodied in hardware, software, firmware, and/or any combination thereof, that is configured to detect and/or identify operational messages transmitted to and/or from a message broker and process the operational message for storage via a data storage platform. In some embodiments, a message intercept service processes a detected or otherwise identified operational message by transmitting the message to at least one system for storage. In some embodiments, a message intercept service processes a detected or otherwise identified operational message by parsing and/or extracting particular data from an operational message and/or deriving data therefrom, and storing such data.

"Message type" refers to electronically managed data defining a classification of operational message.

"Modular superstructure" refers to a plurality of smart racks arranged for traversing of a tote in one or more direction(s). In some embodiments, a modular superstructure includes a plurality of smart racks that cooperate for traversing of one or more tote(s) in any cardinal direction.

"Modular superstructure identifier" refers to electronically managed data that uniquely identifies a particular modular superstructure.

"Modular superstructure plan" refers to electronically managed data representing operations to be performed by each modular superstructure of one or more modular superstructures. In some embodiments, a modular superstructure plan corresponding to a particular modular superstructure includes a combination of smart rack plans defining operations that the smart racks of the particular modular superstructure is to perform at various time steps.

"Modular superstructure plan table" refers to a particular table configured to store data properties of one or more modular superstructure plan associated with one or more modular superstructures. In some embodiments, each data record or row in a modular superstructure plan table represents data properties of a distinct modular superstructure plan.

"Modular superstructure table" refers to a particular table configured to store data properties of at least one modular superstructure. In some embodiments, each data record or row in a modular superstructure table represents data properties of a distinct modular superstructure.

"Operational message" refers to electronically managed data representing a summary, report, or other representation of operations performed by a smart rack, a status of the smart rack, or other details describing functions of a particular smart rack of modular superstructure.

"Operational message table" refers to a particular table configured to store data properties of at least one operational message received associated with at least one modular superstructure. In some embodiments, each data record or row in an operational message table represents data properties of a distinct operational message.

"Playback visualization" refers to electronically managed data that is renderable to depict operation of a modular superstructure, or particular components thereof, based at least in part on particular data corresponding to the modular superstructure and retrieved from an online transaction processing database.

"Smart rack" refers to a component of the modular superstructure that is configured to store a rectangular prism and/or to cause the movement of the rectangular prisms within the modular superstructure. In some embodiments, an example smart rack provides a modular square or rectangle rack that provides structure, power, control, and/or mechanical movements of one or more rectangular prisms. For example, an example smart rack comprises an example rack frame and a plurality of rack actuators, details of which are described herein.

"Smart rack data table" refers to a particular table configured to store data properties of at least one smart rack of a modular superstructure. In some embodiments, each data record or row in a smart rack data table represents data properties of a distinct smart rack.

"Smart rack error" refers to an operational message indicating that a particular smart rack experienced an error in functionality. Non-limiting examples of errors indicated in a smart rack error include non-responsiveness of a smart rack, a smart rack going offline, a smart rack being blocked, a smart rack unable to move a tote, and a smart rack reporting a loss of power.

"Smart rack error table" refers to a particular table configured to store data properties of at least one smart rack error received associated with one or more smart racks of at least one modular superstructure. In some embodiments, each data record or row in a smart rack error table represents data properties of a distinct smart rack error.

"Smart rack location" refers to electronically managed data indicating a position of a smart rack within a modular superstructure. Non-limiting examples of a smart rack location include a coordinate of the smart rack in a grid and an identifier representing the position of the smart rack in the grid.

"Smart rack plan" refers to electronically managed data representing an arrangement of smart racks and/or connections between smart racks of a particular modular superstructure.

"Smart rack plan move" refers to electronically managed data representing operations to be performed by a particular tote to manipulate any number of totes across any number of time steps.

"Smart rack plan move table" refers to a particular table configured to store data properties of at least one smart rack plan move. In some embodiments, each data record or row in a smart rack plan move table represents data properties of a distinct smart rack plan move.

"Smart rack plan table" refers to a particular table configured to store data properties of at least one smart rack plan of at least one modular superstructure. In some embodiments, each data record or row in a smart rack plan table represents data properties of a distinct smart rack plan.

"Stored data set" refers to electronically managed data retrieved from an online transaction processing database that is associated with operation of a particular modular superstructure.

"Superstructure range data" refers to electronically managed data defining a location of a smart rack in a modular superstructure or a plurality locations of smart racks in a modular superstructure. In some contexts, superstructure range data defines a continuous range of locations of smart racks to be depicted via a playback visualization.

"Superstructure user" refers to electronically managed data representing an entity, owner, possessor, or other operator in control of a modular superstructure.

"Superstructure user table" refers to a particular table configured to store data properties of at least one superstructure user associated with at least one modular superstructure. In some embodiments, each data record or row in a superstructure user table represents data properties of a distinct superstructure user.

"Table" refers to a structured data representation of one or more data object(s) within a database. The term "table" may be preceded by a particular object type, where the object type indicates the type of object configured to be stored by the particular table. For example and without limitation, "item table" refers to a table specially configured to represent data values of a data object representing properties of an item.

"Timestamp interval" refers to electronically managed data representing a period of time. In some contexts, a timestamp interval is defined by a starting timestamp and an ending timestamp representing the period of time.

"Tote" refers to any rectangular prism or other physical object that is capable of being manipulated by a smart rack in one or more directions. In some embodiments, the term "tote" and the term "rectangular prism" can be used interchangeably.

"Tote inventory data object" refers to electronically managed data representing detailed data values of a quantity, type, and/or identifier of each item in a particular tote.

"Tote inventory table" refers to a particular table configured to store data properties of at least one tote inventory data object manipulated via at least one tote within at least one modular superstructure. In some embodiments, each data record or row in a tote inventory table represents data properties of a distinct tote inventory data object.

"Tote movement data object" refers to electronically managed data representing or summarizing movement of a particular tote throughout a modular superstructure.

"Tote movement table" refers to a particular table configured to store data properties of at least one tote movement data object. In some embodiments, each data record or row in a tote movement table represents data properties of a distinct tote movement data object.

"Tote section" refers to a sub-compartment within a tote in a circumstance where the tote is split into any number of at least partially separated sub-compartments. For example, in a circumstance where a tote embodies a three-sided box with one side open that includes a single divider through a center axis of the box, the tote includes two tote sections.

"Tote section inventory data object" refers to a particular tote inventory data object within a particular tote section of a tote.

"Tote section inventory table" refers to a particular table configured to store data properties of at least one tote section inventory data object manipulated via at least one tote within at least one modular superstructure. In some embodiments, each data record or row in a tote section inventory table represents data properties of a distinct tote section inventory data object.

"Tote section table" refers to a particular table configured to store data properties of at least one tote section of at least one tote manipulated via a modular superstructure. In some embodiments, each data record or row in a tote section table represents data properties of a distinct tote section.

"Tote table" refers to a particular table configured to store data properties of at least one tote manipulated via at least one modular superstructure. In some embodiments, each data record or row in a tote table represents data properties of a distinct tote.

"Visualization request" refers to electronically managed data that indicates a request to initiate generation and outputting of a playback visualization.

FIG. 223 illustrates an example system in which embodiments of the present disclosure may operate. Specifically, FIG. 223 depicts an example system 22300. Specifically, FIG. 223 illustrates an OLTP management system 22306. In some embodiments, the OLTP management system 22306 is in direct communication with at least one modular superstructure, for example at least the modular superstructure 22304. Optionally, in some embodiments, the system 22300 includes a superstructure controller & monitoring system 22302 in direct communication with at least one modular superstructure, for example at least the modular superstructure 22304. In some such embodiments, the superstructure controller & monitoring system 22302 is in direct communication with an OLTP management system 22306, for example to transmit and/or receive data associated with operation of the modular superstructure 22304 for storing via an online transaction processing database configured as depicted and described herein. Additionally, or alternatively, in some embodiments, the superstructure controller & monitoring system 22302 is embodied as a subsystem of the OLTP management system 22306, such that the OLTP management system 22306 is the only system in direct communication with the modular superstructure 22304 and performs the functionality of the superstructure controller & monitoring system 22302 as well. It will be appreciated that in other embodiments, the superstructure controller & monitoring system 22302 and/or OLTP management system 22306 may be in communication with a plurality of modular superstructures. Optionally, in some embodiments, the system 22300 includes at least one client device 22308 in communication with the OLTP management system 22306 and/or superstructure controller & monitoring system 22302.

In some embodiments, the modular superstructure 22304 includes one or more smart rack(s) that manipulate, ingress, store, and/or egress one or more totes. In some embodiments, each tote embodies a rectangular prism. To achieve such functionality, the example modular superstructure 22304 includes at least a plurality of smart racks, such as those connected in a particular arrangement of smart racks in particular rows and columns, that are configured to manipulate and/or otherwise move rectangular prisms throughout the modular superstructure 22304. In some embodiments, the smart racks of the modular superstructure 22304 communicate between one another to enable propagation of a message transmission, or plurality of message transmissions, to a target model for consuming a particular message transmission.

In some embodiments, the superstructure controller & monitoring system 22302 comprises one or more computer(s), server(s), controller(s), and/or other device(s). The superstructure controller & monitoring system 22302 in some embodiments is configured for controlling the smart racks of the modular superstructure 22304 and/or monitoring of the statuses of the models of the modular superstructure 22304. For example, in some embodiments, the superstructure controller & monitoring system 22302 may receive, access, or otherwise determine a rectangular prism, such as a target tote to be moved, and an egress point for that rectangular prism. In response, the superstructure controller & monitoring system 22302 may determine, input, and/or otherwise generate and/or transmit message transmission(s) that provide instructions to one or more smart rack(s) or other model(s) of the modular superstructure 22304 in such a way to cause traversal of a tote throughout the modular superstructure. For example, a tote may be manipulated via the smart racks throughout the modular superstructure 22304 from an ingress location to a particular target location for storage, and/or from a particular storage location or ingress location to a particular egress location. In some embodiments, the superstructure controller & monitoring system 22302 transmit message transmission(s) to one or more processing circuitries of the one or more smart rack(s) in the modular superstructure 22304 to facilitate rack commands embodying movement instructions for such smart rack(s). For example, in some embodiments the superstructure controller & monitoring system 22302 generates and transmits a rack commands embodying a tote plan that represents instructions for moving a tote throughout the modular superstructure 22304, and/or clearing the path through which the tote is to be traversed. The smart racks of the modular superstructure 22304 may propagate the messages embodying rack commands to one another via transmission, where one or more smart rack(s) consume a message transmission to cause one or more arms of the smart rack actuators to move the tote (e.g., a rectangular prism) in a particular manner based on the rack command represented in the message. Additionally, or alternatively, in some embodiments, the superstructure controller & monitoring system 22302 generates rack command(s) for positioning tote(s) in the modular superstructure 22304 to store the tote in the modular superstructure for subsequent retrieval. In this regard, in some embodiments the superstructure controller & monitoring system 22302 generates message transmissions embodying operational messages for consumption by one or more smart racks of the modular superstructure 22304, and/or receives message transmissions embodying operational messages generated by the one or more smart racks of the modular superstructure 22304 during operation.

In some embodiments, the plurality of smart racks in the modular superstructure 22304 generate a significant amount of electrical noise. Such electrical noise in some embodiments somewhat or significantly diminishes capabilities for transmission to and/or from smart racks of the modular superstructure 22304 via wireless communications. Additionally, or alternatively, in some embodiments, the electrical noise generated by the modular superstructure 22304 creates a faraday cage effect that significantly limits the effectiveness of wireless communications to and/or from models of the modular superstructure 22304. In this regard, effective wired communications are established to one or more smart rack(s) of the modular superstructure 22304 at particular location(s), and wired communications enable propagation between models of the modular superstructure 22304. In some embodiments, the models of the modular superstructure 22304 utilize one or more specially configured algorithm(s) to effectively and/or efficiently propagate such message transmission(s) embodying one or more rack command(s).

In some embodiments, the OLTP management system 22306 comprises one or more computer(s), server(s), controller(s), and/or other device(s). For example, in some embodiments, the OLTP management system 22306 includes one or more application servers, database servers, and/or the like. The OLTP management system 22306 in some embodiments is configured for storing any number of data records associated with operation of one or more modular superstructure, such as the modular superstructure 22304. For example, in some embodiments, the OLTP management system 22306 maintains at least one online transaction processing database specially configured to efficiently store data records associated with the modular superstructure 22304. In this regard, the OLTP management system 22306, alone or together with the superstructure controller & monitoring system 22302, embodies a data storage platform for maintaining data associated with at least the modular superstructure 22304.

In some embodiments, the client device 22308 includes one or more computer(s) accessible to an end user. In some embodiments, the client device 22308 includes a smartphone, a tablet, a personal computer, a smart television or other smart device, a virtual assistant device, and/or the like, that is accessible to an end user for interaction. For example, the end user may be a particular human, maintenance worker, and/or the like that is monitoring operation of at least one modular superstructure, such as the modular superstructure 22304. In some embodiments, the client device 22308 embodies a user device of a remote operator or monitoring agent associated with operation of at least one modular superstructure.

FIG. 224 illustrates a block diagram of an example embodiment in accordance with at least one embodiment of the present disclosure. Specifically, FIG. 224 depicts an example data management apparatus 22400 ("apparatus 22400") specifically configured in accordance with at least some example embodiments of the present disclosure. In some embodiments, the OLTP management system 22306, alone or in combination with the superstructure controller & monitoring system 22302, and/or a subsystem thereof is embodied by one or more system(s), such as the apparatus 22400 as depicted and described in FIG. 224. The apparatus 22400 includes processor 22402, memory 22404, input/output circuitry 22406, communications circuitry 22408, database management circuitry 22410, control processing circuitry 22412, message management circuitry 22414, and visualization circuitry 22416. In some embodiments, the apparatus 22400 is configured, using one or more of the processor 22402, memory 22404, input/output circuitry 22406, communications circuitry 22408, database management circuitry 22410, control processing circuitry 22412, message management circuitry 22414, and/or visualization circuitry 22416, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 22400 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some input/output devices, and/or the like. Alternatively, or additionally, in some embodiments, other elements of the apparatus 22400 provide or supplement the functionality of another particular set of circuitry. For example, the processor 22402 in some embodiments provides processing functionality to any of the sets of circuitry, the memory 22404 provides storage functionality to any of the sets of circuitry, the communications circuitry 22408 provides network interface functionality to any of the sets of circuitry, and/or the like.

In some embodiments, the processor 22402 (and/or co-processor or any other processing circuitry assisting or otherwise associated with the processor) is/are in communication with the memory 22404 via a bus for passing information among components of the apparatus 22400. In some embodiments, for example, the memory 22404 is non-transitory and may include, for example, one or more volatile and/or non-volatile memories. In other words, for example, the memory 22404 in some embodiments includes or embodies an electronic storage device (e.g., a computer readable storage medium). In some embodiments, the memory 22404 is configured to store information, data, content, applications, instructions, or the like, for enabling the apparatus 22400 to carry out various functions in accordance with example embodiments of the present disclosure.

The processor 22402 may be embodied in a number of different ways. For example, in some example embodiments, the processor 22402 includes one or more processing devices configured to perform independently. Additionally, or alternatively, in some embodiments, the processor 22402 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 22400, and/or one or more remote or "cloud" processor(s) external to the apparatus 22400.

In an example embodiment, the processor 22402 is configured to execute instructions stored in the memory 22404 or otherwise accessible to the processor. Alternatively or additionally, the processor 22402 in some embodiments is configured to execute hard-coded functionality. As such, whether configured by hardware or software methods, or by a combination thereof, the processor 22402 represents an entity (e.g., physically embodied in circuitry) capable of performing operations according to an embodiment of the present disclosure while configured accordingly. Alternatively or additionally, as another example in some example embodiments, when the processor 22402 is embodied as an executor of software instructions, the instructions specifically configure the processor 22402 to perform the algorithms embodied in the specific operations described herein when such instructions are executed.

As one particular example, the processor 22402 is configured to perform various operations associated with maintaining data representing operation of at least one modular superstructure and/or visualization of operations of at least one modular superstructure. In some embodiments, the processor 22402 includes hardware, software, firmware, and/or a combination thereof, that configures an online transaction processing database including one or more specially configured tables. Additionally, or alternatively, in some embodiments, the processor 22402 includes hardware, software, firmware, and/or a combination thereof, that receives and/or generates operational messages associated with at least one modular superstructure. Additionally, or alternatively, in some embodiments, the processor 22402 includes hardware, software, firmware, and/or a combination thereof, that stores data records specially configured within tables of an online transaction processing database. Additionally, or alternatively, in some embodiments, the processor 22402 includes hardware, software, firmware, and/or a combination thereof, that detects operational messages from at least one channel of a message broker. Additionally, or alternatively, in some embodiments, the processor 22402 includes hardware, software, firmware, and/or a combination thereof, that generates at least one visualization of a modular superstructure based on stored data associated with the modular superstructure. For example, in some embodiments, the processor 22402 generates and outputs a playback visualization.

In some embodiments, the apparatus 22400 includes input/output circuitry 22406 that provides output to the user and, in some embodiments, to receive an indication of a user input. In some embodiments, the input/output circuitry 22406 is in communication with the processor 22402 to provide such functionality. The input/output circuitry 22406 may comprise one or more user interface(s) and in some embodiments includes a display that comprises the interface(s) rendered as a web user interface, an application user interface, a user device, a backend system, or the like. In some embodiments, the input/output circuitry 22406 also includes a keyboard, a mouse, a joystick, a touch screen, touch areas, soft keys, a microphone, a speaker, or other input/output mechanisms. The processor 22402 and/or input/output circuitry 22406 comprising the processor may be configured to control one or more functions of one or more user interface elements through computer program instructions (e.g., software and/or firmware) stored on a memory accessible to the processor (e.g., memory 22404, and/or the like). In some embodiments, the input/output circuitry 22406 includes or utilizes a user-facing application to provide input/output functionality to a client device and/or other display associated with a user.

In some embodiments, the apparatus 22400 includes communications circuitry 22408. The communications circuitry 22408 includes any means such as a device or circuitry embodied in either hardware or a combination of hardware and software that is configured to receive and/or transmit data from/to a network and/or any other device, circuitry, or module in communication with the apparatus 22400. In this regard, in some embodiments the communications circuitry 22408 includes, for example, a network interface for enabling communications with a wired or wireless communications network. Additionally, or alternatively in some embodiments, the communications circuitry 22408 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 22408 includes circuitry for interacting with the antenna(s) and/or other hardware or software to cause transmission of signals via the antenna(s) or to handle receipt of signals received via the antenna(s). In some embodiments, the communications circuitry 22408 enables transmission to and/or receipt of data from user device, one or more asset(s) or accompanying sensor(s), and/or other external computing device in communication with the apparatus 22400.

In some embodiments, the apparatus 22400 includes database management circuitry 22410. The database management circuitry 22410 includes hardware, software, firmware, and/or a combination thereof, that supports configuration of an online transaction processing database. Additionally, or alternatively, in some embodiments, the database management circuitry 22410 includes hardware, software, firmware, and/or a combination thereof, that initializes and/or configures one or more tables of the online transaction processing database. Additionally, or alternatively, in some embodiments, the database management circuitry 22410 includes hardware, software, firmware, and/or a combination thereof, that facilitates storing of new data records to an online transaction processing database. Additionally, or alternatively, in some embodiments, the database management circuitry 22410 includes hardware, software, firmware, and/or a combination thereof, that facilitates retrieval of data from an online transaction processing database. Additionally, or alternatively, in some embodiments, the database management circuitry 22410 includes hardware, software, firmware, and/or a combination thereof, that otherwise maintains data via an online transaction processing database. In some embodiments, the database management circuitry 22410 includes a separate processor, specially configured field programmable gate array (FPGA), or a specially programmed application specific integrated circuit (ASIC).

In some embodiments, the apparatus 22400 optionally includes control processing circuitry 22412. The control processing circuitry 22412 includes hardware, software, firmware, and/or a combination thereof, that supports controlling of at least one modular superstructure. In some embodiments, the control processing circuitry 22412 includes hardware, software, firmware, and/or a combination thereof, that generates operational messages representing command messages consumable by at least one smart rack of a modular superstructure. Additionally, or alternatively, in some embodiments, the control processing circuitry 22412 includes hardware, software, firmware, and/or a combination thereof, that transmits one or more operational messages embodying command messages for operating at least one smart rack of at least one modular superstructure. In some embodiments, the control processing circuitry 22412 includes a separate processor, specially configured field programmable gate array (FPGA), or a specially programmed application specific integrated circuit (ASIC).

In some embodiments, the apparatus 22400 includes message management circuitry 22414. The message management circuitry 22414 includes hardware, software, firmware, and/or a combination thereof, that supports transmission and processing of operational messages associated with operation of at least one modular superstructure. In some embodiments, the message management circuitry 22414 includes hardware, software, firmware, and/or a combination thereof, that facilitates monitoring of at least one message broker. For example, in some embodiments the message management circuitry 22414 detects operational messages via at least one channel of at least one message broker. Additionally, or alternatively, in some embodiments, the message management circuitry 22414 includes hardware, software, firmware, and/or a combination thereof, that receives at least one operational message from at least one message broker. Additionally, or alternatively, in some embodiments, the message management circuitry 22414 includes hardware, software, firmware, and/or a combination thereof, that generates at least one operational message associated with at least one modular superstructure. Additionally, or alternatively, in some embodiments, the message management circuitry 22414 includes hardware, software, firmware, and/or a combination thereof, that initializes at least one message broker associated with communication with at least one modular superstructure, and/or initializes at least one channel of a message broker associated with communication with at least one modular superstructure. Additionally, or alternatively, in some embodiments, the message management circuitry 22414 includes hardware, software, firmware, and/or a combination thereof, that transmits at least one operational message to at least one smart rack of a modular superstructure, for example directly or indirectly via a message broker. Additionally, or alternatively, in some embodiments, the message management circuitry 22414 includes hardware, software, firmware, and/or a combination thereof, that processes at least one detected operational message or data derived therefrom to determine particular data representing the operational message and/or based on the operational messages to store to an online transaction processing database. In some embodiments, the message management circuitry 22414 generates and/or maintains at least one message intercept service associated with detecting operational messages for at least one channel of a message broker and/or processing such operational messages for storing to an online transaction processing database as described herein. In some embodiments, the message management circuitry 22414 includes a separate processor, specially configured field programmable gate array (FPGA), or a specially programmed application specific integrated circuit (ASIC).

In some embodiments, the apparatus 22400 optionally includes visualization circuitry 22416. The visualization circuitry 22416 includes hardware, software, firmware, and/or a combination thereof, that facilitates generating and/or outputting of at least one digital representation of a modular superstructure and/or operation thereof. In some embodiments, the visualization circuitry 22416 includes hardware, software, firmware, and/or any combination thereof, that receives a visualization request. Additionally, or alternatively, in some embodiments, the visualization circuitry 22416 includes hardware, software, firmware, and/or any combination thereof, that causes rendering of a user interface configured to receive input initiating the visualization request, and/or defining a timestamp interval and/or a modular superstructure identifier. Additionally, or alternatively, in some embodiments, the visualization circuitry 22416 includes hardware, software, firmware, and/or any combination thereof, that queries a stored data set from an online transaction processing database based at least in part on data associated with the received visualization request. Additionally, or alternatively, in some embodiments, the visualization circuitry 22416 includes hardware, software, firmware, and/or any combination thereof, that generates a playback visualization of a modular superstructure based at least in part on a retrieved stored data set. Additionally, or alternatively, in some embodiments, the visualization circuitry 22416 includes hardware, software, firmware, and/or any combination thereof, that outputs a playback visualization. Additionally, or alternatively, in some embodiments, the visualization circuitry 22416 includes hardware, software, firmware, and/or any combination thereof, that saves a generated playback visualization to a file. In some embodiments, the visualization circuitry 22416 includes a separate processor, specially configured field programmable gate array (FPGA), or a specially programmed application specific integrated circuit (ASIC).

Additionally, or alternatively, in some embodiments, two or more of the processor 22402, memory 22404, input/output circuitry 22406, communications circuitry 22408, database management circuitry 22410, control processing circuitry 22412, message management circuitry 22414, and/or visualization circuitry 22416 are combinable. Alternatively, or additionally, in some embodiments, one or more of the sets of circuitry perform some or all of the functionality described associated with another component. For example, in some embodiments, two or more of the processor 22402, memory 22404, input/output circuitry 22406, communications circuitry 22408, database management circuitry 22410, control processing circuitry 22412, message management circuitry 22414, and/or visualization circuitry 22416, are combined into a single module embodied in hardware, software, firmware, and/or a combination thereof. Similarly, in some embodiments, one or more of the sets of circuitry, for example the database management circuitry 22410, control processing circuitry 22412, message management circuitry 22414, and/or visualization circuitry 22416, is/are combined with the processor 22402, such that the processor 22402 performs one or more of the operations described above with respect to each of the database management circuitry 22410, control processing circuitry 22412, message management circuitry 22414, and/or visualization circuitry 22416.

FIG. 225 illustrates a data flow for configuring an online transaction processing database in accordance with at least one embodiment of the present disclosure. Specifically, FIG. 225 depicts a configuration of a particular online transaction processing database 22502 for storing data associated with one or more operational messages representing or otherwise associated with operation of at least one modular superstructure. FIG. 225 depicts the particular storage of operational messages associated with one or more modular superstructures, such as the modular superstructure 22504a-304c.

As illustrated, modular superstructure 22504a is associated with operational messages 22506a. In some embodiments, the operational messages 22506a are generated by the modular superstructure 22504a in response to operation of the smart racks thereof. Additionally, or alternatively, in some embodiments, the operational messages 22506a are generated by a controller system associated with operation of the modular superstructure 22504a. For example, the operational messages 22506a in some embodiments represent operational statuses associated with at least one smart rack of the modular superstructure 22504a as the modular superstructure 22504a operates for traversal of one or more tote via the modular superstructure 22504a. Additionally, or alternatively, in some embodiments, the operational messages 22506a represent smart rack commands for controlling one or more smart racks of the operational messages 22506a.

In some embodiments, the operational messages 22506a is stored to at least one online transaction processing database. For example, in some embodiments the operational messages 22506a is stored to the online transaction processing database 22502. In some such embodiments, the operational messages 22506a is stored to particular tables of the online transaction processing database 22502. In this regard, the online transaction processing database 22502 may be specially configured to effectively and efficiently maintain data associated with the operational messages 22506a for storage and/or retrieval via the online transaction processing database 22502. In some embodiments, the apparatus 22400 maintains and/or otherwise provides access to the online transaction processing database 22502 for read and/or write functionality. For example, in some embodiments, the online transaction processing database 22502 is configured to write particular data to different tables of the online transaction processing database 22502 where such data is extracted from and/or derived from a received operational message.

Additionally, or alternatively, in some embodiments, the online transaction processing database 22502 maintains other configuration data associated with at least one modular superstructure. For example, in some embodiments, the online transaction processing database 22502 is configured to store smart rack arrangement data embodying existence of smart racks and/or connections therebetween. In some embodiments, the apparatus 22400 stores such data based on a received operational message indicating such data for the modular superstructure 22504a as currently operating. Additionally, or alternatively, in some embodiments, the apparatus 22400 statically maintains configuration data associated with the modular superstructure 22504a.

Some embodiments store a plurality of operational messages associated with a plurality of modular superstructures. For example, as illustrated, in some embodiments operational messages are stored and maintained associated with at least the modular superstructure 22504b and/or modular superstructure 22504c. In some embodiments, each modular superstructure is associated with distinct operational messages, for example operational messages 22506b associated with operation of the modular superstructure 22504b and operational messages 22506c associated with operation of the modular superstructure 22504c. In some embodiments, the operational messages 22506b are generated by the modular superstructure 22504b and/or a controller system associated therewith, and the operational messages 22506*c* are generated by the modular superstructure 22504*c* and/or a controller system associated therewith. The controller system in some embodiments is shared between the modular superstructure 22504*a*, modular superstructure 22504*b*, and modular superstructure 22504*c*.

In some embodiments, the same database, for example the online transaction processing database 22502, stores each of the operational messages associated with the plurality of modular superstructures 22504*a*-304*c*. In some other embodiments a different online transaction processing database is maintained for each of the plurality of modular superstructures 22504*a*, 22504*b*, and 22504*c*.

In some embodiments, an online transaction processing database is specially configured to enable efficient and effective storage of data to, and/or retrieval of data from, the online transaction processing database. For example, in some embodiments, the online transaction processing database is specially configured with particular tables configured to store data values for particular data properties. Non-limiting examples of an example configuration of an online transaction processing database include the tables and particular configurations thereof as depicted and described in FIG. 226A to FIG. 226D. For example, in some embodiments the online transaction processing database 22502 is specially configured in accordance with FIG. 226A to FIG. 226D.

FIG. 226A illustrates a first set of tables of an online transaction processing database in accordance with at least one embodiment of the present disclosure. In some embodiments, the online transaction processing database is embodied by and/or maintained by a specially configured apparatus, for example the apparatus 22400. As illustrated, in some embodiments, the example online transaction processing database is configured to include at least a superstructure user table 22602. The superstructure user table 22602 in some embodiments is configured to store data records that each identify a superstructure user associated with the online transaction processing database. In some embodiments, the data records includes data identifying a user, owner, or other operator associated with a modular superstructure. For example, in some embodiments, a superstructure user table 22602 includes a unique identifier for a superstructure user, a user first name, a user last name, a user creation datetime, and/or the like. In some embodiments, the superstructure user table 22602 is configured to store values representing entity identification information.

In some embodiments, the online transaction processing database is further configured to include modular superstructure table 22604. In some embodiments, the modular superstructure table 22604 includes data records each uniquely identifying a modular superstructure maintained via the online transaction processing database. In some embodiments, a modular superstructure represented by a record in the modular superstructure table 22604 is associated with at least one superstructure user represented in the superstructure user table 22602. In some embodiments, the data records include a modular superstructure identifier, a message broker identifier for a message broker associated with the modular superstructure, a superstructure user identifier for the superstructure user associated with the modular superstructure, modular superstructure name data, manifest name data for a manifest associated with operation of the modular superstructure, initial state data, manifest data, and a create datetime.

In some embodiments, the online transaction processing database is further configured to include smart rack data table 22606. In some embodiments, the smart rack data table 22606 includes data records each uniquely identifying a smart rack of a modular superstructure. In some embodiments, a smart rack represented by a data record in the smart rack data table 22606 is associated with at least one modular superstructure represented in the modular superstructure table 22604. In some embodiments, the data records include a smart rack identifier, a modular superstructure identifier, smart rack location data (e.g., x, y, and z coordinate data in the modular superstructure for a particular smart rack), cartesian coordinate data, smart rack behavior data, movement data in each positive Cartesian direction, movement data in each negative Cartesian direction, time data in each negative Cartesian direction, time data in each positive Cartesian direction, an external flag indicating whether the smart rack is at a location with at least one external facing direction, and/or a create datetime.

In some embodiments, the online transaction processing database is further configured to include message broker queue table 22608. In some embodiments, the message broker queue table 22608 includes data records each uniquely identifying a message broker associated with communicating operational messages for operation of a modular superstructure. In some embodiments, a message broker represented by a data record in the message broker queue table 22608 is associated with at least one modular superstructure represented in the modular superstructure table 22604, for example the modular superstructure that the message broker communicates with for routing of operational messages to the modular superstructure or from the modular superstructure. In some embodiments, the data records include a message broker identifier, a modular superstructure exchange identifier, and/or a create datetime.

In some embodiments, the online transaction processing database is further configured to include modular superstructure plan table 22610. In some embodiments, the modular superstructure plan table 22610 includes data records each uniquely identifying a modular superstructure plan associated with a particular modular superstructure. In some embodiments, a modular superstructure plan includes data records each uniquely identifying operations to be performed by operation of a combination of smart racks of the modular superstructure corresponding to the particular smart rack plan. In some embodiments, the data records include a modular superstructure plan identifier, a modular superstructure identifier, a database identifier, a JSON file name, and/or a create datetime.

FIG. 226B illustrates a second set of tables of an online transaction processing database in accordance with at least one embodiment of the present disclosure. The second set of tables are similarly embodied as a part of the online transaction processing database, for example maintained by and/or embodied by the apparatus 22400.

In some embodiments, the online transaction processing database is further configured to include a smart rack plan table 22612. In some embodiments, the smart rack plan table 22612 includes data records each uniquely identifying a smart rack plan maintained via the online transaction processing database. In some embodiments, a smart rack plan represented by a record in the smart rack plan table 22612 is associated with at least one smart rack represented in the smart rack data table 22606. In some embodiments, the data records include a smart rack plan identifier, a smart rack identifier for the corresponding smart rack, and/or a create datetime.

In some embodiments, the online transaction processing database is further configured to include a smart rack plan move table 22614. In some embodiments, the smart rack plan move table 22614 includes data records each uniquely identifying a smart rack plan move of a smart rack plan maintained via the online transaction processing database. Each smart rack move may define a particular action to be performed by a corresponding smart rack for tote traversal via the smart rack. In some embodiments, a smart rack plan move represented by a record in the smart rack plan move table 22614 is associated with at least one smart rack plan represented in the smart rack plan table. In some embodiments, the data records include a smart rack plan move identifier, a smart rack plan identifier for the smart rack plan corresponding to the smart rack plan move, tote identifier representing a tote to be moved via the smart rack plan move, an origin smart rack identifier for the smart rack plan move, a destination smart rack identifier for the smart rack plan move, plan order data defining what number the smart rack plan move is in a particular arrangement of smart rack plan moves of a smart rack plan, and/or a create datetime.

In some embodiments, the online transaction processing database is further configured to include a tote table 22616. In some embodiments, the tote table 22616 includes data records each uniquely identifying a tote that is manipulated via at least one modular superstructure. In some embodiments, a tote represented by a record in the tote table 22616 is associated with at least one smart rack plan move represented in the smart rack plan move table 22614. In some embodiments, the data records include a tote identifier, a modular superstructure identifier, a tote license plate or other tote type schema data, tote dimension data (e.g., a tote x dimension, y dimension, and/or z dimension size), and/or a create datetime.

In some embodiments, the online transaction processing database is further configured to include a tote movement table 22618. In some embodiments, the tote movement table 22618 includes data records each uniquely identifying a tote movement performed via a modular superstructure. In some embodiments, a tote movement represented by a record in the tote movement table 22618 is associated with at least one smart rack represented in the smart rack data table 22606. In some embodiments, the data records include a tote movement identifier, an origin smart rack identifier, a destination smart rack identifier, a tote identifier, a time at location identifier, an operational message timestamp, and/or a create datetime.

FIG. 226C illustrates a third set of tables of an online transaction processing database in accordance with at least one embodiment of the present disclosure. The third set of tables are similarly embodied as a part of the online transaction processing database, for example maintained by and/or embodied by the apparatus 22400. Specifically, the third set of tables represents specifically configured tables for maintaining data associated with tote sections, inventories, and items therein.

In some embodiments, the online transaction processing database is further configured to include a tote section table 22620. In some embodiments, the tote section table 22620 includes data records each uniquely defining a tote section of at least one tote. In some embodiments, each tote section represented by a record in the tote section table 22620 is associated with a tote represented in the tote table 22616. In some embodiments, the data records include a tote section identifier, a tote identifier, tote section dimension data (e.g., a tote x dimension and a tote y dimension size), tote section anchor data (e.g., an x anchor and a y anchor), an active flag, and/or a create datetime.

In some embodiments, the online transaction processing database is further configured to include a tote section inventory table 22622. In some embodiments, the tote section inventory table 22622 includes data records each uniquely identifying a tote section inventory. In some embodiments, a tote section inventory represented by a record in the tote section inventory table 22622 is associated with at least one tote section represented by a record in the tote table 22616. In some embodiments, the data records include a tote section inventory identifier, a tote section identifier, an item identifier, an item quantity data, best by date data, and/or a create datetime.

In some embodiments, a tote is associated with any number of tote sections. For example, a tote may be associated with two or more tote sections that define discrete portions of the tote within which items may be stored for traversal. Different tote sections may include different items, different item types, and/or the like. In other embodiments, a tote includes no sub-sections, such that the tote is embodied by only a single tote section.

In some embodiments, the online transaction processing database is further configured to include an item table 22624. In some embodiments, the item table 22624 includes data records each uniquely identifying an item that is within an item inventory. In some embodiments, an item represented by a record in the item table 22624 is associated with at least one inventory represented by a record in the tote section inventory table 22622 and/or tote inventory table 22626. In some embodiments, the data records include an item name, an item description, and/or a create datetime.

In some embodiments, the online transaction processing database is further configured to include a tote inventory table 22626. In some embodiments, the tote inventory table 22626 includes data records each uniquely identifying a tote inventory of a particular tote. In some embodiments, a tote inventory represented by a record in the tote inventory table 22626 is associated with at least one tote represented by a record in the tote table 22616. In some embodiments, the data records include a tote inventory identifier, a tote identifier, an item identifier, a quantity in tote data, and/or a create datetime.

FIG. 226D illustrates a fourth set of tables of an online transaction processing database in accordance with at least one embodiment of the present disclosure. The fourth set of tables are similarly embodied as a part of the online transaction processing database, for example maintained by and/or embodied by the apparatus 22400. Specifically, the fourth set of tables represents specifically configured tables for maintaining operational message data, associated smart rack errors, and/or associated supporting data therein.

In some embodiments, the online transaction processing database is further configured to include a smart rack error table 22628. In some embodiments, the smart rack error table 22628 includes data records each uniquely defining details of a smart rack error experienced by at least one modular superstructure. In some embodiments, each smart rack error table 22628 represented by a record in the smart rack error table 22628 is associated with a smart rack represented in the smart rack data table 22606. In some embodiments, the data records includes an error identifier for the smart rack identifier, a smart rack identifier corresponding to the smart rack experiencing the smart rack error, an error code identifier representing a type of error based on a lookup object, error description data, an operational message timestamp corresponding to the operational message that represented the operational message, and/or a create datetime.

In some embodiments, the online transaction processing database is further configured to include an operational message table 22630. In some embodiments, the operational message table 22630 includes data records each uniquely defining data of and/or derived from at least one operational message processed associated with a particular modular superstructure or portion thereof. In some embodiments, each operational message represented by a record in the operational message table 22630 is associated with a smart rack represented in the smart rack data table 22606. In some embodiments, the data records include an operational message identifier, an origin smart rack identifier, an event lookup identifier corresponding to a lookup object associated with the operational message, a status message lookup identifier corresponding to a lookup object associated with a status represented in the operational message, payload data associated with the operational message, an operational message timestamp, and/or a create datetime.

In some embodiments, the online transaction processing database is further configured to include a task table 22632. In some embodiments, the task table 22632 includes data records each uniquely defining a task to be performed via at least one smart rack of a modular superstructure. In some embodiments, each task represented in the task table 22632 is associated with a smart rack represented in the smart rack data table 22606, for example a smart rack that executes the task or a portion thereof. In some embodiments, the data records include a task identifier, a task lookup identifier representing a classification of the task, a status lookup identifier representing a status of the task, a gtp station smart rack identifier corresponding to the smart rack and/or modular superstructure, a receive tote identifier associated with the tote to be received or otherwise manipulated as part of the task, an item identifier associated with the task, and/or a create datetime.

In some embodiments, the online transaction processing database is further configured to include a lookup object table 22634. In some embodiments, the lookup object table 22634 includes data records each uniquely defining a lookup object. The lookup object may define a particular classification or other categorization that may be attributed to any number of data objects or particular data parameters thereof. In some embodiments, a lookup object defined in the lookup object table 22634 may be associated with any of a number of other data objects represented by other tables of the online transaction processing database, for example a status for a task, a status of a smart rack, and/or the like. In some embodiments, the data records include a lookup identifier, a lookup type identifier, a lookup name, and/or a lookup description.

In some embodiments, the online transaction processing database is further configured to include a lookup type table 22636. In some embodiments, the lookup object table 22634 includes data records each uniquely defining a lookup type. The lookup type may define particular data and/or classification of a lookup object. For example, in some embodiments, the lookup type defines a sub-classification of lookup objects that share one or more characteristics, for example "errors" that group a set of lookup objects that are each different types of errors, "statuses" that group a set of lookup objects that are each different types of operational statuses for a smart rack, and/or the like. In some embodiments, a lookup type represented by a record in the lookup type table 22636 is associated with a lookup type represented in the lookup object table 22634. In some embodiments, the data records include a lookup type identifier, a lookup type name, and/or lookup type description data.

Example processes for generating an online transaction processing database will now be described. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 227 illustrates operations of an example data flow for configuring and utilizing an online transaction processing database in accordance with at least one embodiment of the present disclosure. Specifically, FIG. 227 depicts operations of an example process 22700 is embodied by computer program code stored on a non-transitory computer-readable storage medium of a computer program product configured for execution to perform the process as depicted and described. Alternatively, or additionally, in some embodiments, the process 22700 is performed by one or more specially configured computing devices, such as the apparatus 22400 alone or in communication with one or more other component(s), device(s), system(s), and/or the like. In this regard, in some such embodiments, the apparatus 22400 is specially configured by computer-coded instructions (e.g., computer program instructions) stored thereon, for example in the memory 22404 and/or another component depicted and/or described herein and/or otherwise accessible to the apparatus 22400, for performing the operations as depicted and described. In some embodiments, the apparatus 22400 is in communication with one or more external apparatus(es), system(s), device(s), and/or the like, to perform one or more of the operations as depicted and described. For example, the apparatus 22400 in some embodiments is in communication with at least one apparatus, at least one physical component, at least one processing plant system, a scheduling system, and/or the like. For purposes of simplifying the description, the process 22700 is described as performed by and from the perspective of the apparatus 22400.

According to some examples, the method includes generating an online transaction processing database at operation 22702. For example, the apparatus 22400 may generate an instance of the online transaction processing database via one or more specially configured computing devices utilizing corresponding hardware, software, firmware, and/or any combination thereof. The generation of the online transaction processing database in some embodiments allocates at least a particular portion of memory and/or computing resources for storage via the online transaction processing database. In some embodiments, the online transaction processing database is embodied as part of the apparatus 22400, for example by at least one subsystem of the apparatus 22400. Additionally, or alternatively, in some embodiments, the online transaction processing database is embodied at least in part by one or more cloud systems remotely located from the apparatus 22400. In other embodiments, the online transaction processing database is already existing, such that the apparatus 22400 need not generate the online transaction processing database and the process 22700 begins at Optional operation 22704.

According to some examples, the method includes automatically configuring at least one table of the online transaction processing database based at least in part on predetermined data at optional operation 22704. For example, in some embodiments, the apparatus 22400 configures a table of the online transaction processing database to include one or more particular data parameters. In this regard, the table may be configured such that each data record stored to the table includes at least the particular data properties configured for that table. It will be appreciated that in some embodiments different tables are configured to include distinct, particular properties that are arranged for efficient storage to and/or retrieval from the online transaction processing database. For example, in some embodiments the apparatus 22400 configures the online transaction processing database to include the tables as depicted and described in FIG. 226A to FIG. 226D.

According to some examples, the method includes receiving at least one operational message corresponding to a particular modular superstructure at operation 22706. In some embodiments, the at least one operational message is received in response to transmission from a modular superstructure. It should be appreciated that in some embodiments, the at least one operational message includes at least one operational message associated with a first modular superstructure and at least one operational message associated with a second modular superstructure. Additionally, or alternatively, in some embodiments, the at least one operational message is received in response to transmission from a controller system associated with the at least one modular superstructure. In some embodiments, the apparatus 22400 receives the at least one operational message via a message intercept service that detects the at least one operational message from a message broker that facilitates communication of the operational messages between the controller system and at least one modular superstructure.

According to some examples, the method includes updating, in real-time, at least one table of the online transaction processing database based at least in part on the received operational messages at operation 22708. In some embodiments, the operational messages are written to particular tables determined based at least in part on data in each operational message of the operational messages. For example, in some embodiments, a message type associated with an operational message is utilized to determine a particular table or set of tables to which data of the operational message is to be written. Additionally, or alternatively, in some embodiments, one or more tables are written to for each operational message received by the apparatus 22400. Upon writing of the at least one table, in some embodiments the apparatus 22400 may retrieve such stored data records corresponding to or otherwise embodying particular operational messages from the online transaction processing database, for example to generate alerts, monitor operation, and/or generate playback visualizations associated with a modular superstructure as depicted and described herein.

In some embodiments, the apparatus 22400 extracts data from the at least one operational message, where the data represents at least one data value for one or more particular data properties for storing to at least one table. Additionally, or alternatively, in some embodiments, the apparatus 22400 derives data from the at least one operational message, where the derived data represents at least one data value for one or more particular data properties for storing to at least one table of the online transaction processing database. For example, in some embodiments, the apparatus 22400 writes data values for particular data properties to particular tables that correspond to the particular data properties.

FIG. 228 illustrates an example data flow for communication of operational messages in accordance with at least one embodiment of the present disclosure. Specifically, FIG. 228 depicts a data flow between a modular superstructure 22802 and a controller system 22806 intermediated or otherwise facilitated via a message broker 22804. In some embodiments, the modular superstructure 22802, message broker 22804, and controller system 22806 are connected via one or more communications networks that facilitate transmission of one or more operational messages. For example, in some embodiments, one or more operational messages are transmitted from the controller system 22806 to the message broker 22804 for fielding to the modular superstructure 22802, and/or one or more operational messages are transmitted from the modular superstructure 22802 to the message broker 22804 for fielding to the controller system 22806.

In some embodiments, the modular superstructure 22802, and/or particular smart racks thereof, facilitates transmission of one or more such operational messages in response to operation of the modular superstructure or particular smart racks. For example, the operational messages from the modular superstructure 22802 may indicate particular statuses of smart racks in the modular superstructure 22802, actions performed by the smart racks, and/or the like. In some embodiments, the controller system 22806 facilitates transmission of one or more operational messages that control operation of the modular superstructure 22802 and/or particular smart racks thereof. For example, in some embodiments the operational messages from the controller system 22806 each embody at least one rack command consumable by at least one particular smart rack of the modular superstructure 22802 to cause the smart rack to perform a particular action for traversing a tote throughout the modular superstructure 22802.

In some embodiments, the controller system 22806 includes a system embodied in hardware, software, firmware, and/or a combination thereof that facilitates controlled monitoring of the operation of at least one modular superstructure, for example the modular superstructure 22802. In some embodiments, for example, the controller system 22806 receives operational messages that represent an operational status for one or more smart racks of the modular superstructure 22802. Additionally, or alternatively, the controller system 22806 in some embodiments generates one or more operational messages for controlling operation of one or more smart racks of the modular superstructure 22802. The controller system 22806 in some embodiments processes received operational messages to determine subsequent operations to perform via the modular superstructure 22802, and generate operational messages to prompt one or more smart racks of the modular superstructure 22802 to perform such operations.

In some embodiments, the message broker 22804 includes a system embodied in hardware, software, firmware, and/or a combination thereof that facilitates exchange of the operational messages between the modular superstructure 22802 and controller system 22806. For example, in some embodiments, the message broker 22804 is embodied as one or more software applications executed on an OLTP management system, for example embodied by the apparatus 22400. Additionally, or alternatively, in some embodiments, the message broker 22804 is embodied as a cloud or other system remotely located from an OLTP management system and/or controller system that communicates messages received from the OLTP management system and/or controller system to one or more modular superstructure, and/or communicates messages received from a modular superstructure to a controller system and/or an associated OLTP management system. In some embodiments, the message broker 22804 maintains a channel specially configured or otherwise dedicated for communication with a particular modular superstructure. In this regard, the message broker 22804 may maintain multiple channels that enable communication between a controller system 22806 and/or different modular superstructures. In this regard, the different channels of the message broker 22804 may be processed, for example by an OLTP management system, to detect operational messages that are specific to a particular modular superstructure.

In some embodiments, the message broker 22804 is processed via at least one message intercept service to enable detection, processing, and/or storage of operational messages transmitted via the message broker 22804. FIG. 229 illustrates an example visualization of at least one message intercept service operating in accordance with at least one embodiment of the present disclosure. Each message intercept service may be specially configured to enable detection of at least one operational message communicated via the message broker 22804, enable transmission of such detected at least one operational message to an OLTP management system 22906, and/or enable processing of such detected at least one operational message for storage via the OLTP management system 22906. As illustrated, in some embodiments the controller system 22806 and the OLTP management system 22906 are embodied in separate systems. In some embodiments, the controller system 22806 and the OLTP management system 22906 are embodied as a single system.

As illustrated, the message broker 22804 includes or otherwise is associated with one or more message intercept services. In some embodiments, a message intercept service is embodied as one or more software application executed on at least one server embodying the message broker 22804. Additionally, or alternatively, in some embodiments, a message intercept service is embodied as a separate system embodied in hardware, software, firmware, and/or a combination thereof, that is linked to or otherwise communicable with the message broker 22804 to read operational messages transmitted through the message broker 22804.

In some embodiments, the message broker 22804 maintains a channel that facilitates communication of operational messages associated with a particular modular superstructure. In some such embodiments, each channel is associated with a message intercept service that monitors and/or processes operational messages transmitted via that particular channel. As illustrated, for example, the message broker 22804 is associated with message intercept service 22904*a* corresponding to communications between a modular superstructure 22802 and controller system 22806. In this regard, the message intercept service 22904*a* in some embodiments establishes a connection with the channel of the message broker 22804 to gain access to at least the first channel. In some embodiments, the message intercept service 22904*a* establishes a connection that grants the message intercept service 22904*a* direct access to the first channel, or in other embodiments the connection establishes a notification-based monitoring of the first channel. The message intercept service 22904*a* monitors a first channel of the message broker 22804 associated with the modular superstructure 22802 for communications transmitted via the first channel, for example to the modular superstructure 22802 from the controller system 22806 and/or to the controller system 22806 from the modular superstructure 22802. The message intercept service 22904*a* may monitor the first channel to detect each operational message transmitted via the first channel.

In some embodiments, a message intercept service detects such operational messages at the message broker 22804 via the first channel for further processing. In some embodiments, the message intercept service processes and/or transmits the processed operational messages for storage via the OLTP management system 22906. For example, in some embodiments, the message intercept service 22904*a* processes a detected operational message to determine at least one table of an online transaction processing database to which to write data associated with the detected operational message. Once the at least one table is determined, the message intercept service 22904*a* in some embodiments writes data parsed and extracted from the received operational message and/or otherwise determined based at least in part on the received operational message to the at least one table.

In some embodiments, the OLTP management system 22906 processes the received operational message to determine the at least one table based at least in part on a data value for one or more parameters of or associated with the operational message. For example, in some embodiments, the message intercept service 22904*a* processes the operational message to determine a message type of the operational message. The message intercept service 22904*a* may then determine the at least one table based at least in part on the message type. It will be appreciated that any data value for a parameter of the operational message or derivable associated with the operational message may be utilized determine the at least one table to which data is to be written.

In some embodiments, the message intercept service 22904*a* does the processing of the operational message to determine the particular tables and/or initiate storage to such tables. In some other embodiments, the message intercept service 22904*a* merely detects the operational messages and transmits such operational messages to the OLTP management system 22906 that then performs the processing of the received operational message for table identification, parsing of the operational message, and/or storage of data based on the operational message to an online transaction processing database.

In one example context, an operational message is received at the message broker 22804 via a first channel associated with the message intercept service 22904*a*. The message intercept service 22904*a*, or the OLTP management system 22906 to which the operational message is transmitted, processes the operational message to determine particular tables to which data is to be written. For example, based at least on the table configuration depicted and described with respect to FIG. 226*a* and FIG. 226*d*, in a circumstance where an operational message is received and determined to indicate an error message type, the message intercept service 22904*a* determines to write data to at least the operational message table 22630 and/or smart rack error table 22628. Additionally, or alternatively, in circumstances where an operational message is received indicating a status update associated with movement of a tote via one or more smart racks of a modular superstructure, the message intercept service 22904*a* determines to write data to at least the operational message table 22630, smart rack plan table 22612, tote movement table 22618, smart rack plan move table 22614, and/or any other table that stores data representing traversal of a tote throughout a modular superstructure. In this regard, the message intercept service 22904*a* and/or the OLTP management system 22906 may process the operational message to parse and/or extract particular data, and write such data to one or more of the determined tables for storage.

In some embodiments, the message broker 22804 is associated with a plurality of message intercept services. For example, in some embodiments, the message broker 22804 is associated with a distinct message intercept service for each modular superstructure that is communicated with via the message broker 22804. As illustrated, for example, in addition to the modular superstructure 22802 corresponding to the first message intercept service 22904*a*, in some embodiments the message broker 22804 is associated with a second message intercept service 22904*b* corresponding to at least one additional modular superstructure 22902*a*, and the message broker 22804 is associated with a third message intercept service 22904*c* corresponding to at least one additional modular superstructure 22902*b*. In this regard, the message intercept service 22904*b* in some embodiments corresponds to a second channel maintained by the message broker 22804, such that the message intercept service 22904*b* processes operational messages that are transmitted via the second channel between the modular superstructure 22902*b* and the controller system 22806. Similarly, the message intercept service 22904*b* in some embodiments corresponds to a third channel maintained by the message broker 22804, such that the message intercept service 22904*c* processes operational messages transmitted via the third channel between the modular superstructure 22902*b* and the controller system 22806. The various message intercept services may operate in parallel as operational messages are received in real-time via the message broker 22804 from any of the modular superstructures 22802, 22902*a*, and/or 22902*b*, and/or controller system 22806 for communication.

In some embodiments, a message intercept service is maintained as a component of the message broker 22804, for example as illustrated. In some embodiments, a message intercept service is maintained as a component of an OLTP management system 22906. In this regard, in some embodiments the OLTP management system 22906 is configured to perform all of the operations and/or functionality as depicted and described associated with one or more message intercept service.

Example processes for storing operational message data will now be described. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 230 illustrates a flowchart depicting operations of an example process for storing operational messages by a message intercept service in accordance with at least one embodiment of the present disclosure. Specifically, FIG. 230 depicts operations of an example process 23000. In some embodiments, the process 23000 is embodied by computer program code stored on a non-transitory computer-readable storage medium of a computer program product configured for execution to perform the process as depicted and described. Alternatively or additionally, in some embodiments, the process 23000 is performed by one or more specially configured computing devices, such as the apparatus 22400 alone or in communication with one or more other component(s), device(s), system(s), and/or the like. In this regard, in some such embodiments, the apparatus 22400 is specially configured by computer-coded instructions (e.g., computer program instructions) stored thereon, for example in the memory 22404 and/or another component depicted and/or described herein and/or otherwise accessible to the apparatus 22400, for performing the operations as depicted and described. In some embodiments, the apparatus 22400 is in communication with one or more external apparatus(es), system(s), device(s), and/or the like, to perform one or more of the operations as depicted and described. For example, the apparatus 22400 in some embodiments is in communication with at least one apparatus, at least one physical component, at least one processing plant system, a scheduling system, and/or the like. For purposes of simplifying the description, the process 23000 is described as performed by and from the perspective of the apparatus 22400.

According to some examples, the method includes establishing a connection with at least one channel of a message broker, the channel associated with at least one modular superstructure at optional operation 23002. In some embodiments, the apparatus 22400 initiates a message intercept service that is initiated with the connection to the channel of the message broker. In some embodiments, the connection with the message intercept service is established upon initiation of the channel of the message broker itself. In some embodiments, the connection is established through an API or SDK enabling access to particular data of the message broker. Additionally, or alternatively, in some embodiments, the connection is established in response to authentication of a particular user or computing device associated with the apparatus 22400. In some other embodiments, the connection is automatically or pre-established with a channel of a message broker to enable access to data processed by or otherwise communicated via the channel.

According to some examples, the method includes monitoring, via the connection, the at least one channel of the message broker for at least an operational message associated with the at least one modular superstructure at operation 23004. In some embodiments, the apparatus 22400 monitors the at least one channel via a specially configured message intercept service. In some embodiments, the apparatus 22400 promiscuously monitors operational messages that are received at the message broker via the channel. In this regard, the apparatus 22400 may detect and/or otherwise receive the at least one operational message without impacting the transmission of the operational message to its intended recipient. In some embodiments, the at least one operational message is received from a controller system, for example for transmission to at least one smart rack of a modular superstructure communicable via the message broker. In some embodiments, the at least one operational message is received from a smart rack of a modular superstructure, for example for transmission to at least one controller system communicable via the message broker. In this regard, the message broker may continue to process the received operational message for routing and/or processing while the apparatus 22400 simultaneously detects and processes the at least one operational message for storage to at least one online transaction processing database.

According to some examples, the method includes processing the operational message to determine at least one table of an online transaction processing database to which data is to be written at operation 23006. In some embodiments, the apparatus 22400 determines a message type associated with the operational message. In some such embodiments, the apparatus 22400 determines the at least one table to which to write data based at least in part on the message type. Additionally, or alternatively, in some embodiments, the apparatus 22400 determines at least one table to which data is to be written based at least in part on the presence of a particular data value or data parameter in the operational message, and/or the absence of a particular data value or data parameter in the operational message. Additionally, or alternatively, in some embodiments, the apparatus 22400 predetermines particular tables to which data is to be written. For example, in some embodiments, one or more tables are written to each time an operational message is received.

According to some examples, the method includes storing the operational message to the online transaction processing database by updating the at least one table with data based on the operational message at operation 23008. For example, in some embodiments, the apparatus 22400 writes data to the at least one table identified at operation 23006 based at least in part on data parsed and/or otherwise extracted from the received operational message. In some embodiments, the apparatus 22400 generates a new data record for each table determined for writing data. The data of each data record in some such embodiments is parsed and/or extracted from the received operational message. For example, data values corresponding to particular data parameters in the operational message may be written to different tables.

In some embodiments, the apparatus 22400 processes any number of operational messages. For example, in some embodiments, the apparatus 22400 detects a plurality of operational message received via any number of channels associated with a message broker. The channels may be monitored by one or more message intercept services that monitor such operational messages. In this regard, each operational message may be processed as depicted and described with respect to FIG. 230.

In several contexts, monitoring of operation for at least one modular superstructure is desirable. For example, often it is desirable for a user to be able to visually observe such operation of at least one modular superstructure. A user may visualize some operations of the modular superstructure in real-time. In some contexts, however, it is beneficial to visualize operation of a modular superstructure that has previously occurred. For example, visualization of previously performed operations may be desired to reconstruct visualization of what operations actually occurred during operation of a modular superstructure, and/or a portion thereof, based on data collected and stored as a result of such operation of the modular superstructure or otherwise stored associated with the modular superstructure.

Some embodiments generate and/or output a playback visualization. The playback visualization includes data visually depicting a digital representation of a modular superstructure or portion thereof, for example a digital representation of at least one smart rack of the modular superstructure. The playback visualization in some embodiments includes digital representations of the operation of the modular superstructure, and/or at least one smart rack thereof, for example traversal of one or more totes via the smart racks of the modular superstructure. In some embodiments, the playback visualization is generated and/or outputted based at least in part on stored data associated with the modular superstructure, as depicted and described further herein.

In some embodiments, the playback visualization is outputted via a data file. The data file may be locally stored via a system, for example the apparatus 22400, and/or remotely accessible, for example via one or more cloud system. Additionally, or alternatively, in some embodiments, the playback visualization is outputted via a web user interface. For example, in some embodiments, the playback visualization is outputted to a client device remotely located from the apparatus 22400.

FIG. 231 illustrates an example data flow for outputting a playback visualization in accordance with at least one embodiment of the present disclosure. Specifically, FIG. 231 depicts a playback visualization 23112 generated corresponding to a particular modular superstructure 23102. The modular superstructure 23102 may include any number of smart racks in a particular arrangement. In this regard, the modular superstructure 23102 may operate in accordance with particular generated operational commands, for example embodied in one or more operational messages, to traverse one or more totes for ingressing, egressing, storing, and/or otherwise manipulating such totes. In some embodiments, the modular superstructure 23102 is embodied at least in part by the modular superstructure 22304 and the OLTP management system 23106 is embodied at least in part by the OLTP management system 22306 and/or superstructure controller & monitoring system 22302 as depicted and described herein.

During such operations, one or more operational messages 23104 may be generated as described herein. For example, in some embodiments, one or more of the operational messages 23104 are generated by one or more smart racks of the modular superstructure 23102, for example representing actions performed by a smart rack, an operational status associated with a smart rack, an error experienced during operation of a smart rack, and/or the like. Additionally, or alternatively, in some embodiments, the operational messages 23104 includes one or more operational messages that represents operational commands for controlling operation of the modular superstructure 23102 or at least one smart rack thereof. For example, in some embodiments the operational messages 23104 includes at least one operational message that controls at least one smart rack of the modular superstructure 23102 in accordance with a smart rack plan, tote plan, and/or the like. In some embodiments, the operational messages 23104 are transmitted via a message broker to and/or from the modular superstructure 23102, as depicted and described herein.

In some embodiments, the OLTP management system 23106 receives the operational messages 23104. In some embodiments, the OLTP management system 23106 receives the operational messages 23104 by detecting the operational messages 23104 as such operational messages 23104 are transmitted via at least one message broker. In some such embodiments, the OLTP management system 23106 maintains and/or otherwise accesses at least one message intercept service that monitors and detects operational messages 23104 communicated via at least one channel of a message broker, as described herein.

The OLTP management system 23106 may store such operational messages 23104, and/or data embodying the operational messages 23104 or otherwise associated with the operational messages 23104, to the online transaction processing database 23108. In some embodiments, the OLTP management system 23106 stores particular data of or otherwise associated with the operational messages 23104 to particular tables of the online transaction processing database 23108. For example, in some embodiments the online transaction processing database 23108 is configured in accordance with FIG. 226A to FIG. 226D to enable efficient and effective retrieval of data usable to generate and/or output an accurate playback visualization. In some embodiments, the OLTP management system 23106 writes to the online transaction processing database 23108 utilizing at least one message intercept service specially configured to interact with an associated message broker and/or particular channel thereof.

In some embodiments, the OLTP management system 23106 generates and/or outputs a playback visualization 23112. In some embodiments, the playback visualization 23112 is generated in response to a request to generate such a playback visualization, for example a visualization request. In some embodiments, the OLTP management system 23106 receives a visualization request in response to user input provided via the OLTP management system 23106. Additionally, or alternatively, in some embodiments, the OLTP management system 23106 receives the visualization request from a client device communicable with the OLTP management system 23106. Additionally, or alternatively, in some embodiments, a visualization request is received automatically in response to one or more data-driven triggers, for example based on detection of particular errors, operational data conditionals, and/or the like.

In some embodiments, the OLTP management system 23106 (for example, embodied by an apparatus 22400) generates the playback visualization based at least in part on at least a portion of the data that is associated with the modular superstructure 23102 and is stored in the online transaction processing database 23108. In some embodiments, the OLTP management system 23106 queries the online transaction processing database 23108 for data from particular tables of the online transaction processing database 23108. For example, in some embodiments the OLTP management system 23106 retrieves at least data required to construct a digital representation of the modular superstructure 23102, or a portion thereof, generate digitalized connections between smart racks of the modular superstructure 23102 in an arrangement, represent operations for tote manipulations performed by one or more of the smart racks depicted in the digital representation, errors experienced by one or more of the smart racks depicted in the digital representation, and/or the like.

In some embodiments, the data is queried for a particular modular superstructure, for example all of modular superstructure 23102 based at least in part on one or more identifiers, particular smart racks of the modular superstructure 23102 based at least in part on one or more identifiers, and/or the like. Data utilized to limit the playback visualization 23112 to a particular portion of the modular superstructure 23102 in some embodiments is received as part of the visualization request received as depicted and described herein. Additionally, or alternatively, in some embodiments, the OLTP management system 23106 queries for data within a particular timestamp interval to utilize in generation of playback visualization 23112. Data representing the timestamp interval for which the playback visualization 23112 should be generated, in some embodiments, is received as part of a received visualization request as depicted and described herein. In this regard, the OLTP management system 23106 may utilize the received visualization request to generate a playback visualization 23112 specifically based on the stored data set corresponding to the visualization request, where such stored data set is retrieved from the online transaction processing database 23108 based on the visualization request. For example, in some embodiments, the OLTP management system 23106 queries the online transaction processing database 23108 for data records that fall within the time timestamp interval indicated in the received visualization request.

The OLTP management system 23106 may generate the playback visualization 23112 that depicts a digital representation of operation of at least a portion of smart racks of a modular superstructure. For example, in some embodiments, the playback visualization 23112 retrieves a stored data set from the online transaction processing database 23108 that includes data representing configurations of smart racks (e.g., existence of smart racks, the arrangement and/or connection between such smart racks, and/or the like) and/or totes (e.g., existence of totes, items within the totes, and/or the like). At least a portion of such data may remain static for the duration of a rendering of the playback visualization. Additionally, or alternatively, in some embodiments, the playback visualization 23112 retrieves a stored data set that includes data representing dynamic actions, status updates, and/or other reports associated with operation of the smart racks across time to perform tote traversal. Such data may include data values received as part of operational messages indicating performed actions for tote traversal, smart rack errors experienced by one or more smart racks of a modular superstructure, successful tote egress and/or ingress actions, and/or the like. Additionally, or alternatively, in some embodiments, such data is utilized to configure the playback visualization 23112 to depict changes to the smart racks and/or totes that occur across time based at least in part on timestamp data associated with each portion of the stored data set.

In some embodiments, the OLTP management system 23106 outputs the playback visualization 23112 upon completing generation of the playback visualization 23112. For example, in some embodiments, the OLTP management system 23106 outputs the playback visualization 23112 to a user interface of the OLTP management system 23106. Additionally, or alternatively, in some embodiments, the OLTP management system 23106 outputs the playback visualization 23112 to a user interface of a remote device, for example a client device communicable with the OLTP management system 23106. Additionally, or alternatively still, in some embodiments, the OLTP management system 23106 outputs the playback visualization 23112 to a data file that is then playable via the OLTP management system 23106 to cause rendering of a corresponding user interface, transmissible to a client device or other remote device, storable in a short-term and/or long-term memory storage, and/or the like. In some embodiments, the playback visualization 23112 embodies particular digitalized three-dimensional objects in a three-dimensional rendering environment, and/or animation data within the three-dimensional rendering environment. For example, in some embodiments the three-dimensional rendering environment comprises Blender3D, where the generated playback visualization 23112 comprises a Blender3D file embodying the digital representation.

Additionally, or alternatively, in some embodiments, the playback visualization 23112 is configured to be interactable by an end user, for example a user of the OLTP management system 23106 and/or a client device associated therewith. For example, a user may interact with particular virtual objects in the playback visualization 23112 that embody digital representations of corresponding real-world objects, such as smart racks, totes, and/or the like. A user may interact with the virtual objects to view particular properties and corresponding property values associated with the virtual object, monitor internal states of such objects, and/or otherwise select particular aspects associated with the playback visualization 23112 to render. Additionally, or alternatively, in some embodiments, the virtual objects of the playback visualization 23112 are interactable to enable the user to adjust one or more aspects of the virtual objects and depict the effects of such adjustments.

FIG. 232 illustrates an example visualization of data retrieval from an online transaction processing database for outputting a playback visualization in accordance with at least one embodiment of the present disclosure. Specifically, FIG. 232 depicts an example of various portions of data utilized in generating a particular playback visualization, such as the playback visualization 23112. The portions of data in FIG. 232 may be received from different sources, tables, and/or the like for processing. In some embodiments, the data retrieval from an online transaction processing database for outputting a playback visualization is performed by a specially configured computing device, for example an OLTP management system embodied by the apparatus 22400 as depicted and/or described herein.

In some embodiments, a playback visualization is generated and/or outputted based at least in part on visualization request data 23202. In some embodiments, the visualization request data 23202 corresponds to a received visualization request, for example where the visualization request data 23202 includes data values included in and/or derived from the received visualization request. In some embodiments, the visualization request data 23202 is received from a user device communicable with the apparatus 22400, for example user device 23208. The user device 23208 may be authenticated via particular credentials to link the user device 23208 with particular modular superstructures, for example such that the user of the user device 23208 may request playback visualization of any particular modular superstructure or portion thereof linked to the user device 23208. For example, in some embodiments the user device 23208 is associated with an authenticated session utilizing validation of a username and password to associate the user device 23208 with a particular user profile during the authenticated session, wherein the particular user profile is linked to particular modular superstructures and is authenticated to access any particular data associated with such modular superstructures.

In some embodiments, the visualization request is submitted via the user device 23208 in response to user engagement requesting generation and/or outputting of a particular playback visualization. In some such embodiments, a user may provide one or more portions of user input that define at least a portion of the visualization request data 23202 utilized for generation and/or outputting of the playback visualization 23112. Additionally, or alternatively, in some embodiments, the visualization request is automatically generated and/or received, for example in response to a data-driven determination and/or trigger, such as satisfaction of a particular conditional based at least in part on operational data associated with a particular modular superstructure.

As illustrated, the online transaction processing database 23108 is utilized to retrieve visualization configuration data 23204 and/or visualization operational data 23206. In some embodiments, the visualization configuration data 23204 and visualization operational data 23206 embody a stored data set including any number of data records associated with at least one modular superstructure, or sub-portion of a modular superstructure, to be depicted via a generated playback visualization. The stored data set embodying at least the visualization configuration data 23204 and visualization operational data 23206 in some embodiments is retrieved and received from the online transaction processing database 23108 in response to one or more queries generated and processed by the online transaction processing database 23108. For example, in some embodiments, the apparatus 22400 queries the online transaction processing database 23108 utilizing one or more requests embodying such one or more queries, where the online transaction processing database 23108 is embodied as a portion of the apparatus 22400 or at least one external computing entity. It should be appreciated that in other embodiments, the stored data set retrieved from the online transaction processing database 23108 includes one or more other portions of data utilized in generating the playback visualization 23112 corresponding to a particular modular superstructure.

The visualization request data 23202 may include any number of individual data portions and/or values utilized in generating and/or outputting the playback visualization 23112. In some embodiments, the visualization request data 23202 includes at least a modular superstructure identifier that uniquely identifies a particular modular superstructure to be depicted in the generated playback visualization. Additionally, or alternatively, in some embodiments, the visualization request data 23202 includes superstructure range data that represents a particular portion of a modular superstructure to be depicted in the generated playback visualization. For example, in some embodiments, the superstructure range data includes data identifying or more smart rack locations corresponding to smart racks to be depicted in the generated playback visualization. In this regard, the superstructure range data may be utilized to depict a particular sub-portion of a modular superstructure rather than the entire modular superstructure, for example to emphasize the particular sub0portion of the modular superstructure. In one example context, the superstructure range data is utilized to cause rendering of a particular sub-portion of a modular superstructure that experienced a smart rack error during a particular timestamp interval. In some embodiments, the modular superstructure identifier and/or superstructure range data is received in response to user input that defines such data.

Additionally, or alternatively, in some embodiments, the visualization request data 23202 includes timestamp interval data that defines a particular timestamp interval. In this regard, the timestamp interval defined by such data may be utilized to depict operation of a modular superstructure, or a particular sub-portion thereof, that occurred during the timestamp interval. The timestamp interval data in some such embodiments is utilized to query for data from the online transaction processing database 23108 that occurred during the timestamp interval represented by the inputted timestamp interval data. In some embodiments, the visualization request data 23202 includes at least a starting timestamp and/or datetime value and an ending timestamp and/or datetime value, such values defining the timestamp interval to utilize in generation of the playback visualization 23112.

As depicted, visualization configuration data 23204 is retrieved from online transaction processing database 23108. In some embodiments, the visualization configuration data 23204 includes data indicating a configuration of smart racks of a particular modular superstructure to be visualized. For example, the visualization configuration data 23204 in some embodiments includes data identifying existence of a particular modular superstructure. Additionally, or alternatively, in some embodiments, the visualization configuration data 23204 includes data identifying existence of a smart rack at a particular location in a grid arrangement of smart racks, for example based at least in part on a coordinate representing the smart rack location within the grid. Additionally, or alternatively, in some embodiments, the visualization configuration data 23204 includes data identifying existence and/or locations of totes being manipulated by a modular superstructure to be depicted in a generated playback visualization.

In some embodiments, the visualization configuration data 23204 is retrieved or otherwise received from particular tables of the online transaction processing database 23108. For example, with respect to the particular configuration depicted and described with in FIG. 226A to FIG. 226D, the visualization configuration data 23204 may include data from a modular superstructure table 22604, smart rack data table 22606, modular superstructure plan table 22610, smart rack plan table 22612, smart rack plan move table 22614, tote table 22616, tote movement table 22618, and/or the like. In some embodiments, the visualization configuration data 23204 is queried from the online transaction processing database 23108 based at least in part on particular data, such as visualization request data 23202, that defines a particular timestamp interval, modular superstructure identifier, and/or other data utilized to retrieve particular data based at least in part on the visualization request data 23202.

As depicted, visualization operational data 23206 is retrieved from online transaction processing database 23108. In some embodiments, the visualization operational data 23206 includes data indicating operations performed by at least one smart rack of a modular superstructure and/or indicating information associated with such operations performed by at least one smart rack of a modular superstructure. The visualization operational data 23206 in some embodiments includes operational messages and/or data thereof for any number of operational message received during such operating of the at least one smart rack. For example, in some embodiments, the visualization operational data 23206 includes data indicating actions performed by each smart rack of at least one smart rack, operational statuses of each smart rack of at least one smart rack, smart rack errors experienced by each of at least one smart rack during operation of at least one smart rack, modular superstructure plans and/or smart rack plans during operation of at least one smart rack, tote movements successfully performed during operation of at least one smart rack, inventory data associated with items in totes manipulated by at least one smart rack, and/or the like.

In some embodiments, each data record of the visualization operational data 23206 includes a timestamp associated with that record. The timestamp associated with each data record of the visualization operational data 23206 may be utilized to temporally arrange such data portions. In some such embodiments, data portions associated with operations performed earlier relative to one or more later-performed operations of at least one smart rack may be associated with earlier timestamps. In this regard, the apparatus 22400 may process the visualization operational data 23206 based at least in part on the timestamps corresponding to each data record therein to generate a playback visualization in temporal order of such data.

In some embodiments, upon retrieval of the stored data set (e.g., comprising at least the visualization configuration data 23204 and/or visualization operational data 23206) the apparatus 22400 generates the playback visualization 23112 based at least in part on such data. For example, in some embodiments, the apparatus 22400 utilizes the visualization configuration data 23204 to generate at least some elements in digital representation of a modular superstructure, or particular sub-portion thereof, having a particular configuration. Such a digital representation may include particular virtual objects representing at least one smart rack of a modular superstructure, totes stored by one or more of the at least one smart rack, and/or the like. The digital representation of the modular superstructure may include any number of static elements, for example defining existence of particular smart racks, arrangement of connected smart racks of a modular superstructure, and/or the like.

Additionally, or alternatively, in some embodiments, the apparatus 22400 utilizes the visualization operational data 23206 to generate at least some elements in the digital representation of the modular superstructure, or particular sub-portion thereof. In some embodiments, the visualization operational data 23206 is utilized to generate and/or update one or more dynamic elements in the digital representation. For example, in some embodiments, the apparatus 22400 reconfigures and/or otherwise updates digital representations of smart racks, totes, and/or the like to reflect the operations, statuses, and/or other data values represented in the visualization operational data 23206. Such digital elements may be generated based on the visualization operational data 23206 and/or updated based at least in part on the visualization operational data 23206 to reflect changes to at least one digital element that are reflected across time based at least in part on different portions of the visualization operational data 23206.

In some embodiments, the playback visualization 23112 embodies or otherwise includes an animation, GIF, video, or other renderable format depicting the digital representation across time of particular at least one smart racks of a modular superstructure and/or totes manipulated therein. Additionally, or alternatively, in some embodiments, the playback visualization 23112 includes a specially configured three-dimensional rendering environment within which virtual objects embodying the smart racks, totes manipulated by the smart racks, and/or the like are represented. In this regard, in some embodiments the apparatus 22400 utilizes the stored data set or one or more portions thereof, for example at least the visualization operational data 23206, to generate keyframes and/or intermediary states for the digital representations in the playback visualization 23112. Such intermediary states may be based at least in part on a determined status associated with each digitally represented element at a given point in time based at least in part on the data records in the stored data set corresponding to a timestamp representing and/or otherwise associated with that given point in time. The playback visualization 23112 may utilize interpolation and/or other data processing techniques to transition between intermediary states defined based at least in part on the data records in the stored data set. In this regard, the different portions of the stored data set may be utilized to configure different elements of the playback visualization 23112, and/or changes to such elements.

Example processes for outputting a playback visualization will now be described. It will be appreciated that each of the flowcharts depicts an example computer-implemented process that is performable by one or more of the apparatuses, systems, devices, and/or computer program products described herein, for example utilizing one or more of the specially configured components thereof.

FIG. 233 illustrates a flowchart depicting operations of an example process for outputting a playback visualization in accordance with at least one embodiment of the present disclosure. Specifically, FIG. 233 depicts operations of an example process 23300. In some embodiments, the process 23300 is embodied by computer program code stored on a non-transitory computer-readable storage medium of a computer program product configured for execution to perform the process as depicted and described. Alternatively or additionally, in some embodiments, the process 23300 is performed by one or more specially configured computing devices, such as the apparatus 22400 alone or in communication with one or more other component(s), device(s), system(s), and/or the like. In this regard, in some such embodiments, the apparatus 22400 is specially configured by computer-coded instructions (e.g., computer program instructions) stored thereon, for example in the memory 22404 and/or another component depicted and/or described herein and/or otherwise accessible to the apparatus 22400, for performing the operations as depicted and described. In some embodiments, the apparatus 22400 is in communication with one or more external apparatus(es), system(s), device(s), and/or the like, to perform one or more of the operations as depicted and described. For example, the apparatus 22400 in some embodiments is in communication with at least one apparatus, at least one physical component, at least one processing plant system, a scheduling system, and/or the like. For purposes of simplifying the description, the process 23300 is described as performed by and from the perspective of the apparatus 22400.

According to some examples, the method includes causing rendering of a user interface that receives input defining a visualization request corresponding to a modular superstructure at optional operation 23302. In some embodiments, the apparatus 22400 causes rendering of the user interface to a display of the apparatus 22400. In some such embodiments, the user interface may be interactable via one or more peripherals, inputs, and/or the like of the apparatus 22400 itself, for example via input/output circuitry 22406. Additionally, or alternatively, in some embodiments the apparatus 22400 causes rendering of the user interface to a display of a client device associated with the apparatus 22400. In some such embodiments, the user interface may be interactable to receive user input via user engagement with the client device.

In some embodiments, the visualization request initiates the process 23300 for generation and/or outputting of a playback visualization associated with a particular modular superstructure. In some embodiments, the user interface is configured to enable user input of particular visualization request data utilized to specially configure the corresponding visualization request. For example, in some embodiments, the user interface includes at least one interface element specially configured to receive user input defining a timestamp interval, which may be utilized in depicting operations of a modular superstructure during the timestamp interval. Additionally, or alternatively, for example in some embodiments, the user interface includes at least one interface element specially configured to receive user input identifying a modular superstructure to depict via the generated playback visualization. In some such embodiments, the user interface receives user input defining a particular modular superstructure identifier corresponding to the modular superstructure to be depicted. Additionally, or alternatively, in some embodiments, the user interface includes at least one interface element specially configured to receive superstructure range data. In some such embodiments, the superstructure range data defines at least a portion of a particular modular superstructure, for example where only the particular portion defined by the superstructure range data is to be depicted in the generated playback visualization.

According to some examples, the method includes receiving a visualization request defining at least a particular timestamp interval and a modular superstructure identifier corresponding to a modular superstructure at block 23304. In some embodiments, the visualization request is received in response to a particular user interface, for example as depicted and described with respect to optional operation 23302. Additionally, or alternatively, in some embodiments the visualization request is received automatically in response to a data-driven determination.

In some embodiments, the modular superstructure identifier indicates the particular modular superstructure from which one or more smart racks are to be depicted in the generated playback visualization. For example, in some embodiments, the modular superstructure identifier uniquely identifies a particular modular superstructure where all such smart racks of the modular superstructure are to be depicted in the playback visualization. Additionally, or alternatively, in some embodiments, the modular superstructure identifier unique identifies a particular modular superstructure where a portion of the smart racks of the modular superstructure are to be depicted in the playback visualization, for example based at least in part on superstructure range data associated with or received as part of the visualization request. In some embodiments, the apparatus 22400 utilizes the modular superstructure identifier to determine and/or otherwise retrieve particular data linked to the modular superstructure identifier for use in generating the playback visualization, for example the stored data set as described herein.

In some embodiments, the timestamp interval represents a historical period of time for which to generate the playback visualization. For example, in some embodiments, the apparatus 22400 utilizes the timestamp interval to retrieve particular data utilized to generate the playback visualization, where the playback visualization depicts operations performed by or otherwise experienced by the modular superstructure, or particular smart racks thereof, during the period of time represented by the timestamp interval. In this regard, the playback visualization generated and outputted may be configured based at least in part on the retrieved data within the timestamp interval to depict a virtual representation of the operation of the modular superstructure, or at least a sub-portion of smart racks thereof, over the timestamp interval.

According to some examples, the method includes querying a stored data set from the online transaction processing database based at least in part on the timestamp interval and the modular superstructure identifier at operation 23306. In some embodiments, the apparatus 22400 generates and/or executes at least one query via the online transaction processing database, wherein the results that resolve from the at least one query embody the stored data set. The stored data set may be retrieved as a single portion, or as multiple portions aggregated together to form the entire stored data set for processing.

In some embodiments, visualization request data from the received visualization request is utilized to limit the data that is queried and/or processed. In some embodiments, the apparatus 22400 queries for data records that are linked to the particular modular superstructure identifier in the online transaction processing database. For example, such data records may include the modular superstructure, and/or be linked to other data records that correspond to smart racks linked to the modular superstructure identifier, smart rack plans and/or modular superstructure plans associated with the modular superstructure identifier, operational messages associated with the modular superstructure identifier, and/or the like. Additionally, or alternatively, in some embodiments, the apparatus 22400 queries for data records based at least in part on superstructure range data. For example, the superstructure range data may define a particular portion of smart racks of the modular superstructure identified by the modular superstructure identifier for which to query data from the online transaction processing database. In this regard, the superstructure range data may limit the data associated with the modular superstructure identifier that is to be processed to generate the playback visualization to depict only particular one or more smart racks of the modular superstructure represented by the modular superstructure identifier.

Additionally, or alternatively, in some embodiments, the apparatus 22400 queries for data records that are within the timestamp interval. For example, in some embodiments, each data record in the online transaction processing database is associated with a particular timestamp. The apparatus 22400 in some embodiments queries for each data record that is associated with timestamp data that falls within the timestamp interval. In some embodiments, the modular superstructure identifier and the timestamp interval are utilized to query for particular data records associated with a particular modular superstructure and that fall within the timestamp interval.

According to some examples, the method includes generating a playback visualization of the modular superstructure based at least in part on the stored data set at operation 23308. In some embodiments, the playback visualization is generated to represent an animation or other depiction of keyframes generated based at least in part on the stored data set. For example, in some embodiments, the apparatus 22400 processes different portions of the stored data set to generate keyframes associated with different time steps based at least in part on a temporal arrangement of such data portions in the stored data set. In this regard, the playback visualization depicts changes represented between such portions of the stored data set, such as performed actions defined in the stored data set. The playback visualization in some embodiments is playable in a three-dimensional rendering environment to render such changes across time.

According to some examples, the method includes saving the playback visualization to a file at optional operation 23310. In some embodiments, the file is stored in a file system by apparatus 22400. The file may be transmissible to at least one external system communicable with the apparatus 22400. For example, in some embodiments, the apparatus 22400 is configured to enable transmission of the file to at least one associated user device to cause rendering of the file to at least one display of the user device.

According to some examples, the method includes outputting the playback visualization at operation 23312. In some embodiments, the apparatus 22400 outputs the playback visualization to a display of the apparatus 22400. In this regard, the playback visualization may be output to render the frames of an animation (in temporal order) generated based at least in part on the stored data set. Additionally, or alternatively, in some embodiments, the apparatus 22400 outputs the playback visualization to a display of an external user device communicable with the apparatus 22400. In some embodiments, the playback visualization is outputted within a corresponding three-dimensional rendering environment that enables interaction with the playback visualization, for example to visualize parameter values associated with particular virtual objects, visualize adjustments of parameter values associated with particular virtual objects, and/or the like.

FIG. 234A, FIG. 234B, FIG. 234C, and FIG. 234D illustrate example configurations associated with an example smart rack 23400 for transporting a rectangular prism in accordance with some embodiments of the present disclosure. In one or more embodiments, smart rack 23400 includes a plurality of rollers 23410, bearings 23420, solenoids 23430, and axles 23440.

In some embodiments, the plurality of rollers 23410 are motorized. In one or more embodiments, the plurality of rollers 23410 are driven by one or more motors. In one or more embodiments, the plurality of rollers 23410 may be spaced axially along an X axis or a Y axis to facilitate movement of a rectangular prism.

In one or more embodiments, at least one of the plurality of rollers 23410 are V-shaped. In one or more embodiments, a V-shaped roller 23410 includes a V-shaped groove on a roller surface. In one or more embodiments, the V-shaped groove is configured to mate with a lip on an outer surface of a rectangular prism. In one or more embodiments, the V-shaped groove of a roller 23410 is configured to facilitate movement of a rectangular prism in a direction towards a next roller 23410. In one or more embodiments, the plurality of rollers 23410 are configured to extend and retract. In one or more embodiments, when the plurality of rollers 23410 are extended, the rollers 23410 are configured to engage with a rectangular prism. In one or more embodiments, when the plurality of rollers are retracted, they are configured to not engage with a rectangular prism.

In one or more embodiments, at least one of the plurality of rollers 23410 are H-shaped. In one or more embodiments, an H-shaped roller includes an H-shaped groove on a roller surface. In one or more embodiments, the H-shaped groove is configured to mate with a lip on an outer surface of a rectangular prism. In one or more embodiments, the H-shaped groove of a roller is configured to facilitate movement of a rectangular prism in a direction towards a next roller.

In one or more embodiments, the smart rack 23400 includes a plurality of bearings 23420. In one or more embodiments, the plurality of bearings 23420 are placed on each side of a solenoid 23430. In one or more embodiments, two bearings are placed on each axle 23440. In one or more embodiments, the plurality of bearings 23420 facilitate a rotational movement of at least one roller 23410. In one or more embodiments, the plurality of bearings 23420 provide structural integrity to smart rack 23400. In one or more embodiments, the plurality of bearings 23420 keep one or more solenoids 23430 in place in the smart rack 300.

In one or more embodiments, the smart rack 23400 includes a plurality of solenoids 23430. In one or more embodiments, each of the plurality of solenoids 23430 includes an axle 23440 positioned within a coil, where the axle 23440 is secured to one or more motorized rollers. In one or more embodiments, the coil of at least one solenoid 23430 is configured to receive an electrical current. In one or more embodiments, a coil of at least one solenoid 23430 is configured to produce a magnetic field in response to receiving the electrical current. In one or more embodiments, at least one solenoid is paired to at least one motor sleeve. In one or more embodiments, at least one of the plurality of solenoids 23430 includes a linear solenoid.

In one or more embodiments, the smart rack 23400 includes a plurality of axles 23440. In one or more embodiments, the axles 23440 are positioned within bearings 23420. In one or more embodiments, the axles 23440 are positioned within solenoids 23430. In one or more embodiments, at least one axle 23440 is secured to at least one motorized roller. In one or more embodiments, at least one axle 23440 is made of or comprises a ferromagnetic material. In one or more embodiments, at least one axle 23440 is secured to at least one motor sleeve. In one or more embodiments, at least one axle 23440 is configured to extend and/or retract a roller 23410. In one or more embodiments, when the at least one axle 23440 extends a roller 23410, the roller 23410 is able to engage with a rectangular prism. In one or more embodiments, when the at least one axle 23440 retracts a roller 23410, the roller 23410 does not engage with a rectangular prism.

In one or more embodiments, the smart rack 23400 comprises a ball screw 23450. In one or more embodiments, the ball screw 23450 is configured to secure a plurality of rollers 23410. In one or more embodiments, the ball screw 23450 is configured to secure a plurality of axles 23440, which may be positioned within at least one bearing 23420 and/or solenoid 23430. In one or more embodiments, the ball screw 23450 secures rollers 23410 in order to allow linear movement of a rectangular prism.

Turning now to FIG. 235A and FIG. 235B, an example solenoid is shown coupled to a motor sleeve 23510. In one or more embodiments, the axle 23540 of the solenoid 23560 is secured within a motor sleeve 23510. In one or more embodiments, the motor sleeve 23510 is configured to rotate the roller 23570 by rotating axle 23540. In one or more embodiments, motor sleeve 23510 is coupled to axle 23540 with key 23520. In one or more embodiments, motor sleeve 23510 is coupled with a motor 23530. In one or more embodiments, motor 23530 rotates motor sleeve 23510, which thereby rotates axle 23540.

Referring now to FIG. 236A and FIG. 236B, an example lip 23610 of a rectangular prism is illustrated. In one or more embodiments, as shown in FIG. 236A, a lip 23610 is configured to mate with an H-shaped groove in a roller 23410. In one or more embodiments, when lip 23610 is mated with an H-shaped groove of roller 23410, a rectangular prism is enabled to move in a linear direction guided by the roller 23410. Similarly, in one or more embodiments, as shown in FIG. 236B, a lip 23610 is configured to mate with a V-shaped groove in a roller 23410. In one or more embodiments, when lip 23610 is mated with a V-shaped groove of roller 23410, a rectangular prism is enabled to move in a linear direction guided by the roller 23410.

Referring to FIG. 237A and FIG. 237B, an example rectangular prism 23710 is illustrated. In one or more embodiments, the rectangular prism 23710 is configured to move along a path set out by a plurality of rollers 23410. In one or more embodiments, the plurality of rollers 23410 guides the rectangular prism 23710 when the rollers 23410 are in an extended position. In one or more embodiments, when the rollers 23410 are in retracted positions, the rollers 23410 do not guide the rectangular prism 23710. In one or more embodiments, this allows the rectangular prism 23710 to be guided in different directions depending on which rollers are extended. In one or more embodiments, a rectangular prism 23710 may be transported over two dimensions by the rollers 23410.

In one or more embodiments, the rollers 23410 are extended and/or retracted by one or more motors 23530, similar to those describe above.

FIG. 238 illustrates an example smart rack 23800 for transporting a rectangular prism including a retractable arm 23811 and a plurality of motorized rollers 23820.

In one or more embodiments, the smart rack 23800 is configured to transport a rectangular prism in one or more directions. In one or more embodiments, the smart rack 23800 is configured to transport a rectangular prism in two directions including, for example, an X direction and an Y direction that orthogonal to the X direction. In one or more embodiments, the smart rack 23800 is configured to transport a rectangular prism in three directions, including the X direction, the Y direction, and an Z direction that is orthogonal to both the X direction and the Y direction.

In one or more embodiments, the smart rack 23800 includes a retractable arm having a top surface 23810. In one or more embodiments, the top surface 23810 of the retractable arm is configured to engage a rectangular prism. In one or more embodiments, the top surface 23810 of the retractable arm is configured to move a rectangular prism along a length of the top surface 23810 of the retractable arm.

In one or more embodiments, the top surface 23810 of the retractable arm is configured to support a rectangular prism in the Z direction. For example, top surface 23810 of the retractable arm may be configured to engage with a lip of a rectangular prism in some embodiments of the present disclosure.

In one or more embodiments, a plurality of motorized rollers 23820 are disposed on the top surface 23810 of the retractable arm. In one or more embodiments, the plurality of motorized rollers 23820 are coupled with one or more motors.

In one or more embodiments, a single motor may cause the plurality of motorized rollers 23820 to rotate. In one or more embodiments, a plurality of motors may cause the plurality of motorized rollers 23820 to rotate. In one or more embodiments, the plurality of motorized rollers 23820 may rotate in a clockwise or counterclockwise direction depending on the direction that the rectangular prism should be transported.

Referring to FIG. 239A and FIG. 239B, a scissor jack 23920 is illustrated. In some embodiments, the scissor jack 23920 may be configured to extend and/or retract the retractable arm.

In one or more embodiments, the scissor jack 23920 includes a lift plate 23930. In one or more embodiments, the lift plate 23930 is coupled with an inner side surface 23910 of the retractable arm. In one or more embodiments, the scissor jack 23920 includes a base stand 23940. In one or more embodiments, the base stand 23940 is coupled with an inner surface 23950 of a rack frame of the smart rack.

In one or more embodiments, extending the scissor jack 23920 causes extending the retractable arm. For example, the scissor jack 23920 may extend the retractable arm in order to engage the retractable arm with a rectangular prism. In one or more embodiments, the scissor jack 23920 compresses in order to retract the retractable arm. For example, the scissor jack 23920 compresses when the retractable arm should not impede the movement of a rectangular prism.

In one or more embodiments, lift plate 23930 of scissor jack 23920 is coupled with an inside surface 23910 of the retractable arm. In one or more embodiments, lift plate 23930 is coupled to inside surface 210 of the retractable arm by screws, adhesives, or other common means of coupling.

In one or more embodiments where scissor jack 23920 extends, lift plate 23930 pushes the inside surface 23910 of the retractable arm out so that a rectangular prism may be engaged by the retractable arm. In one or more embodiments where the scissor jack 23920 compresses, lift plate 23930 pulls the inside surface 23910 of the retractable arm back so that a rectangular prism is not engaged by the retractable arm.

In one or more embodiments, base stand 23940 of the scissor jack 23920 is coupled with an inner surface 23950 of a rack frame of the smart rack. In one or more embodiments, base stand 23940 is coupled to inner surface 23950 by screws, adhesives, or other common means of coupling.

In one or more embodiments, the scissor jack 23920 pushes the retractable arm and the rack frame away from each other when extending using base stand 23940 and lift plate 23930. In one or more embodiments, scissor jack 23920 pulls the retractable arm and base stand together when compressing using base stand 23940 and lift plate 23930.

Referring to FIG. 240, a lead screw 24020 is illustrated. In one or more embodiments, lead screw 24020 is coupled with a rack socket component 24010.

In one or more embodiments, rack socket component 24010 is secured on a bottom surface of a smart rack. In one or more embodiments, rack socket component 24010 may be secured by screws, adhesives, or any number of means to the bottom surface of the smart rack.

In one or more embodiments, rack socket component 24010 defines a socket space. In one or more embodiments, the socket space of rack socket component 24010 is defined along the top surface of rack socket component 24010. In one or more embodiments, rack socket component 24010 includes a first portion disposed along the top of rack socket component 24010 and a second portion underneath the first portion. In one or more embodiments, the second portion of the socket space is wider than the first portion. In one or more embodiments, the first portion and the second portion form a continuous space.

In one or more embodiments, the socket space of rack socket component 24010 is shaped similar to the shape of a dove tail. In one or more embodiments, the socket space of rack socket component 24010 is configured to engage with a lead screw tail component 24030 of a lead screw 24020.

In one or more embodiments, a lead screw 24020 is provided. In one or more embodiments, lead screw 24020 is configured to engage with the socket space of rack socket component 24010. In one or more embodiments, the lead screw 24020 includes a lead screw tail component 24030 that is configured to slide into the socket space. In one or more embodiments, the lead screw tail component 24030 includes a first portion and a second portion. In one or more embodiments, the second portion of lead screw tail component 24030 is wider than the first portion. In one or more embodiments, the lead screw tail component 24030 is shaped similar to the shape of a dove tail.

In one or more embodiments, the rack socket component 24010 includes a spring-loaded pin 24040. In one or more embodiments, the spring-loaded pin 24040 is configured to enter into a side of rack socket component 24010. In one or more embodiments, the spring-loaded pin 24040 is configured to enter into the socket space of the rack socket component 24010. In one or more embodiments, spring-loaded pin 24040 is configured to hold lead screw in place when lead screw tail component 24030 is completely engaged with the socket space of rack socket component 24010.

Referring to FIG. 241, a top of the lead screw 24020 is provided.

In one or more embodiments, the top of the lead screw 24020 includes a lead screw recess component 24110. In one or more embodiments, the lead screw recess component 24110 comprises two parallel protrusions projecting upwards from the lead screw 24020. In one or more embodiments, the lead screw recess component 24110 may form a rectangular shape between the two parallel protrusions. In one or more embodiments, the lead screw recess component 24110 may form any number of other shapes, including but not limited to triangular, pentagonal, hexagonal, octagonal shapes and/or the like. In one or more embodiments, a shape formed by a lead screw recess component 24110 is configured to match a shape of a lead screw connector 24120. In one or more embodiments, the lead screw recess component 24110 is configured to be made of the same material as other parts of lead screw 24020 that include, but not limited to, metal.

In one or more embodiments, a lead screw connector 24120 is provided. In one or more embodiments, the lead screw connector 24120 is configured to engage with a lead screw recess component 24110. In one or more embodiments, the lead screw connector 24120 may be a rectangular shape. In one or more alternative embodiments, lead screw connector 24120 may be a different shape matching the lead screw recess component 24110.

In one or more embodiments, a bottom surface of the lead screw connector 24120 is secured to the lead screw recess component 24110 of the lead screw 24020. In one or more embodiments, a top surface of the lead screw connector 24120 is secured to a corner plate 24130.

In one or more embodiments, lead screw connector 24120 may be secured to corner plate 24130 by a variety of means including but not limited to screws, adhesives, glue, welding, and/or the like. In one or more embodiments, lead screw connector 24120 connects lead screw 24020 and corner plate 24130.

In one or more embodiments, corner plate 24130 is coupled to at least two rack beams 24140. In one or more embodiments, corner plate 24130 is disposed at a corner of a smart rack for a rectangular prism. In one or more embodiments, corner plate 24130 is secured to the at least two rack beams 24140 by any of a variety of means including but not limited to screws, adhesives, glue, welding, and/or the like.

In one or more embodiments, corner plate 24130 includes a bottom surface connected to a lead screw connector 24120. In one or more embodiments, corner plate 24130 includes an angled side surface. In one or more embodiments, the angled side surface is a triangular shape. In one or more embodiments, corner plate 24130 includes a square side surface. In one or more embodiments, corner plate 24130 may be connected to the two or more rack beams 24140 by a side surface or by an edge.

Referring to FIG. 242A, FIG. 242B, and FIG. 242C, a rack frame 24200 for transporting a rectangular prism is illustrated.

In one or more embodiments, the rack frame 24200 comprises a plurality of rack beams 24210. In one or more embodiments, at least one of the plurality of rack beams 24210 are shaped similar to various examples described above. In one or more embodiments, the plurality of rack beams 24210 may be connected together, for example, at their respective ends, similar to various examples described above.

In one or more embodiments, at least one rack beam 24210 extends in more than one direction, for example, forming square beam that can be used as a base for a rack frame 24200. In one or more embodiments, a base is formed by four rack beams 24210 connected together to form a square shape.

In one or more embodiments, rack beams 24210 are made of metal. For example, rack beams 24210 may be made of steel, iron, aluminum, copper, or other metals. In one or more embodiments, a rack beam 24210 may be made of plastic.

In one or more embodiments, the length of a rack beam 24210 is greater than a length of a side of a rectangular prism. In one or more embodiments, at least one rack beam 24210 is configured to secure a brainbox.

In one or more embodiments, the plurality of rack beams 24210 form a cube shape. In one or more embodiments, the beams are connected to form a plurality of rack corners 24220, where each rack corner 24220 of a cube connects a plurality of rack beams 24210. In one or more embodiments, a rack corner 24220 may connect two rack beams 24210. In one or more embodiments, a rack corner 24220 connects three rack beams 24210. In one or more embodiments, at least one rack corner 24220 is configured secure a corner hub 24230, as shown in FIG. 242A.

In one or more embodiments, a plurality of corner hubs 24230 are provided. In one or more embodiments, the plurality of corner hubs 24230 are secured to the plurality of rack corners 24220. In one or more embodiments, each of the plurality of corner hubs 24230 includes a corner hub housing. In one or more embodiments, a corner hub housing is configured to hold one or more electrical components. In one or more embodiments, a corner hub housing is made at least partially of a plastic material. In one or more embodiments, a corner hub housing is made at least partially of metal.

In one or more embodiments, the corner hub 24230 is configured to connect with at least one brainbox 24250 with a corner hub connection interface 24270, as shown in FIG. 242A and FIG. 242B. In one or more embodiments, the corner hub connection interface 24270 may secure the brainbox 24250. In one or more embodiments, the corner hub connection interface 24270 may connect with the brainbox 24250 electrically and/or mechanically. In one or more embodiments, the corner hub connection interface 24270 is part of the corner hub housing.

In one or more embodiments, a plurality of brainboxes 24250 are provided, as shown in FIG. 242C. In one or more embodiments, the plurality of brainboxes 24250 are secured to the plurality of rack frames 24210. In one or more embodiments, each of the plurality of brainboxes 24250 includes a brainbox housing. In one or more embodiments, a brainbox housing is configured to hold one or more electrical components. In one or more embodiments, a brainbox housing is made at least partially of a plastic material. In one or more embodiments, a brainbox housing is made at least partially of metal.

Referring to FIG. 243, an example view of an example brainbox 24250 is provided. In one or more embodiments, the example brainbox 24250 of FIG. 243 comprises a variety of electrical components configured to assist moving a rectangular prism.

In one or more embodiments, brainbox 24250 includes a printed circuit board 24310 housed inside of a brainbox housing 24260. In one or more embodiments, printed circuit board 24310 may support a variety of electrical components. In one or more embodiments, electrical components connected to printed circuit board 24310 may be configured to execute a variety of functions including, for example, moving a rectangular prism. In one or more embodiments, electrical components connected to printed circuit board 24310 may provide functionality to other components of a rack frame.

In one or more embodiments, a brainbox 24250 includes at least one brainbox connection interface 24320. In one or more embodiments, a brainbox connection interface 24320 is configured to establish electronic communication between a printed circuit board 24310 and other components. In one or more embodiments, brainbox connection interface 24320 may be connected to the printed circuit board 24310 mechanically and/or electrically.

In one or more embodiments, brainbox connection interface 24320 may connect brainbox 24250 to another brainbox connection interface of another brainbox. In one or more embodiments, brainbox connection interface 24320 may connect printed circuit board 24310 with other electrical components in rack frame 24200, such as electrical components connected to rack beam 24210. In one or more embodiments, brainbox connection interface 24320 may connect to a corner hub connection interface 24270. In one or more embodiments, a brainbox connection interface 24320 may connect a brainbox 24250 to two corner hub connection interfaces 24270. In one or more embodiments, brainbox connection interface 24320 may mechanically connect a brainbox 24250 to two corner hubs 24230. In one or more embodiments, brainbox connection interface 24320 may mechanically connect a brainbox 24250 to two corner hub housings 24240. In one or more embodiments, a brainbox connection interface 24320 may electrically connect a printed circuit board 24310 to electrical components in a corner hub 24230.

While the description above provides some example connections that may be provided by an example brainbox connection interface, it is noted that the scope of the present disclosure is not limited to the examples above.

Referring to FIG. 244A and FIG. 244B, an example smart rack 24400 is provided. In the example shown in FIG. 244A and FIG. 244B, the example smart rack includes a plurality of rack beams 24410.

In one or more embodiments, the smart rack 24400 is formed by a plurality of rack beams 24410 connected at the ends of the rack beams 24410, similar to the examples described above. In one or more embodiments, rack beams 24410 may be connected at the ends to form a cubic structure, similar to the examples described above.

In one or more embodiments, each of the plurality of rack beams 24410 includes a rack beam inner surface. In one or more embodiments, a rack beam inner surface is inside the smart rack 24400. In one or more embodiments, the inner rack beam surface of a rack beam 24410 defines at least one roller rail 24420. In one or more embodiments, at least one roller rail 24420 extends along a rack beam 24410 in a vertical direction. In one or more embodiments, a roller rail 24420 is designed to engage with a roller 24450 such that roller 24450 may traverse the roller rail 24420 in a vertical direction.

In one or more embodiments, smart rack 24400 includes a movable base 24430. In one or more embodiments, the movable base 24430 comprises a retractable arm. In one or more embodiments, the retractable arm comprises a plurality of motorized rollers.

In one or more embodiments, movable base 24430 extends between two parallel rack beams, where the movable base 24430 is perpendicular to the two rack beams.

In one or more embodiments, movable base 24430 includes a movable base outer surface. In one or more embodiments, a roller coupler 24440 is secured to the movable base outer surface of movable base 24430. In one or more embodiments, the movable base 24430 slidable along a roller rail 24420 of the at least one rack beam 24410 through the roller coupler 24440 and the roller 24450.

Referring to FIG. 244B, a closeup view of roller coupler 24440 is provided.

In one or more embodiments, roller coupler 24440 is secured to a movable base outer surface of movable base 24430. In one or more embodiments, roller coupler 24440 may be secured to movable base 24430 through a variety of means including, but not limited to, screws, adhesive, glue, welding, and/or the like. In one or more embodiments, roller coupler 24440 is coupled to at least one roller 24450. In one or more embodiments, roller coupler 24440 is coupled to one or more rollers 24450 that are configured to traverse one or more roller rails 24420 in a vertical direction.

In one or more embodiments, the roller coupler 24440 is in a shape similar to an S shape. In one or more embodiments, the roller coupler 24440 is in a shape similar to a Z shape.

In one or more embodiments, the roller coupler 24440 comprises a first portion coupled to a movable base outer surface and a second portion that is not coupled to the movable base outer surface. In one or more embodiments, the first portion of the roller coupler 24440 is thicker than the second portion of the roller coupler 24440. In one or more embodiments, the roller coupler 24440 is able to bear at least part of the weight of movable base 24430 as it moves in a vertical and/or horizontal direction.

In one or more embodiments, the roller coupler 24440 is coupled to one or more rollers 24450. In one or more embodiments, a roller 24450 comprises a wheel. In one or more embodiments, roller 24450 is configured to spin while attached to roller coupler 24440. In one or more embodiments, roller 24450 is configured to couple to a roller rail 24420. In one or more embodiments, roller 24450 is configured to traverse a roller rail 24420 in a vertical direction. In one or more embodiments, roller 24450 is configured to transport roller coupler 24440 as it traverses the roller rail 24420 in a vertical direction.

Referring to FIG. 244C, a closeup view of a movable base 24460 is provided.

In one or more embodiments, a first end of the movable base 24460 is secured to a first coupler 24461A. For example, the first coupler 24461A is coupled to the first end of the movable base 24460 through a variety of means including, but not limited to, screws, adhesive, glue, welding, and/or the like. In one or more embodiments, a second end of the movable base 24460 is secured to a second coupler 24461B. For example, the second coupler 24461B is coupled to the second end of the movable base 24460 through a variety of means including, but not limited to, screws, adhesive, glue, welding, and/or the like. In one or more embodiments, the first end of the movable base 24460 is opposite to the second end of the movable base 24460.

In some embodiments, one of the first coupler 24461A or the second coupler 24461B is secured to a slider that is movable along a lead screw, similar to the various examples described above. In the example shown in FIG. 244C, the first coupler 24461A is movable along the lead screw 24463A, similar to the various examples described above.

In one or more embodiments, one or more rails are secured to one or more rack beams. In the example shown in FIG. 244C, a top end of the first rail 24465A is secured to a rail mounting bracket 24466A, and the rail mounting bracket 24466A is secured to a left side rack beam. A bottom end of the first rail 24465A is secured to a rail mounting bracket 24467A, and the rail mounting bracket 24467A is secured to a top surface of a bottom rail beam. Similarly, a top end of the second rail 24465B is secured to a rail mounting bracket 24466B, and the rail mounting bracket 24466B is secured to a right side rack beam. A bottom end of the second rail 24465B is secured to a rail mounting bracket 24467B, and the rail mounting bracket 24467B is secured to a top surface of a bottom rail beam.

In some embodiments, each of the rails passes through an opening on a coupler. In the example shown in FIG. 244C, the first rail 24465A passes through an opening on the first coupler 24461A, and the second rail 24465B passes through an opening on the second coupler 24461B. In some embodiments, the first rail 24465A and the second rail 24465B provide various technical benefits and advantages such as, but not limited to, providing support for the movable base 24460 when a rectangular prism is moving in the X direction or in the Y direction, as well as providing support and guidance for the movable base 24460 when the rectangular prism is moving in the Z direction. For example, when the first coupler 24461A moves in the Z direction along the lead screw 24463A, the movable base 24460 moves along with the first coupler 24461A, and the first rail 24465A and the second rail 24465B guides the Z direction movement of the movable base 24460.

Referring now to FIG. 245, a smart rack 24500 for transporting a rectangular prism 24560 is provided.

In one or more embodiments, the smart rack 24500 is operable to transport a rectangular prism 24560 in horizontal and vertical directions. In one or more embodiments, smart rack 24500 includes a bottom rack plate 24510 and a top rack plate 24520. In one or more embodiments, a smart rack 24500 can transport a rectangular prism 24560 in a vertical direction from the bottom rack plate 24510 to the top rack plate 24520 and/or from the top rack plate 24520 to the bottom rack plate 24510.

In one or more embodiments, rectangular prism 24560 is supported by movable base 24540. In one or more embodiments, movable base 24540 is configured to lift the rectangular prism 24560 from bottom rack plate 24510 to top rack plate 24520.

In one or more embodiments, movable base 24540 includes a plurality of motorized rollers 24550. In one or more embodiments, the plurality of motorized rollers 24550 are configured to move the rectangular prism 24560 in a horizontal direction. In one or more embodiments, the plurality of motorized rollers 24550 are driven by one or more motors.

Referring now to FIG. 246, in one or more embodiments, a rectangular prism 24560 can be elevated from bottom rack plate 24510 to top rack plate 24520 using asymmetrical guide rail 24530. In one or more embodiments, a rectangular prism 24560 can be lowered from a top rack plate 24520 to a bottom rack plate 24510 using the asymmetrical guide rails 24530.

In the examples shown in FIG. 245 and FIG. 246, a movable base 24540 is elevated and/or lowered on an asymmetrical guide rail 24530, which elevates and/or lowers a rectangular prism 24560. In one or more embodiments, an asymmetrical guide rail 24530 is configured to allow retraction of a movable base 24540. In one or more embodiments, asymmetrical guide rail 24530 allows a movable base 24540 to navigate in a vertical direction around a rectangular prism 24560. In one or more embodiments, movable base 24540 is configured to engage with asymmetrical guide rail 24530 using one or more rollers.

In one or more embodiments, movable base 24540 engages with an asymmetrical guide rail 24530 using at least one spring. For example, a movable base 24540 may comprise a spring loaded platform that is designed to engage the asymmetrical guide rail 24530.

In one or more embodiments, the spring loaded platform may be used to move a rectangular prism. In one or more embodiments, the spring loaded platform may be used to navigate around a rectangular prism. In one or more embodiments, spring loaded platform can engage in and out of a smart rack 24500.

Referring to FIG. 247, a brainbox 24700 is illustrated.

In one or more embodiments, the brainbox 24700 is configured to be secured to a smart rack. In one or more embodiments, the brainbox 24700 is configured to be secured to a top rack beam of a smart rack.

In one or more embodiments, the brainbox 24700 comprises plastic. In one or more embodiments, the brainbox 24700 comprises metal. In one or more embodiments, the brainbox 24700 comprises one or more additional and/or alternative materials.

In one or more embodiments, the brainbox 24700 is configured to house electrical components within a brainbox housing.

In one or more embodiments, the brainbox 24700 is configured to guide a rectangular prism when the rectangular prism is moving in a vertical direction. In one or more embodiments, brainbox 24700 is in a shape similar to a chamfered wedge shape. In one or more embodiments, the brainbox 24700 is in a shape similar to a curved shape.

In one or more embodiments, the shape of the brainbox 24700 ensures that the rectangular prism maintains alignment as it moves up or down to a neighboring smart rack.

In one or more embodiments, the housing of brainbox 24700 comprises a plurality of thickened ribs 24710. In one or more embodiments, the plurality of thickened ribs 24710 are configured to guide a rectangular prism between smart racks in a vertical direction.

Referring to FIG. 248, a brainbox including a plurality of rollers 24810 is illustrated. In one or more embodiments, the plurality of rollers 24810 are configured to guide a rectangular prism between smart racks in a vertical direction. In one or more embodiments, the plurality of rollers are secured in the plurality of thickened ribs 24710.

Although two rollers 24810 are illustrated in FIG. 248, more than two rollers 24810 may be used in a brainbox.

Referring to FIG. 249A and FIG. 249B, an example arm assembly 24900 is illustrated.

In one or more embodiments, the arm assembly 24900 comprises a retractable arm 24910, similar to the various examples described above.

In one or more embodiments, retractable arm 24910 is configured to support a rectangular prism. For example, retractable arm 24910 is configured to support a rectangular prism when the rectangular prism is lifted in a vertical direction.

In one or more embodiments, retractable arm 24910 is configured to move a rectangular prism in a horizontal direction. In one or more embodiments, retractable arm 24910 is equipped with a plurality of motorized rollers to transport a rectangular prism.

In one or more embodiments, a retractable arm 24910 is configured to retract in and out of a smart rack.

In one or more embodiments, retractable arm 24910 includes an attachment point 24920. In one or more embodiments, attachment point 24920 is configured to connect retractable arm 24910 with a cable covered by a protective chain housing 24930. In one or more embodiments, attachment point 24920 is on an inner surface of retractable arm 24910. For example, attachment point 24920 is positioned on an inner side surface of retractable arm 24910. In one or more embodiments, attachment point 24920 is coupled to the protective chain housing 24930 (such as, but not limited to, by welding or another attachment means).

In one or more embodiments, protective chain housing 24930 is configured to envelop a cable. In one or more embodiments, protective chain housing 24930 is configured to extend from an attachment point 24920 of a retractable arm 24910 to a corner hub. In such examples, the cable enveloped by the protective chain housing 24930 may convey control signals and/or power from the corner hub to the retractable arm 24910.

In one or more embodiments, the corner hub is placed above the retractable arm 24910 in the vertical direction. In one or more embodiments, protective chain housing 24930 is configured to be pulled by retractable arm 24910 in the vertical direction. In one or more embodiments, the cable housed by protective chain housing 24930 may move along with the protective chain housing 24930. In one or more embodiments, protective chain housing 24930 allows the enveloped cable to rotate.

Referring to FIG. 249B, a different view of arm assembly 24900 is shown.

Similar to those illustrate in FIG. 249A, protective chain housing 24930 is attached to retractable arm 24910 via attachment point 24920.

In one or more embodiments, the retractable arm 24910 may move in a horizontal or vertical direction while attached to protective chain housing 24930. In one or more embodiments, retractable arm 24910 is positioned below a different retractable arm 24940. In one or more embodiments, retractable arm 24910 may be lifted above retractable arm 24940. In one or more embodiments, retractable arm 24910 is lifted above retractable arm 24940 with a cable that is housed by protective chain housing 24930.

Referring to FIG. 250A, a lead screw coupled to an arm assembly is illustrated. In one or more embodiments, a lead nut 25010 of the lead screw is coupled to a movable base 25040 of the arm assembly through a lead screw socket 25020 and a base tail component 25030.

In one or more embodiments, a lead nut 25010 of a lead screw is coupled to a lead screw socket 25020. In one or more embodiments, the lead screw socket 25020 may be secured to lead nut 25010 via screws, welding, or other methods of attachment.

In one or more embodiments, lead screw socket 25020 comprises a dove tail slot that in a shape similar to a T shape. For example, lead screw socket 25020 comprises a hollow portion that is proximal to the lead nut 25010 and an opening portion that is distal to the lead nut 25010. In one or more embodiments, the hollow portion is wider than the opening portion.

In one or more embodiments, the lead screw socket 25020 comprises one or more materials such as, but not limited to, metal.

In one or more embodiments, a base tail component 25030 is configured to be coupled to the lead screw socket 25020. In one or more embodiments, the base tail component 25030 comprises a dovetail section. In one or more embodiments, the base tail component 25030 comprises a T-shaped section. In one or more embodiments, the dovetail section or T-shaped section of the base tail component 25030 is configured to slide into and engage the slot of lead screw socket 25020. As such, the base tail component 25030 is configured to couple with movable base 25040.

Referring now to FIG. 250B, a base tail component 25030 being coupled with the lead screw socket 25020 in accordance with some embodiments of the present disclosure is illustrated.

In one or more embodiments, the base tail component 25030 is configured to couple with movable base 25040 by using screws 25050. For example, the base tail component 25030 may comprise a plurality of screw slots and the movable base 25040 may comprise a plurality of holes. In one or more embodiments, screws 25050 are configured to enter through the holes of movable base and screw into the screw slots of base tail component 25030. In one or more embodiments, heads of the screws 25050 are configured to compress against an inner surface of movable base, holding movable base to the base tail component 25030.

Referring to FIG. 251A, FIG. 251B, and FIG. 251C, a smart rack 25100 for transporting a rectangular prism is provided. In one or more embodiments, the smart rack 25100 includes one or more movable bases 25110 housing one or more retractable arms 25120.

In one or more embodiments, a retractable arm 25120 may be retracted into and out of a movable base 25110. In one or more embodiments, a retractable arm 25120 may support a rectangular prism. In one or more embodiments, a retractable arm 25120 may assist a rectangular prism in moving in a horizontal or vertical direction, similar to various examples described above.

In one or more embodiments, a retractable arm 25120 includes a plurality of motorized rollers 25130. In one or more embodiments, the plurality of motorized rollers 25130 are positioned on a top surface of the retractable arm 25120.

In one or more embodiments, the plurality of motorized rollers 25130 are driven by one or more motors. In one or more embodiments, the plurality of motorized rollers 25130 are configured to propel a rectangular prism in a horizontal direction.

Referring to FIG. 251B and FIG. 251C, example views associated with the retractable arm 25120 housed in the movable base 25110 are illustrated.

In one or more embodiments, retractable arm 25120 is housed within a movable base 25110. In one or more embodiments, retractable arm 25120 is configured to retract in and out of movable base 25110.

In one or more embodiments, movable base 25110 comprises an upper inner surface. In one or more embodiments, the upper inner surface of movable base 25110 comprises a plurality of funnel protrusions 25140. In one or more embodiments, each of the plurality of funnel protrusions 25140 projects downwardly towards the retractable arm 25120. In one or more embodiments, each of the plurality of funnel protrusions 25140 comprises a curved surface. In one or more embodiments, each of the plurality of funnel protrusions 25140 curves inwardly into the movable base 25110. In one or more embodiments, each of the funnel protrusions 25140 is positioned in between two of the plurality of rollers 25130.

Referring now to FIG. 251D, a movable base 25110 comprising a plurality of funnel protrusions 25140 is illustrated.

In one or more embodiments, the movable base 25110 is configured to house a retractable arm, similar to various examples described above. In one or more embodiments, the plurality of funnel protrusions 25140 aid in the movement of a rectangular prism. For example, the plurality of funnel protrusions 25140 account for any misalignment in the movable bases 25110.

Referring to FIG. 252A and FIG. 252B, a smart rack 25200 for transporting a rectangular prism is provided. In one or more embodiments, the smart rack 25200 comprises one or more movable bases 25210 housing one or more retractable arms 25220.

In one or more embodiments, a retractable arm 25220 may be retracted into and out of a movable base 25210. In one or more embodiments, a retractable arm 25220 may support a rectangular prism. In one or more embodiments, a retractable arm 25220 may assist a rectangular prism in moving in a horizontal or vertical direction.

In one or more embodiments, a retractable arm 25220 includes a plurality of motorized rollers 130. In one or more embodiments, the plurality of motorized rollers 25230 are positioned on a top surface of the retractable arm 25220. In one or more embodiments, the plurality of motorized rollers 25230 are driven by one or more motors. In one or more embodiments, the plurality of motorized rollers 25230 are configured to propel a rectangular prism in a horizontal direction.

In one or more embodiments, movable base 25210 houses the retractable arm 25220. In one or more embodiments, movable base 25210 includes a top surface. In one or more embodiments, the top surface of movable base 25210 is a flat rectangular surface. In one or more embodiments, movable base 25210 is made of metal.

In one or more embodiments, the top surface of movable base 25210 includes a plurality of rollers 25240. In one or more embodiments, the plurality of rollers 25240 are configured to roll as a rectangular prism moves across the top of movable base 25210.

In one or more embodiments, the plurality of rollers 25240 are spherical rollers. In one or more embodiments, the plurality of rollers 25240 protrude halfway or less than halfway from the top of movable base 25210. In one or more embodiments, plurality of rollers 25240 are configured to reduce friction as a rectangular prism moves across the top of movable base 25210. Referring to FIG. 252B, a top view of movable base 25210 is provided.

In one or more embodiments, the rollers 25240 on top of movable base 25210 are spaced evenly across two rows. In one or more alternate embodiments, less than two or more than two rows of rollers 25240 may be on top of movable base 25210. In one or more embodiments, the plurality of rollers 25240 may be replaced by a low friction material. For example, the plurality of rollers 25240 may be replaced by a low friction plastic.

Referring to FIG. 253, a smart rack 25300 for transporting a rectangular prism is provided. In one or more embodiments, smart rack 25300 includes rack beams 25310 and movable bases 25320.

In one or more embodiments, a smart rack 25300 includes a plurality of rack beams 25310. In one or more embodiments, each of the plurality of rack beams 25310 is made of metal. In one or more embodiments, the plurality of rack beams 25310 form a cube structure. In one or more embodiments, the plurality of rack beams 25310 are coupled to one or more movable bases 25320.

In one or more embodiments, movable bases 25320 are configured to move up and down a smart rack 25300 via a lead screw 25330. In one or more embodiments, movable base 25320 is configured to lift a rectangular prism in a vertical direction when moved by lead screw 25330. In one or more embodiments, a movable base 25320 is configured to house a retractable arm.

Referring to FIG. 254, a retractable arm 25410 is illustrated. In one or more embodiments, the retractable arm 25410 may be housed in a movable base 25320 described above in connection with FIG. 253. For example, the retractable arm 25410 may be configured to retract in and out of movable base 25320. In one or more embodiments, the retractable arm 25410 is configured to support a rectangular prism, similar to various examples described above.

In one or more embodiments, a conveyor 25420 is disposed on top of retractable arm 25410. In one or more embodiments, the conveyor 25420 may be configured to transport a rectangular prism. For example, the conveyor 25420 may be configured to move a rectangular prism in a horizontal direction.

In one or more embodiments, a retractable arm 25410 is secured to a movable base 25320 by bracket 25430. In one or more embodiments, bracket 25430 is made of a metal material. In one or more embodiments, bracket 25430 is disposed on two sides of retractable arm 25410. In one or more embodiments, bracket 25430 is configured to slide in and out of movable base 25320.

In one or more embodiments, the conveyor 25420 is a side belt transfer. In one or more embodiments, using the conveyor 25420 may reduce the part count in a smart rack 25300 and increase the speed and efficiency of a smart rack 25300. In one or more embodiments, conveyor 25420 is made of a flexible material. In one or more embodiments, conveyor 25420 is a loop disposed on top of retractable arm 25410.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method for operating a modular superstructure, the computer-implemented method comprising:

identifying rack arrangement data comprising a cell velocity grid associated with a plurality of racks in the modular superstructure;

generating a travel time grid corresponding to the plurality of racks based at least in part on a starting position, an ending position, and the rack arrangement data;

generating a gradient grid corresponding to the plurality of racks by applying at least one filter to the travel time grid;

generating pathing data for traversing a rectangular prism from the starting position to the ending position in the modular superstructure based at least in part on applying a gradient descent algorithm to the gradient grid; and causing the rectangular prism to traverse based at least in part on the pathing data.

2. The computer-implemented method of claim 1, wherein the cell velocity grid comprises a plurality of cell velocities each assigned to a corresponding rack location based at least in part on a rack status associated with the corresponding rack location.

3. The computer-implemented method of claim 2, wherein each of the plurality of cell velocities represents a resistance value associated with traversing the rectangular prism at the corresponding rack location.

4. The computer-implemented method of claim 2, wherein the plurality of cell velocities comprises:

a first cell velocity assigned to a first rack location associated with an obstructed status; and a second cell velocity assigned to a second rack location associated with an open status.

5. The computer-implemented method of claim 1, further comprising:

identifying at least one obstructed rack location from the pathing data;

generating clearing move data based at least in part on the at least one obstructed rack location; and causing the rectangular prism to traverse based at least in part on the pathing data and the clearing move data.

6. The computer-implemented method of claim 1, wherein generating the travel time grid comprises applying a fast-marching method to the cell velocity grid.

7. The computer-implemented method of claim 1, wherein generating the gradient grid comprises applying a Sobel filter to the travel time grid.

8. An apparatus for operating a modular superstructure, the apparatus comprising at least one processor and at least one non-transitory memory comprising program code, the at least one non-transitory memory and the program code configured to, with the at least one processor, cause the apparatus to at least:

identify rack arrangement data comprising a cell velocity grid associated with the plurality of racks in the modular superstructure;

generate a travel time grid corresponding to the plurality of racks based at least in part on a starting position, an ending position, and the rack arrangement data;

generate a gradient grid corresponding to the plurality of racks by applying at least one filter to the travel time grid;

generate pathing data for traversing a rectangular prism from the starting position to the ending position in the modular superstructure based at least in part on applying a gradient descent algorithm to the gradient grid; and cause the rectangular prism to traverse based at least in part on the pathing data.

9. The apparatus of claim 8, wherein the cell velocity grid comprises a plurality of cell velocities each assigned to a corresponding rack location based at least in part on a rack status associated with the corresponding rack location.

10. The apparatus of claim 9, wherein each of the plurality of cell velocities represents a resistance value associated with traversing the rectangular prism at the corresponding rack location.

11. The apparatus of claim 9, wherein the plurality of cell velocities comprises:

a first cell velocity assigned to a first rack location associated with an obstructed status; and a second cell velocity assigned to a second rack location associated with an open status.

12. The apparatus of claim 8, wherein the at least one non-transitory memory and the program code are configured to, with the at least one processor, cause the apparatus to:

identify at least one obstructed rack location from the pathing data;

generate clearing move data based at least in part on the at least one obstructed rack location; and cause the rectangular prism to traverse based at least in part on the pathing data and the clearing move data.

13. The apparatus of claim 8, wherein, when generating the travel time grid, the at least one non-transitory memory and the program code are configured to, with the at least one processor, cause the apparatus to apply a fast-marching method to the cell velocity grid.

14. The apparatus of claim 8, wherein, when generating the gradient grid, the at least one non-transitory memory and the program code are configured to, with the at least one processor, cause the apparatus to apply a Sobel filter to the travel time grid.

15. A computer program product for operating a modular superstructure, the computer program product comprising at least one non-transitory computer-readable storage medium having computer-readable program code portions stored therein, the computer-readable program code portions comprising an executable portion configured to:

identify rack arrangement data comprising a cell velocity grid associated with the plurality of racks in the modular superstructure;

generate a travel time grid corresponding to the plurality of racks based at least in part on a starting position, an ending position, and the rack arrangement data;

generate a gradient grid corresponding to the plurality of racks by applying at least one filter to the travel time grid;

generate pathing data for traversing a rectangular prism from the starting position to the ending position in the modular superstructure based at least in part on applying a gradient descent algorithm to the gradient grid; and cause the rectangular prism to traverse based at least in part on the pathing data.

16. The computer program product of claim 15, wherein the cell velocity grid comprises a plurality of cell velocities each assigned to a corresponding rack location based at least in part on a rack status associated with the corresponding rack location.

17. The computer program product of claim 16, wherein each of the plurality of cell velocities represents a resistance value associated with traversing the rectangular prism at the corresponding rack location.

18. The computer program product of claim 16, wherein the plurality of cell velocities comprises:

a first cell velocity assigned to a first rack location associated with an obstructed status; and a second cell velocity assigned to a second rack location associated with an open status.

19. The computer program product of claim 15, wherein the computer-readable program code portions comprise the executable portion configured to:

identify at least one obstructed rack location from the pathing data;

generate clearing move data based at least in part on the at least one obstructed rack location; and cause the rectangular prism to traverse based at least in part on the pathing data and the clearing move data.

20. The computer program product of claim 15, wherein, when generating the travel time grid, the computer-readable program code portions comprise the executable portion configured to apply a fast-marching method to the cell velocity grid.

* * * * *